US010790917B2

(12) United States Patent
Yang et al.

(10) Patent No.: US 10,790,917 B2
(45) Date of Patent: Sep. 29, 2020

(54) APPARATUS FOR TRANSMITTING BROADCAST SIGNAL, APPARATUS FOR RECEIVING BROADCAST SIGNAL, METHOD FOR TRANSMITTING BROADCAST SIGNAL AND METHOD FOR RECEIVING BROADCAST SIGNAL

(71) Applicant: LG ELECTRONICS INC., Seoul (KR)

(72) Inventors: Seungryul Yang, Seoul (KR); Kyoungsoo Moon, Seoul (KR); Woosuk Ko, Seoul (KR); Minsung Kwak, Seoul (KR); Sungryong Hong, Seoul (KR); Jangwon Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/885,274

(22) Filed: Jan. 31, 2018

(65) Prior Publication Data

US 2018/0159644 A1 Jun. 7, 2018

Related U.S. Application Data

(63) Continuation of application No. 15/543,041, filed as application No. PCT/KR2016/001995 on Feb. 29, 2016, now Pat. No. 10,637,595.

(Continued)

(51) Int. Cl.

*G06F 15/16* (2006.01)
*H04H 20/59* (2008.01)

(Continued)

(52) U.S. Cl.

CPC ......... *H04H 20/59* (2013.01); *H04L 65/4076* (2013.01); *H04N 21/235* (2013.01);

(Continued)

(58) Field of Classification Search

CPC ..... H04H 20/59; H04L 65/4076; H04L 67/02; H04N 21/235; H04N 21/27;

(Continued)

(56) References Cited

U.S. PATENT DOCUMENTS 10,009,129 B2 6/2018 Deshpande
2010/0186029 A1 7/2010 Kim et al.

(Continued)

FOREIGN PATENT DOCUMENTS

KR 10-2013-0117778 A 10/2013
KR 10-2014-0090977 A 7/2014

(Continued)

*Primary Examiner* — Alan S Chou

(74) *Attorney, Agent, or Firm* — Birch, Stewart, Kolasch & Birch, LLP

(57) ABSTRACT

A method for providing a broadcast service by a primary device (PD) includes performing a discovery process with a companion device (CD) application executed in a CD, wherein the discovery process includes receiving a device description request from the CD application, transmitting a first response message, receiving, from the CD application, an application information request destined for a first URL and transmitting a second response message, wherein a header of the first response message includes the first URL, and the second response message includes a second URL used as a Websocket endpoint of the PD; establishing a Websocket connection between a Websocket server and the CD application using the second URL; receiving a request message for media timeline information from the CD through the Websocket connection; and delivering a notification message to the CD through the Websocket connection.

8 Claims, 352 Drawing Sheets

Related U.S. Application Data

(60) Provisional application No. 62/144,311, filed on Apr. 7, 2015, provisional application No. 62/126,704, filed on Mar. 1, 2015, provisional application No. 62/126,693, filed on Mar. 1, 2015, provisional application No. 62/126,707, filed on Mar. 1, 2015.

(51) Int. Cl.

| | |
|---|---|
| *H04N 21/235* | (2011.01) |
| *H04N 21/61* | (2011.01) |
| *H04N 21/488* | (2011.01) |
| *H04N 21/41* | (2011.01) |
| *H04N 21/27* | (2011.01) |
| *H04L 29/06* | (2006.01) |
| *H04N 21/43* | (2011.01) |
| *H04N 21/858* | (2011.01) |
| *H04L 29/08* | (2006.01) |

(52) U.S. Cl.

CPC ......... *H04N 21/27* (2013.01); *H04N 21/4126* (2013.01); *H04N 21/4302* (2013.01); *H04N 21/4882* (2013.01); *H04N 21/6112* (2013.01); *H04N 21/8586* (2013.01); *H04L 67/02* (2013.01)

(58) Field of Classification Search

CPC ........... H04N 21/4126; H04N 21/4302; H04N 21/4882; H04N 21/6112; H04N 21/8586

USPC .......................................................... 709/227

See application file for complete search history.

(56) References Cited

U.S. PATENT DOCUMENTS

| | | | | |
|---|---|---|---|---|
| 2014/0013342 | A1 | 1/2014 | Swan et al. | |
| 2014/0137165 | A1 | 5/2014 | Yamagishi | |
| 2014/0214967 | A1 | 7/2014 | Baba et al. | |
| 2015/0058905 | A1 | 2/2015 | Kim et al. | |
| 2016/0255036 | A1* | 9/2016 | Hebbar | H04L 51/10 709/206 |
| 2018/0270001 | A1* | 9/2018 | Deshpande | H04H 20/08 |

FOREIGN PATENT DOCUMENTS

| | | | |
|---|---|---|---|
| WO | WO 2014/119961 | A1 | 8/2014 |
| WO | WO 2014/148813 | A1 | 9/2014 |
| WO | WO 2014/207305 | A1 | 12/2014 |

* cited by examiner

FIG. 2

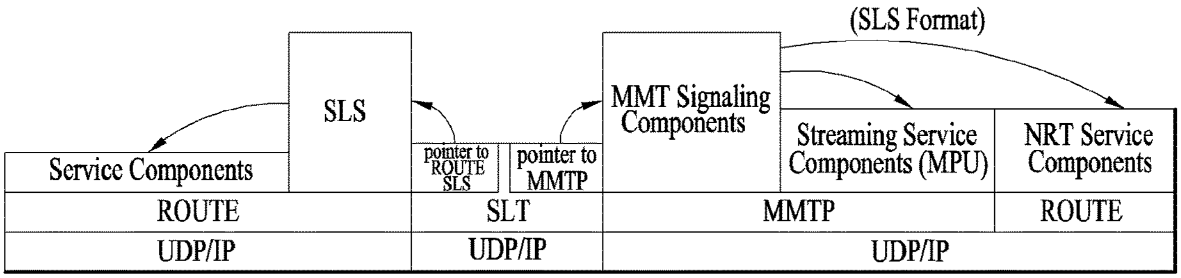

FIG. 3

| Element or Attribute Name | | | Use |
|---|---|---|---|
| SLT | | | |
| | @bsid | | 1 |
| | @sltSectionVersion | | 1 |
| | @sltSectionNumber | | 0..1 |
| | @totalSltSectionNumbers | | 0..1 |
| | @language | | 0..1 |
| | @capabilities | | 0..1 |
| | InetSigLoc | | 0..1 |
| | Service | | 1..N |
| | | @serviceId | 1 |
| | | @SLT serviceSeqNumber | 1 |
| | | @protected | 0..1 |
| | | @majorChannelNo | 1 |
| | | @minorChannelNo | 1 |
| | | @serviceCategory | 1 |
| | | @shortServiceName | 1 |
| | | @hidden | 0..1 |
| | | @sls ProtocolType | 1 |
| | | BroadcastSignaling | 0..1 |
| | | @slsPlpId | 0..1 |
| | | @slsDestinationIpAddress | 0..1 |
| | | @slsDestinationUdpPort | 0..1 |
| | | @slsSourceIpAddress | 0..1 |
| | | @slsMajorProtocolVersion | 0..1 |
| | | @SlsMinorProtocolVersion | 0..1 |
| | | @serviceLanguage | 0..1 |
| | | @broadbandAccessRequired | 0..1 |
| | | @capabilities | 0..1 |
| | | InetSigLoc | 0..1 |

FIG. 5

| Element or Attribute Name | | | | | Use |
|---|---|---|---|---|---|
| bundleDescription | | | | | |
| | userServiceDescription | | | | |
| | | @serviceId | | | M |
| | | @atsc: serviceId | | | M |
| | | @atsc: serviceStatus | | | OD |
| | | @atsc: fullMPDUri | | | M |
| | | @atsc: sTSIDUri | | | M |
| | | name | | | 0..N |
| | | | lang | | CM |
| | | serviceLanguage | | | 0...N |
| | | atsc: capabilityCode | | | 0...1 |
| | | deliveryMethod | | | 1..N |
| | | | r12: broadcastAppService | | 1..N |
| | | | | basePattern | 1..N |
| | | | r12: unicastAppService | | 0..N |
| | | | | basePattern | 1..N |

FIG. 6

| Element and Attribute Names | | | | Use |
|---|---|---|---|---|
| S - TSID | | | | |
| | @serviceId | | | O |
| | RS | | | 1..N |
| | | @bsid | | OD |
| | | @sIpAddr | | OD |
| | | @dIpAddr | | OD |
| | | @dport | | OD |
| | | @PLPID | | OD |
| | | LS | | 1..N |
| | | | @tsi | M |
| | | | @PLPID | OD |
| | | | @bw | O |
| | | | @startTime | O |
| | | | @endTime | O |
| | | | SrcFlow | 0..1 |
| | | | RprFlow | 0..1 |

FIG. 7

| Element or Attribute Name | | | | | Use |
|---|---|---|---|---|---|
| bundleDescription | | | | | |
| | userServiceDescription | | | | |
| | | @serviceId | | | M |
| | | @atsc: serviceId | | | M |
| | | Name | | | 0..N |
| | | | Lang | | CM |
| | | serviceLanguage | | | 0..N |
| | | atsc: capabilityCode | | | 0..1 |
| | | atsc: Channel | | | 1 |
| | | | @atsc: majorChannelNo | | M |
| | | | @atsc: minorChannelNo | | M |
| | | | @atsc: serviceLang | | O |
| | | | @atsc: serviceGenre | | O |
| | | | @atsc: serviceIcon | | M |
| | | | atsc: ServiceDescription | | 0..N |
| | | | | @atsc: serviceDescrText | M |
| | | | | @atsc: serviceDescrLang | O |
| | | atsc:mpuComponent | | | 0..1 |
| | | | @atsc: mmtPackageId | | M |
| | | | @atsc: next MmtPackageId | | O |
| | | atsc: routeComponent | | | 0..1 |
| | | | @atsc: sTSIDUri | | M |
| | | | @slsPlpId | | OD |
| | | | @slsDestinationIpAddress | | OD |
| | | | @slsDestinationUdpPort | | M |
| | | | @slsSourceIpAddress | | M |
| | | | @slsMajorProtocolVersion | | OD |
| | | | @SlsMinorProtocolVersion | | OD |
| | | atsc: broadbandComponent | | | 0..1 |
| | | | @atsc: fullfMPDUri | | M |
| | | atsc: ComponentInfo | | | 1..N |
| | | | @atsc: component Type | | M |
| | | | @atsc: component Role | | M |
| | | | @atsc: component ProtectedFlag | | OD |
| | | | @atsc: component Id | | M |
| | | | @atsc: component Name | | O |

FIG. 13
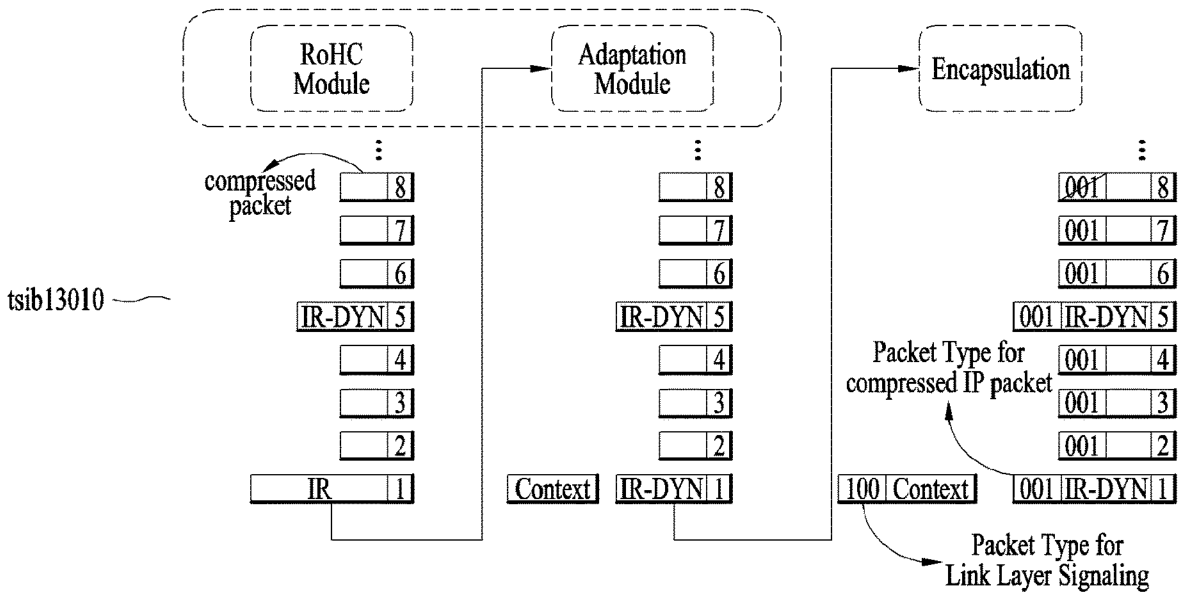
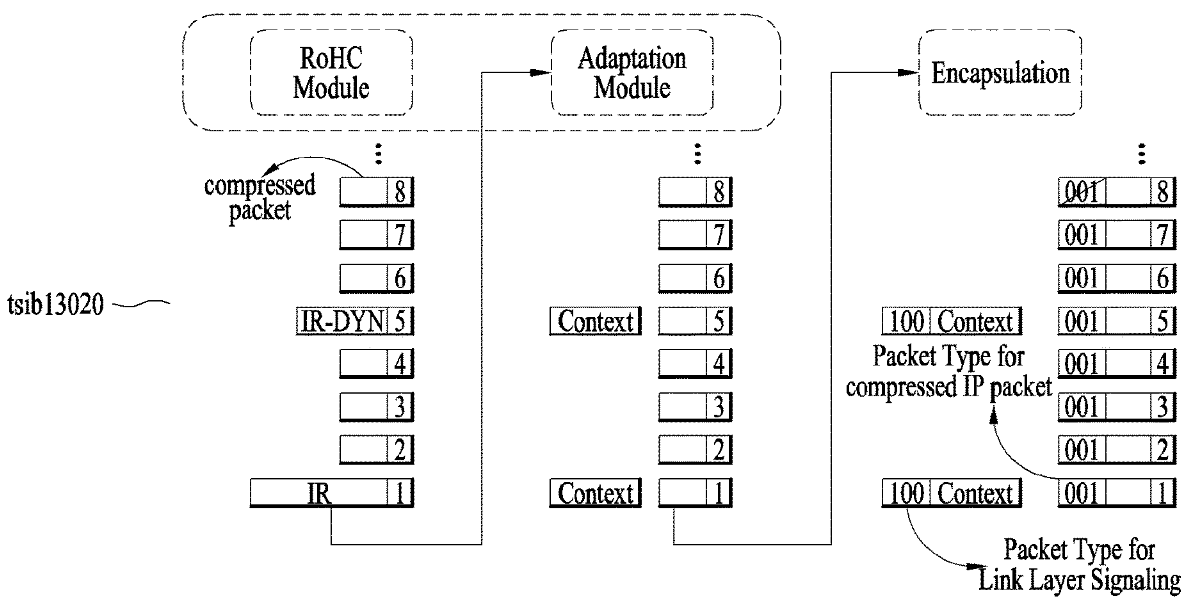

FIG. 14 tsib14010

| Syntax | Number of bits | Mnemonic |
|---|---|---|
| Link_Mapping_Table() { | | |
| signaling_type | 8 | "0x01" |
| PLP_ID | 6 | uimsbf |
| Reserved | 2 | |
| num_session | 8 | uimsbf |
| for(i = 0 ; i < num_session ; i + +) { | | |
| src_IP_add | 32 | uimsbf |
| dst_IP_add | 32 | uimsbf |
| src_UDP_port | 16 | uimsbf |
| dst_UDP_port | 16 | uimsbf |
| SID_flag | 1 | bslbf |
| compressed_flag | 1 | bslbf |
| reserved | 6 | '000000' |
| if (SID_flag = = "1") { | | |
| SID | 8 | uimsbf |
| } | | |
| if (compressed_flag = = "1') { | | |
| context_id | 8 | uimsbf |
| } | | |
| } | | |
| } | | | tsib14020

| Syntax | Number of bits | Mnemonic |
|---|---|---|
| ROHC-U_description_table { | | |
| signaling_type | 8 | "0x02" |
| PLP_ID | 6 | uimsbf |
| adaptation_mode | 2 | uimsbf |
| context_config | 2 | bslbf |
| reserved | 6 | bslbf |
| context_id | 8 | uimsbf |
| context_profile | 8 | uimsbf |
| if (context_config = 0x01) { | | |
| context_length | 8 | uimsbf |
| static_chain_byte () | var | uimsbf |
| } | | |
| else if (context_config = 0X02) { | | |
| context_length | 8 | uimsbf |
| dynamic_chain_byte () | var | uimsbf |
| } | | |
| else if (context_config = 0x03) { | | |
| context_length | 8 | uimsbf |
| static_chain_byte () | var | uimsbf |
| dynamic_chain_byte () | var | uimsbf |
| } | | |
| } | | |

(a)

$$S_{demux\_in}(i)=\{b_i(0),b_i(1),b_i(2),...,b_i(\eta_{MOD}-1)\},$$

$$S_{demux\_out}(i)=\{c_i(0),c_i(1),c_i(2),...,c_i(\eta_{MOD}-1)\},$$

$$c_i(1)=b_i(i\%\eta_{MOD}),c_i(2)=b_i((i+1)\%\eta_{MOD}),...,c_i(\eta_{MOD}-1)=b_i((i+1)\%\eta_{MOD})$$

| Content | Bits |
|---|---|
| PREAMBLE_DATA | 20 |
| NUM_FRAME_FRU | 2 |
| PAYLOAD_TYPE | 3 |
| NUM_FSS | 2 |
| SYSTEM_VERSION | 8 |
| CELL_ID | 16 |
| NETWORK_ID | 16 |
| SYSTEM_ID | 16 |
| for i = 0:3 | |
| FRU_PHY_PROFILE | 3 |
| FRU_FRAME_LENGTH | 2 |
| FRU_GI_FRACTION | 3 |
| RESERVED | 4 |
| end | |
| PLS2_FEC_TYPE | 2 |
| PLS2_MOD | 3 |
| PLS2_SIZE_CELL | 15 |
| PLS2_STAT_SIZE_BIT | 14 |
| PLS2_DYN_SIZE_BIT | 14 |
| PLS2_REP_FLAG | 1 |
| PLS2_REP_SIZE_CELL | 15 |
| PLS2_NEXT_FEC_TYPE | 2 |
| PLS2_NEXT_MODE | 3 |
| PLS2_NEXT_REP_FLAG | 1 |
| PLS2_NEXT_REP_SIZE_CELL | 15 |
| PLS2_NEXT_REP_STAT_SIZE_BIT | 14 |
| PLS2_NEXT_REP_DYN_SIZE_BIT | 14 |
| PLS2_AP_MODE | 2 |
| PLS2_AP_SIZE_CELL | 15 |
| PLS2_NEXT_AP_MODE | 2 |
| PLS2_NEXT_AP_SIZE_CELL | 15 |
| RESERVED | 32 |
| CRC 32 | 32 |

FIG. 25

| Content | Bits |
|---|---|
| FIC_FLAG | 1 |
| AUX_FLAG | 1 |
| NUM_DP | 6 |
| for i = 1: NUM_DP | |
| DP_ID | 6 |
| DP_TYPE | 3 |
| DP_GROUP_ID | 8 |
| BASE_DP_ID | 6 |
| DP_FEC_TYPE | 2 |
| DP_COD | 4 |
| DP_MOD | 4 |
| DP_SSD_FLAG | 1 |
| if PHY_PROFILE = '010' | |
| DP_MIMO | 3 |
| end | |
| DP_TI_TYPE | 1 |
| DP_TI_LENGTH | 2 |
| DP_TI_BYPASS | 1 |
| DP_FRAME_INTERVAL | 2 |
| DP_FIRST_FRAME_IDX | 5 |
| DP_NUM_BLOCK_MAX | 10 |
| DP_PAYLOAD_TYPE | 2 |
| DP_INBAND_MODE | 2 |
| DP_PROTOCOL_TYPE | 2 |
| DP_CRC_MODE | 2 |
| if DP_PAYLOAD_TYPE = = TS('00') | |
| DNP_MODE | 2 |
| ISSY_MODE | 2 |
| HC_MODE_TS | 2 |
| if HC_MODE_TS = = '01' or '10' | |
| PID | 13 |
| end | |
| if DP_PAYLOAD_TYPE == IP('01') | |
| HC_MODE_IP | 2 |
| end | |
| RESERVED | 8 |
| end | |
| if FIC_FLAG = = 1 | |
| FIC_VERSION | 8 |
| FIC_LENGTH_BYTE | 13 |
| RESERVED | 8 |
| end | |
| if AUX_FLAG = = 1 | |
| NUM_AUX | 4 |
| AUX_CONFIG_RFU | 8 |
| for - 1 : NUM_AUX | |
| AUX_STREAM_TYPE | 4 |
| AUX_PRIVATE_CONF | 28 |
| end | |
| end | |

| Content | | Bit |
|---|---|---|
| FRAME_INDEX | | 5 |
| PLS_CHANGE_COUNTER | | 4 |
| FIC_CHANGE_COUNTER | | 4 |
| RESERVED | | 16 |
| for i = 1: NUM_DP | | |
| | DP_ID<br>DP_START | 6<br>15 (or13) |
| | DP_NUM_BLOCK | 10 |
| end | RESERVED | 8 |
| EAC_FLAG | | 1 |
| EAS_WAKE_UP_VERSION_NUM | | 8 |
| if EAC_FLAG == 1 | | |
| | EAC_LENGTH_BYTE | 12 |
| else | | |
| | EAC_COUNTER | 12 |
| end | | |
| for i=1:NUM_AUX | | |
| | AUX_PRIVATE_DYN | 48 |
| end | | |
| CRC 32 | | 32 |

The main-PRBS generator is defined based on the $(N_a-1)$-bit binary word sequence $R_n$ with $N_a = \log_2 N_{max}$ $0 \le n < 2$ $$R_n[N_a-2, N_a-3, \ldots, 1, 0] = 0,0,, \ldots, 0,0$$

$n = 2$ $$R_n[N_a-2, N_a-3, \ldots, 1, 0] = 0,0,, \ldots, 0,1$$

$2 < n < N_{max}$ $$R_n[N_a-3, N_a-4, \ldots, 1, 0] = R_n[N_a-2, N_a-3, \ldots, 2, 1]$$

where $R_n[N_a-2]$ is definedas:

in 8K FFTmode: $R_n[11] = R_{n-1}[0] \oplus R_{n-1}[1] \oplus R_{n-1}[4] \oplus R_{n-1}[6]$ in 16K FFTmode: $R_n[12] = R_{n-1}[0] \oplus R_{n-1}[1] \oplus R_{n-1}[4] \oplus R_{n-1}[5] \oplus R_{n-1}[9] \oplus R_{n-1}[11]$ in 32K FFTmode: $R_n[13] = R_{n-1}[0] \oplus R_{n-1}[1] \oplus R_{n-1}[2] \oplus R_{n-1}[12]$ (a)

| FFT mode | Nmax |
|---|---|
| 8K | 8192 |
| 16K | 16384 |
| 32K | 32768 |

The sub-PRBS generator is defined based on the $(N_b-1)$-bit binary word sequence $G_k$ with $N_b=\log_2(0.5N_{\max})$ $$0 \le k < 4$$
$$G_k[N_b-2, N_b-3,\ldots,1,0]=0,0,,\ldots,0,0$$
$$k=4$$
$$G_k[N_b-2, N_b-3,\ldots,1,0]=1,1,,\ldots,1,1$$
$$4<k<N_{\max}$$
$$G_k[N_b-3, N_b-4,\ldots,1,0]=G_k[N_b-2, N_b-3,\ldots,2,1]$$

where $G_k[N_b-2]$ is defined as:

in 8K FFT mode: $G_k[10]=G_{k-1}[0]\oplus G_{k-1}[2]$ in 16K FFT mode: $G_k[11]=G_{k-1}[0]\oplus G_{k-1}[1]\oplus G_{k-1}[4]\oplus G_{k-1}[6]$ in 32K FFT mode: $G_k[12]=G_{k-1}[0]\oplus G_{k-1}[1]\oplus G_{k-1}[4]\oplus G_{k-1}[5]\oplus G_{k-1}[9]\oplus G_{k-1}[11]$ (a)

$$
\begin{aligned}
& p=0; \\
& for\ \ (n=0; n<N_{\max}; n=n+1) \\
& \quad \{T(n)=(n \bmod 2)\cdot 2^{N_a-1}+\sum_{i=0}^{N_a-2}(2^i\ ?R_n[i]); \\
& \quad S_l(n)=(T(n)+A_{\lfloor l/2\rfloor}) \bmod N_{\max}; \\
& \quad if\ \ S_l(n)<N_{data} \\
& \qquad \{H_l(p)=S_l(n); \\
& \qquad p=p+1;\ \} \\
& \quad \}
\end{aligned}
$$

$(n \bmod 2)\cdot 2^{N_a-1}$ denotes 1-bit toggling, i.e.,, $R_n[N_a-1]=0,1,0,1,\ldots$ and the cyclic-shifting value $A_{\lfloor l/2\rfloor}$ is calculated for every OFDM symbol pair (b)

FIG. 36
| | | |
|---|---|---|
| PLP_NUM | 1 | >1 |
| Interleaving type | CI | CI+BI |
FIG. 37
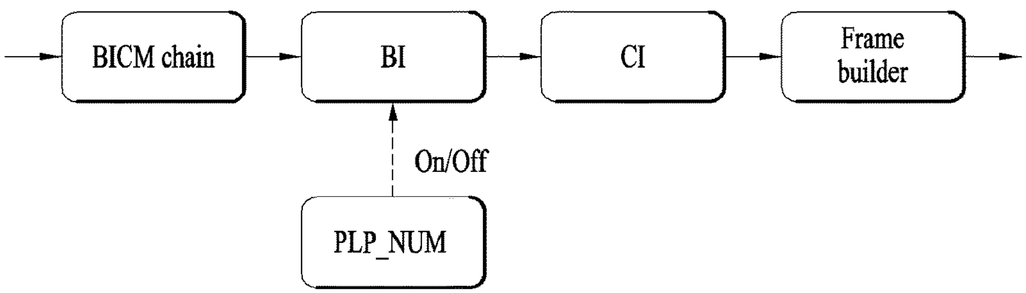
<Hybrid TI structure: example-1>
FIG. 38
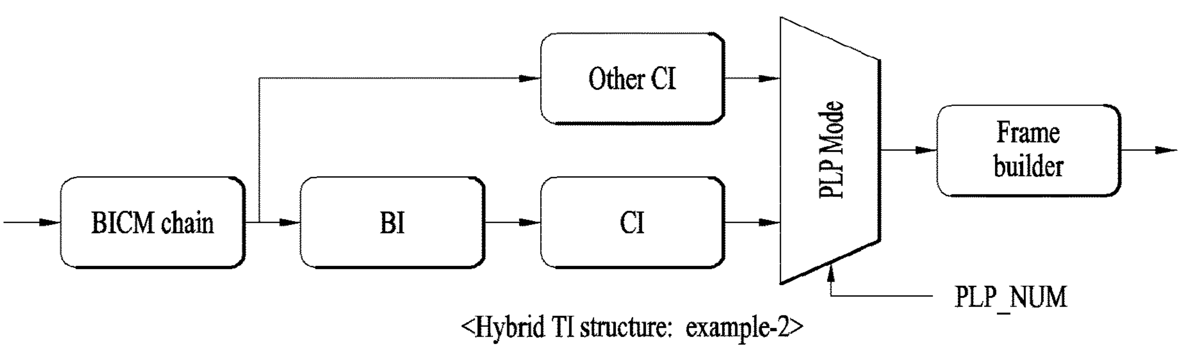
<Hybrid TI structure: example-2>

<Hybrid TI structure: example-1>

<Hybrid TI structure: example-2>

FIG. 57

| Service | Service Type | Service ID |
|---|---|---|
| ESG | atsc3.0ESG:1 | urn:atsc.org:serviceId:atsc3.0ESG |

FIG. 58

```
<?xml version="1.0" encoding="UTF-8"?>
<ESGData
xmlns="urn: atsc. serviceId: atsc3 . OESG"
xsi: schemaLocacion="urn. atsc.org : serviceId: atsc3 . OESG"
    <Service id = "atsc.org/ esg/ service/1" version-"1">
        <Name>Home Shopping</Name>
        <Description> Home Shopping Linear Service</Descripcion>
t54010  <ServiceType>14</ServiceType>
        <ServiceType>15</ServiceType>
        . . .
    </Service>
    <Schedule id="atsc.org/ esg/scheduie/l" version="1">
        <ServiceReference idRef ="atsc.org/ esg/ service/1">
        </ServiceReference>
t54020  . . .
    </Schedule>
    <Content id="atsc.org/content/1" version="1">
        . . .
        <ComponentReference idRef = "atsc.org/ esg/component/1">
        </ComponentReference>
t54030  . . .
    </Content>
    <Component id="atsc.org/esg/component/1" version="1">
        <ComponentType>l</ComponentType>
        <ComponentType>6</ComponentType>
t54040  . . .
        <ComponentData ConrentType="Video">
            . . .
    </Component>
    . . .
    <InteractivityData>
    . . .
    </InteractivityData>
</ESGData>
```

FIG. 59

```
<ESGData
xmlns="urn: atsc. serviceId: atsc3 . OESG"
xsi: schemaLocacion="urn. atsc.org : serviceId: atsc3 . OESG"
    <Service id = "atsc.org/ esg/ service/1" version-"1">
        <Name>Home Shopping</Name>
        <Description> Home Shopping Linear Service</Descripcion>
        <ServiceType>14</ServiceType>
        <ServiceType>15</ServiceType>
        . . .
    </Service>
    <Schedule id="atsc.org/ esg/service/2" version="1">
    . . .
    </Schedule>
    <Content id="atsc.org/content/1" version="1">
        <ServiceReference idRef = "atsc.org/ esg/ service/1">
        </ServiceReference>
        . . .
    </Schedule>
    <Content id =  "atsc.org/ esg/ service/1" version="1">
        . . .
       <ServiceReference idRef = <"atsc.org/ esg/ service/1">
       </ServiceReference>
       <PrivateExt>
       <Component>
            <ComponentType>1</ComponentType>
            <ComponentType>1</ComponentType>
            <StarTime/>
            <EndTime/>
            <Language/>
            <Length/>
            <ParentalRating/>
            <DeviceCapability>4</DeviceCapability>
            <DeviceCapability>8</DeviceCapability>
       <TargetDevice>1</TargetDevice>
       </Component>
       <Component>
            <ComponentType>2</ComponentType>
            <ComponentRole>6</ComponentRole>
            <StartTime/>
            <EndTime/>
            <Language>KOR</Language>
            <Length/>
            <ParentalRating/>
            <DeviceCapability>11</DeviceCapability>
            <TargetDevice>1</TargetDevice>
       </Component>
    </PrivateExt>
    . . .
    </Content>
    . . .
</ESGData>
``` t55010

FIG. 61

```
<?xml version="1.0" encoding="UTF-8"?>
<LastChangedESGData
xmlns="urn: atsc . org:serviceId: atsc3 . OESG"
xsi: schemaLocacion="urn. atsc.org : serviceId: atsc3 . OESG"
    <Addtion>
        <Service id="atsc.org/esg/service/3" version="1">
        . . .
        </Service>
        <Service id="atsc.org/esg/service/4" version="1">
        <Name>ABC</Name>
                . . .
        </Service>
    </Addtion>
    <Modification>
        <Schedule id="atsc.org/esg/service/3" version="1">
            . . .
        </Schedule>
    </Modification>
    <Deletion>
        <Content id="atsc.org/content/1" version="1">
        . . .
        </Content>
        <Content id="atsc.org/content/2" version="1">
        . . .
        </Content>
    </Deletion>
</LastChangedESGData>
``` t57010 (Addtion block)

t57020 (Modification block)

t57030 (Deletion block)

FIG. 74

| Element Name | Description |
|---|---|
| SubscriptionCallbackURL | URL location to receive media playback state information message |
| SubscriptionDuration | Requested duration in number of seconds until the media playback state information subscription expires. A special value of -1 indicates "Infinite" duration. |
| MediaURL | URL for the media for which media playback state information subscription is requested. By default (without this element provided), it is indicated that the information about the media currently being played back on PD is requested (optional). |
| MediaID | Identifier for the media for which media playback state information subscription is requested. The identifier may uniquely identify the media on primary device for which media playback state information subscription is requested. (optional) |
| CDDevID | Device identifier for the companion device (optional) |
| CDAppID | Application identifier for companion device (optional) |
| CDAppVersion | Version for companion device (optional) |

FIG. 75

| Element Name | Description |
|---|---|
| StatusCode | Indicates that the request is successfully accepted.<br><br>For example:<br><br>aaa: successfully accepted. |
| StatusString | A success/ failure indication status string of the request |
| SubscriptionID | The subscription identifier for this media playback state information subscription. SubscriptionID may be used to uniquely identify this subscription from companion device to the primary device. |
| SubscriptionTimeoutDuration | Actual duration in number of seconds until the media playback state information subscription expires. A special value of -1 indicates "Infinite" duration. |
| MediaURL | URL for the media for which media playback state information subscription response is sent (optional) |
| MediaID | Identifier for the media for which media playback state information subscription response is sent. The identifier may uniquely identify the media on primary device for which media playback state information subscription response is sent and associate it with the subscription ID sent (SubscriptionID element) (optional) |
| PDDevID | Device identifier for the primary device (optional) |
| PDVersion | Version for primary device (optional) |

FIG. 76

| Element Name | Description |
|---|---|
| StatusCode | A failure status code describing the reason.<br>For example:<br>xxx: missing or invalid SubscriptionCallbackURL.<br>yyy: unable to accept the subscription request. |
| StatusString | A success/ failure indication status string of the request |

FIG. 77

| Element Name | Description |
|---|---|
| SubscriptionID | The subscription identifier for this media playback state information subscription. SubscriptionID may be used to uniquely identify this subscription from companion device to the primary device. |
| SubscriptionDuration | Requested duration in number of milliseconds until the media playback state information subscription expires. A special value of -1 indicates “Infinite” duration. |
| CDDevID | Device identifier for the companion device (optional) |
| CDAppID | Application identifier for companion device (optional) |
| CDAppVersion | Version for companion device (optional) |

FIG. 78

| Element Name | Description |
|---|---|
| SubscriptionID | The subscription identifier for this media playback state information subscription. SubscriptionID may be used to uniquely identify this subscription from companion device to the primary device. |
| CDDevID | Device identifier for the companion device (optional) |
| CDAppID | Application identifier for companion device (optional) |
| CDAppVersion | Version for companion device (optional) |

FIG. 79

| Element Name | Description |
|---|---|
| StatusCode | Indicates that the request is successfully accepted.<br><br>For example:<br><br>aaa: successfully accepted. |
| StatusString | A success/ failure indication status string of the request |
| SubscriptionID | The subscription identifier for this media playback state information subscription. SubscriptionID may be used to uniquely identify this subscription from companion device to the primary device. |
| SubscriptionTimeoutDuration | Actual duration in number of seconds until the media playback state information subscription expires. A special value of -1 indicates infinite duration |
| PDDevID | Device identifier for the primary device (optional) |
| PDVersion | Version for primary device (optional) |

FIG. 80

| Element Name | Description |
|---|---|
| StatusCode | A failure status code describing the reason.<br>For example:<br>zzz: missing or invalid SubscriptionID.<br>yyy: unable to accept the renewal request. |
| StatusString | A success/ failure indication status string of the request |

FIG. 81

| Element Name | Description |
|---|---|
| StatusCode | A success/ failure indication status code indicating the status of cancel subscription request<br>For example:<br>aaa: successfully accepted.<br>yyy: unable to accept the renewal request. |
| StatusString | A success/ failure indication status string of the request |

FIG. 82

| Element Name | Description |
|---|---|
| SubscriptionID | The subscription identifier for this media playback state information subscription. SubscriptionID may be used to uniquely identify this subscription from companion device to the primary device. |
| MPState | Current media playback state for the media URL/ media ID associated with the media playback state information subscription (identified by the SubscriptionID element). The state can be one of the following: "PLAYING", "PAUSED", "STOPPED", "FFORWARD", "FBACKWARD", "BUFERRING", "UNKNOWN", |
| MPSpeed | Current speed of the media state relative to normal speed. The value is an integer value assuming the normal speed is "1". This is applicable only when the MPState is "FFORWARD" or "FBACKWARD" or "PLAYING". When MPState is "FFORWARD" or "FBACKWARD" the MPSpeed indicates the speed at which media timeline is moving forward or backward relative to normal speed. When MPState is "PLAYING" the MPSpeed indicates the speed at which media playback is progressing relative to normal speed. |
| MediaURL | URL for the media for which media playback state information subscription is requested. By default (without this element provided), it is indicated that the information about the media currently being played back on PD is notified (optional). |
| MediaID | Identifier for the media for which media playback state information subscription is requested. The identifier may uniquely identify the media on primary device for which media playback state information subscription is requested. (optional) |
| PDDevID | Device identifier for the primary device (optional) |
| PDVersion | Version for primary device (optional) |

FIG. 83

| Element Name | Description |
|---|---|
| StatusCode | A success/ failure status code indicating the status of the reception of notification message.<br><br>aaa: successfully accepted.<br><br>yyy: unable to accept the notification message. |
| StatusString | A success/ failure indication status string of the request |
| SubscriptionID | The subscription identifier for this media playback state information subscription. SubscriptionID may be used to uniquely identify this subscription from companion device to the primary device. (optional) |

FIG. 85

| Element Name | Description |
|---|---|
| SubscriptionCallbackURL | URL location to receive emergency alert messages. |
| SubscriptionDuration | Requested duration in number of seconds until the subscription expires. A special value of -1 indicates “Infinite” duration. |
| Geo-loc | Geographical location for which the emergency alert messages are requested (optional) |
| CDDevID | Device identifier for the companion device (optional) |
| CDAppID | Application identifier for companion device (optional) |
| CDAppVersion | Version for companion device (optional) |

FIG. 86

| Element Name | Description |
|---|---|
| StatusCode | Indicates that the request is successfully accepted.<br>For example:<br>aaa: successfully accepted. |
| StatusString | A success/ failure indication status string of the request |
| SubscriptionID | The subscription identifier for this emergency alert message subscription. SubscriptionID may be used to uniquely identify this subscription from companion device to the primary device. |
| SubscriptionTimeoutDuration | Actual duration in number of seconds until the subscription expires. A special value of -1 indicates “Infinite” duration. |
| PDDevID | Device identifier for primary device (optional) |
| PDVersion | Version of the primary device (optional) |

FIG. 87

| Element Name | Description |
| --- | --- |
| StatusCode | A failure status code describing the reason.<br>For example:<br>xxx: missing or invalid SubscriptionCallbackURL.<br>yyy: unable to accept the subscription request. |
| StatusString | A success/ failure indication status string of the request |

FIG. 88

| Element Name | Description |
| --- | --- |
| SubscriptionID | The subscription identifier for this emergency alert message subscription. SubscriptionID may be used to uniquely identify this subscription from companion device to the primary device. |
| SubscriptionDuration | Requested duration in number of seconds until the renewed subscription expires. A special value of -1 indicates "Infinite" duration. |
| CDDevID | Device identifier for the companion device (optional) |
| CDAppID | Application identifier of the companion device (optional) |
| CDAppVersion | Version of the companion device (optional) |

FIG. 89

| Element Name | Description |
|---|---|
| SubscriptionID | The subscription identifier for this emergency alert message subscription. SubscriptionID may be used to uniquely identify this subscription from companion device to the primary device. |
| CDDevID | Device identifier for the companion device (optional) |
| CDAppID | Application identifier of the companion device (optional) |
| CDAppVersion | Version of the companion device (optional) |

FIG. 90

| Element Name | Description |
|---|---|
| StatusCode | Indicates that the request is successfully accepted.<br>For example:<br>aaa: successfully accepted. |
| StatusString | A success/ failure indication status string of the request |
| SubscriptionID | The subscription identifier for this emergency alert message subscription. SubscriptionID may be used to uniquely identify this subscription from companion device to the primary device. |
| SubscriptionTimeoutDuration | Actual duration in number of seconds until the subscription expires. A special value of -1 indicates “Infinite” duration. |
| PDDevID | Device identifier for primary device (optional) |
| PDVersion | Version of the primary device (optional) |

FIG. 91

| Element Name | Description |
|---|---|
| StatusCode | A failure status code describing the reason.<br>For example:<br>zzz: missing or invalid SubscriptionID.<br>yyy: unable to accept the renewal request. |
| StatusString | A success/ failure indication status string of the request |

FIG. 92

| Element Name | Description |
|---|---|
| StatusCode | A success/ failure indication status code indicating the status of cancel subscription request<br>For example:<br>aaa: successfully accepted.<br>yyy: unable to accept the renewal request. |
| StatusString | A success/ failure indication status string of the request |
| PDDevID | Device identifier for primary device (optional) |
| PDVersion | Version of the primary device (optional) |

FIG. 93

| Name | | | Type | Cardinality | Description |
|---|---|---|---|---|---|
| EAMNotification | | | | | Emergency alert message notified from PD to CD |
| | EAM | | E1 | 1..N | Emergency alert message |
| | EAMID | | A | 1 | Identifier of the emergency alert message.<br>The identifier uniquely identifies the emergency alert message. |
| | SentTimestamp | | A | 1 | Date and time when the emergency alert message was generated.<br>The first moment when this message is valid. |
| | ExpiredTimestamp | | A | 1 | The last moment (Date and time) when this message is valid. |
| | Category | | A | 0..1 | Indicates the category of Emergency alert message. For example, Geo, Met, Safety, Rescue, Fire, Health, Env, Transport, Infra, CBRNE. |
| | Urgency | | A | 0..1 | Indicates the urgency of Emergency alert message. For example, Immediate, Expected, Future, Past. |
| | Severity | | A | 0..1 | Indicates the severity of Emergency alert message. For example, Extreme, Severe, Moderate, Minor. |
| | Geo-loc | | A | 0..1 | Indicates Geographical location for which Emergency alert message is applicable. |
| | NewMsg | | A | 0..1 | If NewMsg is true then this emergency alert message is a new message,<br>If NewMsg is false then this emergency alert message is a repeat of a previous emergency alert message |
| | OneTimeMsg | | A | 0..1 | If OneTimeMsg is true then this emergency alert message is sent only one time and may not be repeated. If OneTimeMsg is false this emergency alert message may be sent more than one time. |
| | | EAMContent | E2 | 1 | Emergency alert message content. The content-type of this element is given by the ContentFormat attribute. |
| | | ContentFormat | A | 1 | Content format of the emergency alert message, i.e., EAMContent element. |
| | | AddlEAMURL | E2 | 0..N | URL which provides additional information about this emergency alert message. The URL provides more information than what is included in the EAMContent element. |
| | | EAMContent AccessibilityURL | E2 | 1..N | URL which provides initial emergency alert message content for accessibility.<br>The EAMContentAccessibilityURL may point to secondary audio stream, which will facilitate the provision of emergency information.<br>This may be done as required by FCC rules. |
| | | AddlEAMPhone | E2 | 0..N | Phone number for obtaining more information about this emergency alert message |
| | | ContactEmail | E2 | 0..N | Email address which can provide more information regarding this emergency alert message |
| Message exchange protocol related elements: | | | | | |
| | SubscriptionID | | | 1 | The subscription identifier for this emergency alert message subscription.<br>SubscriptionID may be used to uniquely identify this subscription from companion device to the primary device. |
| | PDDevID | | | 0..1 | Device identifier for primary device |
| | PDVersion | | | 0..1 | Version of the primary device |

FIG. 94

| Element Name | Description |
|---|---|
| StatusCode | A success/ failure status code indicating the status of the reception of notification message.<br><br>aaa: successfully accepted.<br><br>yyy: unable to accept the notification message. |
| StatusString | A success/ failure indication status string |
| SubscriptionID | The subscription identifier for this emergency alert message subscription. SubscriptionID may be used to uniquely identify this subscription from companion device to the primary device (optional). |
| EAMID | Identifier of the emergency alert message. The identifier uniquely identifies the emergency alert message (optional). |

FIG. 95

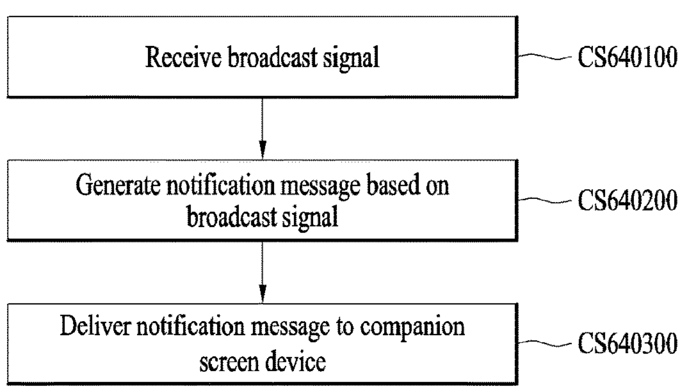

FIG. 98
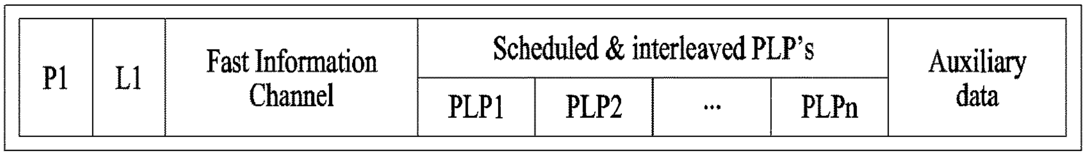
FIG. 99
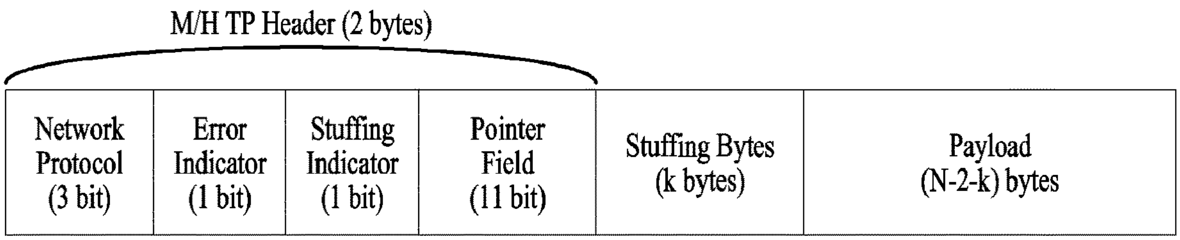
FIG. 100
| network_protocol Value | Meaning |
|---|---|
| 000 | IPv4 (conforming to RFC STD05 [5]) |
| 001-110 | ATSC reserved |
| 111 | framed_packet_type |

FIG. 104

| Syntax | No. of Bits | Format |
|---|---|---|
| service_map_table_section() { | | |
| table_id | 8 | 0xDB |
| section_syntax_indicator | 1 | '0' |
| private_indicator | 1 | '1' |
| reserved | 2 | '11' |
| section_length | 12 | uimsbf |
| table_id_extension { | | |
| SMT_protocol_version | 8 | uimsbf |
| reserved | 8 | uimsbf |
| } | | |
| reserved | 2 | '11' |
| version_number | 5 | uimsbf |
| current_next_indicator | 1 | bslbf |
| section_number | 8 | uimsbf |
| last_section_number | 8 | uimsbf |
| num_services | 8 | uimsbf |
| for (i=0; i<num_services; i++) | | |
| { | | |
| service_id | 16 | uimsbf |
| reserved | 2 | '11' |
| service_status | 2 | uimsbf |
| SP_indicator | 1 | bslbf |
| short_service_name_length /* m */ | 3 | uimsbf |
| short_service_name | 16*m | bslbf |
| reserved | 2 | '11' |
| service_category | 6 | uimsbf |
| reserved | 3 | '111' |
| num_components | 5 | uimsbf |
| for (j=0; j<num_components; j++) | | |
| { | | |
| essential_component_indicator | 1 | bsblf |
| reserved | 3 | '111' |
| num_component_level_descriptors | 4 | uimsbf |
| for (k=0; k<num_component_level_descriptors; k++) | | |
| { | | |
| component_level_descriptor() | var | |
| } | | |
| } | | |
| reserved | 4 | '1111' |
| num_service_level_descriptors | 4 | uimsbf |
| for (m=0; m<num_service_level_descriptors; m++) | | |
| { | | |
| service_level_descriptor() | var | |
| } | | |
| } | | |

FIG. 105

| service_category | Meaning |
|---|---|
| 0x00 | The service category is not specified |
| 0x01 | Basic TV |
| 0x02 | Basic Radio |
| 0x03 | RI service – Rights Issuer service |
| 0x04 | Not specified by the current version of this standard. |
| 0x05 | Not specified by the current version of this standard. |
| 0x06 | Not specified by the current version of this standard. |
| 0x07 | Not specified by the current version of this standard. |
| 0x08 | Service Guide – Service Guide (Announcement) |
| 0x09 | Emergency Alerting |
| 0x0A | Not specified by the current version of this standard. |
| 0x0B ~ 0xFF | Reserved for future use. |

FIG. 106

| Syntax | No. of Bits | Format |
|---|---|---|
| service_map_table_section() { | | |
| table_id | 8 | 0xDB |
| section_syntax_indicator | 1 | '0' |
| private_indicator | 1 | '1' |
| reserved | 2 | '11' |
| section_length | 12 | uimsbf |
| table_id_extension | | |
| SMT_protocol_version | 8 | uimsbf |
| ensemble_id | 8 | uimsbf |
| } | | |
| reserved | 2 | '11' |
| version_number | 5 | uimsbf |
| current_next_indicator | 1 | bslbf |
| section_number | 8 | uimsbf |
| last_section_number | 8 | uimsbf |
| num_services | 8 | uimsbf |
| for (i=0;i<num_services; i++) | | |
| { | | |
| service_id | 16 | uimsbf |
| multi_ensemble_service | 2 | uimsbf |
| service_status | 2 | uimsbf |
| SP_indicator | 1 | bslbf |
| short_service_name_length/* m */ | 3 | uimsbf |
| short_service_name | 16*m | bslbf |
| channel_number | 16 | uimsbf |
| service_category | 6 | uimsbf |
| reserved | 2 | '11' |
| num_components | 5 | uimsbf |
| for (j=0; j<num_components; j++) | | |
| { | | |
| essential_component_indicator | 1 | bsblf |
| reserved | 3 | '111' |
| num_component_level_descriptors | 4 | uimsbf |
| for (k=0; k<num_component_level_descriptors; k++) | | |
| { | | |
| component_level_descriptor() | var | |
| } | | |
| } | | |
| reserved | 4 | '1111' |
| num_service_level_descriptors<br>for (m=0;m<num_service_level_descriptors; m++) | 4 | uimsbf |
| { | | |
| service_level_descriptor() | var | |
| } | | |
| reserved | 4 | '1111' |
| num_ensemble_level_descriptors | 4 | uimsbf |
| for (n=0; n<num_ensemble_level_descriptors; n++) { | | |
| { | | |
| ensemble_level_descriptor() | var | |
| } | | |
| } | | |

FIG. 107
| Syntax | No. of Bits | Format |
|---|---|---|
| stream_identifier_descriptor(){ | | |
| descriptor_tag | 8 | uimsbf |
| descriptor_length | 8 | uimsbf |
| component_tag | 8 | uimsbf |
| } | | |
FIG. 108
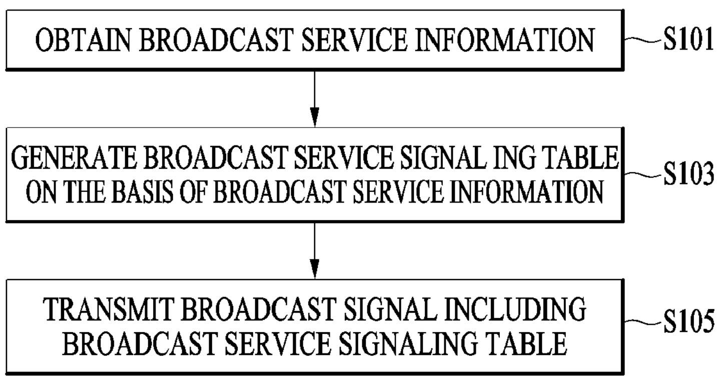
FIG. 109
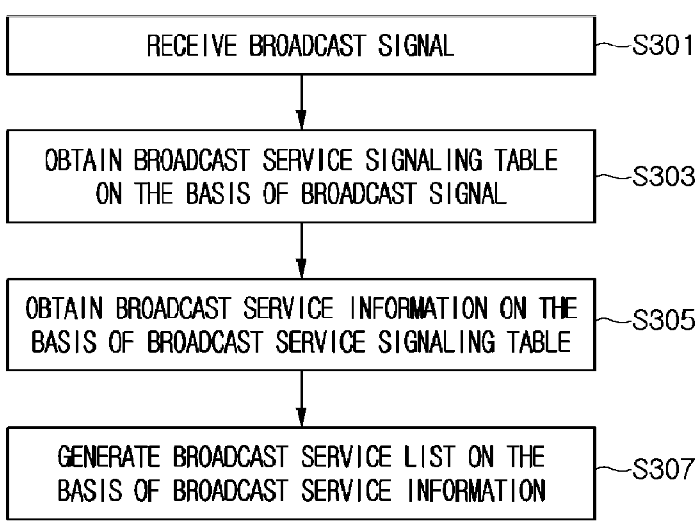

FIG. 110

| Syntax | No. of Bits | Format |
|---|---|---|
| data_path_descriptor( ) { | | |
| descriptor_tag | 8 | uimsbf |
| descriptor_length | 8 | uimsbf |
| delivery_network_type | 8 | uimsbf |
| data_path(delivery_network_type) | var | |
| } | | |

FIG. 111

| delivery_network_type value | |
|---|---|
| 0x00 | IPv4/IPv6 flows through same broadcast or over the cellular network |
| 0x01 | IPv4/IPv6 flows through different broadcast |
| 0x02 | FLUTE session through same broadcast |
| 0x03 | FLUTE session through different broadcast |
| 0x04 | MPEG-2 stream through different broadcast |
| 0x05 | packet-based flows through different broadcast |
| 0x06 | packet-based flows through IP-based broadcast network |
| 0x07 | URL |
| 0x08-0xFF | Reserved |

FIG. 112

| Syntax | No. of Bits | Format |
|---|---|---|
| data_path( ) { | | |
| IP_version_flag | 1 | bslbf |
| source_IP_address_flag | 1 | bslbf |
| destination_IP_address_flag | 1 | bslbf |
| reserved | 5 | '11111' |
| if (source_IP_address_flag) | | |
| source_IP_address | 32 or 128 | uimsbf |
| if (destination _IP_address_flag) | | |
| destination_IP_address | 32 or 128 | uimsbf |
| port_num_count | 8 | |
| if(port_num_count > 0) | | |
| destination_UDP_port_num | 16 | uimsbf |
| } | | |

FIG. 113

| Syntax | No. of Bits | Format |
|---|---|---|
| data_path( ) { | | |
| transport_stream_id | 16 | uimsbf |
| IP_version_flag | 1 | bslbf |
| source_IP_address_flag | 1 | bslbf |
| destination_IP_address_flag | 1 | bslbf |
| reserved | 5 | '11111' |
| if (source_IP_address_flag) | | |
| source_IP_address | 32 or 128 | uimsbf |
| if (destination _IP_address_flag) | | |
| destination_IP_address | 32 or 128 | uimsbf |
| port_num_count | 8 | |
| if(port_num_count > 0) | | |
| destination_UDP_port_num | 16 | uimsbf |
| } | | |

FIG. 114

| Syntax | No. of Bits | Format |
|---|---|---|
| data_path( ) { | | |
| IP_version_flag | 1 | bslbf |
| source_IP_address_flag | 1 | bslbf |
| reserved | 6 | '111111' |
| if (source_IP_address_flag) | | |
| source_IP_address | 32 or 128 | uimsbf |
| destination_IP_address | 32 or 128 | uimsbf |
| destination_UDP_port_num | 16 | uimsbf |
| tsi | 16 | uimsbf |
| } | | |

FIG. 115

| Syntax | No. of Bits | Format |
|---|---|---|
| data_path( ) { | | |
| transport_stream_id | 16 | uimsbf |
| IP_version_flag | 1 | bslbf |
| source_IP_address_flag | 1 | bslbf |
| reserved | 6 | '111111' |
| if (source_IP_address_flag) | | |
| source_IP_address | 32 or 128 | uimsbf |
| destination_IP_address | 32 or 128 | uimsbf |
| destination_UDP_port_num | 16 | uimsbf |
| tsi | 16 | uimsbf |
| } | | |

FIG. 116

| Syntax | No. of bits | Format |
|---|---|---|
| data_path( ) { | | |
| transport_stream_id | 16 | uimsbf |
| reserved | 3 | bslbf |
| pid | 13 | uimsbf |
| } | | |

FIG. 117

| Syntax | No. of Bits | Format |
|---|---|---|
| data_path( ) { | | |
| transport_stream_id | 16 | uimsbf |
| packet_id | 16 | uimsbf |
| } | | |

FIG. 118

| Syntax | No. of Bits | Format |
|---|---|---|
| data_path( ) { | | |
| IP_version_flag | 1 | bslbf |
| source_IP_address_flag | 1 | bslbf |
| reserved | 6 | '111111' |
| if (source_IP_address_flag) | | |
| source_IP_address | 32 or 128 | uimsbf |
| destination_IP_address | 32 or 128 | uimsbf |
| destination_UDP_port_num | 16 | uimsbf |
| packet id | 16 | uimsbf |
| } | | |

FIG. 119

| Syntax | No. of bits | Format |
|---|---|---|
| data_path( ) { | | |
| URL_length | 8 | |
| for (i = 0; i < URL_length; i++){ | | |
| URL_char | 8 | bslbf |
| } | | |
| } | | |

FIG. 122

| Syntax | No. of Bits | Format |
|---|---|---|
| component_descriptor( ) { | | |
| descriptor_tag | 8 | uimsbf |
| descriptor_length | 8 | uimsbf |
| component_type | 7 | uimsbf |
| component_encryption_flag | 1 | bsblf |
| if (component_encryption_flag == '1') { | | |
| num_STKM_streams | 8 | uimsbf |
| for (i=0; i<num_STKM_streams; i++) { | | |
| STKM_stream_id | 8 | uimsbf |
| } | | |
| } | | |
| transport_parameters_text_length | 8 | uimsbf |
| transport_parameters_text() | var | |
| component_data(component_type) | var | |
| } | | |

FIG. 123

| component_type | Meaning |
|---|---|
| 0-34 | Assigned or reserved by IANA, except that 20–24, 27, and 29-30 are unassigned |
| 35 | H.264/AVC video stream component or H.264/SVC base layer stream component |
| 36 | SVC enhancement layer stream component |
| 37 | HE AAC v2 audio stream component |
| 38 | FLUTE file delivery session |
| 39 | STKM stream component |
| 40 | LTKM stream component |
| 41 | OMA-RME DIMS stream component |
| 42 | NTP timebase stream component |
| 43-70 | [Unassigned by IANA and reserved by ATSC for possible future use] |
| 71-76 | Reserved by IANA |
| 77-95 | Unassigned by IANA |
| 96-127 | Designated by IANA for dynamic use |

FIG. 124

| Syntax | No. of Bits | Format |
|---|---|---|
| component_data( ) { | | |
| version | 8 | uimsbf |
| profile | 8 | uimsbf |
| } | | |

FIG. 125

| | |
|---|---|
| Content Component | Essence of a single type plus the relevant Metadata, e.g., a video track, an audio track, Closed Captions, a video enhancement layer, a webpage, an interactive application, etc. |
| Simple Audio Component | Audio component that is a single encoding of a sound sequence with a particular set of encoding parameters. |
| Simple Video Component | Video component that is a single encoding of a picture sequence with a particular set of encoding parameters. |
| Continuous Component | A component that is presented in a continuous stream (e.g., audio, video or closed captioning). |
| Elementary Component | A continuous component that is a single encoding (e.g., a single encoding of a sound sequence, or a single encoding of a picture sequence, or a single closed caption track). |
| Composite Component | A component that consists of a collection of continuous components which have the same media type, and which represent the same scene, and which are to be combined in some combination to produce a presentation (e.g., music, dialog and effects audio components that are to be mixed to give complete audio, or left and right 3D views that are to be combined to give 3D pictures). |
| Composite Audio Component | Compound component consisting of a collection of audio components which are to be combined to produce a sound sequence (e.g., a collection of audio components that are to be mixed). |
| Composite Video Component | Compound component consisting of a collection of video components which are to be combined to produce a picture sequence (e.g., a collection of 3D components that are to be combined to form 3D video; or a base video encoding along with one or more enhancement encodings). |
| Adaptive (alternatively called PickOne) Component | A component that consists of a collection of continuous components which have the same media type, and which represent the same scene, and one of which is to be selected to produce a presentation (e.g., a set of audio components encoded from the same sound sequence with different bitrates, or a set of video components encoded from the same picture sequence with different bit rates, or a regular closed caption track and an "easy reader" closed caption track for the same dialog). |
| Adaptive Audio Component | A component consisting of a collection of audio components, one of which is to be selected to produce a sound sequence (e.g., a collection of audio components encoded from the same sound sequence with different bitrates). |
| Adaptive Video Compone | A component consisting of a collection of video components, one of which is to be selected to produce a picture sequence (e.g., a collection of video components encoded from the same picture sequence with different encoding parameters). |
| Complex Component | Either a composite component or an adaptive component |

FIG. 129

| | |
|---|---|
| Continuous Component | A Content Component that is presented in a continuous stream (e.g., audio, video or closed captioning). |
| Elementary Component | A Continuous Component that is a single encoding (e.g., a single encoding of a sound sequence, or a single encoding of a picture sequence, or a single closed caption track). |
| Composite Component | A Content Component that consists of a collection of Continuous Components which have the same Content type, and which represent the same scene, and which are to be combined in some combination to produce a presentation (e.g., music, dialog and effects audio components that are to be mixed to give complete audio, or left and right 3D views that are to be combined to give 3D pictures). |
| PickOne Component | A Content Component that consists of a collection of Continuous Components which have the same Content type, and which represent the same scene, and exactly one of which is to be selected to produce a presentation (e.g., a set of audio components encoded from the same sound sequence with different bitrates, or a set of video components encoded from the same picture sequence with different bit rates, or a regular closed caption track and an "easy reader"closed caption track for the same dialog). |
| Complex Component | Either a Composite Component or a PickOne Component |
| Presentable Component | A Continuous Component that is intended for presentation to the user. Such a component can be an Elementary Component or a Complex Component. |

FIG. 130

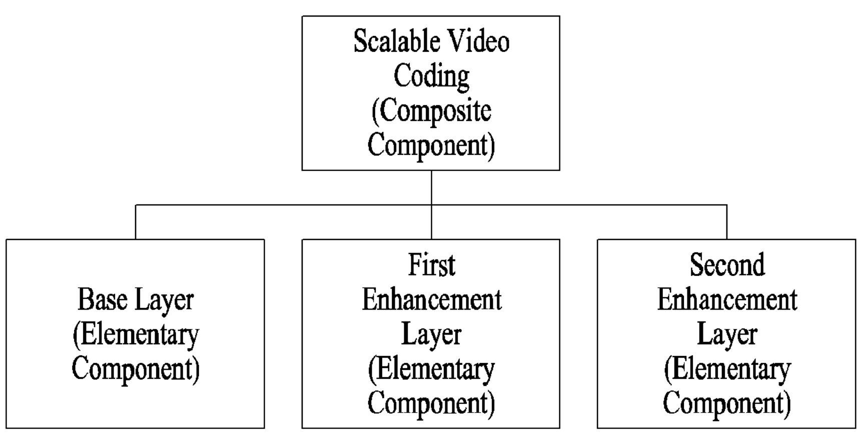

FIG. 137

| Syntax | No. of bits | Format |
|---|---|---|
| component_descriptor( ){ | | |
| descriptor_tag | 8 | uimsbf |
| descriptor_length | 8 | uimsbf |
| component_type | 4 | uimsbf |
| target_device_flag | 1 | bslbf |
| if(target_device_flag == 0x01) { | | |
| target_device | 3 | uimsbf |
| } | | |
| else { | | |
| reserved | 3 | '111' |
| } | | |
| text_length | 8 | uimsbf |
| for (i=0;i<text_length;i++){ | | |
| text_char | 8 | uimsbf |
| } | | |
| if(component_type == 0x00) { | | |
| component_data_type | 8 | uimsbf |
| component_data(component_data_type) | var | |
| } | | |
| else if( component_type == 0x01 \|\| component_type == 0x02 ) { | | |
| complex_component_data() | var | |
| } | | |
| } | | |

FIG. 138

| component_data_type | Meaning |
|---|---|
| 0-34 | Assigned or reserved by IANA, except that 20–24, 27, and 29-30 are unassigned |
| 35 | H.264/AVC video stream component or H.264/SVC base layer stream component |
| 36 | SVC enhancement layer stream component |
| 37 | HE AAC v2 audio stream component |
| 38 | FLUTE file delivery session |
| 39 | STKM stream component |
| 40 | LTKM stream component |
| 41 | OMA-RME DIMS stream component |
| 42 | NTP timebase stream component |
| 43-69 | [Unassigned by IANA and reserved by ATSC for possible future use] |
| 70 | HEVC video stream component |
| 71 | ISO base media file format stream component |
| 72-76 | Reserved by IANA |
| 77-95 | Unassigned by IANA |
| 96-127 | Designated by IANA for dynamic use |

FIG. 139

| Syntax | No. of bits | Format |
|---|---|---|
| complex_component_data(){ | | |
| aggregation_type | 3 | uimsbf |
| reserved | 1 | '111111' |
| target_device_flag | 1 | bslbf |
| if(target_device_flag == 0x01) { | | |
| target_device | 3 | uimsbf |
| } | | |
| else { | | |
| reserved | 3 | '111' |
| } | | |
| num_sub_component | 8 | uimsbf |
| for (i=0;i<num_sub_component;i++){ | | |
| sub_component_id | 8 | uimsbf |
| if(aggregation_type==0x01){ | | uimsbf |
| general_media_type | 8 | uimsbf |
| sub_component_role(general_media_type) | 8 | uimsbf |
| } | | |
| ... | | |
| } | | |
| } | | |

FIG. 140

| Syntax | No. of bits | Format |
|---|---|---|
| complex_component_descriptor( ){ | | |
| descriptor_tag | 8 | uimsbf |
| descriptor_length | 8 | uimsbf |
| complex_component_data( ) | var | |
| } | | |

FIG. 141

| Syntax | No. of bits | Format |
|---|---|---|
| associated_component_list_descriptor( ){ | | |
| descriptor_tag | 8 | uimsbf |
| descriptor_length | 8 | uimsbf |
| num_associated_component | 8 | uimsbf |
| for (i=0;i<num_associated_component;i++){ | | |
| component_id | 8 | uimsbf |
| component_type | 4 | uimsbf |
| if(component_type == 0x00) { | | |
| component_data_type | 8 | uimsbf |
| } | | |
| general_media_type | 8 | uimsbf |
| component_data_type | 8 | uimsbf |
| } | | |
| } | | |

FIG. 142

| Syntax | No. Bits | Format |
|---|---|---|
| NRT_information_section{ | | |
| table_id | 8 | TBD |
| section_syntax_indicator | 1 | ‘0’ |
| private_indicator | 1 | ‘1’ |
| reserved | 2 | ‘11’ |
| section_length | 12 | uimsbf |
| table_id_extension { | | |
| protocol_version | 8 | uimsbf |
| subnet_id | 8 | uimsbf |
| } | | |
| reserved | 2 | ‘11’ |
| version_number | 5 | uimsbf |
| current_next_indicator | 1 | ‘1’ |
| section_number | 8 | uimsbf |
| last_section_number | 8 | uimsbf |
| service_id | 16 | uimsbf |
| NRT_information_block() | var | |
| } | | |

FIG. 143

| Syntax | No. Bits | Format |
|---|---|---|
| NRT_information_block( ){ | | |
| time_span_start | 32 | uimsbf |
| time_span_length | 16 | uimsbf |
| num_content_items_in_section | 8 | uimsbf |
| for (j=0; j< num_content_items_in_section; j++) { | | |
| content_id | 32 | uimsbf |
| updates_available | 1 | bslbf |
| content_security_conditions_indicator | 1 | bslbf |
| master_item | 1 | bslbf |
| playback_length_included | 1 | bslbf |
| playback_delay_included | 1 | bslbf |
| expiration_included | 1 | bslbf |
| content_size_included | 1 | bslbf |
| available_on_internet | 1 | bslbf |
| available_in_broadcast | 1 | bslbf |
| target_included | 1 | bslbf |
| reserved | 6 | '111111' |
| if (playback_length_included==1) { | | |
| playback_length_in_seconds | 24 | uimsbf |
| } | | |
| if (playback_delay_included==1) { | | |
| playback_delay | 24 | uimsbf |
| } | | |
| if (expiration_included==1) { | | |
| expiration | 32 | uimsbf |
| } | | |
| if (content_size_included==1) { | | |
| content_size | 40 | uimsbf |
| } | | |
| if (target_included==1) { | | |
| target | 8 | uimsbf |
| } | | |
| content_name_length | 8 | uimsbf |
| content_name_text() | var | |
| num_content_descriptors | 8 | uimsbf |
| for (i=0; i<num_content_descriptors; i++) { | | |
| content_descriptor() | var | |
| } | | |
| } | | |
| num_descriptors | 8 | uimsbf |
| for (i=0; i<num_descriptors; i++) { | | |
| descriptor() | var | |
| } | | |
| } | | |

FIG. 144

| Syntax | No. of Bits | Format |
|---|---|---|
| NRT_service_descriptor( ) { | | |
| descriptor_tag | 8 | uimsbf |
| descriptor_length | 8 | uimsbf |
| reserved | 2 | '11' |
| consumption_model | 6 | uimsbf |
| auto-update | 1 | bslbf |
| storage_reservation_present | 1 | bslbf |
| default_content_size_present | 1 | bslbf |
| target_present | 1 | bslbf |
| reserved | 4 | '1111' |
| if (storage_reservation_present==1) { | | |
| storage_reservation | 24 | uimsbf |
| if (default_content_size_present==1) { | | |
| default_content_size | 40 | uimsbf |
| } | | |
| if(target_device_present== 1) { | | |
| target | 8 | uimsbf |
| } | | |
| for (j=0; j< N; j++) { | | |
| reserved | 8 | bslbf |
| } | | |
| } | | |

FIG. 145

| Syntax | No. of bits | Format |
|---|---|---|
| image_icon_descriptor( ) { | | |
| descriptor_tag | 8 | uimsbf |
| descriptor_length | 8 | uimsbf |
| descriptor_number | 4 | uimsbf |
| last_descriptor_number | 4 | uimsbf |
| icon_id | 8 | uimsbf |
| if (descriptor_number == 0x00) { | | |
| icon_transport_mode | 2 | uimsbf |
| position_flag | 1 | bslbf |
| if (position_flag == 0x01) { | | |
| coordinate_system | 3 | uimsbf |
| icon_horizontal_origin | 13 | uimsbf |
| icon_vertical_origin | 13 | uimsbf |
| } | | |
| else { | | |
| reserved_future_use | 5 | '11111' |
| } | | |
| icon_type_length /*N*/ | 8 | uimsbf |
| icon_type_chars() | 8*N | uimsbf |
| if (icon_transport_mode == 0x00 ) { | | |
| icon_data_length /*M*/ | 8 | uimsbf |
| icon_data_bytes() | 8*M | uimsbf |
| } | | |
| else if (icon_transport_mode == 0x01 ) { | | |
| url_length /*K*/ | 8 | uimsbf |
| url() | 8*K | uimsbf |
| } | | |
| else if (icon_transport_mode == 0x02 ) { | | |
| icon_content_linkage | 32 | uimsbf |
| } | | |
| } | | |
| else { | | |
| icon_data_length/*L*/ | 8 | uimsbf |
| icon_data_bytes() | 8*L | uimsbf |
| } | | |
| } | | |

FIG. 146

| Value | Meaning |
|---|---|
| 0x00 | The icon is delivered in the icon_data_bytes |
| 0x01 | The location of the icon file is identified by URL carried in the url_char sequence of bytes. |
| 0x02 | The icon file is delivered via a FLUTE session. |
| 0x03 | reserved |

FIG. 147

| Value | Meaning |
|---|---|
| 0x00 | The coordinate system is 720x576 |
| 0x01 | The coordinate system is 1280x720 |
| 0x02 | The coordinate system is 1920x1080 |
| 0x03 | The coordinate system is 3840x2160 |
| 0x04 | The coordinate system is 7680x4320 |
| 0x05 to 0x07 | reserved |

FIG. 148

| Syntax | No. of bits | Format |
|---|---|---|
| component_list_descriptor( ){ | | |
| descriptor_tag | 8 | uimsbf |
| descriptor_length | 8 | uimsbf |
| num_component | 8 | uimsbf |
| for (i=0;i<num_component;i++){ | | |
| component_id | 8 | uimsbf |
| component_type | 4 | uimsbf |
| general_media_type | 4 | uimsbf |
| } | | |
| } | | |

FIG. 149

| Syntax | Number of bits | Identifier |
|---|---|---|
| URI_linkage_descriptor( ){ | | |
| descriptor_tag | 8 | uimsbf |
| descriptor_length | 8 | uimsbf |
| uri_length | 8 | uimsbf |
| for (i=0;i<uri_length;i++) { | | |
| uri_char | 8 | bslbf |
| } | | |
| for (i=0;i<N;i++) { | | |
| private_data_byte | 8 | bslbf |
| } | | |
| } | | |

FIG. 150

| Syntax | No. of bits | Format |
|---|---|---|
| targeting_criteria_descriptor( ){ | | |
| descriptor_tag | 8 | uimsbf |
| descriptor_length | 8 | uimsbf |
| num_ targeting_criteria | 8 | uimsbf |
| for (i=0; i<num_targeting_criteria; i++) { | | |
| criterion_id_length | 8 | uimsbf |
| criterion_id | var | var |
| criterion_type_code | 3 | uimsbf |
| num_criterion_values | 5 | uimsbf |
| for (j=0; j<num_criterion_values; j++) { | | |
| criterion_value_length | 8 | uimsbf |
| criterion_value | var | |
| } | | |
| } | | |
| } | | |

FIG. 151

| Syntax | No. of bits | Format |
|---|---|---|
| text_descriptor( ){ | | |
| descriptor_tag | 8 | uimsbf |
| descriptor_length | 8 | uimsbf |
| descriptor_number | 4 | uimsbf |
| last_descriptor_number | 4 | uimsbf |
| description_id | 8 | uimsbf |
| if (descriptor_number == 0x00) { | | |
| language_code | 24 | bslbf |
| } | | |
| text_length | 8 | uimsbf |
| for (i=0;i<text_length;i++){ | | |
| text_char | 8 | uimsbf |
| } | | |
| } | | |

FIG. 152

| Syntax | No. of bits | Format |
|---|---|---|
| title_descriptor( ){ | | |
| descriptor_tag | 8 | uimsbf |
| descriptor_length | 8 | uimsbf |
| num_title | 8 | uimsbf |
| for (i=0; i<num_title; i++) { | | |
| language_code | 24 | bslbf |
| title_length | 24 | uimsbf |
| for (i=0;i<text_length;i++){ | | |
| text_char | 8 or 16 | uimsbf |
| } | | |
| } | | |
| } | | |

FIG. 153

| Syntax | No. of bits | Format |
|---|---|---|
| genre_descriptor( ){ | | |
| descriptor_tag | 8 | uimsbf |
| descriptor_length | 8 | uimsbf |
| num_genre | 8 | uimsbf |
| for (i=0;i<num_genre;i++){ | | |
| genre_value | 8 | uimsbf |
| } | | |

| Syntax | No. of bits | Format |
|---|---|---|
| targeting_descriptor( ){ | | |
| descriptor_tag | 8 | uimsbf |
| descriptor_length | 8 | uimsbf |
| target_device | 8 | uimsbf |
| } | | |

FIG. 156

| Syntax | No. Bits | Format |
|---|---|---|
| show_information_section{ | | |
| table_id | 8 | TBD |
| section_syntax_indicator | 1 | '0' |
| private_indicator | 1 | '1' |
| reserved | 2 | '11' |
| section_length | 12 | uimsbf |
| table_id_extension { | | |
| protocol_version | 8 | uimsbf |
| subnet_id | 8 | uimsbf |
| } | | |
| reserved | 2 | '11' |
| version_number | 5 | uimsbf |
| current_next_indicator | 1 | '1' |
| section_number | 8 | uimsbf |
| last_section_number | 8 | uimsbf |
| show_id | 16 | uimsbf |
| show_information_block() | var | |
| } | | |

FIG. 157

| Syntax | No. Bits | Format |
|---|---|---|
| show_information_block( ) { | | |
| time_span_length | 16 | uimsbf |
| title_text_length | 8 | uimsbf |
| title_text() | var | |
| num_segments | 8 | uimsbf |
| for(i=0;i<num_segments;i++){ | | |
| segment_information_block() | | |
| } | | |
| num_show_descriptors | 8 | uimsbf |
| for(i=0;i<num_show_descriptors;i++){ | | |
| descriptor() | var | |
| } | | |
| } | | |

FIG. 158

| Syntax | No. Bits | Format |
|---|---|---|
| segment_information_block( ) { | | |
| segment_id | 16 | uimsbf |
| start_time | 32 | uimsbf |
| time_span_length | 16 | uimsbf |
| num_segment_descriptors | 8 | uimsbf |
| i=0;i<num_program_descriptors;i++){ | | |
| descriptor() | | |
| } | | |
| } | | |

FIG. 161

| Syntax | No. Bits | Format |
|---|---|---|
| program_information_section{ | | |
| table_id | 8 | TBD |
| section_syntax_indicator | 1 | '0' |
| private_indicator | 1 | '1' |
| reserved | 2 | '11' |
| section_length | 12 | uimsbf |
| table_id_extension { | | |
| protocol_version | 8 | uimsbf |
| subnet_id | 8 | uimsbf |
| } | | |
| reserved | 2 | '11' |
| version_number | 5 | uimsbf |
| current_next_indicator | 1 | '1' |
| section_number | 8 | uimsbf |
| last_section_number | 8 | uimsbf |
| service_id | 16 | uimsbf |
| program_information_block() | var | |
| } | | |

FIG. 162

| Syntax | No. Bits | Format |
|---|---|---|
| program_information_block( ) { | | |
| num_program | 8 | uimsbf |
| for(i=0;i<num_program;i++){ | | |
| program_id | 16 | uimsbf |
| time_span_start | 32 | uimsbf |
| time_span_length | 16 | uimsbf |
| time_text_length | 8 | uimsbf |
| time_text() | var | |
| num_program_descriptors | 8 | uimsbf |
| for(i=0;i<num_program_descriptors;i++){ | | |
| descriptor() | | |
| } | | |
| } | | |

FIG. 163

| Syntax | No. Bits | Format |
|---|---|---|
| program_information_block( ) { | | |
| num_program | 8 | uimsbf |
| for(i=0;i<num_program;i++){ | | |
| program_id | 16 | uimsbf |
| time_span_start | 32 | uimsbf |
| time_span_length | 16 | uimsbf |
| associated_show_flag | 1 | bslbf |
| reserved | 7 | '1111111' |
| if (associated_show_flag==1) | | |
| show_id | 16 | uimsbf |
| title_text_length | 8 | uimsbf |
| title_text() | var | |
| num_program_descriptors | 8 | uimsbf |
| for(i=0;i<num_program_descriptors;i++){ | | |
| descriptor() | | |
| } | | |
| } | | |

FIG. 164

| Syntax | No. Bits | Format |
|---|---|---|
| program_information_block( ) { | | |
| num_program | 8 | uimsbf |
| for(i=0;i<num_program;i++){ | | |
| program_id | 16 | uimsbf |
| time_span_start | 32 | uimsbf |
| time_span_length | 16 | uimsbf |
| title_text_length | 8 | uimsbf |
| title_text() | var | |
| associated_show_flag | 1 | bslbf |
| reserved | 7 | '1111111' |
| if (associated_show_flag==1) | | |
| show_id | 16 | uimsbf |
| num_component | 8 | uimsbf |
| for (k=0; k< num_component; k++) { | | |
| component_id | 8 | uimsbf |
| essential_component_indicator | 1 | bslbf |
| ... | | |
| num_component_descriptors | 8 | uimsbf |
| for (i=0;i< num_component_descriptors; i++) { | | |
| component_descriptor() | var | |
| } | | |
| } | | |
| num_program_descriptors | 8 | uimsbf |
| for (i=0;i< num_component_descriptors; i++) { | | |
| descriptor() | | |
| } | | |
| } | | |

FIG. 165

| Syntax | No. Bits | Format |
|---|---|---|
| program_information_block( ) { | | |
| num_program | 8 | uimsbf |
| for(i=0;i<num_program;i++){ | | |
| program_id | 16 | uimsbf |
| time_span_start | 32 | uimsbf |
| time_span_length | 16 | uimsbf |
| title_text_length | 8 | uimsbf |
| title_text() | var | |
| num_segments | 8 | uimsbf |
| for(i=0;i<num_segments;i++){ | | |
| segment_information_block() | | |
| } | | |
| num_program_descriptors | 8 | uimsbf |
| for(i=0;i<num_program_descriptors;i++){ | | |
| descriptor() | | |
| } | | |
| } | | |

FIG. 166

| Syntax | No. Bits | Format |
|---|---|---|
| program_information_block( ) { | | |
| num_program | 8 | uimsbf |
| for(i=0;i<num_program;i++){ | | |
| program_id | 16 | uimsbf |
| time_span_start | 32 | uimsbf |
| time_span_length | 16 | uimsbf |
| title_text_length | 8 | uimsbf |
| title_text() | var | |
| associated_show_flag | 1 | bslbf |
| reserved | 7 | '1111111' |
| if (associated_show_flag==1) | | |
| show_id | 16 | uimsbf |
| num_segments | 8 | uimsbf |
| for(i=0;i<num_segments;i++){ | | |
| segment_information_block() | | |
| } | | |
| num_program_descriptors | 8 | uimsbf |
| for(i=0;i<num_program_descriptors;i++){ | | |
| descriptor() | | |
| } | | |
| } | | |

FIG. 167

| Syntax | No. Bits | Format |
|---|---|---|
| segment_information_section{ | | |
| table_id | 8 | TBD |
| section_syntax_indicator | 1 | '0' |
| private_indicator | 1 | '1' |
| reserved | 2 | '11' |
| section_length | 12 | uimsbf |
| table_id_extension { | | |
| protocol_version | 8 | uimsbf |
| subnet_id | 8 | uimsbf |
| } | | |
| reserved | 2 | '11' |
| version_number | 5 | uimsbf |
| current_next_indicator | 1 | '1' |
| section_number | 8 | uimsbf |
| last_section_number | 8 | uimsbf |
| segment_information_block() | var | bslbf |
| } | | |

FIG. 168

| Syntax | No. Bits | Format |
|---|---|---|
| segment_information_block( ) { | | |
| segment_id | 8 | uimsbf |
| segment_type | 3 | uimsbf |
| associated_program_flag | 1 | bslbf |
| time_included | 1 | bslbf |
| reserved | 3 | '111' |
| if (associated_program_flag==1) | | |
| program_id | 16 | uimsbf |
| if (time_included==1) { | | |
| time_span_start | 32 | uimsbf |
| time_span_length | 16 | uimsbf |
| } | | |
| num_component | 8 | uimsbf |
| for (k=0; k< num_component; k++) { | | |
| component_id | 8 | uimsbf |
| num_component_descriptors | 8 | uimsbf |
| for (i=0;i< num_component_descriptors; i++) { | | |
| component_descriptor() | var | |
| } | | |
| } | | |
| num_descriptors | 8 | uimsbf |
| for (i=0; i<num_descriptors; i++) { | | |
| descriptor() | var | |
| } | | |
| } | | |

FIG. 169

| Syntax | No. of bits | Format |
|---|---|---|
| targeting_segment_set_descriptor( ){ | | |
| descriptor_tag | 8 | uimsbf |
| descriptor_length | 8 | uimsbf |
| time_span_start | 32 | uimsbf |
| time_span_length | 16 | uimsbf |
| num_segments | 8 | uimsbf |
| for (i=0; i<num_segments; i++) { | | |
| segment_id | 8 | uimsbf |
| num_targeting_criteria | 8 | uimsbf |
| for (i=0; i<targeting_criteria; i++) { | | |
| criterion_id_length | 8 | uimsbf |
| criterion_id | var | var |
| criterion_type_code | 3 | uimsbf |
| num_criterion_values | 5 | uimsbf |
| for (j=0; j<num_criterion_values; j++) { | | |
| criterion_value_length | 8 | uimsbf |
| criterion_value | var | |
| } | | |
| } | | |
| } | | |
| } | | |

FIG. 172

| Continuous Component <<abstract>> represents a Continuous Component | |
|---|---|
| Attributes | |
| | ComponentId[1] - unique identifier of component |

( a )

| Audio Component <<abstract>> represents a Continuous Component of content type audio | |
|---|---|
| Relationships | |
| | Sub-class relationship with Continuous Component class |

( b )

| Video Component <<abstract>> represents a Continuous Component of content type Video | |
|---|---|
| Relationships | |
| | Sub-class relationship with Continuous Component class |

( c )

| CC Component <<abstract>> represents a Continuous Component of content type closed caption | |
|---|---|
| Relationships | |
| | Sub-class relationship with Continuous Component class |

| | | |
|---|---|---|
| Elementary Audio Component represents an Elementary Component of content type audio | | |
| Attributes | | |
| | Codec[1] | |
| | Number of audio channels[1] | |
| | Encoding bit-rate[1] | |
| | Language[0..1] | |
| | Mode[1] Possible values | |
| | | Complete main |
| | | Music |
| | | Dialog |
| | | Effects |
| | | Visually impaired |
| | | Hearing impaired |
| | | Commentary |
| | Other encoding parameters (possibly codec dependent) | |
| Relationships | | |
| | Sub-class relationship with Audio Component class | |

(a)

| | |
|---|---|
| Elementary Video Component represents an Elementary Component of content type Video | |
| Attributes | |
| | Codec[1] |
| | Resolution (width x height, in pixels)[1] |
| | Aspect ratio[1] |
| | Interlaced/Progressive[1] |
| | Frame rate, on "still"picture mode[1] |
| | Other encoding parameters (possibly codec dependent) |
| Relationships | |
| | Sub-class relationship with Video Component class |

| | | |
|---|---|---|
| Elementary CC Component represents an Elementary Component of content type closed caption | | |
| Attributes | | |
| | "Codec"(i.e., encoding format)[1] | |
| | Language[1] | |
| | Type[1] Possible values | |
| | | Normal |
| | | Easy-reader |
| Relationships | | |
| | Sub-class relationship with CC Component class | |

| | |
|---|---|
| Composite Audio Component<br>represents a Composite Component of content type audio | |
| Relationships | |
| | "ContainsAudio" relationship with Audio Component class - with the restriction that for each instantiation of the relationship all of the included objects (audio components) represent the same sound scene |
| | Sub-class relationship with Audio Component class |

(a)

| | | | |
|---|---|---|---|
| Composite Video Component<br>represents a Composite Component of content type video | | | |
| Relationships | | | |
| | "ContainsVideo" relationship with Video Component class - with the restriction that for each instantiation of the relationship all of the contained objects (video components) represent the same video scene<br>Attributes of Contains Video Relationship | | |
| | | Role - role of the contained component in the Composite Component<br>Possible values | |
| | | | Enhancement layer for scalable video encoding, with level |
| | | | 3D video left/right view |
| | | | 3D video depth information |
| | | | Part of video array, <x,y> of <n,m> (from bottom left to top right, by row) |
| | | | Follow-Subject metadata (name of subject, location of subject, size of subject), in the case when the"follow-subject"feature is supported by a stream of frame-by-frame metadata indicating an area of the main video component that is focused on the subject |
| | Sub-class relationship with Video Component class | | |

| | |
|---|---|
| PickOne Component<br>represents a PickOne Component | |
| Relationships | |
| | "Contains" relationship with Continuous Component class - with the restriction that for each instantiation of the relationship all of the included components are of the same content type and represent the same video scene or audio scene |
| | Sub-class relationship with Continuous Component class |

FIG. 176

| Presentable Component <<abstract>><br>represents a Presentable Component | | |
|---|---|---|
| Attributes | | |
| | Targeting/personalization properties | |
| | Content advisory rating | |
| | Content/Service protection properties | |
| | Target device(s) [0..n] Possible values | |
| | | Primary Device |
| | | Companion Device |
| | | Inset on Primary Screen (“Picture-in-Picture”) |

(a)

| Presentable Video Component<br>represents a Presentable Component of video content type – i.e., contains all objects in the Video Component class that satisfy the definition of a Presentable component | |
|---|---|
| Relationships | |
| | "AssociatedAudio" relationship with Presentable Audio Component class – represents that the associated Presentable Audio Component is suitable for presentation along with the Presentable Video Component |
| | "Associated CC" relationship with Presentable CC Component class – represents that the associated Presentable CC Component is suitable for presentation along with the Presentable Video Component |
| | Sub-class relationship with Video Component |

(b)

| Presentable Audio Component<br>represents a Presentable Component of audio content type – i.e., contains all objects in the Audio Component class that satisfy the definition of a Presentable component | |
|---|---|
| Relationships | |
| | Sub-class relationship with Audio Component |

(c)

| Presentable CC Component<br>represents a Presentable Component of closed caption content type– i.e., contains all objects in the CC Component class that satisfy the definition of a Presentable component | |
|---|---|
| Relationships | |
| | Sub-class relationship with CC Component |

| | |
|---|---|
| OnDemand Component<br>represents a content component that is delivered on demand | |
| Attributes | |
| | OnDemandComponentId [1] – unique identifier of on demand component |
| | ComponentLocation [1..n] – location where the OnDemand component can be accessed |
| | ComponentName [0..n] – human readable name of component, possibly in multiple languages |
| | PlaybackLength [0..1] – playout time of the component (only meaningful for on demand components such as audio or video clips that have a defined playout time) |
| | AvailabilityStart [0.1] – date and time at which component becomes available |
| | AvailablityDuration [0..1] – length of time component remains available |
| | Targeting/personalization properties |
| | Content/Service protection properties |
| | Content advisory rating [0..n] |

FIG. 178

| | |
|---|---|
| NRT Content Item<br>represents an NRT Content Item | |
| Attributes | |
| | ContentItemId [1] – unique identifier of NRT Content Item |
| | ContentItemName [0..n] – human readable name of NRT Content Item, possibly in multiple languages |
| | Updatable [1] – indication whether or not NRT Content Item should be monitored for updates |
| | Expiration [0..1] – date and time after which the NRT Content Item should be discarded |
| | ContentItemSize [1] – size of the NRT Content Item, in bytes |
| | PlaybackLength [0..1] – playout time of the NRT Content Item (only meaningful for NRT Content Items such as audio or video clips that have a defined playout time) |
| | Targeting/personalization properties |
| | Content/Service protection properties |
| | Content advisory rating [0..n] |
| Relationships | |
| | "Contains" relationship with NRT File class |

(a)

| | |
|---|---|
| NRT File represents a Non-real Time file | |
| Attributes | |
| | ContentLocation – Content-Location e.g., it can be defined in IETF RFC 2616 |
| | ContentType – Content-Type, e.g., it can be defined in IETF RFC 2616 |

| | |
|---|---|
| OnDemand Component<br>represents a content component that is delivered on demand | |
| Attributes | |
| | OnDemandComponentId [1] – unique identifier of on demand component |
| | ComponentLocation [1..n] – location where the OnDemand component can be accessed |
| | ComponentName [0..n] – human readable name of component, possibly in multiple languages |
| | PlaybackLength [0..1] – playout time of the component (only meaningful for on demand components such as audio or video clips that have a defined playout time) |
| | AvailabilityStart [0.1] – date and time at which component becomes available |
| | AvailablityDuration [0..1] – length of time component remains available |
| | Targeting/personalization properties |
| | Content/Service protection properties |
| | Content advisory rating [0..n] |
| | Essential capabilities [0..1] – receiver capabilities needed for meaningful rendition of the OnDemand Component |
| | Non-essential capabilities [0..1] – receiver capabilities useful for optimal rendition of enhancement, but not absolutely necessary for meaningful rendition of the OnDemand Component |

FIG. 180

| | |
|---|---|
| NRT Content Item<br>represents an NRT Content Item | |
| Attributes | |
| | ContentItemId [1] – unique identifier of NRT Content Item |
| | ContentItemName [0..n] – human readable name of NRT Content Item, possibly in multiple languages |
| | Updatable [1] – indication whether or not NRT Content Item should be monitored for updates |
| | Expiration [0..1] – date and time after which the NRT Content Item should be discarded |
| | ContentItemSize [1] – size of the NRT Content Item, in bytes |
| | PlaybackLength [0..1] – playout time of the NRT Content Item (only meaningful for NRT Content Items such as audio or video clips that have a defined playout time) |
| | Targeting/personalization properties |
| | Content/Service protection properties |
| | Content advisory rating [0..n] |
| | Essential capabilities [0..1] – receiver capabilities needed for meaningful rendition of the NRT Content Item |
| | Non-essential capabilities [0..1] – receiver capabilities useful for optimal rendition of enhancement, but not absolutely necessary for meaningful rendition of the NRT Content Item |
| Relationships | |
| | “Contains” relationship with NRT File class |

(a)

| | |
|---|---|
| NRT File represents a Non-real Time file | |
| Attributes | |
| | ContentLocation – Content-Location e.g., it can be defined in IETF RFC 2616 |
| | ContentType – Content-Type, e.g., it can be defined in IETF RFC 2616 |
| | Essential capabilities [0..1] – receiver capabilities needed for meaningful rendition of the NRT File |
| | Non-essential capabilities [0..1] – receiver capabilities useful for optimal rendition of enhancement, but not absolutely necessary for meaningful rendition of the NRT File |

| | | | |
|---|---|---|---|
| Linear Service<br>represents a Linear Service (as described in section 3.2 of this document) | | | |
| Relationships | | | |
| | "Contains" relationship with Presentable Video Component class<br>Attributes of | | |
| | | Role of video component [1]<br>Possible values | |
| | | | Primary (default) video |
| | | | Alternative camera view |
| | | | Other alternative video component |
| | | | Sign language (e.g., ASL) inset |
| | | | Follow subject video, with name of subject being followed, in the case when the follow-subject feature is supported by a separate video component. |
| | "Contains" relationship with Presentable Audio Component class | | |
| | "Contains" relationship with Presentable CC Component class | | |
| | "Contains" relationship with Time Base class | | |
| | "Contains" relationship with App-Based Enhancement class | | |
| | "Sub-class" relationship with Service class | | |

FIG. 182

| | |
|---|---|
| App<br>represents a kind of NRT Content Item that can support interactivity | |
| Attributes | |
| | ... |
| Relationships | |
| | Sub-class relationship with NRT Content Item class |

(a)

| | | |
|---|---|---|
| App-Based Enhancement<br>represents an App-Based Enhancement | | |
| Attributes | | |
| | Essential capabilities [0..1] – receiver capabilities needed for meaningful rendition of enhancement | |
| | Non-essential capabilities [0..1] – receiver capabilities useful for optimal rendition of enhancement, but not absolutely necessary for meaningful rendition of enhancement | |
| | Target device [0..n] – for adjunct data services only Possible values | |
| | | Primary device |
| | | Companion device |
| Relationships | | |
| | "Contains" relationship with App class – for the applications in the App-Based Enhancement | |
| | "Contains" relationship with NRT Content Item class – for NRT Content Items used by the applications in the App-Based Enhancement | |
| | "Contains" relationship with Notification Stream class – for Notifications Stream that delivers notifications to synchronize the actions of the applications with an underlying Linear Time Base. | |
| | "Contains" relationship with OnDemand Component class – for On Demand components to be managed by the application(s). | |

| Time Base<br>represents metadata used to establish a time line for synchronizing the components of a Linear Service | |
|---|---|
| Attributes | |
| | Time Base ID – identifier of Time Base |
| | Clock Rate – clock rate of the time base |

(a)

| Notification Stream<br>represents Notification Stream used to deliver synchronized notifications of actions to be taken | |
|---|---|
| Attributes | |
| | Notification Stream ID – identifier of Notification Stream |

| App-Based Service represents an App-Based Service | |
|---|---|
| Relationships | |
| | "Contains" relationship with Time Base class |
| | "Contains" relationship with App-Based Enhancement class. |
| | "Sub-class" relationship with Service class |

FIG. 185

| | | |
|---|---|---|
| Program<br>represents a Program | | |
| Attributes | | |
| | ProgramIdentifier [1] – unique identifier of the Program | |
| | StartTime [1] – wall clock date and time the Program is scheduled to start | |
| | ProgramDuration [1] – scheduled wall clock time from the start of the Program to the end of the Program | |
| | TextualTitle [1..n] – human readable title of the Program, possibly in multiple languages<br>– if not present, defaults to TextualTitle of associated Show | |
| | TextualDescription [0..n] – human readable description of the Program, possibly in multiple languages – if not present, defaults to TextualDescription of associated Show | |
| | Genre [0..n] – genre(s) of the Program – if not present, defaults to Genre of associated Show | |
| | GraphicalIcon [0..n] – icon to represent the program (e.g., in ESG), possibly in multiple sizes – if not present, defaults to GraphicalIcon of associated Show | |
| | ContentAdvisoryRating [0..n] – content advisory rating for the Program, possibly for multiple regions – if not present, defaults to ContentAdvisoryRating of associated Show | |
| | Targeting/personalization properties – properties to be used to determine targeting, etc., of Program – if not present, defaults to Targeting/personalization properties of associated Show | |
| | Content/Service protection properties – properties to be used for content protection and/or service protection of Program – if not present, defaults to Content/Service protection properties of associated Show | |
| | Other properties defined in the "ESG Model" | |
| Relationships | | |
| | "ProgramOf" relationship with Linear Service class | |
| | "ContentItemOf" relationship with App-Based Service class | |
| | "OnDemandComponentOf" relationship with App Based Service Class | |
| | "Contains" relationship with Presentable Video Component class<br>Attributes | |
| | | Role of video component [1]<br>Possible values |
| | | Primary (default) video |
| | | Alternative camera view |
| | | Other alternative video component |
| | | Sign language (e.g., ASL) inset |
| | | Follow subject video, with name of subject being followed, in the case when the follow-subject feature is supported by a separate video component. |
| | "Contains" relationship with Presentable Audio Component class | |
| | "Contains" relationship with Presentable CC Component class | |
| | "Contains" relationship with App-Based Enhancement class | |
| | "Contains" relationship with Time Base class | |
| | "Based-on" relationship with Show class | |
| | "Contains" relationship with Segment class | |
| | Attributes of “Contains” relationship with Segment class | |
| | | RelativeSegmentStartTime – start time of Segment relative to beginning of Program |

FIG. 186

| | |
|---|---|
| Show<br>represents a Show, (i.e., the primary content of a Program from a consumer viewpoint) | |
| Attributes | |
| | ShowIdentifier [1] – unique identifier of the Show [scope of uniqueness TBD] |
| | ShowDuration [1] – duration from the start of the Show to the end of the Show, if played without any interruptions or interstitial material |
| | TextualTitle [1..n] – human readable title of the Show, possibly in multiple languages |
| | TextualDescription [0..n] – human readable description of the Show, possibly in multiple languages |
| | Genre [0..n] – the genre(s) of the Show |
| | GraphicalIcon [0..n] – icon to represent the Show, possibly in multiple sizes |
| | ContentAdvisoryRating [0..n] [details TBD by S34-3 & S33-2] |
| | Targeting/personalization properties – properties to be used to determine targeting, etc., of Program |
| | Content/Service protection properties – properties to be used for content protection and/or service protection of Program |
| | Other properties defined in the "ESG Model" |
| Relationships | |
| | "Includes" relationship with Show Segment class |

FIG. 187

| | |
|---|---|
| Segment <<abstract>><br>represents a Segment | |
| Attributes | |
| | SegmentId [1] – unique identifier of segment |
| | Duration [1] – temporal length of segment |
| | Targeting/personalization properties– targeting properties (to be considered when Segment is to be substituted into a Program) |
| | Content advisory rating [0..1] – content advisory rating for segment (to be considered when Segment is to be substituted into a Program) |

(a)

| | |
|---|---|
| Show Segment<br>represents a Segment of a Show | |
| Attributes | |
| | ShowSegmentRelativeStartTime – start time of Show Segment relative to beginning of Show |
| Relationships | |
| | "Sub-class" relationship with Segment class |

(b)

| | |
|---|---|
| Interstitial Segment<br>Represents a Segment of a Program that is not a Show Segment | |
| Relationships | |
| | "Sub-class" relationship with Segment class |

| XML Element/Attribute | Cardinality | Data Type | Description |
|---|---|---|---|
| ServiceInfo | | | |
| @ServiceId | 1 | unsignedShort | Unique identifier for Service |
| @ServiceName | 0..N | string | Human readable name of the service |
| @MajorChanNum | 0..1 | integer 0..15 | Major"channel number"of the service, for service selection |
| @MinorChanNum | 0..1 | integer 0..15 | Minor"channel number"of the service, for service selection |
| @Description | 0..N | string | Textual description of the service |
| @Genre | 0..N | string | Genre(s) of the service |
| @Icon | 0..N | Base64Binary | Icon used to represent the service |
| @Language | 0..1 | string | Primary language used in the service |
| @UsageReportInfo | 0..N | string | Parameters to be used for service usage reporting (e.g., URL, reporting interval, etc.) |
| @Targeting | 0..N | string | Targeting properties for the service |
| @ServiceProtection | 0..1 | string | Service protection properties for the service |
| @AdvisoryRating | 0..N | string | Content advisory rating(s) for the service |
| ComponentItem | 1..N | | Component information of the service |
| @ComponentId | 1 | unsignedShort | Unique identifier for component of Service |
| @ComponentType | 1 | string | Component type |
| @ComponentName | 0..N | string | Human readable name of the component of Service |
| @StartTime | 0..1 | unsignedShort | Start time of the component |
| @Duration | 0..1 | unsignedShort | Duration of the component |
| @TargetScreen | 0..N | string | Targeting window of component (e.g. Secondary screen) |
| @URL | 0..N | any URI | URL of component in the Content Server |
| @ContentAdvisory | 0..N | string | Content advisory rating(s) for the component |
| @Genre | 0..N | string | Genre(s) of the component |

FIG. 206

| Link_target_type | Description |
|---|---|
| 0x00 | The URI is a deferred URI. |
| 0x01 | The URI is a generic URI targeting all device classes. |
| 0x02 | The URI is a specific URI targeting devices of the Smartphone class. |
| 0x03 | The URI is a specific URI targeting devices of the Tablet class. |
| 0x04 | The URI is a specific URI targeting devices of the TV class. |
| 0x05 | The URI is a specific URI targeting devices of the PC class. |
| 0x06 to 0xFF | reserved for future use |

FIG. 209

| Service | Service Type | Service ID |
|---|---|---|
| ServiceSignaling | atsc3.0servicesignaling:1 | urn:atsc.org:serviceId:atsc3.0servicesignaling |

(a)

| Variable Name | Req/Opt | Data Type | Evented? |
|---|---|---|---|
| ServiceProperty | Required | String (XML, JSON, ...) | Yes |

(b)

| Name | Required/Optional |
|---|---|
| GetServiceProperty | Required |

(c)

| Argument | Direction | Related State Variable |
|---|---|---|
| ServiceProperty | OUT | ServiceProperty |

```
<?xml Version="1.0"?>
< propertyset >
  <property>
    < ServiceId >a000001</ ServiceId >
  </property>
  <property>
    < ServiceName >MBC Music</ServiceId>
  </property>
  <property>
    < ContentId >mbcradio002</ServiceId >
  </property>
  <property>
    < ContentName >Pop Chart</ServiceId>
  </property>
  <property>
    < MajorChanNum>11</ServiceId>
  </property>
  <property>
    < MinorChanNum >5</ServiceId>
  </property>
  ....
 </propertyset >
```

(a)

```
<?xml Version="1.0"?>
< ServiceProperty>
  < ServiceId>a000001</ServiceId>
  < ServiceName>MBC Music</ServiceName>
  < ContentId>mbcradio002</ContentId>
  < ContentName>Pop Chart</ContentName>
  < MajorChanNum>11</MajorChanNum>
  < MinorChanNum>5</MinorChanNum>
   ....
   ....
 </ServiceProperty>
```

(b)

```
<?xml Version="1.0"?>
< ServiceProperty  (or ServiceInfo)
  ServiceId="a000001" ServiceName="MBC Music" MajorChanNum="11" MinorChanNum="5" ...>
  < ComponentItem ContentId="mbcradio002" ComponentType="video" ComponentName=" afaefaef  ", ....>
  </ComponentItem>
 </ServiceProperty (or /ServiceInfo)>
```

| Variable Name | Req/Opt | Data Type | Evented? |
|---|---|---|---|
| Service Property | Required | string | No |
| ServicePropertyName | Required | string | No |
| ServicePropertyChangeFlag | Required | boolean | Yes |

(a)

| Name | Required/Optional |
|---|---|
| GetServiceProperty | Required |

(b)

| Argument | Direction | Related State Variable |
|---|---|---|
| ServicePropertyName | IN | ServicePropertyName |
| ServiceProperty | OUT | ServiceProperty |

```
<?xml Version="1.0"?>
<propertyset>
  <property>
    <ServicePropertyChangeFlag> true </ServicePropertyChangeFlag>
  </property>
</propertyset>
```

(a)

```
<?xml Version="1.0"?>
<ServicePropertyChangeFlag>
  <value> true </value>
</ServicePropertyChangeFlag>
```

(b)

“true” or “false”

(c)

```
<?xml Version="1.0"?>
<ServiceProperty>
  <genre>Sports</genre>
  <language>KOR</language>
</ServiceProperty>
```

| Variable Name | Req/Opt | Data Type | Evented? |
|---|---|---|---|
| ServiceProperty | Required | string (XML) | No |
| ServicePropertyName | Required | string (XML) | No |
| ServicePropertyChangeFlag | Required | string (bin.hex) | Yes |
| ServicePropertyURL | Optional | string (XML) or anyURI | No |

(a)

```
<?xml Version="1.0"?>
<ServicePropertyURL>
  <value>http://atsc.serviceinfo.com/servicename</value>
</ServicePropertyURL>
```

| Variable Name | Req/Opt | Data Type | Evented? |
|---|---|---|---|
| ServiceProperty | Required | string (XML) | No |
| ServicePropertyName | Required | string (XML) | No |
| ServicePropertyChangeFlag | Required | string (XML), List of strings (XML) or CSV of strings | Yes |
| ServicePropertyURL | Optional | string (XML) or anyURI | No |

(a)

```
<?xml Version="1.0"?>
 <ServicePropertyChangeFlag>
     <changedfield > genre</changedfield>
     <changedfield >targeting</changedfield>
 </ServicePropertyChangeFlag>
```

(b)

```
<?xml Version="1.0"?>
< ServicePropertyChangeFlag>
    genre targeting
</ ServicePropertyChangeFlag>
```

(c)

```
"genre, targeting"
```

(d)

changed

```
<?xml Version="1.0"?>
<ServiceProperty>
  <language>a000001</language>
  <genre>MBC Music</genre>
  <AdvisoryRating>mbcradio002</AdvisoryRating>
  <targeting>Pop Chart</targeting>
   ....
   ....
</ServiceProperty>
```

| Variable Name | Req/Opt | Data Type | Evented? |
|---|---|---|---|
| ServiceProperty | Required | string (XML) | No |
| A_ARG_TYPE_ServicePropertyName | Required | string (CSV) | No |
| A_ARG_TYPE_UpdatedServicePropertyValue | Required | string (XML) | No |
| UpdatedPropertyNames | Required | string (XML) | Yes |

(a)

```
<?xml Version="1.0"?>
<UpdatedPropertyNames>
  <propertyList>
    <propertyName>ContentId</propertyName>
    <propertyName>ContentName</propertyName>
    <propertyName>MajorChanNum</propertyName>
</propertyList>
</UpdatedPropertyNames>
```

(b)

```
<?xml Version="1.0"?>
< UpdatedPropertyNames>
  <added>
    <propertyName>ContentId</propertyName>
    <propertyName>ContentName</propertyName>
  </added>
  <modified>
    <propertyName>Description</propertyName>
  </modified>
  <deleted>
    <propertyName>Genre</propertyName>
  </deleted>
</UpdatedPropertyNames>
```

| Name | Required/Optional |
|---|---|
| GetServiceProperty | Required |
| GetServicePropertyValue | Required |

(a)

| Argument | Direction | Related State Variable |
|---|---|---|
| ServiceProperty | OUT | ServiceProperty |

(b)

| Argument | Direction | Related State Variable |
|---|---|---|
| ServicePropertyName | IN | A_ARG_TYPE_ServicePropertyName |
| UpdatedServicePropertyValue | OUT | A_ARG_TYPE_UpdatedServicePropertyValue |

(c)

```
<?xml Version="1.0"?>
<UpdatedServicePropertyValue>
  <propertyList>
    <ContentId>sport0020</ContentId>
    <ContentName>Sports Highlight</ContentName>
    <MajorChanNum>20</MajorChanNum>
  </propertyList>
</UpdatedServicePropertyValue>
```

| Variable Name | Req/Opt | Data Type | Evented? |
|---|---|---|---|
| Service Property | Required | string | No |
| ServicePropertyName | Required | string | No |

(a)

| Name | Required/Optional |
|---|---|
| GetServiceProperty | Required |
| SetServiceProperty | Required |

(b)

| Argument | Direction | Related State Variable |
|---|---|---|
| ServicePropertyName | IN | ServicePropertyName |
| ServiceProperty | OUT | ServiceProperty |

(c)

| Argument | Direction | Related State Variable |
|---|---|---|
| ServicePropertyName | IN | ServicePropertyName |

```
<?xml version = "1.0" encoding = "UTF-8"?>
<alert xmlns = "http://www.incident.com/cap/1.0">
  <identifier>KSTO1055887203</identifier>
  <sender>KSTO@NWS.NOAA.GOV</sender>
  <sent>2003-06-17T14:57:00-07:00</sent>
  <status>Actual</status>
  <msgType>Alert</msgType>
  <scope>Public</scope>
  <info>
    <category>Met</category>
    <event>SEVERE THUNDERSTORM</event>
    <urgency>Immediate</urgency>
    <severity>Severe</severity>
    <certainty>Likely</certainty>
    <eventCode>same=SVR</eventCode>
    <expires>2003-06-17T16:00:00-07:00</expires>
    <senderName>NATIONAL WEATHER SERVICE SACRAMENTO CA</senderName>
    <headline>SEVERE THUNDERSTORM WARNING</headline>
    <description> AT 254 PM PDT...NATIONAL WEATHER SERVICE DOPPLER RADAR
INDICATED A SEVERE THUNDERSTORM OVER SOUTH CENTRAL ALPINE COUNTRY...OR ABOUT 18
MILES SOUTHEAST OF KIRKWOOD...MOVING SOUTHWEST AT 5 MPH. HAIL...INTENSE RAIN AND
STRONG DAMAGING WINDS ARE LIKELY WITH THIS STORM.</description>
    <instruction>TAKE COVER IN A SUBSTANTIAL SHELTER UNTIL THE STORM
PASSES.</instruction>
    <contact>BARUFFALDI/JUSKIE</contact>
    <area>
      <areaDesc>EXTREME NORTH CENTRAL TUOLUMNE COUNTY IN CALIFORNIA, EXTREME
NORTHEASTERN CALAVERAS COUNTY IN CALIFONIA, SOUTHWESTERN ALPINE COUNTY IN
CALIFORNIA</areaDesc>
      <polygon>38.47,-120.14 38.34,-119.95 38.52,-119.74 38.62,-119.89 38.47,
-120.14</polygon>
      <geocode>fips6=006109</geocode>
      <geocode>fips6=006009</geocode>
      <geocode>fips6=006003</geocode>
    </area>
  </info>
</alert>
```

FIG. 227

| Service | Service Type | Service ID |
|---|---|---|
| EmergencyAlert | atsc3.0:atsc3.0eas:1 | urn:atsc.org:service:atsc3.0eas |

(a)

| Variable Name | Req/Opt | Data Type | Evented? |
|---|---|---|---|
| EmergencyAlert | Required | string (XML, JSON, ...) | Yes |
| EmergencyAlertProperty | Required | string (XML, JSON, ...) | No or Yes |

(b)

```
<EmergencyAlert>

<dateTime>20140122T052000 </dateTime>
    <messageType>CAP</messageType>
    <version>1.1</version>
</EmergencyAlert>
```

(c)

| Name | Required/Optional |
|---|---|
| GetAllEmergencyAlertMessage | Required |

(d)

| Argument | Direction | Related State Variable |
|---|---|---|
| EmergencyAlertProperty | OUT | EmergencyAlertProperty |

```
<?xml version = "1.0" encoding = "UTF-8"?>
<alert xmlns = "http://www.incident.com/cap/l.0")
<identifier>KSTo1055887203<lidentifier>
<sender>KSTo8NWS.NOAA.GOV</sender>
<3ent>2003~06-17T14:57:00-07:00</sent>
<status>Actual</status>
<mngype>Alert</mngype>
<scope>Pub1 1c</scope>
<info>
<category>MEt<lcategory>
<event>SEVERE THUNDERSTORM</event>
<urgency>Immediate</urgency>
<severity>5evere</severity>
<certainty>Likely</certainty>
<eventCode>same=SVR<leventCode>
<expires>2003~06~l7Tlé=00:00-07:00</expire3>
<senderName>NATIONAL WEATHER SERVICE SACRAMENTO CA</3enderName>
<headline>SEVERE THUNDERSTORM WARNING</headline>
<description> AT 254 PM PDT...NATIONAL WEATHER SERVICE DOPPLER RADAR
INDICATED A SEVERE THUNDERSTORM OVER SOUTH CENTRAL ALPINE COUNTY...OR ABOUT 18
MILES SOUTHEAST OF KIRKWOOD...MOVTNG SOUTHWEST AT 5 MPH. HAIL...INTENSE RAIN AND
STRONG DAMAGING WINDS ARE LIKELY WITH THIS STORM.</description>
<instruction>TAKE COVER IN A SUBSTANTIAL SHELTER UNTIL THE STORM
PASSES.</instruction>
<contact>BARUFFALDI/JUSKIE</contact>
<area>
<areaDesc>EXTREME NORTH CENTRAL TUOLUMNE COUNTY IN CALIFORNIA, EXTREME
NORTHEASTERN CALAVERAS COUNTY IN CALIFORNIA, SOUTHWESTERN ALPINE COUNTY IN
CALIFORNIA</areaDesc>
<polygon>33.47,-120.l4 38.34,-119.95 38.52,-119.74 38.62,-119.89 38.47,-
120.l4</polygon>
<geocode>fipsé=006109</geocode>
<geocode>fips€=006009</geocode>
<geocode>fipsé:006003<lgeocode>
</area>
</info>
</alert>
```

FIG. 230

JSON data format

```
{
   "MessageName":"EmergencyAlertPropoery", "identifier":"KST0103344",
   "sender":"KSTO@NWS.NOAA.GOV", "sent":"2003-06-17T14:57:00-07:00",
   "status":"Actual", "msgType":"Alert", "scope":"Public",
    "info":{
       "category":"Met", "event":"SEVERE THUNDERSTORM", "urgency":"Immediate",
       "severity":"Severe", "certainty":"Likely", "eventCode":"same=SVR",
       "expires":"2003-06-17T16:00:00-07:00",
       "senderName":"NATIONAL WEATHER SERVICE SACRAMENTO CA",
       "headline":"SEVERE THUNDERSTORM WAWRNING",
       "description":"At 254 PM PDT....NATIONAL WEATHER ~~~",
       "instruction":"TAKE COVER IN A SUBSTAINTIAL SHELTER ~~~",
       "contact":"BARUFFALDI/JUSKIE",
       "area":{
            "areaDesc":"EXTREME NORTH CENTRAL ~~~",
            "polygon":"38.47, -120.14 ~~~",
            "geocode":"fips6=006109", "geocode":"fips6=006009", ...
        }
    }
}
```

FIG. 231

| Urgency | Severity | Certainty | |
|---|---|---|---|
| Immediate | Extreme | Very likely (>85%) | High |
| Expected | Severe | Likely (>50%) | |
| Future | Moderate | Possible (<50%) | Medium |
| Past | Minor | Unlikely (0%) | Low |
| Unknown | Unknown | Unknown | Default (Medium) |

FIG. 232

| Urgency | Severity | Certainty |
|---|---|---|
| Immediate - 5 | Extreme - 5 | Very likely (>85%) - 5 |
| Expected - 4 | Severe - 4 | Likely (>50%) - 4 |
| Future - 3 | Moderate - 3 | Possible (<50%) - 3 |
| Past - 2 | Minor - 2 | Unlikely (0%) - 2 |
| Unknown - 1 | Unknown - 1 | Unknown - 1 |

FIG. 233

| Urgency |
|---|
| Immediate - 9 |
| Expected - 8 |
| Future - 7 |
| Past - 5 |
| Unknown - 0 |

| Severity |
|---|
| Extreme - 5 |
| Severe - 4 |
| Moderate - 3 |
| Minor - 2 |
| Unknown - 0 |

| Certainty |
|---|
| Very likely (>85%) - 6 |
| Likely (>50%) - 5 |
| Possible (<50%) - 4 |
| Unlikely (0%) - 3 |
| Unknown - 0 |

FIG. 234

| Variable Name | Req/Opt | Data Type | Evented? |
|---|---|---|---|
| EmergencyAlert | Required | string | Yes |
| EmergencyAlertProperty | Required | string | No |

(a)

| Name | Required/Optional |
|---|---|
| GetAllEmergencyAlertMessage | Required |

(b)

| Argument | Direction | Related State Variable |
|---|---|---|
| EmergencyAlertProperty | OUT | EmergencyAlertProperty |

```
<?xml Version="1.0"?>
< EmergencyAlertMessage >
  <identifier>KSTO1055887203</identifier>
  <category>Met</category>
  <urgency>Immediate</urgency>
  <severity>Severe</severity>
  <certainty>Likely</certainty>
  <description>AT 242 PM….</description>
 </EmergencyAlertMessage >
```

FIG. 237

| Variable Name | Req/Opt | Data Type | Evented? |
|---|---|---|---|
| EmergencyAlert | Required | string (XML JSON, ... ) | Yes |

( a )

```
<?xml Version="1.0"?>
< EmergencyAlert >
  < ServiceId>000011</ServiceId>
  < MessageId >KSTO1055887203</MessageId>
  < MessageURI > http://atsc.easinfo.com/</MessageURI>
 </EmergencyAlert>
```

( b )

| Name | Required/Optional |
|---|---|
| GetEmergencyAlertInfo | Required |

( c )

| Argument | Direction | Related State Variable |
|---|---|---|
| EmergencyAlert | OUT | EmergencyAlert |

| Variable Name | Req/Opt | Data Type | Evented? |
|---|---|---|---|
| EmergencyAlert | Required | string (XML) | Yes or No |
| A_ARG_TYPE_EmergencyAlertURI | Required | string (XML) | Yes or No |

(a)

```
<?xml Version="1.0"?>
< EmergencyAlert >
  < dateTime>20140122T052000</dateTime >
  < ServiceId>000011</ServiceId >
  < MessageId >KSTO1055887203</MessageId>
  < URIList >
    <URI> file://EASmessageInfo/ui/full/index.html</URI>
    <URI> file://EASmessageInfo/ui/alternative/index.html</URI>
   </URIList >
 </EmergencyAlert>
```

(b)

```
<?xml Version="1.0"?>
< EmergencyAlerURI >
  <URI>  file://EASmessageInfo/ui/index.html </URI>
 </ EmergencyAlertURI >
```

| Name | Required/Optional |
|---|---|
| GetEmergencyAlert | Required |
| GetEmergencyAlertURI | Required |

(a)

| Argument | Direction | Related State Variable |
|---|---|---|
| EmergencyAlert | OUT | EmergencyAlert |

(b)

| Argument | Direction | Related State Variable |
|---|---|---|
| EmergencyAlertURI | OUT | A_ARG_TYPE_EmergencyAlertURI |

| Service | Service Type | Service ID |
|---|---|---|
| NRTDataSignaling | atsc3.0:nrtdatasignaling:1 | urn:atsc.org:serviceId:atsc3.0:nrtdatasignaling |

(a)

| XML Element/Attribute | Cardinality | Data Type | Description |
|---|---|---|---|
| NRTDataInfo | | | |
| @DataId | 1 | unsignedShort | Unique identifier for NRT Data |
| @ConsumptionModel | 1 | string | Consumption model for NRT Data |
| @DownloadingStatus | 0..1 | string | Downloading status of NRT Data: "Downloading", "Completed", or "Error" |
| ContenItem | 1..N | | Content Item Information of NRT Data |
| @ContentItemId | 1 | unsignedShort | Unique identifier of NRT Content Item |
| @ContentItemName | 0..N | string | Human reqdable name of NRT Content Item |
| @ContentItemSize | 1 | unsignedShort | Size of the NRT Content Item, in bytes |
| @PlaybackLength | 0..1 | unsignedShort | Playtout time of the NRT Content Item |
| @URL | 0..N | any URI | URL of NRT Content Item in Content Server |

| Variable Name | Req/Opt | Data Type | Evented? |
|---|---|---|---|
| NRTDataProperty | Required | string (XML) | Yes |
| NRTDataID | Required | string | No |

(a)

```
<?xml Version="1.0"?>
<NRTDataProperty (or NRTDataInfo)
 DataId="000001" ConsumptionModel="0x0C50" DownloadingStatus="Downloading">
  <ContentItem ContentItemId="32" ContentItemName="Movie clip"
  ContentItemSize="500" PlaybackLength="48" URL="http://atsc.nrtdatainfo.com/32">
</NRTDataProperty (or NRTDataInfo)>
```

(b)

| Name | Required/Optional |
|---|---|
| GetNRTDataProperty | Required |

(c)

| Argument | Direction | Related State Variable |
|---|---|---|
| NRTDataProperty | OUT | NRTDataProperty |
| NRTDataID | IN | NRTDataID |

| Service | Service Type | Service ID |
|---|---|---|
| DeviceCapabilitySignaling | atsc3.0:devservicesignaling:1 | urn:atsc.org:serviceId:atsc3.0:devservicesignaling |

(a)

| XML Element/Attribute | Cardinality | Data Type | Description |
|---|---|---|---|
| DeviceCapabilityProperty | | | |
| ComponentItem | 1..N | | |
| @ComponentID | 1 | unsignedShort | Unique identifier for component of service |
| @ComponentType | 1 | string | Type of component (e.g. video, audio, etc.) |
| Video | 0..1 | | |
| @VideoCodec | 1 | string | Video Codec in case of video component |
| @Resolution | 0..1 | string | width x height, in pixels |
| @AspectRatio | 0..1 | string | Aspect Ratio of component |
| @AudioCodec | 0..1 | string | Audio Codec in case of audio component |
| @CCCodec | 0..1 | string -15 | encoding format for Closed Caption |
| @AppVersion | 0..1 | integer 0 | application version in case of application |
| @CapabilityCode | 0..1 | string | Capability Code for OnDemand component, NRT Content Item, or NRT File |
| @AvailComponentURL | 1 | boolean | Default = "false" |

(b)

| XML Element/Attribute | Cardinality | Data Type | Description |
|---|---|---|---|
| DeviceCapabilityProperty | | | |
| ComponentItem | 1..N | | |
| @ComponentID | 1 | unsignedShort | Unique identifier for component of service |
| @ComponentType | 1 | string | Type of component (e.g. video, audio, etc.) |
| Video | 0..1 | | |
| @VideoCodec | 1 | string | Video Codec in case of video component |
| @Resolution | 0..1 | string | width x height, in pixels |
| @AspectRatio | 0..1 | string | Aspect Ratio of component |
| Audio | 0..1 | | |
| @AudioCodec | 1 | string | Audio Codec in case of audio component |
| CC | 0..1 | | |
| @CCCodec | 1 | string | encoding format for Closed Caption |
| App | 0..1 | | |
| @AppVersion | 0..1 | integer 0 - 15 | application version in case of application |
| CapabilityCode | 0..1 | string | Capability Code for the component, |
| AvailComponentURL | 1 | boolean | Default = "false" |

| Variable Name | Req/Opt | Data Type | Evented? |
|---|---|---|---|
| DeviceCapabilityProperty | Required | string (XML, JSON, ...) | Yes |
| ComponentURL | Optional | string (XML, JSON, ...), or anyURI | No |

(a)

```
<?xml Version="1.0"?>
<DeviceCapabilityProperty>
 < ComponentItem  ComponentId="00011"  ComponentType="video">
   <Video Resolution="1280x720"></Video>
   <Audio  AudioCodec="ABCAAC"></Aideo>
    ...
  <AvailComponentURL>false</AvailComponentURL>
 </ComponentItem>
<DeviceCapabilityProperty>
```

(b)

```
<?xml Version="1.0"?>
<ComponentURL   >
  <value>http://atsc.componentinfo.com/secondscreen/video1</value>
</ ComponentURL   >
```

(c)

| Variable Name | Req /Opt | Data Type | Evented? |
|---|---|---|---|
| A_ARG_TYPE_ComponentId | Required | string (XML, JSON,...) | No |
| A_ARG_TYPE_ComponentItem | Required | string (XML, JSON,...) | No |

| Name | Required/Optional |
|---|---|
| GetComponentItem | Required |
| GetComponentURL | Optional |
| GetDeviceCapability | Required |

(a)

| Action | Argument | Direction | Related State Variable |
|---|---|---|---|
| GetDeviceCapability | ComponentId | IN | A_ARG_TYPE_ComponentId |
| | DeviceCapabilityProperty | OUT | DeviceCapabilityProperty |
| GetComponentURL | ComponentId | IN | A_ARG_TYPE_ComponentId |
| | ComponentURL | OUT | ComponentURL |
| GetComponentItem | ComponentId | IN | A_ARG_TYPE_ComponentId |
| | ComponentItem | OUT | A_ARG_TYPE_ComponentItem |

| XML Element/Attribute | Cardinality | Data Type | Description |
|---|---|---|---|
| DeviceCapabilityProperty | | | |
| ComponentItem | 1..N | | |
| @ComponentID | 1 | unsignedShort | Unique identifier for component of service |
| @ComponentType | 1 | string | Type of component (e.g. video, audio, etc.) |
| Video | 0..1 | | |
| @VideoCodec | 1 | string | Video Codec in case of video component |
| @Resolution | 0..1 | string | width x height, in pixels |
| @AspectRatio | 0..1 | string | Aspect Ratio of component |
| Audio | 0..1 | | |
| @ AudioCodec | 1 | string | Audio Codec in case of audio component |
| CC | 0..1 | | |
| @CCCodec | 1 | string | encoding format for Closed Caption |
| App | 0..1 | | |
| @AppVersion | 0..1 | integer 0 - 15 | application version in case of application |
| CapabilityCode | 0..1 | string | Capability Code for the component, |
| AvailComponentURL | 0..1 | anyURI | Accessible URI for the coomponent |

(a)

```
<?xml Version="1.0"?>
<DeviceCapabilityProperty >
  <ComponentItem ComponentId ="00011" ComponentType ="video">
    <Video Resolution="1280x720"></Video>
    <Audio   AudioCodec ="ABCAAC"></Aideo>
     ...
  <AvailComponentURL >www.abc.def/content00011</AvailComponentURL>
</ ComponentItem  >
<DeviceCapabilityProperty >
```

(b)

(a)

```
<?xml Version="1.0"?>
< DeviceCapabilityProperty >
  < ComponentItem  ComponentId ="00011"
ComponentType="video">
     <Video Resolution="1280x720"></Video>
     <Audio AudioCodec="ABCAAC"></Aideo>
       ...

<AvailComponentURL >www.aaa.bbb</AvailCompon
entURL>
</ComponentItem>
<DeviceCapabilityProperty >
```

(b)

(a)

```
<?xml Version="1.0"?>
<DeviceCapabilityProperty>
  <ComponentItem ComponentId="00011"
ComponentType ="video">
    <Video Resolution="1280x720"></Video>
    <Audio AudioCodec="ABCAAC"></Aideo>
     ...
  <AvailComponentURL></AvailComponentURL>
</ComponentItem>
<DeviceCapabilityProperty>
```

| | |
|---|---|
| Signaling message header | Signaling message data (binary or XML formatted) |

| Syntax | No. Bits | Format |
|---|---|---|
| signaling_message_header (){ | | |
| signaling_id | 8 | uimsbf |
| signaling_length | 16 | uimsbf |
| signaling_id_extension | 16 | uimsbf |
| version_number | 4 | uimsbf |
| current_next_indicator | 1 | uimsbf |
| indicator_flags { | | |
| fragmentation_indicator | 1 | bslbf |
| payload_format_indicator | 1 | bslbf |
| expiration_indicator | 1 | bslbf |
| } | | |
| if(fragmentation_availability = = '1'){ | | |
| fragment_number | 4 | uimsbf |
| last_fragment_number | 4 | uimsbf |
| } | | |
| if(payloadformat_availability = = '1'){ | | |
| payload_format | 8 | uimsbf |
| } | | |
| if(expiration_availability = = '1'){ | | |
| expiration | 32 | uimsbf |
| } | | |
| } | | |
| } | | |

FIG. 272

```
NOTIFY * HTTP/1.1
HOST: 239.255.255.251:1900
CACHE-CONTROL: max-age = seconds until the multicast message expires
LOCATION: URL for the message
NOTIFICATION-TYPE: atsc:emergency
MESSAGE-TYPE: CAP
```

FIG. 273

```
<?xml version = "1.0" encoding = "UTF-8"?>
<alert xmlns = "http://www.incident.com/cap/1.0">
    <identifier>KSTO1055887203</identifier>
    <sender>KSTO@NOAA.GOV</sender>
    <severity>Severe</severity>
    <certainty>Likely</certainty>
    <eventCode>same=SVR</eventCode>
    <expires>2003-06-17T16:00:00-07:00</expires>
    <senderName>NATIONAL WEATHER SERVICE SACRAMENTO CA</senderName>
    <headline>SEVERE THUNDERSTORM WARNING</headline>
    <description> AT 254 PM PDT…NATIONAL WEATHER SERVICE DOPPLER RADAR INDICATED A
SEVERE THINDERSTORM OVER SOUTH CENTRAL ALPINE COUNTY…OR ABOUT 18 MILES
SOUTHEAST OF KIRKWOOD…MOVING SOUTHWEST AT 5 MPH. HALL... INTENSE RAIN AND
STRONG DAMAGING WINDS ARE LIKELY WITH THIS STORM.</description>
    <instruction>TAKE COVER IN A SUBSTANTIAL SHELTER UNTIL THE STORM
PASSES.</instruction>
    <contact>BARUFFALDI/JUSKIE</contact>
    <area>
      <areaDesc>EXTREME NORTH CENTRAL TUOLUMNE COUNTY IN CALIFORNIA, EXTREME
NORTHEASTERN CALAVERAS COUNTY IN CALIFORNIA, SOUTHWESTERN ALPINE COUNTY IN
CALIFORNIA</areaDesc>
      <polygon>38.47,-120.14 38.34,-119.95 38.52,-119.74 38.62,-119.89 38.47,-120.14</polygon>
-120.14</polygon>
      <geocode>fips6=006109</geocode>
      <geocode>fips6=006009</geocode>
      <geocode>fips6=006003</geocode>
    </area>
  </info>
</alert>
```

FIG. 274

```
<?xml version = “1.0” encoding = “UTF-8”?>
<EmergencyAlertProperty>
    <identifier>KSTO1055887203</identifier>
    <category>Met</category>
    <urgency>Immediate</urgency>
    <severity>Severe</severity>
    <certainty>Likely</certainty>
    <description> AT 254 PM PDT...NATIONAL WEATHER SERVICE DOPPLER RADAR INDICATED A
SEVERE THINDERSTORM OVER SOUTH CENTRAL ALPINE COUNTY...OR ABOUT 18 MILES
SOUTHEAST OF KIRKWOOD...MOVING SOUTHWEST AT 5 MPH. </description>
<areaDesc>EXTREME NORTH CENTRAL TOULUMNE COUNTY IN CALIFORNIA</areaDesc>
</EmergencyAlertProperty>
```

(a)

AT 254 PM PDT...NATIONAL WEATHER SERVICE DOPPLER RADAR INDICATED A SEVERE THINDERSTORM OVER SOUTH CENTRAL ALPINE COUNTY...OR ABOUT 18 MILES SOUTHEAST OF KIRKWOOD...MOVING SOUTHWEST AT 5 MPH (b)

FIG. 275

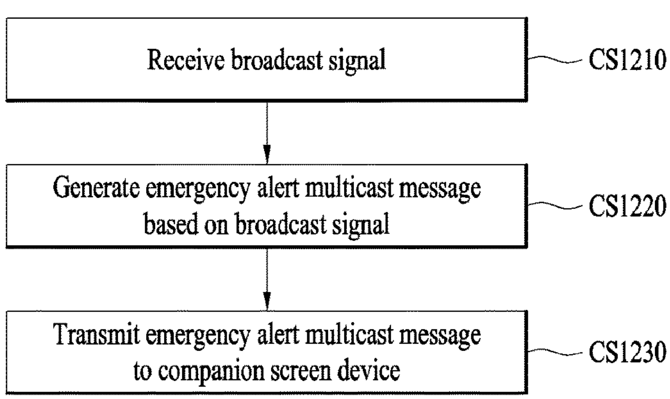

FIG. 280

| | | | | | element/attribute | type | cardinality |
|---|---|---|---|---|---|---|---|
| e | ApplicationList | | | | | | |
| | e | Application | | | | | 1..N |
| | | e | appName | | | xs:string | 0..N |
| | | | @ | lang | | xs:langauge | O |
| | | e | applicationDescriptor | | | | 1 |
| | | | e | icon | | | 0..N |
| | | | | @ | mimeType | xs:string | O |
| | | | | @ | width | xs:unsignedInt | O |
| | | | | @ | height | xs:unsignedInt | O |
| | | | | @ | depth | xs:unsignedInt | O |
| | | | | @ | url | xs:anyURI | M |
| | | | @ | type | | xs:unsignedInt | M |
| | | | @ | controlCode | | xs:unsignedInt | M |
| | | | @ | visibility | | xs:boolean | O |
| | | | @ | serviceBound | | xs:boolean | OD |
| | | | @ | priority | | xs:unsignedInt | M |
| | | | @ | version | | xs:unsignedInt | M |
| | | | @ | mhpVersion | | xs:unsignedInt | O |
| | | | @ | storageCapabilities | | xs:unsignedInt | O |
| | | | @ | trickModeTolerance | | | O |
| | | e | applicationSpecificDescriptor | | | xs:unsignedInt | 0..N |
| | | e | applicationUsageDescriptor | | | xs:unsignedInt | 0..N |
| | | e | applicationBoundary | | | xs:anyURI | 0..N |
| | | e | applicationTransport | | | xs:unsignedInt | 1..N |
| | | e | applicationLocation | | | xs:anyURI | 1 |
| | | e | atsc:Capabilities | | | xs:string | 1 |
| | | e | atsc:liveEventSource | | | | 1 |
| | | | @ | URL | | xs:anyURI | M |
| | | | @ | shortPollingPeriod | | xs:unsignedInt | O |
| | | | @ | targetDevice | | xs:unsignedInt | O |

FIG. 281

| | | | | | element/attribute | type | cardinality |
|---|---|---|---|---|---|---|---|
| e | e | e | atsc:ContentItems | | | | 0..N |
| | | | e | location | | xs:anyURI | 0..N |
| | | | @ | ContentLinkage | | xs:unsignedInt | M |
| | | | @ | updatesAvailable | | xs:boolean | M |
| | | | @ | TFAvailable | | xs:boolean | M |
| | | | @ | contentSecurityCondition | | xs:boolean | M |
| | | | @ | availableInBroadcast | | xs:boolean | M |
| | | | @ | availableOnInet | | xs:boolean | M |
| | | | @ | playBackLengthInSecondes | | xs:unsignedInt | O |
| | | | @ | playBackDelay | | xs:unsignedInt | O |
| | | | @ | expiration | | xs:unsignedInt | O |
| | | | @ | size | | xs:unsingedLong | O |
| | | | @ | name | | xs:string | O |
| | | | e | timeSlotInfo | | | |
| | | | | @ | time_slot_start | xs:unsingedInt | |
| | | | | @ | time_slot_length | xs:unsingedInt | |
| | | | | @ | acquisition_time | xs:unsingedInt | |
| | | | | @ | repeat_period | xs:unsingedInt | |
| | | | | @ | slot_count | xs:unsingedInt | |
| | | @ | applicationIdentifier | | | xs:anyURI | M |
| | | @ | atsc:serviceId | | | xs:unsignedInt | M |
| | | @ | atsc:protocolVersion | | | xs:unsignedInt | M |
| | @ | ASTVersionNumber | | | | xs:unsignedInt | M |
| | @ | timeSpanStart | | | | xs:unsignedInt | M |
| | @ | timeSpanLength | | | | xs:unsignedInt | M |

FIG. 282

| Element Name | | | | Cardin-ality | Data Type |
|---|---|---|---|---|---|
| EMT | | | | | |
| | @mpdId | | | R | string |
| | @periodId | | | R | string |
| | EventStream | | | 1..N | |
| | | @schemeIdURi | | R | anyURI |
| | | @value | | O | string |
| | | @timescale | | O | unsignedInt |
| | | Event | | 0..N | string |
| | | | @presentationTime | OD | unsignedLong |
| | | | @duration | O | unsignedLong |
| | | | @id | O | unsignedInt |

(a) listener(StreamEvent event)

(b) addStreamEventListener(targetURL, eventName, listener)
removeStreamEventListener(targetURL, eventName, listener)

FIG. 302

| Signaling message header | Signaling message (binary or XML formatted) |
|---|---|

| Syntax | No. Bits | Format |
|---|---|---|
| signaling_message_header{ | | |
| signaling_id | 8 | uimsbf |
| signaling_length | 12 | uimsbf |
| reserved | 4 | '1111' |
| signaling_id_extension { | | |
| protocol_version | 8 | uimsbf |
| reserved | 8 | uimsbf |
| } | | |
| reserved | 2 | '11' |
| version_number | 5 | uimsbf |
| current_next_indicator | 1 | uimsbf |
| fragment_number | 8 | uimsbf |
| last_fragment_number | 8 | uimsbf |
| } | | |

FIG. 303

| Signaling message header | Service map signaling message OR PORTION THEREOF |
|---|---|

| Syntax | No. of Bits | Format |
|---|---|---|
| service_map_signaling_message { | | |
| ... | | |
| num_services | 8 | uimsbf |
| for (i=0; i<num_services; i++) | | |
| { | | |
| service_id | 16 | uimsbf |
| service_type | 8 | uimsbf |
| short_service_name_length /* m */ | 3 | uimsbf |
| short_service_name | 16*m | bslbf |
| channel_number | 16 | uimsbf |
| ... | | |
| timebase_transport_mode | 8 | uimsbf |
| bootstrap_data(timebase_transport_mode) | var | |
| signaling_transport_mode | 8 | |
| bootstrap_data(signaling_transport_mode) | var | |
| ... | | |
| num_service_level_descriptors | 8 | uimsbf |
| for (m=0; m<num_service_level_descriptors; m++) | | |
| { | | |
| service_level_descriptor() | var | |
| } | | |
| } | | |
| } | | |

FIG. 304

| timebase_transport_mode OR signaling_transport_mode VALUE | Designation |
|---|---|
| 0x00 | IPv4/IPv6 flows through same broadcast or over the cellular network |
| 0x01 | IPv4/IPv6 flows through different broadcast |
| 0x02 | Session-based flows (e.g., ALC/LCT, FLUTE sessions) through same broadcast |
| 0x03 | Session-based flows (e.g., ALC/LCT, FLUTE sessions) through different broadcast |
| 0x04 | packet-based flows through same broadcast |
| 0x05 | packet-based flows through different broadcast |
| 0x06 | URL |
| 0x07-0xFF | Reserved |

FIG. 305

| Syntax | No. of Bits | Format |
|---|---|---|
| bootstrap_data() { | | |
| IP_version_flag | 1 | bslbf |
| source_IP_address_flag | 1 | bslbf |
| destination_IP_address_flag | 1 | bslbf |
| reserved | 5 | '11111' |
| if (source_IP_address_flag) | | |
| source_IP_address | 32 or 128 | uimsbf |
| if (destination_IP_address_flag) | | |
| destination_IP_address | 32 or 128 | uimsbf |
| port_num_count | 8 | |
| if(port_num_count > 0) | | |
| destination_UDP_port_num | 16 | uimsbf |
| } | | |

FIG. 306

| Syntax | No. of Bits | Format |
|---|---|---|
| bootstrap_data() { | | |
| broadcast_id | 16 | uimsbf |
| IP_version_flag | 1 | bslbf |
| source_IP_address_flag | 1 | bslbf |
| destination_IP_address_flag | 1 | bslbf |
| reserved | 5 | '11111' |
| if (source_IP_address_flag) | | |
| source_IP_address | 32 or 128 | uimsbf |
| if (destination _IP_address_flag) | | |
| destination_IP_address | 32 or 128 | uimsbf |
| port_num_count | 8 | |
| if(port_num_count > 0) | | |
| destination_UDP_port_num | 16 | uimsbf |
| } | | |

FIG. 307

| Syntax | No. of Bits | Format |
|---|---|---|
| bootstrap_data() { | | |
| IP_version_flag | 1 | bslbf |
| source_IP_address_flag | 1 | bslbf |
| destination_IP_address_flag | 1 | bslbf |
| reserved | 5 | '11111' |
| if (source_IP_address_flag) | | |
| source_IP_address | 32 or 128 | uimsbf |
| if (destination _IP_address_flag) | | |
| destination_IP_address | 32 or 128 | uimsbf |
| destination_UDP_port_num | 16 | uimsbf |
| tsi | 16 | uimsbf |
| } | | |

FIG. 308

| Syntax | No. of Bits | Format |
|---|---|---|
| bootstrap_data() { | | |
| broadcast_id | 16 | uimsbf |
| IP_version_flag | 1 | bslbf |
| source_IP_address_flag | 1 | bslbf |
| destination_IP_address_flag | 1 | bslbf |
| reserved | 5 | '11111' |
| if (source_IP_address_flag) | | |
| source_IP_address | 32 or 128 | uimsbf |
| if (destination _IP_address_flag) | | |
| destination_IP_address | 32 or 128 | uimsbf |
| destination_UDP_port_num | 16 | uimsbf |
| tsi | 16 | uimsbf |
| } | | |

FIG. 309

| Syntax | No. of Bits | Format |
|---|---|---|
| bootstrap_data() { | | |
| IP_version_flag | 1 | bslbf |
| source_IP_address_flag | 1 | bslbf |
| destination_IP_address_flag | 1 | bslbf |
| reserved | 5 | '11111' |
| if (source_IP_address_flag) | | |
| source_IP_address | 32 or 128 | uimsbf |
| if (destination _IP_address_flag) | | |
| destination_IP_address | 32 or 128 | uimsbf |
| destination_UDP_port_num | 16 | uimsbf |
| packet_id | 16 | uimsbf |
| } | | |

FIG. 310

| Syntax | No. of Bits | Format |
|---|---|---|
| bootstrap_data() { | | |
| broadcast_id | 16 | uimsbf |
| IP_version_flag | 1 | bslbf |
| source_IP_address_flag | 1 | bslbf |
| destination_IP_address_flag | 1 | bslbf |
| reserved | 5 | '11111' |
| if (source_IP_address_flag) | | |
| source_IP_address | 32 or 128 | uimsbf |
| if (destination _IP_address_flag) | | |
| destination_IP_address | 32 or 128 | uimsbf |
| destination_UDP_port_num | 16 | uimsbf |
| packet_id | 16 | uimsbf |
| } | | |

FIG. 311

| Syntax | No. of Bits | Format |
|---|---|---|
| bootstrap_data() { | | |
| URL_length | 8 | |
| for (i = 0; i < URL_length; i++){ | | |
| URL_char | 8 | bslbf |
| } | | |
| } | | |

FIG. 313

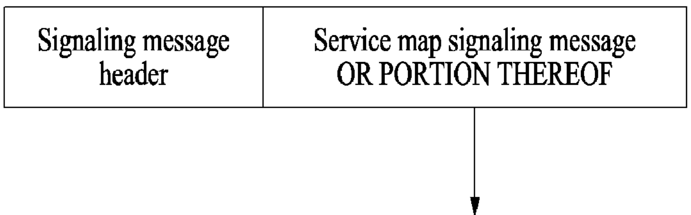

| Syntax | No. of Bits | Format |
|---|---|---|
| service_map_signaling_message { | | |
| ... | | |
| num_services | 8 | uimsbf |
| for (i=0; i<num_services; i++) | | |
| { | | |
| service_id | 16 | uimsbf |
| service_type | 8 | uimsbf |
| short_service_name_length /* m */ | 3 | uimsbf |
| short_service_name | 16*m | bslbf |
| channel_number | 16 | uimsbf |
| ... | | |
| timebase_transport_flag | 1 | bslbf |
| if(timebase_transport_flag) | | |
| timebase_transport_mode | 8 | uimsbf |
| bootstrap_data(timebase_transport_mode) | var | |
| } | | |
| signaling_transport_mode | 8 | |
| bootstrap_data(signaling_transport_mode) | var | |
| ... | | |
| num_service_level_descriptors | 8 | uimsbf |
| for (m=0; m<num_service_level_descriptors; m++) | | |
| { | | |
| service_level_descriptor() | var | |
| } | | |
| } | | |
| } | | |

FIG. 314

| Signaling message header | Service map signaling message Or portion thereof |
|---|---|

SERVICE MAP SIGNALING MESSAGE IS AS FOLLOWS.
(REPRESENT IN THE FORM OF OTHER FORMS SUCH AS XML)

| Syntax | No. of Bits | Format |
|---|---|---|
| service_map_signaling_message { | | |
| ... | | |
| num_services | 8 | uimsbf |
| for (i=0; i<num_services; i++) | | |
| { | | |
| service_id | 16 | uimsbf |
| service_type | 8 | uimsbf |
| ... | | |
| timebase_transport_flag | 1 | bslbf |
| MPD_transport_flag | 1 | bslbf |
| component_location_transport_flag | 1 | bslbf |
| app_signaling_transport_flag | 1 | bslbf |
| signaling_transport_flag | 1 | bslbf |
| reserved | 3 | '111' |
| if(timebase_transport_flag) | | |
| timebase_transport_mode | 8 | uimsbf |
| bootstrap_data(timebase_transport_mode) | var | |
| } | | |
| if(MPD_transport_flag) | | |
| MPD_transport_mode | 8 | |
| bootstrap_data(MPD_transport_mode) | var | |
| } | | |
| if(component_location_transport_flag) | | |
| component_location_transport_mode | 8 | uimsbf |
| bootstrap_data(component_location_transport_mode) | var | |
| } | | |
| if(app_signaling_transport_flag) | | |
| app_signaling_transport_mode | 8 | |
| bootstrap_data(app_signaling_transport_mode) | var | |
| } | | |
| if(signaling_transport_flag) | | |
| signaling_transport_mode | 8 | |
| bootstrap_data(signaling_transport_mode) | var | |
| } | | |
| ... | | |
| num_service_level_descriptors | 8 | uimsbf |
| for (m=0; m<num_service_level_descriptors; m++) | | |
| { | | |
| service_level_descriptor() | var | |
| } | | |
| } | | |
| } | | |

FIG. 315

| X_transport_mode VALUE | Designation |
|---|---|
| 0x00 | IPv4/IPv6 flows through same broadcast or over the cellular network |
| 0x01 | IPv4/IPv6 flows through different broadcast |
| 0x02 | Session-based flows (e.g., ALC/LCT, FLUTE sessions) through same broadcast |
| 0x03 | Session-based flows (e.g., ALC/LCT, FLUTE sessions) through different broadcast |
| 0x04 | packet-based flows through same broadcast |
| 0x05 | packet-based flows through different broadcast |
| 0x06 | URL |
| 0x07-0xFF | Reserved |

FIG. 316

| Syntax | No. Bits | Format |
|---|---|---|
| component_location_signaling_message { | | |
| signaling_id | 8 | uimsbf |
| signaling_length | 12 | uimsbf |
| reserved | 4 | '1111' |
| signaling_id_extension { | | |
| protocol_version | 8 | uimsbf |
| reserved | 8 | uimsbf |
| } | | |
| reserved | 2 | '11' |
| version_number | 5 | uimsbf |
| current_next_indicator | 1 | uimsbf |
| fragment_number | 8 | uimsbf |
| last_fragment_number | 8 | uimsbf |
| service_id | 16 | uimsbf |
| num_components | 8 | uimsbf |
| for (i=0; i<num_components; i++) | | |
| { | | |
| component_id_length /*L*/ | 8 | uimsbf |
| component_id | 8*L | uimsbf |
| frequency_number | 16 | uimsbf |
| broadcast_id | 16 | uimsbf |
| data_pipe_id | 8 | uimsbf |
| IP_version_flag | 1 | bslbf |
| source_IP_address_flag | 1 | bslbf |
| destination_IP_address_flag | 1 | bslbf |
| reserved | 5 | '11111' |
| if (source_IP_address_flag) | | |
| source_IP_address | 32 or 128 | uimsbf |
| if (destination _IP_address_flag) | | |
| destination_IP_address | 32 or 128 | uimsbf |
| UDP_port_num | 16 | uimsbf |
| tsi | 16 | uimsbf |
| } | | |
| num_app_signalings | 8 | uimsbf |
| for (k=0; k<num_app_signalings; k++) | | |
| { | | |
| app_signaling_id_length /*M*/ | 8 | uimsbf |
| app_signaling_id | 8*M | uimsbf |
| app_delivery_info() | var | |
| } | | |
| } | | |

FIG. 317

| Syntax | No. of Bits | Format |
|---|---|---|
| app_delivery_info() { | | |
| broadcast_flag | 1 | bslbf |
| IP_version_flag | 1 | bslbf |
| source_IP_address_flag | 1 | bslbf |
| destination_IP_address_flag | 1 | bslbf |
| reserved | 4 | '1111' |
| if (broadcast_flag) | | |
| broadcast_id | 16 | uimsbf |
| if (source_IP_address_flag) | | |
| source_IP_address | 32 or 128 | uimsbf |
| if (destination_IP_address_flag) | | |
| destination_IP_address | 32 or 128 | uimsbf |
| destination_UDP_port_num | 16 | uimsbf |
| tsi | 16 | uimsbf |
| } | | |

FIG. 318

| Syntax | No. of Bits | Format |
|---|---|---|
| app_delivery_info() { | | |
| broadcast_flag | 1 | bslbf |
| IP_version_flag | 1 | bslbf |
| source_IP_address_flag | 1 | bslbf |
| destination_IP_address_flag | 1 | bslbf |
| reserved | 4 | '1111' |
| if (broadcast_flag) | | |
| broadcast_id | 16 | uimsbf |
| if (source_IP_address_flag) | | |
| source_IP_address | 32 or 128 | uimsbf |
| if (destination_IP_address_flag) | | |
| destination_IP_address | 32 or 128 | uimsbf |
| destination_UDP_port_num | 16 | uimsbf |
| packet_id | 16 | uimsbf |
| } | | |

FIG. 319

```
<?xml version="1.0" encoding="UTF-8"?>
<xs:schema xmlns:xs="http://www.w3.org/2001/XMLSchema">
<xs:element name="CompLocTable" type="CompLocTableType"/>
<xs:complexType name="CompLocTableType">
  <xs:sequence>
    <xs:element name="MPDCompLocs" maxOccurs="unbounded">
    <xs:complexType>
      <xs:sequence>
        <xs:element name="PeriodCompLocs" maxOccurs="unbounded">
          <xs:complexType>
            <xs:sequence>
              <xs:element name="ReptnLoc" type="ReptnLocType" maxOccurs="unbounded"/>
            </xs:sequence>
            <xs:attribute name="periodId" type="xs:string"/>
          </xs:complexType>
        </xs:element>
      </xs:sequence>
      <xs:attribute name="mpdId"/>
    </xs:complexType>
    </xs:element>
  </xs:sequence>
</xs:complexType>
<xs:complexType name="ReptnLocType">
  <xs:attribute name="ReptnID" type="StringNoWhitespaceType" use="required"/>
  <xs:attribute name="RFChan" type="xs:unsignedByte" use="required"/>
  <xs:attribute name="BroadcastId " type="xs:unsignedByte" use="required"/>
  <xs:attribute name="DataPipeId " type="xs:unsignedByte" use="required"/>
  <xs:attribute name="IPAddr" type="xs:unsignedInt" use="required"/>
  <xs:attribute name="UDPPort" type="xs:unsignedShort" use="required"/>
  <xs:attribute name="TSI" type="xs:unsignedInt" use="required"/>
</xs:complexType>
<!-- String without white spaces -->
<xs:simpleType name="StringNoWhitespaceType">
  <xs:restriction base="xs:string">
    <xs:pattern value="[^\r\n\t \p{Z}]*"/>
  </xs:restriction>
</xs:simpleType>
</xs:schema>
```

FIG. 323

| Example Trigger | Function |
|---|---|
| xbc.tv/e12 | Pre-load TPT from identified location (online at http://xbc.tv/e12 or within associated FLUTE session). |
| xbc.tv/e12?s=10 | Pre-load TPT from identified location (online at http://xbc.tv/e12 or within associated FLUTE session), with smoothing parameter value 10 seconds. |
| xbc.tv/e12?v=2 | Pre-load TPT from the identified location and indicate the version number of this TPT. If a TPT had previously been acquired from this location and it was associated with a different version number, the receiver should reload this new version. |
| xbc.tv/e12?m=5a33 | Identify the location of TPT and establish the current Media Time of the associated content. |
| xbc.tv/e12?e=7.5 | Identify the location of TPT and signal the immediate execution of the TPT interactive event with eventID value 5 associated with the TDO that has appID value 7. |
| xbc.tv/e12?e=8.3&t=77ee | Identify the location of TPT and signal the execution at Media Time 77ee of the TPT interactive event with eventID value 3 associated with the TDO that has appID value 8. |
| xbc.tv/e12?m=5a33&s=12 | Identify the location of TPT and establish the current Media Time of the associated content, with smoothing parameter value 12 seconds. |
| xbc.tv/e12?m=44b1&c=xbc55 | Identify the location of the Direct Execution DO to be launched, establish the current Media Time of the associated content, and identify the content. |
| xbc.tv/e12?e=8.3&st=77ee&et=80ee | Identify the location of TPT and signal the execution at Media Time 77ee of the TPT interactive event with eventID value 3 associated with the TDO that has appID vaue 8 and has a end time 80ee. |

FIG. 324

| Element/Attribute | Card-inality | Data Type | Description and Value |
|---|---|---|---|
| TPT | | | |
| @majorProtocolVersion | 0..1 | integer 0..15 | Major Protocol Version, default="1" |
| @minorProtocolVersion | 0..1 | integer 0..15 | Minor Protocol version, default="0" |
| @id | 1 | anyURI | segment_id = domain_name/program_id |
| @tptVersion | 1 | unsignedByte | Data version of this TPT |
| @expireDate | 0..1 | dateTime | Date after which this TPT will not be used |
| @updatingTime | 0..1 | unsignedShort | Time interval to check for TPT updates |
| @serviceID | 0..1 | unsignedShort | NRT service_id |
| @baseURL | 0..1 | anyURI | Base URL for all relative URLs in TPT |
| Capabilities | 0..1 | nrt:CapabilitiesType | Essential capabilities for the segment associated with this TPT |
| LiveTrigger | 0..1 | | Info on Internet live trigger delivery |
| @URL | 1 | anyURI | URL of server for live triggers |
| @pollPeriod | 0..1 | unsignedByte | Short polling period in seconds |
| TDO | 1..N | | TDO (app) for the segment associated with this TPT |
| @appID | 1 | unsignedShort | Application ID of this app, unique within the scope of this TPT |
| @appType | 0..1 | integer 0..15 | Application type (default: 1="TDO") |
| @appName | 0..1 | String | Display name (for viewer launch consent) |
| @globalID | 0..1 | anyURI | Globally unique app ID |
| @appVersion | 0..1 | unsignedByte | Version of this app |
| @cookieSpace | 0..1 | unsignedByte | Persistent storage needed; default=0 |
| @frequencyOfUse | 0..1 | integer 0..15 | Code values per Table 6.3 |
| @expireDate | 0..1 | dateTime | Expire date for caching this app |
| @testTDO | 0..1 | Boolean | Flag for test app; default="false" |
| @availInternet | 0..1 | Boolean | Default="true" |
| @availBroadcast | 0..1 | Boolean | Default="true" |
| URL | 1..N | anyURI | App URL(s) |
| @entry | 0..1 | Boolean | Indicator of entry point; default = "false" |
| Capabilities | 0..1 | nrt:CapabilitiesType | Essential capabilities to present this app |
| ApplicationBoundary | 0..1 | | Extensions to app boundary |
| OriginURL | 1..N | anyURI | Origin to be added to app boundary |
| ContentItem | 0..N | | Content item used by this app |
| URL | 1..N | anyURI | URL(s) of content item |
| @entry | 0..1 | Boolean | Indicator of entry point; default = "false" |
| @updatesAvail | 0..1 | Boolean | Default="false" |
| @pollPeriod | 0..1 | unsignedByte | Short polling period in seconds |
| @size | 0..1 | 24-bit integer | Size of content item, in kilobytes |
| @availInternet | 0..1 | Boolean | Default="true" |
| @availBroadcast | 0..1 | Boolean | Default="true" |
| Event | 1..N | | Event targeted to this TDO |
| @eventID | 1 | unsignedShort | Unique identifier of this Event element within the scope of the TDO element. |
| @action | 1 | String | Allowed values are "prep", "exec", "susp", and "kill" |
| @destination | 0..1 | unsignedByte | Device to which the event is directed (primary screen, second screen, or both) |
| @diffusion | 0..1 | unsignedByte | Period for applying diffusion, in seconds |
| Data | 0..N | base64Binary | Data to be used for this event |
| @dataID | 1 | unsignedShort | Unique identifier of this Data element within the scope of the Event element. |

FIG. 325

| Application Trigger Property | MPD Events | Inband Events (emsg) |
| --- | --- | --- |
| Application Trigger Type | @schemeIdUri + "U+0020" (SPACE character) + @value | scheme_id_uri + "U+0020" (SPACE character) + value |

FIG. 326

| @value | Description |
| --- | --- |
| tpt | Signals the location of TPT |
| status | Signals the lifecycle of applications (e.g., preparing, launching, terminating, suspending, etc.) |
| action | Signals the actions taken by applications |
| mediatime | Signals media time |

FIG. 327

| Element/Attribute | Cardinality | Data Type | Description and Value |
|---|---|---|---|
| TPT | | | |
| @majorProtocolVersion | 0..1 | integer 0..15 | Major Protocol Version, default="1" |
| @minorProtocolVersion | 0..1 | integer 0..15 | Minor Protocol version, default="0" |
| @id | 1 | anyURI | segment_id = domain_name/program_id |
| @tptVersion | 1 | unsignedByte | Data version of this TPT |
| @expireDate | 0..1 | dateTime | Date after which this TPT will not be used |
| @updatingTime | 0..1 | unsignedShort | Time interval to check for TPT updates |
| @serviceID | 0..1 | unsignedShort | NRT service_id |
| @baseURL | 0..1 | anyURI | Base URL for all relative URLs in TPT |
| Capabilities | 0..1 | nrt:CapabilitiesType | Essential capabilities for the segment associated with this TPT |
| LiveTrigger | 0..1 | | Info on Internet live trigger delivery |
| @URL | 1 | anyURI | URL of server for live triggers |
| @pollPeriod | 0..1 | unsignedByte | Short polling period in seconds |
| TDO | 1..N | | TDO (app) for the segment associated with this TPT |
| @appID | 1 | unsignedShort | Application ID of this app, unique within the scope of this TPT |
| @appType | 0..1 | integer 0-15 | Application type (default: 1="TDO") |
| @appName | 0..1 | String | Display name (for viewer launch consent) |
| @globalID | 0..1 | anyURI | Globally unique app ID |
| @appVersion | 0..1 | unsignedByte | Version of this app |
| @cookieSpace | 0..1 | unsignedByte | Persistent storage needed; default=0 |
| @frequencyOfUse | 0..1 | integer 0..15 | Code values per Table 6.3 |
| @expireDate | 0..1 | dateTime | Expire date for caching this app |
| @testTDO | 0..1 | Boolean | Flag for test app; default="false" |
| @availInternet | 0..1 | Boolean | Default="true" |
| @availBroadcast | 0..1 | Boolean | Default="true" |
| URL | 1..N | anyURI | App URL(s) |
| @entry | 0..1 | Boolean | Indicator of entry point; default = "false" |
| Capabilities | 0..1 | nrt:CapabilitiesType | Essential capabilities to present this app |
| ApplicationBoundary | 0..1 | | Extensions to app boundary |
| OriginURL | 1..N | anyURI | Origin to be added to app boundary |
| ContentItem | 0..N | | Content item used by this app |
| URL | 1..N | anyURI | URL(s) of content item |
| @entry | 0..1 | Boolean | Indicator of entry point; default = "false" |
| @updatesAvail | 0..1 | Boolean | Default="false" |
| @pollPeriod | 0..1 | unsignedByte | Short polling period in seconds |
| @size | 0..1 | 24-bit integer | Size of content item, in kilobytes |
| @availInternet | 0..1 | Boolean | Default="true" |
| @availBroadcast | 0..1 | Boolean | Default="true" |
| Event | 1..N | | Event targeted to this TDO |
| @eventID | 1 | unsignedShort | Unique identifier of this Event element within the scope of the TDO element. |
| ~~@action~~ | ~~1~~ | ~~String~~ | ~~Allowed values are "prep", "exec", "susp", and "kill"~~ |
| @destination | 0..1 | unsignedByte | Device to which the event is directed (primary screen, second screen, or both) |
| @diffusion | 0..1 | unsignedByte | Period for applying diffusion, in seconds |
| Data | 0..N | base64Binary | Data to be used for this event |
| @dataID | 1 | unsignedShort | Unique identifier of this Data element within the scope of the Event element. |

FIG. 328

| Application Trigger Property | MPD Events | Inband Events (emsg) |
| --- | --- | --- |
| tptID | @id | id |
| TPT location | Message | message_data |

FIG. 329

| Application Trigger Property | MPD Events | Inband Events (emsg) |
| --- | --- | --- |
| startTime | @presentationTime | event_presentation_time_data |
| tptID | @id | id |
| status (preparing, launching, terminating, suspending, etc.) | Message | message_data |

FIG. 330

| Application Trigger Property | MPD Events | Inband Events (emsg) |
|---|---|---|
| startTime | @presentationTime | event_presentation_time_data |
| endTime | startTime + @duration | startTime + event_duration |
| segmentID (tptID) | @id | id |
| Trigger message | Message | message_data |

FIG. 331

| Application Trigger Property | MPD Events | Inband Events (emsg) |
|---|---|---|
| mediaTime | @presentationTime | event_presentation_time_data |
| segmentID (tptID) | @id | id |

FIG. 332

| @value | Description |
|---|---|
| tpt | Signals the location of TPT |
| status | Signals the lifecycle of applications (e.g., preparing, launching, terminating, suspending, etc.) |
| action | Signals the actions taken by applications |
| mediatime | Signals media time |
| trigger | Signals all trigger information |

FIG. 333

| Application Trigger Property | MPD Events | Inband Events (emsg) |
|---|---|---|
| tptID | @id | id |
| Trigger message | Message | message_data |

FIG. 335

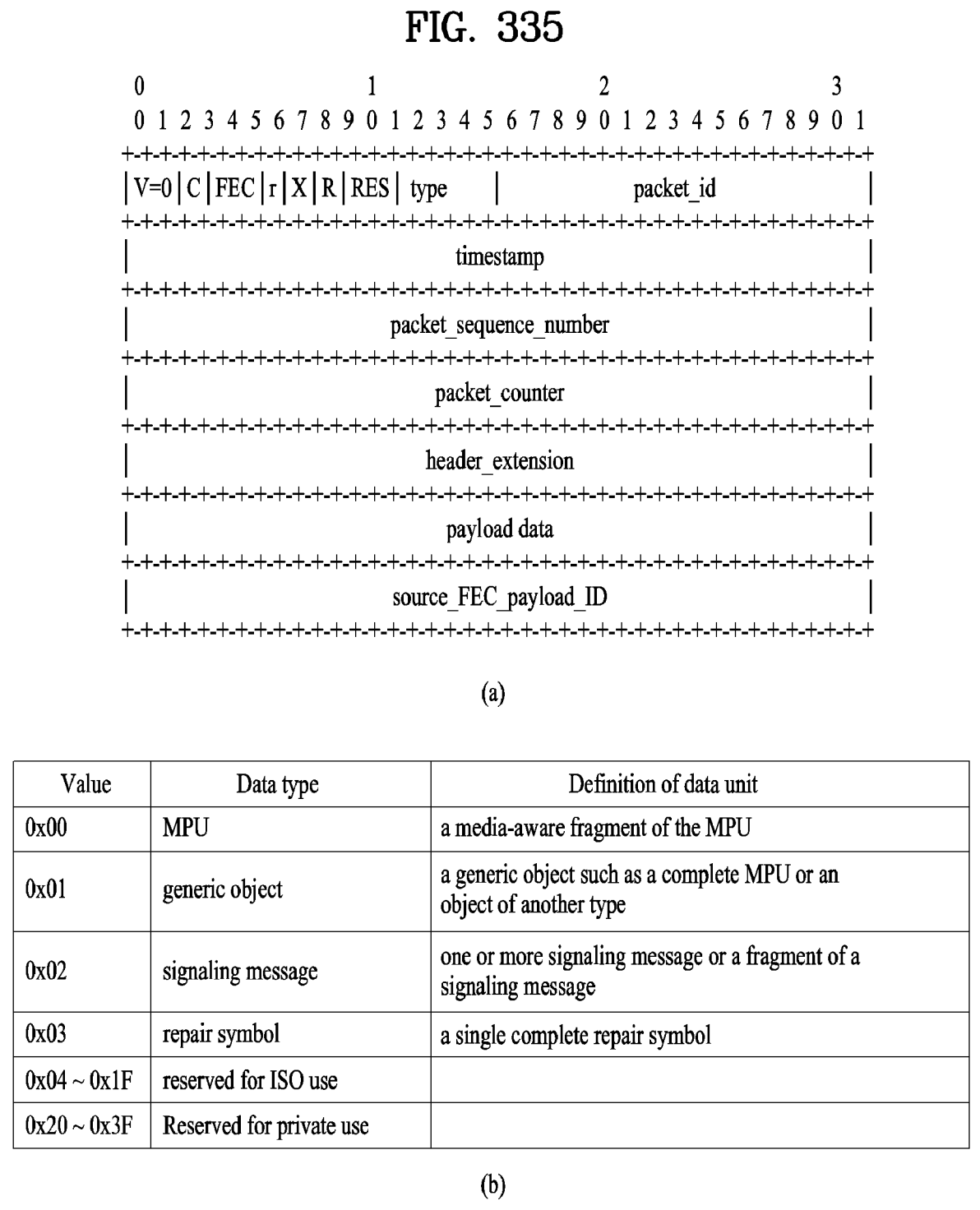

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|V=0|C|FEC|r|X|R|RES| type    |            packet_id            |
+-+-+-+-+-+-+-+-+-+-+-+-+-+-+-+-+-+-+-+-+-+-+-+-+-+-+-+-+-+-+-+-+
|                            timestamp                          |
+-+-+-+-+-+-+-+-+-+-+-+-+-+-+-+-+-+-+-+-+-+-+-+-+-+-+-+-+-+-+-+-+
|                     packet_sequence_number                    |
+-+-+-+-+-+-+-+-+-+-+-+-+-+-+-+-+-+-+-+-+-+-+-+-+-+-+-+-+-+-+-+-+
|                         packet_counter                        |
+-+-+-+-+-+-+-+-+-+-+-+-+-+-+-+-+-+-+-+-+-+-+-+-+-+-+-+-+-+-+-+-+
|                        header_extension                       |
+-+-+-+-+-+-+-+-+-+-+-+-+-+-+-+-+-+-+-+-+-+-+-+-+-+-+-+-+-+-+-+-+
|                          payload data                         |
+-+-+-+-+-+-+-+-+-+-+-+-+-+-+-+-+-+-+-+-+-+-+-+-+-+-+-+-+-+-+-+-+
|                      source_FEC_payload_ID                    |
+-+-+-+-+-+-+-+-+-+-+-+-+-+-+-+-+-+-+-+-+-+-+-+-+-+-+-+-+-+-+-+-+
```

(a)

| Value | Data type | Definition of data unit |
|---|---|---|
| 0x00 | MPU | a media-aware fragment of the MPU |
| 0x01 | generic object | a generic object such as a complete MPU or an object of another type |
| 0x02 | signaling message | one or more signaling message or a fragment of a signaling message |
| 0x03 | repair symbol | a single complete repair symbol |
| 0x04 ~ 0x1F | reserved for ISO use | |
| 0x20 ~ 0x3F | Reserved for private use | |

| Syntax | Value | No. of bits | Mnemonic |
|---|---|---|---|
| signalling_message () { | | | |
| message_id | | 16 | uimsbf |
| version | | 16 | uimsbf |
| if(message_id != PA_message && message_id !=MPI_message) { | | | |
| langth | | 16 | uimsbf |
| } else { | | | |
| langth | | | |
| } | | 32 | uimsbf |
| extension | | | |
| message_payload{ | | | |
| } | | | |

FIG. 339

| Value | Description |
|---|---|
| 0x0000 | PA messages |
| 0x0001 ~ 0x000F | MPI messages.<br><br>For a Package, 16 contiguous values are allocated to MPI messages.<br><br>If the value % 16 equals 15, the MPI message carries complete PI.<br><br>If the value %16 equals N where N = 0 ~ 14, the MPI message carries Subset-N PI. |
| 0x0010 ~ 0x001F | MPT messages.<br><br>For a package, 16 contiguous values are allocated to MPT messages.<br><br>If the value % 16 equals 15, the MPT message carries complete MPT.<br><br>If the value %16 equals N where N = 0 ~ 14, the MPT message carries Subset-N MPT. |
| 0x0200 | CRI messages |
| 0x0201 | DCI messages |
| 0x0202 | AL_FEC messgages |
| 0x0203 | HRBM messages |
| 0x0204 ~ 0x7FFF | reserved for ISO use |
| 0x8000 | Application Signaling messages |
| 0x8001 ~ 0xFFFF | reserved for private use |

FIG. 340

| Syntax | Value | No. of bits | Mnemonic |
|---|---|---|---|
| application_signaling_message() { | | | |
| message_id | 0x8000 | 16 | uimsbf |
| version | | 8 | uimsbf |
| length | | 32 | uimsbf |
| extension { | | | |
| number_of_tables | N1 | 8 | uimsbf |
| for(i=0;i<N1;i++) { | | | |
| table_id | | 8 | uimsbf |
| table_version | | 8 | uimsbf |
| table_length | | 16 | uimsbf |
| } | | | |
| } | | | |
| message_payload { | | | |
| for(i=0;i<N1;i++) { | | | |
| application_signaling_table() | | | |
| } | | | |
| } | | | |
| } | | | |

FIG. 341

| Syntax | No. of Bits | Format |
|---|---|---|
| application_signaling_table() { | | |
| table_id | 8 | uimsbf |
| version | 8 | uimsbf |
| length | 16 | uimsbf |
| trigger_type | 8 | uimsbf |
| for (i=0;i<length-1; i++){ | | |
| URI_character | 8 | uimsbf |
| } | | |
| reserved | var | |
| } | | |

FIG. 342

| Value | Description |
|---|---|
| 00000001 | Signals the location of TPT-tpt |
| 00000010 | Signals the lifecycle of applications (e.g., preparing, launching, terminating, suspending, etc.) - Status |
| 00000100 | Signals the actions taken by applications - action |
| 00001000 | Signals media time - mediatime |
| 00010000 | Signals all trigger information - trigger |
| 00100000 ~ 10000000 | Reserved |

FIG. 343

| Value | Description |
| --- | --- |
| 0x0000 | PA messages |
| 0x0001 ~ 0x000F | MPI messages.<br><br>For a Package, 16 contiguous values are allocated to MPI messages.<br><br>If the value % 16 equals 15, the MPI message carries complete PI.<br><br>If the value %16 equals N where N = 0 ~ 14, the MPI message carries Subset-N PI. |
| 0x0010 ~ 0x001F | MPT messages.<br><br>For a package, 16 contiguous values are allocated to MPT messages.<br><br>If the value % 16 equals 15, the MPT message carries complete MPT.<br><br>If the value %16 equals N where N = 0 ~ 14, the MPT message carries Subset-N MPT. |
| 0x0200 | CRI messages |
| 0x0201 | DCI messages |
| 0x0202 | AL_FEC messgages |
| 0x0203 | HRBM messages |
| 0x0204 ~ 0x7FFF | reserved for ISO use |
| 0x8000 ~ 0x8004 | Application Signaling Message<br><br>0x8000: Signals the location of TPT – tpt<br><br>0x8001: Signals the lifecycle of applications (e.g., preparing, launching, terminating, suspending, etc.) – Status<br><br>0x8002: Signals the actions taken by applications – action<br><br>0x8003: Signals media time – mediatime<br><br>0x8004: Signals all trigger information – trigger |
| 0x8005 ~ 0x801F | Reserved |

FIG. 344

| Syntax | No. of Bits | Format |
|---|---|---|
| application_signaling_table() { | | |
| table_id | 8 | uimsbf |
| version | 8 | uimsbf |
| length | 16 | uimsbf |
| for (i=0; i<length-1; i++) { | 8 | uimsbf |
| URI_character | | |
| } | var | |
| reserved | | |
| } | | |

| | | | | | | | | |
|---|---|---|---|---|---|---|---|---|
| V=0 | C | FEC | r | X | R | RES | type | packet_id |
| timestamp | | | | | | | | |
| packet_sequence_number | | | | | | | | |
| packet_counter | | | | | | | | |
| header_extension .... | | | | | | | | |
| payload data .... | | | | | | | | |
| source_FEC_payload_ID | | | | | | | | |

FIG. 346
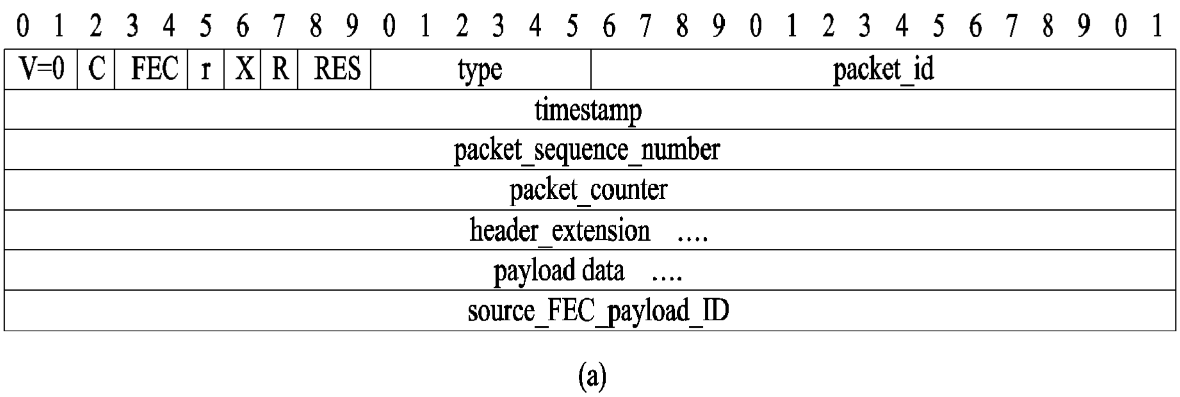
(a)
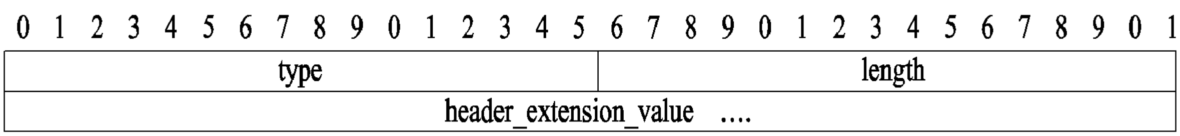
(b)
FIG. 347
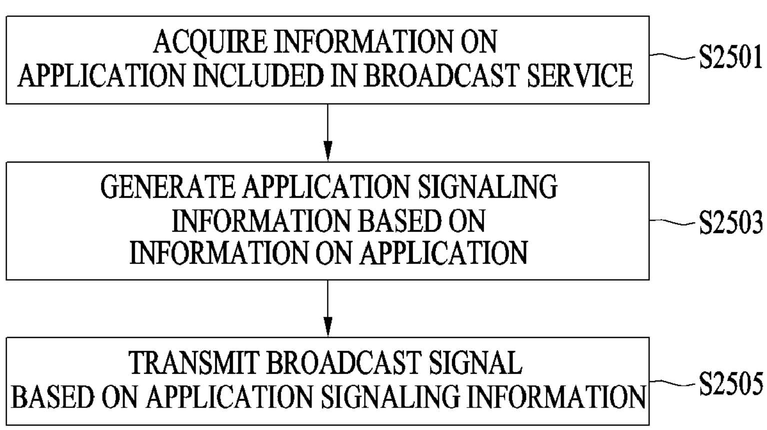

FIG. 349

| Event | 1..N | | Event targeted to this TDO |
|---|---|---|---|
| @eventID | 1 | unsignedShort | Unique identifier of this Event element within the scope of the TDO element. |
| @action | 1 | String | Allowed values are “prep”, “exec”, “susp”, and “kill” |
| @destination | 0..1 | unsignedByte | Device to which the event is directed (primary screen, second screen, or both) |
| @diffusion | 0..1 | unsignedByte | Period for applying diffusion, in seconds |
| Data | 0..N | base64Binary | Data to be used for this event |
| @dataID | 1 | unsignedShort | Unique identifier of this Data element within the scope of the Event element |

FIG. 350

```xml
<?xml version="1.0" encoding="utf-8"?>
<TPT majorProtocolVersion="5" minorProtocolVersion="5" id="http://www.atsc.com" tptVersion="5" expireDate="2014-12-13T12:12:12"
updatingTime="12" serviceID="12" baseURL="http://www.atsc.com">
 <Capabilities />
 <LiveTrigger URL="http://www.atsc.com/liveTrigger" pollPeriod="5" />
 <TDO appId="12" appType="5" appName="quiz01" globalID="http://www.atsc.com" appVersion="5" cookieSpace="5"
frequencyOfUse="5" expireDate="2012-12-13T12:12:12" testTDO="true" availInternet="true" availBroadcast="true">
  <URL entry="true">http://www.atsc.com/app</URL>
  <Capabilities />
  <ApplicationBoundary>
   <OriginURL>http://www.atsc.com/appBoundary</OriginURL>
  </ApplicationBoundary>
  <ContentItem updatesAvail="true" pollPeriod="5" size="123" availInternet="true" availBroadcast="true">
   <URL entry="true">http://www.atsc.com/contentItem</URL>
  </ContentItem>
  <Event eventID="1" action="exec" destination="2" diffusion="5">
   <Data dataID="10">AAAAZg==</Data>
  </Event>
  <Event eventID="2" action="kill" destination="2" diffusion="5">
   <Data dataID="11">YTM0NZomIzI2OTsmIzM0NTueYQ==</Data>
  </Event>
 </TDO>
</TPT>
```

FIG. 353

| Variable Name | R/A a | Data Type | Allowed Value | Default Value | Evented? |
|---|---|---|---|---|---|
| TriggerInfoList | R | string | CSV(string) | | Yes |
| A_ARG_TYPE_TriggerURI | R | string | Any URI | | No |

FIG. 354

| Element/Attribute | Cardi-nality | DataType | Description and Value |
|---|---|---|---|
| TriggerInfoList | | | |
| TriggerInfo | 1..N | | Contains application trigger information |
| triggerType | 1 | String | Type of trigger. Allowed values are 'action', 'status', and 'mediaTime'. |
| action | 1 | String | Type of action. Allowed values are 'prep', 'exec', 'suspend', and 'kill'. |
| eventStartTime | 1 | String | Start time of the event |
| eventEndTime | 0..1 | String | End time of the event |
| data | 0..1 | base64Binary | Data to be used for this trigger |
| dataURI | 0..1 | anyURI | Location of data in content server |

FIG. 355

```
<?xml version="1.0"encoding="UTF-8"?>
<TriggerInfoList>
  <TriggerInfo>
    <triggerType>action</triggerType>
    <action>exec</action>
    < eventStartTime>77ee</eventStartTime>
    < eventEndTime>7870</eventEndTime>
    <data>AAAAZg==</data>
    <dataURI>http://www.atsc.com/trigger/data</dataURI>
  </TriggerInfo>
  <TriggerInfo>
    <triggerType>status</triggerType>
    <action>kill</action>
    <eventStartTime>9a33</eventStartTime>
  <TriggerInfo>
</TriggerInfoList>
```

| Name | Required/Optional |
|---|---|
| GetTriggerInfoList() | Required |
| GetTriggerInfoURI() | Required |

(b)

| Argument | Direction | Related State Variable |
|---|---|---|
| TriggerInfoList | OUT | TriggerInfoList |

(c)

| Argument | Direction | Related State Variable |
|---|---|---|
| TriggerInfoURI | OUT | A_ARG_TYPE_TriggerURI |

FIG. 357

| Variable Name | R/A a | Data Type | Allowed Value | Default Value | Evented? |
|---|---|---|---|---|---|
| TriggerInfoList | R | string | CSV(string) OR XML, JASON ETC | | Yes |
| A_ARG_TYPE_TriggerURI | R | string | Any URI | | No |
| A_ARG_TYPE_TriggerInfo | R | string | XML, JASON ETC | | No |
| A_ARG_TYPE_AppIDs | R | string | CSV(string) OR XML, JASON ETC | | No |

FIG. 358

| Element/Attribute | Cardinality | Data Type | Description and Value |
|---|---|---|---|
| TriggerInfoList | | | |
| TriggerInfo | 1..N | | Containsapplication trigger information |
| @appID | 1 | String | Application ID of this app |
| triggerType | 1 | String | Type of trigger. Allowed values are ‘action’, ‘status’, and ‘mediaTime’. |
| Action | 1 | String | Type of action. Allowed values are ‘prep’, ‘exec’, ‘suspend’, and ‘kill’. |
| eventStartTime | 1 | String | Start time of the event |
| eventEndTime | 0..1 | String | End time of the event |
| data | 0..1 | base64Binary | Data to be used for this trigger |
| dataURI | 0..1 | anyURI | Locationof data in content server |

FIG. 359

```
<?xml version="1.0" encoding="UTF-8"?>
<TriggerInfoList>
  <TriggerInfo appID="12">
    <triggerType>action</triggerType>
    <action>exec</action>
    <eventStartTime>77ee</eventStartTime>
    <eventEndTime>7870</eventEndTime>
    <data>AAAAZg==</data>
    <dataURI>http://www.atsc.com/trigger/data</dataURI>
  </TriggerInfo>
  <TriggerInfo appID="13">
    <triggerType>status</triggerType>
    <action>exec</action>
    <eventStartTime>9a33</eventStartTime>
  <TriggerInfo>
</TriggerInfoList>
```

| Name | Required/Optional |
|---|---|
| GetAppIDs() | Required |
| GetTriggerInfo() | Required |

(b)

| Argument | Direction | Related State Variable |
|---|---|---|
| appIDs | OUT | A_ARG_TYPE_AppIDs |

(c)

| Argument | Direction | Related State Variable |
|---|---|---|
| appIDs | IN | A_ARG_TYPE_AppIDs |
| TriggerInfo | OUT | A_ARG_TYPE_TriggerInfo |

FIG. 362

```
<?xml version="1.0" encoding="UTF-8"?>
<TriggerInfoList>
  <TriggerInfo>
    <triggerType>mediaTime</triggerType>
    <action>exec</action>
    <eventStartTime>9a33</eventStartTime>
  <TriggerInfo>
</TriggerInfoList>
```

FIG. 364

```
<?xml version="1.0" encoding="UTF-8"?>
<TriggerInfoList>
  <TriggerInfo>
    <triggerType>mediaTime</triggerType>
    <action>exec</action>
    <eventStartTime>77ee</eventStartTime>
    <eventEndTime>7870</eventEndTime>
    <data>AAAAZg==</data>
    <dataURI>http://www.atsc.com/trigger/data</dataURI>
</TriggerInfo>
</TriggerInfoList>
```

FIG. 366

```
<?xml version="1.0" encoding="UTF-8"?>
<TriggerInfoList>
  <TriggerInfo>
    <triggerType>status</triggerType>
    <action>kill</action>
    <eventStartTime>9a33</eventStartTime>
  <TriggerInfo>
</TriggerInfoList>
```

FIG. 368

```
<?xml version="1.0" encoding="UTF-8"?>
<TriggerInfoList>
  <TriggerInfo>
     <triggerType>mediaTime</triggerType>
     <action>exec</action>
     <eventStartTime>9a33</eventStartTime>
  <TriggerInfo>
</TriggerInfoList>
```

FIG. 375

| Variable Name | R/A | Data Type | Allowed Value | Default Value | Evented? |
|---|---|---|---|---|---|
| ServiceTimeInfo | R | string | XML, JASON ... | | Yes |
| UpdateDuration | R | integer | Integer in seconds (ex: 120 is every 120 seconds) | Implementation dependent | No |
| A_ARG_TYPE_UpdateDuration | R | integer | Integer in seconds (ex: 120 is every 120 seconds) | | No |

FIG. 376

| Element/Attribute | Cardinality | Data Type | Description and Value |
|---|---|---|---|
| ServiceTimeInfo | | | |
| @serviceId | 1 | unsignedShort | Unique id of the service |
| @programId | 1 | unsignedShort | Unique id of the program |
| mediaTime | 1 | string or dateTime | Media time of program |
| @mediaTimeProtocol | 1 | string | Protocol used for representing mediaTime |
| currentTime | 1 | string or dateTime | Current wall clock time |
| @currentTimeProtocol | 1 | string | Protocol used for representing currentTime |

FIG. 377

```
<?xml version="1.0" encoding="UTF-8"?>
<ServiceTimeInfo serviceId="11" programId="1008">
   <mediaTime mediaTimeProtocol="timestamp">77ee</mediaTime>
   <currentTime currentTimeProtocol="NTP">88ee</currentTime>
</ServiceTimeInfo>
```

| Name | Required/Optional |
|---|---|
| GetServiceTimeInfo( ) | Required or Optional |
| GetUpdateDuration( ) | Required or Optional |
| SetUpdateDuration( ) | Required or Optional |

(b)

| Argument | Direction | Related State Variable |
|---|---|---|
| ServiceTimeInfo | OUT | ServiceTimeInfo |

(c)

| Argument | Direction | Related State Variable |
|---|---|---|
| CurrentUpdateDuration | OUT | UpdateDuration |

(d)

| Argument | Direction | Related State Variable |
|---|---|---|
| ReqestedUpdateDuration | IN | A_ARG_TYPE_UpdateDuration |
| ConfirmedUpdateDuration | OUT | UpdateDuration |

| Variable Name |
| --- |
| UpdateDuration |
| A_ARG_TYPE_UpdateDuration |

→

| Variable Name |
| --- |
| UpdateFrequency |
| A_ARG_TYPE_UpdateFrequency |

(b)

| Action Name |
| --- |
| GetUpdateDuration( ) |
| SetUpdateDuration( ) |

| Action Name | Argument | Direction | Related State Variable |
| --- | --- | --- | --- |
| GetUpdateFrequency ( ) | CurrentUpdateFrequency | OUT | UpdateFrequency |
| SetUpdateFrequency ( ) | ReqestedUpdateFrequency | IN | A_ARG_TYPE_UpdateFrequency |
| | ConfirmedUpdateFrequency | OUT | UpdateFrequency |

FIG. 386

| Element/Attribute | Cardinality | Data Type | Description and Value |
|---|---|---|---|
| ServiceTimeInfo | | | |
| @serviceId | 1 | unsignedShort | Unique id of the service |
| @programId | 1 | unsignedShort | Unique id of the program |
| playbackState | 1 or 0..1 | string | Playback state e.g. "playing", "paused", "stopped", "fastforward", "fastbackward", etc. |
| @speed | 1 | integer or string | Speed in case of fastforward or fastbackward<br>Default value: 1 |
| mediaTime | 1 | string or dateTime | Media time of program |
| @mediaTimeProtocol | 1 | string | Protocol used for representing mediaTime |
| currentTime | 1 | string or dateTime | Current wall clock time |
| @currentTimeProtocol | 1 | string | Protocol used for representing currentTime |

FIG. 387

```
<?xml version="1.0" encoding="UTF-8"?>
<ServiceTimeInfo serviceId="11" programId="1008">
   <playbackState speed="3" >fastforward</playbackState>
   <mediaTime mediaTimeProtocol="timestamp">77ee</mediaTime>
   <currentTime currentTimeProtocol="NTP">88ee</currentTime>
</ServiceTimeInfo>
```

FIG. 392

| Variable Name | R/A | Data Type | Allowed Value | Default Value | Evented? |
|---|---|---|---|---|---|
| PlaybackInfo | R | string | XML, JASON etc. | | Yes |
| A_ARG_TYPE_PlaybackInfo | R | string | XML, JASON etc. | | No |

FIG. 393

| Element/Attribute | Cardinality | Data Type | Description and Value |
|---|---|---|---|
| PlaybackInfo | | | |
| @serviceId | 1 | unsignedShort | Unique id of the service |
| @programId | 1 | unsignedShort | Unique id of the program |
| playbackState | 1 | string | Playback state e.g. “playing”, “paused”, “stopped”, “fastforward”, “fastbackward”, etc. |
| @speed | 1 | integer or string | Speed in case of fastforward or fastbackward<br>Default value: 1 |

FIG. 394

```
<?xml version=“1.0” encoding=“UTF-8”?>
<PlaybackInfo serviceId=“11” programId=“1008”>
  <playbackState speed=“3” >fastforward</playbackState>
</PlaybackInfo>
```

| Name | Required/Optional |
|---|---|
| GetPlaybackInfo () | Required or Optional |

(a)

| Argument | Direction | Related State Variable |
|---|---|---|
| PlaybackInfo | OUT | PlaybackInfo |

XML

```
<?xml version="1.0" encoding="UTF-8"?>
<ServiceTimeInfo serviceId="11" programId="1008">
   <playbackState speed="3" >fastforward</playbackState>
   <mediaTime mediaTimeProtocol="timestamp">77ee</mediaTime>
   <currentTime currentTimeProtocol="NTP">88ee</currentTime>
</ServiceTimeInfo>
```

↓

JSON #1

```
{
   "VariableName":"ServiceTimeInfo",
   "serviceId":"11", "programId":"1008",
   "playbackState":{
      "speed":"3", value":"fastforward"
   }
   "mediaTime":{
      "mediaTimeProtocol":"timestamp", "value":"77ee"
   }
   "currentTime":{
      "currentTimeProtocol":"NTP", "value":"88ee"
   }
}
```

JSON #2

```
{
   "VariableName":"ServiceTimeInfo",
   "serviceId":"11", "programId":"1008",
   "playbackState":"fastforward", "playbackSpeed":"3",
   "mediaTimeProtocol":"timestamp", "mediaTimevalue":"77ee"
   "currentTimeProtocol":"NTP", "currentTimevalue":"88ee"
   }
}
```

FIG. 403

XML

```
<?xml version="1.0" encoding="UTF-8"?>
<ServiceTimeInfo serviceId="11" programId="1008">
  <playbackState speed="3" >fastforward</playbackState>
  <MediaURL>http://www.example.com/media01</MediaURL>
  <MediaID>examplemedia002</MediaID>
  <MediaRole>Main (or Secondary)</MediaRole>
  <mediaTime mediaTimeProtocol="timestamp">77ee</mediaTime>
  <currentTime currentTimeProtocol="NTP">88ee</currentTime>
</ServiceTimeInfo>
```

JSON #1

```
{
  "VariableName":"ServiceTimeInfo",
  "serviceId":"11", "programId":"1008",
  "playbackState":{
    "speed":"3", value":"fastforward"
  }
  "MediaURL":"http://www.example.com/media01", "MediaID":"examplemedia002",
  "MediaRole":"Main (or Secondary)",":"timestamp", "value":"77ee"
  "mediaTime":{
    "mediaTimeProtocol":"timestamp", "value":"77ee"
  }
  "currentTime":{
    "currentTimeProtocol":"NTP", "value":"88ee"
  }
}
```

JSON #2

```
{
  "VariableName":"ServiceTimeInfo",
  "serviceId":"11", "programId":"1008",
  "playbackState":"fastforward", "playbackSpeed":"3",
  "MediaURL":"http://www.example.com/media01", "MediaID":"examplemedia002",
  "MediaRole":"Main (or Secondary)",
  "mediaTimeProtocol":"timestamp", "mediaTimevalue":"77ee"
  "currentTimeProtocol":"NTP", "currentTimevalue":"88ee"
  }
}
```

FIG. 404

XML

```
<?xml version="1.0" encoding="UTF-8"?>
<PlaybackInfo serviceId="11" programId="1008">
    <playbackState
speed="3" >fastforward</playbackState>
</PlaybackInfo>
```

JSON

```
{
    "VariableName":"PlaybackInfo",
    "serviceId":"11", "programId":"1008",
    "playbackState":"fastforward", "playbackSpeed":"3",
}
```

FIG. 416

```
NOTIFY * HTTP/1.1
HOST: 239.255.255.250:1900
CACHE-CONTROL: max-age = seconds until advertisement expires
LOCATION: URL for UPnP description for root device
NT: search target (for example, urn:atsc:device:atsccompanion:3)
NTS: ssdp:alive
SERVER: OS/version UPnP/1.0 product/version
USN: advertisement UUID
``` t413010

```
M-SEARCH * HTTP/1.1
HOST: 239.255.255.250:1900
MAN: "ssdp:discover"
MX: seconds to delay response
ST: search target (for example, urn:atsc:device:atsccompanion:3)
``` t413020

```
HTTP/1.1 200 OK
CACHE-CONTROL: max-age = seconds until advertisement expires
DATE: when response was generated
EXT:
LOCATION: URL for UPnP description for root device
SERVER: OS/version UPnP/1.0 product/version
ST: search target (for example, urn:atsc:device:atsccompanion:3)
USN: advertisement UUID
``` t413030

FIG. 418

```
GET path to description HTTP/1.1
HOST: host for IP address:port for description
ACCEPT-LANGUAGE: language preferred by control point
``` t418010

```
<?xml version="1.0"?>
<root xmlns="urn:schemas-upnp-org:device-1-0">
  <specVersion>
    <major>1</major>
    <minor>0</minor>
  </specVersion>
  <URLBase>base URL for all relative URLs</URLBase>
  <device>
    <deviceType>urn: atsc: device: atsccompanion: 3</deviceType>
    <friendlyName>short user-friendly title</friendlyName>
    <manufacturer>manufacturer name</manufacturer>
    .....
    <serviceList>
      <service>
        <serviceType>urn: atsc: service: atsccompanion: 3</serviceType>
        <serviceId> urn: atsc: serviceId: atsccompanion</serviceId>
        <SCPDURL>URL to service description</SCPDURL>
        <controlURL>URL for control</controlURL>
        <eventSubURL>URL for eventing</eventSubURL>
        .....
      </service>
    </serviceList>
  </device>
</root>
``` t418020

FIG. 419 t419010

```
<?xml version="1.0"?>
<root xmlns="urn:schemas-upnp-org:device-1-0">
  .....
  <device>
    <deviceType>urn:atsc:device:atsccompanion:3</deviceType>
    <X_ATSC_ServiceIdentification>Address of Service and Content Identification
    Endpoint</X_ATSC_ServiceIdentification>
    <X_ATSC_ESG>Address of ESG Information Endpoint</X_ATSC_ESG>
    <X_ATSC_Data>Address of Service, Show and Segment Data Endpoint</X_ATSC_Data>
    <X_ATSC_MediaTimeline>Address of Media Timeline Endpoint</X_ATSC_MediaTimeline>
    <X_ATSC_MediaPlaybackState>Address of Media Playback State
     Endpoint</X_ATSC_MediaPlaybackState>
    <X_ATSC_EAS>Address of Emergency Alert Messages Endpoint</X_ATSC_EAS>
    <X_ATSC_ApptoApp>Address of App-to-App Endpoint</X_ATSC_ApptoApp>
     .....
  </device>
</root>
``` t419020

```
<?xml version="1.0"?>
<root xmlns="urn:schemas-upnp-org:device-1-0">
  .....
  <service>
    <serviceType>urn:atsc:service:atsccompanion:3</serviceType>
    <X_ATSC_ServiceIdentification>Address of Service and Content Identification
    Endpoint</X_ATSC_ServiceIdentification>
    <X_ATSC_ESG>Address of ESG Information Endpoint</X_ATSC_ESG>
    <X_ATSC_Data>Address of Service, Show and Segment Data Endpoint</X_ATSC_Data>
    <X_ATSC_MediaTimeline>Address of Media Timeline Endpoint</X_ATSC_MediaTimeline>
    <X_ATSC_MediaPlaybackState>Address of Media Playback State
     Endpoint</X_ATSC_MediaPlaybackState>
    <X_ATSC_EAS>Address of Emergency Alert Messages Endpoint</X_ATSC_EAS>
    <X_ATSC_ApptoApp>Address of App-to-App Endpoint</X_ATSC_ApptoApp>
     .....
  </service>
  .....
</root>
```

FIG. 420

```
<?xml version="1.0"?>
<root xmlns="urn:schemas-upnp-org:device-1-0">
  .....
  <device>
    <deviceType>urn:atsc:device:atsccompanion:3</deviceType>
    <X_ATSC_Companion>Address of a WebSocket Endpoint for all
    Companion functions</X_ATSC_Companion>
    .....
  </device>
</root>
``` t420010

```
<root xmlns="urn:schemas-upnp-org:device-1-0">
  .....
  <service>
    <serviceType>urn:atsc:device:atsccompanion:3</deviceType>
    <X_ATSC_Companion>Address of a WebSocket Endpoint for all
    Companion functions</X_ATSC_Companion>
    .....
  </service>
  ...
</root>
``` t420020

```
<?xml version="1.0"?>
<root xmlns="urn:schemas-upnp-org:device-1-0">
  .....
  <device>
    <deviceType>urn:atsc:device:atsccompanion:3</deviceType>
    <X_ATSC_ApptoApp>Address of App-to-App
    Endpoint</X_ATSC_ApptoApp>
    <X_ATSC_Companion>Address of a WebSocket Endpoint for all other
    Companion functions</X_ATSC_Companion>
    .....
  </device>
</root>
``` t420030

```
<?xml version="1.0"?>
<root xmlns="urn:schemas-upnp-org:device-1-0">
  .....
  <service>
    <serviceType>urn:atsc:device:atsccompanion:3</deviceType>
    <X_ATSC_ApptoApp>Address of App-to-App
    Endpoint</X_ATSC_ApptoApp>
    <X_ATSC_Companion>Address of a WebSocket Endpoint for all other
    Companion functions</X_ATSC_Companion>
    .....
  </service>
  .....
</root>
``` t420040

FIG. 422

| | |
|---|---|
| GET path to description HTTP/1.1<br>HOST: host for description:port for description<br>ACCEPT-LANGUAGE: language preferred by control point | t422010 |
| HTTP/1.1 200 OK<br>CONTENT-LANGUAGE: language used in description<br>CONTENT-LENGTH: Bytes in body<br>CONTENT-TYPE: text/xml<br>ServiceIdentification-WSEndpoint-URL: Address of Service and Content Identification Endpoint<br>ESG-WSEndpoint-URL: Address of ESG Information Endpoint<br>Data-WSEndpoint-URL: Address of Service, Show and Segment Data Endpoint<br>MediaTimeline-WSEndpoint-URL: Address of Media Timeline Endpoint<br>MediaPlaybackState-WSEndpoint-URL: Address of Media Playback State Endpoint<br>EAS-WSEndpoint-URL: Address of Emergency Alert Messages Endpoint<br>ApptoApp-WSEndpoint-URL: Address of App-to-App Endpoint<br>DATE: when responded | t422020 |
| HTTP/1.1 200 OK<br>CONTENT-LANGUAGE: language used in description<br>CONTENT-LENGTH: Bytes in body<br>CONTENT-TYPE: text/xml<br>Companion-WSEndpoint-URL: Address of a WebSocket Endpoint for all Companion functions<br>DATE: when responded | t422030 |
| HTTP/1.1 200 OK<br>CONTENT-LANGUAGE: language used in description<br>CONTENT-LENGTH: Bytes in body<br>CONTENT-TYPE: text/xml<br>ApptoApp-WSEndpoint-URL: Address of App-to-App Endpoint<br>Companion-WSEndpoint-URL: Address of a WebSocket Endpoint for all other Companion functions<br>DATE: when responded | t422040 |

FIG. 424

GET path to description HTTP/1.1
HOST: host for description:port for description
ACCEPT-LANGUAGE: language preferred by control point t424010

HTTP/1.1 200 OK
CONTENT-LANGUAGE: language used in description
CONTENT-LENGTH: Bytes in body
CONTENT-TYPE: text/xml
WSEndpoint-URL: URL for WebSocket Endpoints
DATE: when responded t424020

GET path to WebSocket Endpoints HTTP/1.1
HOST: host for IP address:port for WebSocket Endpoints
ACCEPT-LANGUAGE: language preferred by control point t424030

GET /WSEndpoints HTTP/1.1
HOST: 192.168.1.10:8080
ACCEPT-LANGUAGE: language preferred by control point t424040

FIG. 425

<?xml version="1.0"?>
.....
<additionalData>
<X_ATSC_ServiceIdentification>Address of Service and Content Identification Endpoint</X_ATSC_ServiceIdentification>
<X_ATSC_ESG>Address of ESG Information Endpoint</X_ATSC_ESG>
<X_ATSC_Data>Address of Service, Show and Segment Data Endpoint</X_ATSC_Data>
<X_ATSC_MediaTimeline>Address of Media Timeline Endpoint</X_ATSC_MediaTimeline>
<X_ATSC_MediaPlaybackState>Address of Media Playback State Endpoint</X_ATSC_MediaPlaybackState>
<X_ATSC_EAS>Address of Emergency Alert Messages Endpoint</X_ATSC_EAS>
<X_ATSC_ApptoApp>Address of App-to-App Endpoint</X_ATSC_ApptoApp>
.....
</additionalData >
</root> t425010

<?xml version="1.0"?>
.....
<additionalData>
<X_ATSC_Companion>Address of a WebSocket Endpoint for all Companion functions</X_ATSC_Companion> .....
</additionalData >
</root> t425020

<?xml version="1.0"?>
.....
<additionalData>
<X_ATSC_ApptoApp>Address of App-to-App Endpoint</X_ATSC_ApptoApp>
<X_ATSC_Companion>Address of a WebSocket Endpoint for all other Companion functions</X_ATSC_Companion>
.....
</additionalData >
</root> t425030

FIG. 434

```
<ESGData
xmlns="urn : atsc.org : serviceId : atsc3.0ESG"
xsi : schemaLocation="urn.atsc.org : serviceId : atsc3.0ESG"
    <Service id="atsc.org/esg/service/1" version="1">
        <Name> Home Shopping < /Name>
        <Description> Home shopping Linear Service < /Description>
        <ServiceType>14< /ServieType>
        <ServiceType>15< /ServieType>
        ...
    < /Service>
    <Service id="atsc.org/esg/service/2" version="1">
    ...
    < /Service>
    <Schedule id="atsc.org/esg/schedule/1" version="1">
        <ServiceReference idRef="atsc.org/esg/service/1">
        < /ServiceReference>
        ...
    < /Schedule>
    <Content id="atsc.org/content/1" version="1">
        ...
        <ServiceReference idRef = "atsc.org/esg/service/1">
        < /ServiceReference>
        <PrivateExt>
        <Component>
            <ComponentType>1< /ComponentType>
            <ComponentType>1< /ComponentRole>
            <StartTime/ >
            <EndTime/ >
            <Language/ >
            <Length/ >
            <ParentalRating/ >
            <DeviceCapability>4< /DeviceCapability>
            <DeviceCapability>8< /DeviceCapability>
        <TargetDevice>1< /TargetDevice>
        < /Component>
        <Component>
            <ComponentType>2< /ComponentType>
            <ComponentRole>6< /ComponentRole>
            <StartTime/ >
            <EndTime/ >
            <Language>KOR</Language>
            <Length/ >
            <ParentalRating/ >
            <DeviceCapability>11< /DeviceCapability>
            <TargetDevice>1< /TargetDevice>
        < /Component>
    < /PrivateExt>
    ...
    </Content>
    ...
</ESGData>
```

(a)

```
{
    "VariableName":"ESGData",
    "Service":{
        "id":"atsc.org/esg/service/1", "version":"1", "Name":"Home Shopping",
        "Description":"Home Shopping Linear Service",
        "ServiceType":"14", "ServiceType":"15"
        ...
    }
    "Service":{
        "id":"atsc.org/esg/service/2", "version":"1", "Name":"Home Shopping",
        ...
    }
    "Schedule":{
        "id":"atsc.org/esg/schedule/1", "version":"1",
        "ServiceReference":{
                    "idRef":"atsc.org/esg/service/1"
        }
        ...
    }
    "Content":{
        "id":" atsc.org/esg/content/1", "version":"1",
        ...
        "ServiceReference":{
                    "idRef":"atsc.org/esg/service/1"
        }
        "PrivateExt":{
                    "Component":{
                            "ComponentType":"1", "ComponentRole":"1", "StartTime":"xxx",
                            "EndTime":"yyy", "Language":"zzz", "ParentalRating":"ppp",
                            "DeviceCapability":"4", "DeviceCapability":"8", "TargetDevice":"1"
                    }
                    ...
        }
    }
}
```

(b)

APPARATUS FOR TRANSMITTING BROADCAST SIGNAL, APPARATUS FOR RECEIVING BROADCAST SIGNAL, METHOD FOR TRANSMITTING BROADCAST SIGNAL AND METHOD FOR RECEIVING BROADCAST SIGNAL

CROSS-REFERENCE TO RELATED APPLICATIONS

This application is a Continuation of co-pending U.S. patent application Ser. No. 15/543,041 filed on Jul. 12, 2017, which is the National Phase of PCT International Application No. PCT/KR2016/001995 filed on Feb. 29, 2016, which claims the benefit under 35 U.S.C. § 119(e) to U.S. Provisional Application Nos. 62/144,311 filed on Apr. 7, 2015, 62/126,704 filed on Mar. 1, 2015, 62/126,693 filed on Mar. 1, 2015 and 62/126,707 filed on Mar. 1, 2015, all of which are hereby expressly incorporated by reference into the present application.

BACKGROUND OF THE INVENTION

Field of the Invention

The present invention relates to an apparatus for transmitting a broadcast signal, an apparatus for receiving a broadcast signal and methods for transmitting and receiving a broadcast signal.

Discussion of the Related Art

As analog broadcast signal transmission comes to an end, various technologies for transmitting/receiving digital broadcast signals are being developed. A digital broadcast signal may include a larger amount of video/audio data than an analog broadcast signal and further include various types of additional data in addition to the video/audio data.

SUMMARY OF THE INVENTION

That is, a digital broadcast system can provide HD (high definition) images, multichannel audio and various additional services. However, data transmission efficiency for transmission of large amounts of data, robustness of transmission/reception networks and network flexibility in consideration of mobile reception equipment need to be improved for digital broadcast.

The present invention provides a system capable of effectively supporting future broadcast services in an environment supporting future hybrid broadcasting using terrestrial broadcast networks and the Internet and related signaling methods.

The present invention proposes a method for efficiently providing hybrid broadcast using both broadcast networks and the Internet.

The present invention proposes app-based enhancement on the basis of applications for basic broadcast services.

The present invention proposes a method for providing app-based enhancement in synchronization with a broadcast service.

The present invention proposes architectures according to various protocols between a PD and a CD and a method for communication between the PD and the CD and between applications according to architectures.

The present invention proposes architectures and signaling methods for effectively delivering information such as an ESG and an EAS from a PD to a CD.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 2 illustrates a relation between an SLT and service layer signaling (SLS) according to an embodiment of the present invention;

FIG. 3 illustrates an SLT according to an embodiment of the present invention;

FIG. 5 illustrates a USBD fragment for ROUTE/DASH according to an embodiment of the present invention;

FIG. 6 illustrates an S-TSID fragment for ROUTE/DASH according to an embodiment of the present invention;

FIG. 7 illustrates a USBD/USD fragment for MMT according to an embodiment of the present invention;

FIG. 13 illustrates an example of adaptation modes in IP header compression according to an embodiment of the present invention (transmitting side);

FIG. 14 illustrates a link mapping table (LMT) and an RoHC-U description table according to an embodiment of the present invention;

FIG. 24 is a table illustrating PLS1 data according to an embodiment of the present invention;

FIG. 25 is a table illustrating PLS2 data according to an embodiment of the present invention;

FIG. 33 illustrates a main PRBS used for all FFT modes according to an embodiment of the present invention;

FIG. 34 illustrates a sub-PRBS used for FFT modes and an interleaving address for frequency interleaving according to an embodiment of the present invention;

FIG. 36 is a table illustrating an interleaving type applied according to the number of PLPs;

FIG. 37 is a block diagram including a first example of a structure of a hybrid time interleaver;

FIG. 38 is a block diagram including a second example of the structure of the hybrid time interleaver;

FIG. 57 is a diagram illustrating a service for exchanging electronic service guide (ESG) between a broadcast receiver and companion devices according to an embodiment of the present invention;

FIG. 58 is a diagram illustrating an ESGData state variable according to an embodiment of the present invention;

FIG. 59 is a diagram illustrating an ESGData state variable according to another embodiment of the present invention;

FIG. 61 is a diagram illustrating LastChangedESGData state variable according to an embodiment of the present invention;

FIG. 74 is a diagram showing information related to a media playback state information subscription request according to one embodiment of the present invention;

FIG. 75 is a diagram showing information related to a media playback state information subscription response according to one embodiment of the present invention;

FIG. 76 is a diagram showing information related to a media playback state information subscription response according to one embodiment of the present invention;

FIG. 77 is a diagram showing information related to a media playback state information subscription update request according to one embodiment of the present invention;

FIG. 78 is a diagram showing information related to a media playback state information subscription cancel request according to one embodiment of the present invention;

FIG. 79 is a diagram showing information related to a media playback state information subscription update response according to one embodiment of the present invention;

FIG. 80 is a diagram showing information related to a media playback state information subscription update response according to one embodiment of the present invention;

FIG. 81 is a diagram showing information related to a media playback state information subscription cancel response according to one embodiment of the present invention;

FIG. 82 is a diagram showing a media playback state information notification message according to one embodiment of the present invention;

FIG. 83 is a diagram showing a response message to a media playback state information notification message according to one embodiment of the present invention;

FIG. 85 is a diagram showing information related to an emergency alert message subscription request according to one embodiment of the present invention;

FIG. 86 is a diagram showing information related to an emergency alert message subscription response according to one embodiment of the present invention;

FIG. 87 is a diagram showing information related to an emergency alert message subscription response according to one embodiment of the present invention;

FIG. 88 is a diagram showing information related to an emergency alert message subscription update request according to one embodiment of the present invention;

FIG. 89 is a diagram showing information related to an emergency alert message subscription cancel request according to one embodiment of the present invention;

FIG. 90 is a diagram showing information related to an emergency alert message subscription update response according to one embodiment of the present invention;

FIG. 91 is a diagram showing information related to an emergency alert message subscription update response according to one embodiment of the present invention;

FIG. 92 is a diagram showing information related to an emergency alert message subscription cancel response according to one embodiment of the present invention;

FIG. 93 is a diagram showing an emergency alert message according to one embodiment of the present invention;

FIG. 94 is a diagram showing a response message to an emergency alert message notification message according to one embodiment of the present invention;

FIG. 95 is a flowchart illustrating a broadcast reception apparatus according to one embodiment of the present invention;

FIG. 98 is a view of a broadcast transmission frame according to another embodiment of the present invention;

FIG. 99 is a view illustrating a structure of a transport packet transmitting a broadcast service according to an embodiment of the present invention;

FIG. 100 is a view illustrating a value that a network protocol field has in a transport packet transmitting a broadcast service according to an embodiment of the present invention;

FIG. 104 is a view illustrating a broadcast service signaling table according to an embodiment of the present invention;

FIG. 105 is a view illustrating a value that a service_category field has in a broadcast service signaling table according to an embodiment of the present invention;

FIG. 106 is a view of a broadcast service signaling table according to another embodiment of the present invention;

FIG. 107 is a view of a stream identifier descriptor according to another embodiment of the present invention;

FIG. 108 is a view illustrating an operation when a broadcast transmission device transmits a broadcast service signaling table according to an embodiment of the present invention;

FIG. 109 is a view illustrating an operation when a broadcast reception device receives a broadcast service signaling table according to an embodiment of the present invention;

FIG. 110 is a view illustrating broadcast service transmission path signaling information according to an embodiment of the present invention;

FIG. 111 is a view illustrating a value that a delivery_network_type field has in broadcast service transmission path signaling information according to an embodiment of the present invention;

FIG. 112 is a view that broadcast service transmission path signaling information signals the transmission of a broadcast service through IP stream according to an embodiment of the present invention;

FIG. 113 is a view that broadcast service transmission path signaling information signals the transmission of a broadcast service through an IP stream of another broadcaster according to an embodiment of the present invention;

FIG. 114 is a view that broadcast service transmission path signaling information signals the transmission of a broadcast service through a FLUTE session according to an embodiment of the present invention;

FIG. 115 is a view that broadcast service transmission path signaling information signals the transmission of a broadcast service through a FLUTE protocol of another broadcaster according to an embodiment of the present invention;

FIG. 116 is a view that broadcast service transmission path signaling information signals the transmission of a broadcast service through MPEG-2 TS stream of another broadcaster according to an embodiment of the present invention;

FIG. 117 is a view that broadcast service transmission path signaling information signals the transmission of a broadcast service through a packet based stream of another broadcaster according to an embodiment of the present invention;

FIG. 118 is a view that broadcast service transmission path signaling information signals the transmission of a broadcast service through a packet based stream of an IP based broadcast network according to an embodiment of the present invention;

FIG. 119 is a view that broadcast service transmission path signaling information signals a broadcast service through URL according to an embodiment of the present invention;

FIG. 120 is a view when a broadcast transmission device transmits broadcast service transmission path signaling information according to an embodiment of the present invention;

FIG. 121 is a view when a broadcast reception device receives a broadcast service on the basis of a broadcast service transmission path according to an embodiment of the present invention;

FIG. 122 is a view illustrating media component signaling information signaling a media component according to an embodiment of the present invention;

FIG. 123 is a view illustrating a value that a component_type field in media component signaling information according to an embodiment of the present invention;

FIG. 124 is a view illustrating a component_data field in media component signaling information according to an embodiment of the present invention;

FIG. 125 is a view illustrating the type and role of a media component according to an embodiment of the present invention;

FIG. 126 is a view illustrating a configuration of a complex component according to an embodiment of the present invention;

FIG. 127 is a view illustrating a complex video component according to an embodiment of the present invention;

FIG. 128 is a view illustrating a complex audio component according to an embodiment of the present invention;

FIG. 129 is a view illustrating a configuration of a broadcast reception device according to another embodiment of the present invention;

FIG. 130 is a view illustrating a configuration of a complex video component according to an embodiment of the present invention;

Figure 131:
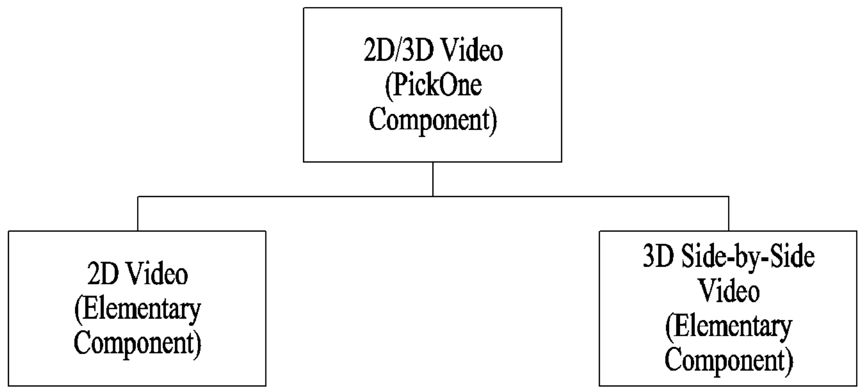
Figure 132:
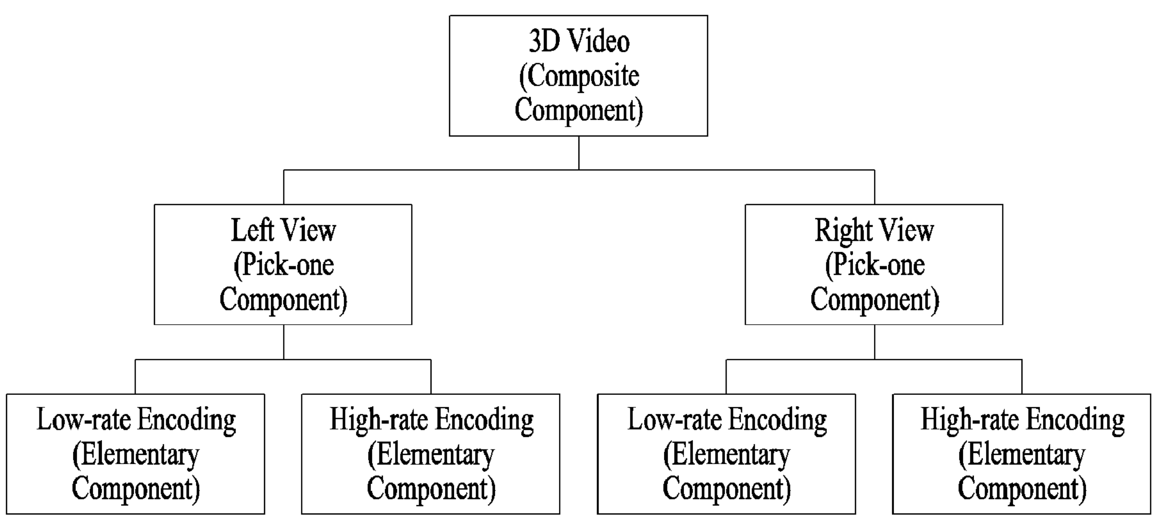
Figure 133:
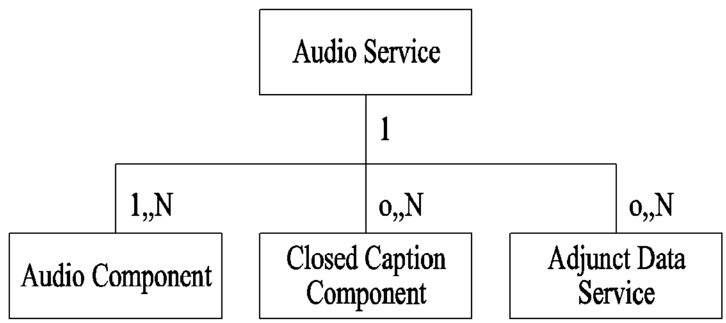
Figure 134:
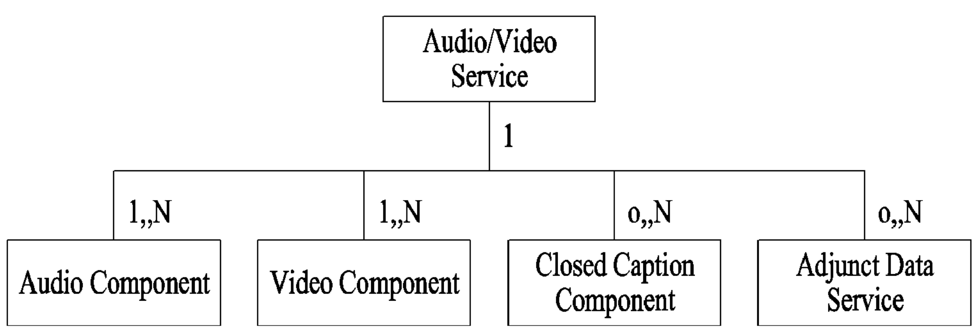
Figure 135:
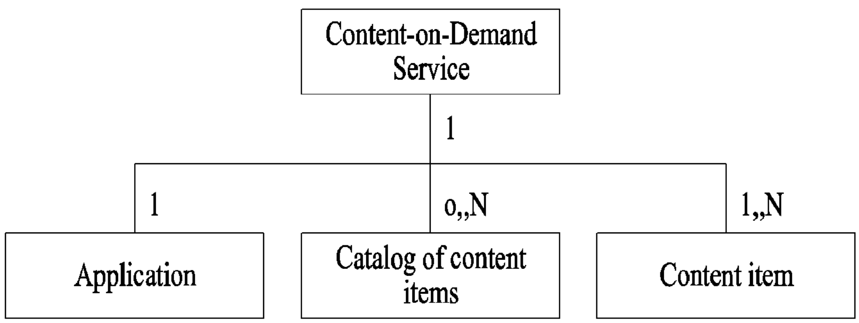
Figure 136:
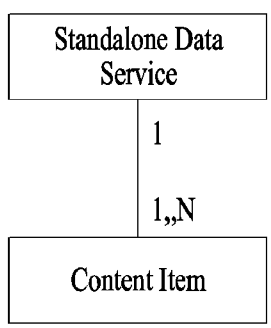
Figures 154, 155:
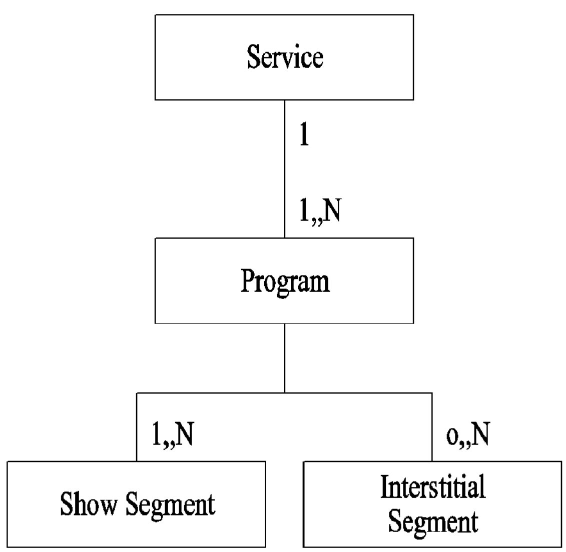
Figure 159:
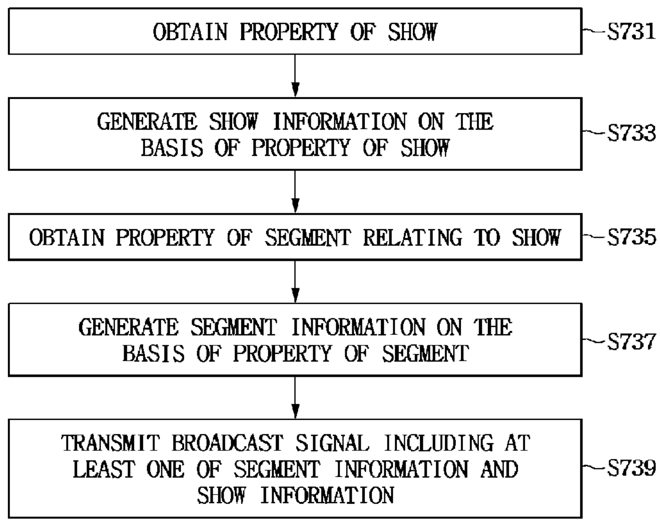
Figure 160:
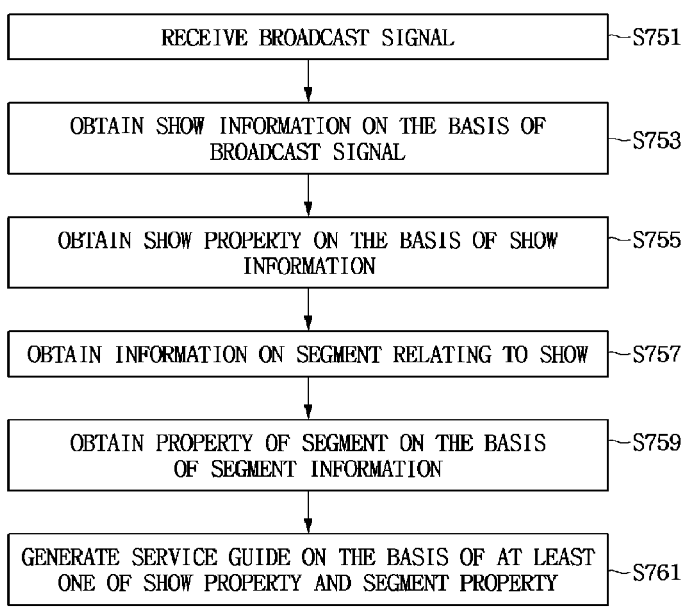
Figure 170:
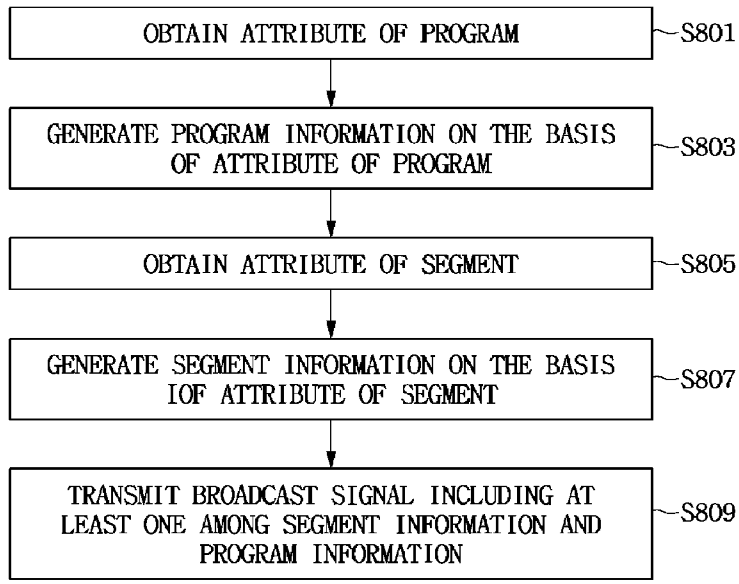
Figure 171:
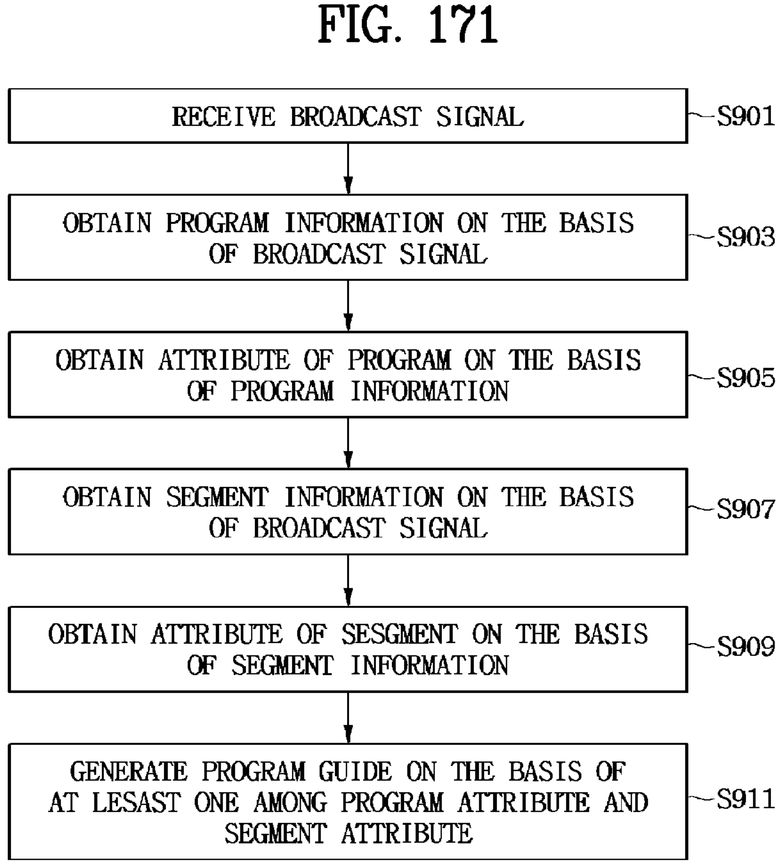
Figure 188:
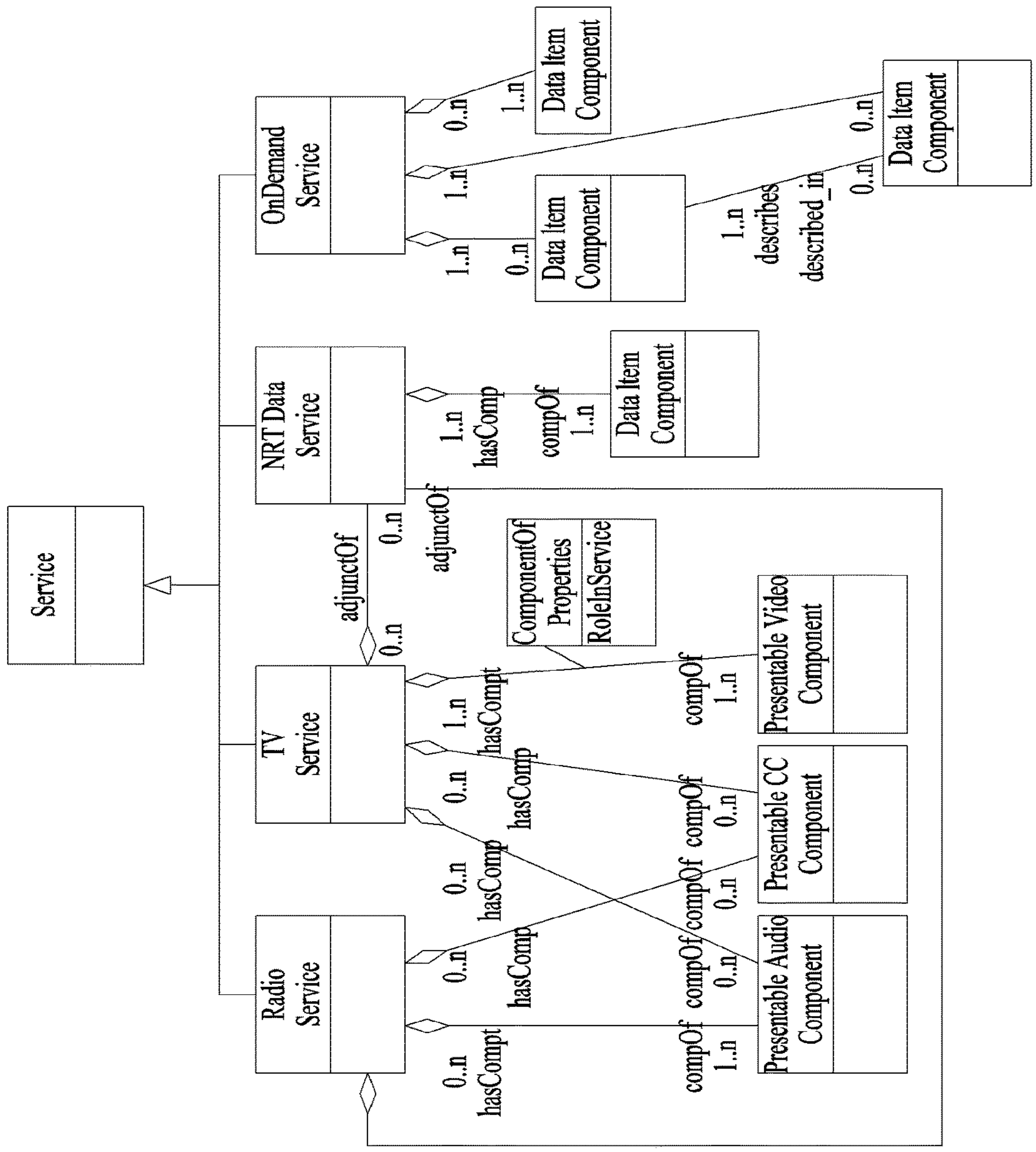
Figure 189:
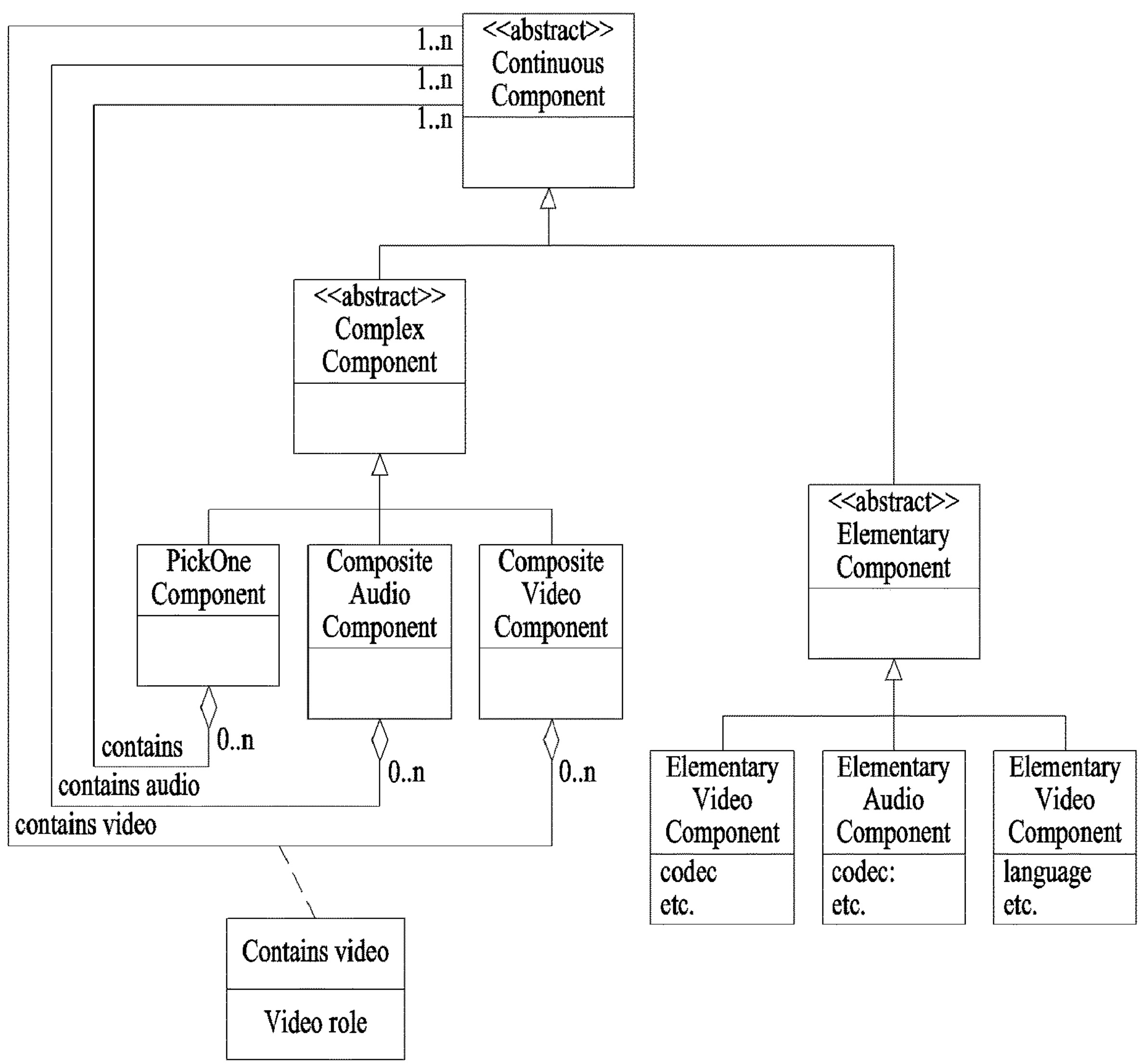
Figure 190:
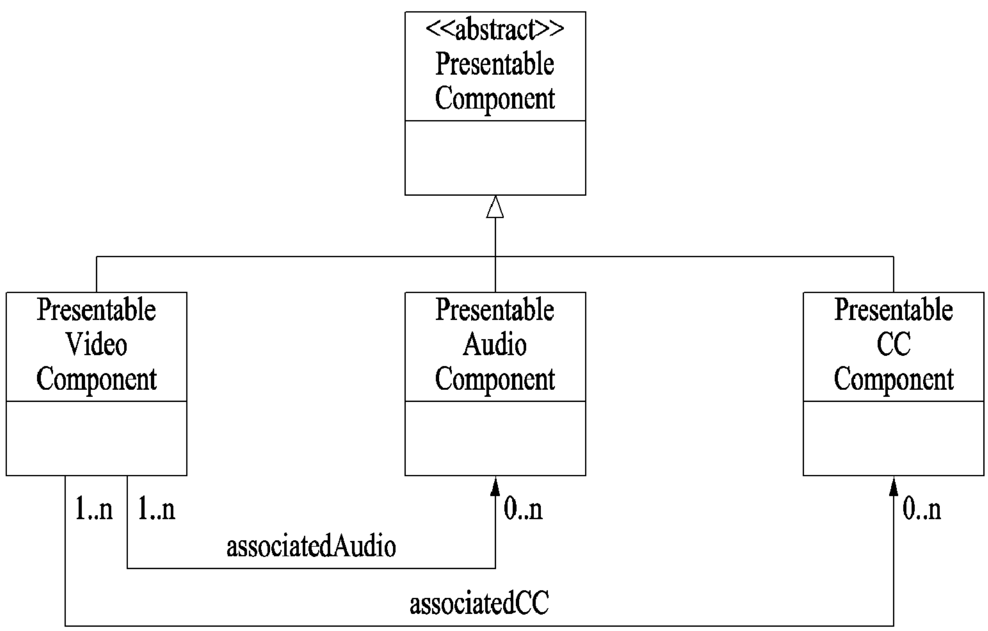
Figure 191:
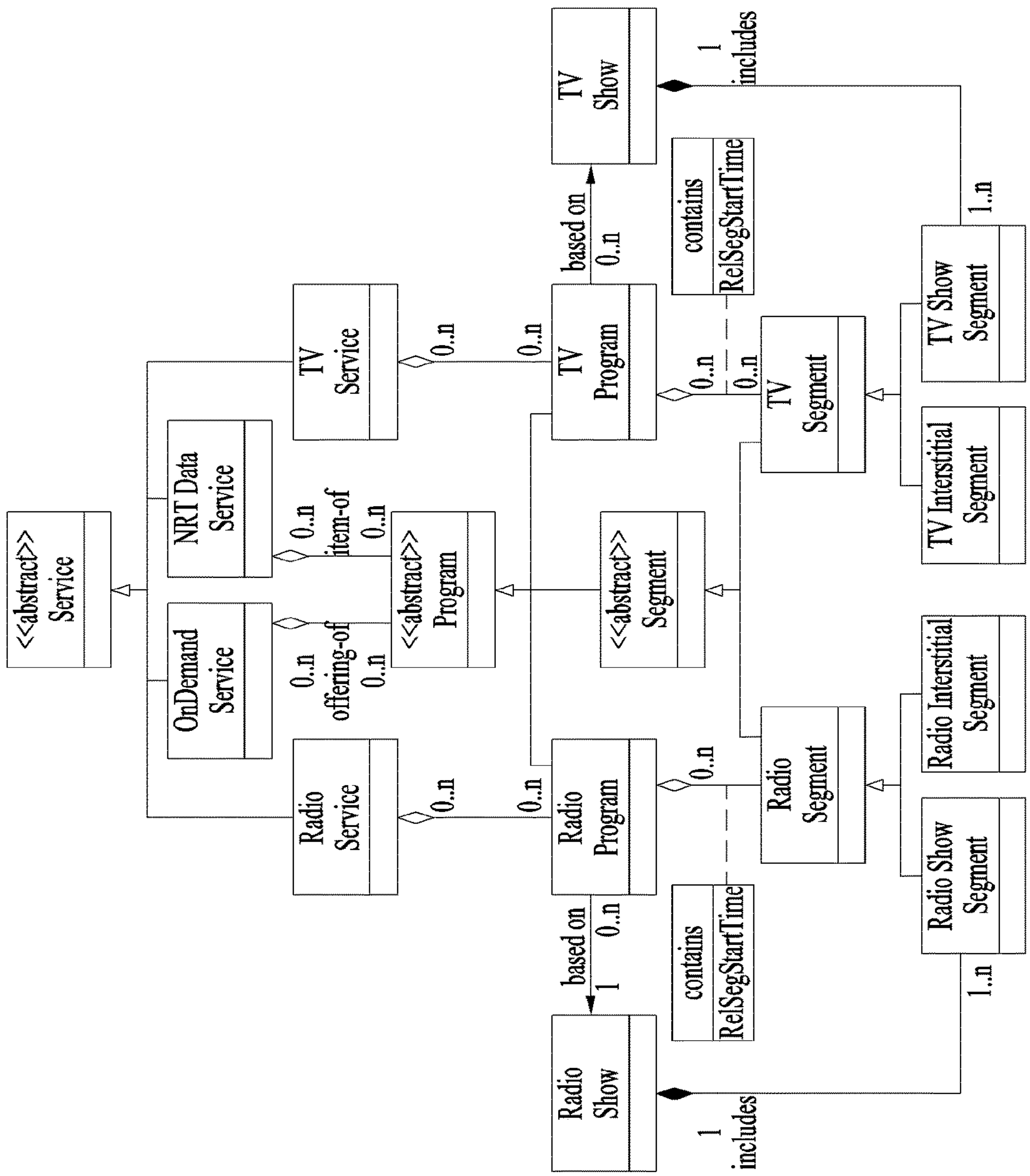
Figure 192:
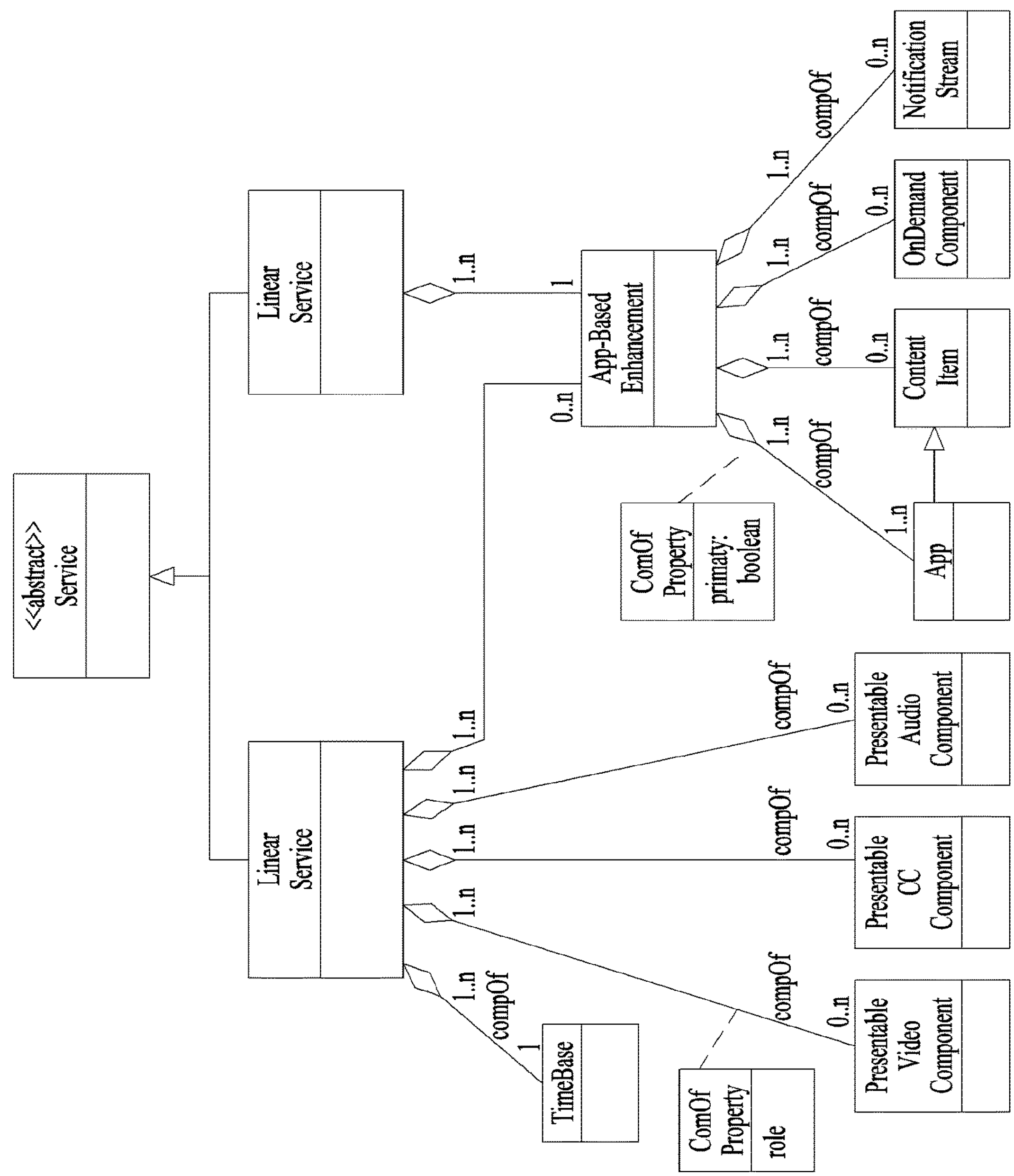
Figure 193:
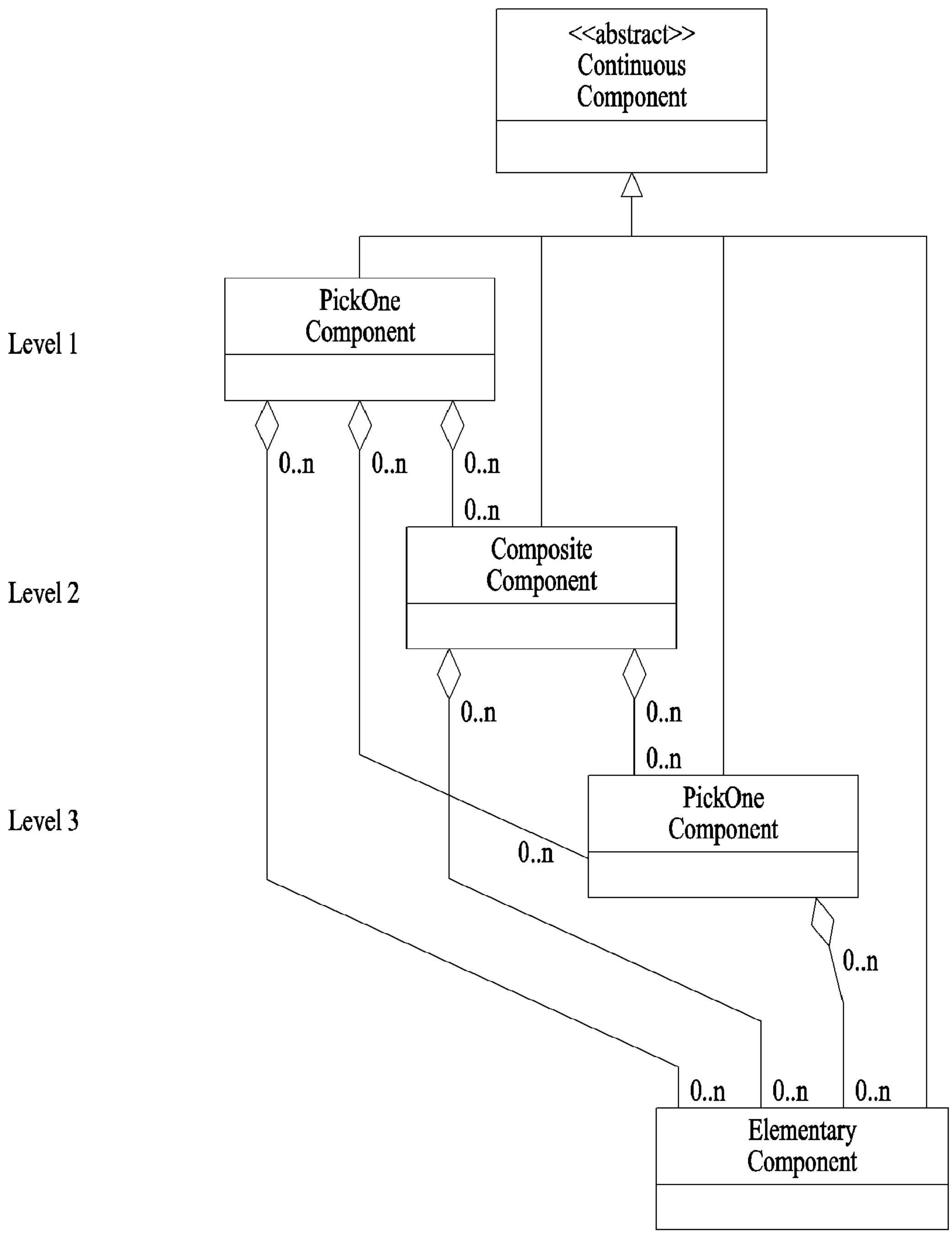
Figure 194:
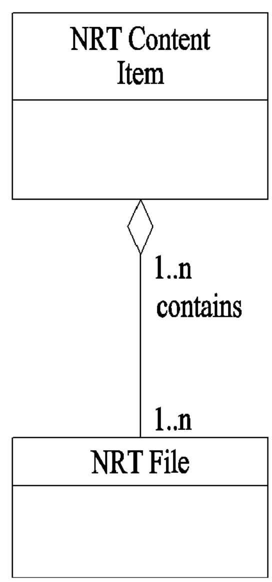
Figure 195:
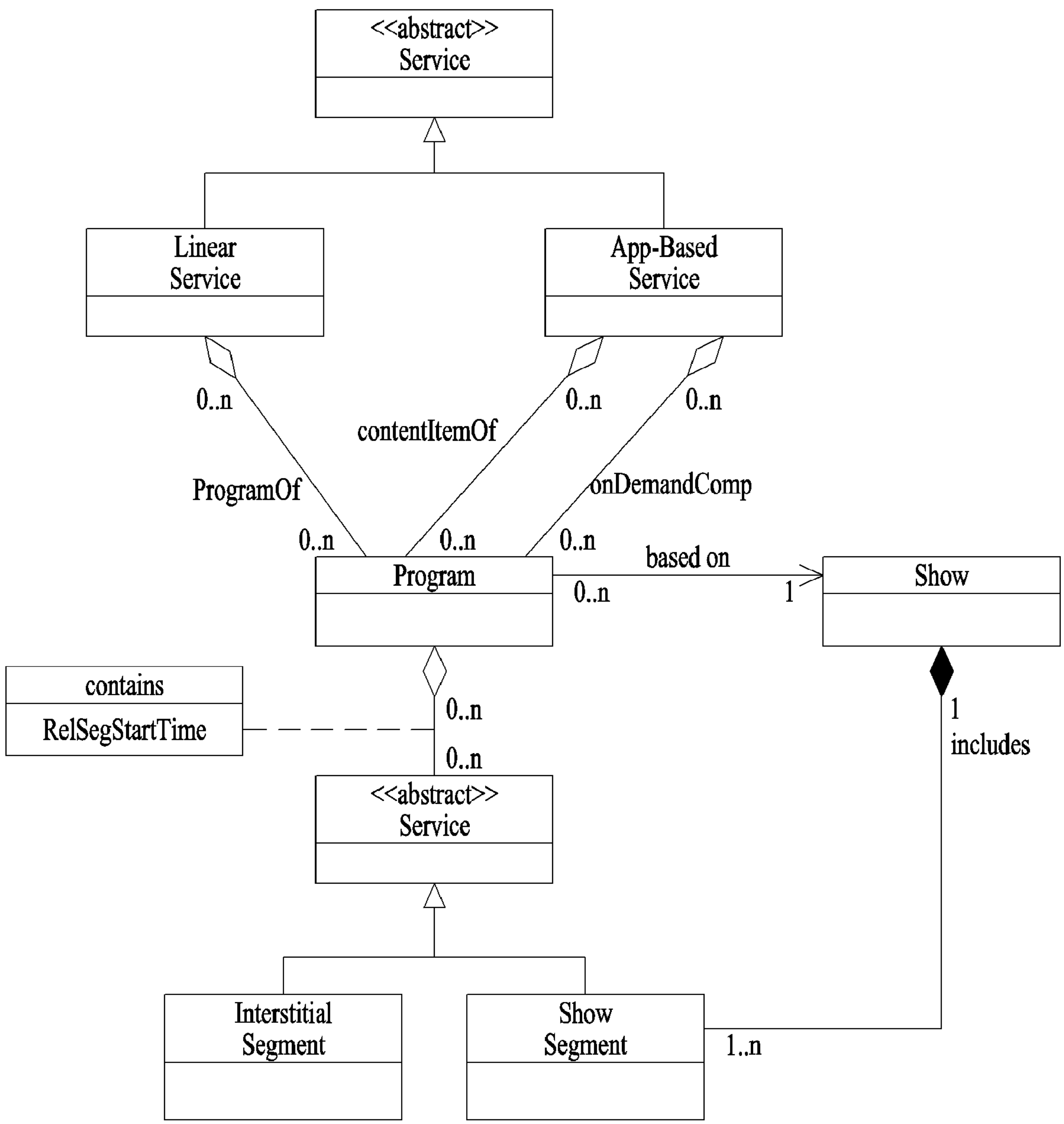
Figure 196:
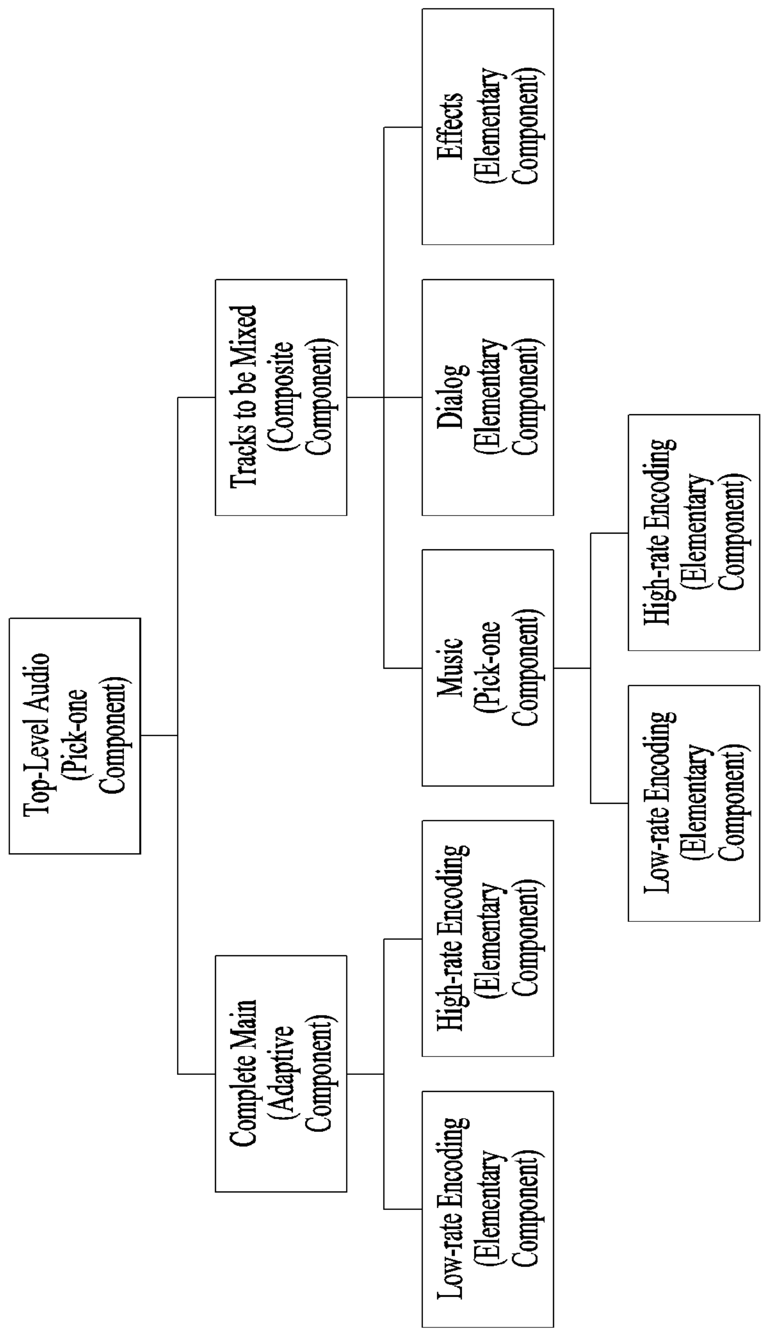
Figure 197:
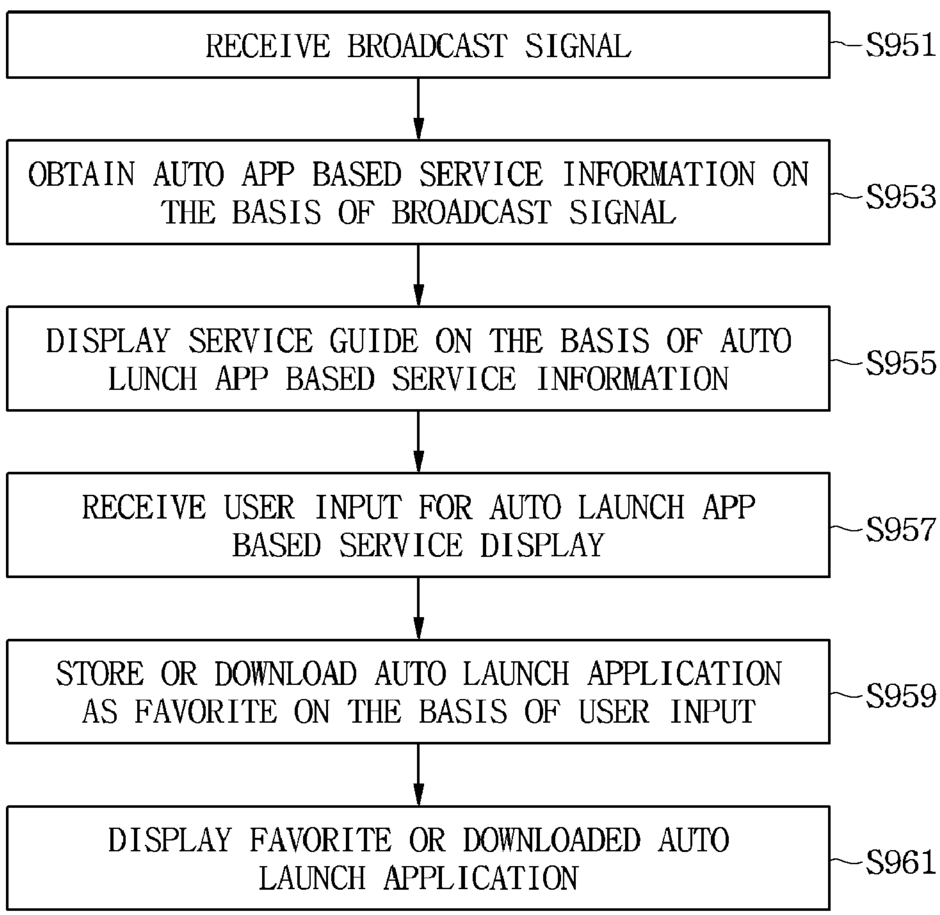
Figure 198:
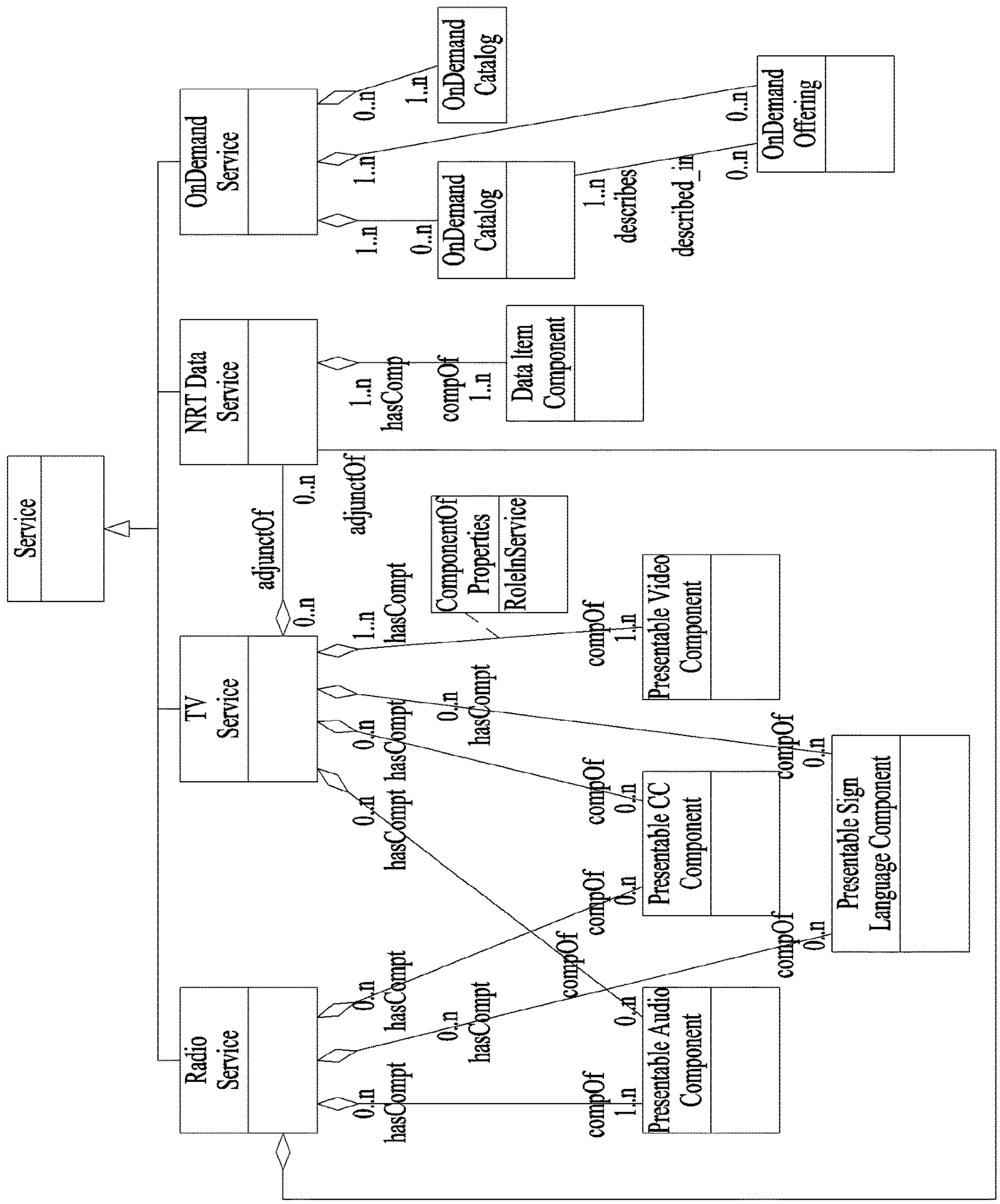
Figure 199:
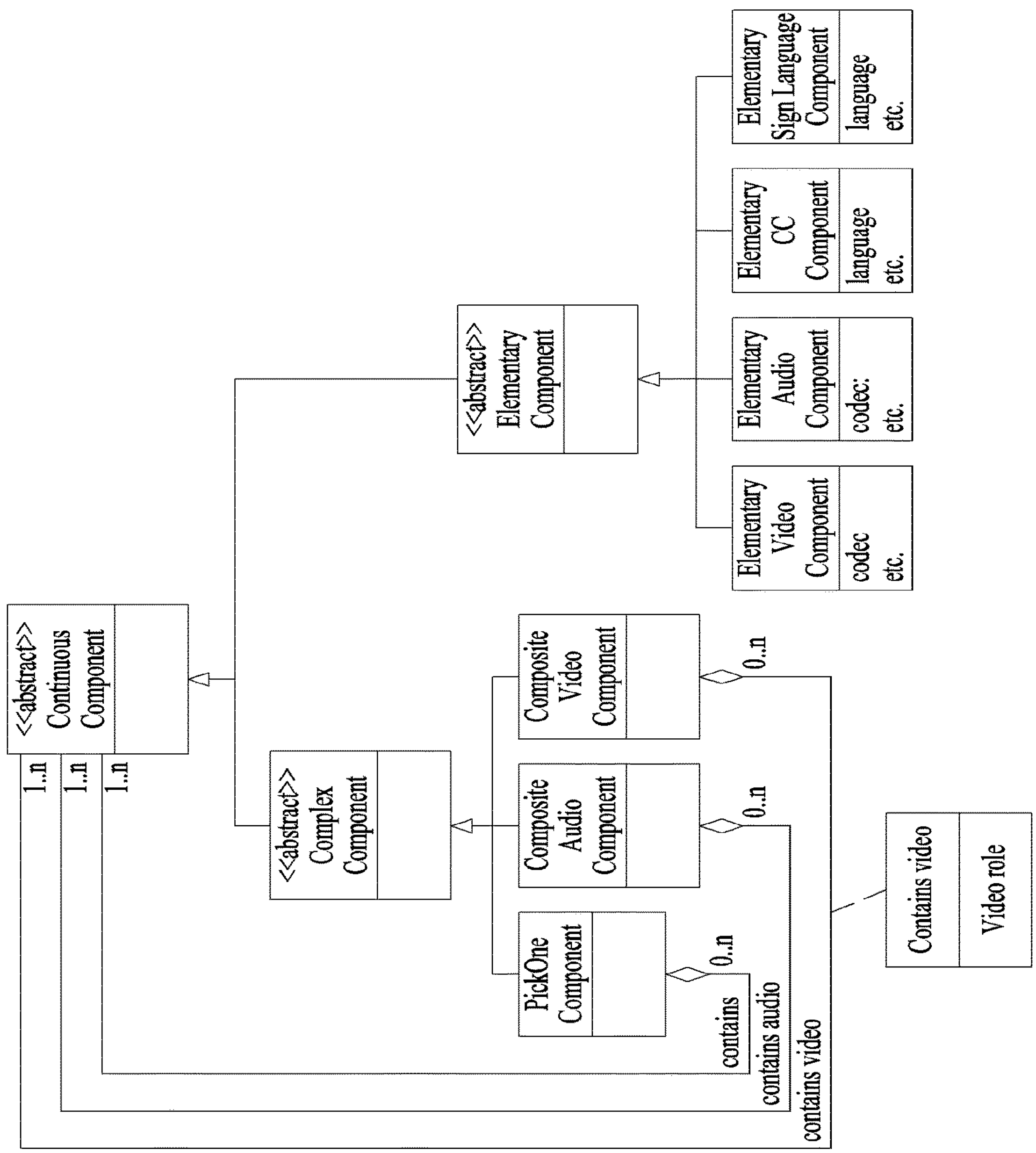
Figure 200:
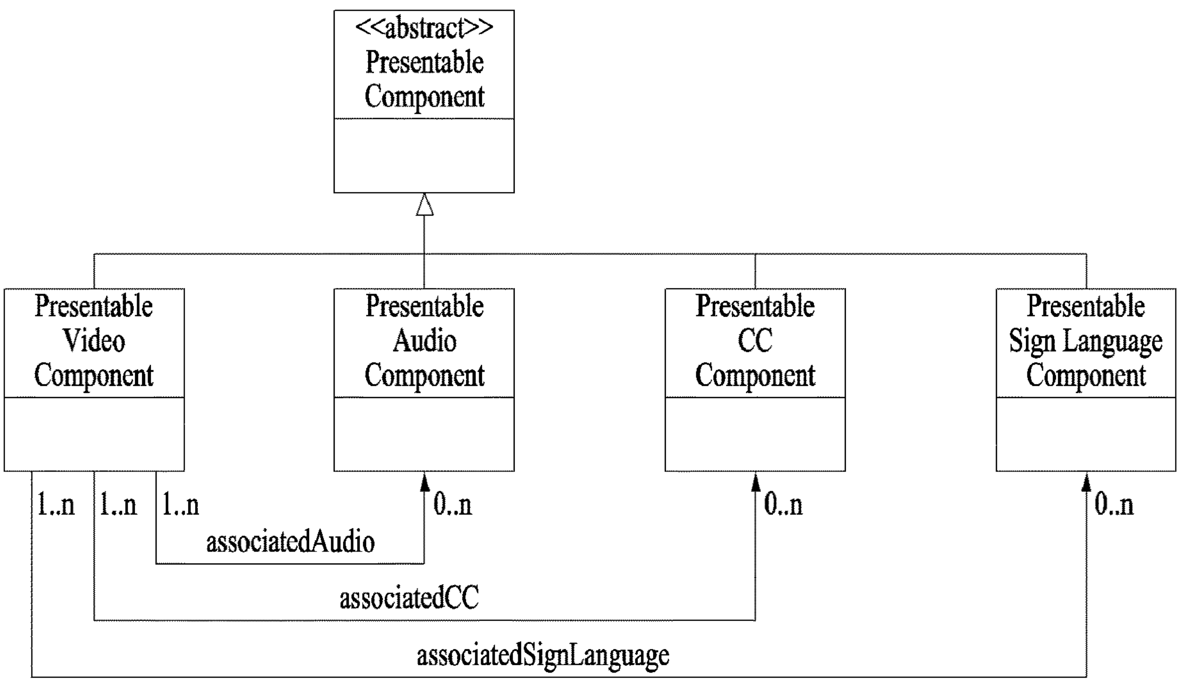
Figure 201:
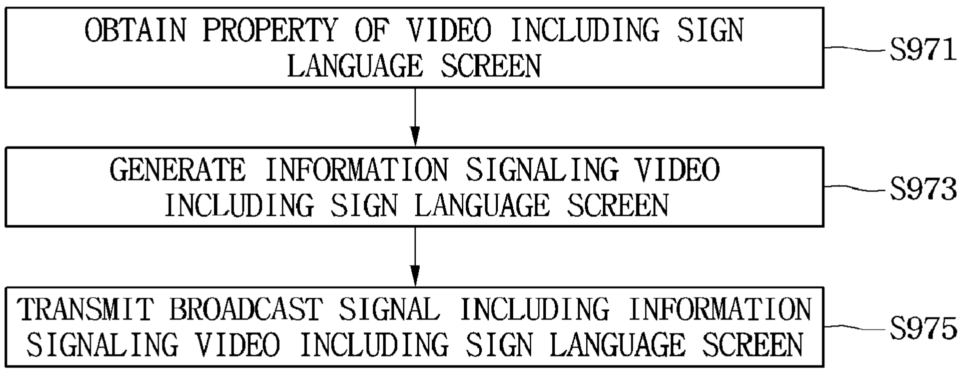
Figure 202:
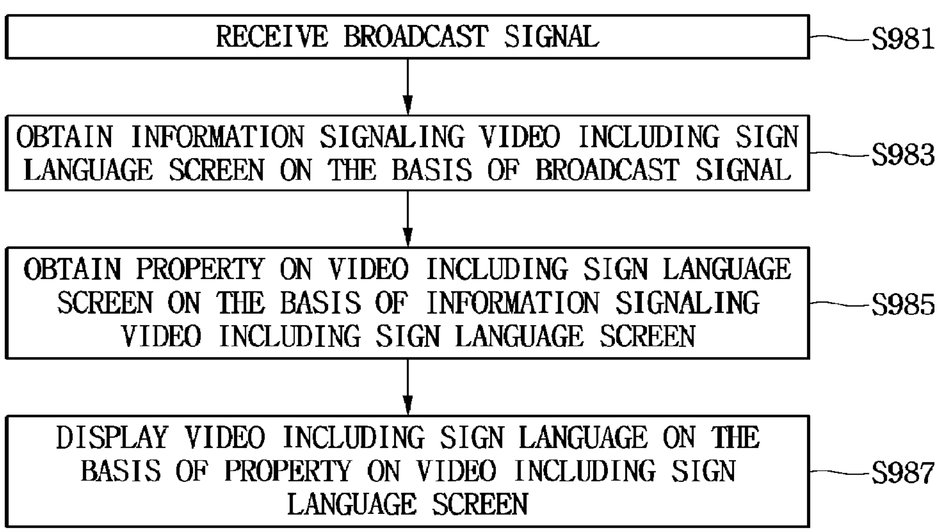
Figure 203:
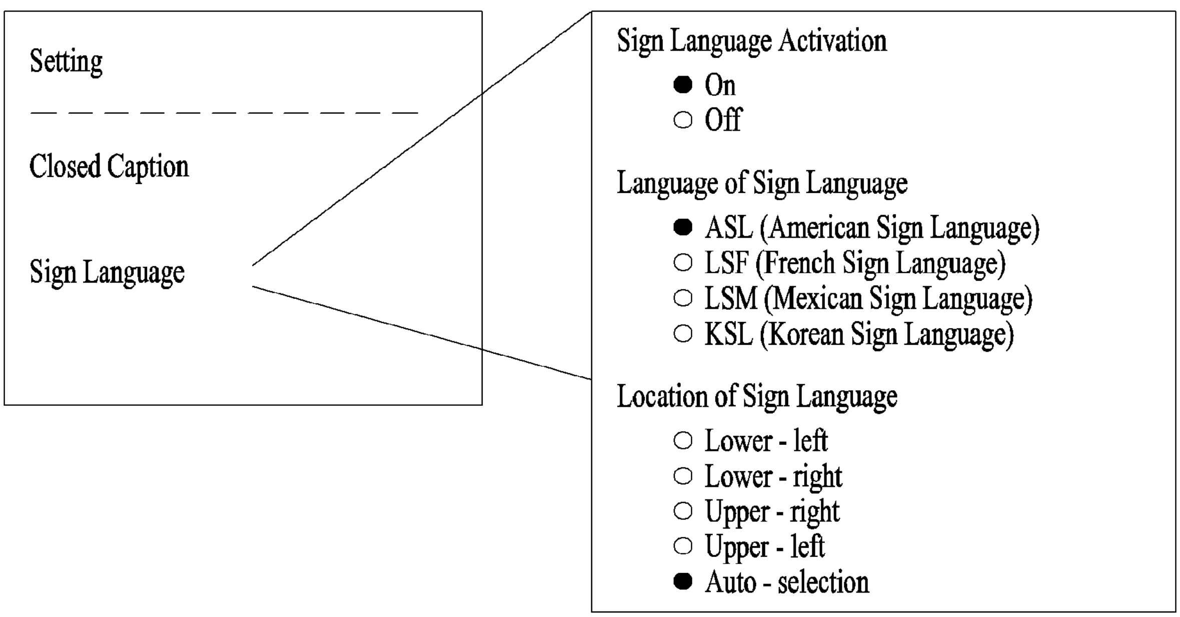
Figure 204:
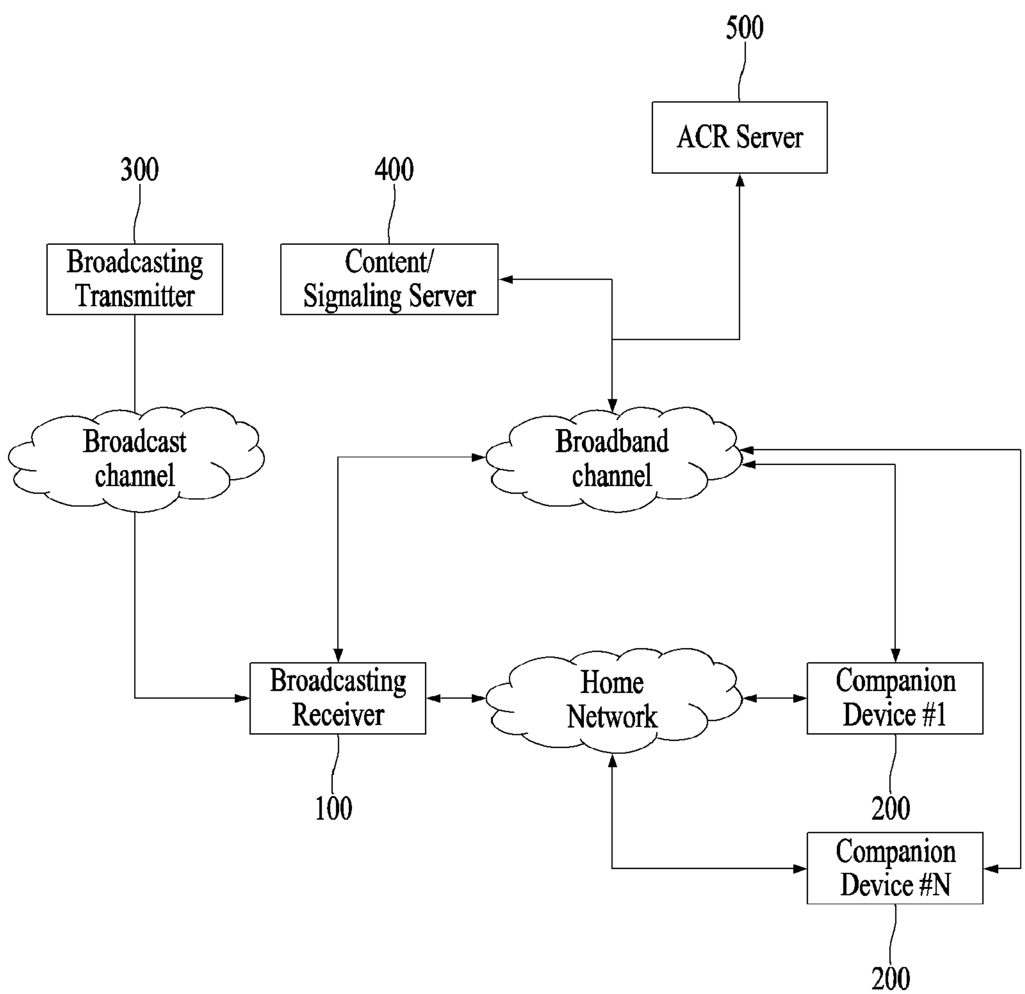
Figure 207:
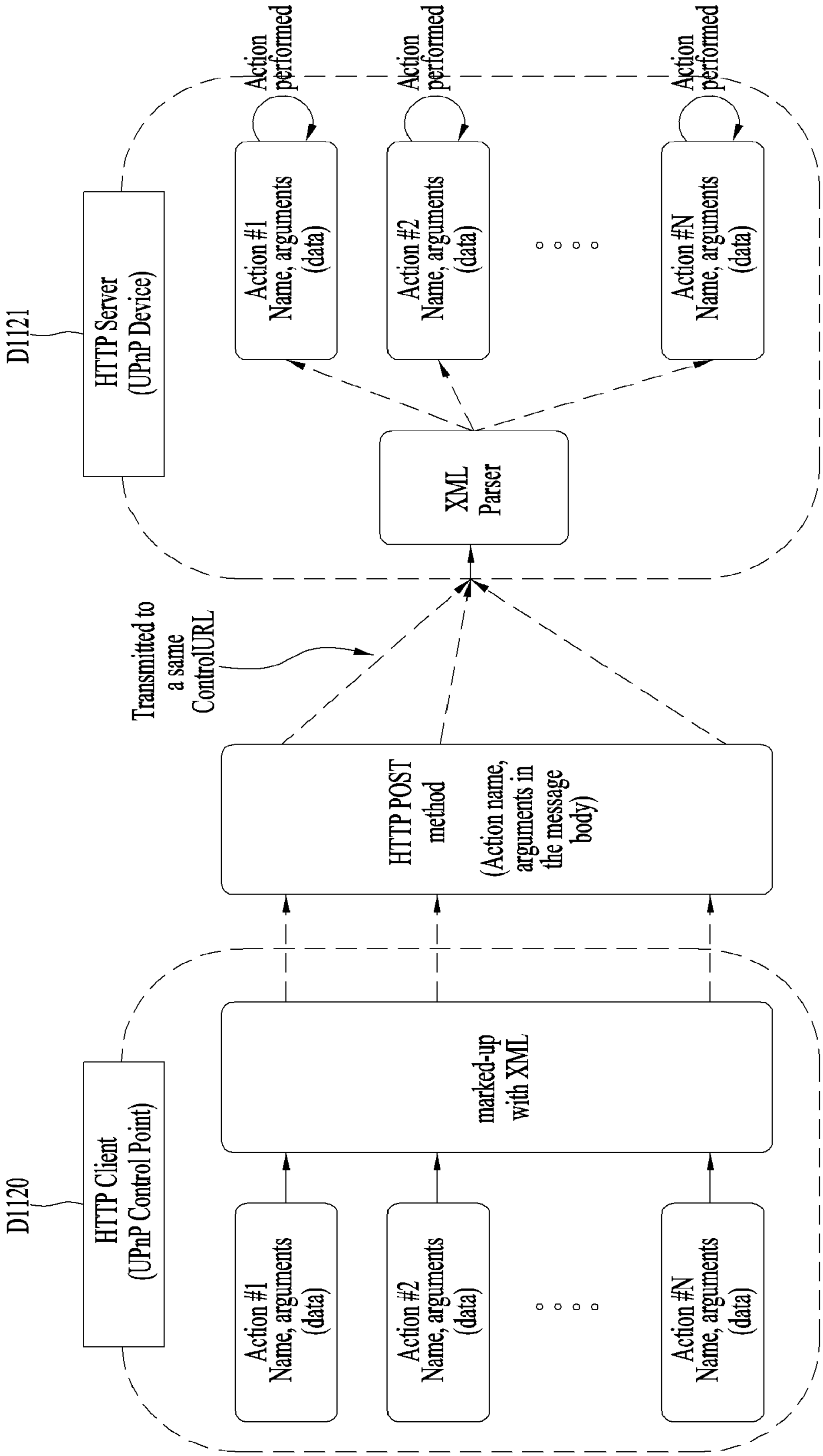
Figure 208:
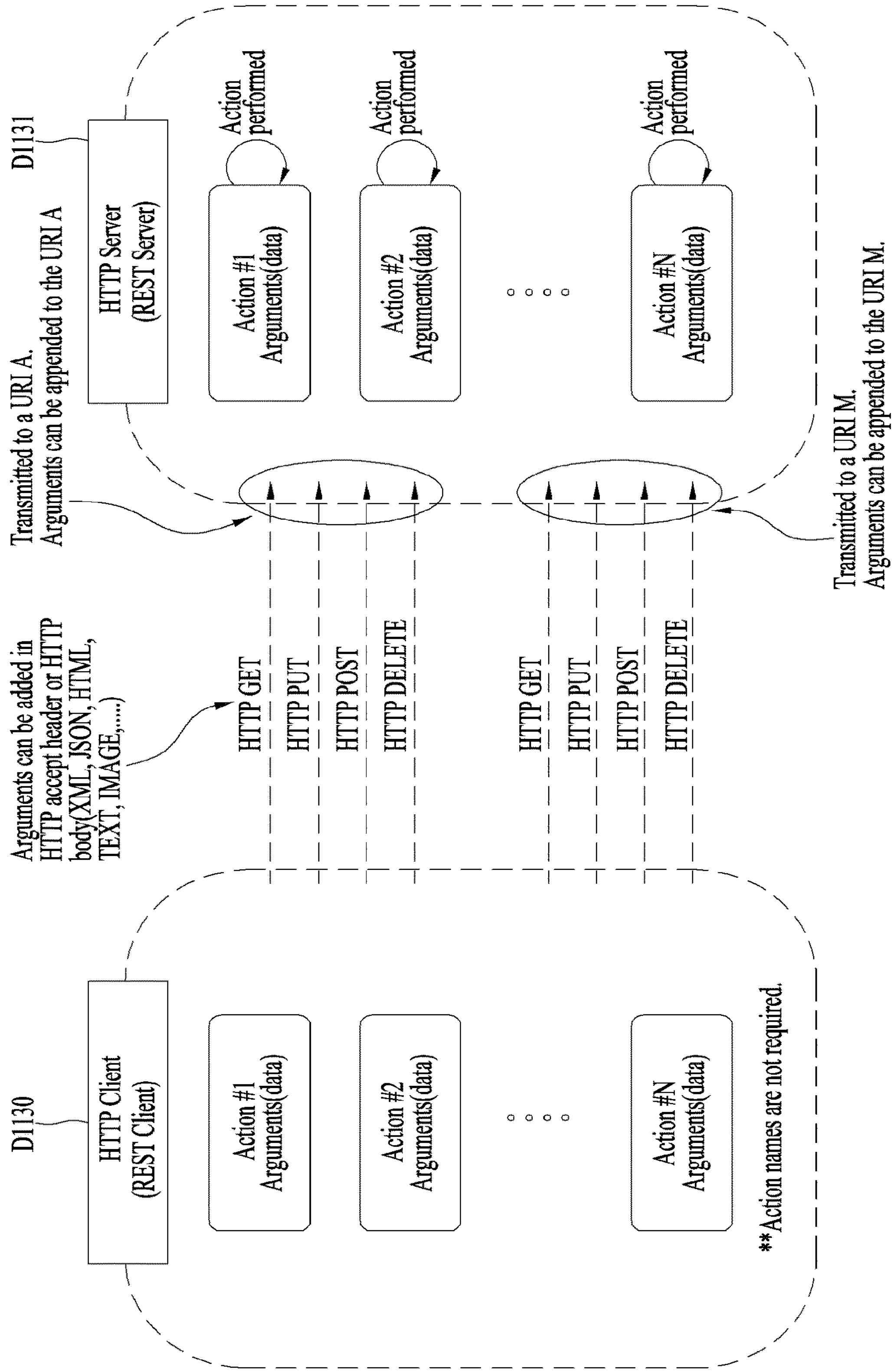
Figure 210:
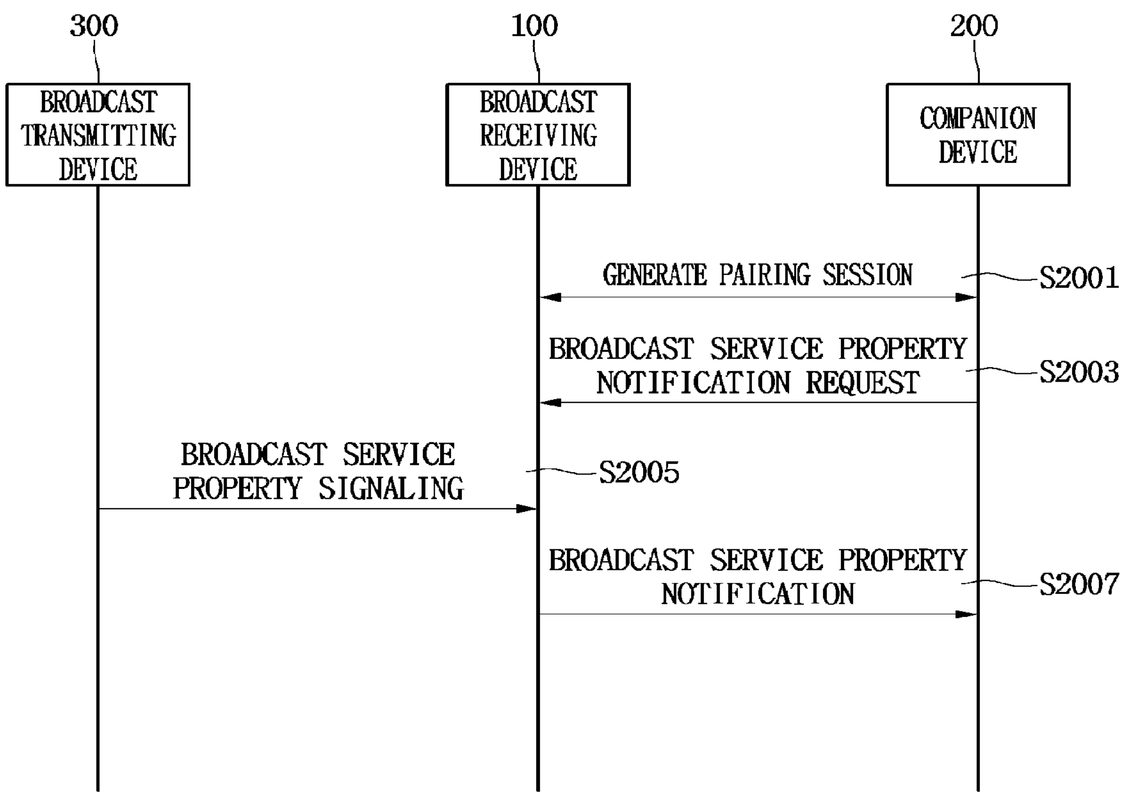
Figure 213:
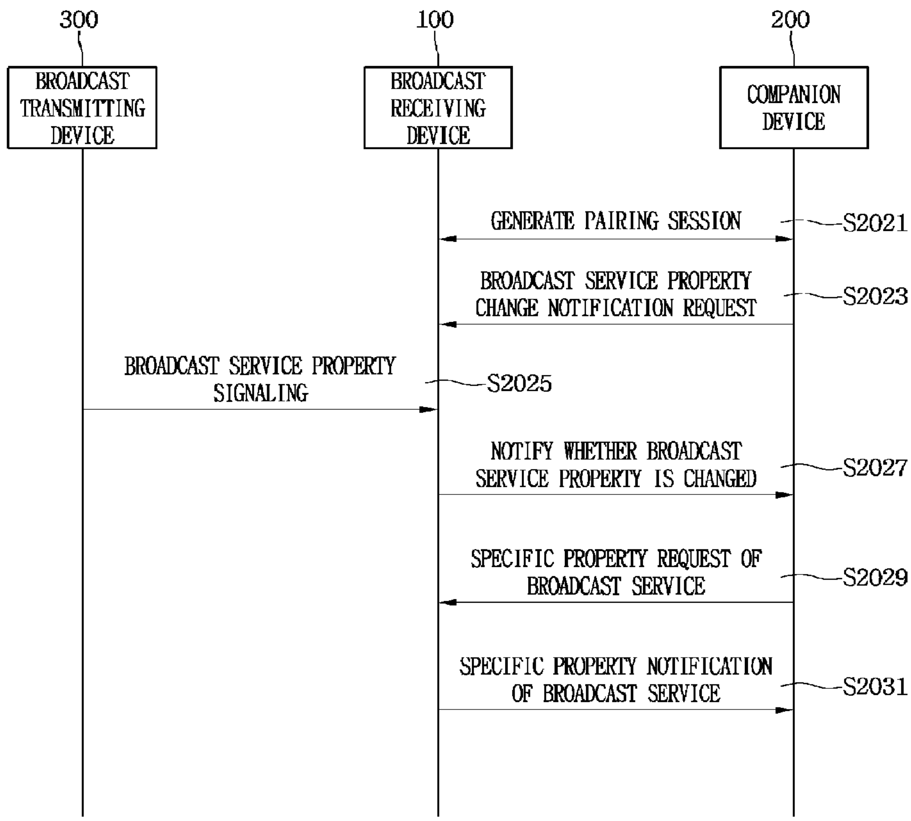
Figure 216:
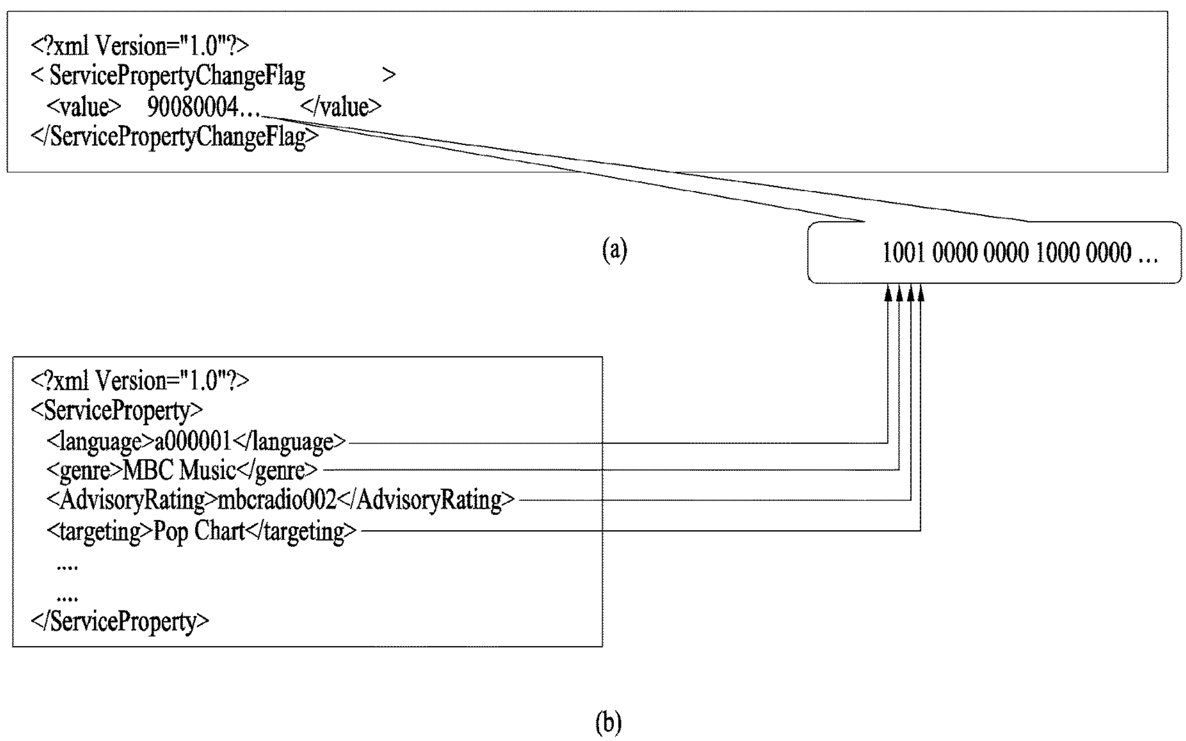
Figure 218:
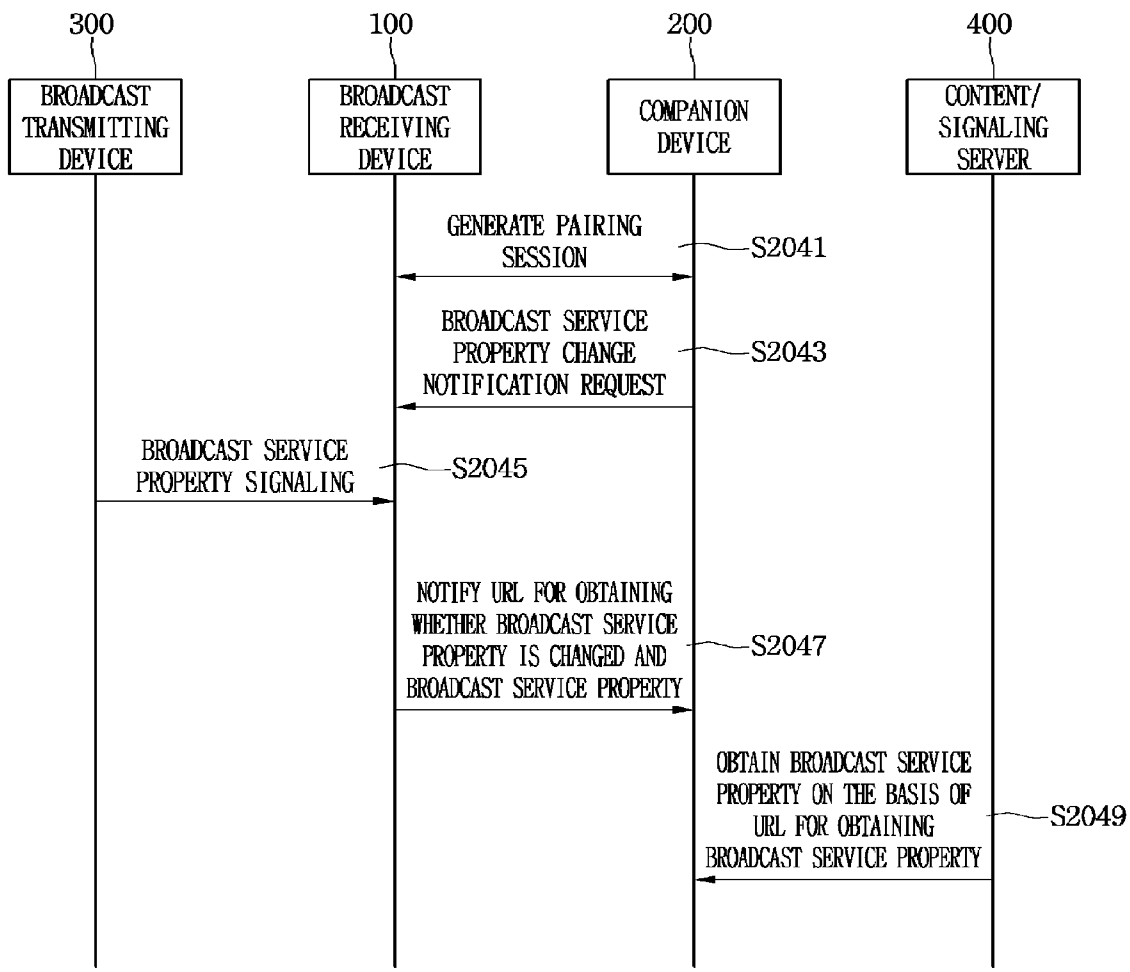
Figure 221:
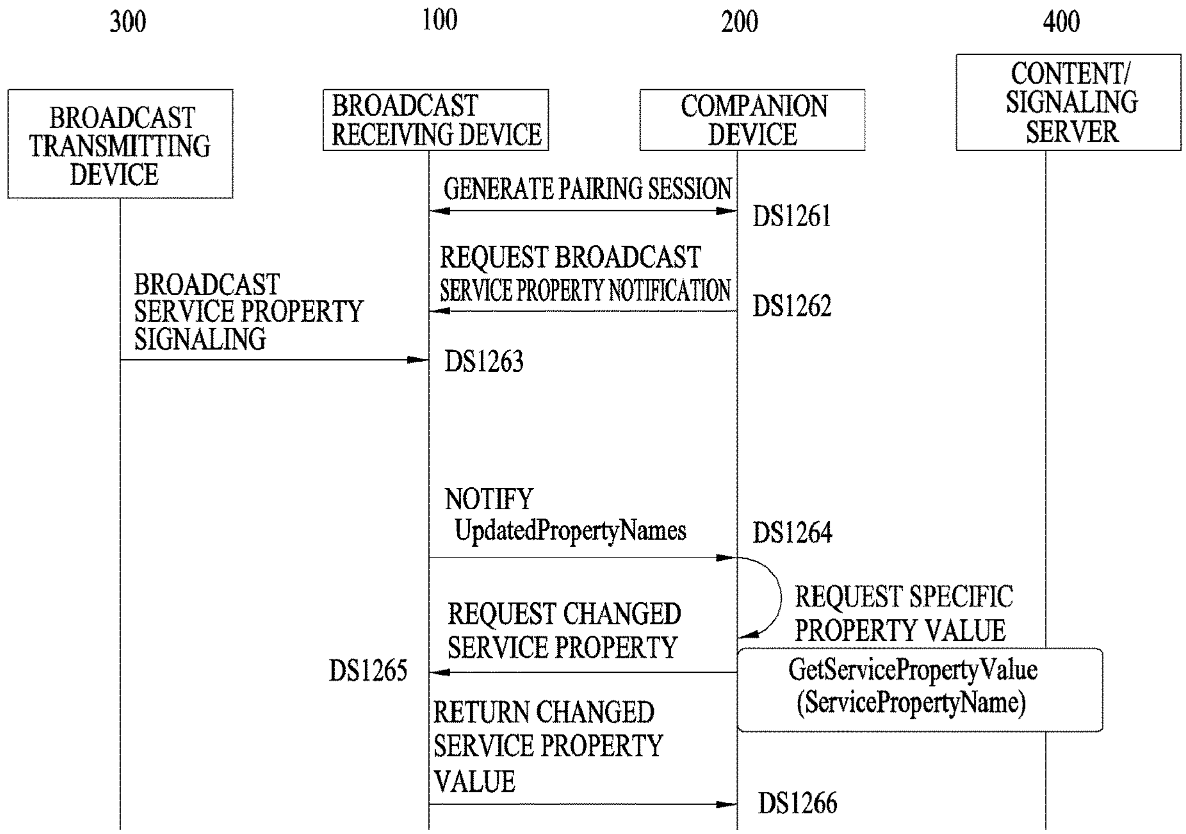
Figure 223:
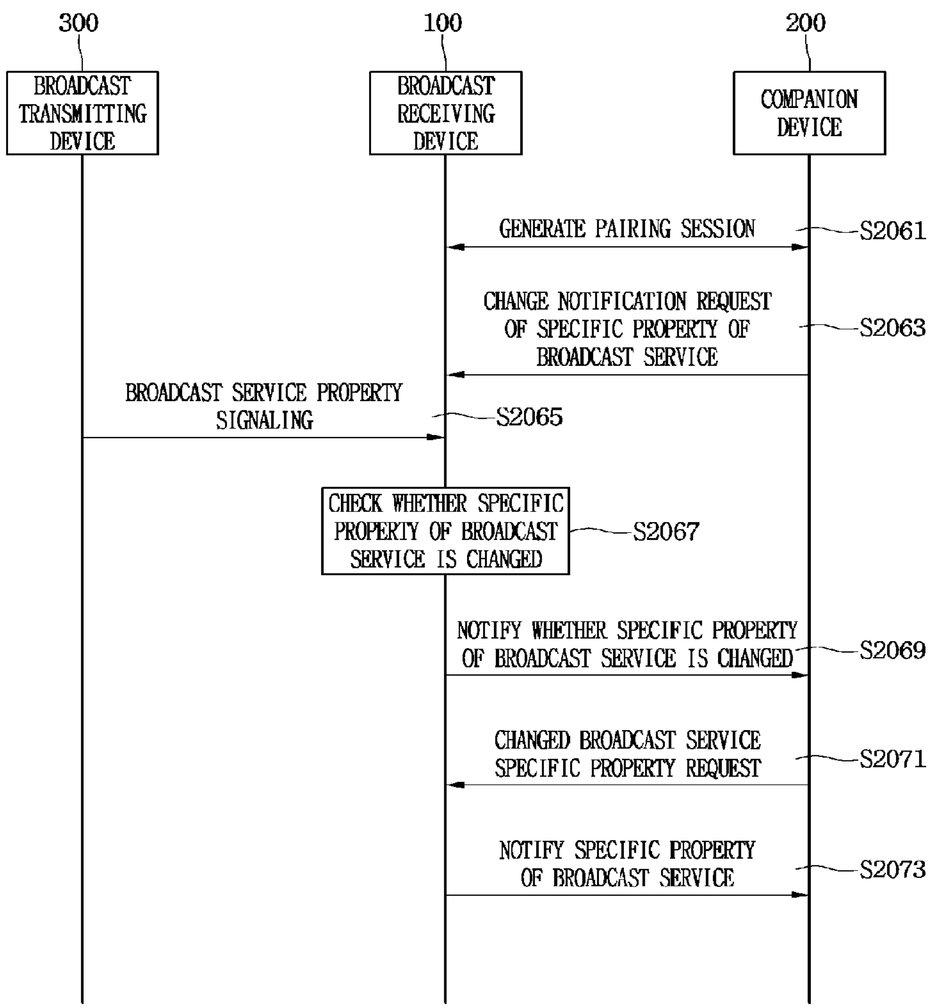
Figure 224:
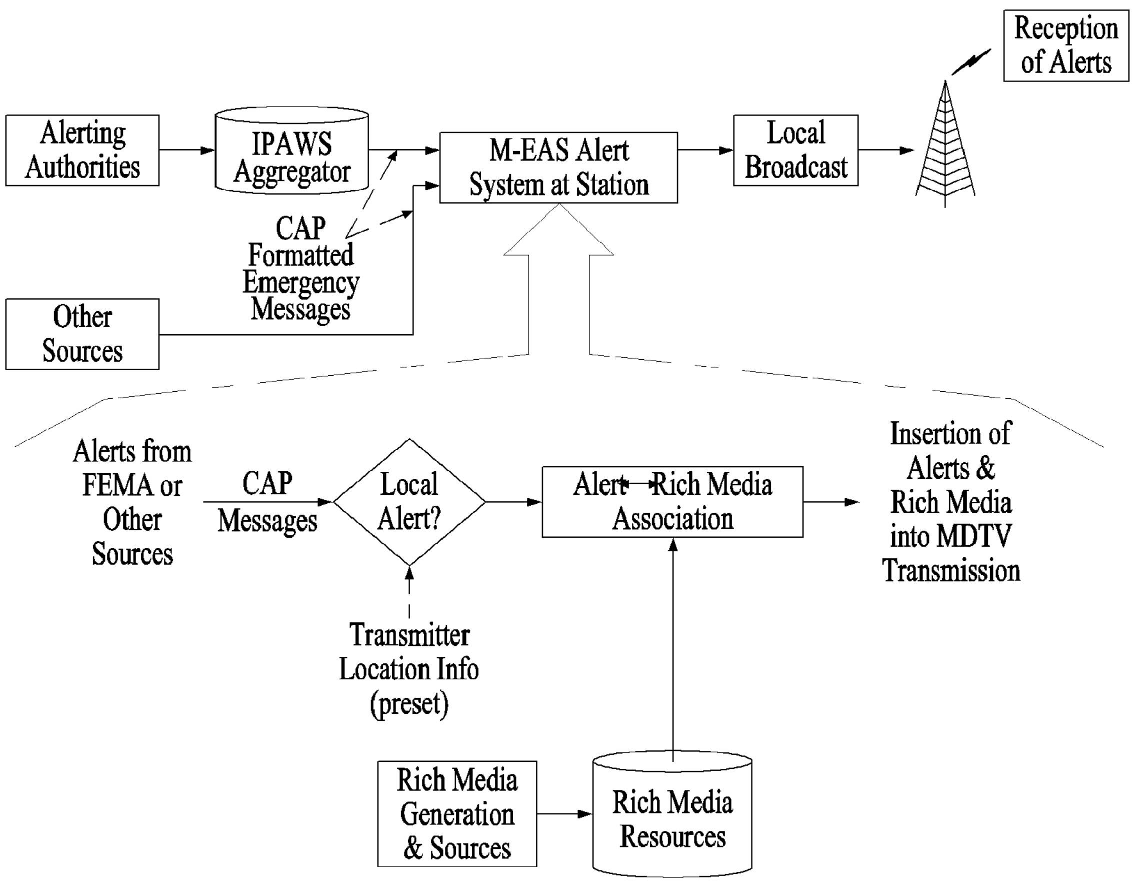
Figure 225:
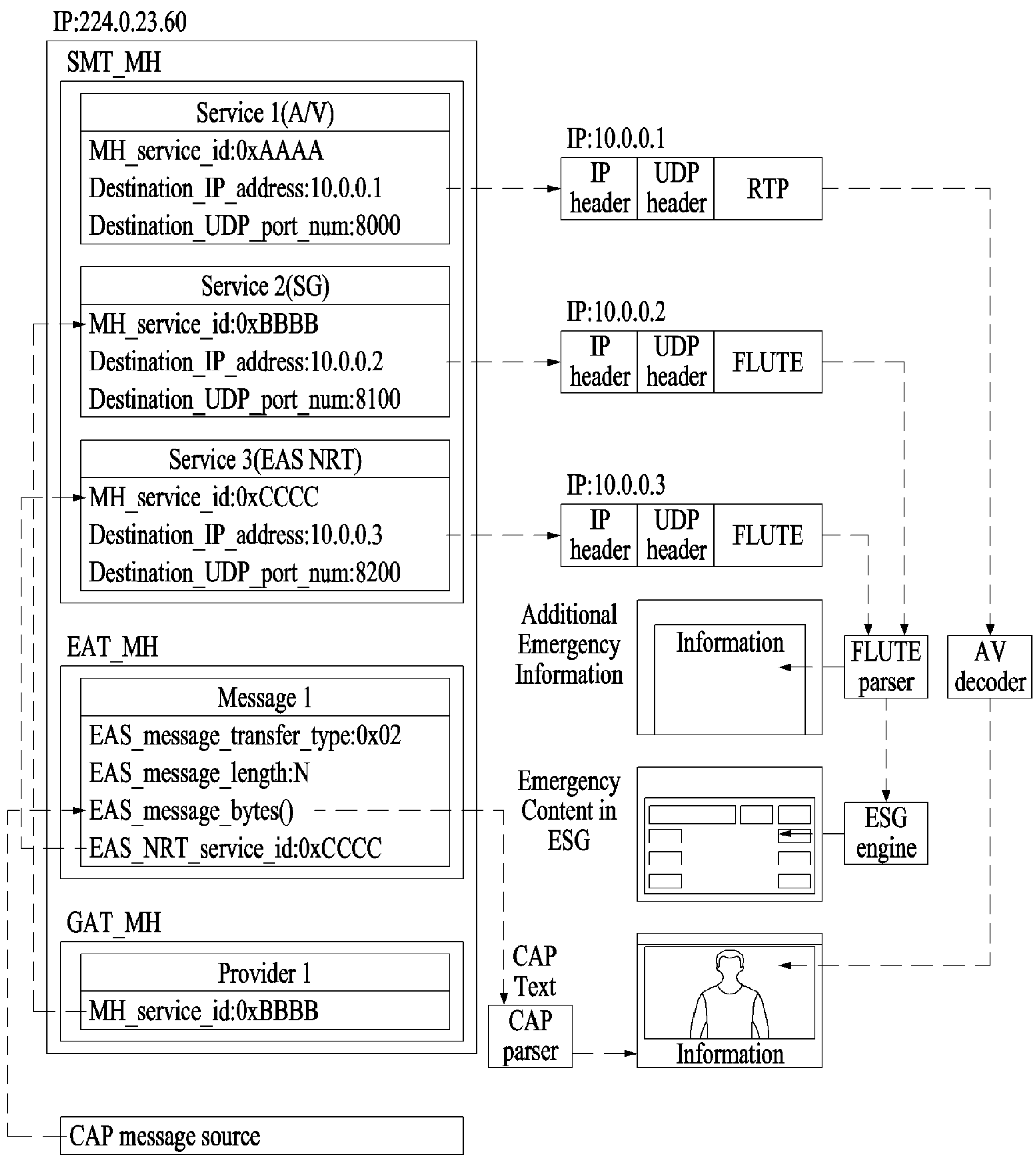
Figure 228:
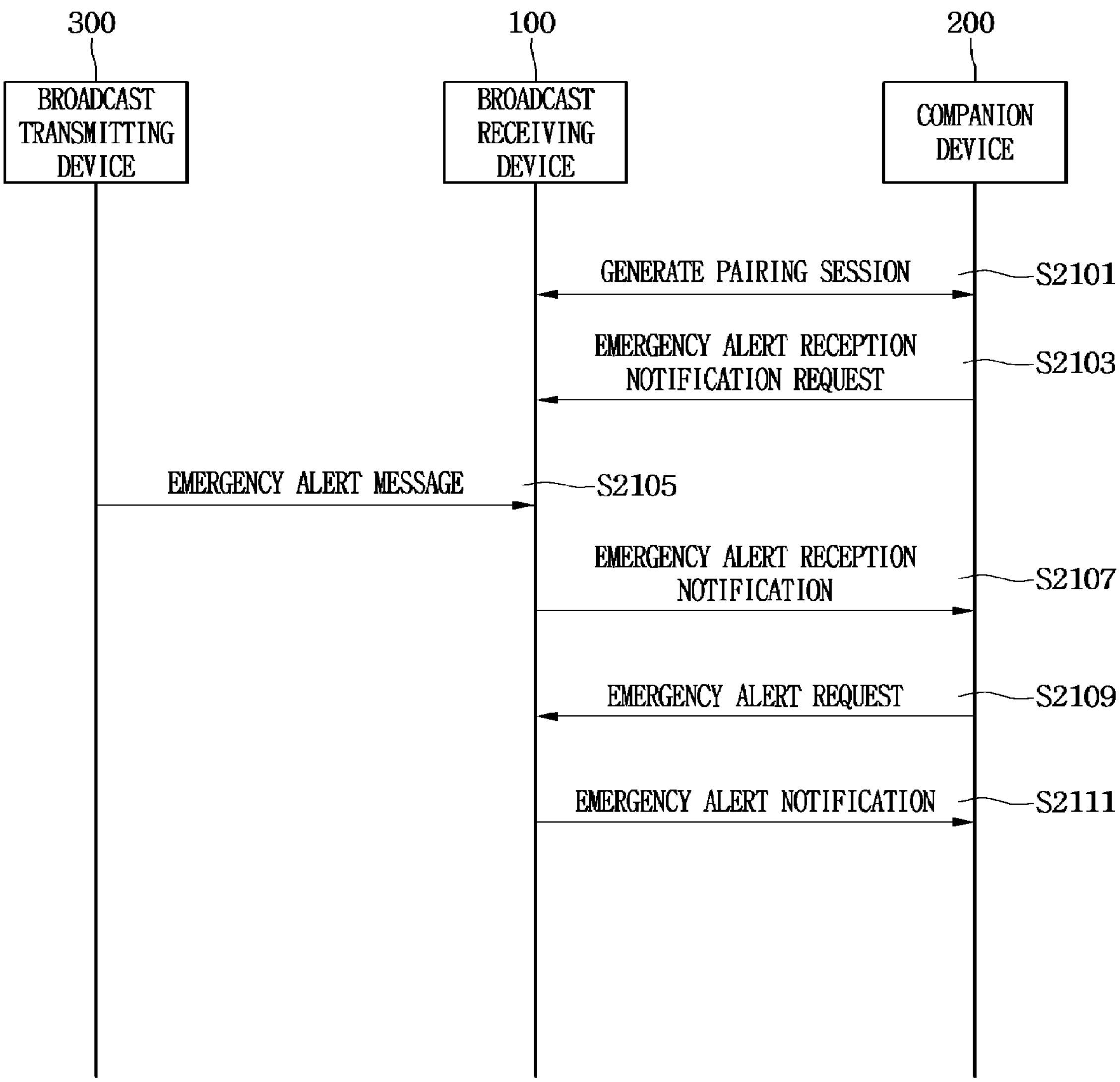
Figure 235:
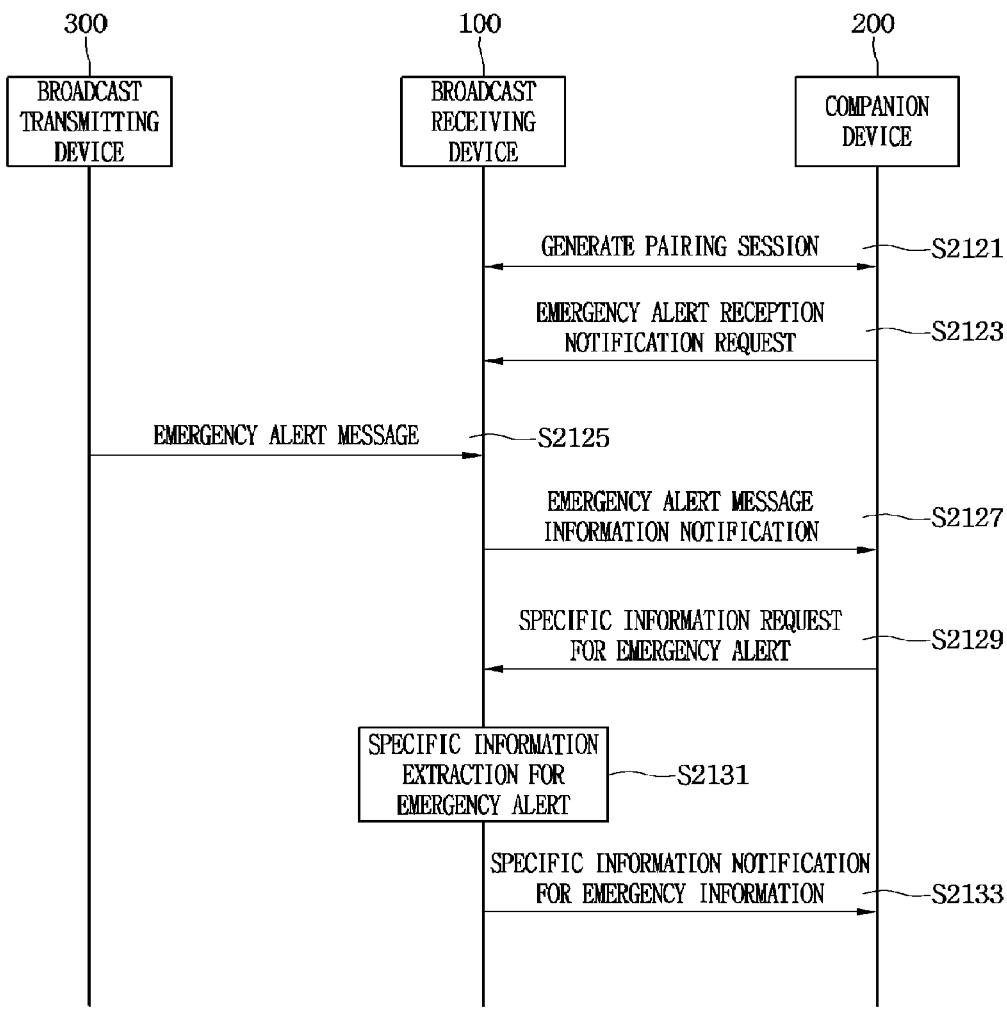
Figure 238:
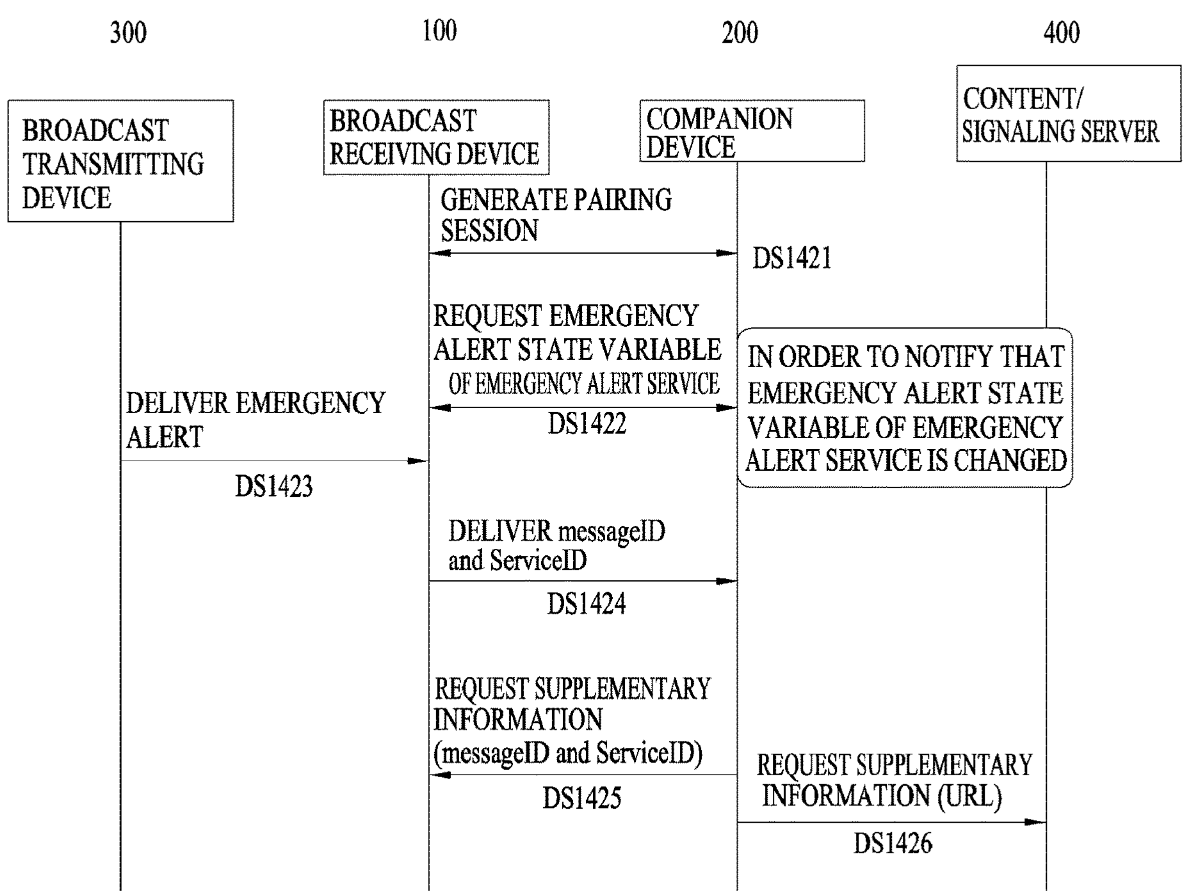
Figure 241:
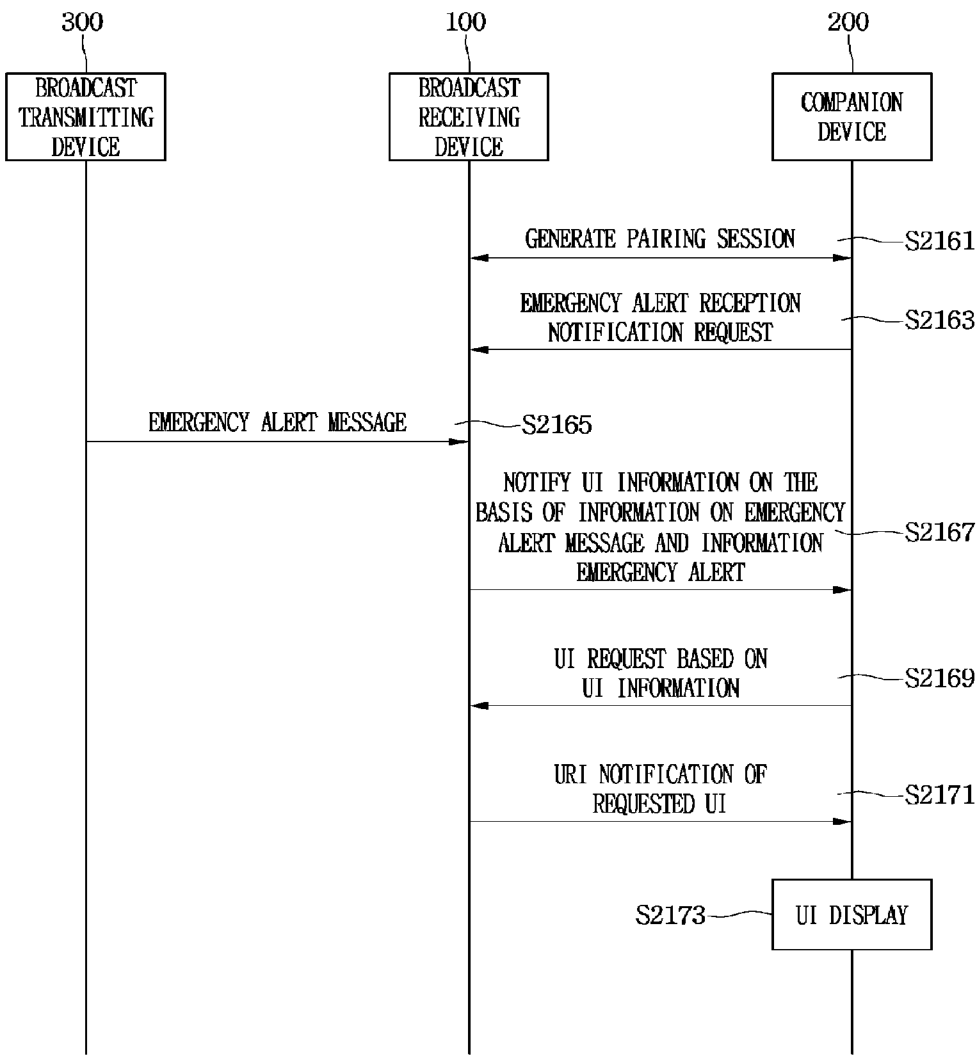
Figure 242:
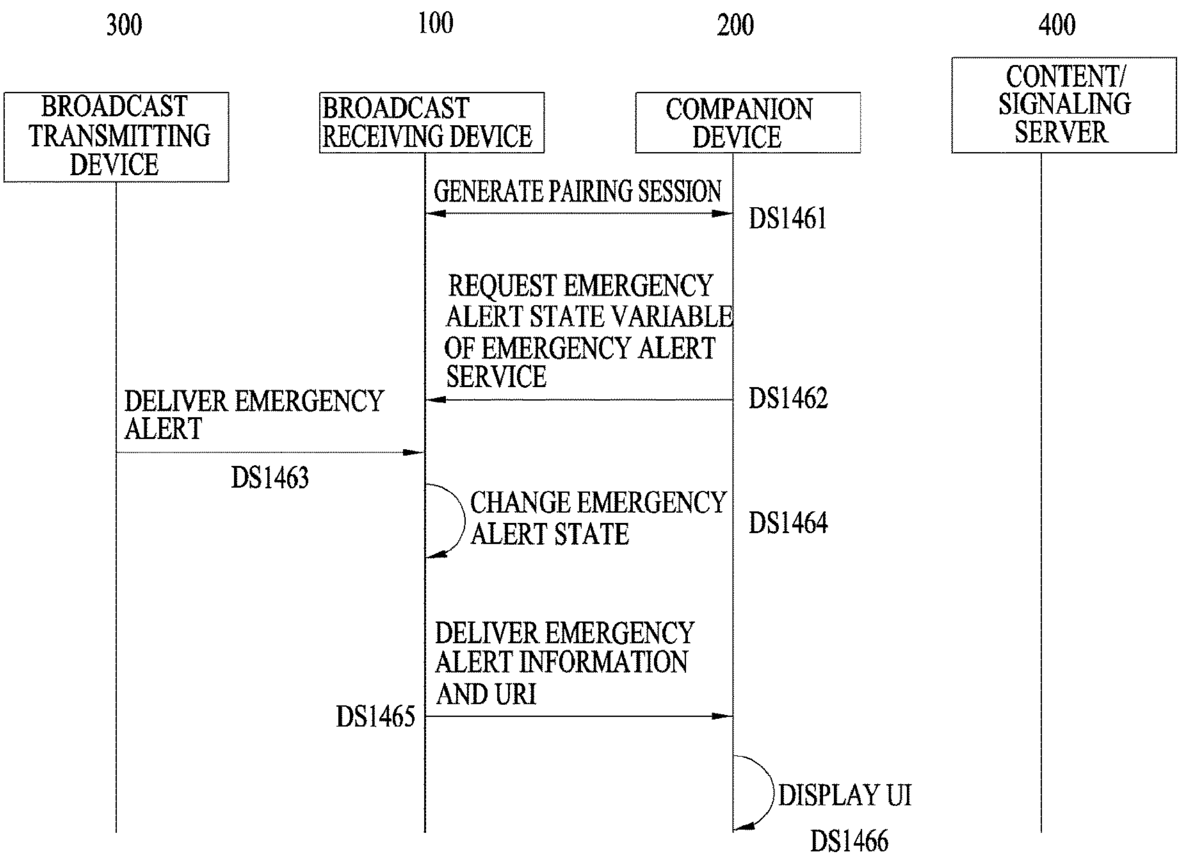
Figure 244:
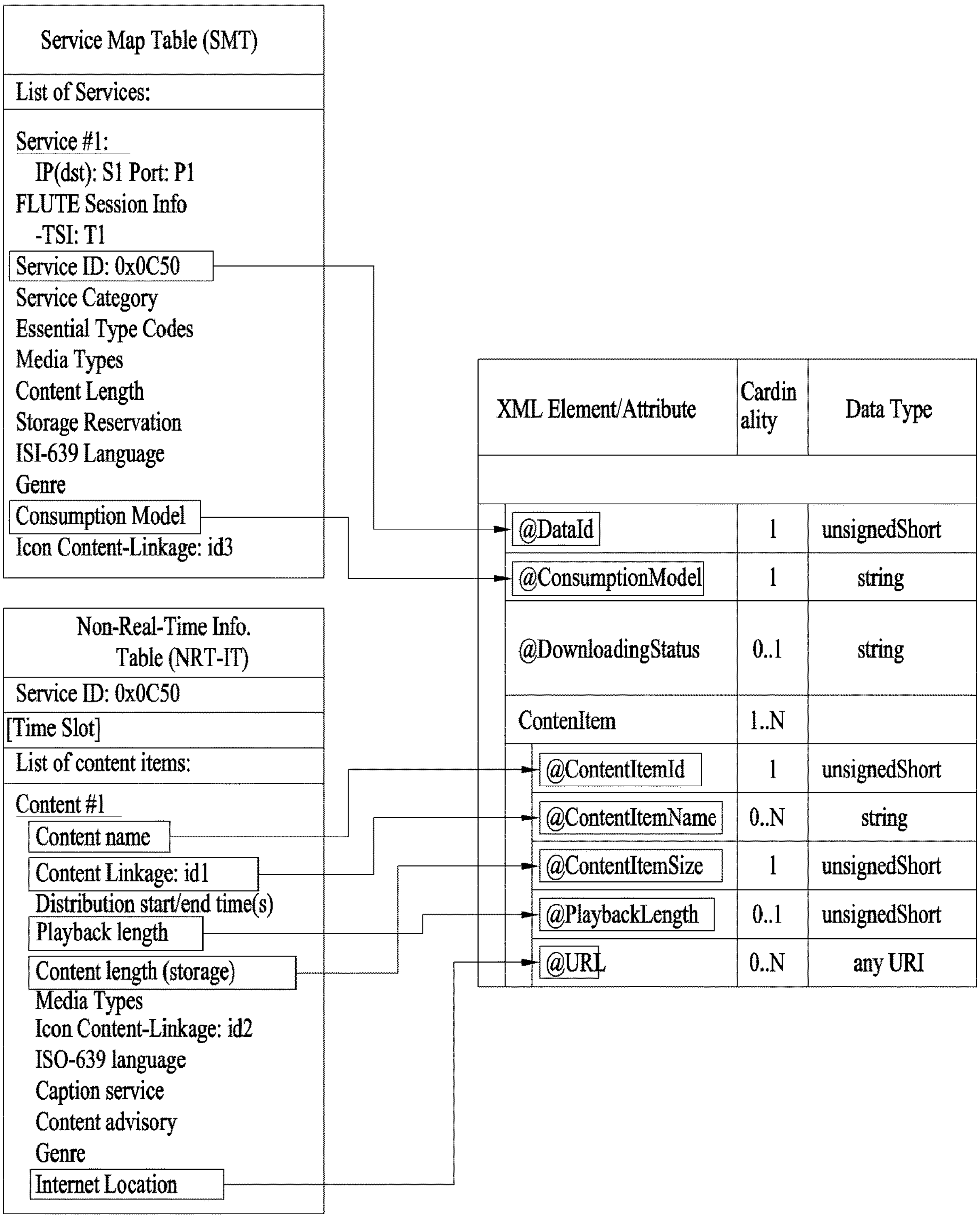
Figure 246:
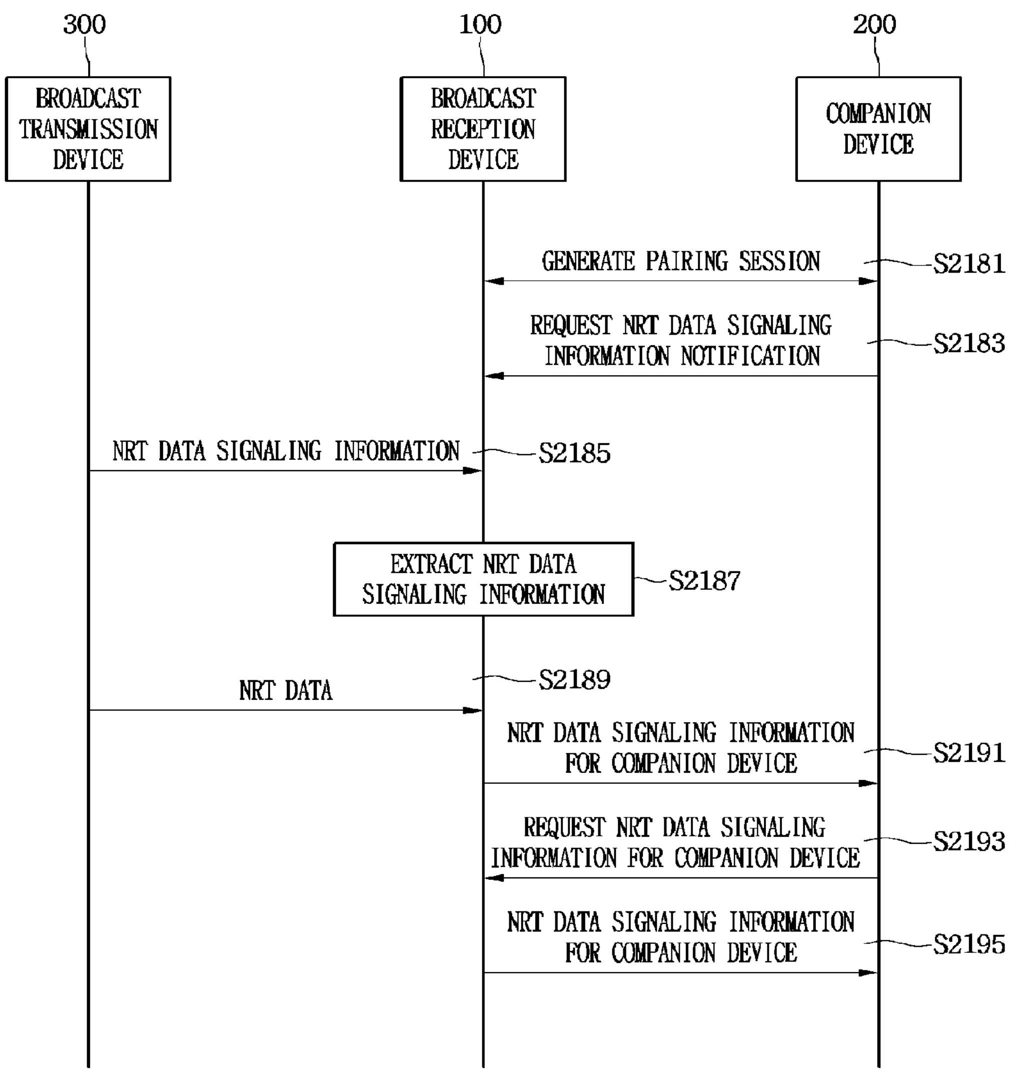
Figure 247:
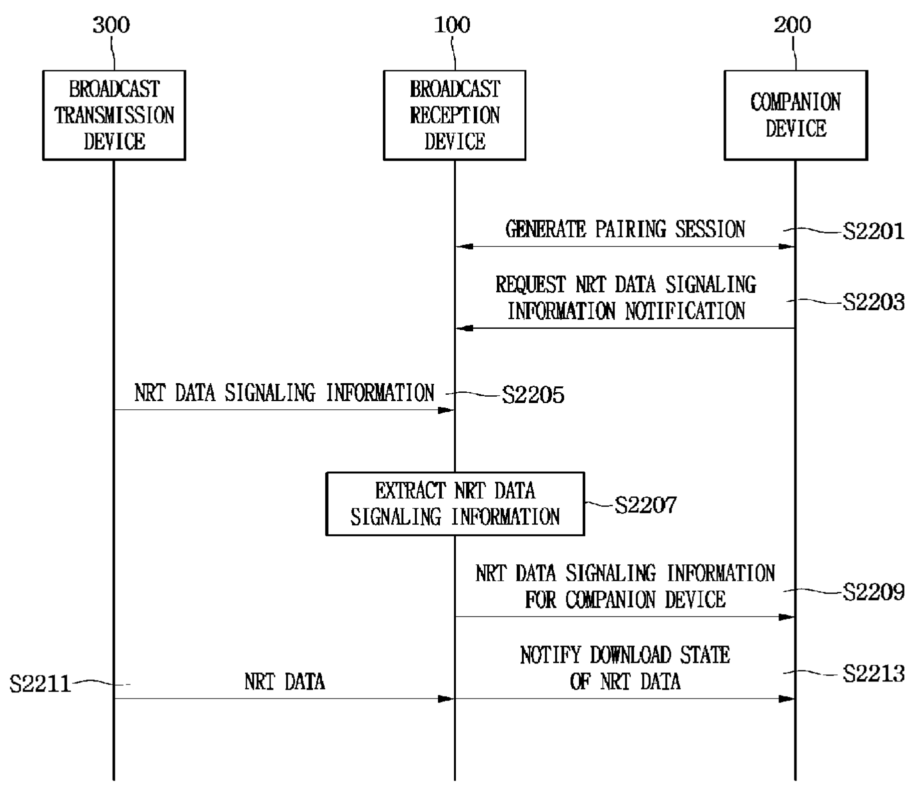
Figure 251:
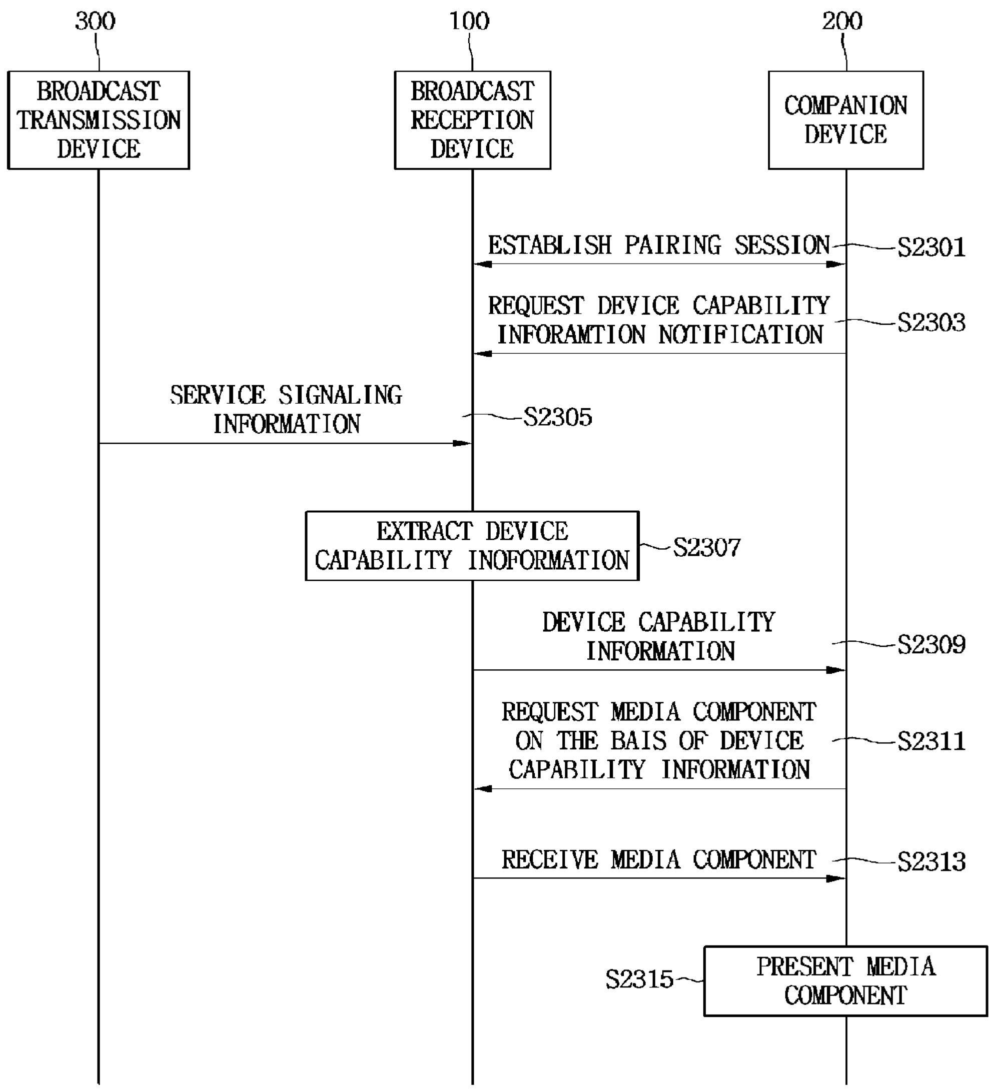
Figure 252:
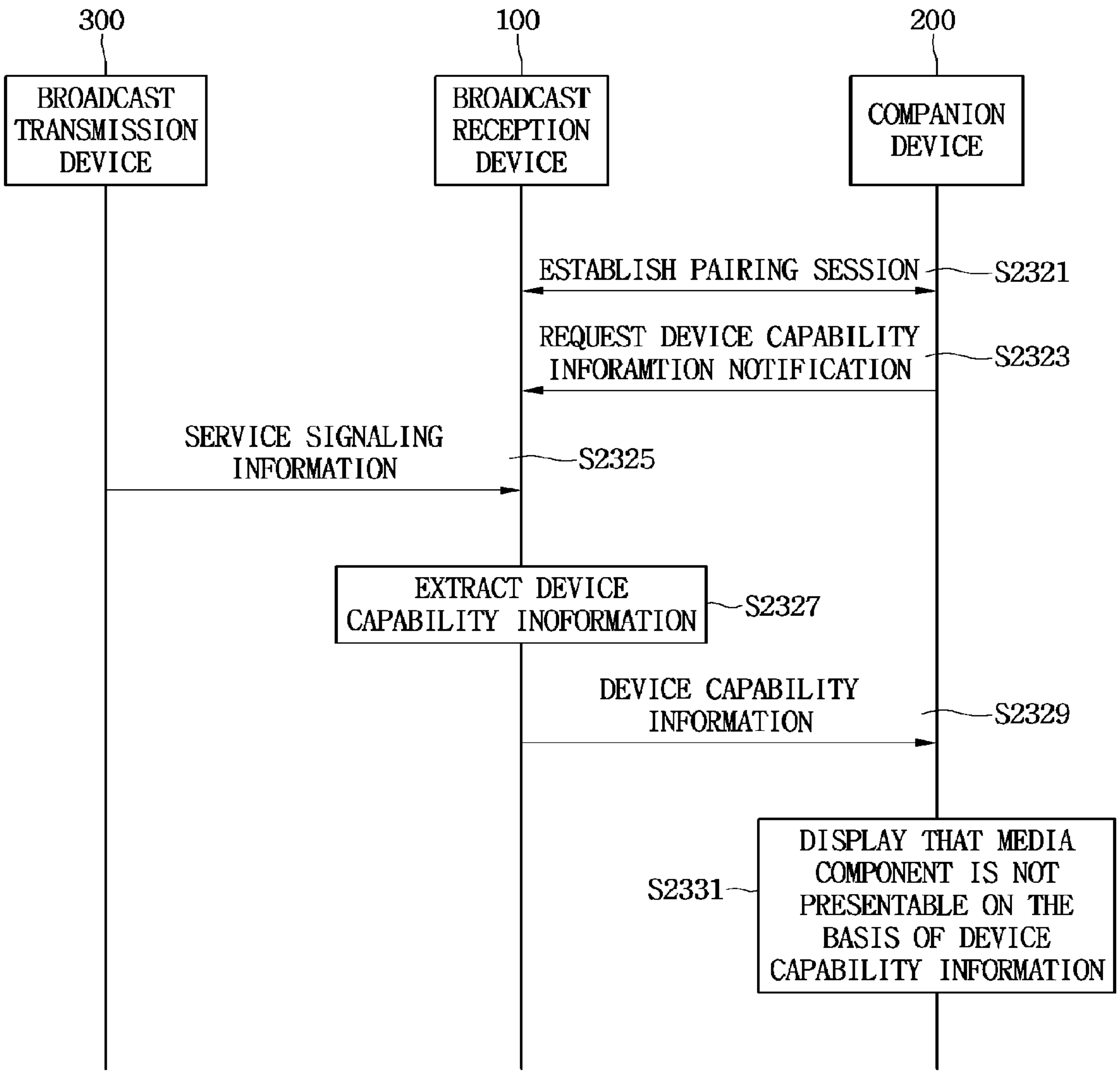
Figure 253:
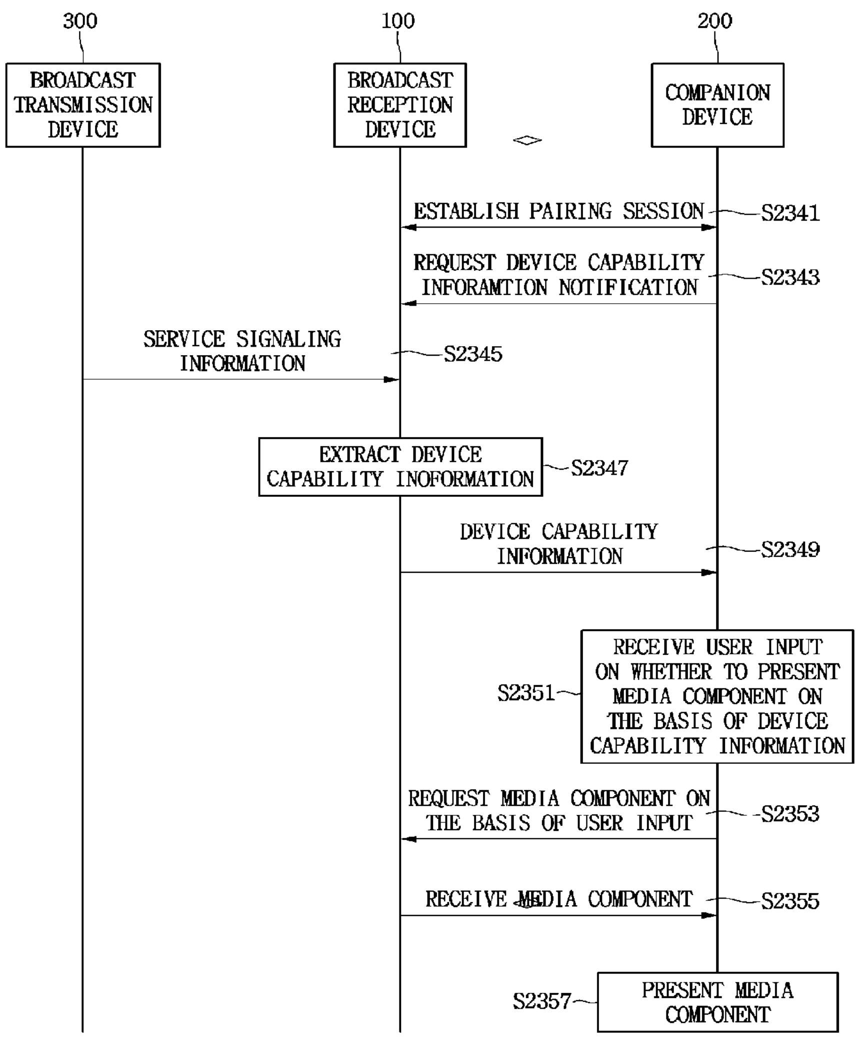
Figure 254:
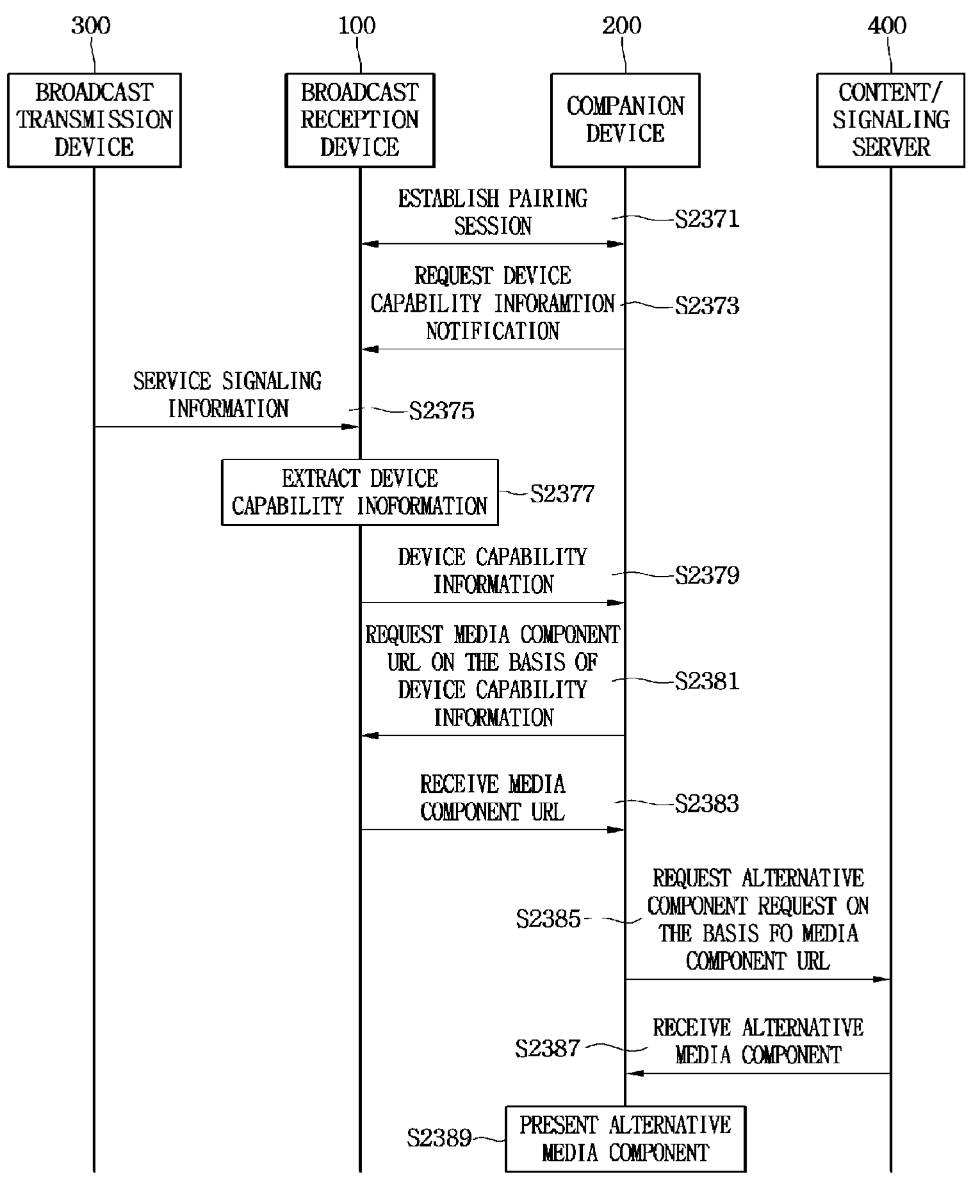
Figure 256:
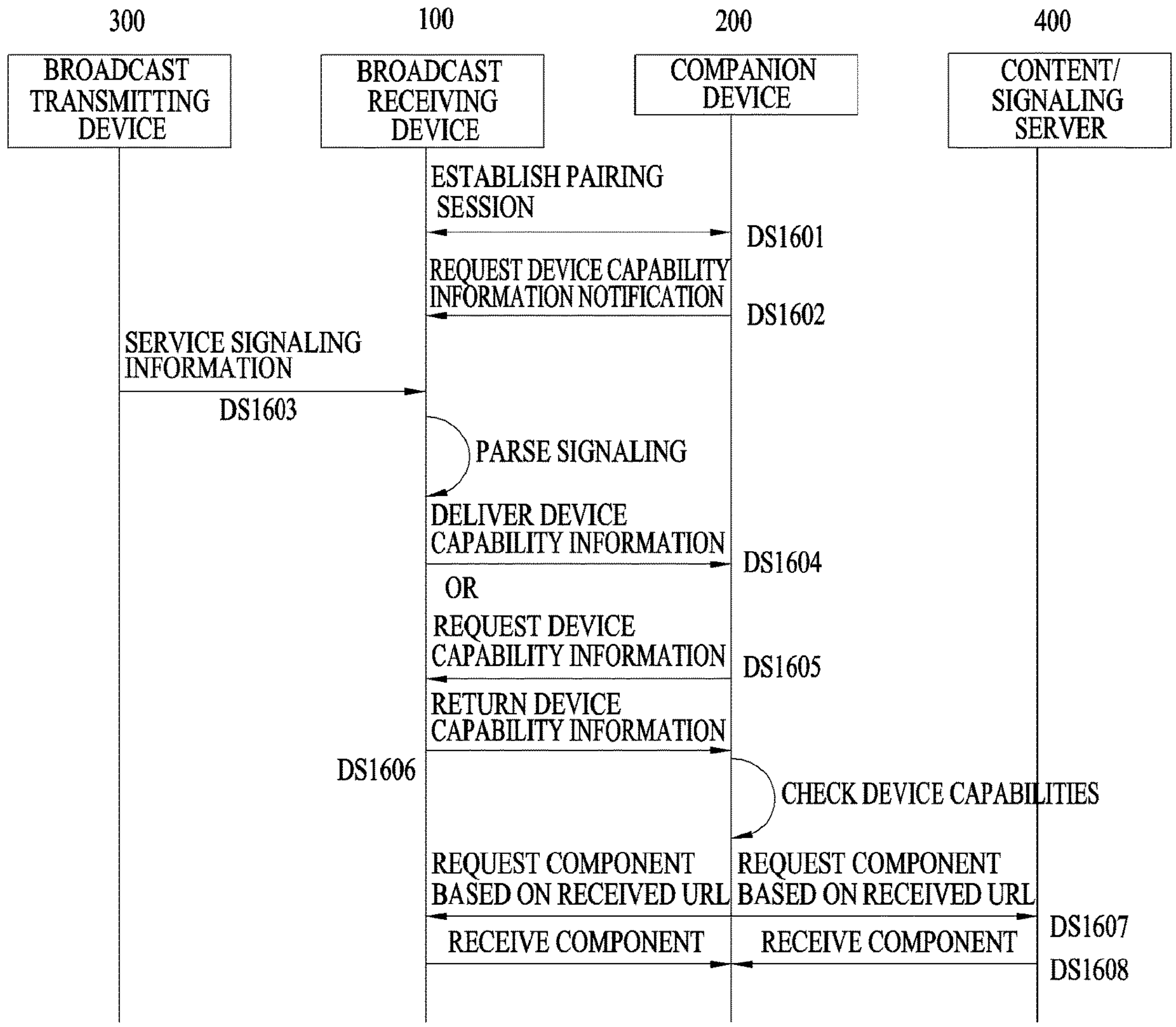
Figure 257:
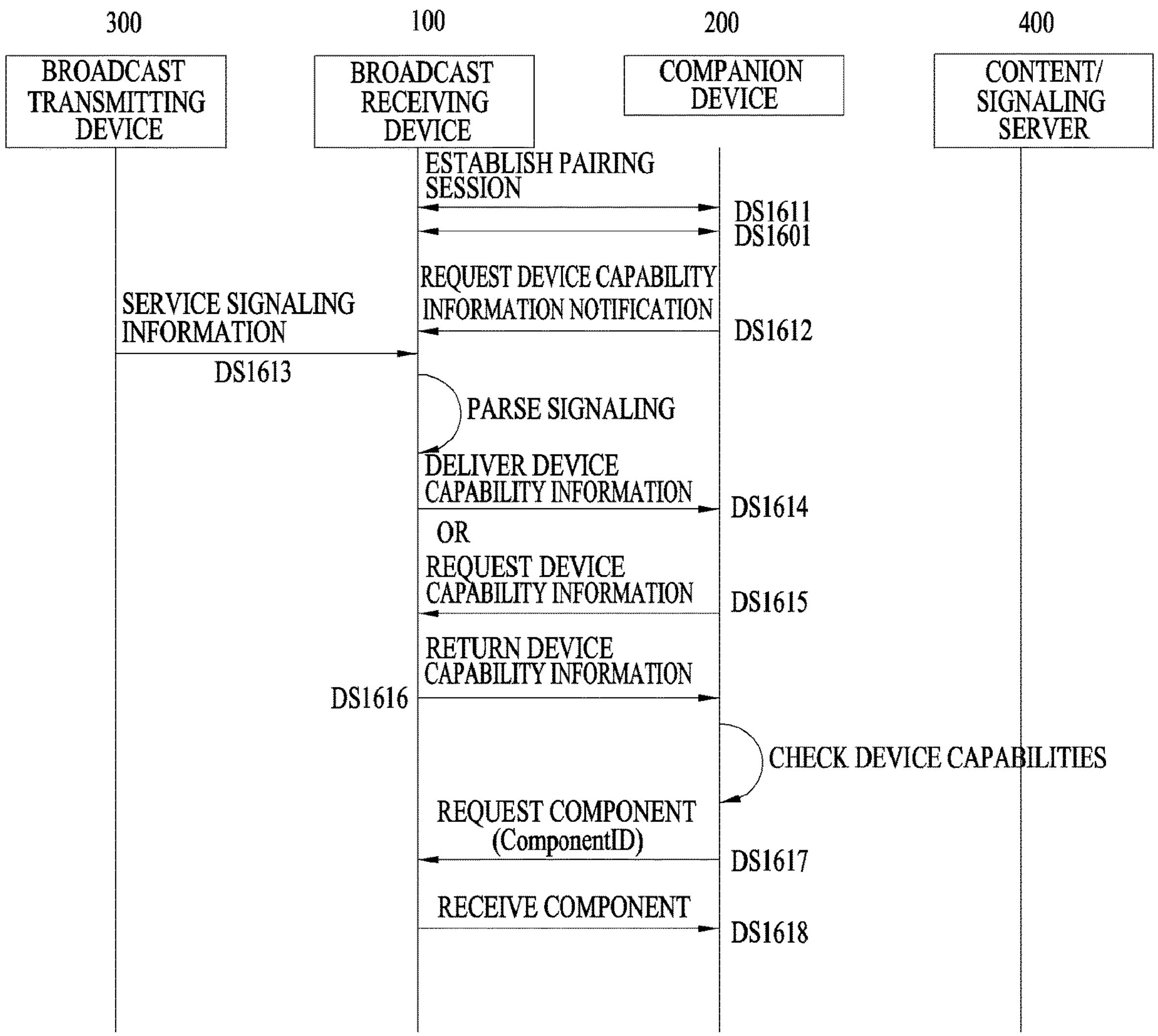
Figure 258:
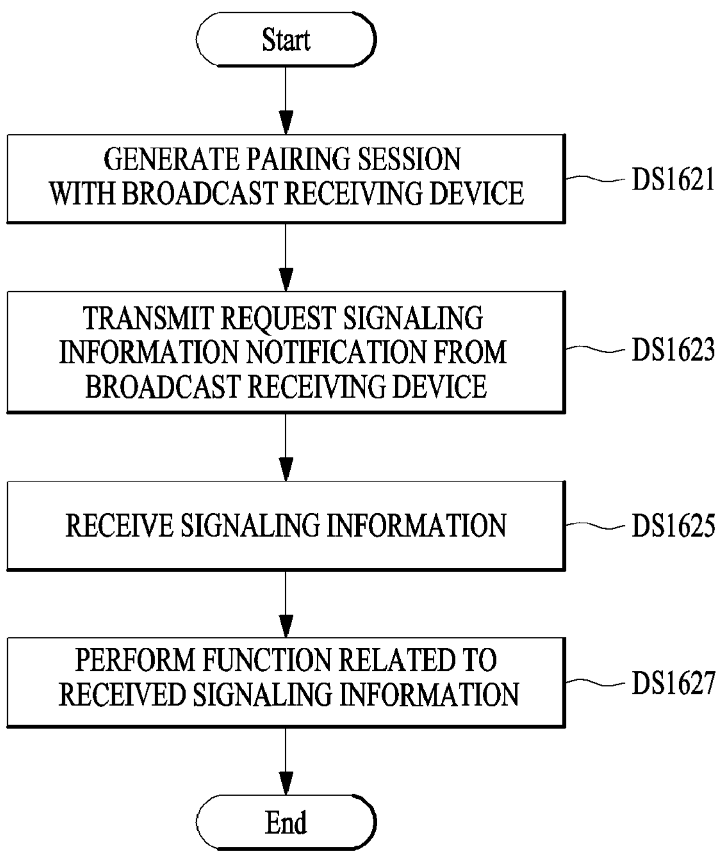
Figure 259:
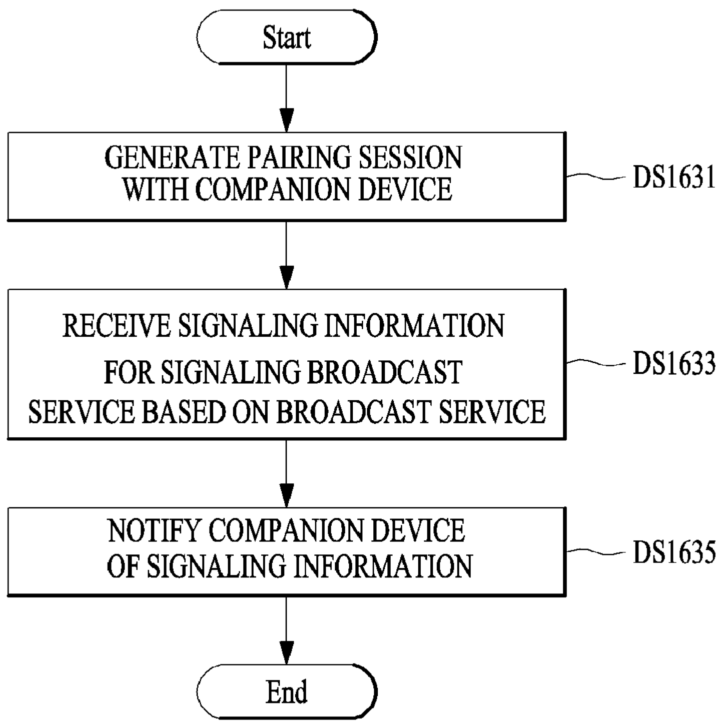
Figure 260:
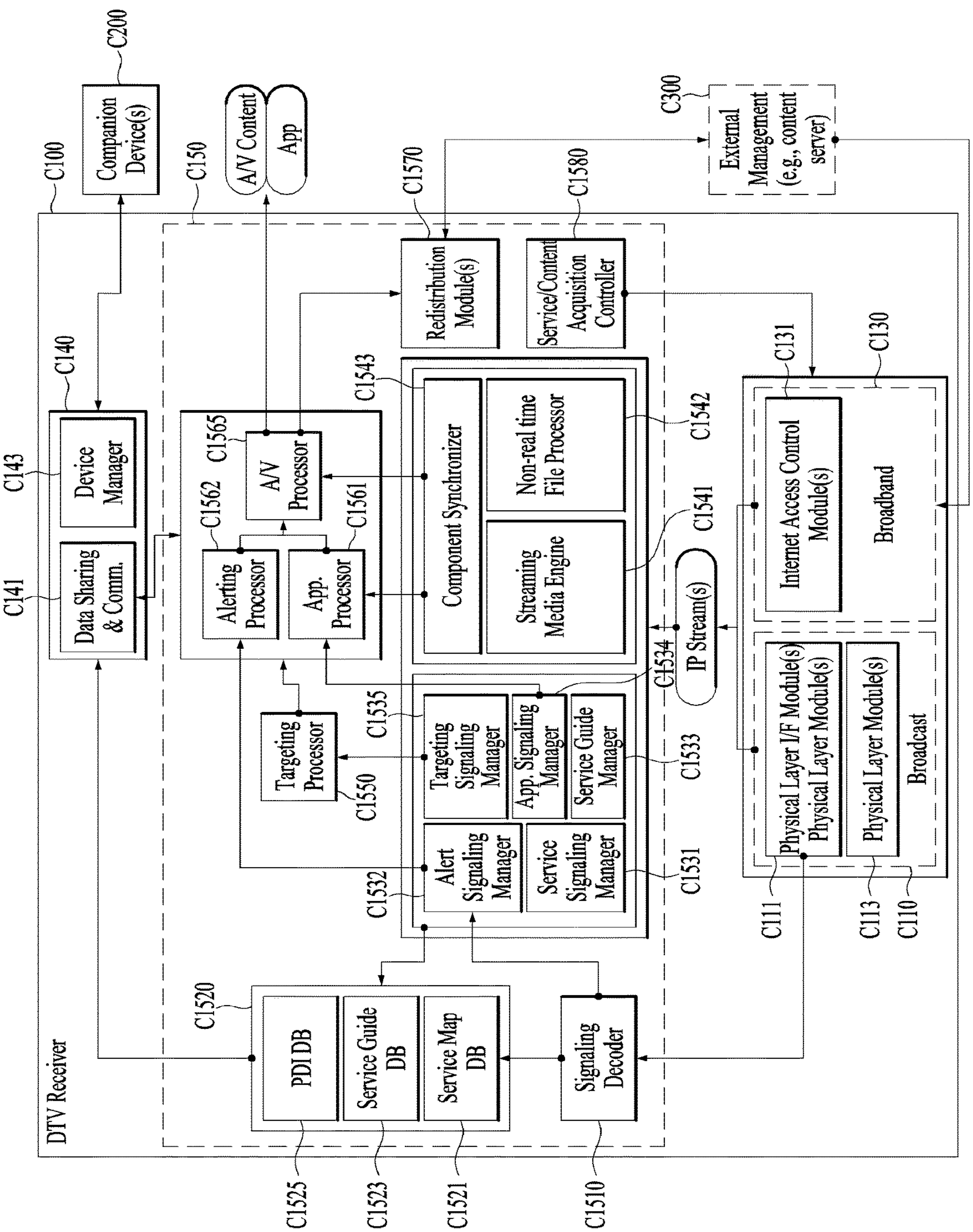
Figure 261:
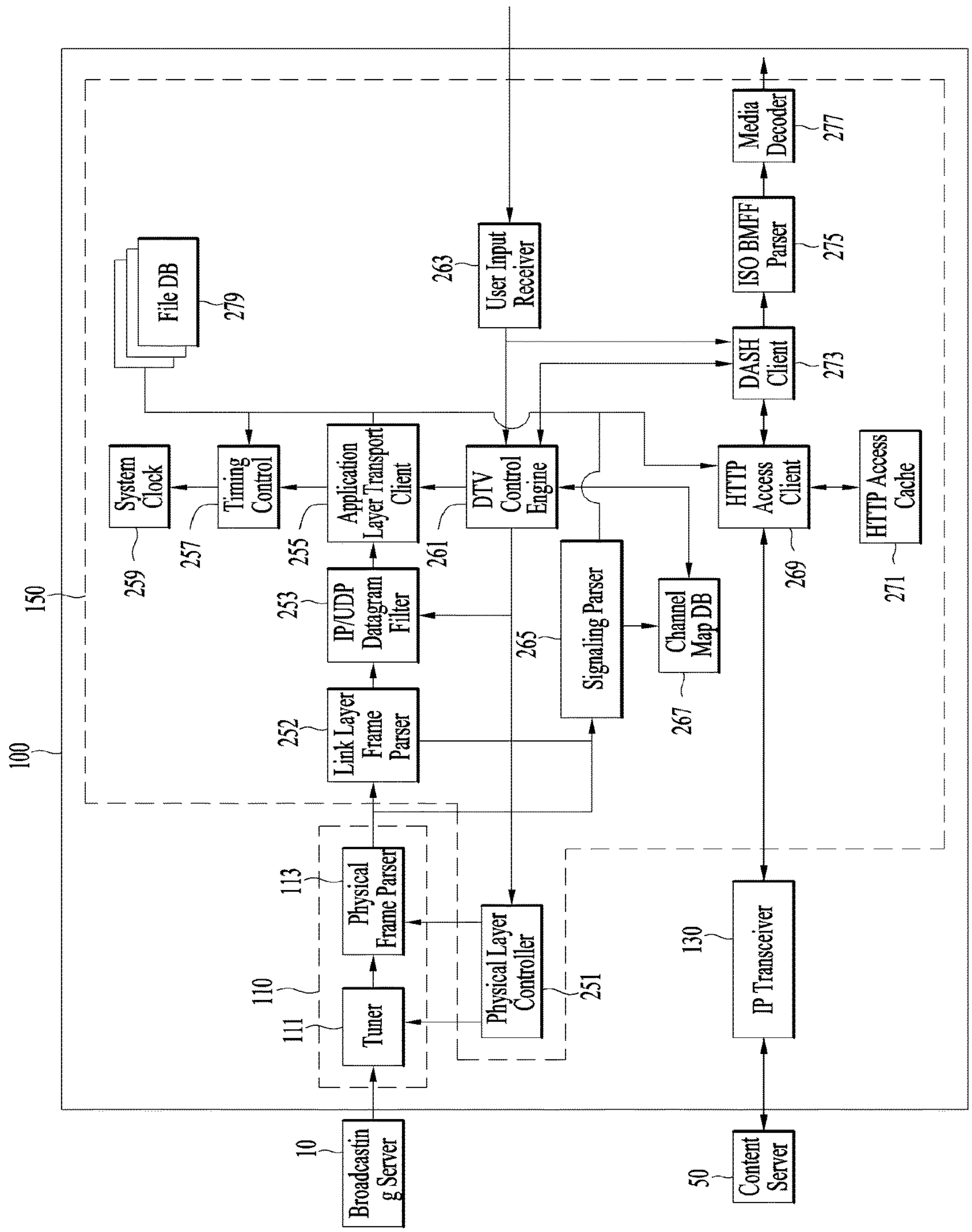
Figure 262:
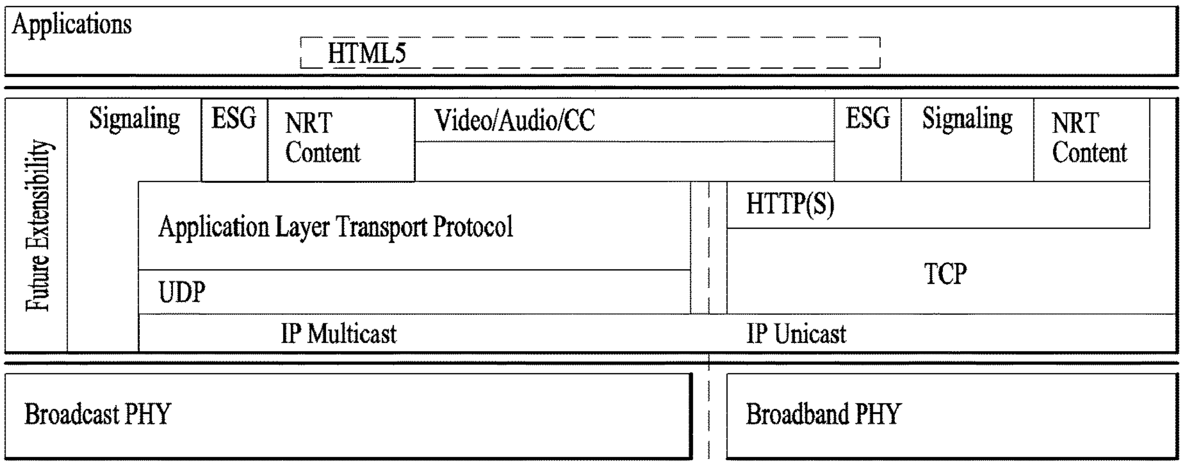
Figure 263:
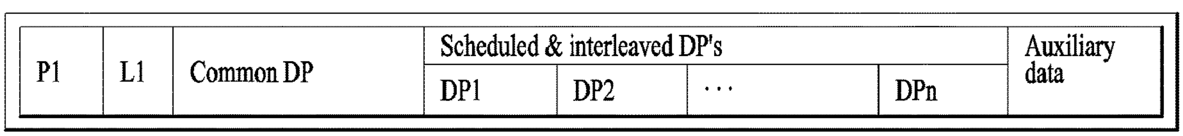
Figure 264:
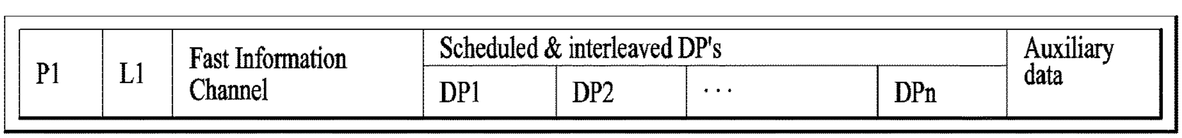
Figure 265:
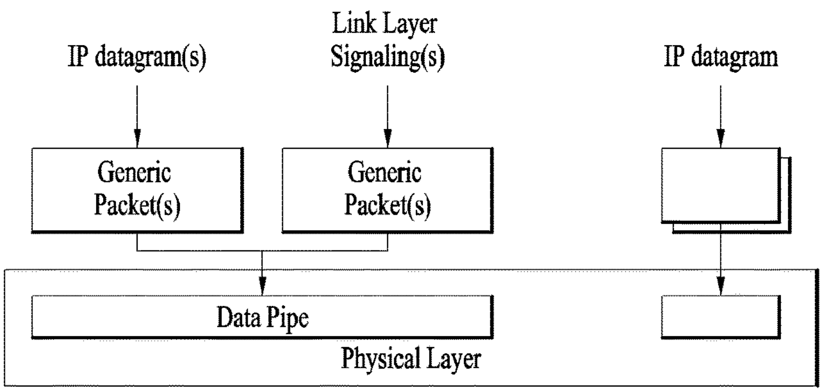
Figure 266:
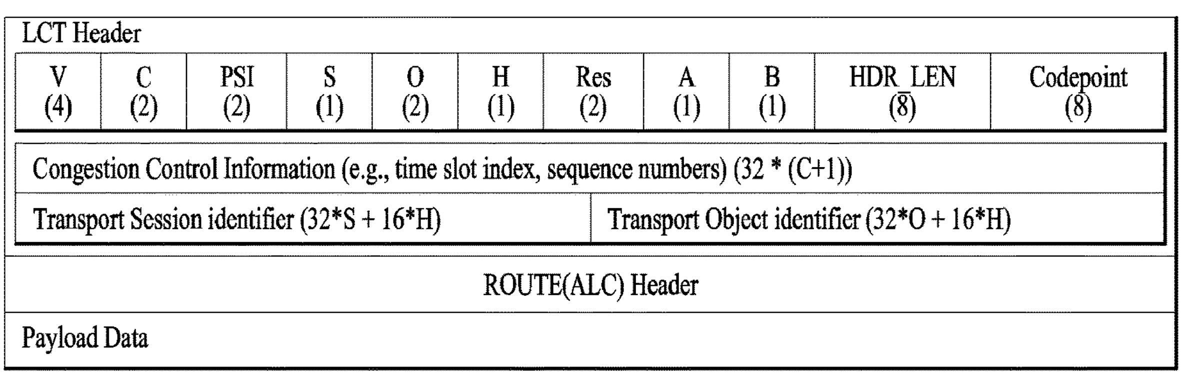
Figure 267:
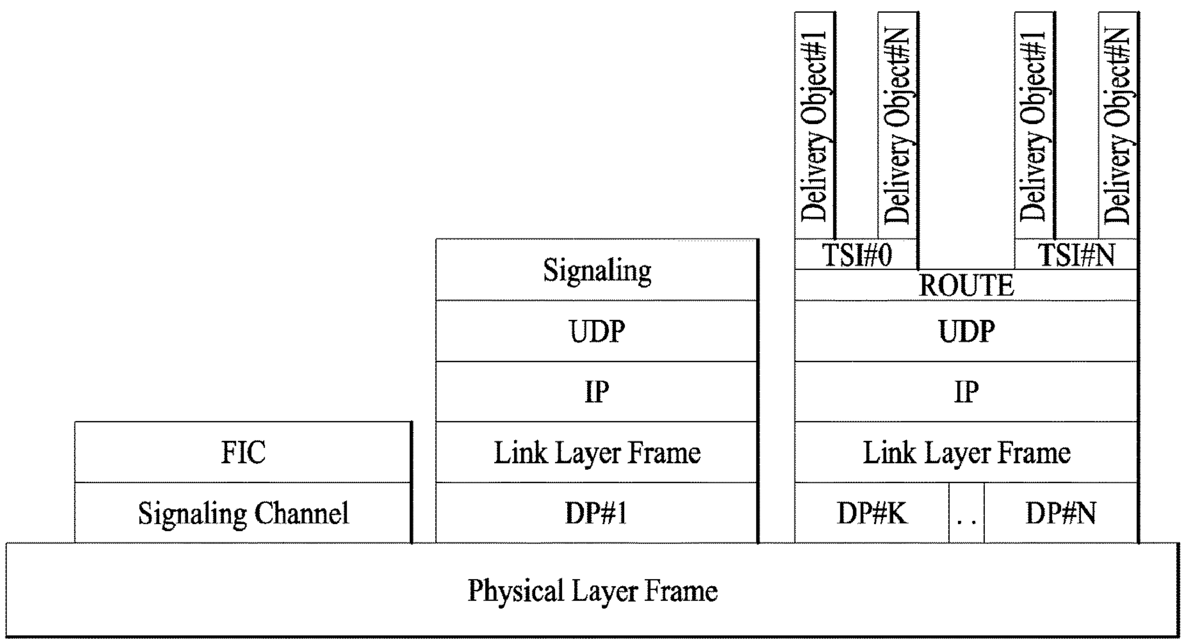
Figure 268:
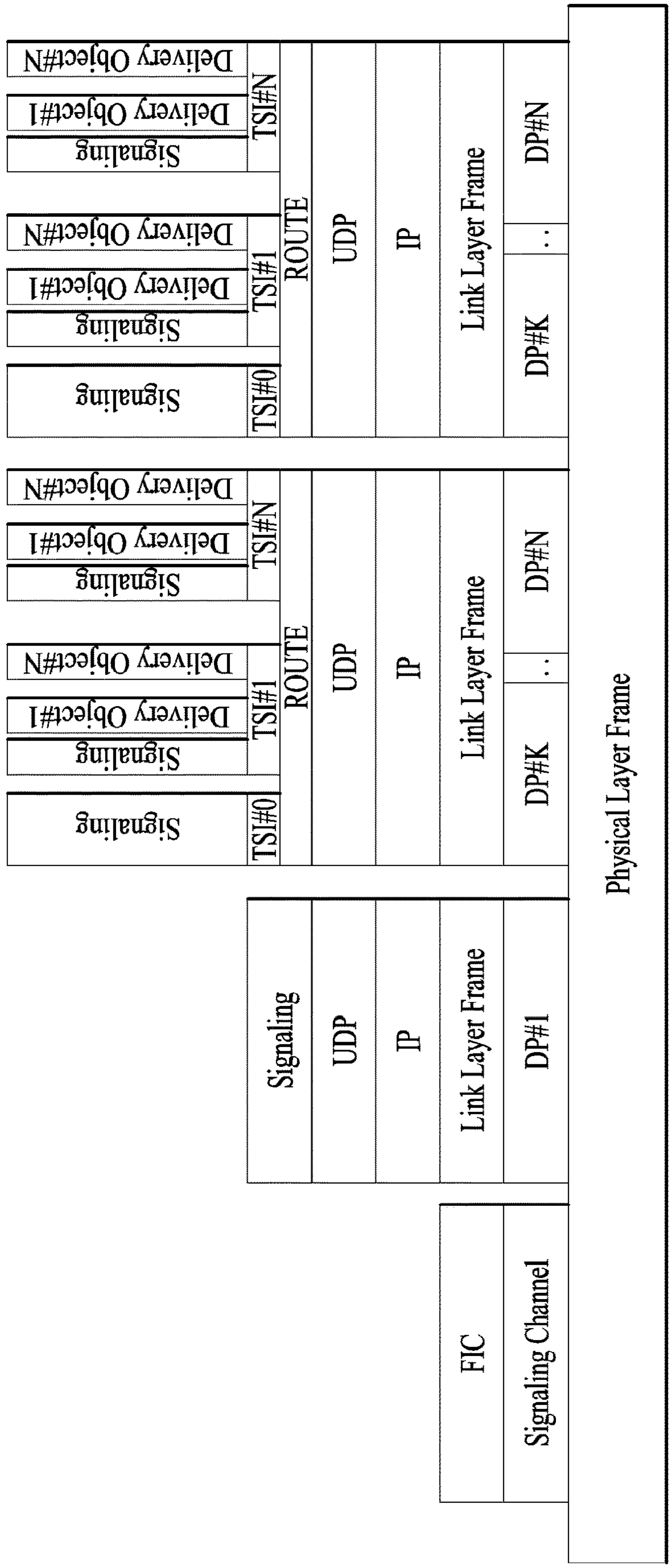
Figure 269:
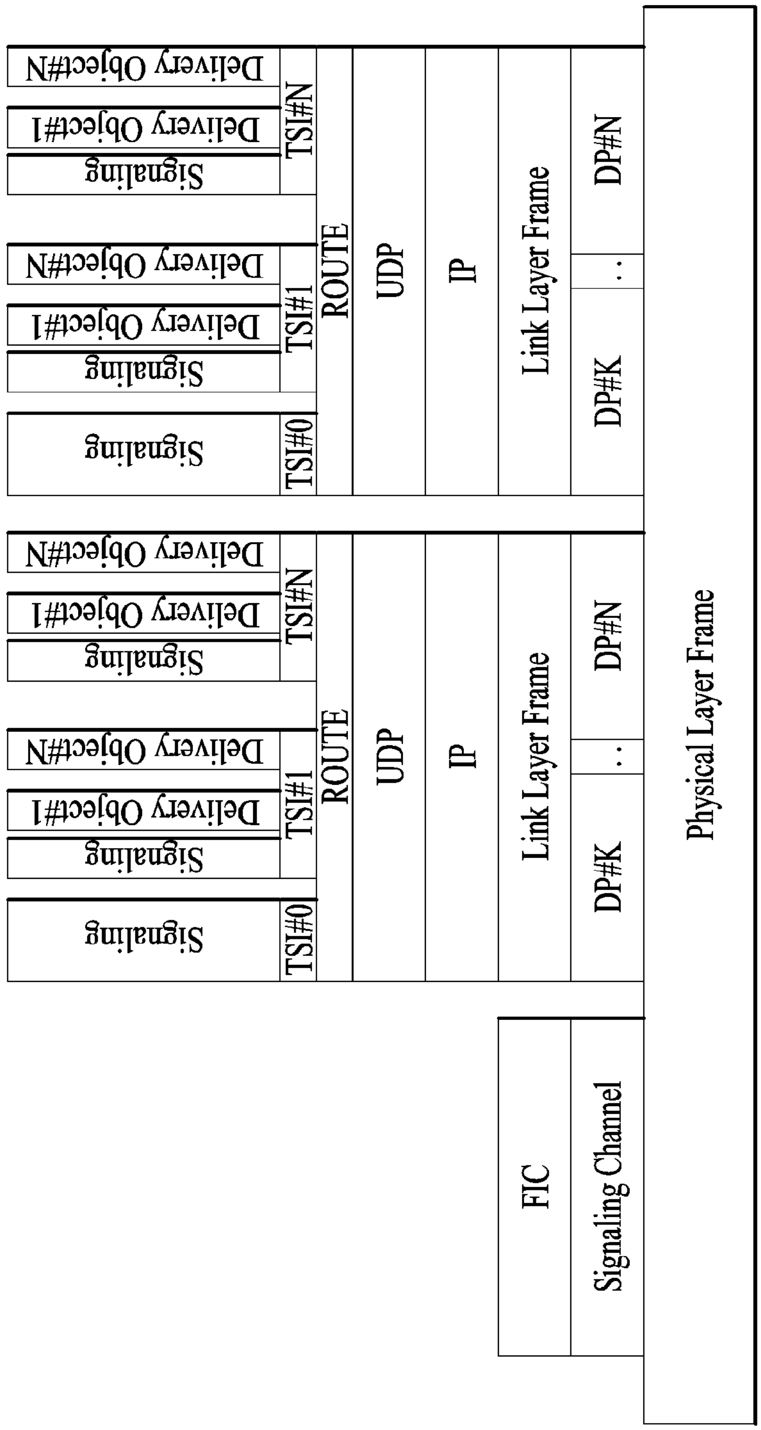
Figure 271:
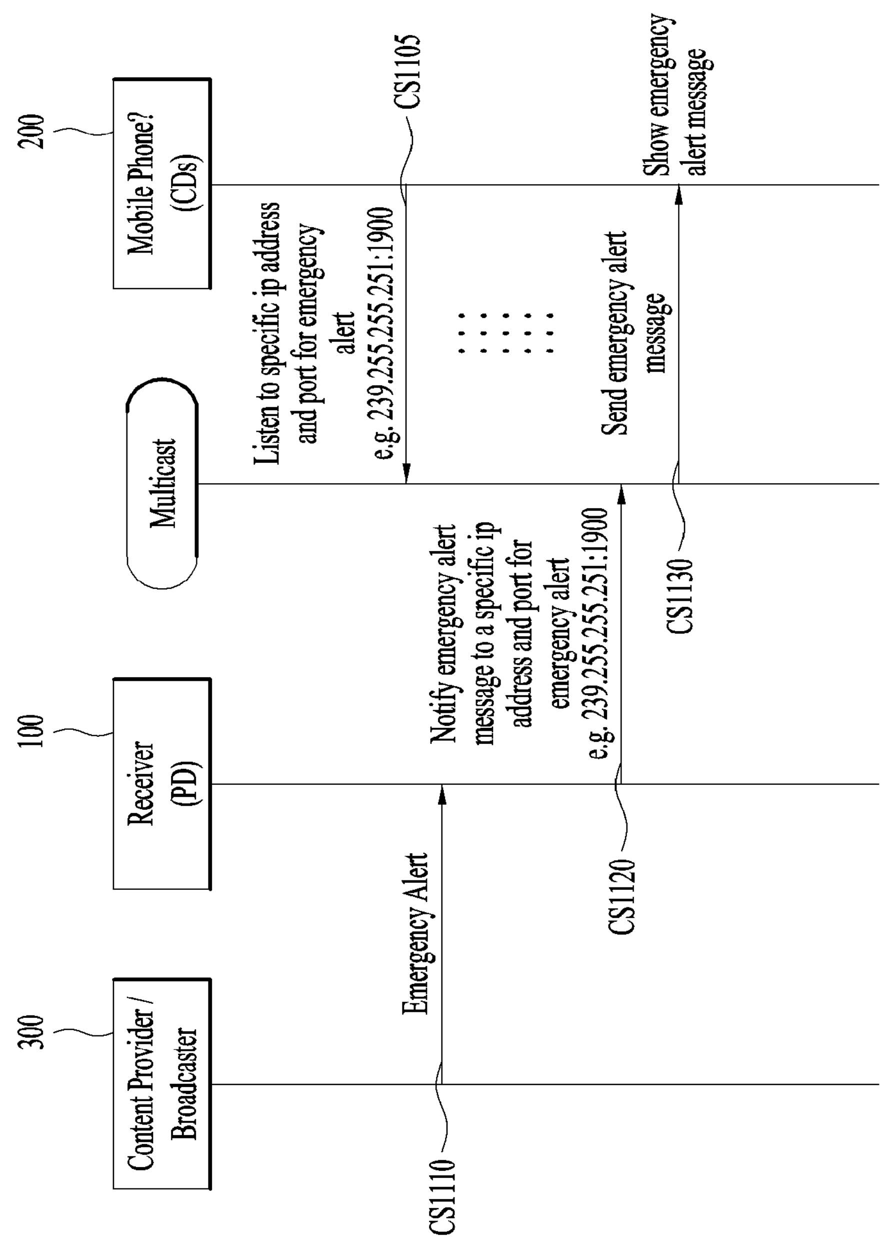
Figure 276:
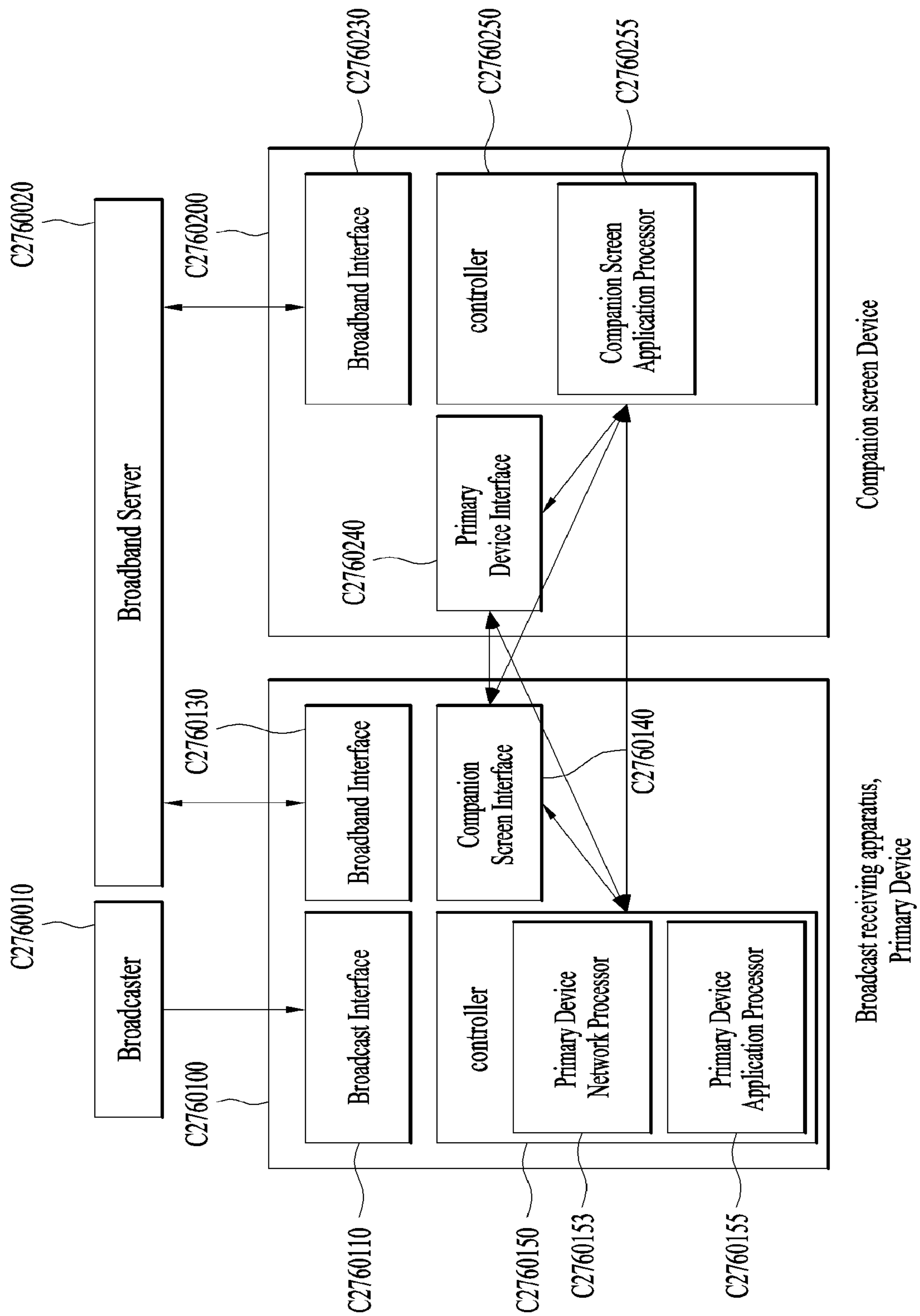
Figure 277:
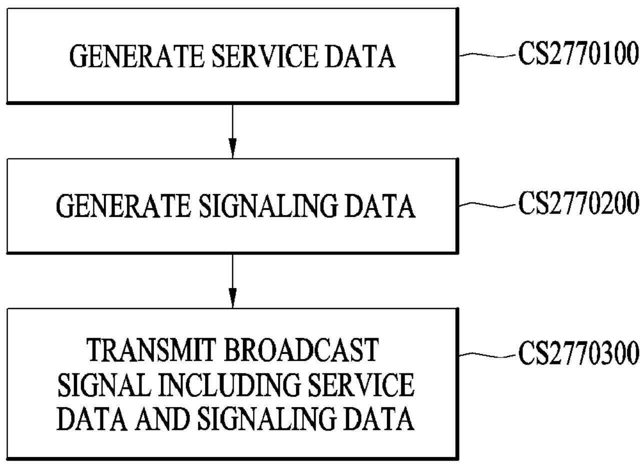
Figure 278:
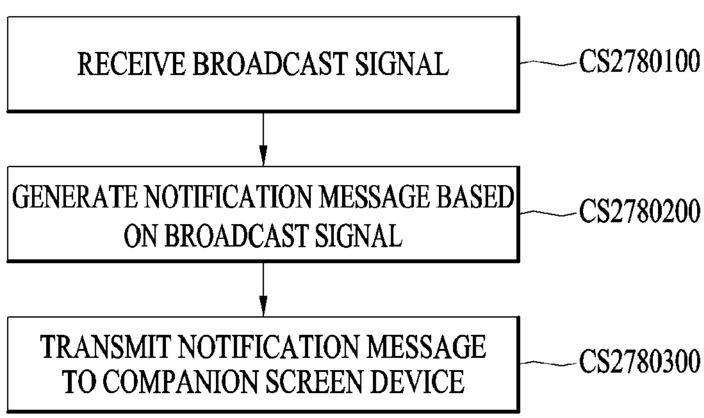
Figure 279:
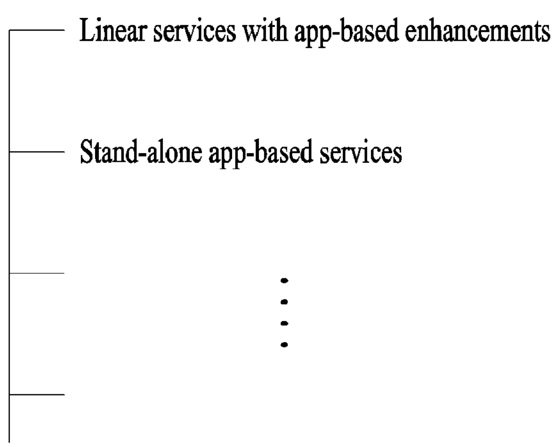
Figure 283:
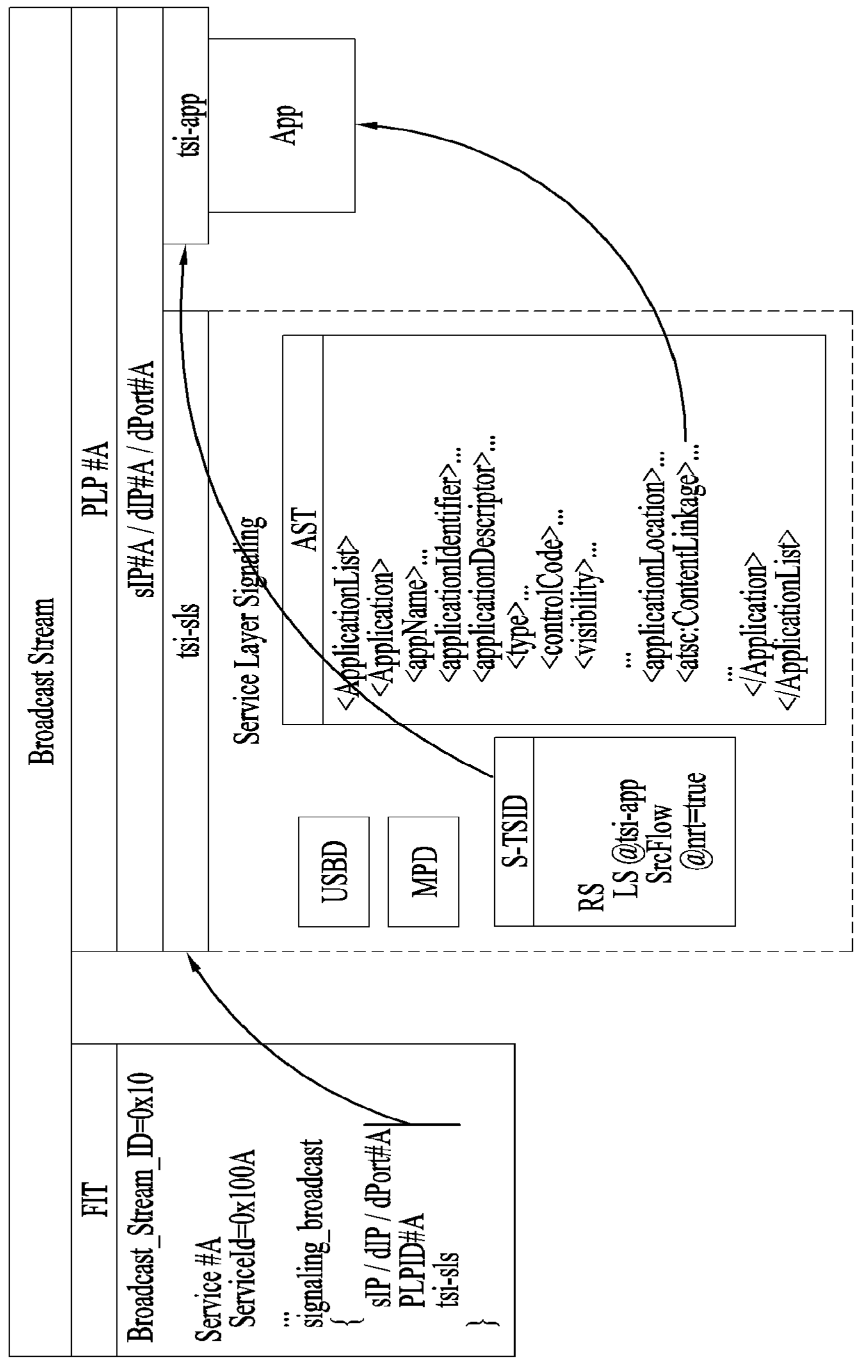
Figure 284:
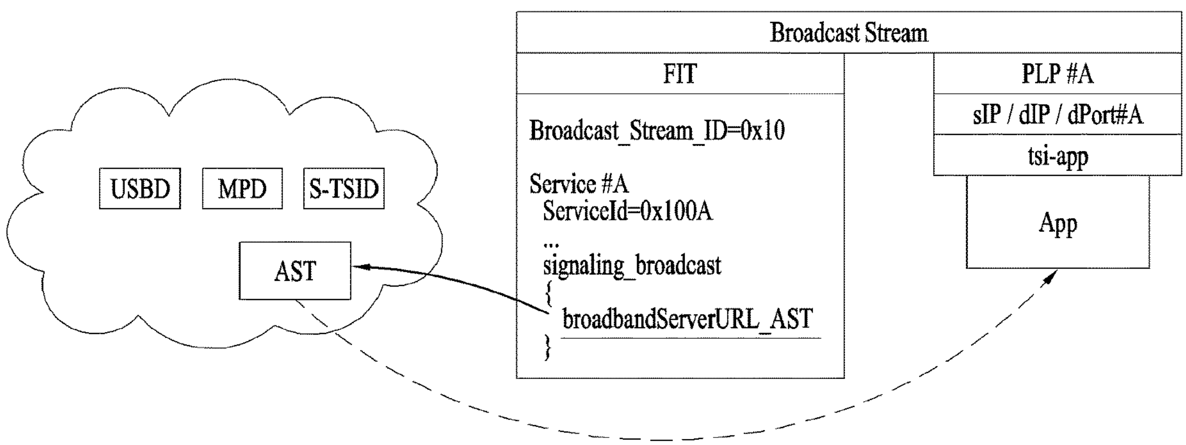
Figure 285:
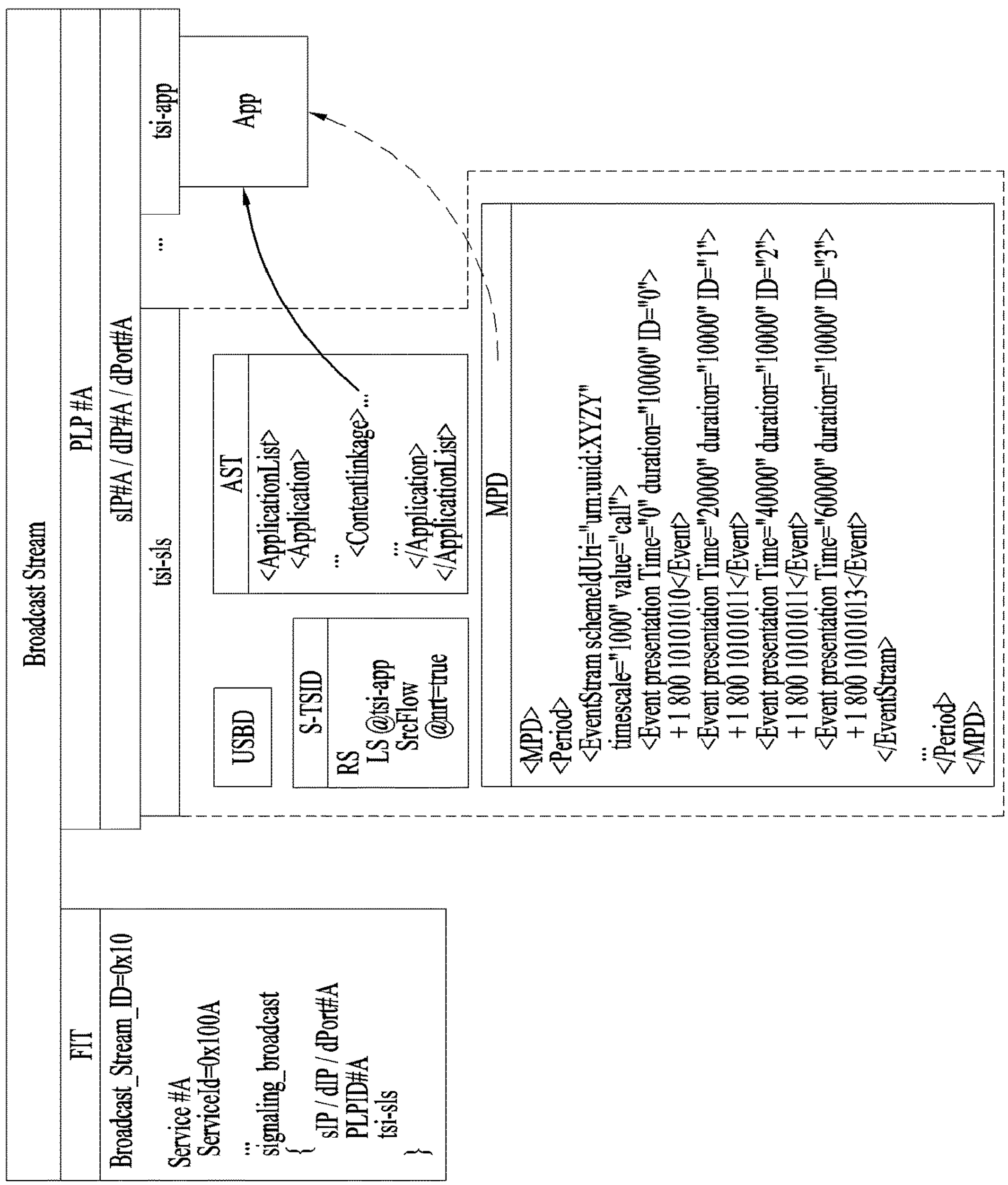
Figure 286:
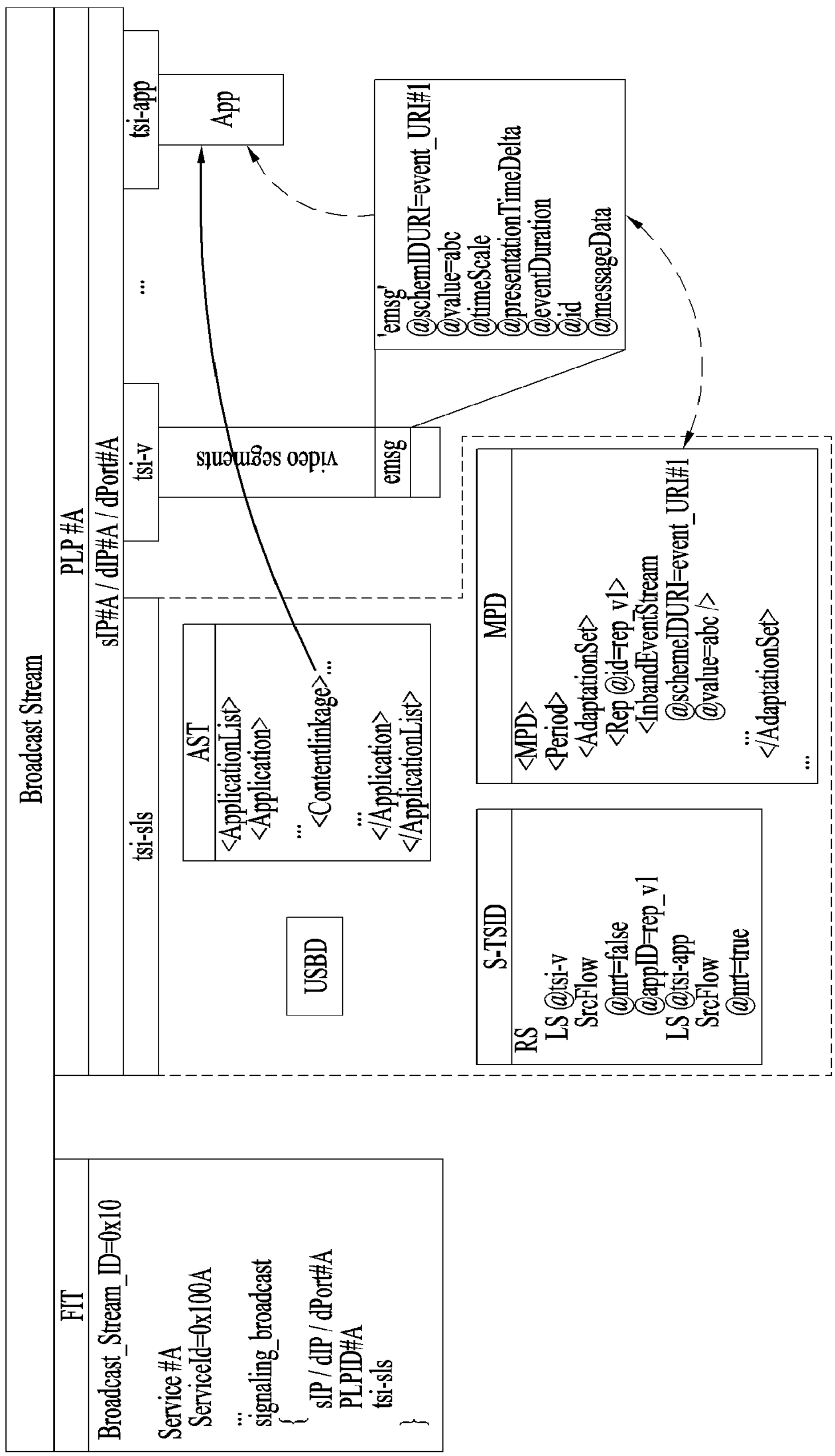
Figure 287:
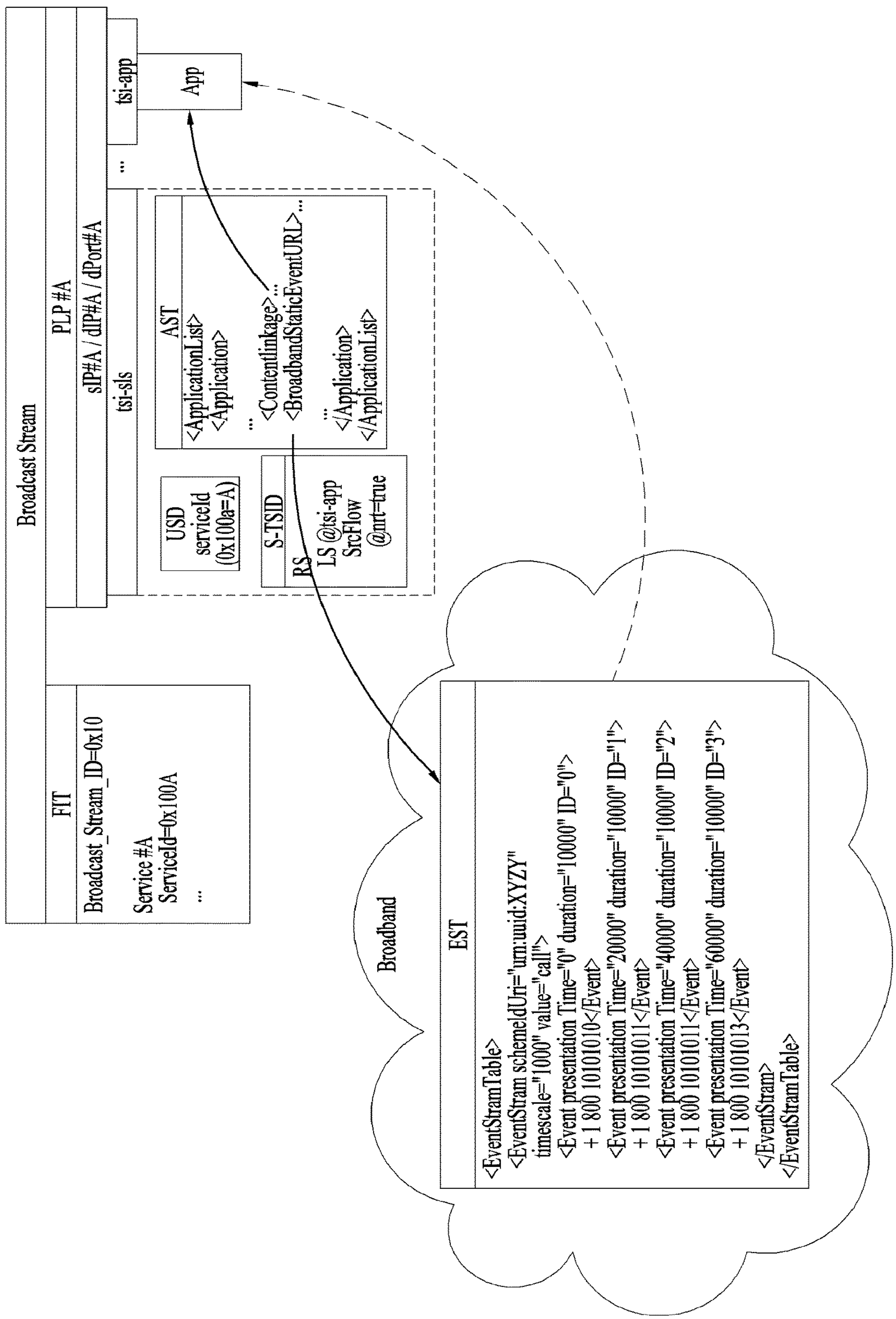
Figure 288:
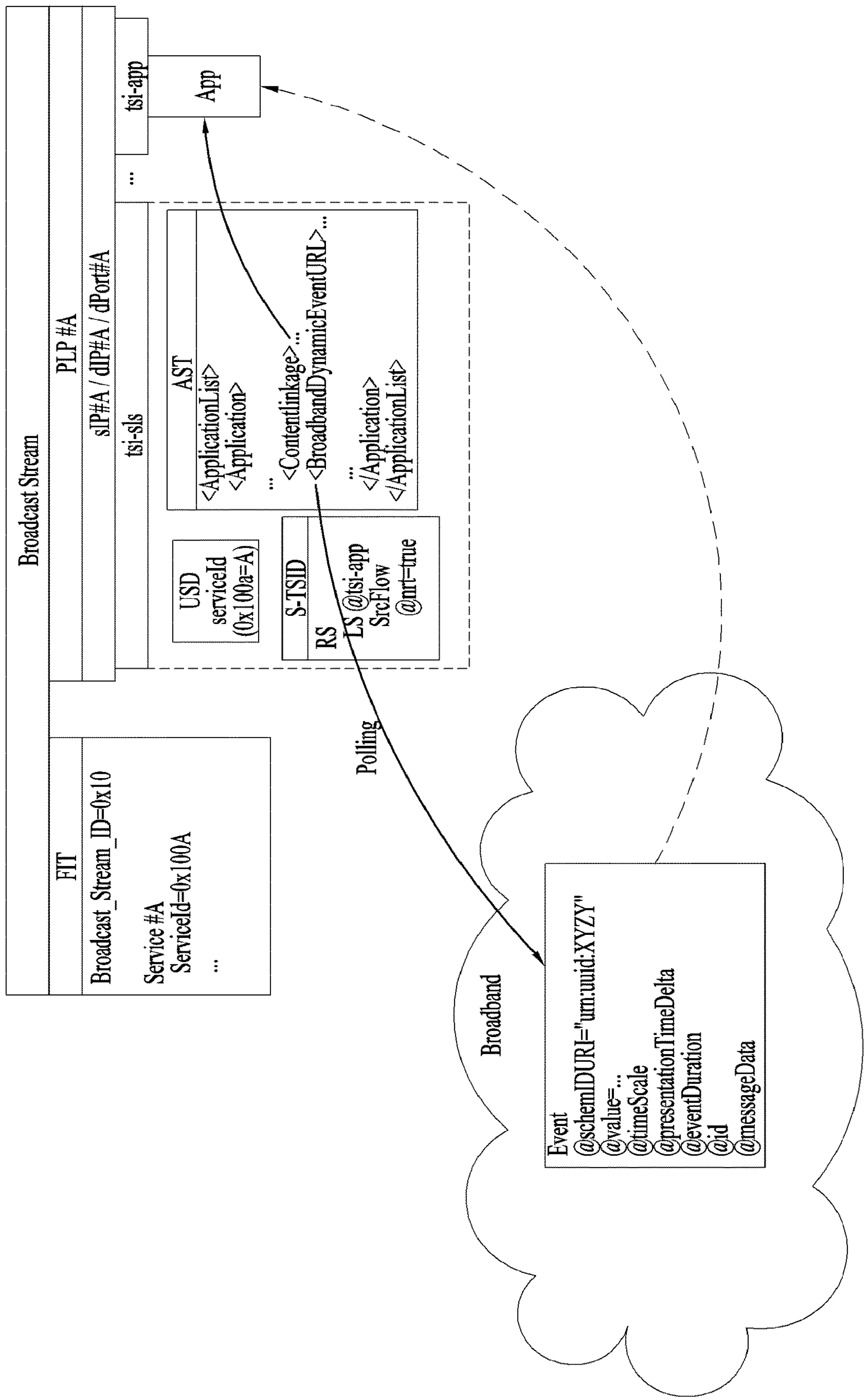
Figures 289, 290:
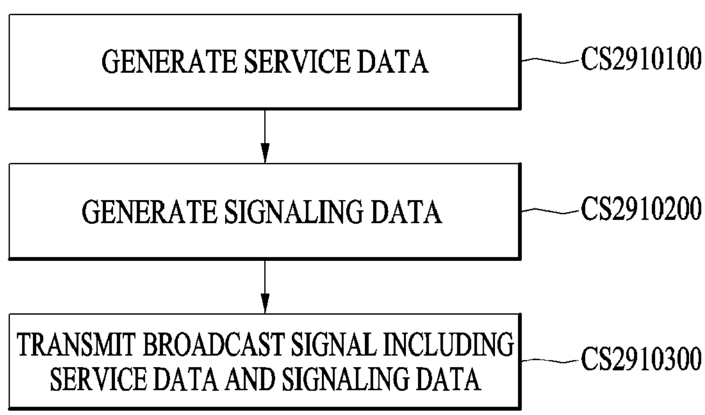
Figure 291:
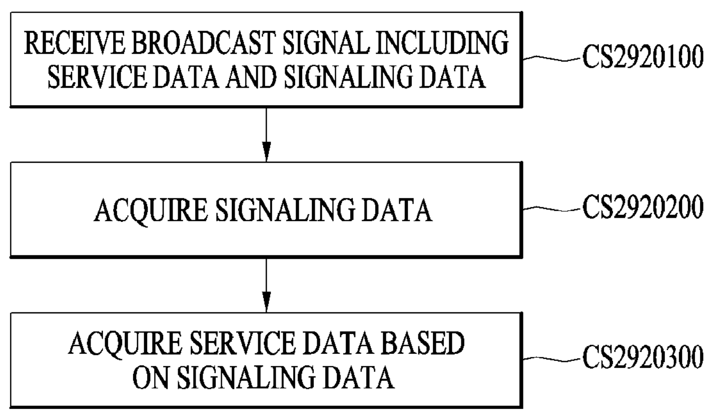
Figure 292:
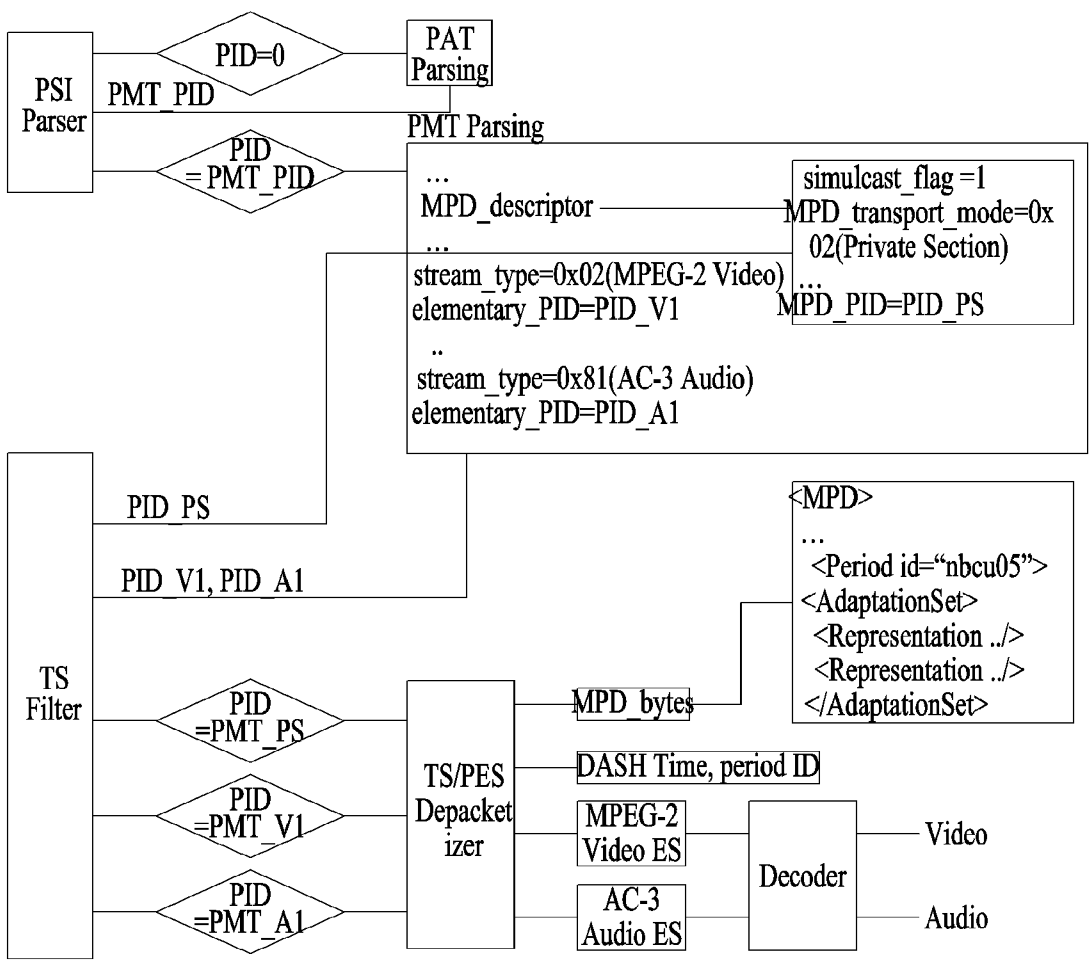
Figure 293:
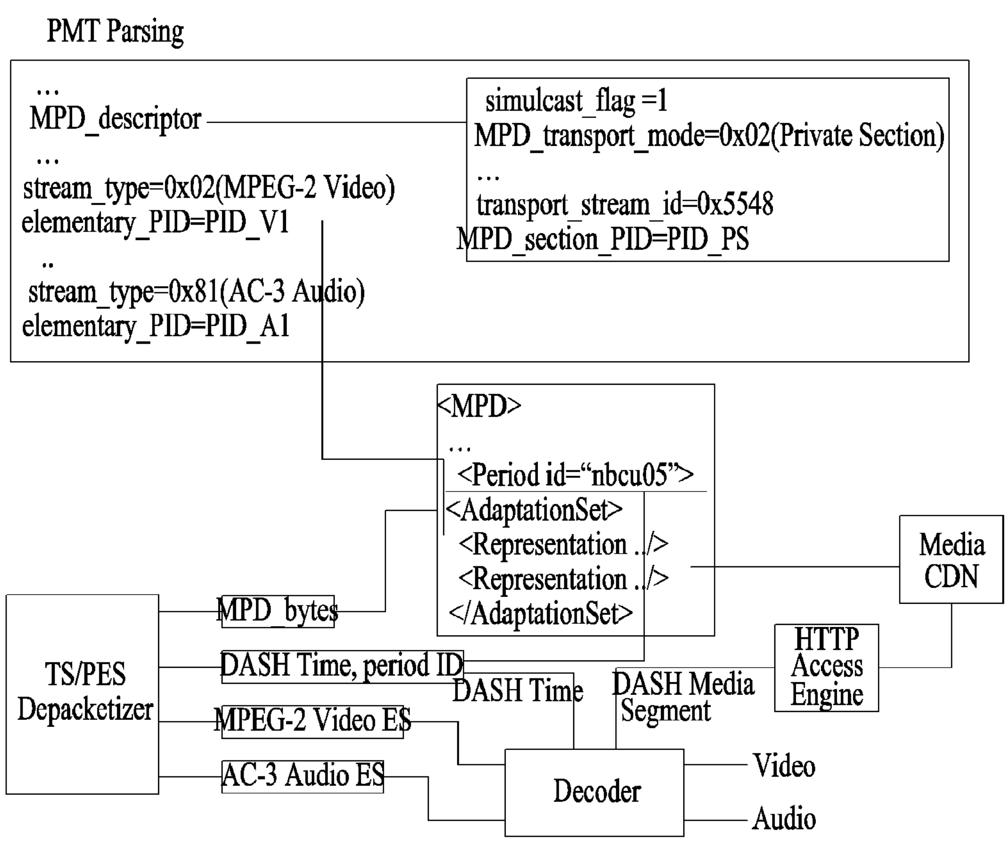
Figure 294:
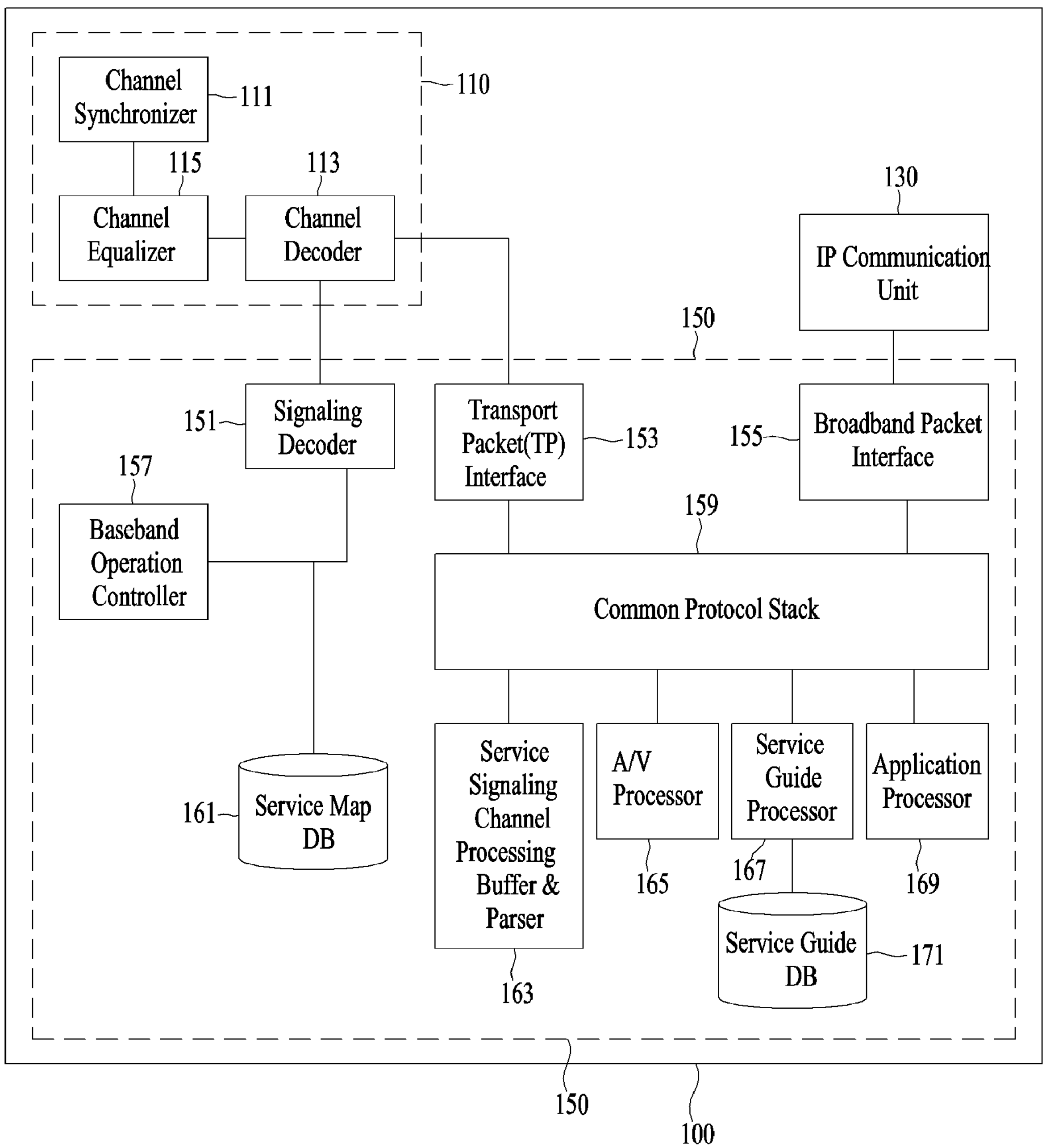
Figure 295:
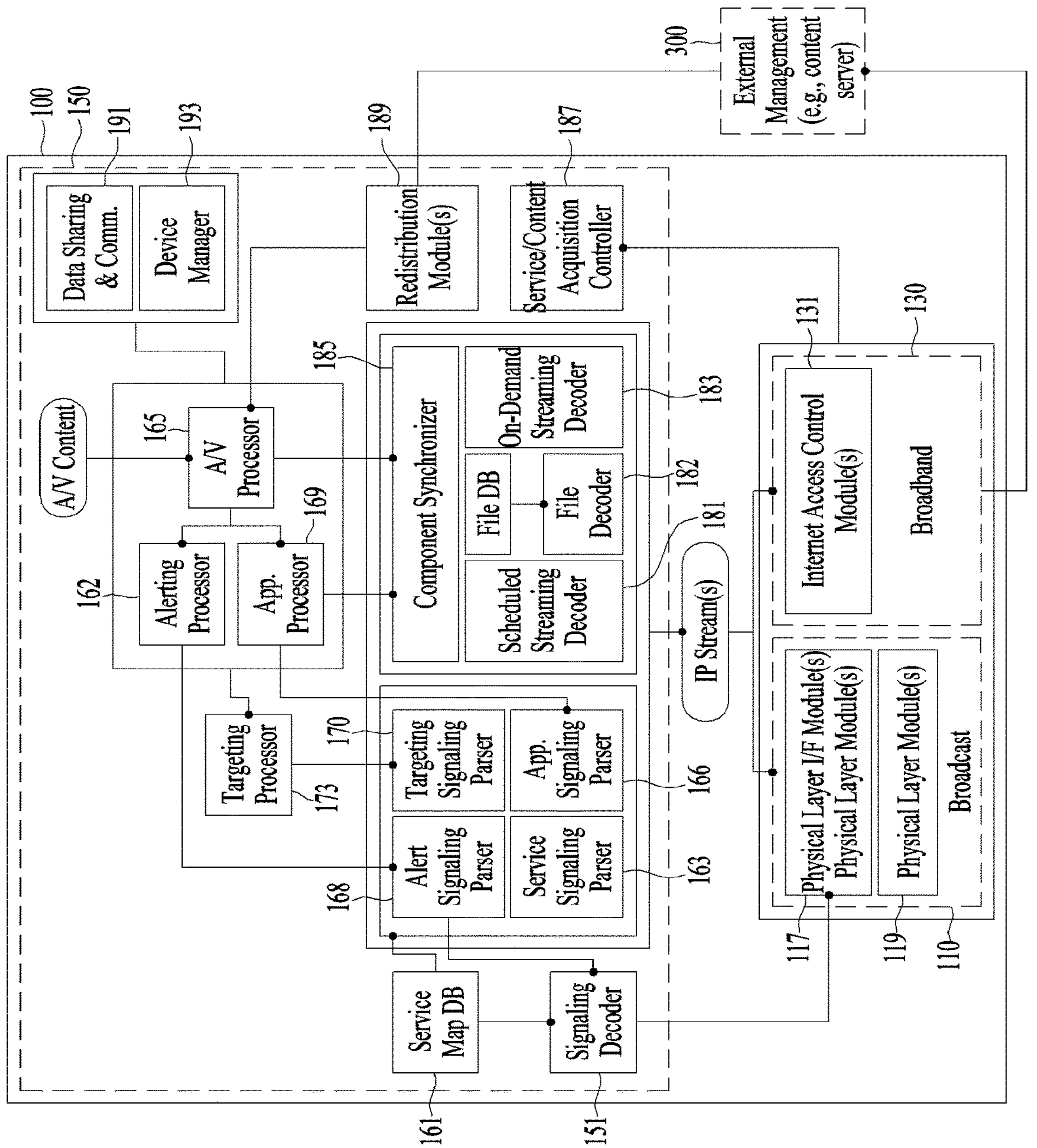
Figure 296:
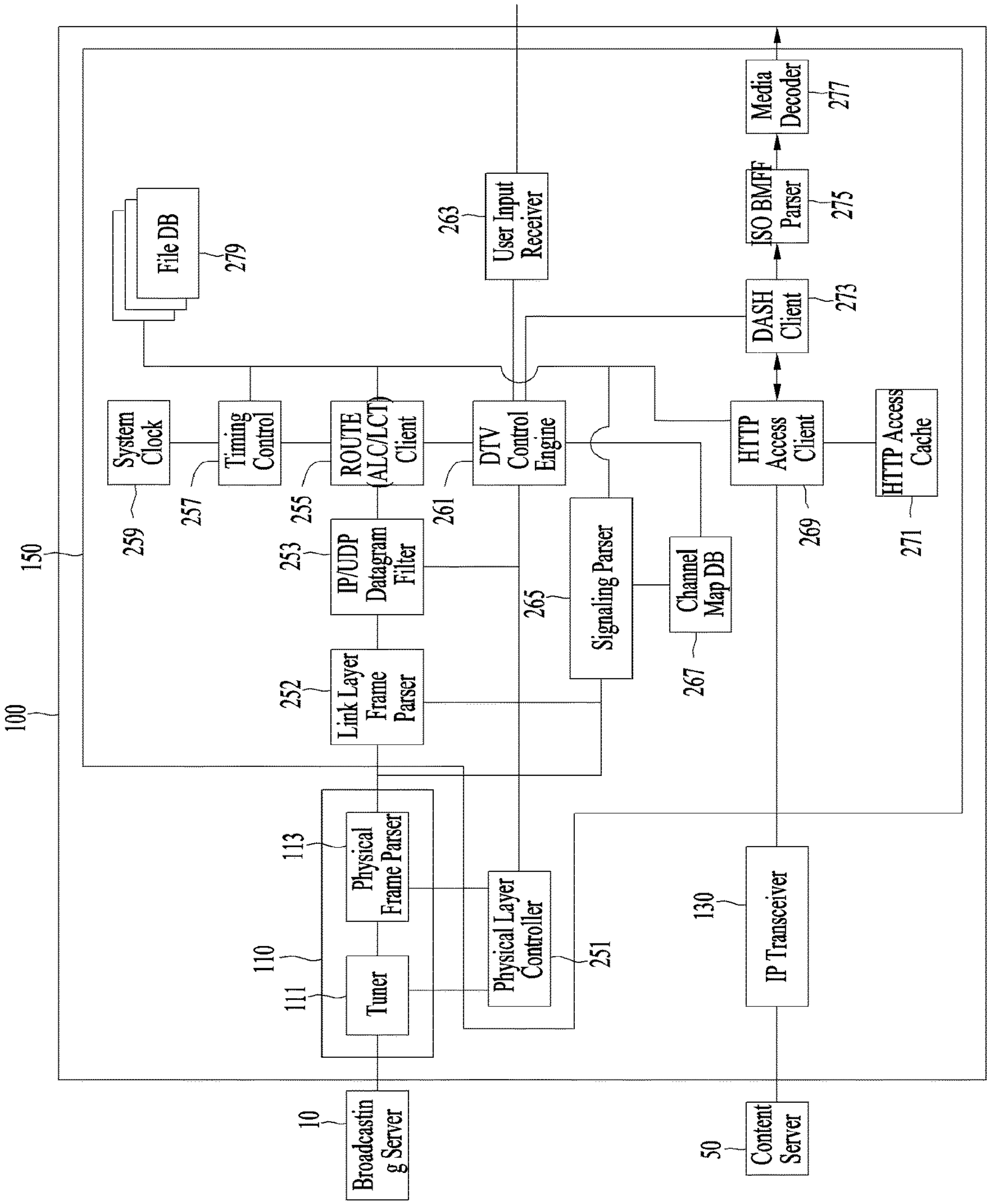
Figure 297:
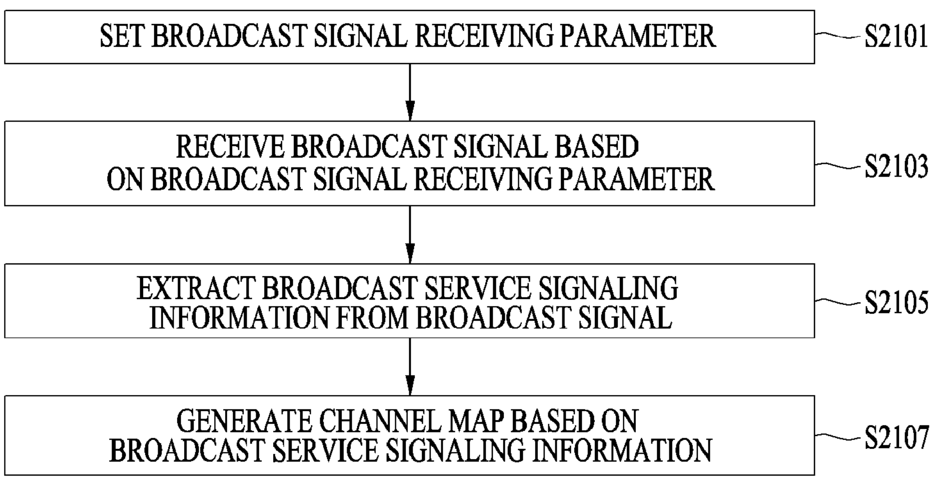
Figure 298:
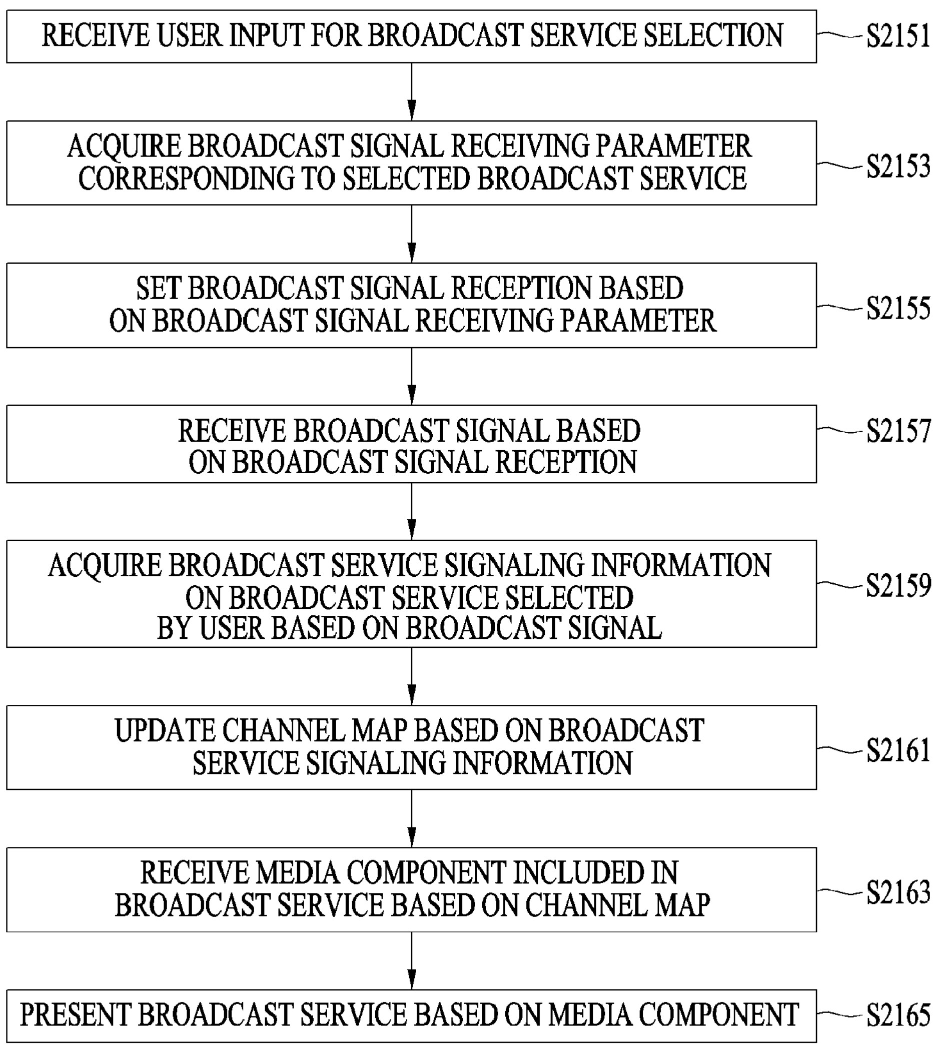
Figure 299:
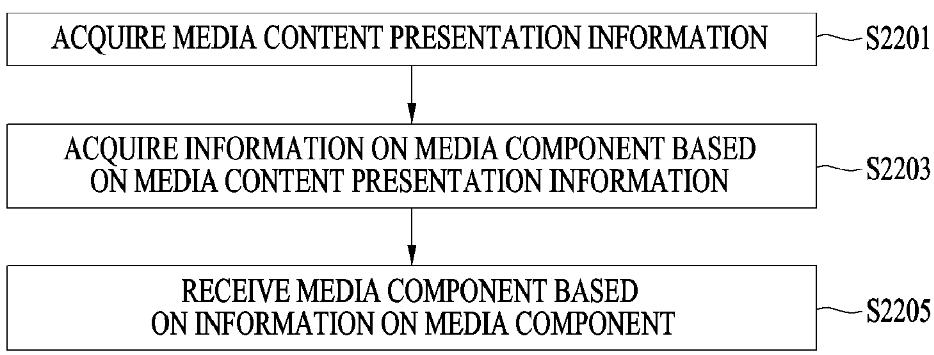
Figure 300:
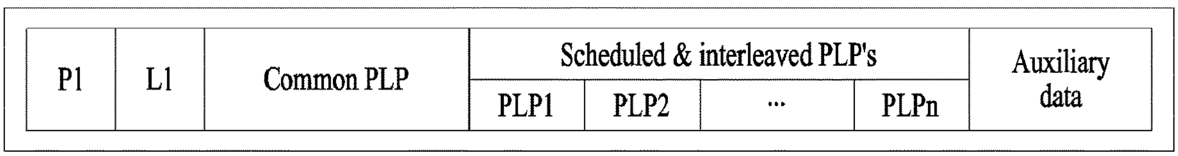
Figure 301:
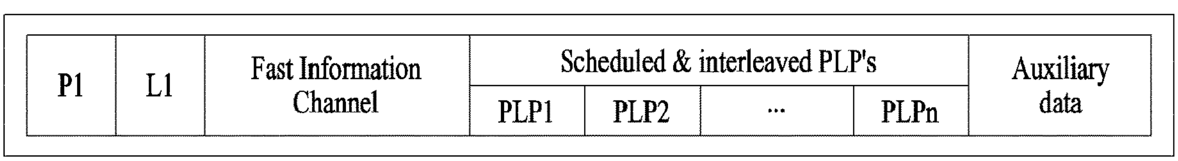
Figure 312:
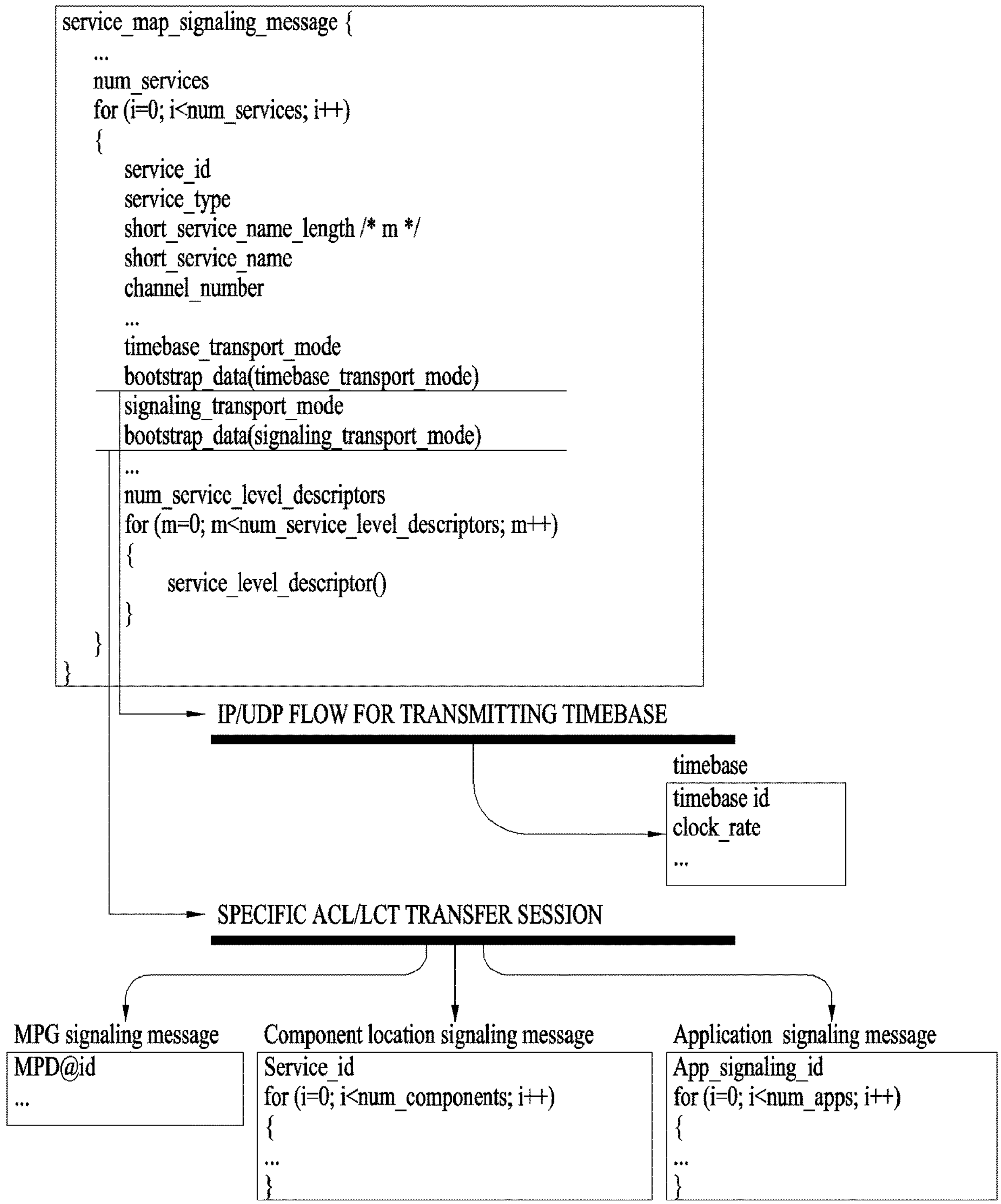
Figure 320:
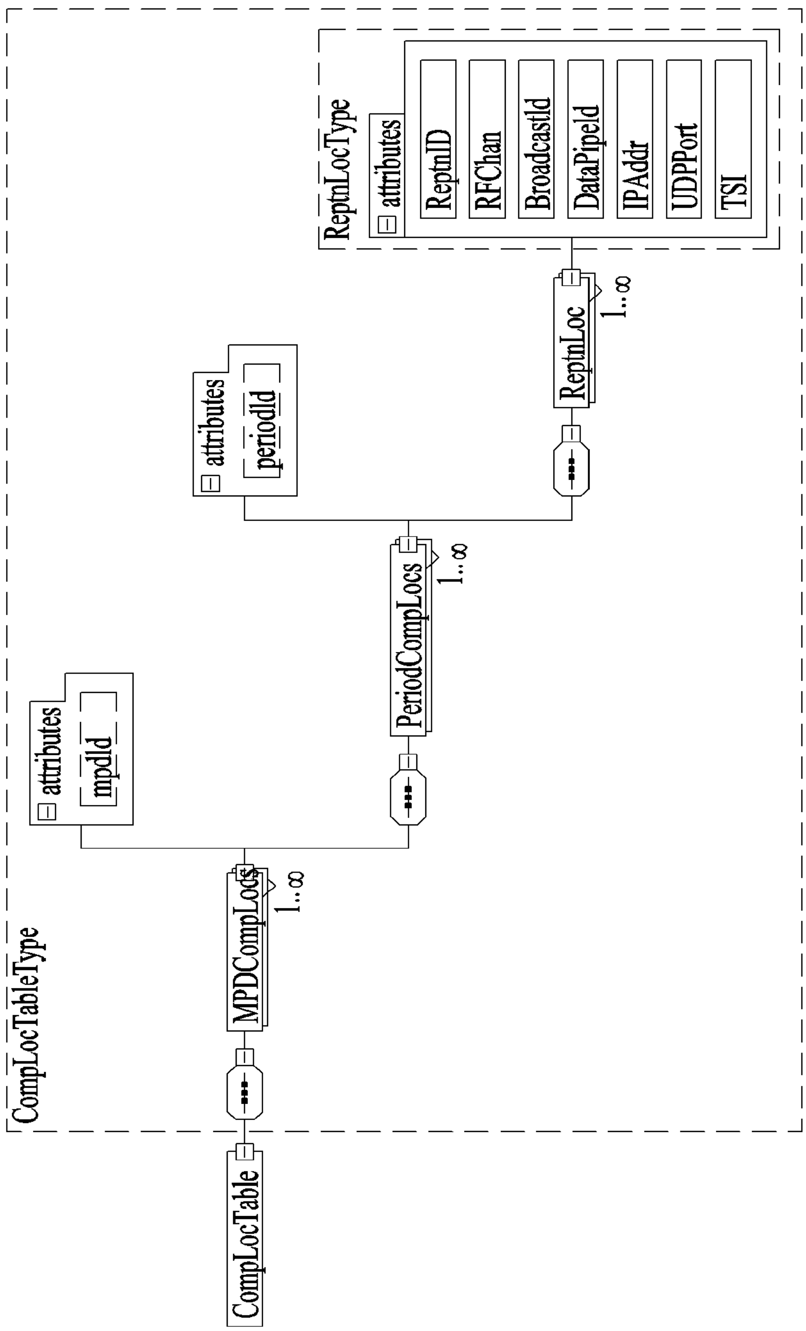
Figure 321:
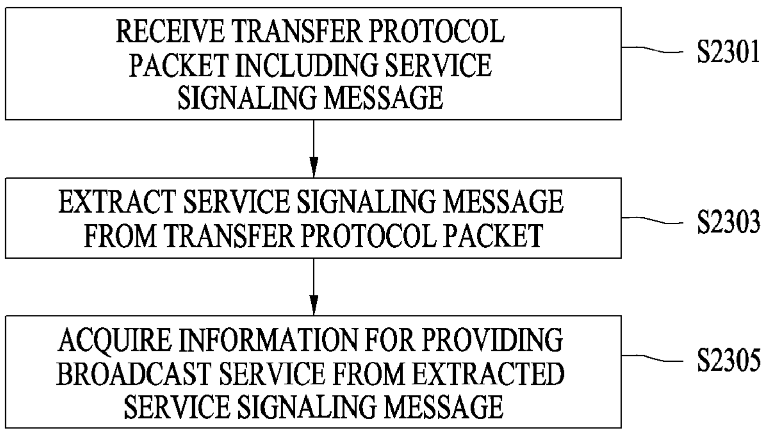
Figure 322:
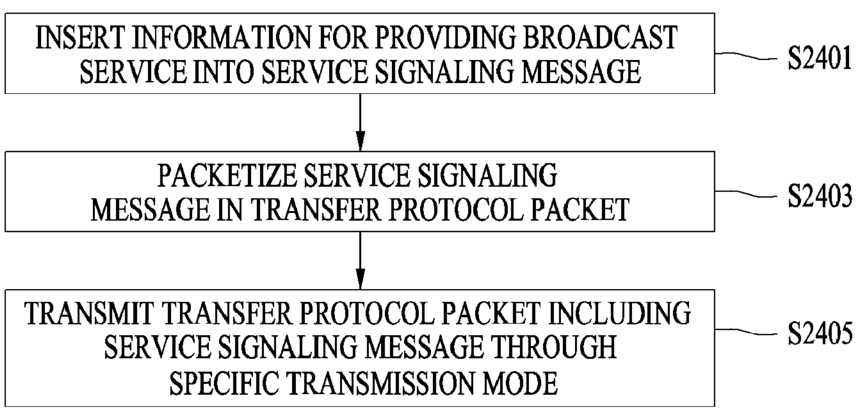
Figure 334:
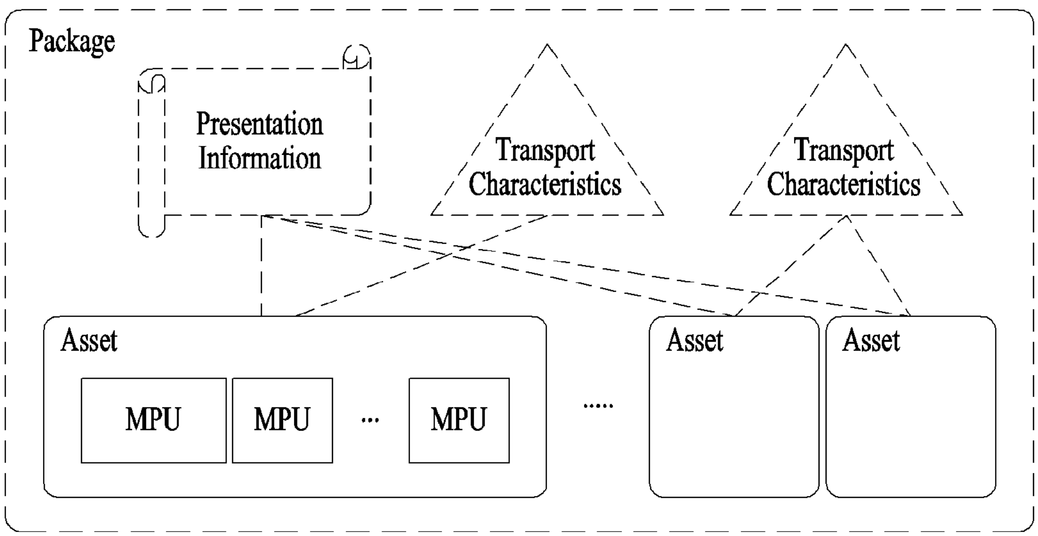
Figure 336:
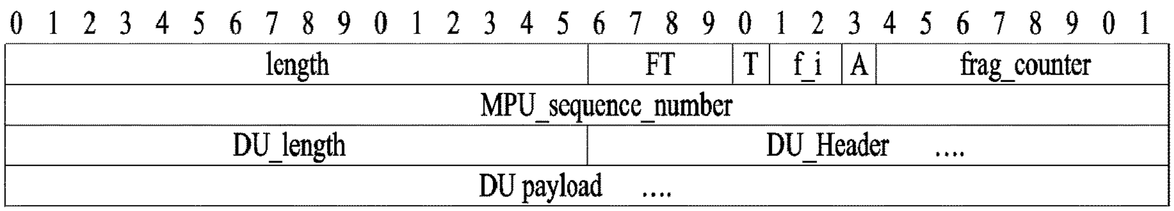
Figure 337:
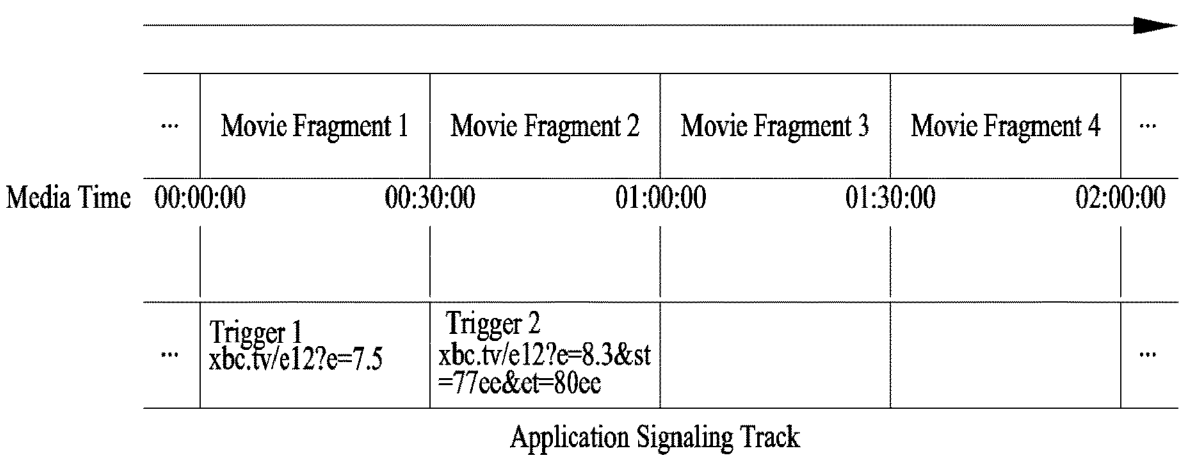
Figure 348:
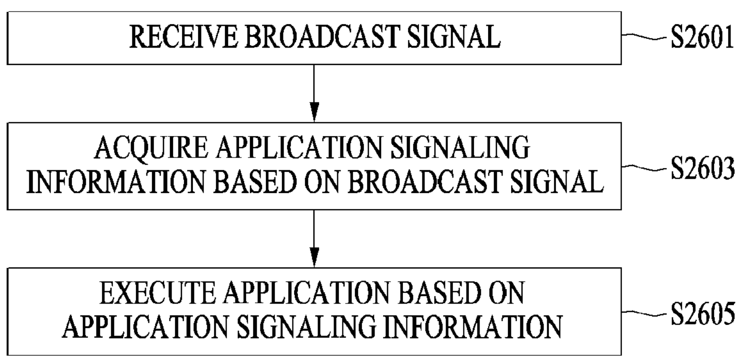
Figure 351:
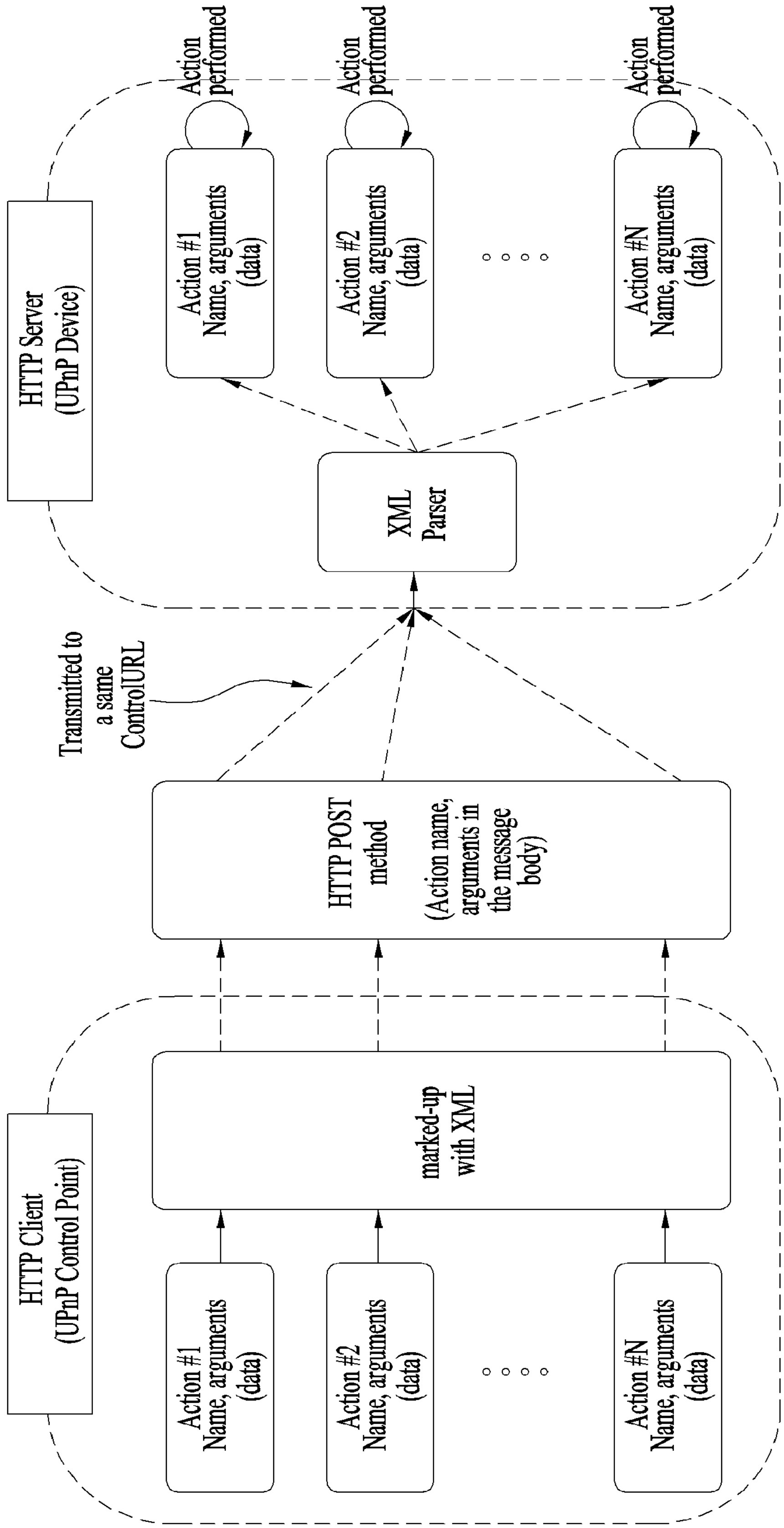
Figure 352:
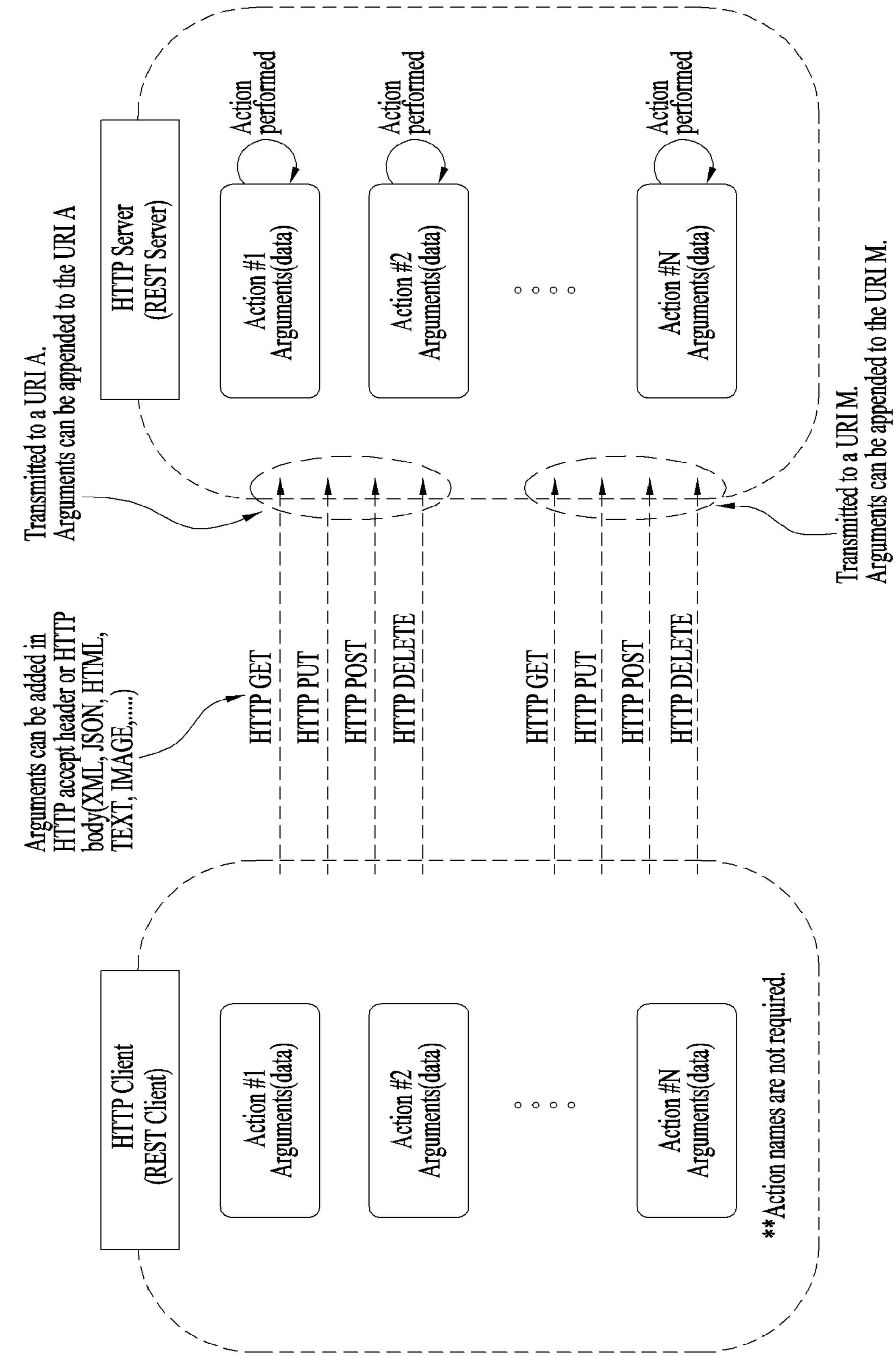
Figure 361:
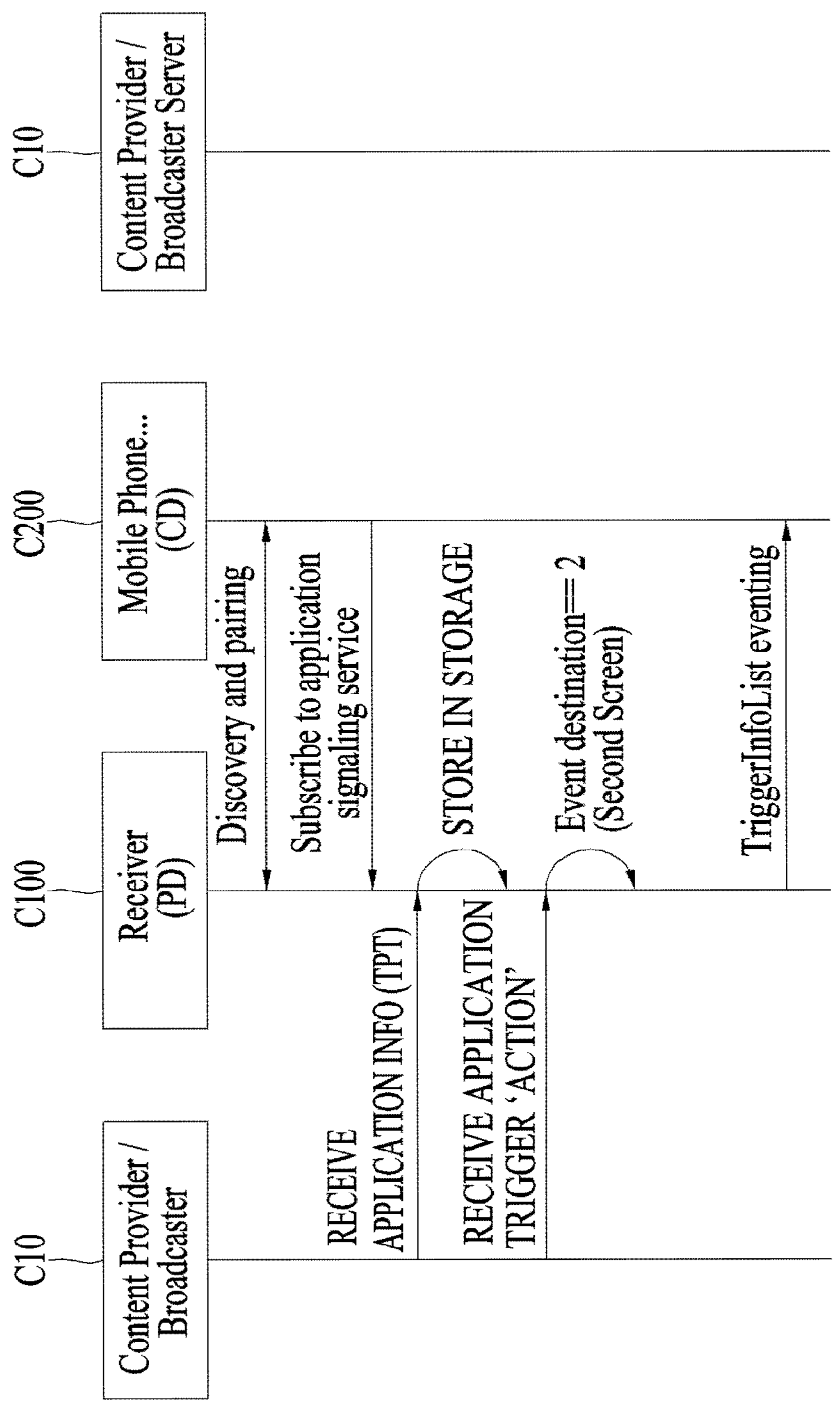
Figure 363:
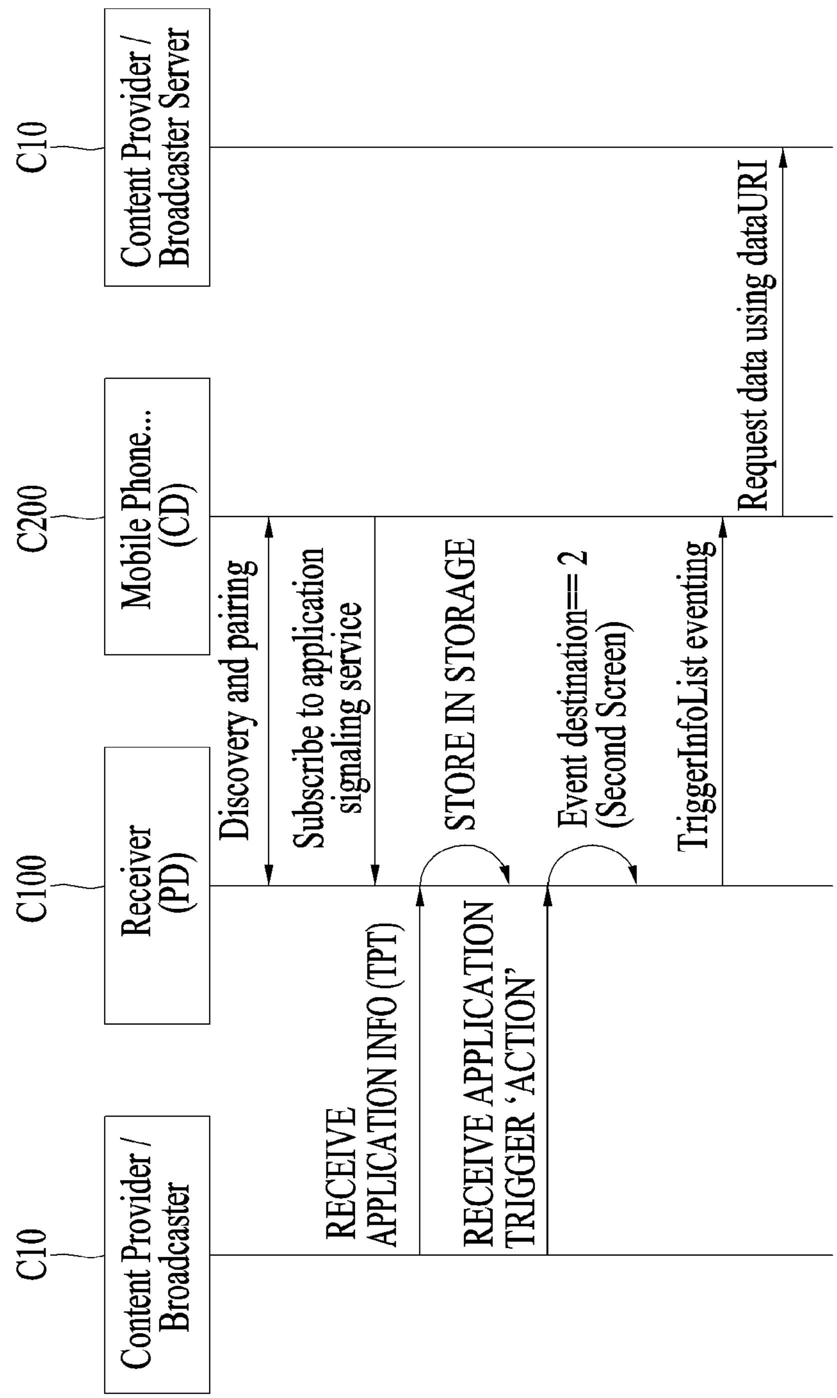
Figure 365:
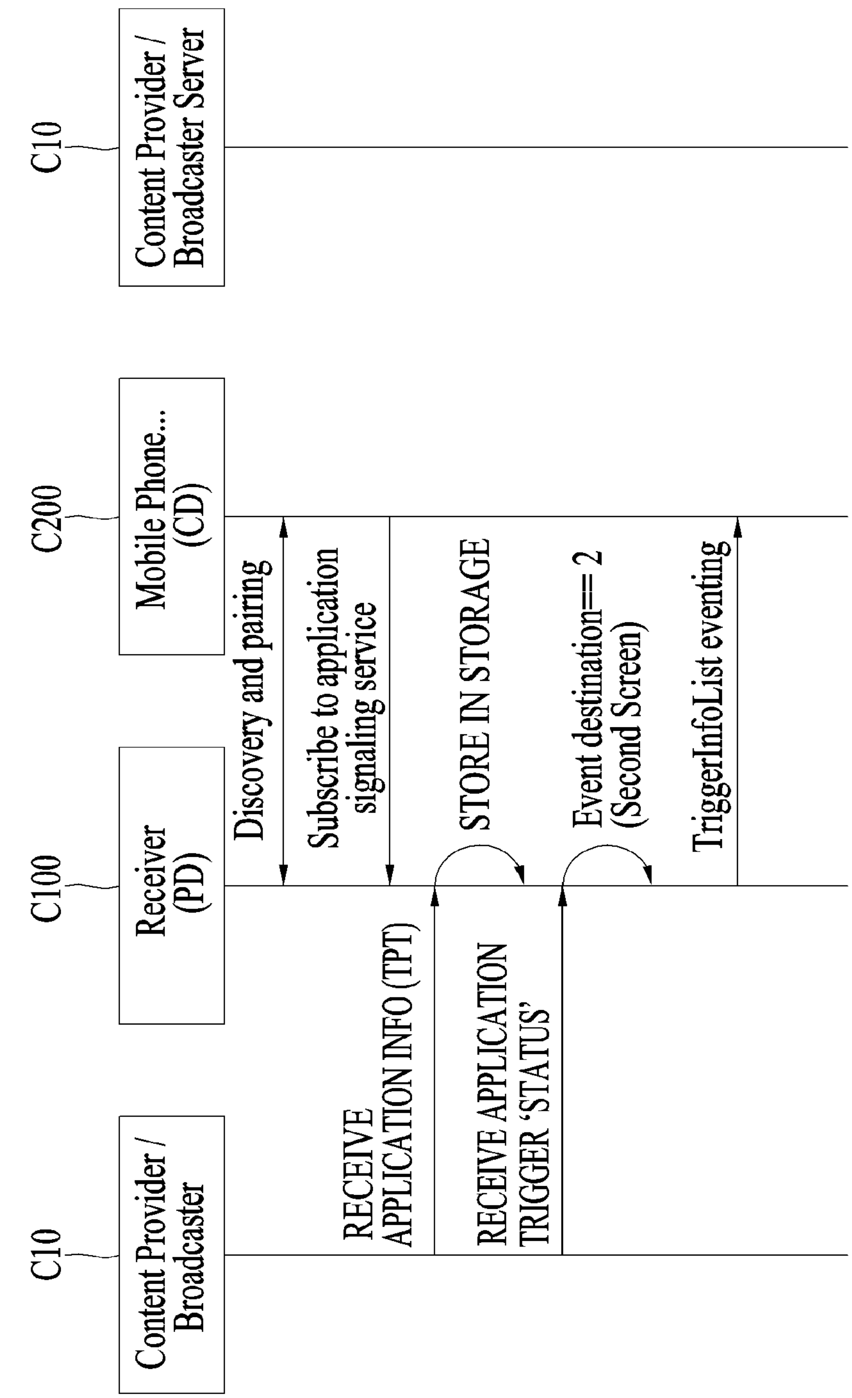
Figure 367:
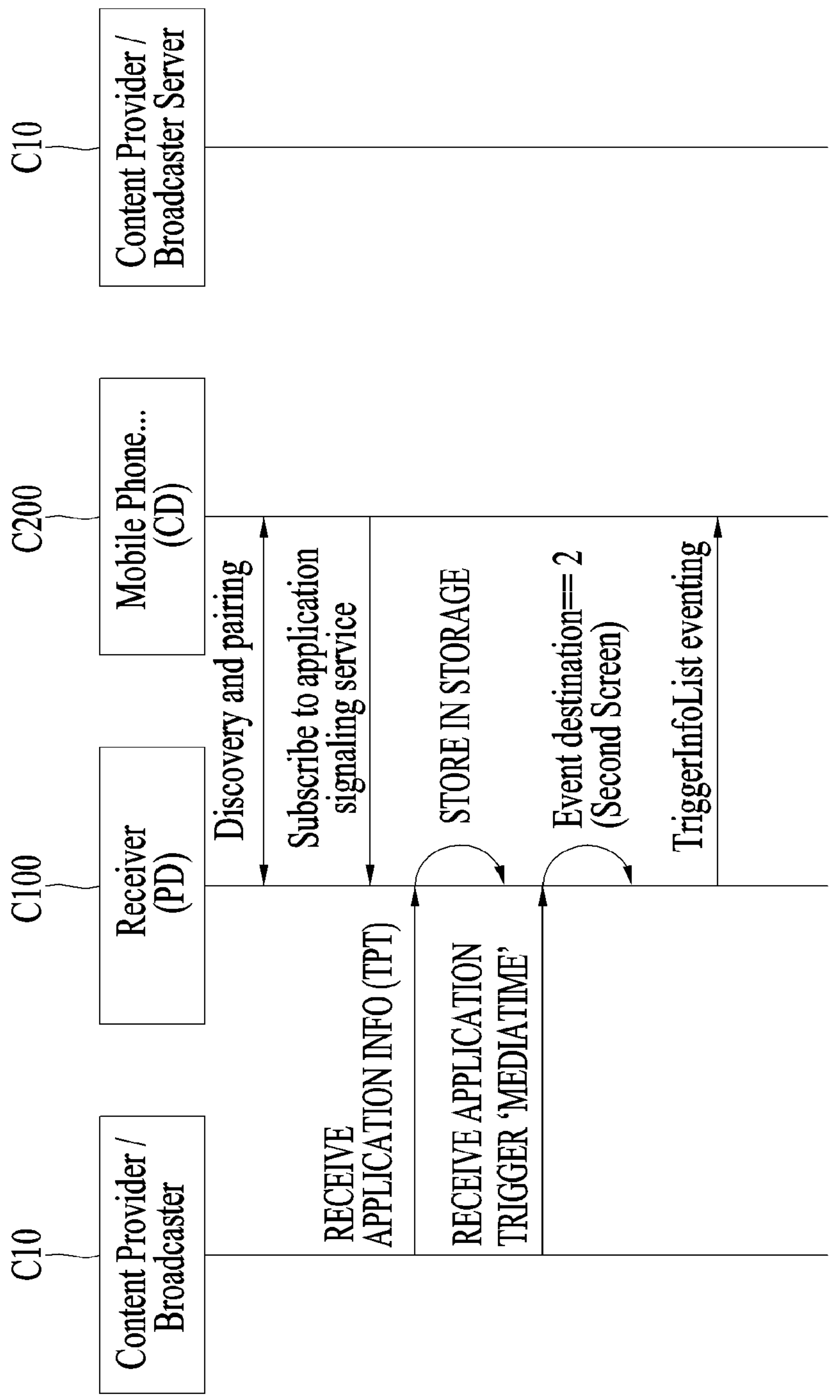
Figure 369:
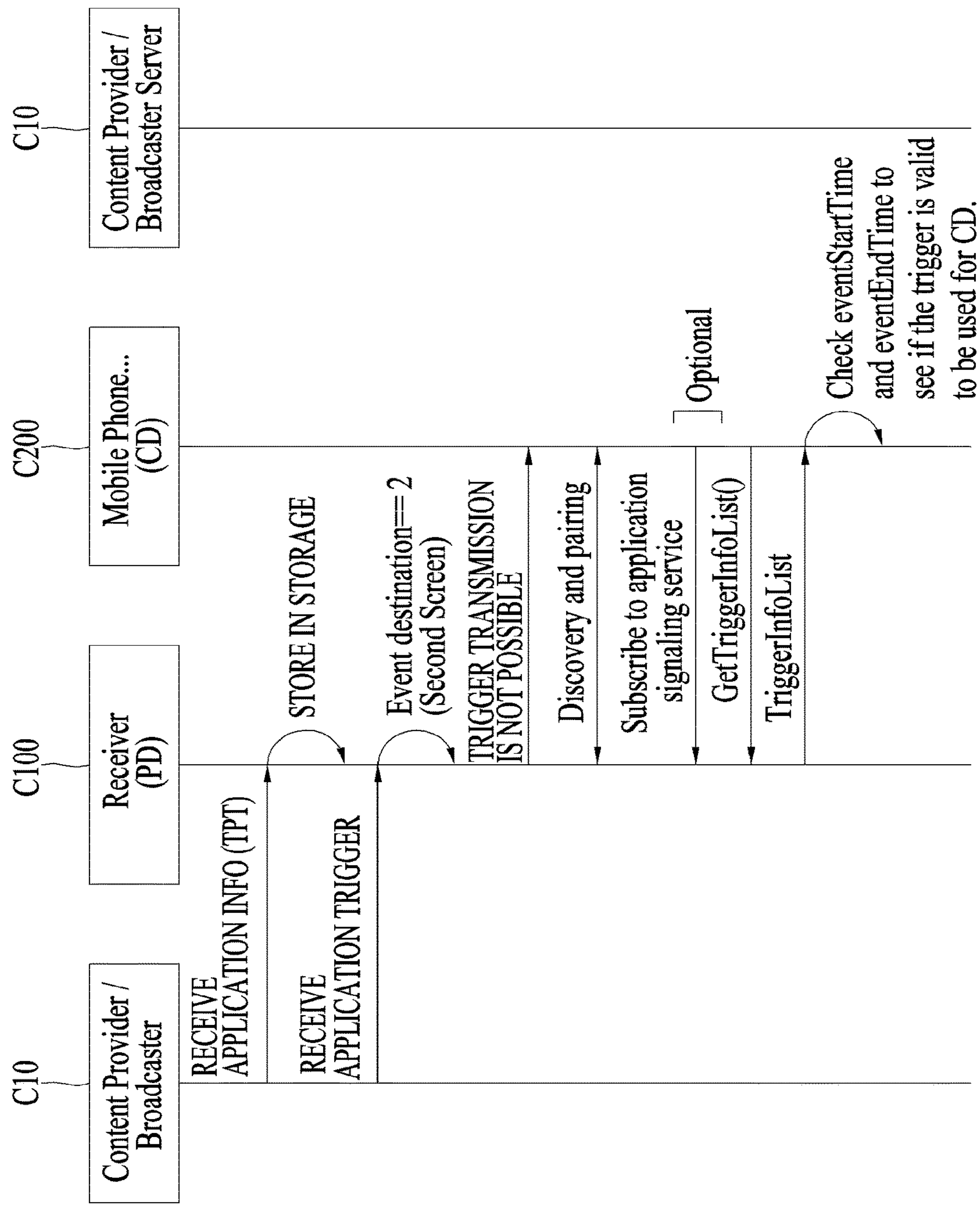
Figure 370:
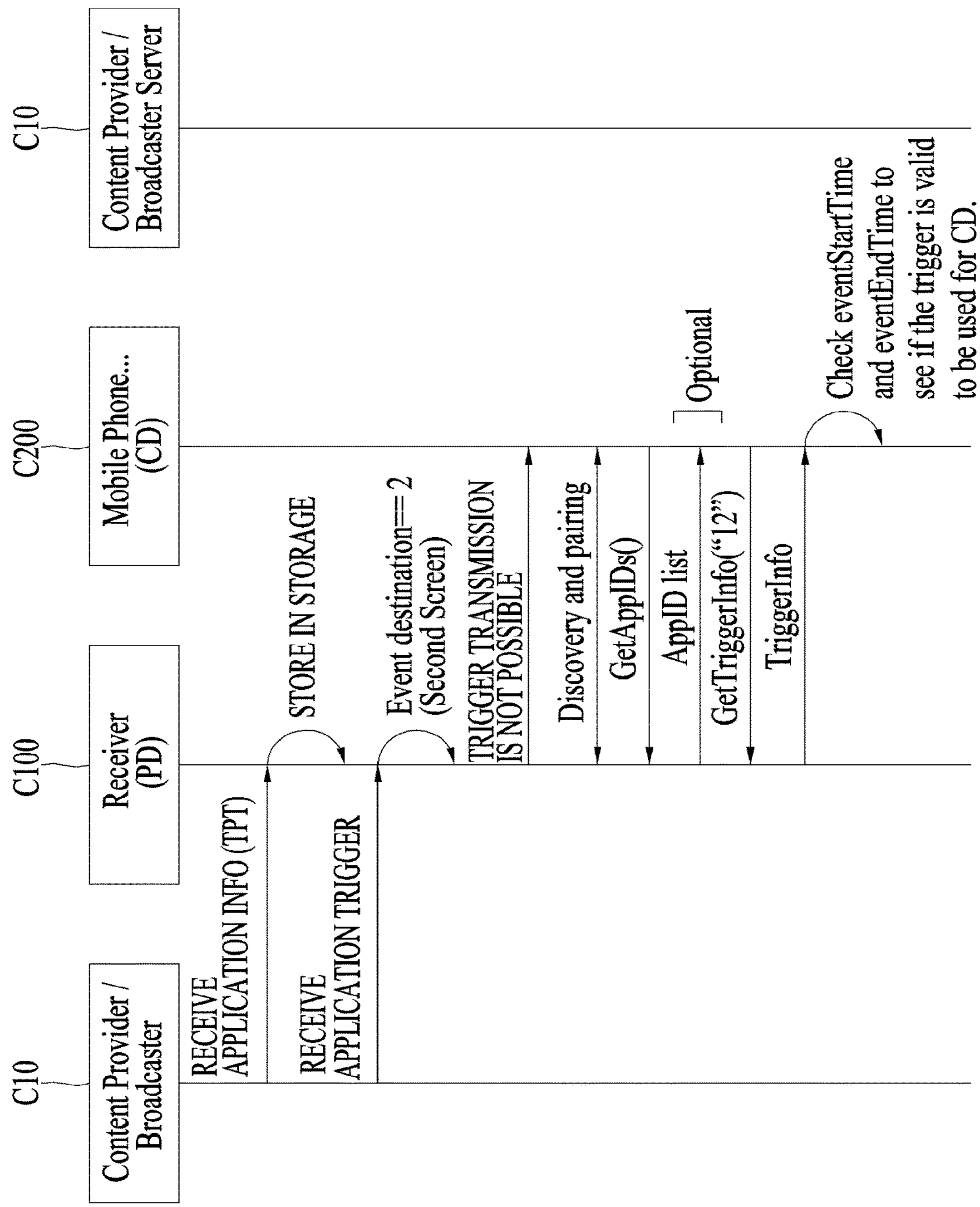
Figure 371:
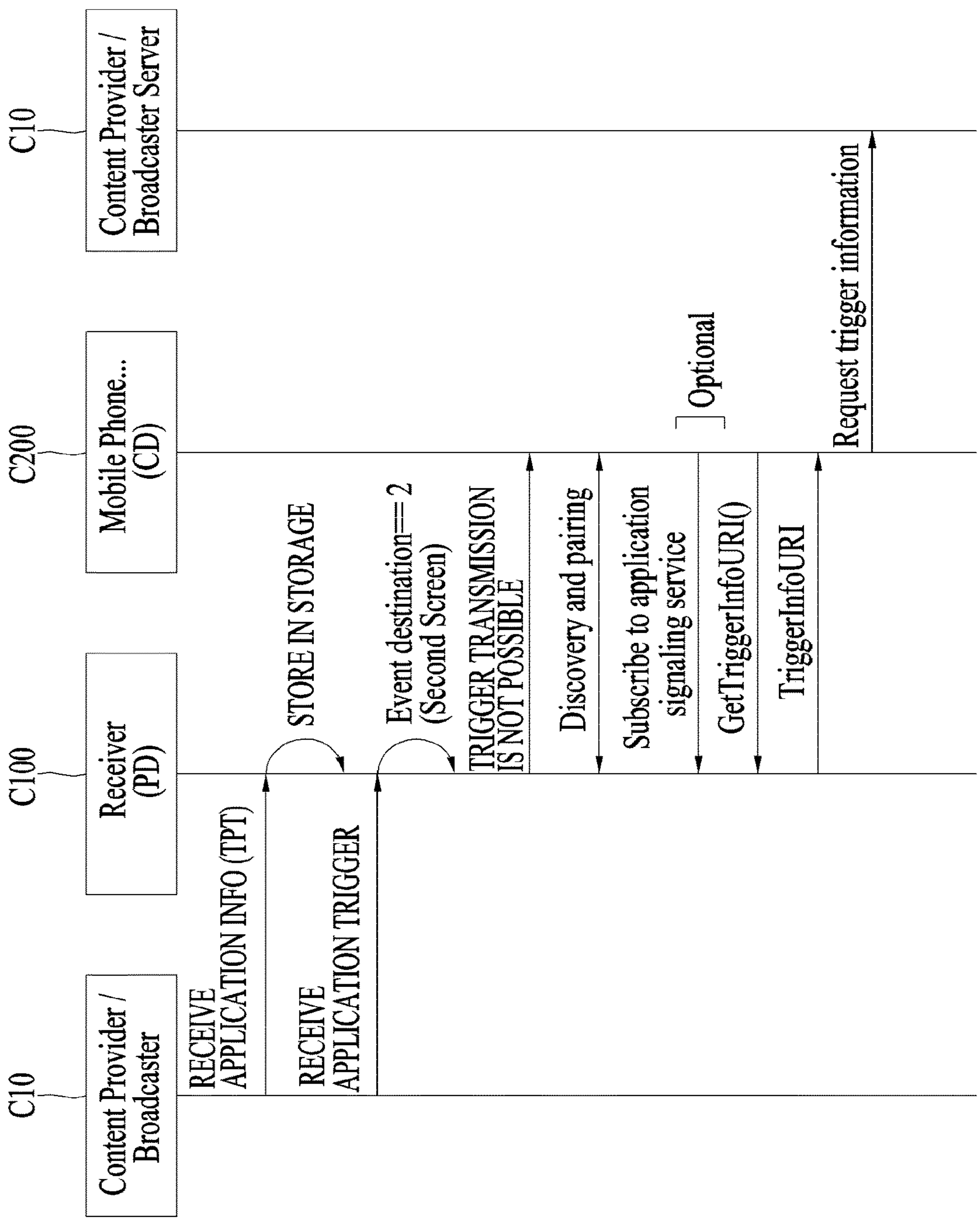
Figure 372:
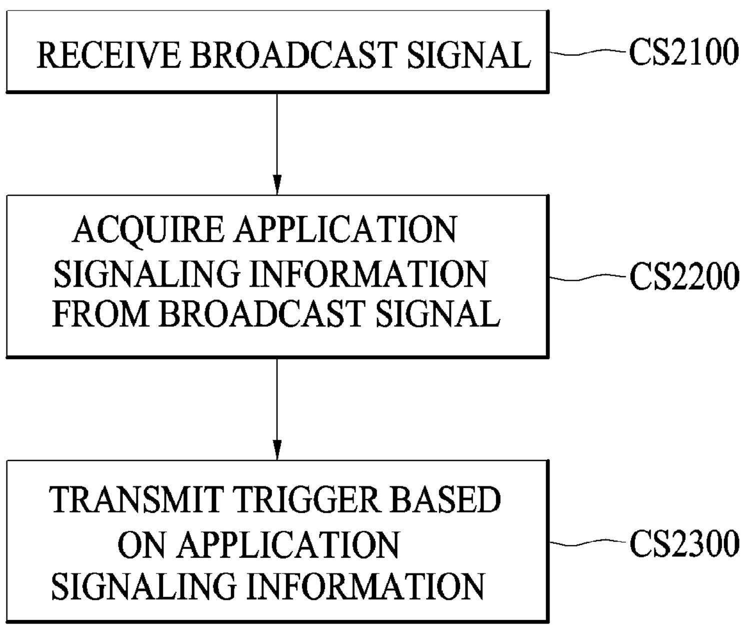
Figure 373:
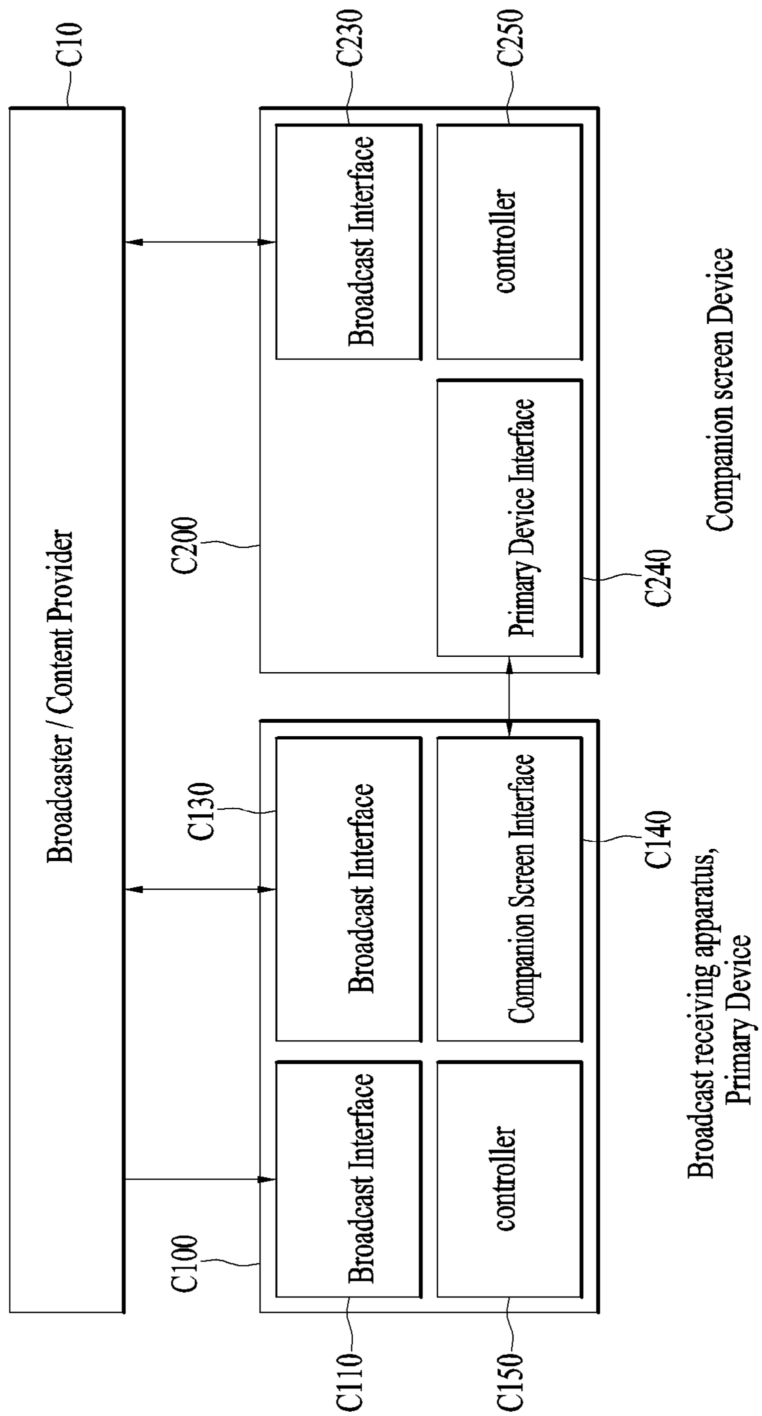
Figure 374:
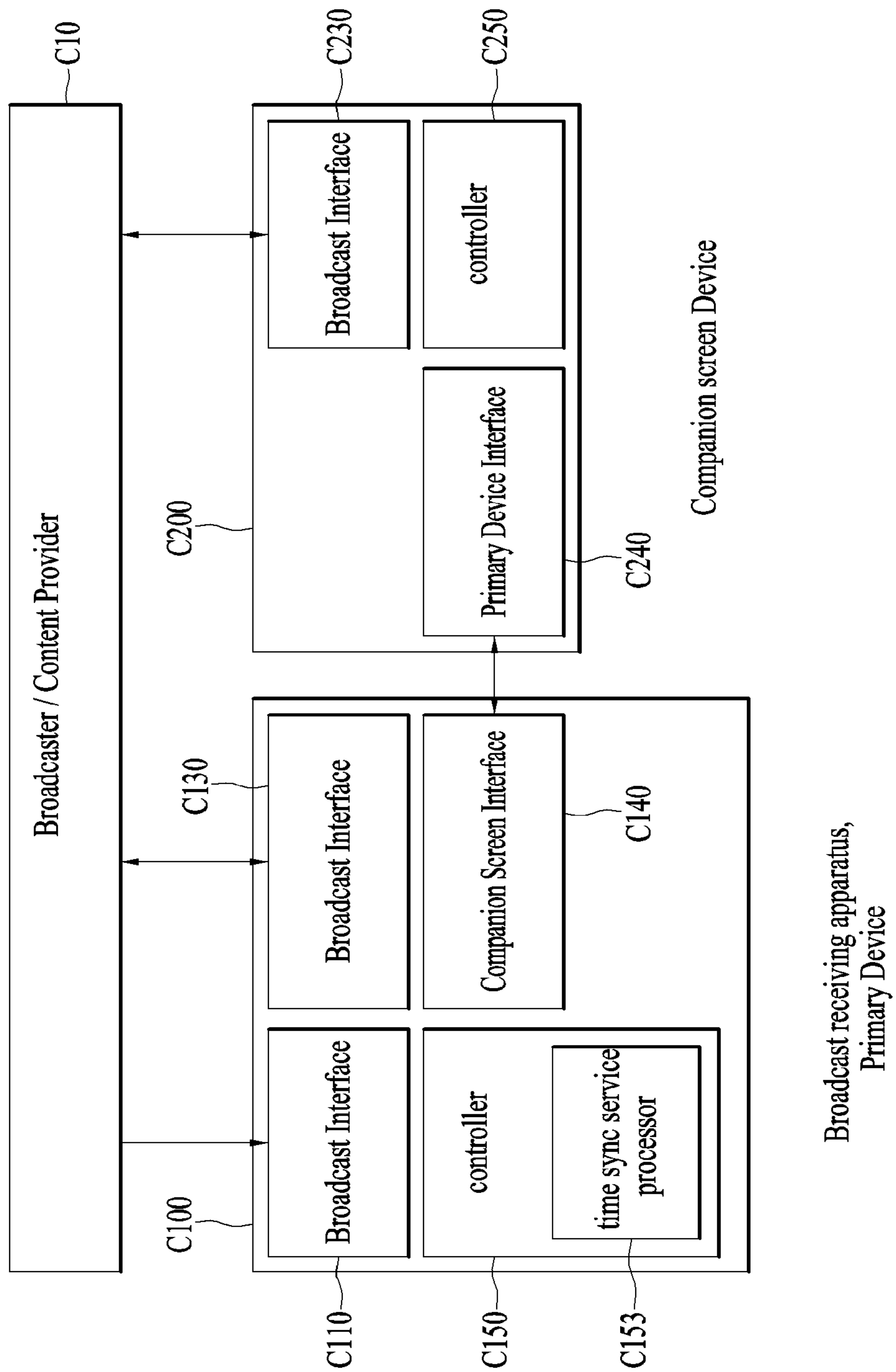
Figure 380:
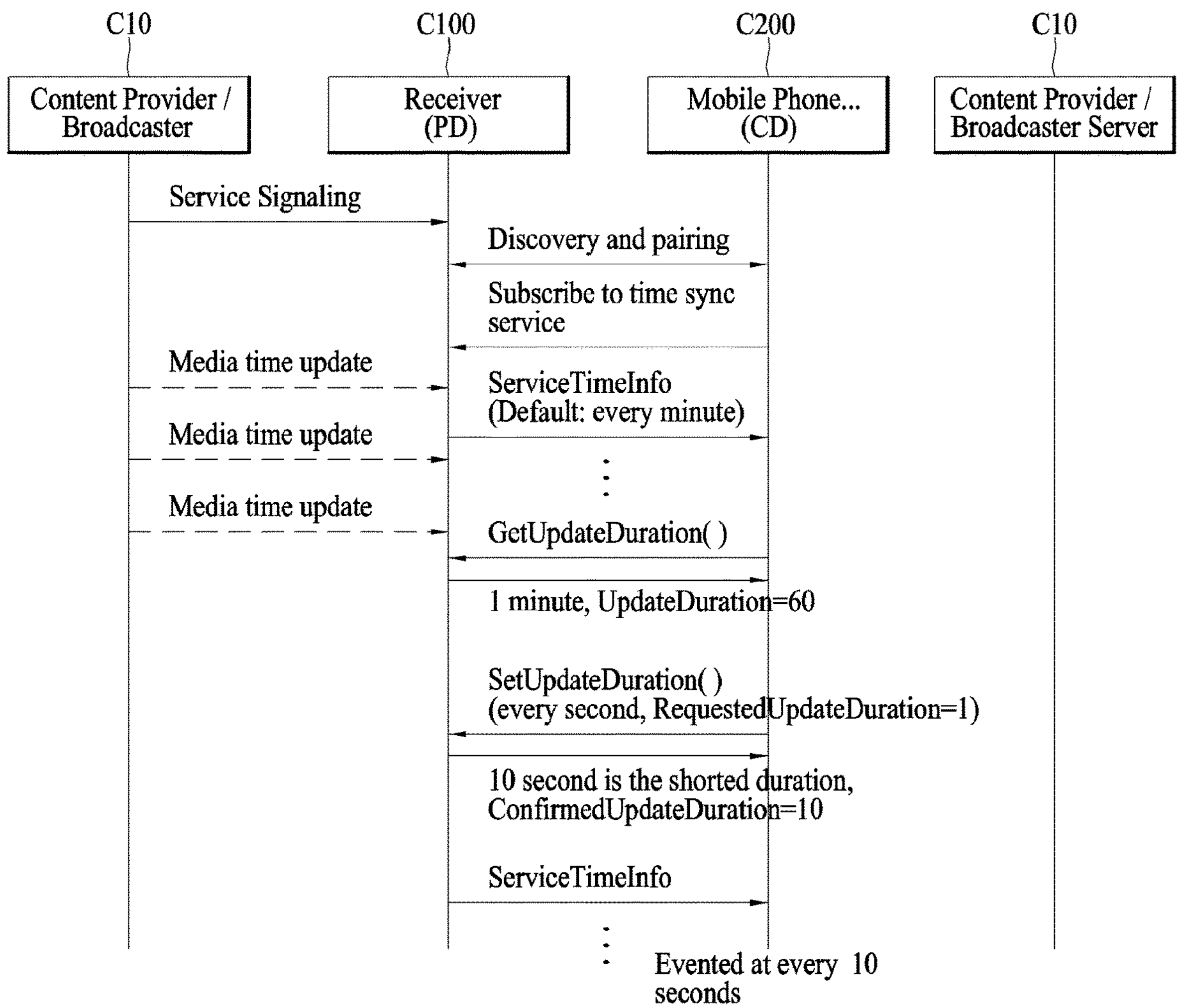
Figure 381:
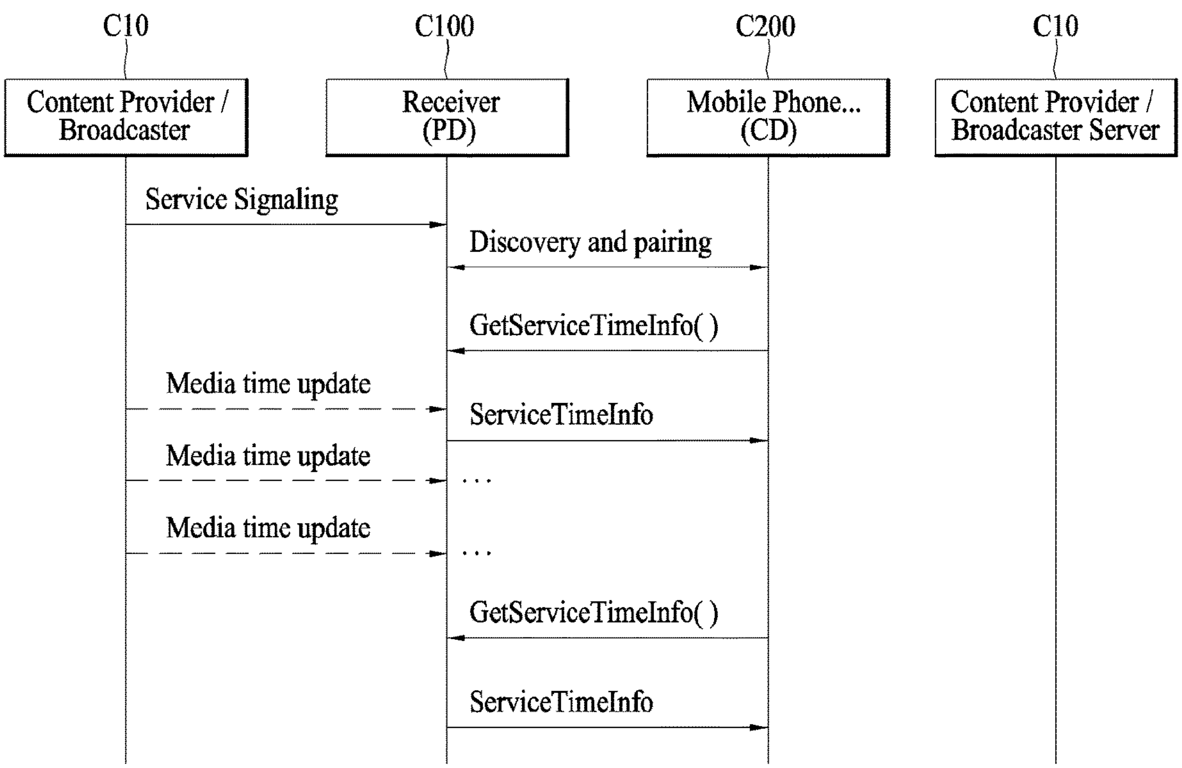
Figure 382:
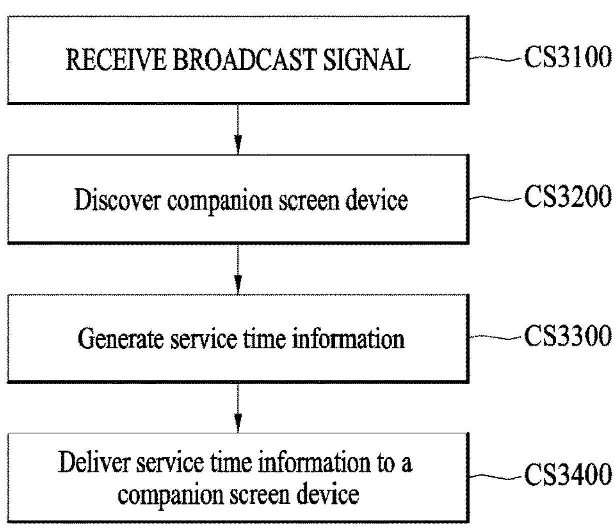
Figure 383:
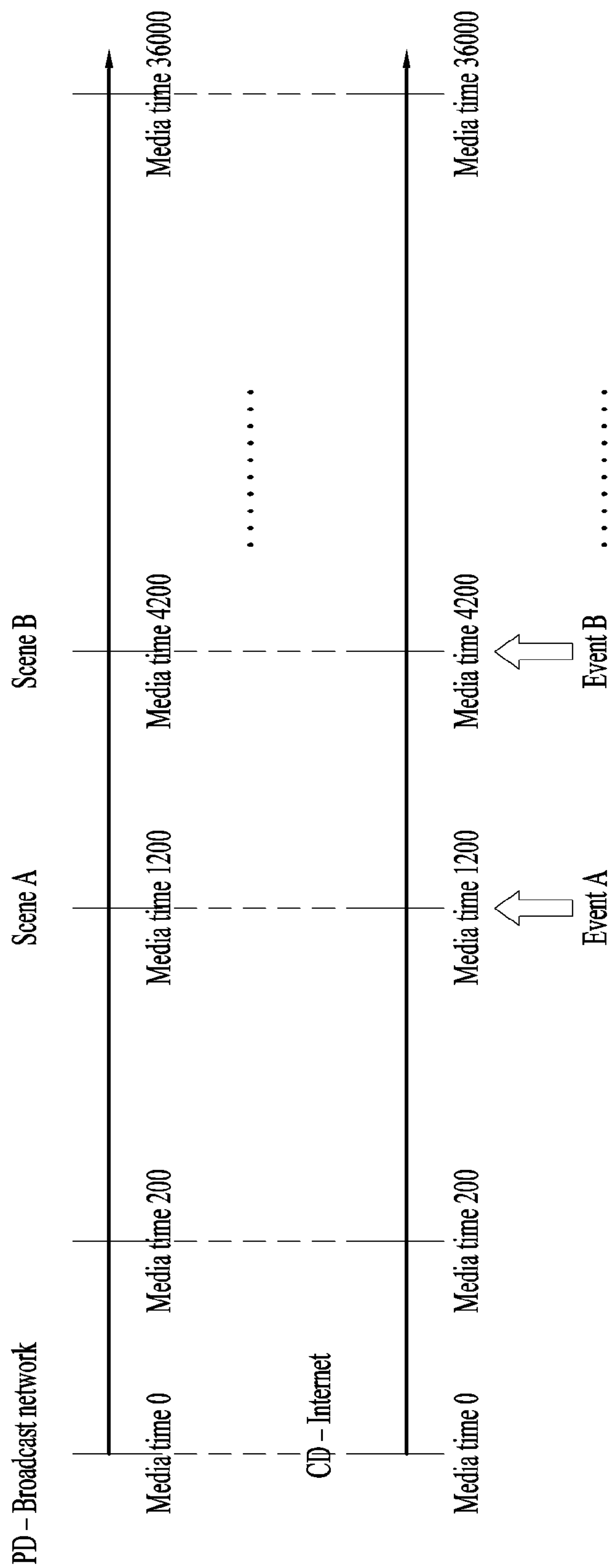
Figure 384:
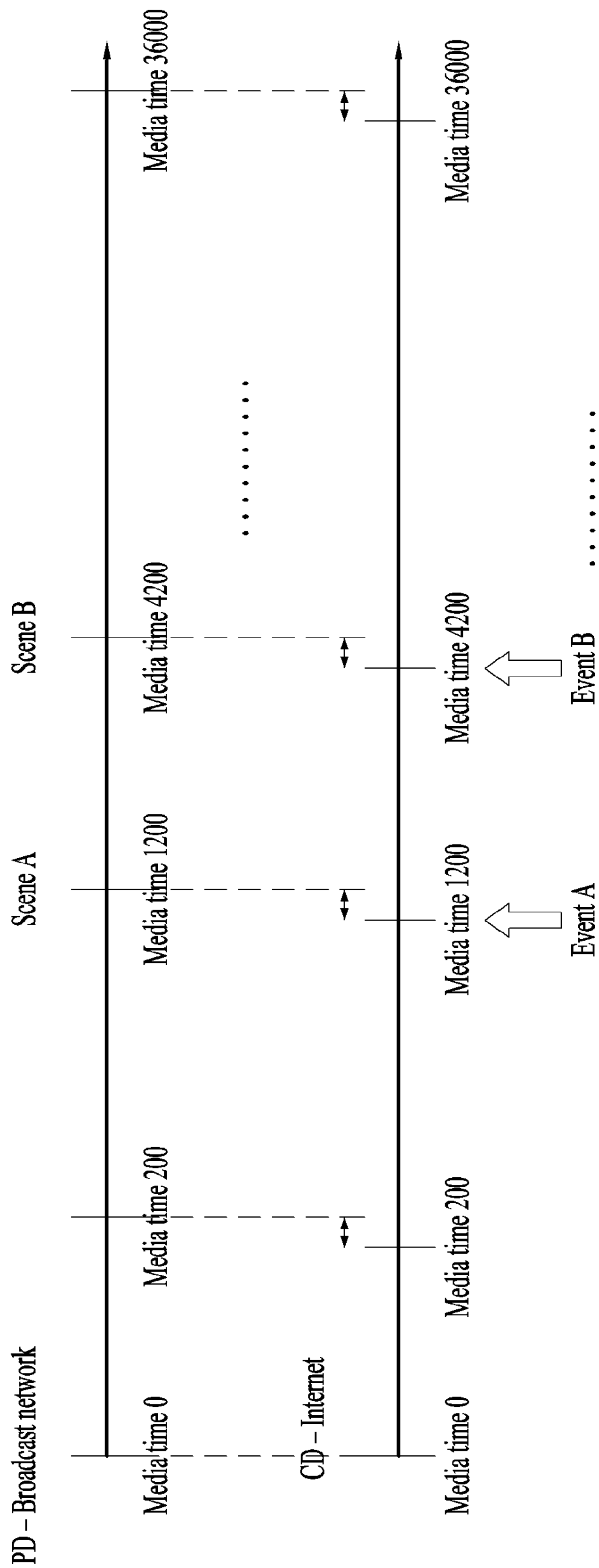
Figure 385:
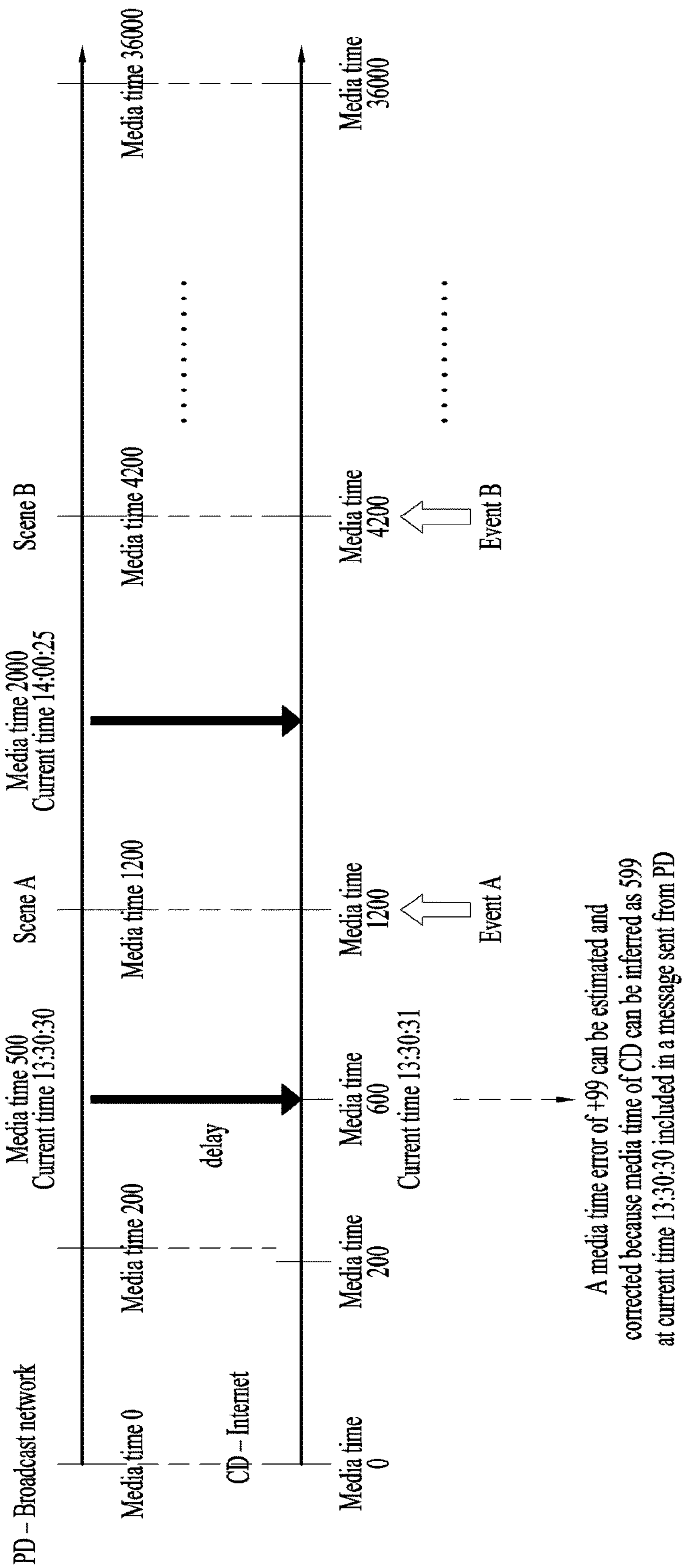
Figure 388:
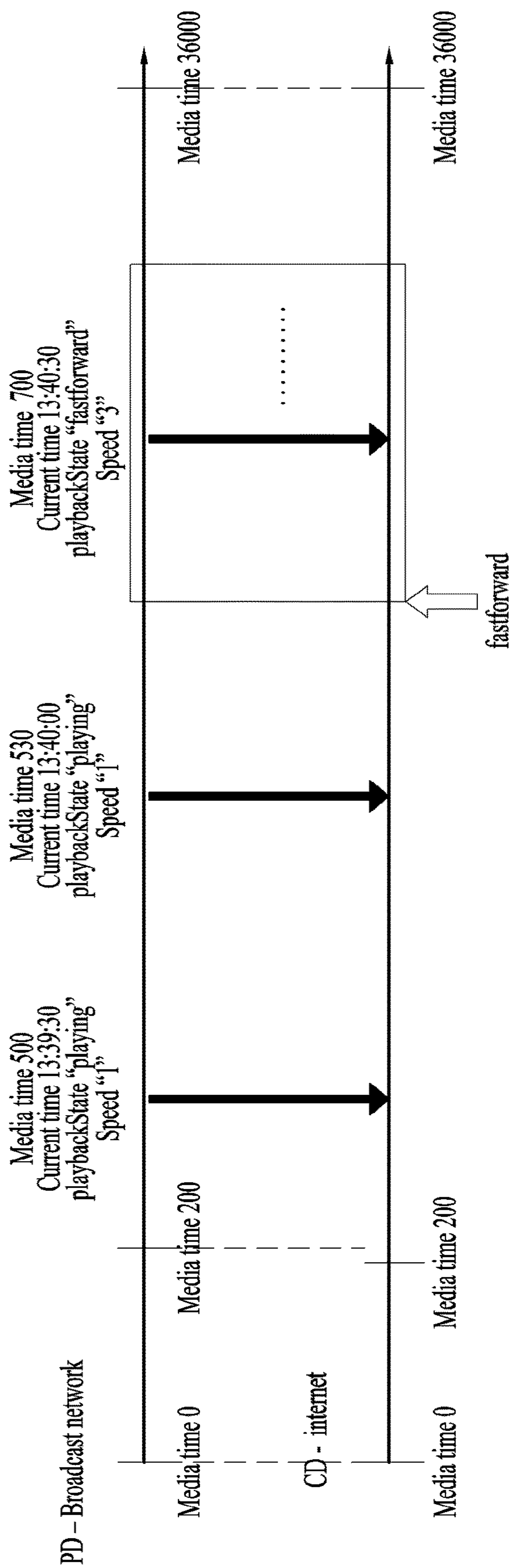
Figure 389:
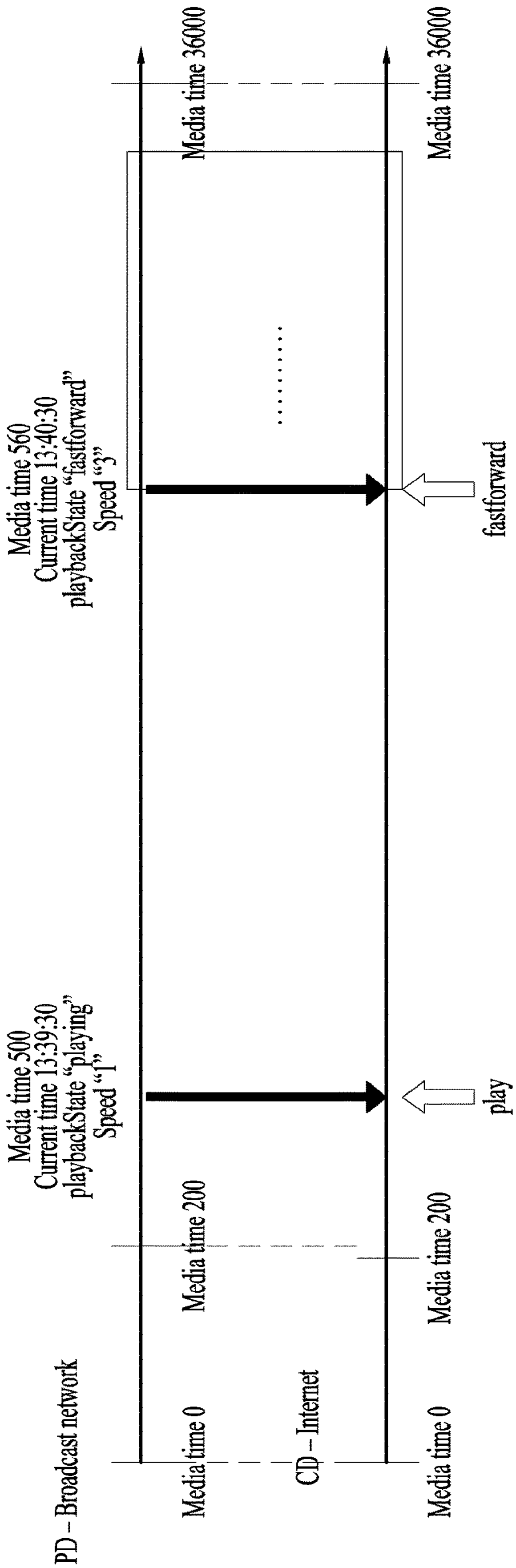
Figure 390:
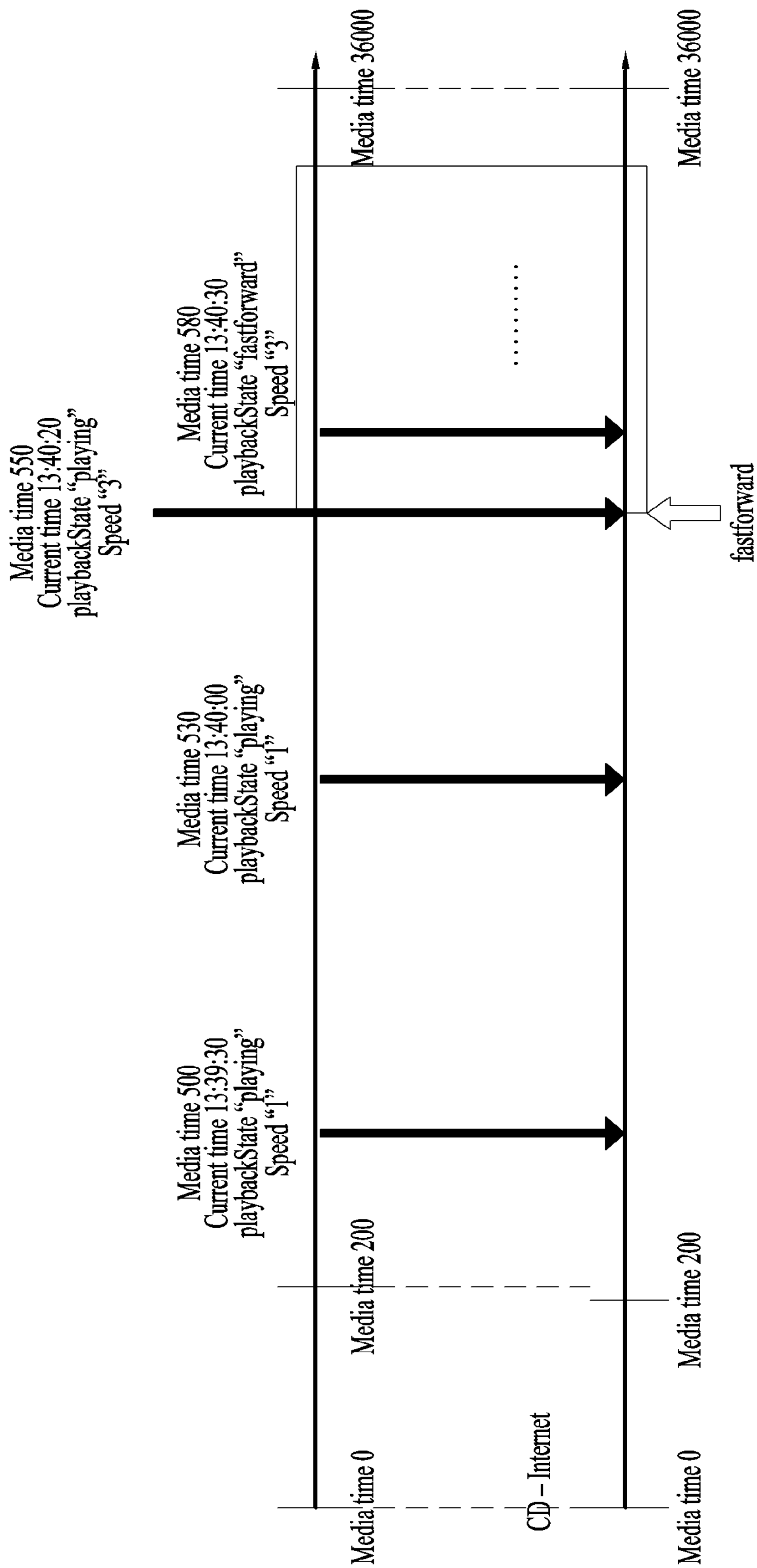
Figure 391:
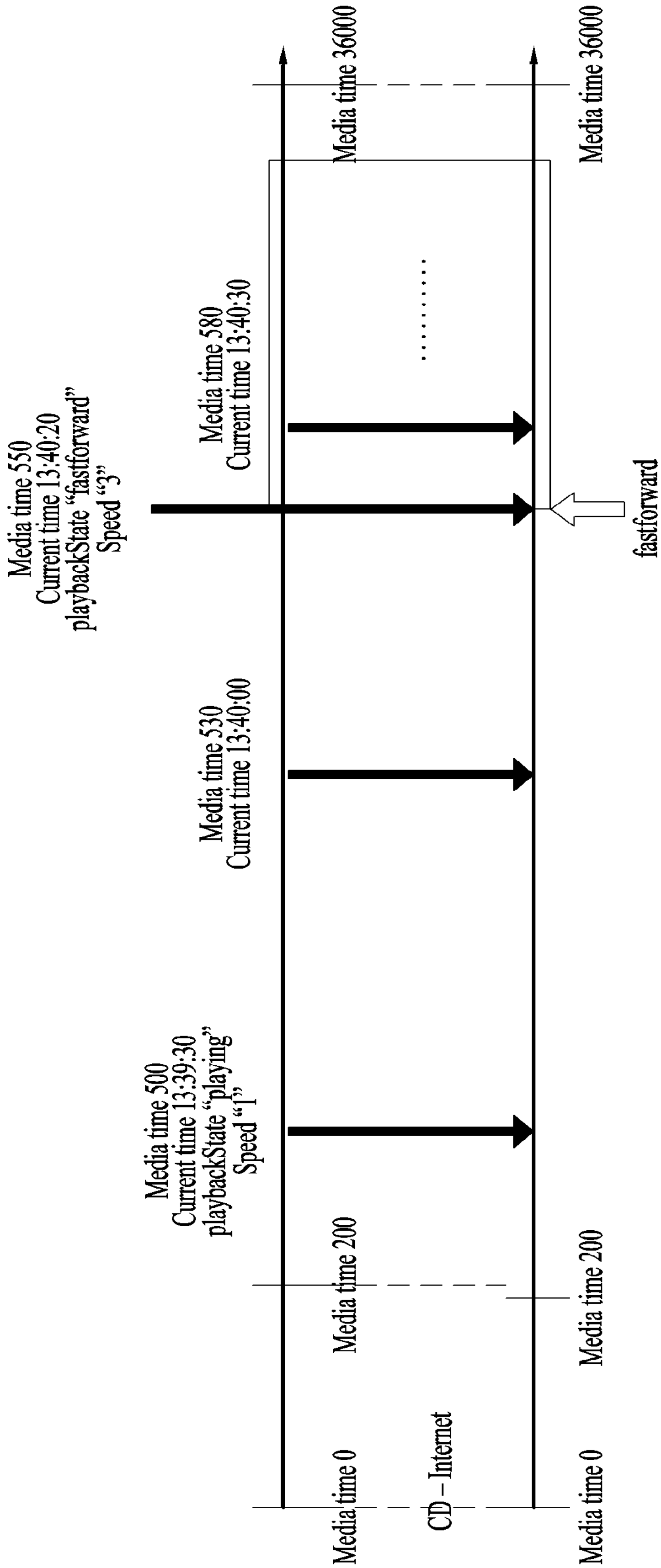
Figures 395, 396:
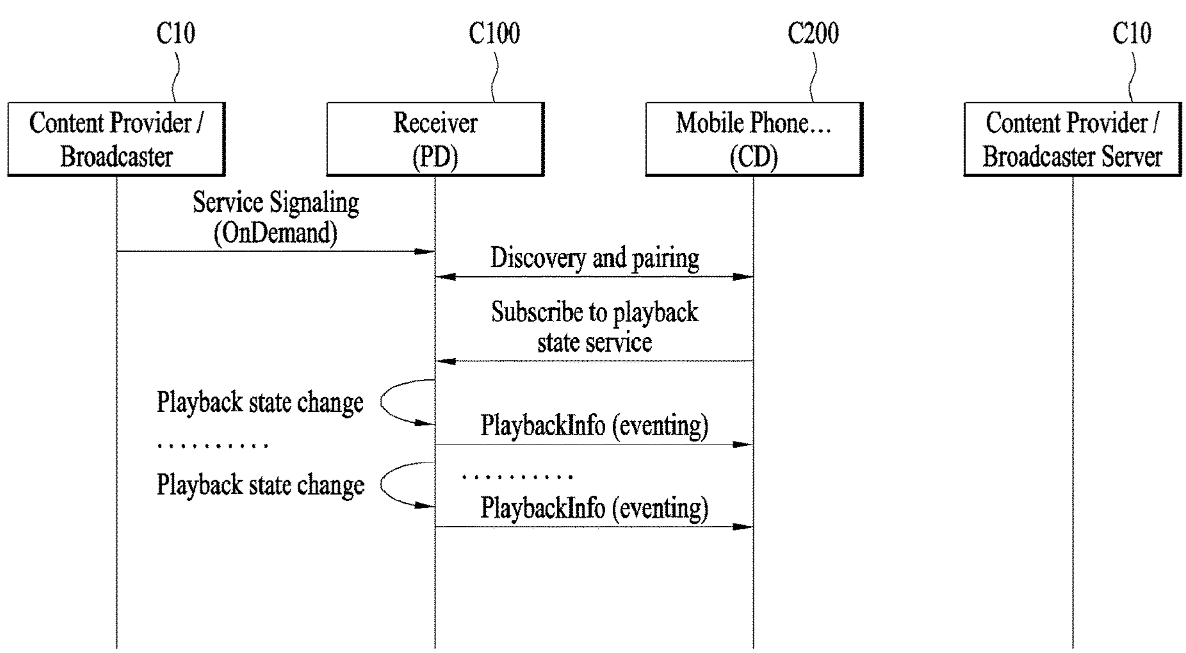
Figure 397:
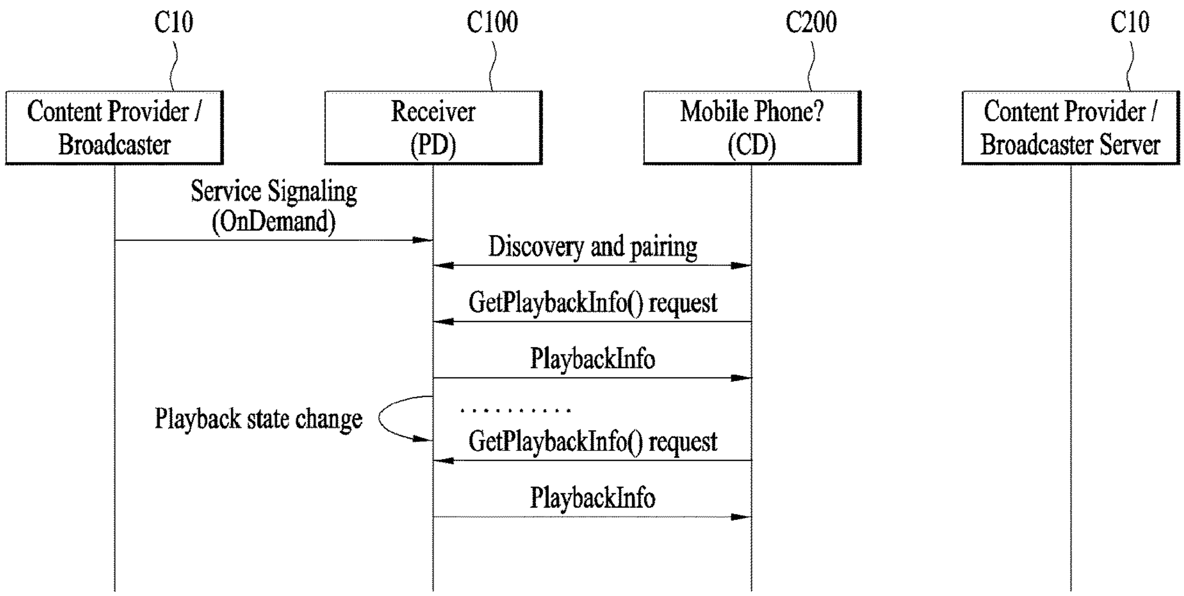
Figure 398:
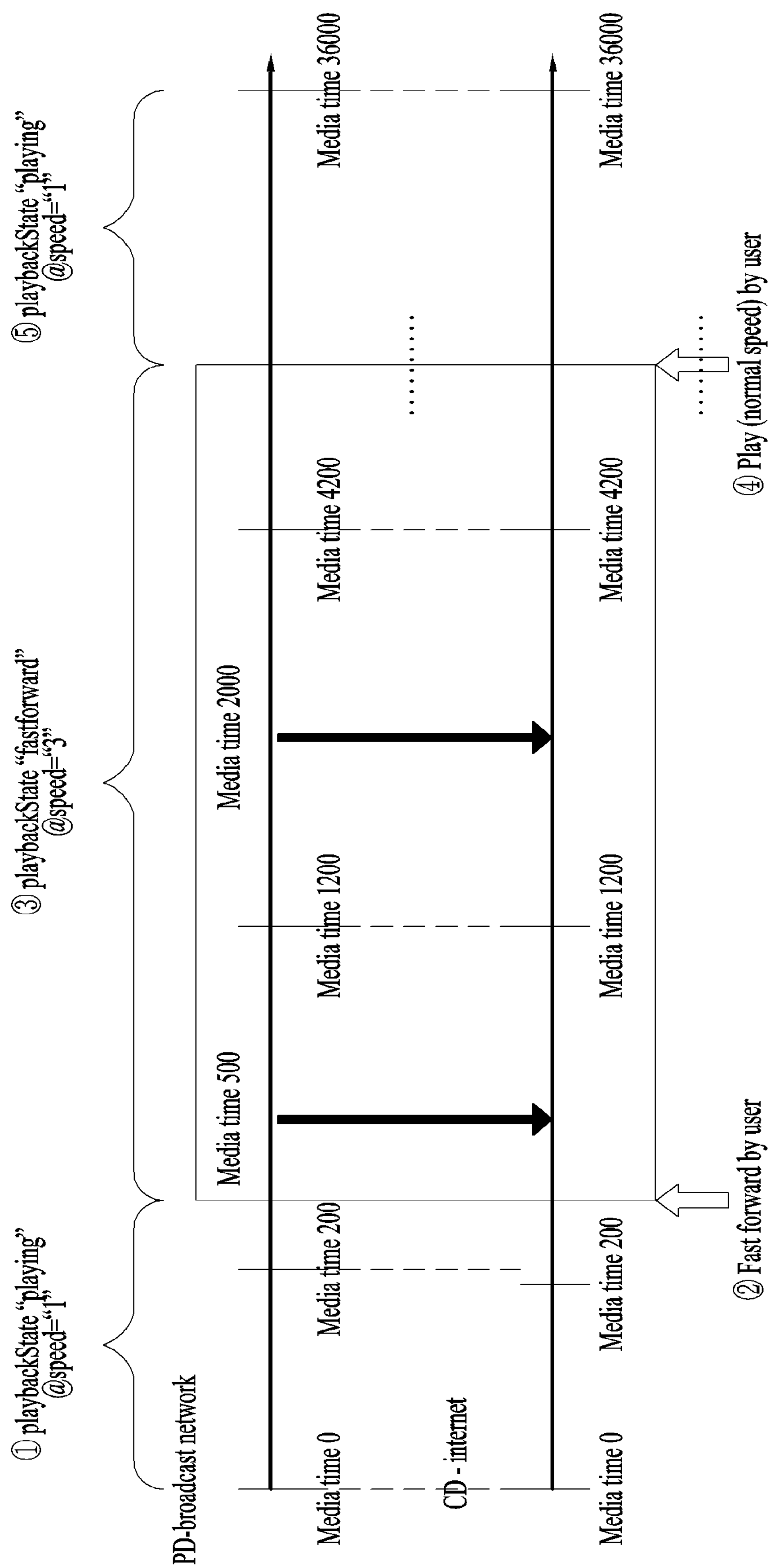
Figure 399:
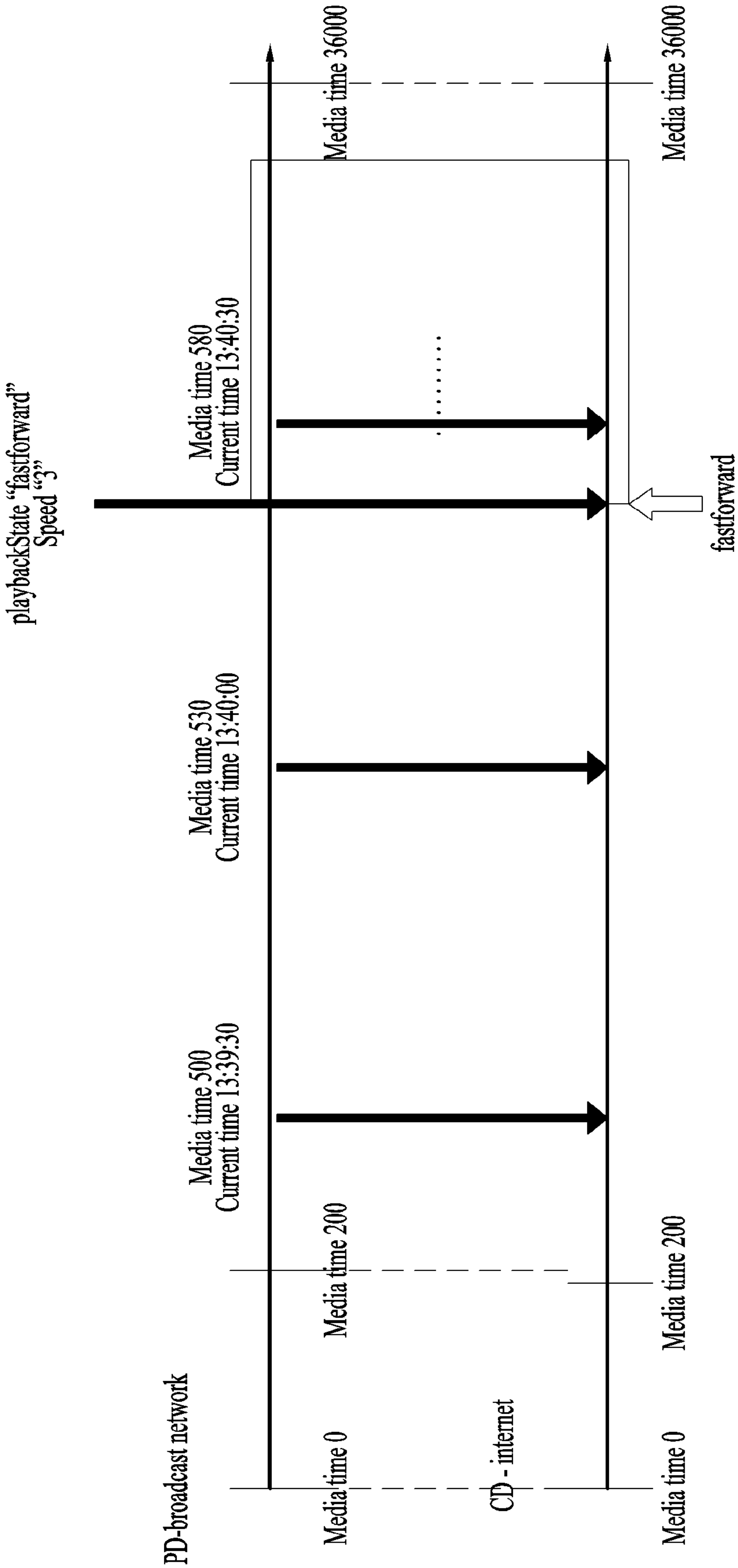
Figure 400:
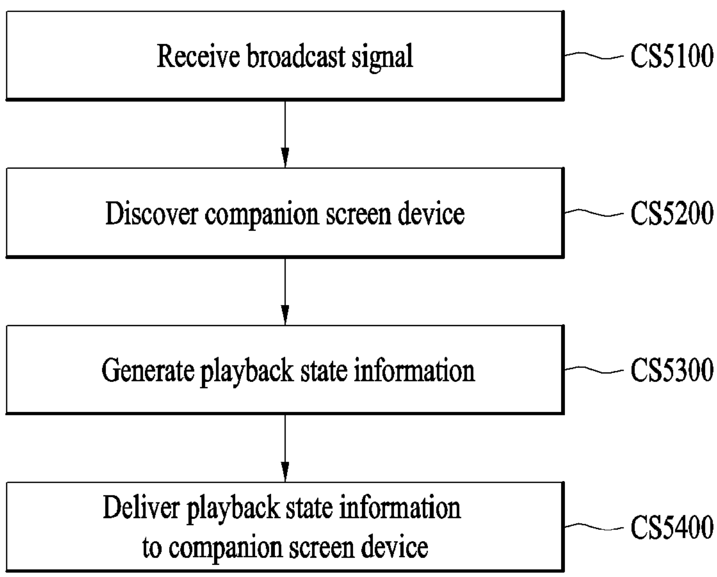
Figure 401:
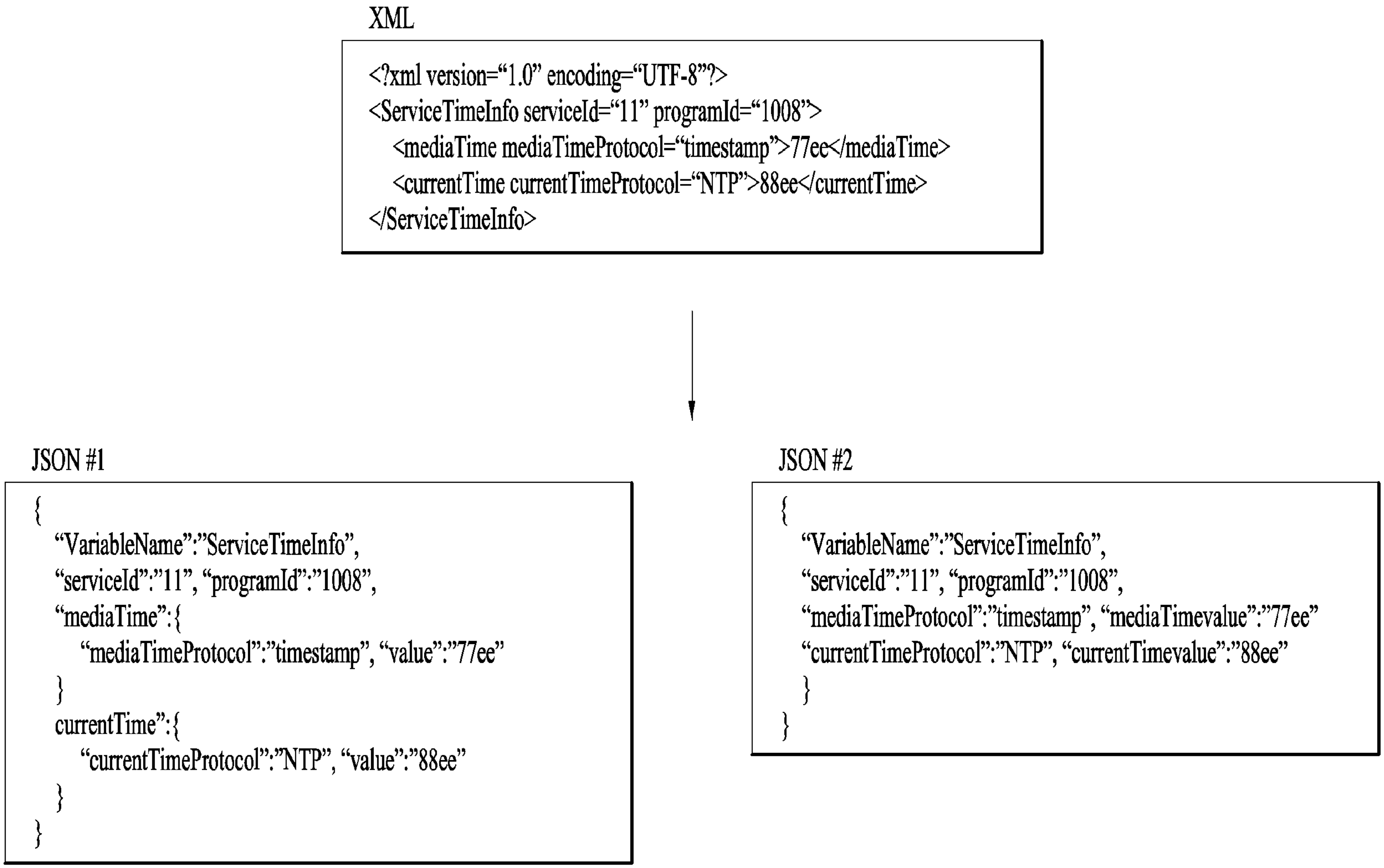
Figure 405:
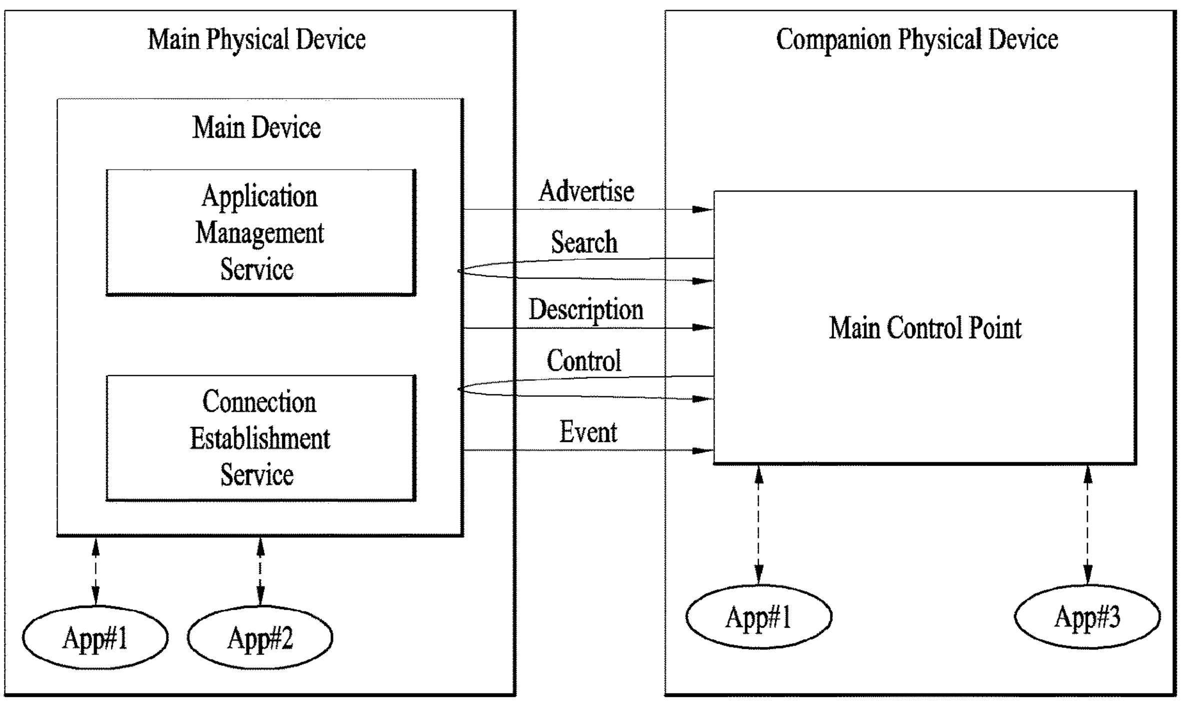
Figure 406:
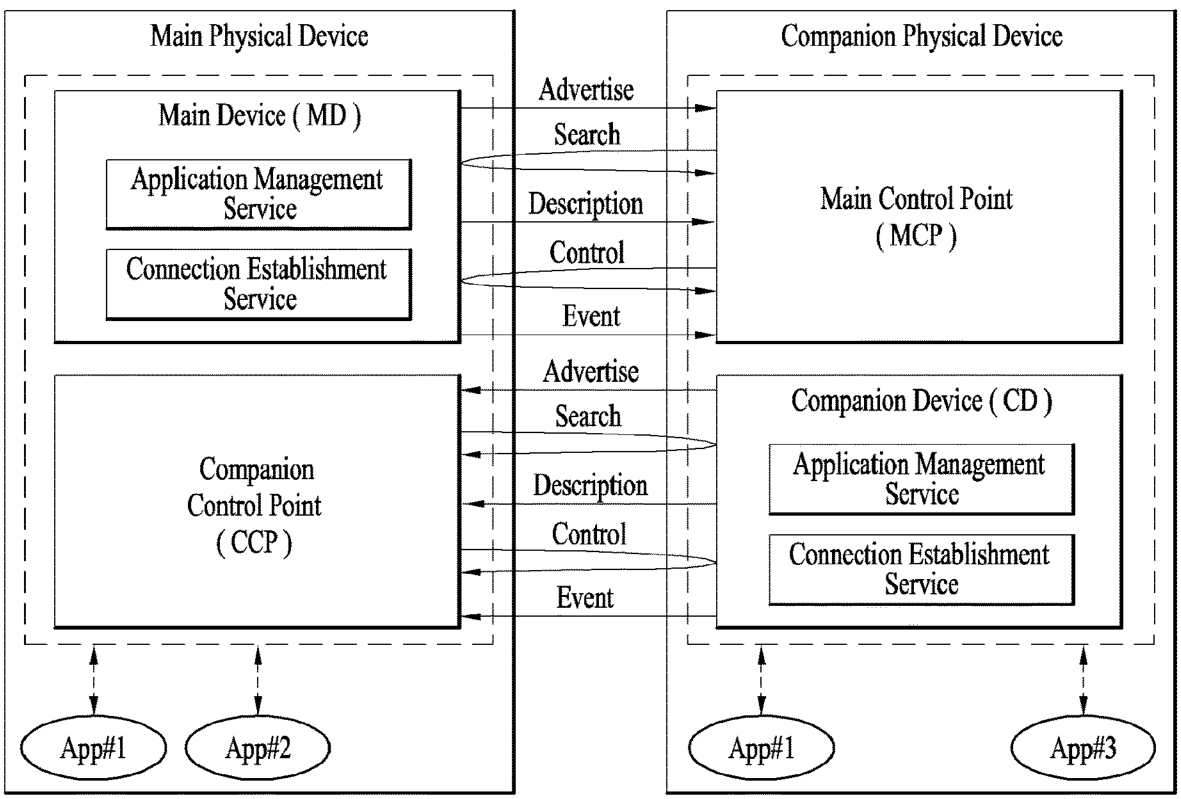
Figure 407:
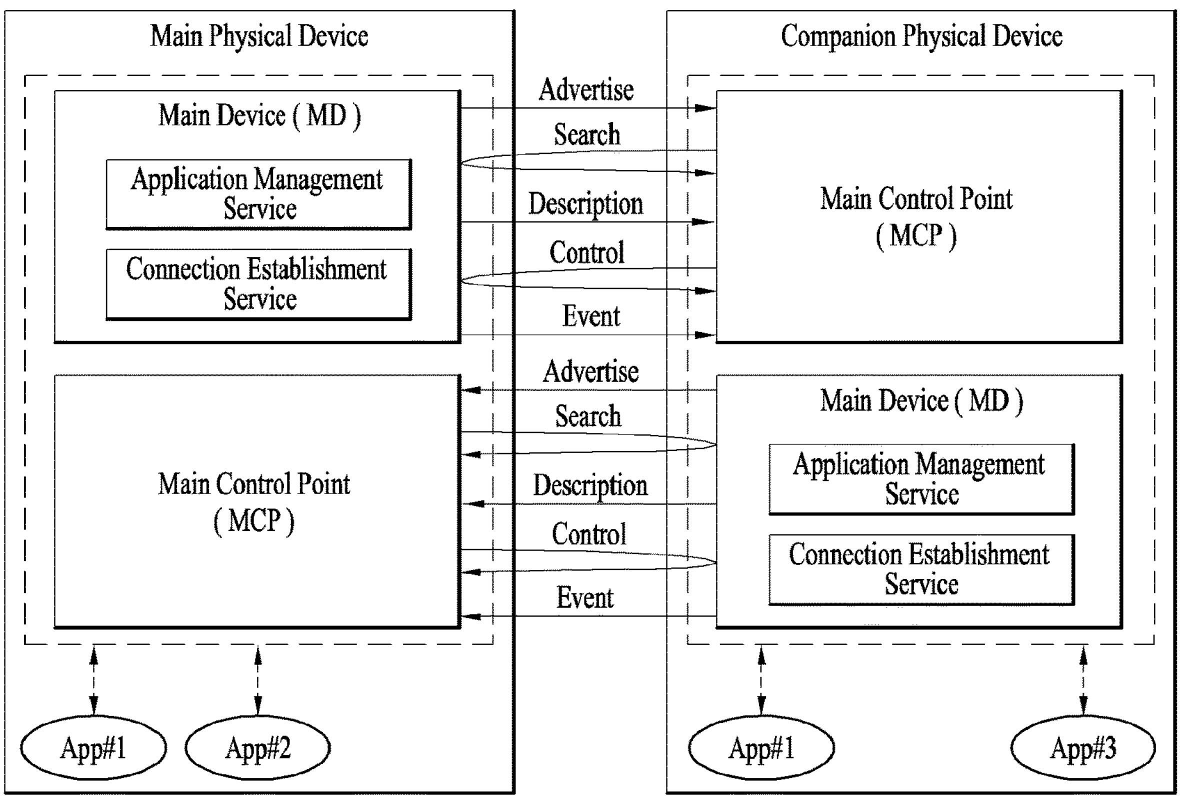
Figure 408:
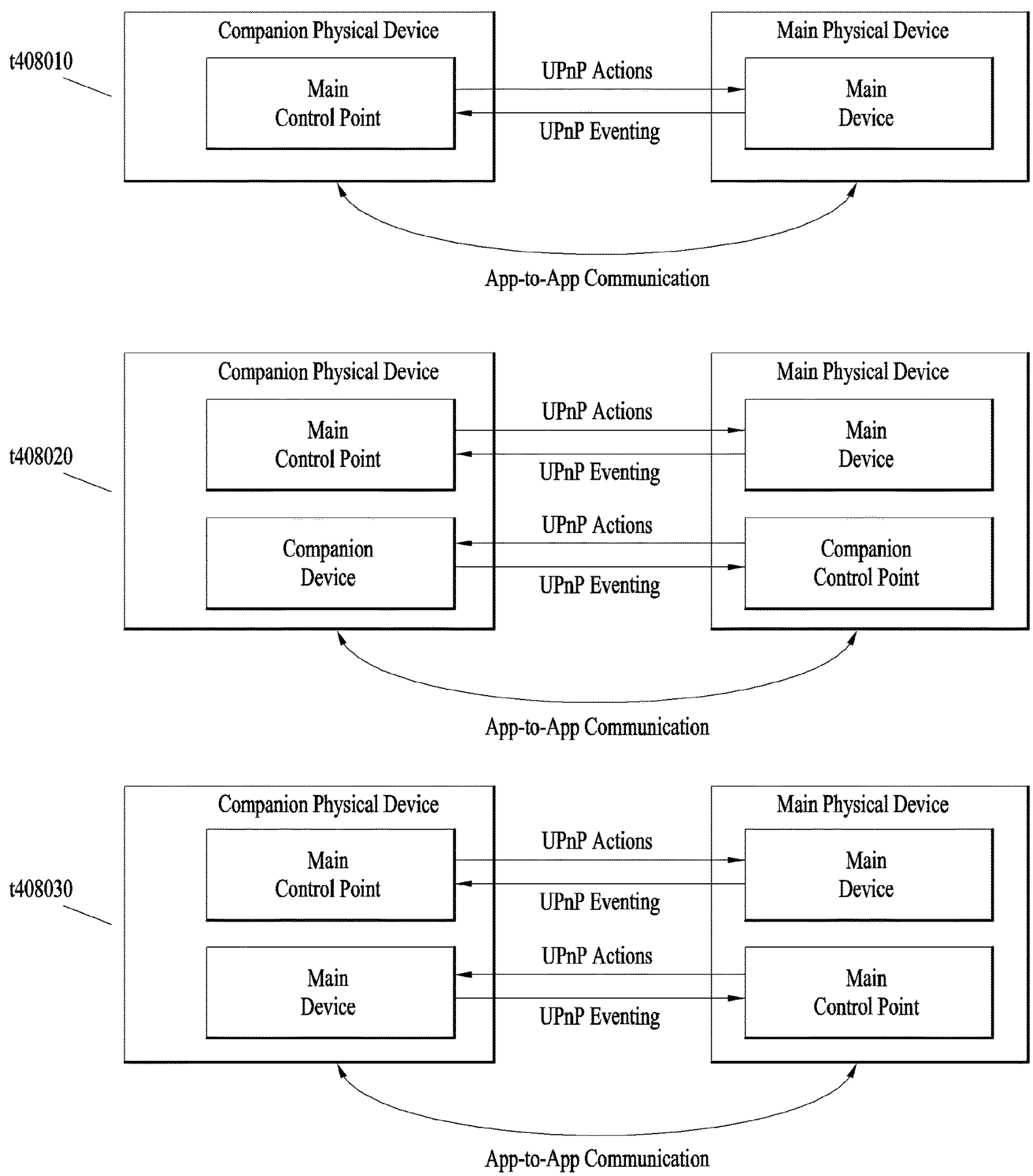
Figure 409:
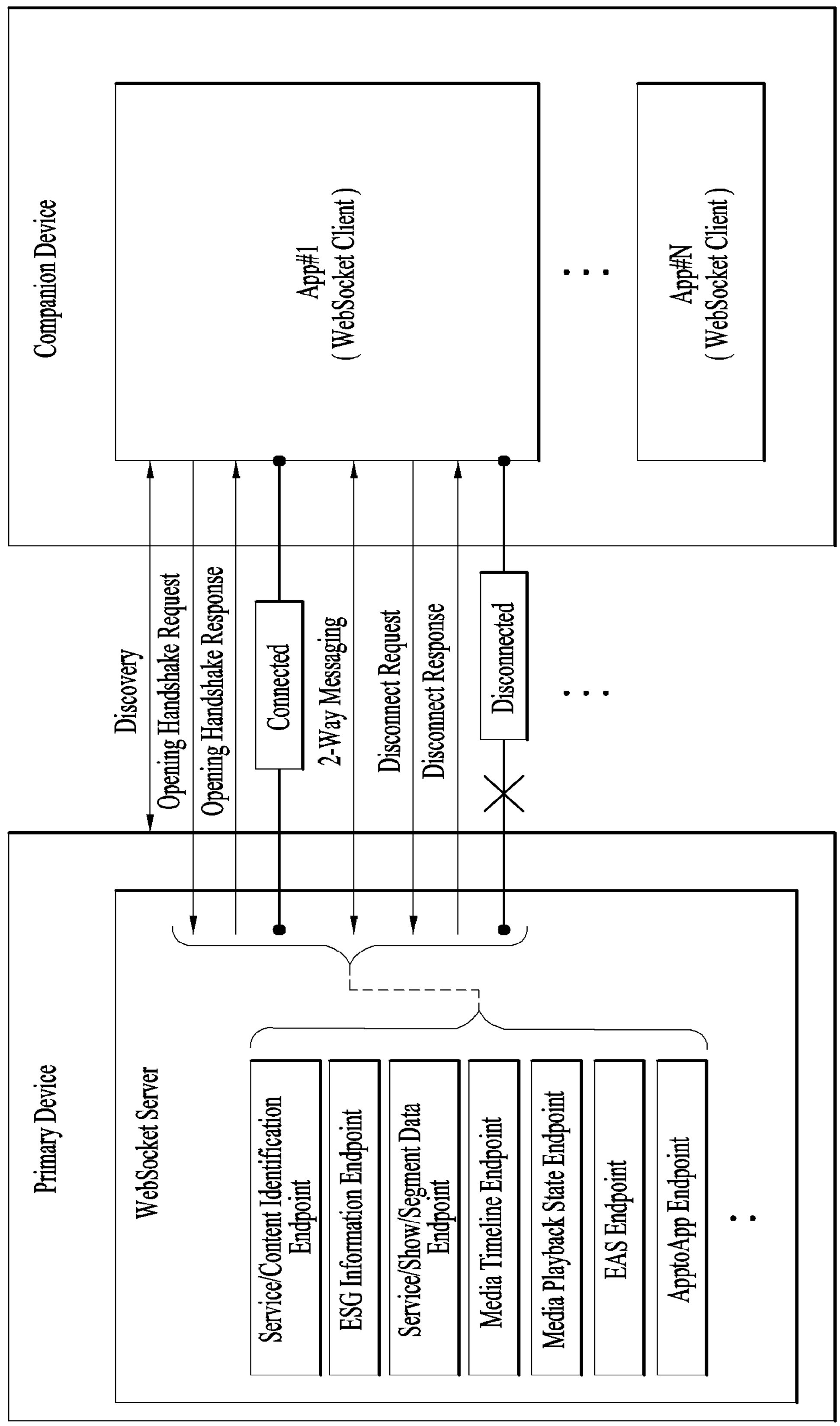
Figure 410:
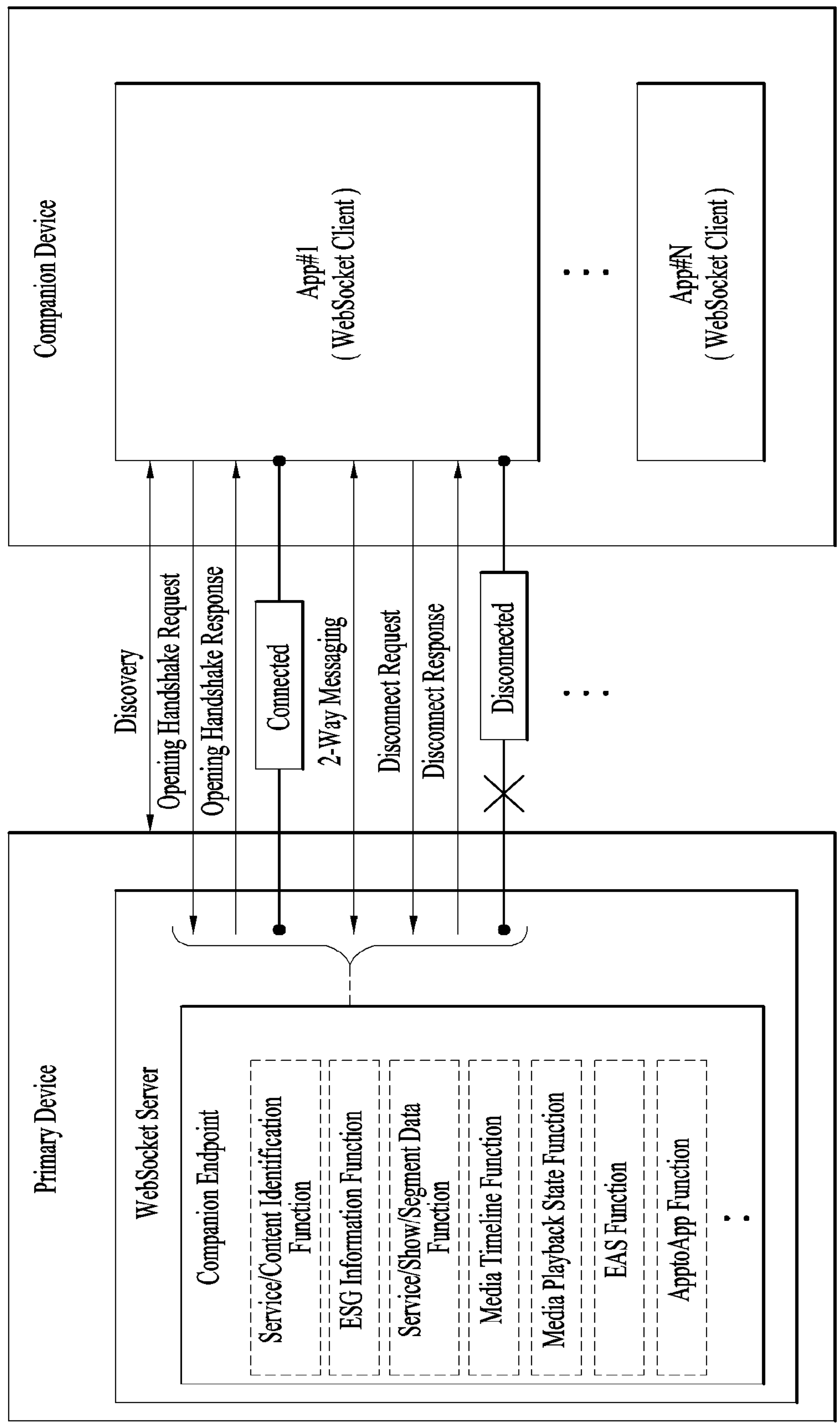
Figure 411:
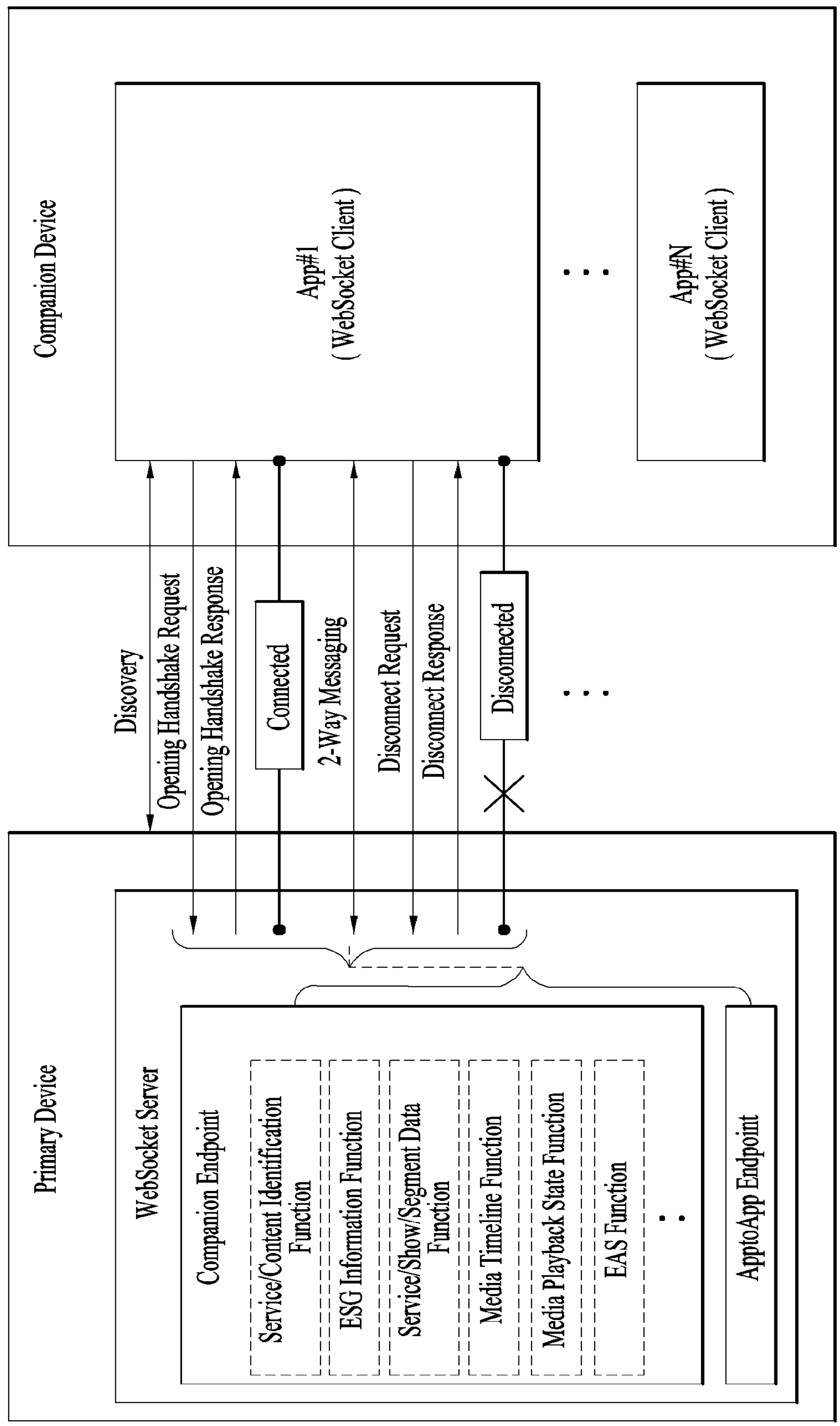
Figure 412:
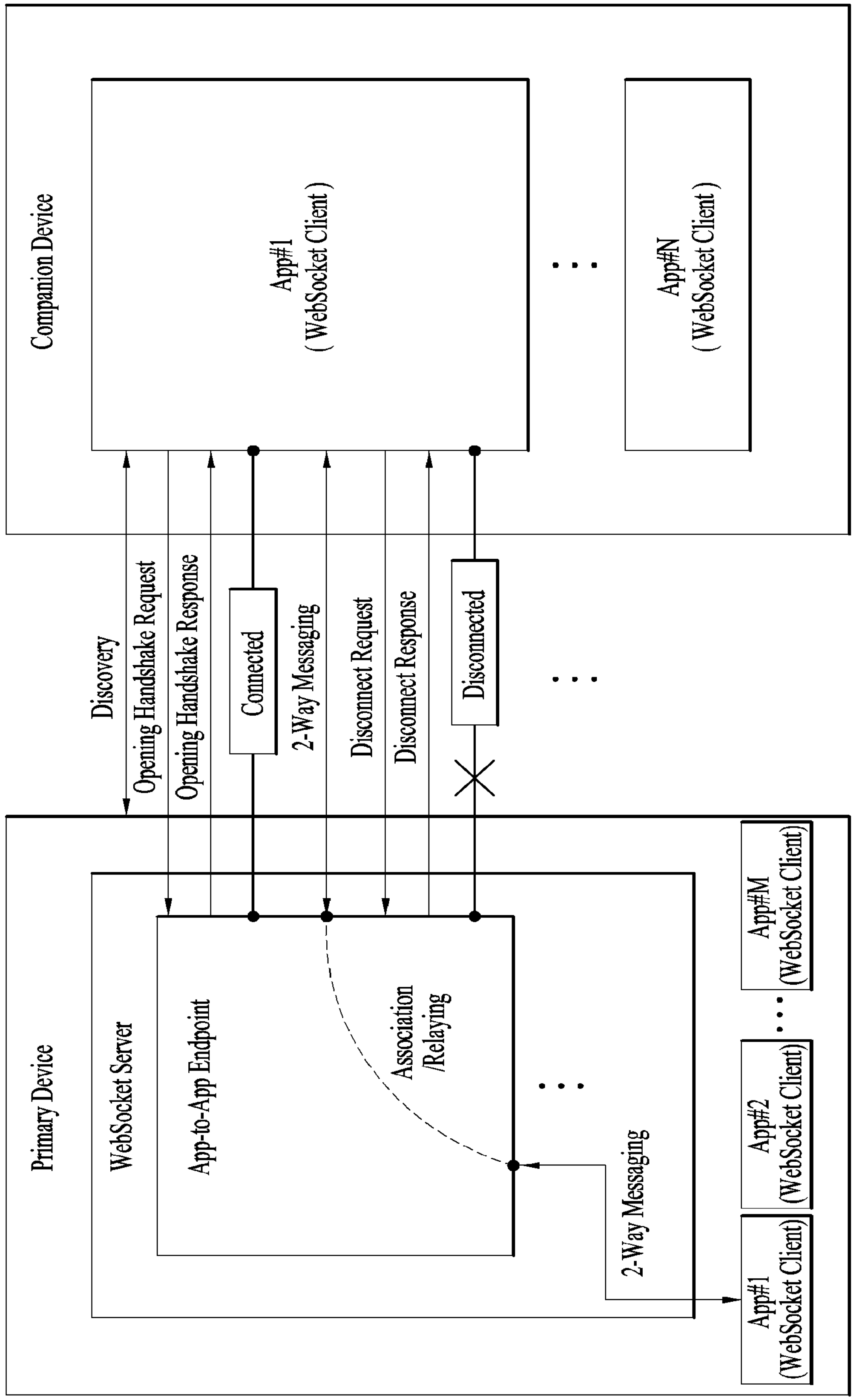
Figure 413:
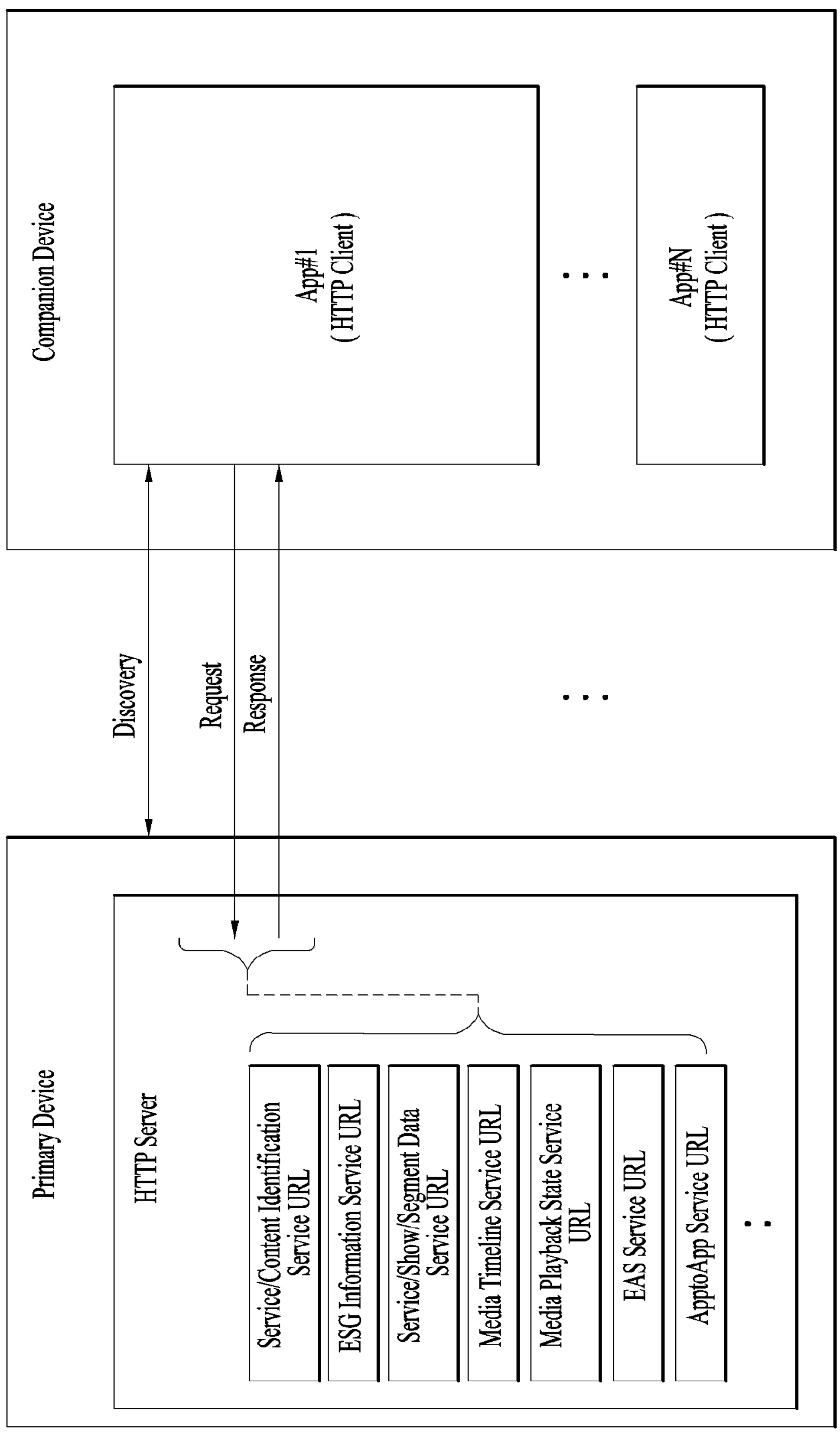
Figure 414:
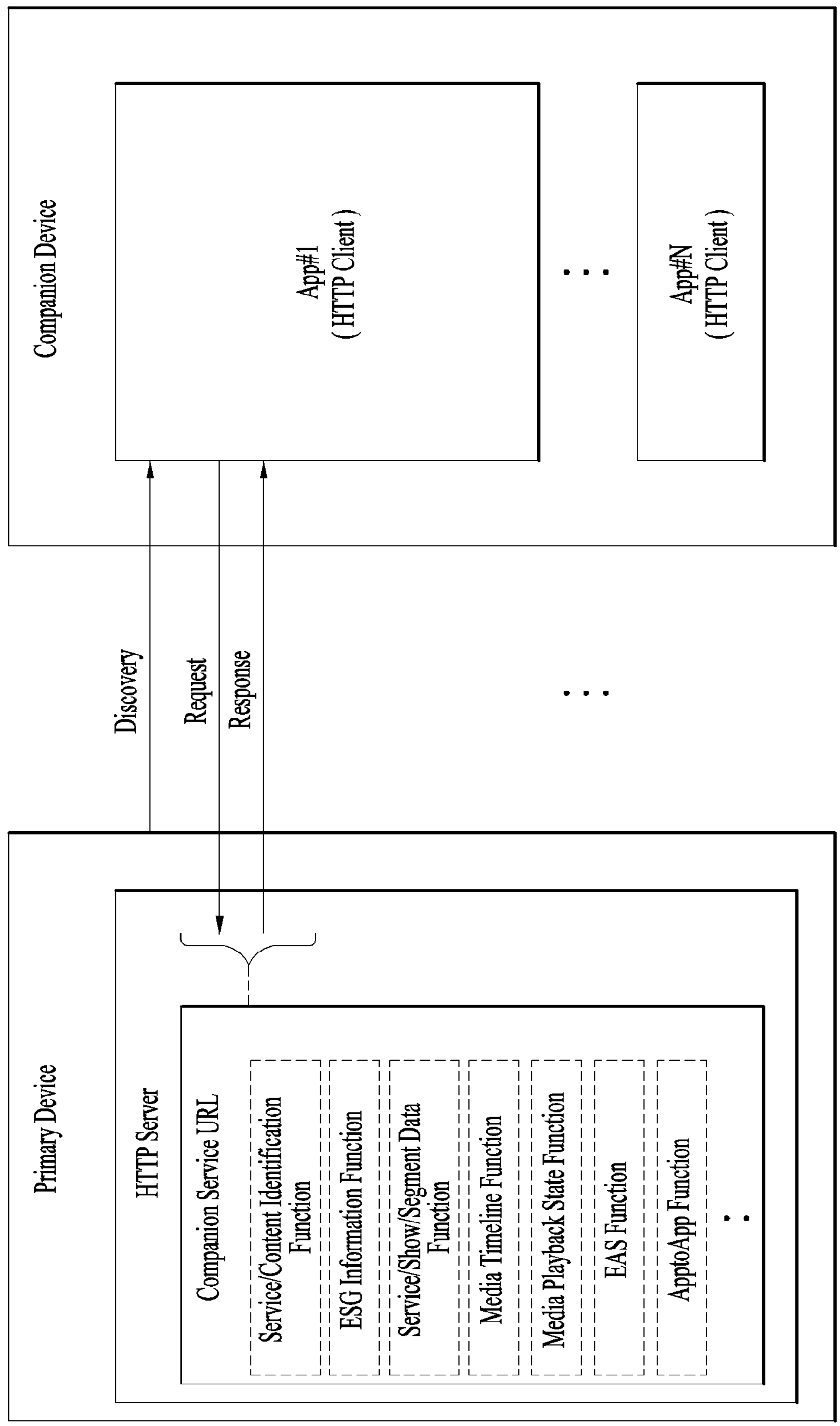
Figure 415:
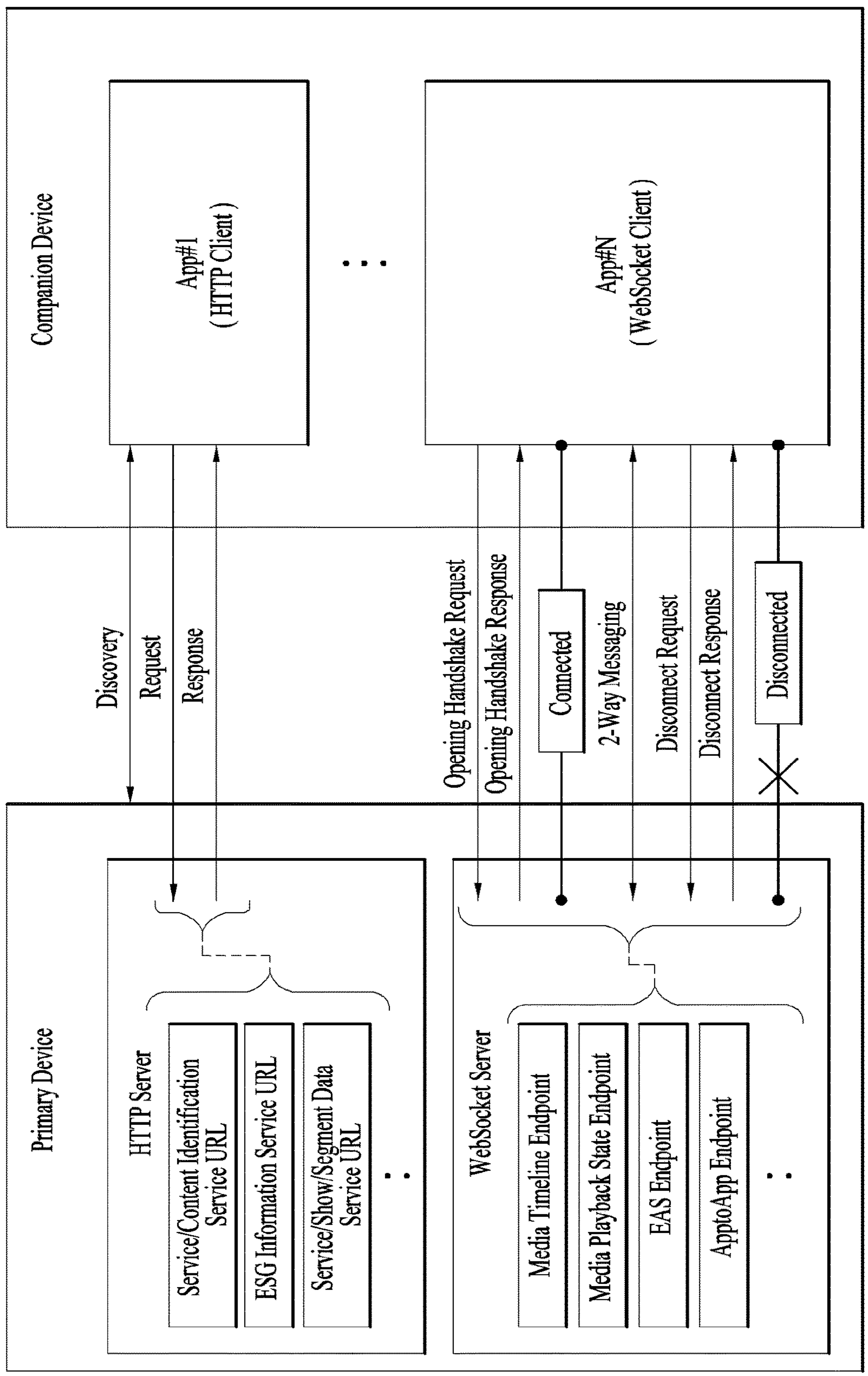
Figure 417:
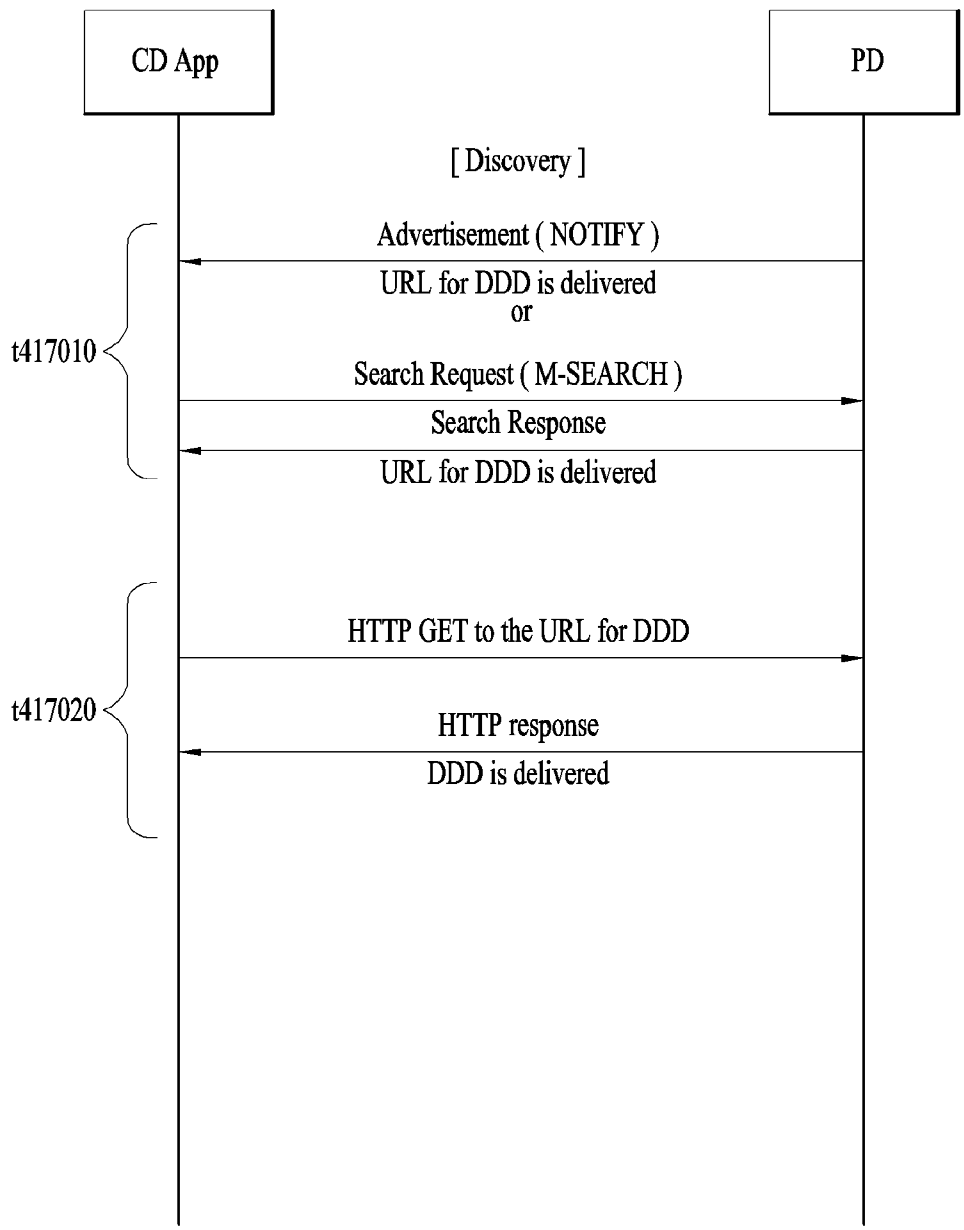
Figure 421:
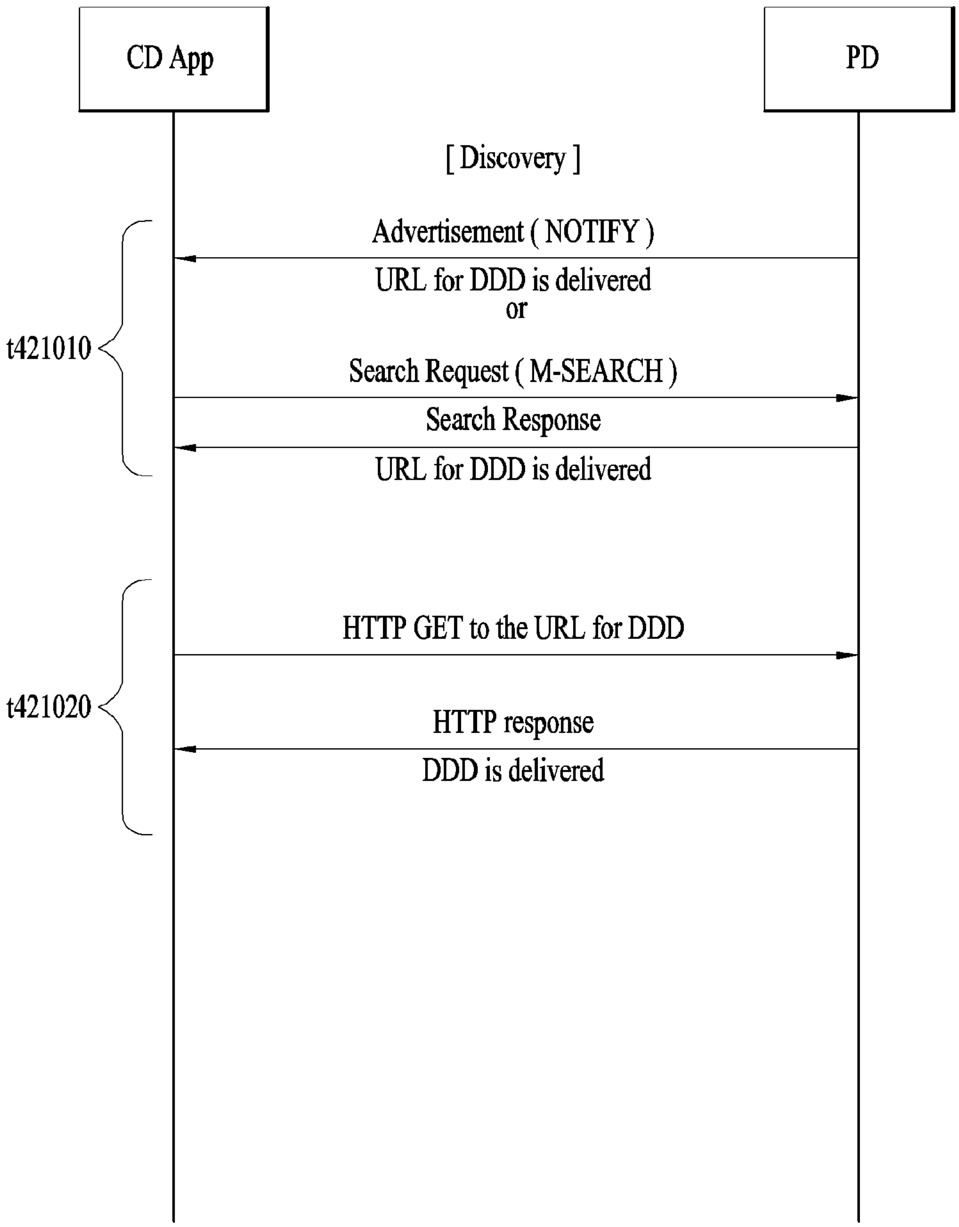
Figure 423:
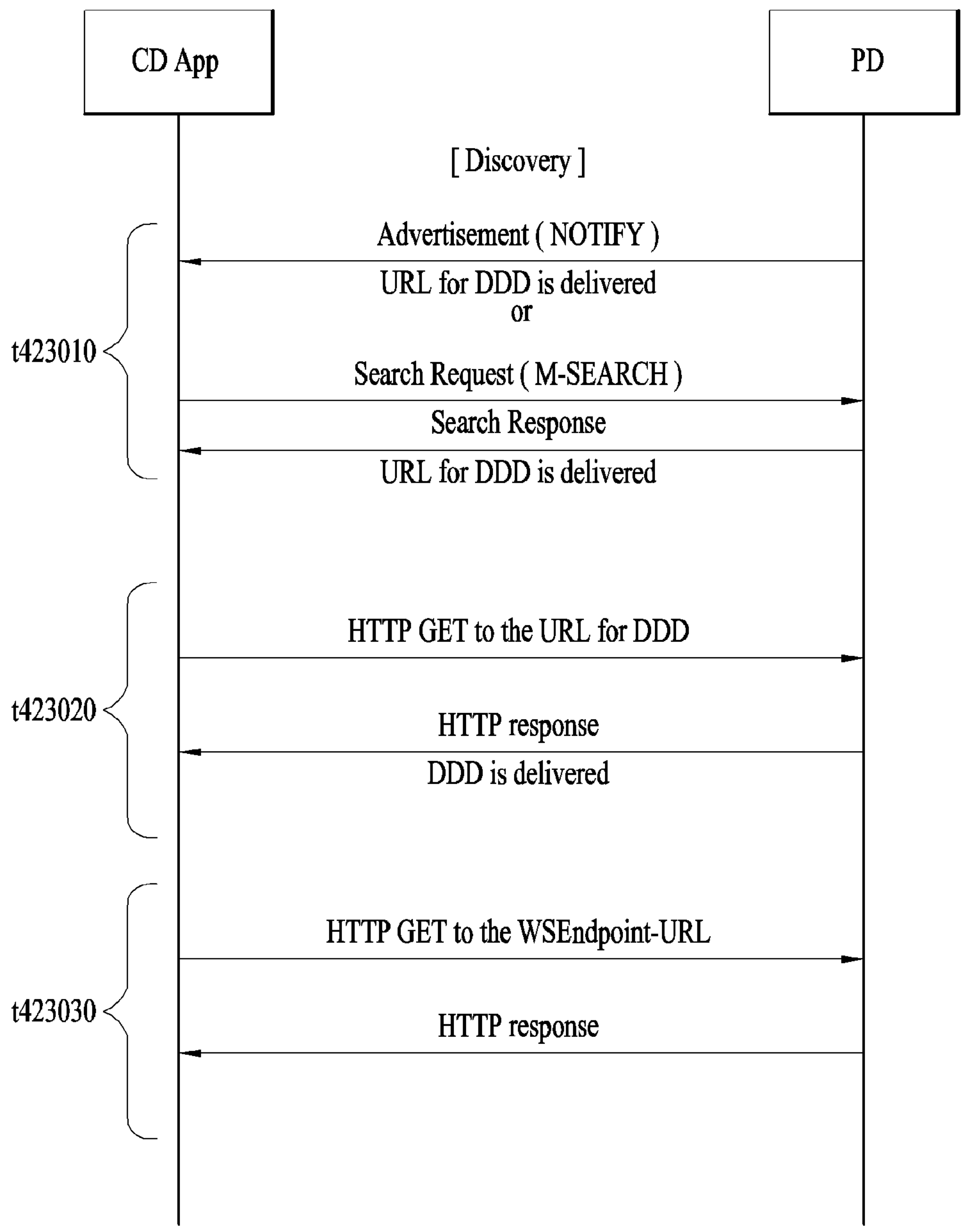
Figure 426:
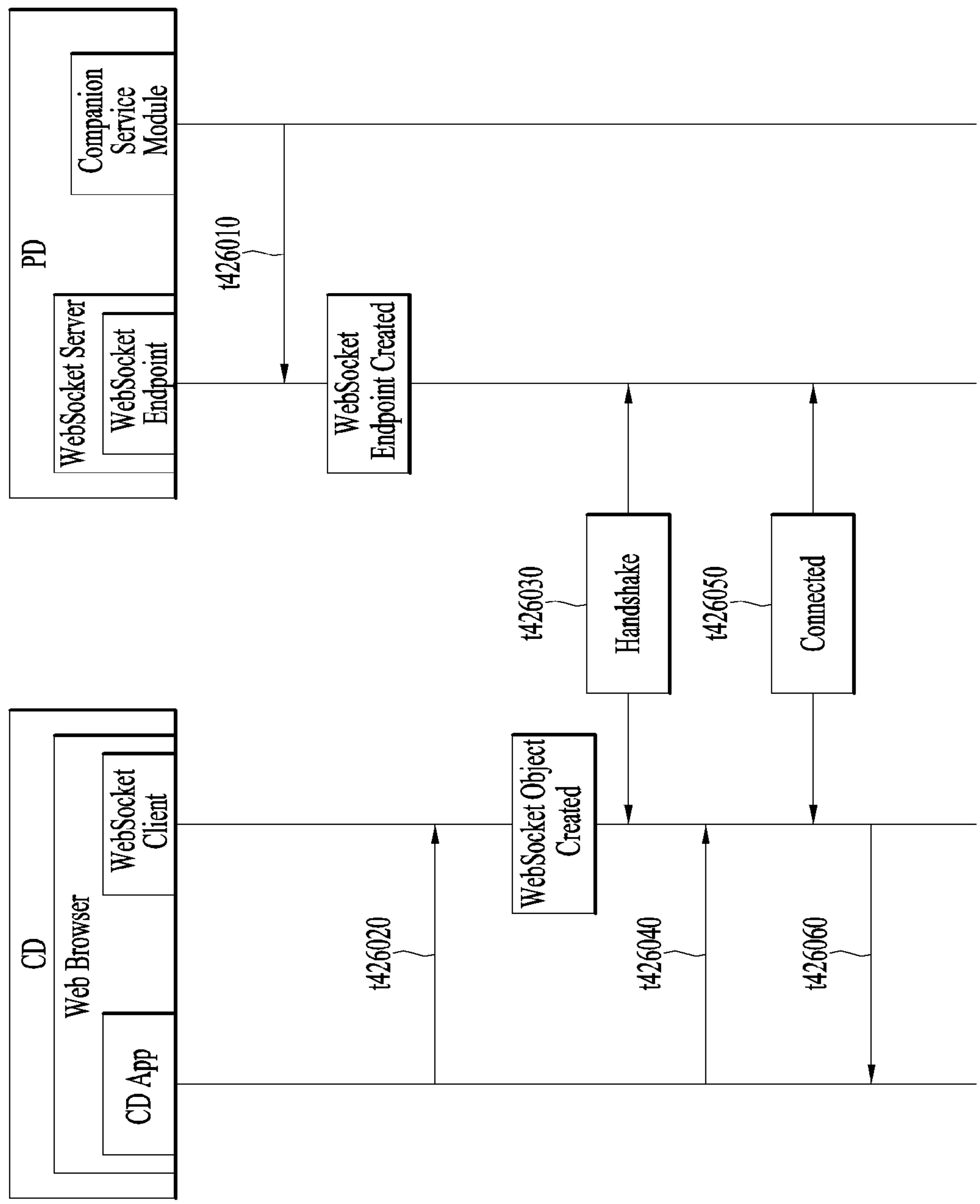
Figure 427:
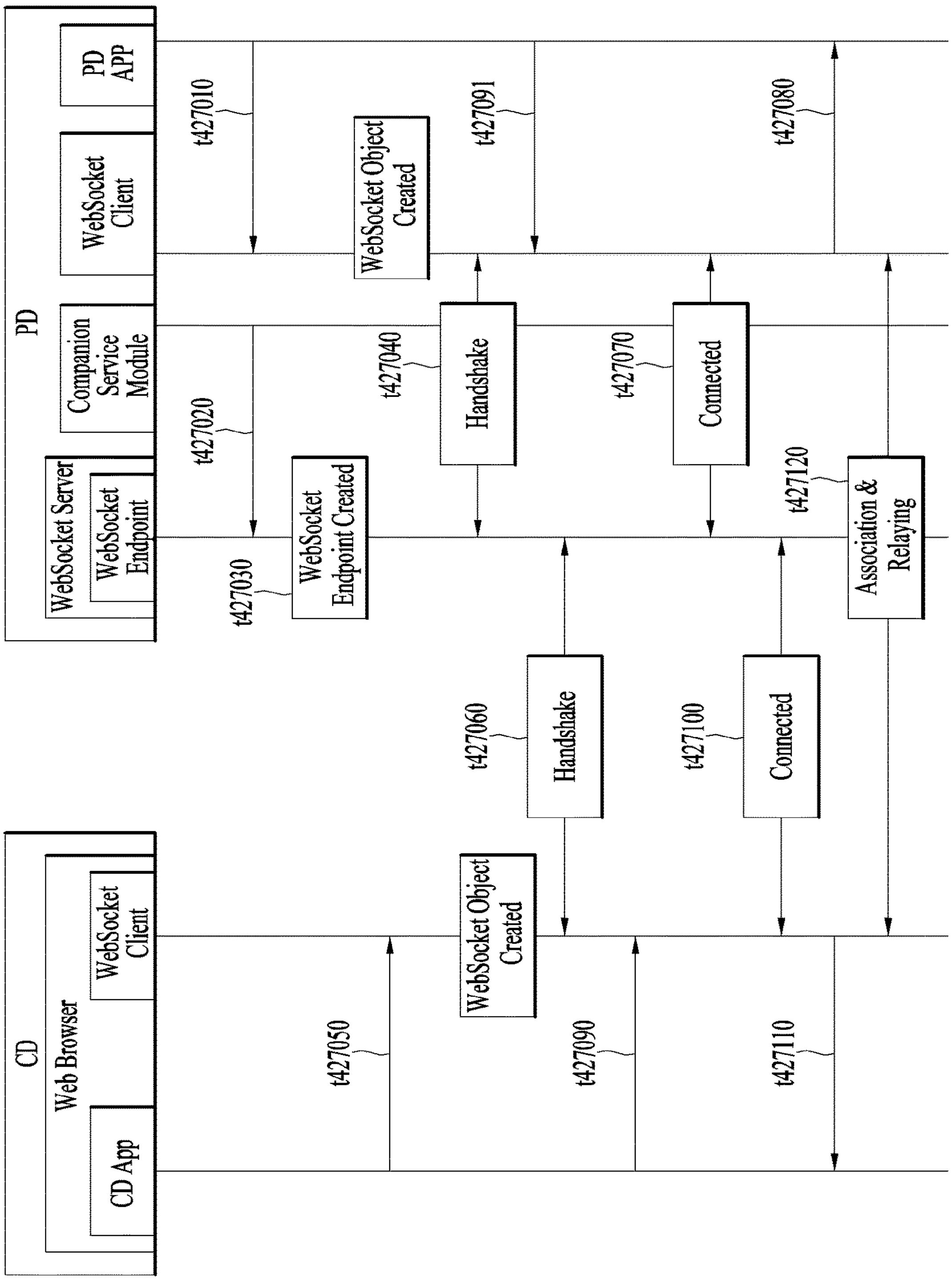
Figure 428:
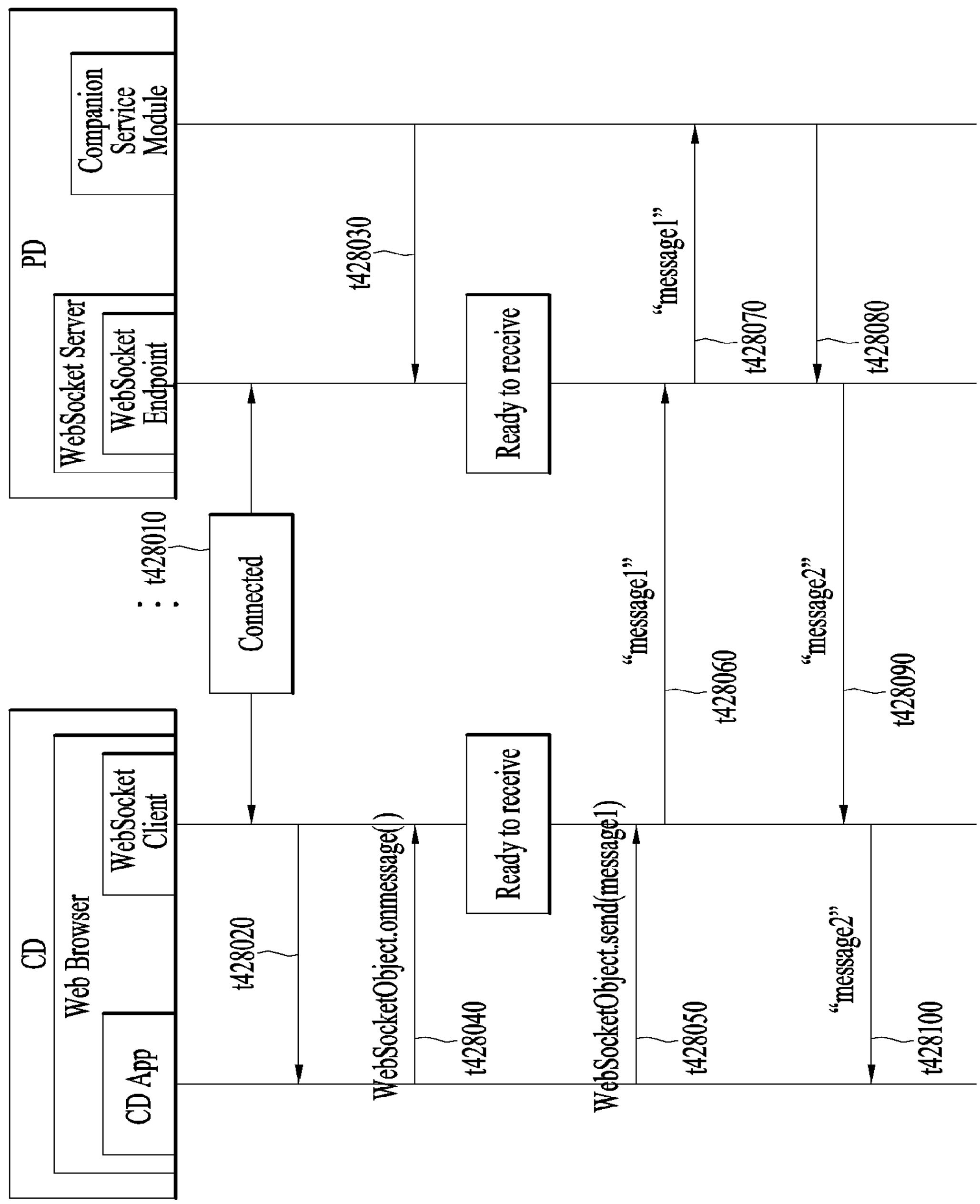
Figure 429:
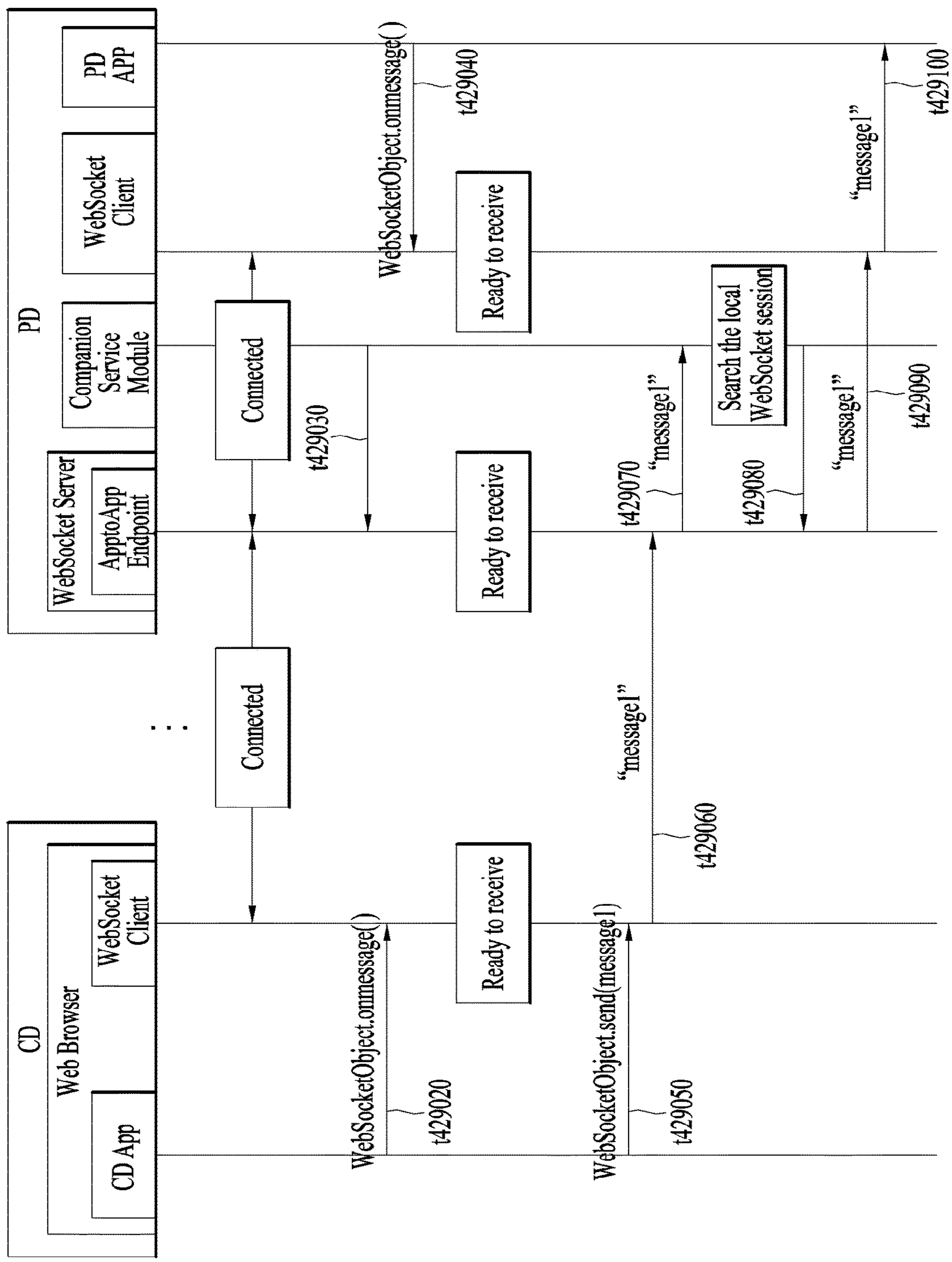
Figure 430:
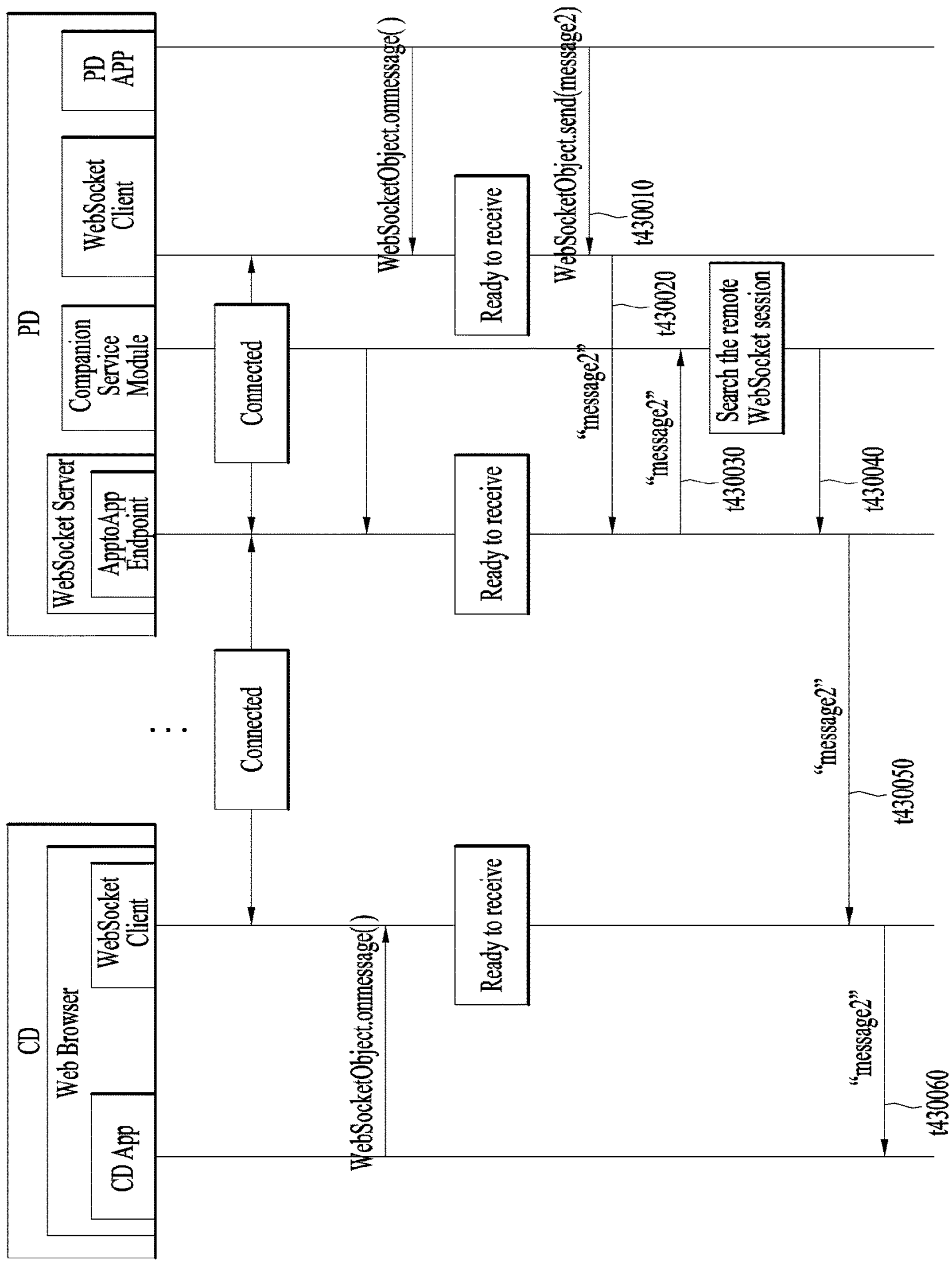
Figure 431:
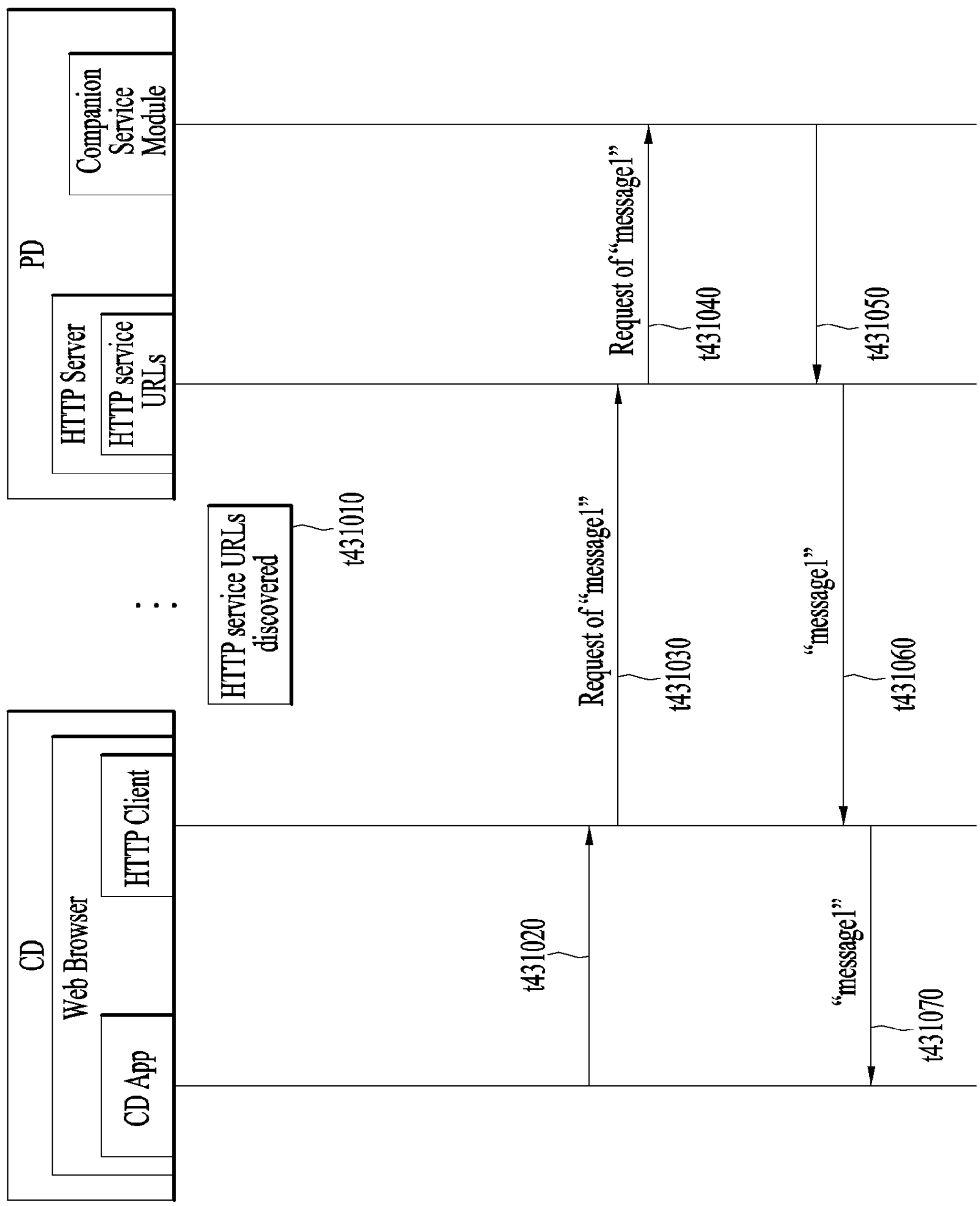
Figure 432:
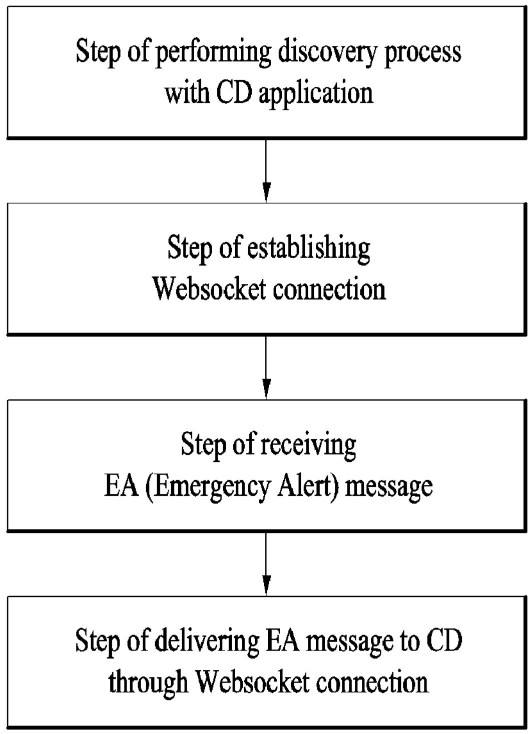
Figure 433:
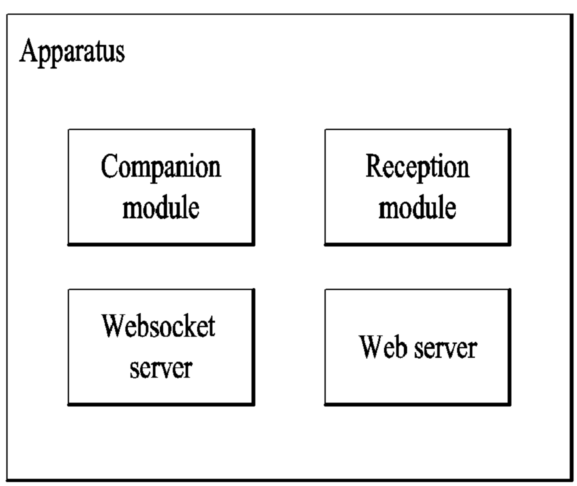
Figure 435:
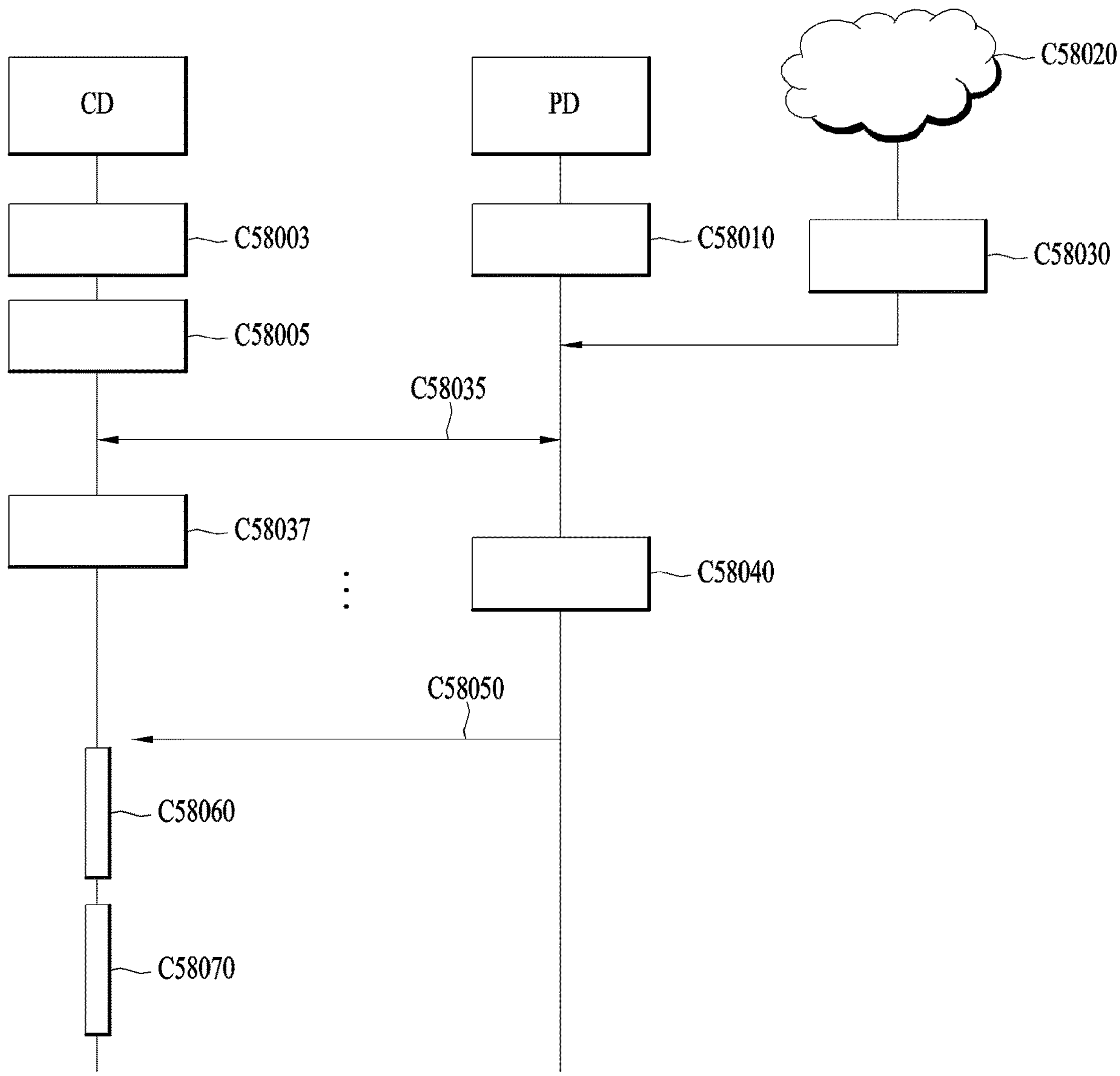

FIG. 131 is a view illustrating a complex video component according to another embodiment of the present invention;

FIG. 132 is a view illustrating a complex video component according to another embodiment of the present invention;

FIG. 133 is a view illustrating a media component configuration of audio service according to an embodiment of the present invention;

FIG. 134 is a view illustrating a configuration of a broadcast service including both audio and video according to an embodiment of the present invention;

FIG. 135 is a view illustrating a configuration of a user request content service according to an embodiment of the present invention;

FIG. 136 is a view illustrating a configuration of a stand-alone NRT data service according to an embodiment of the present invention;

FIG. 137 is a view illustrating media component information according to an embodiment of the present invention;

FIG. 138 is a view illustrating a value of a component_data field in media component signaling information according to another embodiment of the present invention;

FIG. 139 is a view illustrating complex component information according to an embodiment of the present invention;

FIG. 140 is a view illustrating a descriptor including complex component information according to an embodiment of the present invention;

FIG. 141 is a view illustrating related component list information according to an embodiment of the present invention;

FIG. 142 is a view of an NRT information table according to an embodiment of the present invention;

FIG. 143 is a view illustrating an NRT information block according to an embodiment of the present invention;

FIG. 144 is a view of an NRT service descriptor according to an embodiment of the present invention;

FIG. 145 is a view illustrating graphic icon information according to an embodiment of the present invention;

FIG. 146 is a view illustrating a value that an icon_transport_mode field of graphic icon information has according to an embodiment of the present invention;

FIG. 147 is a view illustrating a value that a coordinate_system field of graphic icon information has according to an embodiment of the present invention;

FIG. 148 is a view illustrating media component list information according to an embodiment of the present invention;

FIG. 149 is a view when a media component or a broadcast service is mapped through URI in a broadcast service signaling table according to an embodiment of the present invention;

FIG. 150 is a view illustrating targeting criterion information signaling the targeting criterion of a broadcast service or a media component;

FIG. 151 is a view illustrating text information for describing a broadcast service or a media component;

FIG. 152 is a view illustrating title information of a broadcast service, a program, or a show segment;

FIG. 153 is a view illustrating genre information of a broadcast service, a program, or a show segment;

FIG. 154 is a view illustrating target device information signaling a target device relating to a media component or a content item;

FIG. 155 is a view when a broadcast service is divided into a plurality of segments;

FIG. 156 is a view illustrating show information according to an embodiment of the present invention;

FIG. 157 is a view illustrating a show information block according to an embodiment of the present invention;

FIG. 158 is a view illustrating a segment information block according to an embodiment of the present invention;

FIG. 159 is a view when a broadcast transmission device transmits broadcast signals including at least one of show information and segment information according to an embodiment of the present invention;

FIG. 160 is a view when a broadcast reception device receives broadcast signal including at least one of show information and segment information according to an embodiment of the present invention;

FIG. 161 is a view illustrating program information according to an embodiment of the present invention;

FIG. 162 is a view illustrating a program information block according to an embodiment of the present invention;

FIG. 163 is a view illustrating a program information block according to another embodiment of the present invention;

FIG. 164 is a view illustrating a program information block according to another embodiment of the present invention;

FIG. 165 is a view illustrating a program information block according to another embodiment of the present invention;

FIG. 166 is a view illustrating a program information block according to another embodiment of the present invention;

FIG. 167 is a view illustrating segment information according to an embodiment of the present invention;

FIG. 168 is a view illustrating a segment information block according to an embodiment of the present invention;

FIG. 169 is a view illustrating a targeting segment set information according to an embodiment of the present invention;

FIG. 170 is a view when a broadcast transmission device transmits broadcast signal including at least one of program information and segment information according to an embodiment of the present invention;

FIG. 171 is a view when a broadcast reception device receives broadcast signal including at least one of program information and segment information according to an embodiment of the present invention;

FIG. 172 is a view illustrating a continuous component class, an audio component class, a video component class, and a closed caption component class;

FIG. 173 is a view illustrating an elementary audio component class, an elementary video component class, and an elementary closed caption component class;

FIG. 174 is a view illustrating a composite audio component class and a composite video component class;

FIG. 175 is a view illustrating a PickOne component class;

FIG. 176 is a view illustrating a presentable component class, a presentable video component class, a presentable audio component class, and a presentable subtitle component class;

FIG. 177 is a view illustrating an OnDemand component class;

FIG. 178 is a view illustrating an NRT content item class and an NRT file class;

FIG. 179 is a view illustrating an OnDemand component class according to another embodiment of the present invention;

FIG. 180 is a view illustrating an NRT content item class and an NRT file class according to another embodiment of the present invention;

FIG. 181 is a view illustrating a linear service class;

FIG. 182 is a view illustrating an App class and an App-based enhancement service;

FIG. 183 is a view illustrating a time base class and a notification stream class;

FIG. 184 is a view illustrating an App-based service class;

FIG. 185 is a view illustrating a program class;

FIG. 186 is a view illustrating a show class;

FIG. 187 is a view illustrating a segment class, a show segment class, and an interstitial segment class;

FIG. 188 is a view illustrating an inheritance relationship with a sub-property according to the type of broadcast service according to an embodiment of the present invention;

FIG. 189 is a view illustrating an inheritance relationship between a continuous component and components having a sub-property of the continuous component according to an embodiment of the present invention;

FIG. 190 is a view illustrating an inheritance relationship between a presentable component and components having a sub-property of the presentable component according to an embodiment of the present invention;

FIG. 191 is a view illustrating a relationship between a service, programs in the service, and segments in the programs according to an embodiment of the present invention;

FIG. 192 is a view illustrating an inheritance relationship with sub-attribute according to the type of broadcast service according to another embodiment of the present invention;

FIG. 193 is a view illustrating an inheritance relationship between a continuous component and components having a sub-attribute of the continuous component according to an embodiment of the present invention;

FIG. 194 is a view illustrating an inheritance relationship of an NRT content item class and an NRT file;

FIG. 195 is a view illustrating a relationship between a service, programs in the service, and segments in the programs according to another embodiment of the present invention;

FIG. 196 is a view illustrating a layer hierarchy of a presentable audio component;

FIG. 197 is a flowchart illustrating operations when a broadcast reception device displays an auto-launch app based service through a broadcast service guide and stores it as a favorite or downloads it;

FIG. 198 is a view illustrating an inheritance relationship with sub-attribute according to the type of broadcast service according to another embodiment of the present invention;

FIG. 199 is a view illustrating an inheritance relationship between a continuous component and components having a sub-attribute of the continuous component according to an embodiment of the present invention;

FIG. 200 is a view illustrating an inheritance relationship between a presentable component and components having a sub-attribute of the presentable component according to another embodiment of the present invention;

FIG. 201 is a flowchart illustrating operations of a broadcast transmission device to transmit information signaling a video including a sign language screen according to an embodiment of the present invention;

FIG. 202 is a flowchart illustrating operations of a broadcast reception device to display a video including a sign language screen according to an embodiment of the present invention;

FIG. 203 is a view illustrating an interface of a user input for setting a sign language by a broadcast reception device according to an embodiment of the present invention;

FIG. 204 is a view showing a broadcast system for providing a broadcast service interoperating with a companion device according to an embodiment of the present invention;

FIG. 205 is a view showing properties of a broadcast service signaled according to an embodiment of the present invention;

FIG. 206 is a view showing values of target device information among properties of a broadcast service signaled according to an embodiment of the present invention;

FIG. 207 is a view showing a UPnP action mechanism according to an embodiment of the present invention;

FIG. 208 is a view showing a representational state transfer (REST) action mechanism according to an embodiment of the present invention;

FIG. 209 is a view showing service signaling messages of a broadcast reception device and a companion device using an eventing method according to an embodiment of the present invention;

FIG. 210 is a ladder diagram showing operation for signaling a broadcast service property from a broadcast receiving device to a companion device according to an embodiment of the present invention;

FIG. 211 is a view showing the data format of a broadcast service property signaled from a broadcast receiving device to a companion device according to an embodiment of the present invention;

FIG. 212 is a view showing a variables indicating that the state of a broadcast service property signaled from a broadcast receiving device to a companion device, an action for the broadcast service property and an action argument according to an embodiment of the present invention;

FIG. 213 is a ladder diagram showing operation for signaling a broadcast service property from a broadcast receiving device to a companion device according to another embodiment of the present invention;

FIG. 214 is a view showing data format indicating whether a broadcast service property signaled from a broadcast receiving device to a companion device is changed according to another embodiment of the present invention;

FIG. 215 is a view showing a variable indicating the state of a broadcast service property signaled from a broadcast receiving device to a companion device according to another embodiment of the present invention;

FIG. 216 is a view showing data format indicating whether a broadcast service property signaled from a broadcast receiving device to a companion device is changed according to another embodiment of the present invention;

FIG. 217 is a view showing the variable indicating the state of a broadcast service property signaled from a broadcast receiving device to a companion device according to another embodiment of the present invention;

FIG. 218 is a ladder diagram showing operation for signaling a broadcast service property from a broadcast receiving device to a companion device according to another embodiment of the present invention;

FIG. 219 is a view showing a variable indicating the state of a broadcast service property signaled from a broadcast receiving device to a companion device according to another embodiment of the present invention;

FIG. 220 is a view showing an action for acquiring a broadcast service property according to an embodiment of the present invention;

FIG. 221 is a ladder diagram showing operation for signaling a broadcast service property from a broadcast receiving device to a companion device according to another embodiment of the present invention;

FIG. 222 is a view showing a variable indicating the state of a broadcast service property signaled from a broadcast receiving device to a companion device, an action for the broadcast service property and an action argument according to another embodiment of the present invention;

FIG. 223 is a ladder diagram showing operation for signaling a broadcast service property from a broadcast receiving device to a companion device according to another embodiment of the present invention;

FIG. 224 is a view showing a process of generating and transmitting an emergency alert over a broadcast network according to an embodiment of the present invention;

FIG. 225 is a view showing extraction and display of an emergency alert signaled by a broadcast receiving device over a broadcast network according to an embodiment of the present invention;

FIG. 226 is a view showing the format of a CAP message according to an embodiment of the present invention;

FIG. 227 is a view showing a service type, a service ID, a variable indicating an emergency alert state, an emergency alert action and an action argument of an emergency alert service signaled by a broadcast receiving device according to an embodiment of the present invention;

FIG. 228 is a ladder diagram showing operation for signaling an emergency alert from a broadcast receiving device to a companion device according to an embodiment of the present invention;

FIG. 229 is a view showing information included in an emergency alert notification message of a broadcast receiving device according to an embodiment of the present invention;

FIG. 230 is a diagram illustrating an emergency alert notification message according to an embodiment of the present invention;

FIGS. 231 to 233 are views showing criteria for determining priority of an emergency alert at a broadcast reception device according to another embodiment of the present invention;

FIG. 234 is a view showing a variable indicating the state of an emergency alert signaled by a broadcast reception device, an emergency alert action and an action argument according to another embodiment of the present invention;

FIG. 235 is a ladder diagram showing operation for signaling an emergency alert from a broadcast receiving device to a companion device according to another embodiment of the present invention;

FIG. 236 is a view showing an emergency alert message in XML returned from a broadcast receiving device according to an embodiment of the present invention;

FIG. 237 is a view showing a variable indicating the state of an emergency alert signaled by a broadcast receiving device, an emergency alert action and an action argument according to another embodiment of the present invention;

FIG. 238 is a ladder diagram showing operation for signaling an emergency alert from a broadcast receiving device to a companion device according to another embodiment of the present invention;

FIG. 239 is a view showing a variable indicating the state of an emergency alert signaled by a broadcast receiving device according to another embodiment of the present invention;

FIG. 240 is a view showing an action and action argument of an emergency alert signaled by a broadcast receiving device according to another embodiment of the present invention;

FIG. 241 is a ladder diagram showing operation for signaling an emergency alert from a broadcast receiving device to a companion device according to another embodiment of the present invention;

FIG. 242 is a ladder diagram showing operation for signaling an emergency alert from a broadcast receiving device to a companion device according to another embodiment of the present invention;

FIG. 243 is a view showing NRT data signaling information for a companion device according to an embodiment of the present invention;

FIG. 244 is a view showing a broadcast receiving apparatus generating NRT data signaling information for a companion device based on NRT data signaling information for the broadcast receiving device according to an embodiment of the present invention;

FIG. 245 is a view showing a variable for NRT data, an action for acquiring NRT data and an action argument according to an embodiment of the present invention;

FIG. 246 is a view showing signaling of NRT data from a broadcast receiving device to a companion device according to an embodiment of the present invention;

FIG. 247 is a view showing signaling of NRT data from a broadcast receiving device to a companion device according to another embodiment of the present invention;

FIG. 248 is a view showing device capability information signaled from a broadcast receiving device to a companion device according to an embodiment of the present invention;

FIG. 249 is a view showing a state variable indicating device capability information according to an embodiment of the present invention;

FIG. 250 is a view showing an action for acquiring device capability information and an action argument according to an embodiment of the present invention;

FIG. 251 is a view showing signaling of device information from a broadcast receiving device to a companion device according to an embodiment of the present invention;

FIG. 252 is a view showing signaling of device information from a broadcast reception device to a companion device according to an embodiment of the present invention;

FIG. 253 is a view showing signaling of device information from a broadcast reception device to a companion device according to another embodiment of the present invention;

FIG. 254 is a view showing signaling of device information from a broadcast reception device to a companion device according to another embodiment of the present invention;

FIG. 255 is a view showing device capability information signaled from a broadcast reception device to a companion device according to an embodiment of the present invention;

FIG. 256 is a view showing signaling of device information from a broadcast reception device to a companion device according to an embodiment of the present invention;

FIG. 257 is a view showing signaling of device information from a broadcast reception device to a companion device according to an embodiment of the present invention;

FIG. 258 is a flowchart illustrating operation of a companion device according to an embodiment of the present invention;

FIG. 259 is a flowchart illustrating operation of a broadcast reception device according to an embodiment of the present invention;

FIG. 260 is a diagram showing the configuration of a broadcast system according to an embodiment of the present invention;

FIG. 261 is a diagram showing the configuration of a broadcast reception device according to an embodiment of the present invention;

FIG. 262 is a diagram showing an application layer transport protocol stack according to an embodiment of the present invention;

FIG. 263 is a diagram showing a broadcast transport frame according to an embodiment of the present invention;

FIG. 264 is a diagram showing a broadcast transport frame according to an embodiment of the present invention;

FIG. 265 is a diagram showing a broadcast transport frame according to an embodiment of the present invention;

FIG. 266 is a diagram showing LCT packets according to an embodiment of the present invention;

FIG. 267 is a diagram showing delivery of signaling information through a FIC and/or a PLP according to an embodiment of the present invention;

FIG. 268 is a diagram showing delivery of signaling information through a transport session according to an embodiment of the present invention;

FIG. 269 is a diagram showing delivery of signaling information through a transport session according to an embodiment of the present invention;

FIG. 270 is a diagram showing the configuration of a service signaling message according to an embodiment of the present invention;

FIG. 271 is a ladder diagram showing operation for signaling an emergency alert from a broadcast reception device to a companion device according to an embodiment of the present invention;

FIG. 272 is a diagram showing a header message format for delivery of an emergency alert multicast message according to an embodiment of the present invention;

FIG. 273 is a diagram showing a body message format for delivery of an emergency alert multicast message according to an embodiment of the present invention;

FIG. 274 is a diagram showing a body message format for delivery of an emergency alert multicast message according to an embodiment of the present invention;

FIG. 275 is a flowchart illustrating of a broadcast reception device according to an embodiment of the present invention;

FIG. 276 is a diagram illustrating a broadcast system according to an embodiment of the present invention;

FIG. 277 is a diagram illustrating a broadcast transmitting method according to an embodiment of the present invention;

FIG. 278 is a diagram illustrating a broadcast receiving method according to an embodiment of the present invention;

FIG. 279 illustrates an app-related broadcast service according to an embodiment of the present invention;

FIG. 280 illustrates part of ApplicationList elements according to an embodiment of the present invention;

FIG. 281 illustrates another part of ApplicationList elements according to an embodiment of the present invention;

FIG. 282 illustrates an EMT (Event Message Table) according to an embodiment of the present invention;

FIG. 283 illustrates an AST delivered through broadcast according to an embodiment of the present invention;

FIG. 284 illustrates an AST delivered over broadband according to an embodiment of the present invention;

FIG. 285 illustrates an event delivered in the form of an EventStream element through broadcast according to an embodiment of the present invention;

FIG. 286 illustrates an event delivered in the form of an emsg box through broadcast according to an embodiment of the present invention;

FIG. 287 illustrates an event delivered in the form of an EventStream element over broadband according to an embodiment of the present invention;

FIG. 288 illustrates an event delivered in the form of an emsg box over broadband according to an embodiment of the present invention;

FIG. 289 illustrates an API and an event listener according to an embodiment of the present invention;

FIG. 290 illustrates a broadcast transmission method according to an embodiment of the present invention;

FIG. 291 illustrates a broadcast reception method according to an embodiment of the present invention;

FIG. 292 is a block diagram illustrating an operation of a broadcast reception apparatus to receive an MPD of MPEG-DASH over a broadcast network through which broadcast streams are delivered according to MPEG-2 TS;

FIG. 293 is a block diagram illustrating synchronization between broadcast content of a broadcast stream transmitted according to MPEG-2 TS and media content transmitted over a communication network, performed by a broadcast reception apparatus;

FIG. 294 illustrates a configuration of a broadcast reception apparatus according to an embodiment of the present invention;

FIG. 295 illustrates a configuration of a broadcast reception apparatus according to another embodiment of the present invention;

FIG. 296 illustrates a configuration of a broadcast reception apparatus according to another embodiment of the present invention;

FIG. 297 is a flowchart illustrating an operation of a broadcast reception apparatus 100 to scan broadcast services and generate a channel map;

FIG. 298 is a flowchart illustrating an operation of the broadcast reception apparatus 100 to receive a broadcast service;

FIG. 299 is a flowchart illustrating an operation of the broadcast reception apparatus to acquire a media component on the basis of media content presentation information;

FIG. 300 illustrates a broadcast transport frame according to an embodiment of the present invention;

FIG. 301 illustrates a broadcast transport frame according to another embodiment of the present invention;

FIG. 302 illustrates a configuration of a service signaling message according to an embodiment of the present invention;

FIG. 303 illustrates a configuration of a broadcast service signaling message in a future broadcast system according to an embodiment of the present invention;

FIG. 304 illustrates meanings of values indicated by a timebase_transport_mode field and a signaling_transport_mode field in the service signaling message according to an embodiment of the present invention;

FIG. 305 illustrates a syntax of a bootstrap( ) field in accordance with values of the timebase_transport_mode field and the signaling_transport_mode field according to an embodiment of the present invention;

FIG. 306 illustrates a syntax of a bootstrap( ) field in accordance with values of the timebase_transport_mode field and the signaling_transport_mode field according to an embodiment of the present invention;

FIG. 307 illustrates a syntax of a bootstrap( ) field in accordance with values of the timebase_transport_mode field and the signaling_transport_mode field according to an embodiment of the present invention;

FIG. 308 illustrates a syntax of a bootstrap( ) field in accordance with values of the timebase_transport_mode field and the signaling_transport_mode field according to an embodiment of the present invention;

FIG. 309 illustrates a syntax of a bootstrap( ) field in accordance with values of the timebase_transport_mode field and the signaling_transport_mode field according to an embodiment of the present invention;

FIG. 310 illustrates a syntax of a bootstrap( ) field in accordance with values of the timebase_transport_mode field and the signaling_transport_mode field according to an embodiment of the present invention;

FIG. 311 illustrates a syntax of a bootstrap( ) field in accordance with values of the timebase_transport_mode field and the signaling_transport_mode field according to an embodiment of the present invention;

FIG. 312 illustrates a procedure for acquiring a timebase and a service signaling message in the embodiments shown in FIGS. 303 to 311;

FIG. 313 illustrates a configuration of a broadcast service signaling message in a future broadcast system according to an embodiment of the present invention;

FIG. 314 illustrates a configuration of a broadcast service signaling message in a future broadcast system according to an embodiment of the present invention;

FIG. 315 illustrates meanings of values of transmission modes described in FIG. 314;

FIG. 316 illustrates a configuration of a signaling message that signals a path through which component data of a broadcast service is acquired in a future broadcast system;

FIG. 317 illustrates a syntax of an app_delevery_info( ) field according to an embodiment of the present invention;

FIG. 318 illustrates a syntax of the app_delevery_info( ) field according to another embodiment of the present invention;

FIG. 319 illustrates component location signaling including information on one or more paths through which component data of a broadcast service can be acquired;

FIG. 320 illustrates a configuration of the component location signaling of FIG. 319;

FIG. 321 is a flowchart illustrating an operation process of a broadcast reception apparatus according to an embodiment of the present invention;

FIG. 322 is a flowchart illustrating an operation process of a broadcast transmission apparatus according to an embodiment of the present invention;

FIG. 323 shows triggers according to the above-described trigger syntaxes;

FIG. 324 shows a syntax of triggering application information according to an embodiment of the present invention;

FIG. 325 shows a matching relationship between a trigger property for signaling trigger type information according to an embodiment of the present invention, an MPD element and an event message box;

FIG. 326 shows trigger type information according to an embodiment of the present invention;

FIG. 327 shows a syntax of triggering application information according to an embodiment of the present invention;

FIG. 328 shows a matching relationship between a trigger property for signaling a position of information about an application triggered according to an embodiment of the present invention, an MPD element and an event message box;

FIG. 329 shows a matching relationship between a trigger property for signaling an application state according to an embodiment of the present invention, an MPD element and an event message box;

FIG. 330 shows a matching relationship between a trigger property for signaling operation of an application according to an embodiment of the present invention, an MPD element and an event message box;

FIG. 331 shows a matching relationship between a trigger property for signaling media time according to an embodiment of the present invention, an MPD element and an event message box;

FIG. 332 shows definition of value attributes for signaling all trigger properties as a single event according to an embodiment of the present invention;

FIG. 333 shows a matching relationship between an ID attribute and a message attribute of an event element for signaling all trigger properties as a single event according to an embodiment of the present invention, and an ID field and a message data field of an event message box;

FIG. 334 shows a structure of an MMT protocol package according to an embodiment of the present invention;

FIG. 335 shows a structure of an MMTP packet and types of data included in the MMTP packet according to an embodiment of the present invention;

FIG. 336 shows a syntax of an MMTP payload header when an MMTP packet includes an MPU fragment according to an embodiment of the present invention;

FIG. 337 shows synchronization between content and triggers transmitted through MPUs according to an embodiment of the present invention;

FIG. 338 shows a syntax of an MMT signaling message according to another embodiment of the present invention;

FIG. 339 shows a relationship between values of IDs for identifying MMT signaling messages and data signaled by the MMT signaling messages according to another embodiment of the present invention;

FIG. 340 shows a syntax of a signaling message including application signaling information according to another embodiment of the present invention;

FIG. 341 shows a syntax of an application signaling table including application signaling information according to another embodiment of the present invention;

FIG. 342 shows a relationship between trigger type information included in an application signaling table and a trigger property included in a trigger according to another embodiment of the present invention;

FIG. 343 shows a relationship between values of IDs for identifying MMT signaling messages and data signaled by the MMT signaling message according to another embodiment of the present invention;

FIG. 344 shows an application signaling table including no trigger type information, differently from the aforementioned application signaling table;

FIG. 345 shows a structure of an MMTP packet according to another embodiment of the present invention;

FIG. 346 shows a structure of an MMTP packet and a syntax of a header extension field for transmitting application signaling information according to another embodiment of the present invention;

FIG. 347 illustrates transmission of a broadcast signal on the basis of application signaling information, performed by a broadcast transmission apparatus, according to embodiments of the present invention;

FIG. 348 illustrates acquisition of application signaling information on the basis of a broadcast signal, performed by a broadcast reception apparatus, according to embodiments of the present invention;

FIG. 349 illustrates event information according to an embodiment of the present invention;

FIG. 350 illustrates an XML format of the event information according to an embodiment of the present invention;

FIG. 351 illustrates a UPnP Action Mechanism according to an embodiment of the present invention;

FIG. 352 illustrates a REST Mechanism according to an embodiment of the present invention;

FIG. 353 illustrates state variables for trigger delivery according to an embodiment of the present invention;

FIG. 354 illustrates trigger list information according to an embodiment of the present invention;

FIG. 355 illustrates an XML format of the trigger list information according to an embodiment of the present invention;

FIG. 356 illustrates trigger delivery information according to an embodiment of the present invention;

FIG. 357 illustrates trigger delivery information according to an embodiment of the present invention;

FIG. 358 illustrates trigger delivery information according to an embodiment of the present invention;

FIG. 359 illustrates an XML format of trigger list information according to an embodiment of the present invention;

FIG. 360 illustrates trigger delivery information according to an embodiment of the present invention;

FIG. 361 is a flow diagram when trigger type information according to an embodiment of the present invention indicates “action”;

FIG. 362 illustrates an XML format of TriggerInfoList when the trigger type information according to an embodiment of the present invention indicates “action”;

FIG. 363 is a flow diagram when the trigger type information according to an embodiment of the present invention indicates “action”;

FIG. 364 illustrates an XML format of TriggerInfoList when the trigger type information according to an embodiment of the present invention indicates “action”;

FIG. 365 is a flow diagram when the trigger type information according to an embodiment of the present invention indicates “status”;

FIG. 366 illustrates an XML format of TriggerInfoList when the trigger type information according to an embodiment of the present invention indicates “status”;

FIG. 367 is a flow diagram when the trigger type information according to an embodiment of the present invention indicates “mediaTime”;

FIG. 368 illustrates an XML format of TriggerInfoList when the trigger type information according to an embodiment of the present invention indicates “mediaTime”;

FIG. 369 is a flow diagram when a first receiver does not pair with a second receiver according to an embodiment of the present invention;

FIG. 370 is a flow diagram when the first receiver does not pair with the second receiver according to an embodiment of the present invention;

FIG. 371 is a flow diagram illustrating a process through which the second receiver according to an embodiment of the present invention receives triggering application information from a transmitter;

FIG. 372 is a flowchart illustrating an operation of a broadcast reception apparatus according to an embodiment of the present invention;

FIG. 373 illustrates a configuration of a broadcast system according to an embodiment of the present invention;

FIG. 374 illustrates a broadcast system for delivery of time information according to an embodiment of the present invention;

FIG. 375 illustrates state variables for delivery of service time information according to an embodiment of the present invention;

FIG. 376 illustrates service time information according to an embodiment of the present invention;

FIG. 377 illustrates an XML format of the service time information according to an embodiment of the present invention;

FIG. 378 illustrates operations necessary to deliver the service time information according to an embodiment of the present invention;

FIG. 379 illustrates delivery frequency information according to an embodiment of the present invention;

FIG. 380 is a flow diagram illustrating a process through a broadcast reception apparatus according to an embodiment of the present invention delivers service time information to a companion screen device in an eventing manner;

FIG. 381 is a flow diagram illustrating a process through the broadcast reception apparatus according to an embodiment of the present invention delivers the service time information to the companion screen device in a request manner;

FIG. 382 is a flowchart illustrating an operation of the broadcast reception apparatus according to an embodiment of the present invention;

FIG. 383 illustrates synchronization between the broadcast reception apparatus according to an embodiment of the present invention and the companion screen device;

FIG. 384 illustrates asynchronization between the broadcast reception apparatus according to an embodiment of the present invention and the companion screen device;

FIG. 385 illustrates a method for synchronizing the broadcast reception apparatus according to an embodiment of the present invention with the companion screen device;

FIG. 386 illustrates service time information including playback state information according to an embodiment of the present invention;

FIG. 387 illustrates an XML format of the service time information according to an embodiment of the present invention;

FIG. 388 illustrates delivery of the playback state information according to an embodiment of the present invention;

FIG. 389 illustrates delivery of the playback state information according to an embodiment of the present invention;

FIG. 390 illustrates delivery of the playback state information according to an embodiment of the present invention;

FIG. 391 illustrates delivery of the playback state information according to an embodiment of the present invention;

FIG. 392 illustrates state variables for delivery of playback information according to an embodiment of the present invention;

FIG. 393 illustrates playback information according to an embodiment of the present invention;

FIG. 394 illustrates an XML format of the playback information according to an embodiment of the present invention;

FIG. 395 illustrates operations necessary to deliver the playback information according to an embodiment of the present invention;

FIG. 396 is a flow diagram illustrating a process through which a broadcast reception apparatus according to an embodiment of the present invention delivers playback information to a companion screen device in an eventing manner;

FIG. 397 is a flow diagram illustrating a process through which the broadcast reception apparatus according to an embodiment of the present invention delivers the playback information to the companion screen device in a request manner;

FIG. 398 illustrates delivery of playback state information according to an embodiment of the present invention;

FIG. 399 illustrates delivery of the playback state information according to an embodiment of the present invention;

FIG. 400 is a flowchart illustrating an operation of a broadcast reception apparatus according to an embodiment of the present invention;

FIG. 401 illustrates service time information ServiceTimeInfo in JSON format according to another embodiment of the present invention;

FIG. 402 illustrates service time information ServiceTimeInfo in JSON format further including playback state information according to another embodiment of the present invention;

FIG. 403 illustrates service time information ServiceTimeInfo in JSON format further including playback state information about multiple images according to another embodiment of the present invention;

FIG. 404 illustrates playback state information PlaybackInfo in JSON format according to another embodiment of the present invention;

FIG. 405 illustrates a UPnP based PD-CD architecture according to an embodiment of the present invention;

FIG. 406 illustrates a UPnP based PD-CD architecture according to another embodiment of the present invention;

FIG. 407 illustrates a UPnP based PD-CD architecture according to another embodiment of the present invention;

FIG. 408 illustrates interactions in a UPnP based PD-CD architecture according to an embodiment of the present invention;

FIG. 409 illustrates a Websocket based PD-CD architecture according to an embodiment of the present invention;

FIG. 410 illustrates a Websocket based PD-CD architecture according to another embodiment of the present invention;

FIG. 411 illustrates a Websocket based PD-CD architecture according to another embodiment of the present invention;

FIG. 412 illustrates app-to-app communication in a Websocket based PD-CD architecture according to an embodiment of the present invention;

FIG. 413 illustrates an HTTP based PD-CD architecture according to an embodiment of the present invention;

FIG. 414 illustrates an HTTP based PD-CD architecture according to another embodiment of the present invention;

FIG. 415 illustrates a Websocket & HTTP based PD-CD architecture according to an embodiment of the present invention;

FIG. 416 illustrates formats of messages used for discovery of a PD (Primary Device) according to an embodiment of the present invention;

FIG. 417 illustrates a process for discovering a Websocket endpoint or an HTTP service URL using a DDD (Device Description Document) according to an embodiment of the present invention;

FIG. 418 illustrates a DDD request message and a DDD format in a process for discovering a Websocket endpoint or an HTTP service URL using a DDD according to an embodiment of the present invention;

FIG. 419 illustrates DDD formats in a process for discovering a Websocket endpoint or an HTTP service URL using a DDD according to an embodiment of the present invention;

FIG. 420 illustrates DDD formats in a process for discovering a Websocket endpoint or an HTTP service URL using a DDD according to another embodiment of the present invention;

FIG. 421 illustrates a process for discovering a Websocket endpoint or an HTTP service URL using a response header to a DDD request according to an embodiment of the present invention;

FIG. 422 illustrates response header formats in a process for discovering a Websocket endpoint or an HTTP service URL using a response header to a DDD request according to an embodiment of the present invention;

FIG. 423 illustrates a process for discovering a Websocket endpoint or an HTTP service URL using a URL of a response header to a DDD request according to an embodiment of the present invention;

FIG. 424 illustrates a GET request and formats of response messages thereto in a process for discovering a Websocket endpoint or an HTTP service URL using a URL of a response header to a DDD request according to an embodiment of the present invention;

FIG. 425 illustrates a format of a response message delivering address information in a process for discovering a Websocket endpoint or an HTTP service URL using a URL of a response header to a DDD request according to another embodiment of the present invention;

FIG. 426 illustrates a Websocket based handshake & connection process (after discovery) according to an embodiment of the present invention;

FIG. 427 illustrates a handshake & connection process for Websocket based app-to-app communication (after discovery) according to an embodiment of the present invention;

FIG. 428 illustrates a Websocket based two-way communication process (after connection) according to an embodiment of the present invention;

FIG. 429 illustrates a Websocket based app-to-app two-way communication process (after connection/CD to PD) according to an embodiment of the present invention;

FIG. 430 illustrates a Websocket based app-to-app two-way communication process (after connection/PD to CD) according to an embodiment of the present invention;

FIG. 431 illustrates an HTTP based request-response process (after discovery) according to an embodiment of the present invention;

FIG. 432 illustrates a method for providing a broadcast service in a PD according to an embodiment of the present invention;

FIG. 433 illustrates a broadcast reception apparatus operating as a PD according to an embodiment of the present invention;

FIG. 434 illustrates conversion of an ESGDdata state variable in XML format into an ESGData state variable in JSON format according to another embodiment of the present invention; and FIG. 435 illustrates a process of delivering the ESGData state variable in JSON format to a companion device using a Websocket protocol according to another embodiment of the present invention.

DETAILED DESCRIPTION OF THE EMBODIMENTS

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details.

Although the terms used in the present invention are selected from generally known and used terms, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meanings of each term lying within.

The present invention provides apparatuses and methods for transmitting and receiving broadcast signals for future broadcast services. Future broadcast services according to an embodiment of the present invention include a terrestrial broadcast service, a mobile broadcast service, an ultra high definition television (UHDTV) service, etc. The present invention may process broadcast signals for the future broadcast services through non-MIMO (Multiple Input Multiple Output) or MIMO according to one embodiment. A non-MIMO scheme according to an embodiment of the present invention may include a MISO (Multiple Input Single Output) scheme, a SISO (Single Input Single Output) scheme, etc.

Figure 1:
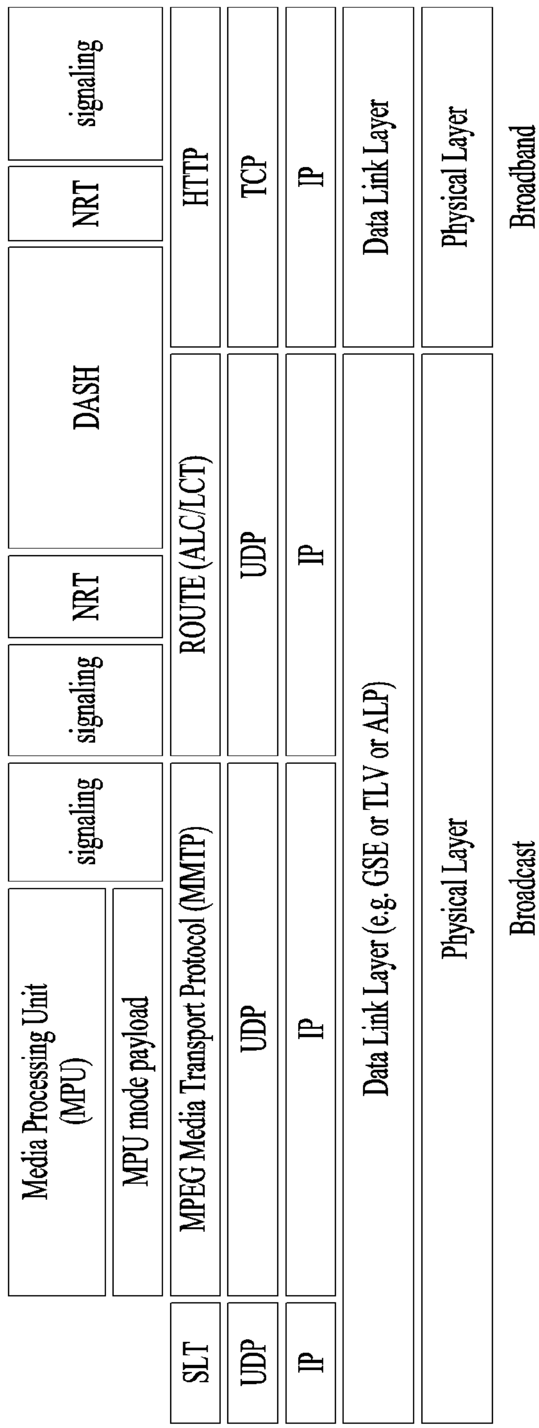
FIG. 1 illustrates a receiver protocol stack according to an embodiment of the present invention.

FIG. 1 illustrates a receiver protocol stack according to an embodiment of the present invention.

Two schemes may be used in broadcast service delivery through a broadcast network.

In a first scheme, media processing units (MPUs) are transmitted using an MMT protocol (MMTP) based on MPEG media transport (MMT). In a second scheme, dynamic adaptive streaming over HTTP (DASH) segments may be transmitted using real time object delivery over unidirectional transport (ROUTE) based on MPEG DASH.

Non-timed content including NRT media, EPG data, and other files is delivered with ROUTE. Signaling may be delivered over MMTP and/or ROUTE, while bootstrap signaling information is provided by the means of the Service List Table (SLT).

In hybrid service delivery, MPEG DASH over HTTP/TCP/IP is used on the broadband side. Media files in ISO Base Media File Format (BMFF) are used as the delivery, media encapsulation and synchronization format for both broadcast and broadband delivery. Here, hybrid service delivery may refer to a case in which one or more program elements are delivered through a broadband path.

Services are delivered using three functional layers. These are the physical layer, the delivery layer and the service management layer. The physical layer provides the mechanism by which signaling, service announcement and IP packet streams are transported over the broadcast physical layer and/or broadband physical layer. The delivery layer provides object and object flow transport functionality. It is enabled by the MMTP or the ROUTE protocol, operating on a UDP/IP multicast over the broadcast physical layer, and enabled by the HTTP protocol on a TCP/IP unicast over the broadband physical layer. The service management layer enables any type of service, such as linear TV or HTML5 application service, to be carried by the underlying delivery and physical layers.

In this figure, a protocol stack part on a broadcast side may be divided into a part transmitted through the SLT and the MMTP, and a part transmitted through ROUTE.

The SLT may be encapsulated through UDP and IP layers. Here, the SLT will be described below. The MMTP may transmit data formatted in an MPU format defined in MMT, and signaling information according to the MMTP. The data may be encapsulated through the UDP and IP layers. ROUTE may transmit data formatted in a DASH segment form, signaling information, and non-timed data such as NRT data, etc. The data may be encapsulated through the UDP and IP layers. According to a given embodiment, some or all processing according to the UDP and IP layers may be omitted. Here, the illustrated signaling information may be signaling information related to a service.

The part transmitted through the SLT and the MMTP and the part transmitted through ROUTE may be processed in the UDP and IP layers, and then encapsulated again in a data link layer. The link layer will be described below. Broadcast data processed in the link layer may be multicast as a broadcast signal through processes such as encoding/interleaving, etc. in the physical layer.

In this figure, a protocol stack part on a broadband side may be transmitted through HTTP as described above. Data formatted in a DASH segment form, signaling information, NRT information, etc. may be transmitted through HTTP. Here, the illustrated signaling information may be signaling information related to a service. The data may be processed through the TCP layer and the IP layer, and then encapsulated into the link layer. According to a given embodiment, some or all of the TCP, the IP, and the link layer may be omitted. Broadband data processed thereafter may be transmitted by unicast in the broadband through a process for transmission in the physical layer.

Service can be a collection of media components presented to the user in aggregate; components can be of multiple media types; a Service can be either continuous or intermittent; a Service can be Real Time or Non-Real Time; Real Time Service can consist of a sequence of TV programs.

FIG. 2 illustrates a relation between the SLT and SLS according to an embodiment of the present invention.

Service signaling provides service discovery and description information, and comprises two functional components: Bootstrap signaling via the Service List Table (SLT) and the Service Layer Signaling (SLS). These represent the information which is necessary to discover and acquire user services. The SLT enables the receiver to build a basic service list, and bootstrap the discovery of the SLS for each service.

The SLT can enable very rapid acquisition of basic service information. The SLS enables the receiver to discover and access services and their content components. Details of the SLT and SLS will be described below.

As described in the foregoing, the SLT may be transmitted through UDP/IP. In this instance, according to a given embodiment, data corresponding to the SLT may be delivered through the most robust scheme in this transmission.

The SLT may have access information for accessing SLS delivered by the ROUTE protocol. In other words, the SLT may be bootstrapped into SLS according to the ROUTE protocol. The SLS is signaling information positioned in an upper layer of ROUTE in the above-described protocol stack, and may be delivered through ROUTE/UDP/IP. The SLS may be transmitted through one of LCT sessions included in a ROUTE session. It is possible to access a service component corresponding to a desired service using the SLS.

In addition, the SLT may have access information for accessing an MMT signaling component delivered by MMTP. In other words, the SLT may be bootstrapped into SLS according to the MMTP. The SLS may be delivered by an MMTP signaling message defined in MMT. It is possible to access a streaming service component (MPU) corresponding to a desired service using the SLS. As described in the foregoing, in the present invention, an NRT service component is delivered through the ROUTE protocol, and the SLS according to the MMTP may include information for accessing the ROUTE protocol. In broadband delivery, the SLS is carried over HTTP(S)/TCP/IP.

FIG. 3 illustrates an SLT according to an embodiment of the present invention.

First, a description will be given of a relation among respective logical entities of service management, delivery, and a physical layer.

Services may be signaled as being one of two basic types. First type is a linear audio/video or audio-only service that may have an app-based enhancement. Second type is a service whose presentation and composition is controlled by a downloaded application that is executed upon acquisition of the service. The latter can be called an "app-based" service.

The rules regarding presence of ROUTE/LCT sessions and/or MMTP sessions for carrying the content components of a service may be as follows.

For broadcast delivery of a linear service without app-based enhancement, the service's content components can be carried by either (but not both): (1) one or more ROUTE/LCT sessions, or (2) one or more MMTP sessions.

For broadcast delivery of a linear service with app-based enhancement, the service's content components can be carried by: (1) one or more ROUTE/LCT sessions, and (2) zero or more MMTP sessions.

In certain embodiments, use of both MMTP and ROUTE for streaming media components in the same service may not be allowed.

For broadcast delivery of an app-based service, the service's content components can be carried by one or more ROUTE/LCT sessions.

Each ROUTE session comprises one or more LCT sessions which carry as a whole, or in part, the content components that make up the service. In streaming services delivery, an LCT session may carry an individual component of a user service such as an audio, video or closed caption stream. Streaming media is formatted as DASH Segments.

Each MMTP session comprises one or more MMTP packet flows which carry MMT signaling messages or as a whole, or in part, the content component. An MMTP packet flow may carry MMT signaling messages or components formatted as MPUs.

For the delivery of NRT User Services or system metadata, an LCT session carries file-based content items. These content files may consist of continuous (time-based) or discrete (non-time-based) media components of an NRT service, or metadata such as Service Signaling or ESG fragments. Delivery of system metadata such as service signaling or ESG fragments may also be achieved through the signaling message mode of MMTP.

A broadcast stream is the abstraction for an RF channel, which is defined in terms of a carrier frequency centered within a specified bandwidth. It is identified by the pair [geographic area, frequency]. A physical layer pipe (PLP) corresponds to a portion of the RF channel. Each PLP has certain modulation and coding parameters. It is identified by a PLP identifier (PLPID), which is unique within the broadcast stream it belongs to. Here, PLP can be referred to as DP (data pipe).

Each service is identified by two forms of service identifier: a compact form that is used in the SLT and is unique only within the broadcast area; and a globally unique form that is used in the SLS and the ESG. A ROUTE session is identified by a source IP address, destination IP address and destination port number. An LCT session (associated with the service component(s) it carries) is identified by a transport session identifier (TSI) which is unique within the scope of the parent ROUTE session. Properties common to the LCT sessions, and certain properties unique to individual LCT sessions, are given in a ROUTE signaling structure called a service-based transport session instance description (S-TSID), which is part of the service layer signaling. Each LCT session is carried over a single physical layer pipe. According to a given embodiment, one LCT session may be transmitted through a plurality of PLPs. Different LCT sessions of a ROUTE session may or may not be contained in different physical layer pipes. Here, the ROUTE session may be delivered through a plurality of PLPs. The properties described in the S-TSID include the TSI value and PLPID for each LCT session, descriptors for the delivery objects/files, and application layer FEC parameters.

A MMTP session is identified by destination IP address and destination port number. An MMTP packet flow (associated with the service component(s) it carries) is identified by a packet_id which is unique within the scope of the parent MMTP session. Properties common to each MMTP packet flow, and certain properties of MMTP packet flows, are given in the SLT. Properties for each MMTP session are given by MMT signaling messages, which may be carried within the MMTP session. Different MMTP packet flows of a MMTP session may or may not be contained in different physical layer pipes. Here, the MMTP session may be delivered through a plurality of PLPs. The properties described in the MMT signaling messages include the packet_id value and PLPID for each MMTP packet flow. Here, the MMT signaling messages may have a form defined in MMT, or have a deformed form according to embodiments to be described below.

Hereinafter, a description will be given of low level signaling (LLS).

Signaling information which is carried in the payload of IP packets with a well-known address/port dedicated to this function is referred to as low level signaling (LLS). The IP address and the port number may be differently configured depending on embodiments. In one embodiment, LLS can be transported in IP packets with address 224.0.23.60 and destination port 4937/udp. LLS may be positioned in a portion expressed by "SLT" on the above-described protocol stack. However, according to a given embodiment, the LLS may be transmitted through a separate physical channel (dedicated channel) in a signal frame without being subjected to processing of the UDP/IP layer.

UDP/IP packets that deliver LLS data may be formatted in a form referred to as an LLS table. A first byte of each UDP/IP packet that delivers the LLS data may correspond to a start of the LLS table. The maximum length of any LLS table is limited by the largest IP packet that can be delivered from the PHY layer, 65,507 bytes.

The LLS table may include an LLS table ID field that identifies a type of the LLS table, and an LLS table version field that identifies a version of the LLS table. According to a value indicated by the LLS table ID field, the LLS table may include the above-described SLT or a rating region table (RRT). The RRT may have information about content advisory rating.

Hereinafter, the SLT will be described. LLS can be signaling information which supports rapid channel scans and bootstrapping of service acquisition by the receiver, and SLT can be a table of signaling information which is used to build a basic service listing and provide bootstrap discovery of SLS.

The function of the SLT is similar to that of the program association table (PAT) in MPEG-2 Systems, and the fast information channel (FIC) found in ATSC Systems. For a receiver first encountering the broadcast emission, this is the place to start. SLT supports a rapid channel scan which allows a receiver to build a list of all the services it can receive, with their channel name, channel number, etc., and SLT provides bootstrap information that allows a receiver to discover the SLS for each service. For ROUTE/DASH-delivered services, the bootstrap information includes the destination IP address and destination port of the LCT session that carries the SLS. For MMT/MPU-delivered services, the bootstrap information includes the destination IP address and destination port of the MMTP session carrying the SLS.

The SLT supports rapid channel scans and service acquisition by including the following information about each service in the broadcast stream. First, the SLT can include information necessary to allow the presentation of a service list that is meaningful to viewers and that can support initial service selection via channel number or up/down selection. Second, the SLT can include information necessary to locate the service layer signaling for each service listed. That is, the SLT may include access information related to a location at which the SLS is delivered.

The illustrated SLT according to the present embodiment is expressed as an XML document having an SLT root element. According to a given embodiment, the SLT may be expressed in a binary format or an XML document.

The SLT root element of the SLT illustrated in the figure may include @bsid, @sltSectionVersion, @sltSectionNumber, @totalSltSectionNumbers, @language, @capabilities, InetSigLoc and/or Service. According to a given embodiment, the SLT root element may further include @providerId. According to a given embodiment, the SLT root element may not include @language.

The service element may include @serviceId, @SLTserviceSeqNumber, @protected, @majorChannelNo, @minor- ChannelNo, @serviceCategory, @shortServiceName, @hidden, @slsProtocolType, BroadcastSignaling, @slsPlpId, @slsDestinationIpAddress, @slsDestinationUdpPort, @slsSourceIpAddress, @slsMajorProtocolVersion, @SlsMinorProtocolVersion, @serviceLanguage, @broadbandAccessRequired, @capabilities and/or InetSigLoc.

According to a given embodiment, an attribute or an element of the SLT may be added/changed/deleted. Each element included in the SLT may additionally have a separate attribute or element, and some attribute or elements according to the present embodiment may be omitted. Here, a field which is marked with @ may correspond to an attribute, and a field which is not marked with @ may correspond to an element.

@bsid is an identifier of the whole broadcast stream. The value of BSID may be unique on a regional level.

@providerId can be an index of broadcaster that is using part or all of this broadcast stream. This is an optional attribute. When it's not present, it means that this broadcast stream is being used by one broadcaster. @providerId is not illustrated in the figure.

@sltSectionVersion can be a version number of the SLT section. The sltSectionVersion can be incremented by 1 when a change in the information carried within the slt occurs. When it reaches maximum value, it wraps around to 0.

@sltSectionNumber can be the number, counting from 1, of this section of the SLT. In other words, @sltSectionNumber may correspond to a section number of the SLT section. When this field is not used, @sltSectionNumber may be set to a default value of 1.

@totalSltSectionNumbers can be the total number of sections (that is, the section with the highest sltSectionNumber) of the SLT of which this section is part. sltSectionNumber and totalSltSectionNumbers together can be considered to indicate "Part M of N" of one portion of the SLT when it is sent in fragments. In other words, when the SLT is transmitted, transmission through fragmentation may be supported. When this field is not used, @totalSltSectionNumbers may be set to a default value of 1. A case in which this field is not used may correspond to a case in which the SLT is not transmitted by being fragmented.

@language can indicate primary language of the services included in this slt instance. According to a given embodiment, a value of this field may have a three-character language code defined in the ISO. This field may be omitted.

@capabilities can indicate required capabilities for decoding and meaningfully presenting the content for all the services in this slt instance.

InetSigLoc can provide a URL telling the receiver where it can acquire any requested type of data from external server(s) via broadband. This element may include @urlType as a lower field. According to a value of the @urlType field, a type of a URL provided by InetSigLoc may be indicated. According to a given embodiment, when the @urlType field has a value of 0, InetSigLoc may provide a URL of a signaling server. When the @urlType field has a value of 1, InetSigLoc may provide a URL of an ESG server. When the @urlType field has other values, the field may be reserved for future use.

The service field is an element having information about each service, and may correspond to a service entry. Service element fields corresponding to the number of services indicated by the SLT may be present. Hereinafter, a description will be given of a lower attribute/element of the service field.

@serviceId can be an integer number that uniquely identify this service within the scope of this broadcast area. According to a given embodiment, a scope of @serviceId may be changed. @SLTserviceSeqNumber can be an integer number that indicates the sequence number of the SLT service information with service ID equal to the serviceId attribute above. SLTserviceSeqNumber value can start at 0 for each service and can be incremented by 1 every time any attribute in this service element is changed. If no attribute values are changed compared to the previous Service element with a particular value of ServiceID then SLTserviceSeqNumber would not be incremented. The SLTserviceSeqNumber field wraps back to 0 after reaching the maximum value.

@protected is flag information which may indicate whether one or more components for significant reproduction of the service are in a protected state. When set to "1" (true), that one or more components necessary for meaningful presentation is protected. When set to "0" (false), this flag indicates that no components necessary for meaningful presentation of the service are protected. Default value is false.

@majorChannelNo is an integer number representing the "major" channel number of the service. An example of the field may have a range of 1 to 999.

@minorChannelNo is an integer number representing the "minor" channel number of the service. An example of the field may have a range of 1 to 999.

@serviceCategory can indicate the category of this service. This field may indicate a type that varies depending on embodiments. According to a given embodiment, when this field has values of 1, 2, and 3, the values may correspond to a linear A/V service, a linear audio only service, and an app-based service, respectively. When this field has a value of 0, the value may correspond to a service of an undefined category. When this field has other values except for 1, 2, and 3, the field may be reserved for future use. @shortServiceName can be a short string name of the Service.

@hidden can be boolean value that when present and set to "true" indicates that the service is intended for testing or proprietary use, and is not to be selected by ordinary TV receivers. The default value is "false" when not present.

@slsProtocolType can be an attribute indicating the type of protocol of Service Layer Signaling used by this service. This field may indicate a type that varies depending on embodiments. According to a given embodiment, when this field has values of 1 and 2, protocols of SLS used by respective corresponding services may be ROUTE and MMTP, respectively. When this field has other values except for 0, the field may be reserved for future use. This field may be referred to as @slsProtocol.

BroadcastSignaling and lower attributes/elements thereof may provide information related to broadcast signaling. When the BroadcastSignaling element is not present, the child element InetSigLoc of the parent service element can be present and its attribute urlType includes URL_type 0x00 (URL to signaling server). In this case attribute url supports the query parameter svc=<service_id> where service_id corresponds to the serviceId attribute for the parent service element.

Alternatively when the BroadcastSignaling element is not present, the element InetSigLoc can be present as a child element of the slt root element and the attribute urlType of that InetSigLoc element includes URL_type 0x00 (URL to signaling server). In this case, attribute url for URL_type 0x00 supports the query parameter svc=<service_id> where service_id corresponds to the serviceId attribute for the parent Service element.

@slsPlpId can be a string representing an integer number indicating the PLP ID of the physical layer pipe carrying the SLS for this service.

@slsDestinationIpAddress can be a string containing the dotted-IPv4 destination address of the packets carrying SLS data for this service.

@slsDestinationUdpPort can be a string containing the port number of the packets carrying SLS data for this service. As described in the foregoing, SLS bootstrapping may be performed by destination IP/UDP information.

@slsSourceIpAddress can be a string containing the dotted-IPv4 source address of the packets carrying SLS data for this service.

@slsMajorProtocolVersion can be major version number of the protocol used to deliver the service layer signaling for this service. Default value is 1.

@SlsMinorProtocolVersion can be minor version number of the protocol used to deliver the service layer signaling for this service. Default value is 0.

@serviceLanguage can be a three-character language code indicating the primary language of the service. A value of this field may have a form that varies depending on embodiments.

@broadbandAccessRequired can be a Boolean indicating that broadband access is required for a receiver to make a meaningful presentation of the service. Default value is false. When this field has a value of True, the receiver needs to access a broadband for significant service reproduction, which may correspond to a case of hybrid service delivery.

@capabilities can represent required capabilities for decoding and meaningfully presenting the content for the service with service ID equal to the service Id attribute above.

InetSigLoc can provide a URL for access to signaling or announcement information via broadband, if available. Its data type can be an extension of the any URL data type, adding an @urlType attribute that indicates what the URL gives access to. An @urlType field of this field may indicate the same meaning as that of the @urlType field of InetSigLoc described above. When an InetSigLoc element of attribute URL_type 0x00 is present as an element of the SLT, it can be used to make HTTP requests for signaling metadata. The HTTP POST message body may include a service term. When the InetSigLoc element appears at the section level, the service term is used to indicate the service to which the requested signaling metadata objects apply. If the service term is not present, then the signaling metadata objects for all services in the section are requested. When the InetSigLoc appears at the service level, then no service term is needed to designate the desired service. When an InetSigLoc element of attribute URL_type 0x01 is provided, it can be used to retrieve ESG data via broadband. If the element appears as a child element of the service element, then the URL can be used to retrieve ESG data for that service. If the element appears as a child element of the SLT element, then the URL can be used to retrieve ESG data for all services in that section.

In another example of the SLT, @sltSectionVersion, @sltSectionNumber, @totalSltSectionNumbers and/or @language fields of the SLT may be omitted.

In addition, the above-described InetSigLoc field may be replaced by @sltInetSigUri and/or @sltInetEsgUri field. The two fields may include the URI of the signaling server and URI information of the ESG server, respectively. The InetSigLoc field corresponding to a lower field of the SLT and the InetSigLoc field corresponding to a lower field of the service field may be replaced in a similar manner.

The suggested default values may vary depending on embodiments. An illustrated "use" column relates to the respective fields. Here, "1" may indicate that a corresponding field is an essential field, and "0 . . . 1" may indicate that a corresponding field is an optional field.

Figure 4:
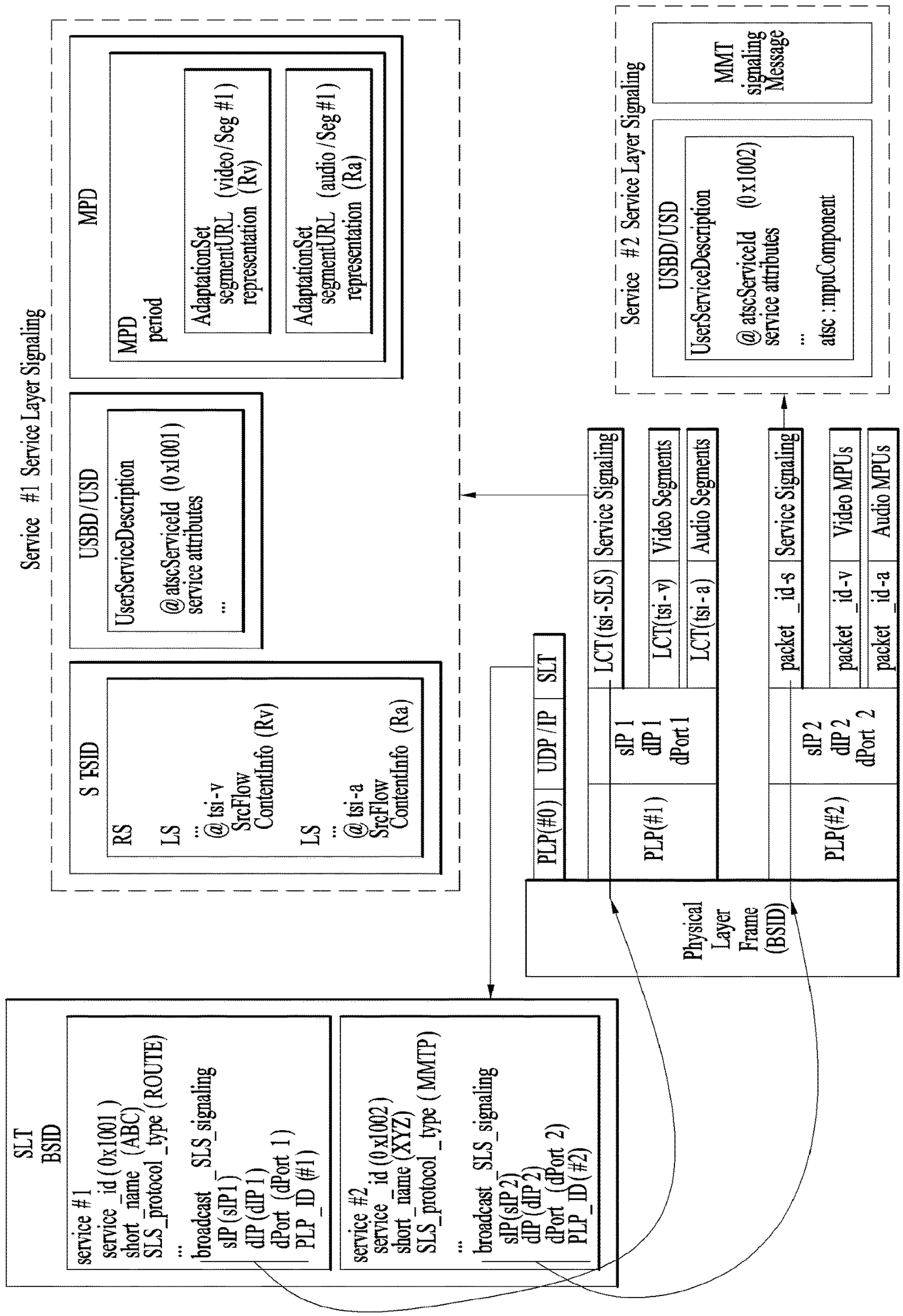
FIG. 4 illustrates SLS bootstrapping and a service discovery process according to an embodiment of the present invention.

FIG. 4 illustrates SLS bootstrapping and a service discovery process according to an embodiment of the present invention.

Hereinafter, SLS will be described.

SLS can be signaling which provides information for discovery and acquisition of services and their content components.

For ROUTE/DASH, the SLS for each service describes characteristics of the service, such as a list of its components and where to acquire them, and the receiver capabilities required to make a meaningful presentation of the service. In the ROUTE/DASH system, the SLS includes the user service bundle description (USBD), the S-TSID and the DASH media presentation description (MPD). Here, USBD or user service description (USD) is one of SLS XML fragments, and may function as a signaling herb that describes specific descriptive information. USBD/USD may be extended beyond 3GPP MBMS. Details of USBD/USD will be described below.

The service signaling focuses on basic attributes of the service itself, especially those attributes needed to acquire the service. Properties of the service and programming that are intended for viewers appear as service announcement, or ESG data.

Having separate Service Signaling for each service permits a receiver to acquire the appropriate SLS for a service of interest without the need to parse the entire SLS carried within a broadcast stream.

For optional broadband delivery of Service Signaling, the SLT can include HTTP URLs where the Service Signaling files can be obtained, as described above.

LLS is used for bootstrapping SLS acquisition, and subsequently, the SLS is used to acquire service components delivered on either ROUTE sessions or MMTP sessions. The described figure illustrates the following signaling sequences. Receiver starts acquiring the SLT described above. Each service identified by service_id delivered over ROUTE sessions provides SLS bootstrapping information: PLPID(#1), source IP address (sIP1), destination IP address (dIP1), and destination port number (dPort1). Each service identified by service_id delivered over MMTP sessions provides SLS bootstrapping information: PLPID(#2), destination IP address (dIP2), and destination port number (dPort2).

For streaming services delivery using ROUTE, the receiver can acquire SLS fragments carried over the IP/UDP/LCT session and PLP; whereas for streaming services delivery using MMTP, the receiver can acquire SLS fragments carried over an MMTP session and PLP. For service delivery using ROUTE, these SLS fragments include USBD/USD fragments, S-TSID fragments, and MPD fragments. They are relevant to one service. USBD/USD fragments describe service layer properties and provide URI references to S-TSID fragments and URI references to MPD fragments. In other words, the USBD/USD may refer to S-TSID and MPD. For service delivery using MMTP, the USBD references the MMT signaling's MPT message, the MP Table of which provides identification of package ID and location information for assets belonging to the service.

Here, an asset is a multimedia data entity, and may refer to a data entity which is combined into one unique ID and is used to generate one multimedia presentation. The asset may correspond to a service component included in one service. The MPT message is a message having the MP table of MMT. Here, the MP table may be an MMT package table having information about content and an MMT asset. Details may be similar to a definition in MMT. Here, media presentation may correspond to a collection of data that establishes bounded/unbounded presentation of media content.

The S-TSID fragment provides component acquisition information associated with one service and mapping between DASH Representations found in the MPD and in the TSI corresponding to the component of the service. The S-TSID can provide component acquisition information in the form of a TSI and the associated DASH representation identifier, and PLPID carrying DASH segments associated with the DASH representation. By the PLPID and TSI values, the receiver collects the audio/video components from the service and begins buffering DASH media segments then applies the appropriate decoding processes.

For USBD listing service components delivered on MMTP sessions, as illustrated by "Service #2" in the described figure, the receiver also acquires an MPT message with matching MMT_package_id to complete the SLS. An MPT message provides the full list of service components comprising a service and the acquisition information for each component. Component acquisition information includes MMTP session information, the PLPID carrying the session and the packet_id within that session.

According to a given embodiment, for example, in ROUTE, two or more S-TSID fragments may be used. Each fragment may provide access information related to LCT sessions delivering content of each service.

In ROUTE, S-TSID, USBD/USD, MPD, or an LCT session delivering S-TSID, USBD/USD or MPD may be referred to as a service signaling channel. In MMTP, USBD/UD, an MMT signaling message, or a packet flow delivering the MMTP or USBD/UD may be referred to as a service signaling channel.

Unlike the illustrated example, one ROUTE or MMTP session may be delivered through a plurality of PLPs. In other words, one service may be delivered through one or more PLPs. As described in the foregoing, one LCT session may be delivered through one PLP. Unlike the figure, according to a given embodiment, components included in one service may be delivered through different ROUTE sessions. In addition, according to a given embodiment, components included in one service may be delivered through different MMTP sessions. According to a given embodiment, components included in one service may be delivered separately through a ROUTE session and an MMTP session. Although not illustrated, components included in one service may be delivered via broadband (hybrid delivery).

FIG. 5 illustrates a USBD fragment for ROUTE/DASH according to an embodiment of the present invention.

Hereinafter, a description will be given of SLS in delivery based on ROUTE.

SLS provides detailed technical information to the receiver to enable the discovery and access of services and their content components. It can include a set of XML-encoded metadata fragments carried over a dedicated LCT session. That LCT session can be acquired using the bootstrap information contained in the SLT as described above. The SLS is defined on a per-service level, and it describes the characteristics and access information of the service, such as a list of its content components and how to acquire them, and the receiver capabilities required to make a meaningful presentation of the service. In the ROUTE/DASH system, for linear services delivery, the SLS consists of the following metadata fragments: USBD, S-TSID and the DASH MPD. The SLS fragments can be delivered on a dedicated LCT transport session with TSI=0. According to a given embodiment, a TSI of a particular LCT session (dedicated LCT session) in which an SLS fragment is delivered may have a different value. According to a given embodiment, an LCT session in which an SLS fragment is delivered may be signaled using the SLT or another scheme.

ROUTE/DASH SLS can include the user service bundle description (USBD) and service-based transport session instance description (S-TSID) metadata fragments. These service signaling fragments are applicable to both linear and application-based services. The USBD fragment contains service identification, device capabilities information, references to other SLS fragments required to access the service and constituent media components, and metadata to enable the receiver to determine the transport mode (broadcast and/or broadband) of service components. The S-TSID fragment, referenced by the USBD, provides transport session descriptions for the one or more ROUTE/LCT sessions in which the media content components of a service are delivered, and descriptions of the delivery objects carried in those LCT sessions. The USBD and S-TSID will be described below.

In streaming content signaling in ROUTE-based delivery, a streaming content signaling component of SLS corresponds to an MPD fragment. The MPD is typically associated with linear services for the delivery of DASH Segments as streaming content. The MPD provides the resource identifiers for individual media components of the linear/streaming service in the form of Segment URLs, and the context of the identified resources within the Media Presentation. Details of the MPD will be described below.

In app-based enhancement signaling in ROUTE-based delivery, app-based enhancement signaling pertains to the delivery of app-based enhancement components, such as an application logic file, locally-cached media files, network content items, or a notification stream. An application can also retrieve locally-cached data over a broadband connection when available.

Hereinafter, a description will be given of details of USBD/USD illustrated in the figure.

The top level or entry point SLS fragment is the USBD fragment. An illustrated USBD fragment is an example of the present invention, basic fields of the USBD fragment not illustrated in the figure may be additionally provided according to a given embodiment. As described in the foregoing, the illustrated USBD fragment has an extended form, and may have fields added to a basic configuration.

The illustrated USBD may have a bundleDescription root element. The bundleDescription root element may have a userServiceDescription element. The userServiceDescription element may correspond to an instance for one service.

The userServiceDescription element may include @serviceId, @atsc:serviceId, @atsc:serviceStatus, @atsc:fullMPDUri, @atsc:sTSIDUri, name, serviceLanguage, atsc:capabilityCode and/or deliveryMethod.

@serviceId can be a globally unique URI that identifies a service, unique within the scope of the BSID. This parameter can be used to link to ESG data (Service@globalServiceID).

@atsc:serviceId is a reference to corresponding service entry in LLS(SLT). The value of this attribute is the same value of serviceId assigned to the entry.

@atsc:serviceStatus can specify the status of this service. The value indicates whether this service is active or inactive. When set to "1" (true), that indicates service is active. When this field is not used, @atsc:serviceStatus may be set to a default value of 1.

@atsc:fullMPDUri can reference an MPD fragment which contains descriptions for contents components of the service delivered over broadcast and optionally, also over broadband.

@atsc:sTSIDUri can reference the S-TSID fragment which provides access related parameters to the Transport sessions carrying contents of this service.

name can indicate name of the service as given by the lang attribute. name element can include lang attribute, which indicating language of the service name. The language can be specified according to XML data types.

serviceLanguage can represent available languages of the service. The language can be specified according to XML data types.

atsc:capabilityCode can specify the capabilities required in the receiver to be able to create a meaningful presentation of the content of this service. According to a given embodiment, this field may specify a predefined capability group. Here, the capability group may be a group of capability attribute values for significant presentation. This field may be omitted according to a given embodiment.

deliveryMethod can be a container of transport related information pertaining to the contents of the service over broadcast and (optionally) broadband modes of access. Referring to data included in the service, when the number of the data is N, delivery schemes for respective data may be described by this element. The deliveryMethod may include an r12:broadcastAppService element and an r12:unicastAppService element. Each lower element may include a basePattern element as a lower element.

r12:broadcastAppService can be a DASH Representation delivered over broadcast, in multiplexed or non-multiplexed form, containing the corresponding media component(s) belonging to the service, across all Periods of the affiliated media presentation. In other words, each of the fields may indicate DASH representation delivered through the broadcast network.

r12:unicastAppService can be a DASH Representation delivered over broadband, in multiplexed or non-multiplexed form, containing the constituent media content component(s) belonging to the service, across all periods of the affiliated media presentation. In other words, each of the fields may indicate DASH representation delivered via broadband.

basePattern can be a character pattern for use by the receiver to match against any portion of the segment URL used by the DASH client to request media segments of a parent representation under its containing period. A match implies that the corresponding requested media segment is carried over broadcast transport. In a URL address for receiving DASH representation expressed by each of the r12:broadcastAppService element and the r12:unicastAppService element, a part of the URL, etc. may have a particular pattern. The pattern may be described by this field. Some data may be distinguished using this information. The proposed default values may vary depending on embodiments. The "use" column illustrated in the figure relates to each field. Here, M may denote an essential field, O may denote an optional field, OD may denote an optional field having a default value, and CM may denote a conditional essential field. 0 . . . 1 to 0 . . . N may indicate the number of available fields.

FIG. 6 illustrates an S-TSID fragment for ROUTE/DASH according to an embodiment of the present invention.

Hereinafter, a description will be given of the S-TSID illustrated in the figure in detail.

S-TSID can be an SLS XML fragment which provides the overall session description information for transport session(s) which carry the content components of a service. The S-TSID is the SLS metadata fragment that contains the overall transport session description information for the zero or more ROUTE sessions and constituent LCT sessions in which the media content components of a service are delivered. The S-TSID also includes file metadata for the delivery object or object flow carried in the LCT sessions of the service, as well as additional information on the payload formats and content components carried in those LCT sessions.

Each instance of the S-TSID fragment is referenced in the USBD fragment by the @atsc:sTSIDUri attribute of the userServiceDescription element. The illustrated S-TSID according to the present embodiment is expressed as an XML document. According to a given embodiment, the S-TSID may be expressed in a binary format or as an XML document.

The illustrated S-TSID may have an S-TSID root element. The S-TSID root element may include @serviceId and/or RS.

@serviceID can be a reference corresponding service element in the USD. The value of this attribute can reference a service with a corresponding value of service_id.

The RS element may have information about a ROUTE session for delivering the service data. Service data or service components may be delivered through a plurality of ROUTE sessions, and thus the number of RS elements may be 1 to N.

The RS element may include @bsid, @sIpAddr, @dIpAddr, @dport, @PLPID and/or LS.

@bsid can be an identifier of the broadcast stream within which the content component(s) of the broadcastAppService are carried. When this attribute is absent, the default broadcast stream is the one whose PLPs carry SLS fragments for this service. Its value can be identical to that of the broadcast_stream_id in the SLT.

@sIpAddr can indicate source IP address. Here, the source IP address may be a source IP address of a ROUTE session for delivering a service component included in the service. As described in the foregoing, service components of one service may be delivered through a plurality of ROUTE sessions. Thus, the service components may be transmitted using another ROUTE session other than the ROUTE session for delivering the S-TSID. Therefore, this field may be used to indicate the source IP address of the ROUTE session. A default value of this field may be a source IP address of a current ROUTE session. When a service component is delivered through another ROUTE session, and thus the ROUTE session needs to be indicated, a value of this field may be a value of a source IP address of the ROUTE session. In this case, this field may correspond to M, that is, an essential field.

@dIpAddr can indicate destination IP address. Here, a destination IP address may be a destination IP address of a ROUTE session that delivers a service component included in a service. For a similar case to the above description of @sIpAddr, this field may indicate a destination IP address of a ROUTE session that delivers a service component. A default value of this field may be a destination IP address of a current ROUTE session. When a service component is delivered through another ROUTE session, and thus the ROUTE session needs to be indicated, a value of this field may be a value of a destination IP address of the ROUTE session. In this case, this field may correspond to M, that is, an essential field.

@dport can indicate destination port. Here, a destination port may be a destination port of a ROUTE session that delivers a service component included in a service. For a similar case to the above description of @sIpAddr, this field may indicate a destination port of a ROUTE session that delivers a service component. A default value of this field may be a destination port number of a current ROUTE session. When a service component is delivered through another ROUTE session, and thus the ROUTE session needs to be indicated, a value of this field may be a destination port number value of the ROUTE session. In this case, this field may correspond to M, that is, an essential field.

@PLPID may be an ID of a PLP for a ROUTE session expressed by an RS. A default value may be an ID of a PLP of an LCT session including a current S-TSID. According to a given embodiment, this field may have an ID value of a PLP for an LCT session for delivering an S-TSID in the ROUTE session, and may have ID values of all PLPs for the ROUTE session.

An LS element may have information about an LCT session for delivering a service data. Service data or service components may be delivered through a plurality of LCT sessions, and thus the number of LS elements may be 1 to N.

The LS element may include @tsi, @PLPID, @bw, @startTime, @endTime, SrcFlow and/or RprFlow.

@tsi may indicate a TSI value of an LCT session for delivering a service component of a service.

@PLPID may have ID information of a PLP for the LCT session. This value may be overwritten on a basic ROUTE session value.

@bw may indicate a maximum bandwidth value. @startTime may indicate a start time of the LCT session. @endTime may indicate an end time of the LCT session. A SrcFlow element may describe a source flow of ROUTE. A RprFlow element may describe a repair flow of ROUTE.

The proposed default values may be varied according to an embodiment. The "use" column illustrated in the figure relates to each field. Here, M may denote an essential field, O may denote an optional field, OD may denote an optional field having a default value, and CM may denote a conditional essential field. 0 . . . 1 to 0 . . . N may indicate the number of available fields.

Hereinafter, a description will be given of MPD for ROUTE/DASH.

The MPD is an SLS metadata fragment which contains a formalized description of a DASH Media Presentation, corresponding to a linear service of a given duration defined by the broadcaster (for example a single TV program, or the set of contiguous linear TV programs over a period of time). The contents of the MPD provide the resource identifiers for Segments and the context for the identified resources within the Media Presentation. The data structure and semantics of the MPD fragment can be according to the MPD defined by MPEG DASH.

One or more of the DASH Representations conveyed in the MPD can be carried over broadcast. The MPD may describe additional Representations delivered over broadband, e.g. in the case of a hybrid service, or to support service continuity in handoff from broadcast to broadcast due to broadcast signal degradation (e.g. driving through a tunnel).

FIG. 7 illustrates a USBD/USD fragment for MMT according to an embodiment of the present invention.

MMT SLS for linear services comprises the USBD fragment and the MMT Package (MP) table. The MP table is as described above. The USBD fragment contains service identification, device capabilities information, references to other SLS information required to access the service and constituent media components, and the metadata to enable the receiver to determine the transport mode (broadcast and/or broadband) of the service components. The MP table for MPU components, referenced by the USBD, provides transport session descriptions for the MMTP sessions in which the media content components of a service are delivered and the descriptions of the Assets carried in those MMTP sessions.

The streaming content signaling component of the SLS for MPU components corresponds to the MP table defined in MMT. The MP table provides a list of MMT assets where each asset corresponds to a single service component and the description of the location information for this component.

USBD fragments may also contain references to the S-TSID and the MPD as described above, for service components delivered by the ROUTE protocol and the broadband, respectively. According to a given embodiment, in delivery through MMT, a service component delivered through the ROUTE protocol is NRT data, etc. Thus, in this case, MPD may be unnecessary. In addition, in delivery through MMT, information about an LCT session for delivering a service component, which is delivered via broadband, is unnecessary, and thus an S-TSID may be unnecessary. Here, an MMT package may be a logical collection of media data delivered using MMT. Here, an MMTP packet may refer to a formatted unit of media data delivered using MMT. An MPU may refer to a generic container of independently decodable timed/non-timed data. Here, data in the MPU is media codec agnostic.

Hereinafter, a description will be given of details of the USBD/USD illustrated in the figure.

The illustrated USBD fragment is an example of the present invention, and basic fields of the USBD fragment may be additionally provided according to an embodiment. As described in the foregoing, the illustrated USBD fragment has an extended form, and may have fields added to a basic structure.

The illustrated USBD according to an embodiment of the present invention is expressed as an XML document. According to a given embodiment, the USBD may be expressed in a binary format or as an XML document.

The illustrated USBD may have a bundleDescription root element. The bundleDescription root element may have a userServiceDescription element. The userServiceDescription element may be an instance for one service.

The userServiceDescription element may include @serviceId, @atsc:serviceId, name, serviceLanguage, atsc:capabilityCode, atsc:Channel, atsc:mpuComponent, atsc:routeComponent, atsc:broadbandComponent and/or atsc:ComponentInfo.

Here, @serviceId, @atsc:serviceId, name, serviceLanguage, and atsc:capabilityCode may be as described above. The lang field below the name field may be as described above. atsc:capabilityCode may be omitted according to a given embodiment.

The userServiceDescription element may further include an atsc:contentAdvisoryRating element according to an embodiment. This element may be an optional element. atsc:contentAdvisoryRating can specify the content advisory rating. This field is not illustrated in the figure.

atsc:Channel may have information about a channel of a service. The atsc:Channel element may include @atsc:majorChannelNo, @atsc:minorChannelNo, @atsc:serviceLang, @atsc:serviceGenre, @atsc:serviceIcon and/or atsc:ServiceDescription. @atsc:majorChannelNo, @atsc:minorChannelNo, and @atsc:serviceLang may be omitted according to a given embodiment.

@atsc:majorChannelNo is an attribute that indicates the major channel number of the service.

@atsc:minorChannelNo is an attribute that indicates the minor channel number of the service.

@atsc:serviceLang is an attribute that indicates the primary language used in the service.

@atsc:serviceGenre is an attribute that indicates primary genre of the service.

@atsc:serviceIcon is an attribute that indicates the Uniform Resource Locator (URL) for the icon used to represent this service.

atsc:ServiceDescription includes service description, possibly in multiple languages. atsc:ServiceDescription includes can include @atsc:serviceDescrText and/or @atsc:serviceDescrLang.

@atsc:serviceDescrText is an attribute that indicates description of the service.

@atsc:serviceDescrLang is an attribute that indicates the language of the serviceDescrText attribute above.

atsc:mpuComponent may have information about a content component of a service delivered in a form of an MPU. atsc:mpuComponent may include @atsc:mmtPackageId and/or @atsc:nextMmtPackageId.

@atsc:mmtPackageId can reference a MMT Package for content components of the service delivered as MPUs.

@atsc:nextMmtPackageId can reference a MMT Package to be used after the one referenced by @atsc:mmtPackageId in time for content components of the service delivered as MPUs.

atsc:routeComponent may have information about a content component of a service delivered through ROUTE. atsc:routeComponent may include @atsc:sTSIDUri, @sTSIDPlpId, @sTSIDDestinationIpAddress, @sTSIDDestinationUdpPort, @sTSIDSourceIpAddress, @sTSIDMajorProtocolVersion and/or @sTSIDMinorProtocolVersion.

@atsc:sTSIDUri can be a reference to the S-TSID fragment which provides access related parameters to the Transport sessions carrying contents of this service. This field may be the same as a URI for referring to an S-TSID in USBD for ROUTE described above. As described in the foregoing, in service delivery by the MMTP, service components, which are delivered through NRT, etc., may be delivered by ROUTE. This field may be used to refer to the S-TSID therefor.

@sTSIDPlpId can be a string representing an integer number indicating the PLP ID of the physical layer pipe carrying the S-TSID for this service. (default: current physical layer pipe).

@sTSIDDestinationIpAddress can be a string containing the dotted-IPv4 destination address of the packets carrying S-TSID for this service. (default: current MMTP session's source IP address).

@sTSIDDestinationUdpPort can be a string containing the port number of the packets carrying S-TSID for this service.

@sTSIDSourceIpAddress can be a string containing the dotted-IPv4 source address of the packets carrying S-TSID for this service.

@sTSIDMajorProtocolVersion can indicate major version number of the protocol used to deliver the S-TSID for this service. Default value is 1.

@sTSIDMinorProtocolVersion can indicate minor version number of the protocol used to deliver the S-TSID for this service. Default value is 0.

atsc:broadbandComponent may have information about a content component of a service delivered via broadband. In other words, atsc:broadbandComponent may be a field on the assumption of hybrid delivery. atsc:broadbandComponent may further include @atsc:fullfMPDUri.

@atsc:fullfMPDUri can be a reference to an MPD fragment which contains descriptions for contents components of the service delivered over broadband.

An atsc:ComponentInfo field may have information about an available component of a service. The atsc:ComponentInfo field may have information about a type, a role, a name, etc. of each component. The number of atsc:ComponentInfo fields may correspond to the number (N) of respective components. The atsc:ComponentInfo field may include @atsc:componentType, @atsc:componentRole, @atsc:componentProtectedFlag, @atsc:componentId and/or @atsc:componentName.

@atsc:componentType is an attribute that indicates the type of this component. Value of 0 indicates an audio component. Value of 1 indicates a video component. Value of 2 indicated a closed caption component. Value of 3 indicates an application component. Values 4 to 7 are reserved. A meaning of a value of this field may be differently set depending on embodiments.

@atsc:componentRole is an attribute that indicates the role or kind of this component.

For audio (when componentType attribute above is equal to 0): values of componentRole attribute are as follows: 0=Complete main, 1=Music and Effects, 2=Dialog, 3=Commentary, 4=Visually Impaired, 5=Hearing Impaired, 6=Voice-Over, 7-254=reserved, 255=unknown.

For video (when componentType attribute above is equal to 1) values of componentRole attribute are as follows: 0=Primary video, 1=Alternative camera view, 2=Other alternative video component, 3=Sign language inset, 4=Follow subject video, 5=3D video left view, 6=3D video right view, 7=3D video depth information, 8=Part of video array <x,y> of <n,m>, 9=Follow-Subject metadata, 10-254=reserved, 255=unknown.

For Closed Caption component (when componentType attribute above is equal to 2) values of componentRole attribute are as follows: 0=Normal, 1=Easy reader, 2-254=reserved, 255=unknown.

When componentType attribute above is between 3 to 7, inclusive, the componentRole can be equal to 255. A meaning of a value of this field may be differently set depending on embodiments.

@atsc:componentProtectedFlag is an attribute that indicates if this component is protected (e.g. encrypted). When this flag is set to a value of 1 this component is protected (e.g. encrypted). When this flag is set to a value of 0 this component is not protected (e.g. encrypted). When not present the value of componentProtectedFlag attribute is inferred to be equal to 0. A meaning of a value of this field may be differently set depending on embodiments.

@atsc:componentId is an attribute that indicates the identifier of this component. The value of this attribute can be the same as the asset_id in the MP table corresponding to this component.

@atsc:componentName is an attribute that indicates the human readable name of this component.

The proposed default values may vary depending on embodiments. The "use" column illustrated in the figure relates to each field. Here, M may denote an essential field, O may denote an optional field, OD may denote an optional field having a default value, and CM may denote a conditional essential field. 0 . . . 1 to 0 . . . N may indicate the number of available fields.

Hereinafter, a description will be given of MPD for MMT.

The Media Presentation Description is an SLS metadata fragment corresponding to a linear service of a given duration defined by the broadcaster (for example a single TV program, or the set of contiguous linear TV programs over a period of time). The contents of the MPD provide the resource identifiers for segments and the context for the identified resources within the media presentation. The data structure and semantics of the MPD can be according to the MPD defined by MPEG DASH.

In the present embodiment, an MPD delivered by an MMTP session describes Representations delivered over broadband, e.g. in the case of a hybrid service, or to support service continuity in handoff from broadcast to broadband due to broadcast signal degradation (e.g. driving under a mountain or through a tunnel).

Hereinafter, a description will be given of an MMT signaling message for MMT.

When MMTP sessions are used to carry a streaming service, MMT signaling messages defined by MMT are delivered by MMTP packets according to signaling message mode defined by MMT. The value of the packet_id field of MMTP packets carrying service layer signaling is set to '00' except for MMTP packets carrying MMT signaling messages specific to an asset, which can be set to the same packet_id value as the MMTP packets carrying the asset. Identifiers referencing the appropriate package for each service are signaled by the USBD fragment as described above. MMT Package Table (MPT) messages with matching MMT_package_id can be delivered on the MMTP session signaled in the SLT. Each MMTP session carries MMT signaling messages specific to its session or each asset delivered by the MMTP session.

In other words, it is possible to access USBD of the MMTP session by specifying an IP destination address/port number, etc. of a packet having the SLS for a particular service in the SLT. As described in the foregoing, a packet ID of an MMTP packet carrying the SLS may be designated as a particular value such as 00, etc. It is possible to access an MPT message having a matched packet ID using the above-described package IP information of USBD. As described below, the MPT message may be used to access each service component/asset.

The following MMTP messages can be delivered by the MMTP session signaled in the SLT.

MMT Package Table (MPT) message: This message carries an MP (MMT Package) table which contains the list of all Assets and their location information as defined by MMT. If an Asset is delivered by a PLP different from the current PLP delivering the MP table, the identifier of the PLP carrying the asset can be provided in the MP table using physical layer pipe identifier descriptor. The physical layer pipe identifier descriptor will be described below.

MMT ATSC3 (MA3) message mmt_atsc3_message( ): This message carries system metadata specific for services including service layer signaling as described above. mmt_atsc3_message( ) will be described below.

The following MMTP messages can be delivered by the MMTP session signaled in the SLT, if required.

Media Presentation Information (MPI) message: This message carries an MPI table which contains the whole document or a subset of a document of presentation information.

An MP table associated with the MPI table also can be delivered by this message.

Clock Relation Information (CRI) message: This message carries a CRI table which contains clock related information for the mapping between the NTP timestamp and the MPEG-2 STC. According to a given embodiment, the CRI message may not be delivered through the MMTP session.

The following MMTP messages can be delivered by each MMTP session carrying streaming content.

Hypothetical Receiver Buffer Model message: This message carries information required by the receiver to manage its buffer.

Hypothetical Receiver Buffer Model Removal message: This message carries information required by the receiver to manage its MMT de-capsulation buffer.

Hereinafter, a description will be given of mmt_atsc3_message( ) corresponding to one of MMT signaling messages. An MMT Signaling message mmt_atsc3_message( ) is defined to deliver information specific to services according to the present invention described above. The signaling message may include message ID, version, and/or length fields corresponding to basic fields of the MMT signaling message. A payload of the signaling message may include service ID information, content type information, content version information, content compression information and/or URI information. The content type information may indicate a type of data included in the payload of the signaling message. The content version information may indicate a version of data included in the payload, and the content compression information may indicate a type of compression applied to the data. The URI information may have URI information related to content delivered by the message.

Hereinafter, a description will be given of the physical layer pipe identifier descriptor.

The physical layer pipe identifier descriptor is a descriptor that can be used as one of descriptors of the MP table described above. The physical layer pipe identifier descriptor provides information about the PLP carrying an asset. If an asset is delivered by a PLP different from the current PLP delivering the MP table, the physical layer pipe identifier descriptor can be used as an asset descriptor in the associated MP table to identify the PLP carrying the asset. The physical layer pipe identifier descriptor may further include BSID information in addition to PLP ID information. The BSID may be an ID of a broadcast stream that delivers an MMTP packet for an asset described by the descriptor.

Figure 8:
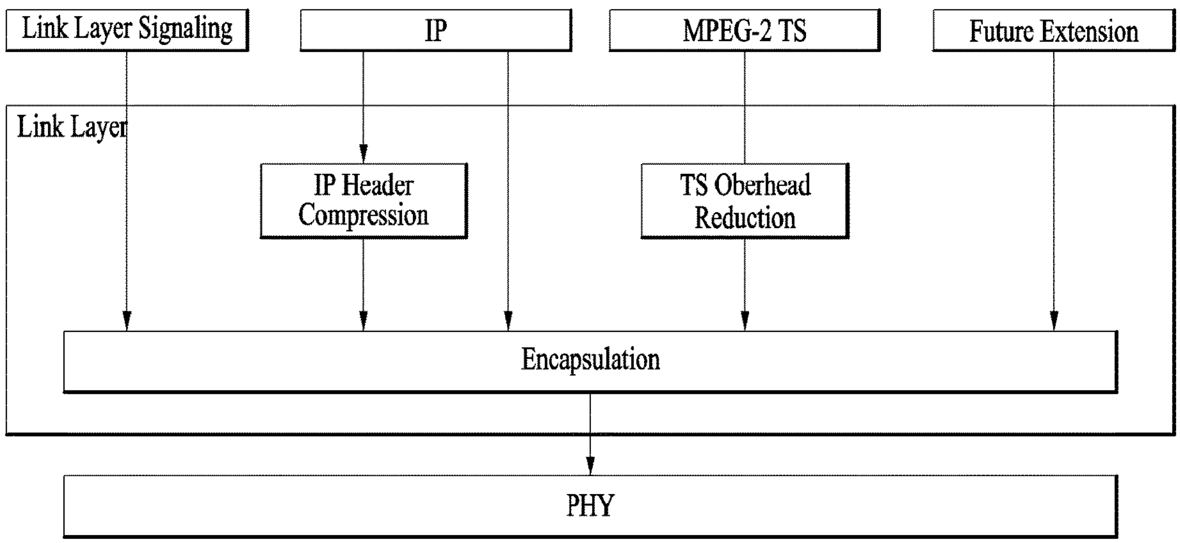
FIG. 8 illustrates a link layer protocol architecture according to an embodiment of the present invention.

FIG. 8 illustrates a link layer protocol architecture according to an embodiment of the present invention.

Hereinafter, a link layer will be described.

The link layer is the layer between the physical layer and the network layer, and transports the data from the network layer to the physical layer at the sending side and transports the data from the physical layer to the network layer at the receiving side. The purpose of the link layer includes abstracting all input packet types into a single format for processing by the physical layer, ensuring flexibility and future extensibility for as yet undefined input types. In addition, processing within the link layer ensures that the input data can be transmitted in an efficient manner, for example by providing options to compress redundant information in the headers of input packets. The operations of encapsulation, compression and so on are referred to as the link layer protocol and packets created using this protocol are called link layer packets. The link layer may perform functions such as packet encapsulation, overhead reduction and/or signaling transmission, etc.

Hereinafter, packet encapsulation will be described. Link layer protocol allows encapsulation of any type of packet, including ones such as IP packets and MPEG-2 TS. Using link layer protocol, the physical layer need only process one single packet format, independent of the network layer protocol type (here we consider MPEG-2 TS packet as a kind of network layer packet.) Each network layer packet or input packet is transformed into the payload of a generic link layer packet. Additionally, concatenation and segmentation can be performed in order to use the physical layer resources efficiently when the input packet sizes are particularly small or large.

As described in the foregoing, segmentation may be used in packet encapsulation. When the network layer packet is too large to process easily in the physical layer, the network layer packet is divided into two or more segments. The link layer packet header includes protocol fields to perform segmentation on the sending side and reassembly on the receiving side. When the network layer packet is segmented, each segment can be encapsulated to link layer packet in the same order as original position in the network layer packet. Also each link layer packet which includes a segment of network layer packet can be transported to PHY layer consequently.

As described in the foregoing, concatenation may be used in packet encapsulation. When the network layer packet is small enough for the payload of a link layer packet to include several network layer packets, the link layer packet header includes protocol fields to perform concatenation. The concatenation is combining of multiple small sized network layer packets into one payload. When the network layer packets are concatenated, each network layer packet can be concatenated to payload of link layer packet in the same order as original input order. Also each packet which constructs a payload of link layer packet can be whole packet, not a segment of packet.

Hereinafter, overhead reduction will be described. Use of the link layer protocol can result in significant reduction in overhead for transport of data on the physical layer. The link layer protocol according to the present invention may provide IP overhead reduction and/or MPEG-2 TS overhead reduction. In IP overhead reduction, IP packets have a fixed header format, however some of the information which is needed in a communication environment may be redundant in a broadcast environment. Link layer protocol provides mechanisms to reduce the broadcast overhead by compressing headers of IP packets. In MPEG-2 TS overhead reduction, link layer protocol provides sync byte removal, null packet deletion and/or common header removal (compression). First, sync byte removal provides an overhead reduction of one byte per TS packet, secondly a null packet deletion mechanism removes the 188 byte null TS packets in a manner that they can be re-inserted at the receiver and finally a common header removal mechanism.

For signaling transmission, in the link layer protocol, a particular format for the signaling packet may be provided for link layer signaling, which will be described below.

In the illustrated link layer protocol architecture according to an embodiment of the present invention, link layer protocol takes as input network layer packets such as IPv4, MPEG-2 TS and so on as input packets. Future extension indicates other packet types and protocol which is also possible to be input in link layer. Link layer protocol also specifies the format and signaling for any link layer signaling, including information about mapping to specific channel to the physical layer. Figure also shows how ALP incorporates mechanisms to improve the efficiency of transmission, via various header compression and deletion algorithms. In addition, the link layer protocol may basically encapsulate input packets.

Figure 9:
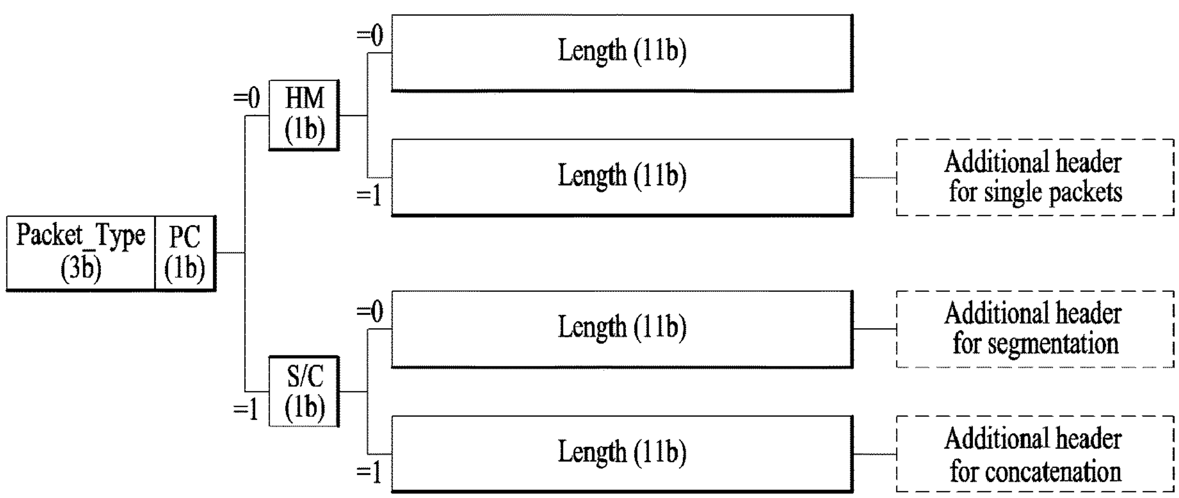
FIG. 9 illustrates a structure of a base header of a link layer packet according to an embodiment of the present invention.

FIG. 9 illustrates a structure of a base header of a link layer packet according to an embodiment of the present invention. Hereinafter, the structure of the header will be described.

A link layer packet can include a header followed by the data payload. The header of a link layer packet can include a base header, and may include an additional header depending on the control fields of the base header. The presence of an optional header is indicated from flag fields of the additional header. According to a given embodiment, a field indicating the presence of an additional header and an optional header may be positioned in the base header.

Hereinafter, the structure of the base header will be described. The base header for link layer packet encapsulation has a hierarchical structure. The base header can be two bytes in length and is the minimum length of the link layer packet header.

The illustrated base header according to the present embodiment may include a Packet_Type field, a PC field and/or a length field. According to a given embodiment, the base header may further include an HM field or an S/C field.

Packet_Type field can be a 3-bit field that indicates the original protocol or packet type of the input data before encapsulation into a link layer packet. An IPv4 packet, a compressed IP packet, a link layer signaling packet, and other types of packets may have the base header structure and may be encapsulated. However, according to a given embodiment, the MPEG-2 TS packet may have a different particular structure, and may be encapsulated. When the value of Packet_Type is "000", "001" "100" or "111", that is the original data type of an ALP packet is one of an IPv4 packet, a compressed IP packet, link layer signaling or extension packet. When the MPEG-2 TS packet is encapsulated, the value of Packet_Type can be "010". Other values of the Packet_Type field may be reserved for future use.

Payload_Configuration (PC) field can be a 1-bit field that indicates the configuration of the payload. A value of 0 can indicate that the link layer packet carries a single, whole input packet and the following field is the Header_Mode field. A value of 1 can indicate that the link layer packet carries more than one input packet (concatenation) or a part of a large input packet (segmentation) and the following field is the Segmentation_Concatenation field.

Header_Mode (HM) field can be a 1-bit field, when set to 0, that can indicate there is no additional header, and that the length of the payload of the link layer packet is less than 2048 bytes. This value may be varied depending on embodiments. A value of 1 can indicate that an additional header for single packet defined below is present following the Length field. In this case, the length of the payload is larger than 2047 bytes and/or optional features can be used (sub stream identification, header extension, etc.). This value may be varied depending on embodiments. This field can be present only when Payload_Configuration field of the link layer packet has a value of 0.

Segmentation_Concatenation (S/C) field can be a 1-bit field, when set to 0, that can indicate that the payload carries a segment of an input packet and an additional header for segmentation defined below is present following the Length field. A value of 1 can indicate that the payload carries more than one complete input packet and an additional header for concatenation defined below is present following the Length field. This field can be present only when the value of Payload_Configuration field of the ALP packet is 1.

Length field can be an 11-bit field that indicates the 11 least significant bits (LSBs) of the length in bytes of payload carried by the link layer packet. When there is a Length_MSB field in the following additional header, the length field is concatenated with the Length_MSB field, and is the LSB to provide the actual total length of the payload. The number of bits of the length field may be changed to another value rather than 11 bits.

Following types of packet configuration are thus possible: a single packet without any additional header, a single packet with an additional header, a segmented packet and a concatenated packet. According to a given embodiment, more packet configurations may be made through a combination of each additional header, an optional header, an additional header for signaling information to be described below, and an additional header for time extension.

Figure 10:
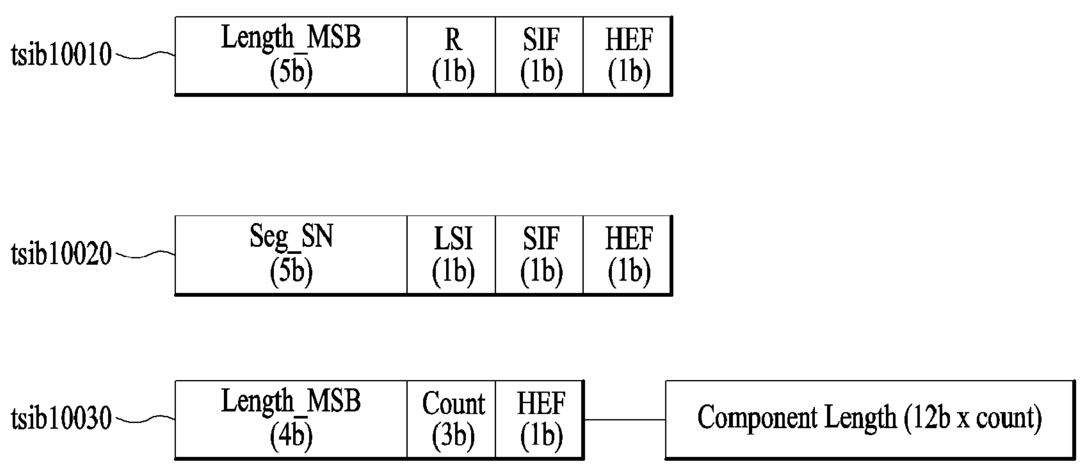
FIG. 10 illustrates a structure of an additional header of a link layer packet according to an embodiment of the present invention.

FIG. 10 illustrates a structure of an additional header of a link layer packet according to an embodiment of the present invention.

Various types of additional headers may be present. Hereinafter, a description will be given of an additional header for a single packet.

This additional header for single packet can be present when Header_Mode (HM)="1". The Header_Mode (HM) can be set to 1 when the length of the payload of the link layer packet is larger than 2047 bytes or when the optional fields are used. The additional header for single packet is shown in Figure (tsib10010).

Length_MSB field can be a 5-bit field that can indicate the most significant bits (MSBs) of the total payload length in bytes in the current link layer packet, and is concatenated with the Length field containing the 11 least significant bits (LSBs) to obtain the total payload length. The maximum length of the payload that can be signaled is therefore 65535 bytes. The number of bits of the length field may be changed to another value rather than 11 bits. In addition, the number of bits of the Length_MSB field may be changed, and thus a maximum expressible payload length may be changed. According to a given embodiment, each length field may indicate a length of a whole link layer packet rather than a payload.

SIF (Sub stream Identifier Flag) field can be a 1-bit field that can indicate whether the sub stream ID (SID) is present after the HEF field or not. When there is no SID in this link layer packet, SIF field can be set to 0. When there is a SID after HEF field in the link layer packet, SIF can be set to 1. The detail of SID is described below.

HEF (Header Extension Flag) field can be a 1-bit field that can indicate, when set to 1 additional header is present for future extension. A value of 0 can indicate that this extension header is not present.

Hereinafter, a description will be given of an additional header when segmentation is used.

This additional header (tsib10020) can be present when Segmentation_Concatenation (S/C)="0". Segment_Sequence_Number can be a 5-bit unsigned integer that can indicate the order of the corresponding segment carried by the link layer packet. For the link layer packet which carries the first segment of an input packet, the value of this field can be set to 0x0. This field can be incremented by one with each additional segment belonging to the segmented input packet.

Last_Segment_Indicator (LSI) can be a 1-bit field that can indicate, when set to 1, that the segment in this payload is the last one of input packet. A value of 0, can indicate that it is not last segment.

SIF (Sub stream Identifier Flag) can be a 1-bit field that can indicate whether the SID is present after the HEF field or not. When there is no SID in the link layer packet, SIF field can be set to 0. When there is a SID after the HEF field in the link layer packet, SIF can be set to 1.

HEF (Header Extension Flag) can be a This 1-bit field that can indicate, when set to 1, that the optional header extension is present after the additional header for future extensions of the link layer header. A value of 0 can indicate that optional header extension is not present.

According to a given embodiment, a packet ID field may be additionally provided to indicate that each segment is generated from the same input packet. This field may be unnecessary and thus be omitted when segments are transmitted in order.

Hereinafter, a description will be given of an additional header when concatenation is used.

This additional header (tsib10030) can be present when Segmentation_Concatenation (S/C)="1".

Length_MSB can be a 4-bit field that can indicate MSB bits of the payload length in bytes in this link layer packet. The maximum length of the payload is 32767 bytes for concatenation. As described in the foregoing, a specific numeric value may be changed.

Count can be a field that can indicate the number of the packets included in the link layer packet. The number of the packets included in the link layer packet, 2 can be set to this field. So, its maximum value of concatenated packets in a link layer packet is 9. A scheme in which the count field indicates the number may be varied depending on embodiments. That is, the numbers from 1 to 8 may be indicated.

HEF (Header Extension Flag) can be a 1-bit field that can indicate, when set to 1 the optional header extension is present after the additional header for future extensions of the link layer header. A value of 0, can indicate extension header is not present.

Component_Length can be a 12-bit length field that can indicate the length in byte of each packet. Component_Length fields are included in the same order as the packets present in the payload except last component packet. The number of length field can be indicated by (Count+1). According to a given embodiment, length fields, the number of which is the same as a value of the count field, may be present. When a link layer header consists of an odd number of Component_Length, four stuffing bits can follow after the last Component_Length field. These bits can be set to 0. According to a given embodiment, a Component_length field indicating a length of a last concatenated input packet may not be present. In this case, the length of the last concatenated input packet may correspond to a length obtained by subtracting a sum of values indicated by respective Component_length fields from a whole payload length.

Hereinafter, the optional header will be described.

As described in the foregoing, the optional header may be added to a rear of the additional header. The optional header field can contain SID and/or header extension. The SID is used to filter out specific packet stream in the link layer level. One example of SID is the role of service identifier in a link layer stream carrying multiple services. The mapping information between a service and the SID value corresponding to the service can be provided in the SLT, if applicable. The header extension contains extended field for future use. Receivers can ignore any header extensions which they do not understand.

SID (Sub stream Identifier) can be an 8-bit field that can indicate the sub stream identifier for the link layer packet. If there is optional header extension, SID present between additional header and optional header extension.

Header_Extension ( ) can include the fields defined below.

Extension_Type can be an 8-bit field that can indicate the type of the Header_Extension ( ).

Extension_Length can be an 8-bit field that can indicate the length of the Header Extension ( ) in bytes counting from the next byte to the last byte of the Header_Extension ( ).

Extension_Byte can be a byte representing the value of the Header_Extension ( ).

Figure 11:
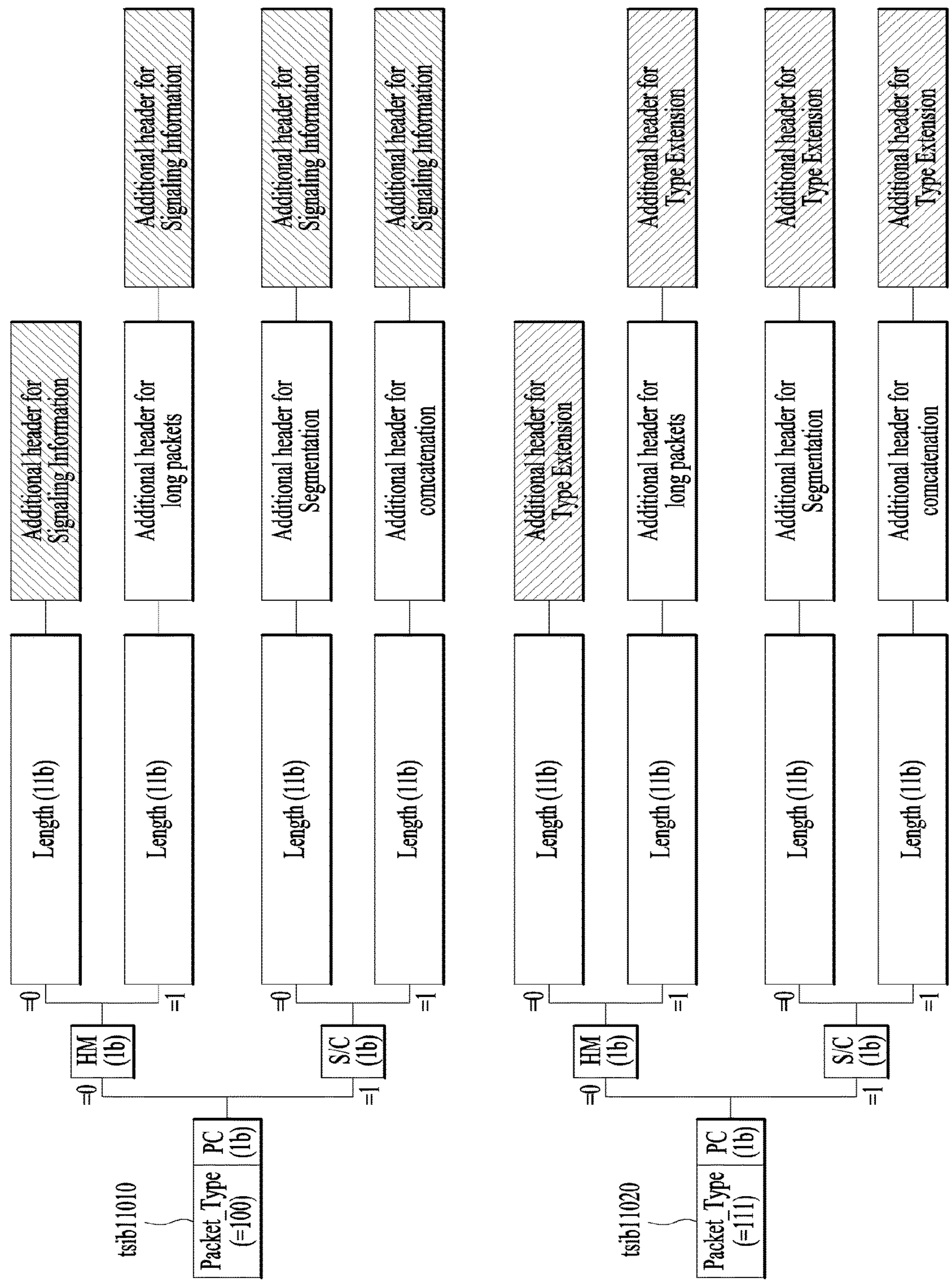
FIG. 11 illustrates a structure of an additional header of a link layer packet according to another embodiment of the present invention.

FIG. 11 illustrates a structure of an additional header of a link layer packet according to another embodiment of the present invention.

Hereinafter, a description will be given of an additional header for signaling information.

How link layer signaling is incorporated into link layer packets are as follows. Signaling packets are identified by when the Packet_Type field of the base header is equal to 100.

Figure (tsib11010) shows the structure of the link layer packets containing additional header for signaling information. In addition to the link layer header, the link layer packet can consist of two additional parts, additional header for signaling information and the actual signaling data itself. The total length of the link layer signaling packet is shown in the link layer packet header.

The additional header for signaling information can include following fields. According to a given embodiment, some fields may be omitted.

Signaling_Type can be an 8-bit field that can indicate the type of signaling.

Signaling_Type_Extension can be a 16-bit filed that can indicate the attribute of the signaling. Detail of this field can be defined in signaling specification.

Signaling_Version can be an 8-bit field that can indicate the version of signaling.

Signaling_Format can be a 2-bit field that can indicate the data format of the signaling data. Here, a signaling format may refer to a data format such as a binary format, an XML format, etc.

Signaling_Encoding can be a 2-bit field that can specify the encoding/compression format. This field may indicate whether compression is not performed and which type of compression is performed.

Hereinafter, a description will be given of an additional header for packet type extension.

In order to provide a mechanism to allow an almost unlimited number of additional protocol and packet types to be carried by link layer in the future, the additional header is defined. Packet type extension can be used when Packet_type is 111 in the base header as described above. Figure (tsib11020) shows the structure of the link layer packets containing additional header for type extension.

The additional header for type extension can include following fields. According to a given embodiment, some fields may be omitted.

extended_type can be a 16-bit field that can indicate the protocol or packet type of the input encapsulated in the link layer packet as payload. This field cannot be used for any protocol or packet type already defined by Packet_Type field.

Figure 12:
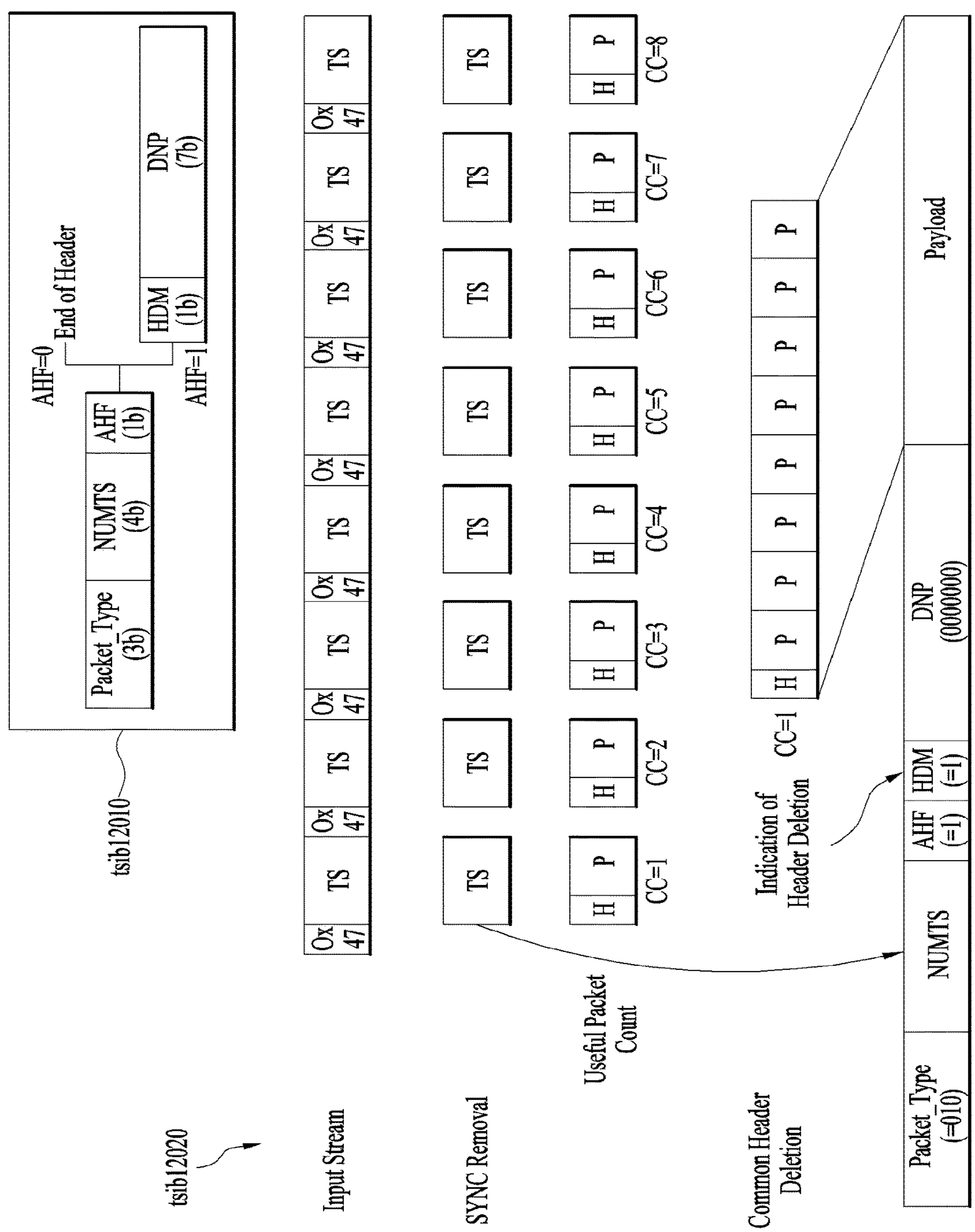
FIG. 12 illustrates a header structure of a link layer packet for an MPEG-2 TS packet and an encapsulation process thereof according to an embodiment of the present invention.

FIG. 12 illustrates a header structure of a link layer packet for an MPEG-2 TS packet and an encapsulation process thereof according to an embodiment of the present invention.

Hereinafter, a description will be given of a format of the link layer packet when the MPEG-2 TS packet is input as an input packet.

In this case, the Packet_Type field of the base header is equal to 010. Multiple TS packets can be encapsulated within each link layer packet. The number of TS packets is signaled via the NUMTS field. In this case, as described in the foregoing, a particular link layer packet header format may be used.

Link layer provides overhead reduction mechanisms for MPEG-2 TS to enhance the transmission efficiency. The sync byte (0x47) of each TS packet can be deleted. The option to delete NULL packets and similar TS headers is also provided.

In order to avoid unnecessary transmission overhead, TS null packets (PID=0x1FFF) may be removed. Deleted null packets can be recovered in receiver side using DNP field. The DNP field indicates the count of deleted null packets. Null packet deletion mechanism using DNP field is described below.

In order to achieve more transmission efficiency, similar header of MPEG-2 TS packets can be removed. When two or more successive TS packets have sequentially increased continuity counter fields and other header fields are the same, the header is sent once at the first packet and the other headers are deleted. HDM field can indicate whether the header deletion is performed or not. Detailed procedure of common TS header deletion is described below.

When all three overhead reduction mechanisms are performed, overhead reduction can be performed in sequence of sync removal, null packet deletion, and common header deletion. According to a given embodiment, a performance order of respective mechanisms may be changed. In addition, some mechanisms may be omitted according to a given embodiment.

The overall structure of the link layer packet header when using MPEG-2 TS packet encapsulation is depicted in Figure (tsib12010).

Hereinafter, a description will be given of each illustrated field. Packet_Type can be a 3-bit field that can indicate the protocol type of input packet as describe above. For MPEG-2 TS packet encapsulation, this field can always be set to 010.

NUMTS (Number of TS packets) can be a 4-bit field that can indicate the number of TS packets in the payload of this link layer packet. A maximum of 16 TS packets can be supported in one link layer packet. The value of NUMTS=0 can indicate that 16 TS packets are carried by the payload of the link layer packet. For all other values of NUMTS, the same number of TS packets are recognized, e.g. NUMTS=0001 means one TS packet is carried.

AHF (Additional Header Flag) can be a field that can indicate whether the additional header is present of not. A value of 0 indicates that there is no additional header. A value of 1 indicates that an additional header of length 1-byte is present following the base header. If null TS packets are deleted or TS header compression is applied this field can be set to 1. The additional header for TS packet encapsulation consists of the following two fields and is present only when the value of AHF in this link layer packet is set to 1.

HDM (Header Deletion Mode) can be a 1-bit field that indicates whether TS header deletion can be applied to this link layer packet. A value of 1 indicates that TS header deletion can be applied. A value of "0" indicates that the TS header deletion method is not applied to this link layer packet.

DNP (Deleted Null Packets) can be a 7-bit field that indicates the number of deleted null TS packets prior to this link layer packet. A maximum of 128 null TS packets can be deleted. When HDM=0 the value of DNP=0 can indicate that 128 null packets are deleted. When HDM=1 the value of DNP=0 can indicate that no null packets are deleted. For all other values of DNP, the same number of null packets are recognized, e.g. DNP=5 means 5 null packets are deleted.

The number of bits of each field described above may be changed. According to the changed number of bits, a minimum/maximum value of a value indicated by the field may be changed. These numbers may be changed by a designer.

Hereinafter, SYNC byte removal will be described.

When encapsulating TS packets into the payload of a link layer packet, the SYNC byte (0x47) from the start of each TS packet can be deleted. Hence the length of the MPEG2-TS packet encapsulated in the payload of the link layer packet is always of length 187 bytes (instead of 188 bytes originally).

Hereinafter, null packet deletion will be described.

Transport Stream rules require that bit rates at the output of a transmitter's multiplexer and at the input of the receiver's de-multiplexer are constant in time and the end-to-end delay is also constant. For some Transport Stream input signals, null packets may be present in order to accommodate variable bitrate services in a constant bitrate stream. In this case, in order to avoid unnecessary transmission overhead, TS null packets (that is TS packets with PID=0x1FFF) may be removed. The process is carried-out in a way that the removed null packets can be re-inserted in the receiver in the exact place where they were originally, thus guaranteeing constant bitrate and avoiding the need for PCR time stamp updating.

Before generation of a link layer packet, a counter called DNP (Deleted Null-Packets) can first be reset to zero and then incremented for each deleted null packet preceding the first non-null TS packet to be encapsulated into the payload of the current link layer packet. Then a group of consecutive useful TS packets is encapsulated into the payload of the current link layer packet and the value of each field in its header can be determined. After the generated link layer packet is injected to the physical layer, the DNP is reset to zero. When DNP reaches its maximum allowed value, if the next packet is also a null packet, this null packet is kept as a useful packet and encapsulated into the payload of the next link layer packet. Each link layer packet can contain at least one useful TS packet in its payload.

Hereinafter, TS packet header deletion will be described. TS packet header deletion may be referred to as TS packet header compression.

When two or more successive TS packets have sequentially increased continuity counter fields and other header fields are the same, the header is sent once at the first packet and the other headers are deleted. When the duplicated MPEG-2 TS packets are included in two or more successive TS packets, header deletion cannot be applied in transmitter side. HDM field can indicate whether the header deletion is performed or not. When TS header deletion is performed, HDM can be set to 1. In the receiver side, using the first packet header, the deleted packet headers are recovered, and the continuity counter is restored by increasing it in order from that of the first header.

An example tsib12020 illustrated in the figure is an example of a process in which an input stream of a TS packet is encapsulated into a link layer packet. First, a TS stream including TS packets having SYNC byte (0x47) may be input. First, sync bytes may be deleted through a sync byte deletion process. In this example, it is presumed that null packet deletion is not performed.

Here, it is presumed that packet headers of eight TS packets have the same field values except for CC, that is, a continuity counter field value. In this case, TS packet deletion/compression may be performed. Seven remaining TS packet headers are deleted except for a first TS packet header corresponding to CC=1. The processed TS packets may be encapsulated into a payload of the link layer packet.

In a completed link layer packet, a Packet_Type field corresponds to a case in which TS packets are input, and thus may have a value of 010. A NUMTS field may indicate the number of encapsulated TS packets. An AHF field may be set to 1 to indicate the presence of an additional header since packet header deletion is performed. An HDM field may be set to 1 since header deletion is performed. DNP may be set to 0 since null packet deletion is not performed.

FIG. 13 illustrates an example of adaptation modes in IP header compression according to an embodiment of the present invention (transmitting side).

Hereinafter, IP header compression will be described.

In the link layer, IP header compression/decompression scheme can be provided. IP header compression can include two parts: header compressor/decompressor and adaptation module. The header compression scheme can be based on the Robust Header Compression (RoHC). In addition, for broadcasting usage, adaptation function is added.

In the transmitter side, ROHC compressor reduces the size of header for each packet. Then, adaptation module extracts context information and builds signaling information from each packet stream. In the receiver side, adaptation module parses the signaling information associated with the received packet stream and attaches context information to the received packet stream. ROHC decompressor reconstructs the original IP packet by recovering the packet header.

The header compression scheme can be based on the RoHC as described above. In particular, in the present system, an RoHC framework can operate in a unidirctional mode (U mode) of the RoHC. In addition, in the present system, it is possible to use an RoHC UDP header compression profile which is identified by a profile identifier of 0x0002.

Hereinafter, adaptation will be described.

In case of transmission through the unidirectional link, if a receiver has no information of context, decompressor cannot recover the received packet header until receiving full context. This may cause channel change delay and turn on delay. For this reason, context information and configuration parameters between compressor and decompressor can be always sent with packet flow.

The Adaptation function provides out-of-band transmission of the configuration parameters and context information. Out-of-band transmission can be done through the link layer signaling. Therefore, the adaptation function is used to reduce the channel change delay and decompression error due to loss of context information.

Hereinafter, extraction of context information will be described.

Context information may be extracted using various schemes according to adaptation mode. In the present invention, three examples will be described below. The scope of the present invention is not restricted to the examples of the adaptation mode to be described below. Here, the adaptation mode may be referred to as a context extraction mode.

Adaptation Mode 1 (not illustrated) may be a mode in which no additional operation is applied to a basic RoHC packet stream. In other words, the adaptation module may operate as a buffer in this mode. Therefore, in this mode, context information may not be included in link layer signaling In Adaptation Mode 2 (tsib13010), the adaptation module can detect the IR packet from ROHC packet flow and extract the context information (static chain). After extracting the context information, each IR packet can be converted to an IR-DYN packet. The converted IR-DYN packet can be included and transmitted inside the ROHC packet flow in the same order as IR packet, replacing the original packet.

In Adaptation Mode 3 (tsib13020), the adaptation module can detect the IR and IR-DYN packet from ROHC packet flow and extract the context information. The static chain and dynamic chain can be extracted from IR packet and dynamic chain can be extracted from IR-DYN packet. After extracting the context information, each IR and IR-DYN packet can be converted to a compressed packet. The compressed packet format can be the same with the next packet of IR or IR-DYN packet. The converted compressed packet can be included and transmitted inside the ROHC packet flow in the same order as IR or IR-DYN packet, replacing the original packet.

Signaling (context) information can be encapsulated based on transmission structure. For example, context information can be encapsulated to the link layer signaling. In this case, the packet type value can be set to “100”.

In the above-described Adaptation Modes 2 and 3, a link layer packet for context information may have a packet type field value of 100. In addition, a link layer packet for compressed IP packets may have a packet type field value of 001. The values indicate that each of the signaling information and the compressed IP packets are included in the link layer packet as described above.

Hereinafter, a description will be given of a method of transmitting the extracted context information.

The extracted context information can be transmitted separately from ROHC packet flow, with signaling data through specific physical data path. The transmission of context depends on the configuration of the physical layer path. The context information can be sent with other link layer signaling through the signaling data pipe.

In other words, the link layer packet having the context information may be transmitted through a signaling PLP together with link layer packets having other link layer signaling information (Packet_Type=100). Compressed IP packets from which context information is extracted may be transmitted through a general PLP (Packet_Type=001). Here, depending on embodiments, the signaling PLP may refer to an L1 signaling path. In addition, depending on embodiments, the signaling PLP may not be separated from the general PLP, and may refer to a particular and general PLP through which the signaling information is transmitted.

At a receiving side, prior to reception of a packet stream, a receiver may need to acquire signaling information. When receiver decodes initial PLP to acquire the signaling information, the context signaling can be also received. After the signaling acquisition is done, the PLP to receive packet stream can be selected. In other words, the receiver may acquire the signaling information including the context information by selecting the initial PLP. Here, the initial PLP may be the above-described signaling PLP. Thereafter, the receiver may select a PLP for acquiring a packet stream. In this way, the context information may be acquired prior to reception of the packet stream.

After the PLP for acquiring the packet stream is selected, the adaptation module can detect IR-DYN packet form received packet flow. Then, the adaptation module parses the static chain from the context information in the signaling data. This is similar to receiving the IR packet. For the same context identifier, IR-DYN packet can be recovered to IR packet. Recovered ROHC packet flow can be sent to ROHC decompressor. Thereafter, decompression may be started.

FIG. 14 illustrates a link mapping table (LMT) and an RoHC-U description table according to an embodiment of the present invention.

Hereinafter, link layer signaling will be described.

Generally, link layer signaling is operates under IP level. At the receiver side, link layer signaling can be obtained earlier than IP level signaling such as Service List Table (SLT) and Service Layer Signaling (SLS). Therefore, link layer signaling can be obtained before session establishment.

For link layer signaling, there can be two kinds of signaling according input path: internal link layer signaling and external link layer signaling. The internal link layer signaling is generated in link layer at transmitter side. And the link layer takes the signaling from external module or protocol. This kind of signaling information is considered as external link layer signaling. If some signaling need to be obtained prior to IP level signaling, external signaling is transmitted in format of link layer packet.

The link layer signaling can be encapsulated into link layer packet as described above. The link layer packets can carry any format of link layer signaling, including binary and XML. The same signaling information may not be transmitted in different formats for the link layer signaling.

Internal link layer signaling may include signaling information for link mapping. The Link Mapping Table (LMT) provides a list of upper layer sessions carried in a PLP. The LMT also provides addition information for processing the link layer packets carrying the upper layer sessions in the link layer.

An example of the LMT (tsib14010) according to the present invention is illustrated.

signaling_type can be an 8-bit unsigned integer field that indicates the type of signaling carried by this table. The value of signaling_type field for Link Mapping Table (LMT) can be set to 0x01.

PLP_ID can be an 8-bit field that indicates the PLP corresponding to this table.

num_session can be an 8-bit unsigned integer field that provides the number of upper layer sessions carried in the PLP identified by the above PLP_ID field. When the value of signaling_type field is 0x01, this field can indicate the number of UDP/IP sessions in the PLP.

src_IP_add can be a 32-bit unsigned integer field that contains the source IP address of an upper layer session carried in the PLP identified by the PLP_ID field.

dst_IP_add can be a 32-bit unsigned integer field that contains the destination IP address of an upper layer session carried in the PLP identified by the PLP_ID field.

src_UDP_port can be a 16-bit unsigned integer field that represents the source UDP port number of an upper layer session carried in the PLP identified by the PLP_ID field.

dst_UDP_port can be a 16-bit unsigned integer field that represents the destination UDP port number of an upper layer session carried in the PLP identified by the PLP_ID field.

SID_flag can be a 1-bit Boolean field that indicates whether the link layer packet carrying the upper layer session identified by above 4 fields, Src_IP_add, Dst_IP_add, Src_UDP_Port and Dst_UDP_Port, has an SID field in its optional header. When the value of this field is set to 0, the link layer packet carrying the upper layer session may not have an SID field in its optional header. When the value of this field is set to 1, the link layer packet carrying the upper layer session can have an SID field in its optional header and the value the SID field can be same as the following SID field in this table.

compressed_flag can be a 1-bit Boolean field that indicates whether the header compression is applied the link layer packets carrying the upper layer session identified by above 4 fields, Src_IP_add, Dst_IP_add, Src_UDP_Port and Dst_UDP_Port. When the value of this field is set to 0, the link layer packet carrying the upper layer session may have a value of 0x00 of Packet_Type field in its base header. When the value of this field is set to 1, the link layer packet carrying the upper layer session may have a value of 0x01 of Packet_Type field in its base header and the Context_ID field can be present.

SID can be an 8-bit unsigned integer field that indicates sub stream identifier for the link layer packets carrying the upper layer session identified by above 4 fields, Src_IP_add, Dst_IP_add, Src_UDP_Port and Dst_UDP_Port. This field can be present when the value of SID_flag is equal to 1.

context_id can be an 8-bit field that provides a reference for the context id (CID) provided in the ROHC-U description table. This field can be present when the value of compressed_flag is equal to 1.

An example of the RoHC-U description table (tsib14020) according to the present invention is illustrated. As described in the foregoing, the RoHC-U adaptation module may generate information related to header compression.

signaling_type can be an 8-bit field that indicates the type of signaling carried by this table. The value of signaling_type field for ROHC-U description table (RDT) can be set to "0x02".

PLP_ID can be an 8-bit field that indicates the PLP corresponding to this table.

context_id can be an 8-bit field that indicates the context id (CID) of the compressed IP stream. In this system, 8-bit CID can be used for large CID.

context_profile can be an 8-bit field that indicates the range of protocols used to compress the stream. This field can be omitted.

adaptation_mode can be a 2-bit field that indicates the mode of adaptation module in this PLP. Adaptation modes have been described above.

context_config can be a 2-bit field that indicates the combination of the context information. If there is no context information in this table, this field may be set to "0x0". If the static_chain( ) or dynamic_chain( ) byte is included in this table, this field may be set to "0x01" or "0x02" respectively. If both of the static_chain( ) and dynamic_chain( ) byte are included in this table, this field may be set to "0x03".

context length can be an 8-bit field that indicates the length of the static chain byte sequence. This field can be omitted.

static_chain_byte ( ) can be a field that conveys the static information used to initialize the ROHC-U decompressor. The size and structure of this field depend on the context profile.

dynamic_chain_byte ( ) can be a field that conveys the dynamic information used to initialize the ROHC-U decompressor. The size and structure of this field depend on the context profile.

The static_chain_byte can be defined as sub-header information of IR packet. The dynamic_chain_byte can be defined as sub-header information of IR packet and IR-DYN packet.

Figure 15:
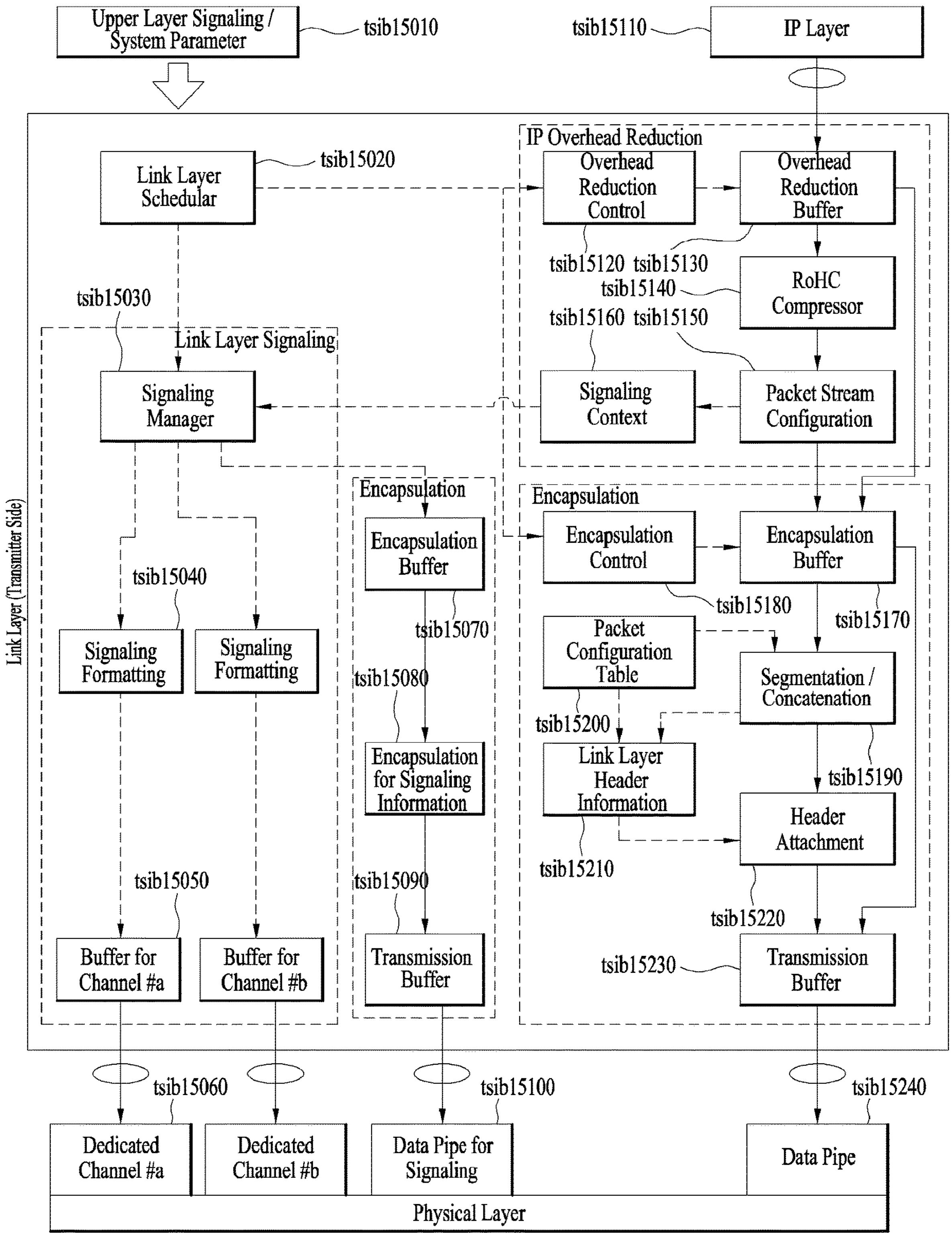
FIG. 15 illustrates a structure of a link layer on a transmitter side according to an embodiment of the present invention.

FIG. 15 illustrates a structure of a link layer on a transmitter side according to an embodiment of the present invention.

The present embodiment presumes that an IP packet is processed. From a functional point of view, the link layer on the transmitter side may broadly include a link layer signaling part in which signaling information is processed, an overhead reduction part, and/or an encapsulation part. In addition, the link layer on the transmitter side may include a scheduler for controlling and scheduling an overall operation of the link layer and/or input and output parts of the link layer.

First, signaling information of an upper layer and/or a system parameter tsib15010 may be delivered to the link layer. In addition, an IP stream including IP packets may be delivered to the link layer from an IP layer tsib15110.

As described above, the scheduler tsib15020 may determine and control operations of several modules included in the link layer. The delivered signaling information and/or system parameter tsib15010 may be filtered or used by the scheduler tsib15020. Information, which corresponds to a part of the delivered signaling information and/or system parameter tsib15010, necessary for a receiver may be delivered to the link layer signaling part. In addition, information, which corresponds to a part of the signaling information, necessary for an operation of the link layer may be delivered to an overhead reduction controller tsib15120 or an encapsulation controller tsib15180.

The link layer signaling part may collect information to be transmitted as a signal in a physical layer, and convert/configure the information in a form suitable for transmission. The link layer signaling part may include a signaling manager tsib15030, a signaling formatter tsib15040, and/or a buffer for channels tsib15050.

The signaling manager tsib15030 may receive signaling information delivered from the scheduler tsib15020 and/or signaling (and/or context) information delivered from the overhead reduction part. The signaling manager tsib15030 may determine a path for transmission of the signaling information for delivered data. The signaling information may be delivered through the path determined by the signaling manager tsib15030. As described in the foregoing, signaling information to be transmitted through a divided channel such as the FIC, the EAS, etc. may be delivered to the signaling formatter tsib15040, and other signaling information may be delivered to an encapsulation buffer tsib15070.

The signaling formatter tsib15040 may format related signaling information in a form suitable for each divided channel such that signaling information may be transmitted through a separately divided channel. As described in the foregoing, the physical layer may include separate physically/logically divided channels. The divided channels may be used to transmit FIC signaling information or EAS-related information. The FIC or EAS-related information may be sorted by the signaling manager tsib15030, and input to the signaling formatter tsib15040. The signaling formatter tsib15040 may format the information based on each separate channel. When the physical layer is designed to transmit particular signaling information through a separately divided channel other than the FIC and the EAS, a signaling formatter for the particular signaling information may be additionally provided. Through this scheme, the link layer may be compatible with various physical layers.

The buffer for channels tsib15050 may deliver the signaling information received from the signaling formatter tsib15040 to separate dedicated channels tsib15060. The number and content of the separate channels may vary depending on embodiments.

As described in the foregoing, the signaling manager tsib15030 may deliver signaling information, which is not delivered to a particular channel, to the encapsulation buffer tsib15070. The encapsulation buffer tsib15070 may function as a buffer that receives the signaling information which is not delivered to the particular channel.

An encapsulation block for signaling information tsib15080 may encapsulate the signaling information which is not delivered to the particular channel. A transmission buffer tsib15090 may function as a buffer that delivers the encapsulated signaling information to a DP for signaling information tsib15100. Here, the DP for signaling information tsib15100 may refer to the above-described PLS region.

The overhead reduction part may allow efficient transmission by removing overhead of packets delivered to the link layer. It is possible to configure overhead reduction parts corresponding to the number of IP streams input to the link layer.

An overhead reduction buffer tsib15130 may receive an IP packet delivered from an upper layer. The received IP packet may be input to the overhead reduction part through the overhead reduction buffer tsib15130.

An overhead reduction controller tsib15120 may determine whether to perform overhead reduction on a packet stream input to the overhead reduction buffer tsib15130. The overhead reduction controller tsib15120 may determine whether to perform overhead reduction for each packet stream. When overhead reduction is performed on a packet stream, packets may be delivered to a robust header compression (RoHC) compressor tsib15140 to perform overhead reduction. When overhead reduction is not performed on a packet stream, packets may be delivered to the encapsulation part to perform encapsulation without overhead reduction. Whether to perform overhead reduction of packets may be determined based on the signaling information tsib15010 delivered to the link layer. The signaling information may be delivered to the encapsulation controller tsib15180 by the scheduler tsib15020.

The RoHC compressor tsib15140 may perform overhead reduction on a packet stream. The RoHC compressor tsib15140 may perform an operation of compressing a header of a packet. Various schemes may be used for overhead reduction. Overhead reduction may be performed using a scheme proposed by the present invention. The present invention presumes an IP stream, and thus an expression “RoHC compressor” is used. However, the name may be changed depending on embodiments. The operation is not restricted to compression of the IP stream, and overhead reduction of all types of packets may be performed by the RoHC compressor tsib15140.

A packet stream configuration block tsib15150 may separate information to be transmitted to a signaling region and information to be transmitted to a packet stream from IP packets having compressed headers. The information to be transmitted to the packet stream may refer to information to be transmitted to a DP region. The information to be transmitted to the signaling region may be delivered to a signaling and/or context controller tsib15160.

The information to be transmitted to the packet stream may be transmitted to the encapsulation part.

The signaling and/or context controller tsib15160 may collect signaling and/or context information and deliver the signaling and/or context information to the signaling manager in order to transmit the signaling and/or context information to the signaling region.

The encapsulation part may perform an operation of encapsulating packets in a form suitable for a delivery to the physical layer. It is possible to configure encapsulation parts corresponding to the number of IP streams.

An encapsulation buffer tsib15170 may receive a packet stream for encapsulation. Packets subjected to overhead reduction may be received when overhead reduction is performed, and an input IP packet may be received without change when overhead reduction is not performed.

An encapsulation controller tsib15180 may determine whether to encapsulate an input packet stream. When encapsulation is performed, the packet stream may be delivered to a segmentation/concatenation block tsib15190. When encapsulation is not performed, the packet stream may be delivered to a transmission buffer tsib15230. Whether to encapsulate packets may be determined based on the signaling information tsib15010 delivered to the link layer. The signaling information may be delivered to the encapsulation controller tsib15180 by the scheduler tsib15020.

In the segmentation/concatenation block tsib15190, the above-described segmentation or concatenation operation may be performed on packets. In other words, when an input IP packet is longer than a link layer packet corresponding to an output of the link layer, one IP packet may be segmented into several segments to configure a plurality of link layer packet payloads. On the other hand, when an input IP packet is shorter than a link layer packet corresponding to an output of the link layer, several IP packets may be concatenated to configure one link layer packet payload.

A packet configuration table tsib15200 may have configuration information of a segmented and/or concatenated link layer packet. A transmitter and a receiver may have the same information in the packet configuration table tsib15200. The transmitter and the receiver may refer to the information of the packet configuration table tsib15200. An index value of the information of the packet configuration table tsib15200 may be included in a header of the link layer packet.

A link layer header information block tsib15210 may collect header information generated in an encapsulation process. In addition, the link layer header information block tsib15210 may collect header information included in the packet configuration table tsib15200. The link layer header information block tsib15210 may configure header information according to a header structure of the link layer packet.

A header attachment block tsib15220 may add a header to a payload of a segmented and/or concatenated link layer packet. The transmission buffer tsib15230 may function as a buffer to deliver the link layer packet to a DP tsib15240 of the physical layer.

The respective blocks, modules, or parts may be configured as one module/protocol or a plurality of modules/protocols in the link layer.

Figure 16:
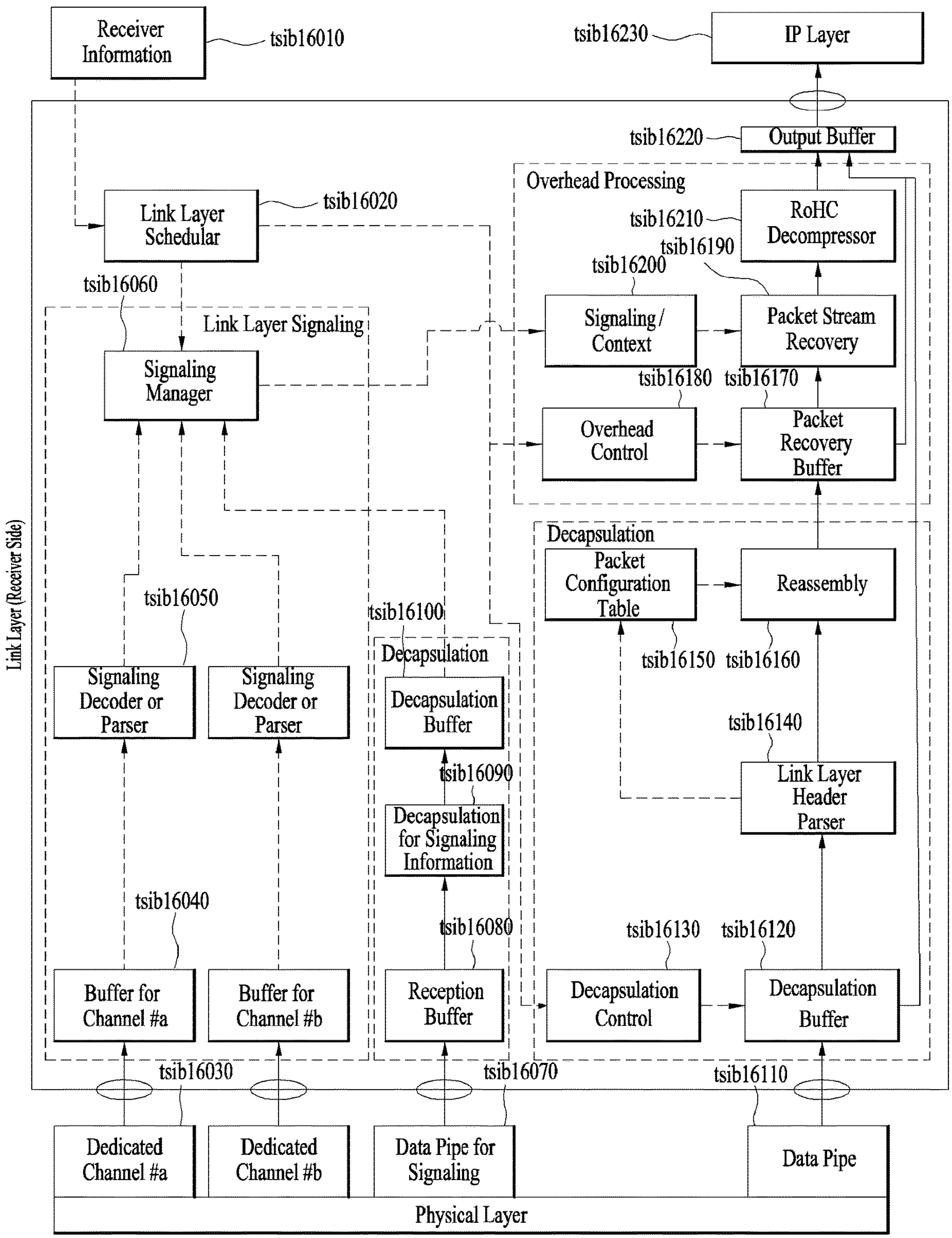
FIG. 16 illustrates a structure of a link layer on a receiver side according to an embodiment of the present invention.

FIG. 16 illustrates a structure of a link layer on a receiver side according to an embodiment of the present invention.

The present embodiment presumes that an IP packet is processed. From a functional point of view, the link layer on the receiver side may broadly include a link layer signaling part in which signaling information is processed, an overhead processing part, and/or a decapsulation part. In addition, the link layer on the receiver side may include a scheduler for controlling and scheduling overall operation of the link layer and/or input and output parts of the link layer.

First, information received through a physical layer may be delivered to the link layer. The link layer may process the information, restore an original state before being processed at a transmitter side, and then deliver the information to an upper layer. In the present embodiment, the upper layer may be an IP layer.

Information, which is separated in the physical layer and delivered through a particular channel tsib16030, may be delivered to a link layer signaling part. The link layer signaling part may determine signaling information received from the physical layer, and deliver the determined signaling information to each part of the link layer.

A buffer for channels tsib16040 may function as a buffer that receives signaling information transmitted through particular channels. As described in the foregoing, when physically/logically divided separate channels are present in the physical layer, it is possible to receive signaling information transmitted through the channels. When the information received from the separate channels is segmented, the segmented information may be stored until complete information is configured.

A signaling decoder/parser tsib16050 may verify a format of the signaling information received through the particular channel, and extract information to be used in the link layer. When the signaling information received through the particular channel is encoded, decoding may be performed. In addition, according to a given embodiment, it is possible to verify integrity, etc. of the signaling information.

A signaling manager tsib16060 may integrate signaling information received through several paths. Signaling information received through a DP for signaling tsib16070 to be described below may be integrated in the signaling manager tsib16060. The signaling manager tsib16060 may deliver signaling information necessary for each part in the link layer. For example, the signaling manager tsib16060 may deliver context information, etc. for recovery of a packet to the overhead processing part. In addition, the signaling manager tsib16060 may deliver signaling information for control to a scheduler tsib16020.

General signaling information, which is not received through a separate particular channel, may be received through the DP for signaling tsib16070. Here, the DP for signaling may refer to PLS, L1, etc. Here, the DP may be referred to as a PLP. A reception buffer tsib16080 may function as a buffer that receives signaling information delivered from the DP for signaling. In a decapsulation block for signaling information tsib16090, the received signaling information may be decapsulated. The decapsulated signaling information may be delivered to the signaling manager tsib16060 through a decapsulation buffer tsib16100. As described in the foregoing, the signaling manager tsib16060 may collate signaling information, and deliver the collated signaling information to a necessary part in the link layer.

The scheduler tsib16020 may determine and control operations of several modules included in the link layer. The scheduler tsib16020 may control each part of the link layer using receiver information tsib16010 and/or information delivered from the signaling manager tsib16060. In addition, the scheduler tsib16020 may determine an operation mode, etc. of each part. Here, the receiver information tsib16010 may refer to information previously stored in the receiver. The scheduler tsib16020 may use information changed by a user such as channel switching, etc. to perform a control operation.

The decapsulation part may filter a packet received from a DP tsib16110 of the physical layer, and separate a packet according to a type of the packet. It is possible to configure decapsulation parts corresponding to the number of DPs that can be simultaneously decoded in the physical layer.

The decapsulation buffer tsib16100 may function as a buffer that receives a packet stream from the physical layer to perform decapsulation. A decapsulation controller tsib16130 may determine whether to decapsulate an input packet stream. When decapsulation is performed, the packet stream may be delivered to a link layer header parser tsib16140. When decapsulation is not performed, the packet stream may be delivered to an output buffer tsib16220. The signaling information received from the scheduler tsib16020 may be used to determine whether to perform decapsulation.

The link layer header parser tsib16140 may identify a header of the delivered link layer packet. It is possible to identify a configuration of an IP packet included in a payload of the link layer packet by identifying the header. For example, the IP packet may be segmented or concatenated.

A packet configuration table tsib16150 may include payload information of segmented and/or concatenated link layer packets. The transmitter and the receiver may have the same information in the packet configuration table tsib16150. The transmitter and the receiver may refer to the information of the packet configuration table tsib16150. It is possible to find a value necessary for reassembly based on index information included in the link layer packet.

A reassembly block tsib16160 may configure payloads of the segmented and/or concatenated link layer packets as packets of an original IP stream. Segments may be collected and reconfigured as one IP packet, or concatenated packets may be separated and reconfigured as a plurality of IP packet streams. Recombined IP packets may be delivered to the overhead processing part.

The overhead processing part may perform an operation of restoring a packet subjected to overhead reduction to an original packet as a reverse operation of overhead reduction performed in the transmitter. This operation may be referred to as overhead processing. It is possible to configure overhead processing parts corresponding to the number of DPs that can be simultaneously decoded in the physical layer.

A packet recovery buffer tsib16170 may function as a buffer that receives a decapsulated RoHC packet or IP packet to perform overhead processing.

An overhead controller tsib16180 may determine whether to recover and/or decompress the decapsulated packet. When recovery and/or decompression are performed, the packet may be delivered to a packet stream recovery block tsib16190. When recovery and/or decompression are not performed, the packet may be delivered to the output buffer tsib16220. Whether to perform recovery and/or decompression may be determined based on the signaling information delivered by the scheduler tsib16020.

The packet stream recovery block tsib16190 may perform an operation of integrating a packet stream separated from the transmitter with context information of the packet stream.

This operation may be a process of restoring a packet stream such that an RoHC decompressor tsib16210 can perform processing. In this process, it is possible to receive signaling information and/or context information from a signaling and/or context controller tsib16200. The signaling and/or context controller tsib16200 may determine signaling information delivered from the transmitter, and deliver the signaling information to the packet stream recovery block tsib16190 such that the signaling information may be mapped to a stream corresponding to a context ID.

The RoHC decompressor tsib16210 may restore headers of packets of the packet stream. The packets of the packet stream may be restored to forms of original IP packets through restoration of the headers. In other words, the RoHC decompressor tsib16210 may perform overhead processing.

The output buffer tsib16220 may function as a buffer before an output stream is delivered to an IP layer tsib16230.

The link layers of the transmitter and the receiver proposed in the present invention may include the blocks or modules described above. In this way, the link layer may independently operate irrespective of an upper layer and a lower layer, overhead reduction may be efficiently performed, and a supportable function according to an upper/lower layer may be easily defined/added/deleted.

Figure 17:
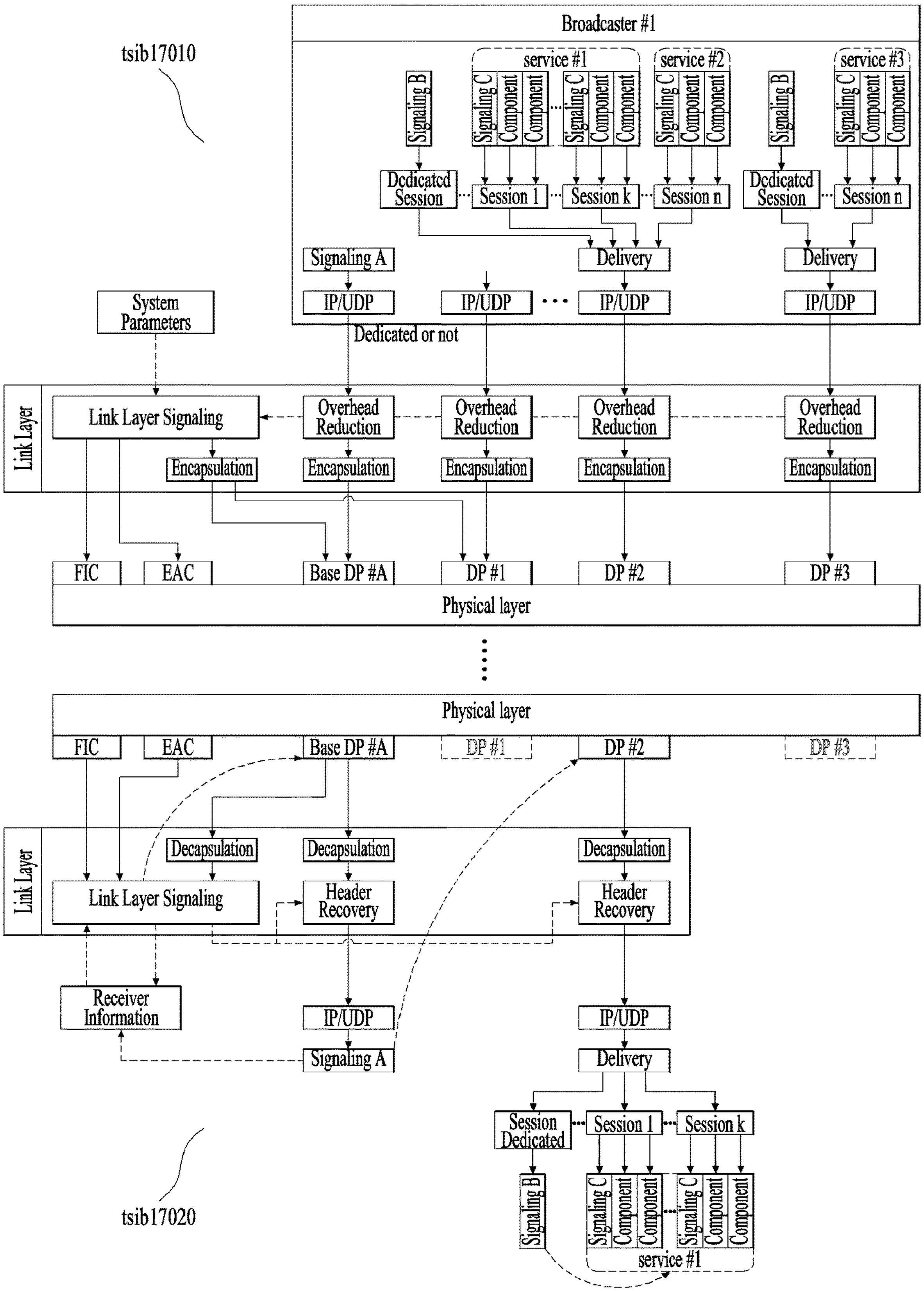
FIG. 17 illustrates a configuration of signaling transmission through a link layer according to an embodiment of the present invention (transmitting/receiving sides)

FIG. 17 illustrates a configuration of signaling transmission through a link layer according to an embodiment of the present invention (transmitting/receiving sides).

In the present invention, a plurality of service providers (broadcasters) may provide services within one frequency band. In addition, a service provider may provide a plurality of services, and one service may include one or more components. It can be considered that the user receives content using a service as a unit.

The present invention presumes that a transmission protocol based on a plurality of sessions is used to support an IP hybrid broadcast. Signaling information delivered through a signaling path may be determined based on a transmission configuration of each protocol. Various names may be applied to respective protocols according to a given embodiment.

In the illustrated data configuration tsib17010 on the transmitting side, service providers (broadcasters) may provide a plurality of services (Service #1, #2, . . . ). In general, a signal for a service may be transmitted through a general transport session (signaling C). However, the signal may be transmitted through a particular session (dedicated session) according to a given embodiment (signaling B).

Service data and service signaling information may be encapsulated according to a transmission protocol. According to a given embodiment, an IP/UDP layer may be used. According to a given embodiment, a signal in the IP/UDP layer (signaling A) may be additionally provided. This signaling may be omitted.

Data processed using the IP/UDP may be input to the link layer. As described in the foregoing, overhead reduction and/or encapsulation may be performed in the link layer. Here, link layer signaling may be additionally provided. Link layer signaling may include a system parameter, etc. Link layer signaling has been described above.

The service data and the signaling information subjected to the above process may be processed through PLPs in a physical layer. Here, a PLP may be referred to as a DP. The example illustrated in the figure presumes a case in which a base DP/PLP is used. However, depending on embodiments, transmission may be performed using only a general DP/PLP without the base DP/PLP.

In the example illustrated in the figure, a particular channel (dedicated channel) such as an FIC, an EAC, etc. is used. A signal delivered through the FIC may be referred to as a fast information table (FIT), and a signal delivered through the EAC may be referred to as an emergency alert table (EAT). The FIT may be identical to the above-described SLT. The particular channels may not be used depending on embodiments. When the particular channel (dedicated channel) is not configured, the FIT and the EAT may be transmitted using a general link layer signaling transmission scheme, or transmitted using a PLP via the IP/UDP as other service data.

According to a given embodiment, system parameters may include a transmitter-related parameter, a service provider-related parameter, etc. Link layer signaling may include IP header compression-related context information and/or identification information of data to which the context is applied. Signaling of an upper layer may include an IP address, a UDP number, service/component information, emergency alert-related information, an IP/UDP address for service signaling, a session ID, etc. Detailed examples thereof have been described above.

In the illustrated data configuration tsib17020 on the receiving side, the receiver may decode only a PLP for a corresponding service using signaling information without having to decode all PLPs.

First, when the user selects or changes a service desired to be received, the receiver may be tuned to a corresponding frequency and may read receiver information related to a corresponding channel stored in a DB, etc. The information stored in the DB, etc. of the receiver may be configured by reading an SLT at the time of initial channel scan.

After receiving the SLT and the information about the corresponding channel, information previously stored in the DB is updated, and information about a transmission path of the service selected by the user and information about a path, through which component information is acquired or a signal necessary to acquire the information is transmitted, are acquired. When the information is not determined to be changed using version information of the SLT, decoding or parsing may be omitted.

The receiver may verify whether SLT information is included in a PLP by parsing physical signaling of the PLP in a corresponding broadcast stream (not illustrated), which may be indicated through a particular field of physical signaling. It is possible to access a position at which a service layer signal of a particular service is transmitted by accessing the SLT information. The service layer signal may be encapsulated into the IP/UDP and delivered through a transport session. It is possible to acquire information about a component included in the service using this service layer signaling. A specific SLT-SLS configuration is as described above.

In other words, it is possible to acquire transmission path information, for receiving upper layer signaling information (service signaling information) necessary to receive the service, corresponding to one of several packet streams and PLPs currently transmitted on a channel using the SLT. The transmission path information may include an IP address, a UDP port number, a session ID, a PLP ID, etc. Here, depending on embodiments, a value previously designated by the IANA or a system may be used as an IP/UDP address. The information may be acquired using a scheme of accessing a DB or a shared memory, etc.

When the link layer signal and service data are transmitted through the same PLP, or only one PLP is operated, service data delivered through the PLP may be temporarily stored in a device such as a buffer, etc. while the link layer signal is decoded.

It is possible to acquire information about a path through which the service is actually transmitted using service signaling information of a service to be received. In addition, a received packet stream may be subjected to decapsulation and header recovery using information such as overhead reduction for a PLP to be received, etc.

In the illustrated example (tsib17020), the FIC and the EAC are used, and a concept of the base DP/PLP is presumed. As described in the foregoing, concepts of the FIC, the EAC, and the base DP/PLP may not be used.

While MISO or MIMO uses two antennas in the following for convenience of description, the present invention is applicable to systems using two or more antennas. The present invention proposes a physical profile (or system) optimized to minimize receiver complexity while attaining the performance required for a particular use case. Physical (PHY) profiles (base, handheld and advanced profiles) according to an embodiment of the present invention are subsets of all configurations that a corresponding receiver should implement. The PHY profiles share most of the functional blocks but differ slightly in specific blocks and/or parameters. For the system evolution, future profiles may also be multiplexed with existing profiles in a single radio frequency (RF) channel through a future extension frame (FEF). The base profile and the handheld profile according to the embodiment of the present invention refer to profiles to which MIMO is not applied, and the advanced profile refers to a profile to which MIMO is applied. The base profile may be used as a profile for both the terrestrial broadcast service and the mobile broadcast service. That is, the base profile may be used to define a concept of a profile which includes the mobile profile. In addition, the advanced profile may be divided into an advanced profile for a base profile with MIMO and an advanced profile for a handheld profile with MIMO. Moreover, the profiles may be changed according to intention of the designer.

The following terms and definitions may be applied to the present invention. The following terms and definitions may be changed according to design.

Auxiliary stream: sequence of cells carrying data of as yet undefined modulation and coding, which may be used for future extensions or as required by broadcasters or network operators.

Base data pipe: data pipe that carries service signaling data.

Baseband frame (or BBFRAME): set of Kbch bits which form the input to one FEC encoding process (BCH and LDPC encoding).

Cell: modulation value that is carried by one carrier of orthogonal frequency division multiplexing (OFDM) transmission.

Coded block: LDPC-encoded block of PLS1 data or one of the LDPC-encoded blocks of PLS2 data.

Data pipe: logical channel in the physical layer that carries service data or related metadata, which may carry one or a plurality of service(s) or service component(s).

Data pipe unit (DPU): a basic unit for allocating data cells to a DP in a frame.

Data symbol: OFDM symbol in a frame which is not a preamble symbol (the data symbol encompasses the frame signaling symbol and frame edge symbol).

DP_ID: this 8-bit field identifies uniquely a DP within the system identified by the SYSTEM_ID.

Dummy cell: cell carrying a pseudo-random value used to fill the remaining capacity not used for PLS signaling, DPs or auxiliary streams.

Emergency alert channel (EAC): part of a frame that carries EAS information data.

Frame: physical layer time slot that starts with a preamble and ends with a frame edge symbol.

Frame repetition unit: a set of frames belonging to the same or different physical layer profiles including an FEF, which is repeated eight times in a superframe.

Fast information channel (FIC): a logical channel in a frame that carries mapping information between a service and the corresponding base DP.

FECBLOCK: set of LDPC-encoded bits of DP data.

FFT size: nominal FFT size used for a particular mode, equal to the active symbol period Ts expressed in cycles of an elementary period T.

Frame signaling symbol: OFDM symbol with higher pilot density used at the start of a frame in certain combinations of FFT size, guard interval and scattered pilot pattern, which carries a part of the PLS data.

Frame edge symbol: OFDM symbol with higher pilot density used at the end of a frame in certain combinations of FFT size, guard interval and scattered pilot pattern.

Frame group: the set of all frames having the same PHY profile type in a superframe.

Future extension frame: physical layer time slot within the superframe that may be used for future extension, which starts with a preamble.

Futurecast UTB system: proposed physical layer broadcast system, the input of which is one or more MPEG2-TS, IP or general stream(s) and the output of which is an RF signal.

Input stream: a stream of data for an ensemble of services delivered to the end users by the system.

Normal data symbol: data symbol excluding the frame signaling symbol and the frame edge symbol.

PHY profile: subset of all configurations that a corresponding receiver should implement.

PLS: physical layer signaling data including PLS1 and PLS2.

PLS1: a first set of PLS data carried in a frame signaling symbol (FSS) having a fixed size, coding and modulation, which carries basic information about a system as well as parameters needed to decode PLS2.

NOTE: PLS1 data remains constant for the duration of a frame group.

PLS2: a second set of PLS data transmitted in the FSS, which carries more detailed PLS data about the system and the DPs.

PLS2 dynamic data: PLS2 data that dynamically changes frame-by-frame.

PLS2 static data: PLS2 data that remains static for the duration of a frame group.

Preamble signaling data: signaling data carried by the preamble symbol and used to identify the basic mode of the system.

Preamble symbol: fixed-length pilot symbol that carries basic PLS data and is located at the beginning of a frame.

The preamble symbol is mainly used for fast initial band scan to detect the system signal, timing thereof, frequency offset, and FFT size.

Reserved for future use: not defined by the present document but may be defined in future.

Superframe: set of eight frame repetition units.

Time interleaving block (TI block): set of cells within which time interleaving is carried out, corresponding to one use of a time interleaver memory.

TI group: unit over which dynamic capacity allocation for a particular DP is carried out, made up of an integer, dynamically varying number of XFECBLOCKs.

NOTE: The TI group may be mapped directly to one frame or may be mapped to a plurality of frames. The TI group may contain one or more TI blocks.

Type 1 DP: DP of a frame where all DPs are mapped to the frame in time division multiplexing (TDM) scheme.

Type 2 DP: DP of a frame where all DPs are mapped to the frame in frequency division multiplexing (FDM) scheme.

XFECBLOCK: set of $N_{cells}$ cells carrying all the bits of one LDPC FECBLOCK.

Figure 18:
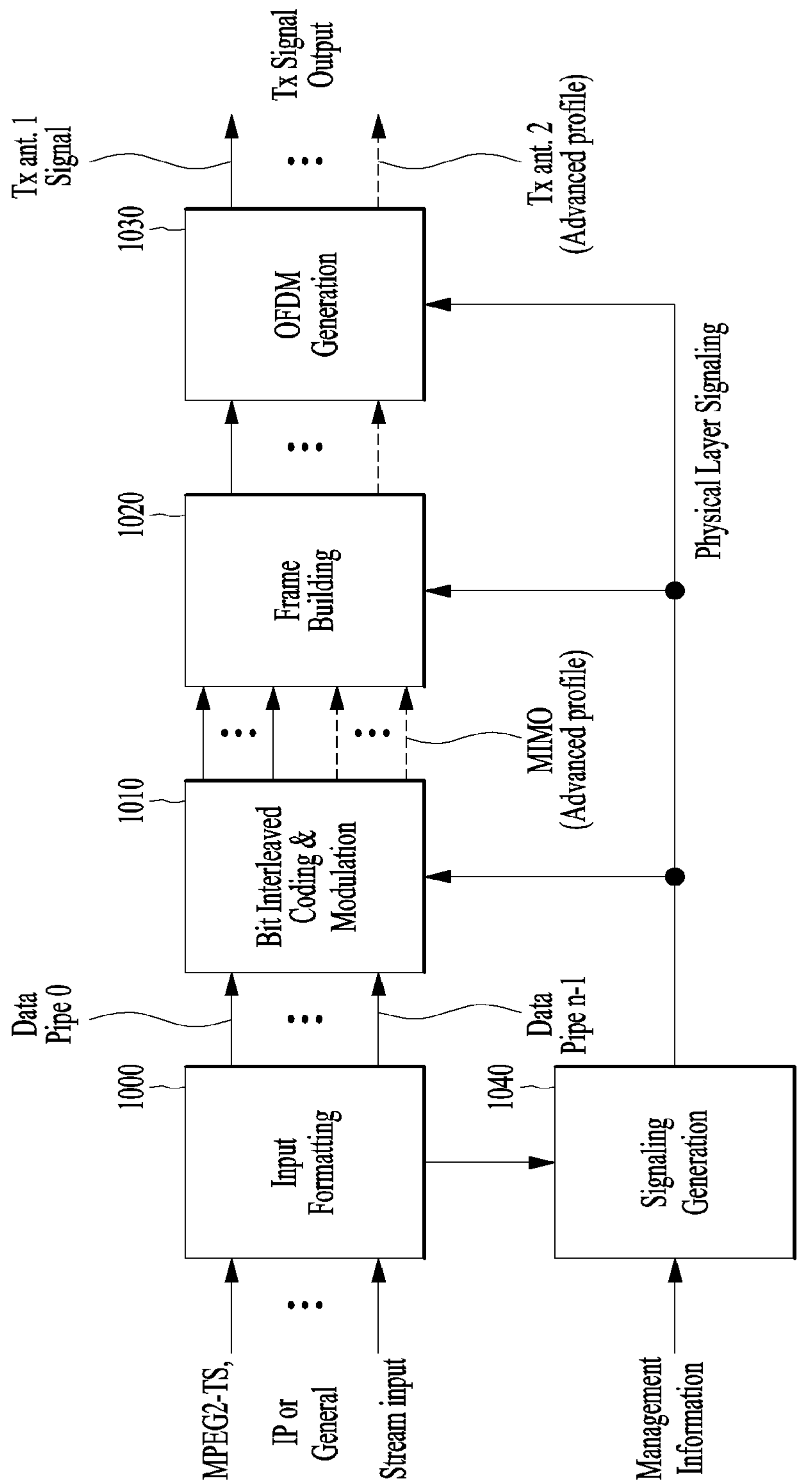
FIG. 18 is a block diagram illustrating a configuration of a broadcast signal transmission apparatus for future broadcast services according to an embodiment of the present invention.

FIG. 18 illustrates a configuration of a broadcast signal transmission apparatus for future broadcast services according to an embodiment of the present invention.

The broadcast signal transmission apparatus for future broadcast services according to the present embodiment may include an input formatting block 1000, a bit interleaved coding & modulation (BICM) block 1010, a frame building block 1020, an OFDM generation block 1030 and a signaling generation block 1040. Description will be given of an operation of each block of the broadcast signal transmission apparatus.

In input data according to an embodiment of the present invention, IP stream/packets and MPEG2-TS may be main input formats, and other stream types are handled as general streams. In addition to these data inputs, management information is input to control scheduling and allocation of the corresponding bandwidth for each input stream. In addition, the present invention allows simultaneous input of one or a plurality of TS streams, IP stream(s) and/or a general stream(s).

The input formatting block 1000 may demultiplex each input stream into one or a plurality of data pipes, to each of which independent coding and modulation are applied. A DP is the basic unit for robustness control, which affects QoS. One or a plurality of services or service components may be carried by one DP. The DP is a logical channel in a physical layer for delivering service data or related metadata capable of carrying one or a plurality of services or service components.

In addition, a DPU is a basic unit for allocating data cells to a DP in one frame.

An input to the physical layer may include one or a plurality of data streams. Each of the data streams is delivered by one DP. The input formatting block 1000 may covert a data stream input through one or more physical paths (or DPs) into a baseband frame (BBF). In this case, the input formatting block 1000 may perform null packet deletion or header compression on input data (a TS or IP input stream) in order to enhance transmission efficiency. A receiver may have a priori information for a particular part of a header, and thus this known information may be deleted from a transmitter. A null packet deletion block 3030 may be used only for a TS input stream.

In the BICM block 1010, parity data is added for error correction and encoded bit streams are mapped to complex-value constellation symbols. The symbols are interleaved across a specific interleaving depth that is used for the corresponding DP. For the advanced profile, MIMO encoding is performed in the BICM block 1010 and an additional data path is added at the output for MIMO transmission.

The frame building block 1020 may map the data cells of the input DPs into the OFDM symbols within a frame, and perform frequency interleaving for frequency-domain diversity, especially to combat frequency-selective fading channels. The frame building block 1020 may include a delay compensation block, a cell mapper and a frequency interleaver.

The delay compensation block may adjust timing between DPs and corresponding PLS data to ensure that the DPs and the corresponding PLS data are co-timed at a transmitter side. The PLS data is delayed by the same amount as the data pipes by addressing the delays of data pipes caused by the input formatting block and BICM block. The delay of the BICM block is mainly due to the time interleaver. In-band signaling data carries information of the next TI group so that the information is carried one frame ahead of the DPs to be signaled. The delay compensation block delays in-band signaling data accordingly.

The cell mapper may map PLS, DPs, auxiliary streams, dummy cells, etc. to active carriers of the OFDM symbols in the frame. The basic function of the cell mapper 7010 is to map data cells produced by the TIs for each of the DPs, PLS cells, and EAC/FIC cells, if any, into arrays of active OFDM cells corresponding to each of the OFDM symbols within a frame. A basic function of the cell mapper is to map a data cell generated by time interleaving for each DP and PLS cell to an array of active OFDM cells (if present) corresponding to respective OFDM symbols in one frame. Service signaling data (such as program specific information (PSI)/SI) may be separately gathered and sent by a DP. The cell mapper operates according to dynamic information produced by a scheduler and the configuration of a frame structure. The frequency interleaver may randomly interleave data cells received from the cell mapper to provide frequency diversity. In addition, the frequency interleaver may operate on an OFDM symbol pair including two sequential OFDM symbols using a different interleaving-seed order to obtain maximum interleaving gain in a single frame.

The OFDM generation block 1030 modulates OFDM carriers by cells produced by the frame building block, inserts pilots, and produces a time domain signal for transmission. In addition, this block subsequently inserts guard intervals, and applies peak-to-average power ratio (PAPR) reduction processing to produce a final RF signal.

Specifically, after inserting a preamble at the beginning of each frame, the OFDM generation block 1030 may apply conventional OFDM modulation having a cyclic prefix as a guard interval. For antenna space diversity, a distributed MISO scheme is applied across transmitters. In addition, a PAPR scheme is performed in the time domain. For flexible network planning, the present invention provides a set of various FFT sizes, guard interval lengths and corresponding pilot patterns.

In addition, the present invention may multiplex signals of a plurality of broadcast transmission/reception systems in the time domain such that data of two or more different broadcast transmission/reception systems providing broadcast services may be simultaneously transmitted in the same RF signal bandwidth. In this case, the two or more different broadcast transmission/reception systems refer to systems providing different broadcast services. The different broadcast services may refer to a terrestrial broadcast service, mobile broadcast service, etc.

The signaling generation block 1040 may create physical layer signaling information used for an operation of each functional block. This signaling information is also transmitted so that services of interest are properly recovered at a receiver side. Signaling information according to an embodiment of the present invention may include PLS data. PLS provides the receiver with a means to access physical layer DPs. The PLS data includes PLS1 data and PLS2 data.

The PLS1 data is a first set of PLS data carried in an FSS symbol in a frame having a fixed size, coding and modulation, which carries basic information about the system in addition to the parameters needed to decode the PLS2 data. The PLS1 data provides basic transmission parameters including parameters required to enable reception and decoding of the PLS2 data. In addition, the PLS1 data remains constant for the duration of a frame group.

The PLS2 data is a second set of PLS data transmitted in an FSS symbol, which carries more detailed PLS data about the system and the DPs. The PLS2 contains parameters that provide sufficient information for the receiver to decode a desired DP. The PLS2 signaling further includes two types of parameters, PLS2 static data (PLS2-STAT data) and PLS2 dynamic data (PLS2-DYN data). The PLS2 static data is PLS2 data that remains static for the duration of a frame group and the PLS2 dynamic data is PLS2 data that dynamically changes frame by frame. Details of the PLS data will be described later.

The above-described blocks may be omitted or replaced by blocks having similar or identical functions.

Figure 19:
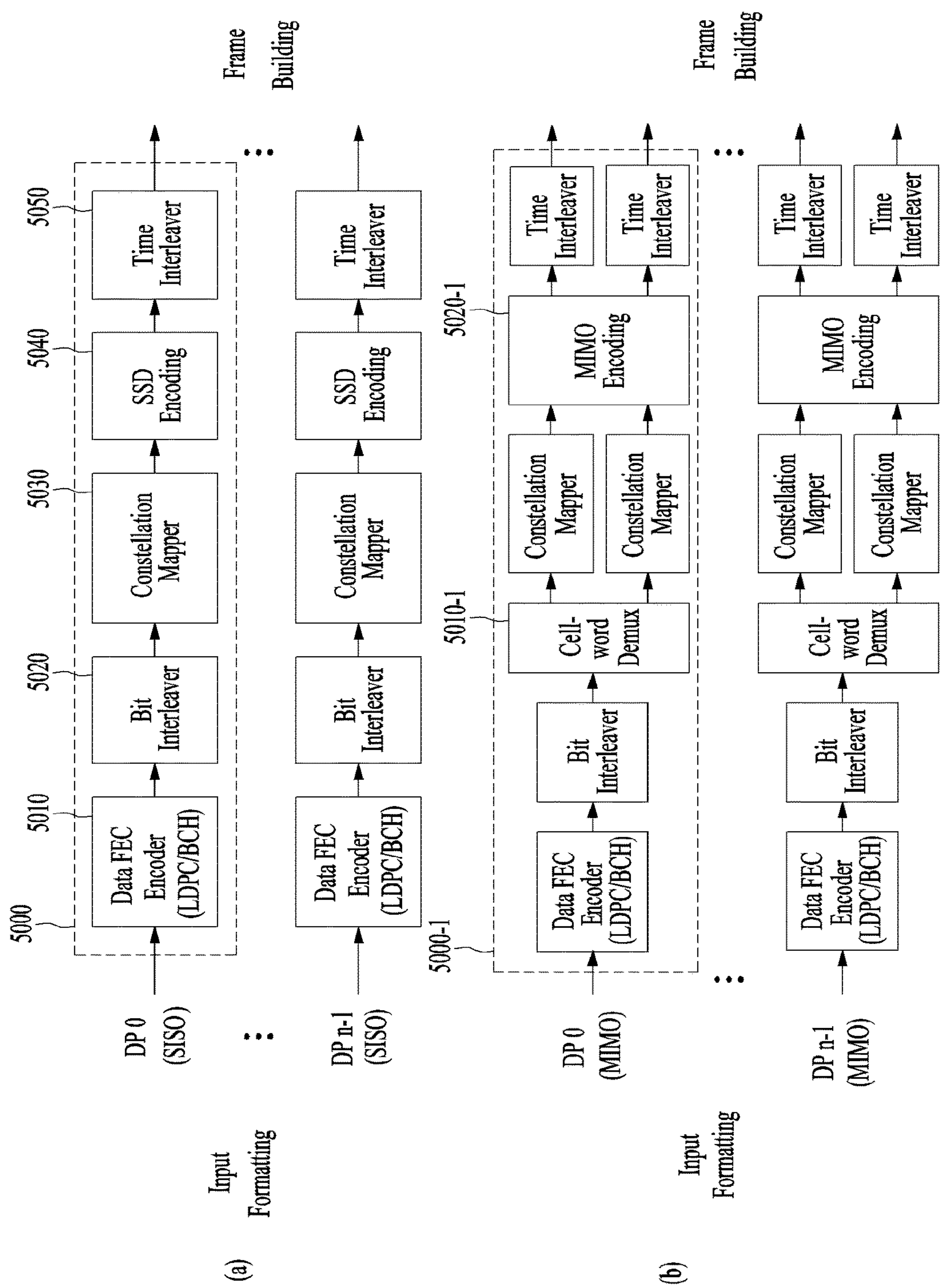
FIG. 19 is a block diagram illustrating a bit interleaved coding & modulation (BICM) block according to an embodiment of the present invention.

FIG. 19 illustrates a BICM block according to an embodiment of the present invention.

The BICM block illustrated in FIG. 19 corresponds to an embodiment of the BICM block 1010 described with reference to FIG. 18.

As described above, the broadcast signal transmission apparatus for future broadcast services according to the embodiment of the present invention may provide a terrestrial broadcast service, mobile broadcast service, UHDTV service, etc.

Since QoS depends on characteristics of a service provided by the broadcast signal transmission apparatus for future broadcast services according to the embodiment of the present invention, data corresponding to respective services needs to be processed using different schemes. Accordingly, the BICM block according to the embodiment of the present invention may independently process respective DPs by independently applying SISO, MISO and MIMO schemes to data pipes respectively corresponding to data paths. Consequently, the broadcast signal transmission apparatus for future broadcast services according to the embodiment of the present invention may control QoS for each service or service component transmitted through each DP.

(a) shows a BICM block applied to a profile (or system) to which MIMO is not applied, and (b) shows a BICM block of a profile (or system) to which MIMO is applied.

The BICM block to which MIMO is not applied and the BICM block to which MIMO is applied may include a plurality of processing blocks for processing each DP.

Description will be given of each processing block of the BICM block to which MIMO is not applied and the BICM block to which MIMO is applied.

A processing block 5000 of the BICM block to which MIMO is not applied may include a data FEC encoder 5010, a bit interleaver 5020, a constellation mapper 5030, a signal space diversity (SSD) encoding block 5040 and a time interleaver 5050.

The data FEC encoder 5010 performs FEC encoding on an input BBF to generate FECBLOCK procedure using outer coding (BCH) and inner coding (LDPC). The outer coding (BCH) is optional coding method. A detailed operation of the data FEC encoder 5010 will be described later.

The bit interleaver 5020 may interleave outputs of the data FEC encoder 5010 to achieve optimized performance with a combination of LDPC codes and a modulation scheme while providing an efficiently implementable structure. A detailed operation of the bit interleaver 5020 will be described later.

The constellation mapper 5030 may modulate each cell word from the bit interleaver 5020 in the base and the handheld profiles, or each cell word from the cell-word demultiplexer 5010-1 in the advanced profile using either QPSK, QAM-16, non-uniform QAM (NUQ-64, NUQ-256, or NUQ-1024) or non-uniform constellation (NUC-16, NUC-64, NUC-256, or NUC-1024) mapping to give a power-normalized constellation point, $e_1$. This constellation mapping is applied only for DPs. It is observed that QAM-16 and NUQs are square shaped, while NUCs have arbitrary shapes. When each constellation is rotated by any multiple of 90 degrees, the rotated constellation exactly overlaps with its original one. This "rotation-sense" symmetric property makes the capacities and the average powers of the real and imaginary components equal to each other. Both NUQs and NUCs are defined specifically for each code rate and the particular one used is signaled by the parameter DP_MOD filed in the PLS2 data.

The time interleaver 5050 may operates at a DP level. Parameters of time interleaving (TI) may be set differently for each DP. A detailed operation of the time interleaver 5050 will be described later.

A processing block 5000-1 of the BICM block to which MIMO is applied may include the data FEC encoder, the bit interleaver, the constellation mapper, and the time interleaver.

However, the processing block 5000-1 is distinguished from the processing block 5000 of the BICM block to which MIMO is not applied in that the processing block 5000-1 further includes a cell-word demultiplexer 5010-1 and a MIMO encoding block 5020-1.

In addition, operations of the data FEC encoder, the bit interleaver, the constellation mapper, and the time interleaver in the processing block 5000-1 correspond to those of the data FEC encoder 5010, the bit interleaver 5020, the constellation mapper 5030, and the time interleaver 5050 described above, and thus description thereof is omitted.

The cell-word demultiplexer 5010-1 is used for a DP of the advanced profile to divide a single cell-word stream into dual cell-word streams for MIMO processing.

The MIMO encoding block 5020-1 may process an output of the cell-word demultiplexer 5010-1 using a MIMO encoding scheme. The MIMO encoding scheme is optimized for broadcast signal transmission. MIMO technology is a promising way to obtain a capacity increase but depends on channel characteristics. Especially for broadcasting, a strong LOS component of a channel or a difference in received signal power between two antennas caused by different signal propagation characteristics makes it difficult to obtain capacity gain from MIMO. The proposed MIMO encoding scheme overcomes this problem using rotation-based precoding and phase randomization of one of MIMO output signals.

MIMO encoding is intended for a 2×2 MIMO system requiring at least two antennas at both the transmitter and the receiver. A MIMO encoding mode of the present invention may be defined as full-rate spatial multiplexing (FR-SM). FR-SM encoding may provide capacity increase with relatively small complexity increase at the receiver side. In addition, the MIMO encoding scheme of the present invention has no restriction on an antenna polarity configuration.

MIMO processing is applied at the DP level. NUQ ($e_{1,i}$ and $e_{2,i}$) corresponding to a pair of constellation mapper outputs is fed to an input of a MIMO encoder. Paired MIMO encoder output (g1,i and g2,i) is transmitted by the same carrier k and OFDM symbol l of respective TX antennas thereof.

The above-described blocks may be omitted or replaced by blocks having similar or identical functions.

Figure 20:
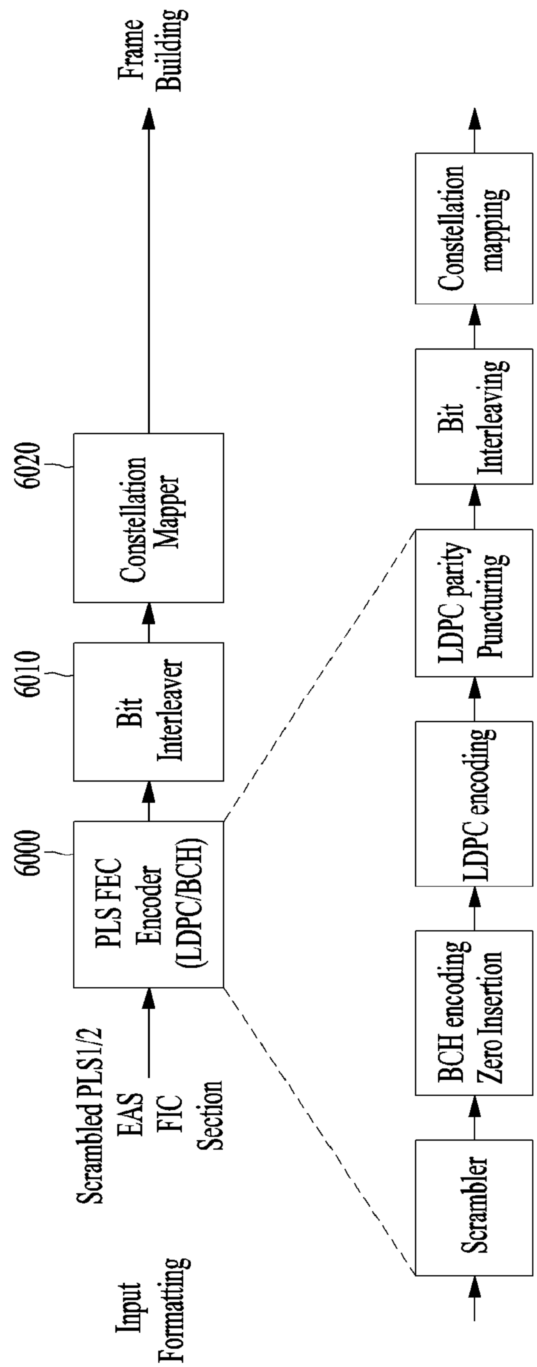
FIG. 20 is a block diagram illustrating a BICM block according to another embodiment of the present invention.

FIG. 20 illustrates a BICM block according to another embodiment of the present invention.

The BICM block illustrated in FIG. 20 corresponds to another embodiment of the BICM block 1010 described with reference to FIG. 18.

FIG. 20 illustrates a BICM block for protection of physical layer signaling (PLS), an emergency alert channel (EAC) and a fast information channel (FIC). The EAC is a part of a frame that carries EAS information data, and the FIC is a logical channel in a frame that carries mapping information between a service and a corresponding base DP. Details of the EAC and FIC will be described later.

Referring to FIG. 20, the BICM block for protection of the PLS, the EAC and the FIC may include a PLS FEC encoder 6000, a bit interleaver 6010 and a constellation mapper 6020.

In addition, the PLS FEC encoder 6000 may include a scrambler, a BCH encoding/zero insertion block, an LDPC encoding block and an LDPC parity puncturing block. Description will be given of each block of the BICM block.

The PLS FEC encoder 6000 may encode scrambled PLS 1/2 data, EAC and FIC sections.

The scrambler may scramble PLS1 data and PLS2 data before BCH encoding and shortened and punctured LDPC encoding.

The BCH encoding/zero insertion block may perform outer encoding on the scrambled PLS 1/2 data using a shortened BCH code for PLS protection, and insert zero bits after BCH encoding. For PLS1 data only, output bits of zero insertion may be permutted before LDPC encoding.

The LDPC encoding block may encode an output of the BCH encoding/zero insertion block using an LDPC code. To generate a complete coded block, $C_{ldpc}$ and parity bits $P_{ldpc}$ are encoded systematically from each zero-inserted PLS information block $I_{ldpc}$ and appended thereto.

$$C_{ldpc}=[I_{ldpc}P_{ldpc}]=[i_0,i_1,\ldots,i_{K_{ldpc}-1},p_0,p_1,\ldots,p_{N_{ldpc}-K_{ldpc}-1}] \quad \text{[Equation 1]}$$

The LDPC parity puncturing block may perform puncturing on the PLS1 data and the PLS2 data.

When shortening is applied to PLS1 data protection, some LDPC parity bits are punctured after LDPC encoding. In addition, for PLS2 data protection, LDPC parity bits of PLS2 are punctured after LDPC encoding. These punctured bits are not transmitted.

The bit interleaver 6010 may interleave each of shortened and punctured PLS1 data and PLS2 data.

The constellation mapper 6020 may map the bit-interleaved PLS1 data and PLS2 data to constellations.

The above-described blocks may be omitted or replaced by blocks having similar or identical functions.

Figure 21:
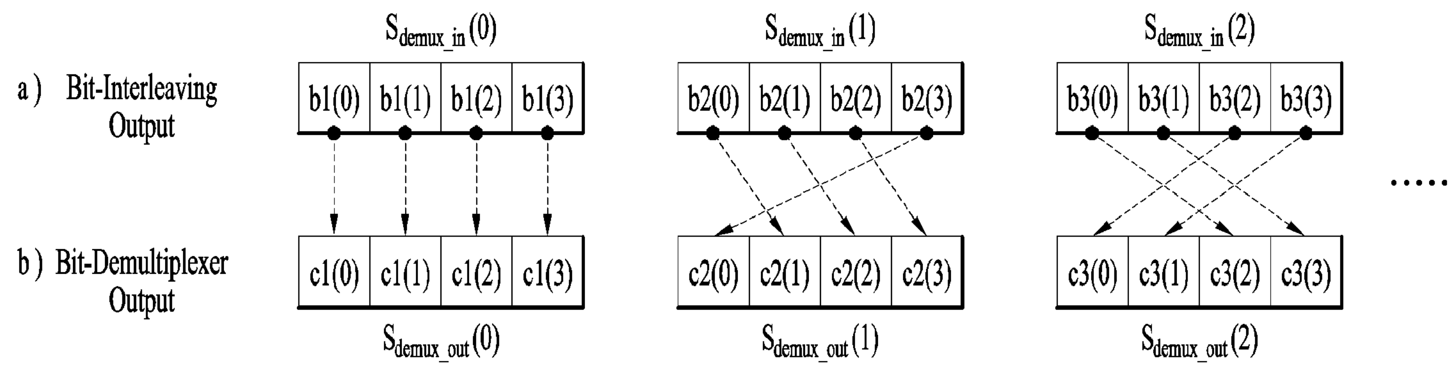
FIG. 21 illustrates a bit interleaving process of physical layer signaling (PLS) according to an embodiment of the present invention.

FIG. 21 illustrates a bit interleaving process of PLS according to an embodiment of the present invention.

Figure 22:
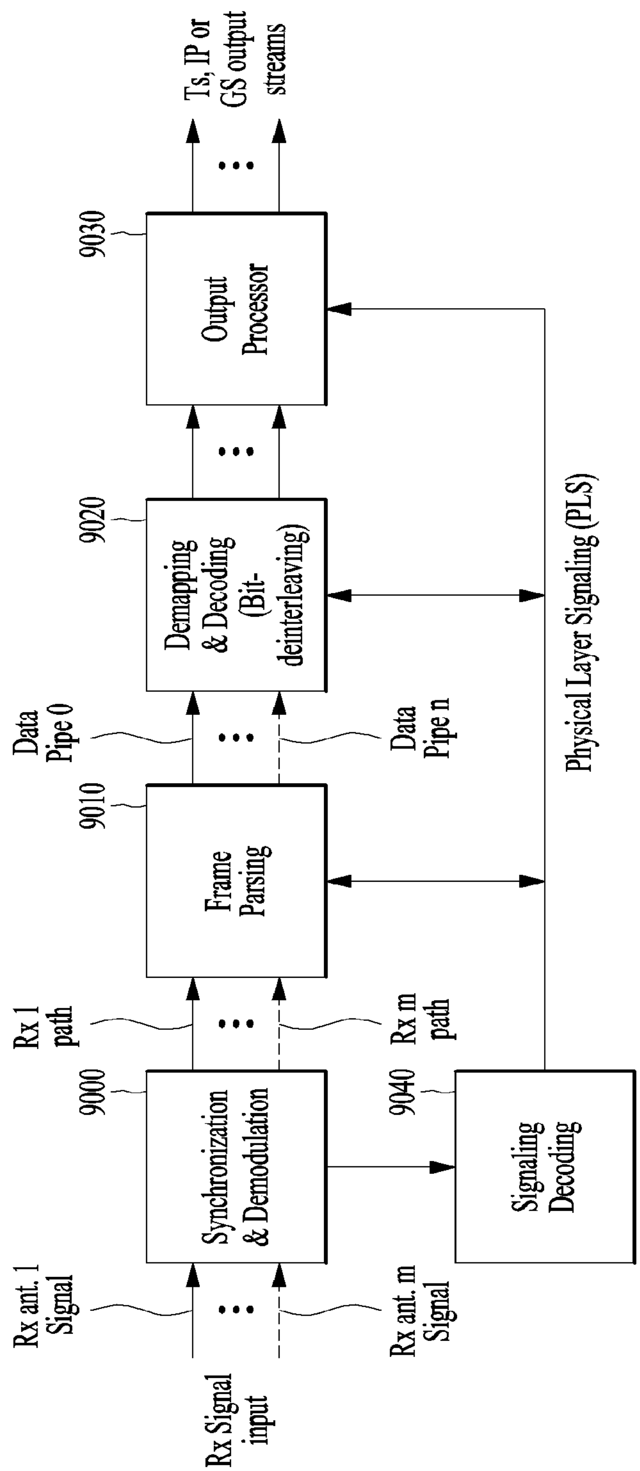
FIG. 22 is a block diagram illustrating a configuration of a broadcast signal reception apparatus for future broadcast services according to an embodiment of the present invention.

Each shortened and punctured PLS1 and PLS2 coded block is interleaved bit-by-bit as described in FIG. 22. Each block of additional parity bits is interleaved with the same block interleaving structure but separately.

In the case of BPSK, there are two branches for bit interleaving to duplicate FEC coded bits in the real and imaginary parts. Each coded block is written to the upper branch first. The bits are mapped to the lower branch by applying modulo $N_{FE}C$ addition with cyclic shifting value floor($N_{FEC}$/2), where $N_{FEC}$ is the length of each LDPC coded block after shortening and puncturing.

In other modulation cases, such as QSPK, QAM-16 and NUQ-64, FEC coded bits are written serially into the interleaver column-wise, where the number of columns is the same as the modulation order.

In the read operation, the bits for one constellation symbol are read out sequentially row-wise and fed into the bit demultiplexer block. These operations are continued until the end of the column.

Each bit interleaved group is demultiplexed bit-by-bit in a group before constellation mapping. Depending on modulation order, there are two mapping rules. In the case of BPSK and QPSK, the reliability of bits in a symbol is equal. Therefore, the bit group read out from the bit interleaving block is mapped to a QAM symbol without any operation.

Figure 23:
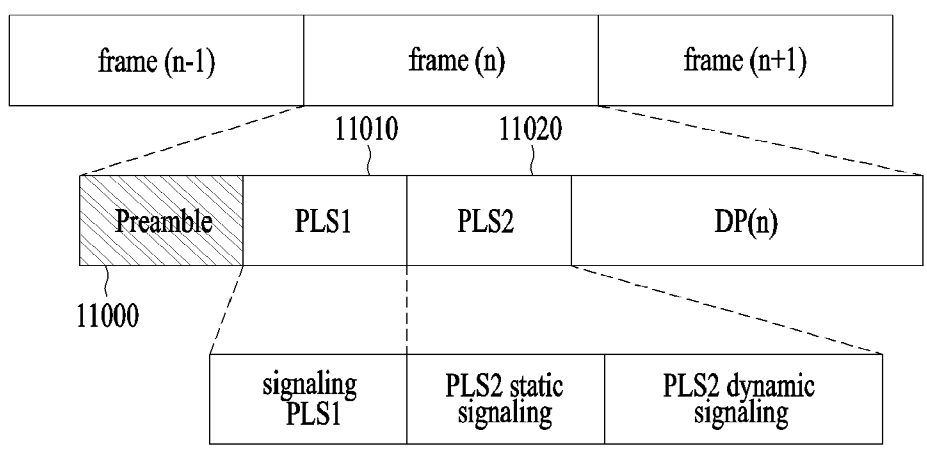
FIG. 23 illustrates a signaling hierarchy structure of a frame according to an embodiment of the present invention.

In the cases of QAM-16 and NUQ-64 mapped to a QAM symbol, the rule of operation is described in FIG. 23(*a*). As shown in FIG. 23(*a*), i is bit group index corresponding to column index in bit interleaving.

FIG. 21 shows the bit demultiplexing rule for QAM-16. This operation continues until all bit groups are read from the bit interleaving block.

FIG. 22 illustrates a configuration of a broadcast signal reception apparatus for future broadcast services according to an embodiment of the present invention.

The broadcast signal reception apparatus for future broadcast services according to the embodiment of the present invention may correspond to the broadcast signal transmission apparatus for future broadcast services described with reference to FIG. 18.

The broadcast signal reception apparatus for future broadcast services according to the embodiment of the present invention may include a synchronization & demodulation module 9000, a frame parsing module 9010, a demapping & decoding module 9020, an output processor 9030 and a signaling decoding module 9040. A description will be given of operation of each module of the broadcast signal reception apparatus.

The synchronization & demodulation module 9000 may receive input signals through m Rx antennas, perform signal detection and synchronization with respect to a system corresponding to the broadcast signal reception apparatus, and carry out demodulation corresponding to a reverse procedure of a procedure performed by the broadcast signal transmission apparatus.

The frame parsing module 9010 may parse input signal frames and extract data through which a service selected by a user is transmitted. If the broadcast signal transmission apparatus performs interleaving, the frame parsing module 9010 may carry out deinterleaving corresponding to a reverse procedure of interleaving. In this case, positions of a signal and data that need to be extracted may be obtained by decoding data output from the signaling decoding module 9040 to restore scheduling information generated by the broadcast signal transmission apparatus.

The demapping & decoding module 9020 may convert input signals into bit domain data and then deinterleave the same as necessary. The demapping & decoding module 9020 may perform demapping of mapping applied for transmission efficiency and correct an error generated on a transmission channel through decoding. In this case, the demapping & decoding module 9020 may obtain transmission parameters necessary for demapping and decoding by decoding data output from the signaling decoding module 9040.

The output processor 9030 may perform reverse procedures of various compression/signal processing procedures which are applied by the broadcast signal transmission apparatus to improve transmission efficiency. In this case, the output processor 9030 may acquire necessary control information from data output from the signaling decoding module 9040. An output of the output processor 9030 corresponds to a signal input to the broadcast signal transmission apparatus and may be MPEG-TSs, IP streams (v4 or v6) and generic streams.

The signaling decoding module 9040 may obtain PLS information from a signal demodulated by the synchronization & demodulation module 9000. As described above, the frame parsing module 9010, the demapping & decoding module 9020 and the output processor 9030 may execute functions thereof using data output from the signaling decoding module 9040.

A frame according to an embodiment of the present invention is further divided into a number of OFDM symbols and a preamble. As shown in (d), the frame includes a preamble, one or more frame signaling symbols (FSSs), normal data symbols and a frame edge symbol (FES).

The preamble is a special symbol that enables fast future-cast UTB system signal detection and provides a set of basic transmission parameters for efficient transmission and reception of a signal. Details of the preamble will be described later.

A main purpose of the FSS is to carry PLS data. For fast synchronization and channel estimation, and hence fast decoding of PLS data, the FSS has a dense pilot pattern than a normal data symbol. The FES has exactly the same pilots as the FSS, which enables frequency-only interpolation within the FES and temporal interpolation, without extrapolation, for symbols immediately preceding the FES.

FIG. 23 illustrates a signaling hierarchy structure of a frame according to an embodiment of the present invention.

FIG. 23 illustrates the signaling hierarchy structure, which is split into three main parts corresponding to preamble signaling data 11000, PLS1 data 11010 and PLS2 data 11020. A purpose of a preamble, which is carried by a preamble symbol in every frame, is to indicate a transmission type and basic transmission parameters of the frame. PLS1 enables the receiver to access and decode the PLS2 data, which contains the parameters to access a DP of interest. PLS2 is carried in every frame and split into two main parts corresponding to PLS2-STAT data and PLS2-DYN data. Static and dynamic portions of PLS2 data are followed by padding, if necessary.

Preamble signaling data according to an embodiment of the present invention carries 21 bits of information that are needed to enable the receiver to access PLS data and trace DPs within the frame structure. Details of the preamble signaling data are as follows.

FFT_SIZE: This 2-bit field indicates an FFT size of a current frame within a frame group as described in the following Table 1.

TABLE 1

| Value | FFT size |
|---|---|
| 00 | 8K FFT |
| 01 | 16K FFT |
| 10 | 32K FFT |
| 11 | Reserved |

GI_FRACTION: This 3-bit field indicates a guard interval fraction value in a current superframe as described in the following Table 2.

TABLE 2

| Value | GI_FRACTION |
|---|---|
| 000 | 1/5 |
| 001 | 1/10 |
| 010 | 1/20 |
| 011 | 1/40 |
| 100 | 1/80 |
| 101 | 1/160 |
| 110 to 111 | Reserved |

EAC_FLAG: This 1-bit field indicates whether the EAC is provided in a current frame. If this field is set to '1', an emergency alert service (EAS) is provided in the current frame. If this field set to '0', the EAS is not carried in the current frame. This field may be switched dynamically within a superframe.

PILOT_MODE: This 1-bit field indicates whether a pilot mode is a mobile mode or a fixed mode for a current frame in a current frame group. If this field is set to '0', the mobile pilot mode is used. If the field is set to '1', the fixed pilot mode is used.

PAPR_FLAG: This 1-bit field indicates whether PAPR reduction is used for a current frame in a current frame group. If this field is set to a value of '1', tone reservation is used for PAPR reduction. If this field is set to a value of '0', PAPR reduction is not used.

RESERVED: This 7-bit field is reserved for future use.

FIG. 24 illustrates PLS1 data according to an embodiment of the present invention.

PLS1 data provides basic transmission parameters including parameters required to enable reception and decoding of PLS2. As mentioned above, the PLS1 data remain unchanged for the entire duration of one frame group. A detailed definition of the signaling fields of the PLS1 data is as follows.

PREAMBLE_DATA: This 20-bit field is a copy of preamble signaling data excluding EAC_FLAG.

NUM_FRAME_FRU: This 2-bit field indicates the number of the frames per FRU.

PAYLOAD_TYPE: This 3-bit field indicates a format of payload data carried in a frame group. PAYLOAD_TYPE is signaled as shown in Table 3.

TABLE 3

| Value | Payload type |
|---|---|
| 1XX | TS is transmitted. |
| X1X | IP stream is transmitted. |
| XX1 | GS is transmitted. |

NUM_FSS: This 2-bit field indicates the number of FSSs in a current frame.

SYSTEM_VERSION: This 8-bit field indicates a version of a transmitted signal format. SYSTEM_VERSION is divided into two 4-bit fields: a major version and a minor version.

Major version: The MSB corresponding to four bits of the SYSTEM_VERSION field indicates major version information. A change in the major version field indicates a non-backward-compatible change. A default value is '0000'. For a version described in this standard, a value is set to '0000'.

Minor version: The LSB corresponding to four bits of SYSTEM_VERSION field indicates minor version information. A change in the minor version field is backwards compatible.

CELL_ID: This is a 16-bit field which uniquely identifies a geographic cell in an ATSC network. An ATSC cell coverage area may include one or more frequencies depending on the number of frequencies used per futurecast UTB system. If a value of CELL_ID is not known or unspecified, this field is set to '0'.

NETWORK_ID: This is a 16-bit field which uniquely identifies a current ATSC network.

SYSTEM_ID: This 16-bit field uniquely identifies the futurecast UTB system within the ATSC network. The futurecast UTB system is a terrestrial broadcast system whose input is one or more input streams (TS, IP, GS) and whose output is an RF signal. The futurecast UTB system carries one or more PHY profiles and FEF, if any. The same futurecast UTB system may carry different input streams and use different RFs in different geographical areas, allowing local service insertion. The frame structure and scheduling are controlled in one place and are identical for all transmissions within the futurecast UTB system. One or more futurecast UTB systems may have the same SYSTEM_ID meaning that they all have the same physical layer structure and configuration.

The following loop includes FRU_PHY_PROFILE, FRU_FRAME_LENGTH, FRU_GI_FRACTION, and RESERVED which are used to indicate an FRU configuration and a length of each frame type. A loop size is fixed so that four PHY profiles (including an FEF) are signaled within the FRU. If NUM_FRAME_FRU is less than 4, unused fields are filled with zeros.

FRU_PHY_PROFILE: This 3-bit field indicates a PHY profile type of an $(i+1)^{th}$ (i is a loop index) frame of an associated FRU. This field uses the same signaling format as shown in Table 8.

FRU_FRAME_LENGTH: This 2-bit field indicates a length of an $(i+1)^{th}$ frame of an associated FRU. Using FRU_FRAME_LENGTH together with FRU_GI_FRACTION, an exact value of a frame duration may be obtained.

FRU_GI_FRACTION: This 3-bit field indicates a guard interval fraction value of an $(i+1)^{th}$ frame of an associated FRU. FRU_GI_FRACTION is signaled according to Table 7.

RESERVED: This 4-bit field is reserved for future use.

The following fields provide parameters for decoding the PLS2 data.

PLS2_FEC_TYPE: This 2-bit field indicates an FEC type used by PLS2 protection. The FEC type is signaled according to Table 4. Details of LDPC codes will be described later.

TABLE 4

| Content | PLS2 FEC type |
|---|---|
| 00 | 4K-1/4 and 7K-3/10 LDPC codes |
| 01 to 11 | Reserved |

PLS2_MOD: This 3-bit field indicates a modulation type used by PLS2. The modulation type is signaled according to Table 5.

TABLE 5

| Value | PLS2_MODE |
|---|---|
| 000 | BPSK |
| 001 | QPSK |
| 010 | QAM-16 |
| 011 | NUQ-64 |
| 100 to 111 | Reserved |

PLS2_SIZE_CELL: This 15-bit field indicates $C_{total\_partial\_block}$, a size (specified as the number of QAM cells) of the collection of full coded blocks for PLS2 that is carried in a current frame group. This value is constant during the entire duration of the current frame group.

PLS2_STAT_SIZE_BIT: This 14-bit field indicates a size, in bits, of PLS2-STAT for a current frame group. This value is constant during the entire duration of the current frame group.

PLS2_DYN_SIZE_BIT: This 14-bit field indicates a size, in bits, of PLS2-DYN for a current frame group. This value is constant during the entire duration of the current frame group.

PLS2_REP_FLAG: This 1-bit flag indicates whether a PLS2 repetition mode is used in a current frame group. When this field is set to a value of '1', the PLS2 repetition mode is activated. When this field is set to a value of '0', the PLS2 repetition mode is deactivated.

PLS2_REP_SIZE_CELL: This 15-bit field indicates $C_{total\_partial\_block}$, a size (specified as the number of QAM cells) of the collection of partial coded blocks for PLS2 carried in every frame of a current frame group, when PLS2 repetition is used. If repetition is not used, a value of this field is equal to 0. This value is constant during the entire duration of the current frame group.

PLS2_NEXT_FEC_TYPE: This 2-bit field indicates an FEC type used for PLS2 that is carried in every frame of a next frame group. The FEC type is signaled according to Table 10.

PLS2_NEXT_MOD: This 3-bit field indicates a modulation type used for PLS2 that is carried in every frame of a next frame group. The modulation type is signaled according to Table 11.

PLS2_NEXT_REP_FLAG: This 1-bit flag indicates whether the PLS2 repetition mode is used in a next frame group. When this field is set to a value of '1', the PLS2 repetition mode is activated. When this field is set to a value of '0', the PLS2 repetition mode is deactivated.

PLS2_NEXT_REP_SIZE_CELL: This 15-bit field indicates $C_{total\_full\_block}$, a size (specified as the number of QAM cells) of the collection of full coded blocks for PLS2 that is carried in every frame of a next frame group, when PLS2 repetition is used. If repetition is not used in the next frame group, a value of this field is equal to 0. This value is constant during the entire duration of a current frame group.

PLS2_NEXT_REP_STAT_SIZE_BIT: This 14-bit field indicates a size, in bits, of PLS2-STAT for a next frame group. This value is constant in a current frame group.

PLS2_NEXT_REP_DYN_SIZE_BIT: This 14-bit field indicates the size, in bits, of the PLS2-DYN for a next frame group. This value is constant in a current frame group.

PLS2_AP_MODE: This 2-bit field indicates whether additional parity is provided for PLS2 in a current frame group. This value is constant during the entire duration of the current frame group. Table 6 below provides values of this field. When this field is set to a value of '00', additional parity is not used for the PLS2 in the current frame group.

TABLE 6

| Value | PLS2-AP mode |
|---|---|
| 00 | AP is not provided |
| 01 | AP1 mode |
| 10 to 11 | Reserved |

PLS2_AP_SIZE_CELL: This 15-bit field indicates a size (specified as the number of QAM cells) of additional parity bits of PLS2. This value is constant during the entire duration of a current frame group.

PLS2_NEXT_AP_MODE: This 2-bit field indicates whether additional parity is provided for PLS2 signaling in every frame of a next frame group. This value is constant during the entire duration of a current frame group. Table 12 defines values of this field.

PLS2_NEXT_AP_SIZE_CELL: This 15-bit field indicates a size (specified as the number of QAM cells) of additional parity bits of PLS2 in every frame of a next frame group. This value is constant during the entire duration of a current frame group.

RESERVED: This 32-bit field is reserved for future use.

CRC_32: A 32-bit error detection code, which is applied to all PLS1 signaling.

FIG. 25 illustrates PLS2 data according to an embodiment of the present invention.

FIG. 25 illustrates PLS2-STAT data of the PLS2 data. The PLS2-STAT data is the same within a frame group, while PLS2-DYN data provides information that is specific for a current frame.

Details of fields of the PLS2-STAT data are described below.

FIC_FLAG: This 1-bit field indicates whether the FIC is used in a current frame group. If this field is set to '1', the FIC is provided in the current frame. If this field set to '0', the FIC is not carried in the current frame. This value is constant during the entire duration of a current frame group.

AUX_FLAG: This 1-bit field indicates whether an auxiliary stream is used in a current frame group. If this field is set to '1', the auxiliary stream is provided in a current frame. If this field set to '0', the auxiliary stream is not carried in the current frame. This value is constant during the entire duration of current frame group.

NUM_DP: This 6-bit field indicates the number of DPs carried within a current frame. A value of this field ranges from 1 to 64, and the number of DPs is NUM_DP+1.

DP_ID: This 6-bit field identifies uniquely a DP within a PHY profile.

DP_TYPE: This 3-bit field indicates a type of a DP. This is signaled according to the following Table 7.

TABLE 7

| Value | DP Type |
|---|---|
| 000 | DP Type 1 |
| 001 | DP Type 2 |
| 010 to 111 | Reserved |

DP_GROUP_ID: This 8-bit field identifies a DP group with which a current DP is associated. This may be used by the receiver to access DPs of service components associated with a particular service having the same DP_GROUP_ID.

BASE_DP_ID: This 6-bit field indicates a DP carrying service signaling data (such as PSI/SI) used in a management layer. The DP indicated by BASE_DP_ID may be either a normal DP carrying the service signaling data along with service data or a dedicated DP carrying only the service signaling data.

DP_FEC_TYPE: This 2-bit field indicates an FEC type used by an associated DP.

The FEC type is signaled according to the following Table 8.

TABLE 8

| Value | FEC_TYPE |
|---|---|
| 00 | 16K LDPC |
| 01 | 64K LDPC |
| 10 to 11 | Reserved |

DP_COD: This 4-bit field indicates a code rate used by an associated DP. The code rate is signaled according to the following Table 9.

TABLE 9

| Value | Code rate |
|---|---|
| 0000 | 5/15 |
| 0001 | 6/15 |
| 0010 | 7/15 |
| 0011 | 8/15 |
| 0100 | 9/15 |
| 0101 | 10/15 |
| 0110 | 11/15 |
| 0111 | 12/15 |
| 1000 | 13/15 |
| 1001 to 1111 | Reserved |

DP_MOD: This 4-bit field indicates modulation used by an associated DP. The modulation is signaled according to the following Table 10.

TABLE 10

| Value | Modulation |
|---|---|
| 0000 | QPSK |
| 0001 | QAM-16 |
| 0010 | NUQ-64 |
| 0011 | NUQ-256 |
| 0100 | NUQ-1024 |
| 0101 | NUC-16 |
| 0110 | NUC-64 |
| 0111 | NUC-256 |
| 1000 | NUC-1024 |
| 1001 to 1111 | Reserved |

DP_SSD_FLAG: This 1-bit field indicates whether an SSD mode is used in an associated DP. If this field is set to a value of '1', SSD is used. If this field is set to a value of '0', SSD is not used.

The following field appears only if PHY_PROFILE is equal to '010', which indicates the advanced profile:

DP_MIMO: This 3-bit field indicates which type of MIMO encoding process is applied to an associated DP. A type of MIMO encoding process is signaled according to the following Table 11.

TABLE 11

| Value | MIMO encoding |
|---|---|
| 000 | FR-SM |
| 001 | FRFD-SM |
| 010 to 111 | Reserved |

DP_TI_TYPE: This 1-bit field indicates a type of time interleaving. A value of '0' indicates that one TI group corresponds to one frame and contains one or more TI blocks. A value of '1' indicates that one TI group is carried in more than one frame and contains only one TI block.

DP_TI_LENGTH: The use of this 2-bit field (allowed values are only 1, 2, 4, and 8) is determined by values set within the DP_TI_TYPE field as follows.

If DP_TI_TYPE is set to a value of '1', this field indicates $P_I$, the number of frames to which each TI group is mapped, and one TI block is present per TI group ($N_{TI}$=1). Allowed values of $P_I$ with the 2-bit field are defined in Table 12 below.

If DP_TI_TYPE is set to a value of '0', this field indicates the number of TI blocks $N_{TI}$ per TI group, and one TI group is present per frame ($P_I$=1). Allowed values of $P_I$ with the 2-bit field are defined in the following Table 12.

TABLE 12

| 2-bit field | $P_I$ | $N_{TI}$ |
|---|---|---|
| 00 | 1 | 1 |
| 01 | 2 | 2 |
| 10 | 4 | 3 |
| 11 | 8 | 4 |

DP_FRAME_INTERVAL: This 2-bit field indicates a frame interval ($I_{JUMP}$) within a frame group for an associated DP and allowed values are 1, 2, 4, and 8 (the corresponding 2-bit field is '00', '01', '10', or '11', respectively). For DPs that do not appear every frame of the frame group, a value of this field is equal to an interval between successive frames.

For example, if a DP appears on frames 1, 5, 9, 13, etc., this field is set to a value of '4'. For DPs that appear in every frame, this field is set to a value of '1'.

DP_TI_BYPASS: This 1-bit field determines availability of the time interleaver 5050. If time interleaving is not used for a DP, a value of this field is set to '1'. If time interleaving is used, the value is set to '0'.

DP_FIRST_FRAME_IDX: This 5-bit field indicates an index of a first frame of a superframe in which a current DP occurs. A value of DP_FIRST_FRAME_IDX ranges from 0 to 31.

DP_NUM_BLOCK_MAX: This 10-bit field indicates a maximum value of DP_NUM_BLOCKS for this DP. A value of this field has the same range as DP_NUM_BLOCKS.

DP_PAYLOAD_TYPE: This 2-bit field indicates a type of payload data carried by a given DP. DP_PAYLOAD_TYPE is signaled according to the following Table 13.

TABLE 13

| Value | Payload type |
|---|---|
| 00 | TS |
| 01 | IP |
| 10 | GS |
| 11 | Reserved |

DP_INBAND_MODE: This 2-bit field indicates whether a current DP carries in-band signaling information. An in-band signaling type is signaled according to the following Table 14.

TABLE 14

| Value | In-band mode |
|---|---|
| 00 | In-band signaling is not carried. |
| 01 | INBAND-PLS is carried |
| 10 | INBAND-ISSY is carried |
| 11 | INBAND-PLS and INBAND-ISSY are carried |

DP_PROTOCOL_TYPE: This 2-bit field indicates a protocol type of a payload carried by a given DP. The protocol type is signaled according to Table 15 below when input payload types are selected.

TABLE 15

| Value | If DP_PAYLOAD_TYPE is TS | If DP_PAYLOAD_TYPE is IP | If DP_PAYLOAD_TYPE is GS |
|---|---|---|---|
| 00 | MPEG2-TS | IPv4 | (Note) |
| 01 | Reserved | IPv6 | Reserved |
| 10 | Reserved | Reserved | Reserved |
| 11 | Reserved | Reserved | Reserved |

DP_CRC_MODE: This 2-bit field indicates whether CRC encoding is used in an input formatting block. A CRC mode is signaled according to the following Table 16.

TABLE 16

| Value | CRC mode |
|---|---|
| 00 | Not used |
| 01 | CRC-8 |
| 10 | CRC-16 |
| 11 | CRC-32 |

DNP_MODE: This 2-bit field indicates a null-packet deletion mode used by an associated DP when DP_PAYLOAD_TYPE is set to TS ('00'). DNP_MODE is signaled according to Table 17 below. If DP_PAYLOAD_TYPE is not TS ('00'), DNP_MODE is set to a value of '00'.

TABLE 17

| Value | Null-packet deletion mode |
|---|---|
| 00 | Not used |
| 01 | DNP-NORMAL |
| 10 | DNP-OFFSET |
| 11 | Reserved |

ISSY_MODE: This 2-bit field indicates an ISSY mode used by an associated DP when DP_PAYLOAD_TYPE is set to TS ('00'). ISSY_MODE is signaled according to Table 18 below. If DP_PAYLOAD_TYPE is not TS ('00'), ISSY_MODE is set to the value of '00'.

TABLE 18

| Value | ISSY mode |
|---|---|
| 00 | Not used |
| 01 | ISSY-UP |
| 10 | ISSY-BBF |
| 11 | Reserved |

HC_MODE_TS: This 2-bit field indicates a TS header compression mode used by an associated DP when DP_PAYLOAD_TYPE is set to TS ('00'). HC_MODE_TS is signaled according to the following Table 19.

TABLE 19

| Value | Header compression mode |
|---|---|
| 00 | HC_MODE_TS 1 |
| 01 | HC_MODE_TS 2 |
| 10 | HC_MODE_TS 3 |
| 11 | HC_MODE_TS 4 |

HC_MODE_IP: This 2-bit field indicates an IP header compression mode when DP_PAYLOAD_TYPE is set to IP ('01'). HC_MODE_IP is signaled according to the following Table 20.

TABLE 20

| Value | Header compression mode |
|---|---|
| 00 | No compression |
| 01 | HC_MODE_IP 1 |
| 10 to 11 | Reserved |

PID: This 13-bit field indicates the PID number for TS header compression when DP_PAYLOAD_TYPE is set to TS ('00') and HC_MODE_TS is set to '01' or '10'.

RESERVED: This 8-bit field is reserved for future use.

The following fields appear only if FIC_FLAG is equal to '1'.

FIC_VERSION: This 8-bit field indicates the version number of the FIC.

FIC_LENGTH_BYTE: This 13-bit field indicates the length, in bytes, of the FIC.

RESERVED: This 8-bit field is reserved for future use.

The following fields appear only if AUX_FLAG is equal to '1'.

NUM_AUX: This 4-bit field indicates the number of auxiliary streams. Zero means no auxiliary stream is used.

AUX_CONFIG_RFU: This 8-bit field is reserved for future use.

AUX_STREAM_TYPE: This 4-bit is reserved for future use for indicating a type of a current auxiliary stream.

AUX_PRIVATE_CONFIG: This 28-bit field is reserved for future use for signaling auxiliary streams.

Figures 26, 27:
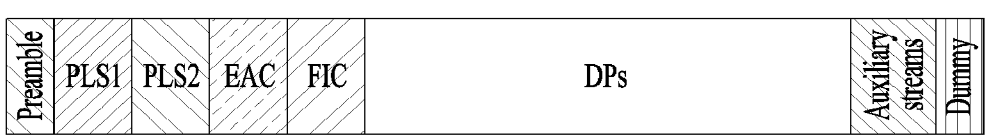
FIG. 26 is a table illustrating PLS2 data according to another embodiment of the present invention.
FIG. 27 illustrates a logical structure of a frame according to an embodiment of the present invention.

FIG. 26 illustrates PLS2 data according to another embodiment of the present invention.

FIG. 26 illustrates PLS2-DYN data of the PLS2 data. Values of the PLS2-DYN data may change during the duration of one frame group while sizes of fields remain constant.

Details of fields of the PLS2-DYN data are as below.

FRAME_INDEX: This 5-bit field indicates a frame index of a current frame within a superframe. An index of a first frame of the superframe is set to '0'.

PLS_CHANGE_COUNTER: This 4-bit field indicates the number of superframes before a configuration changes. A next superframe with changes in the configuration is indicated by a value signaled within this field. If this field is set to a value of '0000', it means that no scheduled change is foreseen. For example, a value of '1' indicates that there is a change in the next superframe.

FIC_CHANGE_COUNTER: This 4-bit field indicates the number of superframes before a configuration (i.e., content of the FIC) changes. A next superframe with changes in the configuration is indicated by a value signaled within this field. If this field is set to a value of '0000', it means that no scheduled change is foreseen. For example, a value of '0001' indicates that there is a change in the next superframe.

RESERVED: This 16-bit field is reserved for future use.

The following fields appear in a loop over NUM_DP, which describe parameters associated with a DP carried in a current frame.

DP_ID: This 6-bit field uniquely indicates a DP within a PHY profile.

DP_START: This 15-bit (or 13-bit) field indicates a start position of the first of the DPs using a DPU addressing scheme. The DP_START field has differing length according to the PHY profile and FFT size as shown in the following Table 21.

TABLE 21

| | DP_START field size | |
|---|---|---|
| PHY profile | 64K | 16K |
| Base | 13 bits | 15 bits |
| Handheld | — | 13 bits |
| Advanced | 13 bits | its |

DP_NUM_BLOCK: This 10-bit field indicates the number of FEC blocks in a current TI group for a current DP. A value of DP_NUM_BLOCK ranges from 0 to 1023.

RESERVED: This 8-bit field is reserved for future use.

The following fields indicate FIC parameters associated with the EAC.

EAC_FLAG: This 1-bit field indicates the presence of the EAC in a current frame.

This bit is the same value as EAC_FLAG in a preamble.

EAS_WAKE_UP_VERSION_NUM: This 8-bit field indicates a version number of a wake-up indication.

If the EAC_FLAG field is equal to '1', the following 12 bits are allocated to EAC_LENGTH_BYTE. If the EAC_FLAG field is equal to '0', the following 12 bits are allocated to EAC_COUNTER.

EAC_LENGTH_BYTE: This 12-bit field indicates a length, in bytes, of the EAC.

EAC_COUNTER: This 12-bit field indicates the number of frames before a frame where the EAC arrives.

The following fields appear only if the AUX_FLAG field is equal to '1'.

AUX_PRIVATE_DYN: This 48-bit field is reserved for future use for signaling auxiliary streams. A meaning of this field depends on a value of AUX_STREAM_TYPE in a configurable PLS2-STAT.

CRC_32: A 32-bit error detection code, which is applied to the entire PLS2.

FIG. 27 illustrates a logical structure of a frame according to an embodiment of the present invention.

As above mentioned, the PLS, EAC, FIC, DPs, auxiliary streams and dummy cells are mapped to the active carriers of OFDM symbols in a frame. PLS1 and PLS2 are first mapped to one or more FSSs. Thereafter, EAC cells, if any, are mapped to an immediately following PLS field, followed next by FIC cells, if any. The DPs are mapped next after the PLS or after the EAC or the FIC, if any. Type 1 DPs are mapped first and Type 2 DPs are mapped next. Details of types of the DPs will be described later. In some cases, DPs may carry some special data for EAS or service signaling data. The auxiliary streams or streams, if any, follow the DPs, which in turn are followed by dummy cells. When the PLS, EAC, FIC, DPs, auxiliary streams and dummy data cells are mapped all together in the above mentioned order, i.e. the PLS, EAC, FIC, DPs, auxiliary streams and dummy data cells, cell capacity in the frame is exactly filled.

Figure 28:
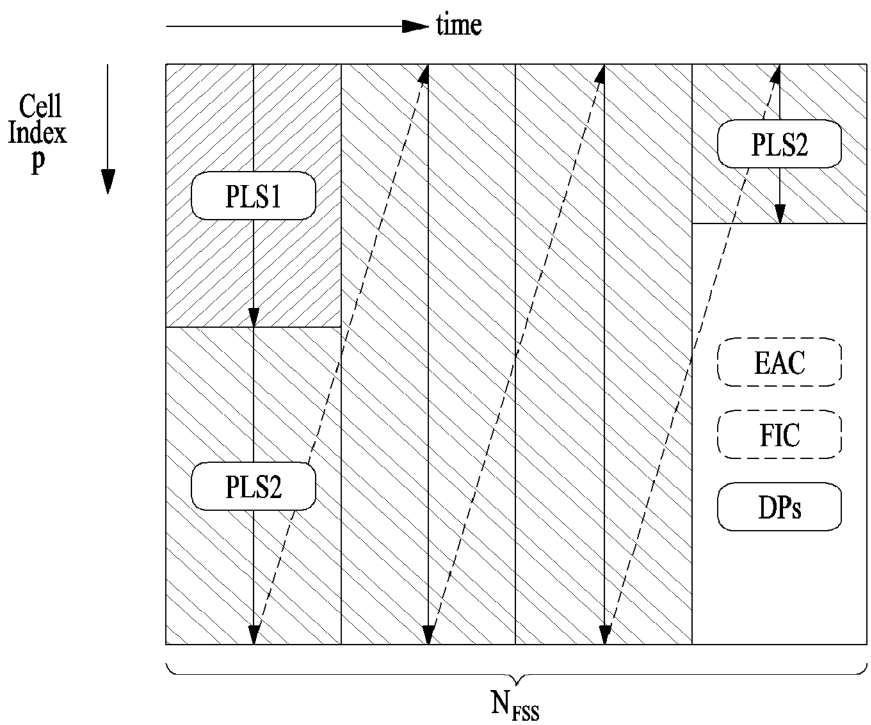
FIG. 28 illustrates PLS mapping according to an embodiment of the present invention.

FIG. 28 illustrates PLS mapping according to an embodiment of the present invention.

PLS cells are mapped to active carriers of FSS(s). Depending on the number of cells occupied by PLS, one or more symbols are designated as FSS(s), and the number of FSS(s) $N_{FSS}$ is signaled by NUM_FSS in PLS1. The FSS is a special symbol for carrying PLS cells. Since robustness and latency are critical issues in the PLS, the FSS(s) have higher pilot density, allowing fast synchronization and frequency-only interpolation within the FSS.

PLS cells are mapped to active carriers of the FSS(s) in a top-down manner as shown in the figure. PLS1 cells are mapped first from a first cell of a first FSS in increasing order of cell index. PLS2 cells follow immediately after a last cell of PLS1 and mapping continues downward until a last cell index of the first FSS. If the total number of required PLS cells exceeds the number of active carriers of one FSS, mapping proceeds to a next FSS and continues in exactly the same manner as the first FSS.

After PLS mapping is completed, DPs are carried next. If an EAC, an FIC or both are present in a current frame, the EAC and the FIC are placed between the PLS and "normal" DPs.

Hereinafter, description will be given of encoding an FEC structure according to an embodiment of the present invention. As above mentioned, the data FEC encoder may perform FEC encoding on an input BBF to generate an FECBLOCK procedure using outer coding (BCH), and inner coding (LDPC). The illustrated FEC structure corresponds to the FECBLOCK. In addition, the FECBLOCK and the FEC structure have same value corresponding to a length of an LDPC codeword.

As described above, BCH encoding is applied to each BBF ($K_{bch}$ bits), and then LDPC encoding is applied to BCH-encoded BBF ($K_{ldpc}$ bits=$N_{bch}$ bits).

A value of $N_{ldpc}$ is either 64,800 bits (long FECBLOCK) or 16,200 bits (short FECBLOCK).

Table 22 and Table 23 below show FEC encoding parameters for the long FECBLOCK and the short FECBLOCK, respectively.

TABLE 22

| LDPC rate | $N_{ldpc}$ | $K_{ldpc}$ | $K_{bch}$ | BCH error correction capability | $N_{bch} - K_{bch}$ |
|---|---|---|---|---|---|
| 5/15 | 64800 | 21600 | 21408 | 12 | 192 |
| 6/15 | | 25920 | 25728 | | |
| 7/15 | | 30240 | 30048 | | |
| 8/15 | | 34560 | 34368 | | |
| 9/15 | | 38880 | 38688 | | |
| 10/15 | | 43200 | 43008 | | |
| 11/15 | | 47520 | 47328 | | |
| 12/15 | | 51840 | 51648 | | |
| 13/15 | | 56160 | 55968 | | |

TABLE 23

| LDPC rate | $N_{ldpc}$ | $K_{ldpc}$ | $K_{bch}$ | BCH error correction capability | $N_{bch} - K_{bch}$ |
|---|---|---|---|---|---|
| 5/15 | 16200 | 5400 | 5232 | 12 | 168 |
| 6/15 | | 6480 | 6312 | | |
| 7/15 | | 7560 | 7392 | | |
| 8/15 | | 8640 | 8472 | | |
| 9/15 | | 9720 | 9552 | | |
| 10/15 | | 10800 | 10632 | | |
| 11/15 | | 11880 | 11712 | | |
| 12/15 | | 12960 | 12792 | | |
| 13/15 | | 14040 | 13872 | | |

Detailed operations of BCH encoding and LDPC encoding are as below.

A 12-error correcting BCH code is used for outer encoding of the BBF. A BCH generator polynomial for the short FECBLOCK and the long FECBLOCK are obtained by multiplying all polynomials together.

LDPC code is used to encode an output of outer BCH encoding. To generate a completed $B_{ldpc}$ (FECBLOCK), $P_{ldpc}$ (parity bits) is encoded systematically from each $I_{ldpc}$ (BCH—encoded BBF), and appended to $I_{ldpc}$. The completed $B_{ldpc}$ (FECBLOCK) is expressed by the following Equation.

$$B_{ldpc}=[I_{ldpc}P_{ldpc}]=[i_0,i_1,\ldots,i_{K_{ldpc}-1},p_0,p_1,\ldots,p_{N_{ldpc}-K_{ldpc}-1}] \quad \text{[Equation 2]}$$

Parameters for the long FECBLOCK and the short FECBLOCK are given in the above Tables 22 and 23, respectively.

A detailed procedure to calculate $N_{ldpc}-K_{ldpc}$ parity bits for the long FECBLOCK, is as follows.

1) Initialize the parity bits.

$$p_0=p_1=p_2=\ldots=p_{N_{ldpc}-K_{ldpc}-1}=0 \quad \text{[Equation 3]}$$

2) Accumulate a first information bit—$i_0$, at a parity bit address specified in a first row of addresses of a parity check matrix. Details of the addresses of the parity check matrix will be described later. For example, for the rate of 13/15, $$p_{983}=p_{983}\oplus i_0$$

$$p_{2815}=p_{2815}\oplus i_0$$

$$p_{4837}=p_{4837}\oplus i_0$$

$$p_{4989}=p_{4989}\oplus i_0$$

$$p_{6138}=p_{6138}\oplus i_0$$

$$p_{6458}=p_{6458}\oplus i_0$$

$$p_{6921}=p_{6921}\oplus i_0$$

$p_{6974}=p_{6974}\oplus i_0$ $p_{7572}=p_{7572}\oplus i_0$ $p_{8260}=p_{8260}\oplus i_0$ $p_{8496}=p_{8496}\oplus i_0$ [Equation 4]

3) For the next 359 information bits, $i_s$, s=1, 2, . . . , 359, accumulate $i_s$ at parity bit addresses using following Equation.

$$\{x+(s \bmod 360)\times Q_{ldpc}\} \bmod (N_{ldpc}-K_{ldpc}) \quad \text{[Equation 5]}$$

Here, x denotes an address of a parity bit accumulator corresponding to a first bit $i_0$, and $Q_{ldpc}$ is a code rate dependent constant specified in the addresses of the parity check matrix. Continuing with the example, $Q_{ldpc}$=24 for the rate of 13/15, so for an information bit $i_1$, the following operations are performed.

$p_{1007}=p_{1007}\oplus i_1$ $p_{2839}=p_{2839}\oplus i_1$ $p_{4861}=p_{4861}\oplus i_1$ $p_{5013}=p_{5013}\oplus i_1$ $p_{6162}=p_{6162}\oplus i_1$ $p_{6482}=p_{6482}\oplus i_1$ $p_{6945}=p_{6945}\oplus i_1$ $p_{6998}=p_{6998}\oplus i_1$ $p_{7596}=p_{7596}\oplus i_1$ $p_{8284}=p_{8284}\oplus i_1$ $p_{8520}=p_{8520}\oplus i_1$ [Equation 6]

4) For a 361th information bit $i_{360}$, an address of the parity bit accumulator is given in a second row of the addresses of the parity check matrix. In a similar manner, addresses of the parity bit accumulator for the following 359 information bits $i_s$, s=361, 362, . . . , 719 are obtained using Equation 6, where x denotes an address of the parity bit accumulator corresponding to the information bit $i_{360}$, i.e., an entry in the second row of the addresses of the parity check matrix.

5) In a similar manner, for every group of 360 new information bits, a new row from the addresses of the parity check matrix is used to find the address of the parity bit accumulator.

After all of the information bits are exhausted, a final parity bit is obtained as below.

6) Sequentially perform the following operations starting with i=1.

$$p_i=p_i\oplus p_{i-1}, i=1,2, \ldots, N_{ldpc}-K_{ldpc}-1 \quad \text{[Equation 7]}$$

Here, final content of $p_i$ (i=0, 1, . . . , $N_{ldpc}-K_{ldpc}-1$) is equal to a parity bit $p_i$.

TABLE 24

| Code rate | $Q_{ldpc}$ |
|---|---|
| 5/15 | 120 |
| 6/15 | 108 |
| 7/15 | 96 |
| 8/15 | 84 |
| 9/15 | 72 |

TABLE 24-continued

| Code rate | $Q_{ldpc}$ |
|---|---|
| 10/15 | 60 |
| 11/15 | 48 |
| 12/15 | 36 |
| 13/15 | 24 |

This LDPC encoding procedure for the short FECBLOCK is in accordance with t LDPC encoding procedure for the long FECBLOCK, except that Table 24 is replaced with Table 25, and the addresses of the parity check matrix for the long FECBLOCK are replaced with the addresses of the parity check matrix for the short FECBLOCK.

TABLE 25

| Code rate | $Q_{ldpc}$ |
|---|---|
| 5/15 | 30 |
| 6/15 | 27 |
| 7/15 | 24 |
| 8/15 | 21 |
| 9/15 | 18 |
| 10/15 | 15 |
| 11/15 | 12 |
| 12/15 | 9 |
| 13/15 | 6 |

Figure 29:
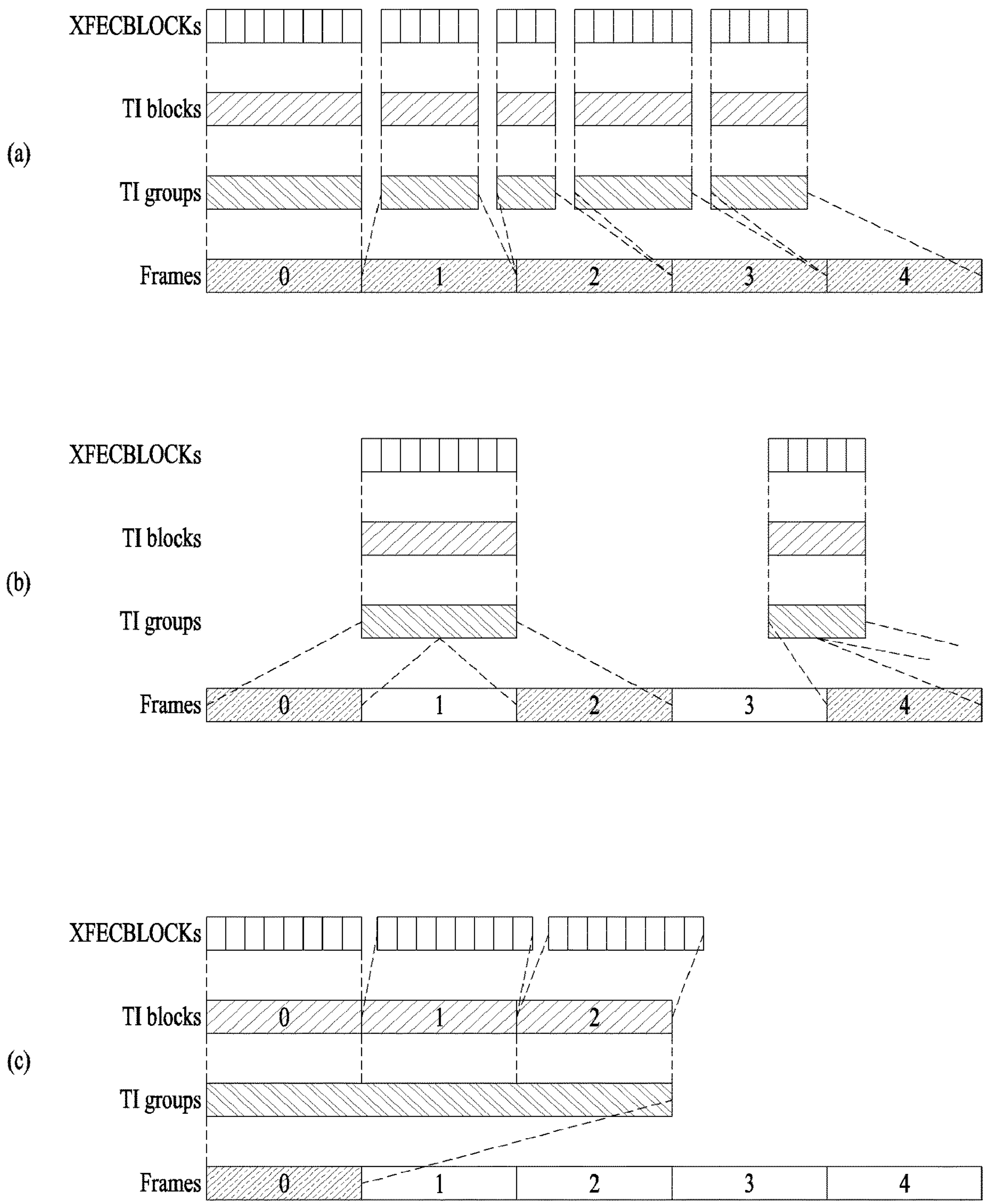
FIG. 29 illustrates time interleaving according to an embodiment of the present invention.

FIG. 29 illustrates time interleaving according to an embodiment of the present invention.

(a) to (c) show examples of a TI mode.

A time interleaver operates at the DP level. Parameters of time interleaving (TI) may be set differently for each DP.

The following parameters, which appear in part of the PLS2-STAT data, configure the TI.

DP_TI_TYPE (allowed values: 0 or 1): This parameter represents the TI mode.

The value of '0' indicates a mode with multiple TI blocks (more than one TI block) per TI group. In this case, one TI group is directly mapped to one frame (no inter-frame interleaving). The value of '1' indicates a mode with only one TI block per TI group. In this case, the TI block may be spread over more than one frame (inter-frame interleaving).

DP_TI_LENGTH: If DP_TI_TYPE='0', this parameter is the number of TI blocks $N_{TI}$ per TI group. For DP_TI_TYPE='1', this parameter is the number of frames $P_I$ spread from one TI group.

DP_NUM_BLOCK_MAX (allowed values: 0 to 1023): This parameter represents the maximum number of XFECBLOCKs per TI group.

DP_FRAME_INTERVAL (allowed values: 1, 2, 4, and 8): This parameter represents the number of the frames $I_{JUMP}$ between two successive frames carrying the same DP of a given PHY profile.

DP_TI_BYPASS (allowed values: 0 or 1): If time interleaving is not used for a DP, this parameter is set to '1'. This parameter is set to '0' if time interleaving is used.

Additionally, the parameter DP_NUM_BLOCK from the PLS2-DYN data is used to represent the number of XFECBLOCKs carried by one TI group of the DP.

When time interleaving is not used for a DP, the following TI group, time interleaving operation, and TI mode are not considered. However, the delay compensation block for the dynamic configuration information from the scheduler may still be required. In each DP, the XFECBLOCKs received from SSD/MIMO encoding are grouped into TI groups.

That is, each TI group is a set of an integer number of XFECBLOCKs and contains a dynamically variable number of XFECBLOCKs. The number of XFECBLOCKs in the TI group of index n is denoted by $N_{xBLOCK\_Group}(n)$ and is signaled as DP_NUM_BLOCK in the PLS2-DYN data. Note that $N_{xBLOCK\_Group}(n)$ may vary from a minimum value of 0 to a maximum value of $N_{xBLOCK\_Group\_MAX}$ (corresponding to DP_NUM_BLOCK_MAX), the largest value of which is 1023.

Each TI group is either mapped directly to one frame or spread over $P_I$ frames.

Each TI group is also divided into more than one TI block ($N_{TI}$), where each TI block corresponds to one usage of a time interleaver memory. The TI blocks within the TI group may contain slightly different numbers of XFECBLOCKs. If the TI group is divided into multiple TI blocks, the TI group is directly mapped to only one frame. There are three options for time interleaving (except an extra option of skipping time interleaving) as shown in the following Table 26.

TABLE 26

| Modes | Descriptions |
|---|---|
| Option 1 | Each TI group contains one TI block and is mapped directly to one frame as shown in (a). This option is signaled in PLS2-STAT by DP__TI__TYPE = '0' and DP__TI__LENGTH = '1' ($N_{TI}$ = 1). |
| Option 2 | Each TI group contains one TI block and is mapped to more than one frame. (b) shows an example, where one TI group is mapped to two frames, i.e., DP__TI__LENGTH = '2' ($P_I$ = 2) and DP__FRAME__INTERVAL ($I_{JUMP}$ = 2). This provides greater time diversity for low data-rate services. This option is signaled in PLS2-STAT by DP__TI__TYPE = '1'. |
| Option 3 | Each TI group is divided into multiple TI blocks and is mapped directly to one frame as shown in (c). Each TI block may use a full TI memory so as to provide a maximum bit-rate for a DP. This option is signaled in PLS2-STAT by DP__TI__TYPE = '0' and DP__TI__LENGTH = $N_{TI}$, while $P_I$ = 1. |

Typically, the time interleaver may also function as a buffer for DP data prior to a process of frame building. This is achieved by means of two memory banks for each DP. A first TI block is written to a first bank. A second TI block is written to a second bank while the first bank is being read from and so on.

The TI is a twisted row-column block interleaver. For an $s^{th}$ TI block of an $n^{th}$ TI group, the number of rows $N_r$ of a TI memory is equal to the number of cells $N_{cells}$, i.e., $N_r=N_{cells}$ while the number of columns $N_0$ is equal to the number $N_{xBLOCK\_TI}(n,s)$.

Figure 30:
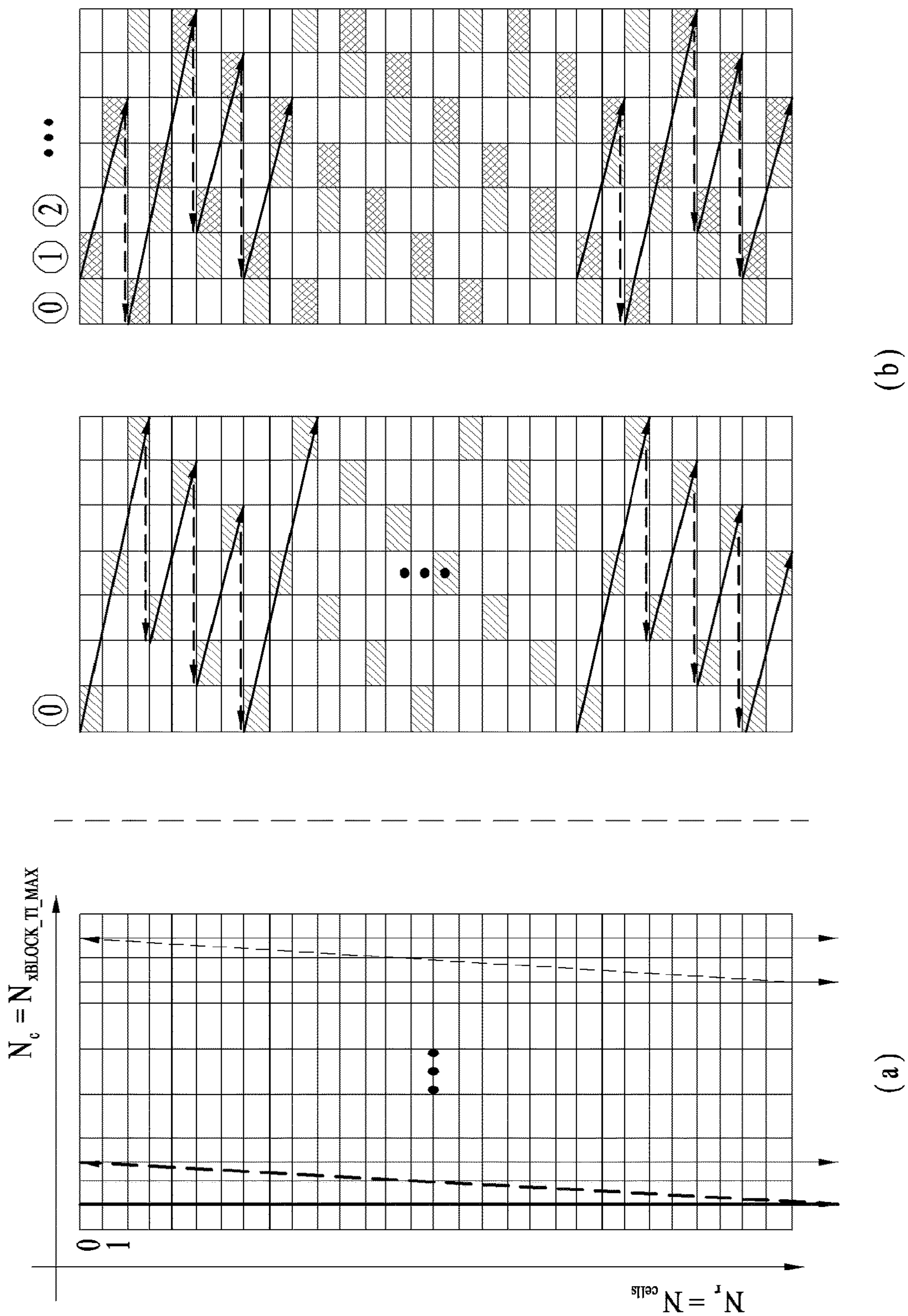
FIG. 30 illustrates a basic operation of a twisted row-column block interleaver according to an embodiment of the present invention.

FIG. 30 illustrates a basic operation of a twisted row-column block interleaver according to an embodiment of the present invention.

FIG. 30(*a*) shows a write operation in the time interleaver and FIG. 30(*b*) shows a read operation in the time interleaver. A first XFECBLOCK is written column-wise into a first column of a TI memory, and a second XFECBLOCK is written into a next column, and so on as shown in (a). Then, in an interleaving array, cells are read diagonal-wise. During diagonal-wise reading from a first row (rightwards along a row beginning with a left-most column) to a last row, $N_r$ cells are read out as shown in (b). In detail, assuming $z_{n,s,i}(i=0, \ldots, N_rN_c)$ as a TI memory cell position to be read sequentially, a reading process in such an interleaving array is performed by calculating a row index $R_{n,s,i}$, a column index $C_{n,s,i}$, and an associated twisting parameter $T_{n,s,i}$ as in the following Equation.

[Equation 8]

$$\text{GENERATE}(R_{n,s,i}, C_{n,s,i}) = \{ R_{n,s,i} = \text{mod}(i, N_r),\ T_{n,s,i} = \text{mod}(S_{shift} \times R_{n,s,i}, N_c),\ C_{n,s,i} = \text{mod}\left(T_{n,s,i} + \left\lfloor \frac{i}{N_r} \right\rfloor, N_c\right) \}$$

Here, $S_{shift}$ is a common shift value for a diagonal-wise reading process regardless of $N_{xBLOCK\_TI}(n,s)$, and the shift value is determined by $N_{xBLOCK\_TI\_MAX}$ given in PLS2-STAT as in the following Equation.

[Equation 9]

$$\text{for } \begin{cases} N'_{xBLOCK\_TI\_MAX} = N_{xBLOCK\_TI\_MAX} + 1, & \text{if } N_{xBLOCK\_TI\_MAX} \bmod 2 = 0 \\ N'_{xBLOCK\_TI\_MAX} = N_{xBLOCK\_TI\_MAX}, & \text{if } N_{xBLOCK\_TI\_MAX} \bmod 2 = 1 \end{cases},\quad S_{shift} = \frac{N'_{xBLOCK\_TI\_MAX} - 1}{2}$$

As a result, cell positions to be read are calculated by coordinates $z_{n,s,i}=N_rC_{n,s,i}+R_{n,s,i}$.

Figure 31:
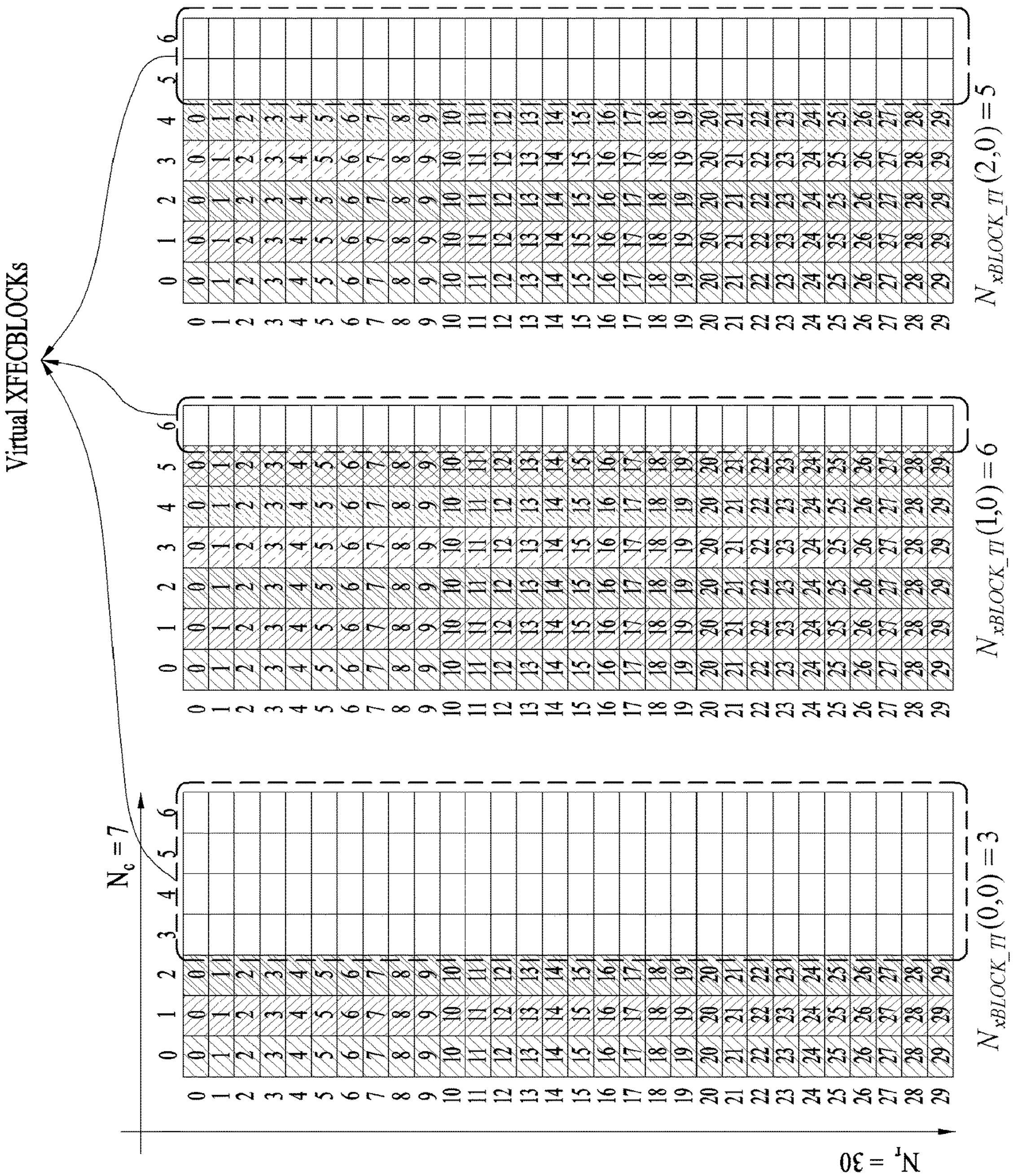
FIG. 31 illustrates an operation of a twisted row-column block interleaver according to another embodiment of the present invention.

FIG. 31 illustrates an operation of a twisted row-column block interleaver according to another embodiment of the present invention.

More specifically, FIG. 31 illustrates an interleaving array in a TI memory for each TI group, including virtual XFECBLOCKs when $N_{xBLOCK\_TI}(0,0)=3$, $N_{xBLOCK\_TI}(1,0)=6$, and $N_{xBLOCK\_TI}(2,0)=5$.

A variable number $N_{xBLOCK\_TI}(n,s)=N_r$ may be less than or equal to $N'_{xBLOCK\_TI\_MAX}$. Thus, in order to achieve single-memory deinterleaving at a receiver side regardless of $N_{xBLOCK\_TI}(n,s)$, the interleaving array for use in the twisted row-column block interleaver is set to a size of $N_r \times N_c = N_{cells} \times N'_{xBLOCK\_TI\_MAX}$ by inserting the virtual XFECBLOCKs into the TI memory and a reading process is accomplished as in the following Equation.

[Equation 10]

$$\begin{aligned} &p = 0; \\ &\text{for } i = 0;\ i < N_{cells}N'_{xBLOCK\_TI\_MAX};\ i = i + 1 \\ &\{\text{GENERATE}(R_{n,s,i}, C_{n,s,i}); \\ &V_i = N_rC_{n,s,j} + R_{n,s,j} \\ &\quad \text{if } V_i < N_{cells}N_{xBLOCK\_TI}(n, s) \\ &\quad \{ \\ &\quad\quad Z_{n,s,p} = V_i;\ p = p + 1; \\ &\quad\} \\ &\} \end{aligned}$$

The number of TI groups is set to 3. An option of the time interleaver is signaled in the PLS2-STAT data by DP_TI_TYPE='0', DP_FRAME_INTERVAL='1', and DP_TI_LENGTH='1', i.e., NTI=1, IJUMP=1, and PI=1. The number of XFECBLOCKs, each of which has Ncells=30 cells, per TI group is signaled in the PLS2-DYN data by NxBLOCK_TI(0,0)=3, NxBLOCK_TI(1,0)=6, and NxBLOCK_TI(2,0)=5, respectively. A maximum number of XFECBLOCKs is signaled in the PLS2-STAT data by NxBLOCK_Group_MAX, which leads to $\lfloor N_{xBLOCK\_Group\_MAX}/N_{TI} \rfloor = N_{xBLOCK\_TI\_MAX} = 6$.

The purpose of the Frequency Interleaver, which operates on data corresponding to a single OFDM symbol, is to provide frequency diversity by randomly interleaving data cells received from the frame builder. In order to get maximum interleaving gain in a single frame, a different interleaving-sequence is used for every OFDM symbol pair comprised of two sequential OFDM symbols.

Therefore, the frequency interleaver according to the present embodiment may include an interleaving address generator for generating an interleaving address for applying corresponding data to a symbol pair.

Figure 32:
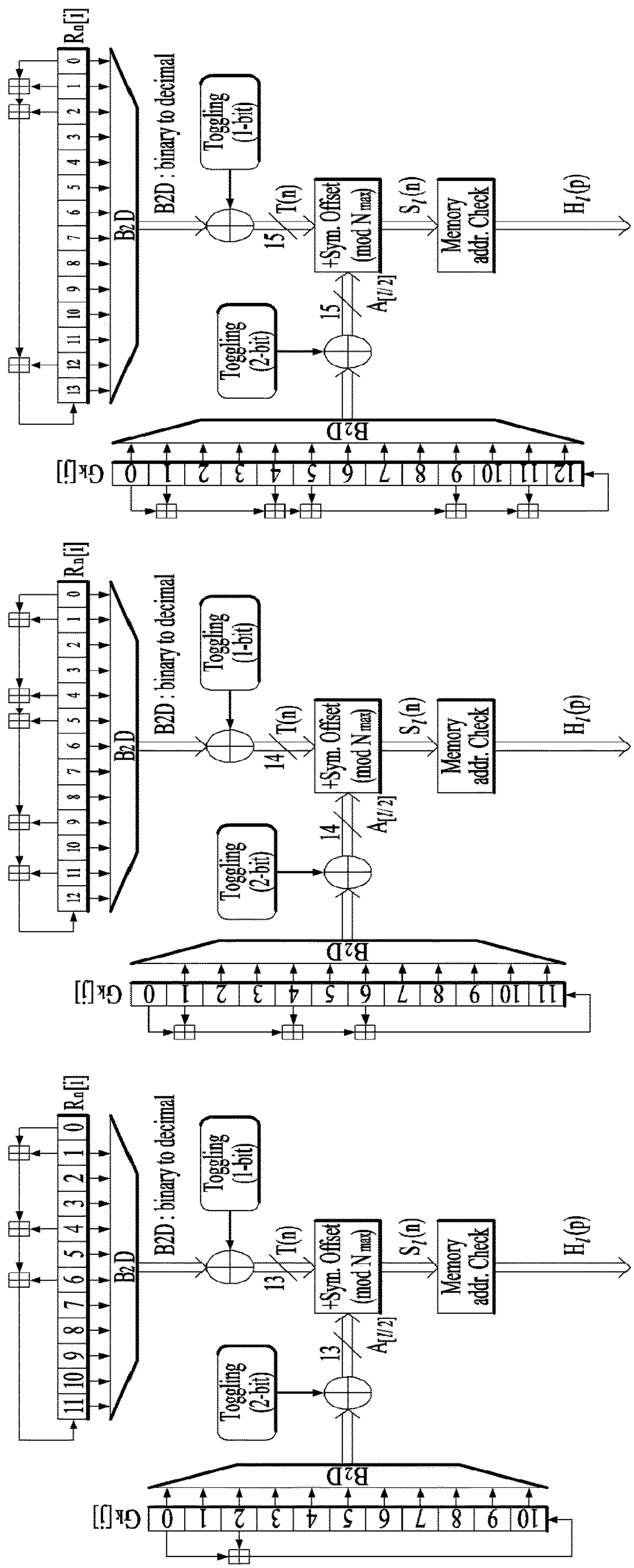
FIG. 32 is a block diagram illustrating an interleaving address generator including a main pseudo-random binary sequence (PRBS) generator and a sub-PRBS generator according to each FFT mode according to an embodiment of the present invention.

FIG. 32 illustrates an interleaving address generator including a main pseudo-random binary sequence (PRBS) generator and a sub-PRBS generator according to each FFT mode according to an embodiment of the present invention.

(a) shows the block diagrams of the interleaving-address generator for 8K FFT mode, (b) shows the block diagrams of the interleaving-address generator for 16K FFT mode and (c) shows the block diagrams of the interleaving-address generator for 32K FFT mode.

The interleaving process for the OFDM symbol pair is described as follows, exploiting a single interleaving-sequence. First, available data cells (the output cells from the Cell Mapper) to be interleaved in one OFDM symbol $O_{m,l}$ is defined as $O_{m,l}=[x_{m,l,0}, \ldots, x_{m,l,p}, \ldots, x_{m,l,N_{data}-1}]$ for $l=0, \ldots, N_{sym}-1$, where $x_{m,l,p}$ is the $p^{th}$ cell of the $l^{th}$ OFDM symbol in the $m^{th}$ frame and $N_{data}$ is the number of data cells: $N_{data}=C_{FSS}$ for the frame signaling symbol(s), $N_{data}=C_{data}$ for the normal data, and $N_{data}=C_{FES}$ for the frame edge symbol. In addition, the interleaved data cells are defined as $P_{m,l}=[v_{m,l,0}, \ldots, v_{m,1,N_{data}-1}]$ for $l=0, \ldots, N_{sym}-1$. For the OFDM symbol pair, the interleaved OFDM symbol pair is given by $v_{m,l,H_l(p)}=x_{m,l,p}$, $p=0, \ldots, N_{data}-1$, for the first OFDM symbol of each pair $v_{m,l,p}(p)=x_{m,l,H_i(p)}$, $p=0, \ldots, N_{data}-1$, for the second OFDM symbol of each pair, where $H_l(p)$ is the interleaving address generated by a PRBS generator.

FIG. 33 illustrates a main PRBS used for all FFT modes according to an embodiment of the present invention.

(a) illustrates the main PRBS, and (b) illustrates a parameter Nmax for each FFT mode.

FIG. 34 illustrates a sub-PRBS used for FFT modes and an interleaving address for frequency interleaving according to an embodiment of the present invention.

(a) illustrates a sub-PRBS generator, and (b) illustrates an interleaving address for frequency interleaving. A cyclic shift value according to an embodiment of the present invention may be referred to as a symbol offset.

Figure 35:
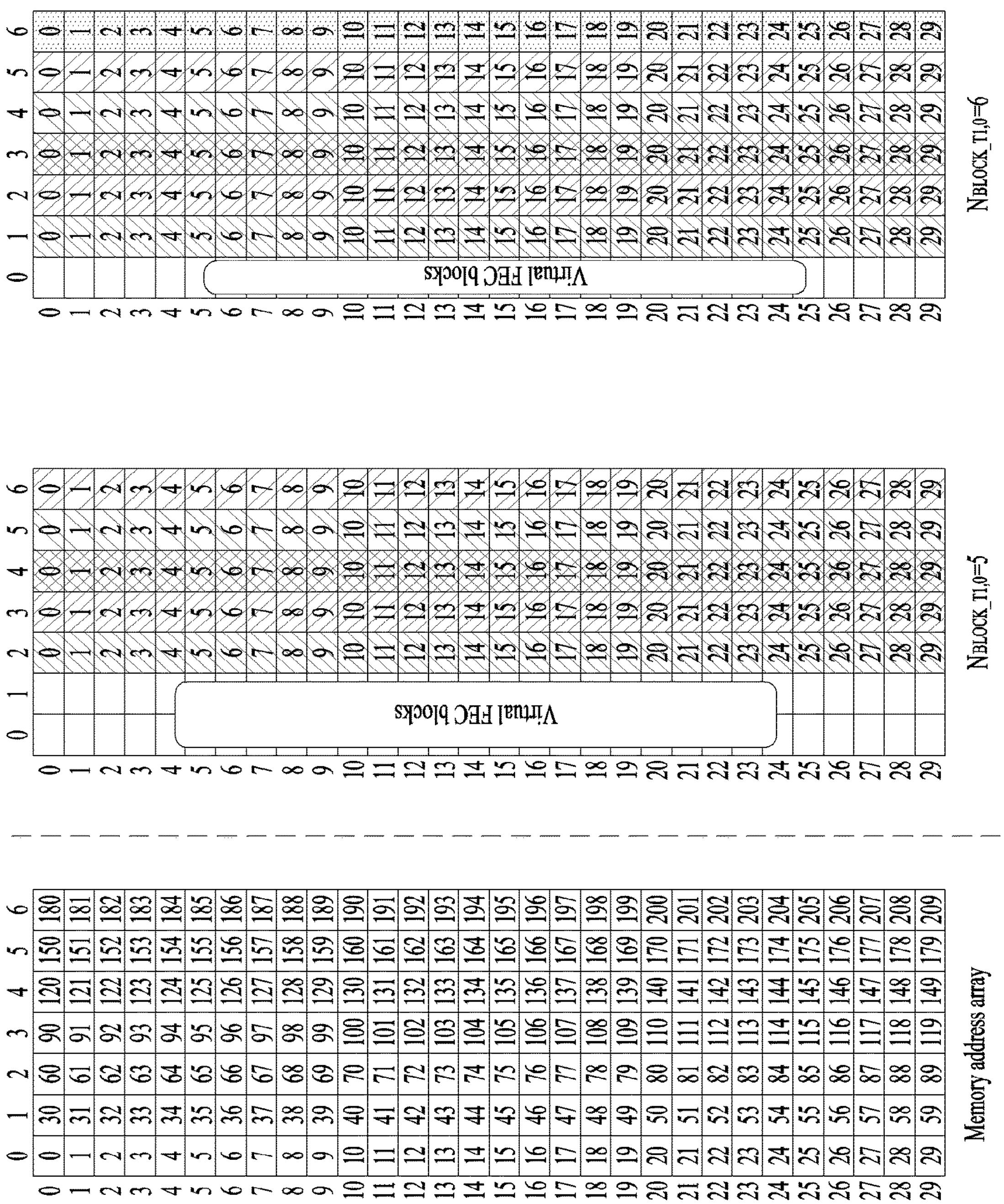
FIG. 35 illustrates a write operation of a time interleaver according to an embodiment of the present invention.

FIG. 35 illustrates a write operation of a time interleaver according to an embodiment of the present invention.

FIG. 35 illustrates a write operation for two TI groups.

A left block in the figure illustrates a TI memory address array, and right blocks in the figure illustrate a write operation when two virtual FEC blocks and one virtual FEC block are inserted into heads of two contiguous TI groups, respectively.

Hereinafter, description will be given of a configuration of a time interleaver and a time interleaving method using both a convolutional interleaver (CI) and a block interleaver (BI) or selectively using either the CI or the BI according to a physical layer pipe (PLP) mode.

A PLP according to an embodiment of the present invention is a physical path corresponding to the same concept as that of the above-described DP, and a name of the PLP may be changed by a designer.

A PLP mode according to an embodiment of the present invention may include a single PLP mode or a multi-PLP mode according to the number of PLPs processed by a broadcast signal transmitter or a broadcast signal transmission apparatus. The single PLP mode corresponds to a case in which one PLP is processed by the broadcast signal transmission apparatus. The single PLP mode may be referred to as a single PLP.

The multi-PLP mode corresponds to a case in which one or more PLPs are processed by the broadcast signal transmission apparatus. The multi-PLP mode may be referred to as multiple PLPs.

In the present invention, time interleaving in which different time interleaving schemes are applied according to PLP modes may be referred to as hybrid time interleaving. Hybrid time interleaving according to an embodiment of the present invention is applied for each PLP (or at each PLP level) in the multi-PLP mode.

FIG. 36 illustrates an interleaving type applied according to the number of PLPs in a table.

In a time interleaving according to an embodiment of the present invention, an interleaving type may be determined based on a value of PLP_NUM. PLP_NUM is a signaling field indicating a PLP mode. When PLP_NUM has a value of 1, the PLP mode corresponds to a single PLP. The single PLP according to the present embodiment may be applied only to a CI.

When PLP_NUM has a value greater than 1, the PLP mode corresponds to multiple PLPs. The multiple PLPs according to the present embodiment may be applied to the CI and a BI. In this case, the CI may perform inter-frame interleaving, and the BI may perform intra-frame interleaving.

FIG. 37 is a block diagram including a first example of a structure of a hybrid time interleaver described above.

The hybrid time interleaver according to the first example may include a BI and a CI. The time interleaver of the present invention may be positioned between a BICM chain block and a frame builder.

The BICM chain block illustrated in FIGS. 37 and 38 may include the blocks in the processing block 5000 of the BICM block illustrated in FIG. 19 except for the time interleaver 5050. The frame builder illustrated in FIGS. 37 and 38 may perform the same function as that of the frame building block 1020 of FIG. 18.

As described in the foregoing, it is possible to determine whether to apply the BI according to the first example of the structure of the hybrid time interleaver depending on values of PLP_NUM. That is, when PLP_NUM=1, the BI is not applied (BI is turned OFF) and only the CI is applied. When PLP_NUM>1, both the BI and the CI may be applied (BI is turned ON). A structure and an operation of the CI applied when PLP_NUM>1 may be the same as or similar to a structure and an operation of the CI applied when PLP_NUM=1.

FIG. 38 is a block diagram including a second example of the structure of the hybrid time interleaver described above.

An operation of each block included in the second example of the structure of the hybrid time interleaver is the same as the above description in FIG. 20. It is possible to determine whether to apply a BI according to the second example of the structure of the hybrid time interleaver depending on values of PLP_NUM. Each block of the hybrid time interleaver according to the second example may perform operations according to embodiments of the present invention. In this instance, an applied structure and operation of a CI may be different between a case of PLP_NUM=1 and a case of PLP_NUM>1.

Figure 39:
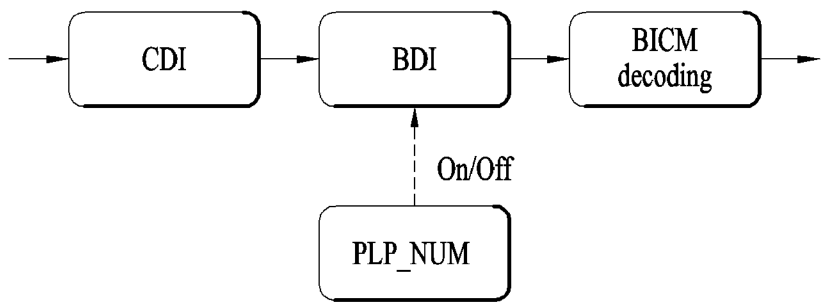
FIG. 39 is a block diagram including a first example of a structure of a hybrid time deinterleaver.

FIG. 39 is a block diagram including a first example of a structure of a hybrid time deinterleaver.

The hybrid time deinterleaver according to the first example may perform an operation corresponding to a reverse operation of the hybrid time interleaver according to the first example described above. Therefore, the hybrid time deinterleaver according to the first example of FIG. 39 may include a convolutional deinterleaver (CDI) and a block deinterleaver (BDI).

A structure and an operation of the CDI applied when PLP_NUM>1 may be the same as or similar to a structure and an operation of the CDI applied when PLP_NUM=1.

It is possible to determine whether to apply the BDI according to the first example of the structure of the hybrid time deinterleaver depending on values of PLP_NUM. That is, when PLP_NUM=1, the BDI is not applied (BDI is turned OFF) and only the CDI is applied.

The CDI of the hybrid time deinterleaver may perform inter-frame deinterleaving, and the BDEI may perform intra-frame deinterleaving. Details of inter-frame deinterleaving and intra-frame deinterleaving are the same as the above description.

Figure 40:
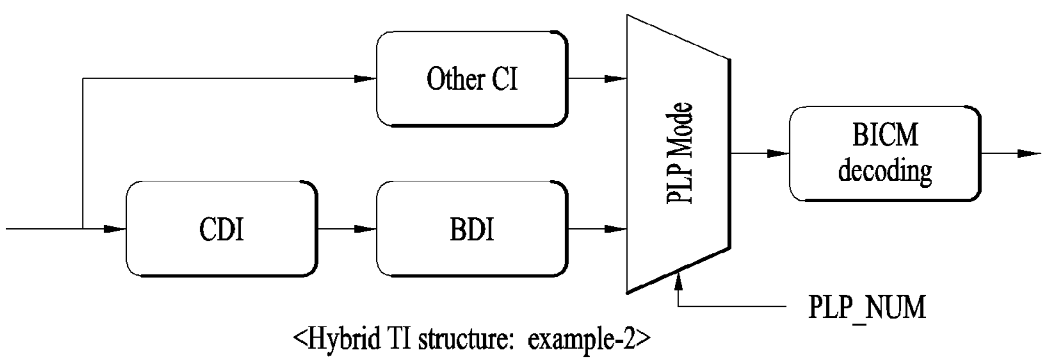
FIG. 40 is a block diagram including a second example of the structure of the hybrid time deinterleaver.

A BICM decoding block illustrated in FIGS. 39 and 40 may perform a reverse operation of the BICM chain block of FIGS. 37 and 38.

FIG. 40 is a block diagram including a second example of the structure of the hybrid time deinterleaver.

The hybrid time deinterleaver according to the second example may perform an operation corresponding to a reverse operation of the hybrid time interleaver according to the second example described above. An operation of each block included in the second example of the structure of the hybrid time deinterleaver may be the same as the above description in FIG. 39.

It is possible to determine whether to apply a BDI according to the second example of the structure of the hybrid time deinterleaver depending on values of PLP_NUM. Each block of the hybrid time deinterleaver according to the second example may perform operations according to embodiments of the present invention. In this instance, an applied structure and operation of a CDI may be different between a case of PLP_NUM=1 and a case of PLP_NUM>1.

Figure 41:
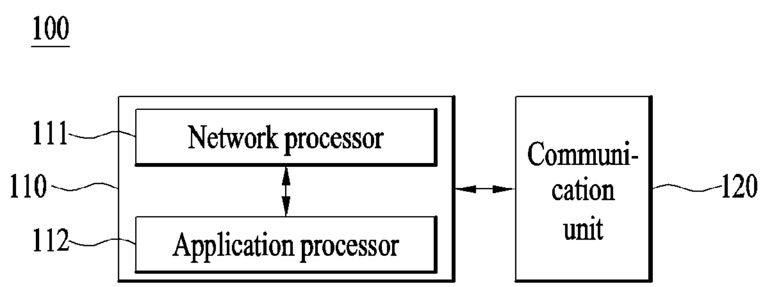
FIG. 41 is a block diagram of an electronic device according to an embodiment of the present invention.

FIG. 41 is a block diagram of an electronic device according to an embodiment of the present invention.

Referring to FIG. 41, the electronic device 100 includes a controller 110 and a communication unit 120. The controller 110 may establish a communication linkage with a companion device. In addition, when the communication linkage with the companion device is established, the communication unit 120 may exchange data with the companion device.

In addition, the controller 110 may include a network processor 111 and an application processor 112. The application processor 112 may request connection with the companion device from the network processor 111.

The network processor 111 may place the connection request received from the application processor 112 in a standby state since the network processor 111 has not been connected with the companion device. Thereafter, the network processor 111 may receive a connection request from the companion device. The network processor 111 may search for a matching connection request from the application processor 112 based on information received from the companion device. Upon finding the matching connection request, the network processor 111 may connect the companion device to the application processor 112.

As an example, the application processor 112 may correspond to an application module or an application browser. Alternatively, the application processor 112 may correspond to an HbbTV application. As an example, the network processor 111 may be implemented as a network module. Alternatively, the network processor 111 may correspond to a WebSocket server. The network processor 111 may interconnect the application processor 112 and the companion device. As an example, when the network processor 111 is implemented as the WebSocket server, each of the application processor 112 and the companion device may be regarded as one client. In other words, the WebSocket server may connect a first client and a second client. Alternatively, each of the first client and the second client may be referred to as a peer. Depending on cases, the WebSocket server may be implemented as a separate device outside the electronic device.

Meanwhile, the application processor 112 may operate one application. In addition, the companion device may operate one application. The application processor 112 may be connected to the companion device through the network processor 111. The companion device may receive data from the application processor 112 and receive and drive an application which is being driven by the application processor 112. Alternatively, each of the application processor 112 and the companion device may drive an application. The application processor 112 may be connected to the companion device to exchange data with the companion device. In this case, the electronic device 100 and the companion device may be considered to perform inter-application communication.

The WebSocket server may be used as a repeater and may generate a communication channel between applications. The generated communication channel may enable the electronic device 100 and the companion device to communicate with each other.

The WebSocket server may connect a channel between applications requesting the same information using a name ID and an origin ID of an application desiring to perform communication to generate a communication channel. For example, the above-described method may connect an application (client) and an application (client) without correcting a WebSocket API in HbbTV 2.0.

In this specification, respective terms are interchangeable.

Figure 42:
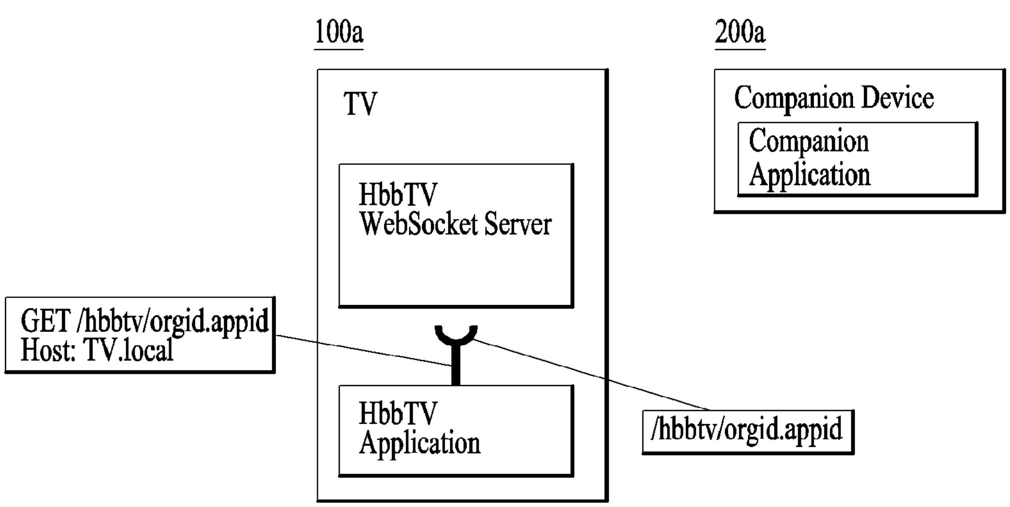
FIG. 42 is a diagram for description of connection of a first client according to an embodiment of the present invention.

FIG. 42 is a diagram for description of connection of a first client according to an embodiment of the present invention.

FIG. 42 illustrates an electronic device 100*a* and a companion device 200*a*. The electronic device 100*a* may include an application processor and a network processor. As an example, the application processor may correspond to an HbbTV application or a first application, and the network processor may correspond to an HbbTV WebSocket server. The companion device 200*a* may include a companion device processor. As an example, the companion device processor may correspond to a companion application or a second client.

The WebSocket server may need to be changed to connect the clients. Hereinafter, an operation related to change of the WebSocket server will be described. The changed WebSocket server may be driven in HbbTV 2.0 TV.

Usually, a WebSocket client specifies the remote host to which it wishes to establish a connection, and the relative URI for the desired service on that host in the initial GET request along with the WebSocket connection upgrade header. In HbbTV, however, it cannot be assumed that, the peer with which communications are to be established, has contacted the WebSocket server yet. A connection request from a client in the special client-to-client mode, hence needs to be kept active until another, suitable peer arrives.

To achieve this, we define special uses for two fields of the WebSocket protocol upgrade GET request. The Request-URI—which is part of the Request-Line—takes a predefined format with a common prefix string. This field is used to match corresponding communication peers. The Host request-header field may either refer to the TV set running the WebSocket server (in which case communications with any peer with a matching Request-URI will be established), or to a specific companion device (in which case communications only with the designated device, and with a matching Request-URI will be established).

The format for the Request-URI field may be according to the following ABNF grammar:

HbbTV-Request-URI="/hbbtv/" org-id "." app-id org-id=8HEX app-id=4HEX

In response to such a request, an HbbTV WebSocket server may create a stream head, that is a half open connection, which is associated with the Request-URI supplied in the upgrade GET request by the client. The server may not respond immediately with a WebSocket Protocol Handshake response, but instead wait for other peers to appear, and thereby keep the first client waiting. If the server wishes to implement a time-out, it may respond with a 504 Gateway Timeout response.

Clients may not use the Sec-WebSocket-Protocol header when requesting client-to-client connections. Servers may ignore the Sec-WebSocket-Protocol header in requests for client-to-client connections. Servers may respond with a 403 Forbidden response if the Host header field in a client-to-client connection request does not specify a device on any of the local sub-networks that the server is attached to. All HbbTV 2.0 WebSocket clients may use the method described in this section to request client-to-client connections from HbbTV 2.0 WebSocket servers.

Figure 43:
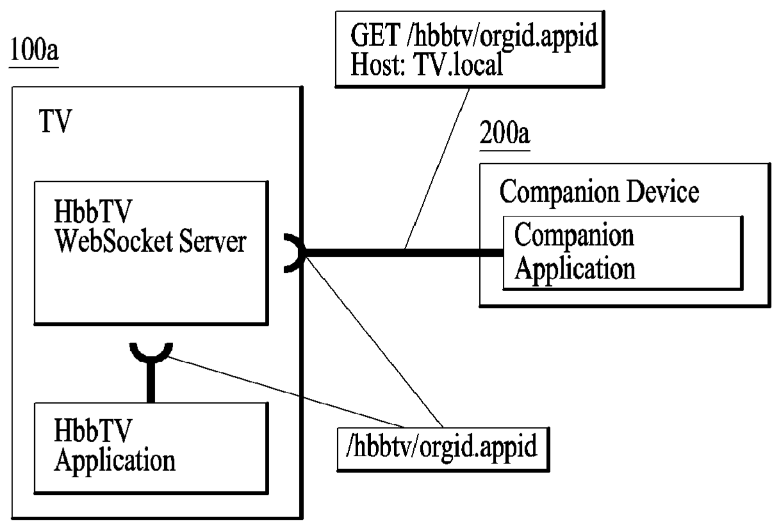
FIG. 43 is a diagram for description of connection of a second client according to an embodiment of the present invention.

FIG. 43 is a diagram for description of connection of a second client according to an embodiment of the present invention.

FIG. 43 illustrates an electronic device 100*a* and a companion device 200*a*. The electronic device 100*a* may include an application processor and a network processor. The network processor (for example, a WebSocket server) may receive a connection request from an HbbTV application and a companion application.

When another client requests a client-to-client connection using the method as above, the server may also create a stream head for that new request as shown in FIG. 3.

After a new stream head is created, the server may search the collection of stream heads currently waiting to be connected, for Request-URI and Host header field values matching those of the newly created stream head. If no match is found, the server may add the newly created stream head to the collection of stream heads currently waiting to be connected, and may keep waiting for further client-to-client connection requests.

Figure 44:
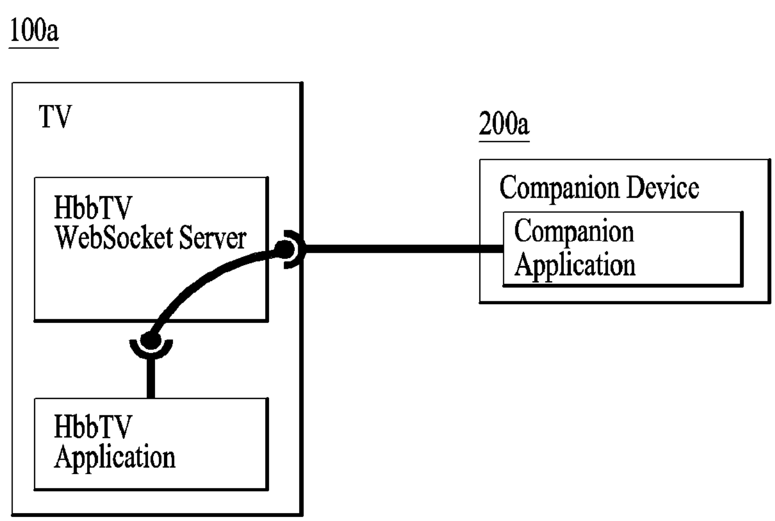
FIG. 44 is a diagram for description of connection between the first and second clients according to an embodiment of the present invention.

FIG. 44 is a diagram for description of connection between the first and second clients according to an embodiment of the present invention.

FIG. 44 illustrates an electronic device 100*a* and a companion device 200*a*. The electronic device 100*a* may include an application processor and a network processor. The network processor (for example, a WebSocket server) may connect an HbbTV application and a companion application.

If a newly created stream head is associated with the same Request-URI and Host header field values as a stream head in the collection of stream heads currently waiting to be connected, the server may remove the matching stream head from the collection, and may establish a full-duplex communications channel between the two stream heads.

Once the two stream heads are connected, the server outputs all data received from one stream head immediately and without alteration to the respective other stream head.

Thereby, a transparent communications channel is established between the two clients.

If one of the two clients sends a Close frame, the server may send a corresponding Close frame to the other client. If one of the two clients disconnects without sending a Close frame, the server may generate a Close frame, and may send the same to the other client.

In other words, the network processor may generate a stream head of the application processor and include the stream head in a stream head group in response to a connection request from the application processor. In addition, in response to a connection request from the companion device, the network processor may generate a stream head of the companion device and verify whether a matching stream head is present. When the matching stream head is present, the network processor may connect a stream head of the application processor and a stream head of the companion device matching from the stream head group.

In this instance, the network processor may remove the matching stream head of the application processor or the matching stream head of the companion device from the stream head group.

Figure 45:
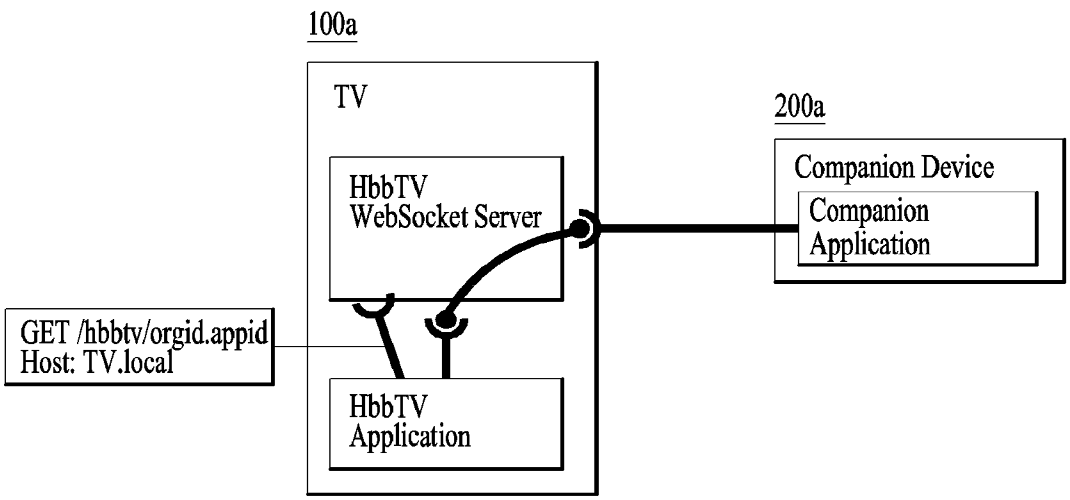
FIG. 45 is a diagram for description of an additional connection request according to an embodiment of the present invention.

FIG. 45 is a diagram for description of an additional connection request according to an embodiment of the present invention.

Referring to FIG. 45, an HbbTV application (client) is connected to a companion application (client) of a companion device 200*a*. In addition, the HbbTV application may generate another stream head for another client. The HbbTV application may be additionally connected to another application. Any stream head be removed from the collection of stream heads available for connecting, prior to establishing a client-to-client connection, such client-to-client connections are one-to-one only. If a client wishes to communicate with more than one other client, it may issue further connection requests to the server until the maximum number of client-to-client connections it is able to process, has been reached.

WebSocket servers may not allow more than one stream head for the same client with the same Request-URI and Host to be on the collection of stream heads currently waiting to be connected. If a client issues another client-to-client connection request with the same Request-URI and Host, before the previous one has been successfully connected or has timed-out, the server may respond with a 403 Forbidden response.

Clients may have several client-to-client connection requests with different Request-URI/Host combinations in the waiting to be connected state. Clients may not attempt to request another client-to-client connection with the same Request-URI/Host combination, before the previous one was either successfully connected or has timed-out.

An "/hbbtv/orgid.appid scheme" for the Request-URI may be used as an escape into the special server client-to-client behavior in order to allow it to be implemented along with other, standard WebSocket server functionalities, and without interfering with the same.

The choice of matching the Request-URI and Host header field allows for two approaches: if a specific device is targeted by the Host header, the client only wishes to talk to that specific other client. It may have learnt about its existence through other means (e.g. SSDP as part of UPnP). Secondly, if the Host header field targets the server, it will be the same for all clients targeting the same server. This will result in only the Request-URI being the discriminating factor for choosing suitable communication peers. Hence, targeting the server in the Host header field effectively provides a wildcard match with any other client using the same Request-URI and also targeting the server. As such, both dedicated and opportunistic connection establishment strategies are possible.

Since the HbbTV 2.0 WebSocket server does not perform any authentication, authorization, or other verification, no trust can be associated with client-to-client connections, or between clients and WebSocket servers. Clients that wish to exchange private, or otherwise sensitive information through a WebSocket server should therefore employ end-to-end encryption to ensure the privacy of the communication. Likewise, such clients should employ cryptographic methods to establish the identity and authenticity of any communication peers with which they wish to communicate through a WebSocket server.

Since an HbbTV 2.0 WebSocket server will establish connections only to clients who have indicated the intent of being connected, it is very unlikely that a successful denial-of-service attack could be staged against another client through an HbbTV WebSocket server. The client under attack can simply stop asking the server to be connected to other clients.

Since it is defined that a server may reject simultaneous connection attempts to a not yet connected Request-URI/Host combination, a denial-of-service attack might be attempted against the server itself. This could be done by repeatedly sending the same connection request to provoke error responses, or by sending random connection requests in an attempt to exhaust the server's resources by creating many open stream heads. Both techniques are general strategies for attacking HTTP servers, and are not specific to WebSocket or HbbTV. It is hence expected that any WebSocket server implementation (be it of the HbbTV flavor or not) will have suitable mitigation mechanisms (e.g. by stopping sending responses or creating stream heads).

Figure 46:
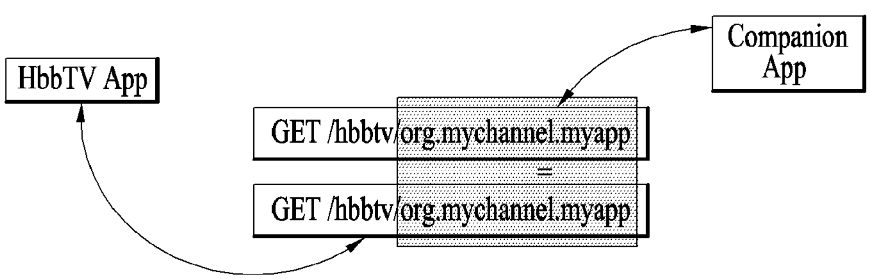
FIG. 46 is a diagram for description of connection between clients when an IP address is not present according to an embodiment of the present invention.

FIG. 46 is a diagram for description of connection between clients when an IP address is not present according to an embodiment of the present invention.

FIG. 46 illustrates a method of establishing a communication linkage between clients. The above-described inter-application communication method based on WebSocket may enable a WebSocket server to connect applications, URI paths (paths excluding a host name) of which are the same, to perform inter-application communication. Inter-client communication may divide an application driven in an electronic device (for example, a TV application) and an application driven in a companion device (for example, a CS application), thereby selectively performing inter-application communication.

As an example, in HbbTV, a Request-URI may be configured without including an IP address. A URI path may start with a reserved word ("hbbtv") indicating HbbTV after a root ("/"), and may include an organization or company ID (org-id) and an application ID (app-id) thereafter. The WebSocket server (network processor) may connect applications, WebSocket API call URI paths of which are the same.

Syntax) GET "/hbbtv/"org-id"."app-id

Example) GET/hbbtv/org.mychannel.myapp

Meanwhile, respective clients requesting connection may use the same port or different ports. When the clients use the same port, the WebSocket server may recognize that a called application is an HbbTV application if IPs of applications calling a WebSocket API are the same, and may recognize that a called application is a companion device application if the IPs are different from each other. When the same port is used, the WebSocket server may simplify server implementation and test, and discovery is unnecessary. (With most WebSocket libraries, need to start a different instance per port. Single port drastically simplifies server implementation and test. No discovery needed if app-2-app server listens on well-defined port on the TV.)

Next, a description will be given of a case in which the clients use different ports.

This case refers to a case in which an application driven by a TV and an application driven by a companion device use the same URI path and use different ports. As an embodiment, an HbbTV application driven by the TV may use port 8900, and an application driven by the companion device may use port 8901. When the WebSocket server knows ports used by a TV application and a companion application, it is possible to distinguish between communication between the TV application and the companion application and inter-companion application communication. When different ports are used, if several companion devices are connected to a TV using the same host request-header, clients may be easily connected by distinguishing the companion devices and the TV. Since the TV and the companion devices communicate with each other by being connected to the WebSocket server through different ports while host request-headers are the same, it is possible to distinguish between the companion device and the TV. Therefore, it is possible to take complementary measures in terms of security.

Figure 47:
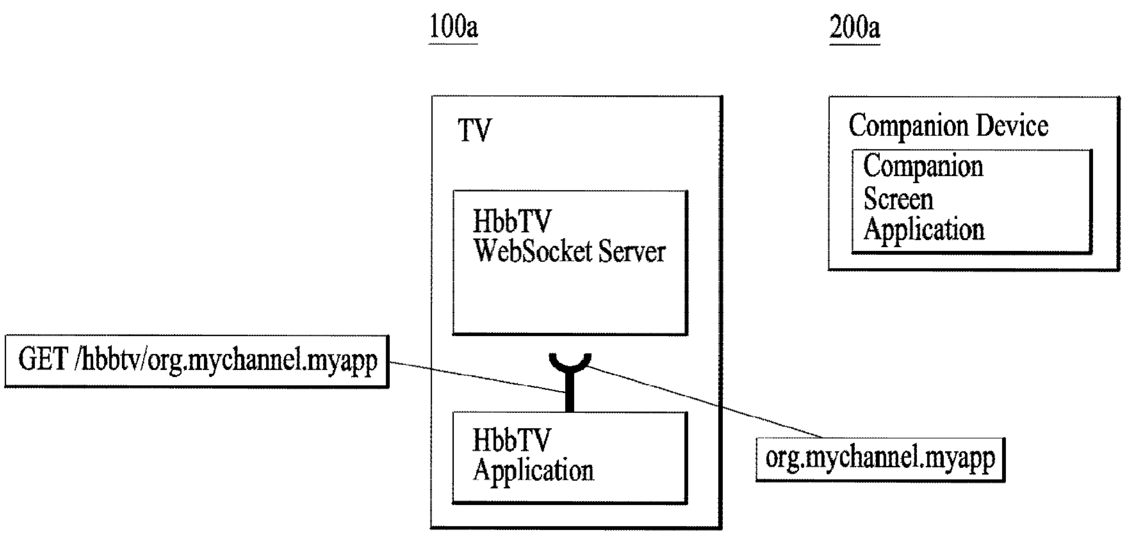
FIG. 47 is a diagram for description of standby connection for connection between applications according to an embodiment of the present invention.

FIG. 47 is a diagram for description of standby connection for connection between applications according to an embodiment of the present invention.

FIG. 47 illustrates an electronic device 100*a* and a companion device 200*a*. A TV application of the electronic device 100*a* may transmit a connection request to a WebSocket server. The TV application is included in the electronic device, and thus the WebSocket server may recognize the TV application as a local application. In addition, a companion application is present outside the electronic device, and thus the WebSocket server may recognize the companion application as a remote application. As an embodiment, an application may use methods below when requesting connection.

TABLE 27

| String getApp2AppLocalBaseURL( ) | |
| --- | --- |
| Description | Returns the base URL of the application to application communication service local end-point. |
| Arguments | No arguments |

TABLE 28

| String getApp2AppRemoteBaseURL( ) | |
| --- | --- |
| Description | Returns the base URL of the application to application communication service remote end-point. |
| Arguments | No arguments |

As an embodiment, a network processor may execute W3C WebSocket API, and may support a minimum of 200 simultaneous WebSocket connections.

The network processor may provide two service end points executed by a server side of a WebSocket protocol specification. A local end point is used for connection to the network processor by an HbbTV application. A remote end point may be connected to a home network by an application of another device, and is used to include a remote companion application or an HbbTV application driven by another HbbTV device. The HbbTV application may be connected to a local service end point of a network processor in which the application operates or a remote service end point of another hybrid terminal in the same home network. It is preferable that the network processor not be connected to a local service end point of another device in the home network. For example, this can be achieved by placing a local service end point of a local loopback interface of the network processor.

When another service end point executes the service side of the WebSocket protocol specification, and the HbbTV application or the companion application uses the service end point, the hybrid terminal should not place the service end point on the same host and port combination as another service end point.

A basic URL for a service end point between applications may be a WebSocket URL. The WebSocket URL may define a host, a port, security, and a resource name of a service end point. A client needs to be connected to a host and a port specified by the WebSocket URL of the service end point. A resource name used in an initial protocol request by the client conforms to ABNF grammar.

resource-name=base-url-resource-name app-endpoint

Base-url-resource-name is a resource name derived from a WebSocket URL of a service end point. App-endpoint is an application specification and may be used for a client connection matching process corresponding to the client. A message of the corresponding client may be delivered through a WebSocket protocol. App-endpoint may be selected by an application developer to avoid collision. Therefore, app-endpoint may start with an ID formatted in reverse DNS notation uniquely related to the HbbTV application, the companion application, or a developer thereof. The hybrid terminal may support app-endpoint including a certain character permitted in a resource name by a minimum length of 1000 characters and the WebSocket protocol specification.

A service end point may support a minimum of ten simultaneous TCP socket connections from a client. When the client attempts to open connection between a server and a TCP socket, the server may reject a request if the server cannot manage simultaneous connection. Otherwise, the server may approve TCP socket connection, and start WebSocket protocol handshake. When the server receives a request handshake from the client, the server may not immediately respond with a handshake response. Instead, the server may wait until connection is paired or connection of the client is canceled. In this state, standby connection may be configured as connection. When the server attempts to execute time-out, the server may respond with a 504 gateway time-out response.

The server may ignore a certain origin header of a request handshake transmitted by the client. The client may not use a Sec-WebSocket-protocol header when requesting connection between clients. The server may ignore the Sec-WebSocket-protocol header in a request for connection between clients. The server may not approve a request from the client for protocol extension using the Sec-WebSocket-protocol header. When the client uses a Sec-WebSocket extension header, the server may not establish a connection using a scheme defined in the WebSocket protocol specification.

As illustrated in FIG. 47, an HbbTV application operating as a client may attempt connection with a local service end point which has app-endpoint of "org.mychannel.myapp" and base-url-resource-name of/hbbtv/. Connection with the companion device may be maintained in a standby state since the companion application has not been linked to communication between applications using the same app-endpoint.

Figure 48:
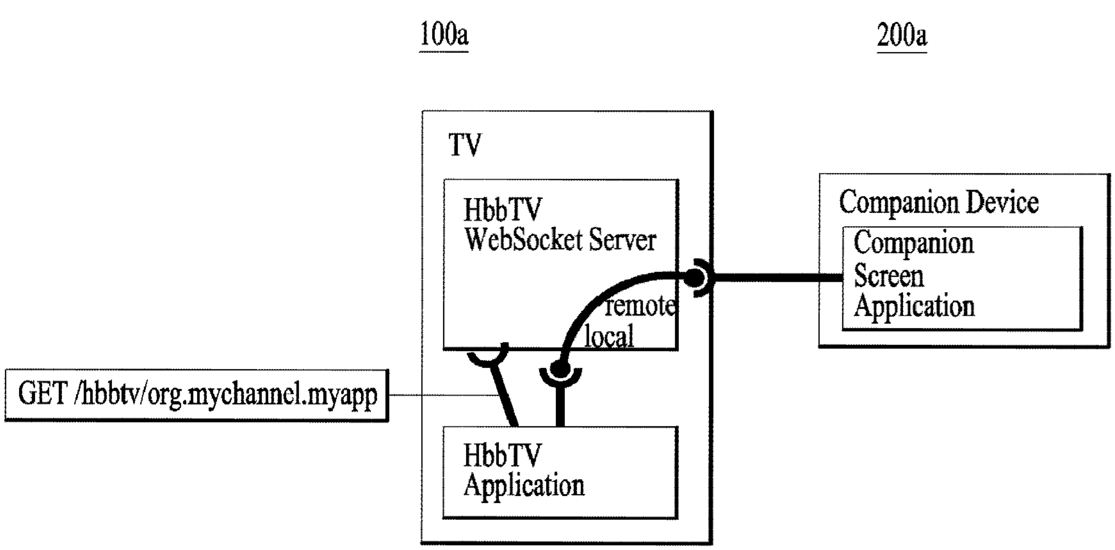
FIG. 48 is a diagram for description of a new connection request for connection with the second client according to an embodiment of the present invention.

FIG. 48 is a diagram for description of a new connection request for connection with a second client according to an embodiment of the present invention.

Referring to FIG. 48, an HbbTV application (client) is connected to a companion application (client) of a companion device 200*a*. In addition, the HbbTV application may generate another stream head for another client.

A server cannot permit one or more simultaneous standby connections from the same original IP address having the same app-endpoint. When successfully connected or when a client of an IP address prior to termination issues another connection request using the same app-endpoint, the server may respond with a 403 Forbidden response.

A client may desire establishment of connection between multiple simultaneous clients through the same service end points using different resource-name combinations. The client cannot attempt to request another connection from an existing service end point before standby to connect the service end point is successful or time-out or connection is canceled. This operation of the client may be defined by a WebSocket protocol specification.

According to FIG. 48, when a client desires to communicate with one or more clients, the client may wait until existing standby connection is paired. In this instance, an additional connection request may be issued to the server until a maximum number of processable inter-client connections is reached. In other words, the HbbTV application may generate a new standby connection request to permit establishment of inter-application communication.

Meanwhile, the client may include an IP address in a URI path.

Figure 49:
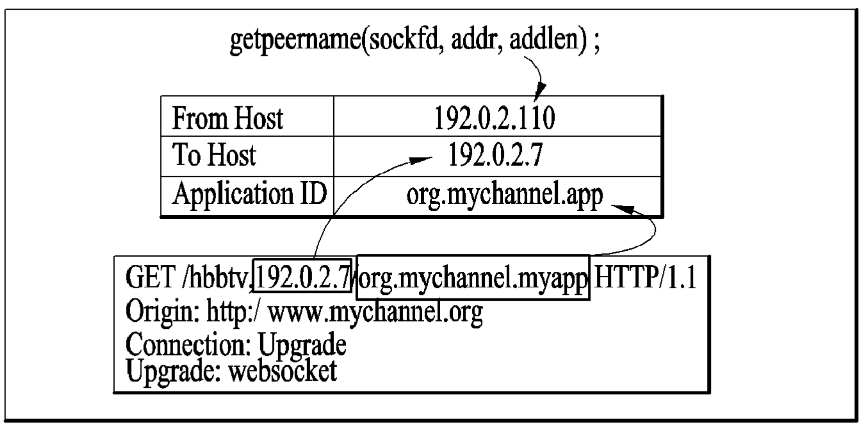
FIG. 49 is a diagram for description of setting of the first client when an IP address is included according to an embodiment of the present invention.

FIG. 49 is a diagram for description of setting of a first client when an IP address is included according to an embodiment of the present invention.

As an embodiment, the above-described URI path starts with a reserved word ("hbbtb") indicating HbbTV after a root ("/"), and may include an organization/company ID (org-id) and an application ID (app-id) thereafter. An application desiring to perform inter-application communication may add an IP address of a driven device to a URI path to designate a target application. A WebSocket server may connect applications, WebSocket API call URI paths of which are the same, according to IP to be used for communication.

Syntax) GET "/hbbtv/" target IP "/" org-id "." app-id

Example) GET/hbbtv/1.1.1.1/org.mychannel.myapp

As an embodiment, a TV application A may be driven in IP 1.1.1.1, a companion application B may be driven in IP 1.1.1.2 (a first user terminal), and a companion application C may be driven in IP 1.1.1.3 (a second user terminal). In this instance, the TV application A may attempt to communicate with the companion application C. The TV application A may include IP (1.1.1.3) in which the companion application C is driven in a URI path which is included in a WebSocket request. In addition, the companion application C may include IP (1.1.1.1) of the TV application A in a URI path which is included in a WebSocket request.

According to FIG. 49, a URI path may correspond to hbbtv/192.0.2.7/org.mychannel.myapp HTTP/1/1. Here, 192.0.2.7 may correspond to an IP address of a target application. 192.0.2.110 may correspond to an IP address thereof. In addition, org.mychannel.myapp may correspond to an application ID.

Figure 50:
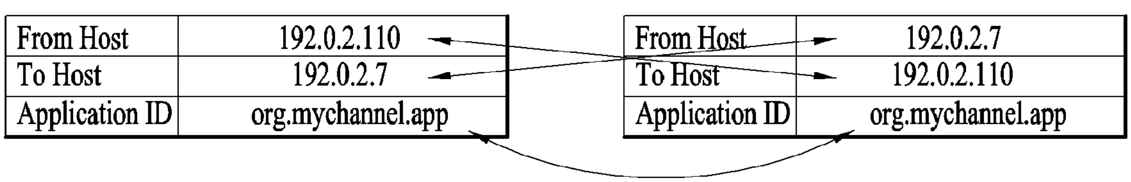
FIG. 50 is a diagram for description of setting of the first client and the second client when IP addresses are included according to an embodiment of the present invention.

FIG. 50 is a diagram for description of setting of a first client and a second client when IP addresses are included according to an embodiment of the present invention.

A WebSocket server may receive the URI request described with reference to FIG. 49 from each of the clients. Referring to FIG. 50, the first client has an IP address of 192.0.2.110, and the second client has an IP address of 192.0.2.7. When the first client requests connection from the second client, a start point (From Host) is 192.0.2.110, and a destination (To Host) is 192.0.2.7. In addition, an application ID may be org.mychannel.myapp. When the second client requests connection from the first client, a start point (From Host) is 192.0.2.7, and a destination (To Host) is 192.0.2.110. In addition, an application ID may be org.mychannel.myapp. That is, start points and destinations of the first client and the second client may be opposite to each other. However, application IDs may be the same. The WebSocket server may connect matching clients to each other.

In addition, a URI path including a host IP address may be used.

For example, the URI path may be used as below. Syntax) GET "/"hbbtv"/" host_address"/"org-id"." app-id, Example) GET/hbbtv/192.0.2.7/org.mychannel.myapp.

Figure 51:
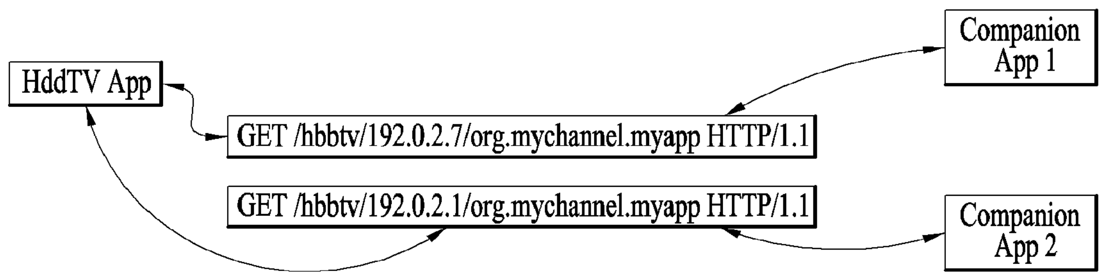
FIG. 51 is a diagram for description of an embodiment of connection to a plurality of second clients when IP addresses are included.

FIG. 51 is a diagram for description of an embodiment of connection to a plurality of second clients when IP addresses are included.

Referring to FIG. 51, an HbbTV has a certain IP address and includes an application ID of org.mychannel.myapp. A first companion application IP address is 192.0.2.7, and a second companion application IP address is 192.0.2.1. Application IDs of first and second companion applications correspond to org.mychannel.myapp. As described above with reference to FIG. 50, the WebSocket server may connect matching clients to each other. Therefore, the WebSocket server may connect matching clients to each other in response to requests from respective clients.

In this way, when an IP address is used in a URI path, both clients designate an object to be connected. Thus, security is improved, clients may be connected to each other, and all information may be matched without extra effort. Meanwhile, even when an IP address is used in a URI path, respective clients may use the same port or may use different ports.

Figure 52:
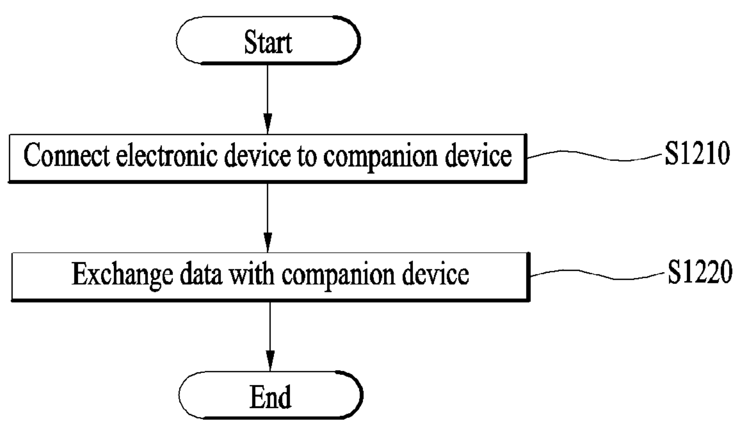
FIG. 52 is a flowchart of a method of controlling an electronic device according to an embodiment of the present invention.

FIG. 52 is a flowchart of a method of controlling an electronic device according to an embodiment of the present invention.

Referring to FIG. 52, in S1210, the electronic device is connected to a companion device. The electronic device may include a network processor and an application processor.

In the electronic device, the application processor may request connection to a companion device from the network processor. Upon receiving a connection request from the companion device, the network processor may connect the application processor requesting connection to the companion device.

As described in the foregoing, the application processor may correspond to an application module or an application browser. Alternatively, the application processor may correspond to an HbbTV application. The network processor may be implemented as a network module. Alternatively, the network processor may correspond to a WebSocket server. When the network processor is implemented as the WebSocket server, each of the application processor and the companion device may be regarded as one client. Alternatively, each of a first client and a second client may be referred to as a peer.

The application processor may transmit information about an electronic device operating in the network processor or host request header information indicating companion device information to the network processor. In addition, in response to a connection request from the application processor, the network processor may generate a stream head of the application processor and include the stream head in a stream head group. Upon receiving a connection request from the companion device, the network processor may generate a stream head of the companion device and connect the generated stream head to a stream head of an application processor matched from a stream head group. In this instance, the network processor may remove the stream head of the matched application processor or the stream head of the companion device from the stream head group. Meanwhile, the application processor may transmit an IP address of a companion device to be connected, and respective applications may use the same port.

In S1220, the electronic device may exchange data with the companion device. Through this process, the electronic device may be connected to the companion device to perform communication.

The electronic device and the control method according to the specification are not restricted to configurations and methods of the above-described embodiments, and all or some of the respective embodiments may be selectively combined and variously changed.

Figure 53:
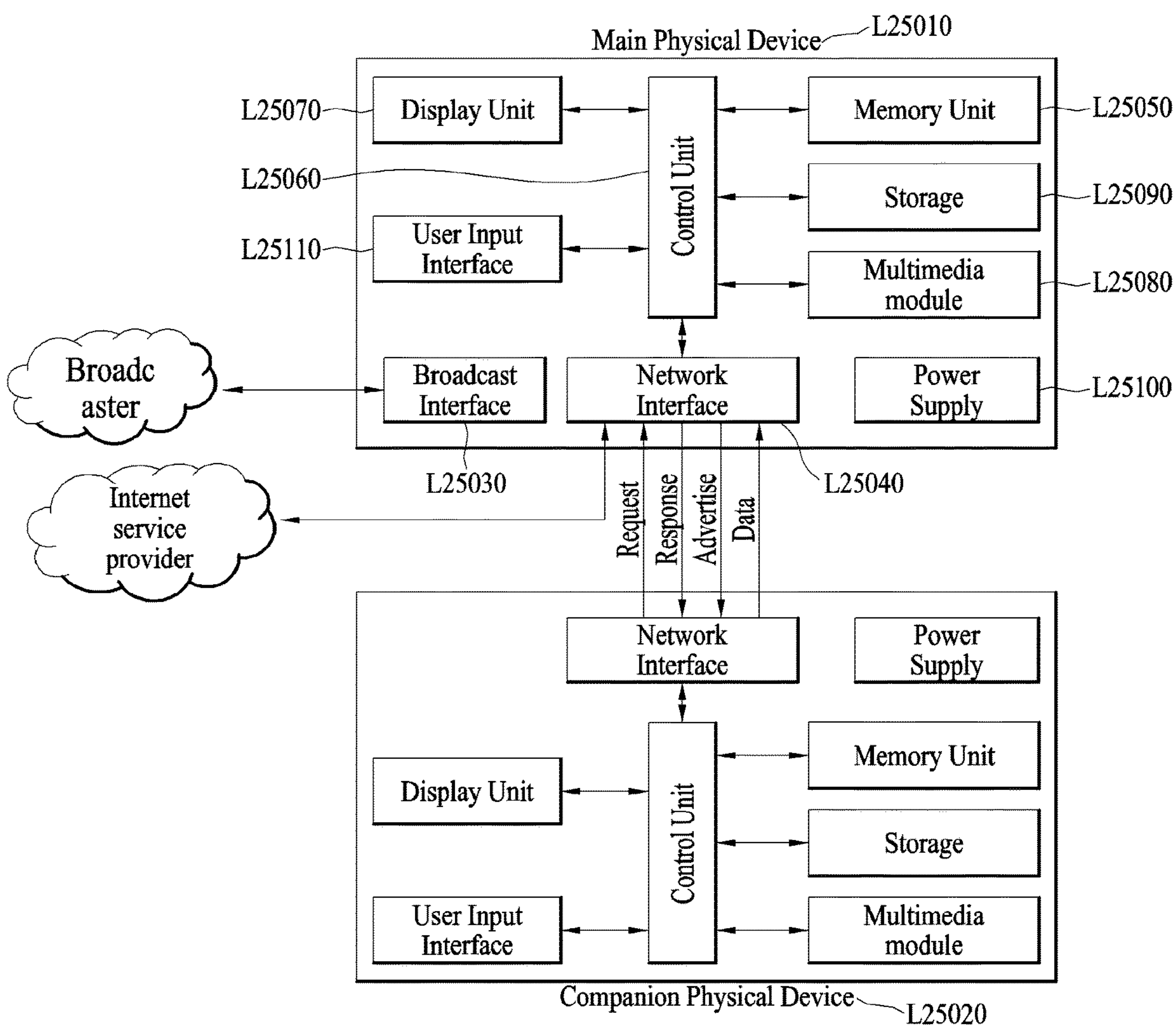
FIG. 53 is a block diagram illustrating a main physical device and a companion physical device according to an embodiment of the present invention.

FIG. 53 is a block diagram illustrating a main physical device and a companion physical device according to an embodiment of the present invention.

The embodiment of the present invention can provide a service guide in a terrestrial broadcast environment or a mobile broadcast environment. In addition, the embodiment of the present invention can provide a service guide regarding services available in the next generation hybrid broadcast environment based on interaction between a terrestrial broadcast network and the Internet.

The embodiment of the present invention can inform users of not only various services available in the next generation hybrid broadcast system, but also constituent content of the services and/or component elements of the services. As a result, the user can easily confirm, select, and view the corresponding service, resulting in increased user convenience.

The embodiment of the present invention may construct a single service, various constituent content of the service, and/or component elements of the service, and may make a cross reference to each other. As a result, the broadcast receiver can easily construct and provide the corresponding service, and can allow the user to easily recognize the corresponding service.

The embodiments of the present invention can extend the reference structure for linking one service to various content and/or component elements of the service, and can allow the broadcast receiver and/or the user to reduce the amount of resources and/or consumption time needed to search for content and/or component elements of the single service.

FIG. 53 is a block diagram illustrating a main physical device and a companion physical device according to an embodiment of the present invention.

The main physical device (L25010) according to an embodiment of the present invention is one of devices for interactive services, and may indicate a target device to be controlled by the companion physical device (L25020). The main physical device may be referred to as a main device, a main reception device, a main display, a main screen, or the like.

The main physical device (L25010) according to one embodiment of the present invention may include a broadcast interface (L25030), a network interface (L25040), a memory unit (L25050), a control unit (L25060), a display unit (L25070), a multimedia module (L25080), a storage unit (L25090), a power-supply unit (L25100), and/or a user input interface (L25110).

The broadcast interface (L25030) may indicate a physical device located between the broadcaster and the device, such that the broadcast interface (L25030) acting as the physical device can transmit various messages (such as the AV stream, service guide, and notification messages) and/or data. The broadcast interface (L25030) may receive broadcast signals, signaling information, data, etc. from the broadcaster.

The network interface (L25040) may indicate a physical device located between various devices (e.g., the main physical device and the companion physical device), such that the network interface (L25040) can transmit various messages (e.g., commands, requests, actions, response messages, etc.), and can perform advertising and/or data transmission. The network interface may receive broadcast services, broadcast content, signaling information, applications, data, etc. from the Internet service provider.

The memory unit (L25050) may be an optional or selective device implemented in various types of devices, and may indicate a volatile physical device capable of temporarily storing various types of data.

The control unit (L25060) may be configured to control the entire operation of the source device and/or the sink device, and may be implemented by software or hardware. In this case, the source device may indicate a device configured to transmit messages and/or data. The sink device may indicate a device configured to receive messages and/or data. Therefore, the main physical device and the companion physical device according to the embodiment of the present invention may correspond to the source device or the sink device.

The display unit (L25070) may display data received through the network interface or data stored in the storage unit on the screen. In this case, the display unit may be controlled by the control unit.

The multimedia module (L25080) may reproduce various types of multimedia. The multimedia module may be contained in the control unit, and may be located independently of the control unit.

The storage unit (L25090) may indicate a non-volatile physical device capable of storing various types of data therein. For example, the SC card may correspond to the storage unit.

The power-supply unit (L25100) may receive the external power-supply voltage and/or the internal power-supply voltage under control of the control unit, such that the power-supply unit (L25100) can provide a power-supply voltage needed to operate other constituent elements.

The user input interface (L25110) may indicate a device capable of receiving input signals or commands from the user.

The companion physical device (L25020) according to the embodiment of the present invention may be one of devices needed for interactive services, and may indicate a device configured to control the main device. Generally, the companion physical device may directly receive input signals from the user. The companion physical device may be referred to as a companion device, a second device, an additional device, an auxiliary device, a companion reception device, a companion receiver, a companion display, a second screen, or the like.

The physical device (L25020) according to the embodiment of the present invention may include a network interface, a memory unit, a control unit, a display unit, a multimedia module, a storage unit, a power-supply unit, and/or a user input interface.

From among all the constituent elements of the companion physical device according to the embodiment, some constituent elements having the same names as those of the main device may have the same functions as those of the constituent elements of the above-mentioned main device.

Figure 54:
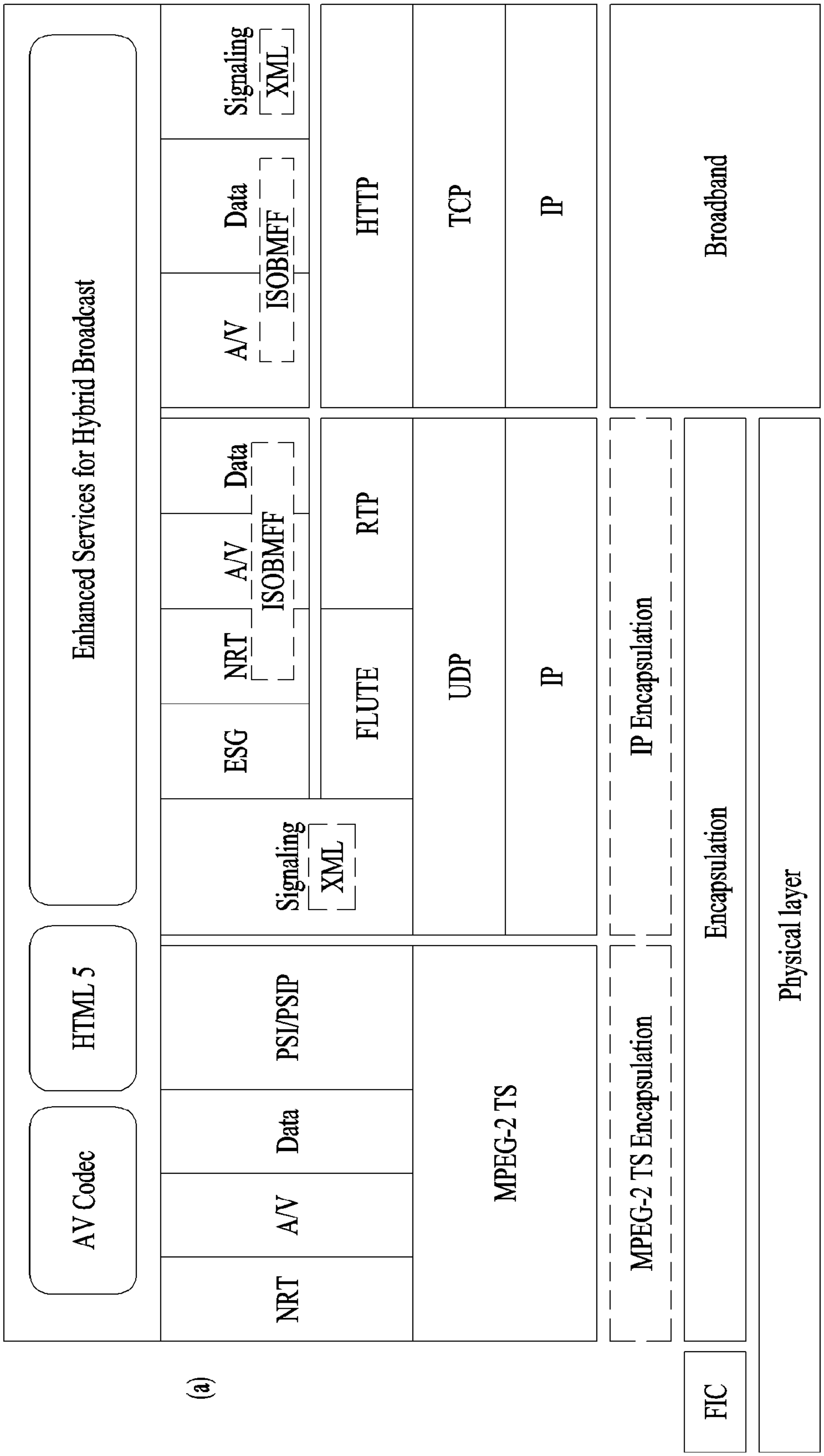
FIG. 54 is a block diagram illustrating a protocol stack to support a hybrid broadcast service according to an embodiment of the present invention.

FIG. 54 is a block diagram illustrating a protocol stack configured to support a hybrid broadcast service according to an embodiment of the present invention.

A physical layer may receive terrestrial broadcast signals, and may properly convert (or transform) the received terrestrial broadcast signals.

IP (Internet Protocol) Encapsulation may acquire an IP datagram using information acquired from the physical layer. In addition, the IP encapsulation may convert (or transform) the acquired IP datagram into a specific frame (e.g., RS Frame, GSE, etc.).

MPEG2 TS Encapsulation may acquire the MPEG2 TS using information acquired from the physical layer. In addition, the MPEG2 TS Encapsulation may convert the acquired MPEG2 TS datagram into a specific frame (e.g., RS Frame, GSE, etc.).

A Fast Information Channel (FIC) may transmit specific information (e.g., mapping information between the service ID and the frame) so as to access the service and/or content.

Signaling may include signaling information to support a hybrid broadcast service according to an embodiment of the present invention. This signaling information may include signaling information to support efficient acquisition of the services and/or content.

This signaling information may be denoted in binary and/or XML format, and may be transmitted through the terrestrial broadcast network and/or the broadband network.

Real time ANV (Audio/Video) content and data may be represented by ISO Base Media File Format (ISOBMFF) or the like, and may be transmitted in real time through the terrestrial broadcast network and/or the broadband network. Non-real time content may be transmitted on the basis of IP/UDP/FLUTE. Real-time broadcast ANV (Audio/Video) content, data and/or signaling information may be transmitted in real time through the Internet. In this case, the real-time broadcast A/V (Audio/Video) content, data and/or signaling information may be transmitted by a request message. Alternatively, the real-time broadcast A/V (Audio/Video) content, data and/or signaling information may also be transmitted through real-time streaming.

The embodiment of the present invention may combine data through the above-mentioned protocol stack, and may also provide various enhanced services, for example, an interactive service, a second screen service, etc.

Figure 55:
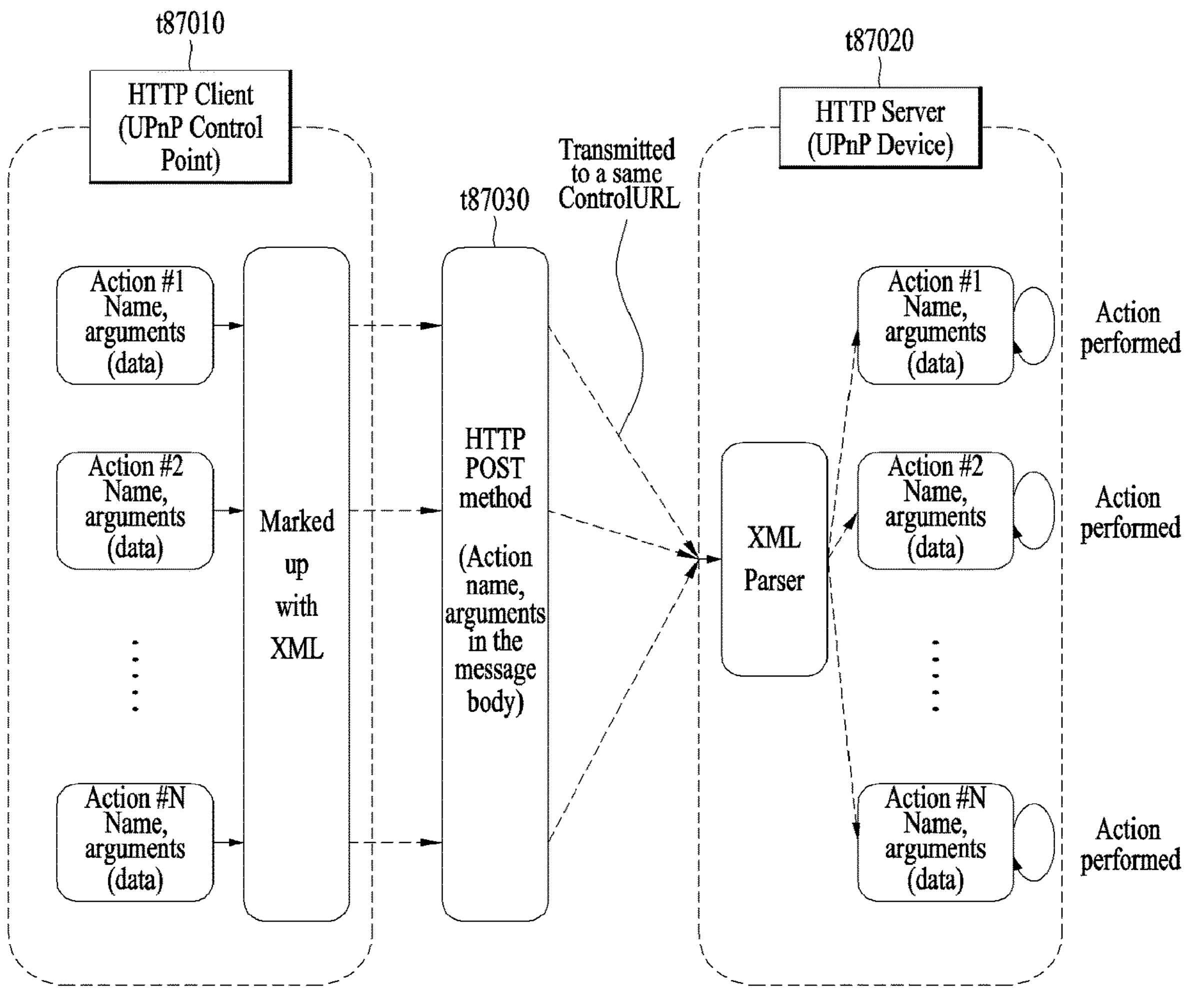
FIG. 55 is a view showing an UPnP type Action mechanism according to an embodiment of the present invention.

FIG. 55 is a view showing an UPnP type Action mechanism according to an embodiment of the present invention.

First, communication between devices in the present invention will be described.

The communication between devices may mean exchange of a message/command/call/action/request/response between the devices.

In order to stably transmit a message between devices to a desired device, various protocols, such as Internet Control Message Protocol (ICMP) and Internet Group Management Protocol (IGMP), as well as Internet Protocol (IP) may be applied. At this time, the present invention is not limited to a specific protocol.

In order to contain various information in a message used for communication between devices, various protocols, such as Hypertext Transfer Protocol (HTTP), Real-time Transport Protocol (RTP), Extensible Messaging and Presence Protocol (XMPP), and File Transfer Protocol (FTP), may be applied. At this time, the present invention is not limited to a specific protocol.

When a message used for communication between devices is transmitted, various components, such as a message header and a message body, defined by each protocol may be utilized. That is, each message component may be transmitted in a state in which data are stored in each message component and the present invention is not limited to a specific message component. In addition, data transmitted by a message may be transmitted various types (string, integer, floating point, boolean, character, array, list, etc.) defined by each protocol. In order to structurally express/transmit/store complex data, a Markup scheme, such as Extensible Markup Language (XML), Hypertext Markup Language (HTML), Extensible Hypertext Markup Language (XHTML), and JavaScript Object Notation (JSON), text, or an image format may be applied. At this time, the present invention is not limited to a specific scheme.

In addition, a message used for communication between devices may be transmitted in a state in which data are compressed. The present invention is not limited to application of a specific compression technology.

In the description of the above-described communication between devices in the present invention, one scheme, e.g. a UPnP scheme, will be described. The UPnP scheme may correspond to a case in which IP-TCP/UDP-HTTP protocols are combined in the description of the above-described communication between devices.

The UPnP type Action mechanism according to the embodiment of the present invention shown in the figure may mean a communication mechanism between a UPnP control point and a UPnP device. The UPnP control point t87010 may be an HTTP client and the UPnP device t87020 may be an HTTP server. The UPnP control point t87010 may transmit a kind of message called an action to the UPnP device t87020 such that the UPnP device t87020 can perform a specific action.

The UPnP control point t87010 and the UPnP device t87020 may be paired with each other. Pairing may be performed between the respective devices through a discovery and description transmission procedure. The UPnP control point may acquire a URL through a pairing procedure.

The UPnP control point t87010 may express each action in an XML form. The UPnP control point t87010 may transmit each action to the acquired control URL using a POST method t87030 defined by HTTP. Each action may be data which are to be actually transmitted as a kind of message. This may be transmitted to a HTTP POST message body in an XML form. Each action may include name, arguments, and relevant data. The HTTP POST message body may transmit name and/or arguments of each action.

At this time, each action may be transmitted to the same control URL. The UPnP device t87020 may parse the received action using an XML parser. The UPnP device t87020 may perform a corresponding operation according to each parsed action.

For the UPnP protocol, each action may be defined by name and used. In addition, since the name of the action is also transmitted to the HTTP POST message body, exchange between infinite kinds of actions may be possible even in a case in which only one URL for a target device exists and only one HTTP POST method is used.

Figure 56:
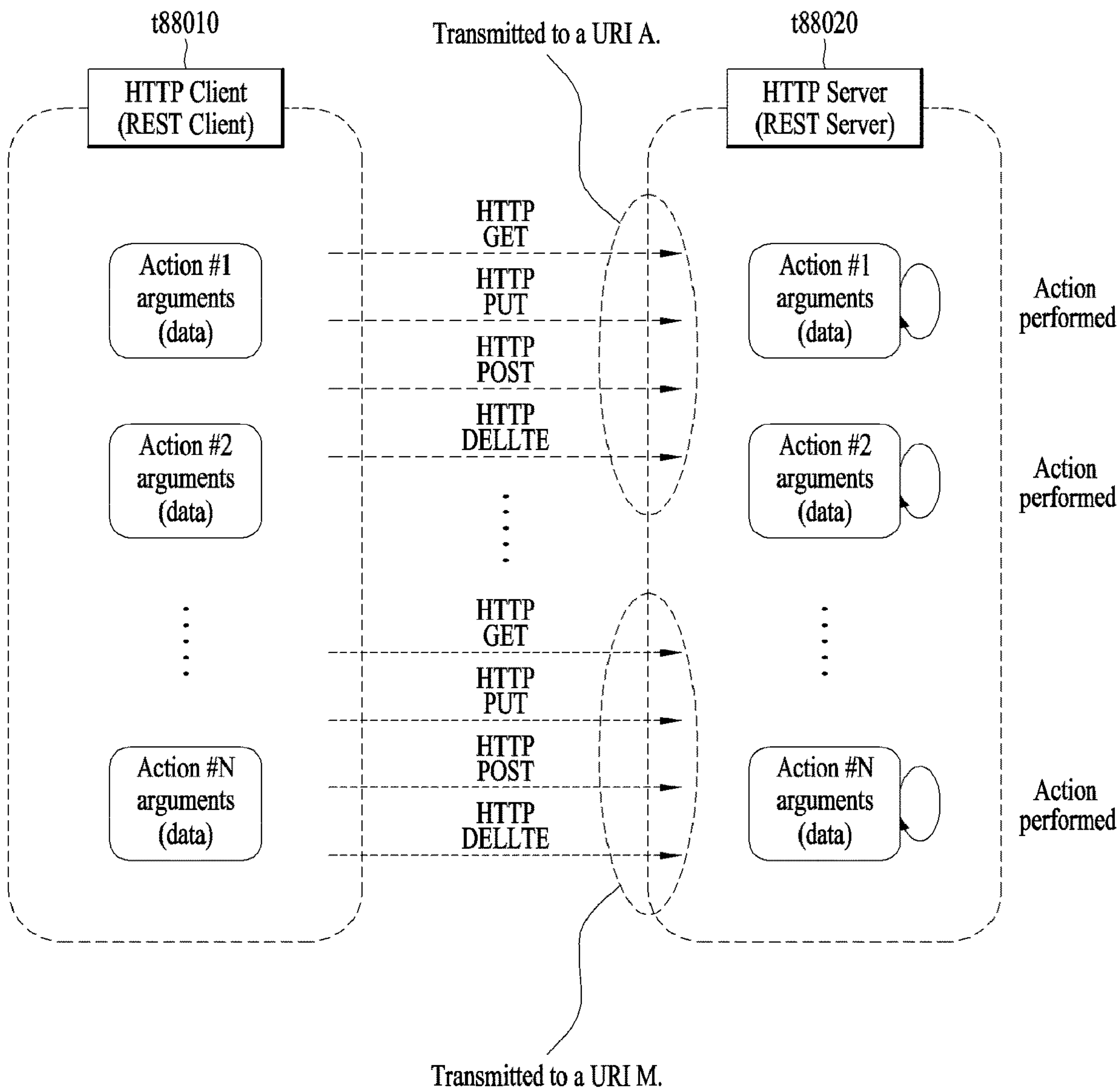
FIG. 56 is a view showing a REST mechanism according to an embodiment of the present invention.

FIG. 56 is a view showing a REST mechanism according to an embodiment of the present invention.

In the description of the above-described communication between devices in the present invention, one scheme, e.g. a REST scheme, will be described.

The REST mechanism according to the embodiment of the present invention shown in the figure may mean a communication mechanism between a REST client t88010 and a REST server t88020. The REST client t88010 may be an HTTP client and the REST server t88020 may be an HTTP server. In the same manner as in the above description, the REST client t88010 may transmit a kind of message called an action to the REST server t88020 such that the REST server t88020 can perform a specific action.

In this embodiment, the REST client t88010 may transmit each action to the REST server t88020 through a URI. Action name is not required for each action. Each action may include only arguments and data.

Among HTTP methods, various methods, such as GET, HEAD, PUT, DELETE, TRACE, OPTIONS, CONNECT, and PATCH, as well as POST may be utilized. In addition, a plurality of URIs that will access a target device for communication may be defined. Due to such characteristics, an action may be transmitted without definition of action name. A plurality of URI values necessary for such a REST scheme may be acquired during a discovery or description transmittance procedure.

Data or arguments necessary to be transmitted may be transmitted while being added to a corresponding URI. Alternatively, data or arguments may be transmitted while being included in the HTTP body in various forms (XML, JSON, HTML, TEXT, IMAGE, etc.).

The REST server t88020 may perform a specific operation according to the received action.

The above-described communication between devices is only an embodiment and all of the details proposed by the present invention are not limited to the UPnP scheme.

FIG. 57 is a diagram illustrating a service for exchanging electronic service guide (ESG) between a broadcast receiver and companion devices according to an embodiment of the present invention.

ESG may be a type of channel or information to be transmitted through service guide delivery descriptors in a specific session and may provide service guide of broadcast, radio, or other media applications. ESG may provide service scheduling or program related information items in the form of menu format, etc. to a user. ESG may be provided through a broadcast channel or an Internet channel (broadband).

Users may perform an operation such as service providing schedule, discovery of an entry point of currently available services, and service filtering according to preference, through ESG. Content providers may represent information on a service and/or content that are available, purchase/subscription related information, and service access information, through ESG. The ESG may also be referred to as service guide, electronic program guide (EPG), or the like.

Conventionally, when service guide such as ESG is executed while a user watches a broadcast program through a broadcast receiver, ESG may be hidden by the watched broadcast program to cause inconvenience.

The present invention proposes a method of executing service guides such as ESG in a companion device to access ESG information without obstructing watch of the currently watched broadcast program. In this case, a user may access ESG while does not experience inconvenience during watching of a broadcast program. The user may protect his or her privacy using a personal companion device for ESG search. In general, ESG may be searched for through a UI of a companion device instead of a UI of a broadcast receiver with degraded convenience, thereby enhancing convenience.

The present invention may overcome the aforementioned problem by defining a protocol for transmitting ESG information to a companion device from a broadcast receiver in a next-generation hybrid broadcast environment based on interaction between a terrestrial broadcast network and the Internet. The present invention proposes a protocol of changing a service of a broadcast receiver by transmitting channel information in a companion device when a user selects a new service through ESG provided by the companion device.

Although the embodiments of the present invention have been described based on UPnP, this is merely for convenience of description and a protocol for communication between a broadcast receiver and a companion device is not limited thereto. Although XML-based ESG has been exemplified according to the embodiments of the present invention, this is merely for convenience of description and format for configuring ESG is not limited thereto.

An example of a service for exchanging the illustrated ESG may be referred to as an ESG service.

The ESG service may be a service for exchanging ESG between a broadcast receiver and a companion device. In some embodiments, a service type of an ESG service may be defined as atsc3.0ESG-1 and a service ID may be defined as urn:atsc.org:serviceId:atsc3.0ESG.

Compatibility between services may be required for an ESG service. In some embodiments, an UPnP device type may be defined. A broadcast receiver may have a device type of urn:atsc.org:device:atsc3.0rcvr and operate as a UPnP controlled device. A companion device may operate as an UPnP control point.

A state variable, an action, etc. for an ESG service will be described below.

FIG. 58 is a diagram illustrating an ESGData state variable according to an embodiment of the present invention.

For the aforementioned ESG service, the ESGData state variable may be defined. The ESGData state variable may be a state variable indicating ESG. The ESGData state variable may store ESG data of ESG received through a broadcast/Internet network. The illustrated ESGData may be written in XML format.

The ESGData state variable may store ESG data items indicating ESG, that is, elements, attributes, and sub elements in ESG.

A Service element t54010 in the ESGData state variable may be an element having information related to a service indicated by ESG among contents included in the ESG.

Lower information of the element may include Service@id indicating a service ID, Service@version indicating a service version, Service.Name indicating a service name, Service.Description indicating service description, and/or Service.ServiceType indicating a service type. Here, A.B may refer to a B element as a lower element of an A element and A@a may refer to @a as lower attribute of the A element.

Here, Service.ServiceType, that is, an ServiceType element as a lower element of a service may indicate a service type indicated by a corresponding service. In some embodiments, 0 may be unspecified, 1 may refer to Basic TV, 2 may refer to Basic Radio, . . . , 14 may refer to a linear service, 15 may refer to an app based service, and 16 may refer to a companion screen service or the like. A value indicated by the element may be changed in some embodiments.

A Schedule element t54020 in the ESGData state variable may be an element having schedule information of services/programs indicated by ESG among contents included in the ESG. Lower information of the element may include Schedule@id indicating a schedule ID, Schedule@version indicating schedule version, and so on. Lower information of the element may include Scheudle.ServiceReference indicating a service related to schedule, Scheudle.InteractivityDataReference indicating interactivity data related to schedule, Scheudle.ContentReference indicating content related to schedule, and so on.

A Content element t54030 in the ESGData state variable may be an element having content information indicated by ESG among contents included in the ESG. Lower information of the element may include Content@id indicating a content ID, Content@version indicating a content version, Content.Name indicating a content name, Content.Description indicating content description, Content. StartTimie indicating presentation start time of content, and/or Content.EndTime indicating presentation end time of content. ComponentReference as a lower element of the Content element may include information for referencing a component of corresponding content, related to the corresponding content. Thereby, the related component may be recognized and corresponding component related information items in ESG may be referenced.

A Component element t54040 in the ESGData state variable may be an element having component information of content indicated by ESG among contents included in the ESG. Lower information of the element may include Component@id indicating a component ID, Component@version indicating a component version, and so on. Lower information of the element may include Language indicating a component language, Length indicating a component length, ParentalRating indicating component rating, ComponentType indicating a component type, ComponentRole indicating a component role, Target- Device indicating a device targeted by a component, and so on. According to whether a component is a presentable video, audio, closed caption, or app, information such as PresentableVideoComponent, PresentableAudioComponent, PresentableCCComponent, and PresentableAppComponent may be included in the element, respectively.

In some embodiments, the ESGData state variable may be transmitted to a companion device using an eventing method or an action method.

The aforementioned element, attributes, and so on are merely embodiments of ESGData and element/attributes, etc. in ESGData may be further added, modified, or deleted according to configuration, format, etc. of ESG.

FIG. 59 is a diagram illustrating an ESGData state variable according to another embodiment of the present invention.

The illustrated ESGData state variable is similar to the aforementioned ESGData state variable but is different from the aforementioned ESGData state variable in that the Component element is included as a lower element of the Content element.

A plurality of components are combined to constitute one content and, thus, the Component element may be included as a lower element of the Content element. Capability of devices for supporting each component may be defined as DeviceCapability as a lower element and may be included as a lower element of a Component element.

Figure 60:
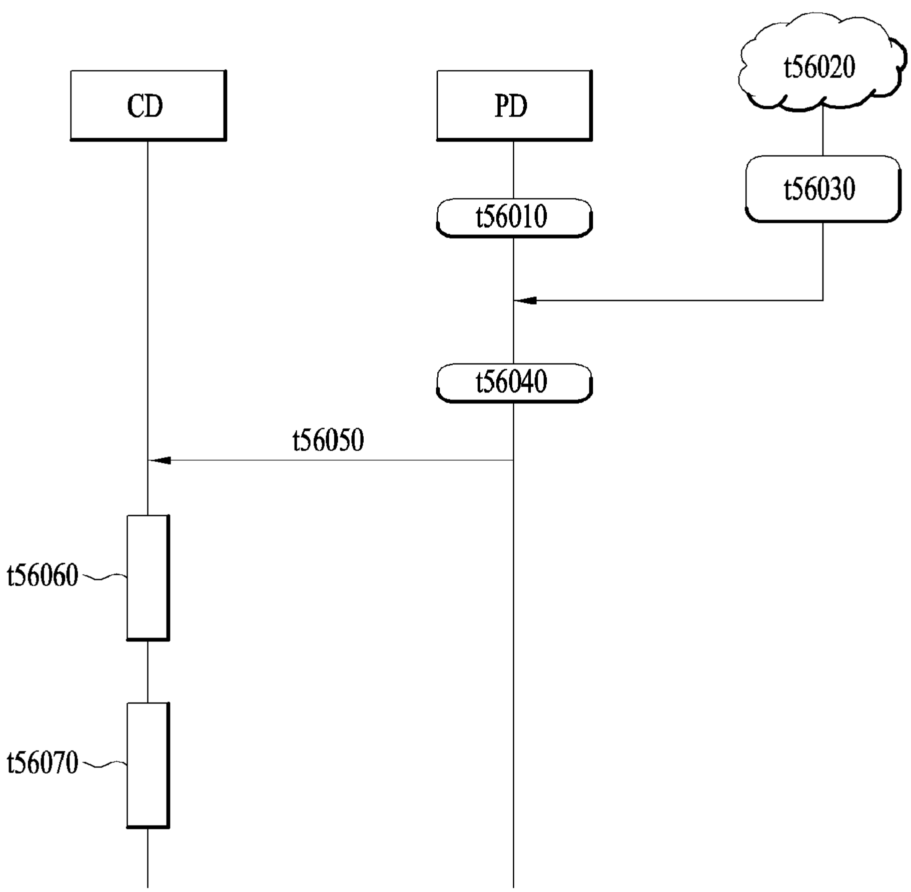
FIG. 60 is a diagram illustrating an operation of transmitting an ESGData state variable to a companion device using an eventing method according to an embodiment of the present invention.

FIG. 60 is a diagram illustrating an operation of transmitting an ESGData state variable to a companion device (CD) using an eventing method according to an embodiment of the present invention.

First, the illustrated DC may refer to a companion device and a primary device (PD) may refer to a receiver or a broadcast receiver. According to the present embodiment, the two devices are assumed to be paired with each other. The companion device is assumed to subscribe to the aforementioned ESG service. In this initial state t56010, the ESGData state variable may not have any value.

A service/content provider may transmit ESG through a broadcast network or a broadband channel (t56020). The ESG may be received through a network interface or a receiving unit of a receiver. Here, the receiving unit may be the aforementioned broadcast interface or tuner.

The receiver may signal the received ESG (t56030). The ESG data may be stored in the ESGData state variable (t56040).

The ESGData may be transmitted to the companion device through eventing (t56050). The companion device that receives the ESGData state variable may parse the ESGData (t56060) and ESG may be exposed to the companion device through a UI according to the parsed value (t56070). In this case, in order to show the ESG to the user, the UI may be represented at a native level of the companion device or represented in an application of the companion device.

There may be various exemplary embodiments of a method of representing ESG by a companion device. In some embodiments, upon receiving ESG, the companion device may immediately expose ESG to the user in any form. According to another embodiment of the present invention, upon receiving ESG, the companion device may transmit a notification message to a user, and when the user executes the notification message, ESG may be exposed. According to another embodiment of the present invention, upon receiving the ESG, the companion device owns ESG information in a background and then the user executes an application in which ESG is viewable at a time desired by a user, the ESG may be exposed to the user at last.

FIG. 61 is a diagram illustrating LastChangedESGData state variable according to an embodiment of the present invention.

For the aforementioned ESG service, the LastChangedESGData state variable may be defined. As described above, when an entire portion of ESG is transmitted to a companion device, even if even some ESG data items are modified, it may not be effective that all ESG data items are transmitted. To this end, the LastChangedESGData state variable for storing only the modified ESG data may be defined. The LastChangedESGData state variable may store only ESG data that is added/modified/deleted in newly received ESG compared with previous ESG.

The LastChangedESGData state variable may include an Addition element (t57010). The element may store ESG data added to the newly received ESG compared with existing ESG data. As a sub element of the element, newly added ESG data items, i.e., element/attributes may be stored. For example, when ESG data related to a new service with a new service ID compared with existing ESG data is added to newly received ESG, element/attributes related to the new service may be included in a lower tree of the Addition element. In the illustrated embodiment, a service with an ID of "atsc.org/esg/service/3 is newly added and, thus, it may be seen that a Service element of a corresponding service is included in the Addition element. In addition, a service with an ID of "atsc.org/esg/service/4 and a name of ABC is newly added and, thus, it may be seen that the Service element of the corresponding service is added to the Addition element. In addition, information such as Service, Content, and Schedule may be included in the element.

The LastChangedESGData state variable may include an element Modification (t57020). The element may store ESG data modified in newly received ESG compared with existing ESG data. As a sub element of the element, the modified ESG data items, that is, element/attributes may be stored. For example, when any one of lower information items of schedule with an ID of "atsc.org/esg/schedule/3" is modified, an element Schedule of corresponding schedule may be stored in the element Modification. In addition, information such as Service, Content, and Schedule may be included in the element.

The LastChangedESGData state variable may include an element Deletion (t57030). The element may store ESG data deleted in newly received ESG compared with existing ESG data. As a sub element of the element, the deleted ESG data items, that is, element/attributes may be stored. For example, when the Content element with an ID of "atsc.org/esg/content/1" and "atsc.org/esg/content/2" is deleted in newly received ESG, the Content element of corresponding content may be stored in an element Deletion. In addition, information such as Service, Content, and Schedule may be included in the element.

In some embodiments, the LastChangedESGData state variable may be transmitted to a companion device using an eventing method or an action method. When the state variable is transmitted using the eventing method, if a value of the state variable is modified, the state variable may be transmitted to the companion device. When the state variable is transmitted using the action method, the LastChangedESGData state variable may be configured with respect to mostly recently modified content of ESG data at a time of receiving a request for the value of the state variable and transmitted to the companion device.

The companion device may update only the modified ESG data items compared with pre-stored ESG with respect to the received LastChangedESGData state variable. Thereby, effective transmission may be performed compared with the case in which an entire portion of ESG is transmitted.

The aforementioned element, attributes, and so on are merely embodiments of LastChangedESGData and element/attributes, etc. in LastChangedESGData may be further added, modified, or deleted according to configuration, format, etc. of ESG.

Figure 62:
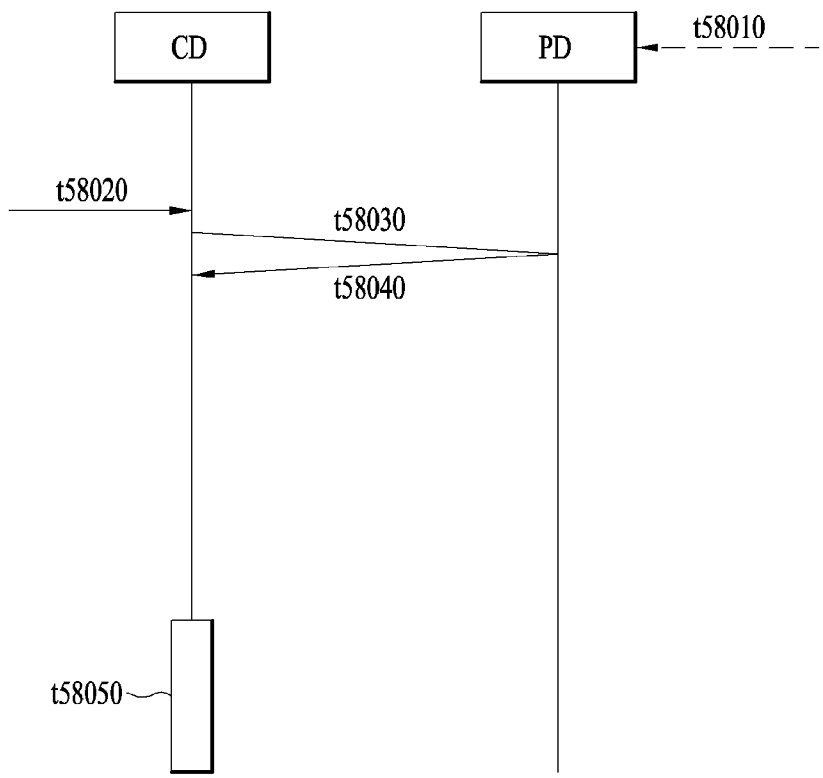
FIG. 62 is an operation of transmitting ESG data to a companion device according to a GetESGData action according to an embodiment of the present invention.

FIG. 62 is an operation of transmitting ESG data to a companion device according to a GetESGData action according to an embodiment of the present invention.

As described above, an ESGData state variable may be transmitted to the companion device using an eventing method. However, when a receiver transmits ESG data to the companion device using an eventing method whenever ESG is modified, this results in network overload and a burden to the companion device. Accordingly, a GetESGData( ) action may be defined to transmit ESG data only when the companion device wants this.

The GetESGData( ) action may be an action for transmitting the ESGData state variable to the companion device using an action method. That is, when the companion device makes a request for ESG data to the receiver through the action, the receiver may transmit the ESGData state variable to companion data. An input argument of the action may be none and an output argument may be the ESGData state variable.

The GetESGData( ) action may be performed when a user wants to see ESG through the companion device and an ESG application, etc. are executed. In this case, ESG data may be received as a result of the corresponding action and the received ESG data may be exposed through the ESG application. In some embodiments, when the GetESGData( ) action is executed using a periodic polling method to store ESG data in the companion device and, then, the ESG application is executed, the stored ESG data may be exposed to the user.

The GetESGData( ) action may also be simultaneously supported when the ESGData state variable supports an eventing method. However, in this case, when ESG data is received using an eventing method and, simultaneously, ESG data is also received using an action whenever ESGData is modified, ESG data may be redundantly received. Accordingly, when the action method and the eventing method are simultaneously supported, a policy of receiving ESG data using an eventing method only when a first ESG service is subscribed and, then, receiving ESG data using the GetESGData( ) action periodically or when an ESG application is executed.

First, in the present embodiment, two devices are assumed to be already paired with each other. In addition, the companion device is assumed to subscribe the aforementioned ESG service.

The receiver may have own ESG data (t58010). The ESG data may be stored in the ESGData state variable. A user may take a specific action of executing an ESG application (t58020). The specific action may be an operation that requires ESG data.

The companion device may perform the GetESGData( ) action to make a request for the ESGData state variable to the receiver (t58030). The receiver may simultaneously output the ESGData state variable as an output argument of the GetESGData( ) action to the companion device while transmitting call back of 200 OK in response to the request (t58040).

The companion device may perform an operation of parsing the received ESGData and exposing the ESGData through an ESG application using the ESG data (t58050). The companion device may perform an operation of immediately exposing ESG data or storing the ESG data once in order to expose the ESG data, like in the aforementioned embodiments.

The illustrated embodiment may be an embodiment of performing the GetESGData( ) action when the user performs a specific action. However, in some embodiments, as described above, when the GetESGData( ) action is periodically performed (irrespective of whether the specific action is performed) and, then, the user executes the ESG application or the like at a predetermined time, ESG data that has been received and stored through the corresponding action may be exposed.

Figure 63:
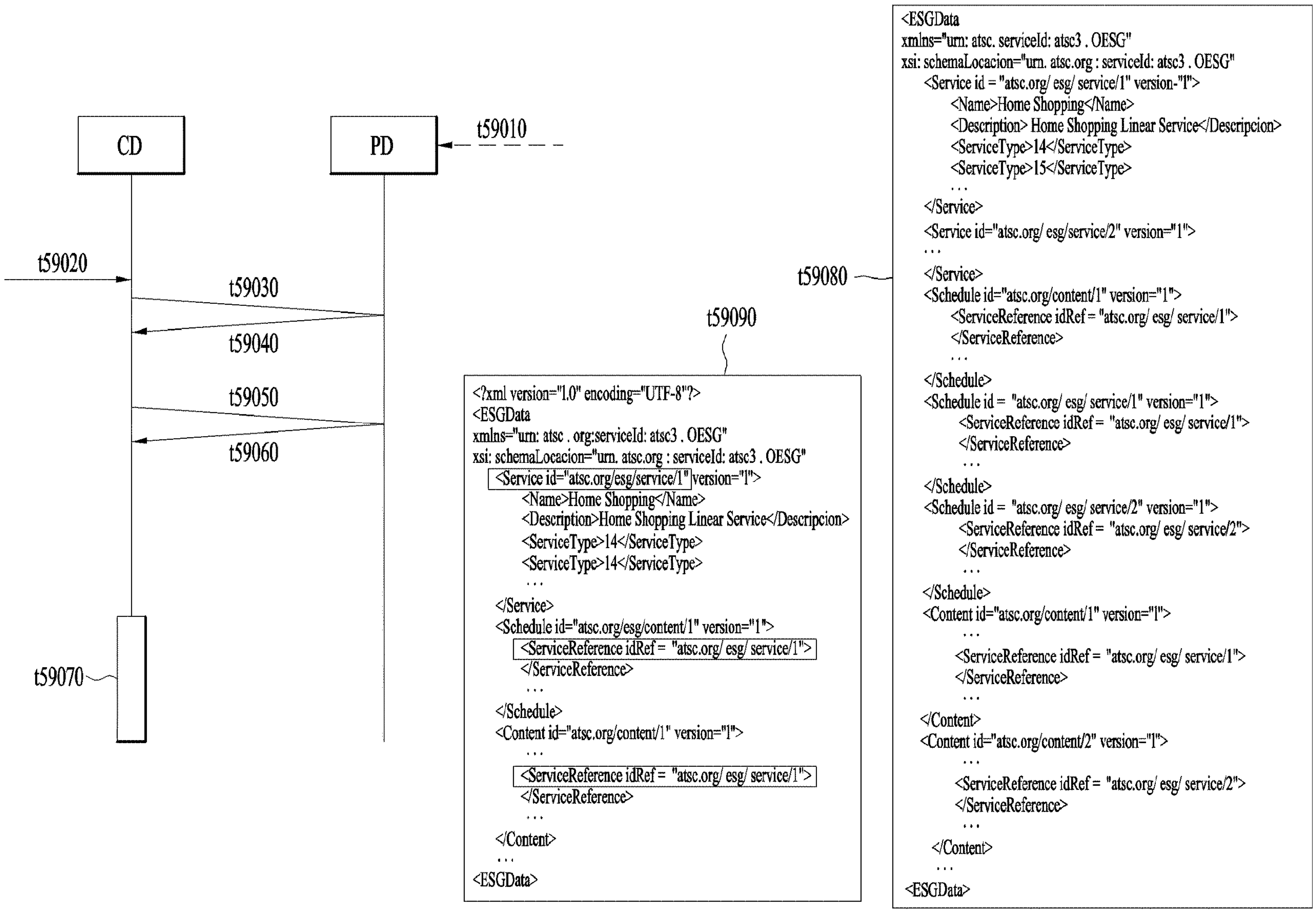
FIG. 63 is a diagram illustrating an operation of transmitting ESG data to a companion device according to a GetServiceIds action or a GetESGbyServiceIds action according to an embodiment of the present invention.

FIG. 63 is a diagram illustrating an operation of transmitting ESG data to a companion device according to a GetServiceIds action or a GetESGbyServiceIds action according to an embodiment of the present invention.

In order to minimize a network burden between a broadcast receiver and a companion device and/or a burden used to process entire ESG data by the companion device, only ESG data related to a specific service may be transmitted to the companion device. To this end, a ServiceIdsList state variable and a A_ARG_TYPE_ESGData_by_ServiceIds state variable may be defined.

The ServiceIdsList state variable may be a state variable for transmitting IDs of services described by ESG to the companion device. That is, the state variable may include service ID information items among ESG data items that have been parsed and stored by the receiver. The state variable may have a type of a list of strings or a list of URIs. Here, any type of URI may be used. In some embodiments, the state variable may be represented in the form of CSV. For example, the state variable may be represented according to atsc.org/esg/service/1, atsc.org/esg/service/2, . . . , etc.

The A_ARG_TYPE_ESGData_by_ServiceIds state variable may be a state variable for storing some ESG data of ESG. The state variable may be defined to transmit only some ESG data to the companion device. The state variable may have a fragment type of a specific form of Markup Language for representing the ESGData state variable. For example, when the ESGData state variable is an XML document, the state variable may have an XML fragment type.

Service IDs of ESG owned by the receiver may be first transmitted to the companion device using the aforementioned state variables and, accordingly, only the requested required ESG data may be transmitted to the companion device. To this end, a GetServiceIds action and a GetESGbyServiceIds action may be defined.

The GetServiceIds action may be an action of receiving IDs of a service from the receiver by the companion device. The receiver may transmit service IDs in the form of a list to the companion device among information items on a service described by ESG owned by the receiver. An input argument of the action may be none and an output argument may be the ServiceIdsList state variable.

The GetServiceIds action may be performed when a user wants to see ESG through the companion device and an ESG application, etc. are executed. In this case, ESG data may be received as a result of the corresponding action and the received ESG data may be exposed through the ESG application. In some embodiments, when the GetServiceIds action is executed using a periodic polling method to store ESG data in the companion device and, then, the ESG application is executed, the stored ESG data may be exposed to the user.

The GetESGbyServiceIds action may be defined to receive only ESG data corresponding to a specific service from the receiver by the companion device. The companion device may select a service ID of a desired service using a list of service IDs received through the GetServiceIds action. Then, the action may be performed using a list of service IDs using an input argument in order to receive ESG data of a desired service. As a result, the companion device may receive ESG data about a desired service. An input argument of the action may be a ServiceIdsList state variable and an output argument may be an A_ART_TYPE_ESGData_by_ServiceIds state variable.

The GetESGbyServiceIds action may be performed when an ESG application, etc. are executed if a user wants to see ESG through the companion device. In this case, ESG data may be received as a result of the corresponding action and the received ESG data may be exposed through the ESG application. In some embodiments, when the GetESGbyServiceIds action is executed using a periodic polling method to store ESG data in the companion device and, then, the ESG application is executed, the stored ESG data may be exposed to the user.

In some embodiments, when an input argument is set as "*" in the GetESGbyServiceIds action, all ESG data items may be set to be requested irrespective of a service ID. In some embodiments, when an input argument is set as "empty" in the GetESGbyServiceIds action, ESG data about a currently watched service may be set to be requested.

According to the present embodiment, the two devices are assumed to be paired with each other. The companion device is assumed to subscribe to the aforementioned ESG service.

The receiver may own ESG data (t59010). The ESG data may be stored in the ESGData state variable. The ESG data stored in ESGData may be ESG data about two services identified according to "atsc.org/esg/service/1" or "atsc.org/esg/service/2" (t59080).

A user may take a specific action of executing an ESG application (t59020). The specific action may be an operation that requires ESG data.

The companion device may make a request for a list of service IDs through the GetServiceIds action (t59030). The receiver may output ServiceIdsList to the companion device along with 200 OK (t59040). According to the present embodiment, a value of ServiceIdsList may be the same as (atsc.org/esg/service/1, atsc.org/esg/service/2).

When a specific service desired by a user or a companion device is a service identified according to "atsc.org/esg/service/1", the GetESGbyServiceIds action may be performed using the service ID as an input argument (t59050). The receiver may output A_ART_TYPE_ESGData_by_ServiceIds to the companion device along with 200 OK (t59060). In the present embodiment, a value of A_ART_TYPE_ESGData_by_ServiceIds may be ESG data related to a service identified according to "atsc.org/esg/service/1" (t59090).

As illustrated in the drawing, the output argument may include a Schedule element having atsc.org/esg/service/1 as a reference value and a Content element as well as a Service element having atsc.org/esg/service/1 as a service ID value. Here, the Schedule element and the Content element may be schedule and content information related to a service identified according to atsc.org/esg/service/1.

The companion device may perform an operation of parsing the received ESG data and exposing the ESG data through an ESG application using the ESG data (t59070). The companion device may perform an operation of immediately exposing ESG data or storing the ESG data once in order to expose the ESG data, like in the aforementioned embodiments.

The illustrated embodiment may be a case in which a user performs the specific action but, as described above, when the action may be first performed (irrespective of whether the specific action is performed) and, then, the user executes the ESG application, etc. at a predetermined time, ESG data that has been received and stored through the corresponding action may be exposed.

Figure 64:
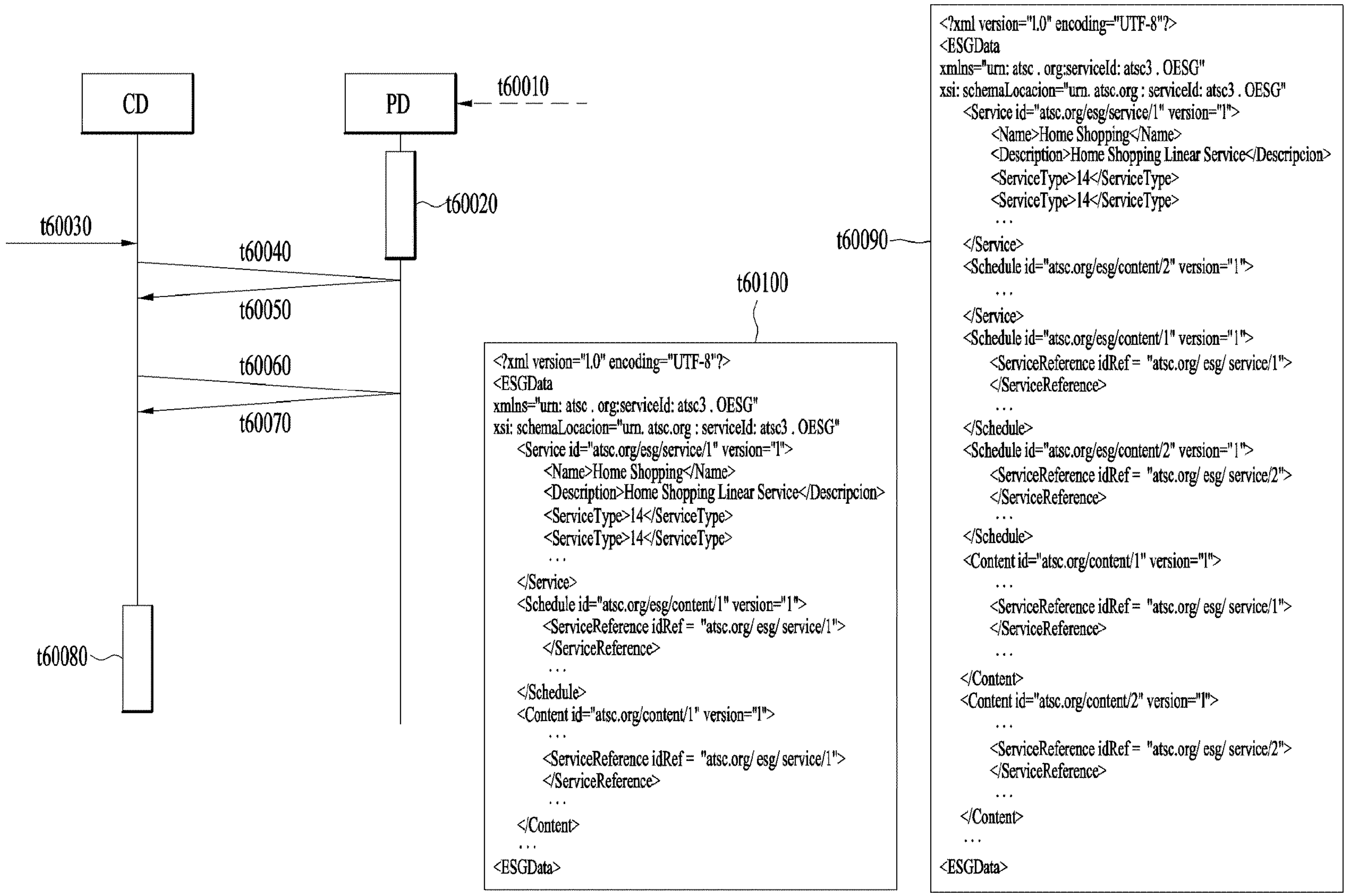
FIG. 64 is a diagram illustrating an operation of transmitting ESG data to a companion device according to a GetCurrentServiceId action according to an embodiment of the present invention.

FIG. 64 is a diagram illustrating an operation of transmitting ESG data to a companion device according to a GetCurrentServiceId action according to an embodiment of the present invention.

It may be needed to transmit ESG data about a currently watched service in a receiver to the companion device. To this end, a service ID of the currently watched service may be transmitted to the companion device. To this end, a CurrentServiceId state variable and a GetCurrentServiceId action may be defined.

The CurrentServiceId state variable may store a service ID of a currently watched service in a receiver among ESG data items of the receiver. The state variable may be a string or specific URI type.

The GetCurrentServiceId action may be an action for receiving a service ID of a currently watched service in a receiver by the companion device. An input argument of the action may be none and an output argument may be the CurrentServiceId state variable.

The GetCurrentServiceId action may be performed when a user wants to see ESG through the companion device and an ESG application, etc. are executed. In this case, ESG data may be received as a result of the corresponding action and the received ESG data may be exposed through the ESG application. In some embodiments, when the GetCurrentServiceId action is executed using a periodic polling method to store ESG data in the companion device and, then, the ESG application is executed, the stored ESG data may be exposed to the user.

According to the present embodiment, the two devices are assumed to be paired with each other. The companion device is assumed to subscribe to the aforementioned ESG service.

The receiver may own ESG data (t60010). The ESG data may be stored in the ESGData state variable. The ESG data stored in ESGData may be ESG data about two services identified according to "atsc.org/esg/service/1" or "atsc.org/esg/service/2" (t60090).

The receiver may periodically signal currently watched broadcast and update a service ID of a currently watched service to the CurrentServiceId state variable. The user may take a specific action of executing an ESG application (t60030). The specific action may be an operation that requires ESG data.

The companion device may make a request for an ID of a currently watched service through the GetCurrentServiceId action (t60040). The receiver may output the CurrentServiceId state variable to the companion device along with 200 OK (t60050).

According to the present embodiment, a value of the CurrentServiceId state variable may be "atsc.org/esg/service/1".

The companion device may perform the GetESGbyServiceIds action to make a request for ESG data related to a currently watched service (t60060). According to the present embodiment, an input argument of the GetESGbyServiceIds action may be atsc.org/esg/service/1. The receiver may output the A_ART_TYPE_ESGData_by_ServiceIds state variable to the companion device along with 200 OK (t60070). According to the present embodiment, a value of the A_ART_TYPE_ESGData_by_ServiceIds may be ESG data related to a service identified according to "atsc.org/esg/service/1" (t60100). As illustrated in the drawing, an output argument may include a Schedule element having atsc.org/esg/service/1 as a reference value and a Content element as well as a Service element having atsc.org/esg/service/1 as a service ID value. Here, the Schedule element and the Content element may be schedule and content information related to a service identified according to atsc.org/esg/service/1.

The companion device may perform an operation of parsing the received ESG data and exposing the ESG data through an ESG application using the ESG data (t60080). The companion device may perform an operation of immediately exposing ESG data or storing the ESG data once in order to expose the ESG data, like in the aforementioned embodiments.

The illustrated embodiment may be a case in which a user performs the specific action but, as described above, when the action may be first performed (irrespective of whether the specific action is performed) and, then, the user executes the ESG application, etc. at a predetermined time, ESG data that has been pre-received and stored through the corresponding action may be exposed.

Figure 65:
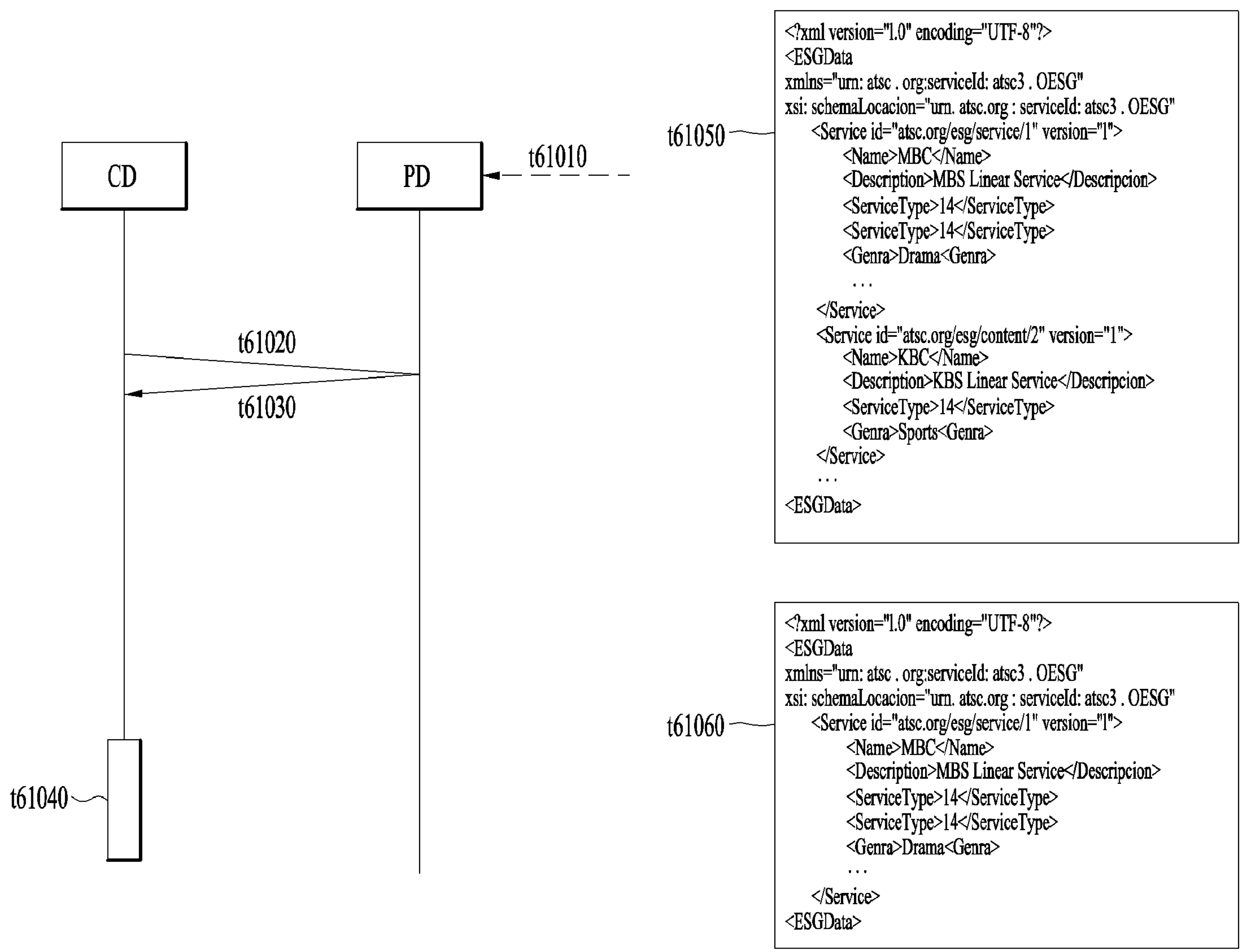
FIG. 65 is a diagram illustrating an operation of transmitting ESG data to a companion device according to a SearchESG action according to an embodiment of the present invention.

FIG. 65 is a diagram illustrating an operation of transmitting ESG data to a companion device according to a SearchESG action according to an embodiment of the present invention.

Upon making a request for ESG data to the receiver, the companion device may make a request for corresponding ESG data only when a specific field of the ESG data has a specific value (target value). To this end, the A_ART_TYPE_SearchField state variable, the A_ART_TYPE_TargetValue state variable, and the SearchESG action may be defined.

The A_ART_TYPE_SearchField state variable may indicate a specific field to be determined by the companion device. That is, the state variable may be a list of names of element/attributes of the ESGData state variable. For example, a value of the Service@id, Service.Genre, etc. may be stored in the state variable. The state variable may have a list type of strings. The state variable may also be referred to as SearchField.

The A_ART_TYPE_TargetValue state variable may store a specific value of a specific field determined by the companion device, that is, a target value. The target value may be used to determine whether the determined specific field has the corresponding target value. ESG data may be searched for using the target value. The state variable may have a list type of strings. The state variable may also be referred to as TargetValue.

The SearchESG action may be an action for searching for and making a request for ESG data in the receiver by the companion device. As an input argument of the action, a specific field (SearchField) and/or a target value (TargetValue) may be defined. The receiver may search for ESG data according to whether the corresponding specific field has a corresponding target value. Upon searching for ESG data that satisfies a corresponding condition, the receiver may output all related ESG data items to the companion device. When any data is not matched, no data may be output. In some embodiments, only some ESG data items are matched, ESG information may also be transmitted.

As an output argument, the A_ART_TYPE_ESGData state variable may be defined and may be a state variable for storing some ESG data items of ESG like the aforementioned A_ART_TYPE_ESGData_by_ServiceIds state variable. The A_ART_TYPE_ESGData state variable may also be referred to as SearchedESGData.

The SearchESG action may be performed when a user wants to see ESG through the companion device and an ESG application, etc. are executed. In this case, ESG data may be received as a result of the corresponding action and the received ESG data may be exposed through the ESG application. In some embodiments, when the SearchESG action is executed using a periodic polling method to store ESG data in the companion device and, then, the ESG application is executed, the stored ESG data may be exposed to the user.

First, in the present embodiment, two devices are assumed to be already paired with each other. In addition, the companion device is assumed to subscribe the aforementioned ESG service.

The receiver may have own ESG data (t61010). The ESG data may be stored in the ESGData state variable. ESG data stored in the ESGData may be ESG data about a service identified according to "atsc.org/esg/service/1" and having a Service.Genre value of Drama and a service identified according to "atsc.org/esg/service/2" and having a Service.Genre value of Sports (t61050).

The companion device may make a request for ESG data using the SearchESG action (t61020). Here, an input argument of the corresponding action may be the same as ("Service@id, Service.Genre", "atsc.org/esg/service/1, Drama"). This is used to search for ESG data with a service ID of atsc.org/esg/service/1 and Drama as a value of sub element Genre of the Service element.

The receiver may search for ESG data matched with a corresponding condition and output the corresponding ESG data to the companion device along with 200 OK (t61030). In the present embodiment, ESG data related to a service identified according to "atsc.org/esg/service/1" matched with the corresponding condition may be output.

The companion device may perform an operation of parsing the received ESG data and exposing the ESG data through an ESG application using the ESG data (t61040). The companion device may perform an operation of immediately exposing ESG data or storing the ESG data once in order to expose the ESG data, like in the aforementioned embodiments.

Figure 66:
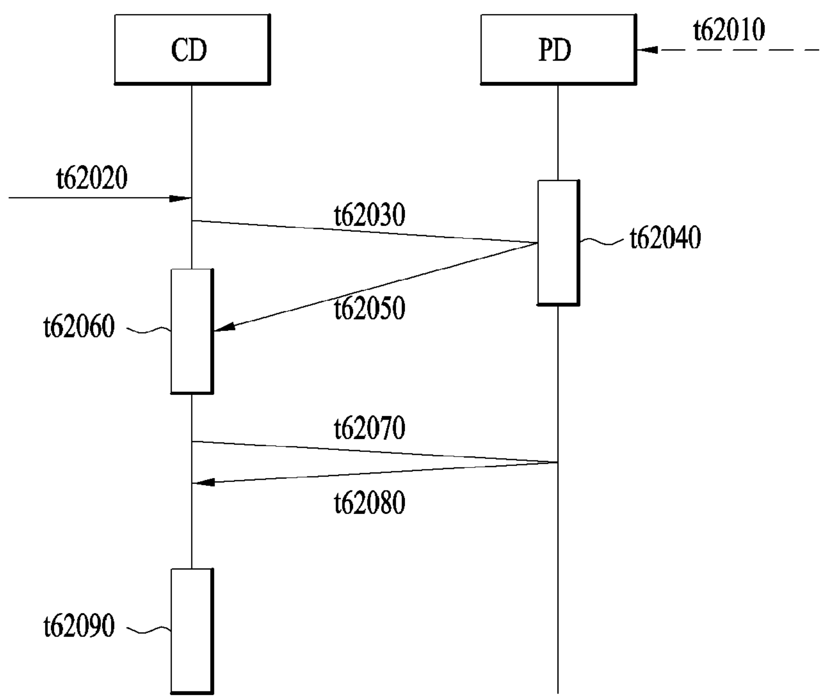
FIG. 66 is a diagram illustrating an authentication procedure of transmitting ESG data according to a DoAuthenticationForESG action according to an embodiment of the present invention.

FIG. 66 is a diagram illustrating an authentication procedure of transmitting ESG data according to a DoAuthenticationForESG action according to an embodiment of the present invention.

During exchange of ESG data between a receiver and a companion device, an unintended application, for example, an application for hacking may make a request for ESG information. In order to prevent this, authentication procedure for security may be required.

To this end, a CompanionDeviceId state variable, a CompanionDeviceAppId state variable, a CompanionDeviceAppVersion state variable, a PrimaryDeviceId state variable, and a DoAuthenticationForESG action may be defined.

The CompanionDeviceId state variable may be a state variable for storing ID information of the companion device. A unique value for identifying the companion device may be stored in the state variable. As a device ID, a MAC address or the like may be used and may also be encrypted for security (e.g. hashed Mac address). The state variable may be a string or a specific URI type.

The CompanionDeviceAppId state variable may be a state variable for storing ID information of an application to be executed to use ESG by the companion device. Here, the application may be a concept including both a native app of the companion device and a browser-based app. The state variable may be a string or a specific URI type.

The CompanionDeviceAppVersion state variable may be a state variable for storing version information of an application to be executed to use ESG by the companion device.

The receiver may determine whether ESG information is provided using the version information. The state variable may be a hexBinary or integer type.

The PrimaryDeviceId state variable may be a state variable for storing device ID information of a receiver, that is, a primary device. The companion device may identify the receiver using the state variable. The companion device may determine whether received information is from an unintended receiver or whether a searched receiver is a specific receiver that has made a request for ESG when a plurality of receivers are searched in a home network, using the state variable. The state variable may be a string or a specific URI type.

The DoAuthenticationForESG action may be an action for performing an authentication procedure for security before the companion device makes a request for ESG data to a receiver. Through the authentication procedure, whether ESG data is permitted to be exchanged may be determined. As an input argument, an ID of the companion device, an app ID of the companion device, and/or app version information of the companion device may be input and transmitted to the receiver. The information items may be referred to as authentication information. Upon receiving the authentication information, the receiver may determine whether a companion device or an app for ESG makes a request for the authentication information. Upon receiving an app of a normal companion device, the receiver may output a device ID of the receiver to the companion device. The companion device may check whether the receiver is a target to which the companion device makes a request for ESG with reference to the received ID of the receiver. After the authentication procedure is terminated, actual ESG data may be receive according to a mechanism such as action/eventing proposed according to the present invention. An input argument of the action may be states variables of CompanionDeviceId, CompanionDeviceAppId, and CompanionDeviceAppVersion and an output argument of the action may be a PrimaryDeviceId state variable.

The DoAuthenticationForESG action may be performed when a user wants to see ESG through the companion device and an ESG application, etc. are executed. In some embodiments, the DoAuthenticationForESG action may be performed using a periodic polling method and an authentication procedure may be performed.

According to the present embodiment, the two devices are assumed to be paired with each other. The companion device is assumed to subscribe to the aforementioned ESG service.

The receiver may own ESG data (t62010). The ESG data may be stored in the state variable ESGData. The user may take a specific action of executing an ESG application (t62020). The specific action may be an operation that requires ESG data.

The companion device may perform the DoAuthenticationForESG action (t62030).

Thereby, authentication information may be transmitted to the receiver. The receiver may determine whether a corresponding companion device is authenticated using the received authentication information (t62040). When the companion device is authenticated, the receiver may output a device ID of the receiver to the companion device along with 200 OK (t62050). The companion device may determine whether the companion device is a receiver that is permitted to make a request for ESG data using the received ID of the receiver (t62060).

Then, in some embodiments, the companion device may make a request for and receive ESG data (t62070 and t62080). The companion device may perform an operation of parsing the received ESG data and exposing the ESG data through an ESG application using the ESG data (t62070). The companion device may perform an operation of immediately exposing ESG data or storing the ESG data once in order to expose the ESG data, like in the aforementioned embodiments.

The illustrated embodiment may be a case in which a user performs the specific action but, as described above, when the action may be first performed (irrespective of whether the specific action is performed) and, then, the user executes the ESG application, etc. at a predetermined time, the authentication procedure is already terminated and, thus, operations of transmitting ESG data may be immediately performed.

Figure 67:
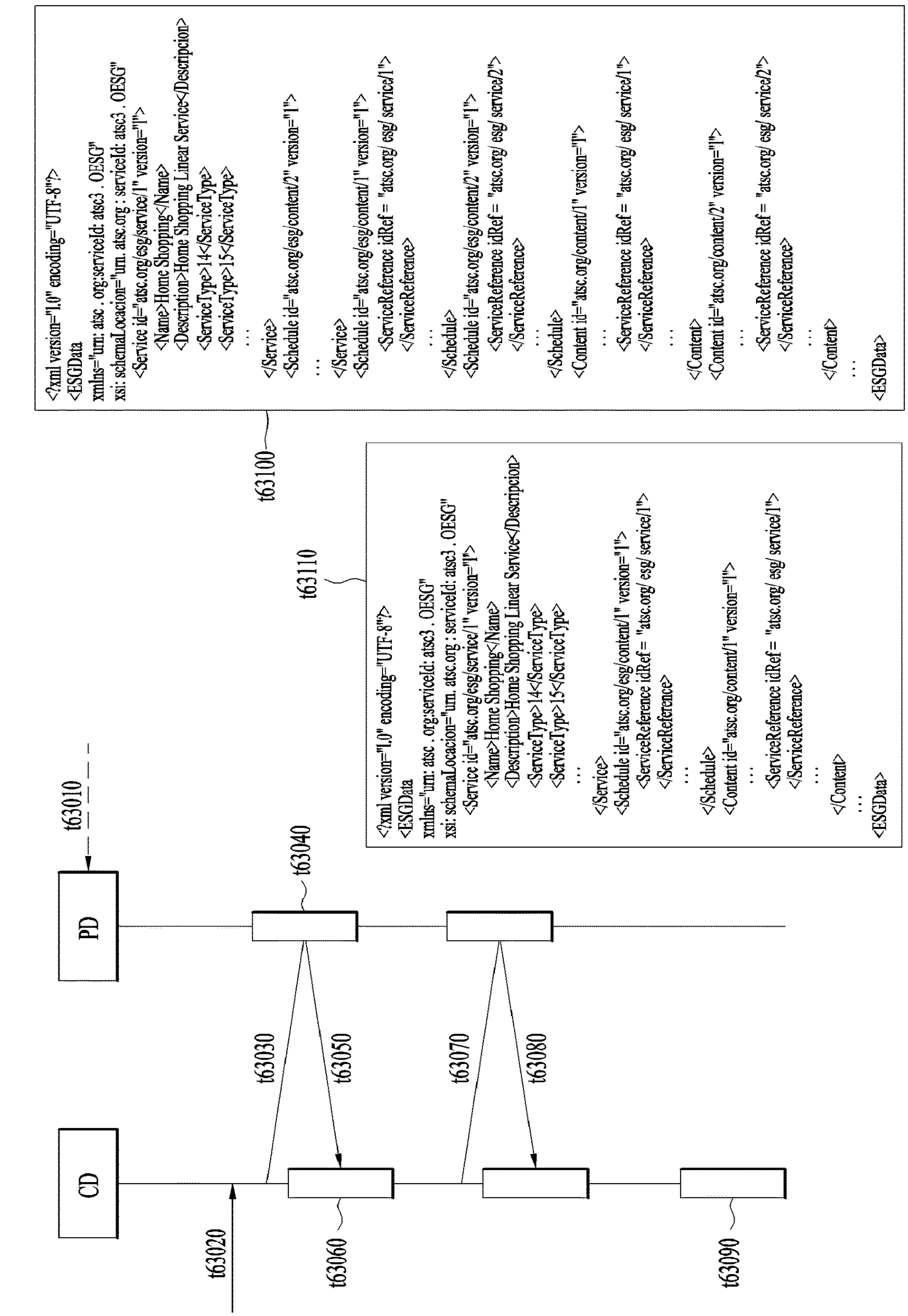
FIG. 67 is a diagram illustrating an operation of transmitting ESG data to a companion device simultaneously with device authentication according to GetServiceIds and GetESGbyServiceIds actions according to another embodiment of the present invention.

FIG. 67 is a diagram illustrating an operation of transmitting ESG data to a companion device simultaneously with device authentication according to GetServiceIds and GetESGbyServiceIds actions according to another embodiment of the present invention.

As described above, a separate action may be defined for authentication. In the present embodiment, existing actions may be extended and authentication may be performed without definition of a separate action and, simultaneously, original purpose of the existing actions may be performed. Here, actions as an extension target may be the all actions stated in the present invention. With regard to the actions as an extension target, as well as the existing defined an input/output argument, CompanionDeviceId, CompanionDeviceAppId, and CompanionDeviceAppVersion state variables may be added as an input argument and a PrimaryDeviceId state variable may be added as an output argument.

According to the present embodiment, the GetServiceIds action and the GetESGbyServiceIds action may be extended. The present invention may not be limited only to extension of the corresponding action.

The GetServiceIds action may be extended to have CompanionDeviceId, CompanionDeviceAppId, and CompanionDeviceAppVersion state variables as an input argument and to have a PrimaryDeviceId state variable as well as an existing ServiceIdsList state variable as an output argument. Upon receiving authentication information and determining that transmission is permitted according to the action, the receiver may transmit IDs of services along with a device ID of the receiver to the companion device. The companion device may determine whether the received service IDs are available with reference to the received device ID of the receiver.

The GetESGbyServiceIds action may be extended to have CompanionDeviceId, CompanionDeviceAppId, and CompanionDeviceAppVersion state variables as well as an existing ServiceIdsList state variable as an input argument and to have an existing A_ART_TYPE_ESGData_by_ServiceIds state variable as an output argument. Upon receiving authentication information and service IDs and determining that transmission is permitted according to the action, the receiver may transmit ESG data of a related service along with a device ID of the receiver to the companion device. The companion device may determine whether the received ESG data is available with reference to the received device ID of the receiver.

The extended actions may be performed when a user wants to see ESG through the companion device and an ESG application, etc. are executed. In this case, ESG data may be received as a result of the corresponding action and the received ESG data may be exposed through the ESG application. In some embodiments, the extended actions are executed using a periodic polling method to store ESG data in the companion device and, then, the ESG application is executed, the stored ESG data may be exposed to the user.

First, in the present embodiment, two devices are assumed to be already paired with each other. In addition, the companion device is assumed to subscribe the aforementioned ESG service.

The receiver may have own ESG data (t63010). The ESG data may be stored in the ESGData state variable. The ESG data stored in ESGData may be ESG data about two services identified according to "atsc.org/esg/service/1" and "atsc.org/esg/service/2" (t63100).

A user may take a specific action of executing an ESG application (t63020). The specific action may be an operation that requires ESG data.

The companion device may make a request for a list of service IDs through the GetServiceIds action (t63030). In this case, authentication information may also be transmitted to the receiver. The receiver may determine whether the companion device is authenticated using the authentication information (t63040). When the companion device is authenticated, the receiver may output ServiceIdsList along with 200 OK to the companion device (t63050). According to the present embodiment, a value of ServiceIdsList may be the same as (atsc.org/esg/service/1, atsc.org/esg/service/2). In this case, a device ID of the receiver may also be transmitted. The companion device may determine whether the companion device is a receiver that is permitted to make a request for ESG data using the received ID of the receiver (t63060).

When a specific service desired by a user or a companion device is identified according to "atsc.org/esg/service/1", the GetESGbyServiceIds action may be performed using this as an input argument (t63070). In this case, authentication information may also be transmitted to a receiver. In some embodiments, the authentication procedure may be considered to be redundant and, thus, may be omitted. When the authentication procedure is omitted, an existing general GetESGbyServiceIds action may be performed. When the receiver is authenticated, the receiver may output A_ART_TYPE_ESGData_by_ServiceIds along with 200 OK to the companion device (t63080). According to the present embodiment, a value of A_ART_TYPE_ESGData_by_ServiceIds may be ESG data related to a service identified according to "atsc.org/esg/service/1" (t63110). As illustrated in the drawing, the output argument may include a Schedule element with atsc.org/esg/service/1 as a reference value and a Content element as well as a Service element with atsc.org/esg/service/1 as a service ID value. Here, the Schedule element and the Content element may be schedule and content information related to a serviced identified according to atsc.org/esg/service/1.

The companion device may perform an operation of parsing the received ESG data and exposing the ESG data through an ESG application using the ESG data (t63090). The companion device may perform an operation of immediately exposing ESG data or storing the ESG data once in order to expose the ESG data, like in the aforementioned embodiments.

The illustrated embodiment may be a case in which a user performs the specific action but, as described above, when the action may be first performed (irrespective of whether the specific action is performed) and, then, the user executes the ESG application, etc. at a predetermined time, ESG data that has pre-received and stored through the corresponding action may be exposed.

Figure 68:
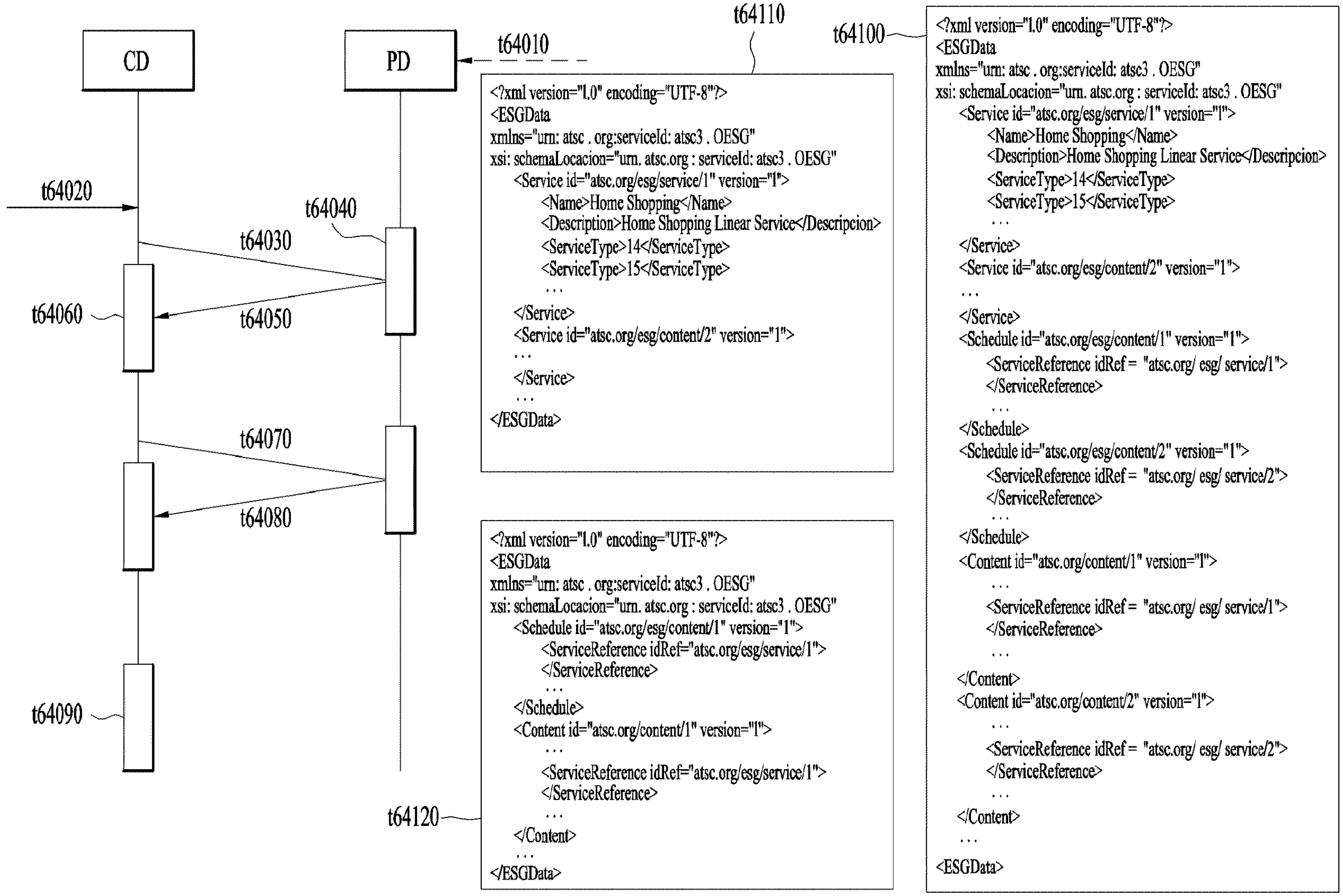
FIG. 68 is a diagram illustrating an operation of transmitting ESG data to a companion device according to a GetService action according to an embodiment of the present invention.

FIG. 68 is a diagram illustrating an operation of transmitting ESG data to a companion device according to a GetService action according to an embodiment of the present invention.

In the case of a service of ESG data, an updating frequency of adding a new service or deleting a service may be low. Accordingly, when ESG data about a service is continuously requested/transmitted, unnecessary network overload may be caused. To overcome this, a NumOfServices state variable, an A_ARG_TYPE_ESGData_Service state variable, and a GetService action may be defined. In addition, another embodiment of the aforementioned GetESGbyServiceIds action may be defined.

The NumOfServices state variable may be a state variable for storing the total number of services described by ESG of the receiver. A value of the state variable may be referred to configure a service list. For example, a value of the state variable may be used to check validation during configuration of a service list. The state variable may be a type of an integer.

The A_ARG_TYPE_ESGData_Service state variable may be a state variable for storing only ESG data corresponding to a Service element of ESG of the receiver. The state variable may have a fragment type of a specific form of Markup Language for representing the ESGData state variable. For example, when the ESGData state variable is an XML document, the state variable may have an XML fragment type.

The GetService action may be an action for receiving ESG data related to a service among ESG information items from the receiver by the companion device. The companion device may receive ESG data (ESG data items except for Service element) related to a specific service using ESG data (Service elements) received through the action. The companion device may compare the total number of services indicated by a NumOfServices state variable and the number of the received Service elements to refer the result to configure a service list. During this procedure, the aforementioned authentication procedure may be used. That is, the GetService action may be extended form including additional input/output argument for authentication. In some embodiments, a GetService action without additional variable for authentication may be used.

An input argument of the action may be state variables corresponding to the aforementioned authentication input argument. An output argument may be a PrimaryDeviceId state variable, a NumOfServices state variable, or an A_ARG_TYPE_ESGData_Service state variable.

Another embodiment of the aforementioned GetESGbyServiceIds action may be defined. The GetESGbyServiceIds action according to another embodiment may be an action for receiving the remaining ESG data related to a specific service using service IDs of a specific service as input by the companion device. Here, the remaining ESG data may be ESG data except for the corresponding Service element, that is, ESG data corresponding to Content and Schedule elements related to the corresponding service. Similarly, the action may also be defined in an extended form including additional variables for the aforementioned authentication.

The GetService and GetESGbyServiceIds actions may be performed when a user wants to see ESG through the companion device and an ESG application, etc. are executed. In this case, ESG data may be received as a result of the corresponding action and the received ESG data may be exposed through the ESG application. In some embodiments, when the GetService and GetESGbyServiceIds actions are executed using a periodic polling method to store ESG data in the companion device and, then, the ESG application is executed, the stored ESG data may be exposed to the user.

According to the present embodiment, the two devices are assumed to be paired with each other. The companion device is assumed to subscribe to the aforementioned ESG service.

The receiver may own ESG data (t64010). The ESG data may be stored in the ESGData state variable. The ESG data stored in ESGData may be ESG data about two services identified according to "atsc.org/esg/service/1" or "atsc.org/esg/service/2" (t64100). A user may take a specific action of executing an ESG application (t64020). The specific action may be an operation that requires ESG data.

The companion device may perform the GetService action to make a request for ESG data about a service (t64030). Upon determining that the companion and/or app are authenticated (t64040), the receiver may output the A_ARG_TYPE_ESGData_Service state variable along with 200 OK to the companion device (t64050). Here, the A_ARG_TYPE_ESGData_Service state variable may include only ESG data about a Service element of ESG data of the receiver (t64110). The companion device may perform authentication using the received device ID of the receiver to determine whether the data is reliable information (t64060).

The companion device may perform the GetESGbyServiceIds action to make a request for the remaining ESG data related to a specific service (t64070). In the present embodiment, a ServiceIdsList input argument value of the GetESGbyServiceIds action may be atsc.org/esg/service/1. Upon determining that the companion and/or app are authenticated, the receiver may output the A_ARG_TYPE_ESGData_by_ServiceIds state variable along with 200 OK (t64080). According to the present embodiment, the output A_ARG_TYPE_ESGData_by_ServiceIds state variable may be ESG data related to a service identified according to atsc.org/esg/service/1 (t64120). As illustrated in the drawing, the output argument may include a Schedule element having atsc.org/esg/service/1 as a reference value and a Content element. The output argument may not include a Service element identified according to atsc.org/esg/service/1.

The companion device may perform an operation of parsing the received ESG data and exposing the ESG data through an ESG application using the ESG data (t64090). The companion device may perform an operation of immediately exposing ESG data or storing the ESG data once in order to expose the ESG data, like in the aforementioned embodiments.

The illustrated embodiment may be a case in which a user performs the specific action but, as described above, when the action may be first performed (irrespective of whether the specific action is performed) and, then, the user executes the ESG application, etc. at a predetermined time, ESG data that has been pre-received and stored through the corresponding action may be exposed.

Figure 69:
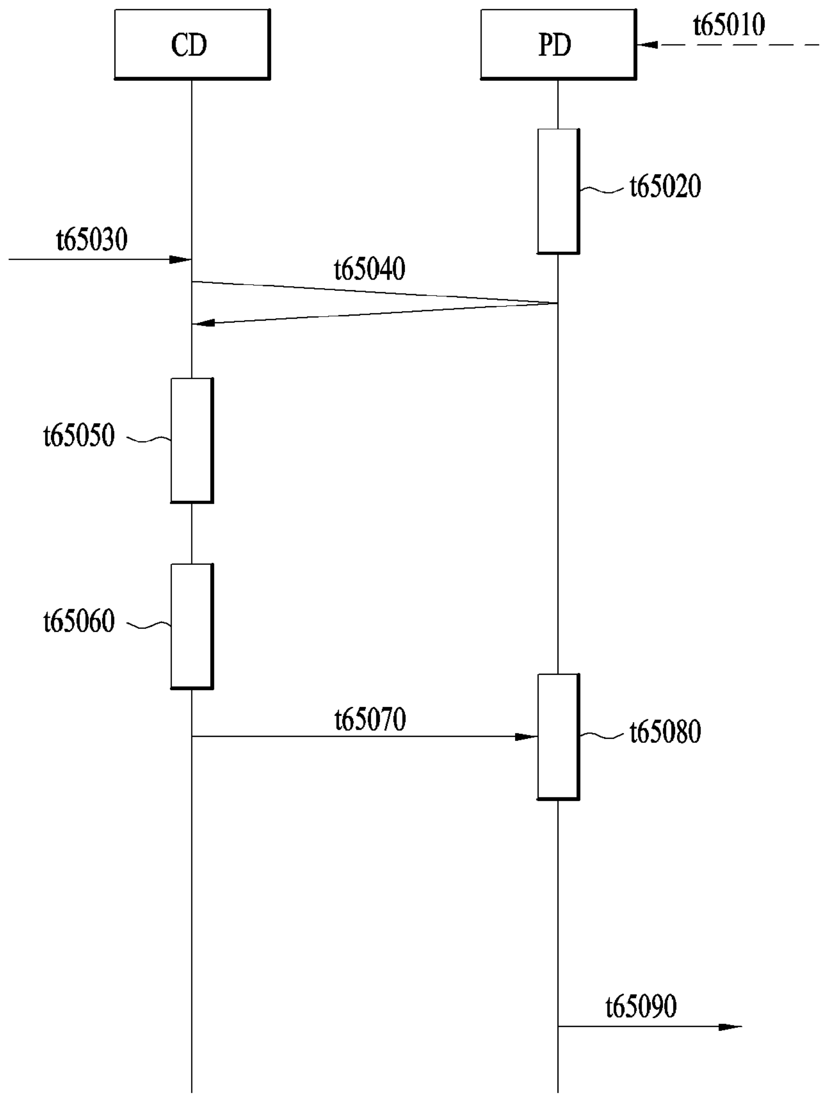
FIG. 69 is a diagram illustrating a procedure of changing a service of a broadcast receiver by a companion device according to a SetChangeChannel action according to an embodiment of the present invention.

FIG. 69 is a diagram illustrating a procedure of changing a service of a broadcast receiver by a companion device according to a SetChangeChannel action according to an embodiment of the present invention.

ESG information transmitted to the companion device may be exposed to the user through a user interface (UI). A service indicated by the ESG may be checked and selected by a user. In this case, a device to which a service is actually provided is a receiver and, thus, information for changing a service needs to be transmitted to the receiver to change a service.

To this end, the A_ARG_TYPE_SelectedServiceId state variable and the SetChangeChannel action may be defined.

The A_ARG_TYPE_SelectedServiceId state variable may be a state variable for storing a service ID of the service that is selected through ESG data by a user in a companion device. The state variable may be a string or a specific URI type.

The SetChangeChannel action may be an action for changing a service provided to a receiver by a companion device. The input argument may be an A_ARG_TYPE_SelectedServiceId state variable. The user may select a specific service while seeing ESG through the companion device. In this case, an ID of a corresponding service may be stored as an input argument. When the corresponding action is performed, the receiver may change a channel to a service with a corresponding service ID according to a value of the input argument. The output argument may be none.

According to the present embodiment, the two devices are assumed to be paired with each other. The companion device is assumed to subscribe to the aforementioned ESG service.

The receiver may own ESG data (t65010). The ESG data may be stored in the ESGData state variable. The user may take a specific action of executing an ESG application (t65030). The specific action may be an operation that requires ESG data.

The companion device may make a request for ESG data through the aforementioned GetESGData action and receive ESG data (t65040). The The illustrated embodiment may be a case in which a user performs the specific action but, as described above, when the action may be first performed (irrespective of whether the specific action is performed) and, then, the user executes the ESG application, etc. at a predetermined time, ESG data that has been pre-received and stored through the corresponding action may be exposed.

The companion device may perform an operation of parsing the received ESG data and exposing the ESG data through an ESG application using the ESG data (t65050). The companion device may perform an operation of immediately exposing ESG data or storing the ESG data once in order to expose the ESG data, like in the aforementioned embodiments.

The user may select a service through the UI of the companion device while seeing ESG (t65060). For example, the user may attempt to change a current channel to an NBCU channel. The companion device may perform the SetChangeChannel action (t65070). A service ID corresponding to the NBCU channel may be transmitted to the receiver through the action.

The receiver may change a channel to a corresponding service using the received service ID (t65080). The service may be changed to NBCU and provided to the user (t65090).

Figure 70:
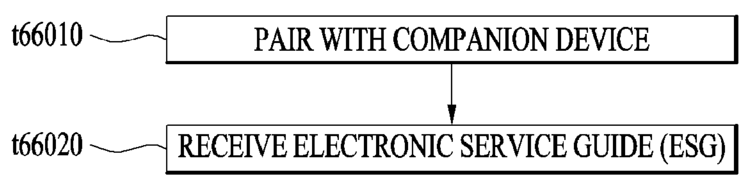
FIG. 70 is a diagram illustrating a method of providing a broadcast service according to an embodiment of the present invention.

FIG. 70 is a diagram illustrating a method of providing a broadcast service according to an embodiment of the present invention.

The method of providing a broadcast service by a broadcast receiver according to an embodiment of the present invention may include paring the broadcast receiver with a companion device and/or receiving electronic service guide (ESG).

A network interface unit of the broadcast receiver may be paired with the companion device (t66010). Here, the network interface unit may correspond to a network interface of the aforementioned broadcast receiver. For pairing, technology such as UPnP may be used but technology for pairing may not be limited thereto.

A receiving unit of the broadcast receiver may receive ESG and specific service guide. Here, the receiving unit may be a broadcast interface or a network interface of the aforementioned broadcast receiver. When ESG is received through a broadcast network, the receiving unit may correspond to a broadcast interface and when ESG is received through the Internet, the receiving unit may correspond to a network interface. That is, in some embodiments, the network interface unit and the receiving unit may be the same block/module.

According to the present embodiment, ESG may include ESG data about at least one broadcast service. Here, the ESG data may refer to data included in the ESG or element/attributes in the ESG. The broadcast service may correspond to the aforementioned service or channel.

The method of providing a broadcast service according to an embodiment of the present invention, the ESG data may be service type information, schedule information, related content information, or related component information of the aforementioned at least one broadcast service. The ESG data may be each of the aforementioned type attributes of the Service element, the Schedule element, the Content element, or the Component element.

Here, related content and related components may refer to content related to a service described by the ESG and a component related thereto.

The method of providing a broadcast service according to an embodiment of the present invention may further include transmitting information on modified content of the received ESG to the companion device. The operation may be performed by the aforementioned network interface unit. Here, the information on modified content may include added, modified, or deleted ESG data of the received ESG compared with pre-stored ESG data. Here, the information on modified content may be the aforementioned LastChangedESGData state variable. The added, modified, and deleted ESG data may be Addition, Modification, and Deletion elements, respectively.

The method of providing a broadcast service according to an embodiment of the present invention may further include transmitting an ID list of broadcast services included in the received ESG to the companion device, receiving a request for ESG data related to specific broadcast services identified according to at least one ID of an ID list from the companion device, and transmitting ESG data related to the requested specific broadcast service to the companion device. The service ID list may be transmitted through the aforementioned GetServiceIds action. The request and transmission of the ESG data according to an ID may be performed through the aforementioned GetESGbyServiceIds action.

The method of providing a broadcast service according to an embodiment of the present invention may further include receiving a request for an ID of a currently watched broadcast service from the companion device and transmitting the ID of the currently watched broadcast service to the companion device, receiving a request for ESG data related to the currently watched broadcast service, and transmitting the requested ESG data related to the currently watched broadcast service to the companion device. The ID of the currently watched service may be transmitted through the aforementioned GetCurrentServiceId action.

The request and transmission of the ESG data according to an ID may be performed through the aforementioned GetESGbyServiceIds action.

The method of providing a broadcast service according to an embodiment of the present invention may further include receiving a target value of a search field indicating a specific field of ESG data and a target value of a specific field from the companion device, selecting ESG data having the target value of the specific field indicated by the search field by a control unit, and transmitting the selected ESG data to the companion device. The search field and the target value of the specific field may correspond to the aforementioned A_ART_TYPE_SearchField state variable and A_ART_TYPE_TargetValue state variable, respectively. Selection and transmission of ESG data may be performed through the aforementioned SearchESG action. Here, the control unit may correspond to a control unit of a main physical device of the aforementioned broadcast receiver.

The method of providing a broadcast service according to an embodiment of the present invention may further include receiving authentication information of a companion device from a companion device, the authentication information including device ID information of the companion device, checking whether the companion device is authenticated using the authentication information by an authentication module, and when the companion device is checked to be authenticated, transmitting device ID information of the broadcast receiver to the companion device. Here, the authentication information may correspond to the aforementioned CompanionDeviceId, CompanionDeviceAppId, and/or CompanionDeviceAppVersion state variables. The device ID of the broadcast receiver may correspond to the aforementioned PrimaryDeviceId state variable. An operation of transmitting the authentication information, checking authentication, and transmitting a receiver device ID may be performed through the aforementioned DoAuthenticationForESG action. Here, the authentication module may be a block/module that is positioned inside/outside the broadcast receiver and performs the aforementioned operations related to authentication. In some embodiments, the authentication module may be integrated with the aforementioned control or network interface.

In the method of providing a broadcast service according to an embodiment of the present invention, the transmitting of the ID list to the companion device may include receiving a request for the ID list from the companion device, the request for the ID list including authentication information of the companion device, checking whether the companion device is authenticated using the authentication information by an authentication module; and when the companion device is checked to be authenticated, transmitting the ID list and device ID information of a broadcast receiver to the companion device. The present embodiment may be obtained by extending the aforementioned embodiment of transmission of ESG through a service ID list to the case in which the GetServiceIds action performs authentication.

The method of providing a broadcast service according to an embodiment of the present invention may further include receiving a request for change in a currently watched broadcast service from the companion device, the request for change in the currently watched broadcast service being based on the received ESG data, and changing a broadcast service watched in a broadcast receiver according to the request for change in the broadcast service by a control unit. The receiving of the request for broadcast and the changing of the service based on the request may be performed by the aforementioned SetChangeChannel action.

The aforementioned method of providing a broadcast service may be described in terms of a companion device. The present invention also includes the case in which the aforementioned embodiments are performed in terms of the companion device. For example, the companion device may receive information of modified content of ESG or may request an ID list of a service and receive related ESG data using the ID. The companion device may make a request for an ID of a currently watched service and receive related ESG data using the ID. The companion device may transmit a search field indicting a specific field and a specific value to a receiver and receive matched ESG data and may transmit authentication information to the receiver and perform authentication. The companion device may make a request for change in a currently watched service. Communication with the receiver may be performed by the aforementioned network interface inside/outside the companion device. Overall operations such as a search field related operation, a service change request related operation, and an ESG data related processing operation may be performed by the aforementioned control unit inside/outside the companion device. The companion device may include an authentication module that performs an authentication related operation.

Each of the aforementioned operations may be omitted or replaced with another operation with the same or similar function.

Figure 71:
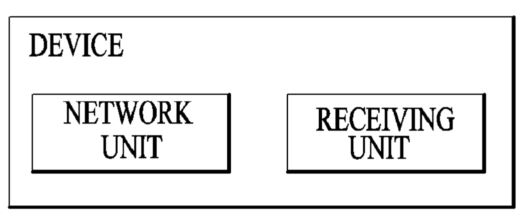
FIG. 71 is a diagram of a broadcast receiver according to an embodiment of the present invention.

FIG. 71 is a diagram of a broadcast receiver according to an embodiment of the present invention.

The broadcast receiver according to an embodiment of the present invention may include a network interface unit and/or a receiving unit. The broadcast receiver according to another embodiment of the present invention may further include a control unit and/or an authentication module. Each block, module, and unit are the same as the aforementioned description.

According to an embodiment of the present invention, the broadcast receiver and module/block/units therein may perform embodiments of providing the aforementioned method of providing a broadcast service by a broadcast receiver.

According to an embodiment of the present invention, the companion device may include a network interface unit and/or a receiving unit. According to another embodiment of the present invention, the companion device may further include a control unit and/or an authentication module. Each block, module, and unit are the same as the aforementioned description.

According to an embodiment of the present invention, the companion device and module/block/units therein may perform the aforementioned embodiments of providing a broadcast service by the companion device.

The aforementioned broadcast receiver, the block/module/unit, etc. in the companion device may be processors that perform consecutive procedures stored in a memory or, in some embodiments, may be hardware elements positioned inside/outside a device.

Each of the aforementioned block/module/units may be omitted or replaced with another block/module with the same or similar function.

Figure 72:
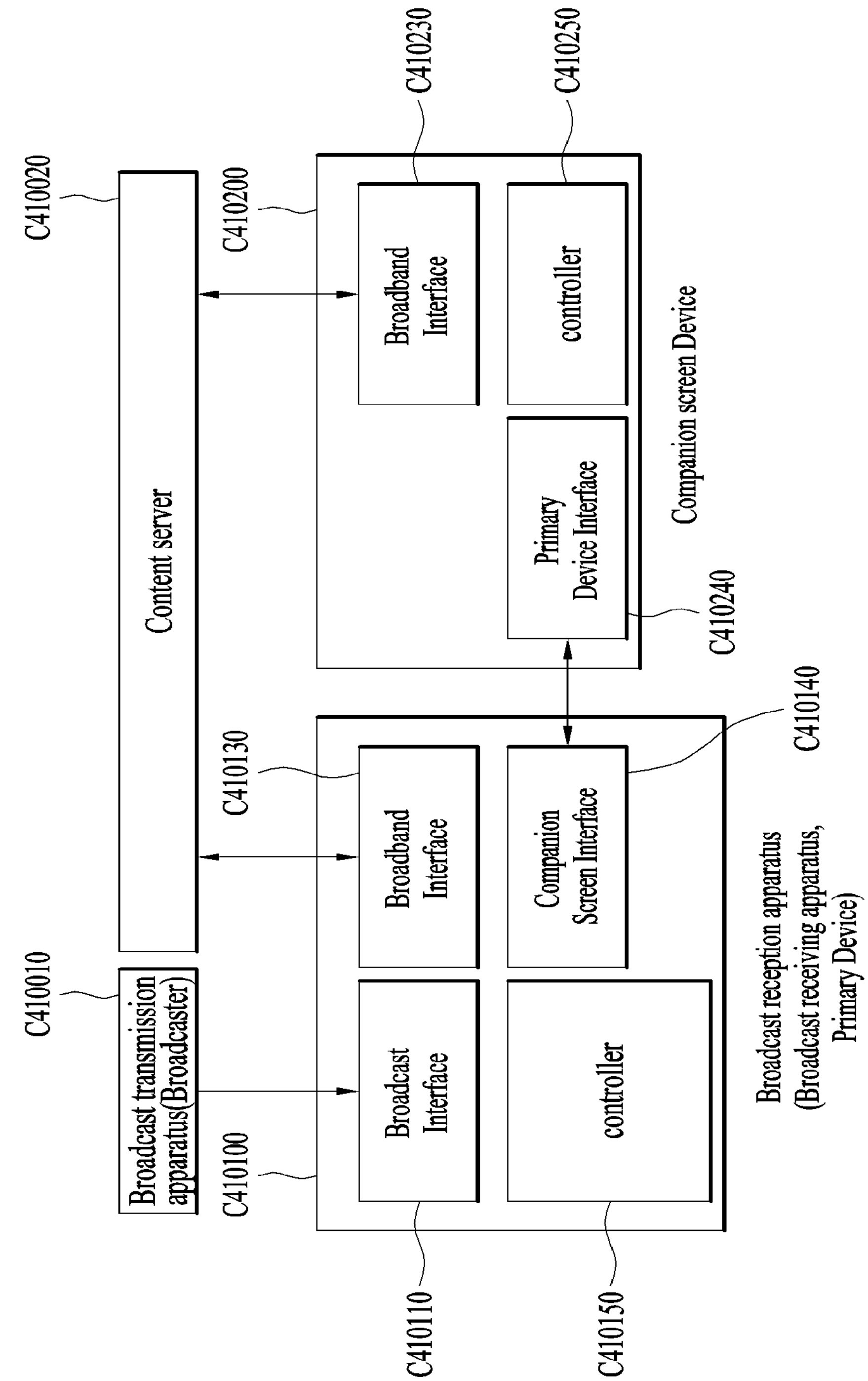
FIG. 72 is a block diagram showing the configuration of a broadcast system according to one embodiment of the present invention.

FIG. 72 is a block diagram showing the configuration of a broadcast system according to one embodiment of the present invention.

The broadcast system according to one embodiment of the present invention may include at least one of a broadcast transmission apparatus (broadcaster) C410010, a content server C410020, a broadcast reception apparatus C410100 and/or a companion screen device C410200.

The broadcast transmission apparatus C410010 may provide a broadcast service.

The broadcast transmission apparatus C410010 may include at least one of a controller (not shown) and/or a transmission unit (not shown). In addition, the broadcast transmission apparatus C410010 may be referred to as a transmitter.

For example, the broadcast service may include at least one of content (or a linear service), an application (or a non-linear service) and/or signaling information. The broadcast transmission apparatus C410010 may transmit a broadcast stream including a broadcast service using at least one of satellite, terrestrial and cable broadcast networks.

The content server C410020 may receive a request from the broadcast reception apparatus C410100 and/or the companion screen device C410200 via an Internet protocol network and provide a broadcast service via the Internet protocol network in response thereto.

The broadcast reception apparatus C410100 may receive the broadcast service via a broadcast network and/or an Internet protocol network. The broadcast reception apparatus C410100 may be referred to as a receiver, a first receiver, a first screen device, a master device (MD) and/or a primary device (PD).

The broadcast reception apparatus C410100 may include at least one of a broadcast interface C410100 (or a broadcast reception unit), a broadband interface (C410130) (or an IP transmission/reception unit), a companion screen interface (C410140) (or an App transmission/reception unit), a decoder (not shown), a display (not shown) and/or a controller C410150.

The broadcast interface C410110 may receive a broadcast stream including a broadcast service. At this time, the broadcast stream may be transmitted using at least one of satellite, terrestrial and cable broadcast networks. Accordingly, the broadcast interface C410110 may include at least one of a satellite tuner, a terrestrial tuner and a cable tuner in order to receive the broadcast stream.

The broadband interface C410130 may request a broadcast service from the content server C410020. In addition, the broadband interface C410130 may receive the broadcast service from the content server.

The companion screen interface C410140 may transmit and/or receive a broadcast service and/or signaling data to and/or from the primary device interface C410240 of the companion screen device C410200.

The decoder (not shown) may decode the broadcast service.

The display (not shown) may display the broadcast service.

The controller C410150 may control operation of the broadcast interface C410100, the broadband interface C410130, the companion screen interface C410140, the decoder and/or the display.

The companion screen device C410200 may receive the broadcast service from the content server C410020 via the Internet protocol network. The companion screen device C410200 may be referred to as a second broadcast reception apparatus, a second receiver, a second screen device, a slave device (SD) and/or a companion device (CD). The companion screen device C410200 may include at least one of a broadband interface (C410230) (or an IP transmission/reception unit), a primary device interface (C410240) (or an App transmission/reception unit), a decoder (not shown), a display (not shown) and/or a controller (C410250). A plurality of companion screen devices C410200 may be provided.

The broadband interface C410230 may request a broadcast service from the content server C410020 and receive the broadcast service from the content server C410020.

In addition, the broadband interface C410230 may receive the broadcast service from the broadcast reception apparatus C410100.

The primary device interface C410240 may transmit and/or receive the broadcast service and/or service data to and/or from the companion screen interface C410140 of the broadcast reception apparatus C410100.

The decoder (not shown) may decode the broadcast service.

The display (not shown) may display the broadcast service.

The controller C410250 may control operation of the broadband interface C410230, the primary device interface C410240, the decoder and/or the display.

Hereinafter, five types of functions supported by the PD (or the broadcast reception apparatus) and the CD (companion screen device) will be described.

A first function is to use the PD in order to stream some consecutive components of a service currently selected by the PD for simultaneous playback in the CD. The components may be equal to the components played back in the PD. Alternatively, the components may be alternative components which are not currently played back in the PD.

A second function is to use the PD in order to deliver, to the CD, files or data which are portions of the service currently selected by the PD. The data may include a method or place for accessing content from sources other than the PD. For example, the data may include the URL of the remote server. The CD may request a single particular file or a data package. Alternatively, the CD may request "subscription" of a series of specific files or data.

A third function is to use the PD in order to deliver, to the CD, media timeline information of the service currently selected by the PD, for synchronization of content played back in the CD along with content played back in the PD.

A fourth function is to use a CD application cooperating with a PD application.

The PD application may be an enhancement application which is a portion of a scheduled linear service. In addition, the PD application may be an application which is a portion of an App-based service (unscheduled service).

A fifth function is EAM delivery. That is, the fifth function is to use the PD in order to deliver, to the CD, emergency alert messages. This is particularly important when the CD displays consecutive content, because, when an emergency alert occurs, a user (or a viewer) cannot concentrate on the PD or may not be in the same room as the PD.

Along with the PD which serves as a server, an appropriate paradigm for supporting the CD is a paradigm for a client-server. That is, the PD may support certain CD supporting operations. This is applicable to the CD. Interaction may start by a request from a client (or a CD) to a server (or a PD) in order to apply particular operation. Two-way communication may start by a request from a client (or a CD) to a server (or a PD) in order to establish communication. Asynchronous notification from the PD to the CD may start by a request of a client (or a CD) for requesting subscription of streams of notification from a server (or a PD). All the below-described messages may be unicast unless stated otherwise.

A security mechanism may be required to authenticate CD application requests.

Hereinafter, use cases will be described.

For example, Julio views the concert of his favorite rock & roll band using a TV screen. A TV notification pop-up indicates that alternative camera views of the concert presenting musicians may be available via a specific application of a CD. Julio may launch an application indicating that close-up pictures of a guitarist, a bassist, a singer and a drummer are available. Julio may select the guitarist during a guitar solo and then may change to the drummer. Media content may be synchronously rendered on the TV screen and the companion screen.

For example, Mary is interested in hearing a video description for a visually handicapped person but does not want all viewers in the room to hear the video description. She may find various available audio tracks using an application of a CD and select a description track for playback from the CD. John is a visually handicapped person and wants to read closed captions along with a sound description. He may find various options for the closed captions using an application of a CD and select one option along with an audio description for playback from the CD. Hector prefers voice dubbing to reading of Spanish subtitles. He has a CD application having a text-to-voice function. He may find the Spanish subtitle using a CD and use the text-to-voice application via a headphone.

For example, Jane views her favorite game show. A TV notification pop-up indicates that the game show is simultaneously played on her tablet via a tablet application.

She may launch the application and play the game show in real time. While the show is displayed, questions are presented to her on her tablet. Her response time is limited to the response time of the participant of the show. Her score is tracked by the application and she may watch her ranking among the other viewers who play the game using the tablet application.

For example, George launches an on-demand application on his main TV receiver.

A TV application may request demographic information from George in order to make program recommendations. The TV application recommends a companion table application which may be downloaded by George in order to easily input data. George downloads and launches the tablet application. The tablet application provides data entry fields to George. George completes data entry in his tablet and registers the information with the TV application. The TV application recommends several on-demand programs based on his entries. George uses his tablet in order to select one from among the recommended programs displayed on the TV. As an alternative method, George uses his tablet in order to select one of the recommended programs displayed on his tablet instead of the main TV receiver.

For example, Laura views her favorite program in a living room. She has various work to do around the house. However, she does not want to miss her favorite show. She launches an application on her tablet in order to view the show even on her tablet. She continuously views the show using her tablet while moving from one room to another room.

While Laura is in a laundry room, an emergency alert message is broadcast. A message is displayed on her tablet. The table informs her that there is a viewable video event if she chooses. She selects the video and starts to view the video. She follows instructions delivered by an emergency message.

Hereinafter, PD application to CD application communication will be described.

In several use cases, the PD application and the CD application may be designed to operate in tandem. In this case, the application designer will decide details of app-to-app communication. PD applications and CD applications may include information on the users of the other applications and may also include methods for downloading and launching the other applications. Although the CD application is not currently launched, the CD application may include a mechanism for always "listening for" an announcement message from the PD application. ATSC will not specify certain specifications of such operation. (HbbTV 2.0 provides several specifications of necessary operations.

Figure 73:
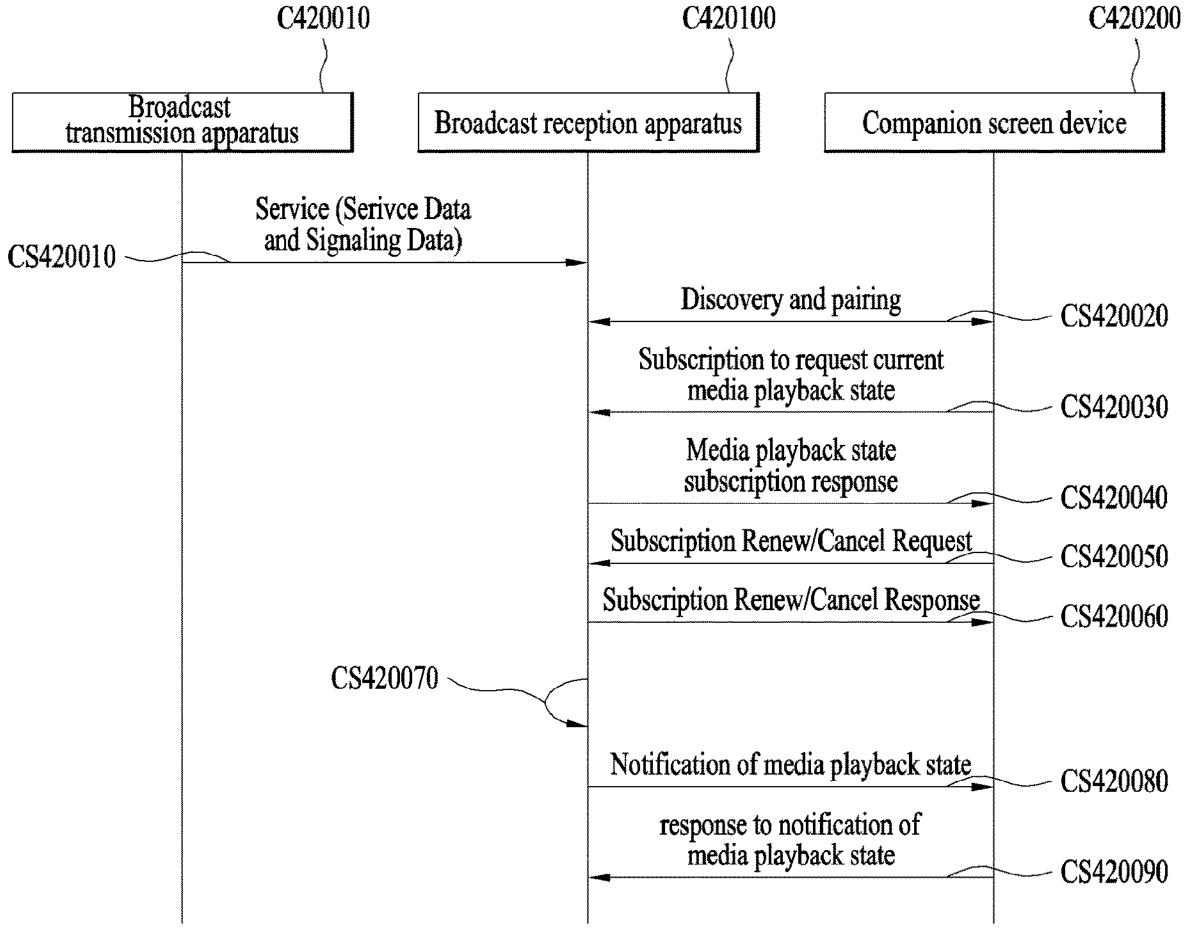
FIG. 73 is a flow diagram of a broadcast system according to one embodiment of the present invention.

FIG. 73 is a flow diagram of a broadcast system according to one embodiment of the present invention.

The broadcast system according to one embodiment of the present invention may include at least one of a broadcast transmission apparatus C420010, a broadcast reception apparatus C420100 (PD) and/or a companion screen device C420200 (CD). The contents of the components of the broadcast system according to one embodiment of the present invention may include those of the components of the above-described broadcast system.

The broadcast reception apparatus C420100 according to one embodiment may notify the companion screen device C420200 of media playback state information.

The media playback state information is information for delivering the media playback state from the PD to the CD. The media playback state information may be used when the CD plays back a media stream in a state of being synchronized with the PD.

The PD may receive a broadcast service and/or signaling data (CS420010).

Then, the PD and the CD may generate a pairing session for bidirectional communication (CS420020). More specifically, the PD and the CD may generate a pairing session using UPnP. More specifically, the PD application and the CD application may transmit multicast discovery messages for searching for and/or advertising presence thereof and/or ATSC 3.0 service support.

Then, the PD may receive a media playback state information subscription request for requesting current media playback state information from the CD (CS420030).

Then, the PD may transmit a media playback state information subscription response to the CD (CS420040).

Meanwhile, the PD may receive a media playback state information subscription update/cancel request from the CD (CS420050).

In addition, the PD may transmit a media playback state information subscription update/cancel response to the CD (CS420060).

Then, the media playback state of the PD may be changed (CS420070).

When the media playback state of the PD is changed, the PD may notify the CD of the media playback state information (CS420080).

Then, the PD may receive a response to notification of the media playback state information from the CD (CS420090).

FIG. 74 is a diagram showing information related to a media playback state information subscription request according to one embodiment of the present invention.

The companion screen device (CD) may transmit a subscription request to the broadcast reception apparatus (CD). For example, the companion screen device (CD) may transmit a media playback state information subscription request to the broadcast reception apparatus (CD). A time may not be specified (that is, may be determined by an application designer).

Referring to the figure, elements and/or parameters included in a subscription request (or a media playback state information subscription request) for, at the companion screen device (CD), receiving the media playback state information from the broadcast reception apparatus PD are shown.

The media playback state information subscription request may include at least one of a SubscriptionCallbackURL element, a SubscriptionDuration element, a MediaURL element, a MediaID element, a CDDevID element, a CDAppID element and/or a CDAppVersion element.

The SubscriptionCallbackURL element may indicate uniform resource locator (URL) information for receiving a media playback state information message.

The SubscriptionDuration element may indicate a duration requested until media playback state information subscription expires. For example, the requested duration may be in seconds. When the SubscriptionDuration element has a specific value (e.g., "−1"), the requested duration may indicate an infinite duration.

The MediaURL element may indicate a URL for media for which media playback state information subscription is requested. If the MediaURL element is not provided, information on the media currently being played back on the broadcast reception apparatus may be optionally selected.

The MediaID element may indicate an identifier for media for which media playback state information subscription is requested. This identifier may uniquely identify the media on the broadcast reception apparatus for which media playback state information subscription is requested.

The CDDevID element may indicate a device identifier for the companion screen device.

The CDAppID element may indicate an application identifier for the companion screen device.

The CDAppVersion element may indicate version information of the application for the companion screen device.

The companion screen device may transmit the media playback state information request to the broadcast reception apparatus using a specific address (e.g., SubscriptionURL).

FIG. 75 is a diagram showing information related to a media playback state information subscription response according to one embodiment of the present invention.

The broadcast reception apparatus (PD) may transmit a subscription response to the companion screen device (CD). For example, the broadcast reception apparatus may deliver the media playback state information subscription response to the companion screen device. As soon as the subscription request is received (initial response) and/or whenever content is changed (subsequent responses) (that is, whenever a service, show or segment is changed), the broadcast reception apparatus may transmit the subscription response to the companion screen device.

Referring to the figure, elements and/or parameters included in the media playback state information subscription response when the subscription request is successfully accepted are shown.

The media playback state information subscription response may include at least one of a StatusCode element, a StatusString element, a SubscriptionID element, a SubscriptionTimeoutDuration element, a MediaURL element, a MediaID element, a PDDevID element and/or a PDVersion element.

The StatusCode element may indicate that the request is successfully accepted. For example, when the StatusCode element has a predetermined value (e.g., "aaa"), this may indicate that the request is successfully accepted.

The StatusString element may indicate a success/failure indication status string of the request.

The SubscriptionID element may indicate a subscription identifier for this media playback state information subscription. The SubscriptionID element may be used to uniquely identify this subscription from the companion screen device to the broadcast reception apparatus.

The SubscriptionTimeoutDuration element may indicate the actual duration until the media playback state information subscription expires. For example, the duration may be in seconds. When the SubscriptionTimeoutDuration element has a specific value (e.g., "−1"), the actual duration until subscription expires may indicate an infinite duration.

The MediaURL element may indicate a URL for media for which a media playback state information subscription response is sent.

The MediaID element may indicate an identifier for media for which the media playback state information subscription response is sent. This identifier may uniquely identify the media on the broadcast reception apparatus for which the media playback state information subscription response is sent. In addition, this identifier may associate the media with the SubscriptionID element.

The PDDevID element may indicate a device identifier for the broadcast reception apparatus.

The PDVersion element may indicate version information of the broadcast reception apparatus.

FIG. 76 is a diagram showing information related to a media playback state information subscription response according to one embodiment of the present invention.

Referring to the figure, elements and/or parameters included in the media playback state information subscription response when the subscription request is not accepted are shown.

The media playback state information subscription response may include at least one of a StatusCode element and/or a StatusString element.

The StatusCode element may indicate a failure status code describing the reason why the request is not accepted. For example, when the StatusCode element has a predetermined value (e.g., "xxx"), this may indicate that the SubscriptionCallbackURL element is missing or invalid. In addition, when the StatusCode element has a predetermined value (e.g., "yyy"), this may indicate that the subscription request cannot be accepted.

The StatusString element may indicate a success/failure indication status string of the request.

FIG. 77 is a diagram showing information related to a media playback state information subscription update request according to one embodiment of the present invention.

The companion screen device (CD) may transmit a subscription update request to the broadcast reception apparatus PD. For example, the companion screen device (CD) may transmit a media playback state information subscription update request to the broadcast reception apparatus. In order to update subscription, before subscription timeout, the companion screen device may transmit the media playback state information subscription update request to the broadcast reception apparatus.

Referring to the figure, elements and/or parameters included in the media playback state information subscription update request for, at the companion screen device, continuously receiving the media playback state information from the broadcast reception apparatus are shown.

The media playback state information subscription update request may include at least one of a SubscriptionID element, a SubscriptionDuration element, a CDDevID element, a CDAppID element and/or a CDAppVersion element.

The SubscriptionID element may indicate a subscription identifier for this media playback state information subscription. The SubscriptionID element may be used to uniquely identify subscription from the companion screen device to the broadcast reception apparatus.

The SubscriptionDuration element may indicate a requested duration until the media playback state information subscription expires. For example, the requested duration may be in miliseconds. When the SubscriptionDuration element has a specific value (e.g., "−1"), the requested duration may indicate an infinite duration.

The CDDevID element may indicate a device identifier for the companion screen device.

The CDAppID element may indicate an application identifier for the companion screen device.

The CDAppVersion element may indicate the version information of the application for the companion screen device.

FIG. 78 is a diagram showing information related to a media playback state information subscription cancel request according to one embodiment of the present invention.

The companion screen device (CD) may transmit a subscription cancel request to the broadcast reception apparatus. In order to cancel subscription, the companion screen device may transmit the media playback state information subscription cancel request to the broadcast reception apparatus.

Referring to the figure, elements and/or parameters included in the subscription cancel request (or the media playback state information subscription cancel request) for cancelling reception of the media playback state information from the broadcast reception apparatus (PD) are shown.

The media playback state information subscription cancel request may include at least one of a SubscriptionID element, a CDDevID element, a CDAppID element and/or a CDAppVersion element.

The SubscriptionID element may indicate a subscription identifier for this media playback state information subscription. The SubscriptionID element may be used to uniquely identify subscription from the companion screen device to the broadcast reception apparatus.

The CDDevID element may indicate a device identifier for the companion screen device.

The CDAppID element may indicate an application identifier for the companion screen device.

The CDAppVersion element may indicate the version information of the application for the companion screen device.

FIG. 79 is a diagram showing information related to a media playback state information subscription update response according to one embodiment of the present invention.

The broadcast reception apparatus (PD) may transmit a subscription update response to the companion screen device (CD). For example, as soon as the subscription update request is received, the broadcast reception apparatus may transmit the media playback state information subscription update response to the companion screen device.

Referring to the figure, elements and/or parameters included in the media playback state information subscription update response when the subscription update request is successfully accepted are shown.

The media playback state information subscription update response may include at least one of a StatusCode element, a StatusString element, a SubscriptionID element, a SubscriptionTimeoutDuration element, a PDDevID element and/or a PDVersion element.

The StatusCode element may indicate that the request is successfully accepted. For example, when the StatusCode element has a predetermined value (e.g., "aaa"), this may indicate that the request is successfully accepted.

The StatusString element may indicate a success/failure indication status string of the request.

The SubscriptionID element may indicate a subscription identifier for this media playback state information subscription. The SubscriptionID element may be used to uniquely identify this subscription from the companion screen device to the broadcast reception apparatus.

The SubscriptionTimeoutDuration element may indicate the actual duration until the media playback state information subscription expires. For example, the duration may be in seconds. When the SubscriptionTimeoutDuration element has a specific value (e.g., "−1"), the actual duration until subscription expires may indicate an infinite duration.

The PDDevID element may indicate a device identifier for the broadcast reception apparatus.

The PDVersion element may indicate version information of the broadcast reception apparatus.

FIG. 80 is a diagram showing information related to a media playback state information subscription update response according to one embodiment of the present invention.

Referring to the figure, elements and/or parameters included in the media playback state information subscription update response when the subscription request is not accepted are shown.

The media playback state information subscription update response may include at least one of a StatusCode element and/or a StatusString element.

The StatusCode element may indicate a failure status code describing the reason why the request is not accepted. For example, when the StatusCode element has a predetermined value (e.g., "xxx"), this may indicate that the SubscriptionCallbackURL element is missing or invalid. In addition, when the StatusCode element has a predetermined value (e.g., "yyy"), this may indicate that the subscription request cannot be accepted.

The StatusString element may indicate a success/failure indication status string of the request.

FIG. 81 is a diagram showing information related to a media playback state information subscription cancel response according to one embodiment of the present invention.

The broadcast reception apparatus (PD) may transmit a subscription cancel response to the companion screen device (CD). For example, as soon as the subscription cancel request is received, the broadcast reception apparatus may transmit the media playback state information subscription cancel response to the companion screen device.

Referring to the figure, elements and/or parameters included in the media playback state information subscription cancel response are shown.

The media playback state information subscription cancel response may include at least one of a StatusCode element and/or a StatusString element.

The StatusCode element may indicate a success/failure status code indicating the subscription cancel request state. For example, when the StatusCode element has a predetermined value (e.g., "xxx"), this may indicate that the subscription cancel request is successfully accepted. In addition, when the StatusCode element has a predetermined value (e.g., "yyy"), this may indicate that the subscription cancel request (or the subscription update request) cannot be accepted.

The StatusString element may indicate a success/failure indication status string of the request.

FIG. 82 is a diagram showing a media playback state information notification message according to one embodiment of the present invention.

The broadcast reception apparatus (PD) may transmit a notification message to the companion screen device. The protocol used to transmit the notification message may be a websocket or notification.

For example, as soon as the subscription request is received and/or when the identification information of this content or related information thereof is changed, the broadcast reception apparatus may transmit a media playback state information notification message to the companion screen device.

Referring to the figure, the media playback state information notification message may include at least one of a SubscriptionID element, an MPstate element, an MPSpeed element, a MediaURL element, a MediaID element, a PDDevID and/or a PDVersion element.

The SubscriptionID may indicate the subscription identifier for this media playback state information subscription. The SubscriptionID element may be used to uniquely identify subscription from the companion screen device to the broadcast reception apparatus.

The MPstate element may indicate a current media playback state for the media URL element and/or a mediaID element (or the media identified by the mediaURL element and/or the mediaID element) associated with the media playback state information subscription identified by the SubscriptionID element. For example, the media playback state may include at least one of "PLAYING", "PAUSED", "STOPPED", "FFORWARD", "FBACKWARD", "BUFFERING" and/or "UNKNOWN".

The "STOPPED" state may indicate the last of the media stream for the mediaID element (or the media identified by the mediaID element) associated with the media playback state information.

The MPSpeed element may indicate the current speed of the media (playback) state relative to a normal speed.

The value of the MPSpeed element may have an integer value. For example, the value of the MPSpeed element for the normal speed may be "1". The MPSpeed element is applicable only when the MPState element indicates "PLAYING", "FFORWARD" and/or "FBACKWARD".

When the MPState element indicates "FFORWARD" and/or "FBACKWARD", the MPSpeed element may indicate the speed at which media timeline is moving forward or backward relative to the normal speed.

When the MPState element indicates "PLAYING", the MPSpeed element indicates the speed at which media playback is progressing relative to the normal speed.

More specifically, the positive value of the MPSpeed element may indicate "forward playback". "Forward playback" may mean that a media timeline position increases as a wall-clock time increases.

In addition, the negative value of the MPSpeed element may indicate "backward playback". "Backward playback" may mean that a media timeline position decreases as a wall-clock time decreases.

When the value of the MPSpeed is "1", the MPSpeed element may indicate "forward playback" as the normal speed. If "forward playback" is indicated as the normal speed, the media timeline may increase by the wall-clock time. When the value of the MPSpeed is "−1", the MPSpeed element may indicate "backward playback" as the normal speed. If "backward playback" is indicated as the normal speed, the media timeline may decrease by the wall-clock time.

When the value of the MPSpeed is "X", the MPSpeed element may indicate playback at X times the normal speed. In case of playback at "X" times the normal speed, the media timeline may increase (for a positive "X" value) or decrease (for a negative "X" value) by "X" times the wall-clock time. For example, "X" may not be "0" and/or "1".

When this MPState element indicates "PLAYING", the MPSpeed element having a value of "0" may be reserved to indicate an "unknown playback speed".

When this MPState element indicates a state other than "PLAYING", the MPSpeed element may have a value of "0".

When this MPState element indicates "PLAYING", the non-existent MPSpeed element may be estimated to have a value of "1".

When this MPState element indicates a state other than "PLAYING", the non-existent MPSpeed element may be estimated to have a value of "0".

The MediaURL element may indicate a URL for the media for which media playback state information subscription is requested. If the MediaURL element is not provided, information about the media being currently played back on the broadcast reception apparatus is optionally sent.

The MediaID element may indicate an identifier for the media for which media playback state information subscription is requested. The identifier may uniquely identify the media on the broadcast reception apparatus for which media playback state information subscription is requested.

For example, the MediaID element having a value of "CURRENT" may indicate that information about a main media being currently played back on the broadcast reception apparatus is requested.

The PDDevID element may indicate a device identifier for the broadcast reception apparatus.

The PDVersion element may indicate version information for the broadcast reception apparatus.

The broadcast reception apparatus may transmit a media playback state information response to the companion screen device using a specific address (e.g., SubscriptionCallbackURL).

FIG. 83 is a diagram showing a response message to a media playback state information notification message according to one embodiment of the present invention.

The companion screen device (CD) may transmit a response message to a notification message to the broadcast reception apparatus. For example, when the media playback state information notification message is received from the broadcast reception apparatus, the companion screen device may transmit the response message to the media playback state information notification message to the broadcast reception apparatus.

Referring to the figure, the response message to the media playback state information notification message may include at least one of a StatusCode element, a StatusString element and/or a SubscriptionID element.

The StatusCode element may indicate a success/failure status code describing the status of reception of the notification message. For example, when the StatusCode element has a predetermined value (e.g., "xxx"), this may indicate that the notification message is successfully received. In addition, when the StatusCode element has a predetermined value (e.g., "yyy"), this may indicate that the notification message cannot be received.

The StatusString element may indicate a success/failure indication status string of the request.

The SubscriptionID element may indicate a subscription identifier for this media playback state information subscription. The SubscriptionID element may be used to uniquely identify subscription from the companion screen device to the broadcast reception apparatus.

Figure 84:
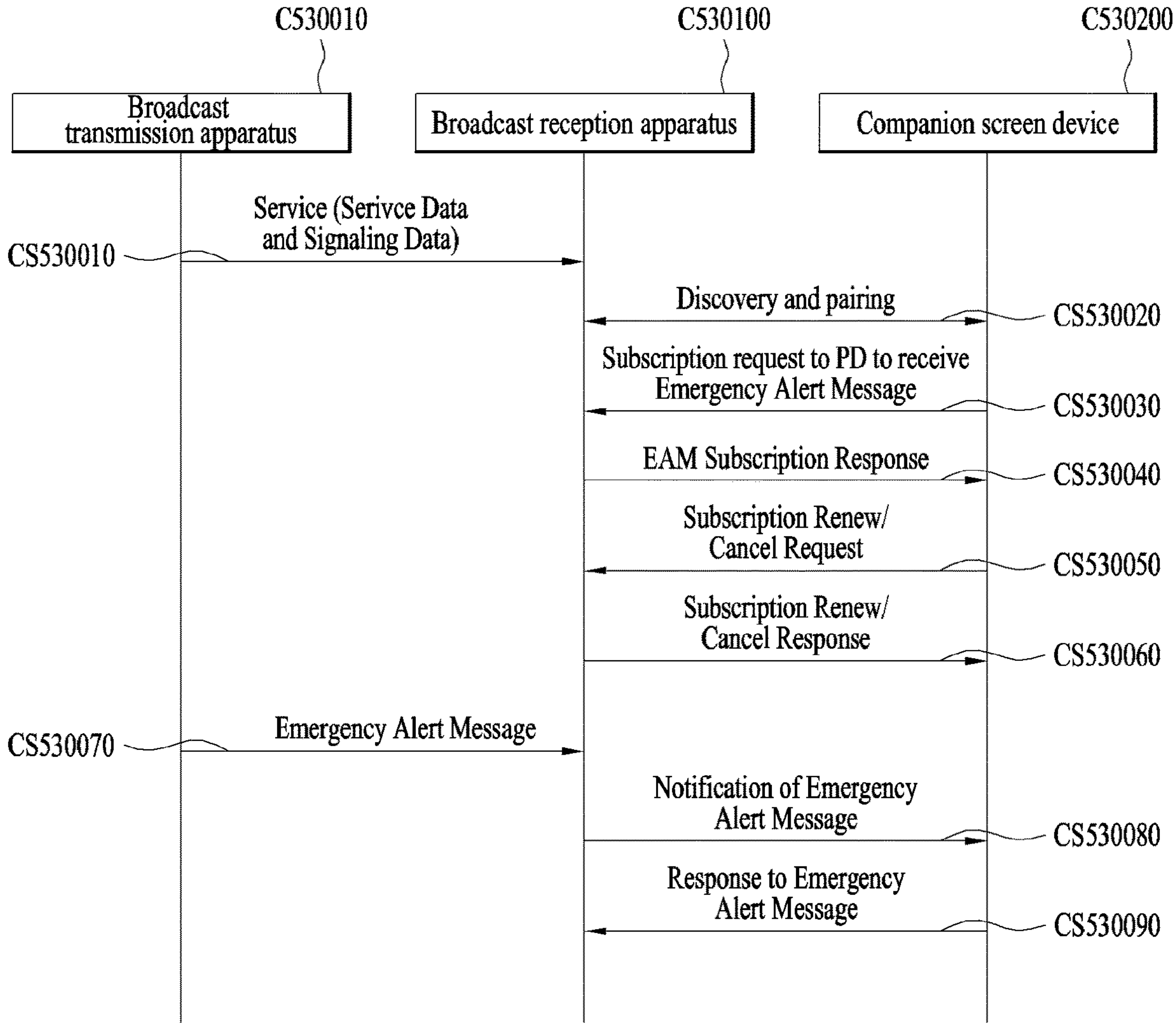
FIG. 84 is a flow diagram of a broadcast system according to one embodiment of the present invention.

FIG. 84 is a flow diagram of a broadcast system according to one embodiment of the present invention.

The broadcast system according to one embodiment of the present invention may include at least one of a broadcast transmission apparatus C530010, a broadcast reception apparatus C530100 (PD) and/or a companion screen device C530200 (CD). The contents of the components of the broadcast system according to one embodiment of the present invention may include those of the components of the above-described broadcast system.

The broadcast reception apparatus C530100 according to one embodiment may receive an emergency alert message and notify the companion screen device C530200 of the emergency alert message. For example, the broadcast reception apparatus C530100 may deliver the emergency alert message to the companion screen device C530200 using websocket and/or multicast.

The PD may receive a broadcast service and/or signaling data (CS530010).

Then, the PD and the CD may generate a pairing session for bidirectional communication (CS530020). More specifically, the PD and the CP may generate a pairing session using UPnP. More specifically, the PD application and the CD application may transmit multicast discovery messages for searching for and/or advertising presence thereof and/or ATSC 3.0 service support.

Then, the PD may receive an emergency alert message subscription request for requesting the emergency alert message from the CD (CS530030).

Then, the PD may transmit an emergency alert message subscription response to the CD (CS530040).

Meanwhile, the PD may receive an emergency alert message subscription update/cancel request from the CD (CS530050).

In addition, the PD may transmit an emergency alert message subscription update/cancel response to the CD (CS530060).

Then, the PD may receive the emergency alert message (CS530070).

When the PD receives the emergency alert message, the PD may notify the CD of the emergency alert message (CS530080).

Then, the PD may receive a response to notification of the emergency alert message from the CD (CS530090).

FIG. 85 is a diagram showing information related to an emergency alert message subscription request according to one embodiment of the present invention.

The companion screen device (CD) may transmit a subscription request to the broadcast reception apparatus (CD). For example, the companion screen device (CD) may transmit an emergency alert message subscription request to the broadcast reception apparatus (CD). When the CD participates in the network to activate an EAM function (or when a CD application launches), the CD may transmit an emergency alert message subscription request to the PD in order to receive the EAM.

Referring to the figure, elements and/or parameters included in a subscription request (or an emergency alert message subscription request) for, at the companion screen device (CD), receiving the emergency alert message from the broadcast reception apparatus (PD) are shown.

The emergency alert message subscription request may include at least one of a SubscriptionCallbackURL element, a SubscriptionDuration element, a Geo-loc element, a CDDevID element, a CDAppID element and/or a CDAppVersion element.

The SubscriptionCallbackURL element may indicate uniform resource locator (URL) information for receiving the emergency alert message.

The SubscriptionDuration element may indicate a duration requested until emergency alert message subscription expires. For example, the requested duration may be in seconds. When the SubscriptionDuration element has a specific value (e.g., "−1"), the requested duration may indicate an infinite duration.

The Geo-loc element may indicate a geographical location for which the emergency alert message is requested.

The CDDevID element may indicate a device identifier for the companion screen device.

The CDAppID element may indicate an application identifier for the companion screen device.

The CDAppVersion element may indicate version information of the application for the companion screen device.

The companion screen device may transmit an emergency alert message subscription request to the broadcast reception apparatus using a specific address (e.g., SubscriptionURL).

FIG. 86 is a diagram showing information related to an emergency alert message subscription response according to one embodiment of the present invention.

The broadcast reception apparatus (PD) may transmit a subscription response to the companion screen device (CD). For example, the broadcast reception apparatus may deliver the emergency alert message subscription response to the companion screen device.

As soon as the subscription request is received, the broadcast reception apparatus may transmit the emergency alert message subscription response to the companion screen device.

Referring to the figure, elements and/or parameters included in the emergency alert message subscription response when the subscription request is successfully accepted are shown.

The emergency alert message subscription response may include at least one of a StatusCode element, a StatusString element, a SubscriptionID element, a SubscriptionTimeoutDuration element, a PDDevID element and/or a PDVersion element.

The StatusCode element may indicate that the request is successfully accepted. For example, when the StatusCode element has a predetermined value (e.g., "aaa"), this may indicate that the request is successfully accepted.

The StatusString element may indicate a success/failure indication status string of the request.

The SubscriptionID element may indicate a subscription identifier for this emergency alert message subscription. The SubscriptionID element may be used to uniquely identify this subscription from the companion screen device to the broadcast reception apparatus.

The SubscriptionTimeoutDuration element may indicate the actual duration until the emergency alert message subscription expires. For example, the duration may be in seconds. When the SubscriptionTimeoutDuration element has a specific value (e.g., "−1"), the actual duration until subscription expires may indicate an infinite duration.

The PDDevID element may indicate a device identifier for the broadcast reception apparatus.

The PDVersion element may indicate version information for the broadcast reception apparatus.

FIG. 87 is a diagram showing information related to an emergency alert message subscription response according to one embodiment of the present invention.

Referring to the figure, elements and/or parameters included in the emergency alert message subscription response when the subscription request is not accepted are shown.

The emergency alert message subscription response may include at least one of a StatusCode element and/or a StatusString element.

The StatusCode element may indicate a failure status code describing the reason why the request is not accepted. For example, when the StatusCode element has a predetermined value (e.g., "xxx"), this may indicate that the SubscriptionCallbackURL element is missing or invalid. In addition, when the StatusCode element has a predetermined value (e.g., "yyy"), this may indicate that the subscription request cannot be accepted.

The StatusString element may indicate a success/failure indication status string of the request.

FIG. 88 is a diagram showing information related to an emergency alert message subscription update request according to one embodiment of the present invention.

The companion screen device (CD) may transmit a subscription update request to the broadcast reception apparatus PD. For example, the companion screen device (CD) may transmit an emergency alert message subscription update request to the broadcast reception apparatus. In order to update subscription, before subscription timeout, the companion screen device may transmit the emergency alert message subscription update request to the broadcast reception apparatus.

Referring to the figure, elements and/or parameters included in the emergency alert message subscription update request for, at the companion screen device, continuously receiving the emergency alert message from the broadcast reception apparatus are shown.

The emergency alert message subscription update request may include at least one of a SubscriptionID element, a SubscriptionDuration element, a CDDevID element, a CDAppID element and/or a CDAppVersion element.

The SubscriptionID element may indicate a subscription identifier for this emergency alert message subscription. The SubscriptionID element may be used to uniquely identify subscription from the companion screen device to the broadcast reception apparatus.

The SubscriptionDuration element may indicate a requested duration until the emergency alert message subscription expires. For example, the requested duration may be in miliseconds. When the SubscriptionDuration element has a specific value (e.g., "−1"), the requested duration may indicate an infinite duration.

The CDDevID element may indicate a device identifier for the companion screen device.

The CDAppID element may indicate an application identifier for the companion screen device.

The CDAppVersion element may indicate the version information of the application for the companion screen device.

FIG. 89 is a diagram showing information related to an emergency alert message subscription cancel request according to one embodiment of the present invention.

The companion screen device (CD) may transmit a subscription cancel request to the broadcast reception apparatus. In order to cancel subscription, the companion screen device may transmit the emergency alert message subscription cancel request to the broadcast reception apparatus.

Referring to the figure, elements and/or parameters included in the subscription cancel request (or the emergency alert message subscription cancel request) for cancelling reception of the emergency alert message from the broadcast reception apparatus (PD) are shown.

The emergency alert message subscription cancel request may include at least one of a SubscriptionID element, a CDDevID element, a CDAppID element and/or a CDAppVersion element.

The SubscriptionID element may indicate a subscription identifier for this emergency alert message subscription. The SubscriptionID element may be used to uniquely identify subscription from the companion screen device to the broadcast reception apparatus.

The CDDevID element may indicate a device identifier for the companion screen device.

The CDAppID element may indicate an application identifier for the companion screen device.

The CDAppVersion element may indicate the version information of the application for the companion screen device.

FIG. 90 is a diagram showing information related to an emergency alert message subscription update response according to one embodiment of the present invention.

The broadcast reception apparatus (PD) may transmit a subscription update response to the companion screen device (CD). For example, as soon as the subscription update request is received, the broadcast reception apparatus may transmit the emergency alert message subscription update response to the companion screen device.

Referring to the figure, elements and/or parameters included in the emergency alert message subscription update response when the subscription update request is successfully accepted are shown.

The emergency alert message subscription update response may include at least one of a StatusCode element, a StatusString element, a SubscriptionID element, a SubscriptionTimeoutDuration element, a PDDevID element and/or a PDVersion element.

The StatusCode element may indicate that the request is successfully accepted. For example, when the StatusCode element has a predetermined value (e.g., "aaa"), this may indicate that the request is successfully accepted.

The StatusString element may indicate a success/failure indication status string of the request.

The SubscriptionID element may indicate a subscription identifier for this emergency alert message subscription. The SubscriptionID element may be used to uniquely identify this subscription from the companion screen device to the broadcast reception apparatus.

The SubscriptionTimeoutDuration element may indicate the actual duration until the emergency alert message subscription expires. For example, the duration may be in seconds. When the SubscriptionTimeoutDuration element has a specific value (e.g., "−1"), the actual duration until subscription expires may indicate an infinite duration.

The PDDevID element may indicate a device identifier for the broadcast reception apparatus.

The PDVersion element may indicate version information of the broadcast reception apparatus.

FIG. 91 is a diagram showing information related to an emergency alert message subscription update response according to one embodiment of the present invention.

Referring to the figure, elements and/or parameters included in the emergency alert message subscription update response when the subscription request is not accepted are shown.

The emergency alert message subscription update response may include at least one of a StatusCode element and/or a StatusString element.

The StatusCode element may indicate a failure status code describing the reason why the request is not accepted. For example, when the StatusCode element has a predetermined value (e.g., "xxx"), this may indicate that the SubscriptionCallbackURL element is missing or invalid. In addition, when the StatusCode element has a predetermined value (e.g., "yyy"), this may indicate that the subscription request cannot be accepted.

The StatusString element may indicate a success/failure indication status string of the request.

FIG. 92 is a diagram showing information related to an emergency alert message subscription cancel response according to one embodiment of the present invention.

The broadcast reception apparatus (PD) may transmit a subscription cancel response to the companion screen device (CD). For example, as soon as the subscription cancel request is received, the broadcast reception apparatus may transmit the emergency alert message subscription cancel response to the companion screen device.

Referring to the figure, elements and/or parameters included in the emergency alert message subscription cancel response are shown.

The emergency alert message subscription cancel response may include at least one of a StatusCode element, a StatusString element, a PDDevID element and/or a PDVersion element.

The StatusCode element may indicate a success/failure status code indicating the subscription cancel request state. For example, when the StatusCode element has a predetermined value (e.g., "xxx"), this may indicate that the subscription cancel request is successfully accepted. In addition, when the StatusCode element has a predetermined value (e.g., "yyy"), this may indicate that the subscription cancel request (or the subscription update request) cannot be accepted.

The StatusString element may indicate a success/failure indication status string of the request.

The PDDevID element may indicate a device identifier of the broadcast reception apparatus.

The PDVersion element may indicate version information of the broadcast reception apparatus.

FIG. 93 is a diagram showing an emergency alert message according to one embodiment of the present invention.

The broadcast reception apparatus (PD) may transmit a notification message to the companion screen device. The protocol used to transmit the notification message may be a websocket or notification.

For example, as soon as the emergency alert message subscription request is received from the companion screen device, the broadcast reception apparatus may transmit an emergency alert message notification message to the companion screen device.

Alternatively, as soon as the emergency alert message is received from the broadcast transmission apparatus and/or the content server, the broadcast reception apparatus may transmit the emergency alert message notification message to the companion screen device.

Parameters for the emergency alert message notification message may include at least one of a SubscriptionID element, initial contents of an emergency alert message (EAM), properties of the initial contents of the emergency alert message and/or additionally available content. For example, the properties of the initial contents of the emergency alert message may include a new message including text and/or a rich media, a continuous message and/or a one-time message.

Referring to the figure, the emergency alert message notification message may include at least one emergency alert message sent from the broadcast reception apparatus to the companion screen device. The emergency alert message notification message may include at least one of an EAM element, an EAMID attribute, a SentTimestamp attribute, an ExpiredTimestamp attribute, a Category attribute, a Urgency attribute, a Severity attribute, a Geo-loc attribute, a NewMsg attribute, a OneTimeMsg attribute, an EAMContent element, a ContentFormat attribute, an AddlEAMURL element, an EAMContentAccessibilityURL element, an AddlEAMPhone element, a ContactEmail element, a SubscriptionID element, a PDDevID element and/or a PDVersion element. For example, the EAM element may include at least one of an EAMContent element, a ContentFormat attribute, an AddlEAMURL element, an EAMContentAccessibilityURL element, an AddlEAMPhone element and/or a ContactEmail element.

The EAM element may include information related to an emergency alert message.

The EAMID attribute may indicate the identifier of the emergency alert message.

This identifier may uniquely identify the emergency alert message.

The SentTimestamp attribute may indicate the date and/or time when the emergency alert message was generated. For example, the SentTimestamp attribute may indicate a first moment when the emergency alert message is valid.

The ExpiredTimestamp attribute may indicate the last moment (date and/or time) when the emergency alert message is valid.

The Category attribute may indicate the category of the emergency alert message.

For example, the Category attribute may indicate at least one of Geo, Met, Safety, Rescue, Fire, Health, Env, Transport, Infra and/or CBRNE.

The Urgency attribute may indicate urgency of the emergency alert message. For example, the Urgency attribute may indicate at least one of Immediate, Expected, Future and/or Past.

The Severity attribute may indicate severity of the emergency alert message. For example, the Severity attribute may indicate at least one of Extreme, Severe, Moderate and/or Minor.

The Geo-loc attribute may indicate a geographical location for which the emergency alert message is applicable.

The NewMsg attribute may indicate whether the emergency alert message is a new message. If the value of the NewMsg attribute is “true”, this emergency alert message is a new message. If the value of the NewMsg attribute is “false”, this emergency alert message is a repeat of a previous emergency alert message.

The OneTimeMsg attribute may indicate whether the emergency alert message is sent only one time. If the value of the OneTimeMsg attribute is “true”, this emergency alert message is transmitted only one time and is not repeated. If the value of the OneTimeMsg attribute is “false”, this emergency alert message may be repeated more than one time.

The EAMContent element may include the content of the emergency alert message. The content type of the EAMContent element may be given by the ContentFormat attribute.

The ContentFormat attribute may indicate the content format of the emergency alert message. That is, the ContentFormat attribute may be an EAMContent element.

The AddlEAMURL element may indicate a URL which provides additional information about this emergency alert message. The URL provides more information than what is included in the EAMContent element.

The EAMContentAccessibilityURL element may indicate a URL which provides initial emergency alert message content for accessibility. The EAMContentAccessibilityURL element may point to a secondary audio stream, which will facilitate provision of emergency information. This may be done as required by FCC rules.

The AddlEAMPhone element may indicate a phone number for obtaining more information about this emergency alert message.

The ContactEmail element may indicate an email address which can provide more information regarding this emergency alert message.

The SubscriptionID element may indicate a subscription identifier for this emergency alert message subscription. The SubscriptionID element may be used to uniquely identify this subscription from the companion screen device to the broadcast reception apparatus.

The PDDevID element may indicate a device identifier for the broadcast reception apparatus.

The PDVersion element may indicate version information for the broadcast reception apparatus.

The broadcast reception apparatus may transmit an emergency alert message subscription response to the companion screen device using a specific address (e.g., SubscriptionCallbackURL).

The emergency alert message may be changed to XML format. The XML schema may include PD notification of the emergency alert message sent to the CD. The XML schema may be defined using standard XML conventions based on the above-described elements and/or attributes.

FIG. 94 is a diagram showing a response message to an emergency alert message notification message according to one embodiment of the present invention.

The companion screen device (CD) may transmit a response message to a notification message to the broadcast reception apparatus. For example, when the emergency alert message notification message is received from the broadcast reception apparatus, the companion screen device may transmit the response message to the emergency alert message notification message to the broadcast reception apparatus.

Referring to the figure, the response message to the emergency alert message notification message may include at least one of a StatusCode element, a StatusString element, a SubscriptionID element and/or an EAMID element.

The StatusCode element may indicate a success/failure status code describing the status of reception of the notification message. For example, when the StatusCode element has a predetermined value (e.g., “xxx”), this may indicate that the notification message is successfully received. In addition, when the StatusCode element has a predetermined value (e.g., “yyy”), this may indicate that the notification message cannot be received.

The StatusString element may indicate a success/failure indication status string of the request.

The SubscriptionID element may indicate a subscription identifier for this emergency alert message subscription. The SubscriptionID element may be used to uniquely identify subscription from the companion screen device to the broadcast reception apparatus.

The EAMID element may indicate the identifier of the emergency alert message.

This identifier may uniquely identify the emergency alert message.

FIG. 95 is a flowchart illustrating a broadcast reception apparatus according to one embodiment of the present invention.

The broadcast reception apparatus may receive a broadcast signal including a service using a broadcast interface (CS640100).

In addition, the broadcast reception apparatus may receive a subscription request of a service from the companion screen device using the companion screen interface.

For example, the service may include service data for a service and/or signaling data. In addition, the service may include media playback state information and/or an emergency alert message. The subscription request may include subscription duration information indicating a valid subscription duration. For example, the subscription request may include a SubscriptionDuration element indicating a requested duration until media playback state information subscription expires and/or a SubscriptionDuration element indicating a requested duration until emergency alert message subscription expires.

The broadcast reception apparatus may generate a notification message for the service using the controller (CS640200).

For example, the notification message may include media playback state information.

In addition, the media playback state information may include an MPState element indicating a media playback state.

In addition, the media playback state information may further include an MPSpeed element indicating the speed of the media playback state.

In addition, the media playback state information may further include a MediaID element for identifying media for which media playback state information subscription is requested.

For example, the notification message may include an emergency alert message.

In addition, the emergency alert message may include at least one of a SentTimestamp attribute indicating the date and time when the emergency alert message was generated and an ExpiredTimestamp attribute indicating the last moment (date and time) when the emergency alert message is valid.

In addition, the emergency alert message may include at least one of an EAMContent element including the content of the emergency alert message, a ContentFormat attribute indicating the content format of the emergency alert message and an EAMContentAccessibilityURL element indicating a URL which provides initial emergency alert message content for accessibility.

In addition, the emergency alert message may include at least one of a Category attribute indicating the category of the emergency alert message, an Urgency attribute indicating urgency of the emergency alert message, a Severity attribute indicating severity of the emergency alert message, a Geo-loc attribute indicating a geographical location for which the emergency alert message is applicable, a NewMsg attribute indicating whether the emergency alert message is a new message and a OneTimeMsg attribute indicating whether the emergency alert message is sent only one time.

The broadcast reception apparatus may deliver a notification message to the companion screen device using the companion screen interface (CS640300).

The notification message may be delivered to the companion screen device based on the notification protocol. The notification protocol may indicate a websocket protocol.

For example, the notification protocol may indicate a method for, at the broadcast reception apparatus, generating an event and delivering a notification message to the companion screen device.

Figure 96:
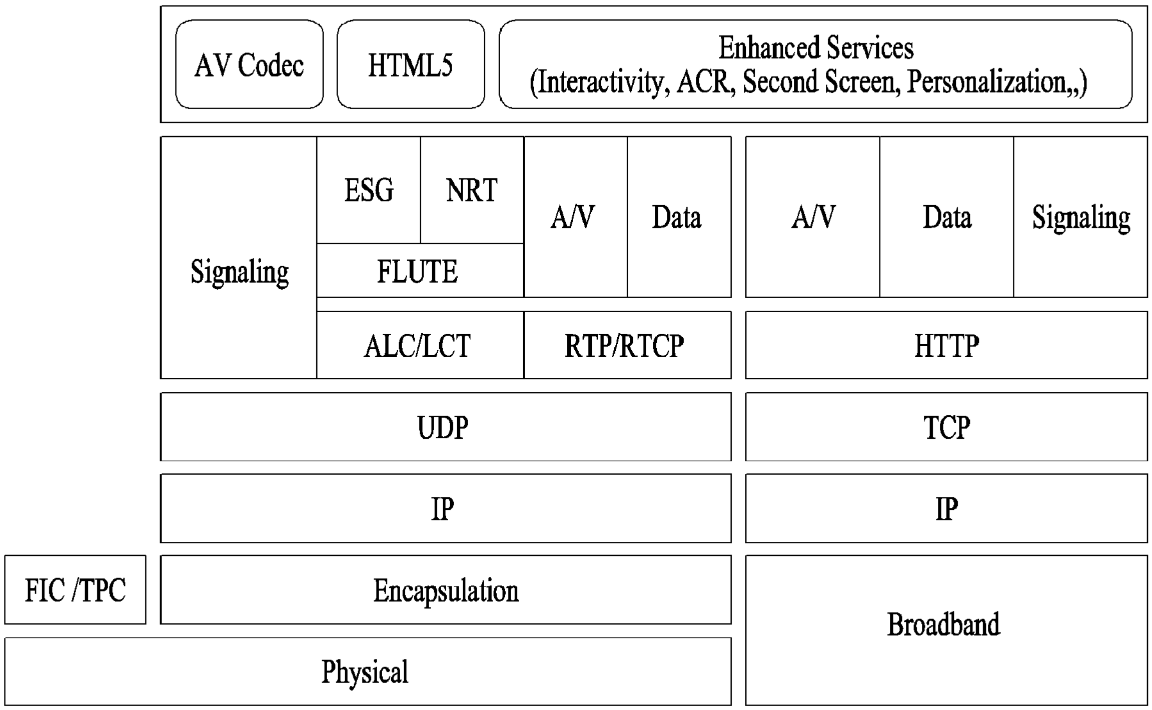
FIG. 96 is a view of a protocol stack for supporting a broadcast service according to an embodiment of the present invention.

FIG. 96 is a view of a protocol stack for supporting a broadcast service according to an embodiment of the present invention.

The broadcast service may provide adjunct services, for example, audio/video (A/V) data and HTML5 application, interactive service, ACR service, second screen service, and personalization service.

Such a broadcast service may be transmitted through a physical layer (i.e., broadcast signal) such as terrestrial wave and a cable satellite. Additionally, a broadcast service according to an embodiment of the present invention may be transmitted through an internet communication network (e.g., broadband).

When the broadcast service is transmitted through a physical layer, i.e., a broadcast signal such as terrestrial wave and a cable satellite, a broadcast reception device may extract an encapsulated MPEG-2 Transport Stream (TS) and an encapsulated IP datagram by demodulating the broadcast signal. The broadcast reception device may extract a user datagram protocol (UDP) datagram from the IP datagram. At this point, the signaling information may be in XML format. The broadcast reception device may extract signaling information from the UDP datagram. Additionally, the broadcast reception device may extract an Asynchronous Layered Coding/Layered Coding Transport (ALC/LCT) packet from the UDP datagram. The broadcast reception device may extract a File Delivery over Unidirectional Transport (FLUTE) packet from the ALC/LCT packet. At this point, the FLUTE packet may include Non-Real Time (NRT) data and Electronic Service Guide (ESG) data. Additionally, the broadcast reception device may extract a Real-time Transport Protocol (RTCP) packet and an RTP Control Protocol (RTCP) packet from the UDP datagram. The broadcast reception device may extract A/V data and enhanced data from the RTP/RTCP packet. At this point, at least one of NRT data, A/V data, and enhanced data may be in ISO Base Media File Format (ISO BMFF). Additionally, the broadcast reception device may extract signaling information such as NRT data, A/V data, and PSI/PSIP from an MPEG-2 TS packet or IP datagram.

When the broadcast service is transmitted through an internet communication network (e.g., broadband), the broadcast reception device may receive an IP packet from the internet communication network. The broadcast reception device may extract a TCP packet from the IP packet. The broadcast reception device may extract an HTTP packet from the TCP packet. The broadcast reception device may extract A/V data, enhanced data, and signaling information from the HTTP packet. At this point, at least one of A/V and enhanced data may be in ISO BMFF format. Additionally, the signaling information may in XML format.

A detailed transmission frame and transport packet transmitting broadcast service will be described with reference to FIGS. 97 to 100.

Figure 97:
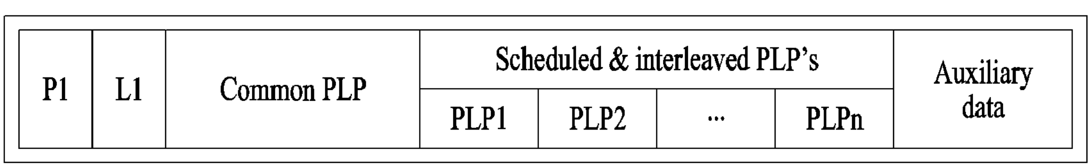
FIG. 97 is a view illustrating a broadcast transmission frame according to an embodiment of the present invention.

FIG. 97 is a view illustrating a broadcast transmission frame according to an embodiment of the present invention.

According to the embodiment of FIG. 97, the broadcast transmission frame includes a P1 part, an L1 part, a common PLP part, an interleaved PLP part (e.g., a scheduled & interleaved PLP's part), and an auxiliary data part.

According to the embodiment of FIG. 97, the broadcast transmission device transmits information on transport signal detection through the P1 part of the transmission frame. Additionally, the broadcast transmission device may transmit turning information on broadcast signal tuning through the P1 part.

According to the embodiment of FIG. 97, the broadcast transmission device transmits a configuration of the broadcast transmission frame and characteristics of each PLP through the L1 part. At this point, the broadcast reception device 100 decodes the L1 part on the basis of the P1 part to obtain the configuration of the broadcast transmission frame and the characteristics of each PLP.

According to the embodiment of FIG. 97, the broadcast transmission device may transmit information commonly applied to PLPs through the common PLP part. According to a specific embodiment of the present invention, the broadcast transmission frame may not include the common PLP part.

According to the embodiment of FIG. 97, the broadcast transmission device transmits a plurality of components included in broadcast service through an interleaved PLP part. At this point, the interleaved PLP part includes a plurality of PLPs.

Moreover, according to the embodiment of FIG. 97, the broadcast transmission device may signal to which PLP components configuring each broadcast service are transmitted through an L1 part or a common PLP part. However, the broadcast reception device 100 decodes all of a plurality of PLPs of an interleaved PLP part in order to obtain specific broadcast service information on broadcast service scan.

Unlike the embodiment of FIG. 97, the broadcast transmission device may transmit a broadcast transmission frame including a broadcast service transmitted through a broadcast transmission frame and an additional part that includes information on a component included in the broadcast service. At this point, the broadcast reception device 100 may instantly obtain information on the broadcast service and the components therein through the additional part. This will be described with reference to FIG. 98.

FIG. 98 is a view of a broadcast transmission frame according to another embodiment of the present invention.

According to the embodiment of FIG. 98, the broadcast transmission frame includes a P1 part, an L1 part, a fast information channel (FIC) part, an interleaved PLP part (e.g., a scheduled & interleaved PLP's part), and an auxiliary data part.

Except the FIC part, other parts are identical to those of FIG. 97.

The broadcast transmission device transmits fast information through the FIC part. The fast information may include configuration information of a broadcast stream transmitted through a transmission frame, simple broadcast service information, and component information. The broadcast reception device 100 may scan broadcast service on the basis of the FIC part. In more detail, the broadcast reception device 100 may extract information on broadcast service from the FIC part.

FIG. 99 is a view illustrating a structure of a transport packet transmitting a broadcast service according to an embodiment of the present invention.

In the embodiment of FIG. 99, a transport packet transmitting a broadcast service includes a Network Protocol field, an Error Indicator field, a Stuffing Indicator field, a Pointer field, a Stuffing bytes field, and payload data.

The Network Protocol field represents the type of a network protocol. According to a specific embodiment of the present invention, a value of the Network Protocol field may represent the IPv4 protocol or a frame packet type. In more detail, as shown in the embodiment of FIG. 99, when a value of the Network Protocol field is 000, it may represent the IPv4 protocol. In more detail, as shown in the embodiment of FIG. 99, when a value of the Network Protocol field is 111, it may represent a frame_packet_type protocol. At this point, framed_packet_type may be a protocol defined by ATSC A/153. In more detail, framed_packet_type may represent a network packet protocol not including a field representing information on the length. According to a specific embodiment of the present invention, the Network Protocol may be a 3-bit field.

The Error Indicator field represents that an error is detected from a corresponding transport packet. In more detail, if a value of the Error Indicator field is 0, it represents that no error is detected from a corresponding packet and if a value of the Error Indicator field is 1, it represents that an error is detected from a corresponding packet According to a specific embodiment of the present invention, the Error Indicator field may be a 1-bit field.

The Stuffing Indicator field represents whether stuffing bytes are included in a corresponding transport packet. At this point, the stuffing bytes represent data included in a payload to maintain the length of a fixed packet. According to a specific embodiment of the present invention, when a value of the Stuffing Indicator field is 1, a transport packet includes a stuffing byte and when a value of the Stuffing Indicator field is 0, a transport packet includes no stuffing byte According to a specific embodiment of the present invention, the Stuffing Indicator field may be a 1-bit field.

The Pointer field represents a start point of a new network packet in a payload part of a corresponding transport packet. According to a specific embodiment of the present invention, when a value of the Pointer field is 0x7FF, it may represent that there is no start point of a new network packet. Additionally, According to a specific embodiment of the present invention, when a value of the Pointer field is not 0x7FF, it may represent an offset value from the last part of a transport packet header to the start point of a new network packet. According to a specific embodiment of the present invention, the Pointer field may be an 11-bit field.

The Stuffing Bytes field represents a stuffing byte filling between the header and the payload data to maintain a fixed packet length.

A configuration of a broadcast reception device for receiving broadcast service will be described with reference to FIG. 129.

Figure 101:
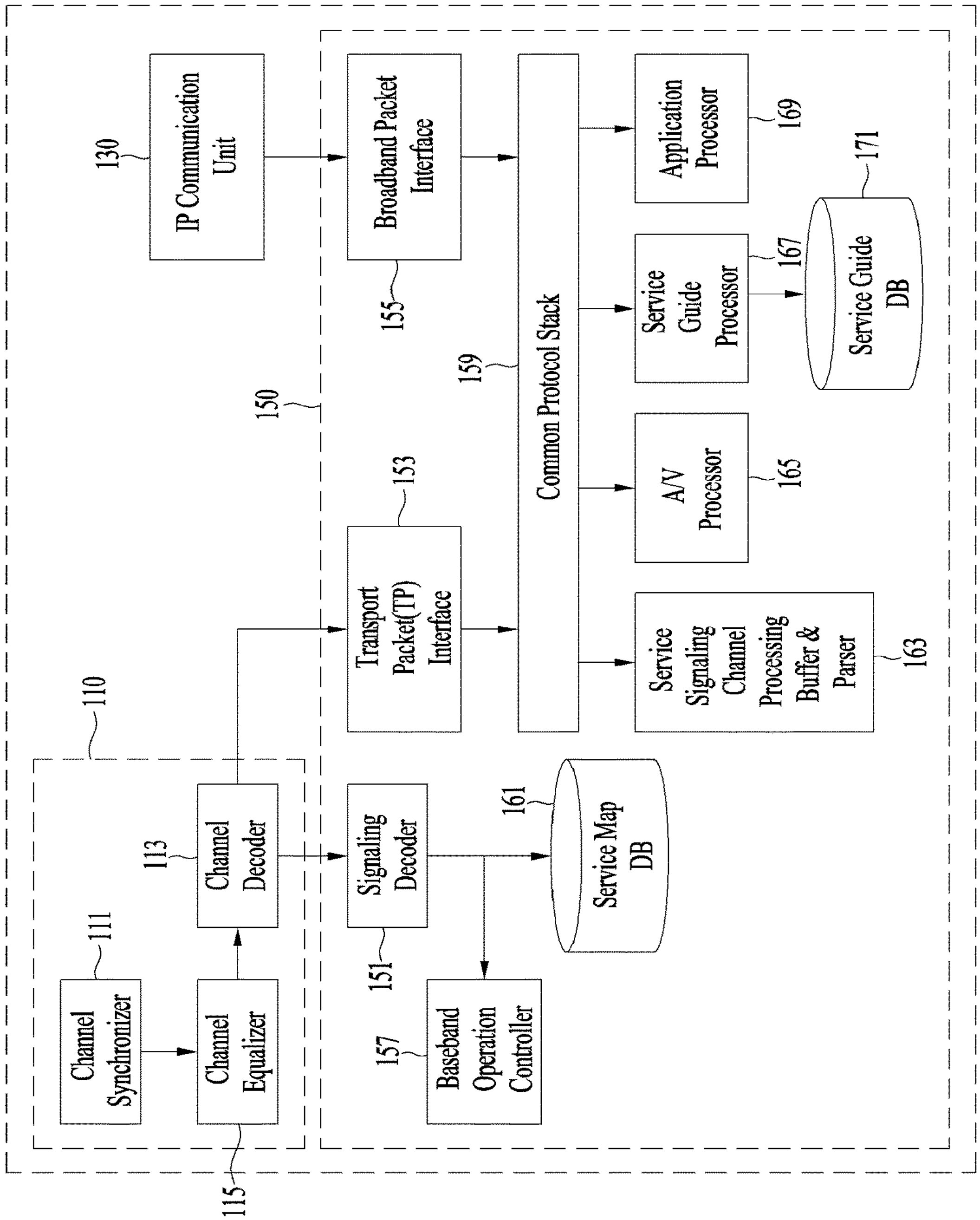
FIG. 101 is a view illustrating a configuration of a broadcast reception device according to an embodiment of the present invention.

FIG. 101 is a view illustrating a configuration of a broadcast reception device according to an embodiment of the present invention.

The broadcast reception device 100 of FIG. 101 includes a broadcast receiving unit 110, an internet protocol (IP) communication unit 130, and a control unit 150.

The broadcast receiving unit 110 includes a channel synchronizer 111, a channel equalizer 113, and a channel decoder 115.

The channel synchronizer 111 synchronizes a symbol frequency with a timing in order for decoding in a baseband where a broadcast signal is received.

The channel equalizer 113 corrects the distortion of a synchronized broadcast signal.

In more detail, the channel equalizer 113 corrects the distortion of a synchronized signal due to multipath and Doppler effects.

The channel decoder 115 decodes a distortion corrected broadcast signal. In more detail, the channel decoder 115 extracts a transmission frame from the distortion corrected broadcast signal. At this point, the channel decoder 115 may perform forward error correction (FEC).

The IP communication unit 130 receives and transmits data through internet network.

The control unit 150 includes a signaling decoder 151, a transport packet interface 153, a broadband packet interface 155, a baseband operation control unit 157, a common protocol stack 159, a service map database 161, a service signaling channel processing buffer and parser 163, an A/V processor 165, a broadcast service guide processor 167, an application processor 169, and a service guide database 171.

The signaling decoder 151 decodes signaling information of a broadcast signal.

The transport packet interface 153 extracts a transport packet from a broadcast signal. At this point, the transport packet interface 153 may extract data such as signaling information or IP datagram from the extracted transport packet.

The broadcast packet interface 155 extracts an IP packet from data received from internet network. At this point, the broadcast packet interface 155 may extract signaling data or IP datagram from the IP packet.

The baseband operation control unit 157 controls an operation relating to receiving broadcast information from a baseband.

The common protocol stack 159 extracts audio or video from a transport packet.

The A/V processor 547 processes audio or video.

The service signaling channel processing buffer and parser 163 parses and buffers signaling information that signals broadcast service. In more detail, the service signaling channel processing buffer and parser 163 parses and buffers signaling information that signals broadcast service from the IP datagram.

The service map database 165 stores a broadcast service list including information on broadcast services.

The service guide processor 167 processes terrestrial broadcast service guide data guiding programs of terrestrial broadcast service.

The application processor 169 extracts and processes application related information from a broadcast signal.

The serviced guide database 171 stores program information of a broadcast service.

Figure 102:
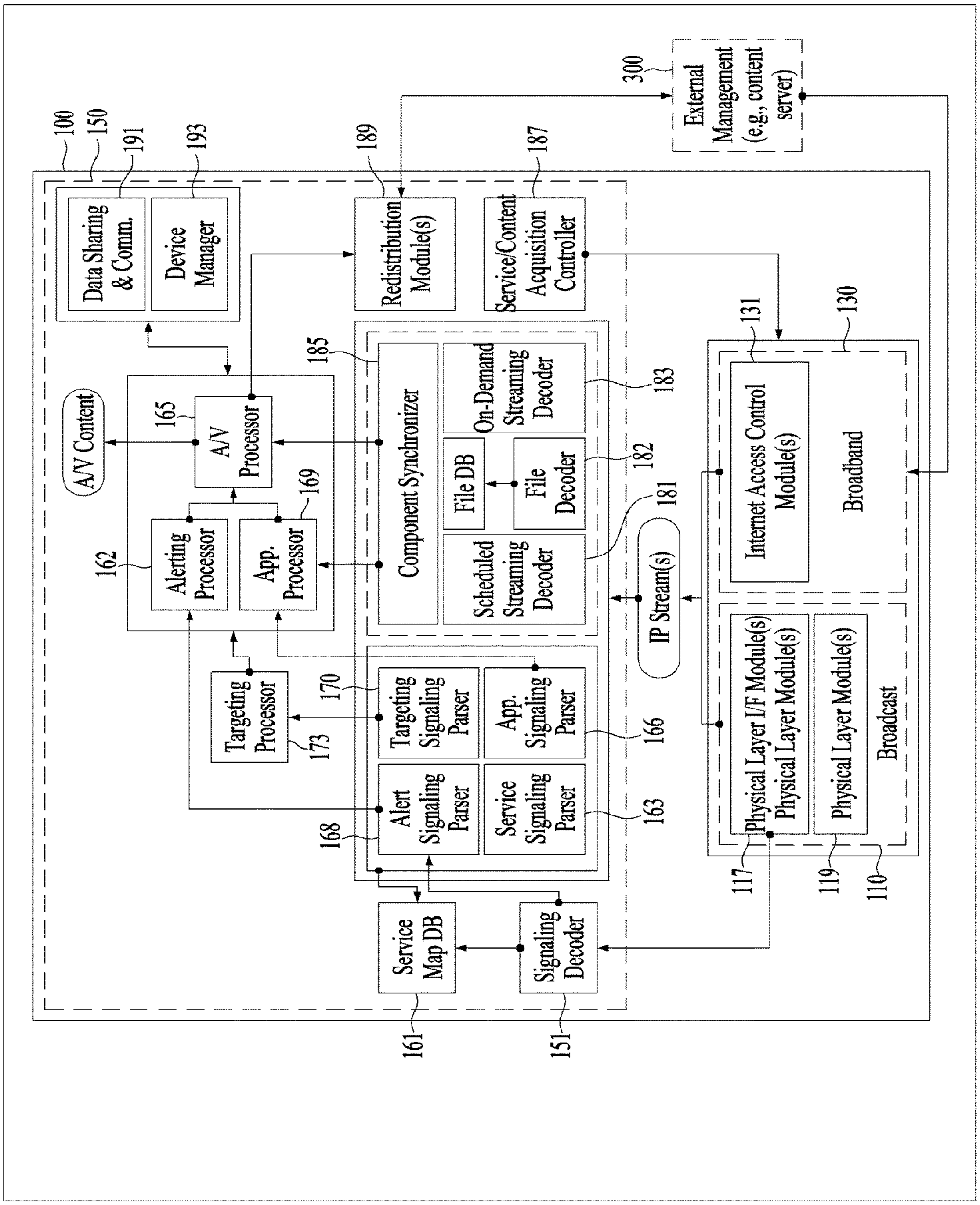
FIG. 102 is a view illustrating a configuration of a broadcast reception device according to another embodiment of the present invention.

FIG. 102 is a view illustrating a configuration of a broadcast reception device according to another embodiment of the present invention.

In an embodiment of FIG. 102, the broadcast reception device 100 of FIG. 102 includes a broadcast receiving unit 110, an internet protocol (IP) communication unit 130, and a control unit 150.

The broadcast receiving unit 110 may include one or more processors, one or more circuits, and one or more hardware modules, which perform each of a plurality of functions that the broadcast receiving unit 110 performs. In more detail, the broadcast receiving unit 110 may be a System On Chip (SOC) in which several semiconductor parts are integrated into one. At this point, the SOC may be semiconductor in which various multimedia components such as graphics, audio, video, and modem and a semiconductor such as a processor and D-RAM are integrated into one. The broadcast receiving unit 110 may include a physical layer module 119 and a physical layer IP frame module 117. The physical layer module 119 receives and processes a broadcast related signal through a broadcast channel of a broadcast network. The physical layer IP frame module 117 converts a data packet such as an IP datagram obtained from the physical layer module 119 into a specific frame. For example, the physical layer module 119 may convert an IP datagram into an RS Frame or GSE.

The IP communication unit 130 may include one or more processors, one or more circuits, and one or more hardware modules, which perform each of a plurality of functions that the IP communication unit 130 performs. In more detail, the IP communication unit 130 may be a System On Chip (SOC) in which several semiconductor parts are integrated into one. At this point, the SOC may be semiconductor in which various multimedia components such as graphics, audio, video, and modem and a semiconductor such as a processor and D-RAM are integrated into one. The IP communication unit 130 may include an internet access control module 131. The internet access control module 131 may control an operation of the broadcast reception device 100 to obtain at least one of service, content, and signaling data through an internet communication network (for example, broad band).

The control unit 150 may include one or more processors, one or more circuits, and one or more hardware modules, which perform each of a plurality of functions that the control unit 150 performs. In more detail, the control unit 150 may be a System On Chip (SOC) in which several semiconductor parts are integrated into one. At this point, the SOC may be semiconductor in which various multimedia components such as graphics, audio, video, and modem and a semiconductor such as a processor and D-RAM are integrated into one. The control unit 150 may include at least one of a signaling decoder 151, a service map database 161, a service signaling channel parser 163, an application signaling parser 166, an alert signaling parser 168, a targeting signaling parser 170, a targeting processor 173, an A/V processor 161, an alerting processor 162, an application processor 169, a scheduled streaming decoder 181, a file decoder 182, a user request streaming decoder 183, a file database 184, a component synchronization unit 185, a service/content acquisition control unit 187, a redistribution module 189, a device manager 193, and a data sharing unit 191.

The service/content acquisition control unit 187 controls operations of a receiver to obtain services or contents through a broadcast network or an internet communication network and signaling data relating to services or contents.

The signaling decoder 151 decodes signaling information.

The service signaling parser 163 parses service signaling information.

The application signaling parser 166 extracts and parses service related signaling information. At this point, the service related signaling information may be service scan related signaling information. Additionally, the service related signaling information may be signaling information relating to contents provided through a service.

The alert signaling parser 168 extracts and parses alerting related signaling information.

The target signaling parser 170 extracts and parses information for personalizing services or contents or information for signaling targeting information.

The targeting processor 173 processes information for personalizing services or contents.

The alerting processor 162 processes alerting related signaling information.

The application processor 169 controls application related information and the execution of an application. In more detail, the application processor 169 processes a state of a downloaded application and a display parameter.

The A/V processor 161 processes an A/V rendering related operation on the basis of decoded audio or video and application data.

The scheduled streaming decoder 181 decodes a scheduled streaming that is a content streamed according to a schedule defined by a contents provider such as broadcaster.

The file decoder 182 decodes a downloaded file. Especially, the file decoder 182 decodes a file downloaded through an internet communication network.

The user request streaming decoder 183 decodes a content (for example, On Demand Content) provided by a user request.

The file database 184 stores files. In more detail, the file database 184 may store a file downloaded through an internet communication network.

The component synchronization unit 185 synchronizes contents or services. In more detail, the component synchronization unit 185 synchronizes a content decoded by at least one of the scheduled streaming decoder 181, the file decoder 182, and the user request streaming decoder 183.

The service/content acquisition control unit 187 controls operations of a receiver to obtain services, contents or signaling information relating to services or contents.

When services or contents are not received through a broadcast network, the redistribution module 189 performs operations to support obtaining at least one of services, contents, service related information, and content related information. In more detail, the redistribution module 189 may request at least one of services, contents, service related information, and content related information from the external management device 300. At this point, the external management device 300 may be a content server.

The device manager 193 manages an interoperable external device. In more detail, the device manager 193 may perform at least one of the addition, deletion, and update of an external device. Additionally, an external device may perform connection and data exchange with the broadcast reception device 100.

The data sharing unit 191 performs a data transmission operation between the broadcast reception device 100 and an external device and processes exchange related information. In more detail, the data sharing unit 191 may transmit AV data or signaling information to an external device. Additionally, the data sharing unit 191 may receive AV data or signaling information from an external device.

Figure 103:
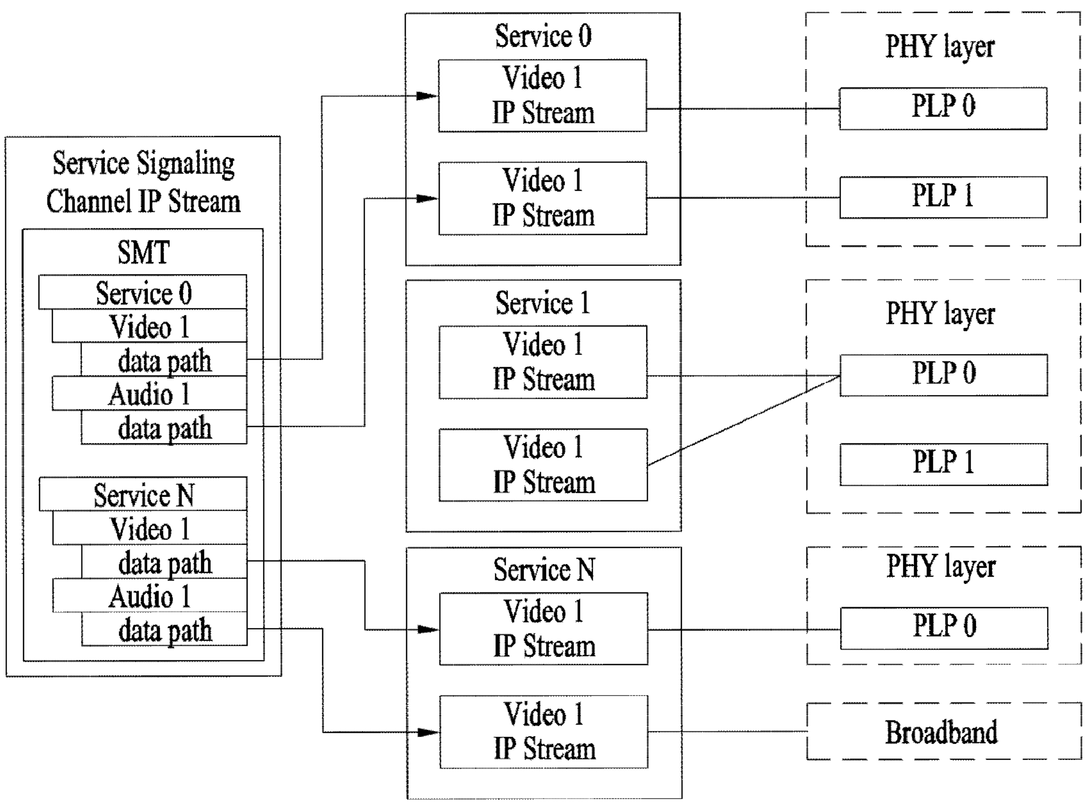
FIG. 103 is a view that a broadcast service signaling table and broadcast service transmission path signaling information signal broadcast service and a broadcast service transmission path.

FIG. 103 is a view that a broadcast service signaling table and broadcast service transmission path signaling information signal broadcast service and a broadcast service transmission path.

The broadcast service signaling table may signal broadcast service information. In more detail, the broadcast service signaling table may signal a media component that broadcast service includes. Additionally, the broadcast service signaling table may signal broadcast service and a transmission path of a media component that the broadcast service includes. For this, the broadcast service signaling table may include broadcast service transmission path signaling information. In the embodiment of FIG. 103, the broadcast service signaling table includes information on a plurality of broadcast services. At this point, the broadcast service signaling table includes media component signaling information signaling a plurality of media components respectively included in a plurality of broadcast services. Especially, the broadcast service signaling table includes broadcast service transmission path signaling information signaling transmission paths of a plurality of media components. For example, it is shown that the broadcast reception device 100 may transmit Video 1 in Service 0 through PLP 0 according to the signaling table. Additionally, it is shown that the broadcast reception device 100 may transmit Audio 1 in Service N through internet network according to the signaling table. At this point, the PLP is a series of logical data delivery paths identifiable on a physical layer. The PLP may be also referred to as a data pipe.

A broadcast service signaling table will be described with reference to FIGS. 104 to 109.

FIG. 104 is a view illustrating a broadcast service signaling table according to an embodiment of the present invention.

The broadcast service signaling table may include at least one of broadcast service identification information, information representing the current state of a broadcast service, the name of a broadcast service, information representing whether a protection algorithm for broadcast service is applied, category information of a broadcast service, and media component signaling information signaling a media component that a broadcast service includes. The media component signaling information signaling a media component that the broadcast service includes may include information representing whether each media component is essential to a corresponding broadcast service. Additionally, the media component signaling information signaling a media component that the broadcast service includes may include information relating to each component.

In more detail, as shown in the embodiment of FIG. 104, the broadcast service signaling table may include at least one of a table_id field, section_syntax_indicator field, a private_indicator field, a section_length field, a table_id_extension field, a version_number field, a current_next_indicator field, a section_number field, a last_section_number field, a num_services field, a service_id field, a service_status field, an SP_indicator field, a short_service_name_length field, a short_service_name field, a channel_number field, a service_category field, a num_components field, an essential_component_indicator field, a num_component_level_descriptor field, a component_level_descriptor field, a num_service_level_descriptors field, and a service_level_descriptor field.

The table_id field represents an identifier of a broadcast service signaling information table. At this point, a value of the table_id field may be one of reserved id values defined in ATSC A/65. According to a specific embodiment of the present invention, the table_id field may be an 8-bit field.

The section_syntax_indicator field represents whether the broadcast service signaling information table is a private section table in a long format of MEPG-2 TS standard. According to a specific embodiment of the present invention, the section_syntax_indicator field may be a 1-bit field.

The private_indicator field represents whether a current table corresponds to a private section. According to a specific embodiment of the present invention, the private_indicator field may be a 1-bit field.

The section_length field represents the length of a section after the section_length field. According to a specific embodiment of the present invention, the section_length field may be a 12-bit field.

The table_id_extension field represents a value for identifying a broadcast service signaling information table in combination with the table_id field. Especially, the table_id field may include an SMT_protocol_version field representing a protocol version of a service signaling information table. According to a specific embodiment of the present invention, the SMT_protocol_version field may be an 8-bit field.

The version_number field represents a version of a service signaling table. The broadcast reception device 100 may determine the availability of a service signaling information table on the basis of a value of the version_number field. In more detail, when a value of the version_number field is identical to a version of a previously received service signaling table, the information of the service signaling table may not be used. According to a specific embodiment of the present invention, the version_number field may be a 5-bit field.

The current_next_indicator field represents whether information of a broadcast service signaling table is currently available. In more detail, when a value of the current_next_indicator field is 1, it may represent that the information of the broadcast service signaling table is available. Moreover, when a value of the current_next_indicator field is 1, it may represent that the information of the broadcast service signaling table is available next time. According to a specific embodiment of the present invention, the current_next_indicator field may be a 1-bit field.

The section_number field represents a current section number. According to a specific embodiment of the present invention, the section_number field may be an 8-bit field.

The last_section_number field represents the last section number. When the size of a broadcast service signaling table is large, it may be divided into a plurality of sections and then transmitted. At this point, the broadcast reception device 100 determines whether all sections necessary for a broadcast service signaling table are received on the basis of the section_number field and the last_section_number field. According to a specific embodiment of the present invention, the last_section_number field may be an 8-bit field.

The service_id field represents a service identifier for identifying a broadcast service. According to a specific embodiment of the present invention, the service_id field may be a 16-bit field.

The service_status field represents the current state of a broadcast service. In more detail, it may represent whether the broadcast service is available currently. According to a specific embodiment of the present invention, when a value of the service_status field is 1, it may represent that the broadcast service is available currently. According to a specific embodiment of the present invention, the broadcast reception device 100 may determine whether to display a corresponding broadcast service in a broadcast service list and a broadcast service guide on the basis of a value of the service_status field. For example, when a corresponding broadcast service is unavailable, the broadcast reception device 100 may not display the corresponding broadcast service in a broadcast service list and a broadcast service guide. According to another specific embodiment of the present invention, the broadcast reception device 100 may limit an access to a corresponding broadcast service on the basis of a value of the service_status field. For example, when a corresponding broadcast service is unavailable, the broadcast reception device 100 may limit an access to a corresponding broadcast service through a channel up/down key. According to a specific embodiment of the present invention, the service_status field may be a 2-bit field.

The SP_indicator field may represent whether service protection is applied to at least one component in a corresponding broadcast service. For example, when a value of SP_indicator is 1, it may represent that service protection is applied to at least one component in a corresponding broadcast service. According to a specific embodiment of the present invention, the SP_indicator field may be a 1-bit field.

The short_service_name_length field represents the size of the short_service_name field.

The short_service_name field represents the name of a broadcast service. In more detail, the short_service_name field may be displayed by summarizing the name of a broadcast service.

The channel_number field displays a virtual channel number of a corresponding broadcast service.

The service_category field represents a category of a broadcast service. In more detail, the service_category field may represent at least one of TV service, radio service, broadcast service guide, RI service, and emergency alerting. For example, as shown in the embodiment of FIG. 104, in the case that a value of the service_category field is 0x01, it represents TV service. In the case that a value of the service_category field is 0x02, it represents radio service. In the case that a value of the service_category field is 0x03, it represents RI service. In the case that a value of the service_category field is 0x08, it represents service guide. In the case that a value of the service_category field is 0x09, it represents emergency alerting. According to a specific embodiment of the present invention, the service_category field may be a 6-bit field.

The num_component field represents the number of media components that a corresponding broadcast service includes. According to a specific embodiment of the present invention, the num_component field may be a 5-bit field.

The essential_component_indicator field represents whether a corresponding media component is an essential media component essential to a corresponding broadcast service presentation. According to a specific embodiment of the present invention, the essential_component_indicator field may be a 1-bit field.

The num_component_level_descriptor field represents the number of component_level_descriptor fields. According to a specific embodiment of the present invention, the num_component_level_descriptor field may be a 4-bit field.

The component_level_descriptor field includes an additional property for a corresponding component.

The num_service_level_descriptors field represents the number of service_level_descriptor fields. According to a specific embodiment of the present invention, the num_service_level_descriptors field may be a 4-bit field.

The service_level_descriptor field includes an additional property for a corresponding service.

The service signaling table may further include information on ensemble. When the same Forward Error Correction (FEC) is applied to at least one service and transmitted, the ensemble represents a collection of the at least one service. This will be described in more detail with reference to FIG. 106.

FIG. 106 is a view of a broadcast service signaling table according to another embodiment of the present invention.

In more detail, as shown in the embodiment of FIG. 106, the broadcast service signaling table may further include a num_ensemble_level_descriptors field and an ensemble_level_descriptor field.

The num_ensemble_level_descriptors field represents the number of ensemble_level_descriptor fields. According to a specific embodiment of the present invention, the num_ensemble_level_descriptors field may be a 4-bit field.

The ensemble_level_descriptor field includes an additional property for a corresponding ensemble.

Additionally, the service signaling table may further include stream identifier information for identifying a media component. This will be described in more detail with reference to FIG. 136.

FIG. 107 is a view of a stream identifier descriptor according to another embodiment of the present invention.

The stream identifier information includes at least one of a descriptor_tag field, a descriptor_length field, and a component_tag field.

The descriptor_tag field represents a descriptor including stream identifier information. According to a specific embodiment of the present invention, the descriptor_tag field may be an 8-bit field.

The descriptor_length field represents the length of stream identifier information after a corresponding field. According to a specific embodiment of the present invention, the descriptor_length field may be an 8-bit field.

The component_tag field represents a media component identifier for identifying a media component. At this point, the media component identifier may have a different unique value than a media component identifier of another media component on a corresponding signaling information table. According to a specific embodiment of the present invention, the component_tag field may be an 8-bit field.

An operation for transmitting/receiving a broadcast service signaling table will be described with reference to FIGS. 108 and 112.

The above broadcast service table is described as in a bitstream format but according to a specific embodiment of the present invention, a broadcast service table may be in an XML format.

FIG. 108 is a view illustrating an operation when a broadcast transmission device transmits a broadcast service signaling table according to an embodiment of the present invention.

The broadcast transmission device may include a transmitting unit for transmitting a broadcast signals and a control unit for controlling operations of the broadcast transmitting unit. A transmitting unit may include one or more processors, one or more circuits, and one or more hardware modules, which perform each of a plurality of functions that the transmitting unit performs. In more detail, the transmitting unit may be a System On Chip (SOC) in which several semiconductor parts are integrated into one. At this point, the SOC may be semiconductor in which various multimedia components such as graphics, audio, video, and modem and a semiconductor such as a processor and D-RAM are integrated into one. A control unit may include one or more processors, one or more circuits, and one or more hardware modules, which perform each of a plurality of functions that the control unit performs. In more detail, the control unit may be a System On Chip (SOC) in which several semiconductor parts are integrated into one. At this point, the SOC may be semiconductor in which various multimedia components such as graphics, audio, video, and modem and a semiconductor such as a processor and D-RAM are integrated into one.

The broadcast transmission device obtains broadcast service information through the control unit in operation S101. At this point, the broadcast service information is information for describing broadcast service. In more detail, the broadcast service information may include at least one of broadcast service identification information, information representing the current state of a broadcast service, the name of a broadcast service, a channel number of a broadcast service, information representing whether a protection algorithm for broadcast service is applied, category information of a broadcast service, and media component signaling information signaling a media component that a broadcast service includes. The media component signaling information signaling a media component that the broadcast service includes may include information representing whether each media component is essential to a corresponding broadcast service. Additionally, the media component signaling information signaling a media component that the broadcast service includes may include information relating to each component.

The broadcast transmission device generates a broadcast service signaling table on the basis of broadcast service information through a control unit in operation S103. At this point, the broadcast service signaling table may include the above-mentioned broadcast service information.

The broadcast transmission device transmits a broadcast signal including a service signaling table through a transmitting unit in operation S105.

FIG. 109 is a view illustrating an operation when a broadcast reception device receives a broadcast service signaling table according to an embodiment of the present invention.

The broadcast reception device 100 receives a broadcast signal through the broadcast receiving unit 110 in operation S301.

The broadcast reception device 100 obtains a broadcast service signaling table through the control unit 150 on the basis of the broadcast signal in operation S303. In more detail, the broadcast reception device 100 may obtain a broadcast service signaling table from the broadcast signal. At this point, as mentioned above, the broadcast service signaling table may include at least one of broadcast service identification information, information representing the current state of a broadcast service, the name of a broadcast service, information representing whether a protection algorithm for broadcast service is applied, category information of a broadcast service, and media component signaling information signaling a media component. The media component signaling information signaling a media component that the broadcast service includes may include information representing whether each media component is essential to a corresponding broadcast service. Additionally, the media component signaling information signaling a media component that the broadcast service includes may include information relating to each component. However, according to a specific embodiment of the present invention, the broadcast reception device 100 may obtain a broadcast service signaling table via an IP network.

The broadcast reception device 100 obtains broadcast service information on the basis of the broadcast service signaling table through the control unit 150 in operation S305. At this point, as mentioned above, the broadcast service information may include at least one of broadcast service identification information, information representing the current state of a broadcast service, the name of a broadcast service, a channel number of a broadcast service, information representing whether a protection algorithm for broadcast service is applied, category information of a broadcast service, and media component signaling information signaling a media component that a broadcast service includes. The media component signaling information signaling a media component that the broadcast service includes may include information representing whether each media component is essential to a corresponding broadcast service. Additionally, the media component signaling information signaling a media component that the broadcast service includes may include information relating to each component.

The broadcast reception device 100 generates a broadcast service list for storing information on a broadcast service on the basis of the broadcast service information through the control unit 150 in operation S307. At this point, the broadcast service list may include broadcast service information that the broadcast reception device 100 obtains. According to a specific embodiment of the present invention, the broadcast reception device 100 may receive a broadcast service on the basis of broadcast service information or a broadcast service list.

FIG. 110 is a view illustrating broadcast service transmission path signaling information according to an embodiment of the present invention.

The broadcast service transmission path signaling information may include information representing the type of a network transmitting a broadcast service and specific transmission information according to a broadcast transmission type. The type of a network transmitting a broadcast service may be one of a network transmitting a broadcast service through an IP stream that the same broadcaster transmits, a network transmitting a broadcast service through an IP stream that a different broadcaster transmit, a network transmitting a broadcast service through a FLUTE session of the same broadcaster, a network transmitting a broadcast service through a FLUTE session of a different broadcaster, a network transmitting a broadcast service through MPEG-2 TS of different broadcasters, a network transmitting a broadcast service through a packet based stream of a different broadcaster, a network transmitting a broadcast service through a packet based stream transmitted from an IP based broadcast network, and a network for obtaining a broadcast service through URL.

According to a specific embodiment of the present invention, as shown in FIG. 110, the broadcast service transmission path signaling information may include a descriptor_tag field, a description_length field, a delivery_network_type field, and a data_path field.

The descriptor_tag field represents that a corresponding descriptor includes transmission path signaling information. According to a specific embodiment of the present invention, the descriptor_tag field may be an 8-bit field.

The descriptor_length field represents the length of broadcast service transmission path signaling information after a corresponding field. According to a specific embodiment of the present invention, the descriptor_length field may be an 8-bit field.

The delivery_network_type field represents the type of a transmission network transmitting a broadcast service. According to a specific embodiment of the present invention, a value of the delivery_network_type field may represent one of a network transmitting a broadcast service through an IP stream that the same broadcaster transmits, a network transmitting a broadcast service through an IP stream that a different broadcaster transmit, a network transmitting a broadcast service through a FLUTE session of the same broadcaster, a network transmitting a broadcast service through a FLUTE session of a different broadcaster, a network transmitting a broadcast service through MPEG-2 TS of a different broadcaster, a network transmitting a broadcast service through a packet based stream of a different broadcaster, a network transmitting a broadcast service through a packet based stream transmitted from an IP based broadcast network, and a network obtaining a broadcast service through URL. For example, as shown in the embodiment of FIG. 111, when a value of the delivery_network_type field is 0x00, it may represent a network transmitting a broadcast service through an IP stream transmitted from the same broadcaster. Moreover, when a value of the delivery_network_type field is 0x01, it may represent a network transmitting a broadcast service through an IP stream transmitted from a different broadcaster. Moreover, when a value of the delivery_network_type field is 0x02, it may represent a network transmitting a broadcast service through a FLUTE session of the same broadcaster. Additionally, when a value of the delivery_network_type field is 0x03, it may represent a network transmitting a broadcast service through a FLUTE session of a different broadcaster. Furthermore, when a value of the delivery_network_type field is 0x04, it may represent a network transmitting a broadcast service through an MPEG-2 TS of a different broadcaster. In addition, when a value of the delivery_network_type field is 0x05, it may represent a network transmitting a broadcast service through a packet based stream of a different broadcaster. Moreover, when a value of the delivery_network_type field is 0x06, it may represent a network transmitting a broadcast service through a packet based stream transmitted from an IP based broadcast network. Furthermore, when a value of the delivery_network_type field is 0x07, it may represent a network obtaining a broadcast service through URL.

The data_path field includes specific transmission information according to the type of a transmission network transmitting a broadcast service. This data_path will be described in more detail with reference to FIGS. 112 to 120.

FIG. 112 is a view when broadcast service transmission path signaling information signals the transmission of a broadcast service through IP stream according to an embodiment of the present invention.

When a network transmitting a broadcast service is a network transmitting a broadcast service through an IP stream that the same broadcaster transmits, broadcast service transmission path signaling information may include at least one of information representing an IP version, information on whether it contains a source IP address, an source IP address, information on whether it contains a destination IP address, a destination IP address, information representing the number of UDP ports of an IP datagram flow transmitting a broadcast service, and information an UDP port number information.

According to a specific embodiment of the present invention, as shown in the embodiment of FIG. 112, the broadcast service transmission path signaling information may include at leas one among an IP_versioni_flag field, a source_IP_address_flag field, a destination_IP_address_flag field, a source_IP_address field, a port_num_count field, and a destination_UDP_port_number field.

The IP_versioni_flag field represents an IP address format of an IP datagram including a broadcast service. In more detail, when a value of the IP_versioni_flag field is 1, it represents that an IP datagram including a broadcast service is IPV4 format and when a value of the IP_versioni_flag field is 0, it represents that an IP datagram including a broadcast service is IPv6 format. According to a specific embodiment of the present invention, the IP_versioni_flag field may be a 1-bit field.

The source_IP_address_flag field represents whether an IP datagram including a broadcast service includes a source IP address. In more detail, when a value of the source_IP_address_flag field is 1, it represents that an IP datagram including a broadcast service includes a source IP address and when a value of the source_IP_address_flag field is 0, it represents that an IP datagram including a broadcast service does not include a source_IP address. According to a specific embodiment of the present invention, the source_IP_address_flag field may be a 1-bit field.

The destination_IP_address_flag field represents that an IP datagram including a broadcast service includes a destination IP address. In more detail, when a value of the destination_IP_address_flag field is 1, it represents that an IP datagram including a broadcast service includes a destination IP address and when a value of the destinationws_IP_address_flag field is 0, it represents that an IP datagram including a broadcast service does not include a destination IP address. According to a specific embodiment of the present invention, the destination_IP_address_flag field may be a 1-bit field.

The source_IP_address field represents the source IP address of an IP datagram including a broadcast service. According to a specific embodiment of the present invention, the source_IP_address field may be a 32 or 128-bit field according to the IP version.

The destination_IP_address field represents the destination IP address of an IP datagram including a broadcast service. According to a specific embodiment of the present invention, the destination_IP_address field may be a 32 or 128-bit field according to the IP version.

The port_num_count field represents the number of ports of an IP datagram flow including a broadcast. According to a specific embodiment of the present invention, the port_num_count field may be an 8-bit field.

The destination_UDP_port_number field represents the UDP port number of an IP datagram including a broadcast service. According to a specific embodiment of the present invention, the destination_UDP_port_number field may be a 16-bit field.

FIG. 113 is a view when broadcast service transmission path signaling information signals the transmission of a broadcast service through an IP stream of a different broadcaster according to an embodiment of the present invention.

When a network transmitting a broadcast service is a network transmitting a broadcast service through an IP stream that a different broadcaster transmits, unlike a network transmitting a broadcast service through an IP stream that the same broadcaster transmits, the broadcast service transmission path signaling information may further include an identifier for identifying a transport stream transmitting an IP datagram.

According to an embodiment of the present invention, as shown in the embodiment of FIG. 142, the broadcast service transmission path signaling information may include a transport_stream_id field.

The transport_stream_id field identifies a transport stream transmitting an IP datagram including a broadcast service. According to a specific embodiment of the present invention, the transport_stream_id field may be a 16-bit field.

FIG. 114 is a view when broadcast service transmission path signaling information signals the transmission of a broadcast service through a FLUTE session according to an embodiment of the present invention.

When a network transmitting a broadcast service is a network transmitting a broadcast service through a FLUTE session that the same broadcaster transmits, broadcast service transmission path signaling information may include at least one of information representing an IP version, information on whether it contains an IP address, a source IP address, a destination IP address, UDP port number information, and a Transport Session Identifier for identifying a FLUTE session transmitting a FLUTE packet including a broadcast service.

According to a specific embodiment of the present invention, as shown in the embodiment of FIG. 114, the broadcast service transmission path signaling information may include at leas one among an IP_versioni_flag field, a source_IP_address_flag field, a source_IP_address field, a destination_UDP_port_number field, and a flute_tsi field.

The IP_versioni_flag field represents an IP address format of an IP datagram transmitting a FLUTE packet including a broadcast service. In more detail, when a value of the IP_versioni_flag field is 1, it represents that an IP datagram including a broadcast service is IPV4 format and when a value of the IP_versioni_flag field is 0, it represents that an IP datagram including a broadcast service is IPv6 format. According to a specific embodiment of the present invention, the IP_versioni_flag field may be a 1-bit field.

The source_IP_address_flag field represents whether an IP datagram transmitting a FLUTE packet including a broadcast service includes a source IP address. In more detail, when a value of the source_IP_address_flag field is 1, it represents that an IP datagram including a broadcast service includes a source IP address and when a value of the source_IP_address_flag field is 0, it represents that an IP datagram including a broadcast service does not include a source IP address. According to a specific embodiment of the present invention, the source_IP_address_flag field may be a 1-bit field.

The source_IP_address field represents the source IP address of an IP datagram transmitting a FLUTE packet including a broadcast service. According to a specific embodiment of the present invention, the source_IP_address field may be a 32 or 128-bit field according to the IP version.

The destination_IP_address field represents the destination IP address of an IP datagram transmitting a FLUTE packet including a broadcast service. According to a specific embodiment of the present invention, the destination_IP_address field may be a 32 or 128-bit field according to the IP version.

The destination_UDP_port_number field represents the UDP port number of an IP datagram transmitting a FLUTE packet including a broadcast service. According to a specific embodiment of the present invention, the destination_UDP_port_number field may be a 16-bit field.

The flute_tsi field represents a Transport Session Identifier for identifying a FLUTE session transmitting a FLUTE packet including a broadcast service.

FIG. 115 is a view when broadcast service transmission path signaling information signals the transmission of a broadcast service through a FLUTE protocol of a different broadcaster according to an embodiment of the present invention.

When a network transmitting a broadcast service is a network transmitting a broadcast service through a FLUTE session of a different broadcaster, unlike a network transmitting a broadcast service through a FLUTE session of the same broadcaster, the broadcast service transmission path signaling information may further include an identifier for identifying a transport stream transmitting a FLUTE packet.

According to an embodiment of the present invention, as shown in the embodiment of FIG. 115, the broadcast service transmission path signaling information may include a transport_stream_id field.

The transport_stream_id field identifies a transport stream transmitting a FLUTE packet including a broadcast service.

According to a specific embodiment of the present invention, the transport_stream_id field may be a 16-bit field.

FIG. 116 is a view when broadcast service transmission path signaling information signals the transmission of a broadcast service through MPEG-2 TS stream of a different broadcaster according to an embodiment of the present invention.

When a network transmitting a broadcast service is a network transmitting a broadcast service through MPEG-2 TS of a different broadcaster, it may include an identifier for identifying a transport stream transmitting MPEG-2 TS including a broadcast and an identifier of an MPEG-2 TS packet including a broadcast service.

According to a specific embodiment of the present invention, as shown in FIG. 116, the broadcast service transmission path signaling information may include at least one of a transptort_stream_id field and a pid field.

The transptort_stream_id field represents an identifier for identifying a transport stream transmitting MPEG-2 TS. According to a specific embodiment of the present invention, the transport_stream_id field may be a 16-bit field.

The pid field represents an identifier of an MPEG2-TS packet including a broadcast service. According to a specific embodiment of the present invention, the pid field may be a 13-bit field.

FIG. 117 is a view when broadcast service transmission path signaling information signals the transmission of a broadcast service through a packet based stream of a different broadcaster according to an embodiment of the present invention.

When a network transmitting a broadcast service is a network transmitting a broadcast service through a packet based stream of a different broadcaster, broadcast service transmission path signaling information may include an identifier for identifying a packet based stream including a broadcast service and an identifier of a packet including a broadcast service.

According to a specific embodiment of the present invention, as shown in FIG. 117, the broadcast service transmission path signaling information may include at least one of a transptort_stream_id field and a packet_id field.

The transport_stream_id field represents an identifier of a packet based stream including a broadcast service. According to a specific embodiment of the present invention, the transport_stream_id field may be a 16-bit field.

The packet_id field represents an identifier of a packet including a broadcast service. According to a specific embodiment of the present invention, the packet_id field may be a 16-bit field.

FIG. 118 is a view when broadcast service transmission path signaling information signals the transmission of a broadcast service through a packet based stream of an IP based broadcast network according to an embodiment of the present invention.

When a network transmitting a broadcast service is a network transmitting a broadcast service through a packet based stream transmitted from an IP based broadcast network, broadcast service transmission path signaling information may include at least one of information representing an IP version, information representing whether it contains a source IP address, a source IP address, a destination IP address, UDP port number information, and an identifier for identifying a packet including a broadcast service.

According to a specific embodiment of the present invention, as shown in the embodiment of FIG. 118, the broadcast service transmission path signaling information may include at leas one among an IP_versioni_flag field, a source_IP_address_flag field, a source_IP_address field, a destination_UDP_port_number field, and a packet_id field.

The IP_versioni_flag field represents an IP address format of an IP datagram transmitting a packet including a broadcast service. In more detail, when a value of the IP_versioni_flag field is 1, it represents that an IP datagram including a broadcast service is IPV4 format and when a value of the IP_versioni_flag field is 0, it represents that an IP datagram including a broadcast service is IPv6 format. According to a specific embodiment of the present invention, the IP_versioni_flag field may be a 1-bit field.

The source_IP_address_flag field represents whether an IP datagram transmitting a packet including a broadcast service includes a source IP address. In more detail, when a value of the source_IP_address_flag field is 1, it represents that an IP datagram including a broadcast service includes a source IP address and when a value of the source_IP_address_flag field is 0, it represents that an IP datagram including a broadcast service does not include a source IP address. According to a specific embodiment of the present invention, the source_IP_address_flag field may be a 1-bit field.

The source_IP_address field represents the source IP address of an IP datagram transmitting a packet including a broadcast service. According to a specific embodiment of the present invention, the source_IP_address field may be a 32 or 128-bit field according to the IP version.

The destination_IP_address field represents the destination IP address of an IP datagram transmitting a packet including a broadcast service. According to a specific embodiment of the present invention, the destination_IP_address field may be a 32 or 128-bit field according to the IP version.

The destination_UDP_port_number field represents the UDP port number of an IP datagram transmitting a packet including a broadcast service. According to a specific embodiment of the present invention, the destination_UDP_port_number field may be a 16-bit field.

The packet_id field represents an identifier for identifying a packet including a broadcast service. According to a specific embodiment of the present invention, the packet_id field may be a 16-bit field.

FIG. 119 is a view when broadcast service transmission path signaling information signals a broadcast service through URL according to an embodiment of the present invention.

When a network transmitting a broadcast service is a network obtaining a broadcast service through URL, broadcast service transmission path signaling information may include information representing the length of URL for receiving a broadcast service and a URL for receiving a broadcast service.

According to a specific embodiment of the present invention, as shown in FIG. 119, the broadcast service transmission path signaling information may include at least one of an URL_length field and a URI_char field.

The URL_length field represents the length of a URL for receiving a broadcast service. According to a specific embodiment of the present invention, the URL_length field may be an 8-bit field.

The URL_char field represents a URL for receiving a broadcast service. According to a specific embodiment of the present invention, the URL_char field may be an 8-bit field.

Figure 120:
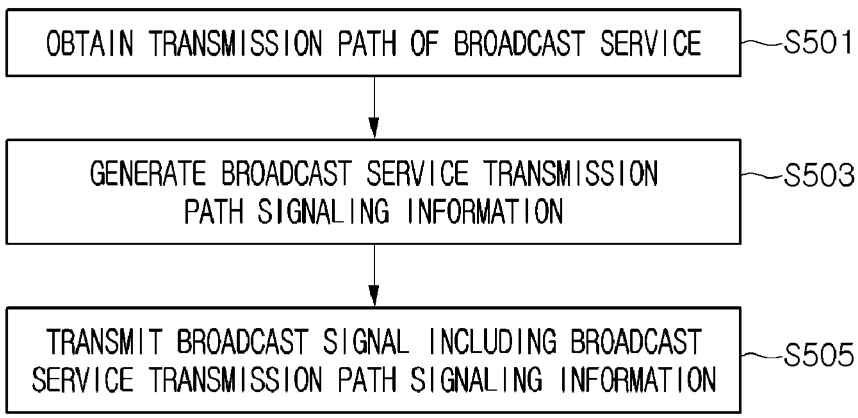

FIG. 120 is a view when a broadcast transmission device transmits broadcast service transmission path signaling information according to an embodiment of the present invention.

The broadcast transmission device obtains a transmission path of a broadcast service through a control unit in operation S501.

The broadcast transmission device generates broadcast service transmission path signaling information through a control unit in operation S503. The broadcast transmission device may generate the broadcast service transmission path signaling information described with reference to FIGS. 109 to 118.

The broadcast transmission device transmits a broadcast signal including broadcast service transmission path signaling information through a transmitting unit in operation S505.

Figure 121:
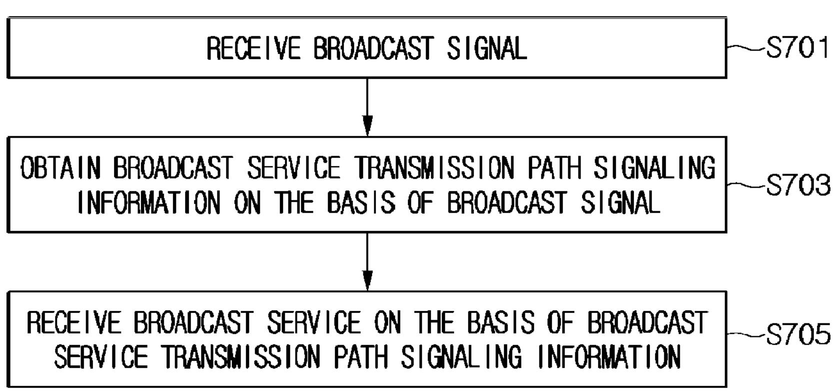

FIG. 121 is a view when a broadcast transmission device transmits broadcast service transmission path signaling information according to an embodiment of the present invention.

The broadcast reception device 100 receives a broadcast signal through the broadcast receiving unit 110 in operation S701.

The broadcast reception device 100 obtains broadcast service transmission path signaling information through the control unit 150 on the basis of the broadcast signal in operation S703.

The broadcast reception device 100 receives a broadcast service on the basis of the broadcast service transmission path signaling information through the control unit 150 in operation S705. In more detail, the broadcast reception device 100 may receive a media component of a broadcast service on the basis of the broadcast service transmission path signaling information through the control unit 150. As described with reference to FIGS. 111 to 120, the broadcast reception device 100 may receive a broadcast service through at least one of a network transmitting a broadcast service through an IP stream that the same broadcaster transmits, a network transmitting a broadcast service through an IP stream that a different broadcaster transmit, a network transmitting a broadcast service through a FLUTE session of the same broadcaster, a network transmitting a broadcast service through a FLUTE session of different broadcasters, a network transmitting a broadcast service through MPEG-2 TS of a different broadcaster, a network transmitting a broadcast service through a packet based stream of a different broadcaster, a network transmitting a broadcast service through a packet based stream transmitted from an IP based broadcast network, and a network obtaining a broadcast service through URL. Especially, according to a specific embodiment of the present invention, the broadcast reception device 100 may receive a plurality of media components of a broadcast service through a plurality of networks. For example, the broadcast reception device 1100 may receive a video component of a broadcast service via a packet based stream through the broadcast receiving unit 1110 and may receive an audio component of a broadcast service via an IP based broadcast network through the IP communication unit 130.

As described above, the broadcast service signaling table may include media component signaling information signaling a media component. Especially, when a broadcast service is transmitted in the ISO Base Media File Format (ISO BMFF), the broadcast service signaling table may include media component signaling information. This will be described in more detail with reference to FIGS. 122 to 125.

FIG. 122 is a view illustrating media component signaling information signaling a media component according to an embodiment of the present invention.

The media component signaling information may include information representing an encoding type of a media component, information on whether a media component is encrypted, information representing the number of STKM streams including a key decrypting an encrypted media component, an identifier for identifying an STKM stream including a key for decrypting an encrypted media component, the length of a transmission parameter of a media component, a transmission parameter of a media component, and an encoding parameter according to an encoding type of a component. At this point, the transmission parameter may include at least one of a buffer model and the size of a maximum transmitting unit (MTU).

According to a specific embodiment of the present invention, as shown in the embodiment of FIG. 122, media component signaling information may include at least one of a descriptor_tag field, a descriptor_length field, a component_type field, a component_encryption_flag field, a num_STKM_streams field, an STKM_stream_id field, a transport_parameter_text_length field, a transport_parameter_text field, and a component_data field.

The descriptor_tag field represents that a corresponding descriptor includes media component signaling information. According to a specific embodiment of the present invention, the descriptor_tag field may be an 8-bit field.

The descriptor_length field represents the length of broadcast service transmission path signaling information after a corresponding field. According to a specific embodiment of the present invention, the descriptor_length field may be an 8-bit field.

The component_type field represents an encoding type of a corresponding component. According to an embodiment of the present invention, as shown in the embodiment of FIG. 123, a value that the component_type field has may represent at least one of an H.264/AVC, SVC enhancement layer stream component, an HE AAC v2 audio stream component, a FLUTE file delivery session, an STKM stream component, an LTKM stream component, an OMA-RME DIMS stream component, and an NTP time base stream component. When a media component is transmitted through ISO BMFF, the broadcast reception device 100 needs to prepare an appropriate operation for receiving a media component. Accordingly, it is necessary to signal the fact that a media component is transmitted through ISO BMFF. In more detail, as shown in the embodiment of FIG. 123, the component_type field may represent that a media component is transmitted through ISO BMFF. In more detail, when a value of the component_type field is 35, it may represent that a media component is an H.264/AVC component. In more detail, when a value of the component_type field is 36, it may represent that a media component is an SVC enhancement layer stream component. In more detail, when a value of the component_type field is 37, it may represent that a media component is an HE AAC v2 audio stream component. In more detail, when a value of the component_type field is 38, it may represent that a media component is transmitted through a FLUTE file transport session. In more detail, when a value of the component_type field is 39, it may represent that a media component is an STKM stream component. In more detail, when a value of the component_type field is 40, it may represent that a media component is an LTKM stream component. In more detail, when a value of the component_type field is 41, it may represent that a media component is an OMA-RME DIMS stream component. In more detail, when a value of the component_type field is 42, it may represent that a media component is an NTP time base stream component. In more detail, when a value of the component_type field is 43, it may represent that a media component is transmitted through an ISO BMFF. According to a specific embodiment of the present invention, the component_type field may be a 7-bit field.

The component_encryption_flag field is a field representing whether a media component is encrypted. According to a specific embodiment of the present invention, the component_encryption_flag field may be a 1-bit field.

The num_STKM_streams field represents the number of STKM streams including a key for decrypting an encrypted media component. According to a specific embodiment of the present invention, the num_STKM_streams field may be an 8-bit field.

The STKM_stream_id field represents an identifier for identifying an STKM stream including a key for decrypting an encrypted media component. According to a specific embodiment of the present invention, the STKM_stream_id field may be an 8-bit field.

The transport_parameter_text_length field represents the length of the transport_parameter_text field. According to a specific embodiment of the present invention, the transport_parameter_text_length field may be an 8-bit field.

The transport_parameter_text field represents a transmission parameter of a media component. At this point, the transmission parameter may include at least one of a buffer model and the size of a maximum transmitting unit (MTU).

The component_data field represents an encoding parameter of a component. A parameter that an encoding parameter includes may vary according to an encoding type of a component. In more detail, a parameter that an encoding parameter includes may vary according to a value of the component_type field.

When a media component is transmitted through ISO BMFF, the component_data field may include at least one of version information of ISO BMFF and profile information.

In more detail, as shown in the embodiment of FIG. 125, the component_data field may include at least one of a version field and a profile field.

The version field represents version information of ISO BMFF. According to a specific embodiment of the present invention, the version field may be an 8-bit field.

The profile field represents profile information of ISO BMFF. According to a specific embodiment of the present invention, the profile field may be an 8-bit field.

The above-described media components are all handled and signaled identically regardless of their contents. However, recently, an adaptive streaming service transmitting different qualities of a media component according to a communication environment receives great attentions. Accordingly, a user may select one of various qualities of media components including the same content according to a communication environment and may then view the selected one. Furthermore, a multi view service displaying a plurality of media components on one screen simultaneously is provided. Accordingly, a user may view a plurality of images or data broadcasts through one screen. For example, a user may view a game of another stadium while viewing a baseball game through an additional Picture In Picture (PIP) screen. In such a way, as a broadcast service including a plurality of media components is diversified and increased, a broadcast transmission device and a broadcast reception device may need to divide the types of a component and process them and also need to systematically define the relationship between each media component. This will be described with reference to FIGS. 125 to 203.

FIG. 125 is a view illustrating the type and role of a media component according to an embodiment of the present invention.

The media component may be divided into a content component, a simple audio component, a simple video component, a continuous component, an elementary component, a composite component, a composite audio component, a composite video component, an adaptive component, an adaptive audio component, an adaptive video component, and a complex component. An adaptive component may be represented as a PickOne component.

The content component is a component including metadata relating to one kind of media. In more detail, the content component may be one of a video track, an audio track, a closed caption, a video enhanced layer, a webpage, and a bi-directional application.

The simple audio component is a component including audio. In more detail, the simple audio component is the encoding of one voice sequence encoded according to specific encoding parameters.

The simple audio component is a component including video. In more detail, the simple video component is the encoding of one video sequence encoded according to specific encoding parameters.

The continuous component is a component played on a continuous stream.

The elementary component is a continuous component including one encoding. The elementary component may be an audio component. In more detail, the elementary component may be one encoding for voice sequence. Additionally, the elementary component may be a video component. In more detail, the elementary component may be one encoding for video sequence. The elementary component may be one closed caption track.

The composite component is a collection of continuous components necessary for playing one scene. In more detail, the composite component is a collection of continuous components that have the same media type, represent the same scene, and need to be played together in a predetermined combination. Accordingly, the composite component is a collection of media components combined to represent one scene. In more detail, the composite component may be music, dialogs, and special effect necessary for one complete audio. Additionally, the composite component may be the right image and the left image of a 3D image necessary for playing the 3D image.

The composite audio component is a collection of audio components necessary for playing voice sequence. In more detail, the composite audio component may be a collection of audio components to be mixed.

The composite video component is a collection of video components necessary for playing image sequence. In more detail, the composite video component may be a collection of 3D components combined for 3D video playback. Additionally, the composite video component may be base video encoding accompanying at least one enhanced encoding.

The adaptive component is a collection of continuous components representing one scene, which are replaced with each other. As described above, the adaptive component may be referred to as PickOne and this represents that one of a plurality of several replaceable continuous components is selected and played. In more detail, the adaptive component is a collection of continuous components that have the same media type and represent the same scene and one of the continuous components is selected for playback. In more detail, the adaptive component is a collection of media components obtained by encoding the same content with different qualities. For example, the adaptive component may be a collection of audio components obtained by encoding the same voice sequence with different bitrates. Additionally, the adaptive component is a collection of video components obtained by encoding the same image sequence with different bitrates. Additionally, the adaptive component may be a general closed caption track and an easy reader closed caption for the same dialog.

The adaptive audio component is a collection of audio components, one of which is selected for playing voice sequence. In more detail, the adaptive audio component may be a collection of audio components obtained by encoding the same sound sequence with different bitrates.

The adaptive video component is a collection of video components, one of which is selected for playing image sequence. In more detail, the adaptive video component may be a collection of video components obtained by encoding the same video sequence with different encoding parameters.

The complex component represents one of the composite component or the adaptive component. The complex component will be described in more detail with reference to FIGS. 126 to 128.

Figure 126:
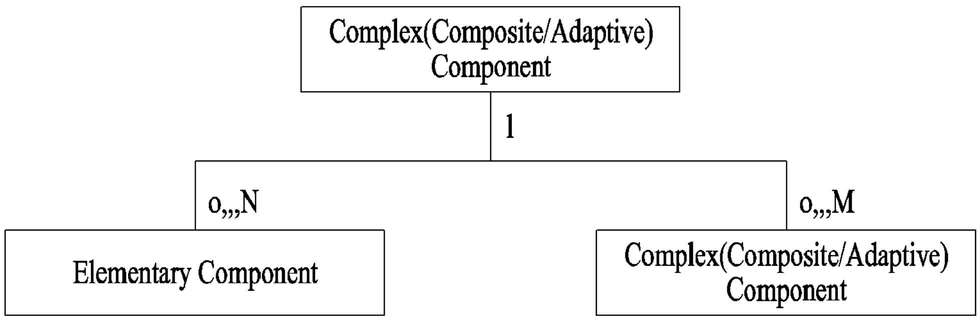

FIG. 126 is a view illustrating a configuration of a complex component according to an embodiment of the present invention.

The complex component is not required to include only an elementary component. According to a specific embodiment of the present invention, the complex component may include a complex component. Accordingly, a broadcast service may not be played only with one elementary component in a complex component. Additionally, the complex component may be a composite component or an adaptive component. In more detail, as shown in the embodiment of FIG. 126, the composite component may include at least one elementary component. Additionally, the composite component may include at least one complex component. Additionally, the composite component may include both an elementary component and a complex component. One adaptive component may include at least one elementary component.

A component of a broadcast service may be described using the term "top-level component". A top-level audio component represents a unique voice sequence. A top-level video component represents a unique image sequence. According to a specific embodiment of the present invention, such a top-level component may be an elementary component. According to another specific embodiment of the present invention, such a top-level component may be a composite component.

Figure 127:
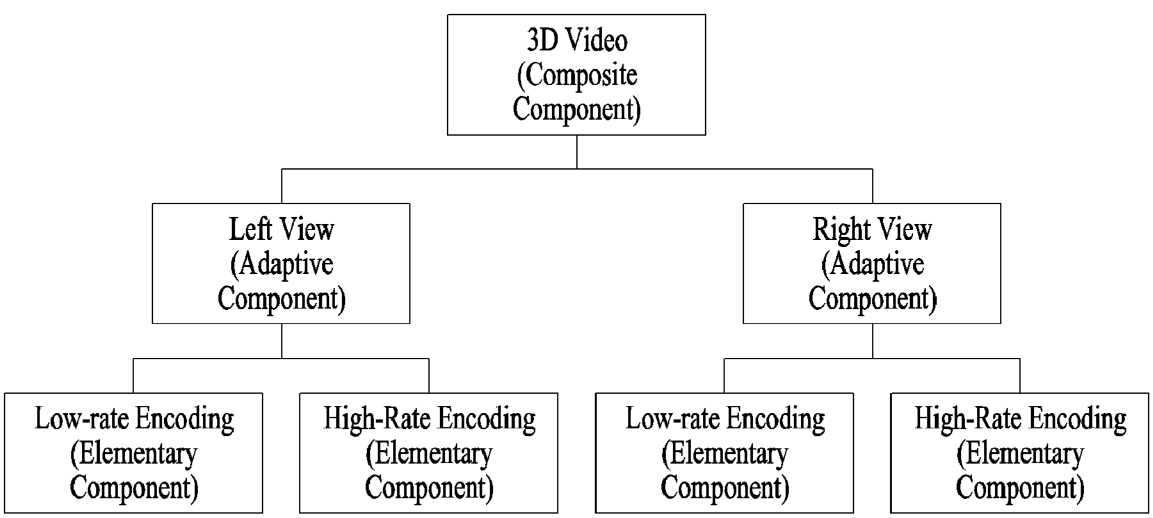

For example, as shown in the embodiment of FIG. 127, the top-level video component may be a composite component including the left image and right image components of a 3D image. At this point, the left image component of the 3D image may be an adaptive component including a plurality of elementary components encoded with different bitrates. Additionally, the right image component of the 3D image may be an adaptive component including a plurality of elementary components encoded with different bitrates.

Figure 128:
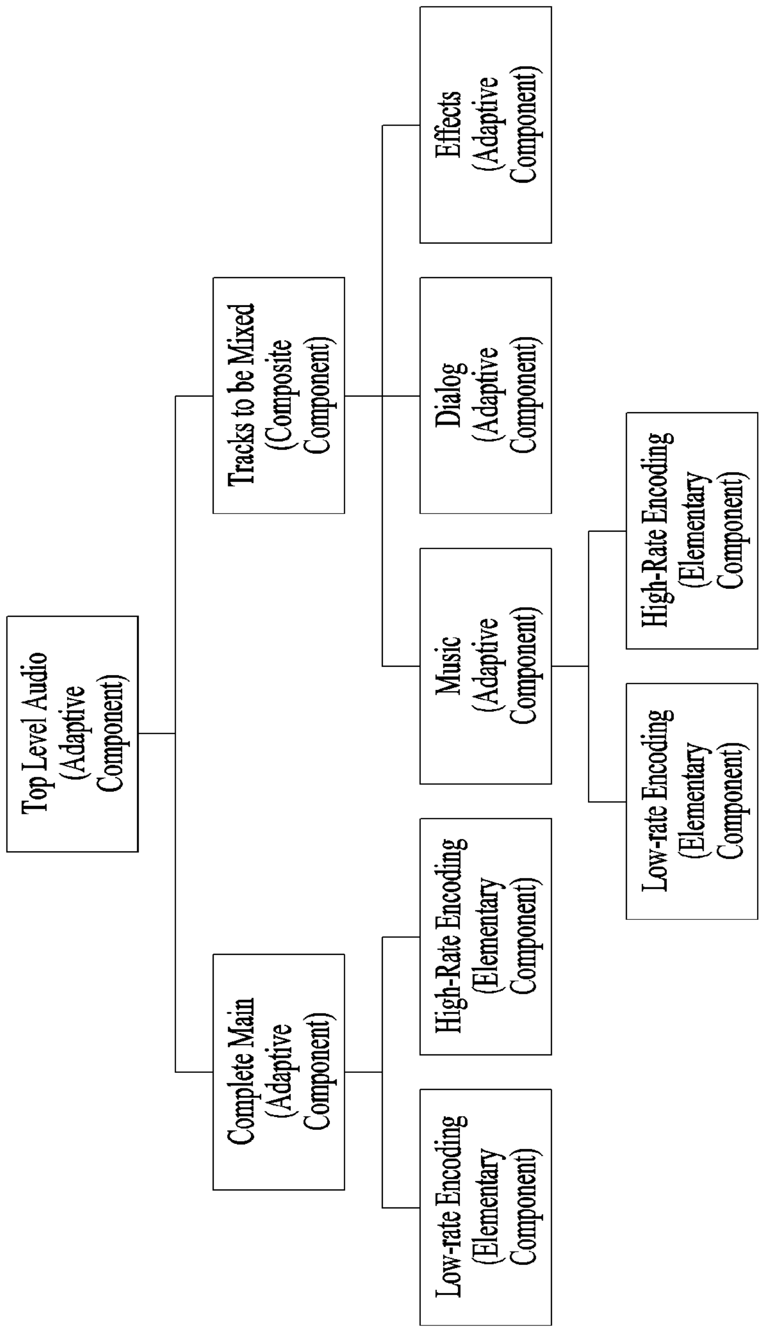

According to another specific embodiment of the present invention, as shown in the embodiment of FIG. 128, the top-level audio component may be an adaptive component including an adaptive component including a complete main audio and a composite component having mixed music, dialogs, and special effects. At this point, the adaptive component including a complete main audio may include a plurality of elementary components encoded with different bitrates. Additionally, the composite component including mixed music, dialogs, and special effects may include an adaptive component including music, an adaptive component including dialogs, and an adaptive component including special effects. That is, the adaptive component including music may include a plurality of elementary components encoded with different bitrates.

Distinguishing a media component in such a way may simplify the relationship between a plurality of media components. For example, when it is specified that each video program includes one complex video component, the relationship with each audio elementary component or a video elementary component does not need to be specified.

There may be a plurality of complex component models for one media. For example, a 3D component encoded with a plurality of bitrates may be modeled with a sub media component for a left image and a sub media component for a right image. Each sub media component may be modeled as an adaptive component including a plurality of components encoded with different bitrates. Additionally, the same 3D component may be modeled as an adaptive component including a plurality of sub media components encoded with different bitrates and each of the sub media components may be modeled as a composite component including left and right images. The number of sub media components with different bitrates in the left and right images may vary.

FIG. 129 is a view illustrating a configuration of a complex video component according to an embodiment of the present invention.

The embodiment of FIG. 129 is obtained by editing the specific expression in the embodiment of FIG. 129 and is applicable like the embodiment of FIG. 126. Especially, the definitions and roles of continuous components, elementary components, composite components and complex components are the same. The adaptive component of FIG. 125 is expressed as a PickOne component as described above. The definition and role of the PickOne component in the embodiment of FIG. 129 are identical to those of the adaptive component in the embodiment of FIG. 125. Accordingly, a composite component represents that a plurality of continuous components are combined and one content is played. Additionally, a PickOne component represents a component that is one selected from a plurality of selectable media components and played. However, in the embodiment of FIG. 129, a presentable component is defined unlike the embodiment of FIG. 125. The presentable component represents a continuous component that is substantially played in the broadcast reception device 100. Additionally, the presentable component may be an elementary component. Additionally, the presentable component may be a complex component. In a specific embodiment, a media component itself may be a presentable component and may be included in a complex component as a sub-media component of a complex component. For example, a service may include a basic 2D video component and a complex 3D component. At this point, a 2D video component is a presentable component that is playable as a 2D image without a 3D video component. Additionally, as one view of a 3D image, the 2D video component may be played as a 3D image together with another 3D video component.

Additionally, in another specific embodiment, a presentable audio component may be a PickOne component including a main component, music, dialog, and sound effect. At this point, a main component and a music component may be a PickOne component including a plurality of elementary components encoded with different bitrates. Additionally, a media component representing dialog and sound effect may be an elementary component.

FIG. 130 is a view illustrating a configuration of a complex video component according to an embodiment of the present invention.

A presentable component may be a composite component. Like the embodiment of FIG. 130, scalable video encoding may include a plurality of media components as a composite component. The scalable video encoding may include a base layer component that is an elementary component, a first enhancement layer component, and a second enhancement layer component. At this point, the base layer component is a presentable component that is playable without the first enhancement layer component and the second enhancement layer component. Additionally, the base layer component may be played as a high quality image together with at least one of the first enhancement layer component and the second enhancement layer component. At this point, the first enhancement layer component and the second enhancement layer component are components unplayable without the base layer component and are supposed to be played together with the base layer component. Therefore, the first enhancement layer component and the second enhancement layer component cannot be called a presentable component. At this point, the broadcast reception device 100 may combine the base layer component with the first enhancement layer component and the second enhancement layer component to play an image on the basis of the capabilities of the broadcast reception device 100. In more detail, when the capabilities of the broadcast reception device 100 are low, the broadcast reception device 100 may play a relatively low quality image by using the base layer component. Or, when the capabilities of the broadcast reception device 100 are relatively high, the broadcast reception device 100 may combine the base layer component with the first enhancement layer component and the second enhancement layer component to play a relatively high quality image. Or, when the capabilities of the broadcast reception device 100 are very high, the broadcast reception device 100 may combine the base layer component with the first enhancement layer component and the second enhancement layer component to play a very high quality image.

FIG. 131 is a view illustrating a complex video component according to another embodiment of the present invention.

A presentable component may be a PickOne component. According to the embodiment of FIG. 131, a PickOne component may include 2D encoding and 3D encoding in side-by-side format. At this point, the 3D encoding is divided into a left view and a right view. The left view and the right view are encoded each to be half the view width and disposed side-by-side to generate a picture. The broadcast reception device 100 may select one of the 2D encoding and the 3D encoding according to the capabilities of the broadcast reception device 100 and may then play the selected one. In more detail, when the broadcast reception device 100 does not support a 3D image, it may select and play the 2D encoding. Additionally, when the broadcast reception device 100 supports a 3D image, it may select and play the 3D encoding.

In such a way, each service may be described through a presentable component therein. Additionally, when the presentable component is a complex component, it may be described through components including the complex component. In a specific embodiment, each presentable audio component may represent the voice of a specific scene and each presentable video component may represent the picture of a specific scene captured at a specific angle. In the case of a simple combination, the presentable component may be an elementary component. As described above, each presentable component may be a complex component. This will be described with reference to FIG. 132.

FIG. 132 is a view illustrating a complex video component according to another embodiment of the present invention.

A presentable component may be a composite component and a component that a composite component includes may be a PickOne component. In the embodiment of FIG. 37, a presentable video component includes a 3D image left view video component and a 3D image right view video component. The left view video component and the right view video component are PickOne components. Accordingly, the left view video component and the right view video component include a plurality of elementary components encoded with different bitrates.

When the type and role of a media component are defined as in the embodiment of FIG. 63, the relationship and structure of a media component that a service includes may be described efficiently and simply. Accordingly, by using this, a broadcast transmission device may signal services efficiently and simply and also by using this, the broadcast reception device 100 may obtain service signaling information efficiently and simply.

Various broadcast service models are described with reference to FIGS. 133 to 136.

FIG. 133 is a view illustrating a media component configuration of an audio service according to an embodiment of the present invention.

The audio service may include one or more audio components. Additionally, the audio service may include a closed caption component. Additionally, the audio component may include adjunct data service. At this point, an adjunct service may be a Non-Real-Time (NRT) service. Additionally, according to a specific embodiment of the present invention, an audio service may be transmitted through continuous stream according to a predetermined schedule. According to a specific embodiment of the present invention, audio service may be referred to as radio service.

FIG. 134 is a view illustrating a configuration of a broadcast service including both audio and video according to an embodiment of the present invention.

The broadcast service including both audio and video may include one or more main video components. At this point, the broadcast service including both audio and video may include an adjunct video component. At this point, the broadcast service including both audio and video may include an audio component. Moreover, the broadcast service including both audio and video may include a closed caption component. Furthermore, the broadcast service including both audio and video may include an adjunct service data component. According to a specific embodiment of the present invention, a service including both audio and video may be referred to as TV service.

FIG. 135 is a view illustrating a configuration of a user request content service according to an embodiment of the present invention.

A Contents On Demand (CoD) service may include an application providing a user interface. Additionally, the CoD service may include a content item provided in response to a user request. Additionally, the CoD service may include a catalog of a content item. At this point, the catalog may be embedded in an application.

FIG. 136 is a view illustrating a configuration of a stand-alone data service according to an embodiment of the present invention.

A stand-alone data service may include one or more content items configuring a service. In a specific embodiment, a stand-alone NRT data service may be referred to as an App service.

A plurality of broadcast services may share a media component. In more detail, each of media components that the above-described audio service, broadcast service including both audio and video, and stand-alone data service include may relate to one or more other components. At this point, one or more other components may include a service encoded by another method representing the same base content.

Additionally, a broadcast service may include as a property at least one of a service identifier, a service form, a description of a service, a service name, a channel number, a graphic icon, a list of components in a service, a property for broadcast service protection, a property on targeting/personalization, a contents advisory rating, a language of a service, a list of adjunct NRT data services relating to service, and a property on broadcast service user report. At this point, a service name may be displayed in a plurality of languages. Additionally, a graphic icon may be used to represent a service. Additionally, a service language may represent a primary language used in service. Additionally, the service form may include at least one of a scheduled audio service transmitted according to a planned schedule, a service including scheduled audio and video transmitted according to a planned schedule, a user request service transmitted in response to a user request, and a scripted NRT data service. Additionally, the channel number may include a major channel number and a minor channel number in detail. Additionally, the channel number may be displayed as a virtual channel number. Moreover, a plurality of broadcast services may use the same graphic icon. Additionally, the service identifier may have a unique value in a broadcast area where a broadcast service is broadcasted. Additionally, the service identifier may include identifiers of two categories, for example, a local identifier and a regional identifier. The local identifier may be used for services broadcasted only in one broadcast area. Accordingly, a plurality of broadcast services broadcasted in a plurality of different broadcast areas may have the same regional identifier. The local identifier may be used for broadcast service identification when the same broadcast is available in a plurality of broadcast areas.

In order to signal the properties of such a broadcast service, the above-described broadcast signaling table may be used.

Each continuous component may have a plurality of properties. At this point, the plurality of languages may be divided into a plurality of types. In a specific embodiment, a plurality of properties that a continuous component has may include a basic continuous component property, an elementary component property, a complex component property, and a presentable component property.

The basic continuous component property is applied to all continuous components. The basic continuous component property may include at least one of a unique content identifier, a content structure, and a content type. At this point, the content structure may represent one of a basic component and a PickOne component. Additionally, the content type may represent one of audio, video, and a closed caption.

The elementary component property is applied to an elementary component. The elementary component property may include the basic feature of component encoding. For example, the elementary component property may include a video resolution. Additionally, the elementary component property may include the number of audio channels.

The complex component property is applied to a complex component. The complex component property may include at least one of media components that a complex component includes and the role of the media components. In more detail, the role of the media components may represent that an audio component is a dialog track. Additionally, the role of media components may represent that a video component is the left view of a 3D image.

Each service may include one or more media components. Additionally, each media component may include at least one as a property among a component identifier for identifying a media component, the type of a component, description for a component, a targeting/personalization property, a service protection property, a target device, contents advisory rating, and related component information. At this point, a value of a component identifier may be unique between components of a broadcast service. The target device may represent one among a primary device and a companion device. Additionally, the service signaling table may include media component information signaling a property of such a media component. In more detail, the service signaling table may include media component information as component level information. This will be described with reference to FIG. 137.

FIG. 137 is a view illustrating media component information according to an embodiment of the present invention.

The media component information may include information representing the type of a media component, information on whether information on a target device is included, target device information representing a target device, text information describing a media component, a component encoding parameter according to the type of a media component, and information on a complex component in the case of a complex component that a media content includes.

The media component information may include a descriptor_tag field, a descriptor_length field, a component_type field, a target_device_flag field, a target_device field, a text_length field, a text_char field, a component_data_type field, a component_data field, and a complex_component_data field.

The descriptor_tag field represents that media component information is included. According to a specific embodiment of the present invention, the descriptor_tag field may be an 8-bit field.

The descriptor_length field represents the length after the descriptor_length field. According to a specific embodiment of the present invention, the descriptor_length field may be an 8-bit field.

The component_type field represents the type of a media component. According to a specific embodiment of the present invention, a value of the component_type field may represent one among the above-described elementary component, composite component, and adaptive component. In more detail, when a value of the component_type field is 0x00, a corresponding media component represents an elementary component. When a value of the component_type field is 0x01, a corresponding media component represents a composite component. When a value of the component_type field is 0x02, a corresponding media component represents an adaptive component. According to a specific embodiment of the present invention, the component_type field may be a 4-bit field.

The target_device_flag field represents whether the target_device field is included. According to a specific embodiment of the present invention, the target_device_flag may be a 1-bit field.

The target_device field represents a target device where a corresponding component is executed. According to a specific embodiment of the present invention, a value that the target_device field has may represent whether a corresponding component is executed only in a primary device, only in a companion device, or in both primary device and a companion device. In more detail, when a value of the target_device field is 0x01, it represents that a corresponding component is executed only in a primary device. When a value of the target_device field is 0x02, it represents that a corresponding component is executed only in a companion device. When a value of the target_device field is 0x03, it represents that a corresponding component is executed in both a primary device and a companion device. According to a specific embodiment of the present invention, the target_device field may be a 3-bit field.

The text_length field represents the length of the text_char field. According to a specific embodiment of the present invention, the text_length field may be an 8-bit field.

The text_char field is a text for describing a media component.

The component_data_type field represents an encoding type of a corresponding component. In more detail, the component_data_type field may have the same value as that in the embodiment of FIG. 138. In more detail, when a value of the component_type field is 35, it may represent that a media component is an H.264/AVC component. In more detail, when a value of the component_data_type field is 36, it may represent that a media component is an SVC enhancement layer stream component. In more detail, when a value of the component_data_type field is 37, it may represent that a media component is an HE AAC v2 audio stream component. In more detail, when a value of the component_data_type field is 38, it may represent that a media component is transmitted through a FLUTE file transport session. In more detail, when a value of the component_data_type field is 39, it may represent that a media component is an STKM stream component. In more detail, when a value of the component_data_type field is 40, it may represent that a media component is an LTKM stream component. In more detail, when a value of the component_data_type field is 41, it may represent that a media component is an OMA-RME DIMS stream component. In more detail, when a value of the component_data_type field is 42, it may represent that a media component is an NTP time base stream component. In more detail, when a value of the component data type field is 70, it may represent that a media component is an HEVC video stream component. In more detail, when a value of the component_data_type field is 71, it may represent that a media component is transmitted through an ISO BMFF. According to a specific embodiment of the present invention, the component_type field may be an 8-bit field.

The component_data field represents an encoding parameter of a component. A parameter that an encoding parameter includes may vary according to an encoding type of a component. In more detail, a parameter that an encoding parameter includes may vary according to a value of the component_type field.

When the type of a media component is a complex type, for example, a composite component or an adaptive component, the complex_component_data field represents information on a complex component. This will be described in more detail with reference to FIGS. 139 and 140. Additionally, component information is described through a bit stream format, but component information may be in another format such as an XML file format.

FIG. 139 is a view illustrating complex component information according to an embodiment of the present invention.

The complex component information may include at least one of information representing a set form of component, information on whether information on a target device is included, target device information representing a target device, the number of sub media components that a corresponding complex component includes, information on the type of a media that a sub media component includes and a role of a sub media component when a corresponding complex component is a composite component.

In more detail, as shown in FIG. 139, the complex component information may include at least one of an aggretation_type field, a num_sub_component field, a sub_component_id field, a general_media_type field, and a sub_component_role field.

The aggretation_type field represents the type of a set that a corresponding component belongs. In more detail, a value of the aggretation_type field represents either a composite component or an adaptive component. According to a specific embodiment of the present invention, the aggretation_type field may be a 3-bit field.

The target_device_flag field represents whether the target_device field is included. According to a specific embodiment of the present invention, the target_device_flag may be a 1-bit field.

The target_device field represents a target device where a corresponding component is executed. According to a specific embodiment of the present invention, a value that the target_device field has may represent whether a corresponding component is executed only in a primary device, only in a companion device, or in both primary device and a companion device. In more detail, when a value of the target_device field is 0x01, it represents that a corresponding component is executed only in a primary device. When a value of the target_device field is 0x02, it represents that a corresponding component is executed only in a companion device. When a value of the target_device field is 0x03, it represents that a corresponding component is executed in both a primary device and a companion device. According to a specific embodiment of the present invention, the target_device field may be a 3-bit field.

The num_sub_component field represents the number of sub media components that a corresponding complex component includes. According to a specific embodiment of the present invention, the num_sub_component field may be an 8-bit field.

The sub_component_id field represents a sub media component identifier for identifying a sub media component. According to a specific embodiment of the present invention, the sub_component_id field may be an 8-bit field.

When a corresponding complex component is a composite component, the general media_type field represents the type of a media that a sub media component includes. In more detail, a value of the general_media_type field may represent one among video, audio, text, application, and message. In more detail, when a value of the general_media_type field is 0x00, it represents that a media that a sub media component includes video. When a value of the general_media_type field is 0x01, it represents that a media that a sub media component includes audio. When a value of the general_media_type field is 0x02, it represents that a media that a sub media component includes text. When a value of the general_media_type field is 0x03, it represents that a media that a sub media component includes application. When a value of the general_media_type field is 0x04, it represents that a media that a sub media component includes message. According to a specific embodiment of the present invention, the general_media_type field may be a 4-bit field.

The sub_component_role field represents the role of each sub media component. In more detail, a value of the sub_component_role field may represent that a sub media component is an enhancement layer for scalable video encoding. According to another specific embodiment of the present invention, a value of the sub_component_role field may represent that a sub media component is one among the right image, left image, and depth information of a 3D image. According to another specific embodiment of the present invention, a value of the sub_component_role field may represent that a sub media component is a video at a specific position of a screen divided into a plurality of areas. According to the type of a media that a sub media component includes, information that the sub_component_role field represents may vary. According to a specific embodiment of the present invention, the sub_component_role field may be an 8-bit field.

Such complex component information may be included in a complex component descriptor as shown in the embodiment of FIG. 140. Additionally, complex component information is described through a bit stream format, but the complex component information may be in another format such as an XML file format.

As described above, media components may have a predetermined relationship to each other. For example, one closed caption component may relate to one or more audio components. Additionally, in order to signal a relationship between such media components, the service signaling table may include related component list information. In more detail, the service signaling table may include related component list information as component level information. The related component list information will be described in more detail with reference to FIG. 141.

FIG. 141 is a view illustrating related component list information according to an embodiment of the present invention.

The related component list information may include at least one of a component identifier for identifying a component, information representing the type of a media component, information representing the encoding format of a media component, and information representing the type of media that a media component includes.

In more detail, as shown in the embodiment of FIG. 142, the related component list information may include at least one of a descriptor_tag field, a descriptor_length field, a num_associated_component field, a component_id field, a component_type field, a component_data_type field, and a general_media_type field.

The descriptor_tag field represents that related component list information is included. According to a specific embodiment of the present invention, the descriptor_tag field may be an 8-bit field.

The descriptor_length field represents the length after the descriptor_length field. According to a specific embodiment of the present invention, the descriptor_length field may be an 8-bit field.

The num_associated_component field represents the number of media components relating to a corresponding media component. According to a specific embodiment of the present invention, the num_associated_component field may be an 8-bit field.

The component_id field represents an identifier for identifying a related media component. According to a specific embodiment of the present invention, the component_id field may be an 8-bit field.

The component_type field represents the type of a media component. According to a specific embodiment of the present invention, a value of the component_type field may represent one among the above-described elementary component, composite component, and adaptive component. In more detail, when a value of the component_type field is 0x00, a related media component represents an elementary component. When a value of the component_type field is 0x01, a related media component represents a composite component. When a value of the component_type field is 0x02, a related media component represents an adaptive component. According to a specific embodiment of the present invention, the component_type field may be a 4-bit field.

The component_data_type field represents an encoding type of a corresponding component. In more detail, the component_data_type field may have the same values as those in FIG. 138. According to a specific embodiment of the present invention, the component_type field may be an 8-bit field.

The general_media_type field represents the type of a media that a related media component includes. In more detail, a value of the general_media_type field may represent one among video, audio, text, application, and message. In more detail, when a value of the general_media_type field is 0x00, it represents that a media that a related media component includes video. When a value of the general_media_type field is 0x01, it represents that a media that a related media component includes audio. When a value of the general_media_type field is 0x02, it represents that a media that a related media component includes text. When a value of the general_media_type field is 0x03, it represents that a media that a related media component includes application. When a value of the general_media_type field is 0x04, it represents that a media that a related media component includes message. According to a specific embodiment of the present invention, the general_media_type field may be an 8-bit field.

An audio component may include at least one as a property among a component identifier for identifying a media component, the type of a component, description for a component, a targeting/personalization property, a service protection property, a target device, and related component information. At this point, a value of a component identifier may be unique between components of a broadcast service. The target device may represent one among a primary device, a companion device, and both a primary device and a companion device.

When the audio component is an elementary component, it may include a property for encoding format including codec, the number of channels, a bitrate, and a compression parameter. Additionally, when the audio component is an elementary component, it may include language information of audio as a property. The mode of the audio component may be included as a property. At this point, the mode of the audio component may be one among complete main audio, dialog, effect sound, and audio for the visually impaired, audio for the hearing-impaired, commentary, and voice over.

When the audio component is a complex component, it may include at least one as a property among information representing the type of aggregation, a list of included media components, and the role of an included component in the case of a composite component. The form of a set may be one of a composite component and an adaptive component, that is, a PickOne component.

When the audio component is a top level component, it may include at least one as a property among contents advisory rating and information on a related closed caption component.

When an audio component is a presentable component, it may have as a property at least one of targeting/personalization, Content advisory rating, content/service protection, a target screen, and a related closed caption component. At this point, the target screen property may represent at least one of a primary screen, a companion screen, and a screen partially inserted into the primary screen, for example, Picture In Picture (PIP).

The closed caption component may include at least one as a property among a component identifier, the type of a component, a targeting/personalization property, a service protection property, a target device, and an audio component identifier relating to a closed caption component. At this point, a value of a component identifier may be unique between components of a broadcast service. The target device may represent one among a primary device, a companion device, and both a primary device and a companion device.

When the closed caption component is an elementary component, the closed caption component may include its language kind and form, as a property. In more detail, the form of a closed caption component may be one among a general closed caption or an Easy-reader closed caption.

When the closed caption component is an adaptive component, it may include a media component therein, as a property.

When the closed caption component is a top level component, it may include contents advisory rating as a property.

When a closed caption component is a presentable component, it may have as a property at least one of targeting/personalization, Content advisory rating, content/service protection, and a target screen. At this point, the target screen property may represent at least one of a primary screen, a companion screen, and a screen partially inserted into the primary screen, for example, Picture In Picture (PIP).

The video component may include at least one as a property among a component identifier for identifying a media component, the type of a component, a targeting/personalization property, a service protection property, the role of a video component, a target screen, and an NRT data service relating to a video component. At this point, a value of a component identifier may be unique between components of a broadcast service. The role of a video component may be one among an alternative camera view, an alternative video component, a sign language screen, and a follow subject video. The target device may represent one among a primary device, a companion device, both a primary device and a companion device, and a Picture In Picture (PIP) screen. When the NRT data service relating to a video component is not included, all additional NRT data services are connected to a video component.

When the video component is an elementary component, it may include at least one as a property among codec, an encoding format including a compression parameter or the like, a resolution including horizontal and vertical pixel values, an aspect ratio, a scanning method representing whether it is interlace or progressive, a frame rate, and a still picture mode. Additionally, the video component may include an encoding parameter as a property. At this point, the type of a specific encoding parameter may vary depending on codec of a video component.

When the video component is a complex component, it may include an aggregation form and a media component list that the complex component includes, as a property.

When the video component is a composite component among complex components, it may include the role of each media component that the composite component includes, as a property. At this point, the role of a media component may represent an enhancement layer for scalable video encoding. According to another specific embodiment of the present invention, the role of a media component may represent one among the right image, left image, and depth information of a 3D image. According to another specific embodiment of the present invention, the role of a media component may represent a video at a specific position of a screen divided into a plurality of areas. According to another specific embodiment of the present invention, the role of a media component may be Follow-Subject metadata that is a screen displayed according to a specific subject. Such Follow-Subject metadata may include at least one of a subjects' name, a subject's position, and a subject's size. When a Follow-Subject function is supported by metadata in frame unit of stream, the Follow-Subject metadata may represent an area of a main video component where a subject is focused.

When the video component is a top level component among complex components, it may include at least one as a property among contents advisory rating and a related audio component.

When a video component is a presentable component, it may have as a property at least one of targeting/personalization, Content advisory rating, content/service protection, a target screen, and a related audio presentable component, and related closed caption presentable component. At this point, the target screen property may represent at least one of a primary screen, a companion screen, and a screen partially inserted into the primary screen, for example, Picture In Picture (PIP).

The NRT data service may be a stand-alone service not depending on another service. Additionally, the NRT data service may be an adjunct NRT data service depending on another service. At this point, the adjunct NRT data service may be part of radio service. Moreover, the adjunct NRT data service may be part of TV service. The NRT data service may have a common property for all services, for example, a service identifier. Furthermore, the NRT data service and the NRT service may have a common property.

The data service may include at least one of a service language, a consumption model, an essential capability list, a non-essential capability list, a target device, and a content item available in a data service as properties.

A consumption model may represent at least one of Push, Portal, Push Scripted, Portal Scripted, Triggered, and Segment Delivery.

In Push, NRT data service provides service on the basis of a request. The broadcast reception device 100 provides to a user an option for automatically updating an NRT data service relating to service. In more detail, the broadcast reception device 100 receives from a user an input for auto update of an NRT data service relating to service. When an input for auto update of an NRT data service relating to service is received from a user, the broadcast reception device 100 caches a content relating to service and the latest version of an auto update file in order for user. When an input for push service is received from a user, the broadcast reception device 100 displays a pre-loaded content.

Portal provides an experience as if a user accessed NRT data service through a web browser. At this point, files used for NRT data service need to support text/graphic rendering.

Push Scripted is similar to Push. However, there is a difference in that Push Scripted provides a Declarative Object providing a user interface of a specific broadcaster for service.

Portal Scripted is similar to Portal. However, there is a difference in that Portal Scripted provides a Declarative Object providing a user interface of a specific broadcaster for service.

Triggered is a consumption model used in bi-directional adjunct NRT data service. In an example of typical Triggered, in order to improve user experience, a Declarative Object in which adjunct NRT data service for A/V virtual channel is synchronized is delivered.

Segment delivery provides the delivery of a segment and an application for supporting the insertion of a targeted content of a program. A segment divides a program into a plurality of time spans. A targeting segment provides a content based on the characteristics of a user and the characteristics of the broadcast reception device 100 as a specific segment.

In more detail, the broadcast reception device 100 may play a content based on the characteristics of a user and the characteristics of the broadcast reception device 100 as a specific segment. In more detail, a segment delivery consumption model is not displayed to a user (for example, behind scene) and is used to insert a targeting content into the middle of a radio program or a TV program. For example, the broadcast reception device 100 displays a targeting advertisement based on the characteristics of a user during the middle of a radio program or a TV program. Such NRT data service is not provided by a user's selection. Such NRT data service may be opened by an inserted targeting application, a collection of segments targeted for insertion, and an application and may deliver at least one of consumed other files as a content item. At this pint, it is selected that which segment and what time the inserted targeting application is inserted. Additionally, the targeting application may notify such insertion to the broadcast reception device 100. Additionally, the targeting application may perform a report function. Additionally, other files opened and consumed by an application may be encrypted to be interpreted by only a corresponding application.

The broadcast reception device 100 may perform the following operations in order for segment delivery. The broadcast reception device 100 may download and cache an application in advance in order not to download the application repeatedly each time a user selects radio service or TV service including adjunct NRT data service. Additionally, the broadcast reception device 100 may pre-download a targeted segment and may cache an expiration date. Through this, the broadcast reception device 100 may provide a targeted segment to a user immediately. Additionally, the broadcast reception device 100 may execute an application. Additionally, when an application notifies that a specific segment is inserted, the broadcast reception device 100 may insert the specific segment.

A target device may represent one of a primary device and a companion device, or both a primary device and a companion device.

A content item of data service may have as a property at least one of a content item identifier, the name of a content item, a file set including content items, a display for representing whether the update of a content item is to be monitored, an available window representing a download available time, an expiration data representing a time at which a content item is discarded, a content item size, the playback length of a content item, a targeting/personalizing property, service/content protection, and content advisory rating.

Additionally, each additional NRT service may include a target screen as a property. At this point, the target screen may represent one among a primary device, a companion device, and both a primary device and a companion device.

Such an NRT data property may be signaled through an NRT information table.

This will be described with reference to FIG. 142.

FIG. 142 is a view of an NRT information table according to an embodiment of the present invention.

The NRT information table may include an NRT service identifier and an NRT information block.

According to a specific embodiment of the present invention, as shown in the embodiment of FIG. 142, the NRT information table may include at least one of a table_id field, section_syntax_indicator field, private_indicator field, section_length field, table_id_extension field, version_number field, current_next_indicator field, section_number field, last_section_number field, service_id field, and NRT_information_block field.

The table_id field represents the identifier of an NRT information table. At this point, a value of the table_id field may be one of reserved id values defined in ATSC A/65. According to a specific embodiment of the present invention, the table_id field may be an 8-bit field.

The section_syntax_indicator field represents whether an NRT information table is a private section table in the long format of MEPG-2 TS standard. According to a specific embodiment of the present invention, the section_syntax_indicator field may be a 1-bit field.

The private_indicator field represents whether a current table corresponds to a private section. According to a specific embodiment of the present invention, the private_indicator field may be a 1-bit field.

The section_length field represents the length of a section after the section_length field. According to a specific embodiment of the present invention, the section_length field may be a 12-bit field.

The table_id_extension field represents a value for identifying an NRT information table in combination with the table_id field. Especially, the table_id field may include a protocol_version field representing a protocol version of an NRT information table. According to a specific embodiment of the present invention, the protocol_version field may be an 8-bit field. Especially, the table_id_extension field may include a subnet_id field identifying a subnet that an NRT information table transmits. According to a specific embodiment of the present invention, the subnet_id field may be an 8-bit field.

The version_number field represents a version of an NRT information table. The broadcast reception device 100 may determine the availability of an NRT information table on the basis of a value of the version_number field. In more detail, when a value of the version_number field is identical to a version of a previously received service signaling table, the information of the NRT information table may not be used. According to a specific embodiment of the present invention, the version_number field may be a 5-bit field.

The current_next_indicator field represents whether information of an NRT information table is currently available. In more detail, when a value of the current_next_indicator field is 1, it may represent that an NRT information table is available. Moreover, when a value of the current_next_indicator field is 1, it may represent that information of an NRT information table is available next time. According to a specific embodiment of the present invention, the current_next_indicator field may be a 1-bit field.

The section_number field represents a current section number. According to a specific embodiment of the present invention, the section_number field may be an 8-bit field.

The last_section_number field represents the last section number. When the size of an NRT information table is large, the NRT information table may be divided into a plurality of sections and then transmitted. At this point, the broadcast reception device 100 determines whether all sections necessary for an NRT information table are received on the basis of the section_number field and the last_section_number field. According to a specific embodiment of the present invention, the last_section_number field may be an 8-bit field.

The service_id field represents a service identifier for identifying an NRT service. According to a specific embodiment of the present invention, the service_id field may be a 16-bit field.

The NRT_information_block field represents an NRT information block. This will be described in more detail with reference to FIG. 143.

FIG. 143 is a view illustrating an NRT information block according to an embodiment of the present invention.

The NRT information block may include at least one of descriptors including information representing the start time of a time span that the NRT information block signals, information representing the length of a time span that the NRT information block signals, the number of content items that the NRT information block signals, content identification information identifying a corresponding content item, information on whether a corresponding content item is updated periodically, information on whether content protection is applied to files that a corresponding content item includes, information representing whether a corresponding content item is a master content item executed when service is selected, information on whether the NRT information block includes the length of a playback time of a corresponding content, the length of a playback time of a corresponding content, information on whether the NRT information block includes the playback delay time of a corresponding content, the playback delay time of a corresponding content, information on whether the NRT information block includes the expiration time of a corresponding content item, the expiration time of a content item, information on whether the NRT information block includes the size of a corresponding content item, the size of a corresponding content, information on whether the NRT information block includes information on a target device of NRT service, information on a target device of NRT service, information on whether a corresponding content item is received through a broadcast network, information on whether a corresponding content item is received through an internet network, the name of a corresponding content item, and specific information on a corresponding content.

In more detail, as shown in the embodiment of FIG. 144, the NRT information block may include at least one of a time_span_start field, time_span_length field, a num_content_items_in_section field, a content_id, an updates_available field, a content_security_conditions_indicator field, a master_item field, a playback_length_included field, a palyback_Delay_included field, an expiration_included field, a content_size_included field, an available_in_broadcast field, a target_included field, a playback_length_in seconds field, a playback_delay field, an expiration field, a content_size field, a target field, a content_name_text field, and a content_descriptor field.

In more detail, as shown in the embodiment of FIG. 144, the NRT information block may include at least one of a time_span_start field, time_span_length field, a num_content_items_in_section field, a content_id, an updates_available field, a content_security_conditions_indicator field, a master_item field, a playback_length_included field, a palyback_Delay_included field, an expiration_included field, a content_size_included field, an available_in_broadcast field, a target_included field, a playback_length_in seconds field, a playback_delay field, an expiration field, a content_size field, a target field, a content_name_text field, and a content_descriptor field.

The time_span_start field represents the start time of a time span that the NRT information block signals. According to a specific embodiment of the present invention, the time_span_start field may be a 32-bit field.

The time_span_length field represents the length of a time span that the NRT information block signals. According to a specific embodiment of the present invention, the time_span_length field may be a 16-bit field.

The NRT_content_items_in_section field represents the number of content items that the NRT information block signals. According to a specific embodiment of the present invention, the NRT_content_items_in_section field may be an 8-bit field.

The content_id field represents information for identifying a corresponding content item. According to a specific embodiment of the present invention, the content_id field may be a 32-bit field.

The updates_available field represents whether a corresponding content item is updated. According to a specific embodiment of the present invention, the updates_available field may be a 1-bit field.

The content_security_conditions_indicator field represents whether a content protection is applied to at least one of files that a corresponding content item includes. According to a specific embodiment of the present invention, the content_security_conditions_indicator field may be a 1-bit field.

The master_item field represents whether a corresponding content item is a master content item. In more detail, the master_item field represents whether a corresponding content item is a content item that needs to be executed when a corresponding NRT service is selected. According to a specific embodiment of the present invention, the master_item field may be a 1-bit field.

The playback_length_included field represents whether the NRT information block includes the length of a playback time of a corresponding content item. According to a specific embodiment of the present invention, the playback_length_included field may be a 1-bit field.

The playback_Delay_included field represents whether the NRT information block includes delay playback time information of a corresponding content item. According to a specific embodiment of the present invention, the playback_Delay_included field may be a 1-bit field.

The expiration_included field represents whether the NRT information block includes the expiration time of a corresponding content item. According to a specific embodiment of the present invention, the expiration_included field may be a 1-bit field.

The content_size_included field represents whether the NRT information block includes the size of a corresponding content item. According to a specific embodiment of the present invention, the content_size_included field may be a 1-bit field.

The available_in_broadcast field represents whether a corresponding content item is obtained through a broadcast network. According to a specific embodiment of the present invention, the available_in_broadcast field may be a 1-bit field.

The available in_internet field represents whether a corresponding content item is obtained through an internet network. According to a specific embodiment of the present invention, the available_in_internet field may be a 1-bit field.

The target_included field represents whether the NRT information block includes information on a target device. According to a specific embodiment of the present invention, the target_included may be a 1-bit field.

The playback_length in seconds field represents the length of a playback time of a corresponding content item. According to a specific embodiment of the present invention, the playback_length_in seconds field may represent a length in seconds. Additionally, according to a specific embodiment of the present invention, the playback_length_in seconds field may be a 24-bit field.

The playback_delay field represents the playback delay time of a corresponding content item. According to a specific embodiment of the present invention, the playback_delay field may be a 24-bit field.

The expiration field represents the expiration time of a corresponding content item. According to a specific embodiment of the present invention, the expiration field may be a 32-bit field.

The content_size field represents the size of a corresponding content item. According to a specific embodiment of the present invention, the content_size field may be a 40-bit field.

The target field represents target device information of a corresponding content item. According to a specific embodiment of the present invention, when a value of the target field is 0x01, it represents that a target device is only a primary device. According to a specific embodiment of the present invention, when a value of the target field is 0x02, it represents that a target device is one or more companion devices. Additionally, according to a specific embodiment of the present invention, when a value of the target field is 0x03, it represents that a target device is both a primary device and one or more companion devices.

The content_name_length field represents the length of the content_name_text field. According to a specific embodiment of the present invention, the content_name_length field may be an 8-bit field.

The content_name_text field represents the name of a corresponding content item.

The content_descriptor field represents one or more NRT service descriptors including specific information on a content item. This will be described in more detail with reference to FIG. 144. FIG. 144 is a view of an NRT service descriptor according to an embodiment of the present invention.

The NRT service descriptor may include at least one of information representing a consumption model of NRT service, information on whether to update NRT service automatically, information on whether information representing a minimum storage space necessary for NRT service is included, information on whether information representing the default size of a content item is included, information on a target device, information representing a minimum storage space for NRT service, and information on the default size of a content item.

According to a specific embodiment of the present invention, the NRT service descriptor may include at least one of a consumption_model field, auto-update field, a storage_reservation_present field, a decault_content_size_present field, a target_include field, a storage_reservation field, and a default_content_size field.

The consumption_model field represents a consumption model of NRT service. According to an embodiment of the present invention, when a value of the consumption_model field is 0x00, it represents that a consumption model of NRT service is Push. According to an embodiment of the present invention, when a value of the consumption_model field is 0x01, it represents that a consumption model of NRT service is Portal. According to an embodiment of the present invention, when a value of the consumption_model field is 0x02, it represents that a consumption model of NRT service is Scripted Push. According to an embodiment of the present invention, when a value of the consumption_model field is 0x03, it represents that a consumption model of NRT service is Scripted Portal. According to an embodiment of the present invention, when a value of the consumption_model field is 0x04, it represents that a consumption model of NRT service is Triggered. According to an embodiment of the present invention, when a value of the consumption_model field is 0x05, it represents that a consumption model of NRT service is Segment Delivery. According to a specific embodiment of the present invention, the consumption_model field may be a 6-bit field.

The auto-update field represents that auto-update service is provided. According to a specific embodiment of the present invention, the auto-update field may be a 1-bit field.

The storage_reservation_present field represents whether information on the size of a minimum storage space necessary for executing NRT service is included. According to a specific embodiment of the present invention, the storage_reservation_resent field may be a 1-bit field.

The decault_content_size_present field represents whether information representing the default size of a content item is included. According to a specific embodiment of the present invention, the decault_content_size_present field may be a 1-bit field.

The target_include field represents whether information on a target device is included. According to a specific embodiment of the present invention, the target_include may be a 1-bit field.

The storage_reservation field represents the size of a minimum storage space necessary for executing NRT service. According to a specific embodiment of the present invention, the storage_reservation field may be a 24-bit field.

The default_content_size field represents the default size of a content item. According to a specific embodiment of the present invention, the default_content_size field may be a 40-bit field.

The above described NRT information block and NRT service descriptor are described in a bit stream format. However, the NRT information block and the NRT service descriptor are not limited to a bit stream format and thus may be in another format. For example, the NRT information block and the NRT service descriptor may be in an XML file format.

Additionally, in order to signal the graphic icon of a broadcast service, a program or a show segment including the primary content of a program among a plurality of time spans, a broadcast service signaling table, program information, or segment information may include the graphic icon information. Especially, the broadcast service signaling table may include graphic icon service as service level information. Additionally, the program information may include graphic icon information as program level information. Additionally, the segment information may include graphic icon information as segment level information.

FIG. 145 is a view illustrating graphic icon information according to an embodiment of the present invention.

The graphic icon information may include at least one of an icon identifier, an icon transmission mode representing an icon transmission method, information representing whether the position of an icon is specified, coordinate system information representing coordinates that are the base of an icon position, horizontal coordinates information representing the horizontal coordinates of an icon, vertical coordinates information representing the vertical coordinates of an icon, information representing the image form of an icon, URL information representing the position where an icon image is stored, and icon data itself.

In more detail, as shown in the embodiment of FIG. 145, the graphic icon information may include at least one of a descriptor_tag field, a descriptor_length field, a descriptor_number field, a last_descriptor_number field, an icon_id field, an icon_transport_mode field, a position_flag field, a coordinate_system field, an icon_horizontal_origin field, an icon_vertical_origin field, an icon_type_length field, an icon_type_chars field, an icon_data_length field, an icon_data_byte field, a url_length field, a url field, and an icon_content_linkage field.

The descriptor_tag field represents that icon information is included. According to a specific embodiment of the present invention, the descriptor_tag field may be an 8-bit field.

The descriptor_length field represents the length of icon information after this field. According to a specific embodiment of the present invention, the descriptor_length field may be an 8-bit field.

The descriptor_number field represents the order of the current descriptor when icon information is divided into a plurality of descriptors and transmitted. According to a specific embodiment of the present invention, in the case of a descriptor transmitted first, a value of the descriptor_number field may be 0x00. According to a specific embodiment of the present invention, a value of the descriptor_number field may be increased by one. According to a specific embodiment of the present invention, the descriptor_number field may be a 4-bit field.

The last_descriptor_number field represents the number of the last descriptor. According to a specific embodiment of the present invention, the last_descriptor_number field may be a 4-bit field.

The icon_id field represents an icon identifier for identifying an icon. According to a specific embodiment of the present invention, the icon_id field may be an 8-bit field.

The icon_transport_mode field represents an icon transmission method. In more detail, a value of the icon_transport_mode field may represent one among when an icon image is transmitted through graphic icon information itself, when an icon image is linked through URL, and an icon image is transmitted through a FLUTE session. According to a specific embodiment of the present invention, as shown in the embodiment of FIG. 146, when a value of the icon_transport_mode field is 0x00, it represents that an icon image is transmitted through graphic icon information itself. When a value of the icon_transport_mode field is 0x01, it represents that an icon image is linked through URL. When a value of the icon_transport_mode field is 0x02, it represents that an icon image is transmitted through a FLUTE session. According to a specific embodiment of the present invention, the icon_transport_mode field may be a 2-bit field.

The position_flag field represents whether the position of an icon is specified. According to a specific embodiment of the present invention, the position_flag field may be a 1-bit field.

The coordinate_system field represents coordinates that is the base of an icon position. In more detail, when a value of the coordinate_system field may represent at least one of when a coordinate system is configured with 720×576 coordinates, when a coordinate system is configured with 1280×720 coordinates, when a coordinate system is configured with 1920×1080 coordinates, when a coordinate system is configured with 3840×2160 coordinates, and when a coordinate system is configured with 7680×4320 coordinates. According to a specific embodiment of the present invention, as shown in the embodiment of FIG. 147, when a value of the coordinate_system field is 0x00, it represents that a coordinate system is configured with 720×576 coordinates. When a value of the coordinate_system field is 0x01, it represents that a coordinate system is configured with 1280×720 coordinates. When a value of the coordinate_system field is 0x02, it represents that a coordinate system is configured with 1920×1080 coordinates. When a value of the coordinate_system field is 0x03, it represents that a coordinate system is configured with 3840×2160 coordinates. When a value of the coordinate_system field is 0x04, it represents that a coordinate system is configured with 7680×4320 coordinates. According to a specific embodiment of the present invention, the coordinate_system field may be a 3-bit field.

The icon_horizontal_origin field represents the horizontal coordinates of an icon. In more detail, a value of coordinates may be increased in a direction from a left column to a right column. According to a specific embodiment of the present invention, the icon_horizontal_origin may be a 13-bit field.

The icon_vertical_origin field represents the vertical coordinates of an icon. In more detail, a value of coordinates may be increased in a direction from an upper row to a lower row. According to a specific embodiment of the present invention, the icon vertical_origin may be a 13-bit field.

The icon_type_length field represents the length of the icon_type field. According to a specific embodiment of the present invention, the icon_type_length field may be an 8-bit field.

The icon_type_chars field represents the image form of an icon. In more detail, a value of the icon_type_chars field may be in a Multipurpose Internet Mail Extensions (MIME) image form defined in RFC 2045.

The icon_data_length field represents the length of the icon_data_byte field when an icon image is transmitted through graphic icon information. According to a specific embodiment of the present invention, the icon_data_length field may be an 8-bit field.

The icon_data_byte field represents data of an icon image that graphic icon information transmits.

The url_length field represents the length of the url field when an icon image is linked through URL. The url_length field may be an 8-bit field.

The url field represents a URL that an icon links.

The icon_content_linkage field represents a FLUTE FDT contents linkage transmitting an icon image when the icon image is transmitted through a FLUTE session.

Graphic icon information is described through the embodiment in which the graphic icon information is in a bit stream format, but the graphic icon information may be in another format such as an XML file format.

Additionally, as described above, broadcast services may include one or more media components. The service signaling table may include media component list information signaling media components that a broadcast service includes. Especially, the broadcast service signaling table may include media component list information as service level information.

This will be described in more detail with reference to FIG. 148.

FIG. 148 is a view illustrating media component list information according to an embodiment of the present invention.

The media component list information may include at least one of a component identifier for identifying a component, component type information representing the type of a media component, and media type information representing the type of media that a media component includes.

According to a specific embodiment of the present invention, as shown in FIG. 148, the media component list information may include a descriptor_tag field, a descriptor_length field, a num_component field, a component_id field, a component_type field, and a general_media_type field.

The descriptor_tag field represents that component list information is included. According to a specific embodiment of the present invention, the descriptor_tag field may be an 8-bit field.

The descriptor_length field represents the length after the descriptor_length field. According to a specific embodiment of the present invention, the descriptor_length field may be an 8-bit field.

The num_component field represents the number of media components that a corresponding broadcast service includes. According to a specific embodiment of the present invention, the num_component field may be an 8-bit field.

The component_id field represents an identifier for identifying a corresponding media component. According to a specific embodiment of the present invention, the component_id field may be an 8-bit field.

The component_type field represents the type of a media component. According to a specific embodiment of the present invention, a value of the component_type field may represent one among the above-described elementary component, composite component, and adaptive component. In more detail, when a value of the component_type field is 0x00, a corresponding media component represents an elementary component. When a value of the component_type field is 0x01, a corresponding media component represents a composite component. When a value of the component_type field is 0x02, a corresponding media component represents an adaptive component. According to a specific embodiment of the present invention, the component_type field may be a 4-bit field.

The general_media_type field represents the type of a media that a media component includes. A value of the general_media_type field may represent one among video, audio, text, application, and message. In more detail, when a value of the general_media_type field is 0x00, it represents that a media that a media component includes video. When a value of the general_media_type field is 0x01, it represents that a media that a media component includes audio. When a value of the general_media_type field is 0x02, it represents that a media that a media component includes text. When a value of the general_media_type field is 0x03, it represents that a media that a media component includes application. When a value of the general_media_type field is 0x04, it represents that a media that a media component includes message. According to a specific embodiment of the present invention, the general_media_type field may be a 4-bit field.

Additionally, component list information is described through a bit stream format, but may be in another format such as an XML file format.

According to a specific embodiment of the present invention, one media component may be shared by a plurality of broadcast services of the same broadcast stream. Additionally, a plurality of broadcast services in a different broadcast stream may share one media component. Accordingly, a method of a plurality of broadcast services to efficiently share one media component is required. For this, a broadcast transmission device may allow each media component or broadcast service to be associated with a unique resource identifier (URI).

This will be described in more detail with reference to FIG. 149.

FIG. 149 is a view when a media component or a broadcast service is mapped through URI in a broadcast service signaling table according to an embodiment of the present invention.

A broadcast service or a media component may be signaled through URI in the broadcast service signaling. At this point, information signaling broadcast service or media component through URI may be referred to as URI linkage information. The URI linkage information may include at least one of URI or private data independently defined by each broadcaster or region.

According to a specific embodiment of the present invention, as shown in FIG. 149, the URI linkage information may include a descriptor_tag field, a descriptor_length field, an uri_length field, an uri_char field, and a private_data_byte field.

The descriptor_tag field represents that URI linkage information is included. According to a specific embodiment of the present invention, the URI linkage information may be an 8-bit field.

The descriptor_length field represents the length of the URI linkage information after the descriptor_length field. According to a specific embodiment of the present invention, the descriptor_length field may be an 8-bit field.

The uri_length field represents the length of the uri_char field. According to a specific embodiment of the present invention, the uri_length field may be an 8-bit field.

The uri_char field represents each character in URI character string. According to a specific embodiment of the present invention, the uri_char field may be an 8-bit field.

The private_data_byte field represents private data independently defined by each broadcaster or region. According to a specific embodiment of the present invention, the private_data_byte field may be an 8-bit field.

The broadcast reception device 100 may identify a media component or a broadcast service through URI of URI linkage information. When the URI of the URI linkage information identifies a media component, a broadcast service signaling table may include URI linkage information as component level information. When the URI of the URI linkage information identifies a broadcast service, a broadcast service signaling table may include URI linkage information as service level information.

The format of URI link information is described through bit stream in the embodiment of FIG. 149 but is not limited thereto. Especially, URI link information may be in an XML file format.

A broadcast transmission device may transmit a broadcast service or a media component, which targets on users having a specific condition. Additionally, the broadcast reception device 100 may transmit information on a user of the broadcast reception device 100 and may receive a broadcast service or a media component proper for a user of the broadcast reception device 100. For example, the broadcast reception device 100 may transmit information of a region where the broadcast reception device 100 is placed and may receive a broadcast service for a corresponding region. For this, required is a method of signaling information on a targeting criterion and a personalization property that a broadcast service or a media component targets. This will be described with reference to FIG. 149.

FIG. 150 is a view illustrating targeting criterion information signaling the targeting criterion of a broadcast service or a media component.

The broadcast service signaling table may include targeting criterion information signaling the target criterion of a broadcast service or a media component.

The targeting criterion information may include at least one of targeting identifier information for identifying a target criterion, targeting form information representing the form of targeting, and targeting criterion value information representing a specific targeting criterion.

According to a specific embodiment of the present invention, as shown in the embodiment of FIG. 150, the targeting criterion information may include at least one of a descriptor_tag field, a descriptor_length field, a num_targeting_criteria field, a criterion_id_length field, a criterion_id field, a criterion_type_code field, a num_criterion_values field, a criterion_value_length field, and criterion_value field.

The descriptor_tag field represents targeting criterion information. According to a specific embodiment of the present invention, the descriptor_tag field may be an 8-bit field.

The descriptor_length field represents the length of targeting criterion information after the descriptor_tag field. The descriptor_length field may be an 8-bit field.

The num_targeting_criteria field represents the number of targeting criterion information. According to an embodiment of the present invention, a targeting criterion that a broadcast service or a media component has may be in plurality. According to a specific embodiment of the present invention, the num_targeting_criteria field may be an 8-bit field.

The criterion_id_length field represents the length of the criterion_id field. According to a specific embodiment of the present invention, the criterion_id_length field may be an 8-bit field.

The criterion_id field represents a targeting criterion identifier for identifying a targeting criterion. According to a specific embodiment of the present invention, the criterion_id field may be an 8-bit field.

The criterion_type_code field represents the form of a targeting criterion. According to a specific embodiment of the present invention, the criterion_type_code may be a 3-bit field.

The num_criterion_values field represents the number of targeting criterion values. According to an embodiment of the present invention, a broadcast service or a media component may have a plurality of targeting criterion values corresponding to a targeting criterion form. According to a specific embodiment of the present invention, the num_criterion_values field may be a 5-bit field.

The criterion_value_length field represents the length of the criterion_value field. According to a specific embodiment of the present invention, the criterion_value_length field may be an 8-bit field.

The criterion_value field represents a targeting criterion value. According to a specific embodiment of the present invention, when targeting criterion information signals targeting criterion of a media component, the broadcast service signaling table may include targeting criterion information as component level information. According to a specific embodiment of the present invention, when targeting criterion information signals the targeting criterion of a broadcast service, the broadcast service signaling table may include targeting criterion information as service level information.

Targeting criterion information is described through a bit stream format in the embodiment of FIG. 150 but is not limited thereto. Especially, the targeting criterion information may be in an XML file format.

The broadcast service signaling table may include text information for describing a broadcast service or a media component. This will be described in more detail with reference to FIG. 151.

FIG. 151 is a view illustrating text information for describing a broadcast service or a media component.

In more detail, the text information may include at least one of information representing the kind of text language, an identifier for identifying text information, and text information for describing a text including a broadcast service or a media component.

According to a specific embodiment of the present invention, as shown in the embodiment of FIG. 151, the text information may include a descriptor_number field, a last_descriptor_number field, a description_id field, a language_code field, a text_length field and a text_char field.

The descriptor_number field represents the order of a descriptor. When one descriptor does not include all text information, text information is divided and included in a plurality of descriptors. At this point, the descriptor_number field represents a number of a corresponding descriptor among a plurality of descriptors. According to a specific embodiment of the present invention, the descriptor_number field may be a 4-bit field.

The last_descriptor_number field represents a number of the last descriptor including text information. According to a specific embodiment of the present invention, the last_descriptor_number field may be a 4-bit field.

The description_id field represents an identifier for identifying text information. In more detail, the broadcast reception device 100 may identify text information for a specific broadcast service or media component from text information for another media component or broadcast service, on the basis of a value of the description_id field. According to a specific embodiment of the present invention, the description_id field may be an 8-bit field.

The language_code field represents a language used in text information. According to a specific embodiment of the present invention, the language_code field may be a 24-bit field.

The text_length field represents the length of the text_char field. According to a specific embodiment of the present invention, the text_length field may be an 8-bit field.

The text_char field represents a character of text information. According to a specific embodiment of the present invention, the text_char field may be an 8-bit field.

According to a specific embodiment of the present invention, when text information signals a text for describing a media component, the broadcast service signaling table may include text information as component level information. According to a specific embodiment of the present invention, when text information signals text information for describing a broadcast service, the broadcast service signaling table may include text information as service level information.

The text information format is described through a bit stream format in the embodiment of FIG. 151 but is not limited thereto. Especially, the text information may be in an XML file format.

Additionally, in order to signal the title of a broadcast service, a program or a show segment including the primary content of a program among a plurality of time spans, a broadcast service signaling table, program information, or segment information may include title information. Especially, the broadcast service signaling table may include title information as service level information. Additionally, the program information may include title information as program level information. Additionally, the segment information may include title information as segment level information. Especially, the title information may include titles in a plurality of languages to support multiple languages.

FIG. 152 is a view illustrating title information of a broadcast service, a program, or a show segment.

The title information may include at least one of information representing the number of languages, information representing the language of a title, information representing the length of a title, and characters in a title.

According to a specific embodiment of the present invention, as shown in the embodiment of FIG. 152, the title information may include at least one of a num_title field, a language_code field, a title_length field, and a text_char field.

The num_title field represents the number of titles. In more detail, the title information may include the title of a broadcast service, a program, or a show segment, which are displayed according to a plurality of languages. Accordingly, the num_title field may represent the number of languages displaying a title. According to a specific embodiment of the present invention, the num_title field may be an 8-bit field.

The language_code field represents the type of language displaying a title. According to a specific embodiment of the present invention, the language_code field may be a 24-bit field.

The title_length field represents the number of characters in a title. According to a specific embodiment of the present invention, the title_length field may be an 8-bit field.

The text_char field represents characters in a title. According to a specific embodiment of the present invention, the text_char field may be an 8-bit or 16-bit field.

Although title information in a bit stream format is described, it is not limited to the bit stream format and may be in another format. In a specific embodiment, the title information may be in an XML file format.

Additionally, in order to signal the genre of a broadcast service, a program or a show segment including the primary content of a program among a plurality of time spans, a broadcast service signaling table, program information, or segment information may include genre information. Especially, the broadcast service signaling table may include genre information as service level information. Additionally, the program information may include genre information as program level information. Additionally, the segment information may include genre information as segment level information. This will be described in more detail with reference to FIG. 153.

FIG. 153 is a view illustrating genre information of a broadcast service, a program, or a show segment.

In more detail, the genre information may include information representing the number of genres and information representing the genre of a broadcast service, a program, or a show segment.

In more detail, as shown in the embodiment of FIG. 153, the genre information may include at least one of a num_genre field and a genre_value field.

The num_genre field represents the number of genres. According to a specific embodiment of the present invention, the num_genre field may be an 8-bit field. One broadcast service, program, and show segment may correspond to a plurality of genres. Accordingly, the genre information may include a plurality of genre information on one broadcast service, program, and show segment. Accordingly, the genre information may include the num_genre field.

The genre_value field represents the genre of a broadcast service, a program, or a show segment. According to a specific embodiment of the present invention, the genre_value field may be an 8-bit field.

Although genre information in a bit stream format is described, it is not limited to the bit stream format and may be in another format. In a specific embodiment, the genre information may be in an XML file format.

Additionally, a broadcast service, a media component, or a content item may be for a specific device. In detail, a broadcast service, a media component, or a content item may be for a primary device. Additionally, a broadcast service, a media component, or a content item may be for a plurality of companion devices. Accordingly, in order to signal a target device relating to a broadcast service, a media component, or a content item, a broadcast service program table, a program table, or an NRT information table may include target device information. This will be described with reference to FIG. 154.

FIG. 154 is a view illustrating target device information signaling a target device relating to a media component or a content item.

The target device information may include information representing a target device of a broadcast service, a media component, or a content item.

In a specific embodiment, the target device information may include a target_device field as shown in FIG. 154. The target_device field represents a target device of a broadcast service, a media component, or a content item. According to a specific embodiment of the present invention, the target device may be an 8-bit field.

Although target device information in a bit stream format is described, it is not limited to the bit stream format and may be in another format. In a specific embodiment, the target device information may be in an XML file format.

A broadcast service and a media component that a broadcast service includes are described above. A program and a segment will be described in more detail with reference to FIGS. 155 to 159.

FIG. 155 is a view when a broadcast service is divided into a plurality of segments.

A broadcast service may include a program which is a temporal segment having a scheduled start time and playback length. More specifically, a radio service includes a radio program or an audio program. In addition, a TV service may include a TV program. In addition, a user request content service may include a user request program. In addition, a stand-alone NRT data service may include a data program.

Such a program may be divided according to broadcast service time. In addition, a broadcast time of a radio service is equal to a sum of durations of radio programs. A broadcast time of a TV service is equal to a sum of durations of TV programs. The duration of a user request content service does not indicate a playback time of specific content but indicates a time when a user request content service is possible. Accordingly, the playback time of individual content depends on the user. While a content item is provided, a start time and a length are restricted according to program. Accordingly, a content item provided through the user request content service may be included in a catalog. At this time, the catalog may be an application for providing a user interface to provide a service.

A program may include a show representing a primary content of a related program. Many parts which are considered as a property of a program may be substantially referred to a property of a show. For example, texts, actors, or genre describing a program included in a program property relate to the properties of a show. Properties other than the properties of a show in a program property are the properties of a program itself. For example, the identifier of a service including a program or the start time of a program is the property of the program itself. Even when a program includes the same show, the property of a program itself may vary.

A show may include at least one of identifier information for identifying the show, the text title of the show, a text describing the show, a genre, a graphic icon, a list of segments relating to the show, an advisory viewing rating, a targeting/personalizing property, and a content/service protection property. The property of such a show may be signaled through show information. At this point, the list of segments relating to a show may be a list of segments including a show. This will be described with reference to FIG. 156.

FIG. 156 is a view illustrating show information according to an embodiment of the present invention.

The show information may include a show information block including identifier information for identifying a show and specific information on a show.

In more detail, as shown in the embodiment of FIG. 156, the show information may include a table_id field, a section_syntax_indicator field, a private_indicator field, a section_length field, a table_id_extension field, a version_number field, a current_next_indicator field, a section_number field, a last_section_number field, a show_id field, and a show_information_block field.

The table_id field represents that show information is included. According to a specific embodiment of the present invention, the table_id field may be an 8-bit field.

The section_syntax_indicator field represents whether show information is a private section table in the long format of MEPG-2 TS standard. According to a specific embodiment of the present invention, the section_syntax_indicator field may be a 1-bit field.

The private_indicator field represents whether a current table corresponds to a private section. According to a specific embodiment of the present invention, the private_indicator field may be a 1-bit field.

The section_length field represents the length of a section after the section_length field. According to a specific embodiment of the present invention, the section_length field may be a 12-bit field.

The table_id_extension field represents a value for identifying show information in combination with the table_id field. In more detail, the table_id_extension field may include at least one of the protocol_version field and the subnet_id field. The protocol_version field represents a protocol version of program information. In more detail, the protocol_version field may be an 8-bit field in which the upper four bits represent a major version_number and the lower four bits represent a minor version_number. When show information is transmitted through broadcast stream, the subnet_id field may represent a subnet identifier for identifying an IP subnet for transmitting program information. According to another specific embodiment of the present invention, a value of the subnet_id field may be 0. When program information is transmitted through internet network, the subnet_id field has the same value as the subnet_id field of program information transmitted through broadcast stream. According to a specific embodiment of the present invention, the subnet_id field may be an 8-bit field.

The version_number field represents a version of show information. The broadcast reception device 100 may determine the availability of show information on the basis of a value of the version_number field. In more detail, when a value of the version_number field is identical to a version of previously received service show information, the show information may not be used. According to a specific embodiment of the present invention, the version_number field may be a 5-bit field.

The current_next_indicator field represents whether show information is currently available. In more detail, when a value of the current_next_indicator field is 1, it may represent that show information is available. Moreover, when a value of the current_next_indicator field is 1, it may represent that show information is available next time. According to a specific embodiment of the present invention, the current_next_indicator field may be a 1-bit field.

The section_number field represents a current section_number. According to a specific embodiment of the present invention, the section_number field may be an 8-bit field.

The last_section_number field represents the last_section_number. When the size of a show information table is large, the show information table may be divided into a plurality of sections and then transmitted. At this point, the broadcast reception device 100 determines whether all sections necessary for show information are received on the basis of the section_number field and the last_section_number field. According to a specific embodiment of the present invention, the last_section_number field may be an 8-bit field.

The show_id field represents a show identifier for identifying a show that show information signals. According to a specific embodiment of the present invention, the show_id field may be a 16-bit field.

The show_information_block field represents a show information block including information on the property of a segment. This will be described in more detail with reference to FIG. 157.

FIG. 157 is a view illustrating a show information block according to an embodiment of the present invention.

The show information block may include at least one of descriptors including the length of a show, a text for describing a show, the number of segments relating to a show, a segment information block signaling a segment relating to a show, and specific information on the property of a show. At this point, a show related segment may be a segment including a show.

In more detail, as shown in the embodiment of FIG. 157, the show information block may include at least one of a time_span_length field, a title_text_length field, a title_text( ) field, a num_segment field, a segment_information_block( ) field, a num_show_descriptors field, and a descriptors field.

The time_span_length field represents the length of a show. The show may be included in a plurality of segments. At this point, the start times of a plurality segments may vary but the length of a show may be identical. The reason is that even when contents of a show segment are included in different programs, they are the same. According to a specific embodiment of the present invention, the time_span_length field may be a 16-bit field.

The title_text_length field may include a title_text( ) field, a num_segment field, a segment_information_block( ) field, a num_show_descriptors field, and a descriptors field.

FIG. 158 is a view illustrating a segment information block according to an embodiment of the present invention.

The segment information block may include at least one of descriptors including a segment identifier for identifying a segment, information representing the start time of a segment, information representing the length of a segment, and specific information on a segment. In a specific embodiment, a segment identifier may be based on a program identifier for identifying a program including a segment and a domain name. In a specific embodiment, a segment identifier may be a combination of a program identifier for identifying a program including a segment and a domain name. In more detail, the start time of a segment may be a relative time from the start of a program including a segment.

According to a specific embodiment of the present invention, as shown in the embodiment of FIG. 158, the segment information block may include at least one of a segment_id field, a start_time field, a time_span_length field, a num_segment_descriptors field, and a descriptor field.

The segment_id field represents a segment identifier for identifying a segment. According to a specific embodiment of the present invention, the segment_id field may be a 16-bit field.

The start_time field represents the start time of a segment. Even when a segment includes the same show, the start time for each segment may vary. Accordingly, each segment information may include information representing the start time of a segment. According to a specific embodiment of the present invention, the start_time field may be a 32-bit field.

The time_span_length field represents the length of a segment. According to a specific embodiment of the present invention, the time_span_length field may be a 16-bit field.

The num_segment_descriptors field represents the number of descriptors that a segment information block includes. According to a specific embodiment of the present invention, the num_segment_descriptors field may be an 8-bit field.

The descriptor field includes specific information on a segment.

Although show information, a show_information_block, and a segment information block in a bit stream format are described, they are not limited to the bit stream format and may be in another format. In more detail, show information, a show_information_block, and a segment information block may be in an XML file format.

FIG. 159 is a view when a broadcast transmission device transmits broadcast signals including at least one of show information and segment information according to an embodiment of the present invention.

The broadcast transmission device obtains the property of a show that a broadcast service includes through a control unit in operation S731. As described above, the property of a show may include at least one of identifier information for identifying the show, the text title of the show, a text describing the show, a genre, a graphic icon, a list of segments relating to the show, an advisory viewing rating, a targeting/personalizing property, and a content/service protection property. The property of such a show may be signaled through show information. At this point, the list of segments relating to a show may be a list of segments including a show.

The broadcast transmission device generates program information signaling a program on the basis of the property of a show through a control unit in operation S733. The show information may include at least one of the show information and the show information block described through FIGS. 156 and 157.

The broadcast transmission device obtains the property of a segment relating to a show through a control unit in operation S735. The property of a segment may include at least one of a unique identifier for identifying a segment, a list of media components played during a time span of a corresponding segment, the start time and the duration of a segment, a segment type, and a targeting/personalization property, and a contents advisory rating.

The broadcast transmission device generates a segment information block on the basis of the property of a segment through a control unit in operation S737. The segment information block may be the above-mentioned segment information block in FIG. 158.

The broadcast transmission device transmits a broadcast signal including at least one of a segment information block and program information through a transmitting unit in operation S739.

FIG. 160 is a view when a broadcast reception device receives broadcast signal including at least one of show information and segment information according to an embodiment of the present invention.

The broadcast reception device 100 receives a broadcast signal through the broadcast receiving unit 110 in operation S751.

The broadcast reception device 100 obtains program information on the basis of a broadcast signal through the control unit 150 in operation S753. In more detail, the broadcast reception device 100 may obtain show information from the broadcast signal. At this point, the show information may include at least one of the show information and the show information block described through FIGS. 156 and 157.

The broadcast reception device 100 obtains the property of a show on the basis of the show information through the control unit 150 in operation S755. As described above, the property of a show may include at least one of identifier information for identifying the show, the text title of the show, a text describing the show, a genre, a graphic icon, a list of segments relating to the show, an advisory viewing rating, a targeting/personalizing property, and a content/service protection property. The property of such a show may be signaled through show information. At this point, the list of segments relating to a show may be a list of segments including a show.

The broadcast reception device 100 obtains a segment information block relating to a show on the basis of a broadcast signal through the control unit 150 in operation S757. In more detail, the broadcast reception device 100 may obtain a segment information block relating to a show from the show information block. The segment information block may include the above-mentioned segment information block in FIG. 158.

The broadcast reception device 100 obtains the property of a segment on the basis of the segment information block through the control unit 150 in operation S759. The segment information block may be the above-mentioned segment information block in FIG. 158.

The broadcast reception device 100 generates a service guide displaying the property of a show on the basis of at least one of the property of a show and a segment property relating to a show in operation S761. According to a specific embodiment of the present invention, a service guide may display the property of a show and segments relating to a show together. For example, the service guide may display the properties of a plurality of segments including the same show. At this point, the property of a segment may include at least one of the start time of a segment and the property of a program including a segment. At this point, the property of a program may include at least one of the start time of a program and information of a service including a program.

A radio program, a TV program, and a data program may include at least one of a unique identifier, a list of media components in a program, the start time and length of a program, a show identifier for identifying a related show, a text for describing a title and a program, the genre of a program, a graphic icon, a contents advisory rating, a targeting/personalization property, a contents protection property, a list of related data services, and list of related segments. Properties included in an audio program, a TV program, and a data program may be signaled through program information. This will be described with reference to FIGS. 171 to 166.

FIG. 171 is a view illustrating program information according to an embodiment of the present invention.

As shown in the embodiment of FIG. 171, the program information may include at least one of a table_id field, a section_syntax_indicator field, a private_indicator field, a section_length field, a table_id_extension field, a version_number field, a current_next_indicator field, a section_number field, a last_section_number field, a service_id field, and a program_information_block field.

The table_id field represents program information. According to a specific embodiment of the present invention, the table_id field may be an 8-bit field.

The section_syntax_indicator field represents whether program information is a private section table in the long format of MEPG-2 TS standard. According to a specific embodiment of the present invention, the section_syntax_indicator field may be a 1-bit field.

The private_indicator field represents whether a current table corresponds to a private section. According to a specific embodiment of the present invention, the private_indicator field may be a 1-bit field.

The section_length field represents the length of a section after the section_length field. According to a specific embodiment of the present invention, the section_length field may be a 12-bit field.

The table_id_extension field represents a value for identifying program information in combination with the table_id field. In more detail, the table_id_extension field may include at least one of the protocol_version field and the subnet_id field. The protocol_version field represents a protocol version of program information. In more detail, the protocol_version field may be an 8-bit field in which the upper four bits represent a major version number and the lower four bits represent a minor version number. When program information is transmitted through broadcast stream, the subnet_id field may represent a subnet identifier for identifying an IP subnet for transmitting program information. According to another specific embodiment of the present invention, a value of the subnet_id field may be 0. When program information is transmitted through internet network, the subnet_id field has the same value as the subnet_id field of program information transmitted through broadcast stream. According to a specific embodiment of the present invention, the subnet_id field may be an 8-bit field.

The version_number field represents a version of program information. The broadcast reception device 100 may determine the availability of program information on the basis of a value of the version_number field. In more detail, when a value of the version_number field is identical to a version of previously received service program information, the program information may not be used. According to a specific embodiment of the present invention, the version_number field may be a 5-bit field.

The current_next_indicator field represents whether program information is currently available. In more detail, when a value of the current_next_indicator field is 1, it may represent that program information is available. Moreover, when a value of the current_next_indicator field is 1, it may represent that the program information is available the next time. According to a specific embodiment of the present invention, the current_next_indicator field may be a 1-bit field.

The section_number field represents a current section number. According to a specific embodiment of the present invention, the section_number field may be an 8-bit field.

The last_section_number field represents the last section number. When the size of a program information table is large, the program information may be divided into a plurality of sections and then transmitted. At this point, the broadcast reception device 100 determines whether all sections necessary for program information are received on the basis of the section_number field and the last_section_number field. According to a specific embodiment of the present invention, the last_section_number field may be an 8-bit field.

The service_id field represents a service identifier for identifying a broadcast service relating to program information. In more detail, the service_id field may represent a service identifier for identifying a broadcast service including a program that program information signals. According to a specific embodiment of the present invention, the service_id field may be an 8-bit field.

The program_information_block field represents a program information block including information on the property of a program. This will be described in more detail with reference to FIG. 162.

FIG. 162 is a view illustrating a program information block according to an embodiment of the present invention.

The program information block may include the number of programs that the program information block signals, a program identifier for identifying a signaling program, a start time of a program, the length of a program, a text for describing a program, and a descriptor for signaling a text for describing a program and a property of a program.

According to a specific embodiment of the present invention, as shown in the embodiment of FIG. 162, the program information block may include at least one of a num_program field, a program_id field, a time_span_start field, a time_span_length field, a title_text_length field, a title_text field, a num_program_descriptors field, and a descriptor field.

The num_program field represents the number of programs that a program information block signals. According to a specific embodiment of the present invention, the num_program field may be an 8-bit field.

The program_id field represents a program identifier for identifying a corresponding program. According to a specific embodiment of the present invention, the program_id field may be an 8-bit field.

The time_span_start field represents a start time of a corresponding program. In more detail, the time_span_start field may represent a UTC time that elapsed from 00:00 Jan. 6, 1980. According to a specific embodiment of the present invention, the time_span_start field may be a 32-bit field.

The time_span_length field represents the length of a corresponding program. In more detail, a corresponding program may represent the length of a time that a corresponding program is broadcasted in minutes on the basis of a value of the time_span_start field. When a value of the time_span_length field is set once, it does not change in the future. According to a specific embodiment of the present invention, the time_span_length field may be a 16-bit field.

The title_text_length field represents the length of the title_text field. According to a specific embodiment of the present invention, the title_text field may be an 8-bit field.

The title_text field represents each character that the title of a corresponding program includes. According to a specific embodiment of the present invention, each character may be in a UTF-8 encoding format. According to a specific embodiment of the present invention, the title_text field may be an 8-bit field.

The num_program_descriptors field represents the number of descriptors that a program information block includes. According to a specific embodiment of the present invention, the num_program_descriptors field may be an 8-bit field.

The descriptor field represents a descriptor including information relating to a property of a program. For example, a descriptor that the descriptor field has may include information on a media component list. Additionally, a descriptor that the descriptor field has may include information on a contents advisory rating. Additionally, a descriptor that the descriptor field has may include information on a targeting property. Additionally, a descriptor that the descriptor field has may include information on a text for describing a program. Accordingly, the descriptor field may include at least one of the component_list_descriptor field, the targeting_descriptor field, and the text_descriptor field. However, the program information block shown in FIG. 162 may not signal a show relating to a program. In more detail, the program information block in the embodiment of FIG. 162 may not signal a show in a program. A method for resolving the above issue will be described with reference to FIG. 163.

FIG. 163 is a view illustrating a program information block according to another embodiment of the present invention.

A program information block according to another embodiment of the present invention may further include at least one of information on whether information on a show relating to a program that the program information block signals is included and a show identifier for identifying a show relating to a program that the program information block signals.

According to a specific embodiment, the program information block may include at least one of an associated_show_flag field and a show_id field as shown in FIG. 163.

The associated_show_flag field represents whether information on a show relating to a program that a program information block signals is included. According to an embodiment of the present invention, if there is a related show, the broadcast reception device 100 may receive show information. Accordingly, when associated_show_flag is 1, the broadcast reception device 100 may receive show information. At this point, the show information may be the show information or the show information block described with reference to FIGS. 166 and 167. According to a specific embodiment of the present invention, the associated_show_flag field may be a 1-bit field.

The show_id field represents a show identifier for identifying a show relating to a show that a program information block signals. According to a specific embodiment of the present invention, the show_id field may be a 16-bit field.

However, the program information block shown in FIG. 163 may not signal the property of a media component through component level information. Accordingly, a plurality of media components having various properties may not be signaled efficiently. A method for resolving the above issue will be described with reference to FIG. 193.

FIG. 164 is a view illustrating a program information block according to another embodiment of the present invention.

The program information block may include the number of media components that a corresponding program includes, a component identifier for identifying a corresponding media component, information for representing whether a corresponding media component is a media component necessary for corresponding program playback, and a component descriptor including an additional property of a media component.

According to a specific embodiment of the present invention, as shown in the embodiment of FIG. 164, the program information block may include at least one of a num_component field, a component_id field, an essential_component_indicator field, a num_component_descriptors field, and a component_descriptor field.

The num_component field represents the number of media components that a corresponding program includes. According to a specific embodiment of the present invention, the num_component field may be an 8-bit field.

The component_id field represents a component identifier for identifying a corresponding media component. According to a specific embodiment of the present invention, the component_id field may be an 8-bit field.

The essential_component_indicator field represents whether a corresponding media component is an essential media component essential to a corresponding broadcast service presentation. According to a specific embodiment of the present invention, the essential_component_indicator field may be a 1-bit field.

The num_component_descriptors field represents the number of component_descriptor fields. According to a specific embodiment of the present invention, the num_component_descriptors field may be an 8-bit field.

The component_descriptor field represents a component descriptor including an additional property on a corresponding component.

However, in this case, information on a segment that a program includes may not be obtained. A method of resolving this will be described with reference to FIGS. 165 and 166.

FIGS. 165 and 166 are views illustrating a program information block according to another embodiment of the present invention.

The program information block may include information of a segment that a program signaled by the program information block includes. In more detail, the program information block may include a segment information block including the number of segments that a program signaled by the program information block includes and a specific property of a segment.

The program information block may include at least one of a num_segment field and a segment_information_block field as shown in FIGS. 165 and 166.

The num_segment field represents the number of segments that a program signaled by a program information block includes. According to a specific embodiment of the present invention, the num_segments field may be an 8-bit field.

The segment_information_block field may include the segment information block described through the embodiment of FIG. 187 or a segment information block to be described with reference to FIGS. 167 and 168.

In the embodiment of FIG. 165, the broadcast reception device 100 may not obtain information of a show relating to a program that a program information block signals. In the embodiment of FIG. 167, like the embodiment of FIG. 134, information of a show relating to a program that a program information block signals is included so that the broadcast reception device 100 may obtain information of a show relating to a program.

The program information and the program information block in a bit stream format are described through FIGS. 160 to 166 but the present invention is not limited to the bit stream format. Especially, the program information and the program information block may be in an XML file format.

As described above, a broadcast service may include a plurality of programs. At this point, a program may include a plurality of segments. A segment is a time interval configuring a program. A segment may include a show segment broadcasting the primary content of a show and an interstitial segment broadcasting a content not relating to the primary content of the program between the primary contents of the program. At this point, the interstitial segment may include ads or public service announcement. The show segment and the interstitial segment of a radio service or a TV service may have a scheduled start time and duration.

The segment may include at least one as one property among a unique identifier for identifying a segment, a list of media components played during a time interval of a corresponding segment, a start time and the duration of a segment, a segment type, and a targeting/personalization property, and a contents advisory rating. As described above, the segment type may be one among a show segment and an interstitial segment. At this point, the start time of a segment may represent a relative time on the basis of the start time of a show. For example, the start time of a segment may be specified on the basis of the start time of a show, for example, 10 minutes before a show start time. An anchored segment represents a segment relating to a specific program and having a specified start time. On the other hand, an unanchored segment represents a segment not relating to a specific program and not having a specified start time. For example, since the broadcast reception device 100 receives a targeted advertisement but a corresponding advertisement segment is used in various programs and services several times, when a start time for a corresponding is not clearly specified, the targeted advertisement may be referred to as an unanchored segment. It is necessary to efficiently signal such a segment. Signaling a segment will be described with reference to FIGS. 167 to 171.

FIG. 167 is a view illustrating segment information program information according to an embodiment of the present invention.

The segment information may include a segment block including a specific segment property.

According to a specific embodiment of the present invention, as shown in the embodiment of FIG. 167, the segment information may include at least one of a table_id field, a section_syntax_indicator field, a private_indicator field, a section_length field, a table_id_extension field, a version_number field, a current_next_indicator field, a section_number field, a last_section_number field, and a segment_information_block field.

The table_id field represents segment information is included. According to a specific embodiment of the present invention, the table_id field may be an 8-bit field.

The section_syntax_indicator field represents whether broadcast service segment information is a private section table in a long format of MEPG-2 TS standard. According to a specific embodiment of the present invention, the section_syntax_indicator field may be a 1-bit field.

The private_indicator field represents whether a current table corresponds to a private section. According to a specific embodiment of the present invention, the private_indicator field may be a 1-bit field.

The section_length field represents the length of a section after the section_length field. According to a specific embodiment of the present invention, the section_length field may be a 12-bit field.

The table_id_extension field represents a value for identifying segment information in combination with the table_id field. In more detail, the table_id_extension field may include at least one of the protocol_version field and the subnet_id field. The protocol_version field represents a protocol version of segment information. In more detail, the protocol_version field may be an 8-bit field in which the upper four bits represent a major version_number and the lower four bits represent a minor version_number. When segment information is transmitted through broadcast stream, the subnet_id field may represent a subnet identifier for identifying an IP subnet for transmitting segment information. According to another specific embodiment of the present invention, a value of the subnet_id field may be 0. When segment information is transmitted through internet network, the subnet_id field has the same value as the subnet_id field of segment information transmitted through broadcast stream. According to a specific embodiment of the present invention, the subnet_id field may be an 8-bit field.

The version_number field represents a version of segment information. The broadcast reception device 100 may determine the availability of segment information on the basis of a value of the version_number field. In more detail, when a value of the version_number field is identical to a version of previously received service segment information, the segment information may not be used. According to a specific embodiment of the present invention, the version_number field may be a 5-bit field.

The current_next_indicator field represents whether segment information is currently available. In more detail, when a value of the current_next_indicator field is 1, it may represent that segment information is available. Moreover, when a value of the current_next_indicator field is 1, it may represent that segment information is available the next time. According to a specific embodiment of the present invention, the current_next_indicator field may be a 1-bit field.

The section_number field represents a current section number. According to a specific embodiment of the present invention, the section_number field may be an 8-bit field.

The last_section_number field represents the last section number. When the size of a segment information table is large, the segment information may be divided into a plurality of sections and then transmitted. At this point, the broadcast reception device 100 determines whether all sections necessary for segment information are received on the basis of the section_number field and the last_section_number field. According to a specific embodiment of the present invention, the last_section_number field may be an 8-bit field.

The service_id field represents a service identifier for identifying a broadcast service relating to segment information. In more detail, the service_id field may represent a service identifier for identifying a broadcast service including a segment that segment information signals. According to a specific embodiment of the present invention, the service_id field may be an 8-bit field.

The program_information_block field represents a segment information block including information on the property of a segment. This will be described in more detail with reference to FIG. 168.

FIG. 168 is a view illustrating a segment information block according to an embodiment of the present invention.

The segment information block in segment information may include at least one of a segment identifier for identifying a signaling segment, a segment type, information representing whether there is a program relating to a segment, information representing whether a start time and the duration of a segment is specified, a program identifier for identifying a program relating to a segment, a start time of a segment, the number of media components in a segment, a media component identifier for identifying a corresponding media component, the number of descriptors including a property for a corresponding media component, a descriptor including a property for a corresponding media component, the number of descriptors including a property for a corresponding segment, and a descriptor including a corresponding segment.

According to a specific embodiment of the present invention, as shown in the embodiment of FIG. 168, the segment information may include at least one of a segment_id field, a segment_type field, an associated_program_flag field, a time_included field, a progmam_id field, a time_span_start field, a time_span_length field, a num_component field, a component_id field, a num_component_descriptors field, a component_descriptors field, a num_descriptor field, and a descriptor field.

The segment_id field represents a segment identifier for identifying a corresponding segment. According to a specific embodiment of the present invention, the segment_id field may be an 8-bit field.

The segment_type field represents the type of a corresponding segment. In more detail, it may represent a show segment or an interstitial segment. According to a specific embodiment of the present invention, when a value of the segment_type field is 0x02, it represents a show segment and when a value of the segment_type field is a value between 0x03 to 0x07, it represents an interstitial segment According to a specific embodiment of the present invention, the segment_type field may be a 3-bit field.

The associated_program_flag field represents whether there is a program relating to a corresponding segment. In more detail, when a value of the associated_program_flag field is 1, it represents that there is a program relating to a corresponding segment and when a value of the associated_program_flag field is 0, it represents that there is no program relating to a corresponding segment. According to a specific embodiment of the present invention, the associated_program_flag field may be a 1-bit field.

The time_included field represents whether a start time and duration of a corresponding segment is specified. In more detail, when a value of the time_included field is 1, it represents that a start time and duration of a corresponding segment is specified and when a value of the time_included field is 0, it represents that a start time and duration of a corresponding segment is not specified. According to a specific embodiment of the present invention, the time_included field may be a 1-bit field.

The program_id field represents a program identifier for identifying a program relating to a corresponding program. According to a specific embodiment of the present invention, the program_id field may be a 16-bit field.

The time_span_start field represents a start time of a corresponding segment. In more detail, the time_span_start field may represent a UTC time that elapsed from 00:00 Jan. 6, 1980. According to a specific embodiment of the present invention, the time_span_start field may be a 32-bit field.

The time_span_length field represents the length of a corresponding segment. In more detail, a corresponding segment may represent the length of a time that a corresponding program is broadcasted in minutes on the basis of a value of the time_span_start field. When a value of the time_span_length field is set once, it does not change in the future. According to a specific embodiment of the present invention, the time_span_length field may be a 16-bit field.

The num_component field represents the number of media components that a corresponding segment includes. According to a specific embodiment of the present invention, the num_component field may be an 8-bit field.

The component_id field represents a component identifier for identifying a corresponding media component. According to a specific embodiment of the present invention, the component_id field may be an 8-bit field.

The num_component_descriptors field represents the number of component_descriptor fields. According to a specific embodiment of the present invention, the num_component_descriptors field may be an 8-bit field.

The component_descriptor field represents a component descriptor including an additional property on a corresponding component.

The num_descriptor field represents the number of descriptor fields. According to a specific embodiment of the present invention, the num_descriptors field may be an 8-bit field.

The descriptor field represents a descriptor including an additional property. For example, the descriptor may include at least one of a contents advisory rating and a targeting property. Accordingly, the descriptor field may be the targeting_descriptor field.

When a program is divided into a plurality of segments, even when a viewer watches the same program, another segment may be provided according to the characteristics of each viewer. Especially, segments according the characteristics of each viewer may be provided to an interstitial segment instead of the show segment. Through this, broadcasters may provide the feature broadcast of the same content and also may provide a target advertisement to viewers according to the characteristics of each viewer. For this, it is necessary to provide a targeting segment set signaling the targeting information and property of each segment. This will be described with reference to FIG. 169.

FIG. 169 is a view illustrating a targeting segment set information according to an embodiment of the present invention.

The targeting segment set may signal targeting information on a plurality of segments. Especially, the targeting segment set information may signal targeting information on a plurality of segments having the same duration. According to a specific embodiment of the present invention, the targeting segment set information may signal targeting information on a plurality of segments relating to the same program. According to another specific embodiment of the present invention, targeting segment information may signal targeting information on a plurality of segments having the same start time.

The targeting segment set information may include at least one of a start time of a corresponding segment, the duration of a segment, the number of segments that a targeting segment set includes, a segment identifier for identifying a corresponding segment, the number of targeting criteria that targeting segment set information includes, targeting identification information for identifying a target criterion, targeting form information representing the form of targeting, and targeting criterion value information representing a specific targeting criterion.

According to a specific embodiment of the present invention, as shown in the embodiment of FIG. 169, the targeting segment set information may include at least one of a descriptor_tag field, a descriptor_length field, a time_span_start field, a time_span_length field, a num_segment field, a segment_id field, a num_targeting_criteria field, a criterion_id_length field, a criterion_id field, a criterion_type_code field, a num_criterion_values field, a criterion_value_length field, and a criterion_value field.

The descriptor_tag field represents targeting segment set information. According to a specific embodiment of the present invention, the descriptor_tag field may be an 8-bit field.

The descriptor_length field represents the length of targeting segment information after the descriptor_tag field. The descriptor_length field may be an 8-bit field.

The time_span_start field represents a start time of a corresponding segment. In more detail, the time_span_start field may represent a UTC time that elapsed from 00:00 Jan. 6, 1980. According to a specific embodiment of the present invention, the time_span_start field may be a 32-bit field.

The time_span_length field represents the length of a corresponding segment. In more detail, a corresponding segment may represent the length of a time that a corresponding program is broadcasted in minutes on the basis of a value of the time_span_start field. When a value of the time_span_length field is set once, it does not change in the future. According to a specific embodiment of the present invention, the time_span_length field may be a 16-bit field.

The num_segments field represents the number of segments that targeting segment set information signals. According to a specific embodiment of the present invention, the num_segments field may be an 8-bit field.

The num_targeting_criteria field represents the number of targeting segment set information. According to an embodiment of the present invention, a targeting criterion that a broadcast service or a media component has may be in plurality. According to a specific embodiment of the present invention, the num_targeting_criteria field may be an 8-bit field.

The criterion_id_length field represents the length of the criterion_id field. According to a specific embodiment of the present invention, the criterion_id_length field may be an 8-bit field.

The criterion_id field represents a targeting criterion identifier for identifying a targeting criterion. According to a specific embodiment of the present invention, the criterion_id field may be an 8-bit field.

The criterion_type_code field represents the form of a targeting criterion. According to a specific embodiment of the present invention, the criterion_type_code may be a 3-bit field.

The num_criterion_values field represents the number of targeting criterion values. According to an embodiment of the present invention, a segment may have a plurality of targeting criterion values corresponding to a targeting criterion form. According to a specific embodiment of the present invention, the num_criterion_values field may be a 5-bit field.

The criterion_value_length field represents the length of the criterion_value field. According to a specific embodiment of the present invention, the criterion_value_length field may be an 8-bit field.

The criterion_value field represents a targeting criterion value.

In consideration of a broadcast receiving situation or the capability of the broadcast reception device 100, if a specific segment cannot be received, the broadcast reception device 100 may receive or play another segment on the basis of targeting segment set information. For example, if the broadcast reception device 100 does not support the playback of a 3D image, it may receive or play a segment including a 2D image on the basis of a targeting segment set instead of a segment. According to another specific embodiment of the present invention, the broadcast reception device 100 may selectively receive or play only content suitable for a user on the basis of targeting segment set information. For example, if a viewer is youth, the broadcast reception device 100 may receive or play a trailer of a youth movie instead of a trailer of an adult movie.

The case in which segment information, a segment information block, segment targeting set information are in a bit stream format is described above with reference to FIGS. 167 to 169. However, the formats of segment information, a segment information block, and segment targeting set information are not limited to the bit stream format. Especially, segment information, a segment information block, and segment targeting set information may be in an XML file format. Additionally, according to a specific embodiment of the present invention, the above-described program information may include segment information, a segment information block, and segment targeting set information.

Operations of a broadcast transmission device and the broadcast reception device 100 transmitting/receiving the properties of a program and a segment will be described with reference to FIGS. 170 and 171.

FIG. 170 is a view when a broadcast transmission device transmits broadcast signal including at least one of program information and segment information according to an embodiment of the present invention.

The broadcast transmission device obtains the property of a program that a broadcast service includes through a control unit in operation S101. As described above, the property of a program may include at least one of a unique identifier, a list of media components in a program, a start time and a length of a program, a text for describing a title and a program, a graphic icon, a contents advisory rating, a targeting/personalization property, and a contents protection property.

The broadcast transmission device generates program information signaling a program on the basis of the property of a program through a control unit in operation S803. The program information may include at least one of the program information and the program information block described through FIGS. 170 and 171.

The broadcast transmission device obtains the property of a segment that a program includes through a control unit in operation S805. As described above, the property of a segment may include at least one as one property among a unique identifier for identifying a segment, a list of media components played during a time interval of a corresponding segment, a start time and the duration of a segment, a segment type, and a targeting/personalization property, and a contents advisory rating.

The broadcast transmission device generates segment information on the basis of the property of a program through a control unit in operation S807. The segment information may include at least one of the above-mentioned segment information, segment information block, and segment targeting set information of FIGS. 167 to 171.

The broadcast transmission device transmits a broadcast signal including at least one of segment information and program information through a transmitting unit in operation S809.

FIG. 171 is a view when a broadcast reception device receives broadcast signal including at least one of program information and segment information according to an embodiment of the present invention.

The broadcast reception device 100 receives a broadcast signal through the broadcast receiving unit 110 in operation S901.

The broadcast reception device 100 obtains program information on the basis of a broadcast signal through the control unit 150 in operation S903. In more detail, the broadcast reception device 100 may obtain broadcast information from the broadcast signal. At this point, the program information may include at least one of the program information and the program information block described through FIGS. 173 and 174.

The broadcast reception device 100 obtains the property of a program on the basis of the program information through the control unit 150 in operation S905. As described above, the property of a program may include at least one of a unique identifier, a list of media components in a program, a start time and a length of a program, a text for describing a title and a program, a graphic icon, a contents advisory rating, a targeting/personalization property, and a contents protection property.

The broadcast reception device 100 obtains segment information on the basis of a broadcast signal through the control unit 150 in operation S907. In more detail, the broadcast reception device 100 may obtain segment information from the broadcast signal. The segment information may include at least one of the above-mentioned segment information, segment information block, and segment targeting set information of FIGS. 167 to 169.

The broadcast reception device 100 obtains the property of a segment on the basis of the segment information through the control unit 150 in operation S909. The segment information may include at least one of the above-mentioned segment information, segment information block, and segment targeting set information of FIGS. 167 to 169.

The broadcast reception device 100 generates a service guide for displaying the property of a program on the basis of at least one of the program property and the segment property in operation S911. According to an embodiment of the present invention, a service guide may also display the property of a segment that a program includes. In more detail, a service guide may display the property of a show segment in a program together. For example, a service guide may display the start time and length of a show segment in a program and another program information including the same show segment in addition to a program property.

As described above, a broadcast service according to an embodiment of the present invention divides the property of a media component and again divides a program representing a time span of the broadcast service into segments, so as to effectively signal the format of the broadcast service that become more complex and various. This will be described in more detail with reference to FIGS. 172 to 195.

A broadcast service according to an embodiment of the present invention may be described as an object model including a kind of class, an inheritance relationship between classes, a containment relationship between classes, and an another association between classes.

FIG. 172 is a view illustrating a continuous component class, an audio component class, a video component class, and a closed caption component class.

A continuous component class represents a continuous component. A continuous component class may include a component identifier componentID for identifying a component as a property.

An audio component class represents a continuous component whose content type is audio. The audio component class may have a "Sub-class relationship with Continuous Component class".

A video component class represents a continuous component whose content type is video. The video component class may have a Sub-class relationship with Continuous Component class.

A closed caption component class represents a continuous component whose content type is a closed caption. The closed caption component class may have a Sub-class relationship with Continuous Component class.

FIG. 173 is a view illustrating an elementary audio component class, an elementary video component class, and an elementary closed caption component class.

An elementary audio component class represents an elementary component whose content type is audio. The elementary audio component class may include at least one of codec, the number of audio channels, encoding bitrate, other encoding parameters, and the language and mode of an audio component, as attribute. In more detail, another encoding parameter may be determined according to codec. Additionally, the mode may represent the mode of a corresponding audio and also may represent at least one of "complete main", "music", "dialog", "effects", "visual impaired", and "hearing impaired", and "commentary". The audio component class may have a "Sub-class relationship with Audio Component class".

An elementary video component class represents an elementary component whose content type is video. The elementary video component class may include at least one of "codec", "resolution", "aspect ratio", "scanning method", "frame rate", "still picture mode", and "another encoding parameter", as attribute. The resolution may be represented by width x height pixel units. Additionally, the scanning method may be one of an interlaced method and a progressive method. Additionally, other encoding parameters may be determined according to codec. The elementary video component class may have a "Sub-class relationship with Video Component class".

An elementary closed caption class represents an elementary component whose content type is a closed caption. The elementary closed caption class may include at least one of "codec", "language", and "type". At this point, codec may represent the format of closed caption text. The language represents a language configuring a closed caption. The type may be a general closed caption and an easy-reader closed caption for low vision person. An elementary closed caption component class may have a "Sub-class relationship with Closed Caption Component class".

A complex component class represents a complex component. As described above, the complex component may be a composite component or a PickOne component. Accordingly, a class for the composite component and the PickOne component will be described with reference to FIG. 174 and FIG. 175.

FIG. 174 is a view illustrating a composite audio component class and a composite video component class.

A composite audio component class represents a composite component whose content type is audio. The composite audio component class may include one of "ContainsAudio" and "Sub-class relationship with Audio Component class" as relationship. At this point "ContainsAudio" represents an audio component class included in a composite audio class. At this point, all objects included in "ContainsAudio" are limited as representing one sound scene.

A composite video component class represents a composite component whose content type is video. The composite video component class may include one of "ContainsVideo" and "Sub-class relationship with Video Component class" as relationship. At this point, the ContainsVideo represents a sub-class relationship with a video component class of a composite video component class. At this point, all objects in the ContainsVideo are limited as representing one video scene. Additionally, the property of the ContainsVideo may include "role". At this point, the role may represent an enhanced layer of variable video. Additionally, the role may represent the left view or right view of a 3D image. Additionally, the role may represent the depth information of a 3D image. Additionally, the role may represent part of a video array divided into a plurality of screens. At this point, the role may represent the xth in the yth line from the left if there is an n×m matrix. Additionally, the role may represent Follow-subject metadata.

FIG. 175 is a view illustrating a PickOne component class.

A PickOne component class represents a PickOne component. The PickOne component class may include one of "contains" and "Sub-class relationship with Continuous Component Class" as relationship. At this point, "contains" represents a relationship with a continuous component class of a PickOne component class. At this point, all components in "contains" are the same content type and is limited as representing all the same image scene or audio scene.

FIG. 176 is a view illustrating a presentable component class, a presentable video component class, a presentable audio component class, and a presentable closed caption component class.

A presentable component class represents a presentable component. A presentable component class may include as a property at least one of a targeting/personalization property, a content advisory rating, a content/service protection property, and a target device. At this point, the target device may be at least one of a primary screen, a companion screen, and a screen partially inserted into the primary screen.

A presentable video component class represents a presentable video component. The presentable video component class may include at least one of "AssociatedAudio", "Associated CC" and "Sub-class relationship with Video Component Class" as relationship. "AssociatedAudio" may represent a presentable audio component that is appropriate to be played with a presentable video component.

The presentable audio component class represents a presentable audio component. The presentable audio component class may have a Sub-class relationship with Audio Component class as relationship.

The presentable closed caption component class indicates a presentable closed caption component. The presentable closed caption component class may have a Sub-class relationship with closed caption component class as relationship.

FIG. 177 is a view illustrating an OnDemand component class.

An OnDemand component represents a content component transmitted by a user request. The OnDemand component may include as an attribute at least one of OnDemandComponentId representing the unique identifier of an OnDemand component, ComponentLocation representing a location where an OnDemand component can be accessed, ComponentName representing the name of a component, possibly in multiple languages, PlaybackLength representing the total playback time of a component, AvailabilityStart representing a start time at which a component becomes available, AvailabilityDuration representing the length of a time that a component remains available, Targeting/personalization properties representing a device that a component targets or user's characteristics, Content/Service protection properties representing whether content or service is protected, and Content advisory rating representing a content advisory ration.

FIG. 178 is a view illustrating an NRT content item class and an NRT file class.

An NRT content item component class represents a content item of NRT data service. The NRT content item component class may include as a property at least one of the name of a content item for identifying a content item (ContentItemID), the name of a content item (ContentItemName), a display for representing whether the update of a content item is to be monitored, (Updateable), a download available window representing a download available time (Avaiblewindow), an expiration time representing a time at which a content item is discarded, a content item size (ContentItemSize), the playback length of a content item (PlaybackLength), a targeting/personalization property (TargetInfo), the protection property of a content item (ProtectionInfo), and the contents advisory rating of a content item (ContentAdvRating). Additionally, the NRT content item class may include an NRT file class as relationship.

The NRT file class represents a non-real time file. In more detail, the NRT file may represent a file used for NRT service. The NRT file class may include as an attribute at least one of ContentLocation representing the location of content and ContentType representing the type of content. At this point, ContentLocation and ContentType may be defined in IETF RFC 2616.

Classes for service will be described with reference to FIGS. 208 and 209.

A service class represents a service. The service class may include as a property at least one of a service identifier (ServiceId), a service name (ServiceName), a channel number (ChanNum), description of a service (Description), a graphic icon representing a service (Icon), a list of media components in a service, a property for broadcast service protection (Content/service protection properties for the service), a property for targeting/personalization (targeting properties for the service), a viewing advisory rating (contentAdvRating), service language (Language), and a property on broadcast service user report (UsageReportInfo). At this point, the channel number may be divided into a major number (MajorChanNum) and a minor number (MinorChanNum).

A radio service class represents a radio service scheduled to be broadcasted at a predetermined time. The radio service class may include at least one of "Containment Relationship with Presentable Video Component Class", "Containment Relationship with Presentable CC Component Class", and "Adjunct relationship with NRT Data Service Class" as relationship.

A TV service class represents a TV service scheduled to be broadcasted at a predetermined time. The TV service class may include at least one of "Containment Relationship with Presentable Video Component Class", "Containment Relationship with Presentable Audio Component Class", "Containment Relationship with Presentable CC Component Class", and "Adjunct relationship with NRT Data Service Class" as relationship. "Containment Relationship with Presentable Video Component Class" includes the role of a video component as a property. In more detail, the role of a video component may represent at least one of a primary video, an alternative camera view, another alternative video component, a sign language screen, and Follow Subject Video/metadata. Especially, the Follow Subject Video/metadata may include the name of a subject that follows. Such Follow Subject Video/metadata may be video stream. Or, a follow subject video may be rectangles of each frame for zoom-in of a subject of a video stream.

An OnDemand service class represents an OnDemand content service. The OnDemand service class may include "Containment relationship with OnDemand UI App Class", "Containment relationship with OnDemand Offering Class", and "containment relationship with OnDemand Catalog class" as relationship. "Containment relationship with OnDemand UI App Class" is to provide a user interface for OnDemand service. In a specific embodiment, the user interface of a user request service may be provided in a plurality of languages. An OnDemand offering may represent products of services provided by OnDemand. "Containment relationship with OnDemand Offering Class" is for a content item provided from an OnDemand service. "containment relationship with OnDemand Catalog class" is for an OnDemand offering catalog of an OnDemand service. In a specific embodiment, the OnDemand offering catalog may be provided in a plurality of languages.

An NRT data service class represents an NRT data service. The NRT data service class may include at least one of "Consumption Mode", "Essential capabilities", "Non-essential capabilities", "Target Device", and "containment relationship with data item component class" as a property. "Essential capabilities" represents a capability necessary to allow the broadcast reception device 100 to receive a service. "Non-essential capabilities" represents a capability necessary to allow the broadcast reception device 100 to receive a service's selection item. "Target Device" may represent at least one of a primary device or a companion device.

According to another specific embodiment, a service class may be classified into linear service and App-based service. This will be described with reference to FIGS. 208 to 211.

FIG. 179 is a view illustrating an OnDemand component class according to another embodiment of the present invention.

The OnDemand component class may include "Essential capabilities" and "Non-essential capabilities" as attributes. "Essential capabilities" represent a capability necessary for the broadcast reception device 100 to present an OnDemand component. "Non-essential capabilities" represent a capability necessary for the broadcast reception device 100 to present a selection item of an OnDemand component. The broadcast reception device 100 may determine whether to present an OnDemand component on the basis of "Essential capabilities". For example, when not supporting a device capability included in "Essential capabilities", the broadcast reception device 100 may not present an OnDemand component. Additionally, in a specific embodiment, when not supporting at least one of "Essential capabilities" and "Non-essential capabilities", the broadcast reception device 100 may display that it does not support at least one of "Essential capabilities" and "Non-essential capabilities".

FIG. 180 is a view illustrating an NRT content item class and an NRT file class according to another embodiment of the present invention.

The NRT content item class may include "Essential capabilities" and "Non-essential capabilities" as attributes. "Essential capabilities" represent a capability necessary for the broadcast reception device 100 to present an NRT content item. "Non-essential capabilities" represent a capability necessary for the broadcast reception device 100 to present a selection item of an NRT content item. The broadcast reception device 100 may determine whether to present an NRT content item on the basis of "Essential capabilities". For example, when not supporting a device capability included in "Essential capabilities", the broadcast reception device 100 may not present an NRT content item. Additionally, in a specific embodiment, when not supporting at least one of "Essential capabilities" and "Non-essential capabilities" of an NRT content item, the broadcast reception device 100 may display that it does not support at least one of "Essential capabilities" and "Non-essential capabilities" of an NRT content item.

The NRT file class may include "Essential capabilities" and "Non-essential capabilities" as attributes. "Essential capabilities" represent a capability necessary for the broadcast reception device 100 to present an NRT file. "Non-essential capabilities" represent a capability necessary for the broadcast reception device 100 to present a selection item of an NRT file. The broadcast reception device 100 may determine whether to present an NRT file on the basis of at least one of "Essential capabilities" and "Non-essential capabilities". For example, when not supporting a device capability included in "Essential capabilities", the broadcast reception device 100 may not present an NRT file. Additionally, in a specific embodiment, when not supporting at least one of "Essential capabilities" and "Non-essential capabilities" of an NRT file, the broadcast reception device 100 may display that it does not support at least one of "Essential capabilities" and "Non-essential capabilities" of an NRT file.

FIG. 181 is a view illustrating a linear service class.

Linear service represents a service in which primary content includes a continuous component. At this point, continuous components may be consumed according to a time base and schedule that a broadcaster defines. However, even when continuous components are consumed according to a time base and schedule that a broadcaster defines, a user may use various kinds of time shift methods on the continuous components. The TV service class may include as relationship at least one of Contains Relationship with Presentable Video Component Class, Contains Relationship with Presentable Audio Component Class, Contains Relationship with Presentable CC Component Class, Contains relationship with App-Based Enhancement class, and Sub-class relationship with Service class. Especially, the Contains Relationship with Presentable Video Component Class may include a role of video component representing the role of a video component as an attribute. At this point, the role of video component may represent one of a Primary video, an alternative camera view, an alternative video component, a sign language screen, and a follow subject video. At this point, the primary video may be expressed as a default video. Additionally, the follow subject video may include the name of a following subject. The follow subject video may be supported by a separated video component.

FIG. 182 is a view illustrating an App class and an App-based enhancement service.

The App class represents one type of a content item supporting interactivity. Sub-class relationship with NRT Content Item Class is included as relationship.

An App-based enhancement service class represents an App-based enhancement service. The App-based enhancement service may include as an attribute at least one of Essential capabilities representing a device capacity needed for performing enhancement service, Non-essential capabilities useful for performing enhancement service but no absolutely necessary, and a target device representing a device that enhancement service targets. The target device may represent at least one of a primary device and a companion device. At least one of Contains relationship with App Class, Contains relationship with NRT Content Item class, Contains relationship with Notification Stream class, and Contains relationship with OnDemand Component class may be included as relationship The Contains relationship with NRT Content Item class relates to an NRT content item used by App-based enhancement service. The Contains relationship with Notification Stream class relates to a notification stream delivering notifications to synchronize an action of application according to a linear time base. The Contains relationship with OnDemand Component class relates to an OnDemand component managed by application. A time base class that is the synchronization reference of components in service and a notification stream class will be described with reference to FIG. 183.

FIG. 183 is a view illustrating a time base class and a notification stream class.

The time base class is metadata used for generating a timeline to synchronize components of a linear service. At this point, the time line may represent a continuous reference time that is the synchronization reference. The time base class may include at least one of a time base identifier for identifying a time base and a clock rate representing the clock rate of a time base as an attribute.

The notification stream class represents a notification stream for transmitting a notification for an action to be performed. The notification stream class may include a notification stream identifier representing the identifier of a notification stream as an attribute.

FIG. 184 is a view illustrating an App-based service class.

The App-based service class represents an App-based service. At least one of Contains relationship with Time Base Class, Contains relationship with App-Based Enhancement class, and Sub-class relationship with Service class may be included as relationship.

Components of an NRT content item may have a similar structure to a program. However, the NRT content item is transmitted in a file format instead of a stream format. Additionally, the program may have an adjunct data service. In more detail, the adjunct data service may be an interactive service relating to the program. A program class representing a program, a show class representing a show that is a primary content included in a program, and a segment class representing a segment that is a temporal segment of a program will be described in more detail with reference to FIGS. 185 to 187.

FIG. 185 is a view illustrating a program class.

A program class represents a program. The program class may include at least one of a program identifier (ProgamIdentifier), the start time of a program (StartTime), the duration of a program (ProgramDuration), the title of a program (TextualTitle), a text describing a program (TextualTitle), the genre of a program (Genre), a graphic icon representing a program (GraphicalIcon), a content advisory rating (ContentAdvisoryRating), a targeting/personalization property (Targeting/personalization properties), and a content/service protection property representing the content/service protection of a program (Content/Service protection properties) as a property. The start time of a program may include a date and a time at which a program starts. The duration of a program is a duration from the start time to the end time of a program. The title of a program may be displayed in a plurality of languages. Additionally, when there is no title of a program, the image display device 100 may display the title of a related show as the title of a program. Additionally, when there is no genre of a program, the image display device 100 may display the genre of a related show as the genre of a program. Additionally, a graphic icon may be displayed in a plurality of sizes. When there is no graphic icon of a program, the image display device 100 may display the graphic icon of a related show as the graphic icon of a program. A viewing advisory rating may vary by region and may have different values by region. Additionally, if there is no viewing advisory rating, the broadcast reception device 100 may display the viewing advisory rating of a show relating to a program as a viewing advisory rating. If there is no targeting/personalizing property, the broadcast reception device 100 may display the targeting/personalizing property of a related show. If there is no content/service protection property, the broadcast reception device 100 may display the content/service protection property of a related show.

The program class may include, as relationship, at least one of ProgramOf relationship with Linear Service Class, ContentItemOf relationship with App-Based Service Class, Contains relationship with Presentable Video Component class, Contains with Presentable Video Component class, Contains relationship with Presentable Audio Component class, Contains relationship with Presentable CC Component class, Contains relationship with App-Based Enhancement class, Contains relationship with Time Base Class, Based-on relationship with Show class, and Contains relationship with Segment Class. At this point, the Contains relationship with Presentable Video Component class may include a role of video component representing the role of a video component as an attribute. At this point, the role of video component may represent one of a Primary video, an alternative camera view, an alternative video component, a sign language screen, and a follow subject video. At this point, the primary video may be expressed as a default video. Additionally, the follow subject video may include the name of a following subject. The follow subject video may be supported by a separated video component. Additionally, the Contains relationship with Segment Class may include RelativeSegmentStartTime representing the relative start time of a segment using the start of a program as a reference.

A radio program class represents a radio program. The radio service class may include at least one of "Containment relationship with Presentable Audio Component class", "Containment relationship with Presentable CC Component class", "Adjunct relationship with NRT Data Service class", and "Containment relationship with Radio Segment Class)" as relationship. Additionally, the radio program class may include the start time of a radio segment as a property. At this point, the start time of a radio segment may be a relative time from the start time of a program.

The TV program class may represent a TV program. The presentable video component class may have "Containment relationship with Presentable Video Component Class" as relationship. "Containment relationship with Presentable Video Component Class" may include at least one of the role of a video component, a containment relationship with presentable audio component class, a containment relationship with presentable closed caption component class, an adjunct relationship with NRT data service class, the base with TV show class, and a containment relationship with TV segment class as a property. The role of a video component may represent at least one of a primary video, an alternative camera view, another alternative video component, a sign language inset, and a Follow Subject Video including the name of a followed subject. The follow subject video may be supported by a separated video component. A containment relationship with TV segment class may include a segment start time (RelativeSegmentStartTime). At this point, the segment start time may be a relative time from the start of a program.

FIG. 186 is a view illustrating a show class.

A show class represents a show. At this point, the show may represent a primary content of a program as described above. Especially, the show may represent a primary content from a view's perspective view. The show class may include at least one of "ShowIdentifier", "ShowDuration", "TextualDescription", "Genre", "GraphicalIcon", "ContentAdvisoryRating", "Targeting/personalization properties", and "Content/Service protection properties" as attribute. The show class may have an "includes" relationship with show segments"

The TV show class may represent a primary content of a TV program. The TV show class may have "Containment relationship with Presentable TV Show Segment class" as relationship.

FIG. 187 is a view illustrating a segment class, a show segment class, and an interstitial segment class.

A segment class represents a segment. The segment class may include at least one of "SegmentId", "Duration", "Targeting/personalization properties", and "Content advisory rating".

The show segment class represents a segment of a show. The show segment class may have ShowSegmentRelativeStartTime representing a relative start time using the start time of a show as a reference, as an attribute. The show segment class may have a "Sub-class" relationship with segment class.

The interstitial segment class represents a segment that is not a show segment among segments of a program. The interstitial segment class may have a "Sub-class" relationship with segment class.

A radio segment class represents a segment of a radio program.

A TV segment class represents a segment of a TV program.

A radio show segment class represents a segment of a radio show. A radio show segment class may include "ShowSegmentRelativeStartTime" as a property. In more detail, the start time of a show segment may be a relative time on the basis of a radio program.

A TV show segment class represents a show segment including a content that is a TV program. A TV show segment class may include "S ShowSegmentRelativeStartTime" as a property. In more detail, the start time of a show segment may be a relative time on the basis of a TV program.

A Radio Interstitial Segment represents a segment instead of a show segment of a radio program.

A TV Interstitial Segment represents a segment instead of a show segment of a TV program.

An OnDemand UI App class represents an application providing a user interface for OnDemand service.

An OnDemand Offering class represents offering of OnDemand service.

An OnDemand Catalog class represents description on offerings of OnDemand service. At this point, offering may represent a service product provided by OnDemand. An OnDemand request catalog class may include "relationship with OnDemand offering class".

FIG. 188 is a view illustrating an inheritance relationship with sub-attribute according to the type of broadcast service according to an embodiment of the present invention.

FIG. 188 is a view illustrating an adjunct service relationship between the above-mentioned different types of services, different types of components included in each service, and each service. The radio service may include one or more presentable audio components. Additionally, the radio component may include one or more closed caption components. Additionally, the radio component may include one or more enhanced NRT data services. The TV service may include one or more presentable video components. Additionally, the TV service may include one or more presentable audio components. Additionally, the TV service may include one or more presentable closed caption components. Additionally, the TV service may include one or more enhanced NRT data services. The NRT data service may include one or more presentable data item components. Additionally, the NRT data service may be stand-alone data service. Additionally, the NRT data service may be an adjunct NRT data service of radio service or TV service. Additionally, the NRT data service may be an adjunct NRT data service of radio service or TV service. The OnDemand service may include one or more OnDemand offerings. Additionally, the OnDemand service may include one or more catalogs describing offering. Additionally, the OnDemand service may be a UI application service providing a user interface of a service. At this point, the user interface may be customized by a service provider. Additionally, the user interface may be customized by a user.

FIG. 189 is a view illustrating an inheritance relationship between a continuous component and components having a sub-property of the continuous component according to an embodiment of the present invention.

As shown in the embodiment of FIG. 189, a continuous component may be an elementary component or a complex component. The elementary component may be an elementary video component, an elementary audio component, or an elementary closed caption component. Additionally, the complex component may be a PickOne component or a composite component. The purpose of defining "relationship" between components is that distinguishing a component audio from a composite video is very important. This is because in the case of a composite video component, it needs to be displayed differently according to the role of a member component of the composite component. Accordingly, a complex component may include a plurality of "relationships" representing the property of a role of a composite audio component or a composite video component.

FIG. 190 is a view illustrating an inheritance relationship between a presentable component and components having a sub-property of the presentable component according to an embodiment of the present invention.

The presentable component, as described above, may be one of a presentable video component, a presentable audio component, and a presentable closed caption component. The presentable video component of TV service may have one or more related presentable audio components. Additionally, the presentable video component of TV service may have one or more related presentable closed caption components. At this point, the related presentable audio component and presentable closed caption component may be played together with the presentable video component. Since a TV service is a service including a video component, the presentable audio component and the presentable closed caption component of the TV service needs to be related to the presentable video component.

FIG. 191 is a view illustrating a relationship between a service, programs in the service, and segments in the programs according to an embodiment of the present invention.

A radio service may include one or more radio programs. A radio program may be included in one or more radio services. A radio program may be offering of an NRT data service contents item or an OnDemand service. A radio program may include one or more radio segments. At this point, a radio segment may be a radio interstitial segment. A radio segment may be included in one or more radio programs. Each radio segment may be a radio show segment or a radio interstitial segment. A radio program may include one "radio show". At this point, "radio show" is not regarded as interstitial content by a service provider. A radio show may include one or more radio show segments. Such a relationship of a radio service, a radio program, a radio segment, and a radio show may be similarly applied to a relationship of a TV service, TV program, a TV segment, and a TV show.

FIG. 192 is a view illustrating an inheritance relationship with sub-attribute according to the type of broadcast service according to another embodiment of the present invention.

The service may include at least one of a linear service and an App-based service. The linear service may deliver TV service. Additionally, the linear service may deliver service to a device incapable of video decoding or having no display. In more detail, the linear service may deliver a service including only audio. The linear service may include one time base providing a reference time that is a synchronization reference. Or, the linear service may include one or more presentable video components. Or, the linear service may include one or more presentable video components. Or, the linear service may include one or more presentable audio components. Or, the linear service may include one or more App-based enhancement services. At this point, a presentable video component, as described above, may have a role representing the role of a presentable video component as a property.

The App-based enhancement service may include one or more Apps. Additionally, the app-based enhancement service may include one or more content items. Additionally, the App-based enhancement service may include one or more OnDemand components. Additionally, the app-based enhancement service may include one or more notification streams. At this point, an app may have a primary property representing a primary application necessary for App-based enhancement service. At this point, in the case that an app is a primary application, when a service including an app is selected, it may be activated immediately. According to another specific embodiment, an app may be activated by a notification included in a notification stream. According to another specific embodiment, an app may be activated by a previously activated another app. Additionally, an app that an app-based enhancement service includes may execute a content item of an app-based enhancement service.

The app-based service may include one or more app-based enhancement services. The app-based enhancement service that an app based service includes may include one primary app. Additionally, the app-based service may selectively include a time base for providing a synchronization reference time. Additionally, an app may be in a format of a content item or a data item. At this point, the content item may be referred to as a set of files constituting one app.

FIG. 193 is a view illustrating an inheritance relationship between a continuous component and components having a sub-attribute of the continuous component according to an embodiment of the present invention.

All continuous components may have a layer structure divided into a plurality of levels. In a specific embodiment, continuous components may have a layer structure divided into three levels. The continuous component may be one of a PickOne component, a composite component, and an elementary component. The PickOne component may include one or more composite components. The PickOne component may include one or more PickOne components. The PickOne component may include one or more elementary components. At least two components are included on the definition of a PickOne component. Additionally, the PickOne component may correspond to the top level in a layer structure.

The composite component may include one or more components. Additionally, the composite component may include one or more elementary components. At least two components are included on the definition of a composite component. The composite component may be included in the PickOne component of the top level.

A PickOne component not in the top level may include more than two elementary components. At this point, the elementary component may be one of an elementary video component, an elementary audio component, and an elementary closed caption component. A PickOne component not in the top level may be included in one or more PickOne components. A PickOne component not in the top level may be included in one or more composite components.

FIG. 194 is a view illustrating an inheritance relationship of an NRT content item class and an NRT file.

The NRT content item may include one or more NRT files. Additionally, one NRT file may be include in one or more NRT content items. The NRT content item may be a presentable NRT file based component. For example, the NRT content item may be a set of NRT files not combined with other files and consumed. Additionally, the NRT content item may be an elementary NRT file based component. For example, the NRT content item may be an atomic unit. In more detail, the NRT content item may be the smallest file unit. The NRT content item may include at least one of a continuous component and a non-continuous component. Especially, the NRT content item may include a combination of a continuous component and a non-continuous component.

FIG. 195 is a view illustrating a relationship between a service, programs in the service, and segments in the programs according to another embodiment of the present invention.

A linear service may include one or more programs. At this point, the program, as described above, is in a temporal segment format of a linear content. The program may be included in one or more linear services.

The linear service may include one or more App-based enhancement services. The app-based service may include one or more app-based enhancement services. The App-based enhancement service may include one or more programs. At this point, the program is in the format of an NRT content item. Or, the program may be in a format of an OnDemand component.

The program may include one or more segments. A segment may be included in one or more programs. Each segment may be a show segment or an interstitial segment. The program may share many properties with a linear service. The reason is that the program is a time slice of a linear service, an NRT content having the same structure as a temporal segment of a linear service, or an OnDemand request component having the same structure as a temporal segment of a linear service.

The program is based on one show by definition. The reason is that the show is a portion that a service providers does not consider as an interstitial material.

The show may include one or more show segments.

FIG. 196 is a view illustrating a level hierarchy of a presentable audio component.

A continuous component may be divided by three level hierarchies. The top level is a PickOne component. A middle level may include a composite component. A bottom level may include a PickOne component. All continuous components may include such three levels. However, a continuous component may be a simple elementary component not including a bottom level. In a specific embodiment, as shown in FIG. 196, a presentable audio component may be a PickOne component. At this point, the PickOne component may include a component having music, dialog, and sound effect, which are mixed with complete main music of a complete main audio component. At this point, a complete main audio component may be a PickOne component including a plurality of replaceable elementary components encoded with different bitrates. A component having music, dialog, and sound effect, which are mixed with complete main music, may be a composite component in which each of music, dialog, and sound effect is one component. At this point, a component including dialog and a component including sound effect may be an elementary component. A music component may be a PickOne component including a plurality of replaceable elementary components encoded with different bitrates.

A broadcast via a typical broadcast network is a linear service in which one broadcast is broadcasted continuously. As a broadcast via a typical broadcast network becomes a hybrid broadcast, a broadcast service may be divided into a typical linear service and an app-based service.

As described above, the linear service is a service in which a continuous component is presented according to a predetermined schedule. At this point, the linear service may be based on a time determined by a broadcast station. Additionally, the linear service may include an app triggered to be synchronized with a broadcast service.

In more detail, the linear service may include one or more video components.

Additionally, the linear service may include one or more audio components. Additionally, the linear service may include one or more closed caption components.

Furthermore, the linear service may include a time base component that is the basis for the synchronization with at least one of a component and an adjunct service.

Additionally, the linear service may include one or more triggered app based enhancements as a component. Each adjunct service may include one or more applications. At this point, an application may be synchronized with activation notification and may then be activated. An app based adjunct service component may include a series of activation notifications. Additionally, the app based adjunct service component may include one or more content items. Additionally, the App-based enhancement service component may include one or more OnDemand components. At described above, in the case that an app is a primary application, when a service including an app is selected, it may be activated immediately. According to another specific embodiment, an app may be activated by a notification included in a notification stream. According to another specific embodiment, an app may be activated by a previously activated another app. Additionally, an app that an app-based enhancement service includes may execute a content item of an app-based enhancement service.

Additionally, the linear service may include one or more auto-launch app-based enhancements as a component. Each adjunct service may include an application auto-launched when service is selected. The auto-launch app-based enhancements include an auto-launched application as a component. Additionally, one or more content items may be included as a component. Additionally, the app-based enhancement service may include one or more notification streams as a component. Additionally, the auto launch app-based enhancement service may include one more content items as a component.

The linear service may include may include both auto-launch app-based enhancements and triggered app based enhancements as a component. In a specific embodiment, auto-launch app-based enhancements are inserted as a target advertisement and triggered app based enhancements provide interactive viewing experience to a user.

An app based service is that a specified application is launched when service is selected. The app-based service may include one app-based enhancement services. At this point, an app based service including an app-based enhancement service may include one specified primary app. The app may be in a format of a content item or a data item. At this point, the content item may be referred to as a set of files constituting one app. At this point, a service may include an auto-launched application as a property. Additionally, the app based service may include one or more content items as a property.

Components of a service may be shared between a plurality of different components. Additionally, an application of an app based service may initiate the playback of OnDemand content.

In relation to the linear service, a program and a segment are described again. The program is a temporal section of the linear service. At this point, the program has a scheduled start time and duration. Additionally, the program may be defined by a broadcast station so as to be consumed by one program unit.

Additionally, the program may refer to an OnDemand content having the same structure as a content item or a program of a linear service. At this point, the OnDemand content does not have a scheduled start time unlike a program of a linear service. Additionally, the OnDemand does not include a time base defined by a broadcast station.

Each program relates to "show". At this point, the show includes the primary content of a program. As described above, ma properties of a program are properties of a show. For example, properties such as a text describing a program, actors, and a release data in the program are properties of a show. Program properties other than show properties are properties of a program itself. The properties of a program itself may vary even when the program including the same show. For example, a start time in a program and a service including a program may vary for each program.

A program includes one or more temporal sections including a show. Additionally, a program may include one or more temporal sections including an interstitial content. Such a temporal section is called a segment. In more detail, a temporal section may be divided into a show segment and an interstitial segment.

A segment may have a predetermined start time and length as part of a program. Such a segment is called an anchored segment. Additionally, there is a non-anchored segment that is dynamically inserted into a program. In more detail, a non-anchored segment is a segment in which a specific program to be inserted or a specific time to be inserted is not defined. For example, a targeting advertisement in which a program and time to be inserted are not defined and received by the broadcast reception device 100 may be a non-anchored segment.

The broadcast reception device 100 may display an application relating to a program by the control unit 150 through a service guide. Additionally, the broadcast reception device 100 may add an application relating to a program to a favorite list or download it on the basis of a user input. In more detail, when an auto-launch app based service is provided with a packaged app, the broadcast reception device 100 may display it through a service guide displaying a broadcast program. This will be described with reference to FIG. 197.

FIG. 197 is a flowchart illustrating operations when a broadcast reception device displays an auto-launch app based service through a broadcast service guide and stores it as a favorite or downloads it.

The broadcast reception device 100 receives a broadcast signal through the broadcast receiving unit 110 in operation S951.

The broadcast reception device 100 obtains auto-launch app based service information through the control unit 150 on the basis of the broadcast signal in operation S953. In a specific embodiment, the broadcast reception device 100 may obtain the auto-launch app based service information from the broadcast signal. For example, the broadcast reception device 100 may obtain the auto-launch app based service information from the above-described service information or program information.

The broadcast reception device 100 displays a service guide through the control unit 150 on the basis of the auto-launch app based service information in operation S955. In a specific embodiment, the broadcast reception device 100 may display the auto-launch app based service information in addition to the program information. Especially, the broadcast reception device 100 may display both the auto-launch app based service information and the program information relating to auto-launch app based service.

The broadcast reception device 100 receives a user input for auto-launch app based service through the control unit 150 in operation S957. In more detail, the broadcast reception device 100 may receive a user input for selecting auto-launch app based service. In more detail, the broadcast reception device 100 may receive a user input for storing an auto-launch application as a favorite. In another specific embodiment, the broadcast reception device 100 may receive a user input for downloading an auto-launch application.

The broadcast reception device 100 stores an auto-launch application as a favorite or downloads it through the control unit 150 on the basis of a user input in operation S959. In more detail, the broadcast reception device 100 may store an auto-launch application of a selected auto-launch app based service as a favorite or may download it.

The broadcast reception device 100 displays an auto-launch application stored as a favorite or a downloaded auto-launch application through the control unit 150 in operation S961. In more detail, the broadcast reception device 100 may display an auto-launch application stored as a favorite or a downloaded auto-launch application. In a specific embodiment, the broadcast reception device 100 may display an auto-launch application stored as a favorite or a downloaded auto-launch application through an icon. Additionally, the broadcast reception device 100 may receive a user input for an auto-launch application stored as a favorite or a downloaded auto-launch application and may then download or launch an auto-launch application. Through this, the broadcast reception device 100 may allow a broadcast service guide to serve as an application store of a smartphone.

In conventional broadcasting, a sign language screen for hearing-impaired person is directly inserted to a broadcast video. Accordingly, users that have no hearing impairment and thus do not need to see a sign language screen are forced to view the sign language inconveniently. Additionally, the sign language screen is fixed constantly so that this may block a scene that general users want to see intensively. Broadcasters may need to perform an encoding process for inserting a sign language screen into general content in order to transmit the sign language screen. In order to solve this inconvenience, required are a broadcast transmission device and an operating method thereof, and a broadcast reception device and an operating method thereof. This will be described with reference to FIGS. 198 to 203.

A broadcast transmission device may transmit a sign language screen through an additional video different from a video including a general content. The broadcast reception device 100 may overlay an additional video including a sign language screen on a video not including a general content and a sign language screen. Additionally, the broadcast reception device 100 may receive information representing a location at which a sign language screen is displayed and may display an additional video including a sign language screen on the basis of the information representing the location. Or, the broadcast reception device 100 may display an additional video including a sign language screen on the basis of a user input for a location at which a sign language is to be displayed. Additionally, there are various kinds of sign languages used in many countries in addition to general languages. Accordingly, a broadcast transmission device may transmit a plurality of videos respectively including a plurality of sign language screens for one general content. At this point, the broadcast reception device 100 may display one of a plurality of videos respectively including a plurality of sign language screens. At this point, the broadcast reception device 100 may display one of a plurality of videos respectively including a plurality of sign language screens on the basis of a user input. A method of signaling the transmission of such a sign language screen is required.

In a specific embodiment, a video signaling a sign language screen may be signaled as an additional component. Especially, a sign language screen may be signaled efficiently through the above-mentioned object model.

Especially, a sign language component may include information representing a location at which a sign component is to be displayed. Additionally, a sign language component may include information representing the type of a sign language.

A continuous component transmitting a sign language screen may be referred to as a sign language component. At this point, a sign language component class may include as an attribute at least one of a codec representing encoding codec of a sign language screen, a resolution representing the resolution of a sign language screen, coordinates representing a location at which a sign language screen is displayed, an aspect ratio of a sign language screen representing the aspect ratio of a sign language screen, a scanning method representing a scanning method of an image, a frame rate representing the frame rate of a sign language screen, a still picture mode, other encoding parameters, and the type of a sign language. The resolution may be expressed by pixel units of width×height. The coordinates may be displayed by using a pixel at which a sign language screen is displayed. For example, if the coordinates are (10,10), this represents a pixel corresponding to the horizontal 10 and the vertical 10. Additionally, the coordinates may be displayed with the ratio of a screen resolution at which a sign language screen is displayed. For example, if the coordinates are (10,10) and the screen resolution is 1920×1080, the coordinates may represent a pixel corresponding to the horizontal 192 and the vertical 108. Additionally, the scanning method may be one of an interlaced method and a progressive method. Additionally, other encoding parameters may be determined according to codec. Additionally, the type of a sign language may represent one of American Sign Language (ASL), Panamanian Sign Language (LSP), Mexican Sign Language (LSM), and Korean Sign Language (KSL).

At this point, the presentable video component class may have AssociatedSignLanguage relationship with Presentable SignLanguage Component class as relationship. AssociatedSignLanguage relationship with Presentable SignLanguage Component class may represent that displaying a presentable video component and a presentable sign language component simultaneously is suitable. In more detail, the presentable sign language component may overlay on a presentable video component.

The presentable sign language component class represents a presentable component including a sign language content.

Additionally, the above-mentioned TV service class may include Containment Relationship with Presentable Sign Language Component Class as relationship.

Additionally, the above-mentioned TV program class may include Containment relationship with Presentable Sign Language Component Class as relationship.

FIG. 198 is a view illustrating an inheritance relationship with sub-attribute according to the type of broadcast service according to another embodiment of the present invention. As described above, a service may include one or more sign language components. In more detail, a plurality of sign language components may be different types of sign languages representing the same content. The broadcast reception device 100 may display one of a plurality of sign language components according to a user input by receiving the user input. Accordingly, the TV service may include one or more sign language components. Additionally, a radio service may include one or more sign language components. Accordingly, a TV service class may include one or more sign language component classes. Additionally, a radio service class may include one or more sign language component classes.

FIG. 199 is a view illustrating an inheritance relationship between a continuous component and components having a sub-attribute of the continuous component according to an embodiment of the present invention.

As described above, the continuous component may be a complex component or an elementary component. The elementary component may be an elementary sign language component.

FIG. 200 is a view illustrating an inheritance relationship between a presentable component and components having a sub-attribute of the presentable component according to another embodiment of the present invention.

A presentable component may be a presentable sign language component. The presentable video component of each TV service may have one or more presentable sign language components. At this point, the presentable sign language component should be associated with a presentable video component.

In another specific embodiment, a broadcast transmission device may signal a video including a sign language screen by using the property of an elementary video component. In more detail, the elementary video component may include a mode property representing the type of video. At this point, the mode may represent one of a normal representing a general video instead of a sign language screen and a sign language. At this point, when the video component is a sign language, it may include information representing the type of the sign language and coordinate information representing a location at which the sign language screen is to be displayed, as a property. The coordinates may be displayed by using a pixel at which a sign language screen is displayed. For example, if the coordinates are (10,10), this represents a pixel corresponding to the horizontal 10 and the vertical 10. Additionally, the coordinates may be displayed with the ratio of a screen resolution at which a sign language screen is displayed. For example, if the coordinates are (10,10) and the screen resolution is 1920×1080, the coordinates may represent a pixel corresponding to the horizontal 192 and the vertical 108.

In another specific embodiment, a broadcast transmission device may modify information representing the role of a video that is a property that a service, a program, or a composite video component includes and may then signal a video including a sign language screen. In more detail, information representing the role of a video that a service, a program, or a composite video component includes may represent a sign language. At this point, a service, a program, or a composite video component may include information representing the type of the sign language and coordinate information representing a location at which the sign language screen is to be displayed, as a property. The coordinates may be displayed by using a pixel at which a sign language screen is displayed. For example, if the coordinates are (10,10), this represents a pixel corresponding to the horizontal 10 and the vertical 10. Additionally, the coordinates may be displayed with the ratio of a screen resolution at which a sign language screen is displayed. For example, if the coordinates are (10,10) and the screen resolution is 1920×1080, the coordinates may represent a pixel corresponding to the horizontal 192 and the vertical 108. In a specific object model, a role attribute that a service class, a program class, or a composite video component class includes may represent a sign language.

In another specific embodiment, a broadcast transmission device may signal a video including a sign language screen through information representing accessibility to content. In more detail, a broadcast transmission device may signal a video including a sign language screen by using information representing the accessibility to content as the property of at least one of a presentable component, a content item component, a service, a program, a show, a segment, an app, an app-based enhancement service, and an app-based service. Additionally, a broadcast transmission device may allow a targeting property representing a user or a broadcast reception device that a service targets to include information representing the accessibility to content and may then transmit it. In a specific embodiment, the information representing the accessibility to content may include the property of a video including a sign language screen. At this point, a video including a sign language screen component may include information representing the type of the sign language and coordinate information representing a location at which the sign language screen is to be displayed, as a property. The coordinates may be displayed by using a pixel at which a sign language screen is displayed. For example, if the coordinates are (10,10), this represents a pixel corresponding to the horizontal 10 and the vertical 10. Additionally, the coordinates may be displayed with the ratio of a screen resolution at which a sign language screen is displayed. For example, if the coordinates are (10,10) and the screen resolution is 1920×1080, the coordinates may represent a pixel corresponding to the horizontal 192 and the vertical 108. In a specific object model, at least one of a presentable component class, a content item component class, a service class, a program class, a show class, a segment class, an app class, an app-based enhancement service class, and an app-based service class may include information representing the accessibility as an attribute. Additionally, a targeting attribute of a service class may include accessibility representing the accessibility to content as an attribute.

FIG. 201 is a flowchart illustrating operations of a broadcast transmission device to transmit information signaling a video including a sign language screen according to an embodiment of the present invention.

The broadcast transmission device obtains the property of a video including a sign language screen through a control unit in operation S971. The property of a video including a sign language screen, as described above, may include at least one of coordinates representing a location at which the video including the sign language screen is displayed and information representing the type of a sign language.

The broadcast transmission device generates information signaling a video including a sign language screen through the control unit in operation S973. As described above, the broadcast transmission device may signal a video including a sign language screen through at least one of an additional component, the property of an elementary video component, information representing the role of a video that is the property that a service, a program, or a composite video component includes, and information representing the accessibility to content.

The broadcast transmission device transmits a broadcast signal signaling a video including a sign language screen through a transmission unit in operation S975.

FIG. 202 is a flowchart illustrating operations of a broadcast reception device to display a video including a sign language screen according to an embodiment of the present invention.

The broadcast reception device 100 receives a broadcast signal through the broadcast reception unit 110 in operation S981.

The broadcast reception device 100 obtains information signaling a video including a sign language screen on the basis of broadcast signals through the control unit 150 in operation S983. As described above, the information signaling a video including a sign language screen may be signaled through at least one of an additional component, the property of an elementary video component, information representing the role of a video that is the property that a service, a program, or a composite video component includes, and information representing the accessibility to content.

The broadcast reception device 100 obtains the property on a video including a sign language screen on the basis of information signaling the video including the sign language screen through the control unit 150 in operation S985. The property of a video including a sign language screen, as described above, may include at least one of coordinates representing a location at which the video including the sign language screen is displayed and information representing the type of a sign language.

The broadcast reception device 100 displays a video including a sign language screen on the basis of the property on a video including a sign language screen through the control unit 150 in operation S987. In more detail, the broadcast reception device 100 may display a video including a sign language screen on the basis of the coordinates representing a location at which a video including sign language screen is displayed. Additionally, the broadcast reception device 100 may overlay a video including a sign language screen on a video not including a sign language screen and may then display it. Additionally, in a specific embodiment, the broadcast reception device 100 may display a video including a sign language screen on the basis of a user input. This will be described with reference to FIG. 203.

FIG. 203 is a view illustrating an interface of a user input for setting a sign language by a broadcast reception device according to an embodiment of the present invention.

The broadcast reception device 100 may display a video including a sign language screen on the basis of a user input. At this point, the user input may be a user input on whether to display a video displaying a sign language screen. Additionally, the user input may be a user input on a location at which a video including a sign language screen is displayed. Additionally, the user input may be a user input for the type of a sign language of a sign language screen. When a broadcast service or a program includes a plurality of videos including a sign language screen, the broadcast reception device 100 may receive a user input for selecting one of a plurality of videos including a sign language screen. At this point, the broadcast reception device 100 may display a video including a sign language screen selected according to a user input for selecting one of a plurality of videos including a sign language screen. In a specific embodiment, the broadcast reception device 100 may receive such a user input through a setting menu for setting an operation of the broadcast reception device 100 as shown in the embodiment of FIG. 203.

According to embodiments of the present invention, it is described that a broadcast transmission device transmits broadcast service together with service signaling information and the broadcast reception device 100 receives broadcast service on the basis of service signaling information. Then, providing, by the broadcast reception device 100, information to a companion device interworking with broadcast service and an operation of a companion device will be described.

FIG. 204 is a view showing a broadcast system for providing a broadcast service interoperating with a companion device according to an embodiment of the present invention.

The broadcast system according to the embodiment includes a broadcasting receiver 100, a companion device 200, a broadcasting transmitter 300, a content/signaling server 400 and an automatic content recognition (ACR) server 500. Hereinafter, the broadcasting receiver 100 may be referred to as a primary device (PD) and the companion device 200 may be referred to as a companion device (CD).

The broadcasting transmitter 300 indicates a broadcast server for transmitting a broadcast service. At this time, the broadcasting receiver 100 receives the broadcast service from the broadcasting transmitter 300 through a broadcast channel. In addition, the broadcasting receiver 100 may receive information for signaling the broadcast service from the broadcasting transmitter 300 through the broadcast channel. In addition, the broadcasting receiver 100 may receive supplementary information for the broadcast service, such as a trigger, a trigger parameter table (TPT) or a trigger declarative object (TDO) from the broadcasting transmitter 300 through the broadcast channel.

The content/signaling sever 400 generates and manages content of the broadcast service. At this time, the broadcasting receiver 100 may receive at least one of supplementary information of the broadcast service and signaling information of the broadcast service from the content/signaling server 400 through a broadband channel.

The ACR server 300 manages ACR related data of the broadcast service. At this time, the broadcasting receiver 100 may receive at least one of an application of the broadcast service and a trigger from the ACR server 300 through the broadband channel.

The companion device 200 interoperates with the broadcasting receiver 100 over a home network and executes a supplementary function related to the broadcast service. More specifically, the companion device 200 may acquire at least one of an application and file related to the broadcast service. In addition, the companion device 200 may execute the application and file related to the broadcast service. At this time, the companion device 200 may use a mobile communication network such as 3GPP or an HTTP proxy server instead of a home network. In addition, in a detailed embodiment, if the application and file related to the broadcast service are transmitted through file delivery over unidirectional transport (FLUTE), the companion device 200 may receive at least one of the application and file related to the broadcast service from the broadcasting receiver 100. In addition, the companion device 200 may be a second screen device. In addition, the companion device 200 may include at least one of a smartphone, a tablet and a laptop. More specifically, the companion device 200 may be a terminal device not having a broadcast reception function through a broadcast channel and having a communication function of a network. In addition, there may be one or a plurality of companion devices 200. The companion device 200 may include a controller for controlling overall operation of the companion device 200 and a communication unit for performing communication with an external device. The controller may include one or a plurality of processors, one or a plurality of circuits and one or a plurality of hardware modules, for performing a plurality of functions. More specifically, the controller may be a system on chip (SOC) in which various semiconductor parts are integrated. At this time, the SOC may be a semiconductor device in which various multimedia parts for graphics, audio and video, a modem, a processor and a DRAM are integrated. In addition, the communication unit may be a system on chip (SOC) in which various semiconductor parts are integrated. At this time, the SOC may be a semiconductor device in which various multimedia parts for graphics, audio and video, a modem, a processor and a DRAM are integrated.

In addition, the broadcasting receiver 100 may be referred to as a primary device.

In addition, according to an embodiment, at least two of the broadcasting transmitter 300, the content/signaling server 400 and the ACR server 500 may be integrated into one server.

As described above, the broadcasting receiver 100 may receive the signaling information of the broadcast service from the broadcasting transmitter 300. Alternatively, the broadcasting receiver 100 may receive the signaling information of the broadcast service from the content/signaling server 400. At this time, the signaling information of the broadcast service may include properties of the broadcast service, which will be described in detail with reference to FIG. 205.

FIG. 205 is a view showing properties of a broadcast service signaled according to an embodiment of the present invention.

The signaling information of the broadcast service received by the broadcasting receiver 100 may include the properties of the broadcast service. At this time, the properties of the broadcast service may include at least one of a broadcast service ID for identifying the broadcast service, a name of the broadcast service, a channel number of the broadcast service, a description of the broadcast service, a genre of the broadcast service, an icon indicating the broadcast service, a primary language of the broadcast service, usage report information of the broadcast service, targeting properties indicating information on a device capable of providing the broadcast service, protection properties of the broadcast service, an advisory rating and information on a media component included in the broadcast service. The targeting properties indicate a device for providing a service and may indicate at least one of the primary device or the companion device 200. The channel number of the broadcast service may include a major channel and a minor channel. The information on the media component may include at least one of an ID for identifying the media component, a type of the media component, a name of the media component, a start time of the media component, a presentation duration of the media component, information indicating a screen targeted by the media component, a URL capable of receiving the media component, an advisory rating of the media component and a genre of the media component. At this time, the screen targeted by the media component may represent the companion device 200. More specifically, the screen targeted by the media component may represent at least one of no companion device, all devices, a smartphone, a tablet PC, a TV and a PC. The tablet PC may indicate a mobile device having no communication function through a mobile communication network, such as LTE, and having a display.

The properties of the broadcast service may be signaled in XML as shown in FIG. 205. The signaling format of the properties of the broadcast service is not limited thereto and the properties of the broadcast service may be signaled in other formats such as a bit stream. FIG. 205 shows an embodiment of an XML schema for a service signaling service properties, which may be an embodiment of an XML schema structure for service properties according to the following embodiments of the present invention. In some embodiments, fields may be omitted or new fields may be added. The service signaling service properties may include information on the properties of the provided service. The broadcasting transmitter 300 or the content/signaling server 400 may deliver the XML schema to the broadcasting receiver 100. The broadcasting receiver 100 may deliver the received XML schema to the companion device 200. The broadcasting receiver 100 may deliver the XML scheme to the companion device 200 with or without change or may deliver only desired fields or changed fields to the companion device 200.

More specifically, the information for signaling the properties of the broadcast service may include at least one of ServiceID, ServiceName, MajorChanNum, MinorChanNum, Description, Genre, Icon, Language, UsageReportingInfo, Targeting, ServiceProtection, AdvisoryRating and ComponentItem. This information may be defined at the serviceInfo level.

The ServiceID indicates a broadcast service identifier for identifying a service. At this time, there may be only one ServiceID. In addition, in a detailed embodiment, the ServiceID may have an unsigned short data type. More specifically, the broadcasting receiver 100 and the companion device 200 may identify the broadcast service based on the ServiceID.

The ServiceName indicates the name of the broadcast service. There may not be ServiceName or there may be one or a plurality of ServiceNames. In a detailed embodiment, the ServiceName may have a string data type. More specifically, the broadcasting receiver 100 and the companion device 200 may represent the name of the broadcast service based on the ServiceName.

The MajorChanNum and the MinorChanNum indicate the major number and the minor number of the channel number of the broadcast service, respectively. In an embodiment, there may not be MajorChanNum and MinorChanNum and there are one MajorChanNum and one MinorChanNum. Each of the MajorChanNum and the MinorChanNum may be an integer in a range of 0 to 15. The MajorChanNum and the MinorChanNum may be used to enable a user to easily select a broadcast service. More specifically, the broadcasting receiver 100 and the companion device 200 may represent the channel number of the broadcast service based on the MajorChanNum and the MinorChanNum.

The Description indicates the description of the broadcast service. There may not be a Description or there may be one or a plurality of descriptions. The Description may have a string data type. A user may presume the content of the broadcast service through the Description. More specifically, the broadcasting receiver 100 and the companion device 200 may represent the description of the broadcast service based on the Description.

The Genre indicates the genre of the broadcast service. There may not be a genre or there may be one or a plurality of genres. In a detailed embodiment, the Genre may have a string data type. A user may confirm the genre of the broadcast service. More specifically, the broadcasting receiver 100 and the companion device 200 may represent the genre of the broadcast service based on the Genre.

The Icon indicates an icon indicating the broadcast service. There may not be an icon or there may be one or a plurality of icons. The Icon may have a base 64-binary data type. A user may easily confirm the content of the broadcast service through the icon of the broadcast service. More specifically, the broadcasting receiver 100 and the companion device 200 may represent the icon of the broadcast service based on the Icon.

The Language indicates the primary language of the broadcast service. There may not be a language or there may be one or a plurality of languages. The Language may have a string data type. More specifically, the broadcasting receiver 100 and the companion device 200 may represent the language of the broadcast service based on the Language.

The UsageReportingInfo indicates usage report information related to the broadcast service. There may not be UsageReportingInfo or there may be one or a plurality of pieces of UsageReportingInfo. More specifically, the UsageReportingInfo may be used as a parameter for a usage information report. For example, the UsageReportingInfo may include at least one of a URL for a usage information report and a report period. A broadcast service provider may acquire usage information of the broadcast service and payment information of the broadcast service through the usage information report. More specifically, the broadcasting receiver 100 and the companion device 200 may report the usage information of the broadcast service based on the UsageReportingInfo.

The Targeting indicates the targeting properties of the broadcast service. There may not be a targeting property or there may be one or a plurality of targeting attributes. More specifically, the Targeting may have a string data type. More specifically, the Targeting may indicate whether the broadcast service is for the primary device such as the broadcasting receiver 100 or for the companion device 200. If the broadcast service is for the companion device 200, the broadcasting receiver 100 may deliver the XML schema received from the service provider to the companion device 200. More specifically, the broadcasting receiver 100 and the companion device 200 may determine whether the broadcast service is displayed based on the Targeting.

The ServiceProtection indicates the protection properties of the broadcast service. There may not be ServiceProtection property or there may be one ServiceProtection property. More specifically, the ServiceProtection may have a string data type.

The AdvisoryRating indicates the advisory rating of the service. There may not be an AdvisoryRating or there may be one or a plurality of AdvisoryRatings. More specifically, the AdvisoryRating may have a string data type. More specifically, the broadcasting receiver 100 and the companion device 200 may interrupt the broadcast service based on the advisory rating and personalization information. A user may not select an undesired service through the AdvisoryRating information. A user may interrupt a service of a specific rating through personalization.

The ComponentItem indicates information on a media component included in the broadcast service. Here, the component means content and indicates information on content provided by the service corresponding to service information. One ComponentItem may have information on one piece of content. More specifically, the ComponentItem may include at least one of componentId, ComponentType, ComponentName, StartTime, Duration, TargetScreen, URL, ContentAdvisory and Genre.

The ComponentId indicates an identifier for identifying the media component. More specifically, there may be one componentId. The ComponentId is a unique identifier of the component in a service range corresponding to service information. More specifically, the ComponentId may have an unsigned data type. More specifically, the broadcasting receiver 100 and the companion device 200 may identify the media component based on the ComponentId.

The ComponentType indicates the type of the media component. More specifically, there may be one ComponentType. The ComponentType may have a string data type. More specifically, the broadcasting receiver 100 and the companion device 200 may represent the type of the media component based on the ComponentType.

The ComponentName indicates the name of the media component. More specifically, there may not be ComponentName or there may be one or a plurality of ComponentNames. The ComponentName may have a string data type. More specifically, the broadcasting receiver 100 and the companion device 200 may represent the name of the media component based on the ComponentName.

The StartTime indicates the start time of the media component. More specifically, there may not be StartTime or there may be one StartTime. More specifically, the StartTime may have an unsigned short data type. More specifically, the broadcasting receiver 100 and the companion device 200 may determine the start time of the media component based on the StartTime.

The Duration indicates the presentation duration of the media component. More specifically, there may not be a duration or there may be one duration. More specifically, the Duration may have an unsigned short data type. More specifically, the broadcasting receiver 100 and the companion device 200 may determine the presentation duration of the media component based on the Duration.

The TargetScreen indicates a target screen of the media component. More specifically, there may not be a target screen or there may be one or a plurality of target screens. More specifically, the TargetScreen may have a string data type. More specifically, the broadcasting receiver 100 and the companion device 200 may determine whether the media component needs to be presented based on the TargetScreen. The TargetScreen indicates whether the component is for the primary device (PD) including the broadcasting receiver 100 or the companion device (the companion device (CD)). If the component is for the CD, the PD may deliver the XML schema received from the service provider to the CD. In a detailed embodiment, the TargetScreen may indicate that there is no CD corresponding to the media component or that the media component is for all devices. In addition, the TargetScreen may indicate that the media component is for any one of a smartphone, a tablet PC, a TV and a PC. More specifically, the TargetScreen attribute of the component information of the service signaling information received by the PD from the broadcaster or the content provider may be designated and used as in the embodiment of FIG. 206. In the embodiment of FIG. 206, if the value of the TargetScreen is 0x00, this may mean a reserved URI. The TargetScreen may indicate that there is no CD corresponding to the media component. At this time, the URI may identify a resource of a remote server capable of downloading information on a companion device application. In this case, the broadcasting receiver may recognize the URI as a location and acquire the resource from the location. If the value of the TargetScreen is 0x01, the TargetScreen may indicate that the media component is targeted at all device classes. Here, the TargetScreen may be a generic URI. If the value of the TargetScreen is 0x02, the TargetScreen may indicate that the media component is targeted at a smartphone class. Here, the TargetScreen may be a specific URI. If the value of the TargetScreen is 0x03, the TargetScreen may indicate that the media component is targeted at a tablet PC class. Here, the TargetScreen may be a specific URI. If the value of the TargetScreen is 0x04, the TargetScreen may indicate that the media component is targeted at a TV class. Here, the TargetScreen may be a specific URI. If the value of the TargetScreen is 0x05, the TargetScreen may indicate that the media component is targeted at a PC class. Here, the TargetScreen may be a specific URI.

The URL may indicate an address for receiving the media component. More specifically, there may not be URL or there may be one or a plurality of URLs. More specifically, the URL may have a URL data type. More specifically, the URL may indicate the address of the content/signaling server 400. More specifically, the broadcasting receiver 100 and the companion device 200 may receive the media component based on the URL.

The ContentAdvisory indicates the advisory rating of the media component. If the value of the ContentAdvisory conflicts with the AdvisoryRating, the value of ContentAdvisory may have higher priority. More specifically, there may not be a ContentAdvisory or there may be one or a plurality of pieces of ContentAdvisory. More specifically, the ContentAdvisory may have a string data type. More specifically, the broadcasting receiver 100 and the companion device 200 may determine whether the media component is presented based on the ContentAdvisory.

The Genre indicates the genre of the media component. More specifically, there may not be genre or there may be one or a plurality of genres. The Genre may have a string data type. More specifically, the Genre may have a string data type. If the Genre conflicts with the Genre of the serviceInfo level, the Genre information of the component level may be set to have a higher priority. If the Genre conflicts with the Genre indicating the genre of the service, the Genre indicating the genre of the media component may have a higher priority. More specifically, the broadcasting receiver 100 and the companion device 200 may represent the genre of the media component based on the Genre.

Next, a protocol applicable between the PD and the CD will be described. One embodiment of the present invention is not limited to a specific protocol.

A. In the present invention, device-to-device communication is represented by exchange of a message, a command, a call, an action or a request/response.

B. In the present invention, in order to stably deliver a message used upon device-to-device communication to a desired target device, various protocols such as Internet protocol (IP), Internet control message protocol (ICMP), and Internet group management protocol (IGMP) are applicable, without being limited to a specific protocol.

C. In the present invention, in order to stably deliver a message used upon device-to-device communication, control a message flow, solve collision or congestion among a plurality of messages or support multiplexing, various protocols such as transmission control protocol (TCP), user datagram protocol (UDP), datagram congestion control protocol (DCCP) and stream control transmission protocol (SCTP) are applicable without being limited to a specific protocol.

D. In the present invention, in order to deliver a variety of information included in a message used upon device-to-device communication for various purposes, various protocols such as hypertext transfer protocol (HTTP), real-time transport protocol (RTP), extensible messaging and presence protocol (XMPP) and file transfer protocol (FTP) are applicable without being limited to a specific protocol.

E. In the present invention, when a message used upon device-to-device communication is delivered through the various protocols, desired message data may be included and delivered in the various message components such as a message header or a message body among the message components defined in each protocol without being limited to a specific message component.

F. In the present invention, when a message used upon device-to-device communication is delivered through the various protocols, data to be delivered may be delivered in various types defined in each protocol (string, integer, floating point, Boolean, character, array, list, etc.). In order to structurally express, deliver and store complex data, a markup format such as extensible markup language (XML), hypertext markup language (HTML), extensible hypertext markup language (XHTML), javascript object notation (JSON), etc. or a text or image format is applicable without being limited to a specific format.

G. In the present invention, data included in a message used upon device-to-device communication may be delivered by applying various data compression technologies such as “gzip” (RFC 1952), “deflate” (RFC 1950), “compress” (RFC 2616), without being limited to specific technology.

A UPnP protocol which is a device-to-device communication protocol applied to the embodiment of the present invention is a device-to-device communication protocol which is a combination of TCP/IP and UDP-HTTP among technologies of various layers of B to G.

A UPnP action proposed by the present invention is one of various device-to-device communication protocols and delivers data to a control URL acquired in a UPnP discovery and description process in an HTTP POST message body delivered in XML using a POST method defined in HTTP. In the case of a UPnP protocol, since the action name of each action is defined and the action name is also delivered in the HTTP POST message body delivered in XML, only one URL for a communication target device is present and infinite types of actions (messages) may be exchanged using only one HTTP POST method. This will be described with reference to the figure related to a UPnP action mechanism.

As another embodiment, device-to-device communication proposed by the present invention is applicable without defining an action name, when several methods such as GET, HEAT, PUT, DELETE, TRACE, OPTIONS, CONNECT and PATCH are used in addition to POST among HTTP methods and a plurality of URIs accessing the communication target device is defined. Data which needs to be delivered may be appended to a corresponding URI or may be included in an HTTP body in various formats. This will be described below with reference to the figure related to an REST MECHANISM. The plurality of URIs necessary for such an REST mechanism may be acquired in a discovery or description process.

All UPnP actions proposed by the present invention are applicable through various combinations of technologies of various layers of B to G and all proposals of the present invention are not limited to the UPnP protocol.

As described above, the broadcasting receiver 100 and the companion device 200 may interoperate through at least one of a home network, a mobile communication network such as 3GPP and an HTTP proxy server. At this time, communication between the broadcasting receiver 100 and the companion device 200 may be performed using various protocols. More specifically, communication between the broadcasting receiver 100 and the companion device 200 may be performed using a universal plug and play (UPnP) protocol.

UPnP distinguishes between a control point (CP) and controlled devices (CDs). The control point controls the controlled devices using the UPnP protocol. In a detailed embodiment, the broadcasting receiver 100 may be one of the controlled devices. In addition, the companion device 200 may be a control point. In UPnP, discovery, description, control and eventing protocols are defined. The discovery protocol refers to a protocol for enabling a control point to find controlled devices. The description protocol refers to a protocol for enabling a control point to acquire information on controlled devices. The control protocol refers to a protocol for enabling a control point to invoke a predetermined action with respect to controlled devices. The eventing protocol refers to a protocol for enabling a controlled device to deliver asynchronous notifications to a control point. The broadcasting receiver 100 and the companion device 200 according to the embodiment of the present invention may interoperate with at least one of the discovery, description, control and eventing protocols of the UPnP protocol. For example, the broadcasting receiver 100 may find the companion device 200 using the discovery protocol.

FIG. 207 is a view showing a UPnP action mechanism according to an embodiment of the present invention.

The UPnP protocol which is a device-to-device communication protocol applied to the embodiment of the present invention is a device-to-device communication protocol obtained by combining TCP/IP and UDP-HTTP.

A UPnP action proposed by the present invention is one of various device-to-device communication protocols and delivers data to a control URL acquired in a UPnP discovery and description process in an HTTP POST message body delivered in XML using a POST method defined in HTTP. In the case of a UPnP protocol, since the action name of each action is defined and the action name is also delivered in the HTTP POST message body delivered in XML, only one URL for a communication target device is present and infinite types of actions (messages) may be exchanged using only one HTTP POST method.

An HTTP client D1120 is a UPnP control point and may control an HTTP server D1121. At this time, the HTTP server may operate as a UPnP device. The HTTP client D1120 may define each action using a name and arguments in order to deliver various actions. At least one action may include a name corresponding to an identifier and arguments corresponding to data. As shown in the figure, each of action 1 to action N may include a name and arguments, which may be described in XML. The described XML message may be delivered to the HTTP server D1121 using an HTTP POST method. The name and arguments of each action may be included and delivered in the body of an HTTP POST message. At this time, the HTTP POST message including at least one action may be delivered to the same controlURL and each action may be identified by the name.

The HTTP server D1121 may parse the XML message included in the received HTTP POST message using an XML parser. The HTTP server D1121 may identify at least one action included in the XML message and perform actions according to the arguments of each action.

FIG. 208 is a view showing a representational state transfer (REST) action mechanism according to an embodiment of the present invention. As another embodiment, device-to-device communication proposed by the present invention is applicable without defining an action name, when several methods such as GET, HEAT, PUT, DELETE, TRACE, OPTIONS, CONNECT and PATCH are used in addition to POST among HTTP methods and a plurality of URIs accessing the communication target device is defined. Data which needs to be delivered may be appended to a corresponding URI or may be included in an HTTP body in various formats. The plurality of URIs necessary for such an REST mechanism may be acquired in a discovery or description process.

An HTTP client D1130 is an REST client and may control an HTTP server D1131. At this time, the HTTP server may operate an REST server. The HTTP client D1130 may define each action using arguments in order to deliver various actions. Here, the above-described name is not required. The arguments of each action may correspond to data. As shown in the figure, each of action 1 to action N may include arguments. Each action may be delivered to the HTTP server D1131 using HTTP GET, HTTP PUT, HTTP POST, and HTTP DELETE methods. The arguments of each action may be added to an HTTP acceptalbeheader or HTTP body. Here, the HTTP body may be described in XML, JSON, HTML, TEXT or IMAGE. Each HTTP method is transmitted to a URI and a plurality of URIs may be defined with respect to a plurality of actions. The plurality of URIs may be used to access one HTTP server D1131.

HTTP server D1131 may receive actions using the plurality of URIs and perform the received actions. Therefore, each action may be delivered from the HTTP client D1130 to the HTTP server D1131 without the NAME identifier.

FIG. 209 is a view showing service signaling messages of a broadcast receiving device and a companion device using an eventing method according to an embodiment of the present invention.

The eventing method may be based on the UPnP protocol. A service type and a service ID defined in the eventing method are shown in (a) of FIG. 209. That is, the service type of service signaling may be atsc3.0servicesignaling:1 and the service ID may be defined as urn:atsc.org:serviceId:atsc3.0servicesignaling. The service type and the service ID may have different values according to transmission method.

The broadcast receiving device 100 may transmit the properties of a broadcast service to the companion device 200 using one variable indicating the properties of the broadcast service. One variable indicating the properties of the broadcast service may include the properties of a current broadcast service. More specifically, in the embodiment shown in (b) of FIG. 209, the properties of the broadcast service may be transmitted using a variable "ServiceProperty". In an embodiment, ServiceProperty is a required variable and may have a string data type. For example, ServiceProperty may be described in XML, JSON, HTML or TEXT. That is, ServiceProperty may correspond to ServiceInfo defined in XML schema of the above-described Service Signaling Service. In an embodiment, ServiceProperty may not have an action related thereto.

In addition, the Service Signaling Service may have an action and an argument as shown in (c) and (d) of FIG. 209. A GetServiceProperty action may be used for the companion device 200 to acquire service property information of the currently provided service when the companion device 200 is connected to the broadcast receiving device 100 while a service is being provided by the broadcast receiving device 100. A GetServiceProperty argument may have the format shown in (d) of FIG. 209. The broadcast receiving device 100 may include and return information on the currently provided service in a ServiceProperty argument as a return value in response to the GetServiceProperty action from the companion device 200.

If subscription to the ServiceProperty is requested, the broadcast receiving device 100 may transmit a ServiceProperty to the companion device.

FIG. 210 is a ladder diagram showing operation for signaling a broadcast service property from a broadcast receiving device to a companion device according to an embodiment of the present invention.

The broadcast receiving device 100 and the companion device 200 generate a pairing session (S2001). More specifically, the broadcast receiving device 100 may generate the pairing session with the companion device 200 through an IP communication unit 130. More specifically, the companion device 200 may generate the pairing session with the broadcast receiving device 100 through a communication unit. More specifically, the broadcast receiving device 100 and the companion device 200 may generate a pairing session for bidirectional communication. More specifically, the broadcast receiving device 100 and the companion device 200 may generate a pairing session using a UPnP protocol. In a detailed embodiment, the broadcast receiving device 100 may find the companion device 200 using the discovery protocol of a UPnP. For example, the broadcast receiving device 100 may multicast a discovery message for finding a companion device for interoperation through a well-known IP address. At this time, the companion device 200, which has received the multicast message, may request a description from the broadcast receiving device 100. The broadcast receiving device 100 may provide the description to the companion device 200 based on the request for the description of the companion device 200. The companion device 200 may access the broadcast receiving device 200 based on the description. In another detailed embodiment, the companion device 100 may find the broadcast receiving device 100 using the discovery protocol of the UPnP. For example, the companion device 200 may multicast a message for finding the broadcast receiving device 100 for interoperation through a well-known IP address. At this time, the broadcast receiving device may respond to the multicast message using a discovery message. At this time, the companion device 200, which has received the discovery message, may request a description from the broadcast receiving device 100. The broadcast receiving device 100 may provide the description to the companion device 200 based on the request for the description of the companion device 200. The companion device 200 may access the broadcast receiving device 200 based on the description.

The companion device 200 may request broadcast service property notification from the broadcast receiving device 100 (S2003). More specifically, the companion device 200 may request broadcast service property notification from the broadcast receiving device 100 through a controller. More specifically, the companion device 200 may request broadcast service property notification from the broadcast receiving device 100 using a UPnP protocol. In a detailed embodiment, the companion device 200 may request subscription to an event for the broadcast service property from the broadcast receiving device 100 based on an eventing protocol.

The broadcast receiving device 100 receives information for signaling the broadcast service property based on the broadcast service (S2005). More specifically, the broadcast receiving device 100 may receive information for signaling the broadcast service property from the broadcast transmitting device 300 through a broadcast reception unit 110.

The broadcast receiving device 100 notifies the companion device 200 of the broadcast service property based on the information for signaling the broadcast service property (S2007). In the case of a UPnP based architecture, the broadcast service property may be notified according to the eventing protocol. More specifically, the broadcast receiving device 100 notifies the companion device 200 of the broadcast service property through a controller 150 based on the information for signaling the broadcast service property. More specifically, the broadcast receiving device 100 may determine whether the broadcast service property is changed. If the broadcast service property is changed, the broadcast receiving device 100 may notify the companion device 200 of the broadcast service property. In a detailed embodiment, the broadcast receiving device 100 may notify the companion device 200 of the broadcast service property through a variable indicating the broadcast service property. In a detailed embodiment, the variable indicating the broadcast service property may be the ServiceProperty of FIG. 211. The data format of the variable indicating the broadcast service property will be described in detail with reference to FIG. 16.

FIG. 211 is a view showing the data format of a broadcast service property signaled from a broadcast receiving device to a companion device according to an embodiment of the present invention.

The data of the broadcast service property may be an XML as shown in FIG. 211. However, the data format of the broadcast service property is not limited thereto. That is, as shown in (a) of FIG. 211, the broadcast service property may be defined in a propertyset with respect to each property. In addition, as shown in (b) of FIG. 211, the broadcast service property may be defined as a ServiceID, a ServiceName, a Content ID, and a ContentName in the ServiceProperty. In addition, as shown in (c) of FIG. 211, the broadcast service property may be described such that a ServiceProperty (ServiceInfo) element and a ComponentItem element included therein include respective properties.

In the embodiment of FIG. 211, the data format of the broadcast service property may include all the properties of the broadcast service described with reference to FIG. 211. Accordingly, even when only some of the properties of the broadcast service are changed, the broadcast receiving device 100 should transmit all the properties of the broadcast service and the companion device 200 should receive all the properties of the broadcast service. In this case, the amount of data exchanged between the broadcast receiving device 100 and the companion device 200 increases. In addition, the companion device 200 should check which property of the broadcast service is changed. Accordingly, there is a need for a method of efficiently signaling the broadcast service property from the broadcast receiving device 100 to the companion device 200. This will be described with reference to FIGS. 212 to 214.

FIG. 212 is a view showing a variables indicating the state of a broadcast service property signaled from a broadcast receiving device to a companion device, an action for the broadcast service property and an action argument according to an embodiment of the present invention.

The service type and the service ID of the broadcast service signaled from the broadcast receiving device to the companion device may be equal to those of the above-described embodiment. That is, the service type of service signaling may be atsc3.0servicesignaling:1 and the service ID may be defined as urn:atsc.org:serviceId:atsc3.0servicesignaling. The service type and the service ID may have different values according to the transmission method.

In another embodiment of the present invention, the variable indicating the broadcast service property may include at least one of a variable indicating a broadcast service property, a variable indicating a broadcast service property name and a variable indicating whether the broadcast service property is changed. More specifically, if the companion device 200 requests a specific broadcast service property, the broadcast receiving device 100 may transmit the broadcast service property based on the request of the companion device 200. More specifically, the broadcast receiving device 100 may transmit the specific broadcast service property requested by the companion device 200. For example, the broadcast receiving device 100 may notify the companion device 200 of whether the broadcast service property is changed through the variable indicating whether the broadcast service property is changed. At this time, the companion device 200 may request a necessary broadcast service property through the variable indicating the broadcast service property name. The broadcast receiving device 100 may notify the companion device of the broadcast service property through the variable indicating the broadcast service property.

In a detailed embodiment, the variable indicating the broadcast service property may include any one of a ServiceProperty, a ServicePropertyName and a ServicePropertyChangeFlag. The ServiceProperty includes the broadcast service property. In a detailed embodiment, the ServiceProperty is a required variable and may have a string data type. In particular, the ServiceProperty may be described in XML.

The ServicePropertyName indicates the name of the broadcast service property. That is, this may indicate the name of the XML element as each field included in the ServiceProperty. The ServicePropertyName is a required variable and may have a string data type. In particular, the ServicePropertyName may be described in CSV. The variable ServicePropertyChangeFlag indicates whether the broadcast service property is changed. In a detailed embodiment, the ServicePropertyChangeFlag is a required variable and may have a Boolean data type or an integer type. The ServicePropertyChangeFlag is a variable indicating whether the service property is changed. If the ServicePropertyChangeFlag is of a Boolean data type, true indicates that the service property is changed and false indicates that the service property is not changed. Alternatively, if the ServicePropertyChangeFlag is of an integer type, the value thereof increases by 1 whenever the service property is changed and is evented. In addition, if the companion device 200 requests subscription to the ServicePropertyChangeFlag, the broadcast receiving device 100 may transmit the ServicePropertyChangeFlag to the companion device.

The companion device 200 may use an action called GetServiceProperty in order to request the broadcast service property through the variable indicating the name of the broadcast service property. The GetServiceProperty is a required action. At this time, the GetServiceProperty may have a ServicePropertyName as an input argument. In addition, the GetServiceProperty may have a ServiceProperty as an output argument. In a detailed embodiment, if the companion device 200 sets the broadcast service property to be acquired from the broadcast receiving device 100 to a SevicePropertyName and transmits a GetServiceProperty action, the companion device 200 may receive the broadcast service property corresponding to the ServicePropertyName as the ServiceProperty. That is, ServicePropertyName is an input argument and may be used when the companion device 200 acquires the service property value of a desired property name. The ServiceProperty may be used when the broadcast receiving device 100 returns service information, that is, a service property to the companion device 200 in response to the desired property name.

FIG. 213 is a ladder diagram showing operation for signaling a broadcast service property from a broadcast receiving device to a companion device according to another embodiment of the present invention.

The broadcast receiving device 100 and the companion device 200 generate a pairing session (S2021). More specifically, the broadcast receiving device 100 may generate a pairing session with the companion device 200 through an IP communication unit 130. More specifically, the companion device 200 may generate a pairing session with the broadcast receiving device 100 via a communication unit. As described above, the broadcast receiving device 100 and the companion device 200 may generate a pairing session for bidirectional communication. Detailed operation of the broadcast receiving device 100 and the companion device 200 may be equal to that of the above-described embodiment.

The companion device 200 may request broadcast service property change notification from the broadcast receiving device 100 (S2023). More specifically, the companion device 200 may request broadcast service property change notification from the broadcast receiving device 100 through a controller. Detailed operation of the companion device 200 may be equal to that of the above-described embodiment. That is, the companion device 200 may subscribe to the service signaling service of the broadcast receiving device 100.

The broadcast receiving device 100 receives information for signaling the broadcast service property from the broadcast receiving device 100 based on the broadcast service (S2025). More specifically, the broadcast receiving device 100 may receive information for signaling the broadcast service property from the broadcast receiving device 100 through a broadcast reception unit 110. A broadcast transmitting device 300 may notify the broadcast receiving device 100 that the service property is changed.

The broadcast receiving device 100 notifies the companion device 200 of whether the broadcast service property is changed based on the information for signaling the broadcast service property (S2027). In the case of a UPnP based architecture, the broadcast receiving device 100 may notify the companion device of whether the broadcast service property is changed according to an "eventing" protocol. More specifically, the broadcast receiving device 100 may notify the companion device 200 of whether the broadcast service property is changed based on the information for signaling the broadcast service property through a controller 150. More specifically, the broadcast receiving device 100 may determine whether the broadcast service property is changed. If the broadcast service property is changed, the broadcast receiving device 100 may notify the companion device 200 that the broadcast service property is changed. More specifically, the broadcast receiving device 100 may determine whether the broadcast service property is changed depending on whether the version of the information for signaling the broadcast service property is changed. In addition, in a detailed embodiment, the broadcast receiving device 100 may notify the companion device 200 of whether the broadcast service property is changed through the variable indicating whether the broadcast service property is changed. In a detailed embodiment, the variable indicating whether the broadcast service property is changed may be a ServicePropertyChangedFlag.

The companion device 200 requests a specific broadcast service property from the broadcast receiving device 100 (S2029). The companion device 200 may request a changed service property field using "GetServiceProperty" if the changed property field is an interesting field. At this time, the name of the changed service property field may be included in the ServiceProPertyName argument to make a request from the broadcast receiving device 100. For example, if the field to be acquired by the companion device 200 is a genre and a language, a request is made using GetServiceProperty ("genre, language").

The specific broadcast service property may be any one or a plurality of properties of the broadcast service properties included in the information for signaling the broadcast service property. The companion device 200 may request a specific broadcast service property from the broadcast receiving device 100 through a controller. More specifically, if the broadcast receiving device 100 transmits broadcast service property change notification, the companion device 200 may request the specific broadcast service property from the broadcast receiving device 100. At this time, the specific broadcast service property may be a broadcast service property necessary for the companion device 200 to provide supplementary services related to the broadcast service. In addition, the companion device 200 may request the specific broadcast service property based on the type of the changed broadcast service property. More specifically, the companion device 200 may request the specific broadcast service property if the specific broadcast service property is changed. The specific broadcast service property may be a property necessary for the companion device 200 to provide supplementary services related to the broadcast service. For example, if the companion device 200 determines whether the broadcast service is presented based on the targeting properties of the broadcast service, the companion device 200 may request the targeting properties of the broadcast service when the targeting properties of the broadcast are changed.

The broadcast receiving device 100 notifies the companion device 200 of the specific broadcast service property (S2031). That is, the companion device 200 may receive the changed field information from the broadcast receiving device 100 in response to the "GetServiceProperty" action. The ServiceProperty argument may be delivered to the companion device 200 as the output of the "GetServiceProperty" action. Here, the companion device 200 may receive information on the field for the specific property requested thereby. That is, the companion device 200 may receive information indicating that the changed genre is Sports and the language is KOR.

More specifically, the broadcast receiving device 100 may notify the companion device 200 of the specific broadcast service property through the controller 150. More specifically, the broadcast receiving device 100 may notify the companion device 200 of the specific broadcast service property based on the request of the companion device 200. For example, the broadcast receiving device 100 may transmit the specific broadcast service property requested by the companion device 200 to the companion device 200.

Such an embodiment may require continuous communication between the broadcast receiving device 100 and the companion device 200. In particular, if the broadcast receiving device 100 interoperates with a plurality of companion devices 200, continuous communication may cause overload of the operation of the broadcast receiving device 100. This problem may be solved by enabling the companion device 100 to receive the broadcast service property from the content/signaling server 400.

FIG. 214 is a view showing a data format indicating whether a broadcast service property signaled from a broadcast receiving device to a companion device is changed according to another embodiment of the present invention.

(a) to (c) of FIG. 214 show the data format indicating whether the broadcast service property is changed. Whether the broadcast service property is changed may be signaled using a ServicePropertyChangeFlag. The data format indicating whether the broadcast service property is changed may be XML. However, the data format indicating whether the broadcast service property is changed is not limited thereto. As the ServicePropertyChangeFlag, a ServicePropertyChangeFlag which is one type of the property information included in propertyset is used as shown in (a) of FIG. 214, a separate ServicePropertyChangeFlag may be transmitted as shown in (b) of FIG. 214 or data having a different format indicating true or false may be transmitted as shown in (c) of FIG. 214.

In a detailed embodiment, the broadcast receiving device 100 may notify the companion device 200 only of whether the broadcast service property is changed. In the embodiment of FIG. 214, the broadcast receiving device 100 may notify the companion device 200 of whether the broadcast service property is changed using a Boolean variable having a true value or a false value. For example, if the broadcast service property is changed, the broadcast receiving device 100 may transmit data, in which a variable indicating whether the broadcast service property is changed has a true value, to the companion device 200. Therefore, as compared to the above-described embodiment in which all data of the service property is always transmitted, since data is transmitted according to the request of the companion device 200 only when the service property is changed, efficient data transmission is possible.

(d) of FIG. 214 shows an embodiment of the ServiceProperty argument delivered to the companion device 200 as described above. As described above, if the companion device 200 requests genre and language fields, the companion device 200 may receive the changed information of the genre and language fields in XML as shown in the figure. That is, the companion device 200 may receive a ServiceProperty argument indicating that the changed genre is Sports and the language is KOR.

However, in this embodiment, the companion device 200 cannot check which broadcast service property is changed and may check only whether a broadcast service property is changed. Accordingly, the companion device 200 requests the broadcast service property even when an undesired broadcast service property is changed. Accordingly, this embodiment may cause unnecessary operation of the broadcast receiving device 100 and the companion device 200 and unnecessary data exchange. In order to solve this problem, the broadcast receiving device 100 needs to notify the companion device 200 of a changed broadcast service property.

FIG. 215 is a view showing a variable indicating the state of a broadcast service property signaled from a broadcast receiving device to a companion device according to another embodiment of the present invention.

The service type and the service ID information of the broadcast service signaled from the broadcast receiving device to the companion device may be equal to those of the above-described embodiment. That is, the service type of the service signaling may be atsc3.0servicesignaling:1 and the service ID may be defined as urn:atsc.org:serviceId:atsc3.0servicesignaling. The service type and the service ID may have different values according to the transmission method.

As shown in (a) of FIG. 215, the variable indicating the state of the broadcast service property may include service property information, service property name information, service property change information and service property location information.

The service property information and the service property name information may be equal to the above-described service property information and service property name information.

The service property change information may include a binary hexadecimal type unlike the above-described embodiment and indicate which information is changed. This will be described in detail below.

The companion device 200 may download the service property through a broadband network and the variable indicating the state of the broadcast service property may include the broadband location information. That is, the variable indicating the state of the broadcast service property is optional and may further include a ServicePropertyURL state variable. Here, the broadband location information may have an XML string or a URI format. The ServicePropertyURL may have the data format shown in (b) of FIG. 215 and may indicate the location of the service property information on the content server.

If the broadcast service property is changed, the broadcast receiving device 100 may notify the companion device 200 of the changed property and whether the broadcast service property is changed. To this end, the variable indicating the state of the broadcast service property may include information indicating the changed service property. To this end, the variable indicating whether the broadcast service property is changed may have a string type represented by a binary hexadecimal type. If a request for subscription to the ServicePropertyChangedFlag is made, the broadcast receiving device 100 may transmit the ServicePropertyChangedFlag to the companion device.

FIG. 216 is a view showing data format indicating whether a broadcast service property signaled from a broadcast receiving device to a companion device is changed according to another embodiment of the present invention.

Data indicating whether the broadcast service property is changed may mean a ServicePropertyChangeFlag. The data indicating whether the broadcast service property is changed may be described in XML. However, the data indicating whether the broadcast service property is changed is not limited thereto. The broadcast receiving device 100 may allocate a specific bit to the broadcast service property, set the bit to 1 if the broadcast service property is changed and set the bit to 0 when the broadcast service property is not changed. That is, each digit of a binary code may correspond to each property included in the service property. In one embodiment, the ServicePropertyChangeFlag may be defined in a propertyset. A hexadecimal value 90080004 which is the value of the ServicePropertyChangeFlag corresponds to a binary value "1001 0000 0000 1000 0000 0000 0100". At this time, the first four bits indicate the primary language, genre, advisory rating and targeting property of the broadcast service, respectively. In this case, the companion device 200 may confirm that the primary language and targeting property of the broadcast service are changed. The ServicePropertyChangeFlag value represented by the binary value may have a format in which a first service property matches an MSB and a second service property matches a next bit. In the above embodiment, it can be seen that, among the language, the genre, the advisory rating and the targeting property corresponding to 1001, the language and the targeting property are changed.

In addition, in another embodiment, the ServicePropertyChangeFlag may be present as an independent element and the value of the ServicePropertyChangeFlag may match the properties such as the language, the genre, the AdvisoryRating and the targeting in the ServiceProperty element. The hexadecimal value 90080004 which is the value of the ServicePropertyChangeFlag corresponds to a binary value of 1001 0000 0000 1000 0000 0000 0100. The first four bits of the binary value may respectively match properties such as the language, the genre, the AdvisoryRating and the targeting, and the language and targeting property having a value of 1 indicate that the language and the targeting property are changed. FIG. 217 is a view showing the variable indicating that the state of a broadcast service property signaled from a broadcast receiving device to a companion device is changed according to another embodiment of the present invention.

As shown in (a) of FIG. 217, the variable indicating the state of the broadcast service property may include service property information, service property name information, service property change information and service property location information.

The service property information and the service property name information may be equal to the above-described service property information and service property name information.

The service property change information may include a string (XML) type, a list-of-strings (XML) type or a CSV-of-strings type unlike the above-described embodiment and indicate which information of the service property information (ServiceProperty) is changed. This will be described in detail below.

As shown in (b) of FIG. 217, if the service property change information is of a string type (XML), the changed service property information (ServiceProperty) may be indicated using a changedfield in the service property change information (ServicePropertyChangeFlag). If the genre and the targeting information of the ServiceProperty are changed, the changedfield in the service property change information (ServicePropertyChangeFlag) may include the genre and the targeting property.

As shown in (c) of FIG. 217, if the service property change information is of a list-of-strings (XML) type, the service property change information (ServicePropertyChangeFlag) may include changed service property change information. If the genre and the targeting information of the ServiceProperty are changed, the service property change information may include the genre and the targeting property.

As shown in (d) of FIG. 217, if the service property change information is of a CSV (comma separated value)-of-strings type, the changed property of the service property change information may be distinguished by a comma and represented in a text file format. If the genre and the targeting information of the ServiceProperty are changed, the ServicePropertyChangeFlag may be represented by "genre", "targeting".

The property location information may have a string (XML) or a URI format. The property location information may be represented by a ServicePropertyURL and may indicate the location of the service property information on the content server. In some embodiments, the property location information may be optional.

(e) of FIG. 217 shows the format of service property data. As shown in the figure, the ServiceProperty data may include a language, a genre, an AdvisoryRating and a targeting. If the genre value of the service property is changed to MBC Music and the targeting value is changed to Pop Chart, the broadcast receiving device 100 may deliver a ServicePropertyChangeFlag including the genre and the targeting to the companion device 200 to indicate that the genre and the targeting are changed, as shown in (b) to (d) of FIG. 217.

FIG. 218 is a ladder diagram showing operation for signaling a broadcast service property from a broadcast receiving device to a companion device according to another embodiment of the present invention.

The broadcast receiving device 100 and the companion device 200 generate a pairing session (S2041). More specifically, the broadcast receiving device 100 may generate a pairing session with the companion device 200 through an IP communication unit 130. More specifically, the companion device 200 may generate a pairing session with the broadcast receiving device 100 through a communication unit. As described above, the broadcast receiving device 100 and the companion device 200 may generate a pairing session for bidirectional communication. The detailed operation of the broadcast receiving device 100 and the companion device 200 may be equal to that of the embodiment of FIG. 213.

The companion device 200 requests broadcast service property notification from the broadcast receiving device 100 (S2043). More specifically, the companion device 200 may request broadcast service property notification from the broadcast receiving device 100 through a controller. The detailed operation of the companion device 200 may be equal to that of the embodiment of FIG. 213.

The broadcast receiving device 100 receives information for signaling the broadcast service property based on the broadcast service (S2045). More specifically, the broadcast receiving device 100 may receive the information for signaling the broadcast service property from a broadcast transmitting device 300 through a broadcast reception unit 110.

The broadcast receiving device 100 notifies the companion device 200 of whether the broadcast service property is changed and of a URL capable of acquiring the broadcast service property based on the information for signaling the broadcast service property (S2047). More specifically, the broadcast receiving device 100 may notify the companion device 200 of whether the broadcast service property is changed and of a URL capable of acquiring the broadcast service property based on the information for signaling the broadcast service property through the controller 150. Here, the URL may mean location information capable of acquiring service property information on a content server. More specifically, a ServicePropertyURL which is the above-described property location information may be used. In the case of a UPnP based architecture, the broadcast receiving device 100 may notify the companion device of the ServicePropertyURL according to an "eventing" protocol.

More specifically, the broadcast receiving device 100 may determine whether the broadcast service property is changed. More specifically, the broadcast receiving device 100 may determine whether the broadcast service property is changed depending on whether the version of the information for signaling the broadcast service property is changed. In addition, if the broadcast service property is changed, the broadcast receiving device 100 may notify the companion device 200 that the broadcast service property is changed and of the URL capable of acquiring the broadcast service property. In a detailed embodiment, the broadcast receiving device 100 may notify the companion device 200 of whether the broadcast service property is changed through a variable indicating whether the broadcast service property is changed. In a detailed embodiment, the variable indicating whether the broadcast service property is changed may be the ServicePropertyChangeFlag of FIG. 215. In addition, the broadcast receiving device 100 may notify the companion device 200 of whether the broadcast service property is changed through the variable indicating the URL capable of acquiring the broadcast service property. In a detailed embodiment, the variable indicating the URL capable of acquiring the broadcast service property may be the above-described ServicePropertyURL.

The companion device 200 acquires the broadcast service property based on the URL capable of acquiring the broadcast service property (S2049). More specifically, the companion device 200 may acquire the broadcast service property based on the URL capable of acquiring the broadcast service property through a controller. More specifically, the companion device 200 may acquire the broadcast service property from the content/signaling server 400 based on the URL capable of acquiring the broadcast service property. More specifically, the companion device 200 may request the broadcast service property from the content/signaling server 400 based on the URL capable of acquiring the broadcast service property and acquire the broadcast service property from the content/signaling server 400. Therefore, it is possible to reduce the load of the broadcast receiving device 100 due to communication between the broadcast receiving device 100 and the companion device 200. However, in this case, the broadcast receiving device 100 should notify the companion device whether the broadcast service property is changed even when the broadcast service property which is not required by the companion device 200 is changed. Accordingly, the broadcast receiving device 100 should perform unnecessary operation. If the companion device 200 pre-sets a necessary broadcast service property upon requesting notification from the broadcast receiving device 100, the unnecessary operation of the broadcast receiving device 100 can be reduced. This will be described with reference to FIGS. 217 to 218.

FIG. 219 is a view showing a variable indicating the state of a broadcast service property signaled from a broadcast receiving device to a companion device according to another embodiment of the present invention. In this embodiment, the broadcast receiving device 100 may notify the companion device 200 of only updated property names.

The service type and the service ID signaled from the broadcast receiving device to the companion device may be equal to those of the above-described embodiment. That is, the service type of service signaling may be atsc3.0servicesignaling:1 and the service ID may be defined as urn:atsc.org:serviceId:atsc3.0servicesignaling. The service type and the service ID may have different values according to transmission method.

(a) of FIG. 219 shows the variable indicating the state of the broadcast service property. The variable indicating the state of the broadcast service property may include a service property variable, a service property name variable, an updated service property variable and an updated property name variable.

The service property variable may be represented by a ServiceProperty. The service property variable is equal to the above-described service property variable and, in the present embodiment, an eventing method may not be used.

The service property name variable may be expressed by an A_ARG_TYPE_ServicePropertyName. The service property name variable is a state variable associated with a ServicePropertyName which is an input argument of a GetServicePropertyValue action.

The updated service property variable may be represented by an A_ARG_TYPE_UpdatedServicePropertyValue. The updated service property variable is a state variable associated with an UpdatedServiceProperty which is an output argument of a GetServicePropertyValue action.

The updated property name variable may be represented by UpdatedPropertyNames.

The updated property name variable may indicate the names of the service properties. This may be delivered from the broadcast receiving device to the CD using the eventing method and the data format may be equal to (b) or (c) of FIG. 219.

That is, as shown in (b) of FIG. 219, the updated property name variable may include the name of the changed property in the property list. For example, the updated property name variable may include property names such as ContentId, ContentName and MajorChanNum.

In addition, in another embodiment, as shown in (c) of FIG. 219, the updated property name variable may also include information on a method of updating the property names. For example, the name of an added property may be included in an added syntax, the name of a modified property may be included in a modified syntax and the name of a deleted property may be included in a deleted syntax.

FIG. 220 is a view showing an action for acquiring a broadcast service property according to an embodiment of the present invention.

A GetServiceProperty shown in (a) of FIG. 220 is a required action and may be used for the companion device 200 to acquire service property information which is being provided by the broadcast receiving device 100. This is an action used for the companion device 200 to initially acquire currently provided service property information if the companion device 200 is connected to the broadcast receiving device 100 while the service is currently being provided by the broadcast receiving device 100.

A GetServicePropertyValue is a required action and may be used for the companion device 200 to acquire a value of a specific service property name.

(b) of FIG. 220 shows an output argument for a GetServiceProperty action. In response to the GetServiceProperty action from the companion device 200, the broadcast receiving device 100 may include and return the currently provided service information in a ServiceProperty argument as a return value.

(c) of FIG. 220 shows input and output arguments for a GetServicePropertyValue action. The companion device 200 may use a ServicePropertyName argument in order to acquire a value corresponding to a specific property among property names acquired through a GetServiceProperty- Names action. That is, the companion device 200 may include and transmit a ServicePropertyName in a GetServicePropertyValue action as an input argument and return the value of the corresponding property as a ServiceProperty.

The embodiment of the ServicePropertyName input argument is as follows. GetServicePropertyValue ("ContentId, ContentName, MajorChanNum").

(d) of FIG. 220 shows the embodiment of the output argument of an UpdatedServicePropertyValue. That is, the UpdatedServicePropertyValue may include the values of ContentId, ContentName and MajorChanNum in propertyList.

FIG. 221 is a ladder diagram showing operation for signaling a broadcast service property from a broadcast receiving device to a companion device according to another embodiment of the present invention. In this embodiment, an updated property name variable and a GetServicePropertyValue among the variables indicating the state of the broadcast service property may be used.

The broadcast receiving device 100 and the companion device 200 generate a pairing session (DS1261). More specifically, the broadcast receiving device 100 may generate the pairing session with the companion device 200 through an IP communication unit 130. More specifically, the companion device 200 may generate the pairing session with the broadcast receiving device 100 through a communication unit. More specifically, the broadcast receiving device 100 and the companion device 200 may generate a pairing session for bidirectional communication. Detailed operation of the broadcast receiving device 100 and the companion device 200 may be equal to that of the above-described embodiment.

The companion device 200 may request broadcast service property change notification from the broadcast receiving device 100 (DS1262). More specifically, the companion device 200 may request broadcast service property notification from the broadcast receiving device 100 through a controller. Detailed operation of the companion device 200 may be equal to that of the above-described embodiment.

The broadcast receiving device 100 receives information for signaling the broadcast service property from the broadcast receiving device 100 based on the broadcast service (DS1263). More specifically, the broadcast receiving device 100 may receive information for signaling the broadcast service property from the broadcast transmitting device 300 through a broadcast reception unit 110. The broadcast transmitting device 300 may notify the broadcast receiving device 100 that the service property is changed. The broadcast receiving device 100 may change an existing broadcast service property based on the received broadcast service property. In addition, the broadcast receiving device 100 may change the variable indicating the state of the broadcast service property.

The broadcast receiving device 100 may notify the companion device 200 of an UpdatedPropertyNames state variable (DS1264). This may be notified according to an "eventing" protocol in the case of a UPnP based architecture. Here, the broadcast receiving device 100 may deliver only the changed property to the companion device 200 through UpdatedPropertyNames, if the service property is changed.

The companion device 200 may request the value of a changed service property (DS1264). That is, the companion device may request the value of a desired service property using a GetServicePropertyValue. The companion device 200 may include the name of a service property field, which desires to be acquired, in a ServicePropertyName argument and request the service property field from the broadcast receiving device 100. The companion device 200 may acquire a desired property value among the changed property fields. In addition, there may be a plurality of fields in which the companion device 200 is interested. For example, the companion device 200 may be interested in @advisoryRating and @language. If at least one of the plurality of interesting fields is changed, the companion device 200 requests and receives all changed fields.

For example, a request is made using a GetServiceProperty ("advisoryRating", "language"). The broadcast receiving device 100 may receive the GetServicePropertyValue from the companion device 200.

The companion device 200 may receive changed field information from the broadcast receiving device 100 in response to the "GetServicePropertyValue" action. An UpdatedServicePropertyValue argument may be delivered to the companion device 200 as an output of the "GetServicePropertyValue" action.

FIG. 222 is a view showing a variable indicating the state of a broadcast service property signaled from a broadcast receiving device to a companion device, an action for the broadcast service property and an action argument according to another embodiment of the present invention.

As shown in (a) of FIG. 222, the variable indicating the state of the broadcast service property may include a variable indicating the service property (ServiceProperty) and a variable indicating the name of the service property (ServicePropertyName). The ServiceProperty may be a required variable and represented in XML or JSON as a string type. The ServicePropertyName may be a required variable and represented in XML, JSON or CSV as a string type.

As shown in (b) of FIG. 222, an action for a broadcast service property may include a service property request action (GetServiceProperty) and a service property setting action (SetServiceProperty). The GetServiceProperty may be equal to the above-described action having the same name. The SetServiceProperty is a required action and may be used for the companion device to register the value of a desired property field with the broadcast receiving device.

The companion device 200 may specify a broadcast service property to be notified, while requesting broadcast service property change notification from the broadcast receiving device 100. To this end, the companion device 200 may include an action for specifying a broadcast service property to be notified. At this time, the action may have a variable indicating the broadcast service property to be notified as an input argument. Such an action may be the SetServiceProperty of the embodiment of FIG. 217. In a detailed embodiment, the SetServiceProperty may be a required action. In addition, the SetServiceProperty may have a ServicePropertyName indicating the type of the broadcast service property as an input argument. When the desired property field is delivered to and registered with the broadcast receiving device, the broadcast receiving device may notify the companion device that the registered field has changed through eventing only when the registered field is changed.

As shown in (c) of FIG. 222, the argument of the action for requesting the broadcast service property may include a ServicePropertyName and a ServiceProperty. For example, the GetServiceProperty argument may include the arguments of the ServicePropertyName and the ServiceProperty.

The ServicePropertyName may include and request the ServicePropertyName in the GetServiceProperty action as a parameter in order to acquire the value of the service property field desired by the companion device.

The ServiceProperty may be used when the values of the service property fields requested as the parameter of the GetServiceProperty action are returned.

As shown in (d) of FIG. 222, the argument of the action for setting the broadcast service property may include ServicePropertyName. For example, the SetServiceProperty argument may include a ServicePropertyName argument.

The ServiceProperyName may be an argument which may be delivered as the parameter of the SetServiceProperty action when the companion device registers desired service property fields with respect to the broadcast reception device.

FIG. 223 is a ladder diagram showing operation for signaling a broadcast service property from a broadcast receiving device to a companion device according to another embodiment of the present invention.

The broadcast receiving device 100 and the companion device 200 generates a pairing session (S2061). More specifically, the broadcast receiving device 100 may generate the pairing session with the companion device 200 through an IP communication unit 130. More specifically, the companion device 200 may generate the pairing session with the broadcast receiving device 100 through a communication unit. More specifically, the broadcast receiving device 100 and the companion device 200 may generate a pairing session for bidirectional communication. Detailed operation of the broadcast receiving device 100 and the companion device 200 may be equal to that of the embodiment of FIG. 216.

The companion device 200 may request specific broadcast service property change notification from the broadcast receiving device 100 (S2063). More specifically, the companion device 200 may request specific broadcast service property change notification from the broadcast receiving device 100 through a controller. The companion device 200 may request specific broadcast service property change notification necessary to provide supplementary information associated with the broadcast service. In a detailed embodiment, the companion device 200 may request specific broadcast service property change notification through an action for requesting only specific property change notification. At this time, an action for requesting only specific property change notification may be the above-described SetServiceProperty. Operation for requesting specific property change notification from the broadcast receiving device 100 at the companion device 200 may include the following operations. The companion device 200 may request subscription to service property change notification from the broadcast receiving device 100. The broadcast receiving device 100 may transmit an acceptance message and a subscription ID (SID) for identifying a subscription request to the companion device 200 if the request for subscription to service property change notification is accepted. The companion device 200 may request only specific broadcast service property change notification from the broadcast receiving device 100 based on the SID. More specifically, the companion device 200 may transmit a specific broadcast service property, change of which desires to be notified, along with the SID. At this time, the companion device may use the above-described SetServiceProperty action. In an embodiment, the SetServiceProperty( ) delivered from the companion device 200 to the broadcast receiving device 100 may be represented by SetServiceProperty (SID, “genre”, “language”). That is, the SID, that is, a SessionID may also be transmitted as the parameter of the SetServiceProperty action.

As another embodiment, SetServiceProperty( ) delivered from the companion device 200 to the broadcast receiving device 100 may be represented by SetServiceProperty (“genre”, “language”). Since the broadcast receiving device 100 may confirm the SID upon pairing with the companion device 200, the SID may not be transmitted as a separate parameter.

Since the SID of the companion device 200 is mapped to the ServicePropertyName, the broadcast receiving device 100 may notify the companion device 200 that the service property is changed like the following data format.

<?xml Version=“1.0”?>
<ServiceProperty>
<genre>Sports</genre>
<language>KOR</language>
</ServiceProperty>

In addition, the companion device 200 may request notification of change of a plurality of specific properties of the broadcast service from the broadcast receiving device 100. At this time, the companion device 200 may request the plurality of specific properties of the broadcast service in the form of a list.

The broadcast receiving device 100 receives information for signaling the broadcast service property based on the broadcast service (S2065). More specifically, the broadcast receiving device 100 may receive information for signaling the broadcast service property from the broadcast transmitting device 300 through the broadcast reception unit 110.

The broadcast receiving device 100 checks whether the specific broadcast service property is changed (S2067). More specifically, the broadcast receiving device 100 may check whether the specific broadcast service property is changed through a controller 150. More specifically, the broadcast receiving device 100 may determine whether the specific broadcast service property is changed. More specifically, the broadcast receiving device 100 may compare previous and current values of the specific broadcast service property and determine whether the specific broadcast service property is changed.

If the specific broadcast service property is changed, the broadcast receiving device 100 notifies the companion device 200 of whether the specific broadcast service property is changed based on information for signaling the broadcast service property (S2069). More specifically, if the specific broadcast service property is changed, the broadcast receiving device 100 may notify the companion device 200 of whether the specific broadcast service property is changed based on information for signaling the broadcast service property through the controller 150.

The companion device 200 requests the specific broadcast service property from the broadcast receiving device 100 (S2071). More specifically, the companion device 200 may request the specific broadcast service property from the broadcast receiving device 100 through a controller. More specifically, if the broadcast receiving device 100 transmits specific broadcast service property notification, the companion device 200 may request the specific broadcast service property from the broadcast receiving device 100.

The broadcast receiving device 100 notifies the companion device 200 of the specific broadcast service property (S2073). The broadcast receiving device 100 may notify the companion device 200 of the specific broadcast service property through the controller 150. More specifically, the broadcast receiving device 100 may notify the companion device of the specific broadcast service property based on the request of the companion device 200. For example, the broadcast receiving device 100 may transmit the specific broadcast service property requested by the companion device 200 to the companion device 200.

In addition, the companion device 200 may acquire a URL capable of acquiring the broadcast service property and acquire the specific broadcast service property based on the URL capable of acquiring the broadcast service property, instead of acquiring the specific broadcast service property from the broadcast receiving device 100. Through such operation, it is possible to prevent the broadcast receiving device 100 from unnecessarily notifying the companion device 200 that the broadcast service property is changed.

The broadcast receiving device 100 may receive an emergency alert of natural disaster, terrorist attack or war through a broadcast network. In addition, the broadcast receiving device 100 may notify a user of the emergency alert of natural disaster, terrorist attack or war. Accordingly, several persons can rapidly and efficiently confirm national disaster. However, if a user does not continuously view the broadcast receiving device 100, the user may not confirm such an emergency alert. Even when the user does not continuously view the broadcast receiving device 100, the user is highly likely to always hold the companion device such as a mobile phone or a tablet. Accordingly, if the broadcast receiving device 100 transmits an emergency alert to the companion device 200 and the companion device 200 displays the emergency alert, the user can rapidly and efficiently confirm the national disaster.

FIG. 224 is a view showing a process of generating and transmitting an emergency alert over a broadcast network according to an embodiment of the present invention.

An alert system for managing an emergency alert through a broadcast service enables authorities having rights to issue an emergency alert to input emergency information through an integrated public alert & warning system (IPWS) or to receive a common alerting protocol (CAP) message from the other sources. The alert system determines whether the CAP message corresponds to a current area. If the CAP message corresponds to the current area, the CAP message is inserted into a broadcast signal. Accordingly, the CAP message is transmitted through the broadcast signal. Operation for receiving the broadcast signal and transmitting the emergency alert to the user at the broadcast receiving device 100 will now be described.

FIG. 225 is a view showing extraction and display of an emergency alert signaled by a broadcast receiving device over a broadcast network according to an embodiment of the present invention.

A broadcast transmitting device 200 may extract an emergency alert table (EAT) based on a broadcast signal and extract a CAP message from the EAT. In addition, the broadcast transmitting device 200 may acquire additional information related to the emergency alert based on a non-real-time service identifier included in the EAT. More specifically, the broadcast receiving device 200 may acquire the additional information related to the emergency alert based on an EAS_NRT_service_id field in the EAT. More specifically, the broadcast receiving device 200 may acquire information on a FLUTE session for transmitting the additional information related to the emergency alert from a table for signaling a non-real-time service based on the non-real-time service identifier included in the EAT. At this time, the table for signaling the non-real-time service may be a service map table (SMT). The broadcast receiving device 200 may receive the additional information related to the emergency alert from the FLUTE session based on the information on the FLUTE session. The broadcast receiving device 200 may receive an emergency alert and display the emergency alert in a service guide for displaying information on a broadcast service and a broadcast service program. More specifically, the broadcast receiving device 200 may extract a service identifier from a guide access table (GAT), extract information corresponding to the service identifier from the table for signaling the non-real-time service, and receive the emergency alert. In a detailed embodiment, the broadcast receiving device 200 may acquire the information on the FLUTE session of the service corresponding to the service identifier extracted from the GAT. Thereafter, the broadcast receiving device 200 may receive an emergency alert message based on the information on the FLUTE session and display the emergency alert message in the service guide. The format of the CAP is shown in FIG. 226.

FIG. 227 is a view showing a service type, a service ID, a variable indicating an emergency alert state, an emergency alert action and an action argument of an emergency alert service signaled by a broadcast receiving device according to an embodiment of the present invention.

The broadcast receiving device 100 may deliver an emergency alert message to the companion device 200 and the broadcast receiving device 100 may deliver the received message to the companion device 200 without change or deliver only some of the messages received by the broadcast receiving device 100 to the companion device 200.

A UPnP device type of an embodiment of the present invention may be "urn:atsc.org"device:atsc3.0rcvr" and a service type of an EAS UPnP capable of receiving EAS data may be "urn:atsc.org:service:atsc3.0:eas:1".

As shown in (a) of FIG. 227, in an embodiment of the present invention, the service type of an emergency alert service signaled from the broadcast receiving device to the companion device may have a value of atsc3.0:atsc3.0eas:1. In addition, the Service ID information may have a value of urn:atsc.org:service:atsc3.0eas.

As a first embodiment, there is a method of delivering an emergency alert message received by a broadcast receiving device to a companion device without change. The broadcast receiving device may deliver the whole of the received message to the companion device. In this case, the companion device needs to parse the message according to Emergency Alert Message Type.

(b), (d) and (e) of FIG. 227 show the state variable, the action and the argument of the EAS UPnP service of the first embodiment.

As shown in (b) of FIG. 227, in the first embodiment, the state variable may include a variable (EmergencyAlert) indicating an emergency alert and a variable (EmergencyAlertProperty) indicating an emergency alert property. The EmergencyAlert is a required string type state variable and may be described in XML or JSON, like elements shown in (c) of FIG. 227. In (c) of FIG. 227, the EmergencyAlert may include received time information, message type information and version information.

The received time information may be represented by <dateTime> and may store information on a time when the broadcast receiving device receives the emergency message. The message type information may be represented by <messageType> and may indicate whether the message is of a CAP type or a CMAS type. The version information may be represented by <version> and indicate version information per message type.

The broadcast receiving device may receive and parse the emergency alert message and notify the companion device of the EmergencyAlert state variable in the above-described data format using the eventing protocol. Using the above-described element information, the companion device may parse the emergency alert message according to type.

The EmergencyAlertProperty state variable is a required string type state variable and may be represented in XML or JSON. The EmergencyAlertProperty may have information on the emergency alert property of the emergency alert service. That is, in addition to the type information of the message described in the embodiment of the above-described emergency alert message format, the EmergencyAlertProperty may have actual emergency alert message information. When the EmergencyAlertProperty is delivered to the companion device, an eventing protocol may or may not be used.

As shown in (d) of FIG. 227, the action of the first embodiment may include an action for requesting all emergency alert properties. This action may be represented by a GetAllEmergencyAlertProperty. This action is a required action and is used to acquire all emergency alert messages. This action may be used to acquire a changed emergency alert property. Since the action for requesting all emergency alert properties is used to acquire the content of the emergency alert message, the name of this action may be a GetAllEmergencyAlertMessage.

As shown in (e) of FIG. 227, the argument for the action of the first embodiment may include an emergency alert property. This may be represented by an EmergencyAlertProperty argument. In the above-described GetAllEmergencyAlertMessage, there may be an EmergencyAlertProperty argument. When the companion device uses a GetAllEmergencyAlertMessage action in order to acquire the content of the emergency alert message received by the broadcast receiving device, the broadcast receiving device may return the content of the emergency alert message through the EmergencyAlertProperty argument.

FIG. 228 is a ladder diagram showing operation for signaling an emergency alert from a broadcast receiving device to a companion device according to an embodiment of the present invention.

The broadcast receiving device 100 and the companion device 200 generates a pairing session (S2101). More specifically, the broadcast receiving device 100 may generate the pairing session with the companion device 200 through an IP communication unit 130. More specifically, the companion device 200 may generate the pairing session with the broadcast receiving device 100 through a communication unit. More specifically, the broadcast receiving device 100 and the companion device 200 may generate a pairing session for bidirectional communication. Detailed operation of the broadcast receiving device 100 and the companion device 200 may be equal to that of the embodiment of FIG. 208.

The companion device 200 requests emergency alert reception notification from the broadcast receiving device 100 (S2103). More specifically, the companion device 200 may request emergency alert reception notification from the broadcast receiving device 100 through a controller. More specifically, the companion device 200 may request emergency alert reception notification from the broadcast receiving device 100 using a UPnP protocol. In a detailed embodiment, the companion device 200 may request subscription to an event for emergency alert reception notification from the broadcast receiving device 100 based on an eventing protocol, in order to receive information indicating that the emergency alert state variable of the emergency alert service is changed.

The broadcast receiving device 100 receives a message including the emergency alert from the broadcast transmitting device 300 (S2105). More specifically, the broadcast receiving device 100 may receive the emergency alert message from the broadcast transmitting device 300 through the broadcast reception unit 110.

The broadcast receiving device 100 notifies the companion device 200 of information on the emergency alert message based on the emergency alert message (S2107). More specifically, the broadcast receiving device 100 may notify the companion device 200 of information on the emergency alert message based on the emergency alert message through the controller 150. In a detailed embodiment, the broadcast receiving device 100 may notify the companion device 200 of the information on the emergency alert message through a variable indicating the information on the emergency alert message. In a detailed embodiment, a variable indicating the information on the emergency alert message may be EmergencyAlert.

The companion device 200 requests the information on the emergency alert from the broadcast receiving device 100 (S2109). More specifically, the companion device 200 may request the information on the emergency alert from the broadcast receiving device 100 through the controller. In a detailed embodiment, the companion device 200 may request the emergency alert through an action for requesting the emergency alert. In a detailed embodiment, the action for requesting the emergency alert may be GetAllEmergencyAlertMessage.

The broadcast receiving device 100 notifies the companion device 200 of information on the emergency alert including all emergency alert messages (S2111). More specifically, the broadcast receiving device 100 may notify the companion device 200 of information on the emergency alert including all emergency alert messages through the controller 150. However, in this case, since all the emergency alert messages should be received, a load may be caused in operation of the broadcast receiving device 100 and the companion device 200. Accordingly, there is a need for a method of efficiently transmitting the emergency alert message to the companion device 200.

The broadcast receiving device 100 may extract and transmit information necessary for the companion device 200 from the emergency alert message. In a detailed embodiment, the broadcast receiving device 100 may extract at least one of an ID for identifying the emergency alert, information indicating the category of the emergency alert, information indicating the description of the emergency alert, information indicating the area corresponding to the emergency alert, information indicating the urgency of the emergency alert, information on the severity of disaster causing the emergency alert and information indicating the certainty of disaster causing the emergency alert, from the emergency alert message. In a detailed embodiment, the broadcast receiving device 100 may extract at least one of an identifier which is an element for identifying the emergency alert, a category which is an element indicating the category of the emergency alert, a description which is an element indicating the description of the emergency alert, an areaDesc which is an element indicating the area corresponding to the emergency alert, urgency which is an element indicating the urgency of the emergency alert, severity which is an element indicating the severity of disaster causing the emergency alert and certainty which is an element indicating the certainty of disaster causing the emergency alert, from the emergency alert message.

FIG. 229 is a view showing information included in an emergency alert notification message of a broadcast receiving device according to an embodiment of the present invention. In the ladder diagram of the first embodiment, the companion device may request the emergency alert from the broadcast receiving device and may deliver a GetAllEmergencyAlertMessage( ) for example. The broadcast receiving device may return all information included in the emergency alert message to the companion device in response to the GetAllEmergencyAlertMessage( ).

FIG. 230 is a diagram illustrating an emergency alert notification message according to an embodiment of the present invention.

A detailed description of the emergency alert notification message according to an embodiment of the present invention may include the entire aforementioned description of the emergency alert notification message.

Format of the emergency alert notification message according to an embodiment of the present invention may include JSON data format. The format of the emergency alert notification message may be used when a websocket protocol is used between a broadcast receiving apparatus (PD) and a companion device (CD).

FIGS. 231 to 233 are views showing criteria for determining priority of an emergency alert at a broadcast reception device according to another embodiment of the present invention.

The companion device 200 may determine priority based on the values of the information indicating the urgency of the emergency alert, the information on the severity of disaster causing the emergency alert and the information indicating the certainty of disaster causing the emergency alert. At this time, the companion device 200 may determine the priority of the emergency alert according to information having highest priority among the information indicating the urgency of the emergency alert, the information on the severity of disaster causing the emergency alert and the information indicating the certainty of disaster causing the emergency alert. In a detailed embodiment, the companion device 200 may divide the priority of the emergency alert into three urgency levels according to the information indicating the urgency of the emergency alert, the information on the severity of disaster causing the emergency alert and the information indicating the certainty of disaster causing the emergency alert. For example, the companion device 200 may determine that an urgency element corresponding to Immediate or Expected has highest priority, an urgency element corresponding to Future has middle priority lower than highest priority and higher than lowest priority, an urgency element corresponding to Past has lowest priority and an urgency element corresponding to Unknown corresponds to an initial value, in the embodiment of FIG. 231. At this time, the initial value may be middle priority lower than highest priority and higher than lowest priority. In addition, the companion device 200 may determine that a severity element corresponding to Extreme or Severe has highest priority, a severity element corresponding to Moderate has middle priority lower than highest priority and higher than lowest priority, a severity element corresponding to Minor has lowest priority and a severity element corresponding to Unknown corresponds to an initial value, in the embodiment of FIG. 231. At this time, the initial value may be middle priority lower than highest priority and higher than lowest priority. In addition, the companion device 200 may determine that a certainty element corresponding to Very likely or likely has highest priority, a certainty element corresponding to Possible has middle priority lower than highest priority and higher than lowest priority, a certainty element corresponding to Unlikely has lowest priority and an urgency element corresponding to Unknown corresponds to an initial value, in the embodiment of FIG. 231. At this time, the initial value may be middle priority lower than highest priority and higher than lowest priority.

In another embodiment, the companion device 200 may give a point of the priority of the emergency alert based on the values of the information indicating the urgency of the emergency alert, the information on the severity of disaster causing the emergency alert and the information indicating the certainty of disaster causing the emergency alert and determine the priority of the emergency alert according to a sum of points. In a detailed embodiment, the companion device 200 may give a point to the information indicating the urgency of the emergency alert, the information on the severity of disaster causing the emergency alert and the information indicating the certainty of disaster causing the emergency alert with the same weight. For example, the companion device 200 may give a point of 5 to the urgency element corresponding to Immediate, give a point of 4 to the urgency element corresponding to Expected, give a point of 3 to the urgency element corresponding to Future, give a point of 2 to the urgency element corresponding to Past, and give a point of 1 to the urgency element corresponding to Unknown in the embodiment of FIG. 232. In addition, the companion device 200 may give a point of 5 to the severity element corresponding to Extreme, give a point of 4 to the severity element corresponding to Severe, give a point of 3 to the severity element corresponding to Moderate, give a point of 2 to the severity element corresponding to Minor, and give a point of 1 to the urgency element corresponding to Unknown as in the embodiment of FIG. 136. In addition, the companion device 200 may give a point of 5 to the certainty element corresponding to Very likely, give a point of 4 to the certainty element corresponding to likely, give a point of 3 to the certainty element corresponding to Possible, give a point of 2 to the certainty element corresponding to Unlikely, and give a point of 1 to the certainty element corresponding to Unknown in the embodiment of FIG. 136. At this time, the companion device 200 may determine that the emergency alert has highest priority if the sum of points is greater than 10 or less than or equal to 15. In addition, the companion device 200 may determine that the emergency alert has middle priority lower than highest priority and higher than lowest priority if the sum of points is greater than 5 or less than or equal to 10. In addition, the companion device 200 may determine that the emergency alert has lowest priority if the sum of points is greater than 0 or less than or equal to 5.

In another detailed embodiment, the companion device may give a point to the information indicating the urgency of the emergency alert, the information on the severity of disaster causing the emergency alert and the information indicating the certainty of disaster causing the emergency alert with different weights. For example, the companion device 200 may give a point of 9 to the urgency element corresponding to Immediate, give a point of 8 to the urgency element corresponding to Expected, give a point of 7 to the urgency element corresponding to Future, give a point of 5 to the urgency element corresponding to Past, and give a point of 0 to the urgency element corresponding to Unknown in the embodiment of FIG. 137. In addition, the companion device 200 may give a point of 5 to the severity element corresponding to Extreme, give a point of 4 to the severity element corresponding to Severe, give a point of 3 to the severity element corresponding to Moderate, give a point of 2 to the severity element corresponding to Minor, and give a point of 0 to the urgency element corresponding to Unknown in the embodiment of FIG. 137. In addition, the companion device 200 may give a point of 6 to the certainty element corresponding to Veri likely, give a point of 5 to the certainty element corresponding to likely, give a point of 4 to the certainty element corresponding to Possible, give a point of 3 to the certainty element corresponding to Unlikely, and give a point of 0 to the certainty element corresponding to Unknown in the embodiment of FIG. 137. At this time, the companion device 200 may determine that the emergency alert has highest priority if the sum of points is greater than 10 or less than or equal to 15. In addition, the companion device 200 may determine that the emergency alert has middle priority lower than highest priority and higher than lowest priority if the sum of points is greater than 5 or less than or equal to 10. In addition, the companion device 200 may determine that the emergency alert has lowest priority if the sum of points is greater than 0 or less than or equal to 5.

The companion device 200 may display the emergency alert based on the priority of the emergency alert. In a detailed embodiment, the companion device 200 may change at least one of alarm sound, alarm duration, the number of alarms and an emergency alert display time based on the priority of the emergency alert. For example, the companion device 200 may increase alarm sound as the priority of the emergency alert increases. In addition, the companion device 200 may maintain alarm for a longer period of time as the priority of the emergency alert increases.

In the first embodiment of the present invention, the broadcast receiving device 100 should transmit the whole of the emergency alert message to the companion device. However, the companion device 200 may need some information of the emergency alert message. Accordingly, there is a method of, at the broadcast receiving device 200, transmitting only some information required by the companion device 200 of the emergency alert message. This will be described in the following second embodiment.

FIG. 234 is a view showing a variable indicating the state of an emergency alert signaled by a broadcast reception device, an emergency alert action and an action argument according to another embodiment of the present invention. The following description may correspond to the second embodiment. The UPnP device type of the present invention may be "urn:atsc.org"device:atsc3.0rcvr" and the service type of the EAS UPnP service capable of receiving EAS data may be "urn:atsc.org:service:atsc3.0:eas:1". The Service Type and the Service ID are equal to those of the first embodiment.

The companion device 200 may specify specific information of the emergency alert to be acquired while requesting information on the emergency alert from the broadcast receiving device 100. The specific information of the emergency alert may be one or more of a plurality of pieces of information included in an emergency alert message. At this time, the broadcast receiving device 100 may transmit the specific information of the emergency alert to the companion device 200. To this end, the companion device 200 may use an action for requesting the specific information of the emergency alert. At this time, the action may have a variable for identifying the specific information of the emergency alert as an input argument.

(a) of FIG. 234 shows state variables belonging to the EAS UPnP service of the second embodiment. As shown in the figure, the state variables belonging to the EAS UPnP service may include EmergencyAlert, EmergencyAlertProperty and EmergencyAlertField state variables.

The EmergencyAlert is a required string type state variable and is equal to that of the first embodiment. The EmergencyAlert may have an XML or JSON string type.

The EmergencyAlertProperty is a required string type state variable and a desired field of the message may be received as the EmergencyAlertProperty by inputting the desired field in the EmergencyAlertField. The EmergencyAlertProperty may have an XML or JSON string type.

One or more fields may be input to the EmergencyAlertField, the value of the input field may be received as EmergencyAlertProperty, the whole of the message may be received as EmergencyAlertProperty if the value of the EmergencyAlertField is not given. If the whole of the message is returned, the EmergencyAlertProperty is equal to that of the first embodiment. The EmergencyAlertField may have a CSV, XML or JSON string type.

As shown in (b) of FIG. 234, in the second embodiment, the action for requesting the specific information of the emergency alert may be a GetEmergencyAlertProperty. The GetEmergencyAlertProperty is a required action and is an action for acquiring the whole of the message of the emergency alert. This action may be used to acquire a changed Emergency Alert Property. If this action is used to acquire information included in the emergency alert message, the name of the action may be represented by a GetEmergencyAlertMessage.

As shown in (c) of FIG. 234, in the second embodiment, the GetEmergencyAlertMessage may include EmergencyAlertProperty and EmergencyAlertField arguments. If the GetEmergencyAlertMessage action is used for the companion device to acquire the whole or some of the information included in the emergency alert message received by the broadcast receiving device, only desired alert message information may be requested using an EmergencyAlertField parameter. The broadcast receiving device may return the whole or some of the information included in the emergency alert message through the EmergencyAlertProperty argument.

FIG. 235 is a ladder diagram showing operation for signaling an emergency alert from a broadcast receiving device to a companion device according to another embodiment of the present invention, that is, the method of receiving the emergency alert state variable at the broadcast receiving device and the companion device according to the second embodiment.

The broadcast receiving device 100 and the companion device 200 generate a pairing session (S2121). More specifically, the broadcast receiving device 100 may generate a pairing session with the companion device 200 through an IP communication unit 130. More specifically, the companion device 200 may generate a pairing session with the broadcast receiving device 100 via a communication unit. As described above, the broadcast receiving device 100 and the companion device 200 may generate a pairing session for bidirectional communication. Detailed operation of the broadcast receiving device 100 and the companion device 200 may be equal to that of the above-described first embodiment.

The companion device 200 requests emergency alert reception notification from the broadcast receiving device 100 (S2123). More specifically, the companion device 200 may request emergency alert reception notification from the broadcast receiving device 100 through the controller, in order to receive information indicating that the emergency alert state variable has changed. Detailed operation of the companion device 200 is equal to that of the first embodiment.

The broadcast receiving device 100 receives an emergency alert message including an emergency alert based on the broadcast service (S2125). More specifically, the broadcast receiving device 100 may receive the emergency alert message including an emergency alert from the broadcast transmitting device 300 through broadcast reception unit 110.

The broadcast receiving device 100 notifies the companion device 200 of information on the emergency alert message based on the emergency alert message (S2127). More specifically, the broadcast receiving device 100 may notify the companion device 200 of the information on the emergency alert message based on the emergency alert message through the controller 150. In addition, in a detailed embodiment, the broadcast receiving device 100 may notify the companion device 200 of the information on the emergency alert message through a variable indicating the information on the emergency alert message. In a detailed embodiment, the broadcast receiving device 100 may notify the companion device 200 of the information on the emergency alert message through a variable indicating the information on the emergency alert message. In a detailed embodiment, the variable indicating the information on the emergency alert message may be the EmergencyAlert.

The companion device 200 requests the specific information of the emergency alert from the broadcast receiving device 100 (S2129). The companion device 200 may request the specific information of the emergency alert from the broadcast receiving device 100 through the controller. At this time, the specific information of the emergency alert may be information on the emergency alert necessary for the companion device 200 to provide an additional function for the emergency alert. In a detailed embodiment, the companion device 200 may request at least one of an ID for identifying the emergency alert, information indicating the category of the emergency alert, information indicating the description of the emergency alert, information indicating the area corresponding to the emergency alert, information indicating the urgency of the emergency alert, information on the severity of disaster causing the emergency alert and information indicating a certainty of disaster causing the emergency alert of the emergency alert message, from the broadcast receiving device 100. In a detailed embodiment, the broadcast receiving device 100 may request at least one of an identifier which is an element for identifying the emergency alert, a category which is an element indicating the category of the emergency alert, a description which is an element indicating the description of the emergency alert, an areaDesc which is an element indicating the area corresponding to the emergency alert, urgency which is an element indicating the urgency of the emergency alert, severity which is an element indicating severity of disaster causing the emergency alert and certainty which is an element indicating the certainty of disaster causing the emergency alert of the emergency alert message, from the broadcast receiving device 100. In a detailed embodiment, the companion device 200 may request the specific information of the emergency alert from the broadcast receiving device 100 using the above-described GetEmergencyAlertMessage and the EmergencyAlertField. For example, the companion device may include a desired field name in an input parameter like a GetEmergencyAlertMessage ("identifier, category, urgency, severity, certainty, description") to perform the GetEmergencyAlertMessage action in order to request some of the emergency alert message from the broadcast receiving device, for example.

The companion device may perform the GetEmergencyAlertMessage action without including a desired field name in an input parameter like a GetEmergencyAlertMessage (" ") in order to request some of the emergency alert message from the broadcast receiving device. That is, an empty string may be used. The broadcast receiving device 100 extracts the specific information of the emergency alert based on the emergency alert message (S2131). More specifically, the broadcast receiving device 100 may extract the specific information of the emergency alert based on the emergency alert message through the controller 150. More specifically, the broadcast receiving device 100 may request the specific information of the emergency alert from the emergency alert message through the controller 150. If the companion device requests the whole of the emergency alert message, the broadcast receiving device may not perform the step of extracting the specific information.

The broadcast receiving device 100 notifies the companion device 200 of the specific information of the emergency alert (S2133). More specifically, the broadcast receiving device 100 may notify the companion device 200 of the specific information of the emergency alert through the controller 150. More specifically, the broadcast receiving device 100 may notify the companion device 200 of the specific information of the emergency alert based on the request of the companion device 200. That is, in response to the GetEmergencyAlertMessage( ) which is the request for the information of the emergency alert of the companion device 200, the broadcast receiving device may deliver the whole or some of the emergency alert message to the companion device. The operation for returning the whole of the emergency alert message at the broadcast receiving device is equal to that of the first embodiment. In addition, the whole of the emergency alert message returned from the broadcast receiving device is shown in FIG. 236.

FIG. 236 is a view showing an emergency alert message in XML returned from a broadcast receiving device according to an embodiment of the present invention. The broadcast receiving device may return information on the identifier, category, urgency, severity, certainty and description requested by the companion device.

FIG. 237 is a view showing a variable indicating the state of an emergency alert signaled by a broadcast receiving device, an emergency alert action and an action argument according to another embodiment of the present invention. The following description may correspond to a third embodiment of the present invention.

In addition to delivery of the emergency alert message described in the first and second embodiments, the broadcast receiving device may deliver emergency alert related supplementary information to the companion device. The broadcast receiving device may receive supplementary information other than the message through a service provided by a next-generation hybrid broadcast system. The broadcast receiving device may deliver a Service ID and an Emergency Message ID to the companion device. In addition, the broadcast receiving device may deliver an URL to the companion device and the companion device may receive the emergency alert related supplementary information through a content provider or a broadcast server using the received URL. The service Type and the Service ID are equal to those of the first embodiment.

As shown in (a) of FIG. 237, the state variable may include an EmergencyAlert. The EmergencyAlert is a required variable and may have an XML or JSON string type. For example, the EmergencyAlert may be XML having the element shown in (b) of FIG. 237. <ServiceId> may indicate the ID of the service which is being provided by the PD. <MessageId> may indicate the ID of the emergency alert message received by the PD. <MessageURI> may indicate the URL of the emergency alert related supplementary information on the content server. In addition, <MessageURI> may indicate the location of the emergency alert related supplementary information in the broadcast receiving device when the broadcast receiving device receives the emergency alert related supplementary information through a protocol such as FLUTE. In this case, the embodiment of the URI may be equal to "file://EAS/messageFiles/". If the start of the URI is http:// or https://, the URL of the content server may be indicated and, otherwise the location of the PD may be indicated.

As shown in (c) of FIG. 237, the action for the emergency alert may include an action for requesting the emergency alert information. This may be represented by GetEmergencyAlertInfo. The GetEmergencyAlertInfo action may be used for the companion device to request a ServiceId, a MessageId and a MessageURI for the emergency alert message related supplementary information from the broadcast receiving device after the broadcast receiving device is paired with the companion device.

As shown in (d) of FIG. 237, the action argument may include an emergency alert argument. When the companion device requests a GetEmergencyAlertInfo action, the broadcast receiving device may return the ServiceId, the MessageId and the MessageURI for the emergency alert message related supplementary information through the EmergencyAlert argument.

FIG. 238 is a ladder diagram showing operation for signaling an emergency alert from a broadcast receiving device to a companion device according to another embodiment of the present invention, that is, the method of, at the broadcast receiving device and the companion device, receiving the emergency alert state variable according to the third embodiment.

The broadcast receiving device 100 may generate a pairing session through discovery of and pairing with the companion device 200 such as a mobile phone (DS1421). Discovery and pairing may be equal to those of the above-described embodiment.

The companion device 200 may request subscription to the emergency alert information from the broadcast receiving device 100 (DS1422). The companion device may make a request for notifying the companion device of the emergency alert state variable of the emergency alert service from the broadcast receiving device.

The broadcast transmitting device 300 may notify the broadcast receiving device 100 of the emergency alert message (DS1423).

The broadcast receiving device 100 may notify the companion device 200 of an emergency alert state variable (EmergencyAlert state variable) (DS1424). In the case of a UPnP based architecture, the broadcast receiving device 100 may notify the companion device of the emergency alert state variable according to an "eventing" protocol. Here, the emergency alert state variable may include a messageId, a ServiceId and a messageURL as described above.

The companion device 200 may request supplementary information stored in the broadcast receiving device 100 using the received messageId and ServiceId (DS1425). In addition, the companion device 200 may request the supplementary information through the URL of the content server 400 using the messageURL (DS1426).

The method of delivering the emergency alert message related supplementary information from the companion device 200 through the URI of the content server 400 or the URI of the broadcast receiving device 100 may be equal to that of the above-described embodiment.

FIG. 239 is a view showing a variable indicating the state of an emergency alert signaled by a broadcast receiving device according to another embodiment of the present invention. The following description may correspond to a fourth embodiment.

The broadcast receiving device may configure a UI to be displayed to a user after receiving the emergency alert message. In addition, the emergency alert UI configured by the broadcast receiving device may be displayed on the companion device. In this case, the broadcast receiving device may configure a separate UI for the companion device. An embodiment of using a UPnP will be described.

The fourth embodiment is different from the third embodiment in that the UI configured by the broadcast receiving device may be displayed on the companion device without delivering the emergency alert message received by the broadcast receiving device.

After the broadcast receiving device configures the UI, for example, the broadcast receiving device delivers a UI page configured in relation to the emergency alert message, that is, the URI of a html page, to the companion device and then companion device may access the html page and view the UI related to the emergency alert message.

The service type and the service ID are equal to those of the first embodiment.

(a) of FIG. 239 shows the state variable belonging to the EAS UPnP service of the fourth embodiment. The state variable may include a state variable indicating an emergency alert. This may be represented by an EmergencyAlert. The EmergencyAlert is a required state variable and may have an XML string type. The EmergencyAlert may be used to notify the companion device that the broadcast receiving device receives the emergency alert message. The EmergencyAlert may be XML having the element shown in (b) of FIG. 239. The state variable indicating the emergency alert may include information on a service identifier, a message identifier and a location list.

The service identifier may be represented by <ServiceId> and may indicate the identifier of the service which is being provided by the broadcast receiving device. The message identifier may be represented by <MessageId> and may indicate the identifier of the emergency alert message received by the broadcast receiving device. The location list may be represented by <URIList> and may indicate the list of URIs indicating the location of the html page using the emergency alert message received by the broadcast receiving device. The location information included in the location list may be represented by <URI> and may indicate the location of the html page configuring the UI using the emergency alert message received by the broadcast receiving device. The location information may be included in <URIList> and there may be one or more pieces of location information. The state variable indicating the emergency alert may be used for the broadcast receiving device to receive and deliver the emergency alert message to the companion device.

In addition, the state variable may include a state variable indicating an emergency alert location. The state variable indicating the emergency alert location may be represented by an A_ARG_TYPE_EmergencyAlertURI. The A_ARG_TYPE_EmergencyAlertURI may be associated with an output argument of an action for the location of the emergency alert and the embodiment of the data format is shown in (c) of FIG. 239.

FIG. 240 is a view showing an action and action argument of an emergency alert signaled by a broadcast receiving device according to another embodiment of the present invention. The following description may correspond to the action and action argument for the emergency alert used in the fourth embodiment of the present invention.

As shown in (a) of FIG. 240, the action for the emergency alert used in the fourth embodiment may include an action for requesting the emergency alert and an action for requesting the location of the emergency alert.

The action for requesting the emergency alert may be represented by a GetEmergencyAlert action. The companion device may check whether the broadcast receiving device receives the emergency using the GetEmergencyAlert action alert message after pairing. The companion device may use the GetEmergencyAlert action after the broadcast receiving device has received the emergency alert message.

The action for requesting the location of the emergency alert may be represented by GetEmergencyAlertURI action. The companion device may acquire the URI of the UI page configured by the broadcast receiving device using the GetEmergencyAlertURI action.

As shown in (b) and (c) of FIG. 240, the argument of the action for emergency alert used in the fourth embodiment may include an emergency alert argument and an emergency alert location argument.

The emergency alert argument may be represented by an EmergencyAlert argument. When the companion device executes the GetEmergencyAlert action, the broadcast receiving device may deliver emergency alert message related information through the EmergencyAlert argument.

The emergency alert location argument may be represented by an EmergencyAlertURI argument. When the companion device executes the GetEmergencyAlertURI action, the broadcast receiving device may deliver URI information of the UI configured by the broadcast receiving device to the companion device through the EmergencyAlertURI argument. Although this URI information may be obtained through eventing of GetEmergencyAlert( ) action or EmergencyAlert state variable, since the GetEmergencyAlertURI( ) action does not deliver information other than the URI, transmission efficiency may increase. Alternatively, an A_ARG_TYPE_EmergencyAlertURI state variable may be defined as an eventing variable and may be delivered to the companion device without a separate action.

FIG. 241 is a ladder diagram showing operation for signaling an emergency alert from a broadcast receiving device to a companion device according to another embodiment of the present invention, that is, a ladder diagram according to the fourth embodiment.

The broadcast receiving device 100 and the companion device 200 generates a pairing session (S2161). More specifically, the broadcast receiving device 100 may generate a pairing session with the companion device 200 through an IP communication unit 130. More specifically, the companion device 200 may generate a pairing session with the broadcast receiving device 100 via a communication unit. As described above, the broadcast receiving device 100 and the companion device 200 may generate a pairing session for bidirectional communication as described above.

The companion device 200 requests emergency alert reception notification from the broadcast receiving device 100 (S2163). More specifically, the companion device 200 may request emergency alert reception notification from the broadcast receiving device 100 through the controller, such that the companion device is notified that the state variable indicating the emergency alert of the emergency alert service is changed.

The broadcast receiving device 100 receives the emergency alert message based on the broadcast service (S2165). More specifically, the broadcast receiving device 100 may receive the emergency alert message from the broadcast transmitting device 300 through the broadcast reception unit 110.

The broadcast receiving device 100 notifies the companion device 200 of the information on the emergency alert message and the UI information of the emergency alert based on the emergency alert message (S2167). More specifically, the broadcast receiving device 100 may notify the companion device 200 of the information on the emergency alert message and the UI information of the emergency alert based on the emergency alert message through the controller 150. At this time, the UI information of the emergency alert may include a list of UIs of the emergency alert.

The companion device 200 requests the UI of the emergency alert from the broadcast receiving device 100 based on the UI information of the emergency alert (S2169). More specifically, the companion device 200 may request the UI information of the emergency alert from the broadcast receiving device 100 through the controller based on the UI information of the emergency alert.

The broadcast receiving device 100 may transmit a URI capable of acquiring the UI of the emergency alert to the companion device 200 based on the request of the companion device 200 (S2171). The broadcast receiving device 100 may transmit a URI capable of acquiring the UI of the emergency alert to the companion device 200 through the controller 150 based on the request of the companion device 200.

The companion device 200 displays the UI of the emergency alert based on the URI capable of acquiring the UI of the emergency alert (S2173). The companion device 200 may display the UI of the emergency alert through the controller based on the URI capable of acquiring the UI of the emergency alert. More specifically, the companion device 200 may acquire the UI based on the URI capable of acquiring the UI of the emergency alert. At this time, the companion device 200 may acquire the UI of the emergency alert from an external server. For example, the companion device 200 may receive at least one of an image file, an HTML file and an XML file for the UI of the emergency alert from an external server. At this time, the external server may be the content/signaling server 400. In another detailed embodiment, the companion device 200 may pre-store the UIs of the emergency alert and retrieve the UI corresponding to the URI among the stored UIs. In addition, the companion device 200 may display the UI of the emergency alert acquired through such operation. Since the companion device 200 processes the emergency alert through such operation, it is possible to reduce the load of the companion device 200. Although the companion device requires a parser for parsing the emergency message in the first embodiment, the companion device used in the fourth embodiment does not require a parser for parsing a separate emergency message, because the companion device receives a UI obtained by reconfiguring a parsed emergency message from an external device.

FIG. 242 is a ladder diagram showing operation for signaling an emergency alert from a broadcast receiving device to a companion device according to another embodiment of the present invention, that is, a ladder diagram of the case of using a GetEmergencyAlertURI action in the fourth embodiment.

The broadcast receiving device 100 and the companion device 200 generate a pairing session (DS1461). More specifically, the broadcast receiving device 100 may generate a pairing session with the companion device 200 through an IP communication unit 130. More specifically, the companion device 200 may generate a pairing session with the broadcast receiving device 100 via a communication unit. As described above, the broadcast receiving device 100 and the companion device 200 may generate a pairing session for bidirectional communication as described above.

The companion device 200 requests emergency alert reception notification from the broadcast receiving device 100 (DS1462). More specifically, the companion device 200 may request emergency alert reception notification from the broadcast receiving device 100 through the controller, such that the companion device is notified that the state variable indicating the emergency alert of the emergency alert service is changed.

The broadcast receiving device 100 receives the emergency alert message including the emergency alert based on the broadcast service (DS1463). More specifically, the broadcast receiving device 100 may receive the emergency alert message including the emergency alert from the broadcast transmitting device 300 through the broadcast reception unit 110.

The broadcast receiving device 100 may change the emergency alert state after receiving the emergency alert message including the emergency alert (DS1464). More specifically, the broadcast receiving device 100 may configure a UI for representing the emergency alert message and related supplementary information using a remote UI service after receiving the emergency alert message including the emergency alert. As another embodiment of this method, there is a method of using a remote UI service of a UPnP. The broadcast receiving device may notify the companion device that the emergency alert is generated by changing the emergency alert state.

The broadcast receiving device 100 may notify the companion device 200 of the information on the emergency alert message and the URI information of the emergency alert based on the emergency alert message (DS1465). More specifically, the broadcast receiving device 100 may notify the companion device 200 of the information on the emergency alert message and the URI information of the emergency alert through the controller 150 based on the emergency alert message.

The companion device 200 displays the UI of the emergency alert based on the URI capable of acquiring the UI of the emergency alert (DS1466). The companion device 200 may display the UI of the emergency alert through the controller based on the URI capable of acquiring the UI of the emergency alert. More specifically, the companion device 200 may acquire the UI based on the URI capable of acquiring the UI of the emergency alert. At this time, the companion device 200 may acquire the UI of the emergency alert from an external server. For example, the companion device 200 may receive at least one of an image file, an HTML file and an XML file for the UI of the emergency alert from an external server. At this time, the external server may be the content/signaling server 400. In another detailed embodiment, the companion device 200 may pre-store the UIs of the emergency alert and retrieve the UI corresponding to the URI among the stored UIs. In addition, the companion device 200 may display the UI of the emergency alert acquired through such operation. Since the companion device 200 processes the emergency alert through such operation, it is possible to reduce the load of the companion device 200. Although the companion device requires a parser for parsing the emergency message in the first embodiment, the companion device used in the fourth embodiment does not require a parser for parsing a separate emergency message, because the companion device receives a UI obtained by reconfiguring a parsed emergency message from an external device.

The companion device 200 may provide an additional service associated with the broadcast service. To this end, the broadcast receiving device 100 may transmit NRT data to the companion device 200. In particular, the broadcast receiving device 100 may transmit information for signaling a content item for an NRT service to the companion device 200. The content item is a set of one or a plurality of files necessary for NRT service presentation. More specifically, the content item is a set of one or a plurality of files intended to be treated by an NRT service provider as a single unit for NRT service presentation.

FIG. 243 is a view showing NRT data signaling information for a companion device according to an embodiment of the present invention.

In the present invention, an embodiment of using a UPnP in a method of signaling content items of an NRT service received by a broadcast receiving device to a companion device through a broadcast will be described. A module for signaling NRT items delivered from the broadcast receiving device to the companion device may be referred to as an NRT data signaling service. In an embodiment of using a UPnP, an NRTDataSignaling Service may be defined as shown in (a) of FIG. 243. The service type of the NRT data signaling service may be defined as atsc3.0:nrtdatasignaling:1 and a service identifier may be defined as urn:atsc.org:serviceId:atsc3.0:nrtdatasignaling.

(b) of FIG. 243 shows an XML schema structure of NRT data properties used in the embodiment of NRT data signaling. The NRT data signaling information for the companion device 200 may include at least one of an identifier for identifying NRT data, consumption model information indicating a consumption model of NRT data, downloading status information indicating a status in which the broadcast receiving device 100 downloads NRT data and information on a content item configuring NRT data. The information on the content item may include at least one of an identifier for identifying a content item, a content item name indicating the name of the content item, size information indicating the size of the content item, playback length information indicating a playback time of the content item and URL information indicating an URL capable of downloading the content item from a content server. The NRT data signaling information for the companion device 200 may be described in XML.

The NRT data signaling information for the companion device 200 may be described in XML in the embodiment of FIG. 243. In addition, in the embodiment of FIG. 243, the NRT data signaling information for the companion device 200 may include at least one of a DataId, a ConsumptionModel, a DownloadingStatus and a ContentItem.

The DataId indicates the unique identifier of the NRT. In a detailed embodiment, only one DataId may be present. In a detailed embodiment, there may be one DataId. The DataId may have an unsigned short data type.

The ConsumptionModel indicates the consumption model of the NRT data. The ConsumptionModel may indicate at least one of Browse & Download, Portal, Push, Triggered, Push Scripted, Portal Scripted and Electronic Program Guide (EPG). More specifically, Browse & Download indicates that the NRT services provides downloadable content. In addition, Portal indicates that the NRT service provides an experience similar to a web browser. In addition, Push indicates that the NRT service provides content based on a user request. Triggered indicates that the NRT services provides an application synchronized with an A/V program. Push Scripted indicates that a declarative object (DO) indicating the application of the NRT service provides a specific UI while providing content based on a user request. Portal Scripted indicates that the DO provides a specific UI while providing an experience similar to the web browser. EPG indicates that the NRT service provides content consumed by an EPG application of the broadcast receiving device 100. In a detailed embodiment, there may be one ConsumptionModel. In a detailed embodiment, the ConsumptionModel may have a string data type.

The DownloadingStatus indicates the downloading status of the NRT data of the broadcast receiving device 100. The downloading status of the NRT data may indicate at least one of Downloading indicating that downloading is being performed, Completed indicating that downloading is completed and Error indicating downloading failure. In a detailed embodiment, there may be one DownloadingStatus. In a detailed embodiment, DownloadingStatus may have a string data type.

The ContentItem indicates a content item included in the NRT data. In a detailed embodiment, the NRT data may include one or a plurality of content items. Accordingly, there may be one or a plurality of ContentItems.

The ContentItem may include at least one of a ContentItemId, a ContentItemName, a ContentItemSize, a PlaybackLength and an URL as attributes.

The ContentItemId is an identifier for identifying the content item. In a detailed embodiment, there may be one ContentItemId. In a detailed embodiment, contentItemId may have an unsigned short data type.

The ContentItemName indicates the name of the content item. In a detailed embodiment, there may be one or a plurality of ContentItemNames. In a detailed embodiment, ContentItemName may have a string data type.

The ContentItemSize indicates the size of the content item. In a detailed embodiment, the ContentItemSize may be represented in byte units. In a detailed embodiment, there may be one ContentItemSize. In addition, in a detailed embodiment, the ContentItemSize may have an unsigned short data type.

The PlaybackLength indicates the playback length of the content item. The PlaybackLength may be present only when the content item is video or audio. In a detailed embodiment, there may be one or a plurality of PlaybackLengths. In a detailed embodiment, PlaybackLength may have an unsigned short data type.

The URL indicates an URL capable of receiving the content item from the content server.

FIG. 244 is a view showing a broadcast receiving apparatus generating NRT data signaling information for a companion device based on NRT data signaling information for the broadcast receiving device according to an embodiment of the present invention.

The broadcast receiving device 100 may receive NRT data signaling information for broadcast receiving device 100 based on the broadcast signal. The broadcast receiving device 100 may transmit the NRT data signaling information for the companion device 200 based on the NRT data signaling information for the broadcasting receiving device 100. More specifically, the broadcast receiving device 100 may generate NRT signaling information for the companion device 200 based on the NRT data signaling information for the broadcasting receiving device 100. The broadcast receiving device 100 may transmit the generated NRT data signaling information to the companion device 200. At this time, the broadcast receiving device 100 may extract at least one of an identifier for identifying NRT data, consumption model information indicating a consumption model of NRT data and information on a content item included in NRT data from the NRT data signaling information for the broadcasting receiving device 100. The information on the content item may include at least one of a content item name indicating the name of the content item, an identifier for identifying a content item, playback length information indicating a playback length of the content item and size information indicating the size of the content item.

In a detailed embodiment, the signaling information for the broadcast receiving device 100 may be divided into information for signaling NRT data and information for signaling the content item included in the NRT data. More specifically, the information for signaling the NRT data may be a service map table (SMT) of the ATSC standard. In addition, the information for signaling the content item may be a non-real-time information table (NRT-IT) of the ATSC standard. For example, the broadcast receiving device 100 may extract a service identifier corresponding to the NRT data from the SMT and map the service identifier to the identifier of the NRT data. In addition, the broadcast receiving device 100 may extract a consumption model corresponding to the NRT data from the SMT and map the consumption model to consumption model information. In addition, the broadcast receiving device 100 may extract a content item from the NRT IT and map the content item to a content item name. In addition, the broadcast receiving device 100 may extract linkage from the NRT IT and map the linkage to a content identifier. In addition, the broadcast receiving device 100 may extract a playback length from the NRT IT and map the playback length to playback length information. In addition, the broadcast receiving device 100 may extract a content length from the NRT IT and map the content length to a content item size. In addition, the broadcast receiving device 100 may extract an Internet location from the NRT IT and map the Internet location to an URL.

In addition, in a detailed embodiment, the broadcast receiving device 100 may generate the NRT data signaling information for the companion device 200 based on the request of the companion device 200. More specifically, the broadcast receiving device 100 may generate NRT data signaling information for the companion device 200 including the properties of the NRT data requested by the companion device 200.

The broadcast receiving device 100 may extract only information necessary for the companion device 200 from the NRT signaling for the broadcast receiving device 100 and generate the NRT signaling information for the companion device 200, thereby reducing communication traffic with the companion device 200. Therefore, the broadcast receiving device 100 can reduce the load of the companion device 200 for processing the NRT data signaling information.

FIG. 245 is a view showing a variable for NRT data, an action for acquiring NRT data and an action argument according to an embodiment of the present invention.

The broadcast receiving device 100 may signal the NRT data to the companion device 200 using the variable indicating the properties of the NRT data and a variable for identifying the NRT data. The broadcast receiving device 100 may deliver the variable indicating the properties of the NRT data to the companion device 200 when the NRT data is changed. In addition, the companion device 200 may request the properties of the NRT data, which desire to be acquired, from the broadcast receiving device 100 using the variable for identifying the NRT data.

In a detailed embodiment, the variable indicating the properties of the NRT data may be NRTDataProperty as shown in (a) of FIG. 245. The NRTDataProerty is a required variable and may have an XML string data type. If the companion device 200 requests NRT data signaling notification from the broadcast receiving device 100, the broadcast receiving device 100 may transmit the NRTDataProerty to the companion device 200. The data format for representing the XML schema structure for the NRTDataProperty is shown in (b) of FIG. 245. The variable for identifying the NRT data may be NRTDataID as shown in (a) of FIG. 245. The NRTDataID is a required variable and may have a string data type.

The companion device 200 may use an action for requesting the NRT data signaling information in order to request the signaling information of the NRT data from the broadcast receiving device 100. The action for requesting the NRT data signaling information may be defined as shown in (c) of FIG. 245. The action for requesting the NRT data signaling information may use the variable for identifying the NRT data as an input argument and use the variable indicating the properties of the NRT data as an output argument, as shown in (d) of FIG. 245. At this time, the action for requesting the NRT data signaling information may be GetNRTDataProperty as shown in (c) of FIG. 245. The input argument of the GetNRTDatProperty may be an NRTDataID. The output argument of the GetNRTDatProperty may be an NRTDataProperty. That is, when the companion device uses the GetNRTDataProperty action, an NRTDataID may be included as an input parameter. In addition, the companion device may receive the NRTDataProperty of a desired NRTDataID from the broadcast receiving device through the NRTDataProperty argument.

FIG. 246 is a view showing signaling of NRT data from a broadcast receiving device to a companion device according to an embodiment of the present invention.

The broadcast receiving device 100 and the companion device 200 generate a pairing session (S2181). More specifically, the broadcast receiving device 100 may generate a pairing session with the companion device 200 through an IP communication unit 130. More specifically, the companion device 200 may generate a pairing session with the broadcast receiving device 100 via a communication unit. As described above, the broadcast receiving device 100 and the companion device 200 may generate a pairing session for bidirectional communication. In addition, the broadcast receiving device 100 may generate the pairing session based on compatibility with the application of the companion device 200 in the process of generating the pairing session. More specifically, the broadcast receiving device 100 may generate the pairing session when compatibility with the application of the companion device 200 is possible. More specifically, in order to check compatibility, the broadcast receiving device 100 may check at least one of the application version and application identifier of the companion device 200. In another detailed embodiment, the companion device 200 may check compatibility with the application of the broadcast receiving device 100 in the process of generating the pairing session. More specifically, the companion device 200 may generate the pairing session when compatibility with the application of the broadcast receiving device 100 is possible. More specifically, in order to check compatibility, the companion device 200 may check at least one of the application version and application identifier of the broadcast receiving device 100.

The companion device 200 requests NRT data signaling information notification from broadcast receiving device 100 (S2183). More specifically, the companion device 200 may request NRT data signaling information notification from broadcast receiving device 100 through the controller. More specifically, the companion device 200 may notify NRT data signaling information notification from broadcast receiving device 100 using a UPnP protocol. In a detailed embodiment, the companion device 200 may request subscription to the properties of the NRT data from the broadcast receiving device 100 based an eventing protocol.

The broadcast receiving device 100 receives the NRT data signaling information for the broadcasting receiving device 100 based on the broadcast service (S2185). More specifically, the broadcast receiving device 100 may receive the NRT data signaling information from the broadcast transmitting device 300 through the broadcast reception unit 110.

The broadcast receiving device 100 receives the NRT data based on the NRT data signaling information (S2187, S2189). More specifically, the broadcast receiving device 100 may receive the NRT data from the broadcast network based on the NRT data signaling information through the broadcast reception unit 110. In addition, the broadcast receiving device 100 may receive the NRT data from the Internet protocol network based on the NRT data signaling information through the IP communication unit 130.

The broadcast receiving device 100 notifies the companion device 200 of the NRT data signaling information for the companion device 200 based on the NRT data signaling information for the broadcasting receiving device 100 (S2191). More specifically, the broadcast receiving device 100 may notify the companion device 200 of the NRT data signaling information for the companion device 200 based on the NRT data signaling information for the broadcasting receiving device 100 through the controller 150. The broadcast receiving device 100 may generate the NRT data signaling information for the companion device 200 based on the NRT data signaling information as described above. The broadcast receiving device 100 may transmit the generated NRT data signaling information for the companion device 200 to the companion device 200. In addition, as described above, the broadcast receiving device 100 may generate the NRT data signaling information for the companion device 200 including the NRT data properties requested by the companion device 200.

As described above, the companion device 200 requests the NRT data signaling information for the companion device 200 from the broadcast receiving device 100 and acquire the NRT data signaling information for the companion device 200 (S2193, S2195). More specifically, the companion device 200 may transmit the identifier for identifying the NRT data and receive NRT data signaling information corresponding to the identifier. At this time, the broadcast receiving device 100 and the companion device 200 may the above-described actions and variables.

The companion device 200 may receive the NRT data based on the NRT data signaling information. More specifically, the companion device 200 may receive the NRT data based on the NRT data signaling information through the Internet protocol network. In another detailed embodiment, the companion device 200 may receive the NRT data from the broadcast receiving device 100 based on the NRT data signaling information. Even when the companion device 200 cannot directly receive the broadcast service and cannot access a server for providing the NRT data through the Internet protocol network, the companion device 200 can receive the NRT data.

FIG. 247 is a view showing signaling of NRT data from a broadcast receiving device to a companion device according to another embodiment of the present invention.

The broadcast receiving device 100 and the companion device 200 generate a pairing session (S2201). More specifically, the broadcast receiving device 100 may generate a pairing session with the companion device 200 through an IP communication unit 130. More specifically, the companion device 200 may generate a pairing session with the broadcast receiving device 100 via a communication unit. As described above, the broadcast receiving device 100 and the companion device 200 may generate a pairing session for bidirectional communication. Detailed operation of the broadcast receiving device 100 and the companion device 200 may be equal to that of the above-described embodiment.

The companion device 200 requests NRT data signaling information notification from the broadcast receiving device 100 (S2203). More specifically, the companion device 200 may request NRT data signaling information notification from the broadcast receiving device 100 through the controller. More specifically, the companion device 200 may request NRT data signaling information notification from the broadcast receiving device 100 using a UPnP protocol. In a detailed embodiment, the companion device 200 may request subscription to an event for NRT data properties from the broadcast receiving device 100 based on an eventing protocol.

The broadcast receiving device 100 receives the NRT data signaling information for the broadcasting receiving device 100 based on the broadcast service (S2205). More specifically, the broadcast receiving device 100 may receive the NRT data signaling information from the broadcast transmitting device 300 through the broadcast reception unit 110.

The broadcast receiving device 100 notifies the companion device 200 of NRT data signaling information for the companion device 200 based on the NRT data signaling information for the broadcasting receiving device 100 (S2207, S2209). More specifically, the broadcast receiving device 100 may notify the companion device 200 of the NRT data signaling information for the companion device 200 based on the NRT data signaling information for the broadcasting receiving device 100 through the controller 150. The broadcast receiving device 100 may generate the NRT data signaling information for the companion device 200 based on the NRT data signaling information as described above. The broadcast receiving device 100 may transmit the generated NRT data signaling information for the companion device 200 to the companion device 200. In addition, as described above, the broadcast receiving device 100 may generate the NRT data signaling information for the companion device 200 including the NRT data properties requested by the companion device 200.

The broadcast receiving device 100 begins to receive the NRT data based on the NRT data signaling information (S2211). More specifically, the broadcast receiving device 100 may begin to receive the NRT data from a broadcast network through the broadcast reception unit 110 based on the NRT data signaling information. In addition, the broadcast receiving device 100 may begin to receive the NRT data from an Internet protocol network through the IP communication unit 130 based on the NRT data signaling information.

The broadcast receiving device 100 notifies the companion device 200 of the downloading status of the NRT data (S2213). The broadcast receiving device 100 may notify the companion device 200 of the downloading status of the NRT data through the controller 150. The broadcast receiving device 100 may display the downloading status as Downloading indicating that downloading is being performed, Completed indicating that downloading is completed or Error indicating downloading failure. At this time, the broadcast receiving device 100 may display a percentage of downloading completed if the NRT data is being downloaded. For example, the broadcast receiving device 100 may display the downloading status “30% completed” during downloading. In addition, the broadcast receiving device 100 may notify the companion device 200 of the downloading status of the NRT data at a predetermined interval. For example, the broadcast receiving device 100 may notify the companion device 200 of the downloading status of the NRT data at an interval of 10 seconds. At this time, a notification period may be determined based on the request of the companion device 200. For example, the companion device 200 may transmit the notification period while requesting NRT data signaling information notification from the broadcast receiving device 100. In addition, the broadcast receiving device 100 notify the companion device 200 of the downloading status of the NRT data according to the notification period requested by the companion device 200. In addition, the broadcast receiving device 100 may notify the companion device 200 of the downloading status of the NRT data based on the percentage of downloading completed. For example, when downloading of the NRT data is completed by 30%, 60% and 100%, the broadcast receiving device 100 notify the companion device 200 of the downloading status of the NRT data.

The companion device 200 may receive the NRT data based on the NRT data signaling information. In a detailed embodiment, upon receiving information indicating that downloading of the NRT data is completed from the broadcast receiving device 100, the companion device 200 may receive the NRT data from the broadcast receiving device 100 based on the NRT data signaling information. Therefore, even when the companion device 200 cannot directly receive the broadcast service and cannot access the server for providing the NRT server through the Internet protocol network, the companion device 200 may receive the NRT data. In addition, as soon as downloading of the NRT data of the broadcast receiving device 100 is completed, the companion device 200 may request the NRT data from the broadcast receiving device 100.

The broadcast receiving device 100 may signal or transmit a media component to the companion device 200. There are many types of companion devices 200 capable of interoperating with the broadcast receiving device 100. The various types of companion device 200 have different capabilities. Accordingly, it is difficult to provide media components presentable by all companion devices 200. In addition, if the companion device 200 cannot present the received media component, a user experiences inconvenience. In order to solve this problem, the broadcast receiving device 100 needs to signal device capability information indicating the capability of the device used to present the media component to the companion device 200.

FIG. 248 is a view showing device capability information signaled from a broadcast receiving device to a companion device according to an embodiment of the present invention. In an embodiment of using a UPnP, a device capability signaling service for signaling device capabilities from the broadcast receiving device 100 to the companion device 200 (DeviceCapabilitySignlaing Service) may be defined as shown in (a) of FIG. 248. That is, the service type of the DeviceCapabilitySignlaing Service may be defined as atsc3.0:devservicesignaling:1 and the service identifier thereof may be defined as urn:atsc.org:serviceId:atsc3.0:devservicesignaling.

The device capability information indicating the capabilities of the device necessary to present the media component may be signaled from the broadcast receiving device 100 to the companion device 200. The device capability information may include information on a plurality of media components. The device capability information may include at least one of a media component identifier for identifying the media component, a media component type indicating the type of the media component, information on video if the media component includes video, audio codec information indicating the codec of audio if the media component includes audio, closed caption codec information indicating the encoding format for the closed caption if the media component includes closed caption, application version information indicating the version of an application if the media component includes the application, capability code if the media component is an NRT content item, an NRT file or user request component and a media component URL indicating the URL capable of acquiring the media component. The information on the video included in the media component may include at least one of video codec information indicating the codec of video, video resolution information including the resolution of video and aspect ratio information indicating the aspect ratio of video.

The device capability information may be described in an XML in the embodiment of (b) or (c) of FIG. 248. The device capability information may include one or a plurality of ComponentItems indicating one media component as attributes. The ComponentItem may include at least one of a ComponentID, a ComponentType, Video, a AudioCodec, a CCCodec, an AppVersion, a CapabilityCode and an AvailComponentURL as shown in (b) of FIG. 248. Here, the Video may include at least one of a VideoCodec, Resolution and an AspectRatio as substtributes.

In addition, the ComponentItem may include at least one of a ComponentID, a ComponentType, Video, Audio, a CC, an App, a CapabilityCode and an AvailComponentURL as shown in (c) of FIG. 248. Here, the Video may include at least one of a VideoCodec, Resolution and an AspectRatio as subattributes. In addition, the Audio may include an AudioCodec as a subattribute, the CC may include a CCCodec as a subattribute, the App may include an AppVersion as a subattribute.

The ComponentID indicates an identifier for identifying the media component. In a detailed embodiment, one ComponentID may be present per ComponentItem. In a detailed embodiment, the ComponentID may have an unsignedShort data type.

The ComponentType indicates the type of the media component. In a detailed embodiment, one ComponentType may be present per ComponentItem. In a detailed embodiment, the ComponentType may have a string data type.

The Video indicates information on video included in the media component. The Video may include at least one of a VideoCodec, Resolution and an AspectRatio as attributes.

The VideoCodec indicates the codec of video included in the media component. In a detailed embodiment, one VideoCodec may be present per Video. In a detailed embodiment, the VideoCodec may have a string data type.

The Resolution indicates the resolution of video included in the media component. In a detailed embodiment, one Resolution may be present per Video. In a detailed embodiment, The Resolution may have a string data type.

The AspectRatio indicates the aspect ratio of video included in the media component. In a detailed embodiment, one AspectRatio may be present per Video. In a detailed embodiment, the AspectRatio may have a string data type.

The Audio indicates information on audio included in the media component.

The AudioCodec indicates the codec of audio included in the media component. In a detailed embodiment, the AudioCodec may have a string data type.

The CC indicates information on the closed caption included in the media component.

The CCCodec indicates the format of the closed caption included in the media component. In a detailed embodiment, the CCCodec may have a string data type.

The App indicates information on an application included in the media component.

The AppVersion indicates the version of the application included in the media component. In a detailed embodiment, the AppVersion may have an integer type.

The CapabilityCode indicates the capability code corresponding to a user request component, an NRT content item or an NRT file if the media component includes the user request component, the NRT content item or the NRT file. At this time, the value of the capability code may indicate the value defined in the ATSC NRT standard. In a detailed embodiment, the CapabilityCode may have a string data type.

The AvailComponentURL indicates an URL capable of acquiring the media component. In a detailed embodiment, the AvailComponentURL includes the same information as the media component and may indicate an URL capable of receiving an alternate media component having different device capabilities necessary for presentation. In a detailed embodiment, the AvailCompoentURL may have a Boolean data type.

FIG. 249 is a view showing a state variable indicating device capability information according to an embodiment of the present invention. This embodiment relates to the state variable in the case of using a UPnP.

The broadcast receiving device 100 may transmit the device capability information to the companion device 200. More specifically, the companion device 200 may request device capability information notification from the broadcast receiving device 100. The broadcast receiving device 100 may signal the device capability information to the companion device 200 upon receiving the capability information. In addition, the companion device 200 may request the capability information from the broadcast receiving device 100 to acquire the capability information. At this time, the broadcast receiving device 100 and the companion device 200 may use the state variable of the embodiment of FIG. 249.

In the present embodiment, a device capability property state variable and a component URL state variable may be used to signal the device capability information. The device capability property state variable may be represented by a DeviceCapabilityProperty and the component URL state variable may be represented by a ComponentURL.

As shown in (a) of FIG. 249, the DeviceCapabilityProperty may have an XML or JSON string type. The DeviceCapabilityProperty may be a required state variable. The DeviceCapabilityProperty may have information on the companion device. In addition, the companion device may subscribe to the DeviceCapabilityProperty and the broadcast receiving device may notify the companion device that the device capability information is changed in an Event format.

The DeviceCapabilityProperty state variable may indicate the property of the service for signaling the above-described device capabilities and the data format thereof is shown in (b) of FIG. 249.

The ComponentURL state variable may be used to deliver URL information from the broadcast receiving device to the companion device if a component suitable for the device capabilities of the companion device is included in the broadcast receiving device (server). The data format of the ComponentURL is shown in (c) of FIG. 249. In some embodiments, the data format of the ComponentURL state variable may be a URI type.

In order to signal the information on the device capabilities, the state variable shown in (d) of FIG. 249 may be further defined in addition to the above-described state variables. The state variable for the component may be represented by an A_ARG_TYPE_ComponentId. The A_ARG_TYPE_ComponentId may be used to deliver the ComponentId which is an input argument of a GetComponentItem action for requesting a component item. The A_ARG_TYPE_ComponentId state variable may be a required variable and may have an XML or JSON string type. The state variable for the component item may be represented by an A_ARG_TYPE_ComponentItem. The A_ARG_TYPE_ComponentItem may be used to deliver a ComponentItem which is an output argument of a GetComponentItem action for requesting a component item. The A_ARG_TYPE_ComponentItem state variable may be a required variable and may have an XML or JSON string type.

FIG. 250 is a view showing an action for acquiring device capability information and an action argument according to an embodiment of the present invention. The present embodiment relates to the action and argument in the case of using a UPnP.

As shown in (a) of FIG. 250, the action for acquiring the device capability information may include at least one of an action for requesting a component item, an action for requesting the location of a component and an action for requesting device capabilities.

The action for requesting a component item may be represented by a GetComponentItem. The GetComponentItem may be used when the companion device requests a component suitable for the device capabilities thereof from the broadcast receiving device. "Suitable for the device capabilities" may mean that the companion device may render the component or meaningful presentation is possible. The GetComponentItem may be a required action.

The action for requesting the location of the component may be represented by a GetComponentURL. The GetComponentURL may be used when the companion device requests a location capable of acquiring information on a program or a component through a content server, e.g., a URL. The GetComponentURL may be optional.

The action for requesting device capabilities may be represented by a GetDeviceCapability. The GetDeviceCapability may be used when the companion device acquires device capability information for rendering or meaningfully presenting the program or the component. The GetDeviceCapability may be a required action.

(b) of FIG. 250 shows the argument of each action for acquiring the device capability information.

The GetDeviceCapability action may receive the device capability information of the companion device necessary to render or meaningfully present the component corresponding to a ComponentID or a specific program through the GetDeviceCapability action as a DeviceCapabilityProperty argument, after pairing with the broadcast receiving device. When this action is requested in a state in that the ComponentID which is an input argument is empty, the device capability information of the program or component which is being provided by the broadcast receiving device may be received as the DeviceCapabilityProperty argument.

A GetComponentURL action may receive the location of the content server capable of acquiring information on the component corresponding to the ComponentID or a specific program through the GetComponentURL action as a ComponentURL argument. Here, the information on the component may include access URL and additional information of content enabling presentation.

If the GetComponentURL action is requested in a state in which the ComponentID which is the input argument is empty, the location of the content server capable of acquiring information on the program or component which is being provided by the broadcast receiving device may be received as the ComponentURL argument. The content server may be present in the broadcast receiving device and may be an external Internet server or a broadcast transmitting device. The companion device may request the GetComponentURL action only when the TargetScreen of the program or component requested by the GetComponentURL action is set to the companion device, that is, only when presentation is possible or permitted in the companion device. Alternatively, the ComponentURL which is the output argument may be returned only when presentation of the requested program or component is possible or permitted after the broadcast receiving device receives the request for the GetComponentURL action.

A method of requesting a component content at a companion device using a GetComponentURL action and delivering the component content from the broadcast receiving device to the companion device may use a general communication method in the second screen field.

The companion device may include the ComponentId in GetComponentItem action as an input argument to download or stream the component. The broadcast receiving device may return the ComponentItem as an output argument in response to the GetComponentItem action.

FIG. 251 is a view showing signaling of device information from a broadcast reception device to a companion device according to an embodiment of the present invention.

The broadcast receiving device 100 and the companion device 200 establish a pairing session (S2301). More specifically, the broadcast receiving device 100 may establish a pairing session with the companion device 200 through an IP communication unit 130. More specifically, the companion device 200 may establish a pairing session with the broadcast receiving device 100 via a communication unit. As described above, the broadcast receiving device 100 and the companion device 200 may establish a pairing session for bidirectional communication. Detailed operation of the broadcast receiving device 100 and the companion device 200 may be equal to that of the above-described embodiment.

The companion device 200 requests device capability information notification from the broadcast reception device 100 (S2303). More specifically, the companion device 200 may request device capability information notification from the broadcast reception device 100 through the controller. As described above, the companion device 200 may request device capability information notification from the broadcast reception device 100 using a UPnP eventing protocol.

The broadcast reception device 100 receives broadcast service signaling information based on the broadcast service (S2305). More specifically, the broadcast reception device 100 may receive broadcast service signaling information from the broadcast transmission device 300 through the broadcast reception unit 110.

The broadcast reception device 100 extracts device capability information for signaling device capabilities necessary to present the media component from the service signaling information (S2307). The broadcast reception device 100 may extract device capability information for signaling device capabilities necessary to present the media component from the service signaling information through the controller 150. In a detailed embodiment, the device capability information extracted by the broadcast reception device 100 may be equal to the above-described device capability information.

The broadcast reception device 100 notifies the companion device 200 of the device capability information (S2309). More specifically, the broadcast reception device 100 may notify the companion device 200 of the device capability information through the controller 150. In addition, the broadcast reception device 100 may edit the extracted capability information and generate the device capability information for the companion device 200. At this time, the broadcast reception device 100 may notify the companion device 200 of the device capability information for the companion device 200. In a detailed embodiment, the device capability information for the companion device 200 may include the property requested by the companion device 200. In a detailed embodiment, a variable indicating the device capability information may be the above-described DeviceCapabilityProperty.

The companion device 200 requests the media component from the broadcast reception device 100 based on the device capability information (S2311). The companion device 200 may request the media component from the broadcast reception device 100 based on the device capability information through the controller. More specifically, the companion device 200 may determine whether the specification of the companion device 200 satisfies the device capabilities included in the device capability information. For example, if the media component includes video, whether the companion device 200 has a codec capable of present video may be determined. Alternatively, if the media component includes audio, whether the companion device 200 has a codec capable of present audio may be determined. Alternatively, if the media component includes an application, whether the companion device 200 supports the version of the application may be determined. Alternatively, if the media component includes a closed caption, whether the companion device 200 supports the type of the closed caption may be determined. At this time, if the device capabilities are satisfied, the companion device 200 may request the media component from the broadcast reception device 100.

The action for requesting the component at the companion device may be divided into two actions.

As a first embodiment, the companion device may request a component URL from the broadcast reception device. This is possible when information indicating the component URL included in the DeviceCapabilityProperty is TRUE. The companion device may receive the URL information from the broadcast reception device and download or stream the component from the broadcast reception device or an external content provider (S2313).

As a second embodiment, the companion device may request the component from the broadcast reception device (GetComponent action). This is possible when information indicating the component URL included in the DeviceCapabilityProperty is FALSE. The companion device may download or stream the component from the broadcast reception device (S2313). Here, the action for requesting the component at the companion device (GetComponent action) may be equal to the above-described GetComponentItem action.

The companion device 200 present the media component (S2315). The companion device 200 may present the media component through the controller.

FIG. 252 is a view showing signaling of device information from a broadcast reception device to a companion device according to an embodiment of the present invention. The companion device may not include device capabilities necessary to present the media component. This will now be described.

Operations for establishing a pairing session between the broadcast receiving device 100 and the companion device 200 and, at the broadcast receiving device 100, notifying the companion device 200 of the device capability information is equal to those described with reference to the previous figures and thus a description thereof will be omitted.

The companion device 200 displays that the media component is not presentable to the user based on the device capability information (S2331). The companion device 200 may display that the media component is not presentable to the user through the controller based on the device capability information. More specifically, the companion device 200 may display that the media component is not presentable if the specification of the companion device 200 does not satisfy the device capabilities included in the device capability information. For example, if the media component includes video and the companion device 200 does not have a codec necessary to present video, the companion device 200 may display that video is not presentable. Alternatively, if the media component includes audio and the companion device 200 does not have a codec necessary to present audio, the companion device 200 may display that audio is not presentable. Alternatively, if the media component includes an application and the version of the application of the companion device 200 is not supported, the companion device 200 may display that the application of the companion device 200 is not executable. Alternatively, if the media component includes a closed caption and the companion device 200 does not support the closed caption, the companion device 200 may display that the closed caption is not presentable.

FIG. 253 is a view showing signaling of device information from a broadcast reception device to a companion device according to another embodiment of the present invention. Next, an embodiment in which the companion device 200 provides an opportunity to select presentation of the media component to the user if the companion device does not satisfy capabilities unnecessary to present the media component will be described.

Operations for establishing a pairing session between the broadcast receiving device 100 and the companion device 200 and, at the broadcast receiving device 100, notifying the companion device 200 of the device capability information are equal to the above-described operations and thus a description thereof will be omitted.

If the companion device 200 does not satisfy device capabilities included in the device capability information, the companion device 200 receives user input on whether to present the media component (S2351). The companion device 200 may receive user input on whether to present the media component through the controller. More specifically, the companion device 200 may display that the display capabilities required to present the media component are not satisfied and receive user input on whether to present the media component from the user. For example, if the media component includes scalable video encoding and the companion device 200 does not support an enhancement layer, the companion device 200 may display that only a base layer is presentable and receive user input. Alternatively, if the media component includes multi-channel audio and the companion device 200 does not support presentation of multi-channel audio, the companion device 200 may display that only audio of some channels is presentable and receive user input. The companion device 200 may receive user input on whether to present the media component even when necessary device capabilities are not satisfied in addition to the case where unnecessary device capabilities are not satisfied.

The companion device 200 requests the media component from the broadcast reception device 100 based on user input (S2353). The companion device 200 may request the media component from the broadcast reception device 100 based on user input through the controller.

The action for requesting the component at the companion device may be divided into two actions.

As a first embodiment, the companion device may request a component URL from the broadcast reception device. This is possible when information indicating the component URL included in DeviceCapabilityProperty is TRUE. The companion device may receive the URL information from the broadcast reception device and download or stream the component using the URL information from the broadcast reception device or an external content provider (S2353).

As a second embodiment, the companion device may request the component from the broadcast reception device (GetComponent action). This is possible when the component URL included in the DeviceCapabilityProperty is FALSE. The companion device may download or stream the component from the broadcast reception device (S2353). Here, the action for requesting the component at the companion device (GetComponent action) may be equal to the above-described GetComponentItem action.

The companion device 200 receives the media component from the broadcast reception device 100 (S2355). The companion device 200 may receive the media component from the broadcast reception device 100 through the controller.

The companion device 200 may present the media component (S2357). The companion device 200 may present the media component through the controller.

Therefore, the companion device 200 may give the user a choice for presentation of the media component even when the companion device 200 does not satisfy the device capabilities for presentation of the media component.

FIG. 254 is a view showing signaling of device information from a broadcast reception device to a companion device according to another embodiment of the present invention. If the companion device 200 does not satisfy device capabilities, the media component may not be properly presented. In order to property present the media component, the companion device 200 should receive a media component which may be properly presented. To this end, the companion device 200 may receive an alternative media component including the same information as the media component and having different capabilities for presentation from the content/signaling server 400. This will be described below.

Operations for establishing a pairing session between the broadcast receiving device 100 and the companion device 200 and, at the broadcast receiving device 100, notifying the companion device 200 of the device capability information are equal to the above-described operations and thus a description thereof will be omitted.

Based on the device capability information, the companion device 200 requests a media component URL indicating a URL capable of receiving the media component from the broadcast reception device 100 (S2381). Based on the device capability information, the companion device 200 may request the media component URL from the broadcast reception device 100 through the controller. More specifically, if the companion device 200 does not satisfy the device capabilities included in the device capability information, the companion device 200 may request the media component URL. In addition, the media component URL may indicate an URL capable of receiving an alternative media component having the same information as the media component and having different device capabilities necessary for presentation.

The broadcast reception device 100 transmits the media component URL to the companion device 200 (S2383). The broadcast reception device 100 may transmit the media component URL to the companion device 200 through the controller 150.

The companion device 200 receives the alternative media component from the content/signaling server 400 based on the alternative media component URL. More specifically, the companion device 200 performs the following operations.

The companion device 200 requests the alternative media component from the content/signaling server 400 based on the media component URL (S2385). The companion device 200 may request the media component from the content/signaling server 400 through the controller based on the media component URL. More specifically, the companion device 200 may transmit at least one of the capabilities of the companion device 200 and a component identifier for identifying the media component to request the alternative media component. In a detailed embodiment, the content/signaling server 400 may check which media component is replaced with the alternative media component requested by the companion device 200 through the component identifier. In addition, the content/signaling server 400 may find the alternative media component capable of being presented by the component device 200 from a plurality of alternative media components through the capabilities of the companion device 200 transmitted by the companion device 200.

The companion device 200 receives the alternative media component from the content/signaling server 400 (S2387). The companion device 200 may receive the alternative media component from the content/signaling server 400 through the controller. However, if there is no alternative media component satisfying the capabilities of the companion device 200 in the content/signaling server 400, a message indicating that there is no alternative media component may be received. At this time, the message indicating that there is no alternative media component may be delivered through a Boolean variable having a value TRUE or FALSE.

In addition, the companion device 200 may display the message indicating that there is no alternative media component to the user.

The companion device 200 present the media component (S2389). The companion device 200 may present the media component through the controller. Therefore, the companion device 200 may receive the alternative media component having the same information as the media component and capable of being presented. Accordingly, the broadcast reception device 100 and more companion devices 200 may interoperate.

FIG. 255 is a view showing device capability information signaled from a broadcast reception device to a companion device according to an embodiment of the present invention.

The device capability information indicating the capabilities of the device necessary to present the media component may be signaled from the broadcast reception device 100 to the companion device 200. The device capability information may include information on a plurality of media components. The device capability information may include at least one of a media component identifier for identifying the media component, a media component type indicating the type of the media component, information on video if the media component includes video, audio codec information indicating the codec of audio if the media component includes audio, closed caption codec information indicating the encoding format for the closed caption if the media component includes closed caption, application version information indicating the version of an application if the media component includes the application, capability code if the media component is an NRT content item, an NRT file or user request component and a media component URL indicating the URL capable of acquiring the media component. The information on the video included in the media component may include at least one of video codec information indicating the codec of video, video resolution information including the resolution of video and aspect ratio information indicating the aspect ratio of video.

The device capability information may be described in an XML in the embodiment of (b) or (a) of FIG. 255. The device capability information may include one or a plurality of ComponentItems indicating one media component as attributes. The ComponentItem may include at least one of a ComponentID, a ComponentType, Video, Audio, a CC, an App, a CapabilityCode and an AvailComponentURL. Here, the Video may include at least one of a VideoCodec, Resolution and an AspectRatio as substtributes. In addition, the Audio may include an AudioCodec as a subattribute, the CC may include a CCCodec as a subattribute, the App may include an AppVersion as a subattribute.

The ComponentID indicates an identifier for identifying the media component. In a detailed embodiment, one ComponentID may be present per ComponentItem. In a detailed embodiment, the ComponentID may have an unsignedShort data type.

The ComponentType indicates the type of the media component. In a detailed embodiment, one ComponentType may be present per ComponentItem. In a detailed embodiment, the ComponentType may have a string data type.

The Video indicates information on video included in the media component. The Video may include at least one of a VideoCodec, Resolution and an AspectRatio as attributes.

The VideoCodec indicates the codec of video included in the media component. In a detailed embodiment, one VideoCodec may be present per Video. In a detailed embodiment, the VideoCodec may have a string data type.

The Resolution indicates the resolution of video included in the media component. In a detailed embodiment, one Resolution may be present per Video. In a detailed embodiment, The Resolution may have a string data type.

The AspectRatio indicates the aspect ratio of video included in the media component. In a detailed embodiment, one AspectRatio may be present per Video. In a detailed embodiment, the AspectRatio may have a string data type.

The Audio indicates information on audio included in the media component.

The AudioCodec indicates the codec of audio included in the media component. In a detailed embodiment, the AudioCodec may have a string data type.

The CC indicates information on the closed caption included in the media component.

The CCCodec indicates the format of the closed caption included in the media component. In a detailed embodiment, the CCCodec may have a string data type.

The App indicates information on an application included in the media component.

The AppVersion indicates the version of the application included in the media component. In a detailed embodiment, the AppVersion may have an integer type.

The CapabilityCode indicates the capability code corresponding to a user request component, an NRT content item or an NRT file if the media component includes the user request component, the NRT content item or the NRT file. At this time, the value of the capability code may indicate the value defined in the ATSC NRT standard. In a detailed embodiment, the CapabilityCode may have a string data type.

The AvailComponentURL indicates an URL capable of acquiring the media component. In a detailed embodiment, the AvailComponentURL includes the same information as the media component and may indicate an URL capable of receiving an alternate media component having different device capabilities necessary for presentation. In a detailed embodiment, the AvailCompoentURL may have a Boolean data type. That is, as shown in (b) of FIG. 255, the device capability information may not define a Boolean data type but may define a string data type with respect to the AvailComponentURL property and may directly include URL information capable of receiving the alternative media component. If this device capability information is defined, the companion device may check an accessible URL without using the GetComponentURL.

FIG. 256 is a view showing signaling of device information from a broadcast reception device to a companion device according to an embodiment of the present invention. This embodiment relates to the case where the above-described string type AvailComponentURL property includes location information. (a) of FIG. 256 is a ladder diagram showing a method of signaling device information from the broadcast reception device to the companion device.

The broadcast receiving device 100 and the companion device 200 establish a pairing session (DS1601). More specifically, the broadcast receiving device 100 may establish a pairing session with the companion device 200 through an IP communication unit 130. More specifically, the companion device 200 may establish a pairing session with the broadcast receiving device 100 via a communication unit. As described above, the broadcast receiving device 100 and the companion device 200 may establish a pairing session for bidirectional communication. Detailed operation of the broadcast receiving device 100 and the companion device 200 may be equal to that of the above-described embodiment.

The companion device 200 requests device capability information from the broadcast reception device 100 (DS1602). More specifically, the companion device 200 may request device capability information from the broadcast reception device 100 through the controller. As described above, the companion device 200 may request device capability information from the broadcast reception device 100 using a UPnP eventing protocol.

The broadcast reception device 100 receives the broadcast service signaling information based on the broadcast service (DS1603). More specifically, the broadcast reception device 100 may receive the broadcast service signaling information from the broadcast transmitting device 300 through the broadcast reception unit 110.

The broadcast reception device 100 may extract (parse) the device capability information for signaling the capabilities of the device necessary to present the media component from the service signaling information. The broadcast reception device 100 may extract the device capability information for signaling the capabilities of the device necessary to present the media component from the service signaling information through the controller 150. In a detailed embodiment, the device capability information extracted by the broadcast reception device 100 may be equal to the above-described device capability information.

The broadcast reception device 100 may notify the companion device 200 of the device capability information (DS1604). More specifically, the broadcast reception device 100 may notify the companion device 200 of the device capability information through the controller 150. In addition, the broadcast reception device 100 may edit the extracted capability information and generate the device capability information for the companion device 200. At this time, the broadcast reception device 100 may notify the companion device 200 of the device capability information for the companion device 200.

Alternatively, the broadcast reception device 100 may receive a device capability information request action from the companion device instead of notifying the companion device 200 of the device capability information (DS1605). In this case, the broadcast reception device 100 may return the device capability information in response to the request for the device capability information (DS1606). The device capability information request action and the action argument may be equal to those described in the above-described embodiment.

The companion device may check the device capability information received from the broadcast reception device 100. In a detailed embodiment, the variable indicating the device capability information may be the above-described DeviceCapabilityProperty. The received device capability information may be described in an XML shown in (b) of FIG. 256. The received device capability information may include the AvailCompoentURL property indicating the location information of a replaceable media component. In this embodiment, the AvailCompoentURL may include specific location information, e.g., URL information.

The companion device 200 may request the media component based on the location information of the replaceable media component (DS1607). The location information of the replaceable media component may indicate the location of the replaceable media component in the broadcast reception device 100 or the location of the replaceable media component in the content/signaling server 400. Accordingly, the companion device may request the replaceable media component from the broadcast reception device 100 or the content/signaling server 400.

The companion device 200 may receive the replaceable media component from the broadcast reception device 100 or the content/signaling server 400 and present the media component through streaming or downloading (DS1608).

FIG. 257 is a view showing signaling of device information from a broadcast reception device to a companion device according to an embodiment of the present invention. This embodiment relates to the case where the above-described string type AvailComponentURL property does not include location information or the AvailComponentURL property is not present in the device capability property information. (a) of FIG. 257 is a ladder diagram showing a method of signaling device information from the broadcast reception device to the companion device.

The broadcast receiving device 100 and the companion device 200 establish a pairing session (DS1611). More specifically, the broadcast receiving device 100 may establish a pairing session with the companion device 200 through an IP communication unit 130. More specifically, the companion device 200 may establish a pairing session with the broadcast receiving device 100 via a communication unit. As described above, the broadcast receiving device 100 and the companion device 200 may establish a pairing session for bidirectional communication. Detailed operation of the broadcast receiving device 100 and the companion device 200 may be equal to that of the above-described embodiment.

The companion device 200 requests device capability information from the broadcast reception device 100 (DS1612). More specifically, the companion device 200 may request device capability information from the broadcast reception device 100 through the controller. As described above, the companion device 200 may request device capability information from the broadcast reception device 100 using a UPnP eventing protocol.

The broadcast reception device 100 receives the broadcast service signaling information based on the broadcast service (DS1613). More specifically, the broadcast reception device 100 may receive the broadcast service signaling information from the broadcast transmission device 300 through the broadcast reception unit 110.

The broadcast reception device 100 may extract (parse) the device capability information for signaling the capabilities of the device necessary to present the media component from the service signaling information. The broadcast reception device 100 may extract the device capability information for signaling the capabilities of the device necessary to present the media component from the service signaling information through the controller 150. In a detailed embodiment, the device capability information extracted by the broadcast reception device 100 may be equal to the above-described device capability information.

The broadcast reception device 100 may notify the companion device 200 of the device capability information (DS1614). More specifically, the broadcast reception device 100 may notify the companion device 200 of the device capability information through the controller 150. In addition, the broadcast reception device 100 may edit the extracted capability information and generate the device capability information for the companion device 200. At this time, the broadcast reception device 100 may notify the companion device 200 of the device capability information for the companion device 200.

Alternatively, the broadcast reception device 100 may receive a device capability information request action from the companion device instead of notifying the companion device 200 of the device capability information (DS1615). In this case, the broadcast reception device 100 may return the device capability information in response to the request for the device capability information (DS1616). The device capability information request action and the action argument may be equal to those described in the above-described embodiment.

The companion device may check the device capability information received from the broadcast reception device 100. In a detailed embodiment, the variable indicating the device capability information may be the above-described DeviceCapabilityProperty. The received device capability information may be described in an XML shown in (b) of FIG. 257. The received device capability information may include a component identifier. The received device capability information includes the AvailComponentURL property indicating the location information of the replaceable media component but the content of the AvailComponentURL is empty. Alternatively, the device capability information may not include the AvailComponentURL property.

The companion device 200 cannot know the location information of replaceable media component and thus request the media component based on the component identifier (DS1617). The companion device may request the media component from the broadcast reception device 100 using the component identifier.

The companion device 200 may receive the replaceable media component from the broadcast reception device 100 and present the media component through streaming or downloading (DS1618).

FIG. 258 is a flowchart illustrating operation of a companion device according to an embodiment of the present invention. The companion device according to the embodiment of the present invention may interoperate with the broadcast reception device for receiving the broadcast service.

The broadcast reception device 100 and the companion device 200 generate a pairing session (DS1621). More specifically, the broadcast reception device 100 may generate the pairing session with the companion device 200 through an IP communication unit 130. More specifically, the companion device 200 may generate the pairing session with the broadcast reception device 100 through a communication unit. More specifically, the broadcast reception device 100 and the companion device 200 may generate a pairing session for bidirectional communication. More specifically, the broadcast reception device 100 and the companion device 200 may generate a pairing session using a UPnP protocol. In a detailed embodiment, the broadcast reception device 100 may find the companion device 200 using the discovery protocol of a UPnP. For example, the broadcast reception device 100 may multicast a discovery message for finding a companion device through a well-known IP address. At this time, the companion device 200, which has received the multicast message, may request a description from the broadcast reception device 100. The broadcast reception device 100 may provide the description to the companion device 200 based on the request for the description of the companion device 200. The companion device 200 may access the broadcast reception device 100 based on the description. In another detailed embodiment, the companion device 200 may find the broadcast reception device 100 using the discovery protocol of the UPnP. For example, the companion device 200 may multicast a message for finding the broadcast reception device 100 for interoperation through a well-known IP address. At this time, the broadcast reception device may respond to the multicast message using a discovery message. At this time, the companion device 200, which has received the discovery message, may request a description from the broadcast reception device 100. The broadcast reception device 100 may provide the description to the companion device 200 based on the request for the description of the companion device 200. The companion device 200 may access the broadcast reception device 100 based on the description.

The companion device may transmit a request for notification of signaling information to the broadcast reception device (DS1623). More specifically, the companion device 200 may request signaling information notification from the broadcast reception device 100 through the controller. More specifically, the companion device 200 request signaling information notification from the broadcast reception device 100 using a UPnP protocol. In a detailed embodiment, the companion device 200 may request subscription to an event for the signaling information from the broadcast reception device 100 based on an eventing protocol. Here, the signaling information may include broadcast service property information, emergency alert service information, NRT data information or device capability information. The request for notification of each information may use a state variable corresponding to each of the above-described information.

The companion device may receive the signaling information (DS1625). Here, the signaling information may include broadcast service property information, emergency alert service information, NRT data information or device capability information. Reception of each information may be performed using the action and action argument corresponding to each of the above-described information.

The companion device may perform functions related to the received signaling information (DS1627). The companion device may update broadcast service property information upon receiving the broadcast service property information. The companion device may display an emergency alert message upon emergency alert service information. The companion device may update the property information of the NRT data upon receiving NRT data information. The companion device may request and receive a media component, display an unpresentable message, request and receive a replaceable medium component, or display a message for asking for user's consent, upon receiving the device capability information.

Operation of the companion device may be performed according to the embodiments described in the above figures.

FIG. 259 is a flowchart illustrating operation of a broadcast reception device according to an embodiment of the present invention.

The broadcast reception device 100 and the companion device 200 generate a pairing session (DS1631). More specifically, the broadcast reception device 100 may generate the pairing session with the companion device 200 through an IP communication unit 130. More specifically, the companion device 200 may generate the pairing session with the broadcast reception device 100 through a communication unit. More specifically, the broadcast reception device 100 and the companion device 200 may generate a pairing session for bidirectional communication. More specifically, the broadcast reception device 100 and the companion device 200 may generate a pairing session using a UPnP protocol. In a detailed embodiment, the broadcast reception device 100 may find the companion device 200 using the discovery protocol of a UPnP. For example, the broadcast reception device 100 may multicast a discovery message for finding a companion device through a well-known IP address. At this time, the companion device 200, which has received the multicast message, may request a description from the broadcast reception device 100. The broadcast reception device 100 may provide the description to the companion device 200 based on the request for the description of the companion device 200. The companion device 200 may access the broadcast reception device 100 based on the description. In another detailed embodiment, the companion device 200 may find the broadcast reception device 100 using the discovery protocol of the UPnP. For example, the companion device 200 may multicast a message for finding the broadcast reception device 100 for interoperation through a well-known IP address. At this time, the broadcast reception device may respond to the multicast message using a discovery message. At this time, the companion device 200, which has received the discovery message, may request a description from the broadcast reception device 100. The broadcast reception device 100 may provide the description to the companion device 200 based on the request for the description of the companion device 200. The companion device 200 may access the broadcast reception device 100 based on the description.

The broadcast reception device may receive signaling information for signaling the broadcast service based on the broadcast service (DS1633). Here, the signaling information may include broadcast service property information, emergency alert service information, NRT data information or device capability information. Reception of each information may be performed using the action and action argument corresponding to each of the above-described information. The broadcast reception device may receive the signaling information from the broadcast transmission device or the content/signaling server.

The broadcast reception device may notify the companion device of the signaling information (DS1635). The broadcast reception device may notify the companion device for delivering a request for subscription to the signaling information thereto of the signaling information. The broadcast reception device may selectively notify the companion device of the signaling information only when the signaling information is changed. In some embodiments, only changed information or all signaling information may be notified.

Operation of the broadcast reception device may be performed according to the embodiments described with reference to the above figures.

The broadcast reception device may notify the companion device of the signaling information received by the broadcast reception device in a state of interoperating the companion device. In addition, the companion device may perform operation corresponding thereto using the signaling information received from the broadcast reception device. Therefore, signaling and content presentation considering the properties of the companion device are possible.

Hereinafter, the description of FIGS. 260 to 270 may be added to or may be substitute for the description of FIGS. 96 to 102.

FIG. 260 is a diagram showing the configuration of a broadcast system according to an embodiment of the present invention.

The broadcast system according to the embodiment of the present invention may include a broadcast reception device, a companion device C200 and/or an external management apparatus C300. The broadcast reception device may receive and process a broadcast signal. The companion screen device C200 may be an external device for sharing audio, video and/or data including signaling information with the broadcast reception device. The companion screen device C200 may receive a broadcast service through the Internet. The companion screen device C200 may be referred to as a second broadcast reception device, a second receiver, a second screen device, a slave device (SD) and/or a companion device (CD). The detailed description of the broadcast reception device and/or the companion screen device C200 may include the above description. The external management apparatus C300 may be a content server. The external management apparatus C300 may refer to external modules of the broadcast reception device for providing broadcast services/content, such as a next-generation broadcast service/content server.

The broadcast reception device (DTV Receiver) according to the embodiment of the present invention includes at least one of a broadcast interface C110, a broadband interface C130, a companion screen interface C140, and/or a controller C150.

The broadcast interface C110 may be one or a plurality of processors for performing a plurality of functions performed by the broadcast interface C110. The broadcast interface may include one or a plurality of circuits and one or a plurality of hardware units. More specifically, the broadcast interface C110 may be a system on chip (SOC) including various semiconductor parts. At this time, the SOC may be a semiconductor device including various multimedia parts such as graphics, audio, video and modems and a semiconductor part including a processor and a DRAM. The broadcast interface C110 may include a physical layer module C113 and a physical layer IP frame module C111. The physical layer module C113 receives and processes a broadcast related signal through a broadcast channel of a broadcast network. The physical layer IP frame module C111 converts a data packet such as an IP datagram acquired from the physical layer module C113 into a specific frame. For example, the physical layer module C113 may convert an IP datagram, etc. into an RS frame or GSE.

The broadband interface C130 may be one or a plurality of processors for performing a plurality of functions performed by the broadband interface C130. The broadband interface may include one or a plurality of circuits and one or a plurality of hardware units. More specifically, the broadband interface C130 may be a system on chip (SOC) including various semiconductor parts. At this time, the SOC may be a semiconductor device including various multimedia parts such as graphics, audio, video and modems and a semiconductor part including a processor and a DRAM. The broadband interface C130 may include an Internet access control module C131. The Internet access control module C131 may control operation of the broadcast reception device for acquiring at least one of a service, content and signaling data through the communication network (broadband).

The companion screen interface C140 may discover the companion screen device C200. The companion screen interface C140 may transmit data and/or signaling information to the companion screen device C200 or receive data and/or signaling information from the companion screen device C200. The companion screen interface C140 may include at least one of a data sharing unit C141 (Data Sharing & Comm) and a device manager (C143). For example, the companion screen interface C140 may be included in the controller C150.

The data sharing unit C141 (Data Sharing & Comm) performs data transmission operation between the broadcast reception device and an external device and processes exchange related information. More specifically, the data sharing unit C141 may transmit A/V data or signaling information to the external device. In addition, the data sharing unit C141 may receive A/V data or signaling information from the external device.

The device manager C143 manages a connectable external device. More specifically, the device manager C143 may perform at least one of addition, deletion and update of the external device. In addition, the external device may be connected to the broadcast reception device and exchange data with the broadcast reception device.

The controller C150 may be one or a plurality of processors for performing a plurality of functions performed by the controller C150. The controller may include one or a plurality of circuits and one or a plurality of hardware units. More specifically, the controller C150 may be a system on chip (SOC) including various semiconductor parts. At this time, the SOC may be a semiconductor device including various multimedia parts such as graphics, audio, video and modems and a semiconductor part including a processor and a DRAM. The controller C150 may include at least one of a signaling decoder C1510, database C1520, a service signaling manager C1531, an alert signaling manager C1532, a service guide manager C1533, an application signaling manager C1534, a targeting signaling manager C1535, a streaming media engine C1541, a non-real time file processor C1542, a component synchronizer C1543, a targeting processor C1550, an application processor C1561, an alerting processor C1562, an A/V processor C1565, a redistribution module C1570, and/or a service/content acquisition controller C1580.

The signaling decoder C1510 decodes signaling information.

The database C1520 may store data. The database C1520 may include at least one of a service map database C1521, a service guide database C1523, and/or a PDI database C1525. The service map database C1521 may store information related to a service map. The service guide database C1523 may store information related to service guide data. The PDI database C1525 may store data related to PDI.

The service signaling manager C1531 parses service signaling information. The service signaling manager C1531 may perform service scan from an IP datagram and signaling information extraction, parsing and management related to a service/content. For example, the service signaling manager C1531 extracts and parses signaling information related to a service. At this time, signaling information related to the service may be signaling information related to service scan. In addition, the signaling information related to the service may be signaling information related to content provided through the service.

The alert signaling manager C1532 extracts and parses signaling information related to alerts from the IP datagram, etc.

The service guide manager C1533 extracts announcement information from the IP datagram, etc., manages a service guide (SG) database, and provides service guide information.

The application signaling manager C1534 may extract, parse and/or manage signaling information related to application acquisition from the IP datagram. The signaling information related to application acquisition may include signaling information related to an application and/or application signaling information.

The targeting signaling manager C1535 extracts and parses information for personalizing a service or content or information for signaling targeting information.

The streaming media engine C1541 may extract and decode audio/video data for A/V streaming from the IP datagram, etc. The streaming media engine C1541 may include a scheduled streaming decoder (not shown) for decoding scheduled streaming which is content streamed according to a schedule decided by a content provider such as a broadcaster. In addition, the streaming media engine C1541 may include an on-demand streaming decoder (not shown) for decoding on-demand streaming which is on-demand content.

The non-real time file processor C1542 may extract, decode and/or manage NRT data from the IP datagram, etc. and file type data such as applications. The non-real time file processor C1542 may include a file decoder (not shown) for decoding a downloaded file. The file decoder decodes a file downloaded through a broadcast network and/or a communication network. In addition, the non-real time file processor C1542 may include a file database (not shown) for storing a file. More specifically, the file database may store a file downloaded through a broadcast network and/or a communication network.

The component synchronizer C1543 synchronizes content or a service. The component synchronizer C1543 may synchronize content and a service such as streaming audio/video data and NRT data. More specifically, the component synchronizer C1543 synchronizes content decoded by at least one of the non-real time file processor C1542 and/or the streaming media engine C1541.

The targeting processor C1550 processes information for personalizing a service or content.

The application processor C1561 controls execution of an application and application related information. More specifically, the application processor C1561 processes the state of a downloaded application and display parameters.

The alerting processor C1562 processes alerts-related signaling information.

The A/V processor C1565 processes audio/video rendering related operations based on decoded audio, video, application data, etc.

The redistribution module C1570 performs operation for supporting acquisition of at least one of a service, content, service related information and content related information when a service or content is not received through the broadcast network. More specifically, it is possible to request at least one of a service, content, service related information and content related information from the external management apparatus 300.

The service/content acquisition controller C1580 controls operation of a receiver for acquiring at least one of a service, content and service or content related information. The service/content acquisition controller C1580 controls operation of a receiver for acquiring a service, content or service or content related signaling data through a broadcast network or a communication network.

FIG. 261 is a diagram showing the configuration of a broadcast reception device according to an embodiment of the present invention.

The broadcast reception device 100 may include at least one of a broadcast interface 110, a broadband interface 130, a companion screen interface (not shown), and/or a controller 150. The companion screen interface (not shown) may be included in the controller 150.

The broadcast interface 110 may include at least one of a tuner 111 and a physical frame parser 113.

The tuner 111 receives a broadcast signal transmitted through a broadcast network. The tuner 11 may convert the received broadcast signal into a physical frame format.

The physical frame parser 113 extracts a link layer frame from the physical frame of the received broadcast signal.

The broadband interface 130 receives and transmits IP data.

The controller 150 may include at least one of a physical layer controller 251, a link layer frame parser 252, an IP/UDP datagram filter 253, an application layer transport client 255, a timing controller 257, a system clock 259, a DTV control engine 261, a user input receiver 263, a signaling parser 265, a channel map database 267, an HTTP access client 269, an HTTP access cache 271, a DASH client 273, an ISO BMFF parser 275, a media decoder 277 and a file database 279.

The physical layer controller 251 controls operation of the broadcast receiver 110. More specifically, the physical layer controller 251 may control transport parameters of the broadcast signal received by the broadcast receiver 110 and selectively receive the broadcast signal. For example, the physical layer controller 251 may control the frequency of the broadcast signal received by the tuner 111. In addition, the physical layer controller 251 may control the physical frame parser 113 and extract a link layer frame from the broadcast signal.

The link layer frame parser 252 extracts data corresponding to the payload of the link layer frame from the link layer frame of the broadcast signal. More specifically, the link layer frame parser 252 may extract link layer signaling from the link layer frame. The link layer signaling signals a broadcast service through a link layer. Therefore, the broadcast reception device 100 may acquire information on the broadcast service without extracting an application layer. Accordingly, the broadcast reception device 100 may rapidly scan and switch the broadcast service. In addition, the link layer frame parser 252 may extract IP/UDP datagram from the link layer frame.

The IP/UDP datagram filter 253 extracts a specific IP/UDP datagram from the IP/UDP datagram. Since data transmission through a broadcast network or multicast through a communication network is unidirectional communication, the broadcast reception device 100 receives data other than data necessary therefor. Accordingly, the broadcast reception device 100 extracts data necessary therefor from the data stream. The IP/UDP datagram filter 253 extracts IP/UDP datagram required by the broadcast reception device 100 from an IP/UDP datagram stream. More specifically, the IP/UDP datagram filter 253 extracts an IP/UDP datagram corresponding to a specified IP address and UDP port number. At this time, the IP address may include at least one of a source address and a destination address.

The application layer transport client 255 processes application layer transport packets. More specifically, the application layer transport client 255 processes Real-time Object delivery over Unidirectional Transport (ROUTE) based ALC/LCT packets. A ROUTE protocol refers to an application layer protocol for transmitting real-time data using ALC/LCT packets. The broadcast reception device 100 may extract at least one of broadcast service signaling information, NRT data and media content from the ALC/LCT packets. At this time, the media content may be in MPEG-DASH format. More specifically, media content may be encapsulated in an ISO Base Media File Format (ISO BMFF) and transmitted through an MPEG-DASH protocol. The broadcast reception device 100 may extract an MPEG-DASH segment from the ROUTE packets. In addition, the broadcast reception device 100 may extract an ISO BMFF file from the MPEG-DASH segment.

The application layer transport client 255 may process transport packets such as ROUTE based ALC/LCT packets and/or MPEG Media transport (hereinafter, MMT) packets, collect and process several packets and generate one or more ISO Base Media File Format objects.

The timing controller 257 processes packets including system time information which is reference information of media content reproduction. In addition, the timing controller 257 may control a system clock based on the system time information.

The system clock 259 provides a reference clock for operation of the broadcast reception device 100.

The DTV control engine 261 serves as an interface between the components. More specifically, the DTV control engine 261 may deliver parameters for controlling operation of the components.

The user input receiver 263 receives user input. More specifically, the user input receiver 263 may receive at least one of remote control input and key input of a user.

The signaling parser 265 delivers information on a broadcast service, parses broadcast service signaling information for signaling the broadcast service and extracts the information on the broadcast service. More specifically, the signaling parser 265 may parse broadcast service signaling information extracted from the application layer and extract the information on the broadcast service. In another embodiment, the signaling parser 265 may parse broadcast service signaling information extracted from the link layer and extract the information on the broadcast service.

The channel map database 267 stores information on the channel map of the broadcast service. More specifically, the signaling parser 265 may extract the information on the broadcast service and store the information on the channel map in the channel map database 267. In addition, the DTV control engine 261 may acquire the information on the channel map of the broadcast service from the channel map database. At this time, the information on the channel map may include at least one of a channel number of a broadcast service and a broadcast service name of the broadcast service.

The HTTP access client 269 processes HTTP data. More specifically, the HTTP access client 269 may receive a request to a content server 50 using HTTP and receive a response from the content server 50 in response to the request.

The HTTP access cache 271 caches HTTP data to improve the processing speed of the HTTP data.

The DASH client 273 processes an MPEG-DASH segment. More specifically, the DASH client 273 may process the MPEG-DASH segment received through a communication network. More specifically, the DASH client 273 may process the MPEG-DASH extracted from the application layer of the broadcast signal received through the broadcast network.

The ISO BMFF parser 275 processes ISO BMFF packets. More specifically, the ISO BMFF parser 275 may extract media content from the ISO BMFF packets.

The media decoder 277 decodes media content. More specifically, the media decoder 277 may decode the media content and reproduce the media content.

The file database 279 stores files necessary for the broadcast service. More specifically, the file database 279 may store files extracted from the application layer of the broadcast signal.

FIG. 262 is a diagram showing an application layer transport protocol stack according to an embodiment of the present invention.

Referring to the figure, a protocol stack of a system supporting an IP based next-generation hybrid broadcast is shown.

A broadcast transmission device according to an embodiment of the present invention may transmit a broadcast service based on an application layer transport protocol stack.

The broadcast service according to the embodiment of the present invention may include media data (e.g., video data, audio data, or closed caption data) and supplementary services such as an HTML5 application, a bidirectional service, an ACR service, a second screen service, a personalization service, etc.

For example, the broadcast service of a next-generation broadcast system supporting an IP based hybrid broadcast may include real-time content data, signaling data, electronic service guide (ESG) data, and/or NRT (Non-Real Time) content data.

Such a broadcast service may be transmitted through a broadcast network such as a terrestrial, cable and/or satellite network. In addition, the broadcast service according to the embodiment of the present invention may be transmitted through the Internet (broadband).

First, a method of transmitting a broadcast service over a broadcast network will be described.

Media data may include video data, audio data and/or closed caption data. The media data may be encapsulated into MPEG (Moving Picture Expert Group)-DASH (Dynamic Adaptive Streaming over HTTP) segments and/or MMT (MPEG Media Transport) MPU (Media processing unit). For example, the file format of the MPEG-DASH segment and/or the MMT MPU may be an ISO Base Media File (hereinafter, ISO BMFF).

Signaling data, ESG data, NRT (Non Real Time) content data, and/or real-time content data may be encapsulated into application layer transport protocol packets supporting real-time transmission. For example, the real-time content data may include media data such as video data, audio data and/or closed caption data. In addition, the NRT content data may include media data and/or application data. In addition, the application layer transport protocol may include ROUTE (Real-Time Object Delivery over Unidirectional Transport) and/or MMT. The application layer transport protocol packets may include ROUTE packets and/or MMT packets. Hereinafter, the application layer transport protocol packets may be referred to as packets.

Then, the data encapsulated into application layer transport protocol packets may be encapsulated into a UDP datagram.

Then, the UDP datagram may be encapsulated into an IP datagram. For example, the IP datagram may be a datagram based on an IP Multicast or IP Unicast scheme.

Then, the IP datagram may be carried in the broadcast signal. For example, the IP datagram may be transmitted through a physical layer (Broadcast PHY).

The signaling data according to an embodiment of the present invention may be transmitted through a specific physical layer pipe (PLP) of a transport frame (or frame) transmitted through the physical layer of the broadcast network and the next-generation broadcast transmission system according to the properties of signaling. For example, the signaling format may be a format encapsulated into a bitstream or IP datagram.

Next, a method of transmitting a broadcast service through the Internet will be described.

Signaling data, ESG data, NRT Content data, and/or real-time content data may be encapsulated into HyperText Transfer Protocol (HTTP) packets.

Then, the data encapsulated into HTTP packets may be encapsulated into Transmission Control Protocol (TCP) packets. The broadcast service according to the embodiment of the present invention may be directly encapsulated into TCP packets.

Then, the TCP packets may be encapsulated into an IP datagram. For example, the IP datagram may be based on an IP Multicast or IP Unicast scheme.

Then, the IP datagram may be carried in the broadcast signal. For example, the IP datagram may be transmitted through a physical layer (Broadcast PHY).

Signaling data, ESG data, NRT content data, and/or real-time content data may be transmitted through the Internet in response to the request of the receiver.

The broadcast reception device may receive a broadcast service based on the above-described ROUTE protocol stack.

Hereinafter, the case where the above-described signaling data, ESG data, NRT Content data, and/or real-time content data are encapsulated into ROUTE transport packets will be focused upon.

ROUTE is a protocol for transmission of files through IP multicast networks. The ROUTE protocol uses Asynchronous Layered Coding (ALC) which is a base protocol designed for massively scalable multicast distribution, a Layered Coding Transport (LCT) protocol and the other well-known Internet protocols. ROUTE is an improved version of or a functional replacement for FLUTE and has additional features.

ROUTE may transmit signaling messages, electronic service guide (ESG) messages and NRT content. ROUTE is suitable for transmitting streaming media such as MPEG-DASH Media Segment files. As compared to FLUTE, ROUTE provides lower end-to-end latency through a delivery chain.

The ROUTE protocol is a generic transport application for providing transmission of an arbitrary type of object. The ROUTE protocol supports rich presentation including scene descriptions, media objects, and DRM related information. ROUTE is suitable for transmission of real-time media content and provides many features.

For example, ROUTE provides individual delivery of and access to different media components (e.g. language tracks, subtitles, alternative video views). In addition, ROUTE provides support of layered coding by enabling delivery in different transport sessions or different ROUTE sessions. In addition, ROUTE provides support for flexible FEC protection including multistage. In addition, ROUTE provides an easy MPEG-DASH combination. The MPEG-DASH combination enables synergy between broadcast and broadband delivery modes of DASH. In addition, ROUTE provides fast access to media upon joining in a ROUTE session and/or a transport session. In addition, ROUTE focuses upon the concept of delivery to provide high extensibility. In addition, ROUTE provides compatibility with existing IETF protocols and compatibility with IETF IETF-endorsed extension mechanisms.

FIG. 263 is a diagram showing a broadcast transport frame according to an embodiment of the present invention.

Hereinafter, a DP (data pipe) may be referred to as a PLP (physical layer pipe).

In one embodiment, the broadcast transport frame includes a P1 part, an L1 part, a common PLP part, an interleaved (scheduled & interleaved) PLP part and an auxiliary data part.

In one embodiment, a broadcast transmission device transmits information for transport signal detection through the P1 part of the broadcast transport frame. In addition, the broadcast transmission device may transmit tuning information for tuning of a broadcast signal through the P1 part.

In one embodiment, the broadcast transmission device transmits the configuration of the broadcast transport frame and the properties of each PLP through the L1 part. At this time, the broadcast reception device may decode the L1 part based P1 to acquire the configuration of the broadcast transport frame and the properties of each PLP.

In one embodiment, the broadcast transmission device may transmit information commonly applied to PLPs through the common PLP part. In a detailed embodiment, the broadcast transport frame may not include the common PLP part.

In one embodiment, the broadcast transmission device transmits a plurality of components included in the broadcast service through the interleaved PLP part. At this time, the interleaved PLP part includes a plurality of PLPs.

In one embodiment, the broadcast transmission device may signal information indicating through which PLP a component configuring each broadcast service is transmitted through the L1 part or the common PLP part. However, the broadcast reception device should decode the plurality of PLPs of the interleaved PLP part in order to acquire detailed broadcast service information for broadcast service scan.

Unlike, the broadcast transmission device may transmit the broadcast transport frame including a separate part including a broadcast service transmitted through the broadcast transport frame and information on components included in the broadcast service. At this time, the broadcast reception device may rapidly acquire the broadcast service and the information on the components included in the broadcast service through the separate part.

FIG. 264 is a diagram showing a broadcast transport frame according to an embodiment of the present invention.

In one embodiment, the broadcast transport frame includes a P1 part, an L1 part, a Fast Information Channel (FIC) part, an interleaved (scheduled & interleaved) PLP part and an auxiliary data part.

The parts excluding the FIC part are equal to those of the above-described embodiment.

The broadcast transmission device transmits fast information through the FIC part. Fast information may include configuration information of a broadcast stream, brief broadcast service information and component information transmitted through a transport frame. The broadcast reception device may scan a broadcast service based on the FIC part. More specifically, the broadcast reception device may extract information on the broadcast service from the FIC part. The fast information may also be referred to as link layer signaling. The broadcast reception device may parse only the link layer without parsing the application layer to acquire the broadcast service information and the component information.

Further, a specific PLP may operate as a base PLP capable of rapidly and robustly transmitting signaling of a broadcast service and content transmitted in a corresponding transport frame.

FIG. 265 is a diagram showing a broadcast transport frame according to an embodiment of the present invention.

Data transmitted through each PLP of the transport frame of the physical layer is shown in the figure. That is, the link layer signaling and/or IP datagram may be encapsulated into generic packets and transmitted through the PLP.

FIG. 266 is a diagram showing LCT packets according to an embodiment of the present invention.

An application layer transport session may be a combination of an IP address and a port number.

In Real-Time Object Delivery over Unidirectional Transport (hereinafter, ROUTE), a ROUTE session may include one or more LCT (Layered Coding Transport) sessions. For example, if one media component (e.g., DASH Representation, etc.) is transmitted through one LCT transport session, one or more media components may be multiplexed and transmitted through one application transport session. Further, one or more transport objects may be delivered through one LCT transport session and each transport object may be a DASH segment associated with DASH representation transmitted through a transport session. Alternatively, the transport object may include the above-described delivery object.

For example, if the application layer transport protocol is based on LCT, the transport packet may be configured as follows. The transport packet may include an LCT header, a ROUTE (ALC) Header, and/or payload data.

The LCT header may include at least one of an LCT version number field (V), a Congestion control flag field (C), a Reserved field (R), a Transport Session Identifier flag field (S), a Transport Object Identifier flag field (O), a Half-word flag field (H), a Sender Current Time present flag field (T), an Expected Residual Time present flag field (R), a Close Session flag field (A), a Close Object flag field (B), an LCT header length field (HDR_LEN), a Codepoint field (CP), a Congestion Control Information field (CCI), a Transport Session Identifier field (TSI), a Transport Object Identifier field (TOI), and/or a Header Extensions field.

The ROUTE (ALC) Header may include an FEC Payload ID field (not shown).

The payload data may include an Encoding Symbol(s) field.

The LCT version number field (V) may indicate a protocol version number. For example, the LCT version number field (V) may indicate an LCT version number. The LCT version number field (V) of the LCT header may be interpreted as a ROUTE version number field. The version of ROUTE may implicitly use the version "1" of an LCT building block.

For example, the version number may be '0001b'.

The Congestion control flag field (C) may indicate the length of the Congestion Control Information field. C=0 may indicate that the length of the Congestion Control Information (CCI) field is 32 bits. C=1 may indicate that the length of the Congestion Control Information (CCI) field is 64 bits. C=2 may indicate that the length of the Congestion Control Information (CCI) field is 96 bits. C=3 may indicate that the length of the Congestion Control Information (CCI) field is 128 bits.

The Reserved field (R) is reserved for future use. For example, the Reserved field (R) may be a Protocol-Specific Indication field (PSI). The Protocol-Specific Indication field (PSI) may be used as a special-purpose indicator in an LCT higher protocol. The PSI field may indicate whether current packets are source packets or FEC repair packets. Since a ROUTE source protocol transmits only source packets, the PSI field may be set to '10b'.

The Transport Session Identifier flag field (S) may indicate the length of the Transport Session Identifier field.

The Transport Object Identifier flag field (O) may indicate the length of the Transport Object Identifier field. For example, the object may mean one file and the TOI is the identification information of each object and a file having a TOI of 0 is referred to as an FDT.

The Half-word flag field (H) indicates whether a half-word (16 bits) is added to the length of the TSI and TOI field.

The Sender Current Time present flag field (T) may indicate whether a Sender Current Time (SCT) is present. T=0 may indicate that the Sender Current Time (SCT) field is not present. T=1 may indicate that the Sender Current Time (SCT) field is present. The SCT may be included in order for the transmitter to signal information indicating how long the session is processed to the receiver.

The Expected Residual Time present flag field (R) may indicate whether the Expected Residual Time (ERT) field is present. R=0 may indicate that the Expected Residual Time (ERT) field is not present. R=1 may indicate that the Expected Residual Time (ERT) field is present. The ERT may be included in order for the transmitter to signal information indicating how long session/object transmission is continued to the receiver.

The Close Session flag field (A) indicates whether the session is closed or is about to be closed.

The Close Object flag field (B) indicates whether the transmitted object is closed or is about to be closed.

The LCT header length field (HDR_LEN) may indicate the total length of the LCD header in 32-bit word units.

The Codepoint field (CP) may indicate the type of payload transmitted by current packets. According to the type of the payload, an additional payload header may be added in front of payload data.

The Congestion Control Information field (CCI) is used to transmit congestion control information such as layer numbers, logical channel numbers, sequence numbers, etc. The CCI field in the LCT header may include necessary congestion control information.

The Transport Session Identifier field (TSI) is the unique identifier of the session. The TSI may uniquely identify the session among all sessions transmitted from a specific transmitter. The TSI field may identify the transport session in ROUTE. The content of the transport session may be provided by an LSID (LCT Session Instance description).

The LSID may define what is transmitted in each LCT transport session of the ROUTE session. Each transport session may be uniquely identified by the TSI of the LCT header. The LSID may be transmitted through the same ROUTE session including the LCT transport session or may be transmitted through a communication network, a broadcast network, the Internet, a cable network and a satellite network. Means for transmitting the LSID are not limited thereto. For example, the LSID may be transmitted through a specific LCT transport session having a TSI value of “0”. The LSID may include signaling information of all transport sessions transmitted through ROUTE session. The LSID may include LSID version information and information on validity of the LSID. In addition, the LSID may include transport session information for providing information on the LCT transport session. The transport session information may include TSI information for identifying a transport session, source flow information transmitted through the TSI and providing information on a source flow for transmission of source data, repair flow information transmitted through the TSI and providing information on a repair flow for transmission repair data, and transport session property information including additional property information of the transport session.

The TOI may indicate to which object in the session the current packets are related. The TOI field may indicate to which object in the current session the payload of the current packets belongs. Mapping to the object of the TOI field may be provided by an Extended FDT.

The Extended FDT may indicate the details of file delivery data. This may be an extended FDT instance. The extended FDT may be used to generate FDT-equivalent descriptions of a delivery object along with the LCT packet header. The Extended FDT may be provided as an embedded reference. Extended FDT may be independently updated with respect to the LSID upon being provided as the reference. The Extended FDT may be provided as an in-band object of TOI=0 included in the source flow upon being referred to.

The Header Extensions field is used as an LCT header extension part for additional information transmission. The Header Extensions in the LCT may be used to accommodate optional header fields which are not always used or have variable sizes.

For example, EXT_TIME extension may be used to transmit several types of timing information. The EXT_TIME extension may include general-purpose timing information, Sender Current Time (SCT), Expected Residual Time (ERT), and/or Sender Last Change (SLC) time extensions. The EXT_TIME extension may be used for timing information having narrower applicability. For example, the EXT_TIME extension may be defined for single protocol instantiation. In this case, the EXT_TIME extension may be separately described.

The FEC Payload ID field includes identification information of a transmission block or an encoding symbol. The FEC Payload ID indicates the identifier when the above-described file is FEC-encoded. For example, the FEC Payload ID may be allocated in order for the broadcaster or the broadcast server to identify the FLUTE protocol file, if the FLUTE protocol file is FEC-encoded.

The Encoding Symbol(s) field may include data of the transmission block or the encoding symbol.

FIG. 267 is a diagram showing delivery of signaling information through a FIC and/or a PLP according to an embodiment of the present invention.

Signaling data of a next-generation broadcast system may be transmitted as follows. The broadcast transmission device may transmit signaling data of a broadcast service through the physical layer frame using Fast Information Channel (hereinafter, FIC), in order to support fast service/content scan of the broadcast reception device. If the FIC is not present, signaling data of a broadcast service may be delivered through a path for delivering link layer signaling.

Signaling information including information on a service and/or components in the service (audio, video, etc.) may be encapsulated into an IP/UDP datagram and/or application layer transport packets (e.g., ROUTE packets, MMP packets, etc.) through one or more PLPs in the physical layer frame.

The figure shows an embodiment in which such signaling data is transmitted through the FIC and/or one or more DPs. Signaling data supporting fast service scan/acquisition may be delivered through the FIC. In addition, signaling data including details of a service may be encapsulated into an IP datagram and transmitted through a specific PLP.

FIG. 268 is a diagram showing delivery of signaling information through a transport session according to an embodiment of the present invention.

Referring to FIG. 268, signaling information supporting fast service scan/acquisition may be delivered through the FIC. In addition, some of signaling information including information on a specific component in a service may be delivered through one or more transport sessions in a ROUTE session.

FIG. 269 is a diagram showing delivery of signaling information through a transport session according to an embodiment of the present invention.

Referring to the figure, signaling information supporting fast service scan/acquisition may be delivered through the FIC. In addition, signaling information including details of a service and components of the service may be delivered through one or more transport sessions in the ROUTE session.

FIG. 270 is a diagram showing the configuration of a service signaling message according to an embodiment of the present invention.

More specifically, the figure may show the syntax of a service signaling message header according to an embodiment of the present invention. The service signaling message according to the embodiment of the present invention may include a signaling message header and a signaling message. At this time, the signaling message may be expressed in a binary or XML format. In addition, the service signaling message may be included the payload of transport protocol packets.

The signaling message header according to the embodiment may include identifier information for identifying the signaling message. For example, the signaling message may take the form of a section. In this case, the identifier information of the signaling message may indicate the identifier (ID) of the signaling table section. The field indicating the identifier information of the signaling message may be a signaling_id. In one embodiment, the signaling_id field may be 8 bits. For example, if the signaling message is indicated in the form of a section, the identifier information of the signaling message may indicate the id of the signaling table section.

In addition, the signaling message header according to the embodiment may include length information indicating the length of the signaling message. The field indicating the length information of the signaling message may be a signaling_length. In a detailed embodiment, the signaling_length field may be 16 bits.

In addition, the signaling message header according to the embodiment may include identifier extension information for extending the identifier of the signaling message. At this time, the identifier extension information may be information for identifying signaling along with signaling identifier information. The field indicating the identifier extension information of the signaling message may be a signaling_id_extension. In a detailed embodiment, the signaling_id_extension field may be 16 bits.

At this time, the identifier extension information may include the protocol version information of the signaling message. The field indicating the protocol version information of the signaling message may be a protocol_version_field. In a detailed embodiment, the protocol_version_field may be 8 bits.

In addition, the signaling message header according to the embodiment may include the version information of the signaling message. The version information of the signaling message may be changed when the content included in the signaling message is changed. The field indicating the version information of the signaling message may be a version_number field. In a detailed embodiment, the version_number field may be 4 bits.

In addition, the signaling message header according to the embodiment may include information indicating whether the signaling message is currently available. The field indicating whether the signaling message is available may be a current_next_indicator. For example, if the current_next_indicator field is 1, the current_next_indicator field may indicate that the signaling message is available. As another example, if the current_next_indicator field is 0, the current_next_indicator field may indicate that the signaling message is not available and another signaling message including the same signaling identifier information, signaling identifier extension information and fragment number information is subsequently available.

In addition, the signaling message header according to the embodiment may include an indicator_flags. The indicator_flags may include at least one of a fragmentation_indicator, a payload_format_indicator, and/or an expiration_indicator.

The fragmentation_indicator may indicate whether the signaling message is fragmented. If the value of the fragmentation_indicator is '1', this may indicate that the message is fragmented. In this case, the fragmentation_indicator may indicate that only some of the signaling data is included in the signaling_message_data( ). If the value of the fragmentation_indicator is '0', the fragmentation_indicator may indicate that overall signaling data is included in the signaling_message_data( ).

The payload_format_indicator may indicate whether a payload_format value is included in the current signaling message header part. If the value of the payload_format_indicator is '1', the payload_format_indicator may indicate that the payload_format value is included in the signaling message header part.

The expiration_indicator may indicate whether an expiration value is included in the current signaling message header part. If the value of the expiration_indicator is '1', the expiration_indicator may indicate that the expiration value is included in the signaling message header part.

In addition, the signaling message header according to the embodiment may include fragment number information of the signaling message. One signaling message may be transmitted in a state of being divided into a plurality of fragments. Accordingly, information for identifying the plurality of fragments by the receiver may be fragment number information. The field indicating the fragment number information may be a fragment_number field. In a detailed embodiment, the fragment_number field may be 4 bits. For example, if one signaling message is transmitted in a state of being divided into several fragments, the fragment_number field may indicate the fragment_number of the current signaling message.

In addition, the signaling message header according to the embodiment may include the number information of a last fragment if one signaling message is transmitted in a state of being divided into a plurality of fragments. For example, if information on the last fragment number is 3, this may indicate that the signaling message is transmitted in a state of being divided into three fragments. In addition, this may indicate that the fragment including the fragment number of 3 includes the last data of the signaling message. The field indicating the number information of the last fragment may be a last_fragment_number field. In a detailed embodiment, the last_fragment_number field may be 4 bits.

In addition, the signaling message header according to the embodiment may include payload format information indicating the format of the signaling message data included in the payload. The field indicating the payload format information may be a payload_format field. For example, payload_format may indicate one of binary and/or XML.

In addition, the signaling message header according to the embodiment of the present invention may include expiration information indicating the expiration time of the signaling message included in the payload. The expiration information may be expiration.

FIG. 271 is a ladder diagram showing operation for signaling an emergency alert from a broadcast reception device to a companion device according to an embodiment of the present invention.

The broadcast reception device 100 or C100 according to the embodiment of the present invention may receive an emergency alert message from the broadcast transmission device 300 through a broadcast network (broadcast method) and transmit all and/or some of properties of the received emergency alert message to at least one companion device 200 or C200 or a companion screen device C200 using a multicast method.

For example, the broadcast reception device 100 according to the embodiment of the present invention may transmit the emergency alert message to the at least one companion device 200 using the multicast method without requesting subscription. For example, the broadcast reception device 100 according to the embodiment of the present invention may transmit all and/or some of the properties of the emergency alert message to the at least one companion device 200 using the multicast method.

The multicast method refers to a method of, at one broadcast reception device 100, simultaneously transmitting data (or datagrams) to a plurality of companion devices 200 connected to a network through the Internet. For example, one broadcast reception device 100 may transmit data to at least one companion device 200 of a selected specific group. The multicast method may unidirectionally transmit data to a specific device in one-to-many manner. In contrast, a broadcast method is different from the multicast method in that data is unidirectionally delivered to a plurality of unspecified devices. Accordingly, the multicast method may simultaneously transmit data to at least one device connected to the network.

The broadcast reception device 100 may transmit the emergency alert message to the at least one companion device 200 using the multicast method, even when the at least one companion device 200 is not paired with the broadcast reception device 100 or when the at least one companion device 200 is paired with the broadcast reception device 100 but a request for subscription to the emergency alert service of the broadcast reception device 100 is not made.

The broadcast reception device 100 according to the embodiment of the present invention and the at least one companion device 200 are connected to the network for multicast.

The at least one companion device 200 connected to the network always listens to a multicast address (IP & port) for a predefined emergency alert message (CS1105). For example, the at least one companion device 200 prepares to receive the emergency alert multicast message including the emergency alert message through the predefined multicast address (e.g., 239.255.255.251:1900).

The broadcast reception device 100 receives a broadcast signal including the emergency alert message from the broadcast transmission device (CS1110). More specifically, the broadcast reception device 100 may receive a broadcast signal including at least one of the emergency alert message and/or signaling information from the broadcast transmission device 300 using the broadcast receiver 110 or the broadcast interface C110.

The broadcast signal may include an Emergency Alter Table (EAT) and the EAT may include an emergency alert message. The emergency alert message may include an emergency alert.

In addition, the broadcast signal may include signaling information, the signaling information may include a Service Map Table (SMT), and the SMT may include supplementary information of the emergency alert message. The supplementary information of the emergency alert message may include at least one of a ServiceId indicating the identifier of a service which is being provided by the broadcast reception device 100, a MessageId indicating the identifier of the emergency alert message received by the broadcast reception device 100 and/or a MessageURI indicating the address of the content server and/or the broadcast reception device 100 where the supplementary information related to emergency alert is located.

The broadcast reception device 100 may generate an emergency alert multicast message including information related to the emergency alert message based on the emergency alert message.

In one embodiment, the broadcast reception device 100 may generate the emergency alert multicast message including all and/or some of the properties of the emergency alert message based on the emergency alert message using the controller 150.

In one embodiment, the broadcast reception device 100 may generate the emergency alert multicast message including the supplementary information of the emergency alert message based on the supplementary information of the emergency alert message using the controller 150.

In one embodiment, the broadcast reception device 100 may receive the emergency alert message and generate a user interface (UI) to be displayed to the user. The broadcast reception device 100 may generate user interface information of the emergency alert using the controller 150. The user interface information may indicate the properties of the user interface. The user interface information of the emergency alert may include information on a service identifier, a message identifier and a location list of the emergency alert. The service identifier may be expressed by <ServiceId> and may indicate the identifier of the service which is being provided by the broadcast reception device. The message identifier may be expressed by <MessageId> and may indicate the identifier of the emergency alert message received by the broadcast reception device. The location list may be expressed by <URIList> and may indicate a list of URIs indicating the location of the html page configuring the UI using the emergency alert message received by the broadcast reception device. The location information included in the location list may be expressed by <URI> and may indicate the location of the html page configuring the UI using the emergency alert message received by the broadcast reception device. One or more pieces of location information may be included in <URIList>. Then, the broadcast reception device 100 may generate the emergency alert multicast message including UI information of the emergency alert using the controller 150.

The broadcast reception device 100 signals (multicasts) the emergency alert multicast message to a predetermined multicast address using the multicast method (CS1120). For example, the broadcast reception device 100 may signal (or multicast) the emergency alert multicast message including at least one of all and/or some of the properties of the emergency alert message, supplementary information of the emergency alert message and/or UI information of the emergency alert to the predefined multicast address using the multicast method. The predefined multicast address may be a multicast address for transmission of the emergency alert multicast message within the network for multicast. In this case, the broadcast reception device 100 may signal the emergency alert multicast message to the at least one companion device 200 using the controller 150.

The companion device 200 may receive the emergency alert multicast message using the multicast method (CS1130). For example, the companion device 200 may receive the emergency alert multicast message including at least one of all and/or some of the properties of the emergency alert message, supplementary information of the emergency alert message and/or UI information of the emergency alert through the predefined multicast address within the network for multicast.

The companion device 200 may process the emergency alert multicast message. For example, the companion device 200 may display all and/or some of the properties of the emergency alert message using the controller. In addition, the companion device 200 may request the supplementary information stored in the broadcast reception device 100 based on the received messageId and/or ServiceId using the controller. In addition, the companion device 200 may request the supplementary information through the URL of the content server 400 based on the received messageURL using the controller. In addition, the companion device 200 may request a user interface for the emergency alert from the broadcast reception device 100 based on the user interface information of the emergency alert using the controller. In addition, the companion device 200 displays the user interface for the emergency alert based on the URI capable of acquiring the user interface for the emergency alert using the controller. The companion device 200 may display an interface for the emergency alert based on the URI capable of acquiring the interface for the emergency alert through the controller. At this time, the companion device 200 may acquire the interface for the emergency alert from an external server. For example, the companion device 200 may receive at least one of an image file, an HTML file and an XML file for the interface for the emergency alert from the external server. At this time, the external server may be a content/signaling server 400. In another detailed embodiment, the companion device 200 may pre-store the interface for the emergency alert and retrieve the interface corresponding to the URI among the stored interfaces. In addition, the companion device 200 may display the interface for the emergency alert acquired through such operation.

FIG. 272 is a diagram showing a header message format for delivery of an emergency alert multicast message according to an embodiment of the present invention.

The broadcast reception device may generate an emergency alert multicast message using a NOTIFY method and transmit the emergency alert multicast message to a companion device, upon receiving an emergency alert message from a broadcaster. At this time, the value of the TYPE may be set to "atsc:emergency", which may indicate that the emergency alert message is included in a body).

Referring to the figure, the request line of the emergency alert multicast message may be equal to "NOTIFY*HTTP/1.1".

"NOTIFY" may indicate a method of transmitting notification.

"HTTP/1.1" may indicate the version of the HTTP.

In addition, the header field of the emergency alert multicast message may include at least one of a HOST field, a CACHE-CONTROL field, a LOCATION field, a NOTIFICATION-TYPE field, and/or a MESSAGE-TYPE field.

The HOST field may include an address and/or port capable of multicasting the emergency alert message. For example, the HOST field may include "239.255.255.251:1900".

The CACHE-CONTROL field may indicate a time until the multicast message expires. For example, the CACHE-CONTROL field may include an integer specifying the number of seconds when the multicast message is available (Field value can have the max-age directive followed by an integer that specifies the number of seconds the multicast message is available.).

The LOCATION field may indicate the location of the emergency alert message in the content server or the broadcast server. For example, the location may be a URL (Uniform Resource Locator). The companion device may access this URL to access an emergency alert related information page.

The NOTIFICATION-TYPE field may indicate the type of the message. For example, the NOTIFICATION-TYPE field may indicate "atsc:emergency".

The MESSAGE-TYPE field may indicate the emergency message type. For example, the MESSAGE-TYPE field may indicate a Common Alerting Protocol (CAP).

The fields available in the basic header message format were described above and may be deleted/changed or fields may be added according to an emergency alert service system used in a next-generation hybrid broadcast system.

FIG. 273 is a diagram showing a body message format for delivery of an emergency alert multicast message according to an embodiment of the present invention.

Referring to the figure, the body message format for delivery of the emergency alert multicast message including all of the properties of the emergency alert message according to the embodiment of the present invention is shown.

The broadcast reception device 100 according to the embodiment of the present invention may signal (or multicast) the emergency alert multicast message including all of the properties of the received emergency alert message to a predefined multicast address using a multicast method. In this case, the companion device may require an emergency message parser such as a CAP parser.

FIG. 274 is a diagram showing a body message format for delivery of an emergency alert multicast message according to an embodiment of the present invention.

Referring to (a) of the figure, a body message format for delivery of an emergency alert multicast message including some properties of an emergency alert message according to an embodiment of the present invention is shown.

The broadcast reception device may receive an emergency alert message, extract specific elements and/or properties of the emergency alert message, generate an emergency alert multicast message and multicast the emergency alert multicast message.

For example, the broadcast reception device 100 may extract at least one of an identifier element for identifying the emergency alert, a category element indicating the category of the emergency alert, a description element indicating the description of the emergency alert, an areaDesc element indicating the area corresponding to the emergency alert, an urgency element indicating the urgency of the emergency alert, a severity element indicating the severity of disaster causing the emergency alert and/or a certainty element indicating the certainty of disaster causing the emergency alert, from the emergency alert message. Then, the broadcast reception device 100 may generate an emergency alert multicast message including at least one of the identifier element, the category element, the description element, the areaDesc element, the urgency element, the severity element, and/or the certainty element based on the emergency alert message using the controller 150.

The companion device may access the URL of the LOCATION field of the header to access the emergency alert related information page, if a user desires to obtain more emergency alert related information after receiving the emergency alert multicast message including some properties of the emergency alert message. That is, the companion device may receive the emergency alert related information from the content server and/or the broadcast server based on the URL of the LOCATION field.

Referring to (b) of the figure, a body message format for delivery of an emergency alert message in the form of text according to an embodiment of the present invention is shown.

Similarly, when the user desires to obtain more emergency alert related information, the companion device may access the URL of the LOCATION field of the header to access the emergency alert related information page.

FIG. 275 is a flowchart illustrating operation of a broadcast reception device according to an embodiment of the present invention.

The broadcast reception device according to the embodiment of the present invention may perform operation related to the above description.

The broadcast reception device may receive a broadcast signal using a broadcast receiver or a broadcast interface (CS1210). For example, the broadcast reception device may receive a broadcast signal including an emergency alert message and/or signaling information indicating metadata of the emergency alert message.

The broadcast signal may include an Emergency Alert Table (EAT), and the ETA may include an emergency alert message. The emergency alert message may include an emergency alert. In addition, the broadcast signal may include signaling information, the signaling information includes a Service Map Table (SMT), and the SMT may include supplementary information of the emergency alert message. The supplementary information of the emergency alert message may include at least one of a ServiceId indicating the identifier of a service which is being provided by the broadcast reception device 100, a MessageId indicating the identifier of the emergency alert message received by the broadcast reception device 100 and/or a MessageURI indicating the address of the content server and/or the broadcast reception device 100 where the supplementary information related to emergency alert is located.

In addition, the signaling information may include service layer signaling (or first information) for providing discovery and acquisition of a service and at least one content component included in the service. In addition, the signaling information may include a service list table (or FIC or second information) including data related to fast channel joining and switching. The service list table may build a list of services and provide bootstrap discovery of service layer signaling. The FIC may enable the broadcast reception device to build a basic service list and bootstrap discovery of service layer signaling for each service. In some embodiments, the FIC may be expressed by a Service List Table (SLT). The FIC (or SLT) may be transmitted through link layer signaling. In addition, the FIC (or SLT) may be transmitted in each physical layer frame, for fast acquisition. In some embodiments, the FIC (or SLT) may be transmitted through at least one of a physical layer frame, a PLP for transmitting signaling and/or a PLP allocated per broadcaster.

In addition, the signaling information may include a fragmentation_indicator indicating whether signaling information is fragmented, a payload_format_indicator indicating whether information on a payload format is included in a header part of signaling information, an expiration_indicator indicating whether an expiration time of the signaling information is included in the header part of signaling information, a fragment_number attribute indicating the number of the fragmented signaling information, a last_fragment_number attribute indicating a last number of the numbers of the fragmented signaling information, a payload_format attribute indicating a payload format of signaling information, and an expiration attribute indicating the expiration time of the signaling information.

The broadcast reception device may generate an emergency alert multicast message based on the broadcast signal using the controller (CS1220).

The emergency alert multicast message may include a header message and the header message may include at least one of a HOST field indicating an address and/or port capable of multicasting the emergency alert multicast message, a CACHE-CONTROL field indicating an expiration time of the emergency alert multicast message, a LOCATION field indicating the location of the emergency alert message, a NOTIFICATION-TYPE field indicating the type of the emergency alert multicast message and a MESSAGE-TYPE field indicating the type of the emergency alert message.

In addition, the emergency alert multicast message may include a body message and the body message may include all of the properties of the emergency alert message.

In addition, the emergency alert multicast message may include a body message and the body message may include at least one of an identifier element for identifying an emergency alert, a category element indicating the category of the emergency alert, a description element indicating the description of the emergency alert, an areaDesc element indicating the area corresponding to the emergency alert, an urgency element indicating urgency of the emergency alert, a severity element indicating severity of disaster causing the emergency alert and a certainty element indicating the certainty of disaster causing the emergency alert.

In addition, the broadcast reception device may generate an emergency alert multicast message including supplementary information of the emergency alert message using the controller.

In addition, the broadcast reception device may generate a user interface for the emergency alert based on the emergency alert message using the controller and generate an emergency alert multicast message including user interface information indicating the properties of the user interface. The user interface information may include at least one of a ServiceId indicating an identifier of a service, a MessageId indicating an identifier of an emergency alert message, and/or a URIList indicating the location of a page configuring a user interface.

The broadcast reception device 100 may transmit the emergency alert multicast message to a companion screen device using a companion screen interface (CS1230). For example, the broadcast reception device 100 may signal (or multicast) the emergency alert multicast message to a predefined multicast address using a multicast method. The companion screen device may include the above-described companion device. In addition, the companion screen interface may be included in the controller. The predefined multicast address may be a multicast address for transmission of the emergency alert message within a network for multicast. For example, the broadcast reception device 100 may signal (or multicast) the emergency alert multicast message including at least one of all or/or some properties of the emergency alert message, supplementary information of the emergency alert message and/or user interface information of the emergency alert to a predefined multicast address using a multicast method.

FIG. 276 is a diagram illustrating a broadcast system according to an embodiment of the present invention.

The broadcast system according to an embodiment of the present invention may include a broadcast transmitting apparatus C2760010, a broadband server C2760020, a broadcast receiving apparatus C2760100, and/or a companion screen device C2760200.

The broadcast transmitting apparatus C2760010 may provide a broadcast service. The broadcast transmitting apparatus C2760010 may include at least one of a controller (not shown) and/or a transmitter (not shown). The broadcast transmitting apparatus C2760010 may also be represented by a transmitter.

For example, the broadcast service may include at least one of content (or linear service), application (or non-linear service), and/or signaling information. The broadcast service may include electronic service guide (ESG), emergency alert message, and/or media playback state information. A detailed description of the broadcast service may include the entire aforementioned description.

The broadcast transmitting apparatus C2760010 may transmit a broadcast stream including a broadcast service using at least one of a satellite, a terrestrial, and a cable broadcast network.

The broadband server C2760020 may receive a request from the broadcast receiving apparatus C2760100 and/or the companion screen device C2760200 through the Internet and provide a broadcast service through the Internet in response thereto. The broadband server C2760020 may include various data including content. The broadband server C2760020 may include the aforementioned content server.

The broadcast receiving apparatus C2760100 may receive a broadcast service through a broadcast network and/or the Internet. Then, the broadcast receiving apparatus C2760100 may be connected to the companion screen device C2760200. Then, the broadcast receiving apparatus C2760100 may transmit the broadcast service to the companion screen device C2760200. For example, the broadcast service may include at least one of content (or linear service), application (or non-linear service), and/or signaling information. The broadcast service may include electronic service guide (ESG), emergency alert message, and/or media playback state information.

The broadcast receiving apparatus C2760100 may be represented by a receiver, a first receiver, a first screen device, a master device (MD), and/or a primary device (PD).

The broadcast receiving apparatus C2760100 may include at least one of a broadcast interface C2760110 (or a broadcast receiver), a broadband interface C2760130 (or an IP transceiver), a companion screen interface C2760140 (or an App transceiver), a decoder (not shown), a display (not shown), and/or the controller C410150).

The broadcast interface C2760110 may receive a broadcast stream including a broadcast service. In this case, the broadcast stream may be transmitted using at least one of a satellite, a terrestrial, and a cable broadcast network. Accordingly, the broadcast interface C2760110 may include at least one of a satellite tuner, a terrestrial tuner, and a cable tuner in order to receive a broadcast stream.

The broadband interface C2760130 may make a request to the broadband server C2760020 for a broadcast service. The broadband interface C2760130 may receive the broadcast service from the broadband server C2760020.

The companion screen interface C2760140 may transmit/receive a broadcast service and/or signaling data to and from a primary device interface C2760240 of the companion screen device C2760200.

A decoder (not shown) may decode a broadcast service.

A display (not shown) may display the broadcast service.

A controller C2760150 may control operations of a broadcast interface C2760100, the broadband interface C2760130, the companion screen interface C2760140, decoder, and/or the display.

According to an embodiment of the present invention, the broadcast receiving apparatus C2760100 may be connected to the companion screen device C2760200 using the controller C2760150. To this end, the controller C2760150 may include a primary device network processor C2760153 and a primary device application processor C2760155. A detailed description of the primary device network processor C2760153 may include the entire aforementioned description of the network processor of the broadcast receiving apparatus. In addition, a detailed description of the primary device application processor C2760155 may include the entire aforementioned description of the application processor of the broadcast receiving apparatus.

The primary device application processor C2760155 may internally communicate directly and/or indirectly with the companion screen interface C2760140 of the broadcast receiving apparatus C2760100. The primary device application processor C2760155 may externally communicate directly and/or indirectly with the primary device interface C2760240 of the companion screen device C2760200. The primary device application processor C2760155 may externally communicate directly and/or indirectly with a companion screen application processor C2760255 of the companion screen device C2760200.

For example, the primary device application processor C2760155 may make a request to the primary device network processor C2760153 for connection with the companion screen device C2760200. Upon receiving the request for connection from the companion screen device C2760200, the primary device network processor C2760153 may connect the primary device application processor C2760155 that makes a request for connection and the companion screen device C2760200.

As described above, the primary device application processor C2760155 may be an application module or an application browser. The primary device application processor C2760155 may be an HbbTVapplication. The primary device network processor C2760153 may be embodied as 0a network module. The primary device network processor C2760153 may be a web socket server. When the primary device network processor C2760153 is embodied as a web socket server, the primary device application processor C2760155 and the companion screen device C2760200 may each be considered as one client. Alternatively, a first client and a second client may be referred to as a peer.

The primary device application processor C2760155 may transmit host request header information indicating broadcast receiving device information or companion screen device information executed by the primary device network processor C2760153 to the primary device network processor C2760153.

In addition, upon receiving a request for connection with the primary device application processor C2760155, the primary device network processor C2760153 may generate a stream header of the primary device application processor C2760155 and contain the stream head in a stream head group. Upon receiving a request for connection from the companion screen device C2760200, the primary device network processor C2760153 may generate a stream head of the companion screen device C2760200 and connect the stream head to a stream head of the primary device application processor C2760155 matched with a stream head group. In this case, the primary device network processor C2760153 may remove the stream head of the matched primary device application processor C2760155 or the stream head of the companion screen device C2760200 from the stream head group.

The primary device application processor C2760155 may transmit an IP address of the companion screen device C2760200 as a connection target and each of the primary device application processor C2760155 and/or applications may use the same port.

The companion screen device C2760200 may receive a broadcast service from the broadband server C2760020 through the Internet. The companion screen device C2760200 may be represented as a second broadcast receiving apparatus, a second receiver, a second screen device, a slave device (SD), and/or a companion device (CD). The companion screen device C2760200 may include at least one of a broadband interface C2760230 (or an IP transceiver), the primary device interface C2760240 (or an App transceiver), a decoder (not shown), a display (not shown), and/or a controller C2760250. The number of the companion screen devices C2760200 may be plural.

The broadband interface C2760230 may make a request to the broadband server C2760020 for a broadcast service and receive the broadcast service from the broadband server C2760020. The broadband interface C2760230 may receive the broadcast service from the broadcast receiving apparatus C2760100.

The primary device interface C2760240 may transmit and/or receive a broadcast service and/or service data to and/or from the companion screen interface C2760140 of the broadcast receiving apparatus C2760100.

A decoder (not shown) may decode a broadcast service.

A display (not shown) may display a broadcast service.

The controller C2760250 may control operations of the broadband interface C2760230, the primary device interface C2760240, the decoder, and/or the display.

The controller C2760250 may further include the companion screen application processor C2760255. A detailed description of the companion screen application processor C2760255 may include the entire aforementioned description of the application processor.

The companion screen application processor C2760255 may internally communicate directly and/or indirectly with the primary device interface C2760240 of the companion screen device C2760200. In addition, the companion screen application processor C2760255 may externally communicate directly and/or indirectly with the companion screen interface C2760140 of the broadcast receiving apparatus C2760100. The companion screen application processor C2760255 may externally communicate directly and/or indirectly with the primary device application processor C2760155 of the broadcast receiving apparatus C2760100.

FIG. 277 is a diagram illustrating a broadcast transmitting method according to an embodiment of the present invention.

A broadcast transmitting apparatus may generate a service data (or signaling information) for a service using a controller (not shown) (CS2770100).

For example, the service data may include at least one of media playback state information, emergency alert message, and/or electronic service guide (ESG). A detailed description of the media playback state information, the emergency alert message, and/or the ESG may include the entire aforementioned description of the media playback state information, the emergency alert message, and/or the ESG.

The broadcast transmitting apparatus may generate low level signaling data and/or service layer signaling data using a controller (CS2770200).

The broadcast transmitting apparatus may transmit a broadcast signal including the service data, the low level signaling data, and/or the service layer signaling data using a transmitter (CS2770300).

The low level signaling data may support bootstrapping of service acquisition. For example, the low level signaling data may include the aforementioned FIC.

The service layer signaling data may include first signaling data, second signaling data, and third signaling data.

The first signaling data may include reference information formed with reference to the second signaling data and the third signaling data. For example, the first signaling data may include the aforementioned USD and/or SMT.

The second signaling data may include description for a component of the service. For example, the second signaling data may include the aforementioned MPD.

The third signaling data may include the acquisition information of the component related to the service. For example, the third signaling data may include at least one of SDP, SMT, CMT, ROUTE session element, LCT session element, and/or LSID.

The reference information may include first reference information formed with reference to the second signaling data and second reference information formed with reference to the third signaling data. For example, the first reference information may be the aforementioned fullMpdURI attribute (or Full_MPD_URL attribute) and the second reference information may be an atscSdpURI element (or ATSC_SDP_URL attribute).

The third signaling data may include a plurality of first transport session elements. The first transport session element may include information on a first transport session for transmitting the service. For example, the first transport session may be a ROUTE session.

The first transport session element may include at least one of sIpAddr attribute indicating a source IP address of the first transport session, dIpAddr attribute indicating a destination IP address of the first transport session, dport attribute indicating destination port number of the first transport session, and PLPID attribute indicating a physical layer parameter for the first transport session. For example, the first transport session element may include information on the first transport session using at least one of component information (s), an originator and session identifier (o), a source filter (a), connection information (c), media description (m), an ATSC mode (a), and/or TSI information (a) (route-tsi or flute-tsi).

The third signaling data may include a second transport session element, the second transport session element may include information on a second transport session for transmitting the component of the service and the third signaling data may include at least one of PLPID attribute for identifying a physical layer pipe for transmitting the component and tsi attribute for identifying the second transport session. For example, the second transport session may be an LCT session. The third signaling data may include at least one of PLPID attribute for identifying a physical layer pipe for transmitting the component and tsi attribute for identifying the second transport session.

FIG. 278 is a diagram illustrating a broadcast receiving method according to an embodiment of the present invention.

The broadcast receiving apparatus may receive a broadcast signal including a service using a broadcast interface (CS2780100).

For example, the service may include service data and/or signaling data for the service. The service may include media playback state information, emergency alert message, and/or electronic service guide (ESG). A detailed description of the media playback state information, the emergency alert message, and/or the ESG may include the entire aforementioned description of the media playback information, the emergency alert message, and/or the ESG.

The broadcast signal may further include signaling data (or signaling information) for a service. The signaling data may include low level signaling data and/or service layer signaling data. A detailed description of the signaling data may include the entire information related to the signaling data.

The broadcast receiving apparatus may receive a request for service subscription from a companion screen device using a companion screen interface.

The subscription request may include subscription duration information indicating a duration in which subscription is effective. For example, the subscription request may include a SubscriptionDuration element indicating a requested duration up to expiration of subscription of media playback state information and/or a SubscriptionDuration element indicating a requested duration up to expiration of subscription of emergency alert message.

The broadcast receiving apparatus may be connected to a companion screen device using a controller. Technology such as UPnP is used for connection and/or pairing but the technology for pairing is not limited thereto. To this end, the controller may include a network processor and an application processor.

The application processor may make a request to a network processor for connection with a companion screen device. The application processor may transmit host request header information indicating broadcast receiving apparatus information or companion screen device information executed by the network processor. The application processor may transmit an IP address of the companion device as a connection target and applications may use the same port.

Upon receiving the connection request from the companion screen device, the network processor may connect the application processor that makes a request for connection and the companion device. The network processor may be a web socket server.

Upon receiving the connection request of the application processor, the network processor may generate a stream head of the application processor and contain the stream head in a stream head group. Upon receiving the connection request from the companion device, the network processor may generate a stream head of the companion device and connect the generated stream head to a stream head of an application processor matched from the stream head group. In this case, the network processor may remove the stream head of the matched application processor or the stream head of the companion device from the stream head group.

A detailed description of the network processor and the application processor may include the entire aforementioned description.

The broadcast receiving apparatus may generate a notification message for a service using a controller (CS2480200).

For example, the notification message may include media playback state information. A detailed description of the media playback state information may include entire information related to the aforementioned media playback state information.

The media playback state information may include an MPState element indicating a media playback state. The media playback state information may further include an MPSpeed element indicating speed of a media playback state. The media playback state information may further include a MediaID element for identifying media to which subscription of media playback state information is requested.

For example, the notification message may include an emergency alert message.

The emergency alert message may include at least one of SentTimestamp attribute indicating date and time for generation of an emergency alert message and ExpiredTimestamp attribute indicating last date and time at which the emergency alert message is effective.

The emergency alert message may include at least one of an EAMContent element including information of the emergency alert message, ContentFormat attribute indicating content format of the emergency alert message, and EAMContentAccessibilityURL element indicating URL for providing initial emergency alert message content for accessibility.

The emergency alert message may include at least one of Category attribute indicating a category of the emergency alert message, Urgency attribute indicating urgency of the emergency alert message, Severity attribute indicating severity of the emergency alert message, Geo-loc attribute indicating geographical location in which the emergency alert message is available, NewMsg attribute indicating whether the emergency alert message is a new message, and OneTimeMsgattribute indicating whether the emergency alert message is transmitted only once.

For example, the notification message may include electronic service guide (ESG).

According to an embodiment of the present invention, the ESG may include ESG data on at least one broadcast service. Here, the ESG data may refer to element/attribute in the ESG or data in the ESG. The broadcast service may correspond to the aforementioned service and channel.

For example, according to an embodiment of the present invention, the ESG data may be service type information, schedule information, related content information, or related component information of the aforementioned at least one broadcast service. The ESG data may be type attribute of the aforementioned Service element, Schedule element, Content element, or Component element. Here, the related content and the related component may refer to content related to a service described by the ESG and a component related thereto.

According to an embodiment of the present invention, the notification message may further include information on modification of the received ESG. The information on modification of the ESG may be received through a broadcast network and/or the Internet. Here, the information on modification of the ESG may include addition of received ESG, modification, or deleted ESG data compared with pre-stored ESG data. Here, the information on modification of the ESG may be the aforementioned LastChangedESGData state parameter. The added, modified, or deleted ESG data may correspond to Addition, Modification, and Deletion elements, respectively.

The broadcast receiving apparatus may transmit a notification message to a companion screen device using a companion screen interface (CS2470300).

The notification message may be transmitted to the companion screen device based on a notification protocol. The notification protocol may indicate a web socket protocol. Information related to the web socket protocol may include the entire information related to the aforementioned web socket. For example, the notification protocol may indicate a method in which a broadcast receiving apparatus generates an event and transmits a notification message to a companion screen device.

Each of the aforementioned operations may be omitted or the same or similar operation may be replaced with other operation of the same or similar operation.

FIG. 279 is a diagram of an app-related broadcast service according to an embodiment of the present invention.

The present invention proposes a signaling method and synchronization method of an app-related broadcast service among the aforementioned broadcast services. Here, the app-related broadcast service may refer to a broadcast service when provision of a basic broadcast service is related to an application. In detail, the app-related broadcast service may be a linear service including app-based enhancements and/or stand alone app-based service. In some embodiments, the signaling method and so on according to the present invention may be applied to other types of services that use an application.

First, the linear service including app-based enhancements will be described. Here, the linear service may refer to a general broadcast service. Enhancements may refer to an enhancements service and an interactive service for transmitting additional information on a general broadcast service. The app-based enhancements may refer to the case in which the aforementioned information is provided/controlled based on an application.

For example, during broadcast of football game (general broadcast service), the case (app-based enhancements) in which a player information application provides information on football players may correspond to the linear service including the app-based enhancements.

The stand alone app-based service will be described. The stand alone app-based service may refer to a broadcast service only the app-based enhancements. That is, the stand alone app-based service may correspond to the case in which an application provides a service, but not the case in which app-based enhancements provide additional information to a basic broadcast service. A broadcast-independent application and so on may be embodiments of an application for providing the stand alone app-based service.

The app-based enhancements may include a plurality of components. A component of the app-based enhancements may include one or more applications, 0 or more activation notification, 0 or more additional non real time (NRT) content items, and/or 0 or more on-demand item.

Here, each application may be a non real time (NRT) content item and may be an NRT content item to be executed in application run time environment. Here, actions to be performed by applications may be initiated by notifications transmitted through a broadcast network/broadband and, in this regard, the notifications may correspond to the aforementioned activation notification. The notifications may also be referred to as "event". Here, an additional NRT content item and/or an on-demand item may refer to data to be used by an application.

In some embodiments, one of applications included in the app-based enhancements may be prepared as a primary application. When the primary application is present, the primary application may be executed as soon as the broadcast service including the corresponding app-based enhancements is selected. Other applications other than the primary application may be executed via signaling through a broadcast network/broadband. Applications other than the primary application may be executed by other application that is already executed. In this case, an application other than the primary application may be executed by createApplication ( ) of Java script.

The present invention proposes a signaling method of various types of app-based enhancements as described above. The present invention proposes a method of synchronizing activation notification with a time base and transmitting the activation notification. Actions of an application may also be synchronized by the synchronized activation notification.

Here, the application may refer to a set of documents (HTML, CSS, JavaScript, etc.) constituting the enhancement/interactive service.

Here, the content item may refer to a set of one or more files intended to be treated as one unit for the purpose of presentation.

Here, the event may refer to timed notification indicate that an action is supposed to be performed on a DASH client or an application.

Here, the event stream may refer to a stream of the aforementioned events.

Here, the NRT content item may refer to a content item transmitted ahead of time for another use in a future presentation or application.

Here, the on-demand content item may refer to a content item that is downloaded and presented at a time requested by a user.

FIG. 280 is a diagram illustrating a part of an ApplicationList element according to an embodiment of the present invention.

FIG. 281 is a diagram illustrating another part of the ApplicationList element according to an embodiment of the present invention.

The two drawings are originally shown in one drawing but are divided into two parts due to spatial restriction.

As described above, the broadcast service may include 0 or more app-based enhancements. For example, the linear service may include app-based enhancements having one application that is executed in a background and manages insertion of a target advertisement. The linear service may further include app-based enhancements including a set of applications for providing interactive viewing experience related to an audio/video program.

Here, each of the app-based enhancements may be separately signaled. Accordingly, manufacturers of various applications do not necessarily cooperate with each other about signaling thereof.

A set of applications included in one app-based enhancement may be signaled by an ApplicationSignaling Table (AST). The AST may be one of XML documents and may have ApplicationList element as a root element. One AST may include signaling information on applications included in one app-based enhancement. In some embodiments, one AST may be extended to signal a plurality of app-based enhancements.

The service signaling information on one service may include AST of each of app-based enhancements included in a corresponding service. That is, when one service includes a plurality of app-based enhancements, service signaling information of the service may include a plurality of ASTs.

An embodiment of the illustrated AST will be described. In some embodiments, each element/attribute of the AST may be added/omitted/changed.

The AST may include a root element as the ApplicationList element. The ApplicationList element may include a list of Application elements. That is, the ApplicationList element may include at least one Application element.

Each Application element may include appName element, applicationDescriptior element, applicationSpecificDescriptor element, applicationUsageDescriptor element, applicationBoundary element, applicationTransport element, applicationLocation element, atsc:Capabilities element, atsc:liveEventSource element, atsc:ContentItems element, @applicationIdentifier attribute, @atsc:serviceId attribute, and/or @atsc:protocolVersion attribute.

The appName element may indicate a name of an application indicated by the Application element. The element may be omitted. The application name may be represented by various languages. The appName element may further include @lang attribute. The @lang attribute may indicate a language representing an application name.

The applicationDescriptior element may include information on a corresponding application. The applicationDescriptior element may include information items to be commonly included in all applications. The applicationDescriptior element may include a icon element, @type attribute, @controlCode attribute, @visibility attribute, @serviceBound attribute, @priority attribute, @version attribute, @mhpVersion attribute, @storageCapabilities attribute, and/or @trickModeTolerance attribute.

The icon element may represent an icon to be used to represent a corresponding application. The element may be omitted. The icon element may further include @mimType attribute indicating an MIME type of an application image (icon) and/or @width/@height/@depth attribute indicating area/height/depth of the application image. The icon element may further include @url attribute having HTTP URL information for download of an application image.

The @type attribute may indicate a type of a corresponding application. For example, the attribute may indicate that a corresponding application is an application according to ATSC or DVB.

The @controlCode attribute may include information for control of a state of a corresponding application. For example, the attribute may have information of autolaunch, kill, etc. The information may be used to control a state of a corresponding application.

The @visibility attribute may indicate whether a corresponding application is visible to a user and/or another application. Here, whether a corresponding application is visible to a user and/or another application may refer to whether the corresponding application is visible to a user interface as a wide meaning. The attribute may indicate whether the application is audible and sensory as well as whether the application is visible. In some embodiments, whether the corresponding application is audible to a user and so on through a speaker may be indicated separately by @audibility attribute. The attribute may be omitted.

The @serviceBound attribute may indicate whether a corresponding application is service-bounded. When the attribute has a true value, the corresponding application may be service-bounded and when the application has a false value, the application may not be service-bounded. The attribute may have a true value as a default value. The attribute may be omitted. When the attribute is omitted, this may mean that a corresponding application is service-bounded.

The @priority attribute may indicate relative priority compared with other applications. The @version attribute may indicate a version of a corresponding application. The @mhpVersion attribute may indicate a platform or version required for a corresponding application. The attribute may be omitted.

The @storageCapabilities attribute may indicate the amount of a storage required to cache a corresponding application. The attribute may be omitted. In some embodiments, the attribute may be used to indicate whether the corresponding application is cached.

The @trickModeTolerance attribute may indicate whether a corresponding application is compatible with a specific trick mode. Whether a corresponding application is compatible with a specific trick mode may refer to whether the application is capable of tolerating certain trick modes when the certain trick modes are executed. The trick mode may include pause, FF, slow mode, rewind, and so on. The attribute may be omitted. With regard to a broadcast service having the application enhancement, when a user has trick play with respect to the broadcast service, signaling may be performed so as to normally perform enhancement on trick-played basic program.

The applicationSpecificDescriptor element may have information required only for a specific type of application, differently from the aforementioned applicationDescriptior element. That is, information of the element may be dependent upon an application type. The element is not required depending on an application and, accordingly, the element may be omitted.

The applicationUsageDescriptor element may indicate a function of a corresponding application. For example, the element may indicate that a corresponding application is used in teletext. The element may not be required depending on an application type. The element may be omitted.

The applicationBoundary element may indicate URL information for definition of expansion of an application boundary of a corresponding application. The element may be omitted.

The applicationTransport element may indicate a protocol used to transmit a corresponding application. For example, the element may indicate that a corresponding application is transmitted through ROUTE, MMT, or HTTP. In some embodiments, the element may indicate a protocol used to transmit a corresponding AST. When the aforementioned method of transmitting service data according to the present invention is used, an allowable value of the element may be ROUTE, MMT, HTTP, or the like.

The applicationLocation element may indicate URL for providing a location for acquisition of a corresponding application. In some embodiments, the element may indicate a URL for acquisition of a corresponding application.

The atsc:Capabilities element may indicate capability information for significantly processing corresponding application/app-based enhancements. Here, the significant processing may refer to capability of a receiver side for significant rendering/decoding/reproducing, etc. In some embodiments, the capability information may be indicated by a preset capability code.

The atsc:liveEventSource element may provide information for receiving the aforementioned event in a live situation. For example, in the case of a broadcast program that is lively provided, an event may also be changed and transmitted in real time in order to provide enhancement depending on information of a broadcast program that is changed in real time. Differently from pre-produced content, the aforementioned operation may be required in a live situation. The element may provide information such as URL for transmission of an event in real time in this situation. The element may include @url attribute, @shortPollingPeriod attribute, and/or @targetDevice attribute.

The @url attribute may indicate URL for receiving an event in a live situation. The @shortPollingPeriod attribute may indicate a polling period when an event is acquired via short polling of a broadband. The @targetDevice attribute may indicate a target device of a corresponding live event. For example, PrimaryDevice (PD) or Companion Device (CD) may be a target device. The @shortPollingPeriod attribute and/or the @targetDevice attribute may be omitted.

The atsc:ContentItems element may include information on each content item to be used for a corresponding application. The atsc:ContentItems element may be present by as much as the number of content items. The atsc:ContentItems element may further include location element, @ContentLinkage attribute, @updatesAvailable attribute, @TFAvailable attribute, @contentSecurityCondition attribute, @availableInBroadcast attribute, @availableOnInet attribute, @playBackLengthInSecondes attribute, @playBackDelay attribute, @expiration attribute, @size attribute, @name attribute, and/or timeSlotInfo element.

The location element may indicate location information for acquisition of a corresponding content item. In some embodiments, the information may be URL format. The location element may be omitted or a plurality of location elements may be present.

The @ContentLinkage attribute may indicate an application that uses a corresponding content item. Signaling may be performed on a specific application based on information (EventStream element, emsg box, etc.) on an attribute value and an event to be described below. The attribute may provide, for example, an application identifier for a specific application or indicate a specific LCT session for transmitting the application data.

The @updatesAvailable attribute may indicate whether update of a corresponding content item is available. The attribute may have a true or false value. The @TFAvailable attribute may indicate whether a text fragment is present in a signaling channel for a corresponding content item.

The @contentSecurityCondition attribute may indicate a security state of a corresponding content item. The @availableInBroadcast attribute may indicate whether a corresponding content item is acquired through a broadcast network. The @availableOnInet attribute may indicate whether corresponding content item is acquired through the Internet.

The @playBackLengthInSecondes attribute may indicate a length of a corresponding content item during playback in a second unit. The attribute may be omitted. The @playBackDelay attribute may indicate playback delay of a corresponding content item. The attribute may be omitted. The @expiration attribute may indicate an expiration period of a corresponding content item. The attribute may be omitted. The @size attribute may indicate a size of a corresponding content item. The attribute may be omitted. The @name attribute may indicate a name of a corresponding content item. The attribute may be omitted.

The timeSlotInfo element may include time slot related information of a corresponding content item. The timeSlotInfo element may further include @time_slot_start attribute, @time_slot_length attribute, @acquisition_time attribute, @repeat_period attribute, and/or @slot_count attribute.

The @time_slot_start attribute may indicate a start time of a time slot. The time may be represent by GPS seconds from 00:00:00 UTC of Jan. 6, 1980. When the field has a value of 0, the field may indicate that a time slot is initiated from the unknown past.

The @time_slot_length attribute may indicate a length of a time slot in a minute unit.

The @acquisition_time attribute may indicate a minimum time interval length by which transmission of at least one content item is ensured. The time interval may be represented in a minute unit. Here, the time interval may be assumed to be initiated from an arbitrary time in a time slot and may include end of a time slot. If a single large content item is being transmitted repeatedly during the time slot, this will be the time it takes to transmit a single instance of the content item. If a number of small content items are being transmitted in a carousel, this will be the carousel cycle time.

The @repeat_period attribute may represent a repetition period of a time slot in a minute unit.

The @slot_count attribute may indicate a number of times of a time slot. The attribute may indicate a number of times from a time slot at a time indicated by the @time_slot_start attribute. A value of zero for slot_count shall indicate the repetition shall be assumed to continue indefinitely.

The Application element may directly include @ContentLinkage attribute and/or timeSlotInfo element. That is, the @ContentLinkage attribute and/or the timeSlotInfo element may be included in both the Application element and the atsc:ContentItems element.

Among attributes of the Application element, the @applicationIdentifier attribute may indicate an identifier of a corresponding application. The value may be a globally unique value.

The @atsc:serviceId attribute may indicate a service identifier of a service related to a corresponding application.

The @atsc:protocolVersion attribute may indicate a protocol version of a corresponding application. In some embodiments, the corresponding field may be divided into two fields indicating a major protocol version and a minor protocol version. Alternatively, the field may simultaneously provide both the major/minor protocol versions.

The ApplicationList element may include @ASTVersionNumber attribute, @timeSpanStart attribute, and/or @timeSpanLength attribute as well as a plurality of Application elements.

The @ASTVersionNumber attribute may indicate a version_number of an entire corresponding AST. In some embodiments, a corresponding field may be divided into two fields indicating the major protocol version and the minor protocol version. Alternatively, the field may simultaneously provide both the major/minor protocol versions.

The @timeSpanStart attribute may indicate start of a time interval covered by a corresponding AST instance. The AST may be divided into a plurality of instances and transmitted and each AST instance may include signaling information of each time interval.

The @timeSpanLength attribute may indicate a length of a time interval covered by a corresponding AST instance.

The time interval covered by the corresponding AST instance along with a value of the @timeSpanStart attribute may be calculated.

Each of the fields of the AST according to the aforementioned embodiments may be omitted or changed. In some embodiments, additional fields may be added to the AST. Fields of the AST may be replaced with fields having the same/similar meaning.

The aforementioned AST may be transmitted through a broadcast network or a broadband.

When the AST is transmitted through a broadcast network, an AST for application enhancements may be transmitted through a service signaling channel of a broadcast service related to corresponding application enhancement. Here, the service signaling channel of a service may refer to a path for transmitting the aforementioned SLS. For example, in the case of an ROUTE, an LCT transfer session specified with tsi=0 may transmit an AST through a dedicated signaling channel. In the case of an MMT, MMTP packet flow specified with packet_id=00 may transmit the AST through a dedicated signaling channel.

When the AST is transmitted through a broadband, the AST may be acquired via query. The query may be generated using base URL information in the aforementioned SLT. The base URL may be URL information for acquisition of the AST. Here, the SLT may be SLT including bootstrap information on a broadcast service related to the corresponding AST. In the case of a scenario using a watermark, the base URL may be acquired through the watermark or acquired through an Auto ContentRecognition (ACR) procedure using the watermark.

FIG. 282 is a diagram illustrating an event message table (EMT) according to an embodiment of the present invention.

As described above, actions to be performed by applications may be initiated by notifications transmitted through a broadcast network/broadband. The notifications may be referred to as "event". According to the context, an operation, an action, or an operated state of applications started by these notifications may also be referred to as an event. In addition, actions to be performed by applications may also be referred to as an event.

The events may be transmitted through a broadcast network or a broadband. In this case, each event and actions by an event needs to be synchronized with a basic broadcast service/broadcast program. The present invention proposes a transmitting method and synchronization method of an event.

The case in which an event is transmitted through a broadcast network will be described below.

When the event is transmitted through a broadcast network, the event may be transmitted as a DASH event. In this case, the event may be transmitted in the form of EventStream element or emsg box. When an event is transmitted to the EventStream element, the event may be transmitted in the form of EventStream element indicated by a period element of MPD. When an event is transmitted in the form of emsg box, the event may be transmitted to an emsg box indicated in Representation segments.

Two event transfer mechanisms may be used together. For example, one event stream may include some events transmitted to the EventStream element and/or other events transmitted through the emsg box.

Events transmitted through the EvenstStream element may correspond to events to be transmitted to a receiver side during a time interval corresponding to a period. That is, the MPD may be service signaling information of a service and may provide signaling information in a time interval unit of a service referred to as a period. Signaling information on the period may include an MPD Period element and the period element may include an EventStream element. The EventStream element may provide signaling (event) required for an operation for applications during a corresponding period of a corresponding service.

The EventStream element may be a list of Event elements. Each EventStream element may have schemeIdUri attribute and/or value attribute. The two attributes may indicate a type of events in the EventStream. In some embodiments, the two attributes may identify events. Here, the schemeIdUri attribute and/or the value attribute may use a predefined value. Alternatively, a service provider may additionally define and use a value of the schemeIdUri attribute and/or the value attribute. An "owner" of the schemeIdUri attribute needs to uniquely define the schemeIdUri attribute and needs to define corresponding value attribute and event semantics. The value information may be dependent upon an application and may be used to identify a specific event stream in one service.

The EventStream element may further include timescale attribute. The attribute may indicate an event presentation time and reference time scale for duration.

Event sub elements of the EventStream element may each include presentationTime attribute, duration attribute, and/or id attribute. The presentationTime attribute may indicate start time of each event, the duration attribute may indicate duration time of each event, and the id attribute may indicate an identifier of each event. In the context, the event may refer to an action of an application initiated by an event (notification) and a phenomenon (pop up window, etc.) that occurs in response to the action.

The Event sub element may not have data for a corresponding event. However, in some embodiments, the Event element may have additional data element and attribute. The data element/attribute may provide data required for execution of an action initiated in response to an event.

In some embodiments, a plurality of EventStream elements with different types may be present in one period.

When an event is transmitted in the form of emsg box, the event may be transmitted in the emsg box indicated in Representation segments, as described above. In this case, the InbandEventStream element of Representation of MPD may signal whether an event is present in the emsg box in segments.

The InbandEvent element may include schemeIdUri and/or value. The two fields may indicate a type of an event in the emsg box. In some embodiments, the two fields may be used to identify an event.

The InbandEvent element may further include a timescale field. The field may indicate a reference time scale related to an event.

The InbandEvent element may further include presentation_time_delta information, event_duration information, and/or id information. The presentation_time_delta information may indicate start time of a corresponding event. Here, the start time may be represented as a relative value at the start time of the corresponding Representation. The event_duration information may indicate duration time of a corresponding event. The id information may identify a corresponding event instance.

The InbandEvent element may further optionally include message_data information. The message_data information may provide data required to execute an action initiated by a corresponding event.

The case in which an event is transmitted through a broadband will be described below.

With regard to transmission of an event through a broadcast network, batch delivery as a batch via MPD and incremental delivery using an emsg box have been described above. Similarly, with regard to transmission of an event through a broadband, batch delivery and incremental delivery may be proposed.

When an event is transmitted via batch delivery through a broadband, events may be transmitted through an event stream table (EST). In some embodiments, the EST may also be referred to as an event message table (EMT). The EST may be an XML document and may include an EventStreamTable element as a root element.

The EventStreamTable element may be a list of the EventStream element. Each of the EventStream elements may be the same as the EventStream element in event transmission through the aforementioned broadcast network. The list of the EventStream element may include all event streams for one service.

The illustrated EMT may be EMT (EST) according to another embodiment of the present invention. The EMT may include @mpdId attribute, @periodId attribute, and EventStream element.

The @mpdId attribute may be an identifier of MPD related to events described by the corresponding EMT. The MPD may be used as a time reference of corresponding events.

The @periodId attribute may be an identifier of a period of MPD related to events of a corresponding EMT. The period may be used as a time reference of corresponding events.

The fields in the EventStream element are the same as the aforementioned fields. Here, data of the Event element may have a value appropriate for a type thereof depending on a value of the @schemeIdURi and/or the @value. The @presentationTime attribute may represent a start time of an event as a relative value to a start time of a period and the period may be identified by the @mpdId and the @periodId attribute.

The EST may be acquired in response to a query as described above. The query may be generated based on base URL information in the SLT. This is the same as the above description.

When events are transmitted via incremental delivery through a broadband, the events may be separately transmitted through a live event server. Polling may be periodically performed on the live event server and when an event to be transmitted in the period is present, an event server may transmit the event to a receiver. Information such as URL of the live event server and a polling period may be transmitted to a receiver by the aforementioned AST and EST or other signaling objects.

In this case, the transmitted event may have the same format as format of emsg box in the case of transmission of an event using the aforementioned emsg box. In some embodiments, signaling information corresponding to the aforementioned InbandEvent element may be transmitted together during transmission of a live event.

The schemeIdUri information and the value information may correspond to targetURI and eventName arguments with regard to API for addition and deletion of a Stream Event listener for an event stream. Events of each of the aforementioned embodiments may further include optional data attribute. The data attribute may provide data used to execute an action initiated by the corresponding event. The data attribute may correspond to data attribute of a StreamEvent interface returned to a listener registered when an event occurs.

In the case of transmission of an NRT content item, an NRT transmitting method of ATSC may be used. In this case, the AST may be used instead of NRT-IT and a content item to be transmitted by the AST may be identified. When an application is not listened by the AST, broadband delivery of an NRT content item may also be initiated.

In the case of an on-demand content item, the item may be transmitted through a broadband. Broadband delivery of the on-demand content item may be initiated.

Synchronization of an application will be described below.

Synchronization of an application may be required in various aspects. For example, actions of an application need to be synchronized with scheduled audio/video services. In addition, an application may be initiated and stopped depending on the scheduled audio/video services. With regard to playback of recorded content, NRT content, and so on as well as a basic broadcast service, an application and actions of the application need to be synchronized. In addition, the application may also be initiated and stopped depending on the recorded content, the NRT content, and so on for enhancement of an effective user experience.

It may be necessary to synchronize an application in a companion device (CD) with audio/video content that is played back in a PD in order to effectively and provide application enhancement provided by the CD.

The user experience will be described below.

In some embodiments, a user may control operations of an application for effective application enhancement. This is because, when control is not possible, enhancement may impede watching instead. According to an exemplary embodiment, user acceptance may be used. The user may collectively accept all services and any specific services. In addition, the user may accept applications of each service or services case by case.

In the case of user acceptance case by case, application notification needs to be pre-displayed prior to activation of the application. Through the notification, the user acceptance for activation of the application may be obtained. The application may be blocked until acceptance is achieved.

Format and location of notification for acceptance may be determined by a device manufacturer. An actual user interface for acceptance may also be determined by the device manufacturer. In these cases, specific format and so on may be proposed by a specific entity in an industrial aspect.

The notification for acceptance may be time out or dismissed by a user. Thereby, even if a user does not immediately determine to accept activation of an application, interference in watching of a user may be continuously prevented by the notification. However, even if notification is time out or dismissed, the user may activate or block an application via setting and so on. The user may terminate the activated application. In this case, even if signaling for activation of the application is received, the application may be continuously blocked.

Action synchronization and action parameters will be described below.

Download of an application, activation of an application, termination of an application, and/or a specific action of an application need to be synchronized with a basic broadcast program and so on.

In the case of actions of an application, action parameters may be required to perform the action. Information of the parameters may be performed. The action parameter may include an application identifier parameter for identifying an application related to an action, a time parameter indicating a time at which an action is to be performed, and/or a synchronization level parameter of a synchronization level of an action. Here, the time parameter may indicate a start time of an action as a relative value to a time base and a media time line. Here, the synchronization level parameter may indicate a synchronization level of program level sync, sync less than 2 seconds, lip sync, frame sync, and so on.

In the case of an action related to download of an application, the action may further include an action parameter of a target device and/or an action parameter of a jitter interval. The action parameter of a target device may include information on whether a downloaded application is for PD or CD. The action parameter of the jitter interval may include jitter interval related information for fetching of an application.

In the case of an action of initiation of an application, the action may further include an action parameter of a target device and/or an action parameter of a jitter interval. The action parameter of the target device may include information on whether an initiated application is for a PD or a CD.

As described above, the action parameter may also include an action parameter for providing data required to execute the application. The action parameter may include data required to execute the corresponding action.

FIG. 283 is a diagram illustrating AST transmitted in broadcast according to an embodiment of the present invention.

When the AST is transmitted through a broadcast network, the AST for application enhancement may be transmitted through a service signaling channel of a broadcast service related to corresponding application enhancement. Here, the service signaling channel of a service may refer to a path for transmitting the aforementioned SLS.

A broadcast signal (broadcast stream) with a specific frequency may include service data and/or signaling data for a service. For example, the broadcast signal may be identified by a specific frequency.

The broadcast signal may include a first ROUTE session (sIP # A/dIP # A/dPort # A). The service data for a service may be transmitted through the first ROUTE session.

The service data may include a video component and/or an audio component for a service. The video component may include at least one video segment including video data. The audio component may include at least one audio segment including audio data. The video component may be transmitted through a specific transport session of the first ROUTE session. The audio component may be transmitted through another transport session of the first ROUTE session.

The signaling data may include low level signaling data and/or service layer signaling data. For example, the low level signaling data may include FIT and/or SLT. The low level signaling data may be transmitted in an IP/UDP packet. The service layer signaling data may be referred to as SLS. The service layer signaling data may include USBD, MPD, S-TSID, and/or AST. The USBD, the MPD, the S-TSID, and/or the AST may be transmitted through a specific transport session. For example, the SLS may be transmitted through a specific LCT transport session included in a first ROUTE session (sIP # A/dIP # A/dPort # A). In detail, the SLS may be transmitted through a first transport session (tsi-sls) specified with tsi=0.

The first ROUTE session (sIP # A/dIP # A/dPort # A) may be identified by a combination of a source IP Address (sIP # A), a destinationIP Address (dIP # A), and a destination port number (dPort # A). The first ROUTE session may be transmitted through at least one PLP. For example, the first ROUTE session may be transmitted through a first PLP (PLP # A). The first ROUTE session may include a first transport session (tsi-sls), a second transport session (tsi-app), and/or a third transport session (not shown).

The first transport session (tsi-sls) may include at least one service layer signaling information item. For example, the service layer signaling information may include at least one of the aforementioned USBD, MPD, S-TSID, and/or AST.

The second transport session (tsi-app) may include at least one application item. For example, an application may refer to a set of documents (HTML, CSS, JavaScript, etc.) constituting an enhancement/interactive service.

The third transport session may include a video component. For example, the video component may include at least one video segment. A transport object identifier for the video segment may have a specific value.

Hereinafter, SLT (or FIT) will be described.

The SLT may permit a receiver to write a basic service list and to bootstrap discovery of the SLS of each service. The SLT may be transmitted through UDP/IP. The SLT may include basic information related to a service and bootstrapping information for acquisition of service layer signaling information.

For example, the SLT may include Broadcast_Stream_id attribute and first service element (Service # A).

The Broadcast_Stream_id attribute may be an identifier of entire broadcast stream. A value of the Broadcast_Stream_id field may be unique in a regional level.

The first service element (Service # A) may include at least one of serviceId attribute and/or signaling_broadcast element.

The serviceId attribute may be an integer number for uniquely identifying a corresponding service in a range of a corresponding broadcast region.

The signaling_broadcast element may include information for signaling information for a service transmitted in broadcast. The signaling_broadcast element may permit a receiver to bootstrap discovery of the SLS of each service.

The signaling_broadcast element may include at least one of a source IP Address related to the SLS of each service, a destination IP Address, a destination port number, a PLPID, and a transport session identifier (TSI).

For example, the source IP Address, the destination IP Address, and/or the destination port number may indicate the first ROUTE session (sIP # A/dIP # A/dPort # A). The PLPID may indicate a first PLP (PLP # A). The transport session identifier (TSI) may indicate a first transport session (tsi-sls).

Hereinafter, the SLS will be described.

The SLS may be transmitted through a broadcast network. The SLS may be transmitted through a specific LCT transport session included in the first ROUTE session (sIP # A/dIP # A/dPort # A). In detail, the SLS may be transmitted through the first transport session (tsi-sls) specified with tsi=0. The SLS may include at least one of USBD, MPD, S-TSID, and/or AST.

The USBD may describe service layer attributes. The USBD may include reference information (or Uniform Resource Identifier, URI) that refers to the MPD and/or the S-TSID. A detailed description of a USBD C620210 may include the entire aforementioned description of the USBD.

The MPD may include resource identifiers for separate media components of a linear/streaming service. For example, the MPD may include DASH MPD of all components transmitted through a mobile broadcast network, a general broadcast network, and/or the Internet. The DASH MPD may include formalized description of DASH Media Presentation. The DASH MPD may include resource identifiers for separate media components of a linear/streaming service. The DASH MPD may include context of identified resources in media presentation. For example, the resource identifier may be information for identifying representation related to a component for a service. For example, the resource identifier may be the form of segment URL.

The S-TSID may be a type of a service layer signaling (SLS) XML fragment for providing all session description information items for at least one transport session for transmitting at least one content components of a service.

The S-TSID may include a first ROUTE session element (RS) for providing information on a ROUTE session for a service and/or a component included in the service. The first ROUTE session element (RS) may include transport path information for the first ROUTE session. The first ROUTE session element (RS) may include information on a transport session (or a layered coding transport session) in the ROUTE session. For example, the first ROUTE session element (RS) may include a second transport session element (LS) including information on a second transport session. The second transport session element (LS) may include transport path information for the second transport session.

In detail, the second transport session element (LS) may include tsi attribute for identifying a transport session for transmitting a content component for a service and a SrcFlow element for describing source flow included in the ROUTE session. The SrcFlow element may include nrt attribute indicating whether a corresponding SrcFlow element transmits non-real time service data. The SrcFlow element may include rt attribute indicating whether the corresponding SrcFlow element transmits streaming media data. That is, the nrt attribute may perform the same function as the rt attribute and may be replaced with each other. For example, when the tsi attribute is "tsi-app", the corresponding transport session element may include information for the second transport session. When the nrt attribute is "true", the corresponding SrcFlow element may transmit non-real time service data.

The AST may include signaling information for an application. A detailed description of the AST may include the entire aforementioned description.

The AST may include ContentLinkage attribute. The ContentLinkage attribute may indicate an application that is supposed to use the corresponding content item. Signaling may be performed on a specific application by the attribute value and information (EventStream element, emsg box, etc.) on events to be described later.

For example, the ContentLinkage attribute may provide an application identifier for identifying an application (App) transmitted through the second transport session. The ContentLinkage attribute may provide a transport session identifier for identifying the second transport session (or LCT session).

The broadcast receiving apparatus according to an embodiment of the present invention may acquire a service based on signaling data. In detail, the broadcast receiving apparatus may acquire low level signaling data and acquire service layer signaling data based on the low level signaling data.

The broadcast receiving apparatus may acquire attribute of a service using service layer signaling data (USBD). The broadcast receiving apparatus may refer to and/or acquire MPD and/or S-TSID using the USBD.

The broadcast receiving apparatus may acquire information on at least one component (or representation) for a service using the service layer signaling data (USBD and/or MPD). For example, the broadcast receiving apparatus may acquire information on the video component.

The broadcast receiving apparatus may acquire transmission path information of at least one component using service layer signaling data (S-TSID). The broadcast receiving apparatus may acquire transmission path information of other components for at least one component using the service layer signaling data (S-TSID). For example, other components for at least one component may include an application.

The broadcast receiving apparatus may acquire service data for a service based on service layer signaling data (transmission path information). For example, the broadcast receiving apparatus may receive an application (App) through the second transport session (tsi-app) in non-real time.

The broadcast receiving apparatus may acquire information for identifying an application (App) based on the service layer signaling data (AST).

The broadcast receiving apparatus may execute an application at a predetermined timing while playback of the video component.

FIG. 284 is a diagram illustrating AST transmitted through a broadband according to an embodiment of the present invention.

When the AST is transmitted through a broadband, the AST may be acquired through a query. The query may be generated using base URL information in the aforementioned SLT. The base URL may be URL information for acquisition of the AST. Here, the SLT may include bootstrap information on a broadcast service related to the corresponding AST.

A broadcast signal (broadcast stream) with a specific frequency may include service data and/or signaling data for a service. The broadcast signal may include a first ROUTE session (sIP # A/dIP # A/dPort # A). The first ROUTE session may be transmitted through a first PLP (PLP # A). The first ROUTE session may include a first transport session (not shown), a second transport session (tsi-app), and/or a third transport session (not shown). The first transport session may include at least one service layer signaling information item. The second transport session (tsi-app) may include at least one application. The third transport session may include a video component. A detailed description of the third ROUTE session (sIP # A/dIP # A/dPort # A), the first PLP (PLP # A), the first transport session, the second transport session (tsi-app), and/or the third transport session according to an embodiment of the present invention may include the entire aforementioned description of the first ROUTE session (sIP # A/dIP # A/dPort # A), the first PLP (PLP # A), the first transport session, the second transport session (tsi-app), and/or the third transport session.

Hereinafter, the SLT (or FIT) will be described.

A detailed description of the SLT according to an embodiment of the present invention may include the entire aforementioned description of the SLT.

For example, the SLT may include Broadcast_Stream_id attribute and a first service element (Service # A).

The first service element (Service # A) may include at least one of serviceId attribute and/or signaling_broadbandelement.

The serviceId attribute may be an integer number for uniquely identifying a corresponding service in a range of a corresponding broadcast region.

The signaling_broadband element may include path information (or URL) for access to Internet signaling information (e.g., SLS) for a service. The signaling_broadband element may permit a receiver to bootstrap discovery of an SLS for each service. In this case, the SLS may be transmitted through a broadband.

The signaling_broadband element may include broadbandServerURL_AST for path information (or URL) for access to the AST for a service. In this case, the AST may be transmitted through a broadband.

Hereinafter, the SLS will be described.

The SLS may include at least one of USBD, MPD, S-TSID, and/or AST. A detailed description of the SLS may include the entire description of the SLS. However, there is a difference therebetween in that the SLS is transmitted through a broadband.

The broadcast receiving apparatus according to an embodiment of the present invention may receive a broadcast signal including at least one of service data and signaling data (e.g., low level signaling data or SLT) for a service through a broadcast network.

The broadcast receiving apparatus according to an embodiment of the present invention may acquire a service based on the signaling data. In detail, the broadcast receiving apparatus may acquire low level signaling data and acquire service layer signaling data based on the low level signaling data. The service level signaling data may be transmitted through a broadband.

The broadcast receiving apparatus may acquire attribute of a service using service layer signaling data (USBD). The broadcast receiving apparatus may refer to and/or acquire MPD and/or S-TSID using the USBD.

The broadcast receiving apparatus may acquire information on at least one component (or representation) for a service using service layer signaling data (USBD and/or MPD). For example, the broadcast receiving apparatus may acquire information on a video component.

The broadcast receiving apparatus may acquire transmission path information of at least one component using the service layer signaling data (S-TSID). The broadcast receiving apparatus may acquire transmission path information of other components for at least one component using service layer signaling data (S-TSID). For example, other components for at least one component may include an application.

The broadcast receiving apparatus may acquire service data for a service based on the service layer signaling data (transmission path information). For example, the broadcast receiving apparatus may receive an application (App) through the second transport session (tsi-app) in non-real time.

The broadcast receiving apparatus may acquire information for identifying an application (App) based on the service layer signaling data (AST).

The broadcast receiving apparatus may execute an application (App) at a predetermined timing while playback of the video component.

FIG. 285 is a diagram illustrating an event transmitted in the form of EventStream element in broadcast according to an embodiment of the present invention.

The event may be transmitted in the form of EventStream element indicated in a Period element of MPD. A description of the EventStream element transmitted through a broadcast network may include the entire aforementioned description of the EventStream element.

A broadcast signal (broadcast stream) with a specific frequency may include service data and/or signaling data for a service. The broadcast signal may include a first ROUTE session (sIP # A/dIP # A/dPort # A). The first ROUTE session may be transmitted through the first PLP (PLP # A). The first ROUTE session may include the first transport session (tsi-sls), the second transport session (tsi-app), and/or a third transport session (not shown). The first transport session (tsi-sls) may include at least one service layer signaling information item. For example, the service layer signaling information may include at least one of the aforementioned USBD, MPD, S-TSID, and/or AST. The second transport session (tsi-app) may include at least one application. The third transport session may include a video component. A description of the first ROUTE session (sIP # A/dIP # A/dPort # A), the first PLP (PLP # A), the first transport session, the second transport session (tsi-app), and/or the third transport session according to an embodiment of the present invention may include the entire description of the first ROUTE session (sIP # A/dIP # A/dPort # A), the first PLP (PLP # A), the first transport session, the second transport session (tsi-app), and/or the third transport session.

Hereinafter, the SLT will be described.

The SLT may permit a receiver to write a basic service list and to bootstrap discovery of the SLS of each service. For example, the SLT may include path information for the first ROUTE session (sIP # A/dIP # A/dPort # A). The SLT may include path information for the first transport session (tsi-sls). A description of the SLT according to an exemplary embodiment of the present invention may include the entire aforementioned description of the SLT.

Hereinafter, the SLS will be described.

The SLS may include at least one of USBD, MPD, S-TSID, and/or AST. A description of the SLS may include the entire aforementioned description of the SLS. Hereinafter, the MPD will be described in more detail.

The MPD may provide signaling information in a time interval unit of a service referred to as a period as service signaling information on a service. The signaling information on the period may be included in the MPD Period element and the Period element may include EventStream element. The EventStream element may provide signaling (event) required for operation of applications during a corresponding period of a corresponding service.

The EventStream element may include schemeIdUri attribute, value attribute, timescale attribute, and/or at least one Event sub element. Each Event sub element may include presentationTime attribute, duration attribute, and/or id attribute. A detailed description of the EventStream element may include the entire aforementioned description of the EventStream element.

For example, a value of the schemeIdUri attribute may be "urn:uuid:XYZY". A value of the value attribute may be "call". A value of the timescale attribute may be "1000".

With regard to the first event, a value of the presentationTime attribute may be "0", a value of the duration attribute may be "10000", a value of the id attribute may be "0", and/or a value of the data element/attribute may be "+1 800 10101010". With regard to the second event, a value of the presentationTime attribute may be "20000", a value of the duration attribute may be "10000", a value of the id attribute may be "1", and/or a value of the data element/attribute may be "+1 800 10101011". With regard to the third event, a value of the presentationTime attribute may be "40000", a value of the duration attribute may be "10000", a value of the id attribute may be "2", and/or a value of the data element/attribute may be "+1 800 10101012". With regard to the fourth event, a value of the presentationTime attribute may be "60000", a value of the duration attribute may be "10000", a value of the id attribute may be "3", and/or a value of the data element/attribute may be "+1 800 10101013".

The broadcast receiving apparatus according to an embodiment of the present invention may receive a broadcast signal including at least one of service data and signaling data (e.g., low level signaling data or service layer signaling data) for a service through a broadcast network.

The broadcast receiving apparatus according to an embodiment of the present invention may acquire a service based on signaling data. In detail, the broadcast receiving apparatus may acquire low level signaling data and acquire service layer signaling data based on the low level signaling data.

The broadcast receiving apparatus may acquire attribute of a service using service layer signaling data (USBD). The broadcast receiving apparatus may refer to and/or acquire the MPD and/or the S-TSID using the USBD.

The broadcast receiving apparatus may acquire information on at least one component (or representation) for a service using service layer signaling data (USBD and/or MPD). For example, the broadcast receiving apparatus may acquire information on the video component.

The broadcast receiving apparatus may acquire transmission path information of at least one component using service layer signaling data (S-TSID). The broadcast receiving apparatus may acquire transmission path information of other components for at least one component using the service layer signaling data (S-TSID). For example, other components for at least one component may include an application.

The broadcast receiving apparatus may acquire service data for a service based on the service layer signaling data (transmission path information). For example, the broadcast receiving apparatus may receive an application (App) in non-real time through the second transport session (tsi-app).

The broadcast receiving apparatus may acquire information for identifying an application (App) based on the service layer signaling data (AST).

The broadcast receiving apparatus may execute the application (App) based on an event. For example, the event may be transmitted in the form of EventStream element indicated in the Period element of the MPD. The broadcast receiving apparatus may execute an application (App) at a predetermined timing while playback of the video component.

FIG. 286 is a diagram illustrating an event transmitted in the form of emsg box in broadcast according to an embodiment of the present invention.

The event may be transmitted in the form of emsg box indicated in segments (or Representation segments) of Representation. A description of the emsg box transmitted through a broadcast network may include the entire aforementioned description of the emsg box.

The broadcast signal (broadcast stream) with a specific frequency may include service data and/or signaling data for a service. The broadcast signal may include a first ROUTE session (sIP # A/dIP # A/dPort # A). The first ROUTE session may be transmitted through a first PLP (PLP # A). The first ROUTE session may include the first transport session (tsi-sls), the second transport session (tsi-app), and/or the third transport session (tsi-v). The first transport session (tsi-sls) may include at least one service layer signaling information item. For example, the service layer signaling information may include at least one of the aforementioned USBD, MPD, S-TSID, and/or AST. The second transport session (tsi-app) may include at least one application. The third transport session may include a video component. The video component may include at least one video segment including video data. At least one video segment may include emsg box.

A description of the first ROUTE session (sIP # A/dIP # A/dPort # A), the first PLP (PLP # A), the first transport session, the second transport session (tsi-app), and/or the third transport session (tsi-v) according to an embodiment of the present invention may include the entire description of the first ROUTE session (sIP # A/dIP # A/dPort # A), the first PLP (PLP # A), the first transport session, the second transport session (tsi-app), and/or the third transport session (tsi-v).

Hereinafter, emsg box included in a segment will be described.

The emsg box may provide signaling information for generic events related to media presentation time. The emsg box may include at least one of a schemeIdUri field, a value field, a timescale field, a presentationTimeDelta field, an eventDuration field, an id field, and/or a messageData field. A description of the emsg box may include the entire aforementioned description of the emsg box.

Hereinafter, the SLT will be described.

The SLT may permit a receiver to write a basic service list and to bootstrap discovery of the SLS of each service. For example, the SLT may include path information for a first ROUTE session (sIP # A/dIP # A/dPort # A). The SLT may include path information for a first transport session (tsi-sls). A description of the SLT according to an exemplary embodiment of the present invention may include the entire aforementioned description of the SLT.

Hereinafter, the SLS will be described.

The SLS may include at least one of USBD, MPD, S-TSID, and/or AST. A description of the SLS may include the entire aforementioned description of the SLS. Hereinafter, the S-TSID and/or the MPD will be described.

The S-TSID may include a first ROUTE session element (RS) for providing information on a ROUTE session for a service and/or a component included in the service. The first ROUTE session element (RS) may include transmission path information for a first ROUTE session. The first ROUTE session element (RS) may include information on a transport session (or layered coding transport session) in the ROUTE session. For example, the first ROUTE session element (RS) may include a second transport session element (LS) including information on the second transport session. The second transport session element (LS) may include transmission path information for the second transport session. The first ROUTE session element (RS) may include the third transport session element (LS) including information on the third transport session. The third transport session element (LS) may include transmission path information for the third transport session.

In detail, the second transport session element (LS) and/or the third transport session element (LS) may each include tsi attribute for identifying a transport session for transmitting a content component for a service and a SrcFlow element described for source flow included in the ROUTE session.

The SrcFlow element may include nrt attribute indicating whether the corresponding SrcFlow element transmits non-real time service data. The SrcFlowelement may include rt attribute indicating whether the corresponding SrcFlow element transmits streaming media data. That is, the nrt attribute performs the same function as the rt attribute and may be replaced with each other.

The SrcFlow element may further include appID attribute including additional information mapped to a service (or application service) transmitted through a transport session. The appID attribute may be referred to as ContentInfo element. The ContentInfo element may include additional information mapped to a service (or an application service) transmitted through the transport session. For example, the ContentInfo element may include representation identifier (Representation ID) of DASH content and/or adaptation set parameters of DASH media representation in order to select an LCT transport session for rendering. The representation identifier may be related to a component for a service and may be referred to as id attribute. Accordingly, the appID attribute in the SrcFlow element may be matched with id attribute in the Representation element of the MPD.

With regard to the second transport session element (LS), when tsi attribute is "tsi-app", the corresponding transport session element may include information for the second transport session. When the nrt attribute is "true", the corresponding SrcFlow element may transmit non-real time service data. That is, an application (App) may be transmitted through the second transport session (tsi-app) in non-real time.

With regard to the third transport session element (LS), when the tsi attribute is "tsi-v", the corresponding transport session element may include information for the third transport session. When the nrt attribute is "false", the corresponding SrcFlow element may transmit real time service data. When the appID attribute is "rep_v1", a representation identifier of the video component may be "rep_v1". That is, at least one video segment of a video component identified by "rep_v1" may be transmitted through the third transport session (tsi-v) in real time.

The MPD may include resource identifiers for separate media components of a linear/streaming service. The MPD may include a Period element. The Period element may include AdaptationSet element including information on a video component. The AdaptationSet element may include at least one Representation element. The Representation element may include information on representation related to a component.

The Representation element may include id attribute for identifying representation. For example, a value of the id attribute may be "rep_v1". That is, the id attribute may indicate a video component transmitted through the third transport session (tsi-v).

The Representation attribute may further include InbandEventStream element that clearly describes presence of an in-band event stream in related representation. TheInbandEventStream element of the Representation element of the MPD may signal whether an event is present in the emsg box in segments.

The InbandEventStream element may include schemeIdURI attribute and/or value attribute. The two attributes may indicate a type of an event in the emsg box. In some embodiments, the two attributes may be used to identify an event. The schemeIdURI attribute and/or value attribute included in the InbandEventStreamelement may be matched with schemeIdURI attribute and/or value attribute in the emsg box. For example, a value of the schemeIdURI attribute may be "event_URI #1" and a value of the value attribute may be "abc".

The broadcast receiving apparatus according to an embodiment of the present invention may receive a broadcast signal including at least one of service data and signaling data (e.g., low level signaling data or service layer signaling data) for a service through a broadcast network.

The broadcast receiving apparatus according to an embodiment of the present invention may acquire a service based on the signaling data. In detail, the broadcast receiving apparatus may acquire low level signaling data and acquire service layer signaling data based on the low level signaling data.

The broadcast receiving apparatus may acquire attribute of a service using service layer signaling data (USBD). The broadcast receiving apparatus may refer to and/or acquire MPD and/or S-TSID using the USBD.

The broadcast receiving apparatus may acquire information on at least one component (or representation) for a service using the service layer signaling data (USBD and/or MPD). For example, the broadcast receiving apparatus may acquire information on a video component. In this case, a Representation element of the MPD may include the InbandEventStream element that clearly describes presence of the emsg box (or in-band event stream) in the video component.

The broadcast receiving apparatus may acquire transmission path information of at least one component using service layer signaling data (S-TSID). The broadcast receiving apparatus may acquire transmission path information of other components for at least one component using the service layer signaling data (S-TSID). For example, other components for at least one component may include an application.

The broadcast receiving apparatus may acquire service data for a service based on the service layer signaling data (transmission path information). For example, the broadcast receiving apparatus may receive an application (App) through a second transport session (tsi-app) in non-real time. The broadcast receiving apparatus may receive at least one video segment of a video component identified with "rep_v1" in real time through the third transport session (tsi-v). At least one video segment may include the emsg box.

The broadcast receiving apparatus may acquire information for identifying an application (App) based on the service layer signaling data (AST).

The broadcast receiving apparatus may execute an application (App) based on the event. For example, the event may be included in a segment in the form of emsg box. The broadcast receiving apparatus may execute an application (App) at a predetermined timing while playback of a video component.

FIG. 287 is a diagram showing an event transmitted in the form of EventStream element through a broadband according to an embodiment of the present invention.

The event may be transmitted in the form of EventStream element included in an event stream table (EST) transmitted through a broadband. When the EST is transmitted through the broadband, the EST may be acquired through a query. The query may be generated using URL information in the ALT. The URL information may be URL information for acquisition of the EST. A description of the EventStream element transmitted through a broadband may include the entire aforementioned description of the EventStream element.

A broadcast signal (broadcast stream) with a specific frequency may include service data and/or signaling data for a service. The broadcast signal may include a first ROUTE session (sIP # A/dIP # A/dPort # A). The first ROUTE session may be transmitted through the first PLP (PLP # A). The first ROUTE session may include the first transport session (tsi-sls), the second transport session (tsi-app), and/or the third transport session (not shown). The first transport session (tsi-sls) may include at least one service layer signaling information item. For example, the service layer signaling information may include at least one of the aforementioned USBD, MPD (not shown), S-TSID, and/or AST. The second transport session (tsi-app) may include at least one application. The third transport session may include a video component. In some embodiments, the MPD may be omitted. A description of the first ROUTE session (sIP # A/dIP # A/dPort # A), the first PLP (PLP # A), the first transport session, the second transport session (tsi-app), and/or the third transport session according to an exemplary embodiment of the present invention may include the entire description of the first ROUTE session (sIP # A/dIP # A/dPort # A), the first PLP (PLP # A), the first transport session, the second transport session (tsi-app), and/or the third transport session.

Hereinafter, the SLT will be described.

The SLT may include path information for the first ROUTE session (sIP # A/dIP # A/dPort # A). The SLT may include path information for the first transport session (tsi-sls). A description of the SLT according to an exemplary embodiment of the present invention may include the entire aforementioned description of the SLT.

Hereinafter, the SLS will be described.

The SLS may include at least one of USBD, MPD, S-TSID, and/or AST. A description of the SLS may include the entire aforementioned description of the SLS. Hereinafter, the AST will be described in more detail.

The AST may include ContentLinkage attribute. The ContentLinkage attribute may use an application that is supposed to use a corresponding content item. Signaling may be performed on a specific application based on the attribute value and information items (EventStream element, emsg box, etc.) of an event to be described below.

For example, the ContentLinkage attribute may provide an application identifier for identifying an application (App) transmitted through a second transport session. The ContentLinkage attribute may provide a transport session identifier for identifying the second transport session (or LCT session).

The AST may further include BroadbandStaticEventURL attribute. The BroadbandStaticEventURL attribute may include path information (or URL) for access to the EST for a service. In this case, the EST may be transmitted through a broadband. The EST may include the EventStream element. The EventStream element may provide required signaling (event) of execution of applications.

The EventStream element may include schemeIdUri attribute, value attribute, timescale attribute, and/or at least one Event sub element. Each Event sub element may include presentationTime attribute, duration attribute, and/or id attribute. A description of the EventStream element may include the entire aforementioned description of the EventStream element.

For example, a value of the schemeIdUri attribute may be "urn:uuid:XYZY". A value of the value attribute may be "call". A value of the timescale attribute may be "1000".

With regard to the first event, a value of the presentationTime attribute may be "0", a value of the duration attribute may be "10000", a value of the id attribute may be "0", and/or a value of the data element/attribute may be "+1 800 10101010". With regard to the second event, a value of the presentationTime attribute may be "20000", a value of the duration attribute may be "10000", a value of the id attribute may be "1", and/or a value of the data element/attribute may be "+1 800 10101011". With regard to the third event, a value of the presentationTime attribute may be "40000", a value of the duration attribute may be "10000", a value of the id attribute may be "2", and a value of the data element/attribute may be "+1 800 10101012". With regard to the fourth event, a value of the presentationTime attribute may be "60000", a value of the duration attribute may be "10000", a value of the id attribute may be "3", and a value of the data element/attribute may be "+1 800 10101013".

The broadcast receiving apparatus according to an embodiment of the present invention may receive a broadcast signal including at least one of service data and signaling data (e.g., low level signaling data or service layer signaling data) for a service through a broadcast network.

The broadcast receiving apparatus according to an embodiment of the present invention may acquire a service based on signaling data. In detail, the broadcast receiving apparatus may acquire low level signaling data and acquire service layer signaling data based on the low level signaling data.

The broadcast receiving apparatus may acquire attribute of a service using the service layer signaling data (USBD). The broadcast receiving apparatus may refer to and/or acquire the MPD and/or the S-TSID using the USBD.

The broadcast receiving apparatus may acquire information on at least one component (or representation) for a service using service layer signaling data (USBD and/or MPD). For example, the broadcast receiving apparatus may acquire information on a video component.

The broadcast receiving apparatus may acquire transmission path information of at least one component using service layer signaling data (S-TSID). The broadcast receiving apparatus may acquire transmission path information of other components for at least one component using service layer signaling data (S-TSID). For example, other components for at least one component may include an application.

The broadcast receiving apparatus may acquire service data for a service based on the service layer signaling data (transmission path information). For example, the broadcast receiving apparatus may receive an application (App) through the second transport session (tsi-app) in non-real time.

The broadcast receiving apparatus may acquire information for identifying an application (App) based on the service layer signaling data (AST). The broadcast receiving apparatus may acquire EST through a broadband base on the service layer signaling data (AST).

The broadcast receiving apparatus may execute an application (App) based on an event. For example, the event may be transmitted in the form of EventStream element included in an event stream table (EST) transmitted in a broadband.

The broadcast receiving apparatus may execute an application (App) at a predetermined timing while playback of a video component.

FIG. 288 is a diagram showing an event transmitted in the form of emsg box in a broadband according to an embodiment of the present invention.

The event may be transmitted in the form of emsg box transmitted in a broadband. In this case, the event may be transmitted through a live event server. Polling may be periodically performed on the live event server and when there is an event to be transmitted within the period, the event server may transmit the event to a receiver. A detailed description of the emsg box transmitted through a broadband may include the entire aforementioned description of the emsg box.

A broadcast signal (broadcast stream) with a specific frequency may include service data and/or signaling data for a service. The broadcast signal may include a first ROUTE session (sIP # A/dIP # A/dPort # A). The first ROUTE session may be transmitted through a first PLP (PLP # A). The first ROUTE session may include a first transport session (tsi-sls), a second transport session (tsi-app), and/or a third transport session (not shown). The first transport session (tsi-sls) may include at least one service layer signaling information item. For example, the service layer signaling information may include at least one of the aforementioned USBD, MPD (not shown), S-TSID, and/or AST. The second transport session (tsi-app) may include at least one application. The third transport session may include a video component. In some embodiments, the MPD may be omitted. A description of the first ROUTE session (sIP # A/dIP # A/dPort # A), the first PLP (PLP # A), the first transport session, the second transport session (tsi-app), and/or the third transport session according to an exemplary embodiment of the present invention may include the entire aforementioned description of the first ROUTE session (sIP # A/dIP # A/dPort # A), the first PLP (PLP # A), the first transport session, the second transport session (tsi-app), and/or the third transport session.

Hereinafter, the SLT will be described.

The SLT may include path information for the first ROUTE session (sIP # A/dIP # A/dPort # A). The SLT may include path information for the first transport session (tsi-sls). A description of the SLT according to an exemplary embodiment of the present invention may include the entire aforementioned description of the SLT.

Hereinafter, the SLS will be described.

The SLS may include at least one of USBD, MPD, S-TSID, and/or AST. A description of the SLS may include the entire aforementioned description of the SLS. Hereinafter, the AST will be described in more detail.

The AST may include ContentLinkage attribute. The ContentLinkage attribute may indicate an application using a corresponding content item. Signaling may be performed on a specific application based on a value of the attribute and information (EventStream element, emsg box, etc.) on events to be described below.

For example, the ContentLinkage attribute may provide an application identifier for identifying an application (App) transmitted through a second transport session. The ContentLinkage attribute may provide a transport session identifier for identifying the second transport session (or LCT session).

The AST may further include BroadbandDynamicEventURL attribute. The BroadbandDynamicEventURL attribute may include path information (or URL) for access to emsg box for a service. In this case, the emsg box may be transmitted through a broadband. The emsg box may provide signaling (event) required for execution of applications.

The emsg box may provide signaling information for generic events related to media presentation time. The emsg box may include at least one of a schemeIdUri field, a value field, a timescale field, a presentationTimeDelta field, an eventDuration field, an id field, and/or a messageData field. A description of the emsg box may include the entire aforementioned description of the emsg box.

For example, a value of the schemeIdUri field may be "urn:uuid:XYZY".

The broadcast receiving apparatus according to an embodiment of the present invention may receive a broadcast signal including at least one of service data and signaling data (e.g., low level signaling data or service layer signaling data) for a service through a broadcast network.

The broadcast receiving apparatus according to an embodiment of the present invention may acquire a service based on the signaling data. In detail, the broadcast receiving apparatus may acquire low level signaling data and acquire service layer signaling data based on the low level signaling data.

The broadcast receiving apparatus may acquire attribute of a service using service layer signaling data (USBD). The broadcast receiving apparatus may refer to and/or acquire MPD and/or S-TSID using the USBD.

The broadcast receiving apparatus may acquire information on at least one component (or representation) for a service using the service layer signaling data (USBD and/or MPD). For example, the broadcast receiving apparatus may acquire information on a video component.

The broadcast receiving apparatus may acquire transmission path information of at least one component using service layer signaling data (S-TSID). The broadcast receiving apparatus may acquire transmission path information of other components for at least one component using the service layer signaling data (S-TSID). For example, other components for at least one component may include an application.

The broadcast receiving apparatus may acquire service data for a service based on the service layer signaling data (transmission path information). For example, the broadcast receiving apparatus may receive an application (App) through the second transport session (tsi-app) in non-real time.

The broadcast receiving apparatus may acquire information for identifying an application (App) based on the service layer signaling data (AST). The broadcast receiving apparatus may acquire emsg box through a broadband based on the service layer signaling data (AST).

The broadcast receiving apparatus may execute an application (App) based on the event. For example, the event may be transmitted in the form of emsg box transmitted in a broadband.

The broadcast receiving apparatus may execute an application (App) at a predetermined timing while playback of a video component.

FIG. 289 is a diagram illustrating API and an event listener according to an embodiment of the present invention.

Referring to FIG. (a), a listener is shown.

An event processor may be a code that is executed in response to event occurrence. For example, the event processor may be a java script code to be executed in response to event occurrence. The event processor may include an event listener (an event listener or a listener). Differently from an event handler for processing only one event with respect to one element, the event listener may process at least one event with respect to one element.

The listener may include a general signature of a document object mode (DOM) event listener. Here, the DOM may refer to a model (system) for supporting the event handler to be connected to all element nodes.

The listener according to an embodiment of the present invention may include a StreamEvent type of object. For example, the listener may be configured in the form of listener (StreamEvent event).

A StreamEvent type of object transmitted to the listener may be obtained by extending a general DOM Event type of object.

The StreamEvent type of object may include name attribute, data attribute, text attribute, status attribute, and/or time attribute.

The name attribute may indicate a name of an event. The name attribute may be reading dedicated attribute and may be of a String type.

The data attribute may indicate data of an event encoded in hexadecimal. For example, data attribute may have a value of “0A10B81033”. The data attribute may be reading dedicated attribute and may be of a String type.

The text attribute may indicate text data of an event. For example, when the data attribute includes a text, the text attribute may have values of ASCII code. The text attribute may be a child element of an Event element for activation of an event and may include data identified by data identifier (dataID) that is clearly described in a trigger or in the Event element of the EMT. The text attribute may be reading dedicated attribute and may be of a String type.

The status attribute may indicate a state of an event. When an event is activated in response to a trigger, the status attribute may indicate “trigger”. When some types of errors occur, the status attribute may indicate “error”. The status attribute may be reading dedicated attribute and may be of a DOMString type.

The time attribute may indicate a time at which an event occurs. The time attribute may be reading dedicated attribute and may be of an integer type.

Referring to FIG. (b), API for addition and/or deletion of an event listener (or a listener) is shown.

An event processing method according to an embodiment of the present invention may include a method of connecting an object of an event listener and a method of the object. In this method, the event listener may be connected to a method of an object and, then, when an event occurs, the method of the object is executed.

In order to support the event processing method, addStreamEventListener API and/or removeStreamEventListener API according to an embodiment of the present invention may be used.

The addStreamEventListener API may add a listener (e.g., an event listener or a stream event listener) for an event. The addStreamEventListener API may add a listener for an event determined by an event identifier (e.g., eventID) in a range of a currently executed html application, to the AST. When a corresponding event is activated by a trigger, the listener is called. A TriggerEvent type (or StreamEvent type) object may be transmitted. Listeners may be added only when a video/broadcast object is presented and/or stopped.

The addStreamEventListener API may include at least one of targetURL parameter, eventName parameter, and/or Listener parameter. For example, the addStreamEventListener API may have the same format as addStreamEventListener (targetURL, eventName, and listener).

The targetURL parameter may indicate URL of a StreamEvent object for describing an event. The targetURL parameter may be mapped to schemeIdURI attribute of a DASH EventStream element.

The eventName parameter may indicate a name of an event as a subscription target. The eventName may be mapped to value attribute of the DASH EventStream element.

The Listener parameter may indicate a listener for an event. The Listener parameter may be a call-back function. When an event occurs, the listener parameter may be called as a parameter along with the transmitted StreamEvent object.

The targetURL parameter and the eventName parameter may be an event identifier for identifying an event. For example, the addStreamEventListener API may include an event identifier (eventId) parameter and a listener parameter. For example, the addStreamEventListener API may be of an addTriggerEventListener (String eventide and EventListener listener) type. The event identifier may be an identifier of an event present in an event element in the EMT. The event identifier may be an identifier (e.g., id field of emsg box) of events that are dynamically updated by a trigger.

The removeStreamEventListener API may remove a listener for an event. The removeStreamEventListener API may remove a listener for an event determined by an event identifier (e.g., eventID).

The removeStreamEventListener API may include at least one of targetURL parameter, eventName parameter, and/or Listener parameter. For example, the removeStreamEventListener API may have the same format as removeStreamEventListener (targetURL, eventName, and listener).

The targetURL parameter may indicate URL of a StreamEvent object. The targetURL parameter may be mapped to schemeIdURI attribute of the DASH EventStream element.

The eventName parameter may indicate a name of an event that is a removal target of subscription. The eventName may be mapped to value attribute of the DASH EventStream element.

The Listener parameter may indicate a listener for an event. The Listener parameter may be a call-back function. When an event occurs, the Listener parameter may be called as a parameter along with the transmitted StreamEvent object.

The targetURL parameter and the eventName parameter may be an event identifier for identifying an event. For example, the removeStreamEventListener API may include an event identifier (eventId) parameter and a listener parameter. For example, the removeStreamEventListener API may be of format of removeTriggerEventListener (StringeventId and EventListener listener). The event identifier may be an identifier (e.g., EventID attribute or id attribute) of an event present in an event element in the EMT. The event identifier may be an identifier (e.g., id field of emsg box) that is dynamically updated by a trigger.

The broadcast receiving apparatus according to an exemplary embodiment of the present invention may add a listener for an event based on the addStreamEventListener API. The broadcast receiving apparatus may add the listener for the event based on the removeStreamEventListener API. The addStreamEventListener API and/or the removeStreamEventListener API may support synchronization of html application actions for broadcast programming.

FIG. 290 is a diagram showing a broadcast transmitting method according to an embodiment of the present invention.

A broadcast transmitting apparatus may generate service data (or signaling information) for a service using a controller (CS2910100).

For example, the service data for a service may include at least one of a service identifier, media playback state information, an emergency alert message, and/or electronic service guide (ESG). A description of the media playback state information, the emergency alert message, and/or the ESG may include the entire aforementioned description of the media playback state information, the emergency alert message, and/or the ESG. A description of the service may include the entire aforementioned description of the service and/or the service data.

The broadcast transmitting apparatus may generate low level signaling data and/or service layer signaling data using the controller (CS2910200).

The signaling data may include low level signaling data, and/or service layer signaling data. The low level signaling data may support bootstrapping for acquisition of a service. For example, the low level signaling data may include the aforementioned FIC. The service layer signaling data may include first signaling data, second signaling data, and third signaling data.

The first signaling data may include reference information that refers to the second signaling data and the third signaling data. For example, the first signaling data may include the aforementioned USD and/or SMT. The second signaling data may include a description for a component of the service. For example, the second signaling data may include the aforementioned MPD. The third signaling data may include acquisition information of the component related to the service. For example, the third signaling data may include at least one of SDP, SMT, CMT, ROUTE session element, LCT session element, and/or LSID.

Here, the signaling data may include application signaling information for signaling of the application.

Here, the application signaling information may include at least one of type attribute indicating a type of the application, control code attribute indicating a control state of the application, priority attribute indicating priority of the application, version attribute indicating a version of the application, and/or storageCapabilities attribute indicating whether the application is capable of being stored. For example, the application signaling information may include the aforementioned AST.

The broadcast transmitting apparatus may transmit a broadcast signal including the service data, the low level signaling data, and/or the service layer signaling data using a transmitter (CS2910300).

FIG. 291 is a diagram showing a broadcast receiving method according to an embodiment of the present invention.

A broadcast receiving apparatus may receive a broadcast signal including a service using a broadcast interface (CS2920100). Here, the broadcast signal may further include signaling data.

Then, the broadcast receiving apparatus may acquire signaling data using a controller (CS2920200).

The signaling data may include low level signaling data, and/or service layer signaling data. The low level signaling data may support bootstrapping of acquisition of a service. For example, the low level signaling data may include the aforementioned FIC. The service layer signaling data may include first signaling data, second signaling data, and third signaling data.

The first signaling data may include reference information that refers to the second signaling data and the third signaling data. For example, the first signaling data may include the aforementioned USD and/or SMT. The second signaling data may include a description for a component of the service. For example, the second signaling data may include the aforementioned MPD. The third signaling data may include acquisition information of the component related to the service. For example, the third signaling data may include at least one of SDP, SMT, CMT, ROUTE session element, LCT session element, and/or LSID.

Here, the signaling data may include application signaling information for signaling of the application.

Here, the application signaling information may include at least one of type attribute indicating a type of the application, control code attribute indicating a control state of the application, priority attribute indicating priority of the application, version attribute indicating a version of the application, and/or storageCapabilities attribute indicating whether the application is capable of being stored. For example, the application signaling information may include the aforementioned AST.

Then, the broadcast receiving apparatus may acquire service data using the controller (CS2920300).

For example, the service data for a service may include at least one of service identifier, media playback state information, emergency alert message, and/or electronic service guide (ESG). A detailed description of the media playback state information, the emergency alert message, and/or the ESG may include the entire aforementioned description of the media playback state information, the emergency alert message, and/or the ESG. A description of the service may include the entire aforementioned description of the service and/or the service data.

Then, the broadcast receiving apparatus may establish web socket connection from an application of a companion screen device using the controller.

Here, the controller may generate a notification message for the service.

Then, the broadcast receiving apparatus may transmit the notification message to the companion screen device through the web socket connection using the companion screen interface.

The broadcast receiving apparatus may further establish web socket connection from the application of the broadcast receiving apparatus using the controller. Here, communication may be performed between an application of the companion screen device and an application of the broadcast receiving apparatus.

Here, the notification message may include a service identifier for identifying a service. For example, the service identifier may include Service ID.

Here, the notification message may include media playback state information. The media playback state information may include at least one of MPState element indicating a media playback state, MPSpeed element indicating speed of the media playback state, and MediaID element for identifying media to which request for subscription of media playback state information is made.

Here, the notification message may include an emergency alert message.

Here, the notification message may include the application signaling information.

With reference to FIGS. 292 to 294, a method of receiving media content presentation information through a broadcast network by a broadcast receiving apparatus will be described in detail with regard to the aforementioned embodiments. In addition, synchronization between broadcast content and media content by a broadcast receiving apparatus will be described in detail.

FIG. 292 is a block diagram illustrating reception of MPD of MPEG-DASH through a broadcast network for transmitting a broadcast stream by a broadcast receiving apparatus according to the MPEG-2 TS standard.

The controller 150 of the broadcast receiving apparatus 100 according to the embodiment of FIG. 292 may include a PSI parser, a TS filter, a TS/PES depacketizer, and a decoder.

The TS filter may extract a packet with a specific PID from a broadcast stream.

The PSI parser may parse a PSI table such as a program association table (PAT) and a program map table (PMT) to extract signaling information. In particular, in a detailed embodiment, the PSI parser may extract MPD_descriptor included in the PMT.

The TS/PES depacketizer may extract payload data from the TS/PES packet. In a detailed embodiment, when the MPD is transmitted in a separate information table in a broadcast stream, the TS/PES depacketizer may extract MPD from the separate information table based on the MPD_descriptor. In detail, the TS/PES depacketizer may extract an MPD from the information table included in a packet corresponding to a PID included in the MPD_descriptor. In addition, the TS/PES depacketizer may extract a video elementary stream and an audio elementary stream from the TS/PES packet.

The decoder may decode video and audio.

FIG. 293 is a block diagram illustrating synchronization between broadcast content of a broadcast stream transmitted according to the MPEG-2 TS standard and media content transmitted through a communication network by a broadcast receiving apparatus.

The controller 150 of the broadcast receiving apparatus 100 according to the embodiment of FIG. 293 may include a TS/PES depacketizer and a decoder.

The TS/PES depacketizer may extract payload data from the TS/PES packet. In a detailed embodiment, when the MPD is transmitted in a separate information table in a broadcast stream, the MPD may be extracted from a separate information table based on the MPD_descriptor. In detail, the MPD may be extracted from an information table included in the packet corresponding to the PID included in the MPD_descriptor. The TS/PES depacketizer may extract synchronization information for synchronization between media content and broadcast content from the TS/PES packet. In this case, the synchronization information may include presentation time of media content, an identifier for identifying a period element of the MPD, and an MPD URL. In addition, the TS/PES depacketizer may extract a video elementary stream and an audio elementary stream from the TS/PES packet.

The IP transceiver 130 may receive media content from a media CDN server based on the MPD.

The decoder may synchronize and decode the received media content based on the synchronization information.

FIG. 294 illustrates a structure of a broadcast receiving apparatus according to an embodiment of the present invention.

In the embodiment of FIG. 294, the broadcast receiving apparatus 100 may include the broadcast receiver 110, the IP transceiver 130, and the controller 150.

The broadcast receiver 110 may include a channel synchronizer 111, a channel equalizer 113, and a channel decoder 115.

The channel synchronizer 111 may synchronize a symbol frequency and timing so as to decode a broadcast signal in a baseband for receiving the broadcast signal.

The channel equalizer 113 may compensate for distortion of the synchronized broadcast signal. In detail, the channel equalizer 113 may compensate for distortion of the synchronized broadcast signal due to multipath interference, Doppler effect, and so on.

The channel decoder 115 may decode the broadcast signal, distortion of which is compensated for. In detail, the channel decoder 115 may extract a transport frame from the broadcast signal, distortion of which is compensated for. In this case, the channel decoder 115 may perform forward error correction (FEC).

The IP transceiver 130 may receive and transmit data through the Internet.

The controller 150 may include a signaling decoder 151, a transport packet interface 153, a broadband packet interface 155, a baseband operation controller 157, a common protocol stack 159, a service map database (DB) 161, a service signaling channel processing buffer and parser 163, an A/V processor 165, a broadcast service guide processor 167, an application processor 169, and a service guide DB 171.

The signaling decoder 151 may decode signaling information of the broadcast signal.

The transport packet interface 153 may extract a transport packet from the broadcast signal. In this case, the transport packet interface 153 may extract data such as signaling information or an IP datagram from the extracted transport packet.

The broadband packet interface 155 may extract the IP packet from the received data through the Internet. In this case, the broadband packet interface 155 may extract the signaling data or the IP datagram from the IP packet.

The baseband operation controller 157 may control an operation associated with reception of received information of broadcast information from a baseband.

The common protocol stack 159 may extract audio or video from the transport packet.

The A/V processor 165 may process audio or video.

The service signaling channel processing buffer and parser 163 may parse and buffer signaling information for signaling a broadcast service. In detail, the service signaling channel processing buffer and parser 163 may parse and buffer the signaling information for signaling the broadcast service from the IP datagram.

The service map DB 165 may store a broadcast service list including information on broadcast services.

The broadcast service guide processor 167 may process terrestrial broadcast service guide data for guiding a program of a terrestrial broadcast service.

The application processor 169 may extract and process application related information from the broadcast signal.

The application processor 169 may extract and process application related information from the broadcast signal.

The service guide DB 171 may store program information of a broadcast service.

Thus far, a schematic structure and operation of the broadcast receiving apparatus 100 have been described. However, the above description has been given in terms of a typical operation and transmission protocol of the broadcast receiving apparatus 100. However, in order to receive a hybrid broadcast service, the broadcast receiving apparatus 100 needs to process data of various transmission protocols. With reference to FIGS. 82 to 87, a detailed structure and operation of the broadcast receiving apparatus 100 for receiving a hybrid broadcast service will be described below.

FIG. 295 illustrates a structure of a broadcast receiving apparatus according to another embodiment of the present invention.

In the embodiment of FIG. 295, the broadcast receiving apparatus 100 may include the broadcast receiver 110, the IP transceiver 130, and the controller 150.

The broadcast receiver 110 may include one or more processors, one or more circuits, and one or more hardware modules, for performing a plurality of functions performed by the broadcast receiver 110. In detail, the broadcast receiver 110 may be a system on chip (SOC) in which a plurality of semiconductor components are stacked as one structure. In this case, the SOC may be a semiconductor formed by integrating various multimedia components such as graphics, audio, video, and MODEM and a semiconductor such as a processor and a DRAM. The broadcast receiver 110 may include a physical layer module 119 and a physical layer IP frame module 117. The physical layer module 119 may receive and process a broadcast related signal through a broadcast channel of a broadcast network. The physical layer IP frame module 117 may convert a data packet such as an IP datagram acquired from the physical layer module 119 into a specific frame. For example, the physical layer module 119 may convert the IP datagram and so on into an RS Frame, a GSE, or the like.

The IP transceiver 130 may include one or more processors, one or more circuits, and one or more hardware modules, for performing a plurality of functions performed by the IP transceiver 130. In detail, the IP transceiver 130 may be a system on chip (SOC) in which plural semiconductor components are stacked as one structure. In this case, the SOC may be a semiconductor formed by integrating various multimedia components such as graphics, audio, video, and MODEM and a semiconductor such as a processor and a DRAM. The IP transceiver 130 may include an Internet access control module 131. The Internet access control module 131 may control an operation of the broadcast receiving apparatus 100 for acquisition of any one of a service, content, and signaling data through a communication network (a broadband network).

The controller 150 may include one or more processors, one or more circuits, and one or more hardware modules, for performing a plurality of functions performed by the controller 150. In detail, the controller 150 may be a system on chip (SOC) in which a plurality of semiconductor components are stacked as one structure. In this case, the SOC SOC may be a semiconductor formed by integrating various multimedia components such as graphics, audio, video, and MODEM and a semiconductor such as a processor and a DRAM. The controller 150 may include at least one of the signaling decoder 151, the service map DB 161, a service signaling channel parser 163, an application signaling parser 166, an alert signaling parser 168, a targeting signaling parser 170, a targeting processor 173, an A/V processor 165, an alert processor 162, the application processor 169, a scheduled streaming decoder 181, a file decoder 182, an on-demand streaming decoder 183, a file DB 184, a component synchronizer 185, a service/content acquisition controller 187, a redistribution module 189, a device manager 193, and a data sharer 191.

The service/content acquisition controller 187 may control an operation of a receiver for acquisition of a service, content, and signaling data related to the service or content, acquired through a broadcast network or a communication network.

The signaling decoder 151 may decode the signaling information.

The service signaling channel parser 163 may parse the service signaling information.

The application signaling parser 166 may extract and parse signaling information related to a service. In this case, the signaling information related to the service may be signaling information related to service scan. In addition, the signaling information related to a service may be signaling information related to content provided through a service.

The alert signaling parser 168 may extract and parse signaling information related to alerts.

The targeting signaling parser 170 may extract and parse information for signaling targeting information or information for personalization of a service or content.

The targeting processor 173 may process information for personalization of a service or content.

The alert processor 162 may process signaling information related to alerts.

The application processor 169 may control execution of application related information and an application. In detail, the application processor 169 may process a state of a downloaded application and a display parameter.

The A/V processor 165 may process a rendering related operation of audio/video based on decoded audio or video, application data, and so on.

The scheduled streaming decoder 181 may decode scheduled streaming that is content that is streamed according to a schedule predetermined by a content provider such as a broadcaster.

The file decoder 182 may decode a downloaded file. In particular, the file decoder 182 may decode a file downloaded through a communication network.

The on-demand streaming decoder 183 may decode on-demand content provided on-demand.

The file DB 184 may store a file. In detail, the file DB 184 may store a file downloaded through a communication network.

The component synchronizer 185 may synchronize content or a service. In detail, the component synchronizer 185 may synchronize content decoded by at least one of the scheduled streaming decoder 181, the file decoder 182, and the on-demand streaming decoder 183.

The service/content acquisition controller 187 may control an operation of a receiver for acquisition of at least one of a service, content, and signaling information related to the service or content.

When the redistribution module 189 does not receive a service or content through a broadcast network, the redistribution module 189 may perform an operation for supporting acquisition of at least one of a service, content, service related information, and content related information. In detail, at least one of a service, content, service related information, and content related information may be requested to an external management device 300. In this case, the external management device 300 may be the content server 50.

The device manager 193 may manage an associated external device. In detail, the device manager 193 may perform at least one of addition, deletion, and update of an external device. In addition, the external device may be connected to the broadcast receiving apparatus 100 and may exchange data with the broadcast receiving apparatus 100.

The data sharer 191 may perform a data transmission operation between the broadcast receiving apparatus 100 and the external device and process exchange related information. In detail, the data sharer 191 may transmit A/V data or signaling information to the external device. The data sharer 191 may receive the A/V data or the signaling information to the external device.

FIG. 296 illustrates a structure of a broadcast receiving apparatus according to another embodiment of the present invention.

In the embodiment of FIG. 296, the broadcast receiving apparatus 100 may include the broadcast receiver 110, the IP transceiver 130, and the controller 150.

The broadcast receiver 110 may include at least one of a tuner 111 and a physical frame parser 113.

The tuner 111 may receive a broadcast signal transmitted through a broadcast network. The tuner 111 may convert the received broadcast signal into a physical frame form.

The physical frame parser 113 may extract a link layer frame from a physical frame of the received broadcast signal.

The IP transceiver 130 may receive and transmit IP data.

The controller 150 may include at least one of a physical layer controller 251, a link layer frame parser 252, an IP/UDP datagram filter 253, a ROUTE (AL/LCT) client 255, a timing control 257, a system clock 259, a DTV control engine 261, a user input receiver 263, a signaling parser 265, a channel map DB 267, an HTTP access client 269, an HTTP access cache 271, a DASH client 273, an ISO BMFF parser 275, a media decoder 277, and a file DB 279.

The physical layer controller 251 may control an operation of the broadcast receiver 110. In detail, the physical layer controller 251 may control transmission parameters of a broadcast signal received by the broadcast receiver 110 to selectively receive a broadcast signal. For example, the physical layer controller 251 may control a frequency of a broadcast signal received by the tuner 111. The physical layer controller 251 may control the physical frame parser 113 to extract a link layer frame from a broadcast signal.

The link layer frame parser 252 may extract data corresponding to a payload of a link layer frame from the link layer frame of a broadcast signal. In detail, the link layer frame parser 252 may extract link layer signaling from a link layer frame. The link layer signaling may signal a broadcast signal through a link layer. Thereby, the broadcast receiving apparatus 100 may acquire information on a broadcast service without extraction of an application layer. Accordingly, the broadcast receiving apparatus 100 may rapidly scan a broadcast service and convert the broadcast service. The link layer frame parser 252 may extract an IP/UDP datagram from the link layer frame.

The IP/UDP datagram filter 253 may extract specific IP/UDP datagram from the IP/UDP datagram. Data transmission through a broadcast network or multicast through a communication network is unidirectional communication and, thus, the broadcast receiving apparatus 100 may receive data items other than data required by the broadcast receiving apparatus 100. Accordingly, the broadcast receiving apparatus 100 may extract data required by the broadcast receiving apparatus 100 from a data stream. The IP/UDP datagram filter 253 may extract the IP/UDP datagram required by the broadcast receiving apparatus 100 from the IP/UDP datagram stream. In detail, the IP/UDP datagram filter 253 may extract an IP/UDP datagram corresponding to the determined IP address and UDP port number. In this case, the IP address may include any one of a source address and a destination address.

The ROUTE (AL/LCT) client 255 may process an application layer transport packet. In detail, the ROUTE (ALC/LCT) client 255 may process a real-time object delivery over unidirectional transport (ROUTE)-based ALC/LCT packet. The ROUTE protocol is an application layer protocol for transmitting data in real time using an ALC/LCT packet. The broadcast receiving apparatus 100 may extract at least one of broadcast service signaling information, NRT data, and media content from an ALC/LCT packet. In this case, the media content may have an MPEG-DASH form. In detail, the media content may be encapsulated in an ISO base media file format and transmitted according to an MPEG-DASH protocol. The broadcast receiving apparatus 100 may extract an MPEG-DASH segment from a ROUTE packet. The broadcast receiving apparatus 100 may extract an ISO BMFF file from the MPEG-DASH segment.

The timing control 257 may process a packet including system time information as a reference of media content presentation. The timing control 257 may control a system clock based on the system time information.

The system clock 259 may provide a reference clock as a reference of an operation of the broadcast receiving apparatus 100.

The DTV control engine 261 may function as an interface between components. In detail, the DTV control engine 261 may transmit a parameter for control of an operation of each component.

The user input receiver 263 may receive user input. In detail, the user input receiver 263 may receive at least one of a remote control input and a key input of a user.

The signaling parser 265 may transmit information on a broadcast service and parse broadcast service signaling information for signaling the broadcast service to extract information on the broadcast service. In detail, the signaling parser 265 may parse the broadcast service signaling information extracted from the application layer to extract information on the broadcast service. In another detailed embodiment, the signaling parser 265 may parse the broadcast service signaling information extracted from the link layer to extract information on the broadcast service.

The channel map DB 267 may store information on a channel map of the broadcast service. In detail, the signaling parser 265 may extract the information on the broadcast service and store information on a channel map in the channel map DB 267. The DTV control engine 261 may acquire information on a channel map of the broadcast service from a channel map DB. In this case, the information on the channel map may include at least one of a channel number indicating the broadcast service and a broadcast service name of the broadcast service.

The HTTP access client 269 may process HTTP data. In detail, the HTTP access client 269 may transmit a request to the content server 50 using HTTP and receive a response to the request from the content server 50.

The HTTP access cache 271 may cache the HTTP data to enhance processing speed of the HTTP data.

The DASH client 273 may process an MPEG-DASH segment. In detail, the DASH client 273 may process the MPEG-DASH segment received through a communication network. In detail, the DASH client 273 may process the MPEG-DASH segment extracted from the application layer of the broadcast signal received through the broadcast network.

The ISO BMFF parser 275 may process an ISO BMFF packet. In detail, the ISO BMFF parser 275 may extract media content from the ISO BMFF packet.

The media decoder 277 may decode media content. In detail, the media decoder 277 may decode the media content and present the media content.

The file DB 279 may store a file required for the broadcast service. In detail, the file DB 279 may store a file extracted from an application layer of the broadcast signal.

A detailed operation of the broadcast receiving apparatus 100 will be described with reference to FIGS. 297 to 299.

FIG. 297 is a flowchart illustrating an operation for scanning a broadcast service and generating a channel map by the broadcast receiving apparatus 100.

The controller 150 may set a broadcast signal receiving parameter. In detail, the controller 150 may set at least one of a frequency, a bandwidth, a symbol rate, and a physical layer pipe (PLP) identifier, for receiving a broadcast signal. In this case, the physical layer pipe may be a logical data transmission channel for identifying one radio frequency (RF) channel. One RF channel may include one or more physical layer pipes. The physical layer pipe may be referred to as a data pipe (DP). In a detailed embodiment, the controller 150 may set a broadcast signal receiving parameter based on a frequency table for storing a plurality of broadcast signal receiving parameters. For example, the broadcast receiving apparatus 100 may sequentially set broadcast signal receiving parameters stored in the frequency table and sequentially receive broadcast signals corresponding to the respective broadcast signal receiving parameters. In this case, the frequency table may be set according to regional standards or regional broadcast environments.

The broadcast receiver 110 may receive a broadcast signal based on the broadcast signal receiving parameter (S2103). In detail, the broadcast receiver 110 may receive a broadcast signal corresponding to the broadcast signal receiving parameter. The broadcast receiver 110 may demodulate the broadcast signal and extract a physical frame of the broadcast signal.

The controller 150 may extract broadcast service signaling information from the broadcast signal (S2105). In detail, the controller 150 may extract the broadcast service signaling information for signaling information on the broadcast service from the broadcast signal. The information on the broadcast service may include information for identifying the broadcast service. The information for identifying the broadcast service may include a channel number indicating a broadcast service. The information for identifying the broadcast service may include a broadcast service identifier for identifying the broadcast service. The information for identifying the broadcast service may include a channel number indicating the broadcast service. The information for identifying the broadcast service may include a broadcast service name indicating the broadcast service. The information on the broadcast service may include information for receiving the broadcast service. The information for receiving the broadcast service may include a broadcast signal receiving parameter required for setting of a broadcast receiver in order to receive the broadcast service. The information for receiving the broadcast service may include a broadcast stream identifier for identifying a broadcast stream transmitted by the broadcast service. The information for receiving the broadcast service may include an IP address and UDP port number for identifying the IP/UDP datagram transmitted by the broadcast service. The information for receiving the broadcast service may include a session identifier for identifying a session of the session-based transport protocol. The information for receiving the broadcast service may include a packet identifier for identifying a packet of a packet-based transmission protocol. In detail, the controller 150 may extract broadcast service signaling information of link layer signaling extracted from a link layer. In another detailed embodiment, the controller 150 may extract broadcast service signaling information from an application layer. As described above, upon receiving the broadcast service signaling information from the link layer, the controller 150 may reduce broadcast service scan time.

The controller 150 may generate a channel map for storing information on the broadcast service based on the broadcast service signaling information (S2107). In detail, the controller 150 may generate the channel map according to information on a broadcast service provided by the broadcast service signaling information. The channel map may include at least one of information for identifying each of the aforementioned broadcast services and information for receiving each of the broadcast services. The controller 150 may store the generated channel map in the channel map DB 267. The broadcast receiving apparatus 100 may receive the broadcast service based on the channel map, which will be described with reference to FIG. 61.

FIG. 298 is a flowchart illustrating an operation for receiving a broadcast signal by the broadcast receiving apparatus 100.

The controller 150 may receive a user input according to selection of the broadcast service (S2151). The controller 150 may receive a user input according to selection of the broadcast signal through the user input receiver 263. In detail, the controller 150 may receive an input for selecting any one broadcast service from a broadcast service list showing broadcast services by a user. The controller 150 may receive user input of a channel number through a remote controller.

The controller 150 may acquire a broadcast signal receiving parameter corresponding to the broadcast service selected by the user (S2153). In detail, the controller 150 may acquire a broadcast signal receiving parameter corresponding to the broadcast service selected by the user from the channel map. As described above, the broadcast signal receiving parameter may include at least one of a frequency, a bandwidth, a symbol rate, and a physical layer pipe identifier, for receiving a broadcast signal.

The controller 150 may set reception of the broadcast signal based on the broadcast signal receiving parameter. In detail, the controller 150 may set the broadcast receiver 110 according to the broadcast signal receiving parameter. For example, the controller 150 may set at least one of a frequency, a bandwidth, a symbol rate, and a physical layer pipe, for receiving the broadcast signal of the broadcast receiver 110. When a broadcast signal receiving parameter of a currently received broadcast signal is the same as an acquired broadcast signal receiving parameter, this operation may be omitted.

The broadcast receiver 110 may receive the broadcast signal based on the broadcast signal receiving setting (S2157). In detail, the broadcast receiver 110 may receive and demodulate the broadcast signal.

The controller 150 may acquire signaling information on the broadcast service selected by the user based on the broadcast signal (S2159). As described above, the controller 150 may acquire the broadcast service signaling information from the link layer. The controller 150 may acquire the broadcast service signaling information from the link layer. Although the channel map includes information on the broadcast service extracted from the broadcast service signaling information, the broadcast service signaling information is re-acquired. This is because information on the broadcast service is changeable after the channel map is generated. In addition, this is because only basic information for generating the channel map may be acquired and information on a component included in the broadcast service or information for broadcast service presentation may not be acquired during generation of the channel map.

The controller 150 may update the channel map based on the broadcast service signaling information. In detail, when the broadcast service signaling information is changed, the controller 150 may update the channel map. In a detailed embodiment, when previously acquired broadcast service signaling information and the broadcast service signaling information are different, the controller 150 may update the channel map. Upon comparing version information of the previously acquired broadcast service signaling information and version information of the broadcast service signaling information to determine that the broadcast service signaling information is changed, the controller 150 may update the channel map.

The controller 150 may receive a media component included in the broadcast service based on the channel map (S2163). The channel map may include information on reception of the media component. In detail, the channel map may include information for receiving the media component. The controller 150 may acquire information for receiving the media component from the channel map and receive the media component. For example, the controller 150 may acquire information for identifying an IP/UDP datagram for transmitting the media component from the channel map and information for identifying a session-based transport protocol packet for transmitting the media component and receive the media component. The information for identifying the IP/UDP datagram may include at least one of an IP address and a UDP port number. In this case, the IP address may include at least one of a source address and a destination address. The information for identifying the session-based transport protocol packet may include a session identifier for identifying a session. In detail, the session identifier may be TSI of the ALC/LCT session. In another detailed embodiment, the controller 150 may acquire information for identifying the IP/UDP datagram for transmitting the media component and information for identifying a packet-based transmission protocol packet for transmitting the media component from the channel map and receive the media component. The broadcast receiving apparatus 100 may receive the media component based on the media content presentation information, which will be described with reference to FIG. 86.

FIG. 299 is a flowchart illustrating an operation for acquiring a media component by a broadcast receiving apparatus based on media content presentation information.

The broadcast receiving apparatus 100 may acquire the media content presentation information (S2201). The broadcast receiving apparatus 100 may acquire the media content presentation information through a signaling message of the broadcast signal as described above.

The broadcast receiving apparatus 100 may acquire information on the media component based on the media content presentation information (S2203). The information on the media component may include information for receiving the aforementioned media component. The media content presentation information may include information on a broadcast service and the media component included in the broadcast service.

The broadcast receiving apparatus 100 may receive the media component based on the information on the media component (S2205). The broadcast receiving apparatus 100 may receive the media component through a broadcast network. The broadcast receiving apparatus 100 may receive the media component through a communication network. The broadcast receiving apparatus 100 may receive any one of a plurality of media components and receive another media component through a communication network. For example, the broadcast receiving apparatus 100 may receive a video component through a broadcast network and receive an audio component through a communication network.

Referring back to FIG. 298, an operation of the broadcast receiving apparatus 100 will be described below.

The controller 150 may present the broadcast service based on the media component (S2165).

With reference to FIGS. 300 and 301, a transport frame used in hybrid broadcast will be described below.

FIG. 300 illustrates a broadcast transport frame according to an embodiment of the present invention.

In an embodiment of FIG. 300, the broadcast transport frame may include a P1 part, an L1 part, a common PLP part, an interleaved PLP (scheduled & interleaved PLP's) part, and an auxiliary data part.

In the embodiment of FIG. 300, the broadcast transmitting apparatus may transmit information for transport signal detection through the P1 part of the broadcast transport frame. In addition, the broadcast transmitting apparatus may transmit tuning information for tuning to the broadcast signal through the P1 part.

In the embodiment of FIG. 300, the broadcast transmitting apparatus may transmit configuration of the broadcast frame and characteristics of each PLP through the L1 part. In this case, the broadcast receiving apparatus 100 may decode the L1 part based on the P1 to acquire configuration of the broadcast transport frame and characteristics of each PLP.

In the embodiment of FIG. 300, the broadcast transmitting apparatus may transmit information that is commonly applied between PLPs through the common PLP part. According to a detailed embodiment, the broadcast transport frame may not include the common PLP part.

In the embodiment of FIG. 300, the broadcast transmitting apparatus may transmit a plurality of components included in the broadcast service through the interleaved PLP part. In this case, the interleaved PLP part may include a plurality of PLPs.

In the embodiment of FIG. 300, the broadcast transmitting apparatus may signal a PLP through which a component included in each broadcast service is transmitted, through the L1 part or the common PLP part. However, the broadcast receiving apparatus 100 needs to decode a plurality of PLPs to scan a broadcast service.

Unlike in the embodiment of FIG. 300, the broadcast transmitting apparatus may transmit a broadcast transport frame including a separate part including information on a broadcast service transmitted through the broadcast transport frame and a component included in the broadcast service. In this case, the broadcast receiving apparatus 100 may rapidly acquire information on a broadcast service and components included in the broadcast service through the separate part, which will be described with reference to FIG. 320.

FIG. 301 illustrates a broadcast transport frame according to another embodiment of the present invention.

In the embodiment of FIG. 301, the broadcast transport frame may include a P1 part, an L1 part, a fast information channel (FIC) part, an interleaved PLP (scheduled & interleaved PLP's) part, and auxiliary data.

Other parts other than the FIC part are the same as in the embodiment illustrated in FIG. 300.

The broadcast transmitting apparatus may transmit fast information through the FIC part. The fast information may include configuration information of a broadcast stream transmitted through the transport frame, brief broadcast service information, and component information. The broadcast receiving apparatus 100 may scan the broadcast service based on the FIC part. In detail, the broadcast receiving apparatus 100 may extract information on the broadcast service from the FIC part. The fast information may be referred to as link layer signaling. This is because the broadcast receiving apparatus 100 parses only a link layer to acquire broadcast service information and component information without parsing the application layer.

FIG. 302 illustrates configuration of a service signaling message according to an embodiment of the present invention. In detail, FIG. 89 illustrates the syntax of the service signaling message according to an embodiment of the present invention. The service signaling message according to an embodiment of the present invention may include a signaling message header and a signaling message. In this case, the signaling message may be represented in binary or in XML format. The service signaling message may be included in a payload of a transmission protocol packet.

The signaling message header according to the embodiment of FIG. 302 may include identifier information for identifying the signaling message. For example, the signaling message may have a session format. In this case, the identifier information of the signaling message may indicate an identifier (ID) of a signaling table section. A field indicating the identifier information of the signaling message may be signaling_id. In a detailed embodiment, the signaling_id field may be 8 bits long.

A signaling message header according to the embodiment of FIG. 302 may include length information indicating a length of the signaling message header. A field indicating the length information of the signaling message may be signaling_length. In a detailed embodiment, the signaling_length field may be 12 bits long.

The signaling message header according to the embodiment of FIG. 302 may include identifier extension information for extension of an identifier of a signaling message. In this case, the identifier extension information may be information for identifying signaling together with the signaling identifier information. A field indicating the identifier extension information of the signaling message may be signaling_id_extension.

In this case, the identifier extension information may include protocol version information of the signaling message. A field indicating the protocol version information of the signaling message may be protocol_version. In a detailed embodiment, the protocol_version field may be 8 bits long.

A signaling message header according to the embodiment of FIG. 302 may include version information of the signaling message. The version information of the signaling message may be changed when content included in the signaling message is changed. A field indicating the version information of the signaling message may be version_number. In a detailed embodiment, the version_number field may be 5 bits long.

A signaling message header according to the embodiment of FIG. 302 may include information indicating whether the signaling message is currently available. A field indicating whether the signaling message is available may be current_next_indicator. For example, when the current_next_indicator field is 1, the current_next_indicator field may indicate that the signaling message is available. As another example, when the current_next_indicator field is 0, the current_next_indicator field may indicate that the signaling message is not available and another subsequent signaling message including the same signaling identifier information, signaling identifier extension information, or fragment number information is available.

A signaling message header according to the embodiment of FIG. 302 may include fragment number information of a signaling message. One signaling message may be divided into a plurality of fragments and transmitted. Accordingly, information for identifying the plurality of divided fragments by a receiver may be fragment number information. A field indicating the fragment_number information may be a fragment_number field. In a detailed embodiment, the fragment_number field may be 8 bits long.

A signaling message header according to the embodiment of FIG. 302 may include number information of a last fragment when one signaling message is divided into a plurality of fragments and transmitted. For example, when information on a last fragment number indicates 3, this may indicate that the signaling message is divided into three parts. In addition, this may indicate that a fragment including a fragment number indicating 3 includes last data of the signaling message. A field indicating number information of a last fragment may be last_fragment_number. In a detailed embodiment, the last_fragment_number field may be 8 bits long.

FIG. 303 illustrates a configuration of a broadcast service signaling message in a next-generation broadcast system according to an embodiment of the present invention.

The broadcast service signaling message according to an embodiment of the present invention may correspond to a broadcast service signaling method for receiving at least one of a broadcast service and content by the broadcast receiving apparatus 100 in a next-generation broadcast system.

The broadcast service signaling method according to the embodiment of FIG. 303 may be based on the signaling message configuration illustrated in FIG. 302. The broadcast service signaling message according to the embodiment of FIG. 303 may be transmitted through a service signaling channel. In this case, the service signaling channel may be one type of a physical layer pipe for directly transmitting service signaling information for broadcast service scan without passing through another layer. In a detailed embodiment, the service signaling channel may be referred to as at least one of a fast information channel (FIC) and low layer signaling (LLS). A broadcast service signaling message according to the embodiment of FIG. 303 may be one type of XML.

The service signaling message according to the embodiment of FIG. 303 may include number information of included services. In detail, one service signaling message may include a plurality of services and include information indicating the number of included services. The number information of services may be the num_services field. In a detailed embodiment, the num_services field may be 8 bits long.

The service signaling message according to the embodiment of FIG. 303 may include identifier information on a service. The identifier information may be a service_id field. In a detailed embodiment, the service_idfield may be 16 bits long.

The service signaling message according to the embodiment of FIG. 303 may include service type information. The service type information may be service_type field. In a detailed embodiment, when the service type field has a value of 0x00, a service type indicated by the signaling message may be a scheduled audio service.

According to another embodiment, when the service_type field has a value of 0x01, a service type indicated by the signaling message may be a scheduled audio/video service. In this case, the scheduled audio/video service may be an audio/video service broadcast according to a predetermined schedule.

According to another embodiment, when the service_type field has a value of 0x02, a service type indicated by the signaling message may be an on-demand service. In this case, the on-demand service may be an audio/video service presented on-demand. The on-demand service may be a service opposite to the scheduled audio/video service.

According to another embodiment, when the service_type field has a value of 0x03, a service type indicated by the signaling message may be an app-based service. In this case, the app-based service may be a non real time (NRT) service but not a real time broadcast service and may be a service provided through an application. The app-based service may include at least one of a service associated with the real time broadcast service and a service that is not associated with the real time broadcast service. The broadcast receiving apparatus 100 may download an application and provide the app-based service.

According to another embodiment, when the service_type field has a value of 0x04, a service type indicated by the signaling message may be rights issuer service. In this case, the rights issuer service may be a service provided only to a user that is issued rights to receive a service.

According to another embodiment, when the service_type field has a value of 0x05, a service type indicated by the signaling message may be a service guide service. In this case, the service guide service may be a service for providing information on a provided service. For example, the information of the provided service may be a broadcast schedule.

The service signaling message according to the embodiment of FIG. 303 may include service name information. The service name information may be short_service_name field.

The service signaling message according to the embodiment of FIG. 303 may include length information of the short_service_name field. The length information of the short_service_name field may be contained in the short_service_name_length field.

The service signaling message according to the embodiment of FIG. 303 may include broadcast service channel number information associated with a signaled service. The associated broadcast service channel number information may be a channel number field.

The service signaling message according to the embodiment of FIG. 303 may include data required to acquire a time base or a signaling message by a broadcast receiving apparatus according to each transmission mode to be described below. The data for acquisition of the time base or the signaling message may be a bootstrap( ) field.

The aforementioned transmission mode may be at least one of a time base transmission mode and a signaling transmission mode. The time base transmission mode may be a transmission mode of a time base including metadata about a timeline used in a broadcast service. The timeline may be a series of time information for media content. In detail, the timeline may be a series of reference times as a reference for media content presentation. Information on the time base transmission mode may correspond to a time base_transport_mode field.

The signaling transmission mode may be a mode for transmitting a signaling message used in the broadcast service. Information on the signaling transmission mode may be contained in the signaling_transport_mode field. Hereinafter, with reference to FIG. 304, the meaning of a value of each field will be described in detail.

FIG. 304 shows the meanings of values of a time base_transport_mode field and signaling_transport_mode field in a service signaling message according to an embodiment of the present invention.

The time base transmission mode may include a mode for acquisition of a time base of the broadcast service through an IP datagram in the same broadcast stream by the broadcast receiving apparatus 100. According to the embodiment of FIG. 304, when the time base_transport_mode field has a value of 0x00, the time base_transport_mode field may indicate that a broadcast receiving apparatus is capable of acquiring a time base of the broadcast service through an IP datagram of the same broadcast stream.

The signaling transmission mode may include a mode in which the broadcast receiving apparatus 100 acquires a signaling message used in a broadcast service through the IP datagram in the same broadcast stream. According to another embodiment illustrated in FIG. 304, when the signaling_transport_mode field has a value of 0x00, the signaling_transport_mode field may indicate that the broadcast receiving apparatus is capable of acquiring a signaling message used in a broadcast service is capable of being acquired through IP datagram in the same broadcast stream. The same broadcast stream may refer to the same broadcast stream as a broadcast stream in which the broadcast receiving apparatus currently receives the service signaling message. The IP datagram may be one transmission unit for encapsulating components included in the broadcast service or content according to Internet protocol. In this case, a bootstrap( ) field for time base and the signaling message may comply with the syntax illustrated in FIG. 305. The syntax illustrated in FIG. 92 may be represented in XML.

FIG. 305 illustrates the syntax of a bootstrap( ) field when a time base_transport_mode field and a signaling_transport_mode field have a value of 0x00 according to an embodiment of the present invention.

In the embodiment of FIG. 305, bootstrap data may include information on an IP address format of IP datagram including a time base or a signaling message. The information on the IP address format may be an IP_version_flag field. The information on the IP address format may indicate that the IP address format of the IP datagram is IPv4. According to an embodiment of the present invention, when the information on the IP address format is 0, the information on the IP address format may indicate that the IP address format of the IP datagram is IPv4. The information on the IP address format may indicate that the IP address format of IP datagram is IPv6. According to another embodiment, when the information on the IP address format is 1, the information on the IP address format may indicate that the IP address format of the IP datagram is IPv6.

In the embodiment of FIG. 305, bootstrap data may include information indicating whether the IP datagram including a time base or a signaling message includes a source IP address. In this case, the source IP address may be a source address of the IP datagram. Information indicating whether the IP datagram includes a source IP address may be source_IP_address_flag field. According to an embodiment, when the source_IP_address_flag field is 1, this may indicate that the IP datagram includes the source IP address.

In the embodiment of FIG. 305, the bootstrap data may include information indicating whether an IP datagram including the time base or the signaling message includes a destination IP address. In this case, the destination IP address may be a destination address of the IP datagram. Information indicating whether the IP datagram includes the destination IP address may be destination_IP_address field. According to an embodiment, when the destination_IP_address field is 1, this may indicate that the IP datagram includes the destination IP address.

In the embodiment of FIG. 305, the bootstrap data may include source IP address information of the IP datagram including the time base or the signaling message. The source IP address information may be a source_IP_address field.

In the embodiment of FIG. 305, the bootstrap data may include destination IP address information of the IP datagram including the time base or the signaling message. The destination IP address information may be destination_IP_address field.

In the embodiment of FIG. 305, the bootstrap data may include information on the number of flow ports of the IP datagram including the time base or the signaling message. In this case, the port may be a path for receiving a flow of the IP datagram. The information on the number of user datagram protocol (UDP) ports of the IP datagram may be port_num_count field.

In the embodiment of FIG. 305, the bootstrap data may include information on a UDP port number of the IP datagram including the time base or the signaling message. The UDP may be a communication protocol for unilaterally transmitting information from one side but not exchanging information during transmission and reception of the information via the Internet.

Referring back to FIG. 304, an embodiment of the present invention will be described.

A time base transmission mode may include a mode in which the broadcast receiving apparatus 100 acquires time base of the broadcast service through IP datagram in a different broadcast stream. According to another embodiment of FIG. 91, when the time base_transport_mode field has a value of 0x01, the time base_transport_mode field may indicate that the time base of the broadcast service is capable of being acquired through the IP datagram in a different broadcast stream. The different broadcast stream may be a different broadcast stream from a broadcast stream in which a service signaling message is currently received.

The signaling transmission mode may include a mode in which the broadcast receiving apparatus 100 acquires a signaling message used in a broadcast service through an IP datagram in a different broadcast stream. According to another embodiment of FIG. 304, when the signaling_transport_mode field has a value of 0x01, the signaling_transport_mode field may indicate that the signaling message used in the broadcast service is capable of being acquired through the IP datagram in the different broadcast stream. In this case, the bootstrap( ) field on the time base and the signaling message may comply with the syntax illustrated in FIG. 306. The syntax illustrated in FIG. 306 may be represented in XML.

FIG. 306 illustrates the syntax of a bootstrap( ) field when the time base_transport_mode field and the signaling_transport_mode field have a value of 0x01 according to an embodiment of the present invention.

The bootstrap data according to the embodiment of FIG. 306 may include identifier information of a broadcaster that transmits a signaling message. In detail, the bootstrap data may include unique identifier information of a specific broadcaster for transmitting a signaling message through a specific frequency or transport frame. The identifier information of the broadcaster may be broadcasting_id field. The identifier information of the broadcaster may be identifier information of a transmission stream for transmitting a broadcast service.

Referring back to FIG. 304, an embodiment of the present invention will be described.

The time base transmission mode may include a mode in which the broadcast receiving apparatus 100 acquires a time base through a session-based flow in the same broadcast stream.

According to another embodiment of FIG. 304, when the time base_transport_mode field has a value of 0x02, this may indicate that the time base of the broadcast service is capable of being acquired through a session-based flow in the same broadcast stream. The signaling transmission mode may include a mode in which the broadcast receiving apparatus 100 acquires a signaling message through a session-based flow in the same broadcast stream. When the signaling_transport_mode field has a value of 0x02, this may indicate that a signaling message used in the broadcast service is capable of being acquired through a session-based flow for transmitting an application layer in the same broadcast stream. In this case, session-based flow for transmitting the application layer may be any one of asynchronous layered coding (ALC)/layered coding transport (LCT) sessions and file delivery over unidirectional transport (FLUTE) sessions.

In this case, the bootstrap( ) field of the time base and the signaling message may comply with the syntax illustrated in FIG. 307. The syntax illustrated in FIG. 307 may be represented in XML.

The bootstrap data according to the embodiment of FIG. 307 may include transport session identifier information of an application layer for transmitting an application layer transport packet including the time base or the signaling message. In this case, the session for transmitting the transport packet may be any one of the ALC/LCT session and the FLUTE session. The identifier information of the application layer transmission session may be a tsi field.

Referring back to FIG. 304, an embodiment of the present invention will be described.

The time base transmission mode may be a mode in which the broadcast receiving apparatus 100 acquires a time base through a session-based flow in a different broadcast stream. According to another embodiment of FIG. 57, when the time base_transport_mode field has a value of 0x03, this may indicate that the time base of the broadcast service is capable of being acquired through a session-based flow in a different broadcast stream. In addition, the signaling transmission mode may include a mode in which the broadcast receiving apparatus 100 acquires a signaling message through a session-based flow in the same broadcast stream. When the signaling_transport_mode field has a value of 0x03, this may indicate that the signaling message used in the broadcast service is capable of being acquired through an application layer transmission session-based flow in a different broadcast stream. In this case, the application layer transmission session-based flow may be at least one of asynchronous layered coding (ALC)/layered coding transport (LCT) sessions and file delivery over unidirectional transport (FLUTE) session.

In this case, the bootstrap( ) field of the time base and the signaling message may comply with the syntax illustrated in FIG. 308. The syntax illustrated in FIG. 308 may be represented in XML.

The bootstrap data according to the embodiment of FIG. 308 may include identifier information of a broadcaster for transmitting the signaling message. In detail, the bootstrap data may include unique identifier information of a specific broadcaster for transmitting a signaling message through a specific frequency or transport frame. The identifier information of a broadcaster may be a broadcasting_id field. The identifier information of a broadcaster may be identifier information of a transmission stream of a broadcast service.

Referring back to FIG. 304, an embodiment of the present invention will be described.

The time base transmission mode may include a mode in which the broadcast receiving apparatus 100 acquires time base through a packet-based flow in the same broadcast stream. According to another embodiment of FIG. 304, when the time base_transport_mode field has a value of 0x04, this may indicate that the time base of the broadcast service is capable of being acquired through a packet-based flow in the same broadcast stream. In this case, the packet-based flow may be an MPEG media transport (MMT) packet flow.

In addition, the signaling transmission mode may include a mode in which the broadcast receiving apparatus 100 acquires a signaling message through a packet-based flow in the same broadcast stream. When the signaling_transport_mode field has a value of 0x04, this may indicate that a signaling message used in the broadcast service is acquired through a packet-based flow in the same broadcast stream. In this case, the packet-based flow may be an MMT packet flow.

In this case, the bootstrap( ) field of the time base and the signaling message may comply with the syntax illustrated in FIG. 309. The syntax illustrated in FIG. 309 may be represented in XML.

The bootstrap data according to the embodiment of FIG. 309 may include identifier information of a transport packet for transmitting the time base or the signaling message. The identifier information of the transport packet may be packet_id field. The identifier information of the transport packet may be identifier information of an MPEG-2 transmission stream.

Referring back to FIG. 304, an embodiment of the present invention will be described.

The time base transmission mode may include a mode in which the broadcast receiving apparatus 100 acquires a time base through a packet-based flow in a different broadcast stream.

According to another embodiment of FIG. 304, when the time base_transport_mode field has a value of 0x05, this may indicate that the time base of the broadcast service is capable of being acquired through a packet-based flow in a different broadcast stream. In this case, the packet-based flow may be an MPEG media transport packet flow.

In addition, the signaling transmission mode may include a mode in which the broadcast receiving apparatus 100 acquires a signaling message through a packet-based flow in a different broadcast stream. When the signaling_transport_mode field has a value of 0x05, this may indicate that the signaling message used in the broadcast service is capable of being acquired through a packet-based flow in a different broadcast stream. In this case, the packet-based flow may be an MMT packet flow.

In this case, the bootstrap( ) field of the time base and the signaling message may conform to the syntax illustrated in FIG. 310. The syntax illustrated in FIG. 310 may be represented in XML.

The bootstrap data according to the embodiment of FIG. 310 may include identifier information of a broadcaster for transmitting a signaling message. In detail, the bootstrap data may include unique identifier information of a specific broadcaster for transmitting a signaling message through a specific frequency or transport frame. The identifier information of the broadcaster may be a broadcasting_id field. The identifier information of a broadcaster may be identifier information of a transmission stream of the broadcast service.

The bootstrap data according to the embodiment of FIG. 310 may include identifier information of a transport packet for transmitting time base or a signaling message. The identifier information of the transport packet may be packet_id field. The identifier information of the transport packet may be identifier information of an MPEG-2 transport stream.

Referring back to FIG. 304, an embodiment of the present invention will be described.

The time base transmission mode may include a mode in which the broadcast receiving apparatus 100 acquires a time base through a URL.

According to another embodiment of FIG. 304, when the time base_transport_mode field has a value of 0x06, this may indicate that the time base of the broadcast service is capable of being acquired through a URL. In addition, the signaling transmission mode may include a mode in which the broadcast receiving apparatus 100 acquires the signaling message through a URL. When the signaling_transport_mode field has a value of 0x06, this may indicate that the signaling message used in the broadcast service is capable of being acquired through an identifier for identifying an address for receiving the signaling message. In this case, an identifier for identifying the address for receiving the signaling message used in the broadcast service may be a URL.

In this case, bootstrap( ) field of the time base and the signaling message may comply with the syntax illustrated in FIG. 311. The syntax illustrated in FIG. 311 may be represented in XML.

The bootstrap data according to the embodiment of FIG. 311 may include length information on a URL for downloading the time base or the signaling message of the broadcast service. The URL length information may be a URL_length field.

The bootstrap data according to the embodiment of FIG. 311 may include actual data of a URL for downloading the time base or the signaling message of the broadcast service. The actual data of the URL may be a URL_char field.

FIG. 312 illustrates a procedure of acquiring a time base and a service signaling message in the embodiment of FIGS. 303 to 311.

As illustrated in FIG. 312, the broadcast receiving apparatus 100 according to an embodiment of the present invention may acquire a time base through a packet-based transmission protocol. In detail, the broadcast receiving apparatus 100 may acquire a time base through an IP/UDP flow using the service signaling message. The broadcast receiving apparatus 100 according to an embodiment of the present invention may acquire a service related signaling message through the session-based transport protocol. In detail, the broadcast receiving apparatus 100 may acquire the service related signaling message through the ALC/LCT transfer session.

FIG. 313 illustrates a configuration of a broadcast service signaling message in a next-generation broadcast system according to an embodiment of the present invention. The broadcast service signaling message according to an embodiment may correspond to a service signaling method for receiving a broadcast service and content by a broadcast receiving apparatus in a next-generation broadcast system. The broadcast service signaling method according to the embodiment of FIG. 313 may be based on the signaling message configuration illustrated in FIG. 312. The broadcast service signaling message according to the embodiment of FIG. 313 may be transmitted through a service signaling channel. In this case, the service signaling channel may be one form of a physical layer pipe for directly transmitting service signaling information for scanning a broadcast service without passing through another layer.

In a detailed embodiment, the signaling channel may be referred to as at least one of a fast information channel (FIC), low layer signaling (LLS), and an application layer transmission session. In addition, the broadcast service signaling message according to the embodiment of FIG. 313 may be represented in XML.

The service signaling message according to the embodiment of FIG. 313 may include information indicating whether the service signaling message includes information required to acquire a time base. In this case, the time base may include metadata of a timeline used in the broadcast service. The timeline may be a series of time information for media content. Information indicating whether information for acquisition of the time base is included may be a timeline_transport_flag field. According to an embodiment, when the timeline_transport_flag field has a value of 1, this may indicate that the service signaling message includes information for transmitting the time base.

The service signaling message according to the embodiment of FIG. 313 may include data required to acquire a time base or a signaling message by a broadcast receiving apparatus according to each transmission mode to be described below. The data required to acquire the time base or the signaling message may be a bootstrap_data( ) field.

The aforementioned transmission mode may be at least one of a time base transmission mode and a signaling transmission mode. The time base transmission mode may be a transmission mode about time base including metadata about a time line used in the broadcast service. Information on the time base transmission mode may be a time base_transport_mode field.

The signaling transmission mode may be a mode for transmitting the signaling message used in the broadcast service. The information on the signaling transmission mode may be a signaling_transport_mode field.

The meaning of a bootstrap_data( ) field according to the time base_transport_mode field and the signaling_transport_mode field may be the same as the above description.

FIG. 314 illustrates a configuration of a broadcast service signaling message in a next-generation broadcast system according to an embodiment of the present invention. The broadcast service signaling message according to an embodiment of the present invention may correspond to a service signaling method for receiving a broadcast service and content by a broadcast receiving apparatus in a next-generation broadcast system. The broadcast service signaling according to the embodiment of FIG. 314 may be based on the signaling message configuration illustrated in FIG. 312. The broadcast service signaling message according to the embodiment FIG. 314 may be transmitted through a service signaling channel. In this case, the service signaling channel may be one form of a physical channel pipe for directly transmitting service signaling information for scanning a broadcast service without passing through another layer. In a detailed embodiment, the signaling channel may be referred to as at least one of a fast information channel (FIC), low layer signaling (LLS), and an application layer transmission session. The broadcast service signaling message according to the embodiment of FIG. 314 may be represented in XML.

The service signaling message according to the embodiment of FIG. 314 may indicate whether the service signaling message includes information required to acquire a time base. In this case, the time base may include metadata about a timeline used in the broadcast service. The timeline may be a series of time information for media content. Information indicating whether the information required to acquire the time base is included may be a timeline_transport_flag field. According to an embodiment of the present invention, when the timeline_transport_flag field has a value of 1, this may indicate that the service signaling message includes information for transmitting the time base.

The service signaling message according to the embodiment of FIG. 314 may indicate whether the service signaling message includes information required to acquire the signaling message. In this case, the signaling message may be a signaling message related to media presentation data (MPD) or MPD URL used in the broadcast service. The information indicating whether the information for acquisition of the signaling message is included may be an MPD_transport_flag field. According to an embodiment, when the MPD_transport_flag field has a value of 1, this may indicate that the service signaling message includes signaling message transmission related information related to MPD or MPD URL. Adaptive media streaming based on HTTP may be referred to as a dynamic adaptive streaming over HTTP (DASH). In addition, detailed information for acquisition of a segment included in a broadcast service and content in adaptive media streaming by a broadcast receiving apparatus may be referred to as MPD. The MPD may be represented in XML. The MPD URL related signaling message may include address information for acquisition of the MPD.

The service signaling message according to the embodiment of FIG. 314 may indicate whether the service signaling message includes information on an acquisition path for component data. In this case, the component may be one unit of content data for providing the broadcast service. The information indicating whether the path information of acquisition of the component data is included may be a component_location_transport_flag field. According to an embodiment, when the component_location_transport_flag field has a value of 1, the component_location_transport_flag field may indicate that the service signaling message includes path information for acquisition of the component_data.

The service signaling message according to the embodiment of FIG. 314 may indicate whether information required for acquisition of an application related signaling message is included. The information indicating whether information required to acquisition of the application related signaling message is included may be an app_signaling_transport_flag field. According to an embodiment, when the app_signaling_transport_flag field has a value of 1, the app_signaling_transport_flag field may indicate that the service signaling message includes path information for acquisition of the component data.

The service signaling message according to the embodiment of FIG. 314 may indicate whether signaling message transmission related information is included. The information indicating whether signaling message transmission related information is included may be a signaling_transport_flag field. According to an embodiment, when the signaling_transport_flag field has a value of 1, the signaling_transport_flag field may indicate that the service signaling message includes the signaling message transmission related information. When the service signaling message does not include the aforementioned MPD related signaling, component acquisition path information, and application related signaling information, the broadcast receiving apparatus may acquire the MPD related signaling, component acquisition path information, and application related signaling information through a signaling message transmission path.

The service signaling message according to the embodiment of FIG. 314 may indicate a mode for transmitting the time base used in the broadcast service. Information on the mode for transmitting time base may be the time base_transport_mode field.

The service signaling message according to the embodiment of FIG. 314 may indicate a mode for transmitting the MPD or MPD URL related signaling message used in the broadcast service. The information on the mode for transmitting the MPD or the MPD URL related signaling message may be MPD_transport_mode field.

The service signaling message according to the embodiment of FIG. 314 may indicate a mode for transmitting a component location signaling message including an acquisition path of component_data used in the broadcast service. The information on the mode for transmitting the component location signaling message including the acquisition path of the component data may be component_location_transport_mode field.

The service signaling message according to the embodiment of FIG. 314 may indicate a mode for transmitting an application related signaling message used in the broadcast service. The information on the mode for transmitting the application related signaling message may be app_signaling_transport_mode field.

The service signaling message according to the embodiment of FIG. 314 may indicate a mode for transmitting the service related signaling message used in the broadcast service. The information on the mode for transmitting the service related signaling message may be signaling_transport_mode field.

The meanings of values of the aforementioned time base_transport_mode field, MPD_transport_mode field, component_location_transport_mode field, app_signaling_transport_mode field, and signaling_transport_mode field will be described below with reference to FIG. 305.

FIG. 315 illustrates the meaning of a value of each transmission mode described with reference to FIG. 314. The X_transport_mode of FIG. 315 may include a timebase_transport_mode, an MPD_transport_mode, a component_location_transport_mode, an app_signaling_transport_mode, and a signaling_transport_mode. Detailed meaning of a value of each transmission mode is the same as in the description given with reference to FIG. 304. Referring back to FIG. 314, an embodiment of the present invention will be described.

The service signaling message according to the embodiment of FIG. 314 may include information required to acquire the time base or the signaling message by a broadcast receiving apparatus according to a value of each mode of FIG. 315. The information required to acquire the time base or the signaling message may be bootstrap_data( ) field. In detail, information included in the bootstrap_data( ) field is the same as in the above description given with reference to FIGS. 305 to 311.

FIG. 316 illustrates a configuration of a signaling message for signaling a component data acquisition path of a broadcast service in a next-generation broadcast system. In the next-generation broadcast system, one broadcast service may include one or more components. Based on the signaling message according to the embodiment of FIG. 316, the broadcast receiving apparatus may acquire information of an acquisition path of component data and related application in a broadcast stream. In this case, the signaling message according to the embodiment of FIG. 316 may be represented in XML.

The signaling message according to the embodiment of FIG. 316 may include information for identifying that a signaling message is a message for signaling a component location. The information for identifying that the signaling message is a message for signaling a component location may be a signaling_id field. In a detailed embodiment, the signaling_id field may be 8 bits long.

The signaling message according to the embodiment of FIG. 316 may include extension information for identifying that the signaling message is a message for signaling the component location. In this case, the extension information may include a protocol version of a message for signaling of the component location. The extension information may be signaling_id_extension field.

The signaling message according to the embodiment of FIG. 316 may include version information of a message for signaling component location. In this case, the version information may indicate that a message for signaling the component location is changed. The version information may be version_number field.

The signaling message according to the embodiment of FIG. 316 may include identifier information of an associated broadcast service. In this case, the identifier information of the associated broadcast service may be service_id field.

The signaling message according to the embodiment of FIG. 316 may include the number of components associated with the broadcast service. In this case, information on the number of associated components may be num_component field.

The signaling message according to the embodiment of FIG. 316 may include an identifier of each component. The component identifier may be configured by combining MPD@id, period@id, and representation@id of MPEG DASH. In this case, the identifier information of each component may be component_id field.

The signaling message according to the embodiment of FIG. 316 may include length information of the component_id field. In this case, the length information of the component_id field may be component_id_length field.

The signaling message according to the embodiment of FIG. 316 may include frequency information indicating a frequency for acquisition of component data. The component data may be a DASH segment. In this case, the frequency information for acquisition of the component data may be frequency_number field.

The signaling message according to the embodiment of FIG. 316 may include a unique identifier of a broadcaster. The broadcaster may transmit component data through a specific frequency or a transmitted transport frame. In this case, the unique identifier information of a broadcaster may be broadcast_id field. The broadcast_id field may indicate an identifier of a transmission stream of a broadcast service.

The signaling message according to the embodiment of FIG. 316 may include an identifier of a physical layer pipe for transmitting the component data. In this case, the identifier information of the physical layer pipe for transmitting the component data may be datapipe_id field.

The signaling message according to the embodiment of FIG. 316 may include an IP address format of an IP datagram including component data. The IP address format information of the IP datagram may be IP_version_flag field. In a detailed embodiment, when the IP_version_flag field has a field value of 0, this may indicate IPv4 format and when the IP_version_flag field has a field value of 1, this may indicate IPv6 format.

The signaling message according to the embodiment of FIG. 316 may include information indicating whether an IP datagram including component_data includes a source IP address. The information indicating whether the IP datagram includes the source IP address may be source_IP_address- _flag field. According to an embodiment, when the source_IP_address_flag field has a value of 1, this may indicate that the IP datagram includes the source_IP_address.

The signaling message according to the embodiment of FIG. 316 may include information indicating whether an IP datagram including component data includes the destination IP address. The information indicating whether the IP datagram includes the destination IP address may be a destination_IP_address_flag field. In an embodiment, when the destination_IP_address_flag field has a value of 1, this may indicate that the IP datagram includes the destination IP address.

The signaling message according to the embodiment of FIG. 316 may include source IP address information of IP datagram including component data. According to an embodiment, when the source_IP_address_flag field has a value of 1, the signaling message may include the source IP address information. The source IP address information may be a source IP address field.

The signaling message according to the embodiment of FIG. 316 may include destination IP address information of IP datagram including the component data. According to an embodiment, when the destination_IP_address_flag field has a value of 1, the signaling message may include the destination IP address information. The destination IP address information may be destination_IP_address field.

The signaling message according to the embodiment of FIG. 316 may include UDP port number information of IP datagram including component data. The UDP port number information may be UDP_port_num field.

The signaling message according to the embodiment of FIG. 316 may include information of a transport session identifier of an application layer for transmitting a transport packet including component data. The session for transmitting the transport packet may be at least one of an ALC/LCT session and a FLUTE session. The identifier information of the session may be tsi field.

The signaling message according to the embodiment of FIG. 316 may include identifier information of a transport packet including component data. The identifier information of the transport packet may be packet_id field.

The signaling message according to the embodiment of FIG. 316 may include the number of application signaling messages associated with the broadcast service. In this case, the broadcast service may be a broadcast service identified according to service_id field. The number information of the application signaling messages may be num_app_signaling field.

The signaling message according to the embodiment of FIG. 316 may include identifier information of the application signaling message. The identifier information of the application signaling message may be app_signaling_id field.

The signaling message according to the embodiment of FIG. 316 may include length information of app_signaling_id field. The length information of the app_signaling_id field may be app_signaling_id_length field.

The signaling message according to the embodiment of FIG. 316 may include data about a path for acquisition of data of an application included in a signaling message associated with an identifier of the application signaling message. The path information for acquisition of the application included in the signaling message associated with the identifier of the application signaling message may be app_delivery_info( ) field. Hereinafter, an embodiment of app_delivery_info( ) field of FIG. 104 will be described.

FIG. 317 illustrates the syntax of app_delevery_info( ) field according to an embodiment of the present invention.

Data about a path for acquisition of data of an application included in a signaling message associated with an identifier of the application signaling message according to the embodiment of FIG. 317 may include information indicating whether an application or related data is transmitted through a different broadcast stream. The information indicating whether the application or related data is transmitted through the different broadcast stream may be broadcasting_flag field.

The data about a path for acquisition of data of an application included in a signaling message associated with an identifier of the application signaling message according to the embodiment of FIG. 3174 may include IP address format of IP datagram including an application or related data. Information of IP address format of IP datagram may be IP_version_flag field. According to an embodiment, when the IP_version_flag field is 0, the IP datagram including the application or related data may use IPv4 format and when the IP_version_flag field is 1, the IP datagram including the application or related data may use IPv6 format.

The data about a path for acquisition of data of an application included in a signaling message associated with an identifier of the application signaling message according to the embodiment of FIG. 317 may indicate whether the IP datagram including the application or related data includes a source IP address. In this case, the associated data may be data required to execute an application.

The information indicating whether the IP datagram including the application or related data includes a source IP address may be source_IP_address_flag field. According to an embodiment, when the source_IP_address_flag field is 1, this may indicate that the IP datagram includes a source IP address.

The data about a path for acquisition of data of an application included in a signaling message associated with an identifier of the application signaling message according to the embodiment of FIG. 317 may include information indicating whether IP datagram including an application or related data includes the destination IP address. The information indicating whether the IP datagram including the application or related data includes the destination IP address may be destination_IP_address_flag field. According to an embodiment, when the destination_IP_address_flag field is 1, this may indicate that the IP datagram includes the destination IP address.

The data about a path for acquisition of data of an application included in a signaling message associated with an identifier of the application signaling message according to the embodiment of FIG. 317 may include a unique identifier of a broadcaster for transmitting an application or related data through a specific frequency or a transmitted transport frame.

In other words, the data about a path for acquisition of data of an application included in a signaling message associated with an identifier of the application signaling message may include an identifier of the broadcast service transmission stream. The unique identifier information of a broadcaster for transmitting an application or related data through a specific frequency or a transmitted transport frame may be a broadcast_id field. The broadcast_id field may indicate an identifier of a transmission stream of the broadcast service.

The data about a path for acquisition of data of an application included in a signaling message associated with an identifier of the application signaling message according to the embodiment of FIG. 317 may include a source IP address of IP datagram of an application or related data when the source_IP_address_flag field has a value of 1. The source IP address information of the IP datagram including the application or related data may be source_IP_address field.

The data about a path for acquisition of data of an application included in a signaling message associated with an identifier of the application signaling message according to the embodiment of FIG. 317 may include a destination IP address of IP datagram including an application or related data when the destination_IP_address_flag field has a value of 1. The destination IP address information of the IP datagram including the application or related data may be destination_IP_address field.

The data about a path for acquisition of data of an application included in a signaling message associated with an identifier of the application signaling message according to the embodiment of FIG. 317 may include information on the number of ports of IP datagram flows including the application or related data. The information on the number of ports of IP datagram flows including the application or related data may be port_num_count field.

The data about a path for acquisition of data of an application included in a signaling message associated with an identifier of the application signaling message according to the embodiment of FIG. 317 may include information on the number of IP datagram UDP ports including the application or related data.

The data about a path for acquisition of data of an application included in a signaling message associated with an identifier of the application signaling message according to the embodiment of FIG. 317 may include an identifier of a transmission session for transmitting the application or related data. The transmission session for transmitting the application or related data may be any one of an ALC/LCT session and a FLUTE session. The identifier information of the transmission session for transmitting the application or related data may be tsi field.

FIG. 318 illustrates the syntax of app_delevery_info( ) field according to another embodiment of the present invention.

Data about a path for acquisition of data of an application included in a signaling message related to an identifier of an application signaling message according to the embodiment of FIG. 318 may indicate an identifier of a transport packet for transmitting an application or related data. The transport packet for transmitting the application or related data may comply with a protocol based on a packet-based transmission flow. For example, the packet-based transmission flow may include an MPEG media transport protocol. The transport packet for transmitting the application or related data may be packet_id field.

FIG. 319 illustrates component location signaling including path information for acquisition of one or more component data items included in the broadcast service. In detail, FIG. 106 illustrates path information for acquisition of component data including a DASH segment when one or more components included in the broadcast service is represented in a segment of the MPEG DASH.

FIG. 320 illustrates a configuration of the component location signaling of FIG. 319.

The component location signaling according to the embodiment of FIG. 320 may include identifier information of MPEG DASH MPD related to the broadcast service. The identifier information of the MPEG DASH MPD may be mpdip field.

The component location signaling according to the embodiment of FIG. 320 may include an identifier of period attributes in the MPEG DASH MPD indicated by the mpdip field. Identifier information of the period attributes in the MPEG DASH MPD may be periodid field.

The component location signaling according to the embodiment of FIG. 320 may include an identifier of representation attributes in a period indicated by the periodid field. The identifier information of the representation attributes in the period may be ReptnID field.

The component location signaling according to the embodiment of FIG. 320 may include a frequency number for acquisition of a DASH segment included in the representation attributes in the period indicated by the ReptnID field. The frequency number for acquisition of the DASH segment may be an RF channel number. The frequency number information for acquisition of the DASH segment may be RFChan field.

The component location signaling according to the embodiment of FIG. 320 may include unique identifier of a broadcaster for transmitting the DASH segment through a specific frequency or a transmitted transport frame. The unique identifier information of a broadcaster for transmitting the DASH segment may be Broadcastingid field.

The component location signaling according to the embodiment of FIG. 320 may include an identifier of a physical layer pipe for transmitting the DASH segment. The physical layer pipe may be a data pipe for transmitting a physical layer. The identifier information for transmitting the DASH segment may be DataPipeId field.

The component location signaling according to the embodiment of FIG. 320 may include a destination IP address of IP datagram including the DASH segment. The destination IP address information of the IP datagram including the DASH segment may be IPAdd field.

The component location signaling according to the embodiment of FIG. 320 may include a UDP port number of the IP datagram including the DASH segment. The UDP port number information of the IP datagram including the DASH segment may be UDPPort field.

The component location signaling according to the embodiment of FIG. 320 may include a transport session identifier for transmitting a transport packet including the DASH segment. An identifier of the session for transmitting the transport packet may be at least one of an ALC/LCT session and a FLUTE session. The identifier information of the session for transmitting the transport packet may be TSI field.

The component location signaling according to the embodiment of FIG. 320 may include an identifier of a transport packet including the DASH segment. The identifier information of the transport packet may be PacketId field.

FIG. 321 is a flowchart illustrating an operation of a broadcast receiving apparatus according to an embodiment of the present invention.

A receiver of the broadcast receiving apparatus may receive a transmission protocol packet including a service signaling message (S2301). The receiver may include an Internet protocol communicator and a broadcast receiver. The service signaling message may be information for signaling at least one of a broadcast service and media content. According to an embodiment, the transmission protocol may be an Internet protocol (IP). In an embodiment, the service signaling message may be represented in the form of at least one of binary format and XML format.

The transmission protocol packet may include a signaling message header and a signaling message.

A controller of the broadcast receiving apparatus may extract the service signaling message from a received transmission protocol packet (S2303). In detail, the controller may parse the transmission protocol packet to extract a service signaling message. The controller may acquire Internet protocol datagram from the hierarchical transmission protocol packet. The acquired Internet protocol datagram may include a service signaling message.

The controller of the broadcast receiving apparatus may acquire information for providing a broadcast service from the service signaling message (S2305). The information for providing the broadcast service may be a portion of the service signaling message.

According to an embodiment, the information for providing the broadcast service may be transmission mode information for time base including metadata about a timeline as series of time information for content.

The information for providing the broadcast service according to another embodiment may be transmission mode information for detailed information for acquisition of segments included in content in the adaptive media streaming. The detailed information for acquisition of the segments included in content in the adaptive media streaming may be referred to as media presentation description (MPD).

The information for providing the broadcast service according to another embodiment may be transmission mode information for a path for acquisition of component data included in content from the broadcast service. The component data may be objects included in the broadcast service or content. In this case, the acquisition path information of the component data may be identification information of a physical layer pipe for transmitting the component data. The hierarchical transmission protocol packet may include a physical layer pipe transmitted through a physical layer. A plurality of physical layer pipes may be present. Accordingly, it may be necessary to identify a physical layer pipe including component data to be acquired among the plurality of physical layer pipes.

The information for providing the broadcast service according to another embodiment may be transmission mode information for a signaling message for an application used in the broadcast service. In this case, the transmission mode information for a signaling message for an application may be at least one of identifier information of a broadcaster for transmitting an application, a source IP address of Internet protocol datagram including an application, a destination IP address of Internet protocol datagram including an application, a port number of a user data protocol (UDP) of Internet protocol datagram including the application, identifier information for a transmission session for transmitting the application, and identifier information of a packet for transmitting the application.

The information for providing the broadcast service according to another embodiment may be transmission mode information for a signaling message for a service used in the broadcast service. In this case, the service may be one content item.

The information for providing the broadcast service according to another embodiment may include transmission mode information for component data included in the service. In this case, the transmission mode information for component data may indicate at least one of a transmission mode for supporting a non real service, a transmission mode for supporting a real time service, and a transmission mode for packet transmission.

The information for providing the broadcast service according to another embodiment may include information for receiving a file type of real service.

FIG. 322 is a flowchart illustrating an operation of a broadcast transmitting apparatus according to an embodiment of the present invention.

A controller of the broadcast transmitting apparatus may insert information for providing the broadcast service into a service signaling message (S2401). According to an embodiment, the controller of the broadcast transmitting apparatus may insert the information for providing the broadcast service into the service signaling message in XML. The controller of the broadcast transmitting apparatus according to another embodiment may insert the information for providing the broadcast service into the service signaling message in the binary form.

The controller of the broadcast transmitting apparatus may packetize the service signaling message into which the information for providing the broadcast service is inserted, in the transmission protocol packet (S2403). In this case, the transmission protocol may be any one of a session-based transport protocol (ALC/LCT, FLUTE) and a packet-based transmission protocol (MPEG-2 TS, MMT).

A transmitter of the broadcast transmitting apparatus may transmit the transmission protocol packet in which the service signaling message is packetized to the broadcast receiving apparatus through a specific transmission mode (S2405). According to an embodiment, the transmission mode for transmitting the packetized transmission protocol packet may be a transmission mode for time base including metadata for a timeline as series of time information for content used in the broadcast service. According to another embodiment, the transmission mode for transmitting the packetized transmission protocol packet may be a transmission mode for detailed information for acquisition of segments included in content in adaptive media streaming. According to another embodiment, the transmission mode for transmitting the packetized transmission protocol packet may be a transmission mode for a path for acquisition of component data included in content from the broadcast service. According to another embodiment, the transmission mode for transmitting the packetized transmission protocol packet may be a transmission mode for a signaling message for an application used in the broadcast service. According to another embodiment, the transmission mode for transmitting the packetized transmission protocol packet may be a transmission mode for a signaling message for a service used in the broadcast service.

FIG. 323 illustrates a trigger according to the aforementioned trigger syntax.

The trigger syntax according to another detailed embodiment may have a time text format indicated at a predetermined time. In detail, the timed text may be a closed caption.

FIG. 324 illustrates the syntax of triggering application information according to an embodiment of the present invention.

As described above, the triggering application information may be referred to as TPT. The triggering application information may signal a corresponding application corresponding to all program segments or some program segments according to time. In this case, the program segment may indicate a time period including a program.

The triggering application information may include protocol version information indicating a protocol version of triggering application information. In detail, the triggering application information may include major protocol version information indicating main version information of a protocol and minor protocol version information indicating additional version information of a protocol. In this case, the major protocol version information may correspond to a 3-bit integer. When the broadcast receiving apparatus 100 is not capable of supporting any one of the major protocol version information and the minor protocol information, the broadcast receiving apparatus 100 may disregard the triggering application information. The major protocol version information may be referred to as MajorProtocolVersion. The minor protocol version information may be referred to as MinorProtocolVersion. In a detailed embodiment, the major protocol version information may be a 3-bit element. The minor protocol version information may be a 4-bit element.

The triggering application information may include an identifier for identifying the triggering application information. In detail, the triggering application information may be an identifier for identifying a program segment. In a detailed embodiment, the identifier for identifying the program segment may be generated by combining a domain name and a program ID. For example, the identifier may be domain_name/program_id.

The triggering application information may include version information for indicating an update history of the triggering application information. A value of the version information may be changed whenever the triggering application information is changed.

The broadcast receiving apparatus 100 may determine whether detailed information included in the triggering application information is extracted based on the version information. In a detailed embodiment, the version information may be referred to as tptVersion. In a detailed embodiment, the version information may be an 8-bit element.

The triggering application information may include expiration time information indicating expiration date and time of the triggering application information. In detail, the broadcast receiving apparatus 100 may store the triggering application information and reuse the triggering application information prior to the expiration date and time indicated by the expiration time information. In a detailed embodiment, the expiration time information may be referred to as expirationDate. In a detailed embodiment, the expiration time information may be a 16-bit element.

The triggering application information may include time interval information indicating a time interval for checking update of the triggering application information. In detail, the broadcast receiving apparatus 100 may update the triggering application information at a time interval indicated by the time interval information. In a detailed embodiment, the time interval information may be referred to as updatingTime. In a detailed embodiment, the time interval information may be a 16-bit integer.

The triggering application information may include a service identifier for identifying a service including an application. In a detailed embodiment, the service identifier may indicate an identifier of an NRT service defined in the ATSC standard. In a detailed embodiment, the service identifier may be referred to as serviceId. In a detailed embodiment, the service identifier may be a 16-bit integer.

The triggering application information may include a base URL indicating a basic address of a URL included in the application information. In a detailed embodiment, the base URL may be referred to as baseURL.

The triggering application information may include capability information indicating capability required for presentation of an application signaled by the application information. The capability information may comply with a definition of capabilities descriptor defined in the ATSC standard. In a detailed embodiment, the capability information may be referred to as capabilities.

The triggering application information may include live trigger information that is generated in real time and transmitted via the Internet together with transmission of content.

In detail, the live trigger information may include a URL of a server for transmitting a live trigger. The live trigger information may include a polling period when a live trigger is transmitted using a polling method. In a detailed embodiment, the live trigger information may be referred to as LiveTrigger. In addition, a URL of a server for transmitting the live trigger may be referred to as a URL. In addition, the polling period may be referred to as pollPeriod.

The triggering application information may include information on an application. The application information may include detailed information on an application as a sub-element. In a detailed embodiment, the application information may be referred to as TDO.

The application information may include an application identifier for identifying an application. In a detailed embodiment, the application identifier may be referred to as appID. In a detailed embodiment, the application identifier may be a 16-bit element.

The application information may include application type information indicating a type of an application. In a detailed embodiment, when a value of the application type information is 1, the application type information may indicate TDO. In a detailed embodiment, the application type information may be referred to as appType. In a detailed embodiment, application type information may be a 16-bit element.

The application information may include application name information indicating a name of an application. In a detailed embodiment, the application name information may be referred to as appName.

The application information may include a global identifier for globally uniquely identifying an application. The global identifier may be used to indicate the same application as in other application information as well as corresponding triggering application information. In a detailed embodiment, the global identifier may be referred to as globalID.

The application information may include application version information that is version information indicating an update history of an application. In a detailed embodiment, the application version information may be referred to as appVersion. In a detailed embodiment, the appVersion may be an 8-bit element.

The application information may include cookie space information indicating a size of a persistent storage space required to execute an application by the broadcast receiving apparatus 100. The cookie space information may indicate a size of a storage space required to execute an application in kilobytes. In a detailed embodiment, the cookie space information may be referred to as cookieSpace. In a detailed embodiment, the cookie space information may be an 8-bit element.

The application information may include use frequency information indicating a use frequency of an application. The use frequency information may indicate at least one of only once, every time, every day, every week, and every month. In a detailed embodiment, the use frequency information may have a value of 1 to 16. In a detailed embodiment, the use frequency information may be referred to as frequencyOfUse.

The application information may include expiration time information indicating expiration time and date of an application. In a detailed embodiment, expiration time information may be referred to as expireDate.

The application information may include test application information indicating an application for test broadcast. The broadcast receiving apparatus 100 may disregard an application for test broadcast based on test application information. In a detailed embodiment, the test application information may be referred to as testTDO. In a detailed embodiment, the test application information may be a Boolean element.

The application information may include Internet available information indicating that an application is capable of being received through the Internet. In a detailed embodiment, the Internet available information may be referred to as availableInternet. In a detailed embodiment, the Internet available information may be a Boolean element.

The application information may include broadcast available information indicating that an application is capable of being received through a broadcast network. In a detailed embodiment, the broadcast available information may be referred to as availableBroadcast. In a detailed embodiment, the broadcast available information may be a Boolean element.

The application information may include URL information for identifying a file as a part of an application. In a detailed embodiment, the application information may be referred to as URL.

The URL information may include entry information indicating whether a corresponding file is an entry file. In detail, the entry file may indicate a file to be first executed in order to execute a corresponding application.

The application information may include capability information indicating necessary capability information required for presentation of an application. In a detailed embodiment, the capability information may be referred to as Capabilities.

The application information may include application boundary information indicating a boundary of an application. In a detailed embodiment, the application boundary information may be referred to as ApplicationBoundary.

The application boundary information may include origin URL information required to add a boundary of an application. The origin URL information may be referred to as originURL.

The application information may include content item information indicating information on a content item used by an application. The content item information may include detailed information content item. In a detailed embodiment, the content item information may be referred to as contentItem.

The content item may include URL information for identifying a file as a part of a corresponding content item. The URL information may be referred to as URL.

The URL information may include entry information indicating whether a corresponding file is an entry content file. In detail, the entry file may indicate a file to be first executed in order to execute a corresponding content item. In a detailed embodiment, the entry information may be referred to as entry.

The content item information may include update information indicating whether a corresponding content item is capable of being updated. In detail, the update information may indicate whether a content item includes a fixed file or the content item is real time data feed. In a detailed embodiment, the update information may be referred to as updateAvail. The update information may be a Boolean element.

The content item information may include a polling period when the content item is updated and when whether a file included in the content item is updated is checked using a polling method. In detail, the broadcast receiving apparatus 100 may check whether the content item is updated based on the polling period. The polling period may be referred to as pollPeriod.

The content item information may include size information indicating a size of the content item. In a detailed embodiment, the size information may indicate a size of the content item in a kilo byte. The size information may be referred to as a size.

The content item information may include Internet available information indicating that the content item is capable of being received through the Internet. In a detailed embodiment, the Internet available information may be referred to as availableInternet. In a detailed embodiment, the Internet available information may be a Boolean element.

The content item information may include broadcast available information indicating that the content item is capable of being received through a broadcast network. In a detailed embodiment, the broadcast available information may be referred to as availableBroadcast. In a detailed embodiment, the broadcast available information may be a Boolean element.

The application information may include event information indicating information on an event of an application. In a detailed embodiment, the event information may be referred to as event.

The event information may include an event identifier for identifying an event. In detail, the event identifier may uniquely identify an event within a corresponding application range. In a detailed embodiment, the event identifier may be referred to as eventID. In a detailed embodiment, the event identifier may be a 16-bit element.

The event information may include action information indicating an operation of an event. In detail, the event information may include preparing, execution, termination or kill, and/or suspending. In a detailed embodiment, the action information may be referred to as an action.

The event information may include destination information indicating target information targeted by an application. The destination information may indicate that an application is used only for a primary device for receiving a broadcast signal. The destination information may indicate that an application is used only for one or more associated devices that are operatively associated with a primary device for receiving a broadcast signal. The destination information may indicate that an application is used for both a primary device and an associated device. In a detailed embodiment, the destination information may be referred to as destination.

The event information may include diffusion information for diffusion of a triggering application information request. In detail, the broadcast receiving apparatus 100 may calculate a random value based on diffusion information, may be on standby by as much as the random value and, then may make a request for the triggering application information to a server. In detail, the broadcast receiving apparatus 100 may be on standby by as much as a value obtained by multiplying the random value by 10 ms and then may make a request for the triggering application information to the server. In a detailed embodiment, the diffusion information may be referred to as diffusion. In a detailed embodiment, the diffusion information may be an 8-bit element.

The event information may include data information indicating data associated with an event. Each event may have a data element associated with an event. In a detailed embodiment, the data information may be referred to as data.

The data information may include a data identifier for identifying data. The data identifier may be referred to as dataID. The data identifier may be a 16-bit element.

FIG. 325 illustrating a matching relationship of trigger attribute, the MPD element, and the event message box, for signaling trigger type information, according to an embodiment of the present invention.

The trigger type information may indicate a type of a trigger for triggering an application. For example, the trigger type information may include at least one of a trigger for signaling a position of triggering application information (i.e. TPT), a trigger for signaling a state of an application, a trigger for signaling an action of an application, and/or a trigger for signaling media time.

The broadcast server 10 may transmit the trigger type information as the event of the MPEG-DASH. In this case, the scheme identifier element included in the event stream element of the MPD may include information for identifying a scheme of a message included in the event. For example, the scheme identifier element may include information using syntax of uniform resource name (URN) or uniform resource locator (URL). The value element included in the event stream element of the MPD may include a value for the event stream. For example, the value element may include trigger type information indicating a type of a trigger for triggering an application. The broadcast receiving apparatus 100 may receive the trigger type information based on the event stream element of the MPD. In detail, the broadcast receiving apparatus 100 may extract a scheme identifier element and/or a value element from the event stream element of the MPD and receive the trigger type information.

In another detailed embodiment, a scheme identifier field included in the event message box may include information for identifying a scheme of the event message box. for example, the scheme identifier field may include information using syntax of uniform resource name (URN) or uniform resource locator (URL). The value field including the event message box may include a value of an event. For example, the value field may include trigger type information indicating a type of a trigger for triggering an application.

The broadcast receiving apparatus 100 may receive the trigger type information based on the event message box. In detail, the broadcast receiving apparatus 100 may extract a scheme identifier field and/or value field of the event message box and receive trigger type information.

FIG. 326 illustrates trigger type information according to an embodiment of the present invention.

The trigger type information may indicate a type of a trigger for triggering an application. For example, the trigger type information may include at least one of a trigger for signaling a location of triggering application information (i.e. TPT), a trigger for signaling a state of an application, a trigger for signaling an action of an application, and/or a trigger for signaling media time.

According to an embodiment of the present invention, the broadcast server 10 may identify the trigger type information based on a value field of the value element and/or the event message box of the event stream element of the MPD and transmit the trigger type information to the broadcast receiving apparatus 100. Hereinafter, the value element and/or the value field value will be referred to as value information. A value corresponding to the value information may be changed and/or added.

For example, when the value information indicates "tpt", the trigger type information may indicate a trigger for triggering a location of the triggering application information (i.e. TPT). The location of the triggering application information may be represented in the form of a uniform resource identifier (URI). The URI may include uniform resource locator (URL) and/or uniform resource name (URN). The URL may be information indicating a location of a network of web resource. The URN may be information for identifying resource according to a name of a specific namespace. When the URN indicates a location in On-line, a location of the triggering application information may be represented as "http://[domain]/[directory]". When the URN indicates a location on a session (e.g. FLUTE session, ROUTE session, and ALC/LCT session), the location of the triggering application information may be represented as "file://[ip_address]/[path]". That is, the scheme identifier element and/or the scheme identifier field may be represented as http://[domain]/[directory] and/or "file://[ip_address]/[path]".

When the value information indicates "status", the trigger type information may indicate a trigger for signaling a status (or lifecycle) of an application. The status of the application may include at least one of preparing, execution, termination, and/or suspending.

When the value information indicates "action", the trigger type information may indicate a trigger for signaling an action of an application.

When the value information indicates "mediatime", the trigger type information may indicate a trigger for signaling media time.

FIG. 327 illustrates the syntax of triggering application information according to an embodiment of the present invention.

According to an embodiment of the present invention, in a next-generation hybrid broadcast system, when the broadcast server 10 transmits trigger type information using a trigger, action information may be omitted from the aforementioned triggering application information.

FIG. 328 illustrates a matching relationship of trigger attribute, the MPD element, and the event message box, for signaling a position of information on a triggered application, according to an embodiment of the present invention.

The broadcast server 10 may transmit a position of the triggering application information as an event of MPEG-DASH. In this case, the identifier attribute included in the event element of the MPD may indicate an identifier for identifying the triggering application information. In addition, the position of the event may indicate a position of the triggering application information. The broadcast receiving apparatus 100 may receive triggering application information based on the event element. In detail, the broadcast receiving apparatus 100 may extract a position of the triggering application information from a message of the event and receive triggering application information.

In another detailed embodiment, an identifier field included in the event message box may indicate an identifier for identifying triggering application information. The message data field included in the event message box may indicate a position of the triggering application information. The broadcast receiving apparatus 100 may receive triggering application information based on the event message box.

In detail, the broadcast receiving apparatus 100 may extract a position of the triggering application information from the message data field of the event message box and receive the triggering application information.

As described above, the triggering application information may be TPT.

FIG. 329 illustrates a matching relationship of trigger attribute, the MPD element, and the event message box, for signaling a status of an application, according to an embodiment of the present invention.

The broadcast server 10 may transmit the status of the application as an event of MPEG-DASH. In this case, the presentation start time element included in the event element of MPD may indicate start time of the triggering event. The identifier attribute included in the event element of the MPD may indicate an identifier for identifying the triggering application information. A message included in the event element may indicate a status of an application. The broadcast receiving apparatus 100 may change the application status based on the event element. In detail, the broadcast receiving apparatus 100 may extract the application status from the message included in the event element and change the application status. In detail, the broadcast receiving apparatus 100 may extract a state of an application from a message included in an event element, extract event start time from the presentation start time element, and change the state of the application at start time of the triggering event.

In another detailed embodiment, a presentation start delay time field including the event message box may indicate start tie of the triggering event. An identifier field including the event message box may indicate an identifier for identifying the triggering application information. A message data field included in the event message box may indicate a state of an application. The broadcast receiving apparatus 100 may change a state of the application based on the event message box. In detail, the broadcast receiving apparatus 100 may extract the state of the application from the message data field of the event message box and change the state of the application. In a detailed embodiment, the broadcast receiving apparatus 100 may extract the state of the application from the message data field of the event message box, extract start time of the triggering event from the presentation start time delay field, and change the state of the application at start time of the triggering event.

The state of the application may indicate at least one of preparing, execution, termination, and suspending.

As described above, the triggering application information may be TPT.

FIG. 330 is a matching relationship of trigger attribute, an MPD element, and an event message box, for signaling an action of an application, according to an embodiment of the present invention.

The broadcast server 10 may transmit an action of an application as an event of MPEG-DASH. In this case, a presentation start time element included in an event element of MPD may indicate start time of the triggering event. The presentation duration element included in the event element of MPD may indicate a difference between start time of the triggering event and termination time of the triggering event. In another detailed embodiment, the presentation duration element included in the event element of MPD may indicate termination time of the triggering event. The identifier attribute included in the event element of MPD may indicate an identifier for identifying the triggering application information. A message included in the event element may indicate a carried-out action of an application. In detail, the message included in the event element may include at least one of an application identifier for identifying a triggered application, an identifier of an event for identifying a triggering event, and a data identifier for identifying data. In detail, the message included in the event element may have the aforementioned trigger format. In this case, the message included in the event element may not include start time of the triggering event included in the aforementioned attribute, termination time of the triggering event, and an identifier for identifying the program segment. For example, the message included in the event element may be xbc.tv/e12?e=7.5. The broadcast receiving apparatus 100 may perform the action of the application based on the event element. In detail, the broadcast receiving apparatus 100 may extract the action of the application from the message included in the event element and perform the action of the application. In detail, the broadcast receiving apparatus 100 may extract the action of the application from the message included in the event element, extract start time of the triggering event from the presentation start time element, and perform the action of the application at start time of the triggering event. In a detailed embodiment, the broadcast receiving apparatus 100 may extract the action of the application from the message included in the event element, extract start time of the triggering event from the presentation start time element, and perform the action of the application prior to termination time of the triggering event after start time of the triggering event. The broadcast receiving apparatus 100 may disregard the event message of MPEG-DASH upon receiving the MPEG-DASH event message after the termination time of the triggering event.

In another detailed embodiment, a presentation start delay time field including the event message box may indicate start time of the triggering event. The presentation duration field included in the event message box of the MPD may indicate a difference between start time of the triggering event and termination time of the triggering event. In another detailed embodiment, a presentation duration field including the event message box of the MPD may indicate termination time of the triggering event. The identifier field included in the event message box may indicate an identifier for identifying the triggering application information. The message data field included in the event message box may indicate the action of the application. In detail, the message data field included in the event message box may include at least one of an application identifier for identifying a triggered application, an identifier of an event for identifying a triggering event, and a data identifier for identifying data. In detail, the message data field included in the event message box may have the aforementioned trigger format. In this case, the message data field included in the event message box may not include start time of a triggering event included in the aforementioned attribute, termination time of the triggering event, and an identifier for identifying the program segment.

For example, the message data field included in the event message box may be xbc.tv/e12?e=7.5. The broadcast receiving apparatus 100 may perform the action of the application based on the event message box. In detail, the broadcast receiving apparatus 100 may extract the action of the application from the message data field of the event message box and perform the action of the application. In a detailed embodiment, the broadcast receiving apparatus 100 may extract the action of the application from the message data field of the event message box, extract start time of the triggering event from the presentation start time delay field, and perform the action of the application at start time of the triggering event.

In a detailed embodiment, the broadcast receiving apparatus 100 may extract the action of the application from the message data field of the event message box, extract start time of the triggering event from the presentation start time delay field, and perform the action of the application prior to termination time of the triggering event after start time of the triggering event. The broadcast receiving apparatus 100 may disregard the event message box upon receiving the event message box after termination time of the triggering event.

FIG. 331 is a matching relationship of trigger attribute, an MPD element, and an event message box, for signaling media time, according to an embodiment of the present invention.

The broadcast server 10 may transmit media time of content as an event of MPEG-DASH. In this case, the presentation start time element included in the event element of MPD may indicate media time of the content. In this case, the content may be content presented by the broadcast receiving apparatus 100. The identifier attribute included in the event element of the MPD may indicate an identifier for identifying the triggering application information. The broadcast receiving apparatus 100 may extract media time of content based on the event element. The broadcast receiving apparatus 100 may generate a time line as a reference of synchronization between a triggering event and content based on the media content of the content. In detail, the broadcast receiving apparatus 100 may extract the media time of the content from the presentation start time element included in the event element and generate a time line as a reference of synchronization between the triggering event and the content.

The presentation start time delay field included in the event message box of MPD may indicate media time of the content. In this case, the content may be content presented by the broadcast receiving apparatus 100. The identifier attribute included in the event element of MPD may indicate an identifier for identifying the triggering application information.

The broadcast receiving apparatus 100 may extract media time of the content based on the event message box. The broadcast receiving apparatus 100 may generate a time line as a reference of synchronization between the triggering event and the content based on the media time of the content. In this case, the content may be content presented by the broadcast receiving apparatus 100. In detail, the broadcast receiving apparatus 100 may extract media time of content from the presentation start time delay field included in the event message box and generate a time line as a reference of synchronization between the triggering event and the content.

Thereby, the broadcast receiving apparatus 100 may synchronize content and triggering event even if the media time information included in the content is not extracted.

FIG. 332 illustrates definition of value attribute for signaling all trigger attributes as one event according to an embodiment of the present invention.

In order to transmit a trigger as an event of MPEG-DASH, an event element may indicate a type of information signaled by a trigger. In detail, value attribute included in the event stream element may indicate that a trigger included in the message of an event signals a position of the triggering application information. In this case, a value of the value attribute may be tpt. The value attribute included in the event stream element may indicate that a trigger included in the message of the event signals a state of the application. In this case, the value of the value attribute may be status. The value attribute included in the event stream element may indicate that a trigger included in the message of the event signals the action of the application. In this case, the value of the value attribute may be an action. The value attribute included in the event stream element may indicate that a trigger included in the message of the event signals media time of the content. In this case, the value of the value attribute may be mediatime. The value attribute included in the event stream element may indicate that all information items included in the trigger included in the message of the event are included. In this case, the value of the value attribute may be a trigger.

In another detailed embodiment, the value field included in the event message box may indicate that a trigger included in the data message field of the event message box signals a position of the triggering application information. In this case, the value of the value field may be tpt. The value field included in the event message box may indicate that a trigger included in the data message field of the event message box signals a state of the application. In this case, the value of the value field may be status. The value field included in the event message box may indicate that a trigger included in the data message field of the event message box signals the action of the application. In this case, the value of the value field may be action. The value field included in the event message box may indicate that a trigger included in the data message field of the event message box signals media time of content. In this case, the value of the value field may be media time. The value field included in the event message box may indicate that all trigger attributes included in a trigger of the data message field of the event message box are included. In this case, the value of the value field may be trigger, which will be described below in detail.

FIG. 333 illustrates a matching relationship of identifier attribute and message attribute of an event element, an identifier field of an event message box, and a message data field, for signaling all trigger attributes as one event, according to an embodiment of the present invention.

As described above, all attributes to be included in a trigger may be signal as one event of MPEG-DASH.

When value information indicates "trigger", the trigger type information may indicate a trigger for signaling all trigger attributes as one event.

In detail, the message of the event of the MPEG-DASH may include at least one of an identifier for identifying a triggered application, an identifier for identifying a triggering event, an identifier for identifying data, start time of a triggering event, and termination time of the triggering event.

In this case, the identifier attribute of the event element may indicate an identifier for identifying triggering application information. The message included in the event element may include a trigger itself. In detail, the message of the event element may have the aforementioned trigger format. The message included in the event element may be timed text format of trigger.

The identifier field of the event message box may indicate an identifier for identifying the triggering application information. The message data field included in the event message box may include a trigger itself. In detail, the message data field included in the event message box may include the aforementioned format of trigger. The message data field included in the event message box may include the timed text format of trigger.

Thereby, the broadcast server 10 may transmit a plurality of trigger attributes through one MPEG-DASH event message. The broadcast receiving apparatus 100 may acquire a plurality of trigger attributes through one MPEG-DASH event message.

A trigger may be signaled through an MMT protocol, which will be described with reference to the following drawings.

FIG. 334 illustrates a configuration of a package of an MMT protocol according to an embodiment of the present invention.

As described above, an MMT protocol may be used as a protocol for transmitting media content by hybrid broadcast. Transmission of media content through an MMT protocol will be described with regard to package, asset, a media processing unit (MPU), and presentation information (PI).

The package may be a logical unit of content transmitted through the MMT protocol. In detail, the package may include a PI and an asset.

The asset may be an encoded media data unit included in the package. In a detailed embodiment, the asset may indicate an audio track included in the content. The asset may indicate a subtitle track included in the content. A service provider asset for providing the asset may include one or more MPUs.

The MPU may be a media processing unit of content transmitted according to an MMT protocol. In detail, the MPU may include a plurality of access units. The MPU may include different format of data such as MPEG-4 AVC or MPEG-TS.

PI may be aforementioned media content presentation information. In detail, the PI may include at least one of spatial information and temporal information required to consume the asset. In a detailed embodiment, the PI may be composition information defined n the ISO-IEC 23008-1.

The broadcast server 10 may transmit the package in an MMTP packet that is a transfer unit of the MMT protocol. A type included in a payload of the MMTP packet will be described with reference to the following drawings.

FIG. 335 illustrates a configuration of an MMTP packet and a type of data included in the MMTP packet according to an embodiment of the present invention.

According to an embodiment of the present invention, the MMTP packet may have the configuration illustrated in FIG. 112(*a*). In particular, the MMTP packet may indicate a type of data included in a corresponding packet through the field.

The MMTP packet may include a fragment of MPU in a payload. The MMTP packet may include a generic object indicating general data in a payload. In detail, the general object may be one complete MPU. In addition, the generic object may be a different type of object. The MMTP packet may include a signaling message in a payload. In detail, the MMTP packet may include one or more signaling messages. The MMTP packet may include a fragment of the signaling message. The signaling message may be a unit of signaling information for signaling media content transmitted according to an MMT protocol. The MMTP packet may include one repair symbol. In a detailed embodiment, the broadcast transmitting apparatus 100 may transmit application signaling information through the MMTP packet including a fragment of MPU. In detail, the broadcast transmitting apparatus 100 may transmit a trigger through the MMTP packet including the fragment of the MPU, which will be described below with reference to the following drawings.

FIG. 336 illustrates the syntax of an MMTP payload header when an MMTP packet includes a fragment of MPU according to an embodiment of the present invention.

When the MMTP packet includes the fragment of the MPU, the payload header of the MMTP packet may include a length field indicating length information of the payload of the MMTP packet. In a detailed embodiment, the length field may be referred to as length. In a detailed embodiment, the length field may be a 16-bit field.

When the MMTP packet includes the fragment of the MPU, the payload header of the MMTP packet may include a type field indicating a type of MPU included in the payload of the MMPT packet. In detail, when the MMTP packet includes the fragment of the MPU, the payload of the MMTP packet may include at least one of a media fragment unit, an MPU metadata, and movie fragment metadata. The MPU metadata may include other boxes between ftyp, mmpu, moov, and ftyp, mmpu, moov of ISO BMFF. The movie fragment metadata may include a moof box and an mdat box from which the media data is excluded. The fragment unit may include at least one of a media data sample and a sub sample. In this case, the media data may be any one of timed media data presented at predetermined time or non-timed media data, of which presentation time is not determined. In a detailed embodiment, the type field may be referred to as FT. In a detailed embodiment, the type field may be a 4-bit field.

When the MMTP packet includes a fragment of MPU, a payload header of the MMTP packet may include a timed flag indicating whether the fragment of the MPU includes timed media. In detail, when a value of the timed flag is 1, the timed flag may indicate that the fragment of the MPU included in the MMTP packet includes timed media. In a detailed embodiment, the timed flag may be referred to as T. In a detailed embodiment, the timed flag may be a 1-bit flag.

When the MMTP packet includes the fragment of the MPU, a payload header of the MMTP packet may include a fragment indicator indicating fragment information of a data unit included in the payload. The data unit may indicate a unit of data included in the payload of the MMTP packet. The payload of the MMTP packet may include one or more data units. In a detailed embodiment, the fragment indicator may be referred to as f_i. In a detailed embodiment, the fragment indicator may be a 2-bit field.

When the MMTP packet includes the fragment of the MPU, the payload header of the MMTP packet may include an aggregation flag indicating that one or more data units are included in the payload. In a detailed embodiment, the aggregation flag may be referred to as A. In a detailed embodiment, the aggregation flag may be a 1-bit flag.

When the MMTP packet includes the fragment of the MPU, the payload header of the MMTP packet may include a fragment counter field indicating the number of fragments include in the same data unit included in the payload. When the aggregation flag indicates that one or more data units are included in the payload, a value of the fragment counter field may be 0. In a detailed embodiment, the fragment counter field may be referred to as frqg_counter. In a detailed embodiment, the fragment counter field may be an 8-bit field.

When the MMTP packet includes the fragment of the MPU, the payload header of the MMTP packet may include an MPU sequence field indicating the number of a sequence included in the fragment of the MPU. In a detailed embodiment, the MPU sequence field may be referred to as MPU_sequence_number.

When the MMTP packet includes the fragment of the MPU, the payload header of the MMTP packet may include a data unit length field indicating a length of a data unit. In detail, when the payload of the MMTP packet includes one or more data units, the payload header of the MMTP packet may include a data unit length field indicating a length of the data unit. In a detailed embodiment, the data unit length field may be referred to as DU_length field. In a detailed embodiment, the data unit length field may be a 16-bit field.

When the MMTP packet includes a fragment of MPU, a payload header of an MMTP packet may include a data unit header field indicating a header of the data unit. The data unit header field may be changed according to a type of data included in the data unit. In detail, the data unit header field may have format that is changed according to a value of the aforementioned type field. Transmission of the application signaling information using syntax of the payload header will be described with reference to the following drawings.

FIG. 337 illustrates synchronization of a trigger transmitted through content and MPU according to an embodiment of the present invention.

The broadcast server 10 may transmit application signaling information to the MPU so as to transmit the information to a track of ISO BMFF. Thereby, the broadcast server 10 may transmit the application signaling information so as to be synchronized in content and frame units. In detail, the broadcast server 10 may transmit the application signaling information so as to be synchronized in content and frame units through syntax of a payload header of the aforementioned MMTP packet. In a detailed embodiment, the broadcast server 10 may set a fragment of the MPU as a media fragment unit, insert the application signaling message into the data unit payload, and transmit the result. The broadcast server 10 may set the timed flag to transmit timed media. In detail, when the application signaling information needs to be transmitted at specific time like a trigger, the broadcast server 10 may set the timed flag to transmit the timed media. When the application signaling information included in the data unit is a trigger, the trigger may have the aforementioned format. In another detailed embodiment, the trigger may have timed text format. The trigger may have XML format. The trigger may include an application identifier for identifying a triggered application. The trigger may include a triggering event identifier for identifying a triggering event. The trigger may include an action indicating an action of the triggered application. The trigger may include a data identifier for identifying data required by the triggering event. The trigger may include start time of the triggering event. The trigger may include termination time of the triggering event. As described above, the broadcast receiving apparatus 100 may perform an action prior to termination time of the triggering event after start time of the triggering event. In detail, thereby, the trigger may synchronize the application signaling information with the movie fragment presented in a predetermined sequence and at predetermined time. In a detailed embodiment, the broadcast server 10 may set start time of the triggering event and termination time of the triggering event using media time in the movie fragment as a reference. The broadcast server 10 may set the start time of the triggering event and the termination time of the triggering event as relative time inside the trigger. The broadcast server 10 may set the start time of the triggering event and the termination time of the triggering event as time based on a wall-clock provided in out-of-band. For example, the broadcast server 10 may set the start time of the triggering event and the termination time of the triggering event as time based on a wall-clock provided by CI.

The broadcast server 10 may set the start time of the triggering event and the termination time of the triggering event as time based on wall-clock provided by the timestamp descriptor( ).

In the embodiment of FIG. 337, a first trigger (trigger 1) may be synchronized with a first movie fragment (Movie Fragment 1). A second trigger (trigger 2) may be synchronized with a second movie fragment (Movie Fragment 2). In detail, the first trigger may signal a position of triggering application information and trigger immediate execution of a triggering event with a triggering event identifier of 5 with respect to an application with an application identifier of 7, according to the aforementioned trigger format. According to the aforementioned trigger format, the second trigger may signal a position of the triggering application information and trigger execution of a triggering event with a triggering event identifier of 3 with respect to an application with an application identifier of 8 between 77ee and 80ee, according to the aforementioned trigger format.

The broadcast server 10 may transmit an application signaling message as one of signaling messages of an MMT protocol, which will be described with reference to the following drawings.

FIG. 338 illustrates the syntax of an MMT signaling message according to another embodiment of the present invention.

According to an embodiment of the present invention, the MMT signaling message may include a message identifier for identifying a signaling message. In a detailed embodiment, the message identifier may be referred to as message id. In a detailed embodiment, the message identifier may be a 16-bit field.

The MMT signaling message may include version information indicating an update history of a signaling message. In a detailed embodiment, the version information may be referred to as version. In a detailed embodiment, the version information may be an 8-bit field.

The signaling message may include length information indicating a length of data included in the signaling message. The length information may be referred to as length. In a detailed embodiment, the length information may be a 16-bit field or a 32-bit field.

The signaling message may include future extension of the signaling message as extension information. The signaling message may include various information items, which will be described below with reference to the drawings.

FIG. 339 illustrates a relationship between an identifier for identifying an MMT signaling message and data signaled by the MMT signaling message according to an embodiment of the present invention.

In detail, the signaling message may be a PA message indicating information of all other signaling tables. In this case, a value of the message identifier may be 0x0000. The signaling message may be an MPI message including media content presentation information. In this case, a value of the message identifier may be 0x0001 to 0x000F. The signaling message may be an MPT message including an MP table indicating information of an asset included in the package. In this case, a value of the message identifier may be 0x0011 to 0x001F. The signaling message may be a CRI message including a CRI table indicating synchronization information. In this case, a value of the message identifier may be 0x0200.

The signaling message may be a DCI message including a DCI table indicating device capability required to consume the package. In this case, a value of the message identifier may be 0x0201. The signaling message may be an AL_FEC message indicating FEC information required to receive the asset. In this case, a value of the message identifier may be 0x0202. The signaling message may be an HRBM message indicating a memory required by the broadcast receiving apparatus 100 and end to end transmission delay. In this case, a value of the message identifier may be 0x0203. In order to transmit the application signaling information, the signaling message may be an application signaling message including the application signaling information other than this type of message. The broadcast receiving apparatus 100 may identify a type of a message included in the signaling message by the aforementioned message identifier. In this case, a value of the message identifier may be 0x8000. Format of the application signaling message will be described with reference to the following diagram.

FIG. 340 illustrates the syntax of a signaling message including application signaling information according to another embodiment of the present invention.

According to another embodiment of the present invention, the application signaling message may include an application signaling table including application signaling information in a signaling message. In a detailed embodiment, the signaling message may include a plurality of application signaling tables.

The application signaling message may include table number information indicating the number of application tables included in the application signaling message. In a detailed embodiment, the table number information may be referred to as number_of_tables.

The table number information may be an 8-bit field.

The application signaling message may include table identifier information for identifying an application table included in the application signaling message. In a detailed embodiment, the table identifier information may be referred to as table_id. The table identifier information may be an 8-bit field.

The application signaling message may include table version information indicating an update history of the signaling table. In a detailed embodiment, the table version information may be referred to as table_version. In a detailed embodiment, the table version information may be an 8-bit field.

The application signaling message may include table length information indicating a length of the signaling table. In a detailed embodiment, the table length information may be referred to as table_length. In a detailed embodiment, the table length information may be an 8-bit field. Detailed syntax of the application signaling table will be described with referenced to the following drawings.

FIG. 341 illustrates the syntax of an application signaling table including application signaling information according to another embodiment of the present invention.

According to another embodiment of the present invention, the application signaling table may include an identifier for identifying the application signaling table. In a detailed embodiment, the identifier may be referred to as table_id. The identifier may be an 8-bit field.

The application signaling table may include version information indicating an update history of the application signaling table. In a detailed embodiment, the version information may be referred to as version. In a detailed embodiment, the version information may be an 8-bit field.

The application signaling table may include length information indicating a length of the application signaling table. In a detailed embodiment, the length information may be referred to as length. In a detailed embodiment, the length information may be a 16-bit field.

The application signaling table may include trigger type information indicating a type of a trigger included in the application signaling table. The trigger included in the signaling table may have various types, which will be described with reference to the following drawings.

FIG. 342 illustrates a relationship of trigger type information included in an application signaling table and trigger attribute included in a trigger according to another embodiment of the present invention.

The trigger included in the signaling table may signal a position of the triggering application information. In this case, a value of the trigger type information may be 1. The trigger included in the signaling table may signal a lifecycle of an application. In detail, the t rigger included in the signaling table may signal a state of the application. In this case, a value of the trigger type information may be 2. The trigger included in the signaling table may signal an action of the application. In this case, a value of the trigger type information may be 3. The trigger included in the signaling table may signal media time of content. In this case, a value of the trigger type information may be 4. The trigger included in the signaling table may include all information items included in the trigger. In this case, a value of the trigger type information may be 5, which will be described referring back to FIG. 341.

In a detailed embodiment, the trigger type information may be referred to as trigger type. In a detailed embodiment, the trigger type information may be an 8-bit field.

The signaling information table may include a text indicating a trigger. In detail, the signaling information table may include character information indicating character included in the trigger. In a detailed embodiment, the signaling information table may include a plurality of character information items. In a detailed embodiment, the character information may be referred to as URI_character. In addition, the trigger may have aforementioned format. In a detailed embodiment, the character information, an 8-bit field.

However, in the embodiment described with reference to FIGS. 142 and 143, a type of a trigger may be indicated through trigger type information in the application signaling message table. However, in this case, the broadcast receiving apparatus 100 may recognize a type of the trigger by parsing the application signaling table. Accordingly, there is a need in that the broadcast receiving apparatus 100 is not capable of selectively receiving only a necessary type of trigger. A method for overcoming this problem will be described with reference to the following drawing.

FIG. 343 illustrates a relationship of a value of an identifier for identifying an MMT signaling message and data signaled by an MMT signaling message according to another embodiment of the present invention.

The broadcast server 10 may change a value of a message identifier for identifying an application signaling message based on a type of a trigger included in the application signaling message. In detail, the broadcast server 10 may differently set a value of the message identifier according to whether a type of a trigger is a trigger for signaling a position of the triggering application information, a trigger for signaling a lifecycle of an application, a trigger for signaling an action of an application, a trigger for signaling media time of content, or a trigger including all information items to be included in the trigger. In detail, when a value of the message identifier is 0x8000 to 0x8004, this may indicate that the signaling message is an application signaling message. In a detailed embodiment, when a trigger included in the application signaling message signals a position of the triggering application information, a value of the message identifier may be 0x8000. When a trigger included in the application signaling message signals a lifecycle of an application, a value of the message identifier may be 0x8001. When the trigger included in the application signaling message signals an action of an application, a value of the message identifier may be 0x8002. When the trigger included in the application signaling message signals media time of content, a value of the message identifier may be 0x8003. When the trigger included in the application signaling message includes all information items included in the trigger, a value of the message identifier may be 0x8004. A message identifier of the signaling message indicates a type of the trigger included in the application signaling message and, thus, the application signaling table may not include the trigger type information.

In the embodiment of FIG. 344, the application signaling table may not include trigger type information unlike the aforementioned application signaling table.

As such, when a value of the message identifier for identifying the application signaling message is changed according to a type of a trigger included in the signaling message, the broadcast receiving apparatus 100 may recognize a type of a trigger without parsing the application signaling table included in the application signaling message. Accordingly, the broadcast receiving apparatus 100 may be effectively and selectively receive a specific type of trigger.

The broadcast server 10 may transmit application signaling information through a generic packet, which will be described with reference to the following diagram.

FIG. 345 illustrates a configuration of an MMTP packet according to another embodiment of the present invention.

First, syntax of the MMTP packet will be described.

The MMTP packet may include version information indicating a version of an MMTP protocol. In a detailed embodiment, the version information may be referred to as V. In a detailed embodiment, the version information may be a 2-bit field.

The MMTP packet may include packet counter flag information indicating presence of packet counting information. In a detailed embodiment, the packet counter flag information may be referred to as C. In a detailed embodiment, the packet counter flag information may be a 1-bit field.

The MMTP packet may include FEC type information indicating a scheme of an FEC algorithm of error prevention of a packet MMTP packet. In a detailed embodiment, the FEC type information may be referred to as FEC. In a detailed embodiment, the FEC type information may be a 2-bit field.

The MMTP packet may include extension flag information indicating presence of header extension information. In a detailed embodiment, the extension flag information may be referred to as X. In a detailed embodiment, the extension flag information may be a 1-bit field.

The MMTP packet may include random access point (RAP) flag information indicating RAP for data random access of a payload. In a detailed embodiment, the RAP flag information may be referred to as R. In a detailed embodiment, the RAP flag information may be a 1-bit field.

The MMTP packet may include type information indicating a type of data of a payload. In a detailed embodiment, the type information may be referred to as type. In a detailed embodiment, the type information may be a 6-bit field.

The MMTP packet may include packet identifier information indicating an identifier for identifying a packet. The broadcast receiving apparatus 100 may determine an asset included in the corresponding packet based on the packet identifier information. The broadcast receiving apparatus 100 may acquire a relationship between the asset and the packet identifier from the signaling message. The packet identifier information may have a unique value during a life time of a corresponding transmission session. In a detailed embodiment, the packet identifier information may be referred to as packet_id. In a detailed embodiment, the packet identifier information may be a 16-bit field.

The MMTP packet may include packet sequence number information indicating the number of packet sequences. In a detailed embodiment, the packet sequence number information may be referred to as packet_sequence_number. In a detailed embodiment, the packet sequence number information may be a 32-bit field.

The MMTP packet may include time stamp information for specifying a time instance value of transmission of an MMTP packet. The time stamp information may be based on a UTC value. The time stamp information may indicate time for transmitting a first type of the MMTP packet. In a detailed embodiment, the time stamp information may be referred to as timestamp. In a detailed embodiment, the time stamp information may be 32-bit field.

The MMTP packet may include packet counting information indicating a count of transmitted packets. In a detailed embodiment, the packet counting information may be referred to as packet_counter. In a detailed embodiment, the packet counting information may be a 32-bit field.

The MMTP packet may include required FEC information according to an FEC protection algorithm. In a detailed embodiment, the FEC information may be referred to as Sourece_FEC_payload_ID. In a detailed embodiment, the FEC information may be a 32-bit field.

The MMTP packet may include header extension information reserved for future header extension. In a detailed embodiment, the header extension information may be referred to as header_extension.

The broadcast server 10 may insert the application signaling information into a payload of a packet of a generic type and transmit the result. In detail, the broadcast server 10 may insert the application signaling information into a payload of a packet of a generic type and transmit the result. In this case, the broadcast server 10 may allocate different packet identifiers to respective files. The broadcast receiving apparatus 100 may extract application signaling information from the generic packet. In detail, the broadcast receiving apparatus 100 may extract a file including the application signaling information from the generic packet. In detail, the broadcast receiving apparatus 100 may extract the file including the application signaling information based on the packet identifier of the generic packet. For example, the broadcast receiving apparatus 100 may determine whether a corresponding packet includes required application signaling information based on a packet identifier value of a generic packet.

The broadcast server 10 may transmit the application signaling information using the header extension information of the MMTP packet, which will be described with reference to the following drawings.

FIG. 346 illustrates the syntax of a header extension field for transmitting application signaling information and a configuration of an MMTP packet according to another embodiment of the present invention.

The broadcast server 10 may insert the application signaling information into a header of an MMTP packet and transmit the result. In detail, the broadcast server 10 may insert the application signaling information into header extension information and transmit the result.

In a detailed embodiment, the header extension information may include header extension type information indicating a type of header extension information included in the header extension information. In this case, the header extension type may indicate that the header extension information includes an application signaling message. In another detailed embodiment, the header extension type information may indicate a type of application signaling information included in the header extension information. In this case, the type of the application signaling information may include a type of a trigger according to attribute included in the aforementioned trigger. In a detailed embodiment, the header extension type information may be referred to as type.

In a detailed embodiment, the header extension information may be a 16-bit field. In a detailed embodiment, the header extension information may include header extension length information indicating a length of the header extension information. In this case, the header extension length information may indicate a length of the application signaling information included in the header extension information. In a detailed embodiment, the header extension length information may be referred to as length. In a detailed embodiment, the header extension length information may be a 16-bit field.

In a detailed embodiment, the header extension information may include a header extension value indicating extension information included in the header extension information. In this case, the header extension value may indicate application signaling information included in the header extension information. In this case, the application signaling information may be a trigger. A type of the application signaling information may be a string type of URI. The string type of URI may be the aforementioned string type of trigger. In a detailed embodiment, the header extension value may be referred to as header_extension_value.

Accordingly, the broadcast receiving apparatus 100 may extract application signaling information from the header extension information. In detail, the broadcast receiving apparatus 100 may extract the application signaling information based on the header extension type information included in the header extension information. In detail, the broadcast receiving apparatus 100 may determine whether the corresponding header extension information includes application signaling information based on the header extension type information. The broadcast receiving apparatus 100 may extract the application signaling information when the corresponding header extension information includes application signaling information. The broadcast receiving apparatus 100 may determine a type of the application signaling information included in the corresponding header extension information based on the header extension type information. Accordingly, the broadcast receiving apparatus 100 may selectively acquire the application signaling information.

According the aforementioned embodiment of the present invention, operations of the broadcast server 10 and the broadcast receiving apparatus 100 according to transmission and reception of the application signaling information will be described in detail with reference to the following drawings.

FIG. 347 illustrates transmission of a broadcast signal based on application signaling information by a broadcast transmitting apparatus according to embodiments of the present invention.

The broadcast server 10 may acquire information on an application included in a broadcast service (S2501). In detail, the broadcast server 10 may acquire information on the application included in the broadcast service through a controller.

The broadcast server 10 may generate application signaling information based on information on the application (S2503). In detail, the broadcast server 10 may generate the application signaling information based on information on the application through the controller. In this case, the application signaling information may include a trigger for triggering an action of an application and triggering application information for signaling information on the triggered application, as described above.

The broadcast server 10 may transmit a broadcast signal based on the application signaling information (S2505). In detail, the broadcast server 10 may transmit a broadcast signal based on the application signaling information through a transmitter. In detail, as described above, the broadcast server 10 may transmit application signaling information using an MPEG-DASH protocol. In detail, the broadcast server 10 may transmit application signaling information in an event stream of MPD of MPEG-DASH. The broadcast server 10 may transmit the application signaling information in an inband event stream. For example, the broadcast server 10 may transmit the application signaling information through an event message box. In another detailed embodiment, the broadcast server 10 may transmit application signaling information using an MMT protocol. In detail, the broadcast server 10 may transmit the application signaling message based on packet format including the MPU of the MMT protocol. The broadcast server 10 may transmit the application signaling message based on packet format including a generic object of the MMT protocol. The broadcast server 10 may transmit the application signaling message based on packet format including the signaling message of the MMT protocol. The broadcast server 10 may transmit the application signaling message based on the header extension information of the packet of the MMT protocol.

FIG. 348 illustrates acquisition of application signaling information based on a broadcast signal by a broadcast receiving apparatus according to embodiments of the present invention.

The broadcast receiving apparatus 100 may receive a broadcast signal (S2601). In detail, the broadcast receiving apparatus 100 may receive a broadcast signal through the broadcast receiver 110.

The broadcast receiving apparatus 100 may acquire application signaling information based on the broadcast signal (S2603). In detail, the broadcast receiving apparatus 100 may acquire the application signaling information based on the broadcast signal through the controller 150. In detail, as described above, the broadcast receiving apparatus 100 may acquire the application signaling information based on the MPEG-DASH protocol. In detail, the broadcast receiving apparatus 100 may acquire the application signaling information based on an event stream of MPD of MPEG-DASH. The broadcast receiving apparatus 100 may acquire application signaling information based on the inband event stream. For example, the broadcast receiving apparatus 100 may transmit application signaling information from an event message box. In another detailed embodiment, the broadcast receiving apparatus 100 may acquire application signaling information based on the MMT protocol. In detail, the broadcast receiving apparatus 100 may acquire the application signaling message based on packet format including the MPU of the MMT protocol. The broadcast receiving apparatus 100 may acquire the application signaling message based on packet format including a generic object of the MMT protocol. The broadcast receiving apparatus 100 may acquire an application signaling message based on packet format including the signaling message of the MMT protocol. The broadcast receiving apparatus 100 may acquire the application signaling message based on the header extension information of the packet of the MMT protocol. The application signaling information may include at least one of a trigger for triggering an action of an application and triggering application information for signaling information on the triggered application, as described above.

The broadcast receiving apparatus 100 may execute an application based on the application signaling information (S2605). In detail, the broadcast receiving apparatus 100 may execute the application based on the application signaling information through a controller. In a detailed embodiment, the broadcast receiving apparatus 100 may change a state of an application based on the application signaling information. In detail, the broadcast receiving apparatus 100 may change a state of the application based on the application signaling information of the triggering event start time. The broadcast receiving apparatus 100 may change the state of the application based on the application signaling information prior to triggering event termination time after triggering event start time. In another detailed embodiment, the broadcast receiving apparatus 100 may perform an operation triggered to an application based on the application signaling information. In detail, the broadcast receiving apparatus 100 may perform an operation triggered to an application based on the application signaling information of the triggering event start time. The broadcast receiving apparatus 100 may perform an operation triggered to an application based on the application signaling information prior to triggering event termination time after triggering event start time. In another detailed embodiment, the broadcast receiving apparatus 100 may receive triggering application information based on the application signaling information. In another detailed embodiment, the broadcast receiving apparatus 100 may acquire media time of content based on the application signaling information. In detail, the broadcast receiving apparatus 100 may acquire media time of presented content. The broadcast receiving apparatus 100 may acquire media time and generate a time line as a reference of synchronization between triggering event and content based on the media time of content.

Through this operating method, the broadcast server 10 may effectively transmit the application signaling information. In particular, the broadcast server 10 may transmit the application signaling information through the MPEG-DASH protocol or the MMT protocol. The broadcast receiving apparatus 100 may effectively receive the application signaling information. In particular, the broadcast server 10 may transmit the application signaling information through the MPEG-DASH protocol or the MMT protocol.

FIG. 349 is a diagram illustrating event information according to an embodiment of the present invention.

According to an embodiment of the present invention, the first receiver may receive signaling information through a broadcast network and/or the Internet. In detail, the first receiver may receive application signaling information including a trigger and/or triggering application information (e.g., TPT). The first receiver may store event information included in the triggering application information in a storage (or primary device storage) included in the first receiver.

According to an embodiment of the present invention, the first receiver may transmit the signaling information to the second receiver. In detail, the first receiver may transmit the application signaling information to the second receiver (e.g. companion device).

For example, the signaling information may include application signaling information. The application signaling information may include at least one of a trigger for triggering an operation of an application and triggering application information for signaling information on a triggered application.

The trigger may include at least one of a trigger for signaling a state (or life cycle) of an application, a trigger for signaling an operation of an application, and/or a trigger for signaling media time. The state of the application may include at least one of preparing, execution, termination, and/or suspending.

The triggering application information may include additional information required to execute an application.

According to an embodiment of the present invention, the triggering application information may include application information (TDO). The application information may include event information indicating information on an event of an application. In a detailed embodiment, the event information may be referred to as event.

The event information may include an event identifier for identifying an event. In detail, the event identifier may uniquely identify an event in a corresponding application range. In a detailed embodiment, the event identifier may be referred to as eventID. In a detailed embodiment, the event identifier may be a 16-bit element.

The event information may include action information indicating an operation of an event. In detail, the event information may include preparing, execution, termination or kill, and/or suspending. In a detailed embodiment, the action information may be referred to as action.

The event information may include destination information indicating target information targeted by an application. The destination information may indicate that an application is used for only the first receiver (or primary device) for receiving a broadcast signal. The destination information may indicate that an application is used for only one or more second receivers (or companion device) that are operatively associated with the first receiver (or primary device) for receiving a broadcast signal. The destination information may indicate that an application is used for both the first receiver and the second receiver. In a detailed embodiment, the destination information may be referred to as destination.

The event information may include diffusion information for diffusing a triggering application information request. In detail, the first receiver may calculate a random value based on the diffusion information, may be on standby by as much as the random value and, then may make a request for triggering application information to a server. In detail, the receiver may be on standby by as much as a value obtained by multiplying the random value by 10 ms and then may make a request for the triggering application information to the server. In a detailed embodiment, the diffusion information may be referred to as diffusion. In a detailed embodiment, the diffusion information may be an 8-bit element.

The event information may include data information indicating data associated with an event. Each event may have a data element associated with an event. In a detailed embodiment, the data information may be referred to as data.

The data information may include a data identifier for identifying data. The data identifier may be referred to as dataID. The data identifier may be a 16-bit element.

FIG. 350 is a diagram illustrating XML format of event information according to an embodiment of the present invention.

The drawing illustrates XML format of triggering application information received by the first receiver according to an embodiment of the present invention. Hereinafter, event information included in the triggering application information will be described.

The application information may include first event information and/or second event information.

The first event information may include eventID, action, destination, and/or dataID.

The eventID may indicate "1". The action may indicate "exec". The destination may indicate "2". Diffusion may indicate "5". The dataID may indicate "10". The data may indicate "AAAAZg==".

The second event information may include eventID, action, destination, and/or dataID. The eventID may indicate "2". The action may indicate "kill". The destination may indicate "2". The diffusion may indicate "5". The dataID may indicate "11". The data may indicate "YTM0NZomIzI2OTsmIzM0NTueYQ==".

FIG. 351 is a diagram illustrating UPnP Action Mechanism according to an embodiment of the present invention.

Referring to the drawing, one method of communication between devices applied to an embodiment of the present invention may be a communication protocol between devices, obtained by combining protocols of IP-TCP/UDP-HTTP among technology of various layers.

According to an embodiment of the present invention, the technology of layer will be described.

First, according to an embodiment of the present invention, communication between devices may be represented to exchange message, command, call, action, and/or request/response.

Second, according to an embodiment of the present invention, in order to stably transmit a message used during communication between devices to a desired target device, various protocols such as an Internet control message protocol (ICMP) and an Internet group management protocol (IGMP) as well as an Internet protocol (IP) may be applied and may not be limited to a specific protocol.

Third, according to an embodiment of the present invention, in order to stably transmit a message used during communication between devices, to control a message flow, to overcome collision or congestion between a plurality of messages, and to support multiplexing, various protocols such as a datagram congestion control protocol (DCCP) and a stream control transmission protocol (SCTP) as well as a transmission control protocol (TCP) and a user datagram protocol (UDP) and may not be limited to a specific protocol.

Fourth, according to an embodiment of the present invention, in order to transmit various information items in a message used during communication between devices for various purposes, various protocols such as a hypertext transfer protocol (HTTP), a real-time transport protocol (RTP), an extensible messaging and presence protocol (XMPP), and a file transfer protocol (FTP) may be applied and may not be limited to a specific protocol.

Fifth, according to an embodiment of the present invention, when a message used during communication between devices is transmitted through the aforementioned various protocols, desired message data may be transmitted in various message component such as a message header and a message body among message components defined in each protocol and a specific message component may not be limited.

Sixth, according to an embodiment of the present invention, when a message used during communication between devices is transmitted, data to be transmitted may be transmitted using various types (string, integer, floating point, boolean, character, array, list, etc.) defined in each protocol. In order to more structurally represent, transmit, and store data with complex information, a markup method such as extensible markup language (XML), hypertext markup language (HTML), extensible hypertext markup language (XHTML), and javascript object notation (JSON) or text, image format, etc. and a specific method may not be limited.

Seventh, according to an embodiment of the present invention, data included in a message used during communication between devices may be transmitted using various data compression technologies such as "gzip" (RFC 1952), "deflate" (RFC 1950), and "compress" (RFC 2616) and a specific method may not be limited.

UPnP action proposed according to an embodiment of the present invention may be one of various methods of communication between devices and data to be actually transmitted may be transmitted in XML format in an HTTP POST message body using a POST method defined in the HTTP to a control URL acquired during UPnP discovery and description. In the case of a UPnP protocol, an action name is defined and used for each action and is transmitted together with the HTTP POST message body transmitted in XML and, thus, only one URL may be present with respect to a communication target device and an infinite type of action (message) may be exchanged even if only one HTTP POST method is used.

All UPnP actions proposed according to an embodiment of the present invention may be applied via various types of combinations of the aforementioned various technologies of layer and all contents proposed by an embodiment of the present invention may not be limited to the UPnP method.

FIG. 352 is a diagram illustrating a REST mechanism according to an embodiment of the present invention.

Referring to the drawing, a REST method as one method of communication between devices applied to an embodiment of the present invention may define a plurality of URIs to be accessed to a communication target device.

For example, when various methods GET, HEAD, PUT, DELETE, TRACE, OPTIONS, CONNECT, and PATCH as well as POST among HTTP methods are used and a plurality of URIs to be accessed to a communication target device are defined, communication between devices proposed by an embodiment of the present invention may be applied without definition of an action name. Data to be transmitted may be appended to a corresponding URL or may be transmitted and transmitted in an HTTP body in various forms. A plurality of URI values required in the REST method may be acquired during a discovery or description procedure.

FIG. 353 is a diagram illustrating state variables for transmitting a trigger according to an embodiment of the present invention.

According to an embodiment of the present invention, a transceiving system may receive signaling information using the first receiver (or primary device) and execute an event by the second receiver based on signaling information.

For example, the first receiver may receive the signaling information. The first receiver may receive the signaling information through a broadcast network. The signaling information may include application signaling information. The application signaling information may include a trigger and/or triggering application information. The triggering application information may include event information. The event information may include destination information. According to an embodiment, the destination may indicate “2”. When the destination indicates “2”, a target device may indicate the second receiver (or companion device) and the corresponding event may be executed by the second receiver.

Hereinafter, a method of receiving signaling information by the first receiver through a broadcast network and executing an event through the second receiver based on the signaling information will be described. For example, the first receiver may receive a trigger for executing an event with destination=“2” through a broadcast network. The first receiver may transmit the trigger to the second receiver. The second receiver (or companion device) may execute the event using the trigger. According to an embodiment of the present invention, an example of UPnP will be described.

The first receiver and/or the second receiver may each include an app transceiver. The app transceiver may transmit signaling information to the second receiver (or CD) from the first receiver (or PD). According to an embodiment, the app transceiver may be referred to as an application signaling service. According to an embodiment, a service type may be defined as urn:atsc.org:serviceId:atsc3.0:applicationsignaling:1.

The app transceiver of the first receiver may transmit the signaling information (e.g., application signaling information) received through a broadcast network by the first receiver to the second receiver. In addition, the first receiver may allow the second receiver to directly receive the signaling information (or application signaling information) from a transmitter through the Internet using the app transceiver.

The drawing illustrates trigger transmission information for transmitting a trigger. The trigger transmission information may include trigger list information and/or trigger position information. The trigger transmission information may be included in the signaling information and/or the application signaling information. The trigger transmission information may be transmitted to the second receiver from the first receiver using an eventing method and in response to a request of the second receiver.

The trigger list information may include overall information items on a trigger for the second receiver (or CD) as a required state variable. According to an embodiment of the present invention, the trigger list information may be referred to as TriggerInfoList variable. The trigger list information may be transmitted to the second receiver from the first receiver using an eventing method and/or in response to a request of the second receiver.

The trigger position information may indicate a position at which the second receiver (or CD) makes a request for trigger information to a transmitter (or content server) as a required state variable. According to an embodiment, the trigger position information may be referred to as A_ARG_TYPE_NotificationInfo variable. The trigger position information may be transmitted to the second receiver from the first receiver in response to a request of the second receiver. However, the present invention is not limited thereto and the trigger position information may be transmitted o the second receiver from the first receiver using an eventing method.

FIG. 354 is a diagram illustrating trigger list information according to an embodiment of the present invention.

Referring to the drawing, the trigger list information may include overall information on a trigger for the second receiver (or CD) as a required state variable. The trigger list information may include trigger information for at least one trigger for the second receiver (or CD).

The trigger information may include at least one of trigger type information, action information, event start time information, event termination time information, data information, and/or data position information.

The trigger type information may indicate a type of a trigger for triggering an application. The trigger type information may be application trigger type information for the second receiver (or CD). The trigger type information may be referred to as triggerType. The application trigger type may include action, status, and/or mediaTime. For example, when the trigger type information indicates “action”, the triggering application information for signaling information on a triggered application may include an action to be executed by the application. When the trigger type information indicates “status”, the triggering application information may signal change in a life cycle of an application. When the trigger type information indicates “mediaTime”, the triggering application information may include media time. Each type may be the same as in the above description and may be changed or added.

The action information may indicate an operation of a triggered application. The action information may be application trigger action information for the second receiver (or CD). The action information may be referred to as action. The application trigger action may be the same as prep, exec, suspend, and kill. The action may be changed or added in the future. When the application trigger type is an action, the application trigger type may be related to a lifecycle of an application. When the application trigger type is a status, the application trigger type may be related to contained data.

The event start time information may indicate time at which a trigger for the second receiver (or CD) is started. The event start time information may be referred to as eventStartTime.

The event termination time information may indicate time at which a trigger for the second receiver (or CD) is terminated. The event termination time information may be referred to as eventEndTime.

The data information may be trigger related data for the second receiver (or CD). The data information may be referred to as data.

The data position information may indicate a position on a content server of the trigger related data for the second receiver (or CD). The data position information may be referred to as dataURI.

FIG. 355 is a diagram illustrating XML format of trigger list information according to an embodiment of the present invention.

Referring to the drawing, the trigger list information may include first trigger information and/or second trigger information.

The first trigger information may include at least one of trigger type information, action information, event start time information, event termination time information, data information, and/or data position information. The trigger type information may indicate “action”. The action information may indicate “exec”. The event start time information may indicate “77ee”. The event termination time information may indicate 7870”. The data information may indicate “AAAAZg==”. The data position information may indicate “http://www.atsc.com/trigger/data”.

The second trigger information may include at least one of trigger type information, action information, and/or event start time information. The trigger type information may indicate “status”. The action information may indicate “kill”. The event start time information may indicate “9a33”.

FIG. 356 is a diagram illustrating trigger transmission information according to an embodiment of the present invention.

(a) of the drawing illustrates trigger transmission information. The trigger transmission information may include trigger list information and/or trigger position information. The trigger transmission information may be transmitted to the second receiver from the first receiver in response to a request of the second receiver.

The second receiver may make a request for the trigger list information to the first receiver. Information for requesting the trigger list information to the first receiver by the second receiver may be referred to as GetTriggerInfoList( ). For example, GetTriggerInfoList( ) may be information for requesting valid trigger information to the first receiver by the second receiver (or CD). For example, the GetTriggerInfoList( ) may be used to check whether valid trigger information is present in the second receiver (or CD) at a current time point when the second receiver (or CD) is connected to the first receiver (or PD) in the middle of a specific program as a required action.

The second receiver may make a request for trigger position information to the first receiver. The information for requesting trigger position information to the first receiver by the second receiver may be referred to as GetTriggerInfoURI( ). For example, the GetTriggerInfoURI( ) may be used to request trigger related information from a content server through the Internet by the second receiver (or CD) as a required action. As a return value of GetTriggerInfoURI action, a position of trigger information on the second receiver (or CD) on TriggerURI, i.e., the content server may be acquired in the form of URL.

(b) of the drawing illustrates trigger list information. The first receiver may transmit trigger list information in response to a request of the second receiver. For example, the second receiver may acquire trigger list information as a return value of the GetTriggerInfoList action. A state variable related to the trigger list information may be TriggerInfoList.

(c) of the drawing illustrates trigger position information. The first receiver may transmit trigger position information in response to the request of the second receiver. For example, the second receiver may acquire trigger position information as a return value of the GetTriggerInfoURI action. The state variable related to the trigger position information may be A_ARG_TYPE_TriggerURI.

FIG. 357 is a diagram illustrating trigger transmission information according to an embodiment of the present invention.

The trigger list information may include an application identifier (AppID). The application identifier may be included in application attribute related information (e.g., TPT or triggering application information) to be received by the first receiver through the broadcast network and/or the Internet. The application identifier information may identify a specific application that is currently executed or to be executed by the second receiver.

In this case, the trigger transmission information may include at least one of trigger list information, trigger position information, trigger information, and/or application identifier. The trigger transmission information may be included in signaling information and/or application signaling information. The trigger transmission information may be transmitted to the second receiver from the first receiver using an eventing method and/or in response to a request of the second receiver. Alternatively, the trigger transmission information may be transmitted to the first receiver from the second receiver using an eventing method and/or in response to a request of the first receiver.

The trigger list information may include trigger information on at least one trigger for the second receiver (or CD) as a required state variable. According to an embodiment of the present invention, the trigger list information may be referred to as TriggerInfoList variable. The trigger list information may be transmitted to the second receiver from the first receiver using an eventing method and/or in response to a request of the second receiver.

The trigger position information may indicate a position at which the second receiver (or CD) is capable of making a request for trigger information to the transmitter (or content server) as a required state variable. According to an embodiment, the trigger position information may be referred to as A_ARG_TYPE_NotificationInfo variable. The trigger position information may be transmitted to the second receiver from the first receiver in response to a request of the second receiver.

The trigger information may indicate attribute or information on a trigger as a required state variable. According to an embodiment, the trigger information may be referred to as A_ARG_TYPE_TriggerInfo variable. The trigger information may be transmitted to the second receiver from the first receiver in response to a request of the second receiver.

The application identifier list information may indicate a list of an application identifier (or AppID) as a required state variable. According to an embodiment, the application identifier list information may be referred to as A_ARG_TYPE_AppIDs variable. The application identifier list information may be transmitted to the second receiver from the first receiver in response to a request of the second receiver.

FIG. 358 is a diagram illustrating trigger list information according to an embodiment of the present invention.

The trigger list information may include trigger information on nat least one trigger for the second receiver (or CD).

The trigger information may include trigger type information indicating a type of a trigger for triggering an application, action information indicating an operation of a triggered application, event start time information indicating time at which a trigger for the second receiver (or CD) is started, event termination time information indicating time at which a trigger for the second receiver (or CD) is terminated, data information indicating trigger related data for the second receiver (or CD), and/or data position information indicating a position in the content server of trigger related data for the second receiver (or CD).

The trigger information may further include an application identifier for identifying an application. The application identifier may be referred to as appID attribute.

The first receiver may transmit signaling information of an application executed by the first receiver and/or an action for the application to the second receiver.

When the trigger information includes an application identifier, the first receiver may transmit the signaling information on execution of an application with another application identifier to be executed in the future and/or an action of the application as well as the currently executed application and/or an action of the application, to the second receiver.

FIG. 359 is a diagram illustrating trigger list information of XML data format according to an embodiment of the present invention.

Referring to the drawing, the trigger list information may include first trigger information and/or second trigger information.

The first trigger information may include at least one of application identifier, trigger type information, action information, event start time information, event termination time information, data information, and/or data position information. The application identifier may indicate "12". The trigger type information may indicate "action". The action information may indicate "exec". The event start time information may indicate "77ee". The event termination time information may indicate 7870". The data information may indicate "AAAAZg==". The data switching information may indicate "http://www.atsc.com/trigger/data".

The second trigger information may include at least one of application identifier, trigger type information, action information, and/or event start time information. The application identifier may indicate "13". The trigger type information may indicate "status". The action information may indicate "kill". The event start time information may indicate "9a33".

FIG. 360 is a diagram illustrating trigger transmission information according to an embodiment of the present invention.

(a) of the drawing illustrates trigger transmission information. The trigger transmission information may include trigger list information and/or trigger position information. The trigger transmission information may be transmitted to the second receiver from the first receiver in response to a request of the second receiver.

The second receiver may make a request for application identifier list information to the first receiver 에 application identifier list information. Information for requesting application identifier list information to the first receiver by the second receiver may be referred to as GetAppIDs( ). For example, the GetAppIDs( ) may be a required action. The GetAppIDs( ) may be used to acquire an application identifier list included in trigger information by the second receiver after the second receiver is connected to the first receiver. The trigger information may be received through a broadcast network and/or the Internet by the first receiver.

The second receiver may make a request for trigger information to the first receiver. Information for requesting trigger information to the first receiver by the second receiver may be referred to as GetTriggerInfo( ). For example, the GetTriggerInfo( ) may be a required action. The GetTriggerInfo( ) may be used to acquire trigger information on a specific application after the second receiver is connected to the first receiver.

(b) of the drawing illustrates application identifier list information. The first receiver may transmit application identifier list information in response to a request of the second receiver. For example, the second receiver may acquire application identifier list information as a return value of the GetAppIDs action. A state variable related to the application identifier list information may be A_ARG_TYPE_AppIDs.

(c) of the drawing illustrates application identifier list information and/or trigger information. The first receiver may transmit trigger information in response to a request of the second receiver.

The second receiver may use application identifier and/or application identifier list information as input argument in order to acquire information on a desired application. The first receiver may transmit a return value thereof as TriggerInfo argument.

For example, the second receiver may acquire trigger information as a return value of the GetTriggerInfo action. A state variable related to application identifier list information may be appIDs. A state variable related to trigger information may be A_ARG_TYPE_TriggerInfo.

FIG. 361 is a flow diagram when trigger type information indicates "action" according to an embodiment of the present invention.

Referring to the drawing, a transceiving system according to an embodiment of the present invention may include at least one of the transmitter C10, the first receiver C100, and/or the second receiver C200.

The transmitter C10 may provide a broadcast service. For example, the broadcast service may include at least one of content (or linear service), an application (or non-linear service), and/or signaling information. The transmitter C10 may include at least one of the aforementioned broadcast transmitting apparatus (not shown), a content provider (not shown), a content server (not shown), a controller (not shown), and/or a transmitter (not shown).

The first receiver C100 may receive the broadcast service through a broadcast network and/or the internet. The first receiver C100 may be referred to as a TV receiver and/or PD.

The second receiver C200 may receive the broadcast service through the Internet. The second receiver may be referred to as a mobile phone and/or a CD.

Hereinafter, an operation of a transceiving system according to an embodiment of the present invention when the trigger type information indicates "action" will be described.

The first receiver C100 may perform a discovery and/or pairing operation with respect to the second receiver C200. For example, the first receiver C100 may discover the second receiver and may be electrically connected to the second receiver so as to transmit and receive data.

Then, the first receiver C100 may subscribe an application signaling service of the second receiver C200. The second receiver C200 may subscribe the application signaling service of the first receiver C100. For example, the first receiver C100 may subscribe an app transceiver of the second receiver C200 using the app transceiver of the first receiver C100.

Then, the first receiver C100 may receive a broadcast signal from the transmitter C10. The first receiver C100 may acquire signaling information based on the broadcast signal. In detail, the first receiver C100 may acquire application signaling information based on the signaling information. As described above, the first receiver C100 may acquire application signaling information based on an MPEG-DASH protocol and/or an MMT protocol. The application signaling information may include at least one of a trigger for triggering an operation of an application and triggering application information (or TPT) for signaling information on a triggered application.

Then, the first receiver C100 may store the received signaling information in storage. For example, the first receiver C100 may store the received triggering application information in the storage.

Then, the first receiver C100 may further receive signaling information from the transmitter C10. The signaling information may include a trigger. For example, the trigger may include a trigger that is transmitted to the second receiver from the first receiver or is to be processed by the second receiver.

The trigger may include at least one of an application identifier for identifying a triggered application, a triggering event identifier for identifying a triggering event, and/or a data identifier for identifying data required by a triggering event. The trigger may include at least one of trigger type information indicating a type of a trigger for triggering an application, action information indicating an operation of the triggered application, start time of a triggering event, termination time of a triggering event, and/or data information including trigger related data.

According to an embodiment, when the trigger type information indicates "action", the trigger type information may indicate a trigger for signaling an operation of an application.

Then, the first receiver C100 may perform an action of signaling information. The first receiver C100 may transmit signaling information to the second receiver C200. For example, the first receiver may transmit trigger transmission information for acquiring a trigger by the second receiver based on signaling information to the second receiver. For example, the first receiver C100 may transmit the trigger list information to the second receiver C200. That is, the first receiver C100 may transmit the trigger list information to the second receiver C200 using an eventing method. Transmission of the trigger list information using an eventing method may indicate occurrence of an event for transmitting the trigger list information to the second receiver by the first receiver.

Hereinafter, an operation for transmitting trigger list information by the first receiver C100 will be described in detail.

The first receiver C100 may parse a trigger based on signaling information. The first receiver C100 may parse an application identifier (or appID) in the received trigger, an event identifier (or eventID), and/or a data identifier (or dataID).

Then, the first receiver C100 may check a target device. For example, the first receiver C100 may check event information included in the triggering application information based on the trigger information in the trigger. The first receiver C100 may search for a corresponding application and/or event based on the application identifier and/or the event identifier and check whether a destination of an event indicates the second receiver. For example, when the destination indicates "2", the destination of the event may indicate the second receiver (or second screen).

Then, the first receiver C100 may transmit trigger list information (or TriggerInfoList information) including information on the received trigger to the second receiver C200 using an eventing method. When the trigger type information indicates "action", a tape may be included in an event. When the destination of the event is "second receiver" and data is included in the event, the first receiver C100 may notify the second receiver C200 of the trigger list information (or TriggerInfoList information) using an eventing method. For example, when the destination of the event is '2' and data is included in the event, the first receiver C100 may generate an event of transmitting the trigger list information to the second receiver.

The second receiver C200 may receive signaling information from the first receiver C100. For example, the second receiver C200 may receive trigger list information including information on a trigger. For example, the trigger may be a trigger for executing (or exec) contained data, up to "7870" starting from "77ee" based on media time. The second receiver C200 may execute an application based on the trigger included in the trigger list information.

FIG. 362 illustrates XML format of TriggerInfoList when trigger type information indicates "action" according to an embodiment of the present invention.

Referring to the drawing, the trigger list information (or TriggerInfoList) may include trigger information. The trigger information may include at least one of trigger type information, action information, event start time information, event termination time information, and/or data information.

According to an embodiment, the trigger type information (or triggerType) may indicate "action". The action information (or action) may indicate "exec". The event start time information (or eventStartTime) may indicate "77ee". The event termination time information (or eventEndTime) may indicate "7870". The data information may indicate "AAAAZg==".

FIG. 363 is a flow diagram when trigger type information indicates "action" according to an embodiment of the present invention.

Referring to the drawing, a transceiving system according to an embodiment of the present invention may include at least one of the transmitter C10, the first receiver C100, and/or the second receiver C200. A description of the transceiving system according to an embodiment of the present invention may include the entire above description of the aforementioned transceiving system.

The signaling information according to an embodiment of the present invention may include a trigger. The trigger may include at least one of an application identifier for identifying a triggered application, a triggering event identifier for identifying a triggering event, and/or a data identifier for identifying data required by the triggering event. In addition, the trigger may further include trigger type information indicating a type of a trigger for triggering an application, action information indicating an action of the triggered application, start time of a triggering event, termination time of a triggering event, data information including trigger related data, and/or data position information indicating a position in a content server of data information. According to an embodiment, the data position information may be referred to as dataURI.

The first receiver C100 may transmit trigger list information including information on the received trigger to the second receiver C200. For example, the first receiver C100 may transmit trigger list information to the second receiver C200 using an eventing method.

The second receiver C200 may receive signaling information from the first receiver C100. For example, the second receiver C200 may receive trigger list information including information on a trigger. For example, the trigger may be a trigger for executing (or exec) of contained data, up to "7870" starting from "77ee" based on media time.

The second receiver C200 may execute an application based on the trigger included in the trigger list information and/or data information received from a content server. In this case, the second receiver C200 may make a request for data information including trigger related data to the transmitter C10 based on data position information (or dataURI). A routine for requesting data to a content server based on the data position information by the second receiver C200 may be changed according to a mechanism of embodying the second receiver C200.

FIG. 364 illustrates XML format of TriggerInfoList when trigger type information indicates "action" according to an embodiment of the present invention.

Referring to the drawing, the trigger list information (or TriggerInfoList) may include trigger information. The trigger information may include at least one of trigger type information, action information, event start time information, event termination time information, data information, and/or data position information.

According to an embodiment, the trigger type information (or triggerType) may indicate “action”. The action information (or action) may indicate “exec”. The event start time information (or eventStartTime) may indicate “77ee”. The event termination time information (or eventEndTime) may indicate “7870”. The data information may indicate “AAAAZg==”. The data position information (or dataURI) may indicate http://www.atsc.com/trigger/data.

FIG. 365 is a flow diagram when trigger type information indicates “status” according to an embodiment of the present invention.

Referring to the drawing, a transceiving system according to an embodiment of the present invention may include at least one of the transmitter C10, the first receiver C100, and/or the second receiver C200.

A description of the transceiving system according to an embodiment of the present invention may include entire aforementioned transceiving system.

According to an embodiment, the first receiver C100 may receive a trigger including trigger type information (or application trigger type) indicating “status”. When the trigger type information indicates “status”, the trigger type information may indicate a trigger for signaling a status (or lifecycle) of an application. When the trigger type information indicates “status”, the triggering application information may signal change in lifecycle of an application. The status of the application may include at least one of preparing, execution, termination, and/or suspending.

Hereinafter, an operation for transmitting trigger list information by the first receiver C100 when the trigger type information indicates “status” will be described in detail.

The first receiver C100 may parse a trigger based on the signaling information. The first receiver C100 may parse at least one of an application identifier (or appID), an event identifier (or eventID), and/or a data identifier (or dataID) in the received trigger.

Then, the first receiver C100 may check a target device. For example, the first receiver C100 may check event information included in triggering application information based on the trigger information in the trigger. The first receiver C100 may search for a corresponding application and/or event based on the application identifier and/or the event identifier and check whether a destination of the event indicates the second receiver. For example, when the destination indicates “2”, the destination of the event may indicate the second receiver (or second screen).

Then, the first receiver C100 may transmit trigger list information (or TriggerInfoList information) including information on the received trigger to the second receiver C200 using an eventing method. When the destination of the event is “second receiver”, the first receiver C100 may notify the second receiver C200 of the trigger list information (or TriggerInfoList information) using an eventing method. For example, when the destination of the event is ‘2’, the first receiver C100 may generate an event for transmitting the trigger list information to the second receiver.

The second receiver C200 may receive signaling information from the first receiver C100. For example, the second receiver C200 may receive trigger list information including information on a trigger. For example, the trigger may be a trigger for terminating (or killing) an application being executed by the second receiver C200 to “9a33” based on media time. The second receiver C200 may perform an application based on the trigger included in the trigger list information.

FIG. 366 is a diagram illustrating XML format of TriggerInfoList when trigger type information indicates “status” according to an embodiment of the present invention.

Referring to the drawing, the trigger list information (or TriggerInfoList) may include trigger information. The trigger information may include at least one of trigger type information, action information, and/or event start time information.

According to an embodiment of the present invention, the trigger type information (or triggerType) may indicate “status”. The action information (or action) may indicate “kill”. The event start time information (or eventStartTime) may indicate “9a33”.

FIG. 367 is a flow diagram when trigger type information indicates “mediaTime” according to an embodiment of the present invention.

Referring to the drawing, a transceiving system according to an embodiment of the present invention may include at least one of the transmitter C10, the first receiver C100, and/or the second receiver C200. A description of the transceiving system according to an embodiment of the present invention may include the entire description of the aforementioned transceiving system.

According to an embodiment, the first receiver C100 may receive a trigger including trigger type information (or application trigger type) indicating “mediaTime”. When the trigger type information indicates “mediatime”, the trigger type information may indicate a trigger for signaling media time. When the trigger type information indicates “mediaTime”, the triggering application information may include media time.

Hereinafter, an operation for transmitting trigger list information by the first receiver C100 when trigger type information indicates “mediaTime” will be described in detail.

The first receiver C100 may parse a trigger based on signaling information. The first receiver C100 may parse at least one of an application identifier (or appID), an event identifier (or eventID), and/or a data identifier (or dataID) in the received trigger.

Then, the first receiver C100 may acquire a target device. For example, the first receiver C100 may check event information included in the triggering application information based on the trigger information in the trigger. The first receiver C100 may search for a corresponding application and/or event based on the application identifier and/or the event identifier and check whether a destination of an event indicates the second receiver. For example, when the destination indicates “2”, the destination of the event may indicate the second receiver (or second screen).

Then, the first receiver C100 may transmit trigger list information (or TriggerInfoList information) including information on the received trigger to the second receiver C200 using an eventing method. When the destination of the event is “second receiver”, the first receiver C100 may notify the second receiver C200 of the trigger list information (or TriggerInfoList information) using an eventing method. For example, when the destination of the event is ‘2’, the first receiver C100 may generate an event for generating the trigger list information to the second receiver.

The second receiver C200 may receive the signaling information from the first receiver C100. For example, the second receiver C200 may receive trigger list information including information on the trigger. For example, the trigger may be a trigger indicating that current media time is "9a33" to the second receiver C200. When the trigger type information indicates "mediaTime", the second receiver C200 may omit processing of action information. The second receiver C200 may perform an application based on the trigger included in the trigger list information.

FIG. 368 is a diagram illustrating XML format of TriggerInfoList when trigger type information indicates "mediaTime" according to an embodiment of the present invention.

Referring to the drawing, the trigger list information (or TriggerInfoList) may include trigger information. The trigger information may include at least one of trigger type information, action information and/or event start time information.

According to an embodiment, the trigger type information (or triggerType) may indicate "mediaType". The action information (or action) may indicate "exec". The event start time information (or eventStartTime) may indicate "9a33".

FIG. 369 is a flow diagram when a first receiver and a second receiver are not paired with each other according to an embodiment of the present invention.

Referring to the drawing, a transceiving system according to an embodiment of the present invention may include at least one of the transmitter C10, the first receiver C100, and/or the second receiver C200. A description of the transceiving system according to an embodiment of the present invention may include the entire description of the aforementioned transceiving system.

According to an embodiment of the present invention, the first receiver C100 and the second receiver C200 may not be pared with each other. Hereinafter, a flow diagram of the case in which the first receiver C100 is not paired with the second receiver C200 prior to reception of a trigger will be described.

The first receiver C100 may receive a broadcast signal from the transmitter C10. The first receiver C100 may acquire signaling information based on the broadcast signal. In detail, the first receiver C100 may acquire application signaling information based on the signaling information. As described above, the first receiver C100 may acquire the application signaling information based on the MPEG-DASH protocol and/or the MMT protocol. The application signaling information may include at least one of a trigger for triggering an action of an application and triggering application information (or TPT) for signaling information on a triggered application.

Then, the first receiver C100 may store the received signaling information in storage. For example, the first receiver C100 may store the received triggering application information (or TPT) in the storage.

Then, the first receiver C100 may further receive the signaling information from the transmitter C10. The signaling information may include a trigger. For example, the trigger may include a trigger that is transmitted to the second receiver from the first receiver or is processed by the second receiver.

However, the first receiver C100 may not be connected to the second receiver C200. Accordingly, even if a destination of an event indicates "2", the first receiver C100 may not transmit the signaling information and/the trigger to the second receiver.

Then, the first receiver C100 may perform a discovery and/or pairing operation with respect to the second receiver C200. For example, the first receiver C100 may discover the second receiver and may be electrically connected to the second receiver so as to transmit and receive data.

Then, the second receiver C200 may subscribe an application signaling service of the first receiver C100. The first receiver C100 may subscribe an application signaling service of the second receiver C200. For example, the second receiver C200 may subscribe an app transceiver of the first receiver C100 using an app transceiver of the second receiver C200. The second receiver may make a request for trigger list information to the first receiver using GetTriggerInfoList action and, thus, it may not be necessary to subscribe the application signaling service of the first receiver.

Then, the first receiver C100 may receive a request for the trigger list information from the second receiver and transmit trigger list information including information on a trigger to the second receiver.

The second receiver C200 may check whether a trigger for the second receiver C200 is present among triggers received by the first receiver C100 using GetTriggerInfoList action. For example, the second receiver C200 may make a request for trigger list information (or TriggerInfoList) including information on a trigger for the second receiver C200 to the first receiver C100 and receive the trigger list information (or TriggerInfoList) from the first receiver C100.

Then, the second receiver C200 may check whether a trigger to be executed based on a current time point is present using the received trigger list information (or TriggerInfoList information). For example, the second receiver C200 may recognize whether an action to be currently performed based on at least one of trigger type information, event start time information, and/or event termination time information of the received trigger.

Then, the second receiver C200 may perform an action based on the trigger. For example, the second receiver C200 may execute an application based on the trigger included in the trigger list information.

FIG. 370 is a flow diagram of the case in which the first receiver and the second receiver are not paired according to an embodiment of the present invention.

Referring to the drawing, a transceiving system according to an embodiment of the present invention may include at least one of the transmitter C10, the first receiver C100, and/or the second receiver C200. A description of the transceiving system according to an embodiment of the present invention may include the entire above description of the aforementioned transceiving system.

According to an embodiment of the present invention, the first receiver C100 and the second receiver C200 may not be paired with each other. Hereinafter, a flow diagram using an application identifier when the first receiver C100 is not paired with the second receiver C200 prior to reception of a trigger will be described.

The first receiver C100 may receive a request for application identifier list information from the second receiver and transmit the application identifier list information to the second receiver. The application identifier list information may indicate a list of the application identifier (or AppID) as a required state variable. For example, the application identifier list information may be referred to as A_ARG_TYPE_AppIDs variable. The application identifier list information may be transmitted to the second receiver from the first receiver in response to a request of the second receiver.

Then, the first receiver C100 may receive a request for trigger information from the second receiver and transmit the trigger information to the second receiver. For example, the first receiver C100 may receive trigger information on a specific application based on the application identifier list information from the second receiver C200 and transmit trigger information to the second receiver.

The second receiver C200 may make a request for application identifier list information to the first receiver C100 and receive application identifier list information in response thereto. For example, the second receiver C200 may acquire application identifiers corresponding to a trigger for the second receiver C200 among triggered received by the first receiver C100 using GetAppID action.

Then, the second receiver may make a request for trigger information to the first receiver C100 and receive trigger information in response to the trigger information. For example, the second receiver C200 may acquire whether a trigger for the second receiver C200 is present among triggers received by the first receiver C100 using GetTriggerInfo action. In this case, in order to acquire trigger information (or TriggerInfo information) of a specific application, the second receiver C200 may use application identifier information as input argument. For example, the second receiver C200 may make a request for trigger information on a corresponding application based on the application identifier indicating "12" and receive trigger information in response thereto.

Then, the second receiver C200 may check whether a trigger to be executed based on a current time point is present using trigger information. For example, the second receiver C200 may recognize whether an action to be currently performed using triggerType, eventStartTime, and/or eventEndTime information of the received trigger.

Then, the second receiver C200 may perform an action based on the trigger. For example, the second receiver C200 may perform an application based on the trigger.

FIG. 371 is a flow diagram of reception of triggering application information by a second receiver from a transmitter according to an embodiment of the present invention.

Referring to the drawing, a transceiving system according to an embodiment of the present invention may include at least one of the transmitter C10, the first receiver C100, and/or the second receiver C200. A description of the transceiving system according to an embodiment of the present invention may include the entire above description of the aforementioned transceiving system.

According to an embodiment of the present invention, the first receiver C100 and the second receiver C200 may not be paired with each other. Hereinafter, a flow diagram of the case in which the first receiver C100 is not paired with the second receiver C200 prior to reception of a trigger will be described. Then, the second receiver C200 may subscribe an application signaling service of the first receiver C100. The first receiver C100 may subscribe an application signaling service of the second receiver C200. For example, the second receiver C200 may subscribe an app transceiver of the first receiver C100 using an app transceiver of the second receiver C200. The second receiver is capable of making a request for trigger position information to the first receiver using GetTriggerInfoURI action and, thus, it may not be necessary to subscribe the application signaling service of the first receiver.

Then, the first receiver C100 may receive a request for trigger position information indicating a position of a trigger from the second receiver and transmit the trigger position information to the second receiver.

The second receiver C200 may check whether trigger position information for the second receiver C200 is present among trigger position information received by the first receiver C100 using the GetTriggerInfoURI action. For example, the second receiver C200 may make a request for trigger position information (or TriggerInfoURI) to the first receiver C100 and receive the trigger position information (or TriggerInfoURI) from the first receiver C100.

The second receiver C200 may check a trigger to be executed based on a current time point using the received trigger position information (or TriggerInfoURI). For example, the second receiver C200 may recognize whether an operation to be currently performed is present based on at least one of trigger type information, event start time information, and/or event termination time information of the received trigger.

The second receiver C200 may acquire all triggers (or application trigger information) for the second receiver C200 from the transmitter C10 (or content server). The second receiver C200 may recognize whether an operation to be currently performed is present based on at least one of trigger type information, event start time information, and/or event termination time information of the received trigger and pre-recognize whether an operation to be performed in the future according to media time.

Then, the second receiver C200 may perform an operation based on the trigger. For example, the second receiver C200 may execute an application based on the trigger.

This method may be useful in that the second receiver C200 does not necessarily and continuously receive a trigger for the second receiver C200 from the first receiver C100.

In addition, this method may be useful in that data about an event included in a trigger is pre-downloaded so as to reduce data loading time.

Then, the second receiver C200 may transmit trigger information (or TriggerInfo information) from the first receiver C100 using an eventing method. For example, the second receiver C200 may receive a media Time trigger from the first receiver C100 using an eventing method.

FIG. 372 is a flowchart illustrating an operation of a broadcast receiving apparatus according to an embodiment of the present invention.

A transceiving system according to an embodiment of the present invention may include at least one of a transmitter, a broadcast receiving apparatus (or first receiver), and/or a second screen device (or second receiver). A description of the transceiving system according to an embodiment of the present invention may include the entire above description of the aforementioned transceiving system. Hereinafter, an operation of the broadcast receiving apparatus will be described.

The broadcast receiving apparatus may receive a broadcast signal using a broadcast receiver (CS2100). For example, the broadcast receiving apparatus may receive the broadcast signal using the broadcast receiver and/or the IP transceiver.

The broadcast receiving apparatus may acquire application signaling information for signaling an application included in the broadcast server from the broadcast signal using a controller (CS2200). For example, the broadcast receiving apparatus may acquire signaling information from the broadcast signal using the controller and acquire application signaling information from the signaling information.

The broadcast receiving apparatus may acquire application signaling information based on an MPEG-DASH protocol and/or an MMT protocol.

The application signaling information may include at least one of a trigger, trigger position information, and triggering application information. The trigger may trigger an operation of an application. For example, the trigger may perform a timing related signaling operation for supporting an interactive service. The trigger position information may indicate a position of the trigger. The triggering application information may signal information on the triggered application. For example, the triggering application information may include an application and metadata about an event targeted to the application.

The broadcast receiving apparatus may transmit the trigger to the second screen device based on the application signaling information using the app transceiver (CS2300).

The broadcast receiving apparatus may transmit trigger transmission information for transmitting the trigger to the second screen device using the app transceiver.

The trigger transmission information may include at least one of trigger information indicating attribute for a trigger, trigger list information including at least one trigger information item, trigger position information indicating a position of a trigger, and application identifier list information indicating a list of an application identifier.

The trigger information may include at least one of an application identifier for identifying an application, trigger type information indicating a type of a trigger, action information indicating an operation of an application, event start time information indicating start time of a trigger, event termination time information indicating termination time of a trigger, data information including data related to a trigger, and/or data position information indicating data related to a trigger.

The broadcast receiving apparatus may further transmit application notification information including information on application notification for the second screen device using the app transceiver.

The application notification information may include at least one of targetDevice attribute indicating a device on which application notification is displayed, topMargin attribute indicating top margin of application notification, rightMargin attribute indicating right margin of application notification, show attribute indicating time at which application notification is first displayed, lasting attribute indicating lasting time at which application notification is displayed, interval attribute indicating an interval time between application notifications, a message element indicating a notification message of application notification, and/or a logo element indicating a logo image of application notification.

The broadcast receiving apparatus may transmit the signaling information, the application signaling information, the trigger transmission information, and/or the application notification information to a second screen device based on an event and/or in response to a request of the second screen device. The broadcast receiving apparatus transmits data based on the event and in response to the second screen device, as described above.

FIG. 373 is a diagram illustrating a structure of a broadcast system according to an embodiment of the present invention.

The broadcast system according to an embodiment of the present invention may include at least one of a broadcaster/content provider C10, a broadcast receiving apparatus C100, and/or a companion screen device C200. The broadcaster/content provider C10 may provide a broadcast service. The broadcaster/content provider C10 may include at least one of the aforementioned broadcast transmitting apparatus (not shown), content provider (not shown), content server (not shown), controller (not shown), and/or transmitter (not shown). The broadcaster/content provider C10 may be represented by a transmitter. The broadcast receiving apparatus C100 may receive a broadcast service through a broadcast network and/or the Internet. The broadcast receiving apparatus C100 may be represented by a receiver, a first receiver, a first screen device, a master device (MD), and/or a primary device (PD). The broadcast receiving apparatus C100 may include at least one of a broadcast interface (or broadcast receiver) C110, a broadband interface (or IP transceiver) C130, a companion screen interface (or app transceiver) C140, a decoder (not shown), a display (not shown), and/or a controller C150. The companion screen device C200 may receive a broadcast service through the Internet. The companion screen device C200) may be represented by a second broadcast receiving apparatus, a second receiver, a second screen device, a slave device (SD), and/or a companion device (CD). The companion screen device C200 may include at least one of a broadband interface (or IP transceiver) C230, a primary device interface (or app transceiver) C240, a decoder (not shown), a display (not shown), and/or a controller C250. A detailed description of the broadcaster/content provider C10, the broadcast receiving apparatus C100, and/or the companion screen device C200 may include the entire above description.

Hereinafter, operations of a PD (or broadcast receiving apparatus) and a CD (companion screen device) will be described.

Operations required for supporting ATSC 3.0 companion device requirements will be described below. Here, there are five types of supported functions.

A first function may use a PD in order to stream continuous components that are some of services that are currently selected by the PD for simultaneous presentation by a CD. Components may be the same as components presented by a PD. Alternatively, the components may be general components that are not currently presented by a PD.

A second function may use a PD in order to deliver data or files that are some of services that are currently selected by the PD to a CD. The data may contain a place or method of accessing content from sources other than the PD. For example, the data may include a URL of a remote server. The CD may make a request for a single particular file or a data package. Alternatively, the CD may make a request for "subscription" of a series of particular files or data.

A third function may use a PD for delivering media timeline information on a service that is currently selected by the PD in order for a CD to synchronize content presented in the CD along with content presented in the PD.

A fourth function may use a CD application that cooperates with a PD application. The PD application may be an enhancement application that is a portion of a scheduled linear service. Alternatively, the PD application may be an application that is a portion of an app-based service or an unscheduled service.

A fifth function may be EAM delivery. That is, the fifth function uses a PD in order to deliver emergency alert messages to a CD. This is particularly important when a CD displays continuous contents. This is because a user (or viewer) may not concentrate on the PD and may not be in the same room as the PD when emergency alert occurs.

Along with a PD that functions as a server, an appropriate paradigm for supporting a CD is expected to be a client-server paradigm. That is, the PD may support certain CD support operations. This may also be applied to the CD. Each interaction may be initiated according to a request to a server (or PD) from a client (or CD) in order to apply a particular operation. Two-way communications may be initiated according to a request to a server (or PD) from a client (or CD) in order to set up communications. Asynchronous notifications to a CD from a PD may be initiated according to a request of a client (or CD) that makes a request for subscription of a stream of notifications to a server (or PD).

All messages described below may be unicast unless the context clearly indicates otherwise.

A security mechanism may be required to authenticate CD application requests.

In several operations, a CD may receive a URL in order to retrieve content in a remote server. In this case, in order for the remote server to transmit an appropriate version of requested content to a particular CD, the CD may provide information on the remote server to the remote server. For example, to this end, ATSC 2.0 clearly describes "User Agent" based on HbbTV specifications (Per TS 102 796 Section 7.3.2.4, except replace "HbbTV/1.2.1" with "ATSC-ISS/1.0").

Hereinafter, device discovery will be described.

Both a PD application and a CD application may transmit multicast discovery messages for searching and/or advertising presence of the PD application and the CD application and ATSC 3.0 service supporting.

One household may have one or more PDs on a home network and, accordingly, a CD application may receive display messages from a plurality of PDs. In this case, the CD application may ask a user a question about PD(s) that interacts with the user (for example, the CD application may display information from discovery messages in order to help user decision).

The CD application may multicast a CD application search request message for searching the PD. For example, when the CD participates in a network or the CD application is initiated, when discovery scan in the CD application is initiated (e.g., when a user wants to access a new or another TV receiver and new scan is initiated), when the CD transmits a multicast request for a device type/service type of the PD, and/or dependently upon execution and periodically, the CD application may multicast a CD app search request message for searching the PD. For example, parameters may include at least one of a device and/or service type CD app is looking for (in order to avoid a response from a DVD player, etc.).

The PD may multicast a PD advertisement message and unicast a search response message. For example, when the PD participates in a network/LAN (advertisement-multicast), when a list of CD supporting operations provided by the PD is changed (advertisement-multicast), dependently upon execution and periodically. (advertisement-multicast), and/or when a multicast search request is received from the CD (search response-unicast), the PD may multicast a PD advertisement message and unicast a search response message. For example, parameters may include at least one of a PD device ID, a PD device type (ATSC 3.0 TV set) and (ATSC 3.0 support) version, a user-friendly name of a PD (e.g., living room TV), supported CD supporting operations, and/or other parameters.

The CD may multicast a CD advertisement message and unicast a search response message. For example, when the CD participates in a network (or when a CD application is initiated) (advertisement-multicast), when a list of CD supporting operations provided by the PD is changed (advertisement-multicast), dependently upon execution and periodically, and/or when a (multicast) search request for a device/service type of the CD is received from the PD (unicast search message response from the CD), the CD may multicast a CD advertisement message and unicast a search response message. For example, parameters may include at least one of a CD device ID. a CD application ID, a CD application version, a name of a CD readable by the human, supported CD services (service types), and/or other parameters.

The PD may multicast a PD search request message for searching the CD. For example, when the PD is initiated/the PD participates in a network, when discovery scan in the PD is initiated (e.g., when a user wants to access a new or another CD and new scan is initiated), whenever the PD transmits a multicast request for a device type/service type of the CD, and/or dependently upon execution and periodically, the PD may multicast a PD search request message for searching the CD. For example, message parameters may include at least one of a retrieved CD device type and/or CD service type. Optionally, message parameters may include PD information (e.g., a PD device ID, a PD application ID, and a PD application version).

Hereinafter, subscription to content identification will be described.

Several CD applications (e.g., "American Idol" companion application) may be designed for only one show. In addition, several CD applications (e.g., WBZ Channel 4 companion application) may be designed for only one service. On the other hand, other CD applications may be designed to be operated with respect to a plurality of services and/or a plurality of shows. In addition, a CD application (e.g., Ford truck application) may be designed to accompany interstitials. Accordingly, the CD application may need to know a service that is currently selected by a PD and need to trace service changes (e.g., channel changes). In a certain case, the CD application may need to know a show or to even know a segment that is currently presented and need to trace changes thereof.

The CD may transmit a content identification subscription request. For example, a time may not be clearly indicated (that is, this may be determined according to an application designer). For example, parameters may include at least one of subscription callback URL/information, and/or requested subscription duration. Optionally, parameters may include a CD device ID, a CD application ID, a CD application version, and so on.

The PD may transmit content identification subscription response. For example, as soon as a subscription request is received (initial response), and/or whenever content is changed (subsequent responses) (i.e., whenever a service, a show, or a segment is changed), the PD may transmit content identification subscription response. For example, parameters may include at least one of a PD device ID, a subscription ID. and/or confirmed subscription duration.

The CD may transmit a content identification subscription renew/cancel request. For example, prior to subscription timeout for renewing subscription and/or at any time for canceling subscription, the CD may transmit a content identification subscription renew/cancel request. For example, parameters may include at least one of subscription ID, and/or requested subscription duration to renew subscription. Optionally, parameters may include CD information (CD device ID), a CD application ID, a CD application version, and so on.

The PD may transmit content identification subscription renew/cancel response. For example, as soon as receiving a subscription renew/cancel request, the PD may transmit the content identification subscription renew/cancel response. For example, parameters may include at least one of a subscription ID, and/or confirmed subscription duration for subscription renewal.

The PD may transmit a content identification message. For example, as soon as a subscription request is received, and/or when identification of current content or related information is changed, the PD may transmit a content identification message. For example, parameters may include at least one of a service ID, a show ID, and/or a segment ID. In addition, the parameters may include a current temporal location within the given show and/or segment. Each service, show, and/or segment may include available information, available continuous components, and/or available files and data. With respect to the available information, parameters may include at least one of a textual name, description. logo, and/or other ESG info (rating, etc.). With respect to each component of the available continuous components, parameters may include at least one of a component ID, a component type, a component name, component description component attributes (e.g., bit rate, aspect ratio, device capabilities required/desired, etc.), a component filtering criterion (e.g., targeted to certain demographic profiles), and/or a location of each component (e.g., URLs or IP address, port, and protocol) (the location may indicate a stream from the PD or a stream directly from the Internet). With respect to the each file or data element of the available files or data. parameters may include at least one of a file ID/data ID, a file type/data type, a file name/data name, file description/data description, file attributes/data attributes (e.g., size, codec, device capabilities require/desired, etc.), available as subscription or one-off or both, a component filtering criterion (e.g., component filtering criterion targeted to certain demographic profiles), and/or a location for assessing data and/or files (e.g., a location for assessing data and/or files from the PD, a location for assessing data and/or files from a remote server from a certain URL, etc.).

The CD may transmit response to the content identification message. For example, upon receiving the content identification message from the PD, the CD may transmit response to the content identification message. For example, parameters may include a CD device ID or a CD application ID.

Hereinafter, a ESG-type information request for the current service or show will be described.

According to the information, the CD may make a request for information on content in a TV. For example, the information may include information contained in ESG such as a textual name, description, a logo, and rating. According to the information, the CD application may display information readable by the human to a user. For example, the CD application may display "You are watching [Show] starring [actor]".

The CD may transmit a service/show information request. For example, a time may not be clearly indicated. That is, according to decision of an application designer, the CD may transmit a service/show information request. For example, parameters may include CD information (e.g., CD device ID, CD application ID, CD application version, etc.).

The PD may transmit service/show information response. For example, as soon as receiving a CD request, the PD may transmit service/show information response. For example, parameters may include at least one of a service ID and show ID, and/or service ESG information and show ESG information. Optionally, a parameter may include PD information (e.g., PD device ID, etc.).

Hereinafter, a request for current information about a current service, show or segment without subscription will be described.

In addition to subscription based approach and a follow-on request, the CD may directly obtain information on a service/show/segment that is currently presented by the PD using communication of a single transaction request-response style directed to the PD from the CD as follows without first subscription of service identification.

The CD may transmit a CD request to PD to receive current service information. For example, whenever a CD request is needed by an application, the CD may transmit the CD request to PD to receive current service information. For example, parameters may include at least one of information for making a request for current show ESG information, information for making a request for current available components of a current show, information for making a request for a current timeline location in a current show, information for making a request for current available files of a current show or non real-time content, and/or information for making a request for a filtering criterion (e.g., component attributes). Optionally, parameters may include CD information (CD device ID, CD application ID, a CD application version, etc.).

The PD may transmit PD current service information response. For example, as soon as receiving a current service information request, the PD may transmit PD current service information response. For example, parameters may include current show ESG information, information about current available components for the current show, a current timeline location with the current show, information about current available files or non real-time content for the current show, and/or a filtering criterion. Optionally, parameters may include PD information (e.g., PD device ID emd).

Hereinafter, a request for a continuous component from a PD will be described.

When PD service information response includes an access location and availability of continuous components streaming from the PD, the CD may request reception of the stream (Continuous components are available from a remote server through a broadband (or the Internet) but a detailed description thereof will be omitted.).

The CD may transmit a continuous component request. For example, a time may not be clearly indicated. That is, according to an application designer, the CD may transmit a continuous component request. For example, parameters may include a component ID. Optionally, parameters may include CD information (CD device ID), CD application ID, a CD application version, and so on.

The PD may transmit continuous component request response. For example, as soon as receiving a valid CD application request, the PD may transmit the continuous component request response. For example, parameters may include a component ID, and/or an access location of a component. Optionally, parameters may include PD information (e.g., PD device ID, etc.).

After obtaining the access location (e.g., URL) of a component, the CD may pull content using a HTTP GET method without clearly indicating new content. In addition, a stream is not "pushed" by the PD and is "pulled" by the CD (i.e., streaming is controlled by the CD) and, thus, it may not be necessary to define message protocols (e.g., "Start" or "End") between the PD and the CD in order to control a stream.

Hereinafter, a request for a data/file from a PD will be described.

When PD service information response includes availability of data or file components accessible from the PD, the CD may request reception of component(s) (data/file components are available from a remote server through a broadband but a detailed description thereof will be omitted.).

The CD may transmit a data/file request. For example, a time may not be clearly indicated. That is, according to decision of an application designer, the CD may transmit the data/file request. For example, a time may not be clearly indicated. For example, parameters may include data/file ID(s) for item(s) to be received by the CD application. When subscription is optional, whether subscription is appropriate may be clearly indicated. When subscription is appropriate, start or stop for receiving subscription may be clearly indicated. Optionally, parameters may include CD information (CD device ID, CD application ID, CD application version, etc.).

The PD may transmit data/file request response. For example, as soon as receiving a CD application request, the PD may transmit data/file request response. In addition, when there is a subscription request, the PD may transmit supplementary data-files according to notifications present in a broadcast stream. For example, parameters may include at least one of an access location of the data/file and/or data/file ID(s) of requested item(s). Optionally. parameters may include PD information (e.g., PD device ID, etc.).

Hereinafter, a request for media timeline checkpoints will be described.

When the CD accesses supplementary content directly from the PD or through another source (e.g., remote server), the CD may require on-going media timeline information from the PD in order to maintain sync between content displayed by the CD and content displayed by the PD.

Subscription based approach as well as single request response approach may be supported in order to receive timeline checkpoints from the PD. The CD has an accurate internal clock and, thus, request response architecture may permit polling of a timeline in an appropriate interval by the CD in order to maintain synchronization with the PD.

Hereinafter, the subscription based approach will be described.

The CD may transmit a media timeline checkpoints subscription request. For example, a time may not be clearly indicated. That is, according to decision of an application designer, the CD may transmit the media timeline checkpoints subscription request. For example, parameters may include a service/show/segment ID of interest. In addition, parameters may include a notification frequency. The notification frequency may be a requested frequency that does not exceed a clearly indicated maximum frequency and may be a requested frequency (e.g., frequency that does not exceed every two seconds) for receiving temporal updates. When the notification frequency is not clearly indicated, a receiver may determine a frequency. In addition, the receiver may set a default value to be determined. Parameters may include at least one of subscription callback URL/information, and/or requested subscription duration. Optionally, parameters may include CD information (CD device ID, CD application ID, CD application version, etc.).

The PD may transmit media timeline checkpoints subscription response. For example, when a request is received from a CD application (initial response), and/or according to a confirmed notification frequency (subsequent responses), the PD may transmit media timeline checkpoints subscription response. For example, parameters may include at least one of a PD device ID, a service/show/segment ID of interest, a subscription ID, confirmed subscription duration, and/or a confirmed notification frequency.

The CD may transmit a media timeline checkpoints subscription renew/cancel request. For example, prior to subscription timeout for renewing subscription and/or at any time for canceling subscription, the CD may transmit a media timeline checkpoints subscription renew/cancel request. For example, parameters may include requested subscription duration in order to renew a subscription ID and/or subscription. Optionally. parameters may include CD information (CD device ID, CD application ID, CD application version, etc.).

The PD may transmit media timeline checkpoints subscription renew/cancel response. For example, as soon as receiving a subscription renew/cancel request, the PD may transmit media timeline checkpoints subscription renew/cancel response. For example, parameters may include at least one of a subscription ID, and/or confirmed subscription duration for subscription renew request.

Hereinafter, media playback state information communication will be described.

An operation for transmitting a media playback state to the CD by the PD may be supported. This may be useful to playback a media stream when the CD synchronizes with the PD.

The CD may transmit the CD subscription request to the PD to receive current media playback state information. For example, whenever a CD subscription request is needed by an application, the CD may transmit the CD subscription request to the PD to receive current media playback state information. For example, parameters may include a URL/ID for which media playback state is requested, media state subscription callback URL/information, and/or requested subscription duration. Optionally, parameters may include CD information (CD device ID. CD application ID, CD application version, etc.).

The PD may transmit PD media callback state subscription response. For example, as soon as receiving a current media playback state subscription information request, the PD may transmit the PD media callback state subscription response. For example, parameters may include at least one of a PD device ID, a media playback state subscription ID, and/or confirmed subscription duration.

The PD may transmit a media playback state PD notification to the CD. For example, when a media playback state is changed in the PD or periodically, the PD may transmit the media playback state PD notification to the CD. For example, notification parameters may include current media playback state information on a requested URL/ID. For example, the state may include at least one of playing, paused, stopped, fast forward; speed of fast forward, fast backward: speed of fast backward, and buffering.

Hereinafter, PD application to CD application communication will be described.

In some cases, the PD application and the CD application may be designed to operate in tandem. In this case, an application designer may be expected to determine detailed content of app-to-app communication. PD applications and CD applications may include information on a user of the other applications and include methods of downloading and launching the other applications. Even if the CD application is not currently launched, the CD application may include a mechanism that always "listens carefully" to an announcement message from a PD application. ATSC may not be expected to clearly indicate standards for this operation (HbbTV 2.0 provides some specifications for required operations.).

Hereinafter, transmission of an emergency alert message from a PD to a CD will be described.

Subscription based delivery of the emergency alert message (EAM) to the CD from the PD may be supported via the following message exchange.

The CD may transmit a CD subscription request to the PD to receive the EAM. For example, when the CD participates in a network to activate an EAM function (or when the CD application is launched), the CD may transmit a CD subscription request to the PD to receive EAMs. For example, parameters may include at least one of subscription callback URL/information and/or requested subscription duration. Optionally, parameters may include at least one of EAM filtering criterion (e.g., geo-location) and/or CD information (CD device ID, CD application ID, CD application version, etc.).

The PD may transmit PD EAM subscription response. For example, as soon as receiving a subscription request, the PD may transmit PD EAM subscription response. For example, parameters may include at least one of a PD device ID, a subscription ID, and/or confirmed subscription duration.

The CD may transmit a CD EAM subscription renew/cancel request. For example, before subscription timeout to renew subscription and/or when subscription is canceled, the CD may transmit a CD EAM subscription renew/cancel request. For example, parameters may include a subscription ID and/or requested subscription duration to renew subscription. Optionally, parameters may include CD information (CD device ID, CD application ID, CD application version, etc.).

The PD may transmit PD EAM subscription renew/cancel response. For example, as soon as receiving a subscription renew/cancel request, the PD may transmit PD EAM subscription renew/cancel response. For example, parameters may include at least one of a subscription ID, and/or confirmed subscription duration for a subscription renewal request.

The PD may transmit a PD Notification of EAM. For example, as soon as receiving the emergency alert message, the PD may transmit a PD notification of EAM. For example, parameters may include a subscription ID, initial contents of the EAM, characteristics of initial contents of the EAM) (e.g., new message, continual or one-time message, includes rich media as well as text), and/or additional available content.

The CD may transmit CD response to the EAM. For example, upon receiving the emergency alert message from the PD, the CD may transmit CD response to the EAM. For example, parameters may include at least one of a CD device ID and/or a CD application ID. Optionally, parameters may include a request for supplementary content.

Note: Many response messages may indicate success/failure in addition to the aforementioned parameters.

Hereinafter, use cases will be described.

For example, Julio is watching a broadcast concert of Rock & Roll band that he likes through a TV screen. Notification pop-up in a TV may indicate that alternative camera views of a concert for presenting each musician to him are available through an application determined in his CD. Julio may launch an application that indicates scenes for close-ups of a guitarist, a bassist, a singer, and a drummer are available. Julio may select the guitarist during a guitar solo of singing performance and, then, change selection to the drummer. Media contents may be synchronously rendered in a TV screen and a companion screen.

For example, Mary is interested in hearing video description for the visually handicapped but does not want all viewers in a room to hear the video description. Using an application in her CD, she may discover various available audio tracks and select a description track for playback in her CD. John is visually handicapped and wants to read closed captions along with sound description. Using an application in his CD, he may discover various options for closed captions and select one option along with audio description for playback in his CD. Hector prefers voice over-dub to reading Spanish subtitles. He has a CD application having a text-to-voice function. Using his CD, he may discover Spanish subtitles and use an application for changing a text to voice that he listens through a head phone.

For example. Jane is watching a game show that she likes. Notification pop-up in a TV may indicate that the game show can also be present by her tablet through a tablet application determined to her. She may launch the application and play back the application in real time according to the game show. Simultaneously being represented in the show, each question may be represented to here in her tablet. In addition, her response time may be limited to a response time owned by a participant of the show. Her score may be traced according to an application and she may view her ranking among other viewers who also perform playback using a tablet application.

For example, George may launch an OnDemand application in his main TV. A TV application may make a request for several demographic information items from George in order to make program recommendations for George. The TV application may propose a companion tablet application to be downloaded by George in order to easily input data. George may download and launch a tablet application. The tablet application may provide data entry fields to George. George may terminate data entry in his tablet and information thereof may be registered in the TV application. The TV application may recommend several OnDemand programs based on entries thereof. George may use his tablet in order to select one among recommended programs represented in his TV. As an alternative method, George may use his tablet in order to select one among recommended programs represented in his tablet instead of a main TV.

For example, Laura is watching a program that she likes in a living room. She has various tasks required around her house. However, she does not want to miss a show that she likes. She launches an application in her tablet for watching her show in her tablet as well as her TV. She continuously watches her show through her tablet while moving to a room from another room. While Laura is in a laundry room. an emergency alert message is broadcast.

The message may be represented in her tablet. The tablet may indicate that there is video of an event that she can view when she want to view the event, to her. She may select video and begin to view video. She may follow instructions indicated by the emergency alert message.

FIG. 374 is a diagram illustrating a broadcast system for delivery of time information according to an embodiment of the present invention.

The broadcast system according to an embodiment of the present invention may include at least one of the broadcaster/content provider C10, the broadcast receiving apparatus C100, and/or the companion screen device C200. The broadcaster/content provider C10 may provide a broadcast service. The broadcaster/content provider C10 may include at least one of the aforementioned broadcast transmitting apparatus (not shown), a content provider (not shown), a content server (not shown), a controller (not shown), and/or a transmitter (not shown). In addition, the broadcaster/content provider C10 may be represented by a transmitter. The broadcast receiving apparatus C100 may receive a broadcast service through a broadcast network and/or the Internet. The broadcast receiving apparatus C100 may be represented by a receiver, a first receiver, a first screen device, a master device (MD), and/or a primary device (PD). The broadcast receiving apparatus C100 may include at least one of a broadcast interface (or broadcast receiver) C110, the broadband interface (or IP transceiver) C130, the companion screen interface (or app transceiver) C140, a decoder (not shown), a display (not shown). and/or the controller C150. The companion screen device C200 may receive a broadcast service through the Internet. The companion screen device C200 may be represented by a second broadcast receiving apparatus, a second receiver, a second screen device, a slave device (SD), and/or a companion device (CD). The companion screen device C200 may include at least one of the broadband interface (or IP transceiver) C230, the primary device interface (or app transceiver) C240, a decoder (not shown), a display (not shown), and/or the controller C250. A detailed description of the broadcaster/content provider C10, the broadcast receiving apparatus C100, and/or the companion screen device C200 may include the entire above description.

The controller C150 of the broadcast receiving apparatus C100 according to an embodiment of the present invention may operate the broadcast interface C110 and the companion screen interface C140.

The controller C150 may include an application signaling service processor (not shown) for delivery of signaling information (e.g., application signaling information, trigger) to the companion screen device C200 from the broadcast receiving apparatus C100. A detailed description of the application signaling service processor is the same as the above description.

The companion screen device C200 needs to maintain time synchronization between the broadcast receiving apparatus C100 and the companion screen device C200 in order to provide a service in association with the broadcast receiving apparatus C100. The broadcast system according to an embodiment of the present invention may receive signaling information including media time information of A/V content using the broadcast receiving apparatus C100, generate service time information for providing data related to synchronization between A/V content displayed by a broadcast receiving apparatus and AN content displayed by the companion screen device C200 based on the signaling information, and transmit the service time information to the companion screen device C200.

To this end, the controller C150 of the broadcast receiving apparatus C100 according to an embodiment of the present invention may further include a time synchronization service processor C153 for generating service time information for providing data related to time synchronization between AN content displayed by a broadcast receiving apparatus and AN/V content displayed by a companion screen device based on signaling information.

The time synchronization service may refer to a service for generating service time information for time synchronization of the broadcast receiving apparatus C100 and the companion screen device C200 and transmitting the service time information to the companion screen device C200 from the broadcast receiving apparatus C100. The service time information may, be information related to synchronization between A/V content displayed by the broadcast receiving apparatus C100 and AN content displayed by the companion screen device C200. The service time information for providing time synchronization to the companion screen device C200 by the broadcast receiving apparatus C100 may include at least one of media time information (e.g., media time) of a served (e.g., linear service) program and/or current time information (e.g., wall clock).

That is, a processor that is in charge of generation of the service time information and/or transmission of service time information to the companion screen device C200 from the broadcast receiving apparatus C100 may also be referred to as the time sync service processor C153. The time synchronization service processor C153 may transmit at least one of media time information and/or current time information (wall clock information) to the companion screen device C200 for time synchronization of media, an interactive application, and so on to the companion screen device C200 by the broadcast receiving apparatus C100. According to an embodiment of the present invention, Service Type may be defined according to urn:atsc.org:serviceId:atsc3.0:timesync.

For example, the broadcast receiving apparatus C100 may receive signaling information. The broadcast receiving apparatus C100 may receive signaling information through a broadcast network. The signaling information may include application signaling. The application signaling information may include a trigger and/or triggering application information. In addition, the signaling information may include media time information of presented A/V content.

The broadcast receiving apparatus C100 according to an embodiment of the present invention may generate service time information for time synchronization between the broadcast receiving apparatus C100 and the companion screen device C200 based on the signaling information using the time synchronization service processor C153 of the controller C150. Then, the broadcast receiving apparatus C100 may transmit the service time information to the companion screen device C200 using the companion screen interface C140.

In detail, the broadcast receiving apparatus C100 may generate update interval information indicating an interval for delivery of the service time information using the time synchronization service processor C153. The broadcast receiving apparatus C100 may transmit the service time information to the companion screen device C200 based on the update interval information using the companion screen interface C140.

The interval may be a concept including duration and frequency. Hereinafter, the duration will be first described and the frequency will be described.

Hereinafter, a method of receiving signaling information including media time information of A/V content through a broadcast network, generating service time information based on the signaling information, and transmitting the service time information to the companion screen device C200 by the broadcast receiving apparatus C100 will be described. For example, the broadcast receiving apparatus C100 may execute an event (or triggering event) (eventing method) to transmit service time information for time synchronization to the companion screen device C200. The broadcast receiving apparatus C100 may transmit service time information for time synchronization to the companion screen device C200 in response to a request of the companion screen device C200 (requesting method).

FIG. 375 is a diagram illustrating state variables for delivery of service time information according to an embodiment of the present invention.

The drawing illustrates state variables for delivery of the service time information. The state variables for delivery of the service time information may include at least one of a ServiceTimeInfo state variable including the service time information, an UpdateDuration state variable including delivery duration information, and/or an A_ARG_TYPE_UpdateDuration state variable including requested delivery duration information. The ServiceTimeInfo state variable, the UpdateDuration state variable, and/or the A_ARG_TYPE_UpdateDuration state variable may be a required state variable. The ServiceTimeInfo state variable may include media time and current time, i.e., wall-clock time information of a program that is presented or served by a broadcast receiving apparatus. The UpdateDuration state variable may be variable indicating delivery duration of time information when a broadcast receiving apparatus transmit the time information for synchronization to a companion screen device using an eventing method. The A_ARG_TYPE_UpdateDuration state variable may be variable to be used to make a request for particular delivery duration when a companion screen device receives time information for synchronization from a broadcast receiving apparatus using an eventing method.

Service time information (ServiceTimeInfo) may be information for providing data related to time synchronization between A/V content displayed by a broadcast receiving apparatus and A/V content displayed by a companion screen device. For example, the service time information may include at least one of media time information and/or wall-clock time of a program that is presented or served by a broadcast receiving apparatus. The broadcast receiving apparatus may execute an event (or triggering event) (eventing method) to transmit service time information for time synchronization to a companion screen device. In addition, the broadcast receiving apparatus may transmit the service time information for time synchronization to the companion screen device in response to a request of the companion screen device (requesting method).

The delivery duration information may be information indicating duration for delivery of the service time information. The broadcast receiving apparatus may transmit the service time information to the companion screen device based on the delivery duration information. For example, the delivery duration information (UpdateDuration) may be information indicating delivery duration when the broadcast receiving apparatus transmits service time information for time synchronization to the companion screen device using an eventing method. That is, the delivery duration information may indicate duration for eventing the service time information. When the broadcast receiving apparatus transmits the service time information for time synchronization to the companion screen device using an eventing method, the broadcast receiving apparatus may transmit the service time information to the companion screen device with duration indicated by the delivery duration information.

The requested delivery duration information may be information indicating a value of delivery duration information requested by the companion screen device when the companion screen device receives service time information for time synchronization from the broadcast receiving apparatus using an eventing. In detail, when the broadcast receiving apparatus transmits service time information for time synchronization to the companion screen device using an eventing method, the companion screen device may make a request for predetermined (or particular) delivery duration to the broadcast receiving apparatus based on the requested delivery duration information. In response to the request of the companion screen device, the broadcast receiving apparatus may determine delivery duration information based on the requested delivery duration information and transmit the service time information to the companion screen device with duration indicated by the delivery duration information.

FIG. 375 is a diagram illustrating service time information according to an embodiment of the present invention.

The service time information may be information for time synchronization between the broadcast receiving apparatus and the companion screen device. The service time information may include at least one of media time information and/or current time information of a program that is presented or served by the broadcast receiving apparatus. The service time information may include the aforementioned media timeline checkpoint.

In detail, the service time information may include at least one of serviceId attribute, programId attribute, mediaTime element, and/or currentTime element.

The serviceId attribute may indicate a unique ID of a service that is currently selected by a first receiver. For example, the service may include at least one of a linear service and/or a non-linear service.

The programId attribute may indicate a unique ID of a currently presented program. For example, the program may include content included in a linear service and/or a non-linear service.

The mediaTime element may indicate media time information of a currently presented program. The mediaTime element may include mediaTimeProtocol attribute indicating a program used to represent the mediaTime element. For example, the mediaTimeProtocol attribute may indicate a timestamp.

The currentTime element may indicate current time information (wall-clock time). The currentTime element may include currentTimeProtocol attribute indicating a program used to represent the currentTime element. For example, the currentTimeProtocol attribute may indicate a network time protocol (NTP).

The broadcast receiving apparatus may execute an event (or triggering event) (eventing method) to transmit service time information for time synchronization between the broadcast receiving apparatus and the companion screen device to the companion screen device. In addition, the broadcast receiving apparatus may transmit the service time information for time synchronization to the companion screen device in response to a request of the companion screen device (requesting method).

FIG. 377 is a diagram illustrating XML format of service time information according to an embodiment of the present invention.

Referring to the drawing, service time information may include at least one of serviceId attribute, programId attribute, mediaTime element, and/or currentTime element.

The serviceId attribute may indicate "11". The programId attribute may indicate "1008". The mediaTime element may include mediaTimeProtocol attribute. The mediaTimeProtocol attribute may indicate "timestamp". In addition, the mediaTime element may indicate "77ee". The currentTime element may include currentTimeProtocol attribute.

The currentTimeProtocol attribute may indicate "NTP". The currentTime element may indicate "88ee".

The broadcast receiving apparatus may transmit service time information including media time information indicating "77ee" as a timestamp and current time information indicating "88ee" as an NTP to the companion screen device with respect to a program with "1008" as a value of a program ID in a service with "11" as a value of a service ID.

FIG. 378 is a diagram illustrating operations required to transmit service time information according to an embodiment of the present invention.

Referring to FIG. (a), the operations required to transmit the service time information may include at least one of a service time information request (GetServiceTimeInfo( ) or first request), a delivery duration information request (GetUpdateDuration( ) or second request), and/or a delivery duration information setup request (SetUpdateDuration( ) or third request).

The service time information request (GetServiceTimeInfo( ) or first request) may be an operation of making a request for acquisition of service time information for time synchronization to the service time information by the companion screen device.

The delivery duration information request (GetUpdateDuration( )) may be an operation of making a request for acquisition of delivery duration information to the broadcast receiving apparatus by the companion screen device when the companion screen device receives service time information for time synchronization from the broadcast receiving apparatus using an eventing method.

The delivery duration information setup request (SetUpdateDuration( ) or third request) may be an operation of making a request for setup of delivery duration information to the broadcast receiving apparatus by the companion screen device when the companion screen device receives service time information for time synchronization from the broadcast receiving apparatus using an eventing method.

Each of the service time information request, the delivery duration information request, and/or the delivery duration information setup request may be a necessary operation or an optional operation.

FIG. (b) illustrates Argument related to a service time information request.

The service time information request (GetServiceTimeInfo( )) may be used when the companion screen device makes a request for service time information for time synchronization from the broadcast receiving apparatus. The companion screen device may make a request for service time information for time synchronization to the broadcast receiving apparatus based on the service time information request. In response to the service time information request from the companion screen device, the broadcast receiving apparatus may transmit service time information (ServiceTimeInfo Argument) to the companion screen device based on the service time information request (or first request) for making a request for acquisition of the service time information using a companion screen interface. The service time information (ServiceTimeinfo Argument) may be information related to the ServiceTimeInfo state variable.

That is, the broadcast receiving apparatus may transmit service time information for time synchronization to the companion screen device in response to a request of the companion screen device (requesting method).

FIG. (c) illustrates Argument related to a delivery duration information request.

The delivery duration information request (GetUpdateDuration( )) may be used to make a request for current delivery duration information of the broadcast receiving apparatus from the broadcast receiving apparatus by the companion screen device. The companion screen device may make a request for current delivery duration information of the broadcast receiving apparatus to the broadcast receiving apparatus based on the delivery duration information request.

The delivery duration information may refer to duration for eventing service time information. In response to the delivery duration information request from the companion device, the broadcast receiving apparatus may transmit current delivery duration information (CurrentUpdateDuration Argument) indicating a value of delivery duration information at a time point indicated by wall-clock time (or current time) to the companion screen device. The current delivery duration information (CurrentUpdateDuration Argument) may be information related to UpdateDuration state variable.

That is, the broadcast receiving apparatus may transmit current delivery duration information to the companion screen device in response to a request of the companion screen device (requesting method). The broadcast receiving apparatus and/or the companion screen device may confirm current delivery duration information and, then, make a request for setup (or change) of the delivery duration information as necessary.

FIG. (d) illustrates Arguments related to a delivery duration information setup request.

The delivery duration information setup request (SetUpdateDuration( )) may be used to setup and/or change the delivery duration information when the companion screen device receives service time information for time synchronization from the broadcast receiving apparatus using an eventing method. The companion screen device may setup/change the delivery duration information when receiving service time information for time synchronization from the broadcast receiving apparatus using an eventing method based on the delivery duration information setup request.

When the broadcast receiving apparatus transmits service time information for time synchronization to the companion screen device using an eventing method, the broadcast receiving apparatus may transmit the service time information to the companion screen device with predetermined duration. For example, the broadcast receiving apparatus may transmit service time information when media time and/or current time (wall-clock time) are changed (e.g., every second). In this case, delivery duration of the service time information may be very short or long. The broadcast receiving apparatus may set delivery duration information (e.g., every second) that is basically set to a default value. According to the characteristics and/or types of an application and/or service to be provided in association with the broadcast receiving apparatus by the companion screen device, the delivery duration information setup request may be used to set up the delivery duration information (UpdateDuration) by the companion screen device.

Arguments related to the delivery duration information setup request may include at least one of requested delivery duration information (ReqestedUpdateDuration Argument) and/or confirmed delivery duration information (ConfirmedUpdateDuration Argument).

When the companion screen device makes a request for particular delivery duration information (UpdateDuration) of service time information for time synchronization based on the delivery duration information setup request (SetUpdateDuration( ) action), the companion screen device may transmit requested delivery duration information (RequestedUpdateDuration Argument) indicating a value of the requested delivery duration information as an input argument to the broadcast receiving apparatus. The requested delivery duration information (RequestedUpdateDuration Argument) may be information related to the A_ARG_TYPE_UpdateDuration state variable.

In response to the delivery duration information setup request (SetUpdateDuration( ) action) from the companion screen device, the broadcast receiving apparatus may transmit the confirmed delivery duration information (ConfirmedUpdateDuration argument) as an output argument to the companion screen device. The confirmed delivery duration information (ConfirmedUpdateDuration variable) may be information related to the UpdateDuration state variable.

When the broadcast receiving apparatus is capable of normally transmitting the service time information to the companion screen device with the delivery duration information (RequestedUpdateDuration Argument) requested by the companion screen device, the broadcast receiving apparatus may set the confirmed delivery duration information as the same value as the requested delivery duration information. Then, the broadcast receiving apparatus may return the confirmed delivery duration information (ConfirmedUpdateDuration Argument) including the delivery duration information indicated by the requested delivery duration information as an output argument. Then, the broadcast receiving apparatus may transmit the service time information to the companion screen device based on the confirmed delivery duration information using an eventing method.

When the broadcast receiving apparatus is not capable of transmitting the service time information to the companion screen device with the delivery duration information (RequestedUpdateDuration Argument) requested by the companion screen device, the broadcast receiving apparatus may set (or maintain) the delivery duration information to a value (default value or minimum value) closest to the requested delivery duration information. Then, the broadcast receiving apparatus may return the confirmed delivery duration information (ConfirmedUpdateDuration Argument) including the delivery duration information indicating the value closest to the requested delivery duration information as an output argument. Then, the broadcast receiving apparatus may transmit the service time information to the companion screen device based on the confirmed delivery duration information using an eventing method.

For example, the companion screen device transmits the requested delivery duration information indicating the delivery duration information (UpdateDuration) in a unit of "every second" to the broadcast receiving apparatus (RequestedUpdateDuration=1) but a corresponding program or application may set the delivery duration information (UpdateDuration) only in a unit of minimum "every minute (default value)" in the broadcast receiving apparatus. In this case, the broadcast receiving apparatus may return the confirmed delivery duration information indicating the delivery duration information in a unit of "every minute" as an output argument (ConfirmedUpdateDuration=60). The delivery duration information (UpdateDuration) of the confirmed delivery duration information may be maintained as "every minute" as a default value of the broadcast receiving apparatus (UpdateDuration=60). Then, the broadcast receiving apparatus may transmit the service time information to the companion screen device based on the confirmed delivery duration information indicating the delivery duration information in a unit of "every minute" using an eventing method.

When the broadcast receiving apparatus is set (or change) the delivery duration information (UpdateDuration) in a unit of "per second (every second)", the broadcast receiving apparatus may return the confirmed delivery duration information indicating the delivery duration information in a unit of "every second" as an output argument (ConfirmedUpdateDuration=1). Then, the broadcast receiving apparatus may transmit the service time information to the companion screen device based on the confirmed delivery duration information indicating the delivery duration information of a unit of "every second" using an eventing method.

FIG. 379 is a diagram illustrating delivery frequency information according to an embodiment of the present invention.

According to an embodiment of the present invention, Duration may be replaced with Frequency. In this case, Duration=1/Frequency may be satisfied. Here, a unit of Duration may be a second and a unit of Frequency may be 1/second. That is, when a value of Duration is "2 (second)", Frequency is "0.5 (1/second)".

When Frequency is used instead of Duration, names of state variable and action may be changed as illustrated in the drawing.

Referring to FIG. (a), delivery duration information (UpdateDuration state variable) may be changed to delivery frequency information (UpdateFrequency state variable). The delivery frequency information may indicate a delivery frequency when the broadcast receiving apparatus transmits service time information for time synchronization to the companion screen device using an eventing.

The request delivery duration information (A_ARG_TYPE_UpdateDuration state variable) may be changed to the request delivery frequency information (A_ARG_TYPE_UpdateFrequency state variable). The requested delivery frequency information may be information indicating a value of the delivery frequency information requested by the companion screen device when the companion screen device receives service time information for time synchronization from the broadcast receiving apparatus using an eventing method.

Referring to FIG. (b), operations required to transmit the service time information may include at least one of a service time information request, a delivery frequency information request, and/or a delivery frequency information setup request.

The service time information request may be an operation of making a request for service time information for time synchronization from the broadcast receiving apparatus by the companion screen device.

The delivery duration information request (GetUpdateDuration( )) may be changed to the delivery frequency information request (GetUpdateFrequency( )).

The delivery frequency information request (GetUpdateFrequency( )) may be used when the companion screen device makes a request for current delivery frequency information of the broadcast receiving apparatus from the broadcast receiving apparatus. The companion screen device may make a request for the current delivery frequency information of the broadcast receiving apparatus to the broadcast receiving apparatus based on the delivery frequency information request.

The delivery frequency information indicates a frequency for eventing the service time information. In response to the delivery frequency information request from the companion device, the broadcast receiving apparatus may transmit current delivery frequency information (CurrentUpdateFrequency Argument) indicating a value of delivery frequency information at a time point indicated by wall-clock time (or current time) to the companion screen device. The current delivery frequency information (CurrentUpdateFrequency Argument) may be information related to the UpdateFrequency state variable.

That is, the broadcast receiving apparatus may transmit the current delivery frequency information to the companion screen device in response to a request of the companion screen device (requesting method). The broadcast receiving apparatus and/or the companion screen device may confirm the current delivery frequency information and, then. make a request for setup (or change) of the delivery frequency information as necessary.

The delivery duration information setup request (SetUpdateDuration( )) may be changed to delivery frequency information setup request (SetUpdateFrequency( )).

The delivery frequency information setup request (SetUpdateFrequency( )) may be used to setup and/or change delivery frequency information when the companion screen device receives the service time information for time synchronization from the broadcast receiving apparatus using an eventing method. Upon receiving the service time information for time synchronization from the broadcast receiving apparatus based on the delivery frequency information setup request using an eventing method, the companion screen device may setup and/or change the delivery frequency information.

Arguments related to the delivery frequency information setup request may include at least one of requested delivery frequency information (ReqestedUpdateFrequency Argument) and/or confirmed delivery frequency information (ConfirmedUpdateFrequency Argument).

When the companion screen device makes a request for particular delivery frequency information (UpdateFrequency) of service time information for time synchronization based on the delivery frequency information setup request (SetUpdateFrequency( ) action), the companion screen device may transmit the requested delivery frequency information (RequestedUpdateFrequency Argument) indicating a value of the requested delivery frequency information as an input argument to the broadcast receiving apparatus. The requested delivery frequency information (RequestedUpdateFrequency Argument) may be information related to the A_ARG_TYPE_UpdateFrequency state variable.

In response to the delivery frequency information setup request (SetUpdateFrequency( ) action) from the companion screen device, the broadcast receiving apparatus may transmit the confirmed delivery frequency information (ConfirmedUpdateFrequency argument) as an output argument to the companion screen device. The confirmed delivery frequency information (ConfirmedUpdateFrequency variable) may be information related to the UpdateFrequency state variable.

When the broadcast receiving apparatus is capable of normally transmitting the service time information to the companion screen device with the delivery frequency information (RequestedUpdateFrequency Argument) requested by the companion screen device, the broadcast receiving apparatus may set the confirmed delivery frequency information as the same value as the requested delivery frequency information. Then, the broadcast receiving apparatus may return the confirmed delivery frequency information (ConfirmedUpdateFrequency Argument) including the delivery frequency information indicated by the requested delivery frequency information as an output argument. Then, the broadcast receiving apparatus may transmit the service time information to the companion screen device based on the confirmed delivery frequency information using an eventing method.

When the broadcast receiving apparatus is not capable of transmitting the service time information to the companion screen device with the delivery frequency information (RequestedUpdateFrequency Argument) requested by the companion screen device, the broadcast receiving apparatus may set (or maintain) the delivery frequency information to a value (default value or minimum value) closest to the requested delivery frequency information. Then, the broadcast receiving apparatus may return the confirmed delivery frequency information (ConfirmedUpdateFrequency Argument) including the delivery frequency information indicating the value closest to the requested delivery frequency information as an output argument. Then, the broadcast receiving apparatus may transmit the service time information to the companion screen device based on the confirmed delivery frequency information using an eventing method.

A detailed operation of the broadcast receiving apparatus and/or the companion screen device when duration is changed to a frequency may include the entire above description.

FIG. 380 is a flow diagram of transmitting service time information to a companion screen device by a broadcast receiving apparatus using an eventing method according to an embodiment of the present invention.

Referring to the drawing, the broadcast system according to an embodiment of the present invention may include at least one of the broadcaster/content provider C10, the broadcast receiving apparatus C100, and/or the companion screen device C200.

The broadcaster/content provider C10 may provide a broadcast service. For example, the broadcast service may include content (or linear service), an application (or non-linear service), and/or signaling information. The broadcaster/content provider C10 may include at least of the aforementioned broadcast transmitting apparatus (not shown), content provider (not shown), content server (not shown), controller (not shown), and/or transmitter (not shown).

The broadcast receiving apparatus C100 may receive a broadcast service through a broadcast network and/or the Internet. The broadcast receiving apparatus C100 may be referred to as a TV receiver and/or a PD.

The companion screen device C200 may receive a broadcast service through the Internet. The companion screen device may be referred to as a mobile phone and/or a CD.

Hereinafter, a method of transmitting service time information for time synchronization to the companion screen device by the broadcast receiving apparatus using an eventing method will be described.

First, the broadcast receiving apparatus C100 may receive a broadcast signal from the broadcaster/content provider C10. The broadcast receiving apparatus C100 may acquire signaling information based on the broadcast signal. In detail, the broadcast receiving apparatus C100 may acquire the application signaling information based on the signaling information. As described above, the receiver C100 may acquire the signaling information based on an MPEG-DASH protocol and/or an MMT protocol. The application signaling information may include at least one of a trigger for triggering an operation of an application and triggering application information (or TPT) for signaling information on the triggered application. When a user selects a channel, the broadcast receiving apparatus C100 may provide (or broadcast) a particular program based on the signaling information.

Then, the broadcast receiving apparatus C100 may perform discovery and/or pairing with the companion screen device C200. For example, according to the provided program, the broadcast receiving apparatus C100 may discover the companion screen device and may be electrically paired with the companion screen device so as to transmit and receive data.

Then, the broadcast receiving apparatus C100 may receive a request for subscription of the time synchronization service from the companion screen device C200. In addition, the companion screen device C200 may make a request for subscription of the time synchronization service to the broadcast receiving apparatus C100. The time synchronization service may refer to a service of generating service time information for providing time synchronization between A/V content displayed by the broadcast receiving apparatus C100 and content displayed by the companion screen device C200 and transmitting service time information to the companion screen device C200 from the broadcast receiving apparatus C100. The service time information may include the aforementioned media timeline checkpoint.

Then, the broadcast receiving apparatus C100 may receive the signaling information including media time information of presented A/V content from the broadcaster/content provider C10. The signaling information may include at least one of media time information and/or current time information (wall clock). As described above, the broadcast receiving apparatus C100 may receive signaling information based on the MPEG-DASH protocol and/or the MMT protocol. The broadcast receiving apparatus C100 may receive signaling information including media time information at a preset time interval during broadcast of a program.

Then, the broadcast receiving apparatus C100 may transmit the service time information (ServiceTimeInfo) to the companion screen device C200 using an eventing method. For example, the broadcast receiving apparatus C100 may transmit the service time information to the companion screen device C200 based on delivery duration information (e.g., every minute) obtained by setting the service time information to a default value using an eventing method.

Then, the broadcast receiving apparatus C100 may receive delivery duration information request (GetUpdateDuration( ) or second request) for making a request for acquisition of current delivery duration information of the broadcast receiving apparatus C100 from the companion screen device C200.

The companion screen device C200 may make a request for current delivery duration information of the broadcast receiving apparatus C100 to the broadcast receiving apparatus C100 based on the delivery duration information request. In response to the delivery duration information request from the companion screen device C200, the current delivery duration information indicating a value of delivery duration information at a time point indicated by wall-clock time based on the delivery duration information request may be generated and the current delivery duration information may be transmitted to the companion screen device C200.

The broadcast receiving apparatus C100 may transmit the current delivery duration information to the companion screen device C200 in response to a request of the companion screen device C200) (requesting method). The companion screen device C200 may check current delivery duration information of the broadcast receiving apparatus C100 based on the delivery duration information request.

Then, the broadcast receiving apparatus C100 may receive delivery duration information setup request (SetUpdateDuration( ) or third request) for making a request for setup of the delivery duration information from the companion screen device C200.

For example, when the companion screen device C200 receives service time information for time synchronization from the broadcast receiving apparatus C100 using an eventing method, the broadcast receiving apparatus C100 may receive delivery duration information setup request (SetUpdateDuration( ) action) for setup (or change) of delivery duration from the companion screen device C200. For example, the companion screen device C200 may transmit the requested delivery duration information (RequestedUpdateDuration Argument) indicating a value of the requested delivery duration information to the broadcast receiving apparatus.

For example, the requested delivery duration information (RequestedUpdateDuration Argument) may indicate "1 second". The companion screen device C200 may make a request for setup of delivery duration to 1 second using the delivery duration information setup request (SetUpdateDuration( ) action).

Then, the broadcast receiving apparatus may generate confirmed delivery duration information (ConfirmedUpdateDuration Argument) based on the requested delivery duration information (RequestedUpdateDuration Argument). In addition, the broadcast receiving apparatus C100 may transmit the confirmed delivery duration information to the companion screen device. The confirmed delivery duration information (ConfirmedUpdateDuration Argument) may indicate the same value as the requested delivery duration information (RequestedUpdateDuration Argument) and/or a closest value to the requested delivery duration information (RequestedUpdateDuration Argument) of delivery duration information items provided by the broadcast receiving apparatus C100. For example, the confirmed delivery duration information (ConfirmedUpdateDuration Argument) may indicate "10 seconds". Since "10 seconds" are a closest value (or minimum value of delivery duration information) if possible and, thus, the broadcast receiving apparatus C100 may set the confirmed delivery duration information to "10 seconds".

Then, the broadcast receiving apparatus C100 may transmit service time information to the companion screen device based on the confirmed delivery duration information using an eventing method. For example, the first receiver may transmit the service time information to the companion screen device C200 every 10 seconds using an eventing method.

The broadcaster/content provider C10 may transmit time information (or signaling information) including media time information (or media time update) to the broadcast receiving apparatus at a particular time point of a program and/or periodically according to the type and/or characteristics of the program.

FIG. 381 is a flow diagram of transmitting service time information to a companion screen device by a broadcast receiving apparatus using a requesting method according to an embodiment of the present invention.

Referring to the drawing, the broadcast system according to an embodiment of the present invention may include at least one of the broadcaster/content provider C10, the broadcast receiving apparatus C100, and/or the companion screen device C200. A detailed description of the broadcast system according to an embodiment of the present invention may include the entire above description.

Hereinafter, a method of transmitting service time information for time synchronization to the companion screen device C200 by the broadcast receiving apparatus C100 using a requesting method will be described.

First, the broadcast receiving apparatus C100 may receive a broadcast signal from the broadcaster/content provider C10. The broadcast receiving apparatus C100 may acquire signaling information based on the broadcast signal. When a user selects a channel, the broadcast receiving apparatus C100 may provide (or broadcast) a particular program to the user based on the signaling information.

Then, the broadcast receiving apparatus C100 may perform discovery and/or pairing with the companion screen device C200. For example, according to the provided program, the broadcast receiving apparatus C100 may discover the companion screen device and may be electrically paired with the companion screen device C200 so as to transmit and receive data.

Then, the broadcast receiving apparatus C100 may receive service time information request (GetService- TimeInfo( ) or first request) of making a request for acquisition of service time information from the companion screen device C200. The service time information request (GetServiceTimeInfo( ) action) may be an operation of making a request for service time information for time synchronization from the broadcast receiving apparatus C100 by the companion screen device C200. For example, the companion screen device C200 may make a request for service time information to the broadcast receiving apparatus C100 using the service time information request(GetServiceTimeInfo( ) action) at every required time.

Then, in response to a request of the companion screen device C200, the broadcast receiving apparatus C100 may transmit recent service time information to the companion screen device C200. For example, the broadcast receiving apparatus C100 may transmit service time information to the companion screen device C200 based on a request for acquisition of the service time information using a requesting method.

The broadcaster/content provider C10 may transmit time information (or signaling information) including media time information (or media time update) to the broadcast receiving apparatus at a particular time point of a program and/or periodically according to the type and/or characteristics of the program.

FIG. 382 is a flowchart illustrating an operation of a broadcast receiving apparatus according to an embodiment of the present invention.

A broadcast signal receiving apparatus may receive a broadcast signal using a broadcast interface (CS3100). For example, the broadcast signal receiving apparatus may receive signaling information and a service including an audio/video (A/V) program using the broadcast interface. For example, the program may refer to content. That is, the AN program may refer to A/V content.

For example, the signaling information may include media time information of a presented A/V program.

Then, the broadcast receiving apparatus may discover the companion screen device using a companion screen interface (CS3200). The broadcast receiving apparatus may transmit data and/or signaling information to the companion screen device or receive data and/or signaling information from the companion screen device using the companion screen interface.

Then, the broadcast receiving apparatus may operate the broadcast interface and the companion screen interface using a controller. The controller may include a time synchronization service processor.

Then, the broadcast receiving apparatus may generate service time information for providing data related to time synchronization between an A/V program based on signaling information and an A/V program displayed by the companion screen device using the controller and/or the time synchronization service processor (CS3300).

Then, the broadcast receiving apparatus may transmit the service time information to the companion screen device using the companion screen interface (CS3400).

The service time information according to an embodiment of the present invention may include at least one of serviceId attribute indicating a service ID, programId attribute indicating an ID of a program presented in a service, mediaTime element indicating media time information of a program. and/or currentTime element indicating wall-clock time.

The broadcast receiving apparatus according to an embodiment of the present invention may transmit service time information using a requesting method. The broadcast signal receiving apparatus may transmit service time information to the companion screen device based on a first request of making a request for acquisition of service time information received from the companion screen device using the companion screen interface.

The broadcast receiving apparatus according to an embodiment of the present invention may transmit service time information using an eventing method. The broadcast receiving apparatus may generate update interval information indicating an interval for transmitting the service time information using the time synchronization service processor. Then, the broadcast receiving apparatus may transmit the service time information to the companion screen device based on the update interval information using the companion screen interface.

The update interval information according to an embodiment of the present invention may be one of delivery duration information indicating duration for transmitting service time information and delivery frequency information indicating a frequency for transmitting service time information. For example, the interval may include duration and/or a frequency. The update interval information may include update duration information and/or update frequency information.

The broadcast receiving apparatus may make a request for acquisition of the update interval information. The broadcast receiving apparatus may receive a second request (or update interval information request) of making a request for acquisition of the update interval information from the companion screen device using the companion screen interface. Then, the broadcast receiving apparatus may generate current update interval information indicating a value of the update interval information at a time point indicated by wall-clock time based on the second request using the time synchronization service processor. Then, the broadcast receiving apparatus may transmit the current update interval information to the companion screen device using the companion screen interface.

For example, the update interval information request may include a delivery duration information request and/or the delivery frequency information request. The current update interval information may include current delivery duration information and/or current delivery frequency information.

The broadcast receiving apparatus may make a request for setup of the update interval information. The broadcast receiving apparatus may receive a third request (or update interval information setup request) of making a request of setup of the update interval information from the companion screen device using the companion screen interface. The third request may include the requested update interval information indicating a value of the update interval information requested by the companion screen device. Then, the broadcast receiving apparatus may generate confirmed update interval information indicating one of the same value as the requested update interval information and a closest value to the requested update interval information using the time synchronization service processor. Then. the broadcast receiving apparatus may transmit the service time information to the companion screen device based on the confirmed update interval request information using the companion screen interface.

For example, the update interval information setup request may include a delivery duration information setup request and/or a delivery frequency information setup request. The requested update interval information may include the requested delivery duration information and/or the requested delivery frequency information. The confirmed update interval information may include confirmed delivery duration information and/or confirmed delivery frequency information.

FIG. 383 illustrates synchronization between the broadcast reception device and a companion screen device according to an embodiment of the present invention.

The following situation can be assumed. A user views a drama program through the broadcast reception device (or PD). The drama program can provide additional information such as thoughts of characters, twitter messages and pop-up quizzes per scene to the user through an application of the companion screen device (or CD). The companion screen device (or CD) has been connected (or paired) with the broadcast reception device by the user. Audio and video content of the drama can be delivered to the broadcast reception device through a broadcast network. The additional information can be delivered to the broadcast reception device and the companion screen device through the Internet. The broadcast transmission device and/or the content provider can cause the companion screen device to display specific additional information depending on the media type of the drama.

The broadcast reception device and/or the companion screen device can display the specific additional information depending on the media type of the drama.

Referring to the figure, the broadcast reception device and the companion screen device have been synchronized with each other. The broadcast reception device has been connected to the companion screen device.

In addition, the broadcast reception device can receive a program including audio and video content through broadcast networks. Furthermore, the broadcast reception device can receive application data including additional information through broadcast networks and/or the Internet. The additional information may include an event A and/or an event B.

The broadcast reception device can execute the event A at a media time (1200 seconds) corresponding to a scene A of the program. In addition, the broadcast reception device can execute the event B at a media time (4200 seconds) corresponding to a scene B.

The companion screen device can receive application data including additional information through the Internet. The additional information may include the event A and/or the event B.

The companion screen device can execute the event A at media time (1,200 sec) corresponding to the scene A of the program. In addition, the companion screen device can execute the event B at media time (4,200 sec) corresponding to the scene B of the program.

Since the broadcast reception device and the companion screen device have been synchronized with each other, the event A of the broadcast reception device and the event A of the companion screen device can be simultaneously executed. That is, a wall-clock at which the event A is executed in the broadcast reception device is the same as a wall-clock at which the event A is executed in the companion screen device. Furthermore, the event B of the broadcast reception device and the event B of the companion screen device can be simultaneously executed. That is, a wall-clock at which the event B is executed in the broadcast reception device is the same as a wall-clock at which the event B is executed in the companion screen device.

FIG. 384 shows that the broadcast reception device and the companion screen device according to an embodiment of the present invention are not synchronized with each other.

Referring to the figure, the broadcast reception device and the companion screen device are not synchronized with each other.

Since the broadcast reception device and the companion screen device are not synchronized with each other, the event A of the broadcast reception device and the event A of the companion screen device are not simultaneously executed. That is, the wall-clock at which the event A is executed in the broadcast reception device differs from the wall-clock at which the event A is executed in the companion screen device. Furthermore, the event B of the broadcast reception device and the event B of the companion screen device are not simultaneously executed. That is, the wall-clock at which the event B is executed in the broadcast reception device differs from the wall-clock at which the event B is executed in the companion screen device.

The broadcast reception device and the companion screen device are not synchronized with each other for the following reasons.

First, the broadcast reception device and the companion screen device can have different system clock signals according to characteristics of the devices and/or applications. Even through the wall-clock of a media time start point in the broadcast reception device is identical to the wall-clock of a media time start point in the companion screen device, the wall-clock of the media time in the broadcast reception device may differ from the wall-clock of the media time in the companion screen device depending on system clock rates.

Second, the broadcast reception device and the companion screen device may be asynchronized due to network delay in delivery of an event (or triggering event) between the broadcast reception device and the companion screen device.

For such reasons, the media time in the broadcast reception device and the media time in the companion screen device may be different from each other at a specific wall-clock. Accordingly, a scene displayed through the broadcast reception device may not correspond to additional information displayed through the companion screen device at a specific wall-clock.

FIG. 385 illustrates a method for synchronizing the broadcast reception device with the companion screen device according to an embodiment of the present invention.

To synchronize the media time of the broadcast reception device PD with the media time of the companion screen device CD at a specific wall-clock, the broadcast reception device can deliver media time information and wall-clock information (or current time or absolute time) in a pair to the companion screen device. Service time information may include media time information and wall-clock information. The broadcast reception device can deliver the service time information to the companion screen device.

The broadcast reception device may periodically deliver the service time information to the companion screen device (eventing method). For example, the broadcast reception device PD can periodically deliver the media time information and the wall-clock information together to the companion screen device CD. The broadcast reception device may deliver the service time information to the companion screen device as a response to a request of the companion screen device (requesting method). For example, the broadcast reception device can deliver the media time information and the wall-clock information together to the companion screen device as a response to a request of the companion screen device.

The figure shows a method through which the broadcast reception device PD is synchronized with the companion screen device CD. For example, the broadcast reception device PD can deliver service time information including media time information and wall-clock information to the companion screen device CD using the eventing method.

The broadcast reception device PD can deliver service time information including media time information indicating 500 sec and wall-clock information indicating 13:30:30 to the companion screen device CD at 13:30:30. In addition, the broadcast reception device can deliver service time information including media time information indicating 2000 sec and wall-clock information indicating 14:00:25 to the companion screen device CD at 14:00:25.

It is assumed that a delay generated when the service time information is delivered from the broadcast reception device PD to the companion screen device is 1 sec. Additionally, it is assumed that the wall-clock of the broadcast reception device PD is synchronized with the wall-clock of the companion screen device CD.

At the wall-clock of 13:30:30, the media time of the broadcast reception device can be 500 sec and the media time of the companion screen device can be 599 sec. Accordingly, the companion screen device CD can receive the service time information from the broadcast reception device PD at the wall-clock of 13:30:31. That is, a media time difference can be calculated using the information of the media time of 500 sec and the wall-clock of 13:30:30 delivered from the broadcast reception device to the companion screen device. When the wall-clock is 13:30:30, the media time of the broadcast reception device is 500 sec and the media time of the companion screen device is 599 sec. Accordingly, it can be known that there is an error of +99 sec in the media time of the companion screen device.

When the wall-clock is 14:00:25, the media time of the broadcast reception device is 2,000 sec and the media time of the companion screen device is 2,099 sec. Accordingly, the companion screen device CD can receive the service time information from the broadcast reception device PD at the wall-clock of 14:00:26. In the same manner as the aforementioned one, the companion screen device CD can calculate a difference between the media time of the broadcast reception device and the media time of the companion screen device on the basis of the service time information.

Then, the companion screen device CD can be synchronized with the broadcast reception device PD on the basis of the service time information. For example, the companion screen device CD can synchronize the media time thereof with the media time of the broadcast reception device PD on the basis of the media time difference.

According to an embodiment of the present invention, when the broadcast reception device PD delivers the service time information to the companion screen device CD using the requesting method, the companion screen device CD can correct network delay.

By delivering media time information and wall-clock information together from the broadcast reception device PD to the companion screen device CD, the companion screen device CD can be synchronized with the broadcast reception device PD even if when the broadcast reception device PD sends the service time information does not correspond to when the companion screen device CD receives the service time information. For example, the companion screen device CD can calculate media time information on the basis of the wall-clock information and be synchronized with the broadcast reception device PD.

When the companion screen device CD updates media time information to the broadcast reception device PD using the requesting method, the companion screen device CD can correct network delay using Cristian's algorithm and/or NTP in consideration of network delay between a request and a response. Of course, the broadcast reception device PD can correct network delay.

FIG. 386 illustrates service time information including playback state information according to an embodiment of the present invention.

In the case of a program providing an on-demand service, such as an NRT broadcast program, a user can trick-play playback of the program. In this case, the broadcast reception device PD needs to deliver information about a playback state to the companion screen device CD paired therewith.

A description will be given of a method through which the broadcast reception device PD delivers playback state information to the companion screen device CD. The playback state information can indicate a state of a program played back in the broadcast reception device PD.

According to a first method, the broadcast reception device PD may deliver service time information including the playback state information to the companion screen device CD. The broadcast reception device PD can periodically deliver service time information including media time information, wall-clock information and/or playback state information to the companion screen device CD.

According to a second method, the broadcast reception device may define an additional state variable for the playback state information and deliver the playback state information to the companion screen device CD.

The figure shows service time information including playback state information according to an embodiment of the present invention.

The service time information according to an embodiment of the present invention is information for synchronization between the broadcast reception device and the companion screen device. The service time information can be included in at least one of media time information and wall-clock information (or absolute time information or current time information) of a program being played or served through the broadcast reception device. Furthermore, the service time information may include the aforementioned Media Timeline Checkpoint.

Specifically, the service time information may include at least one of a serviceId attribute, a programId attribute, a mediaTime element and a currentTime element.

The serviceId attribute indicates a unique ID of a service currently selected by a first receiver. For example, the service may include at least one of a linear service and a non-linear service.

The programId attribute indicates a unique ID of a currently played program. For example, the program may include content included in the linear service and/or the non-linear service.

The mediaTime element indicates media time information of the currently played program. The mediaTime element may include a mediaTimeProtocol attribute that specifies a protocol used to represent the mediaTime element. For example, the mediaTimeProtocol attribute can indicate a timestamp.

The currentTime element indicates current time information (wall-clock time). The currentTime element may include a currentTimeProtocol attribute that specifies a protocol used to represent the currentTime element. For example, the currentTimeProtocol attribute can indicate the Network Time Protocol (NTP).

The service time information according to an embodiment of the present invention may further include a playbackState element. The playbackState element may be called playback state information.

The playbackState element can indicate the current playback state of a program played back in the broadcast reception device PD. For example, playback states may include at least one of playing, paused, stopped, fast-forward and fast-backward. The playbackState element may include a speed attribute.

The speed attribute indicates the current playback speed of the program in the broadcast reception device PD. When the program is fast forwarded or fast backwarded, the speed attribute can indicate the current playback speed of the program.

For example, an integer value corresponding to a value indicated by the speed attribute can be represented as follows. When the speed attribute indicates "1", the playback speed can be a "normal playback speed". When the speed attribute indicates "2", the playback speed can be "2× normal playback speed". When the speed attribute indicates "3", the playback speed can be "3× normal playback speed". When the speed attribute indicates "4", the playback speed can be "4× normal playback speed". The speed attribute can indicate "1" as a default value.

The broadcast reception device may deliver the service time information including the playback state information indicating the state of the program played back therein to the companion screen device by executing an event (or triggering event) (eventing method). Alternatively, the broadcast reception device may deliver the service time information including the playback state information indicating the state of the program played back therein to the companion screen device as a response to a request of the companion screen device (requesting method).

FIG. 387 illustrates an XML format of service time information according to an embodiment of the present invention.

Referring to the figure, the service time information may include at least one of a serviceId attribute, a programId attribute, a mediaTime element, a currentTime element and a playbackState element.

The serviceId attribute can indicate "11". the programId attribute can indicate "1008". The mediaTime element may include a mediaTimeProtocol attribute. The playbackState element can indicate "fast-forward". In addition, a speed attribute included in the playbackState element can indicate "3". The mediaTimeProtocol attribute can indicate "timestamp". The mediaTime element can indicate "77ee". The currentTime element may include a currentTimeProtocol attribute. The currentTimeProtocol attribute can indicate "NTP". The currentTime element can indicate "88ee".

With respect to a program having a program ID of "1008" in a service having a service ID of "11", the broadcast reception device can deliver, to the companion screen device, service time information including media time information indicating "77ee" as a timestamp, wall-clock information (or current time information) indicating "88ee" as NTP and/or playback state information indicating that the program is "fast-forwarded" at "3×".

FIG. 388 illustrates delivery of playback state information according to an embodiment of the present invention.

Referring to the figure, the broadcast reception device PD may periodically deliver service time information including playback state information to the companion screen device CD.

For example, the broadcast reception device PD can deliver the service time information to the companion screen device CD at intervals of 30 seconds.

At the wall-clock "13:39:30", the broadcast reception device can deliver service time information including media time information indicating "500 sec", wall-clock information indicating "13:39:30" and/or playback state information indicating "1× playback" to the companion screen device.

At the wall-clock "13:40:00", the broadcast reception device can deliver service time information including media time information indicating "530 sec", wall-clock information indicating "13:40:00" and/or playback state information indicating "1× playback" to the companion screen device.

At the wall-clock "13:40:30", the broadcast reception device can deliver service time information including media time information indicating "700 sec", wall-clock information indicating "13:40:30" and/or playback state information indicating "3× fast-forward" to the companion screen device.

Although the broadcast reception device performs "fast-forward" operation before the wall-clock "13:40:30", the broadcast reception device can periodically deliver the service time information to the companion screen device.

FIG. 389 illustrates delivery of playback state information according to an embodiment of the present invention.

Referring to the figure, the broadcast reception device PD may deliver service time information including playback state information to the companion screen device CD when the playback state information changes.

For example, when the playback state information changes from "1× playback" to "3× fast-forward", the broadcast reception device PD can deliver service time information including the changed playback state information to the companion screen device CD.

At the wall-clock "13:39:30", the broadcast reception device can deliver service time information including media time information indicating "500 sec", wall-clock information indicating "13:39:30" and/or playback state information indicating "1× playback" to the companion screen device.

At the wall-clock "13:40:30", the playback state information can change from "1× playback" to "3× fast-forward".

At the wall-clock "13:40:30", the broadcast reception device can deliver service time information including media time information indicating "560 sec", wall-clock information indicating "13:40:30" and/or playback state information indicating "3× fast-forward" to the companion screen device.

The broadcast reception device can deliver the service time information including the playback state information to the companion screen device only when the playback state information changes instead of periodically delivering the service time information to the companion screen device.

FIG. 390 illustrates delivery of playback state information according to an embodiment of the present invention.

Referring to the figure, the broadcast reception device PD may periodically deliver service time information including playback state information to the companion screen device CD and also deliver the service time information including the playback state information to the companion screen device CD when the playback state information changes.

For example, the broadcast reception device PD can deliver the service time information to the companion screen device CD at intervals of 30 seconds. In addition, when the playback state information changes from “1× playback” to “3× fast-forward”, the broadcast reception device PD can deliver service time information including the changed playback state information to the companion screen device CD.

At the wall-clock “13:39:30”, the broadcast reception device can deliver service time information including media time information indicating “500 sec”, wall-clock information indicating “13:39:30” and/or playback state information indicating “1× playback” to the companion screen device.

At the wall-clock “13:40:00”, the broadcast reception device can deliver service time information including media time information indicating “530 sec”, wall-clock information indicating “13:40:00” and/or playback state information indicating “lx playing” to the companion screen device.

At the wall-clock “13:40:20”, the playback state information can change from “1× playback” to “3× fast-forward”.

At the wall-clock “13:40:20”, the broadcast reception device can deliver service time information including media time information indicating “550 sec”, wall-clock information indicating “13:40:20” and/or playback state information indicating “3× fast-forward” to the companion screen device.

At the wall-clock “13:40:30”, the broadcast reception device can deliver service time information including media time information indicating “580 sec”, wall-clock information indicating “13:40:30” and/or playback state information indicating “3× fast-forward” to the companion screen device.

The broadcast reception device can periodically deliver service time information including playback state information to the companion screen device and also additionally deliver the service time information to the companion screen device when the playback state information changes.

FIG. 391 illustrates delivery of playback state information according to an embodiment of the present invention.

Referring to the figure, the broadcast reception device PD may periodically deliver service time information including no playback state information to the companion screen device CD and deliver the service time information including the playback state information to the companion screen device CD when the playback state information changes. The service time information including no playback state information may refer to service time information including playback state information indicating a default value.

For example, the broadcast reception device PD can deliver the service time information including no playback state information to the companion screen device CD at intervals of 30 seconds. In addition, when the playback state information changes from “1× playback” to “3× fast-forward”, the broadcast reception device PD can deliver service time information including the changed playback state information to the companion screen device CD.

At the wall-clock “13:39:30”, the playback state information may change to “1× playback” from a certain state. Otherwise, the playback state information may indicate the default value at the wall-clock “13:39:30”. The default value may indicate “1× playback”.

At the wall-clock “13:39:30”, the broadcast reception device can deliver service time information including media time information indicating “500 sec”, wall-clock information indicating “13:39:30” and/or playback state information indicating “1× playback” to the companion screen device.

At the wall-clock “13:40:00”, the broadcast reception device can deliver service time information including media time information indicating “530 sec” and wall-clock information indicating “13:40:00” to the companion screen device. Here, the service time information may not include the playback state information.

At the wall-clock “13:40:20”, the playback state information can change from “1× playback” to “3× fast-forward”.

At the wall-clock “13:40:20”, the broadcast reception device can deliver service time information including media time information indicating “550 sec”, wall-clock information indicating “13:40:20” and/or playback state information indicating “3× fast-forward” to the companion screen device.

At the wall-clock “13:40:30”, the broadcast reception device can deliver service time information including media time information indicating “580 sec” and wall-clock information indicating “13:40:30” to the companion screen device. Here, the service time information may not include the playback state information.

The broadcast reception device can periodically deliver service time information including no playback state information to the companion screen device and also additionally deliver service time information including the playback state information to the companion screen device when the playback state information changes.

FIG. 392 illustrates state variables for playback information delivery according to an embodiment of the present invention.

A description will be given of a method through which the broadcast reception device PD defines additional state variables for playback state information and delivers the playback state information to the companion screen device CD. State variables and actions for playback state information can be added to the aforementioned synchronization service state variables.

The figure shows state variables for playback information delivery. Playback information can include playback state information. The state variables for playback information delivery may include at least one of a PlaybackInfo state variable containing playback information and an A_ARG_TYPE_PlaybackInfo state variable containing requested playback information. The PlaybackInfo state variable and the A_ARG_TYPE_PlaybackInfo state variable may be required state variables. The PlaybackInfo state variable indicates playback information when the broadcast reception device delivers the playback information to the companion screen device using the eventing method. The A_ARG_TYPE_PlaybackInfo state variable can be used for request and/or response of the playback information when the broadcast reception device delivers the playback information to the companion screen device using the requesting method.

FIG. 393 illustrates playback information according to an embodiment of the present invention.

The playback information includes data related to a playback state of a program played back in the broadcast reception device.

Specifically, the playback information may include at least one of a serviceId attribute, a programId attribute and a playbackState element.

The serviceId attribute indicates a unique identifier of a currently selected service in the broadcast reception device. For example, the service may be a linear service and/or a non-linear service.

The programId attribute indicates a unique identifier of a current program. For example, the program may include content contained in a linear service and/or a non-linear service.

The playbackState element indicates a current playback state of a program played back in the broadcast reception device PD. For example, a playback state may include at least one of playing, paused, stopped, fast-forward and fast-backward. The playbackState element may include a speed attribute.

The speed attribute specifies a current playback speed of a program in the broadcast reception device PD. When the program is fast forwarded or fast backwarded, the speed attribute can indicate the current playback speed of the program.

For example, integer values corresponding to values indicated by the speed attribute may be represented as follows. When the speed attribute is "1", the speed attribute indicates a "normal playback speed". When the speed attribute is "2", the speed attribute indicates "2× normal playback speed". When the speed attribute is "3", the speed attribute indicates "3× normal playback speed". When the speed attribute is "4", the speed attribute indicates "4× normal playback speed". The speed attribute may indicate "1" as a default value.

The broadcast reception device can execute an event (or triggering event) to deliver playback information including playback state information indicating a state of a program played back in the broadcast reception device PD to the companion screen device (eventing method). Furthermore, the broadcast reception device can deliver playback information including playback state information indicating a state of a program played back in the broadcast reception device PD to the companion screen device as a response to a request of the companion screen device (requesting method).

FIG. 394 illustrates an XML format of the playback state according to an embodiment of the present invention.

Referring to the figure, the playback information may include at least one of the serviceId attribute, programId attribute and playbackState element.

The serviceId attribute can indicate "11". The programId attribute can indicate "1008". The playbackState element can indicate "fast-forward". The speed attribute included in the playbackState element can indicate "3".

With respect to a program having a program ID of "1008" in a service having a service ID of "11", the broadcast reception device can deliver, to the companion screen device, playback information including playback state information that indicates that the program is "3× fast-forwarded".

FIG. 395 illustrates operations necessary for playback information delivery according to an embodiment of the present invention.

Referring to FIG. (a), operations necessary for playback information delivery may include a playback information request (GetPlaybackInfo( )).

The playback information request (GetPlaybackInfo( )) is an operation of the companion screen device to request the broadcast reception device for acquisition of playback information including playback state information indicating the current playback state of a program played back in the broadcast reception device.

The playback information request may be a mandatory or optional operation.

FIG. (b) shows an argument related to the playback information request.

The playback information request (GetPlaybackInfo( )) can be used when the companion screen device sends, to the broadcast reception device, a request for acquisition of playback information including playback state information indicating the current playback state of a program played back in the broadcast reception device. The companion screen device can request the broadcast reception device for playback information on the basis of the playback information request. The broadcast reception device can deliver playback information (PlaybackInfo Argument) including playback state information to the companion screen device as a response to the playback information request from the companion screen device on the basis of the playback information request using a companion screen interface. The playback information (PlaybackInfo Argument) is related to the PlaybackInfo state variable.

That is, the broadcast reception device can deliver playback information including playback state information indicating the current playback state of a program played back in the broadcast reception device to the companion screen device as a response to the request of the companion screen device (requesting method).

FIG. 396 is a flow diagram illustrating delivery of playback information from the broadcast reception device to the companion screen device using the eventing method according to an embodiment of the present invention.

Referring to the figure, a broadcast system according to an embodiment of the present invention may include at least one of a broadcast transmission device content server C10, a broadcast reception device C100 and a companion screen device C200.

The broadcast transmission device content server C10 can provide broadcast services. For example, broadcast services may include at least one of content (or linear services), applications (or non-linear services) and signaling information. The broadcast transmission device content server C10 can include at least one of the aforementioned broadcast transmission device (not shown), content provider (not shown), content server (not shown), controller (not shown) and transmitter (not shown).

The broadcast reception device C100 can receive broadcast services through broadcast networks and/or the Internet. The broadcast reception device C100 may be referred to as a TV receiver and/or a PD.

The companion screen device C200 can receive broadcast services through the Internet. The companion screen device may be referred to as a mobile phone and/or a CD.

A description will be given of a method through which the broadcast reception device delivers playback information including data related to a playback state of a program played back in the broadcast reception device to the companion screen device using the eventing method. The playback information can indicate the current playback state of the program played in the broadcast reception device.

First, the broadcast reception device C100 can receive a broadcast signal including a broadcast service from the broadcast transmission device content server C10. The broadcast service may include at least one of an on-demand streaming service and a non-real-time (NRT) service. In the case of an NRT service, the broadcast reception device can store at least one program included in the NRT service. For example, a user can view a specific program through the broadcast reception device using the on-demand service.

In addition, the broadcast reception device C100 can acquire signaling information on the basis of the broadcast signal. The signaling information may be related to the on-demand streaming service and/or the NRT service. The broadcast reception device can store the received signaling information.

Specifically, the broadcast reception device C100 can acquire application signaling information on the basis of the signaling information. As described above, the receiver C100 can acquire the signaling information on the basis of the MPEG-DASH protocol and/or MMT protocol. The application signaling information can include at least one of a trigger for triggering an application operation and triggering application information (or TPT) for signaling information about a triggered application. When the user selects a specific channel or a specific program, the broadcast reception device C100 can provide (or broadcast) the specific program to the user on the basis of the signaling information.

Then, the broadcast reception device C100 discovers and pairs with the companion screen device C200. For example, the broadcast reception device C100 can discover the companion screen device and electrically pair with the companion screen device to transmit/receive data to/from the companion screen device according to a provided program.

Subsequently, the broadcast reception device C100 can receive a request for subscription to a playback state service from the companion screen device C200. The companion screen device C200 can send a request for playback state service subscription to the broadcast reception device C100. The playback state service refers to a service of generating playback information including data related to a playback state of a program (or AV content) played back in the broadcast reception device C100 and delivering the playback information from the broadcast reception device C100 to the companion screen device C200.

The broadcast reception device C100 can play back a selected specific program.

A playback state of the broadcast reception device C100 may be changed by a user and/or for other reasons.

The broadcast reception device C100 can generate playback state information indicating a playback state of the played program.

The broadcast reception device C100 can deliver playback information including the playback state information to the companion screen device C200 using the eventing method. The broadcast reception device C100 can periodically deliver the playback information to the companion screen device C200 using the eventing method. Otherwise, the broadcast reception device C100 can deliver the playback information including the playback state information to the companion screen device C200 using the eventing method when the playback state information has changed.

Alternatively, the broadcast reception device C100 can deliver service time information including the playback state information to the companion screen device C200 using the eventing method.

For example, the broadcast reception device C100 can periodically deliver the service time information including the playback state information to the companion screen device C200 using the eventing method. Otherwise, the broadcast reception device C100 can deliver the service time information including the playback state information to the companion screen device C200 using the eventing method when the playback state information has changed. Furthermore, the broadcast reception device C100 can periodically deliver the service time information including the playback state information to the companion screen device C200 using the eventing method and, even when the playback state information has changed, the broadcast reception device C100 can deliver the service time information including the playback state information to the companion screen device C200.

In addition, the broadcast reception device C100 can periodically deliver service time information including no playback state information to the companion screen device C200 using the eventing method and, when the playback state information has changed, the broadcast reception device C100 can deliver the service time information including the playback state information to the companion screen device C200. The service time information including no playback state information may refer to service time information including playback state information indicating a default value.

The broadcast reception device C100 can deliver playback information and/or service time information to the companion screen device C200 using the eventing method on the basis of update interval information (e.g., update duration information and update frequency information).

The broadcast reception device C100 can receive, from the companion screen device C200, a request for acquisition of current update interval information of the broadcast reception device C100.

The broadcast reception device C100 can deliver the current update interval information to the companion screen device C200 as a response to the request of the companion screen device C200 (requesting method). The companion screen device C200 can check the current update interval information of the broadcast reception device C100 on the basis of the update interval information request.

The broadcast reception device C100 can receive an update interval information setting request from the companion screen device C200.

The broadcast reception device C100 can generate confirmed update interval information on the basis of the requested update interval information. In addition, the broadcast reception device C100 can transmit the confirmed update interval information to the companion screen device.

The broadcast reception device C100 can deliver playback information and/or service time information to the companion screen device C200 on the basis of the confirmed update interval information using the eventing method.

The broadcast transmission device content server C10 can deliver time information (or signaling information) including media time information (or media time update) to the broadcast reception device C100 at a specific time or periodically according to program type and/or characteristics.

FIG. 397 is a flow diagram illustrating delivery of playback information from the broadcast reception device to the companion screen device using the requesting method according to an embodiment of the present invention.

Referring to the figure, a broadcast system according to an embodiment of the present invention can include at least one of a broadcast transmission device content server C10, a broadcast reception device C100 and a companion screen device C200. Description of the broadcast system according to an embodiment of the present invention can include the above description.

A description will be given of a method through which the broadcast reception device C100 delivers playback information to the companion screen device C200 using the requesting method.

First, the broadcast reception device C100 can receive a broadcast signal including a broadcast service from the broadcast transmission device content server C10. The broadcast service may include at least one of an on-demand streaming service and a non-real-time (NRT) service. In the case of an NRT service, the broadcast reception device can store at least one program included in the NRT service. For example, a user can view a specific program through the broadcast reception device using the on-demand service.

In addition, the broadcast reception device C100 can acquire signaling information on the basis of the broadcast signal. The signaling information may be related to the on-demand streaming service and/or the NRT service. The broadcast reception device can store the received signaling information.

Then, the broadcast reception device C100 discovers and pairs with the companion screen device C200. For example, the broadcast reception device C100 can discover the companion screen device and electrically pair with the companion screen device to transmit/receive data to/from the companion screen device according to a provided program.

Subsequently, the broadcast reception device C100 can receive a playback information request for acquisition of playback information from the companion screen device C200. The playback information request (GetPlayback Info( )) is an operation of the companion screen device to request the broadcast reception device for acquisition of playback information including playback state information indicating the current playback state of a program played back by the broadcast reception device.

Thereafter, the broadcast reception device C100 can generate playback information and deliver the playback information to the companion screen device C200 as a response to the request of the companion screen device C200. For example, the broadcast reception device C100 can deliver the playback information to the companion screen device C200 using the requesting method on the basis of the playback information acquisition request.

The playback state of the broadcast reception device C100 may be changed by the user and/or for other reasons.

In this case, the broadcast reception device C100 can receive the playback information request for acquisition of playback information from the companion screen device C200. For example, the companion screen device C200 can send, to the broadcast reception device C100, a request for acquisition of playback information using the playback information request (GetPlaybackInfo( ) action) as necessary or periodically.

FIG. 398 illustrates delivery of playback state information according to an embodiment of the present invention.

Playback state information can be included in service time information and delivered or delivered through a separate state variable.

For example, two users view a movie through the broadcast reception device PD using an on-demand service. The broadcast transmission device content provider provides video content and first audio content (English audio) associated with the movie to the broadcast reception device through a broadcast network. A content server provides second audio content (Korean audio) associated with the movie to the broadcast reception device and/or the companion screen device CD through the Internet. That is, the companion screen device CD paired with the broadcast reception device PD can receive the second audio content through the Internet. The first user can view the movie (or program) including the video content and the first audio content (English speech) using the broadcast reception device. The second user can view the video content associated with the movie using the broadcast reception device and hear the second audio content associated with the movie using his or her companion screen device. The two users can use trick play such as fast-backward and fast-forward while viewing the movie.

In each playback state, the companion screen device can operate as follows. When the playback state of the broadcast reception device PD is "paused", the second audio content of the companion screen device CD can be temporarily stopped. When the playback state of the broadcast reception device PD is "stopped", the second audio content of the companion screen device CD can be stopped. When the playback state of the broadcast reception device PD is "fast-forward", the second audio content of the companion screen device CD can be fast forwarded at the same speed. Since the broadcast reception device PD can periodically deliver media time information and/or wall-clock information to the companion screen device even during fast forward, the broadcast reception device PD and the companion screen device CD can be synchronized with each other. Since the broadcast reception device PD can deliver media time information and wall-clock information to the companion screen device even when the playback state thereof switches to "playing", the broadcast reception device PD and the companion screen device CD can be synchronized with each other. When the playback state of the broadcast reception device PD is "fast-backward", the second audio content of the companion screen device CD can be fast back warded at the same speed. Description of fast-backward is identical to the aforementioned description of fast-forward.

The figure illustrates a method for synchronization of the broadcast reception device and the companion screen device when the playback state of the broadcast reception device is "fast-forward".

When a user views a movie, playback state information playbackState indicates "playing" and the speed attribute can be "1". The broadcast reception device can deliver the playback state information to the companion screen device.

The playback state of the broadcast reception device may be changed to "3× fast-forward" by the user.

Then, the broadcast reception device can generate playback state information including information indicating that the playback state thereof has changed to "fast-forward" and information indicating that the speed attribute is "3" and deliver the playback state information to the companion screen device.

Thereafter, the playback state of the broadcast reception device may be changed to "normal play" by the user.

Then, the broadcast reception device can generate playback state information including information indicating that the playback state thereof has changed to "normal play" and information indicating that the speed attribute is "3" and deliver the playback state information to the companion screen device.

The broadcast reception device can periodically deliver service time information including media time information and/or wall-clock information to the companion screen device using the eventing method even during "fast-forward".

The companion screen device can receive the playback state information from the broadcast reception device and be synchronized with the broadcast reception device.

FIG. 399 illustrates delivery of playback state information according to an embodiment of the present invention.

Referring to the figure, the broadcast reception device PD may periodically deliver service time information including no playback state information to the companion screen device CD using the eventing method and, when playback state information has changed, deliver the playback state information to the companion screen device CD. The service time information including no playback state information may refer to service time information including playback state information indicating a default value.

The broadcast reception device PD can periodically deliver service time information including no playback state information to the companion screen device CD and additionally deliver playback state information to the companion screen device when the playback state information has changed.

FIG. 400 is a flowchart illustrating operation of the broadcast reception device according to an embodiment of the present invention.

The broadcast reception device can receive a broadcast signal containing a service including audio/video (AV) programs and signaling information using a broadcast interface (CS5100). For example, programs may refer to content. That is, the AV programs can refer to AV content.

For example, the signaling information can include service layer signaling (or first information) that provides discovery and acquisition of a service and at least one content component included in the service. In addition, the signaling information can include a service list table (or FIC or second information) containing data related to fast channel participation and switching. The service list table can build a list of services and provide bootstrap discovery of service layer signaling. The FIC allows the broadcast reception device to build a basic service list and bootstrap discovery of service layer signaling for each service. According to an embodiment, the FIC can be represented as a service list table (SLT). The FIC (or SLT) can be delivered through link layer signaling. Furthermore, the FIC (or SLT) can be transmitted in each physical layer frame for fast acquisition. According to an embodiment, the FIC (or SLT) can be transmitted through at least one of a physical layer frame, a PLP delivering signaling and a PLP assigned per broadcaster.

In addition, the signaling information can include media time information of played AV programs.

The signaling information can include at least one of a fragmentation_indicator that indicates whether the signaling information has been fragmented, a payload_format_indicator that indicates whether the header of the signaling information includes information about the payload format, an expiration_indicator that indicates whether the header of the signaling information includes expiration of the signaling information, a fragment_number attribute that indicates the number of a signaling information fragment, a last_fragment_number attribute that indicates the number of the last signaling information fragment, a payload_format attribute that indicates the payload format of the signaling information and an expiration attribute that indicates expiration of the signaling information.

The broadcast reception device can discover the companion screen device using a companion screen interface (CS5200). The broadcast reception device can deliver data and/or signaling information to the companion screen device using the companion screen interface or receive data and/or signaling information from the companion screen device.

Then, the broadcast reception device can operate the broadcast interface and the companion screen interface using the controller.

The controller may include a playback state service processor (not shown). The broadcast reception device can generate playback state information indicating a playback state of a program on the basis of the signaling information using the controller and the playback state service processor (CS5300). The playback state information can include a speed attribute that indicates a playback speed of the program.

Thereafter, the broadcast reception device can deliver the playback state information to the companion screen device using the companion screen interface (CS5400).

The broadcast reception device according to an embodiment of the present invention can deliver the playback state information using the requesting method. For example, the broadcast reception device can receive a playback information request for acquisition of playback information from the companion screen device using the companion screen interface. In addition, the broadcast reception device may generate playback information including playback state information indicating the playback state of a played program using the controller (or playback state service processor). Then, the broadcast reception device can deliver the playback information to the companion screen device using the companion screen interface.

The broadcast reception device according to an embodiment of the present invention can deliver service time information using the eventing method. For example, when the playback state information has changed, the broadcast reception device can generate playback information including the playback state information indicating a playback state of a program using the controller (or playback state service processor). Thereafter, the broadcast reception device can generate an event and deliver the playback information to the companion screen device using the companion screen interface.

The controller of the broadcast reception device may include a synchronization service processor (not shown). The broadcast reception device can generate service time information providing data related to synchronization between an AV program and an AV program displayed through the companion screen device on the basis of the signaling information using the controller or the synchronization service processor. The service time information can include playback state information. The broadcast reception device can deliver the service time information to the companion screen device using the companion screen interface.

The service time information according to an embodiment of the present invention can include at least one of a serviceId attribute that indicates a service ID, a programId attribute that indicates the ID of a played program in a service, a mediaTime element that indicates media time information of a program and a currentTime element that indicates wall-clock time.

The broadcast reception device according to an embodiment of the present invention can deliver the service time information using the requesting method. The broadcast reception device can deliver the service time information to the companion screen device on the basis of a first request for acquisition of the service time information, received from the companion screen device, using the companion screen interface.

The broadcast reception device according to an embodiment of the present invention can deliver the service time information using the eventing method. For example, the broadcast reception device can generate service time information including playback state information indicating a playback state of a program using the controller (or synchronization service processor) when the playback state information has changed. Then, the broadcast reception device can generate an event and deliver the service time information to the companion screen device using the companion screen interface.

Furthermore, the broadcast reception device can generate update interval information indicating a service time information delivery interval using the controller. Then, the broadcast reception device can deliver the service time information to the companion screen device on the basis of the update interval information using the companion screen interface.

The update interval information according to an embodiment of the present invention may be one of update duration information indicating a service time information delivery duration and update frequency information indicating service time information delivery frequency. For example, an interval can include a duration and/or frequency. The update interval information can include update duration information and/or update frequency information.

The broadcast reception device can request acquisition of the update interval information. The broadcast reception device can receive a second request (or update interval information request) for acquisition of the update interval information from the companion screen device using the companions screen interface. Then, the broadcast reception device can generate current update interval information indicating the value of the update interval information at the time indicated by wall-clock time on the basis of the second request using the controller (or synchronization service processor). Thereafter, the broadcast reception device can deliver the current update interval information to the companion screen device using the companion screen interface.

For example, the update interval information request may include an update duration information request and/or an update frequency information request. The current update interval information may include current update duration information and/or current update frequency information.

The broadcast reception device can request setting of update interval information. The broadcast reception device can receive a third request (or update interval information setting request) for setting of update interval information from the companion screen device using the companions screen interface. The third request can include requested update interval information indicating a value of update interval information requested by the companion screen device. Then, the broadcast reception device can generate confirmed update interval information that indicates one of the same value as the requested update interval information and a value closest to the requested update interval information. Subsequently, the broadcast reception device can deliver the service time information to the companion screen device on the basis of the confirmed update interval information using the controller (or synchronization service processor).

For example, the update interval information setting request may include an update duration information setting request and/or an update frequency information setting request. The requested update interval information may include requested update duration information and/or requested update frequency information. The confirmed update interval information may include confirmed update duration information and/or confirmed update frequency information.

FIG. 401 illustrates service time information ServiceTimeInfo in the JSON format according to another embodiment of the present invention.

As described above, the ServiceTimeInfo may be information providing data related to synchronization between services/content played in a TV receiver and a CD (Companion Device). The ServiceTimeInfo may have a format of the aforementioned ServiceTimeInfo state variable. The ServiceTimeInfo may be used to deliver information such as media time from the TV receiver to the CD.

Although the ServiceTimeInfo state variable may be written in XML as described above, it may also be written in JSON. The XML format shown in the figure may be an embodiment of the XML format of the aforementioned ServiceTimeInfo state variable. The ServiceTimeInfo state variable in the XML format may be represented in the JSON format as shown in the figure.

When the ServiceTimeInfo state variable is represented in JSON, the ServiceTimeInfo state variable may be represented as JSON #1 shown in the figure. The ServiceTimeInfo may include VariableName, serviceId, programId, mediaTime and/or currentTime information. The VariableName can indicate the name of the state variable in JSON format. Here, the VariableName can have a value of ServiceTimeInfo. The serviceId can indicate an ID of a service related to the state variable. In the shown embodiment, the serviceId may have a value of "11". This may be a channel number or a channel ID of the corresponding service. The programId can indicate an ID of a program related to the corresponding state variable. In the illustrated embodiment, programId may have a value of "1008". This may be an ID value of the corresponding program (content).

The mediaTime may include mediaTimeprotocol information and/or value information. The mediaTimeProtocol information can indicate a protocol used to represent media time, like the aforementioned @mediaTimeProtocol. Here, the mediaTime has a timestamp value. The mediaTime has a timestamp form. The value information can indicate a mediaTime value. In the present embodiment, mediaTime has a value of 77ee.

The currentTime information may include currentTimeProtocol information and/or value information. The currentTimeProtocol information can indicate a protocol used to represent the current time, like the aforementioned @currentTimeProtocol. Here, currentTime information has an NTP value which represents that the current time is represented in the form of NTP. The value information may have a value indicating the current time. In the present embodiment, the current time is 88ee.

When the ServiceTimeInfo state variable is represented in JSON format, the ServiceTimeInfo state variable may be represented as JSON #2 as shown in the figure. Information in JSON #2 has been described in the above-described JSON #1. However, in JSON #2, the mediaTime information and the currentTime information are omitted and thus there may be no hierarchic structure of information. The names of the value information of the mediaTime information and the currentTime information may be changed to mediaTiem-value and currentTimevalue.

Internal information structures of state variables in JSON format or XML format may be configured/combined differently according to embodiments.

FIG. 402 illustrates ServiceTimeInfo in JSON format further including playback state information according to another embodiment of the present invention.

As described above, the ServiceTimeInfo may further include the playbackState element. The PlaybackState element may further include playback state information. The playback state information may be used to deliver a playback state of a service/content that is being played in a PD to a CD. Synchronization between the PD and the CD can be efficiently performed by delivering the playback state to the CD.

The ServiceTimeInfo further including the PlaybackState element has been described above. The ServiceTimeInfo may have the XML format as described above or may have the JSON format. The XML format shown in FIG. 402 may be an embodiment of the XML format of the aforementioned ServiceTimeInfo state variable including the PlaybackSate element. The ServiceTimeInfo state variable in XML format may be represented in JSON format as shown in the figure.

When the ServiceTimeInfo state variable is represented in JSON format, the ServiceTimeInfo state variable may be represented as JSON #1 as shown in the figure. Information (variableName, serviceId, etc.) of JSON #1 has been described above. The JSON format may further include PlaybackState information. The PlaybackState information may further include speed information and/or value information. The speed information may include information indicating a playback speed of a service/content that is being played in a PD. In the present embodiment, the speed information may have a value of 3 which indicates that the service/content that is being played in the PD is played at a speed of 3. The value 3 may refer to 3× of a normal playback speed although it may be defined differently according to embodiments. The value information may include information indicating a playback state of the service/content that is being played in the PD. In the present embodiment, the value information may have values such as fast-forward, reverse, pause, stop, etc. The value information may indicate that the service/content being played in the PD is in a fast-forward state.

Furthermore, when the ServiceTimeInfo state variable is represented in JSON format, the ServiceTimeInfo state variable may be represented as JSON #2 as shown in the figure. Information in JSON #2 has been described in the above-described JSON #1. However, in JSON #2, the PlaybackState information, the mediaTime information and the currentTime information are omitted and thus there may be no hierarchic structure of the information. The names of the value information of the mediaTime information and the currentTime information may be changed to mediaTiemvalue and currentTimevalue. The names of the speed information and the value information of the PlaybackState information may be changed to PlaybackSpeed and PlaybackState.

Internal information structures of state variables in the JSON format or the XML format may be configured/combined differently according to embodiments.

FIG. 403 illustrates ServiceTimeInfo in the JSON format further including playback state information about multiple images according to another embodiment of the present invention.

A PD may simultaneously play multiple images as in PIP. In this case, playback state information about each image needs to be identified when the PD delivers playback state information to a CD. Accordingly, the aforementioned ServiceTimeInfo information can be extended as shown in the figure.

The ServiceTimeInfo information may further include mediaURL information, mediaId information and/or mediaRole information. This information can be used to identify an image of which playback state is indicated by the corresponding playback state information. The mediaURL information can indicate media URL information of a corresponding image and the mediaId information can indicate an ID of the corresponding image. The mediaRole information can indicate the role of the corresponding image. For example, the mediaRole information can indicate whether the corresponding image is a main image or a secondary image.

The illustrated ServiceTimeInfo information in XML format may further include the aforementioned extended image identification information. The ServiceTimeInfo information in the XML format may further include mediaURL information, mediaId information and/or mediaRole information. In the present embodiment, the mediaURL information may have a value of http://www.example.com/media01, which may be a media URL of an image corresponding to an identification target. In the present embodiment, mediaId information may have a value of examplemedia002, which may be an ID of the corresponding image. The mediaRole information in the present embodiment can indicate whether the corresponding image is a main image or a secondary image.

The ServiceTimeInfo information according to the present embodiment may be described in JSON format. When delivery of playback state information about multiple images is required, the ServiceTimeInfo information can be represented as JSON #1 as shown in the figure. The ServiceTimeInfo information represented as JSON #1 may further include the aforementioned mediaURL information, mediaId information and/or mediaRole information. The information may have the same values as the aforementioned ServiceTimeInfo information in XML format. Other information (VariableName and the like) has been described above.

In addition, the ServiceTimeInfo information according to the present embodiment may be represented in JSON #2. The ServiceTimeInfo information according to the present embodiment may further include the mediaURL information, mediaId information and/or mediaRole information. This information and other information (VariableName and the like) have been described above.

Internal information structures of state variables in the JSON format or the XML format may be configured/combined differently according to embodiments.

FIG. 404 illustrates playback state information PlaybackInfo in JSON format according to another embodiment of the present invention.

As described above, playback state information of a service/content being played in a PD can be included in ServiceTimeInfo and delivered to a CD. However, a separate state variable may be defined for playback state information and the playback state information may be delivered to the CD using the state variable according to an embodiment. The state variable may be the same as the aforementioned PlaybackInfo state variable. This has been described above.

The aforementioned PlaybackInfo state variable may be described in XML format or JSON format. The PlaybackInfo state variable in XML format has been described above. FIG. 404 shows an embodiment in which playback state information is described in JSON format.

The playback state information in JSON format may further include VariableName information, serviceID information, etc. This information has been described above. Since the playback state information is defined using a separate state variable, the VariableName information can have PlaybackInfo instead of ServiceTimeInfo as a value thereof.

The playback state information in JSON format according to the illustrated embodiment delivers playback state information about program “1008” of service “11” and indicates that the corresponding content is fast-forwarded at a speed of 3×.

FIG. 405 illustrates a UPnP based PD-CD architecture according to an embodiment of the present invention.

A main physical device may correspond to a TV receiver (broadcast reception apparatus, PD). A companion physical device may correspond to the aforementioned CD (companion device). The two devices are physical devices and may refer to a PD or a CD.

In the present embodiment, the main physical device may include a main device. Here, the main device may correspond to a controlled device defined in UPnP. Hereinafter, the main device will be called a controlled device for convenience of description.

In the present embodiment, the companion physical device may include a main control point. Here, the main control point may correspond to a control point defined in UPnP. The main control point may refer to a control point that communicates with a main controlled device.

The controlled device may be positioned in the TV receiver in the UPnP architecture and perform various operations. When the TV receiver joins a home network, the controlled device can multicast an advertisement message or deliver a UPnP service description provided by a PD to the control point. In addition, the controlled device may deliver a state variable to the control point in an eventing manner or deliver information to the control point when the control point requests a specific operation according to an action method. A PC such as the TV receiver may be called a controlled device.

The controlled device may provide an Application Management Service and/or a Connection Establishment Service. These services may be UPnP services provided by the controlled device. The application management service may refer to services related to management of applications executed in the controlled device and the control point. App-to-app communication or services for delivering specific information to an application may correspond to the application management service. In the illustrated embodiment, applications App #1 and App #2 in the PD may communicate with applications App #1 and App #3 in the CD according to the application management service.

The connection establishment service may be a service related to establishment and management of connection between the controlled device and the control point. A discovery process between the controlled device and the control point may conform to a discovery process defined in UPnP.

First, when a PD joins a home network, the PD can multicast a discovery message for advertising the PD. When a CD joins the home network later, the CD can multicast a search message for arbitrary PDs. A PD that has received the search message may unicast a response message to the CD. The advertising message and the search message may be exchanged irrespective of home network join time or order of the PD and the CD and may be periodically exchanged.

Upon reception of a response message to the advertising message or the search message of the PD, the CD may send an HTTP GET request message to request information about a UPnP service provided by the PD. The PD may deliver description information about services to the CD in response to the request. Then, the CD can subscribe to a service of the PD. The CD can obtain desired information using an action, transmit information or receive information in an eventing manner.

The main device and the main control point may be called a screen device and a screen control device according to an embodiment.

FIG. 406 illustrates a UPnP based PD-CD architecture according to another embodiment of the present invention.

In the present embodiment, a main physical device PD may include a main controlled device and/or a companion control point. In addition, a companion physical device CD may include a main control point and/or a companion control device.

In general, operations and roles of a controlled device and a control point are asymmetrical in a UPnP architecture. That is, an operation that can be performed by the control device may not be performed by the control point.

To compensate for this, the companion physical device CD may include a companion controlled device in the same manner as the main physical device PD includes a main controlled device. The main physical device may have a companion control point corresponding to each controlled device and the companion physical device may have a main control point. The main controlled device may communicate with the main control point and the companion controlled device may communicate with the companion control point.

The companion controlled device and the companion control point may exchange a discovery message and perform operations such as events/actions. Accordingly, the CD may play a leading role in communication. However, the companion controlled device and the companion control point may have different operations, roles and rights from the main controlled device/control point. Specific operations or the scope of rights may be set by designer.

The companion controlled device and the companion control point may be called a screen (controlled) device and a screen control point according to an embodiment.

FIG. 407 illustrates a UPnP based PD-CD architecture according to another embodiment of the present invention.

In the present embodiment, a main physical device PD may include a main controlled device and/or a main control point. In addition, a companion physical device CD may include a main control point and/or a main controlled device.

As described above, the PD and the CD may perform asymmetrical operations in a UPnP architecture. To solve this, an architecture in which the PD and the CD further includes a pair of a main control point and a main controlled device in addition to the main controlled device and the main control point, respectively, may be configured. In this case, both the PD and the CD can include the equivalent main controlled device/the control point, distinguished from the aforementioned embodiment in which the companion controlled device/control point perform different operations from the main controlled device/control point. Accordingly, an architecture can be configured in such a manner that the TV receiver and the companion physical device have equal communication rights.

FIG. 408 illustrates interactions in a UPnP based PD-CD architecture according to an embodiment of the present invention.

FIG. 408 sequentially illustrates embodiments of the aforementioned UPnP based PD-CD architectures. The first embodiment t408010 may be an embodiment in which the aforementioned PD includes a controlled device and the CD includes a control point. The second embodiment t408020 may be an embodiment in which the aforementioned PD includes a main controlled device and a companion control point and the CD includes a main control point and a companion controlled device. The third embodiment t408030 may be an embodiment in which the aforementioned PD includes a main controlled device and a main control point and the CD includes a main control point and a main controlled device.

In the first embodiment t408010, the controlled device can deliver information such as a state variable to the control point through UPnP eventing. Simultaneously, the control point can request information or a specific operation from the controlled device through a UPnP action. This may be the most fundamental architecture.

In the second embodiment t408020, the main controlled device can communicate with the main control point and the companion controlled device can communicate with the companion control point. The main controlled device can deliver information such as a state variable to the main control point through UPnP eventing. Simultaneously, the main control point can request information or a specific operation from the main controlled device through a UPnP action. In addition, the companion controlled device can deliver information such as a state variable to the companion control point through UPnP eventing. Simultaneously, the companion control point can request information or a specific operation from the companion controlled device through a UPnP action. As described above, the companion controlled device and the companion control point may have different operations, roles and rights from the main controlled device/control point.

In the third embodiment t408030, the main controlled devices of the PD and the CD can communicate with main control points corresponding thereto. The main controlled devices can deliver information such as a state variable to the main control points through UPnP eventing. Simultaneously, the main control points can request information or a specific operation from the main controlled devices through a UPnP action.

FIG. 409 illustrates a Websocket based PD-CD architecture according to an embodiment of the present invention.

In the Websocket based architecture, communication can be performed between a PD and an application executed in a CD. In the Websocket based architecture, the PD may include a Websocket server and the CD may include applications. Here, applications of the CD may be called Websocket clients.

The Websocket server in the PD may have endpoints with respect to operations/functions provided by the PD. The endpoints may be connected to applications of the CD to deliver an ESG or media timeline and perform communication between an application of the PD and an application of the CD.

First, a discovery process may be performed between the PD and an application executed in the CD. The discovery process will be described below. In this process, information about the endpoints of the Websocket server may be delivered to the application of the CD.

For each endpoint, the application of the CD and the Websocket server can perform a handshake process. When the application of the CD requests handshake opening, the Websocket server can send a response to the request. Accordingly, the Websocket server and the application of the CD can be connected through an endpoint.

In the Websocket architecture, when the Websocket server and the application of the CD are connected through the endpoint, information can be transmitted through the endpoint. Messages can be freely relayed between applications of the PD and the CD.

When disconnection is required, the application of the CD can request disconnection for the endpoint (Disconnect Request). The Websocket server sends a response to the request (Disconnect Response) and connection with the endpoint can be terminated. Disconnection may be performed by the PD first and may be automatically performed in various situations.

The aforementioned process may be a process of interacting with a single Websocket endpoint. When there are multiple endpoints, the aforementioned process can be equally performed for the endpoints to activate desired endpoints. This process may be performed for multiple endpoints simultaneously or sequentially.

In the present embodiment, the Websocket server may have endpoints for provided functions, respectively. That is, a single endpoint can be provided to a single function.

Such endpoints may include a service/content identification endpoint, an ESG information endpoint, a service/show/segment data endpoint, a media timeline endpoint, a media playback state endpoint, an EAS endpoint and/or an app-to-app endpoint.

The service/content identification endpoint may execute a function of delivering information for identifying a service/content that is being played or will be played in a PD. An application of a CD can receive the information through this endpoint.

The ESG information endpoint may be used for a CD to receive an ESG. An application of the CD can receive the ESG through this endpoint. The service/show/segment data endpoint may receive various types of data about services.

The media timeline endpoint may deliver the current time and media time information of a currently played service/content. The aforementioned service time information may be delivered through this endpoint. The media playback state endpoint may deliver information related to presentation of a currently played service/content. The information related to presentation may refer to information indicating whether a currently played service/content is played at normal speed, fast-forwarded at 3X or reversed. The aforementioned playback state information may be delivered to an application of the CD through this endpoint.

The EAS endpoint may deliver EAS information to the CD. When the EAS information is delivered to a TV receiver, it is possible to signal a dangerous situation more efficiently by delivering the EAS information to the CD. The app-to-app end point may be an endpoint for communication between an application executed in a PD and an application executed in a CD. The application of the PD and the application of the CD can exchange information by transmitting/receiving messages using this endpoint.

Since each endpoint is provided for each function, an application of the CD can access an endpoint to perform a connection process and obtain desired information to communicate with an application of the PD through the endpoint.

Hereinafter, this architecture may be referred to as Websocket based architecture embodiment #1 for convenience of description. This embodiment can be combined with various embodiments based on UPnP and HTTP as well as other Websocket based architectures.

FIG. 410 illustrates a Websocket based PD-CD architecture according to another embodiment of the present invention.

In the present embodiment, an endpoint may not be provided to each function. In the present embodiment, a Websocket server of a PD provides a single endpoint which can execute all the aforementioned functions. This endpoint may be called a companion endpoint. Other components of the Websocket architecture may be the same as the aforementioned embodiment.

The aforementioned endpoint may execute all functions executed by multiple endpoints in the aforementioned embodiment. That is, this endpoint can execute the functions executed by the aforementioned service/content identification endpoint, the ESG information endpoint, the service/show/segment data endpoint, etc. Accordingly, an application of the CD can perform operations such as receiving an ESG, receiving media time information and communicating with an application of the PD only by connecting to the endpoint. In this case, however, a function for which a message is exchanged between the application of the CD and the Websocket server needs to be identified. Accordingly, the message may include more specific information or may be extended.

Since the companion endpoint executes all functions, all the functions can be executed when connection to the endpoint is established. A process of connecting to the endpoint may be the same as the aforementioned process of connecting to a normal endpoint. In this case, connection to the endpoint cannot be partially terminated even when a certain function need not be accessed because there is a single endpoint. On the contrary, even when only one function is required, connection to the companion endpoint must be established.

Hereinafter, this architecture may be referred to as Websocket based architecture embodiment #2 for convenience of description. This embodiment can be combined with various embodiments based on UPnP and HTTP as well as other Websocket based architectures.

FIG. 411 illustrates a Websocket based PD-CD architecture according to another embodiment of the present invention.

In the present embodiment, n endpoints are provided and can execute m functions. Here, n may be equal to or less than m, and n and m may be integers. That is, a plurality of (n) endpoints each of which can execute one or more functions can be provided.

In the illustrated embodiment, an endpoint that executes a service/content identification function, an ESG delivery function and the like may be provided as a companion endpoint and an endpoint that executes an app-to-app function may be provided as a separate "app-to-app endpoint".

The architecture of the present embodiment may be regarded as a combination of the aforementioned Websocket based architectures #1 and #2. Various architectures can be configured depending on values of n and m. Various numbers of endpoints may be provided and each endpoint may provide various numbers of functions.

The above-described connection to and disconnection from endpoints may need to be performed for each endpoint. That is, the process may need to be performed n times for n endpoints.

Hereinafter, this architecture may be referred to as Websocket based architecture embodiment #3 for convenience of description. This embodiment can be combined with various embodiments based on UPnP and HTTP as well as other Websocket based architectures.

FIG. 412 illustrates app-to-app communication in a Websocket based PD-CD architecture according to an embodiment of the present invention.

App-to-app communication may be performed between an application executed in the PD and an application executed in the CD. In a Websocket based architecture, applications can communicate through a Websocket server. Here, the aforementioned app-to-app endpoint can be used. Alternatively, an endpoint executing the app-to-app communication function and other functions may be used according to an embodiment.

The application of the CD can connect to the app-to-app communication endpoint of the Websocket server through the aforementioned process. Applications executed in the PD correspond to Websocket clients, and the application of the PD can connect to the app-to-app communication endpoint of the Websocket server. The Websocket server can connect matching connection requests from among received connection requests to enable message exchange.

When the applications of the PD and the CD are connected, the applications can exchange messages through the Websocket server. The messages can be delivered bidirectionally. The Websocket server can relay a message sent from one application to the other application.

FIG. 413 illustrates an HTTP based PD-CD architecture according to an embodiment of the present invention.

In the HTTP based architecture, communication can be performed between a PD and an application executed in a CD. In the HTTP based architecture, the PD may include an HTTP server and the CD may include applications. Here, applications of the CD may be called HTTP clients.

The HTTP server included in the PD may be a server for performing various operations/functions. To access each function of the server, a service URL for a corresponding service may be needed. An application of the CD may send a request to the corresponding service URL to receive desired information.

First, a discovery process may be performed between the PD and the application executed in the CD. In this process, information about URLs of the HTTP server may be delivered to the application of the CD. HTTP clients of the CD may access desired URLs using the delivered URL information to receive desired information.

In the present embodiment, the HTTP server may have different URLs for functions. That is, a single URL can be provided for a single function.

Services provided through such service URLs may be similar to functions provided by the aforementioned Websocket server. For example, when the application of the CD accesses a service/content identification service URL, the application can receive information for identifying a service/content that is being played or will be played in the PD. That is, the application of the CD can send a request for service/content identification information to the service/content identification service URL and the HTTP server of the PD can deliver the requested information to the application of the CD. An ESG information service, a media timeline service and the like corresponding to the functions provided by the aforementioned ESG information endpoint, media timeline endpoint and the like can be defined. The application of the CD can receive desired information by sending a request to each service URL.

Since service URLs are respectively provided to services, the application of the CD needs to know information about each URL and to access a desired URL to obtain desired information or communicate with an application of the PD.

Hereinafter, this architecture may be referred to as HTTP based architecture embodiment #1 for convenience of description. This embodiment can be combined with various embodiments based on UPnP and HTTP as well as other HTTP based architectures.

FIG. 414 illustrates an HTTP based PD-CD architecture according to another embodiment of the present invention.

In the present embodiment, service URLs may not be provided to respective services. In the present embodiment, an HTTP server of a PD provides a single service URL through which all the aforementioned functions can be executed. This service URL may be called a companion service URL. Other components of the HTTP architecture may be the same as the aforementioned embodiment.

The single service URL may be a service URL through which all functions executed through multiple service URLs in the aforementioned embodiment can be executed. That is, this service URL can execute the functions executed by the aforementioned service/content identification service URL, ESG information service URL, the service/show/segment data service URL, etc. Accordingly, an application of the CD can receive an ESG or media time information only by sending a request to the service URL.

In this case, when a request is sent to the HTTP server, the request message may be extended in such a manner that a new variable is attached to the query term. This is because it is necessary to identify information that the application of the CD wants to receive by sending a request to the companion service URL. The HTTP server can analyze the request and deliver the information that the application of the CD desires.

Hereinafter, this architecture may be referred to as HTTP based architecture embodiment #2 for convenience of description. This embodiment can be combined with various embodiments based on UPnP and HTTP as well as other HTTP based architectures.

FIG. 415 illustrates a Websocket & HTTP based PD-CD architecture according to an embodiment of the present invention.

The aforementioned UPnP based architectures, Websocket based architectures and HTTP based architectures may be combined. For example, a PD may simultaneously have an HTTP server and a Websocket server. According to an embodiment, the PD may have the HTTP server and the Websocket server and serve as a controlled device in a UPnP architecture.

In addition, a combined UPnP architecture may be one of the aforementioned first, second and third UPnP architecture embodiments #1, #2 and #3. A combined Websocket architecture may be one of the aforementioned first, second and third Websocket architecture embodiments #1, #2 and #3, and a combined HTTP architecture may be one of the aforementioned first, second and third HTTP architecture embodiments #1 and #2.

In the present embodiment, the PD simultaneously has the HTTP server and the Websocket server, HTTP based architecture #2 can be used as an HTTP architecture, and Websocket based architecture #3 can be used as a Websocket architecture. That is, in the HTTP server, a single service URL address can execute a plurality of functions. The Websocket server provides n endpoints that can execute a plurality of functions. Specifically, two endpoints are provided, one endpoint serves as an endpoint for app-to-app communication, and the other endpoint serves as an endpoint executing all other functions in the present embodiment.

Although only the above-described embodiments are described herein, the technical scope of the present invention includes all other combinations as embodiments. Various architectures can be designed according to such combinations and selected and used according to designer.

In the architecture as in the present embodiment, functions may be divided and executed by the HTTP server and the Websocket server. That is, the HTTP server may be used to execute specific functions and a single HTTP service URL may be used to receive requests for executing the functions. In addition, the Websocket server may provide endpoints for executing other functions.

Such function division may be performed depending on characteristics of corresponding functions. The HTTP may be used for asynchronous communication whereas the Websocket may be used for synchronous communication.

According to an embodiment, the ESG information delivery function, the service/show/segment data delivery function and the like may be performed by the HTTP server. That is, information such as an ESG or service data can be acquired by sending a request to a service URL of the HTTP server.

In addition, the service/content identification function, the media playback state function, the app-to-app communication function and the like may be performed by the Websocket. The Websocket server may provide the companion endpoint for executing the media playback state function and the app-to-app endpoint for executing the app-to-app communication function.

According to an embodiment, the media timeline function may be executed by the HTTP and/or Websocket. The media timeline function may be provided by both the HTTP and the Websocket or provided by one of the HTTP and the Websocket. The EAS information delivery function may be executed by the Websocket or a multicast sender in the PD. When the multicast sender is used, the multicast sender in the PD can multicast EAS information to devices in a multicast group.

FIG. 416 illustrates formats of messages used for discovery of a PD (Primary Device) according to an embodiment of the present invention.

The PD can be discovered by a CD or an application executed in the CD. In this process, an SSDP (Simple Service Discovery Protocol) may be used. The PD may have an ST (Search Target) value for identifying a technical standard to which the PD conforms. For example, the PD can use urn:atsc:device:atsccompanion:3 or urn:atsc:service:atsccompanion:3 as a device type or service type thereof. These values can be used in a discovery process through ST matching.

For a discovery process, the PD may advertise itself to CDs. Alternatively, a CD may discover the PD through search.

First, when the PD advertises itself to CDs, the PD can multicast a discovery message. This discovery message may be transmitted through a NOTIFY method. The discovery message for advertising of the PD may be as illustrated in embodiment t413010.

When a CD discovers the PD through search, the CD or an application executed in the CD can multicast a discovery message. This discovery message may be transmitted through an M-SEARCH method. The discovery message for searching of the CD may be as illustrated in embodiment t413020.

The application of the CD can discover PDs conforming to a specific technical standard using the ST value. The PD can receive the aforementioned search message. When the ST value of the PD matches the ST value of the message, the PD can send a response to the application of the CD which has sent the message (200 OK). This response message may be as illustrated embodiment t413030.

The illustrated message formats are merely embodiments of the present invention and parameters included in the messages may have different values according to embodiments.

The discovery process described herein can be applied to HTTP architectures as well as Websocket architectures.

FIG. 417 illustrates a process for discovering a Websocket endpoint or an HTTP service URL using a DDD (Device Description Document) according to an embodiment of the present invention.

As described above, a PD may multicast a discovery message for advertising the PD or transmit a response message to a received M-SEARCH message to a CD. An application of the CD may obtain a URL from a LOCATION header of the multicast discovery message or the response message to the M-SEARCH message. The URL may be a URL through which a DDD (Device Description Document) can be acquired. The application of the CD may acquire the DDD using the URL to obtain device description information.

Specifically, the PD may multicast a discovery message for advertising the PD through the NOTIFY method as described above. In this process, URL information for acquiring a DDD may be delivered to the application executed in the CD. Alternatively, when the application of the CD multicasts a discovery method for searching using the M-SEARCH method, the PD may send a response message thereto to the CD. In this process, the URL information for acquiring the DDD may also be delivered to the application executed in the CD (t417010).

Then, the application of the CD may send a request for the DDD to the acquired URL using HTTP GET. The PD may deliver the DDD to the application of the CD using a response message (t417020). The body of the response message may include the DDD.

Addresses of Websocket endpoints may be provided to the application of the CD through the DDD. According to an embodiment, addresses of service URLs of an HTTP architecture may be provided to the application of the CD through the DDD. When an architecture in which two or more protocols are combined is used, addresses of Websocket endpoints and/or addresses of service URLs of the HTTP may be provided to the application.

FIG. 418 illustrates a DDD request message and a DDD format in a process for discovering a Websocket endpoint or an HTTP service URL using a DDD according to an embodiment of the present invention.

As described above, an application of a CD may request a DDD using HTTP GET. Here, the GET message may have a format as illustrated in embodiment t418010. A DDD request message using GET may be transmitted to a URL of a DDD acquired from a PD. In addition, host information of an IP address/port of the description may be used. Furthermore, a language preferred by a control point may be used.

As described above, a response message to the DDD request message may be returned. The body of the response message may include the DDD. The DDD may have a format as illustrated in embodiment t418020.

The DDD may include specification version information, base URL information, device related information, etc. The specification version information specVersion can indicate version information of a corresponding DDD specification as a major version/minor version. The base URL information can include base URL information that can be used for all related URLs delivered by the DDD.

The device related information can include type information of a device described by the DDD, short device name information readable by a user (friendlyName), manufacture information of a corresponding device, service list information, etc.

The service list information can include service type information indicating the type of each service provided by the corresponding device, service ID information indicating the ID of the service, service description URL information indicating a URL related to service description, control URL information used for control of the corresponding service and/or URL information used for eventing of the corresponding service.

The illustrated formats are merely embodiments of the present invention and structures thereof, elements included therein and values of the elements may be varied according to embodiments.

FIG. 419 illustrates DDD formats in a process for discovering a Websocket endpoint or an HTTP service URL using a DDD according to an embodiment of the present invention.

As described above, addresses of Websocket endpoints or addresses of HTTP service URLs may be delivered to an application of a CD through DDD delivery. The application of the CD may connect to a Websocket endpoint or send a request to a service URL using the addresses.

In the aforementioned Websocket based architecture embodiment #1, the DDD format according to the illustrated embodiment t419010 or the DDD format according to the embodiment t419020 may be used.

In the illustrated embodiment t419010, device information of the DDD may include address information of various Websocket endpoints in addition to the device type information. As shown, address information about endpoints such as the service/content identification endpoint and the ESG information endpoint is included in the device information of the DDD. Since the DDD format is used in Websocket based architecture embodiment #1, the pieces of address information about the endpoints may be arranged. The DDD format according to illustrated embodiment t419020 may also include address information about various Websocket endpoints. In this case, the address information about the endpoints may be included in the service information of the DDD.

While the address information is positioned below the device information and the service information in the present embodiment, the address information may be arranged at other positions in the DDD. In the illustrated embodiment, other elements of the aforementioned DDD are omitted. Other elements may be configured according to various embodiments.

The DDD formats according to the illustrated embodiments t419010 and t419020 may be used in the aforementioned HTTP based architecture embodiment #1. In this case, the address information of the Websocket endpoints can be replaced by URL address information of service URLs. Accordingly, element names may be changed. Similarly, since the DDD formats are used in HTTP based architecture embodiment #1, the pieces of address information of the service URLs may be arranged.

Addresses of Websocket endpoints may be configured in the form of ws://localhost:8030/ESGInformation, ws://localhost:8030/Data and ws://localhost:8030/MediaTimeline. Addresses of HTTP service URLs may be configured in the form of http://192.168.1.4:8080/serviceidentification and http://localhost:8030/ESGInformation.

FIG. 420 illustrates DDD formats in a process for discovering a Websocket endpoint or an HTTP service URL using a DDD according to another embodiment of the present invention.

In the aforementioned Websocket based architecture embodiment #2, a DDD format according to the illustrated embodiment t420010 or a DDD format according to the illustrated embodiment t420020 may be used.

In the illustrated embodiment t420010, the device information of the DDD may include addresses of Websocket endpoints in addition to the device type information. Since the DDD format is used in Websocket based architecture embodiment #2, only address information about a single companion endpoint may be included therein. The DDD format according to the illustrated embodiment t420020 may also include only address information about a single companion endpoint. In this case, the address information of the corresponding endpoint can be included in the service information of the DDD.

The DDD formats according to the illustrated embodiments t420010 and t420020 may be used in the aforementioned HTTP based architecture embodiment #2. In this case, the address information of the Websocket companion endpoint can be replaced by URL address information of a companion service URL. Accordingly, element names may be changed. Similarly, since the DDD formats are used in HTTP based architecture embodiment #2, only address information of a single service URL can be included therein.

In the aforementioned Websocket based architecture embodiment #3, the DDD format according to the illustrated embodiment t420030 or the DDD format according to the illustrated embodiment t420040 may be used.

In the illustrated embodiment t420030, the device information of the DDD may include address information of n Websocket endpoints in addition to the device type information. For example, the device information may include address information of a companion endpoint that executes the service/content identification function, the ESG information delivery function, etc. and address information of the app-to-app communication endpoint. The DDD format according to the illustrated embodiment t420040 may also include address information of n Websocket endpoints. In this case, address information of corresponding endpoints can be included in the service information of the DDD.

While the address information is positioned below the device information and the service information in the present embodiment, the address information may be arranged at other positions in the DDD. In the illustrated embodiment, other elements of the aforementioned DDD are omitted. Other elements may be configured according to various embodiments.

FIG. 421 illustrates a process for discovering a Websocket endpoint or an HTTP service URL using a response header to a DDD request according to an embodiment of the present invention.

As described above, a PD may multicast a discovery message for advertising the PD or transmit a response message to a received M-SEARCH message to a CD. An application of the CD may obtain a URL from a LOCATION header of the multicast discovery message or the response message to the M-SEARCH message. This process may be the same as the process in the aforementioned embodiment.

The URL may be a URL through which a DDD can be acquired, and the application of the CD may send a message for requesting the DDD to the URL using HTTP GET. The DDD is delivered through the body of a response message to the request and thus the application of the CD can obtain device description information (t421020).

In the above-described embodiment, addresses of Websocket endpoints or address information of HTTP service URLs are delivered through the DDD of the response message. In the present embodiment, the address information may be delivered through the header of the response message. In this case, the body of the response message may include no information or may include the DDD.

FIG. 422 illustrates a format of a response header in a process for discovering a Websocket endpoint or an HTTP service URL using a response header to a DDD request according to an embodiment of the present invention.

As described above, an application of a CD may request a DDD using HTTP GET. Here, the GET message may have a format as illustrated in embodiment t422010. A DDD request message using GET may be transmitted to a URL of a DDD acquired from a PD. Furthermore, host information of an IP_address/port of description may be used. In addition, a language preferred by a control point may be used. The GET message may be the same as the message in the aforementioned embodiment.

As described above, a response message to the DDD request message may be returned. Address information may be delivered through the header of the response message.

In the aforementioned Websocket based architecture embodiment #1, a response header format according to the illustrated embodiment t422020 may be used. The response header according to the embodiment can include address information of various Websocket endpoints in addition to basic 200 OK message information. As shown, address information about endpoints such as the service/content identification endpoint and the ESG information endpoint may be included in the response header. Since the response header format is used in Websocket based architecture embodiment #1, the pieces of address information about the endpoints may be arranged. Here, the structure and form in which address information is included in the response header may be configured in various manners according to embodiments.

The response header format according to the illustrated embodiment t422020 may be used in the aforementioned HTTP based architecture embodiment #1. In this case, the address information of the Websocket endpoints can be replaced by URL address information of service URLs. Accordingly, element names may be changed. Similarly, since the response header format is used in HTTP based architecture embodiment #1, the pieces of address information of the service URLs may be arranged.

In the aforementioned Websocket based architecture embodiment #2, a response header format according to the illustrated embodiment t422030 may be used. The response header according to the embodiment can include address information of a Websocket endpoint in addition to basic 200 OK message information. Since the response header format is used in Websocket based architecture embodiment #2, only address information about a companion endpoint can be included therein. Here, the structure and form in which the address information is included in the response header may be configured in various manners according to embodiments.

The response header format according to the illustrated embodiment t422030 may be used in the aforementioned HTTP based architecture embodiment #2. In this case, the address information of the Websocket companion endpoint can be replaced by address information of a companion service URL. Accordingly, element names may be changed. Similarly, since the response header format is used in HTTP based architecture embodiment #2, only the address information of the companion service URL may be included therein.

In the aforementioned Websocket based architecture embodiment #3, a response header format according to the illustrated embodiment t422040 may be used. The response header according to the embodiment can include address information of n Websocket endpoints in addition to basic 200 OK message information. For example, address information of a companion endpoint that executes the service/content identification function, the ESG information delivery function, etc. and address information of the app-to-app communication endpoint may be included in the response header. Here, the structure and form in which address information is included in the response header may be configured in various manners according to embodiments.

FIG. 423 illustrates a process for discovering a Websocket endpoint or an HTTP service URL using a URL of a response header to a DDD request according to an embodiment of the present invention.

As described above, a PD may multicast a discovery message for advertising the PD or transmit a response message to a received M-SEARCH message to a CD. An application of the CD may obtain a URL from a LOCATION header of the multicast discovery message or the response message to the M-SEARCH message. The URL may be a URL through which a DDD can be acquired, and the application of the CD may send an HTTP GET request to the URL. The processes t42310 and t42320 may be the same as the aforementioned embodiment.

Here, a response message may be received as a response to the HTTP GET request. In the aforementioned embodiment, address information has been delivered through a DDD included in the body of the response message or the response message header. In the present embodiment, a URL through which address information can be acquired may be delivered through the response message header. In this case, the body of the response message may include no information and or may include a DDD (t423020).

The application of the CD may request address information by sending the HTTP GET request to the delivered URL for the address information. The PD may send a response message to the application of the CD. The address information can be delivered to the CD through the response message (t423030). The address information may be delivered through the body of the response message. According to an embodiment, the address information may be delivered through the header of the response message.

FIG. 424 illustrates a GET request and response message formats according thereto in a process for discovering a Websocket endpoint or an HTTP service URL using a URL of a response header to a DDD request according to an embodiment of the present invention.

As described above, an application of a CD may request a DDD using HTTP GET. Here, the GET message may have a format as illustrated in embodiment t424010. A DDD request message using GET may be transmitted to a URL of a DDD acquired from a PD. Furthermore, host information of an IP address/port of description may be used. The GET message may be the same as the message in the aforementioned embodiment.

A response message may be received in response to the HTTP GET request. The response message may have a format as shown in embodiment t424020. The response message may include a URL through which address information can be acquired in addition to basic 200OK message information. The URL may be URL information for acquiring the address of a Websocket endpoint or URL information for acquiring the address of an HTTP service URL. Alternatively, the URL may be URL information for obtaining both. In the illustrated format, the URL information for acquiring the address of a Websocket endpoint is included.

The application of the CD may send a request for address information to the URL using HTTP GET. Here, the GET message may have a format shown in embodiment t424030. The request message using GET may be transmitted to a URL of address information acquired from the PD. In addition, host information of an IP address/port of description may be used. Furthermore, a language preferred by a control point may be used.

For example, when the URL for acquiring the address information is http://192.168.1.10:8080/WSEndpoints (assuming Websocket), the GET message using this URL may be configured as shown in embodiment t424040.

Subsequently, a response message to the address information request message may be returned as described above. The response message may include address information. The address information may be the address of the Websocket endpoint or the address of the HTTP service URL.

FIG. 425 illustrates formats of a response message delivering address information in a process for discovering a Websocket endpoint or an HTTP service URL using a URL of a response header to a DDD request according to an embodiment of the present invention.

In the aforementioned Websocket based architecture embodiment #1, a response message format according to the illustrated embodiment t425010 may be used.

As shown, address information about endpoints such as the service/content identification endpoint and the ESG information endpoint may be included in the message. Since the message format is used in Websocket based architecture embodiment #1, the pieces of address information about the endpoints may be arranged.

The message format according to the illustrated embodiment t425010 may be used in the aforementioned HTTP based architecture embodiment #1. In this case, the address information of the Websocket endpoints can be replaced by URL address information of service URLs. Accordingly, element names may be changed. Similarly, since the message format is used in HTTP based architecture embodiment #1, the pieces of address information of the service URLs may be arranged.

In the aforementioned Websocket based architecture embodiment #2, a message format according to the illustrated embodiment t425020 may be used.

The message format according to the illustrated embodiment t425020 may be used in the aforementioned HTTP based architecture embodiment #2. In this case, the address information of the Websocket companion endpoint can be replaced by address information of a companion service URL. Accordingly, element names may be changed. Similarly, since the message format is used in HTTP based architecture embodiment #2, only the address information of the companion service URL may be included therein.

In the aforementioned Websocket based architecture embodiment #3, a message format according to the illustrated embodiment t425030 may be used.

The message format according to the illustrated embodiment t425030 may include n Websocket endpoints. For example, address information of a companion endpoint that executes the service/content identification function, the ESG information delivery function, etc. and address information of the app-to-app communication endpoint may be included in the message format.

While the illustrated formats include address information in an additionalData element, the message may include other pieces of information according to embodiments. Here, a structure and a form in which address information is included in the message may be configured in various manners according to embodiments.

FIG. 426 illustrates a Websocket based handshake & connection process (after discovery) according to an embodiment of the present invention.

As described above, a PD may serve as a Websocket server and a CD may correspond to a Websocket client. The PD may include a Websocket server and/or a companion service module. The companion service module may provide information necessary for a companion device or perform overall management related to companion services. The companion service module may be a hardware module.

The Websocket server of the PD may provide Websocket endpoints. An application available in a web browser in the CD may be executed. The web browser may also provide a Websocket client.

First, the companion service module of the PD may request generation of a Websocket endpoint from the Websocket server (t426010). For example, a request in the form of @ServerEndpoint("/WS_AA") in Java format may be delivered. Here, "/WS_AA" may refer to a related URL. Through this process, the Websocket server can generate the Websocket endpoint.

An application of the CD may call an API for generating a Websocket object (t426020). The API in the name of newWebsocket may have the address of the Websocket endpoint as a variable thereof. For example, ex_Websocket can be defined in the form of ex_Websocket=newWebsocket (ws://192.168.1.11:8080/WS_AA). Through this process, the Websocket object can be generated in the CD. Here, handshake between the endpoint of the Websocket server in the PD and the Websocket object of the CD can be performed (t426030).

The application of the CD may call an APR for adding OpenEventHandler (t426040). The API may be WebsocketObject.onopen( ). For example, a handler can be added in a manner of ex_Websocket.onopen( . . . ). In this process, the Websocket server and a client can be connected (t426050). The Websocket client can notify the application of the CD of opening of connection (t426060).

FIG. 427 illustrates a handshake & connection process for Websocket based app-to-app communication (after discovery) according to an embodiment of the present invention.

In a Websocket based architecture, app-to-app communication can be performed between an application executed in a PD and an application executed in a CD. As described above, when the application of the PD is connected to a Websocket server and the application of the CD is also connected to the Websocket server, the Websocket server can relay messages and data between the applications.

First, the application of the PD may call an API in order to generate a new Websocket object in a Websocket client in the PD. The aforementioned newWebsocket API may be used. For example, the API can be used such as local_Websocket=newWebsocket(ws://localhost:8080/ApptoApp). In this process, the Websocket object for the application of the PD can be generated.

A companion service module of the PD may call an API from the Websocket server to generate a Websocket endpoint (t427020 and t427030). This process has been described above. In this case, an endpoint for app-to-app communication needs to be generated, and thus a URL (e.g., /ApptoApp) related to app-to-app communication can be used as a variable. Thereafter, the local Websocket client of the PD and the Websocket server can perform a handshake process (t427040).

The application of the CD may also generate a Websocket object (t427050). The process for generating the Websocket object is the same as the aforementioned process. In this case, since the Websocket object is a Websocket object for app-to-app communication, the Websocket object can be defined in the form of remote_Websocket=newWebsocket (ws://192.168.1.11:8080/ApptoApp). Subsequently, the Websocket server of the PD and the Websocket object of the CD can perform a handshake process (t427060).

The Websocket client of the PD and the Websocket client of the CD may call an API in order to add OpenEventHandler (t427091 and t427090). This process is the same as the aforementioned process. Accordingly, the Websocket clients can be connected to the Websocket server (t427070 and t427100). Upon connection, the Websocket clients can notify the applications of opening of connection through an event (t427080 and t427110).

Upon completion of the aforementioned processes, the application of the CD and the application of the PD can communicate each other (t427120). The applications of both sides can deliver messages to each other through the Websocket server. That is, the Websocket server can relay a message sent from one client to the other client. Such a two-way communication process will be described in detail below.

FIG. 428 illustrates a Websocket based two-way communication process (after connection) according to an embodiment of the present invention.

A case in which the application of the CD and the Websocket server of the PD have been connected through the aforementioned processes is assumed (t428010). As described above, the Websocket client can notify the application of the CD of opening of connection (t428020).

The companion service module may call an API in order to receive a message (t428030). For example, an API such as @OnMessage in the Java format can be used. Accordingly, the Websocket server may be ready to receive a message (ready receive).

The application of the CD may call an API for adding MessageEventHandler (t428040). For example, an API such as WebsocketObject.onmessage( ) can be called. In the case of an object such as ex_Websocket in the aforementioned example, an API may be called in the form of ex_Websocket.onmessage( . . . ). Through this process, the Websocket client of the CD may be ready to transmit/receive messages.

The application of the CD may call an API for sending a message (t428050). For example, an API such as WebsocketObject.send(message1) can be called. In the case of an object such as ex_Websocket in the aforementioned example, an API such as ex_Websocket.send(message1) can be called. Accordingly, a message (message 1) can be delivered to the Websocket server (t428060).

The Websocket server may deliver the received message (message 1) to the companion service module (t428070). The companion service module may deliver a message (message 2) in response to the message (message 1) (t428080, t428090 and t428100).

The companion service module may call an API for sending the message (t428080). To transmit an object in a text or JSON format, a Java API such as session.getBasicRemote( ).sendText(message2) or session.getBasicRemote( ).sendObject (message2) can be called.

FIG. 429 illustrates a Websocket based app-to-app two-way communication process (after connection: CD-to-PD) according to an embodiment of the present invention.

A case in which the application of the CD, the Websocket server of the PD and the application executed in the PD have been connected through the aforementioned processes is assumed. The applications may have received information indicating opening of connection from the Websocket client through an event.

As described above, the companion service module may call an API in order to receive a message and the Websocket server may be ready to receive a message through the API (t429030). The application of the PD may call an API in order to add MessageEventHandler and the Websocket client of the PD may be ready to receive a message (t429040). The application of the CD may call an API such that the Websocket client is ready to receive a message (t429020). The detailed process has been described above.

The application of the CD may call an API in order to send a message (t429050). The API may be the aforementioned API. For example, an API such as remote_Websocket.send (message1) can be used. A message can be delivered to the Websocket server through the API (t429060). The Websocket server can deliver the message (message 1) to the companion service module (t429070).

The companion service module may search for a local Websocket session in order deliver the message to the local Websocket client of the PD. The companion service module may call an API in order to deliver the message (message 1) when the local Websocket session is found (t429080). Here, a Java API such as session.getBasicRemote( ).sendText (message 1) or session.getBasicRemote( ).sendObject (message1) can be called in order to transmit an object in a text or JSON format, as described above.

The Websocket server can deliver the message (message 1) to the Websocket client (t429090) and the Websocket client can deliver the message (message 1) to the application of the PD (t429100).

FIG. 430 illustrates a Websocket based app-to-app two-way communication process (after connection: PD-to-CD) according to an embodiment of the present invention.

A case in which the application of the CD, the Websocket server of the PD and the application executed in the PD have been connected through the aforementioned processes is assumed. The applications may have received information indicating opening of connection from the Websocket client through an event.

The Websocket server and the Websocket clients may have been ready to transmit/receive messages through the aforementioned processes.

The application of the PD may call an API in order to send a message (t430010). The API may be the aforementioned API. For example, an API such as local_Websocket.send (message2) can be used. A message can be delivered to the Websocket server through the API (t430020). The Websocket server can deliver the message (message 2) to the companion service module (t430030).

The companion service module may search for a remote Websocket session in order deliver the message to a remote Websocket client of the PD. The companion service module may call an API in order to deliver the message (message 2) when the remote Websocket session is found (t430040). Here, a Java API such as session.getBasicRemote( ).sendText(message2) or session.getBasicRemote( ).sendObject (message2) can be called in order to transmit an object in a text or JSON format, as described above.

The Websocket server can deliver the message (message 2) to the Websocket client (t430050) and the Websocket client can deliver the message (message 2) to the application of the CD (t430060).

FIG. 431 illustrates an HTTP based request-response process (after discovery) according to an embodiment of the present invention.

It is assumed that all HTTP service URLs have been discovered through the above-described discovery process in an HTTP based architecture (t431010).

An application of a CD may call an API and send a request for a message to an HTTP client (t431020). The HTTP client may send the request to an appropriate URL corresponding to the request of the application from among the HTTP service URLs discovered in the discovery process (t431030). Alternatively, the HTTP client may send the request to a companion service URL according to the aforementioned embodiment. In this case, content of the request can be identified through the query term of the request.

An HTTP server may deliver the request to a companion service module in a PD (t431040). The companion service module may call an API in order to deliver the requested message (message1) to the CD (t431050).

The HTTP server may deliver the message (message 1) to the HTTP client (t431060) and the HTTP client may deliver the message to the application of the CD (t431070).

FIG. 432 illustrates a method for providing a broadcast service by a PD according to an embodiment of the present invention.

The method for providing a broadcast service by the PD according to an embodiment of the present invention may include a step of performing a discovery process with a CD application, a step of establishing Websocket connection, a step of receiving an EA (Emergency Alert) message and/or step of delivering the EA message to a CD through Websocket connection.

First, a companion module of a broadcast reception apparatus which operates as a PD may perform a discovery process with a CD application executed in a companion device (CD). The discovery process has been described above. Here, it is assumed that the CD application is not launched by the PD. The CD may multicast an M-SEARCH message. Upon reception of the M-SEARCH message, the PD may reply to the message with a 200 OK message. The header of the 200 OK message may include a location URL of the PD.

The CD application may send a request for device description to the location URL. The request may be performed using the HTTP GET method. Upon reception of the request, the PD or the companion module of the PD may transmit a first response message to the CD application. Here, the first response message may include a first URL in the header thereof. The first URL may be used as an endpoint of a web server provided by the PD. Here, the endpoint of the web server may refer to a service URL provided by the web server. The first URL may correspond to a companion service URL used in the aforementioned HTTP based architectures. There may be service URLs depending on functions according to an embodiment. In such a case, the first URL may be one of multiple HTTP service URLs.

The companion module of the PD may receive an application information request from the CD application. The CD application may send the application information request to the first URL. The companion module may transmit a second response message in response to the application information request. The second response message may include the second URL in a response message body. The second URL may be used as an endpoint of a Websocket server provided by the PD. Here, the second URL which is address information of the corresponding Websocket endpoint may be a companion Websocket endpoint or an app-to-app Websocket endpoint.

The present embodiment may correspond to the aforementioned embodiment in which an HTTP based web server and a Websocket based Websocket server are provided by the PD. Specifically, the present embodiment may correspond to the embodiment from among the aforementioned embodiments, in which only one companion service URL is provided as an HTTP service URL and one companion endpoint and one app-top-app endpoint are provided as Websocket server endpoints. Here, the Websocket companion endpoint may be an endpoint providing functions other than the app-to-app communication function. Communication between the PD and the CD may be performed by a web server (HTTP) or a Websocket server depending on functions. For example, ESG delivery may be performed by the web server and service & content identification, EA (Emergency Alert) message delivery and media playback information delivery may be performed by the Websocket server. Media timeline information may be delivered through the web server and/or the Websocket server.

Subsequently, the companion module of the PD may establish Websocket connection between the Websocket server and the CD application. In this process, the second URL may be used. The method of establishing Websocket connection (session) has been described above in detail. Here, the Websocket connection may be Websocket connection for connecting a PD application and a CD application for app-to-app communication or Websocket connection for exchanging information between the PD and the CD application.

A reception module of the PD may receive an EA message including EA information over a broadcast network or a broadband network. The reception module may be one of a tuner that receives data through a broadcast network and a network interface that receives data over broadband or may include both the tuner and the network interface. The EA message may refer to a message including EA information for announcing an emergency situation. This has been described above.

The Websocket server of the PD may deliver the received EA message to the CD through Websocket connection. The delivery process will be described below in detail. Here, the Websocket server may refer to a hardware module or a processor that performs operation corresponding to the aforementioned Websocket server.

In a method for providing a broadcast service by a PD according to another embodiment of the present invention, the step of delivering the EA message to the CD may further include a step of executing a PD application for processing EA information, a step of executing an EA application of the CD by the PD application and/or a step of delivering the EA message from the PD application to the EA application of the CD through Websocket connection.

When the EA message is received, an internal control module of the PD may execute an application of the PD related to the EA message. The application of the PD may render the EA message and manage a process of delivering the EA message to the CD. The application of the PD may execute the EA application in the CD. The EA application may be an application having a function of rendering and processing the EA message in the CD. When the EA application is executed in the CD, app-to-app Websocket connection may be established between the EA application and the application of the PD. This process has been described above. The application of the PD may deliver the received EA message to the EA application. The EA application may render and process the EA message in the CD.

In a method for providing a broadcast service by a PD according to another embodiment of the present invention, the EA message may include ID information for identifying the EA message, expiration time information indicating a time at which the EA message expires and/or category information indicating a type of an emergency alert indicated by the EA message. Information that can be included in the EA message has been described above.

A method for providing a broadcast service by a PD according to another embodiment of the present invention may further include a step in which the CD application requests timeline information using the HTTP GET method and/or a step in which the PD delivers an HTTP response message to the CD application. The aforementioned web server of the PD may be requested to provide the timeline information. Here, the timeline information may refer to information about a media timeline of a broadcast service being provided by the PD. The web server of the PD transmits the response message to the request to the CD application. The response message may include UTC information and media time information in a pair. The UTC information may refer to absolute time information which is current UTC time information and the media time information may refer to media time information at the UTC time.

A method for providing a broadcast service by a PD according to another embodiment of the present invention may further include a step in which the CD application requests a service identification message from the Websocket server of the PD and/or a step in which the Websocket server delivers the service identification message to the CD application. The request and a response thereto may be performed through Websocket connection. Here, the PD may deliver the service identification message to the CD application through notification without a request of the CD application according to an embodiment. The service identification message may include at least one piece of service related information or at least one piece of content related information acquired from electronic service guide (ESG) data. Service related information may be included in the service identification message in the form of a service element and content related information may be included in the service identification message in the form of a content element.

In a method for providing a broadcast service by a PD according to another embodiment of the present invention, the service identification message may include component information and/or content item information related to each piece of content. The content element of the service identification message may include component elements that describe components included in the corresponding content and/or content item elements that describe files/data related to the corresponding content. Here, content may correspond to a program of the corresponding broadcast service (channel).

Here, the component information may include information about components having continuous and presentable data of the corresponding content. For example, the components may correspond to an audio component, a video component, a closed caption component, etc. In addition, each piece of component information may include URL information for accessing the corresponding component. The URL information may be service URL information of the PD or URL information of a server provided by a service provider.

The content item information may include information about additional data components of the corresponding content. Here, additional data components may refer to data such as the aforementioned app-based enhancement components or applications, and signaling information related to applications. In addition, each piece of content item information may include URL information for accessing the corresponding data. The URL information may be service URL information of the PD or URL information of a server provided by the service provider.

In a method for providing a broadcast service by a PD according to another embodiment of the present invention, URL information for accessing an additional data component may be used to acquire data for providing app-based enhancement for a broadcast service.

A method for providing a broadcast service by a CD according to an embodiment of the present invention will be described. This method is not shown in the drawings.

The method for providing a broadcast service by a CD according to an embodiment of the present invention may include a step in which a launcher of the CD executes an application of the CD, a step in which the application of the CD performs a discovery process with a PD using a network interface of the CD, a step in which the application of the CD establishes Websocket connection with a Websocket server of the PD using a Websocket client of the CD and/or a step in which the application of the CD receives an EA message using the Websocket client of the CD. The discovery process between the CD application and the PD may be performed by a companion module of the CD. The CD application may send a device description request using the companion module, send an application information request to the aforementioned first URL and acquire a response to the requests. In addition, an EA application of the CD may be executed by a PD application to perform app-to-app communication through Websocket connection. The EA application may receive an EA message through the app-to-app communication.

Methods for providing a broadcast service by a CD according to embodiments of the present invention may correspond to the above-described method for providing a broadcast service by a PD according to embodiments of the present invention. Methods for providing a broadcast service by a CD may be performed by hardware modules corresponding to modules (e.g., the companion module, the reception module, the internal control module, the web server and the Websocket server) used in the methods for providing a broadcast service by a PD. Methods for providing a broadcast service by a CD may have embodiments corresponding to the above-described embodiments of the method for providing a broadcast service by a PD.

The aforementioned steps may be omitted or replaced by other steps performing similar/identical operations according to embodiments.

FIG. 433 illustrates a broadcast reception apparatus operating as a PD according to an embodiment of the present invention.

The broadcast reception apparatus operating as a PD according to an embodiment of the present invention may include the aforementioned companion module, reception module, internal control module, web server and/or Websocket server. The blocks and modules have been described above. Here, the web server/Websocket server may refer to hardware modules or processors that perform operations corresponding to the aforementioned web server/Websocket server.

The broadcast reception apparatus operating as a PD according to an embodiment of the present invention and internal modules/blocks thereof may perform the aforementioned embodiments of the methods for providing a broadcast service by a PD.

An apparatus operating as a CD according to an embodiment of the present invention will be described. This apparatus is not shown in the drawings.

The apparatus operating as a CD according to an embodiment of the present invention may include the aforementioned launcher, companion module and/or network interface. The blocks and modules have been described above.

The apparatus operating as a CD according to an embodiment of the present invention and internal modules/blocks thereof may perform the aforementioned embodiments of the methods for providing a broadcast service by a CD.

The internal blocks/modules of the aforementioned apparatus may be processors that perform continuous processes stored in a memory and may be hardware elements provided inside/outside the apparatus according to an embodiment.

The aforementioned modules may be omitted or replaced by other modules performing similar/identical operations according to embodiments.

FIG. 434 illustrates conversion of an ESGData state variable in XML format into an ESGData state variable in JSON format according to another embodiment of the present invention.

The broadcast reception apparatus according to an embodiment of the present invention may employ various protocols such as HTTP (Hypertext Transfer Protocol), RTP (Real-time Transport Protocol), XMPP (Extensible Messaging and Presence Protocol), FTP (File Transfer Protocol) and Websocket in order to deliver messages including various types of information (e.g., ESG data) used for communication between devices for various purposes.

When the broadcast reception apparatus according to an embodiment of the present invention delivers a message used for communication between devices through the various protocols, the broadcast reception apparatus may deliver data in various types (e.g., a string, an integer, a floating point, Boolean, a character, an array, a list, etc.) defined in the protocols. To more structurally represent, deliver and store complex data, the broadcast reception apparatus may use Markup formats such as XML (Extensible Markup Language), HTML (Hypertext Markup Language), XHTML (Extensible Hypertext Markup Language) and JSON (JavaScript Object Notation) or text and image format. The formats employed by the broadcast reception apparatus are not limited to a specific format.

A description will be given of a method for delivering a message (e.g., a state variable) including ESG data by the broadcast reception apparatus to a companion device using the Websocket protocol. In this case, the broadcast reception apparatus may convert an ESGData state variable including ESG data into an ESGData state variable in the JSON format and deliver the ESGData state variable in the JSON format to a companion screen device using the Websocket protocol.

FIG. (a) illustrates an embodiment in which ESG data is set to the ESGData state variable in XML (or XML data structure). The ESGData state variable has been described above in detail.

Referring to FIG. (b), the ESGData state variable in XML of FIG. (a) can be converted into the ESGData state variable in the JSON format. Details of the ESGData state variable in the JSON format are the same as details of the ESGData state variable in XML.

In this manner, any data in XML (XML data structure) can be converted into data in JSON format. Data in JSON format may be referred to as a JSON object. The JSON object may be delivered from the broadcast reception apparatus (e.g., a primary device) to a companion device through the Websocket protocol.

FIG. 435 illustrates a process for delivering the ESGData state variable in JSON format to a companion device using WetSocket protocol according to another embodiment of the present invention.

The illustrated CD may refer to a companion device and the illustrated PD (Primary Device) may refer to a receiver or a broadcast reception apparatus.

The CD may generate a Websocket object by calling a Websocket API using the following syntax (C58003).

[Construct Websocket Object]

Websocketobjectname=new Websocket(Websocket address)

Ex) WS_ESG=new Websocket("ws://Tvhost:8080/ESGServer")

Here, the name of the generated Websocket object may be "WS_ESG", the called Websocket API may be "new Websocket" for generating a new Websocket, and the address of the Websocket server may be "ws://Tvhost:8080/ESGServer".

Then, the companion device may open Websocket connection by calling a Websocket API using the following syntax (C58005).

[Open a Websocket Connection]

Ex) WS_ESG.onopen=function { ~~~ }

Here, "WS_ESG.onopen" may be an open event handler for opening Websocket. "function { ~~~ }" may be a Websocket API opening Websocket connection.

In this state (C58010), the ESGData state variable of the broadcast reception apparatus may not have any value.

A service/content provider may transmit ESG data over a broadcast network or a broadband channel (C58020). The ESG data may be received through a reception unit or a network interface of the broadcast reception apparatus. Here, the reception unit may be the aforementioned broadcast interface or tuner.

The broadcast reception apparatus may signal the received ESD data (C58030).

Then, the broadcast reception apparatus and the companion device may open Websocket connection (C58035).

The method of opening Websocket connection has been described above. For example, an application processor (not shown) included in the broadcast reception apparatus may send a request for connection with the companion device to a network processor (not shown). Then, the network processor may receive the connection request from the companion device. The network processor may search for a matching connection request of the application processor on the basis of information received from the companion device.

The network processor may connect the companion device with the application processor of the broadcast reception apparatus when the matching connection request is found. Here, the application processor may be an application module or an application browser. The network processor may be a Websocket server.

When Websocket connection between the broadcast reception apparatus and the companion device is open, the broadcast reception apparatus and the companion device switch to a state in which they can transmit and/or receive messages.

Then, the companion device may transmit/receive various messages to/from the broadcast reception apparatus using the following event handler (C58037).

For example, the event handler may include a Message Event Handler, an Error Event Handler and/or a Close Event Handler.

Here, the Message Event Handler is an event handler for transmitting and/or receiving messages between the broadcast reception apparatus and the companion screen and a syntax therefor is as follows.

[Message Event Handler]

EX) WS_ESG.onmessage=function { ~~~ }

Here, the Error Event Handler is an event handler for transmitting and/or receiving messages related to errors in Websocket connection, the broadcast reception apparatus and/or the companion device and a syntax therefor is as follows.

[Error Event Handler]

EX) WS_ESG.onerror=function { ~~~ }

Here, the Close Event Handler is an event handler for closing Websocket connection and a syntax therefor is as follows.

[Close Event Handler]

EX) WS_ESG.onclose=function { ~~~ }

Thereafter, the broadcast reception apparatus may store (or set) the ESG data in the ESGData state variable (C58040).

For example, the ESGData state variable may be in XML or JSON format. When the broadcast reception apparatus initially sets the ESG data in the ESGData state variable in XML, the broadcast reception apparatus may convert the state variable in XML into a state variable in the JSON format.

Then, the broadcast reception apparatus may deliver the JSON object of the ESGData state variable to the companion device through the Websocket protocol (C58050).

Upon reception of the ESGData state variable, the companion device may parse the ESGData state variable (C58060) and then expose the ESG data through a UI according to the parsed value (C56070).

Here, to show the ESG data to a user, the companion device may represent the UI at a native level or represent the same in an application.

The companion device may represent the ESG data in various manners according to various embodiments. When the ESG data is received, the companion device may immediately expose the ESG data in any form to the user according to an embodiment. In another embodiment, when the ESG data is received, the companion device may send a notification message to the user and expose the ESG data when the user executes the corresponding application. In another embodiment, when the ESG data is received, the companion device has the ESG data in the background and exposes the ESG data to the user when the user directly executes an application for seeing the ESG data.

Modules or units may be processors executing consecutive processes stored in a memory (or a storage unit). The steps described in the aforementioned embodiments can be performed by hardware/processors. Modules/blocks/units described in the above embodiments can operate as hardware/processors. The methods proposed by the present invention can be executed as code. Such code can be written on a processor-readable storage medium and thus can be read by a processor provided by an apparatus.

While the embodiments have been described with reference to respective drawings for convenience, embodiments may be combined to implement a new embodiment. In addition, designing computer-readable recording medium storing programs for implementing the aforementioned embodiments is within the scope of the present invention.

The apparatus and method according to the present invention are not limited to the configurations and methods of the above-described embodiments and all or some of the embodiments may be selectively combined to obtain various modifications.

The methods proposed by the present invention may be implemented as processor-readable code stored in a processor-readable recording medium included in a network device.

The processor-readable recording medium includes all kinds of recording media storing data readable by a processor. Examples of the processor-readable recording medium include a ROM, a RAM, a CD-ROM, a magnetic tape, a floppy disk, an optical data storage device and the like, and implementation as carrier waves such as transmission over the Internet. In addition, the processor-readable recording medium may be distributed to computer systems connected through a network, stored and executed as code readable in a distributed manner.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. Such modifications should not be individually understood from the technical spirit or prospect of the present invention.

Both apparatus and method inventions are mentioned in this specification and descriptions of both the apparatus and method inventions may be complementarily applied to each other.

Those skilled in the art will appreciate that the present invention may be carried out in other specific ways than those set forth herein without departing from the spirit and essential characteristics of the present invention. Therefore, the scope of the invention should be determined by the appended claims and their legal equivalents, not by the above description, and all changes coming within the meaning and equivalency range of the appended claims are intended to be embraced therein.

In the specification, both the apparatus invention and the method invention are mentioned and description of both the apparatus invention and the method invention can be applied complementarily.

Various embodiments have been described in the best mode for carrying out the invention.

The present invention is applied to broadcast signal providing fields.

Various equivalent modifications are possible within the spirit and scope of the present invention, as those skilled in the relevant art will recognize and appreciate. Accordingly, it is intended that the present invention cover the modifications and variations of this invention provided they come within the scope of the appended claims and their equivalents.

What is claimed is:

1. A method for providing a broadcast service by a primary device (PD), the method comprising:

receiving a broadcast signal;

processing the broadcast signal, the processing further comprising:

time deinterleaving data in the broadcast signal by a time interleaving (TI) block to generate time deinterleaved data, the TI block including a number of actual forward error correction (FEC) blocks that corresponds to a difference between a maximum value and a number of virtual FEC blocks, and decoding the time deinterleaved data;

performing a discovery process with a companion device (CD) application executed in a CD, wherein the discovery process includes receiving a device description request from the CD application, transmitting a first response message, receiving, from the CD application, an application information request destined for a first uniform resource locator (URL) and transmitting a second response message, wherein a header of the first response message includes the first URL, and the second response message includes a second URL used as a Websocket endpoint of the PD;

establishing a Web socket connection between a Websocket server and the CD application based on the second URL; and sending a notification related to an emergency alert message to the CD application through the Websocket connection, when there is a change to at least one syntax related to the emergency alert message and when the CD application uses a subscription for a service related to the emergency alert message.

2. The method according to claim 1, wherein the CD is synchronized with the PD, and wherein the CD compensates a media time based on a media time field and a current time field related to the notification.

3. The method according to claim 1, wherein additional information including a social network message or a pop-up quiz is displayed based on a media time field related to the notification.

4. The method according to claim 1, wherein the CD displays a first event at a first media time and a second event at a second media time based on media timeline information.

5. A broadcast reception apparatus operating as a primary device (PD), the broadcast reception apparatus comprising:

a tuner configured to receive a broadcast signal;

a processor configured to time deinterleave data in the broadcast signal by a time interleaving (TI) block to generate time deinterleaved data, the TI block including a number of actual forward error correction (FEC) blocks that corresponds to a difference between a maximum value and a number of virtual FEC blocks, wherein the processor is further configured to decode the time deinterleaved data;

a companion device interface configured to perform a discovery process with a companion device (CD) application executed in a CD, wherein the discovery process includes receiving a device description request from the CD application, transmitting a first response message, receiving, from the CD application, an application information request destined for a first uniform resource locator (URL) and transmitting a second response message, wherein a header of the first response message including the first URL, and the second response message includes a second URL used as a Websocket server endpoint of the PD; and a Websocket server configured to establish a Websocket connection between the Websocket server and the CD application based on the second URL, and send a notification related to an emergency alert message to the CD application through the Websock connection, when there is a change to at least one syntax related to the emergency alert message and when the CD application uses a subscription for a service related to the emergency alert message.

6. The broadcast reception apparatus according to claim 5, wherein the CD is synchronized with the PD, and wherein the CD compensates a media time based on a media time field and a current time field related to the notification.

7. The broadcast reception apparatus according to claim 5, wherein additional information including a social network message or a pop-up quiz is displayed based on a media time field related to the notification.

8. The broadcast reception apparatus according to claim 5, wherein the CD displays a first event at a first media time and a second event at a second media time based on media timeline information.

* * * * *